US012094018B1

(12) United States Patent
O'Malley

(10) Patent No.: US 12,094,018 B1
(45) Date of Patent: Sep. 17, 2024

(54) NLP AND AIS OF I/O, PROMPTS, AND COLLABORATIONS OF DATA, CONTENT, AND CORRELATIONS FOR EVALUATING, PREDICTING, AND ASCERTAINING METRICS FOR IP, CREATIONS, PUBLISHING, AND COMMUNICATIONS ONTOLOGIES

(71) Applicant: Matt O'Malley, Lake Balboa, CA (US)

(72) Inventor: Matt O'Malley, Lake Balboa, CA (US)

(*) Notice: Subject to any disclaimer, the term of this patent is extended or adjusted under 35 U.S.C. 154(b) by 776 days.

(21) Appl. No.: 14/067,896

(22) Filed: Oct. 30, 2013

Related U.S. Application Data

(63) Continuation-in-part of application No. 13/815,960, filed on Mar. 15, 2013, now abandoned.

(60) Provisional application No. 61/720,389, filed on Oct. 30, 2012, provisional application No. 61/720,387, filed on Oct. 30, 2012, provisional application No. 61/720,382, filed on Oct. 30, 2012, provisional application No. 61/720,377, filed on Oct. 30, 2012, (Continued)

(51) Int. Cl.

| | |
|---|---|
| ***G06Q 50/18*** | (2012.01) |
| ***G06N 20/00*** | (2019.01) |
| ***G06Q 10/101*** | (2023.01) |
| *G06Q 10/10* | (2012.01) |

(52) U.S. Cl.
CPC .......... *G06Q 50/184* (2013.01); *G06N 20/00* (2019.01); *G06Q 10/101* (2013.01)

(58) Field of Classification Search
None
See application file for complete search history.

(56) References Cited

U.S. PATENT DOCUMENTS 6,049,811 A * 4/2000 Petruzzi .................. G06F 17/24 715/255
7,680,667 B2 * 3/2010 Sonoura .................. G10L 15/26 318/568.11

(Continued)

OTHER PUBLICATIONS

Sheremetyeva, Svetlana, Sergei Nirenburg, and Irene Nirenburg. "Generating patent claims from interactive input." Proceedings of the Eighth International Workshop on Natural Language Generation. 1996.*

(Continued)

*Primary Examiner* — Daniel T Pellett

(57) ABSTRACT

A system and a computer-implement method is provided. A first user input is received and analyzed to generate a relative novelty score, where the first user input is relatively compared with a second input, second user, plurality of users, panel of judges, algorithm, qualified expert, some variation, and/or the like, is presented. The input novelty score system is analyzed against a relative novelty criteria, wherein a violation of the relative novelty criteria/fitness/threshold generates a prompt. The prompt may comprise a request, adjustment, alert, acknowledgement, correction, suggestion, decision, counter-proposal, fee-adjustment, billing-adjustment, score-adjustment, competition, and/or a litigation. The prompt is sent to an entity to interrogate and/or receive a decision, wherein the decision may be characterized as a final, partial absolute, temporary, contingent, conditional, circumstantial, finite, counter, acceptance, suspension, throttle, variation, termination, suggestion, rejection, grant, license, litigation, arbitration, and/or mediation.

20 Claims, 112 Drawing Sheets

Related U.S. Application Data provisional application No. 61/720,374, filed on Oct. 30, 2012, provisional application No. 61/720,370, filed on Oct. 30, 2012.

(56) References Cited

U.S. PATENT DOCUMENTS

| | | | | |
|---|---|---|---|---|
| 7,716,581 | B2 * | 5/2010 | Tran | G06Q 10/10<br>709/238 |
| 8,041,696 | B2 * | 10/2011 | Boss | G06Q 10/06312<br>707/705 |
| 8,041,739 | B2 * | 10/2011 | Glasgow | G06Q 10/10<br>707/791 |
| 2004/0158587 | A1 * | 8/2004 | Shay | G06Q 10/109 |
| 2006/0218173 | A1 * | 9/2006 | Hicks | G06Q 10/00 |
| 2011/0093539 | A1 * | 4/2011 | Laurin | G06Q 10/06<br>709/205 |
| 2013/0238513 | A1 * | 9/2013 | Mohanty | G06Q 10/0633<br>705/310 |

OTHER PUBLICATIONS

Sheremetyeva, Svetlana, and Sergei Nirenburg. "Interactive Knowledge Elicitation in a Patent Expert's Workstation." IEEE Computer 7 (1996).*

* cited by examiner

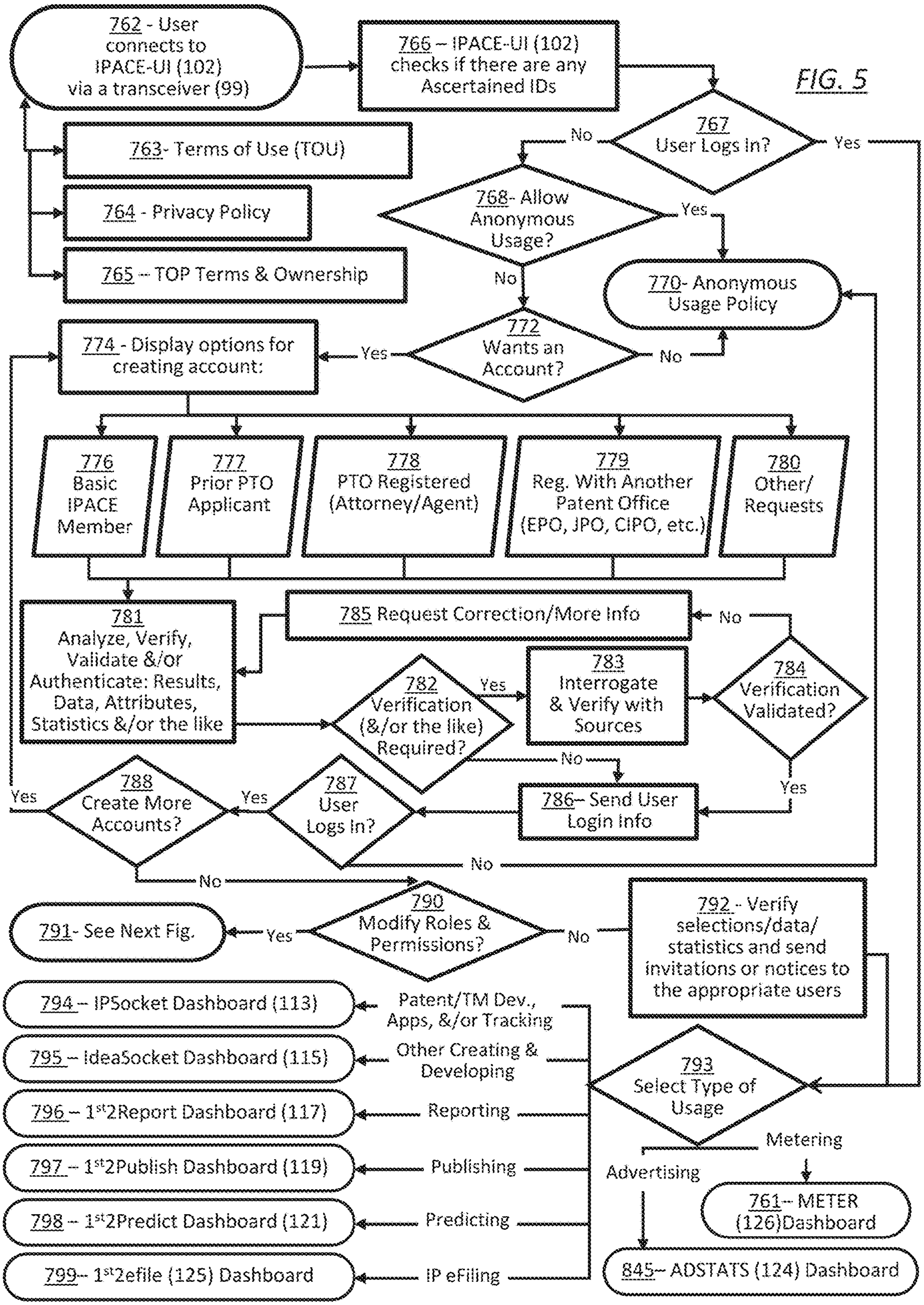
FIG. 5
762 - User connects to IPACE-UI (102) via a transceiver (99)
766 – IPACE-UI (102) checks if there are any Ascertained IDs
763- Terms of Use (TOU)
764 - Privacy Policy
765 – TOP Terms & Ownership
767 User Logs In?
No
Yes
768- Allow Anonymous Usage?
Yes
No
770- Anonymous Usage Policy
772 Wants an Account?
Yes
No
774 - Display options for creating account:
776 Basic IPACE Member
777 Prior PTO Applicant
778 PTO Registered (Attorney/Agent)
779 Reg. With Another Patent Office (EPO, JPO, CIPO, etc.)
780 Other/ Requests
781 Analyze, Verify, Validate &/or Authenticate: Results, Data, Attributes, Statistics &/or the like
785 Request Correction/More Info
782 Verification (&/or the like) Required?
783 Interrogate & Verify with Sources
784 Verification Validated?
786– Send User Login Info
787 User Logs In?
788 Create More Accounts?
790 Modify Roles & Permissions?
791- See Next Fig.
792 - Verify selections/data/ statistics and send invitations or notices to the appropriate users
793 Select Type of Usage
794 – IPSocket Dashboard (113)
Patent/TM Dev., Apps, &/or Tracking
795 – IdeaSocket Dashboard (115)
Other Creating & Developing
796 – 1st2Report Dashboard (117)
Reporting
797 – 1st2Publish Dashboard (119)
Publishing
798 – 1st2Predict Dashboard (121)
Predicting
799– 1st2efile (125) Dashboard
IP eFiling
Metering
Advertising
761– METER (126)Dashboard
845– ADSTATS (124) Dashboard Semantic Web Architecture In Layers FIG. 11a
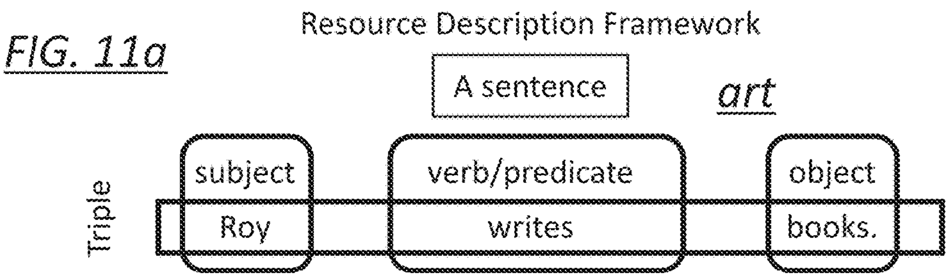
FIG. 11b
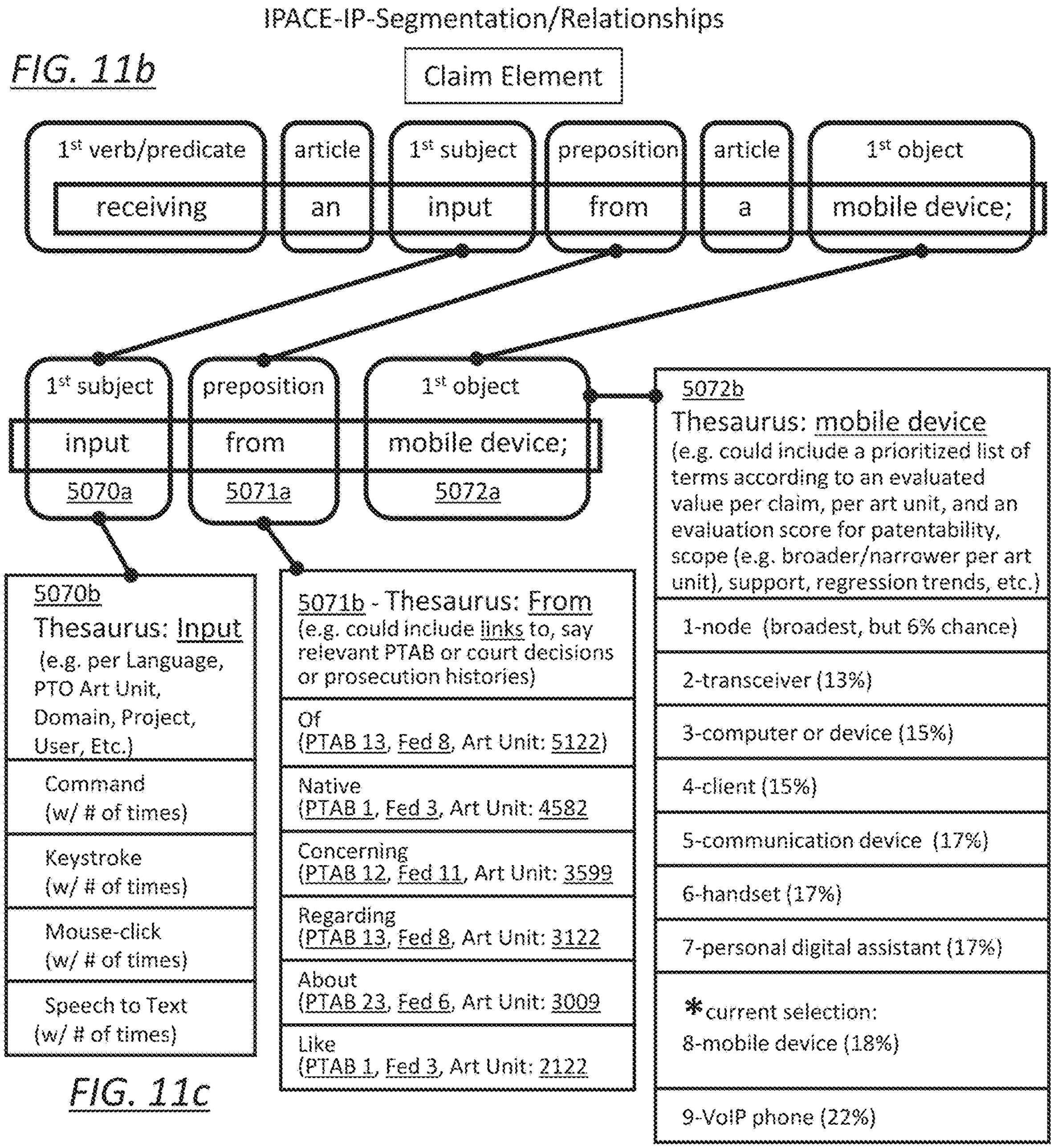
FIG. 11c IPACE-IP-Claim Segmentation "IPACE/ID-ACERS Data Evaluation - and Varying Source/Actor Relationships and Data Perspectives"

1140 T

1140a: A first novel character input for a first user relative to a first domain (e.g. a child's first input on a computer/keyboard) per an ID-ACERS I/O/PC evaluation 1141 The 1141a: A first novel word input for the first user relative to the first domain (e.g. the child's first word input on the computer/keyboard)

FIG. 16a

1142 The largest snowstorm

1142a: ID-ACER interrogates and analyzes each input per the I/O/PC to parse and generate an interval, a node, and a semantic link, say for an adjective "largest" in the interval " largest snowstorm"

FIG. 16b

1143 The largest snowstorm in Chicago

1143a: Starting with the ID-ACERS I/O/PC parsing, analysis, interrogation, and/or evaluation may incorporate an at least one first device input from a first device (e.g. where the first device operates via a processor) from a first actor/user, a first actor/user profile , a first state ID for each, a first time/date stamp for each, and/or, any historical I/O/PC from each for generating and evaluating an ascertained, discerned, relatively perceived, and/or predicted node, edge, interval, interval correlation, link, interval name, and/or the like. Further, where each subsequent input generates another State ID, time/date stamp, and/or the like, for each. Here, the first device input has generated the name interval: "Chicago" and where the ID-ACERS may employ the I/O/PC data, collected data, and historical data to generate a subsequent input prediction list relative to a source/resource/support data, a source/resource/ support data correlation, &/or an evaluation (e.g. a state prediction based on the keyword input "Chicago" (see next Fig.15))

1144 The largest snowstorm in Chicago ,

1144a: ID-ACER ascertains/discerns a punctuation input (e.g. "comma") as a relative predictor of a subsequent input, a subsequent input interval, and generates a prediction list for subsequent inputs, subsequent intervals., and/or the like, where the ID-ACERS may employ historical data from the anticipated analysis, evaluation and/or a prediction, wherein a preceding interval, input/keyword/phrase/expression/value/attribute/relation may be employed to generate the anticipated analysis, evaluation, prediction, projection, and/or the like, along with a list of relative sources/support mappings for interrogating, sources/support-selected, and/or the like. Here, based on subsequent input interval of a "comma" by the first device, the ID-ACERS, as stated in the step1143a, generates an input predictive list that includes the state of "Illinois."

1145 The largest snowstorm in Chicago, Illinois

1145a: ID-ACER evaluates each (I/O/PC) input and each interval subsequent relative to the punctuation input, where each interval is subsequently evaluated to generate the relative prediction list and ranking, and evaluates with a reality using selected interrogation methods, sources, support data obtained, the support data correlation employed, &/or the evaluations made relative to an ascertained/discerned/relatively perceived reality/actuality/set-of-circumstances, &/or the like. Further, to ascertain/discern/relatively perceive a variety of issues and /or improvements, including trust-levels (e.g. inputs/sources/support), shortcomings, latency, formulas, conditions, algorithms, relationships, dependencies, and/or the like, where Artificial Intelligence System may be employed. In an embodiment, via the AIS, a predicted sum/interval/output (e.g. sentence) as represent in an embodiment from the sum of the A/D/RP/AS/P of the inputs interacting with the ID-ACERS, the by the predicted sum/interval/output in a step 1146 is generated.

1146 The largest snowstorm in Chicago, Illinois, record took place January 26-27, 1967, with 23.0 inches of snowfall.

FIG. 16c

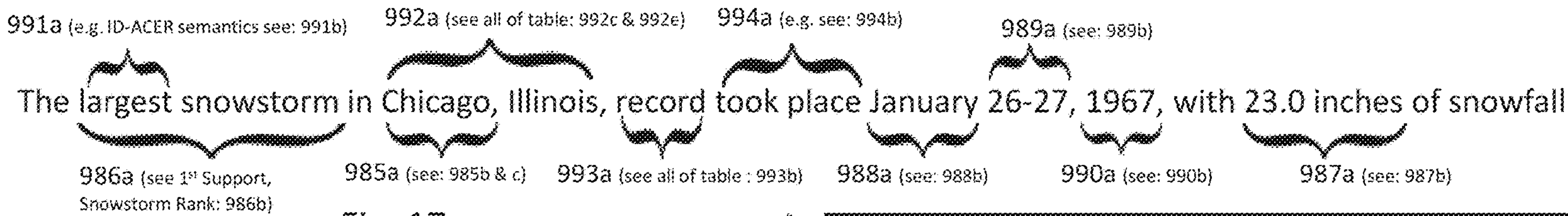

| 985b - Chicago's 5 biggest Snowstorms: | | | | |
|---|---|---|---|---|
| rank | snow | month | day(s) | year |
| 1<br>986b | 23.0<br>987b | Jan<br>988b | 26-27<br>989b | 1967<br>990b |
| 2 | 21.6 | Jan | 1-3 | 1999 |
| 3 | 19.2 | Mar | 25-26 | 1930 |
| 4 | 18.8 | Jan | 13-14 | 1979 |
| 5 | 16.2 | Mar | 7-8 | 1931 |
| ID-ACER First Support (e.g. Historical Weather Data ) | | | | |

| ID-ACER Second Support (e.g. Input & Query History ) | | Historical Input Count (e.g. per past month) | in A Query History (e.g. per past month | Selected Link Related Characteristics (e.g. ID-ACER incorporate a state relationship per link into evaluation to ascertain/discern a state") | ID-ACER Alternatives |
|---|---|---|---|---|---|
| Profile/ Population (e.g. Overall, some profile segment, &/or the like) | 985c Related Keywords (e.g. per 986a) | | | | |
| Overall | Chicago, IL | 193 Bil | 33.2 Mil | "Illinois" | 0 |
| Overall | West Chicago, IL | 21 Mil | 1.1 Mil | "Illinois" | 0 |
| First IP Address (Segment) | Chicago, IL | 57 | 7 | "Illinois" | 0 |
| First input device inputs | Chicago, IL | 1 | 3 | "Illinois" | 0 |

| ID-ACER Third Support (e.g. Current Date/Time/Location) | | | | | | | | |
|---|---|---|---|---|---|---|---|---|
| Current Date | | | Current Time | | | Current Location | | |
| Month | Day | Year | Hrs. | Min. | Sec. | City | State | Country |
| March | 13 | 2010 | 11 | 23 | 53 | Madison | WI | USA |

*Fig. 17d*

| Selection Rank | Location Names | | | Latitude | | | Longitude | | | Population |
|---|---|---|---|---|---|---|---|---|---|---|
| | City | State | Country | Degrees | Min. | Direction | Degrees | Min. | Direction | (Footnotes 2,3) |
| 1 | 995d - Chicago | IL | USA | 41 | 52 | North | 87 | 37 | West | 2,707,120 |
| 2 | 996d - North Chicago | IL | USA | 42 | 19 | North | 87 | 50 | West | 32,574 |
| 3 | 997d - East Chicago | IN | USA | 41 | 52 | North | 87 | 37 | West | 29,698 |
| 4 | 998d - West Chicago | IL | USA | 41 | 53 | North | 88 | 12 | West | 27,086 |
| 5 | 999d - Chicago | 1 | Guatemala | 14 | 5 | North | 91 | 36 | West | 47,200 |
| ID-ACER Forth Support (e.g. Locations & data footnotes: (1) Not Applicable, (2) Population Source: US Census (3) Census Year: 2010 ) | | | | | | | | | | |

| Profile data segments and delineations (examples related to IP) | |
|---|---|
| 1738 | Each named inventor |
| 1739 | Each claim conception |
| 1740 | Each claim reduction to practice |
| 1741 | city |
| 1742 | state |
| 1743 | county |
| 1744 | relationships (e.g. contractual, employer, and the like) |
| 1745 | other related applications |
| 1746 | assignments |
| 1747 | experience |
| 1748 | and projects known |
| 1749 | Each contribution |
| 1750 | Each participating collaborator |
| 1751 | Each participating collaborator contribution |
| 1752 | Each assignee per claim per application |
| 1753 | participating practitioners |
| 1754 | each attorney |
| 1755 | each law firm |
| 1756 | each agent |
| 1757 | each draftperson |
| 1758 | each search firm |
| 1759 | name |
| 1760 | city |
| 1761 | state |
| 1762 | county |
| 1763 | days of participation |
| 1764 | experience |
| 1765 | years registered with PTO and the like |
| 1766 | each patent numbers |
| 1767 | each application title |
| 1768 | claims (the number) |
| 1769 | each set of amendments |
| 1770 | by who |
| 1771 | when |
| 1772 | and why (if known) |
| 1773 | Number of reviewers and/or approvers of amendments |

*FIG. 18a*

| Profile data segments and delineations examples (continued) | |
|---|---|
| 1774 | track the history of each claim (independent and dependent per modification) |
| 1775 | the field of invention |
| 1776 | each art unit |
| 1777 | abstract |
| 1778 | written specification |
| 1779 | figures |
| 1780 | Each Patent Number |
| 1781 | Application Number |
| 1782 | Current US Classification |
| 1783 | PCT Number |
| 1784 | EPO Number |
| 1785 | Other Country ID numbers |
| 1786 | international classification |
| 1787 | filing dates |
| 1788 | extensions |
| 1789 | RCEs |
| 1790 | interview notes |
| 1791 | prosecution history/file wrapper (per country) |
| 1792 | each office action |
| 1793 | each office action response |
| 1794 | remarks |
| 1795 | amendments |
| 1796 | priority date |
| 1797 | Published date |
| 1798 | linkage (e.g. provisional, parent) |
| 1799 | provisional |
| 1800 | Parent |
| 1801 | divisional |
| 1802 | continuation |
| 1803 | continuation-in-part |
| 1804 | foreign) |
| 1805 | IDS |
| 1806 | prior art references |
| 1807 | patent term adjustment requests & grants |
| 1808 | reissues |
| 1809 | re-exams |
| 1810 | maintenance fee history |
| 1811 | each patent examiner &/or patent supervisor |
| 1812 | name |
| 1813 | city |
| 1814 | state |
| 1815 | county |
| 1816 | days of participation |
| 1817 | experience per art unit and per patent |
| 1818 | years registered with PTO and the like) |

*FIG. 18b*

| Profile data segments and delineations examples (continued) | |
|---|---|
| 1891 | each PTO interaction (or other countries) |
| 1892 | a declaration rejection/responses (e.g. 1.131, 1.132) |
| 1893 | a 101 rejection/responses |
| 1894 | a 112 rejection/responses |
| 1895 | a 102 rejection/responses |
| 1896 | a 103 rejection/responses |
| 1897 | another rejections/responses |
| 1898 | per patent applicant |
| 1899 | per patent family |
| 1900 | per claim |
| 1901 | the relative amount of time for each |
| 1902 | fees required for each |
| 1903 | legal fees per each |
| 1904 | expert involved per each |
| 1905 | extensions |
| 1906 | RCEs |
| 1907 | petitions |
| 1908 | appeals |
| 1909 | and the like required per event |
| 1910 | and the amount of amendments required |
| 1911 | Doctrine of Equivalence ground/territory tracked |
| 1912 | marksman hearing |
| 1913 | litigation |
| 1914 | court rulings |
| 1915 | peer reviews |
| 1916 | expert reviews |
| 1917 | mock jury reviews |
| 1918 | points earned |
| 1919 | status points earned |
| 1920 | status points awarded |
| 1921 | membership invitations |
| 1922 | membership invitation accepted |
| 1923 | understanding of anticipated regulations and the like |
| 1924 | historical performance data |
| 1925 | membership comparison data |
| 1926 | Comparisons with all other delineated components |
| 1927 | each project component |
| 1928 | each role |
| 1929 | history of each role change |
| 1930 | role permission |
| 1931 | location |
| 1932 | period of time |
| 1933 | fees associated |
| 1934 | assignment /ownership terms |
| 1935 | number of participants |
| 1936 | Other terms and/or comments |

FIG. 19

| Profile data segments and delineations (examples for TMs) | |
|---|---|
| 1819 | legal history; trademarks: e.g. alive or dead |
| 1820 | word and/or design |
| 1821 | goods and services categories |
| 1822 | serial number |
| 1823 | filing date |
| 1824 | issue date |
| 1825 | owner |
| 1826 | assignment inventors |
| 1827 | name |
| 1828 | city |
| 1829 | state |
| 1830 | county |
| 1831 | other applications |
| 1832 | assignments |
| 1833 | experience |
| 1834 | other trademarks |
| 1835 | other projects (campaigns, if known) |
| 1836 | registration date |
| 1837 | Filing Basis |
| 1838 | Published for Opposition date |
| 1839 | type of mark |
| 1840 | Each attorney of record |
| 1841 | Name |
| 1842 | city |
| 1843 | state |
| 1844 | county |
| 1845 | days of participation |
| 1846 | experience per Good and Services unit and per Trademark |
| 1847 | days of filing experience with PTO and the like |
| 1848 | register type |
| 1849 | file wrapper/prosecution history |
| 1850 | maintenance fee history |
| 1851 | and entire legal history. |

*FIG. 20a*

| Profile data segments and delineations (examples for TMs, continued) | |
|---|---|
| 1852 | Participants (e.g. users) |
| 1853 | inventors |
| 1854 | project managers |
| 1855 | IP Fig. experts |
| 1856 | creative talent |
| 1857 | editors/proofers |
| 1858 | attorneys |
| 1859 | registered patent attorneys |
| 1860 | registered patent agents |
| 1861 | other licensed professionals/engineers |
| 1862 | non-certified experts |
| 1863 | researchers |
| 1864 | translator |
| 1865 | instructors |
| 1866 | recruiters |
| 1867 | press/PR |
| 1868 | advertiser |
| 1869 | employees |
| 1870 | contractors |
| 1871 | peers |
| 1872 | professors |
| 1873 | students |
| 1874 | IP prosecutors |
| 1875 | IP licensors |
| 1876 | IP acquirers |
| 1877 | IP litigators |
| 1878 | former BPAI judges |
| 1879 | former PTO examiner |
| 1880 | former IP case jury members |
| 1881 | and the like |
| 1882 | non-humans / machine contributions actors (e.g. 3rd Party AI systems) |
| 1883 | computers |
| 1884 | software |
| 1885 | time |
| 1886 | resources |
| 1887 | raw materials |
| 1888 | money |
| 1889 | credit |
| 1890 | other/similar |

*FIG. 20b*

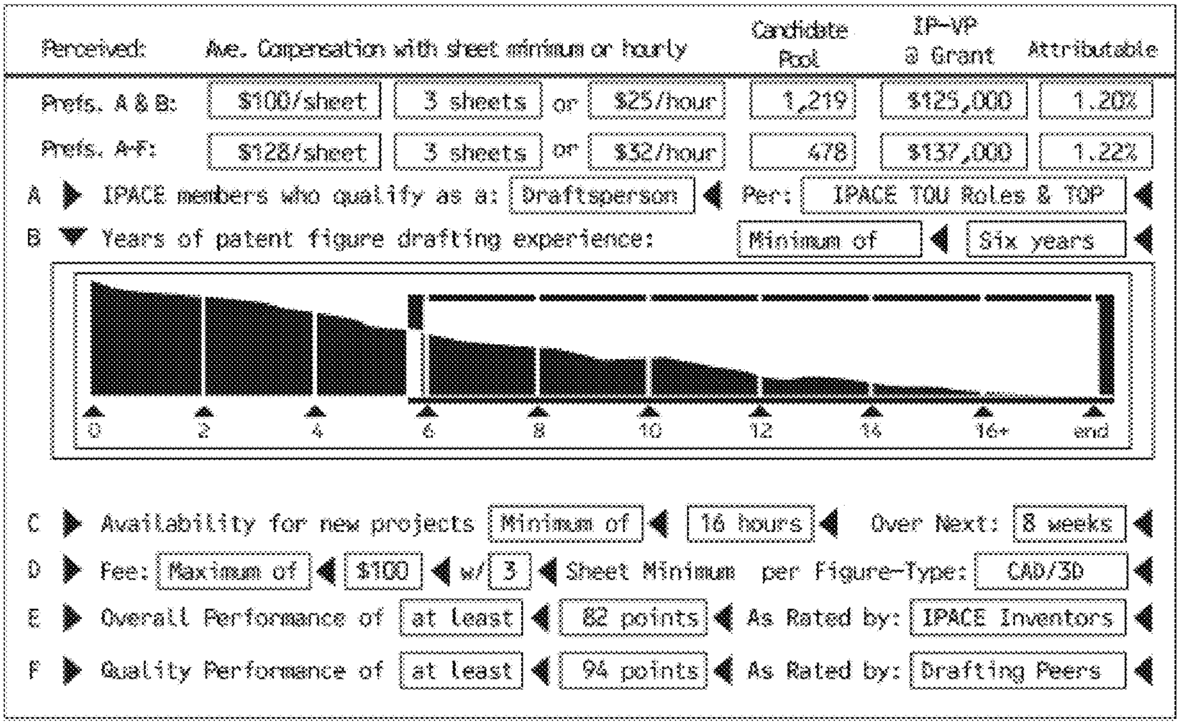
FIG. 28a (Same as Fig. 28c)
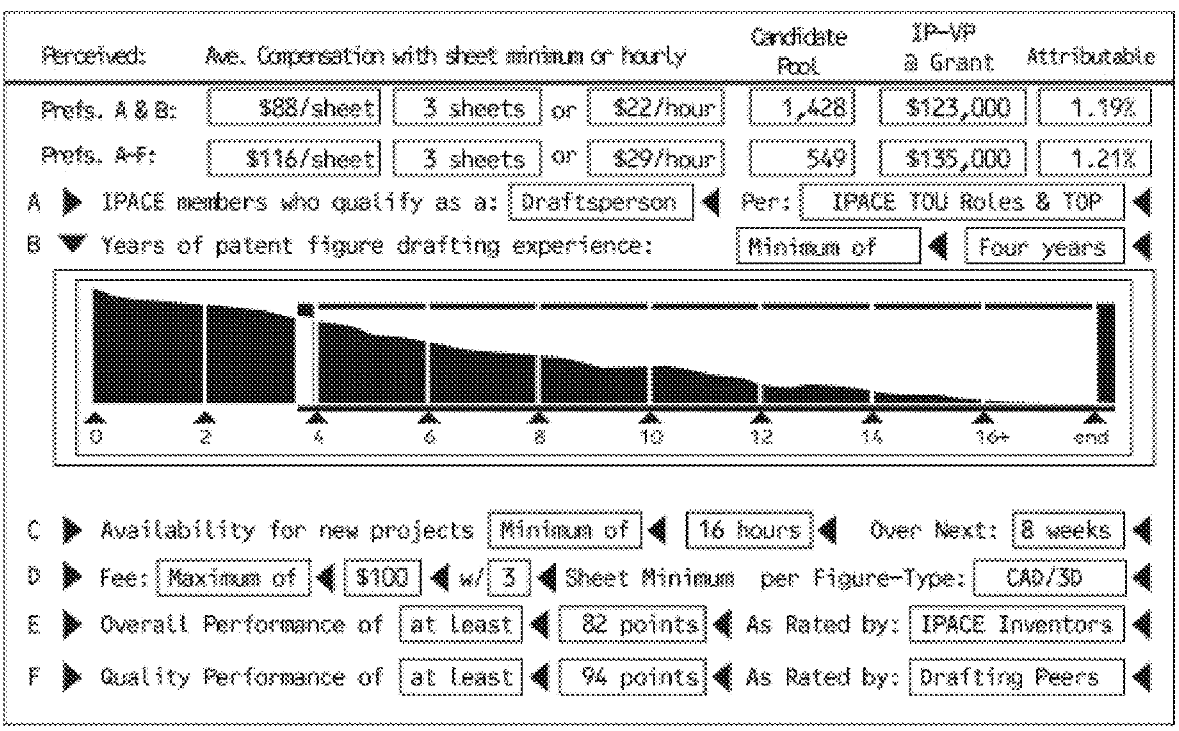
FIG. 28b (Same as Fig. 28d)

| Sort by: | A | US PPA | | | B | w/i 90 days | | | | D | Offering Equity | | | | D | Draftsperson | | | | | | | | | |
|---|---|---|---|---|---|---|---|---|---|---|---|---|---|---|---|---|---|---|---|---|---|---|---|---|---|
| Goal | Post | Time | | Participation Allowed | | | | | | | Offer | | | | Prior Art | | Claims | | | | Figures | | | Spec | | |
| Title Project | Days since posted | Days to Deadline Goal | Days to Hard Deadline | Classification | Co-Inventors Currently | Co-Inventor terms | Contributors Currently | Registered Contributors | Contribution terms | OFFER | Cash | Equity | Hybrid | Other (pts) | Pieces Found | Status/goal | Independent rough | Independent goal | Dependent rough | Dependent goal | Rough only | Done | Goal total | Draft - words | Estimated Word Goal | Abstract wo/prds (150 limit) |
| 1 Title: | System and Method for Collaborating | | | | | | | | | | | | | | | | | | | | | | | | | |
| Lead Inventor: | Matt O'Malley (Member for 5.3 years, 5 projects, 3 active, and 104 profile views) | | | | | | | | | | | | | | | | | | | | | | | | | |
| PPA | 122 | 30 | 50 | 707 | 0 | Terms | 1 | 0 | Terms | | Y | Y | Y | Y | 3 | done | 3 | 3 | 5 | 20 | 20 | 0 | 30 | 12734 | 21000 | 122 |
| Views | 55 | | | | | 22 | X | X | 33 | | 9 | 6 | 4 | 3 | 11 | X | 9 | 6 | 4 | 3 | 3 | X | X | 6 | X | 2 |
| 2 Title: | System and Method for Social Shopping | | | | | | | | | | | | | | | | | | | | | | | | | |
| Lead Inventor: | Greg Vaisbort (Member for 3.2 years, 2 projects, 1 active, and 47 profile views) | | | | | | | | | | | | | | | | | | | | | | | | | |
| PPA | 102 | 32 | 40 | 707 | 1 | Terms | 1 | 0 | Terms | | NO | Y | NO | Y | 3 | done | 3 | 3 | 5 | 20 | 20 | 0 | 30 | 12734 | 21000 | 138 |
| Views | 42 | | | | | 18 | X | X | 26 | | 7 | 5 | 4 | 2 | 8 | X | 7 | 5 | 4 | 2 | 1 | X | X | 5 | X | 4 |
| 3 Title: | System and Method for Advertisement Targeting | | | | | | | | | | | | | | | | | | | | | | | | | |
| Lead Inventor: | Mark Skaist - (Member for 1.2 years, 2 projects, 2 active, and 23 profile views) | | | | | | | | | | | | | | | | | | | | | | | | | |
| PPA | 87 | 45 | 45 | 707 | 0 | Terms | 1 | 0 | Terms | | NO | Y | NO | NO | 3 | done | 3 | 3 | 5 | 20 | 20 | 0 | 30 | 12734 | 21000 | 0 |
| Views | 34 | | | | | 8 | X | X | 21 | | 4 | 4 | 2 | 2 | 3 | X | 4 | 4 | 2 | 2 | 1 | X | X | 3 | X | 0 |
| 4 Title: | System and Method for Job Posting and Recruiting | | | | | | | | | | | | | | | | | | | | | | | | | |
| Lead Inventor: | Andy Rasa (Member for 9 months, 1 project, 1 active, and 17 profile views) | | | | | | | | | | | | | | | | | | | | | | | | | |
| PPA | 44 | 90 | 120 | 707 | 0 | Terms | 1 | 0 | Terms | | Y | Y | NO | Y | 3 | done | 3 | 3 | 5 | 20 | 20 | 0 | 30 | 12734 | 21000 | 124 |
| Views | 27 | | | | | 3 | X | X | 5 | | 1 | 1 | 0 | 0 | 1 | X | 1 | 1 | 0 | 0 | 0 | X | X | 0 | X | 1 |

FIG. 29

| Contribution Scenario One | | | points |
|---|---|---|---|
| For each Independent claim found to be material | | | |
| | Author of the claim | | 20 |
| | Author of the specification material supporting the claim | | 20 |
| | | If more than one, split among the Inventors and/or Contributors | |
| | The drafter of original rough draft of the diagram(s) supporting the claim | | 4 |
| | | If more than one, split among the Inventors and/or Contributors | |
| | The drafter of finalized diagram(s) supporting the claim | | 2 |
| | | If more than one, split among the Inventors and/or Contributors | |
| For each dependent claim found to be material | | | |
| | Author of the claim | | 10 |
| | Author of the specification material supporting the claim | | 10 |
| | | If more than one, split among the Inventors and/or Contributors | |
| | The drafter of original rough draft of the diagram(s) supporting the claim | | 2 |
| | | If more than one, split among the Inventors and/or Contributors | |
| | | If more than one, split among the Inventors and/or Contributors | |
| | The drafter of finalized diagram(s) supporting the claim | | 1 |
| | | If more than one, split among the Inventors and/or Contributors | |

*FIG. 31a*

| Contribution Scenario One | | | points | X 3 |
|---|---|---|---|---|
| For each Independent claim found to be material | | | | |
| | Author of the claim | | 20 | 60 |
| | Author of the specification material supporting the claim | | 20 | 60 |
| | | If more than one, split among the Inventors and/or Contributors | | |
| | The drafter of original rough draft of the diagram(s) supporting the claim | | 4 | 12 |
| | | If more than one, split among the Inventors and/or Contributors | | |
| | The drafter of finalized diagram(s) supporting the claim | | 2 | 6 |
| | | If more than one, split among the Inventors and/or Contributors | | |
| For each dependent claim found to be material | | | | x 5 |
| | Author of the claim | | 10 | 50 |
| | Author of the specification material supporting the claim | | 10 | 50 |
| | | If more than one, split among the Inventors and/or Contributors | | |
| | The drafter of original rough draft of the diagram(s) supporting the claim | | 2 | 10 |
| | | If more than one, split among the Inventors and/or Contributors | | |
| | | If more than one, split among the Inventors and/or Contributors | | |
| | The drafter of finalized diagram(s) supporting the claim | | 1 | 5 |
| | | If more than one, split among the Inventors and/or Contributors | | |
| | | | total: | 253 |

*FIG. 31b*

| Contribution Scenario One | | | points |
|---|---|---|---|
| For each Independent claim found to be material | | | |
| | Inventor who solely contributed a first concept & a first enablement to a first claim | | 50 |
| | Co-Inventor of who contributed a second concept and/or second enablement for a second element to a first claim | | 10 |
| | | If more than one Co-Inventors/Claim, split among the Co-Inventors | |
| | The Draftsperson who solely contributed a final figure(s) to support the particular necessary to support and enable a particular claim | | 4 |
| | | If more than one, split among the Draftspersons and/or Contributors | |
| | The Contributor of an original figure(s) that was utilized to create the final figure(s) of finalized diagram(s) supporting the claim | | 2 |
| | | If more than one, split among the Inventors and/or Contributors | |
| For each dependent claim found to be material | | | |
| | Co-Inventor of the claim | | 10 |
| | Co-Inventor of the specification material supporting the claim | | 10 |
| | | If more than one, split among the Inventors and/or Contributors | |
| | The Representative of original rough draft of the diagram(s) supporting the claim | | 2 |
| | | If more than one, split among the Inventors and/or Contributors | |
| | | If more than one, split among the Inventors and/or Contributors | |
| | The Representative of finalized diagram(s) supporting the claim | | 1 |
| | | If more than one, split among the Inventors and/or Contributors | |

FIG. 32a

| Contribution Scenario One | | | points | X 3 |
|---|---|---|---|---|
| For each Independent claim found to be material | | | | |
| | Co-inventor of the claim | | 20 | 60 |
| | Co-Inventor of the specification material supporting the claim | | 20 | 60 |
| | | If more than one, split among the Inventors and/or Contributors | | |
| | The Representative of original rough draft of the diagram(s) supporting the claim | | 4 | 12 |
| | | If more than one, split among the Inventors and/or Contributors | | |
| | The Representative of finalized diagram(s) supporting the claim | | 2 | 6 |
| | | If more than one, split among the Inventors and/or Contributors | | |
| For each dependent claim found to be material | | | | x 5 |
| | Co-Inventor of the claim | | 10 | 50 |
| | Co-Inventor of the specification material supporting the claim | | 10 | 50 |
| | | If more than one, split among the Inventors and/or Contributors | | |
| | The Representative of original rough draft of the diagram(s) supporting the claim | | 2 | 10 |
| | | If more than one, split among the Inventors and/or Contributors | | |
| | | If more than one, split among the Inventors and/or Contributors | | |
| | The Representative of finalized diagram(s) supporting the claim | | 1 | 5 |
| | | If more than one, split among the Inventors and/or Contributors | | |
| | | | total: | 253 |

FIG. 32b

| | |
|---|---|
| | |
| For each word contributed to the Abstract | Based upon percentage of contribution per word. |
| For each word contributed to the Specification | Based upon percentage of contribution per word. |
| For each Figure contributed to the Specification.. | Based upon percentage of contribution per figure. |
| or | |
| For each claim contribution that held up against invalidity challenges. | Based upon percentage of contribution per word and/or claim. |
| For each claim contribution that was awarded licensing fees. | Based upon percentage of contribution per word and/or claim. |
| For each claim contribution that was awarded damages. | Based upon percentage of contribution per word and/or claim. |
| For each claim contribution that was sold and/or monetized. | Based upon percentage of contribution per word and/or claim. |
| | |

FIG. 33

| Iterations | Emails | Filename | Saved | | Modifications | | Time Gap | | | | | | Previous file name | | As Email Attachment to/from: | | Comments |
|---|---|---|---|---|---|---|---|---|---|---|---|---|---|---|---|---|---|
| | | | Date | Time | Words Added | Removed | Yrs | Mths | Days | Hrs | Min | sec | | | | | |
| 4 | | Dave-n-Joe-s-company | 3/1/2009 | 9:37 AM | 1356 | 45 | | 8 | 3 | 6 | 37 | 0 | Work-from-home-ideas | | | | |
| | 1 | Work-from-home-ideas | 6/29/2008 | 3:10 PM | | | | | | | | | | | to: | dave@gmails.com | Sent with Confidentiality notice |
| 3 | | Work-from-home-ideas | 6/29/2008 | 3:00 PM | 247 | 25 | | 4 | 16 | 2 | 0 | 0 | Work-from-home-idea | | | | |
| 2 | | Work-from-home-idea | 2/13/2008 | 1:00 PM | 78 | 9 | | | 1 | 2 | 28 | 0 | Joe-s-big-idea | | | | |
| 1 | | Joe-s-big-idea | 2/12/2008 | 10:32 | N.A. | N.A. | | | N.A. | | | | Original | | | | |
| | | Totals | | | | | Totals | | | | | | | | | | |
| 4 | 1 | | | | 1681 | 79 | | 12 | 20 | 10 | 65 | 0 | | 3 | | 3 | 3 |

*FIG. 42*

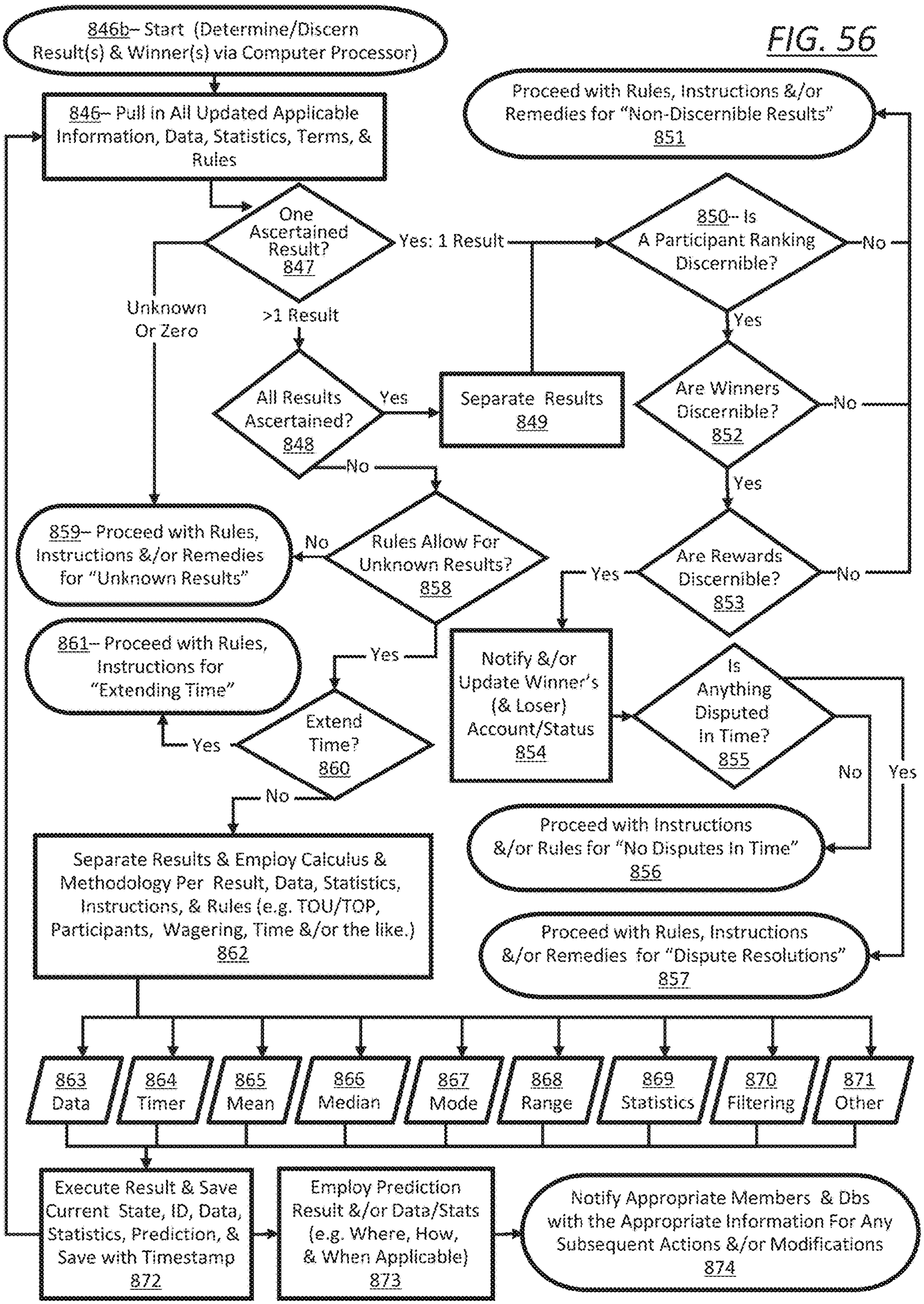
FIG. 56
846b~ Start (Determine/Discern Result(s) & Winner(s) via Computer Processor)
846~ Pull in All Updated Applicable Information, Data, Statistics, Terms, & Rules
One Ascertained Result? 847
Yes: 1 Result
Unknown Or Zero
>1 Result
All Results Ascertained? 848
Yes
No
Separate Results 849
850-- Is A Participant Ranking Discernible?
No
Yes
Proceed with Rules, Instructions &/or Remedies for "Non-Discernible Results" 851
Are Winners Discernible? 852
Are Rewards Discernible? 853
859~ Proceed with Rules, Instructions &/or Remedies for "Unknown Results"
Rules Allow For Unknown Results? 858
861~ Proceed with Rules, Instructions for "Extending Time"
Extend Time? 860
Notify &/or Update Winner's (& Loser) Account/Status 854
Is Anything Disputed In Time? 855
Proceed with Instructions &/or Rules for "No Disputes In Time" 856
Proceed with Rules, Instructions &/or Remedies for "Dispute Resolutions" 857
Separate Results & Employ Calculus & Methodology Per Result, Data, Statistics, Instructions, & Rules (e.g. TOU/TOP, Participants, Wagering, Time &/or the like.) 862
863 Data
864 Timer
865 Mean
866 Median
867 Mode
868 Range
869 Statistics
870 Filtering
871 Other
Execute Result & Save Current State, ID, Data, Statistics, Prediction, & Save with Timestamp 872
Employ Prediction Result &/or Data/Stats (e.g. Where, How, & When Applicable) 873
Notify Appropriate Members & Dbs with the Appropriate Information For Any Subsequent Actions &/or Modifications 874

IPACE-Segmentation/Relationships

| | | | | | | | |
|---|---|---|---|---|---|---|---|
| 1 | | | | | | 2:46 PM | |
| 2 | | | | | 1 | 2 | 3 |
| 3 | | | 10 largest news stories of 2011 | | Casey Anthony Acquittal | Japan Earthquake and Tsunami | The Royal Wedding |
| 4 | | Entry &/or Selection Type Generates: | | | | | |
| 5 | User Input | IPACE Story Submission &/or Validation Required to Gain: | Reporter ID ("RID"): | | | | |
| 6 | Story Input | Past Reporter Has Reporter ID: | | | | | |
| 7 | Story Input | Report/story entry &/or submission: | Story ID/Reporter ID ("SID/RID": | | | | |
| 8 | Story Input | Story Submission Date/Input: | Submission Date/Input/SID ("SDI/SID"): | | | | |
| 9 | Story Input | Story Submission Time/Input: | Submission Time/Input/Story ID ("STI/SID"): | | | | |
| 10 | Story Input | Sometimes combined as: | Submission Date & Time/Input/Story ID ("SDTI/SID") | | | | |
| 11 | Report | Top-Level category name (entry/selection generates): | Top-Level Category/Story ID ("TLC/SID"): | | US News | World News | World News |
| 12 | Report | Sub-Level category name (entry/selection generates): | Sub-Level Category/Story ID ("SLC/SID"): | | Court case | Disaster | |
| 13 | Report | Story Tags. | Tags/Rank/Story ID ("T/R/SID"): | | | Japan, Tsunami, Earth-quake, Nuclear | |
| 14 | Report | Story Content List Submitted/Input: | Content List/Story ID ("CL/SID"): | | | | |
| 15 | Report | what text was first reported: | Text & State ID per Story ID: | | | | |
| 16 | Report | what audio was first reported: | Audio & State ID per Story ID: | | | | |
| 17 | Report | what images submitted: | Story ID & associated images: | | | | |
| 18 | Report | what graphics ("GFX") submitted: | GFX ID per Story ID & graphic created: | | | | |
| 19 | Report | what maps/atlases submitted: | Story ID & associated maps/atlases: | | | | |
| 20 | Report | what raw video submitted: | Story ID & associated raw video/audio: | | | | |
| 21 | Report | what edited video submitted: | Story ID & associated edited video/audio: | | | | |
| 22 | Report | what interviews ("IV") submitted: | Story ID & associated IV video/audio: | | | | |
| 23 | Report | who was interviewed: | Story ID & Interviewee name/ID: | | | | |
| 24 | Report | How reliable report: | Story ID Reliability score: | | | | |
| 25 | Report | Relative Story reliability: | Story ID Reliability score/rank: | | | | |
| 26 | Report | Relatively least challenged: | Reporter ID Challenged score/rank: | | | | |
| 27 | Report | who scored most accurate: | Reporter ID: | | | | |
| 28 | Report | Relative Story accuracy: | Reporter ID Accuracy score/rank: | | | | |
| 29 | Report | who's Story was most consumed: | Reporter ID Consumption score/rank: | | | | |
| 30 | Report | Relative Consumption: | Story ID Consumption score/rank: | | | | |
| 31 | Report | Perceived Novelty Score | Perceived Novelty Score/Reporter ID: | | | | |
| 32 | | | | | | | |
| 33 | Report | Relatively how reliable reporter: | Reporter reliability rank: | | | | |
| 34 | Report | How reliable report: | Reliability score: | | | | |
| 35 | Report | accuracy score & rank: | Accuracy score & rank: | | | | |
| 36 | Report | accuracy score & rank: | Accuracy score & rank: | | | | |
| 37 | | | | | | | |

FIG. 70a (continued on 70b)

IPACE-Segmentation/Relationships

| | | | | | | |
|---|---|---|---|---|---|---|
| 1 | | | | | 2:46 PM | |
| 2 | | | | 1 | 2 | 3 |
| 3 | | | 10 largest news stories of 2011 | Casey Anthony Acquittal | Japan Earthquake and Tsunami | The Royal Wedding |
| 38 | Published | Publication Offer: | Publication Offer ID: | | | |
| 39 | Published | Publication Deal: | Publication Deal ID: | | | |
| 40 | Published | who was first publisher: | Publisher ID: | | | |
| 41 | Published | when was first pub. date: | date: | | 3/11/11 | |
| 42 | Published | when was first pub. time: | time: | | 3/11/11 | |
| 43 | Published | what was first published: | content | | | |
| 44 | Published | how was it published: | Format: | | | |
| 45 | Published | where is publisher based: | Publisher based: | | | |
| 46 | Published | where was it published: | circulation/coverage: | | | |
| 47 | Published | what was the headline: | Headline: | | | |
| 48 | Published | what was the word count: | word/text count: | | | |
| 49 | Published | what images were published: | pictures: | | | |
| 50 | Published | how many: | views: | | | |
| 51 | Published | how many: | aired: | | | |
| 52 | Published | | video: | | | |
| 53 | Published | | duration: | | | |
| 54 | Consumer | what challenges: | | | | |
| 55 | Consumer | what comments: | | | | |
| 56 | Consumer | what feedback: | | | | |
| 57 | | | | | | |
| 58 | Published | what changes: | | | | |
| 59 | Report | who: | Reporter ID: | | | |
| 60 | Editor | who: | Editor ID: | | | |
| 61 | Consumer | who: | Consumer | | | |
| 62 | | | | | | |
| 63 | Prediction | who was first: | Predictor ID: | | | |
| 64 | Prediction | when was first: | Predictor ID: | | | |
| 65 | Prediction | what was first: | Predictor ID: | | | |
| 66 | Prediction | who was most accurate: | Predictor ID: | | | |
| 67 | Prediction | which challenge largest: | Prediction Challenge ID | | | |

| 1 | | | Entry &/or Selection Type Generates: | Generates (Abbreviation) | in combination, Generates | Acryonmn | PER STATE ID/User input generates: | |
|---|---|---|---|---|---|---|---|---|
| 2 | Story input | Content | Top-Level Topic Category (entry/selection generates): | Top | per Story ID: | Top/SID | Top/SID/STID | Top/SID/LISTID |
| 3 | Analyze | Perceived | Popularity TLC score | TopScore | per Story ID: | TopScore/SID | TopScore/SID/STID | TopScore/SID/LISTID |
| 4 | Analyze | Perceived | Popularity TLC rank | TopRank | per Story ID: | TopRank/SID | TopRank/SID/STID | TopRank/SID/LISTID |
| 5 | Story input | Content | Sub-Level Topic Category (entry/selection generates): | Sub | per Story ID: | Sub/SID | Sub/SID/STID | Sub/SID/LISTID |
| 6 | Analyze | Perceived | Popularity TLC score | SubScore | per Story ID: | SubScore/SID | SubScore/SID/STID | SubScore/SID/LISTID |
| 7 | Analyze | Perceived | Popularity TLC rank | SubRank | per Story ID: | SubRank/SID | SubRank/SID/STID | SubRank/SID/LISTID |
| 8 | Story input | Content | Story Tags: | Tag | with STID per Story ID | Tag/SID | Tag/SID/STID | Tag/SID/LISTID |
| 9 | Analyze | Perceived | Popularity Tag score | TagScore | per Story ID: | TagScore/SID | TagScore/SID/STID | TagScore/SID/LISTID |
| 10 | Analyze | Perceived | Popularity Tag rank | TagRank | per Story ID: | TagRank/SID | TagRank/SID/STID | TagRank/SID/LISTID |
| 11 | Story input | Content | Story Content List Submitted/input: | CI | with STID per Story ID | CL-STID/SID | CL/SID/STID | CL/SID/LISTID |
| 12 | Story input | Content | text input | Text | with STID per Story ID | Text-STID/SID | Text-STID/SID/STID | Text-STID/SID/LISTID |
| 13 | Story input | Content | audio input | Audio | with STID per Story ID | Audio-STID/SID | Audio-STID/SID/STID | Audio-STID/SID/LISTID |
| 14 | Story input | Content | image input | Image | with STID per Story ID | Image-STID/SID | Image-STID/SID/STID | Image-STID/SID/LISTID |
| 15 | Story input | Content | what graphics ("GFX") submitted: | GFX | with STID per Story ID | GFX-STID/SID | GFX-STID/SID/STID | GFX-STID/SID/LISTID |
| 16 | Story input | Content | what maps/atlases submitted: | Map | with STID per Story ID | Map-STID/SID | Map-STID/SID/STID | Map-STID/SID/LISTID |
| 17 | Story input | Content | what raw video submitted: | RawV | with STID per Story ID | RawV-STID/SID | RawV-STID/SID/STID | RawV-STID/SID/LISTID |
| 18 | Story input | Content | what edited video submitted: | EditV | with STID per Story ID | EditV-STID/SID | EditV-STID/SID/STID | EditV-STID/SID/LISTID |
| 19 | Story input | Content | interview (IV) submitted: | IVID | with STID per Story ID | IV-STID/SID | IV-STID/SID/STID | IV-STID/SID/LISTID |
| 20 | Story input | Content | interviewee ID: | IVeeID | with STID per Story ID | IVee-STID/SID | IVee-STID/SID/STID | IVee-STID/SID/LISTID |
| 21 | Analyze | Perceived | Reliability score | Rscore | per Story ID: | Rscore/SID | Rscore/SID/STID | Rscore/SID/LISTID |
| 22 | Analyze | Perceived | | Rscore | per Reporter ID: | Rscore/RID | Rscore/RID/STID | Rscore/RID/LISTID |
| 23 | Analyze | Perceived | Relative reliability rank: | Rrank | per Story ID: | Rrank/SID | Rrank/SID/STID | Rrank/SID/LISTID |
| 24 | Analyze | Perceived | | Rrank | per Reporter ID: | Rrank/RID | Rrank/RID/STID | Rrank/RID/LISTID |
| 25 | Analyze | Perceived | Challenged score: | Chscore | per Reporter ID: | Chscore/RID | Chscore/RID/STID | Chscore/RID/LISTID |
| 26 | Analyze | Perceived | | Chscore | per Story ID: | Chscore/SID | Chscore/SID/STID | Chscore/SID/LISTID |
| 27 | Analyze | Perceived | Relatively Challenged rank: | Chrank | per Reporter ID: | Chrank/RID | Chrank/RID/STID | Chrank/RID/LISTID |
| 28 | Analyze | Perceived | | Chrank | per Story ID: | Chrank/SID | Chrank/SID/STID | Chrank/SID/LISTID |
| 29 | Analyze | Perceived | Accuracy score: | Ascore | per Reporter ID: | Ascore/RID | Ascore/RID/STID | Ascore/RID/LISTID |
| 30 | Analyze | Perceived | | Ascore | per Story ID: | Ascore/SID | Ascore/SID/STID | Ascore/SID/LISTID |
| 31 | Analyze | Perceived | Accuracy rank: | Arank | per Reporter ID: | Arank/RID | Arank/RID/STID | Arank/RID/LISTID |
| 32 | Analyze | Perceived | | Arank | per Story ID: | Arank/SID | Arank/SID/STID | Arank/SID/LISTID |
| 33 | Analyze | Perceived | Consumption score | UseScore | per Reporter ID: | UseScore/RID | UseScore/RID/STID | UseScore/RID/LISTID |
| 34 | Analyze | Perceived | | UseScore | per Story ID: | UseScore/SID | UseScore/SID/STID | UseScore/SID/LISTID |
| 35 | Analyze | Perceived | Relative Consumption rank: | UseRank | per Reporter ID: | UseRank/RID | UseRank/RID/STID | UseRank/RID/LISTID |
| 36 | Analyze | Perceived | | UseRank | per Story ID: | UseRank/SID | UseRank/SID/STID | UseRank/SID/LISTID |
| 37 | Analyze | Perceived | Novelty Score | NewScore | per Reporter ID: | NewScore/RID | NewScore/RID/STID | NewScore/RID/LISTID |
| 38 | Analyze | Perceived | | NewScore | per Story ID: | NewScore/SID | NewScore/SID/STID | NewScore/SID/LISTID |
| 39 | Analyze | Perceived | Relative Novelty Rank | NewRank | per Reporter ID: | NewRank/RID | NewRank/RID/STID | NewRank/RID/LISTID |
| 40 | Analyze | Perceived | | NewRank | per Story ID: | NewRank/SID | NewRank/SID/STID | NewRank/SID/LISTID |
| 41 | Analyze | Perceived | Source Reliability (score): | SaysScore | per Story ID: | SaysScore/SID | SaysScore/SID/STID | SaysScore/SID/LISTID |
| 42 | Analyze | Perceived | Source Reliability (rank): | SaysRank | per Story ID: | SaysRank/SID | SaysRank/SID/STID | SaysRank/SID/LISTID |
| 43 | Analyze | Perceived | Source Accuracy score: | ASaysScore | per Story ID: | ASaysScore/SID | ASaysScore/SID/STID | ASaysScore/SID/LISTID |
| 44 | Analyze | Perceived | Relative Source Accuracy rank: | ASaysRank | per Story ID: | ASaysRank/SID | ASaysRank/SID/STID | ASaysRank/SID/LISTID |
| 45 | Analyze | Perceived | Source Identity score: | SaysIDScore | per Story ID: | SaysIDScore/SID | SaysIDScore/SID/STID | SaysIDScore/SID/LISTID |
| 46 | Analyze | Perceived | Relative Source Identity rank: | SaysIDRank | per Story ID: | SaysIDRank/SID | SaysIDRank/SID/STID | SaysIDRank/SID/LISTID |

FIG. 71

Figure 71A:
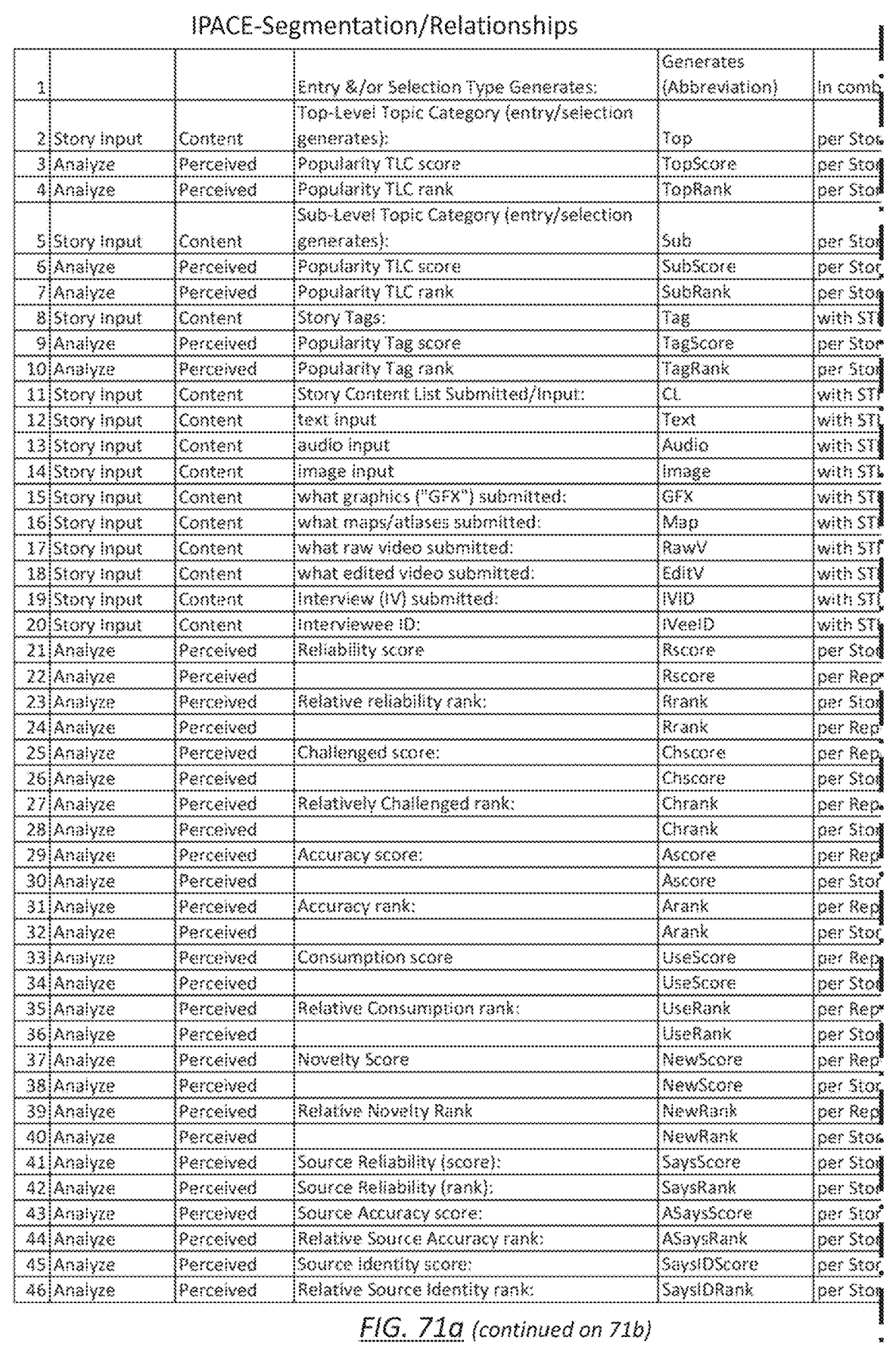

IPACE-Segmentation/Relationships

| | | | | | |
|---|---|---|---|---|---|
| 1 | | | Entry &/or Selection Type Generates: | Generates (Abbreviation) | In comb |
| 2 | Story input | Content | Top-Level Topic Category (entry/selection generates): | Top | per Sto |
| 3 | Analyze | Perceived | Popularity TLC score | TopScore | per Sto |
| 4 | Analyze | Perceived | Popularity TLC rank | TopRank | per Sto |
| 5 | Story input | Content | Sub-Level Topic Category (entry/selection generates): | Sub | per Sto |
| 6 | Analyze | Perceived | Popularity TLC score | SubScore | per Sto |
| 7 | Analyze | Perceived | Popularity TLC rank | SubRank | per Sto |
| 8 | Story input | Content | Story Tags: | Tag | with ST |
| 9 | Analyze | Perceived | Popularity Tag score | TagScore | per Sto |
| 10 | Analyze | Perceived | Popularity Tag rank | TagRank | per Sto |
| 11 | Story input | Content | Story Content List Submitted/Input: | CL | with ST |
| 12 | Story input | Content | text input | Text | with ST |
| 13 | Story input | Content | audio input | Audio | with ST |
| 14 | Story input | Content | image input | Image | with ST |
| 15 | Story input | Content | what graphics ("GFX") submitted: | GFX | with ST |
| 16 | Story input | Content | what maps/atlases submitted: | Map | with ST |
| 17 | Story input | Content | what raw video submitted: | RawV | with ST |
| 18 | Story input | Content | what edited video submitted: | EditV | with ST |
| 19 | Story input | Content | interview (IV) submitted: | IVID | with ST |
| 20 | Story input | Content | Interviewee ID: | IVeeID | with ST |
| 21 | Analyze | Perceived | Reliability score | Rscore | per Sto |
| 22 | Analyze | Perceived | | Rscore | per Rep |
| 23 | Analyze | Perceived | Relative reliability rank: | Rrank | per Sto |
| 24 | Analyze | Perceived | | Rrank | per Rep |
| 25 | Analyze | Perceived | Challenged score: | Chscore | per Rep |
| 26 | Analyze | Perceived | | Chscore | per Sto |
| 27 | Analyze | Perceived | Relatively Challenged rank: | Chrank | per Rep |
| 28 | Analyze | Perceived | | Chrank | per Sto |
| 29 | Analyze | Perceived | Accuracy score: | Ascore | per Rep |
| 30 | Analyze | Perceived | | Ascore | per Sto |
| 31 | Analyze | Perceived | Accuracy rank: | Arank | per Rep |
| 32 | Analyze | Perceived | | Arank | per Sto |
| 33 | Analyze | Perceived | Consumption score | UseScore | per Rep |
| 34 | Analyze | Perceived | | UseScore | per Sto |
| 35 | Analyze | Perceived | Relative Consumption rank: | UseRank | per Rep |
| 36 | Analyze | Perceived | | UseRank | per Sto |
| 37 | Analyze | Perceived | Novelty Score | NewScore | per Rep |
| 38 | Analyze | Perceived | | NewScore | per Sto |
| 39 | Analyze | Perceived | Relative Novelty Rank | NewRank | per Rep |
| 40 | Analyze | Perceived | | NewRank | per Sto |
| 41 | Analyze | Perceived | Source Reliability (score): | SaysScore | per Sto |
| 42 | Analyze | Perceived | Source Reliability (rank): | SaysRank | per Sto |
| 43 | Analyze | Perceived | Source Accuracy score: | ASaysScore | per Sto |
| 44 | Analyze | Perceived | Relative Source Accuracy rank: | ASaysRank | per Sto |
| 45 | Analyze | Perceived | Source identity score: | SaysIDScore | per Sto |
| 46 | Analyze | Perceived | Relative Source Identity rank: | SaysIDRank | per Sto |

FIG. 71a (continued on 71b)

IPACE-Segmentation/Relationships

| | | | | | |
|---|---|---|---|---|---|
| 1 | | In combination, Generates | Acryonmn | PER STATE ID/User Input generates: | |
| 2 | Story Input | per Story ID: | Top/SID | Top/SID/STID | Top/SID/LISTID |
| 3 | Analyze | per Story ID: | TopScore/SID | TopScore/SID/STID | TopScore/SID/LISTID |
| 4 | Analyze | per Story ID: | TopRank/SID | TopRank/SID/STID | TopRank/SID/LISTID |
| 5 | Story Input | per Story ID: | Sub/SID | Sub/SID/STID | Sub/SID/LISTID |
| 6 | Analyze | per Story ID: | SubScore/SID | SubScore/SID/STID | SubScore/SID/LISTID |
| 7 | Analyze | per Story ID: | SubRank/SID | SubRank/SID/STID | SubRank/SID/LISTID |
| 8 | Story Input | with STID per Story ID | Tag/SID | Tag/SID/STID | Tag/SID/LISTID |
| 9 | Analyze | per Story ID: | TagScore/SID | TagScore/SID/STID | TagScore/SID/LISTID |
| 10 | Analyze | per Story ID: | TagRank/SID | TagRank/SID/STID | TagRank/SID/LISTID |
| 11 | Story Input | with STID per Story ID | CL-STID/SID | CL/SID/STID | CL/SID/LISTID |
| 12 | Story Input | with STID per Story ID | Text-STID/SID | Text-STID/SID/STID | Text-STID/SID/LISTID |
| 13 | Story Input | with STID per Story ID | Audio-STID/SID | Audio-STID/SID/STID | Audio-STID/SID/LISTID |
| 14 | Story Input | with STID per Story ID | Image-STID/SID | Image-STID/SID/STID | Image-STID/SID/LISTID |
| 15 | Story Input | with STID per Story ID | GFX-STID/SID | GFX-STID/SID/STID | GFX-STID/SID/LISTID |
| 16 | Story Input | with STID per Story ID | Map-STID/SID | Map-STID/SID/STID | Map-STID/SID/LISTID |
| 17 | Story Input | with STID per Story ID | RawV-STID/SID | RawV-STID/SID/STID | RawV-STID/SID/LISTID |
| 18 | Story Input | with STID per Story ID | EditV-STID/SID | EditV-STID/SID/STID | EditV-STID/SID/LISTID |
| 19 | Story Input | with STID per Story ID | IV-STID/SID | IV-STID/SID/STID | IV-STID/SID/LISTID |
| 20 | Story Input | with STID per Story ID | IVee-STID/SID | IVee-STID/SID/STID | IVee-STID/SID/LISTID |
| 21 | Analyze | per Story ID: | Rscore/SID | Rscore/SID/STID | Rscore/SID/LISTID |
| 22 | Analyze | per Reporter ID: | Rscore/RID | Rscore/RID/STID | Rscore/RID/LISTID |
| 23 | Analyze | per Story ID: | Rrank/SID | Rrank/SID/STID | Rrank/SID/LISTID |
| 24 | Analyze | per Reporter ID: | Rrank/RID | Rrank/RID/STID | Rrank/RID/LISTID |
| 25 | Analyze | per Reporter ID: | Chscore/RID | Chscore/RID/STID | Chscore/RID/LISTID |
| 26 | Analyze | per Story ID: | Chscore/SID | Chscore/SID/STID | Chscore/SID/LISTID |
| 27 | Analyze | per Reporter ID: | Chrank/RID | Chrank/RID/STID | Chrank/RID/LISTID |
| 28 | Analyze | per Story ID: | Chrank/SID | Chrank/SID/STID | Chrank/SID/LISTID |
| 29 | Analyze | per Reporter ID: | Ascore/RID | Ascore/RID/STID | Ascore/RID/LISTID |
| 30 | Analyze | per Story ID: | Ascore/SID | Ascore/SID/STID | Ascore/SID/LISTID |
| 31 | Analyze | per Reporter ID: | Arank/RID | Arank/RID/STID | Arank/RID/LISTID |
| 32 | Analyze | per Story ID: | Arank/SID | Arank/SID/STID | Arank/SID/LISTID |
| 33 | Analyze | per Reporter ID: | UseScore/RID | UseScore/RID/STID | UseScore/RID/LISTID |
| 34 | Analyze | per Story ID: | UseScore/SID | UseScore/SID/STID | UseScore/SID/LISTID |
| 35 | Analyze | per Reporter ID: | UseRank/RID | UseRank/RID/STID | UseRank/RID/LISTID |
| 36 | Analyze | per Story ID: | UseRank/SID | UseRank/SID/STID | UseRank/SID/LISTID |
| 37 | Analyze | per Reporter ID: | NewScore/RID | NewScore/RID/STID | NewScore/RID/LISTID |
| 38 | Analyze | per Story ID: | NewScore/SID | NewScore/SID/STID | NewScore/SID/LISTID |
| 39 | Analyze | per Reporter ID: | NewRank/RID | NewRank/RID/STID | NewRank/RID/LISTID |
| 40 | Analyze | per Story ID: | NewRank/SID | NewRank/SID/STID | NewRank/SID/LISTID |
| 41 | Analyze | per Story ID: | SaysScore/SID | SaysScore/SID/STID | SaysScore/SID/LISTID |
| 42 | Analyze | per Story ID: | SaysRank/SID | SaysRank/SID/STID | SaysRank/SID/LISTID |
| 43 | Analyze | per Story ID: | ASaysScore/SID | ASaysScore/SID/STID | ASaysScore/SID/LISTID |
| 44 | Analyze | per Story ID: | ASaysRank/SID | ASaysRank/SID/STID | ASaysRank/SID/LISTID |
| 45 | Analyze | per Story ID: | SaysIDScore/SID | SaysIDScore/SID/STID | SaysIDScore/SID/LISTID |
| 46 | Analyze | per Story ID: | SaysIDRank/SID | SaysIDRank/SID/STID | SaysIDRank/SID/LISTID |

*FIG. 71b* (71a continued)

File | Home | Interactions | Relationships | Tracking Methods | Review | View

| User: Matt O'Malley | Currently | Mth-over-Mth | Yr-over-Yr | Leaderboard |
|---|---|---|---|---|
| Overall Promptness (S/R) | 94/1 | (last mth) 94/2 | (last yr) 93/2 | You/Wayne |
| Task Proficiency (S/R) | 92/3 | 92/3 | 92/3 | Scott/Greg/You |
| Dependencies on You/Others | 12/48 | (mth) 14/54 | (yr) 376/1298 | Na |
| Application Proficiency (S/R) | 78/6 | AI, PPT, Excel, Word, PS | | Chris/Jennifer/Roy |
| Device Promptness (S/R) | 76/5 | Apple iphone 4s, Blackberry | | Chris/Roy/Mary |
| Budget Proficiency (S/R) | 58/7 | 28/13 | 33/10 | Judy/Tim/Roy |
| Time Proficiency (S/R) | 83/4 | 85/3 | 81/5 | Wayne/Bill/Tim |
| Completed/Accepted/Offered | 8/38/46 | (mth) 21/40/47 | 277/318/352 | Sue:33/33/34 |
| On Time Completion Ratio | 8/8 | 20/21 | 277/283 | Bill: 13/13 |
| Reliability Score/Rank (S/R) | 87/3 | 87/3 | 84/4 | Chris: 92/1 |
| Due Today/Week/Month | 0/4/28 | na | na | Sue: 4/21/34 |
| Challenges to You/Others | 1/3 | (mth) 0/1 | (yr) 8/12 | of Jeff: 12 |
| Errors of You/Others | 0/1 | 0/1 | 4/11 | of Jeff: 11 |

*FIG. 78a*

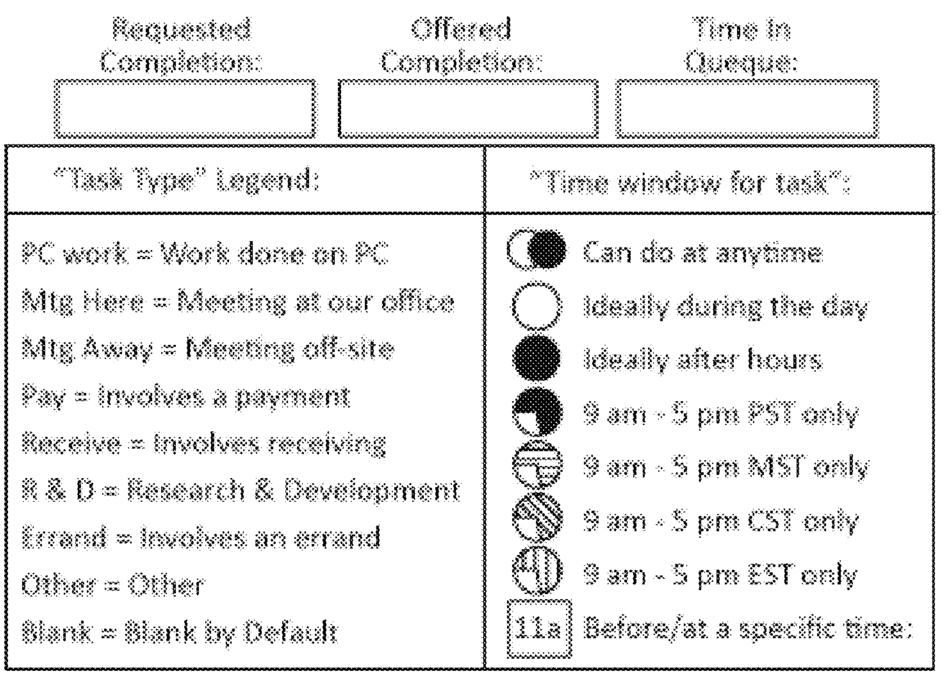

*FIG. 78b*

| Patent Application Preparation | Contributions | | | | | | | | | | | | | | | | | | | | | | | | | | |
|---|---|---|---|---|---|---|---|---|---|---|---|---|---|---|---|---|---|---|---|---|---|---|---|---|---|---|---|
| Prep Application (77) | Research | | | | | Writing/Editing/Proofing | | | | | | | | Figures | | | Other | | | | | | | | Track | | |
| KEY:<br>A=All<br>Co=Participate (w/ potential inventorship)<br>**T=Tasks** (w/o inventorship)<br>S=Suggest (w/o inventorship)<br>V=View Only<br>R=Recruit | Prior Art Known | Prior Art Research | Industry | Terminology | Regulations | Title of Invention | Abstract | Claims before any | Claims per spec | Claims per figs | Description w/ Fig | Description b4 figs | Description post fig | Figures w/ text | Figs only | Figs post text | Recruit | Proof Text | Proof Figs | PTO form Prep | PTO fees prep & sent | PTO file - (e.g. EFS, mail) | Investments | Advertise | Track Deadlines | Track Duties of Others | Track Performance |
| **Participants** | | | | | | | | | | | | | | | | | | | | | | | | | | | |
| **Inventors (70)** | | | | | | | | | | | | | | | | | | | | | | | | | | | |
| Lead inventor (40) | A | A | A | A | A | A | A | A | A | A | A | A | A | A | A | A | A | A | A | A | A | A | A | A | A | A | A |
| Co-Inventor (41) | V | Co | Co | Co | Co | Co | Co | Co | Co | Co | Co | Co | Co | Co | Co | Co | Co | Co | Co | Co | | | S | S | Co | Co | Co |
| **Contributors (80)** | | | | | | | | | | | | | | | | | | | | | | | | | | | |
| **General Non-Cert for App Prep** | | | | | | | | | | | | | | | | | | | | | | | | | | | |
| Project Mgr (43) | V | **T** | **T** | **T** | **T** | V | V | | V | V | | | V | | | V | **T** | **T** | **T** | **T** | | **T** | **T** | | **T** | **T** | **T** |
| IP Fig. Expert (54) | | | V | V | V | V | V | | V | V | | | V | **T** | **T** | **T** | **T** | **T** | **T** | | | | S | | **T** | **V** | **V** |
| Researcher (58) | V | **T** | **T** | **T** | **T** | V | V | | V | V | | | V | | | V | **T** | **T** | **T** | | | | S | | **T** | **T** | **T** |
| Editor/Proofer (61) | | **T** | **T** | **T** | **T** | **T** | **T** | | V | V | | | **T** | | | **T** | **T** | **T** | **T** | | | | S | | **T** | **T** | **T** |
| Translator (74) | | **T** | **T** | **T** | **T** | **T** | **T** | | V | V | | | **T** | | | **T** | **T** | **T** | **T** | | | | S | | **T** | **T** | **T** |
| Intern or Volunteer (59) | | **T** | **T** | **T** | **T** | V | V | | V | V | | | V | | | V | **T** | **T** | **T** | | | | S | | **T** | **T** | **T** |
| **Certified Experts** | | | | | | | | | | | | | | | | | | | | | | | | | | | |
| Patent Attorney (44) | V | V | V | V | V | **T** | **T** | **T** | **T** | **T** | **T** | **T** | **T** | **T** | **T** | **T** | **T** | **T** | **T** | **T** | | **T** | S | | **T** | V | V |
| Patent Agent (45) | V | V | V | V | V | **T** | **T** | **T** | **T** | **T** | **T** | **T** | **T** | **T** | **T** | **T** | **T** | **T** | **T** | **T** | | **T** | S | | **T** | V | V |
| **Non-Cert. Experts other than Patent Prep** | | | | | | | | | | | | | | | | | | | | | | | | | | | |
| Recruiter (81) | | R | V | | | V | R | R | R | R | R | R | R | R | R | R | **T** | R | R | R | R | R | R | R | R | R | R |
| Advertiser (57) | | | V | | | V | | | | | | | | | | | **T** | | | | | | | **T** | | | |
| Public Relations (82) | | | V | | | V | | | | | | | | | | | **T** | | | | | | | | | | |

FIG. 81

| Other Than Patent Application Prep. | Contributions | | | | | | | | | | | | | | | | | | | | | | | | | | |
|---|---|---|---|---|---|---|---|---|---|---|---|---|---|---|---|---|---|---|---|---|---|---|---|---|---|---|---|
| Patent Application Prosecution | Research | | | | | | | | | | IV | OA-Response | | | | Other | | | | | | | | Track | | | |
| KEY:<br>A=All<br>**T=Tasks**<br>V=View Only<br>R=Recruit | Search Report | Office Action Reading | OA-Cited-Art-Research | OA-Regs Cited/Research | 101 research | 102 research | 103 research | 112 research | 1.131 Declaration/Prep | Other | Interview with Examiner | Claim Amendments | Remarks | Spec Amendments | Fig. Amendments | IDS | Notice of Appeal | Pre-Appeal Brief Request | Pre-Appeal Brief | BPAI Appeal | Petition | Continuations | Divisionals | Track Deadlines | Track Duties of Others | Track Performance | Track Prior Art |
| **Participants** | | | | | | | | | | | | | | | | | | | | | | | | | | | |
| **Inventors (70)** | | | | | | | | | | | | | | | | | | | | | | | | | | | |
| Lead Inventor (40) | A | A | A | A | A | A | A | A | A | A | A | A | A | A | A | A | A | A | A | A | A | A | A | A | A | A | A |
| Co-Inventor (41) | T | T | T | T | T | T | T | T | T | T | T | T | T | T | T | T | T | T | T | T | T | T | T | T | | T | T |
| **Contributors (80)** | | | | | | | | | | | | | | | | | | | | | | | | | | | |
| **General Non-Cert for App Prep** | | | | | | | | | | | | | | | | | | | | | | | | | | | |
| Project Mgr (43) | **T** | | V | V | | V | V | | | V | | | V | **T** | **T** | **T** | **T** | **T** | **T** | **T** | | **T** | **T** | V | **T** | **T** | **T** |
| IP Fig. Expert (54) | V | | V | V | | V | V | | | V | **T** | **T** | **T** | **T** | **T** | **T** | **T** | **V** | **V** | | | | S | | | V | V |
| Researcher (58) | **T** | | V | V | | V | V | | | V | | | V | **T** | **T** | **T** | **T** | **T** | **T** | | | | S | V | **T** | **T** | **T** |
| Editor/Proofer (61) | **T** | | **T** | **T** | | V | V | | | **T** | | | **T** | **T** | **T** | **T** | **T** | **T** | **T** | | | | S | | **T** | **T** | **T** |
| Translator (74) | **T** | | **T** | **T** | | V | V | | | **T** | | | **T** | **T** | **T** | **T** | **T** | **T** | **T** | | | | S | | **T** | **T** | **T** |
| Intern or Volunteer (59) | **T** | | V | V | | V | V | | | V | | | V | **T** | **T** | **T** | **T** | **T** | **T** | | | | S | | **T** | **T** | **T** |
| **Certified Experts** | | | | | | | | | | | | | | | | | | | | | | | | | | | |
| Patent Attorney (44) | V | V | **T** | **T** | **T** | **T** | **T** | **T** | **T** | **T** | **T** | **T** | **T** | **T** | **T** | **T** | **T** | V | V | **T** | | **T** | S | V | V | V | V |
| Patent Agent (45) | V | V | **T** | **T** | **T** | **T** | **T** | **T** | **T** | **T** | **T** | **T** | **T** | **T** | **T** | **T** | **T** | V | V | **T** | | **T** | S | V | V | V | V |
| Other Certified Pros (47) | | V | **T** | **T** | **T** | **T** | **T** | **T** | **T** | **T** | | | | | | | | | | | | | | | | | |
| Former PTO Examiner (50) | | V | **T** | **T** | **T** | **T** | **T** | **T** | **T** | **T** | | | | | | | | | | | | | | | | | |
| Former BPAI Judge (52) | | V | **T** | **T** | **T** | **T** | **T** | **T** | **T** | **T** | | | | | | | | | | | | | | | | | |
| **Non-Cert. Experts other than Patent Prep** | | | | | | | | | | | | | | | | | | | | | | | | | | | |
| Expert Status (75) | | V | **T** | **T** | **T** | **T** | **T** | **T** | **T** | **T** | | | | | | | | | | | | | | | | | |
| Peer Status (65) | | V | **T** | **T** | **T** | **T** | **T** | **T** | **T** | **T** | | | | | | | | | | | | | | | | | |

*FIG. 82*

| Other Than Patent Application Prep. | Contributions | | | | | | | | | | | | | | | | | | | | | | | | | | |
|---|---|---|---|---|---|---|---|---|---|---|---|---|---|---|---|---|---|---|---|---|---|---|---|---|---|---|---|
| Post Application | Post | | | | Research | | | | | | | Monetization | | | | | Litigation | | | | | Track | | | | | |
| KEY: A=All **T=Tasks** V=View Only R=Recruit | Re-Issue | Patent Term Adjust. | Press/PR | Advertise | R&D Production | R&D Funding | R&D Infringers | R&D Litigation | R&D Litigation Funds | R&D Ocean Tomo | R&D Acquisition | Production | Licensing | Sell IP | Litigate | Ocean Tomo | Preparation | Notifications | Marksman | Re-Exam | Trial | Track Deadlines | Duties of Others | Track Performance | Track Infringers | Track Licensing | Maintenance |
| **Participants** | | | | | | | | | | | | | | | | | | | | | | | | | | | |
| **Inventors (70)** | | | | | | | | | | | | | | | | | | | | | | | | | | | |
| Lead Inventor (40) | A | A | | | A | A | A | A | A | A | A | A | A | A | A | A | A | A | A | A | A | A | A | A | A | A | A |
| Co-Inventor (41) | Co | Co | | | Co | Co | Co | Co | Co | Co | Co | Co | Co | Co | Co | Co | Co | Co | Co | Co | Co | V | V | V | V | V | V |
| **Contributors (80)** | | | | | | | | | | | | | | | | | | | | | | | | | | | |
| IP Acquirer (49) | | | | | | | | | | T | T | | | | | | | | | | | | | | | | |
| IP Licensing (53) | | | | | | | | | | | | | T | | | | | | | | | | | | | T | |
| IP Litigation (72) | | | | | | | | | | | | | | | T | | T | T | T | T | T | | | | T | | |
| **General Non-Cert for App Prep** | | | | | | | | | | | | | | | | | | | | | | | | | | | |
| Project Mgr (43) | | | | | T | T | T | T | T | T | T | | | | | | T | T | T | T | T | T | T | T | T | T | T |
| Researcher (58) | | | | | T | T | T | T | T | T | T | | | | | | T | T | T | T | T | T | T | T | T | T | T |
| Editor/Proofer (61) | | | | | T | T | T | T | T | T | T | | | | | | T | | | | | | | | | | |
| Translator (74) | | | | | T | T | T | T | T | T | T | | | | | | T | | | | | | | | | | |
| **Certified Experts** | | | | | | | | | | | | | | | | | | | | | | | | | | | |
| Patent Attorney (44) | T | T | | | | T | T | T | T | T | T | | T | T | T | T | T | T | T | T | T | T | T | T | T | T | V |
| Patent Agent (45) | T | T | | | | | | | | | | | | | | | | | | | | | | | | | |
| **Cert. Experts other than Patent Prep.** | | | | | | | | | | | | | | | | | | | | | | | | | | | |
| Attorney (w/o PTO Reg.) (76) | T | T | | | | T | T | T | T | T | T | | T | T | T | T | T | T | T | T | T | T | T | T | T | T | V |
| Other Certified Pros (47) | | | | | T | T | T | T | T | T | T | | | | | | T | | | | T | | | | | | |
| Former PTO Examiner ((66a) | | | | | T | T | T | T | T | T | T | | | | | | T | | | | | | | | | | |
| Former BPAI Judge (52a) | | | | | T | T | T | T | T | T | T | | | | | | T | | | | | | | | | | |
| **Non-Cert. Experts other than Patent Prep** | | | | | | | | | | | | | | | | | | | | | | | | | | | |
| Former or Mock Juror (51/51a) | | | | | T | T | T | T | T | T | T | | | | | | T | | | | | | | | | | |
| Peer Status (65) | | | | | T | T | T | T | T | T | T | | | | | | T | | | | | | | | | | |
| Expert Status (75) | | | | | T | T | T | T | T | T | T | | | | | | T | | T | T | T | | | | | | |
| Investor (67) | | | | | T | T | T | T | T | T | T | | | | | | T | | | | | | | | | | |
| Advertiser (57) | | | | T | | | | | | | | | | | | | | | | | | | | | | | |
| Public Relations (82) | | | | T | | | | | | | | | | | | | | | | | | | | | | | |

FIG. 83

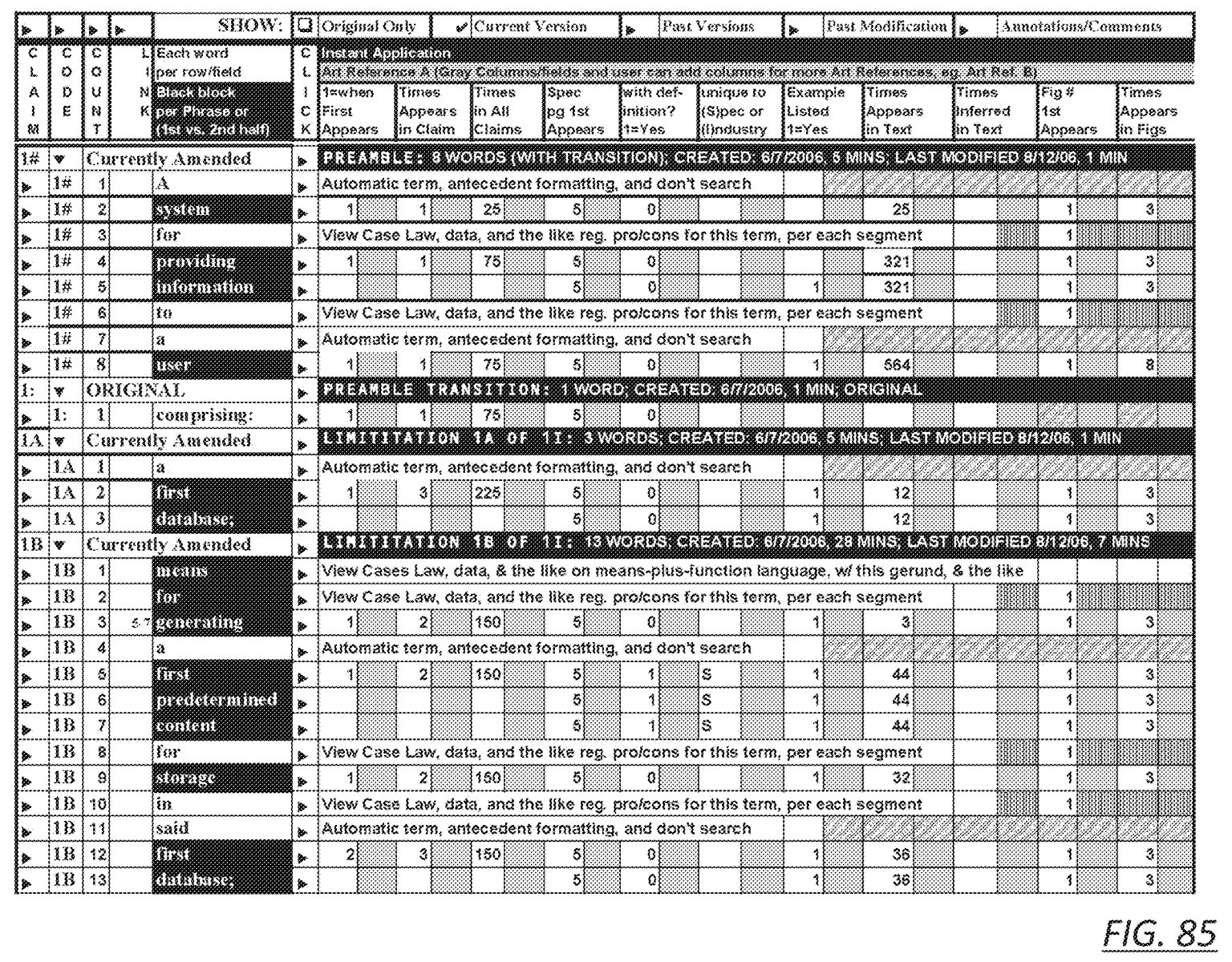

| CLAIM | CODE | COUNT | LINK | SHOW: Each word per row/field; Black block per Phrase or (1st vs. 2nd half) | CLICK | Original Only / Instant Application: 1=when First Appears | Times Appears in Claim | ✔ Current Version: Times in All Claims | Spec pg 1st Appears | with definition? 1=Yes | Past Versions: unique to (S)pec or (I)ndustry | Example Listed 1=Yes | Past Modification: Times Appears in Text | Times Inferred in Text | Annotations/Comments: Fig # 1st Appears | Times Appears in Figs |
|---|---|---|---|---|---|---|---|---|---|---|---|---|---|---|---|---|
| | | | | | | Art Reference A (Gray Columns/fields and user can add columns for more Art References, eg. Art Ref. B) | | | | | | | | | | |
| 1# | ▼ | Currently Amended | | | | PREAMBLE: 8 WORDS (WITH TRANSITION); CREATED: 6/7/2006, 5 MINS; LAST MODIFIED 8/12/06, 1 MIN | | | | | | | | | | |
| | 1# | 1 | | A | | Automatic term, antecedent formatting, and don't search | | | | | | | | | | |
| | 1# | 2 | | system | | 1 | 1 | 25 | 5 | 0 | | | 25 | | 1 | 3 |
| | 1# | 3 | | for | | View Case Law, data, and the like reg. pro/cons for this term, per each segment | | | | | | | | | 1 | |
| | 1# | 4 | | providing | | 1 | 1 | 75 | 5 | 0 | | | 321 | | 1 | 3 |
| | 1# | 5 | | information | | | | | 5 | 0 | | 1 | 321 | | 1 | 3 |
| | 1# | 6 | | to | | View Case Law, data, and the like reg. pro/cons for this term, per each segment | | | | | | | | | 1 | |
| | 1# | 7 | | a | | Automatic term, antecedent formatting, and don't search | | | | | | | | | | |
| | 1# | 8 | | user | | 1 | 1 | 75 | 5 | 0 | | 1 | 564 | | 1 | 8 |
| 1: | ▼ | ORIGINAL | | | | PREAMBLE TRANSITION: 1 WORD; CREATED: 6/7/2006, 1 MIN; ORIGINAL | | | | | | | | | | |
| | 1: | 1 | | comprising: | | 1 | 1 | 75 | 5 | 0 | | | | | | |
| 1A | ▼ | Currently Amended | | | | LIMITITATION 1A OF 1I: 3 WORDS; CREATED: 6/7/2006, 5 MINS; LAST MODIFIED 8/12/06, 1 MIN | | | | | | | | | | |
| | 1A | 1 | | a | | Automatic term, antecedent formatting, and don't search | | | | | | | | | | |
| | 1A | 2 | | first | | 1 | 3 | 225 | 5 | 0 | | 1 | 12 | | 1 | 3 |
| | 1A | 3 | | database; | | | | | 5 | 0 | | 1 | 12 | | 1 | 3 |
| 1B | ▼ | Currently Amended | | | | LIMITITATION 1B OF 1I: 13 WORDS; CREATED: 6/7/2006, 28 MINS; LAST MODIFIED 8/12/06, 7 MINS | | | | | | | | | | |
| | 1B | 1 | | means | | View Cases Law, data, & the like on means-plus-function language, w/ this gerund, & the like | | | | | | | | | | |
| | 1B | 2 | | for | | View Case Law, data, and the like reg. pro/cons for this term, per each segment | | | | | | | | | 1 | |
| | 1B | 3 | 5-7 | generating | | 1 | 2 | 150 | 5 | 0 | | 1 | 3 | | 1 | 3 |
| | 1B | 4 | | a | | Automatic term, antecedent formatting, and don't search | | | | | | | | | | |
| | 1B | 5 | | first | | 1 | 2 | 150 | 5 | 1 | S | 1 | 44 | | 1 | 3 |
| | 1B | 6 | | predetermined | | | | | 5 | 1 | S | 1 | 44 | | 1 | 3 |
| | 1B | 7 | | content | | | | | 5 | 1 | S | 1 | 44 | | 1 | 3 |
| | 1B | 8 | | for | | View Case Law, data, and the like reg. pro/cons for this term, per each segment | | | | | | | | | 1 | |
| | 1B | 9 | | storage | | 1 | 2 | 150 | 5 | 0 | | 1 | 32 | | 1 | 3 |
| | 1B | 10 | | in | | View Case Law, data, and the like reg. pro/cons for this term, per each segment | | | | | | | | | 1 | |
| | 1B | 11 | | said | | Automatic term, antecedent formatting, and don't search | | | | | | | | | | |
| | 1B | 12 | | first | | 2 | 3 | 150 | 5 | 0 | | 1 | 36 | | 1 | 3 |
| | 1B | 13 | | database; | | | | | 5 | 0 | | 1 | 36 | | 1 | 3 |

FIG. 85

| CLAIM | CODE | COUNT | LINK | Each word per row/field; Black block per Phrase or (1st vs. 2nd half) | CLICK | Instant Application; Art Reference A (Gray Columns/fields and user can add columns for more Art References, eg. Art Ref. B): 1=when First Appears | Times Appears in Claim | Times in All Claims | Spec pg 1st Appears | with definition? 1=Yes | unique to (S)pec or (I)ndustry | Example Listed 1=Yes | Times Appears in Text | Times Inferred in Text | Fig # 1st Appears | Times Appears in Figs |
|---|---|---|---|---|---|---|---|---|---|---|---|---|---|---|---|---|
| 1C | ▼ | ORIGINAL | | | ▶ | LIMITATION 1C OF 1I: 2 WORDS; CREATED: 6/7/2006, 5 MINS; ORIGINAL | | | | | | | | | | |
| ▶ | 1C | 1 | | a | ▶ | Automatic term, antecedent formatting, and don't search | | | | | | | | | | |
| ▶ | 1C | 2 | | second | ▶ | 1 | 3 | 225 | 5 | 0 | | 1 | 35 | | 1 | 3 |
| ▶ | 1C | 3 | | database; | ▶ | | | | 5 | 0 | | 1 | 35 | | 1 | 3 |
| 1D | ▼ | Previously Amended | | | ▶ | LIMITATION 1D OF 1I: 13 WORDS; CREATED: 6/7/2006, 28 MINS; LAST MODIFIED 8/12/06, 7 MINS | | | | | | | | | | |
| ▶ | 1D | 1 | | means | ▶ | View Cases Law, data, & the like on means-plus-function language, w/ this gerund, & the like | | | | | | | | | | |
| ▶ | 1D | 2 | | for | ▶ | View Case Law, data, and the like reg. pro/cons for this term, per each segment | | | | | | | | | 1 | |
| ▶ | 1D | 3 | 5-7 | generating | ▶ | 1 | 2 | 150 | 5 | 0 | | 1 | 3 | | 1 | 3 |
| ▶ | 1D | 4 | | a | ▶ | Automatic term, antecedent formatting, and don't search | | | | | | | | | | |
| ▶ | 1D | 5 | | second | ▶ | 1 | 2 | 150 | 5 | 1 | S | 1 | 48 | | 1 | 3 |
| ▶ | 1D | 6 | | predetermined | ▶ | | | | 5 | 1 | S | 1 | 48 | | 1 | 3 |
| ▶ | 1D | 7 | | content | ▶ | | | | 5 | 1 | S | 1 | 48 | | 1 | 3 |
| ▶ | 1D | 8 | | for | ▶ | View Case Law, data, and the like reg. pro/cons for this term, per each segment | | | | | | | | | 1 | |
| ▶ | 1D | 9 | | storage | ▶ | 2 | 2 | 150 | 5 | 0 | | 1 | 32 | | 1 | 3 |
| ▶ | 1D | 10 | | in | ▶ | View Case Law, data, and the like reg. pro/cons for this term, per each segment | | | | | | | | | 1 | |
| ▶ | 1D | 11 | | said | ▶ | Automatic term, antecedent formatting, and don't search | | | | | | | | | | |
| ▶ | 1D | 12 | | second | ▶ | 2 | 3 | 225 | 5 | 0 | | 1 | 35 | | 1 | 3 |
| ▶ | 1D | 13 | | database; | ▶ | | | | 5 | 0 | | 1 | 35 | | 1 | 3 |
| 1E | ▼ | ORIGINAL | | | ▶ | LIMITATION 1E OF 1I: 2 WORDS; CREATED: 6/7/2006, 5 MINS; ORIGINAL | | | | | | | | | | |
| ▶ | 1E | 1 | | server | ▶ | 1 | 3 | 225 | 5 | 0 | | 1 | 13 | | 1 | 3 |
| ▶ | 1E | 2 | | means; | ▶ | View Cases Law, data, & the like on means-plus-function language, w/ this gerund, & the like | | | | | | | | | | |

FIG. 86

| CLAIM | CODE | COUNT | LINK | Each word per row/field Black block per Phrase or (1st vs. 2nd half) | CLICK | Instant Application<br>Art Reference A (Gray Columns/fields and user can add columns for more Art References, eg. Art Ref. B)<br>1=when First Appears | Times Appears in Claim | Times in All Claims | Spec pg 1st Appears | with definition? 1=Yes | unique to (S)pec or (I)ndustry | Example Listed 1=Yes | Times Appears in Text | Times Inferred in Text | Fig # 1st Appears | Times Appears in Figs |
|---|---|---|---|---|---|---|---|---|---|---|---|---|---|---|---|---|
| 1F | ▼ | Previously Amended | | | ▶ | LIMITATION 1F OF 1I: 12 WORDS; CREATED: 6/7/2006, 28 MINS; LAST MODIFIED 8/12/06, 7 MINS | | | | | | | | | | |
| ▶ | 1F | 1 | | means | ▶ | View Cases Law, data, & the like on means-plus-function language, w/ this gerund, & the like | | | | | | | | | | |
| ▶ | 1F | 2 | | for | ▶ | View Case Law, data, and the like reg. pro/cons for this term, per each segment | | | | | | | | | 1 | |
| ▶ | 1F | 3 | 5-8 | interconnecting | ▶ | 1 | 1 | 75 | 5 | 0 | | 1 | 12 | | 1 | 3 |
| ▶ | 1F | 4 | | said | ▶ | Automatic term, antecedent formatting, and don't search | | | | | | | | | | |
| ▶ | 1F | 5 | 8 | first | ▶ | 3 | 3 | 225 | 5 | 0 | | 1 | 36 | | 1 | 3 |
| ▶ | 1F | 6 | | and | ▶ | Don't Search | | | | | | | | | | |
| ▶ | 1F | 7 | | second | ▶ | 3 | 3 | 225 | 5 | 0 | | 1 | 35 | | 1 | 3 |
| ▶ | 1F | 8 | | databases | ▶ | | | | 5 | 0 | | 1 | 35 | | 1 | 3 |
| ▶ | 1F | 9 | | to | ▶ | View Case Law, data, and the like reg. pro/cons for this term, per each segment | | | | | | | | | 1 | |
| ▶ | 1F | 10 | | said | ▶ | Automatic term, antecedent formatting, and don't search | | | | | | | | | | |
| ▶ | 1F | 11 | | server | ▶ | 2 | 3 | 225 | 5 | 0 | | 1 | 13 | | 1 | 3 |
| ▶ | 1F | 12 | | means; | ▶ | View Cases Law, data, & the like on means-plus-function language, w/ this gerund, & the like | | | | | | | | | | |
| 1G | ▼ | ORIGINAL | | | ▶ | LIMITATION 1G OF 1I: 3 WORDS; CREATED: 6/7/2006, 5 MINS; ORIGINAL | | | | | | | | | | |
| ▶ | 1G | 1 | | a | ▶ | Automatic term, antecedent formatting, and don't search | | | | | | | | | | |
| ▶ | 1G | 2 | | plurality | ▶ | | | | 5 | | | | | | 1 | 3 |
| ▶ | 1G | 3 | | of | ▶ | View Case Law, data, and the like reg. pro/cons for this term, per each segment | | | | | | | | | | |
| ▶ | 1G | 4 | | transceivers; | ▶ | 1 | 3 | 225 | 5 | 0 | | 1 | 74 | | 1 | 5 |

FIG. 87

| CLAIM | CODE | COUNT | LINK | Each word per row/field Black block per Phrase or (1st vs. 2nd half) | CLICK | Instant Application / Art Reference A (Gray Columns/fields and user can add columns for more Art References, eg. Art Ref. B) 1=when First Appears | Times Appears in Claim | Times in All Claims | Spec pg 1st Appears | with definition? 1=Yes | unique to (S)pec or (I)ndustry | Example Listed 1=Yes | Times Appears in Text | Times Inferred in Text | Fig # 1st Appears | Times Appears in Figs |
|---|---|---|---|---|---|---|---|---|---|---|---|---|---|---|---|---|
| 1H | ▼ | Previously Amended | | | ▶ | LIMITITATION 1H OF 1I: 13 WORDS; CREATED: 6/7/2006, 28 MINS; LAST MODIFIED 8/12/06, 7 MINS | | | | | | | | | | |
| ▶ | 1H | 1 | | means | ▶ | View Cases Law, data, & the like on means-plus-function language, w/ this gerund, & the like | | | | | | | | | | |
| ▶ | 1H | 2 | | providing | ▶ | | | | 5 | 0 | | 1 | 21 | | 1 | 3 |
| ▶ | 1H | 3 | 8-12 | access | ▶ | 1 | 1 | 75 | 5 | 0 | | 1 | 21 | | 1 | 3 |
| ▶ | 1H | 4 | | by | ▶ | View Case Law, data, and the like reg. pro/cons for this term, per each segment | | | | | | | | | 1 | |
| ▶ | 1H | 5 | | each | ▶ | View Case Law, data, and the like reg. pro/cons for this term, per each segment | | | | | | | | | 1 | |
| ▶ | 1H | 6 | | of | ▶ | View Case Law, data, and the like reg. pro/cons for this term, per each segment | | | | | | | | | 1 | |
| ▶ | 1H | 7 | | said | ▶ | Automatic term, antecedent formatting, and don't search | | | | | | | | | | |
| ▶ | 1H | 8 | | transceivers | ▶ | 2 | 3 | 225 | 5 | 0 | | 1 | 74 | | 1 | 5 |
| ▶ | 1H | 9 | | to | ▶ | View Case Law, data, and the like reg. pro/cons for this term, per each segment | | | | | | | | | 1 | |
| ▶ | 1H | 10 | | said | ▶ | Automatic term, antecedent formatting, and don't search | | | | | | | | | | |
| ▶ | 1H | 11 | | server | ▶ | 3 | 3 | 225 | 5 | 0 | | 1 | 13 | | 1 | 3 |
| ▶ | 1H | 12 | | means; | ▶ | View Cases Law, data, & the like on means-plus-function language, w/ this gerund, & the like | | | | | | | | | | |
| ▶ | 1H | 13 | | and | ▶ | Automatic term, antecedent formatting, and don't search | | | | | | | | | | |
| 1I | ▼ | Previously Amended | | | ▶ | LIMITITATION 1I OF 1I: 14 WORDS; CREATED: 6/7/2006, 28 MINS; LAST MODIFIED 8/12/06, 7 MINS | | | | | | | | | | |
| ▶ | 1I | 1 | | selector | ▶ | 1 | 1 | 75 | 5 | 0 | | 1 | 3 | | 1 | 3 |
| ▶ | 1I | 2 | | means | ▶ | View Cases Law, data, & the like on means-plus-function language, w/ this gerund, & the like | | | | | | | | | | |
| ▶ | 1I | 3 | | on | ▶ | View Case Law, data, and the like reg. pro/cons for this term, per each segment | | | | | | | | | 1 | |
| ▶ | 1I | 4 | | each | ▶ | View Case Law, data, and the like reg. pro/cons for this term, per each segment | | | | | | | | | 1 | |
| ▶ | 1I | 5 | | said | ▶ | Automatic term, antecedent formatting, and don't search | | | | | | | | | | |
| ▶ | 1I | 6 | | transceiver | ▶ | 3 | 3 | 225 | 5 | 0 | | 1 | 74 | | 1 | 5 |
| ▶ | 1I | 7 | | for | ▶ | View Case Law, data, and the like reg. pro/cons for this term, per each segment | | | | | | | | | | |
| ▶ | 1I | 8 | | selectively | ▶ | 1 | | | 5 | 0 | | 1 | 17 | | 5 | 8 |
| ▶ | 1I | 9 | 11-14 | accessing | ▶ | | | | 5 | 0 | | 1 | 17 | | 5 | 8 |
| ▶ | 1I | 10 | | said | ▶ | Automatic term, antecedent formatting, and don't search | | | | | | | | | | |
| ▶ | comment: | | | for 11-14 | ▶ | NOTE: check consistency on "predetermined" first and second content | | | | | | | | | | |
| ▶ | 1I | 11 | 14 | first | ▶ | 2 | 2 | 150 | 5 | 1 | S | 1 | 44 | | 1 | 3 |
| ▶ | 1I | 12 | | and | ▶ | Don't Search | | | | | | | | | | |
| ▶ | 1I | 13 | | second | ▶ | 2 | 2 | 150 | 5 | 1 | S | 1 | 48 | | 1 | 3 |
| ▶ | 1I | 14 | | content. | ▶ | | | | 5 | 1 | S | 1 | 48 | | 1 | 3 |
| ▶ | | | | TOTALS | ▶ | 97 WORDS; CREATED: 6/7/2006, 1 HOUR: 5 MINS; LAST MODIFIED 8/14/06; TOTAL: 6 HOURS: 1 MIN | | | | | | | | | | |

FIG. 88

NLP AND AIS OF I/O, PROMPTS, AND COLLABORATIONS OF DATA, CONTENT, AND CORRELATIONS FOR EVALUATING, PREDICTING, AND ASCERTAINING METRICS FOR IP, CREATIONS, PUBLISHING, AND COMMUNICATIONS ONTOLOGIES

CLAIM FOR PRIORITY AND CROSS REFERENCE TO RELATED APPLICATIONS

This application is a continuation-in-part application of U.S. patent application Ser. No. 13/815,960, filed on Mar. 15, 2013, the disclosure of which is specifically incorporated herein by reference. This application also claims the priority benefit of U.S. Patent Application Ser. Nos. 61/720,389; 61/720,387; 61/720,382; 61/720,377; 61/720,374; and 61/720,370, all of which were filed on Oct. 30, 2012, the disclosure of all of which are specifically incorporated herein by reference.

BACKGROUND

Field

The field of the present disclosures relates to computerized exchange platforms, natural language processing (NLP), artificial intelligence systems (AIS), and persistent/continuous computer processor i/o monitoring, interrogating, extracting, parsing, classifying, mapping, and analyzing for inputs, outputs, prompts, queries, responses, relations, formatting, and correlations of raw, formatted data, knowledge, collaborations, and correlations, comprising systems and methods for implementing, monitoring, analyzing, and evaluating, assessing, determining, the I/O, prompts, and correlations (I/O/PC), where an I/O/PC analysis and evaluation further produces i/o/pc, data, values, statistics, metrics, correlations, scores, social graphs, graphs, regression analysis, clustering, assessments, libraries, lexicon, taxonomies, ontologies, and relative proof and trust scores per each. The i/o/pc data analysis, evaluations, and assessments comprise data reliability, creativity, IP, rights, novelty, utility, consumption, reality, actuality, success, value, rights, intellectual property rights, returns on investments, electronically, historically, regressively, currently, concurrently, retrospectively, prospectively, and futuristically, via persistent artificial intelligent means for measurably improving SWOT, ROI, for interrogation, extraction, assessment and statistical data analysis and clustering relationships for/from/related-to/prompted by actor inputs/outputs, prompts, and/or relations of social graphs.

SUMMARY

The present disclosure is generally directed to computer implemented methods in which a project is generated and terms of participation for authorized contributions to the project are established. Authorized contributions from authorized participants are electronically stored; each authorized contribution is associated with an authorized participant and an authorship content module is run to evaluate an authorship condition for each authorized contribution. A patentability module is run that evaluates a patent claim input to determine a patentability profile.

The authorship condition can be determined relative to the project, to a preselected database (such as a defined IP universe, and example of which might be U.S. issued patents and printed publications), and/or to a database of prior work of the authorized participant associated with a given authorized contribution (which can be used, e.g., to identify the given authorized contribution as being a potential conflicting contribution if the authorship condition does not satisfy a criterion).

The patentability profile can include one or more of (1) an estimated likelihood or predictive evaluation of novelty of the patent claim input; (2) an evaluated contribution of each of the authorized participants to the patent claim input; and (3) a determined compensation for one or more of the authorized participants.

The predictive evaluation of novelty of the patent claim input can be determined relative to a preselected database by use of an information extraction algorithm that indexes information within the preselected database so that it can be compared to claim components contained within the patent claim input. The claim components can be obtained by use of a second information extraction algorithm that parses elements of the patent claim input and uses semantic roles and relationships of words within the patent claim input to establish classifications of claim components.

The evaluated contributions of the authorized participants are determined by establishing a relative overlap of authorized contributions by an authorized participant with the patent claim input when the authorship condition satisfies a criterion. Thus, for example, although an authorized participant might make many authorized contributions to a project, none of such contributions might be relevant to the patent claim input, or any that might be relevant to the patent claim input might not satisfy the authorship condition if other authorized participants have already made authorized contributions containing the same content that created the overlap.

The determined compensation can be based at least in part upon a value attributed to the patent claim input and a contribution value attributed to the relative overlap of authorized contributions that have an authorship condition satisfying a criterion to the patent claim input and/or to the terms of participation for authorized contributions to the project (which might establish multiple classifications of authorized participants and determined compensation based at least in part upon which of the multiple classifications applies). Also, compensation might be determined after a patent has been granted when the patent claim input is one or more patent claims contained in the patent.

A contribution to the project can be tested against the terms of participation for authorized contributions to the project to determine if it satisfies the terms of participation and then it can either be accepted as an authorized contribution to the project if it does satisfy the terms of participation or rejected as an unauthorized contribution to the project if it does not satisfy the terms of participation. If a contribution is identified as an unauthorized contribution, an inquiry can be made to determine if the unauthorized contribution will be accepted as an authorized contribution to the project.

A comparison can be generated between the results of using different patent claim inputs or changing something found within the patent claim input, such as adding or deleting words or elements of a claim. This method can be iterative, meaning results might naturally be compared as changes are made to the patent claim input (such as when a patent claim is being drafted), which could be used to help evaluate a claim as it is being drafted, or it can be used to compare complete claims to choose which claim might be selected or deleted for a given purpose.

A patent claim input can be one or more claims used to predict use or value of such claims by one or more entities. In this method, the patent claim input can be evaluated according to the methods already described, and it can also be compared to selected databases to create a predictive profile of at least one entity who might be using the patent claim input. Such methodology can be used to identify one or more groups of persons within a large entity who might be working in area similar or related to a project, or it might be used to identify potential use or infringement of one or more claims, especially if the patent claim input is from an issued patent.

Accordingly, it is a primary object of the present disclosure to provide computer-implemented methods useful in evaluating one or more patent claim inputs and authorized contributions to a project.

This and further objects and advantages will be apparent to those skilled in the art in connection with the drawings and the detailed description set forth below.

BRIEF DESCRIPTION OF THE DRAWINGS

Various features and characteristics of the non-limiting and non-exhaustive embodiments disclosed and described in this specification may be better understood by reference to the accompanying figures, in which:

FIG. 5 is a flowchart depicting a non-limiting embodiment and example of the user creating an Account (60) using the IPACE-UI 102.

FIG. 11 a is an illustration of a Triple per the Resource Description Framework, according to the art.

FIG. 11*b* is an illustrative example of a non-limiting embodiment of the IPACE Enhanced IP-TRIPLEs and the IPACE Enhanced IP-TRIPLE statements which a relationship connection to FIG. 11*c*.

FIG. 11*c* is an illustrative example of a non-limiting embodiment of a simplified IP-TRIPLEs (similar to the TRIPLE), where there are relationships for evaluating and prioritizing a variety of options relative to a patent claim, claim element, and/or word selection.

FIG. 11*g* is an illustrative example of a non-limiting embodiment of relational mapping and schema for determining, evaluating, and visually representing a "Lack of Anticipation" (e.g. from the IPACE's perspective, e.g. AIS), wherein the IPACE generates a variety of scored option responses for the Applicant to consider, including links to support, sources, previous cases that were relatively similar.

FIGS. 16*a*-16*c* depict various non-limiting embodiments and examples, where the IPACE via the ID-ACERS parses, evaluates, assesses, and determines, I/O/PC data.

FIGS. 17*a*-17*e* depict various non-limiting embodiments and examples, employing resource tables for the ID-ACERS parsers, evaluation, assessments, predictions, and determinations of the I/O/PC data.

FIG. 18*a* depicts an example embodiment with some independent data segments, parsing, and/or delineations (e.g. specifically related to IP), where the IPACE could delineate, parse, and/or the like.

FIG. 18*b* continues the depicted embodiment example from FIG. 18*a*.

FIG. 19 continues the depicted embodiment example from FIGS. 18*a* and 18*b*.

FIG. 20*a* depicts an example embodiment with some independent data segments, parsing, and/or delineations (e.g. specifically related to trademark-related IP), where the IPACE could delineate, parse, and/or the like.

FIG. 20*b* continues the depicted embodiment example from FIG. 20*a*.

FIG. 29 depicts an example embodiment of the IPACE graphical user interface for viewing, tracking, sorting, and interacting with projects within the IPACE system.

FIGS. 31*a* and 31*b* (and also 32*a* and 32*b*) and FIG. 33 depict examples for various non-limiting embodiments, regarding performance Pay.

FIG. 42 depicts an example embodiment of the IPACE graphical user interface for viewing, tacking, and interacting with data/content creation and collaboration within the IPACE system, where, for example, data/content contributions and/or emails are tracked per Contributor (50).

FIG. 56 is a flowchart that depicts a non-limiting embodiment and example of the IPACE system, and associated computer-implemented method for tracking, analyzing, determining, and/or discerning a competition winner (e.g. a prediction winner).

FIG. 63 is a flowchart that depicts a non-limiting embodiment and example of the IPACE system, and associated computer-implemented method for Computer-Processor-based analysis, interrogation, extraction, evaluation and/or the like of I/O/PC, data/content with/for any Intellectual Property components, elements, links, relations, novelty, overlap, scoring, verifications, prompts, and/or the like.

FIG. 70*a* is a table (continued on 70*b*) that depicts a non-limiting embodiment and example of the IPACE-Hub100, system for extracting, classifying, mapping, electronically storing, tracking, and analyzing the relative novelty and correlations, relationships, and/or the like of data/content associated with a story, report, publication, consumer, prediction, and/or the like, and a plurality of events (e.g. a list of the most popular news events).

FIG. 71 is a table (also split between FIG. 71*a* and continued on FIG. 71*b*) that depicts another embodiment and example of the IPACE-Hub100, system for storing and tracking components and relationships associated with a plurality of stories comprising different sub-states.

FIG. 76 is a flowchart that depicts an embodiment and example of the IPACE system, and associated computer-implemented method for Extracting, classifying, mapping, electronically storing, tracking, and analyzing User inputs and Interactions (e.g. via Todometer).

FIG. 77 depicts an example embodiment of the IPACE graphical user interface for viewing, tacking, analyzing, and displaying a particular user's activities, tasks, events, calendar, schedule, and/or interactions with other users, where preferably there is a relative timer, score, and ranking applied to a variety of metrics per user, per interaction, and/or the like.

FIG. 78*a* depicts an example embodiment of a component of the IPACE graphical user interface for viewing, tacking, analyzing, and displaying a particular user's activities, tasks, events, calendar, schedule, and/or interactions with other users; depicting a relative report per metric (e.g. via Todometer).

FIG. 78*b* depicts an example embodiment of a component of the IPACE graphical user interface for viewing, tacking, analyzing, and displaying a particular user's activities, tasks, events, calendar, schedule, and/or interactions with other users depicting a variety of filtering and sorting options for tracking tasks (e.g. via Todometer).

FIG. 81 through FIG. 83 depict an example embodiment of the IPACE graphical user interface for data/content creation, collaboration, development, and monitoring within the IPACE system, such as where participation roles, permissions, and rights that may be viewed, tracked, and interacted.

FIGS. 85-88 depict examples and non-limiting embodiments of the IPACE graphical user interface for data/content creation, collaboration, development, and monitoring within the IPACE system, such as where participation roles, permissions, and rights that may be viewed, tracked, and interacted.

FIG. 89 is a flowchart that depicts a non-limiting embodiment and example of the IPACE system, and associated computer-implemented method regarding patent prosecution options.

FIG. 90 is a flowchart that depicts a non-limiting embodiment and example of the IPACE system, and associated computer-implemented method regarding patent post grant options.

FIG. 91 is a block diagram with some flow charting steps depicting a non-limiting embodiment of the IPACE member's functionality from the ADSTATS Management (124) module.

FIG. 92 is a flowchart depicting a non-limiting embodiment and an example whereby the ADSTATS MGR may utilize the ADSTATS module to create and/or modify a particular Campaign 236 with target advertising.

FIG. 93 is a combination flowchart and block diagram depicting an example embodiment whereby an Account (60) user with a particular role receives targeted advertisements, when he/she connects to the IPACE Operating Environment or an IPACE-Hub-controlled or enabled entity.

FIG. 94 is a combination flowchart and block diagram depicting an example embodiment whereby an IPACE member/user receives targeted advertisements, when he/she utilizing the IdeaSocket Dashboard when connected to the IPACE Operating Environment or a IPACE-Hub-controlled or enabled entity.

Figure 95A:
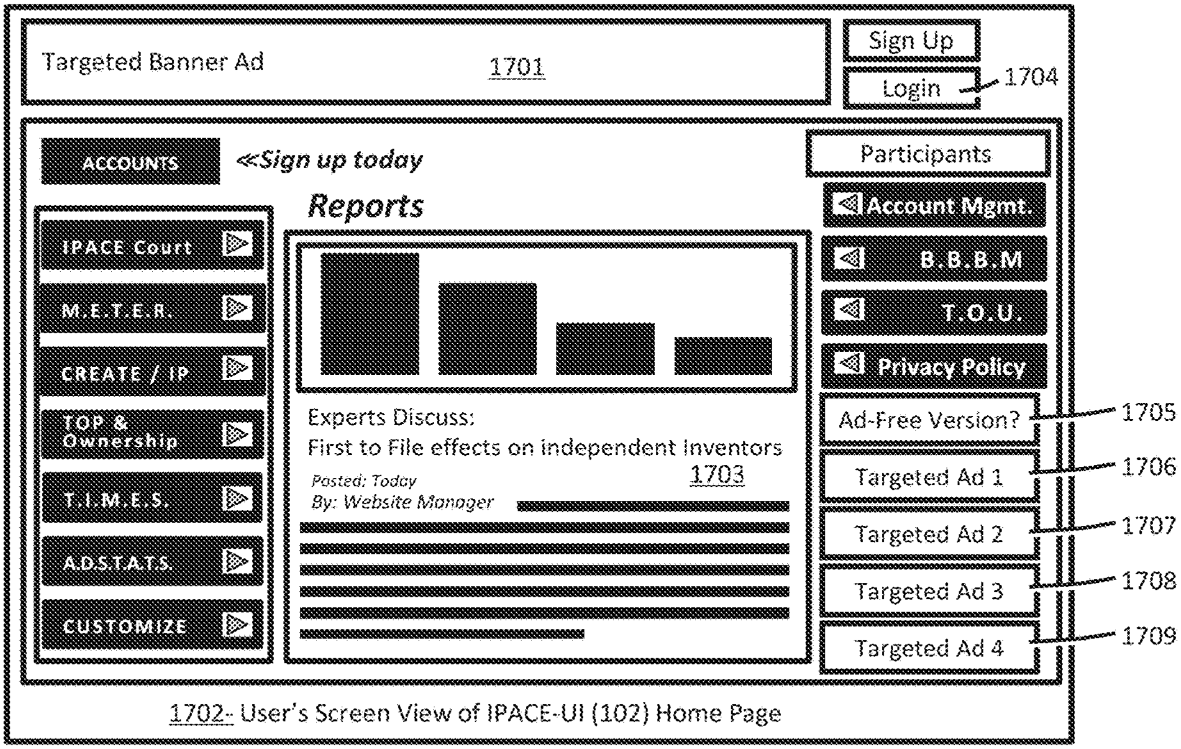

FIG. 95*a* depicts a non-limiting embodiment and an example screenshot of the user interface and Home Page as would be seen by an Account (60) with the role and permissions of an IPACE Account (60).

Figure 95B:
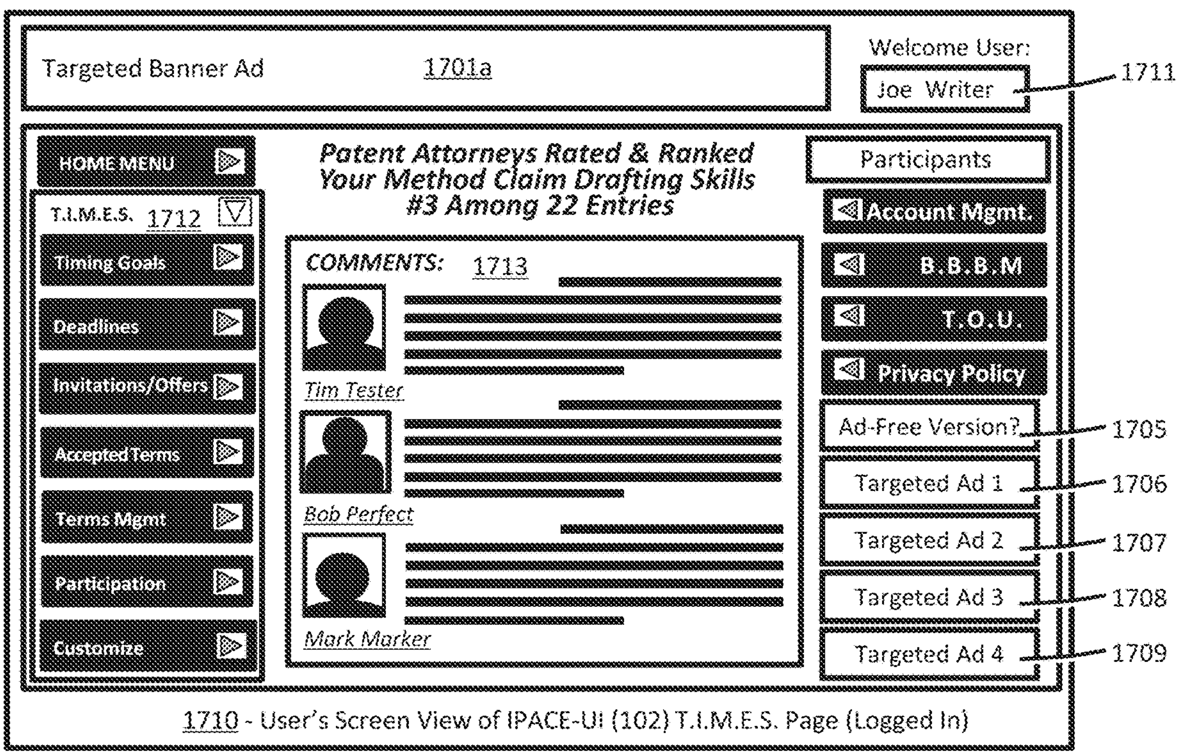

FIG. 95*b* depicts a non-limiting embodiment of an example screenshot of the user interface after a particular IPACE member/user has logged into the IPACE-UI 102 system.

Figure 96A:
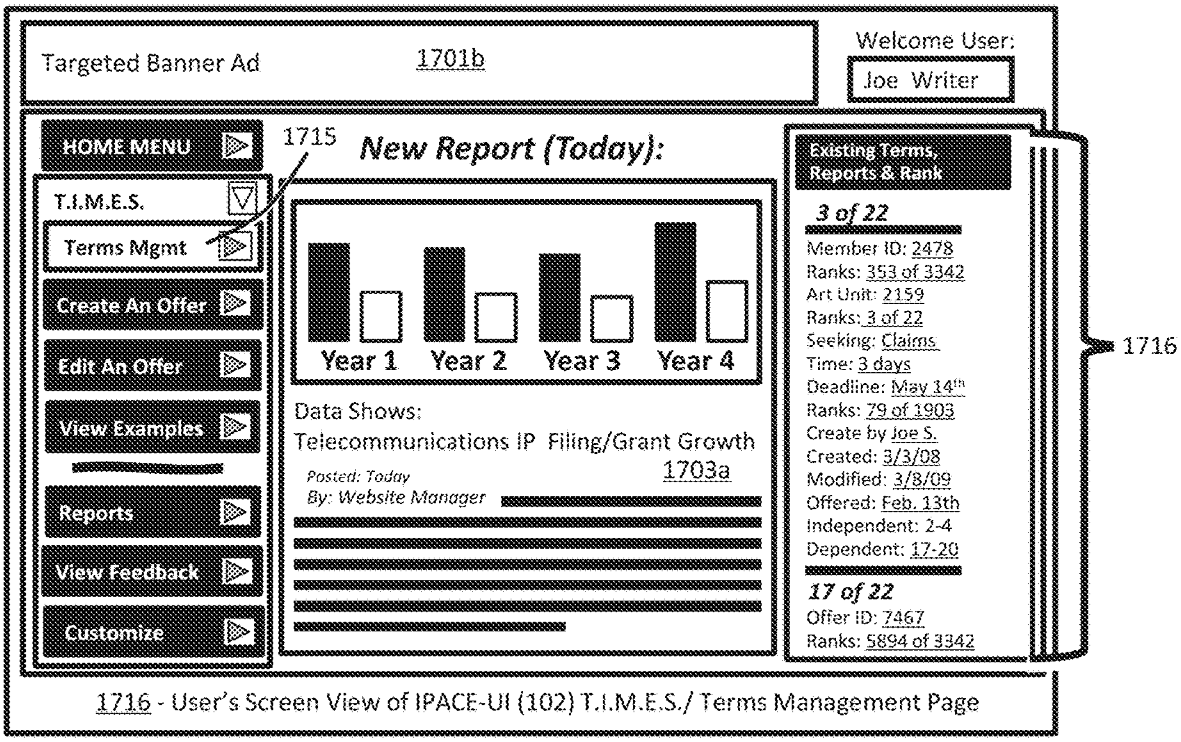

FIG. 96*a* depicts a non-limiting embodiment and an example screenshot of the IPACE member/user interface after the IPACE member/user has selected "Terms Mgmt" under the TIMES menu heading.

Figure 96B:
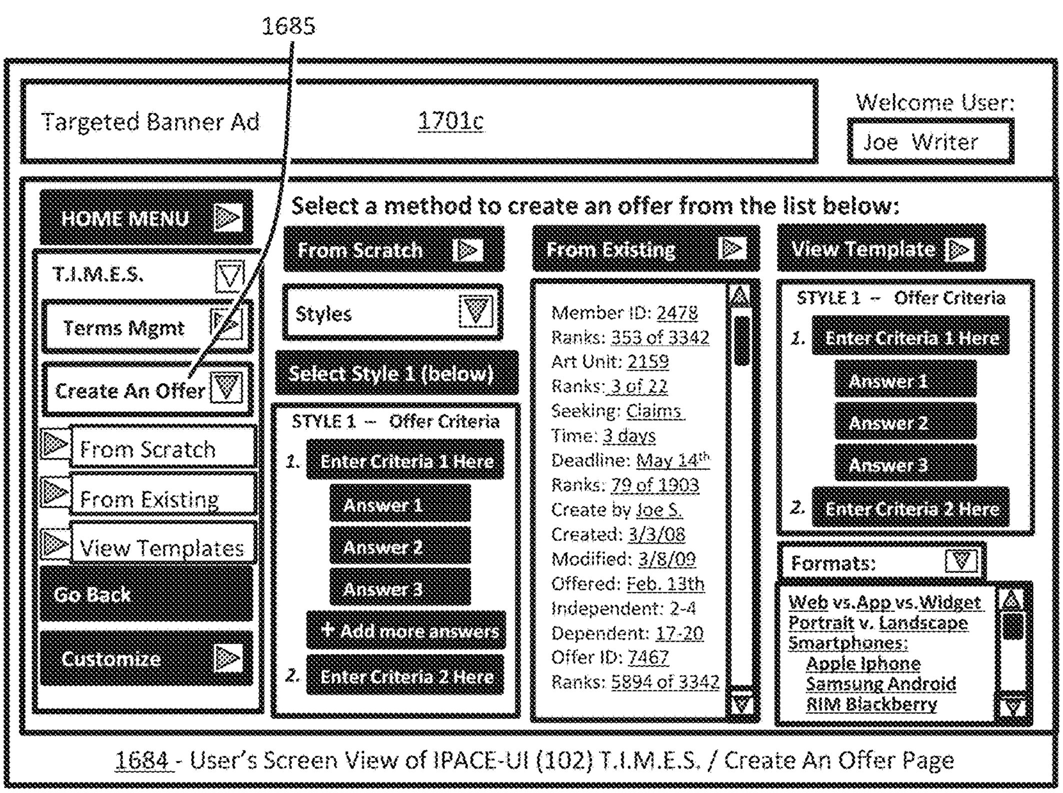

FIG. 96*b* depicts a non-limiting embodiment of an example screenshot of where the user interface after the IPACE member/user has selected to create an Offer under the Terms Mgmt menu heading.

Figure 97A:
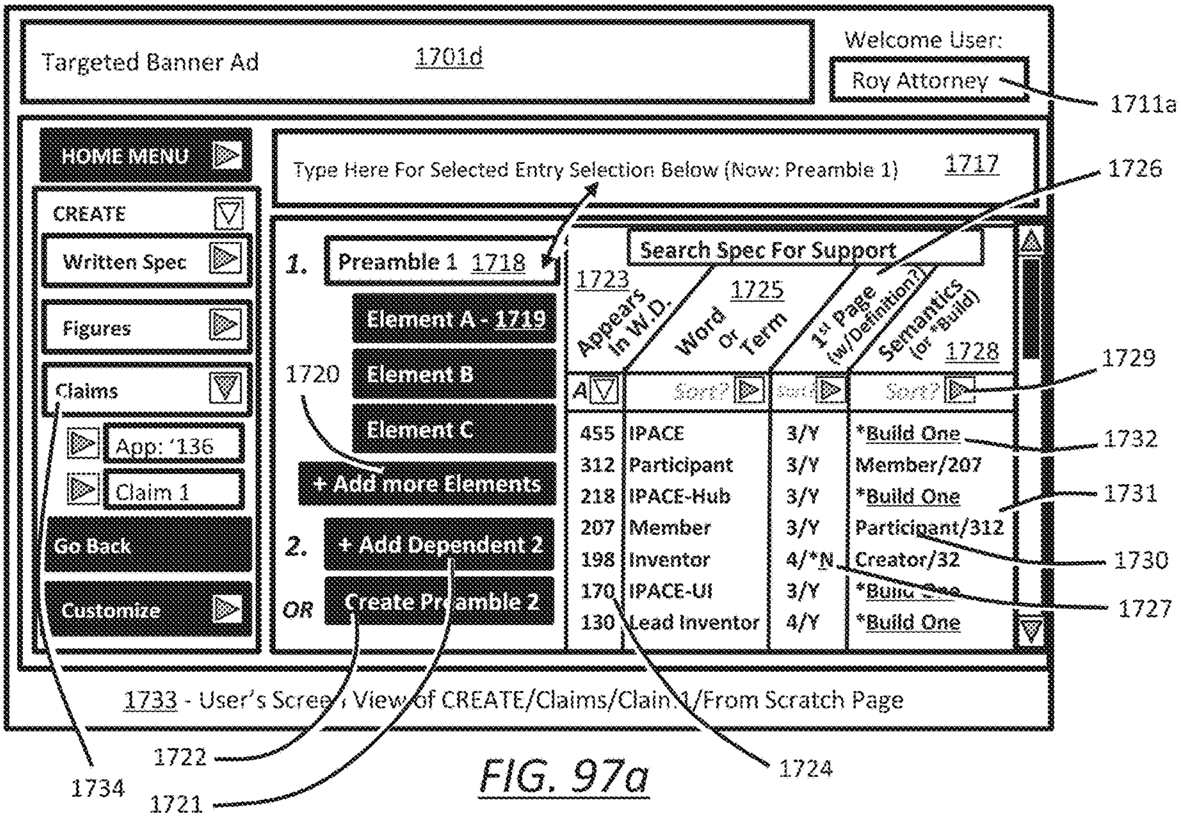

FIG. 97*a* depicts a non-limiting embodiment of an example screenshot of the user interface after the IPACE member/user has selected to create Claims from scratch.

Figure 97B:
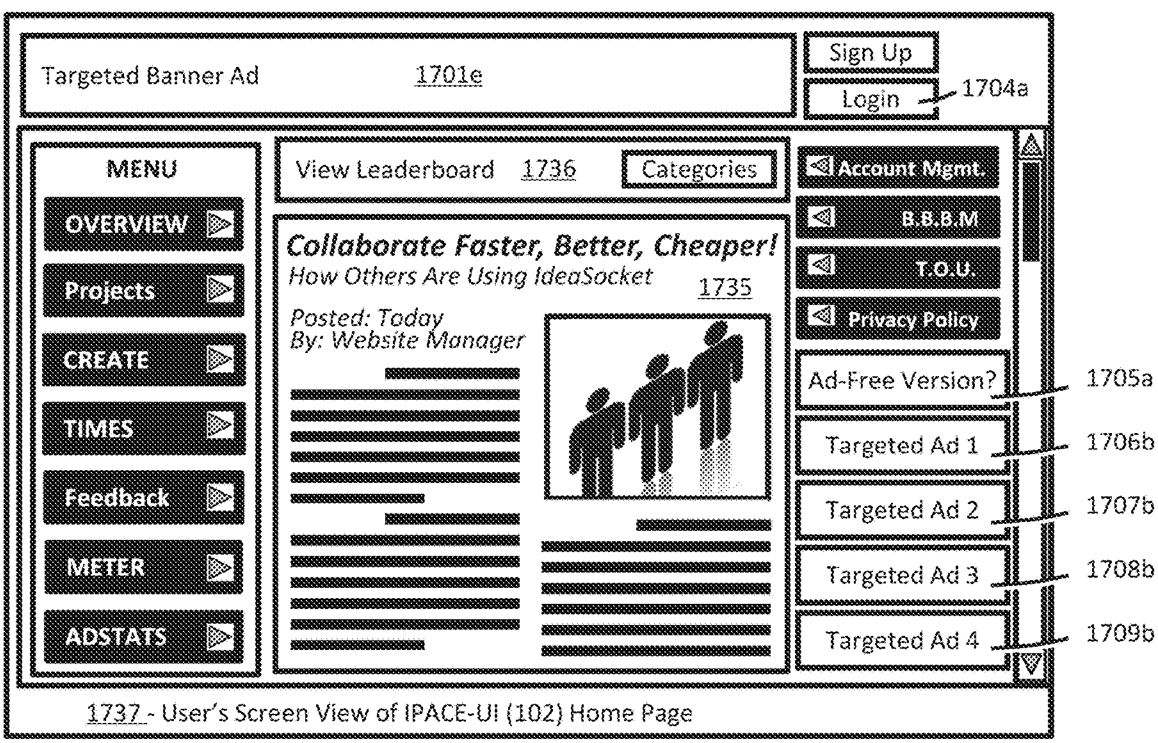

FIG. 97*b* depicts a non-limiting embodiment of an example screenshot of the IPACE user interface and Home Page as would be seen by an Account (60) user with the role and permissions of an IPACE user.

Figure 98A:
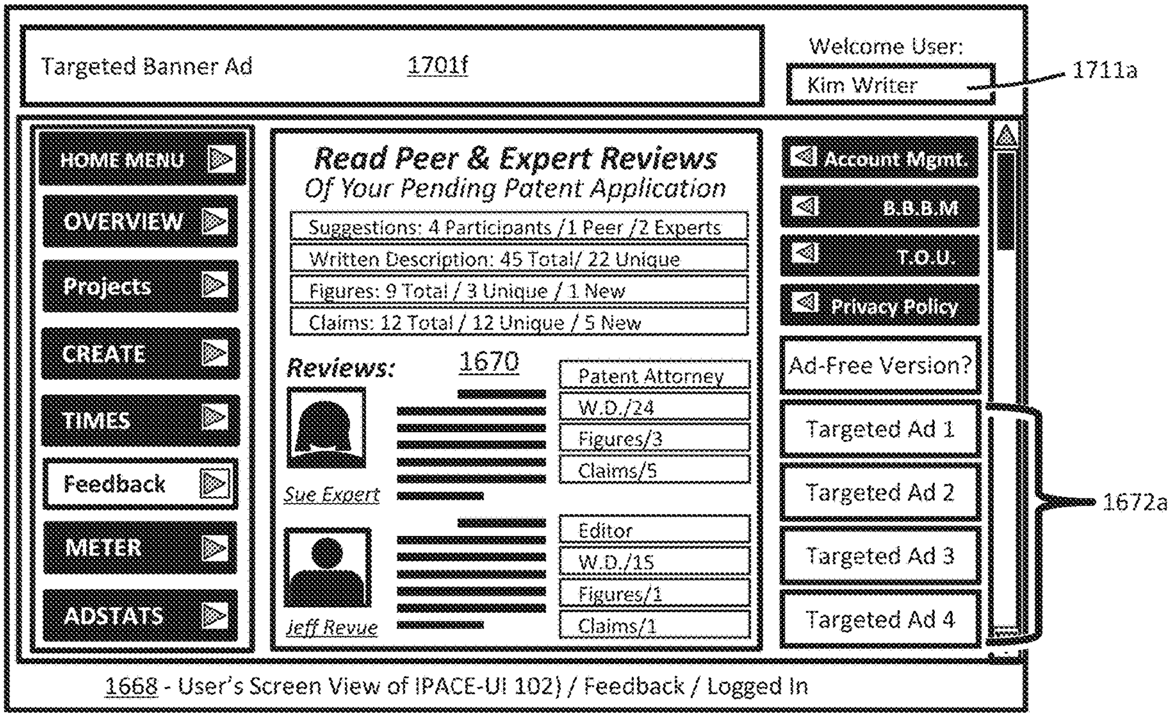

FIG. 98*a* depicts a non-limiting embodiment of an example screenshot of the user interface after a particular IPACE user has logged into the IPACE-UI 102 system.

Figure 98B:
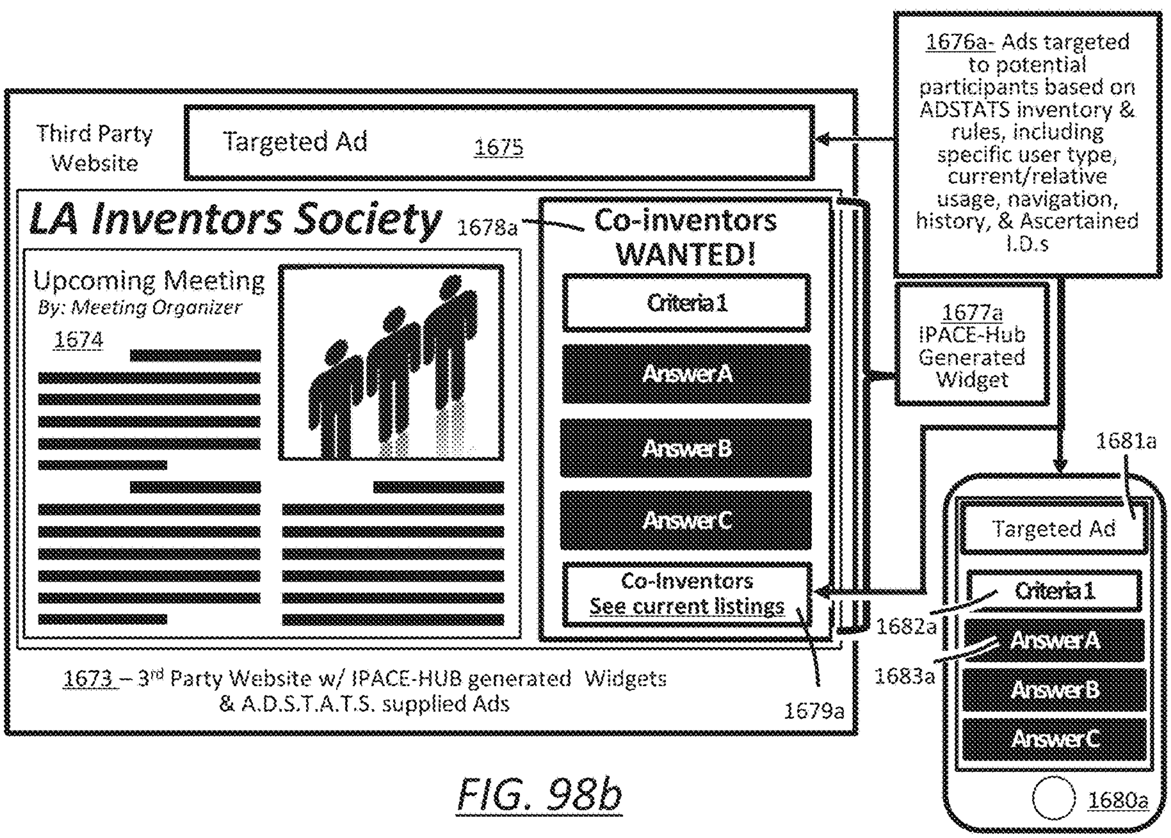

FIG. 98*b* depicts a non-limiting embodiment of an example screenshot of a mobile device 1681*a* and a third party website 1673 with a Widget 1678*a*, a website data/content (e.g. a Story, Article, Report, and/or the like) 1674 and/or a Targeted Ad 1675 generated and/or targeted by the IPACE-Hub 100 system.

Figure 99A:
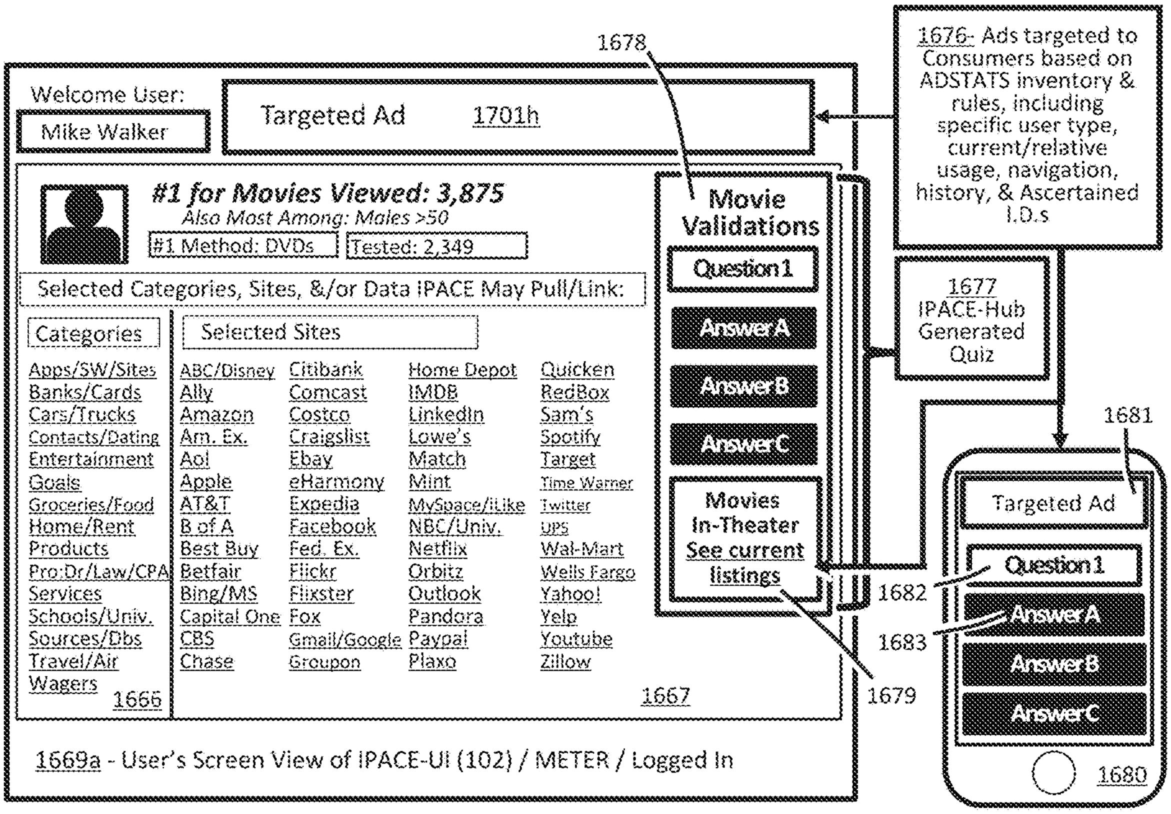

FIG. 99*a* depicts a non-limiting embodiment of an example screenshot of a mobile device 1680 and a third party website 1669*a* with a Widget 1678, a Categories List 1666, a Selected Sites List 1667, and/or a Targeted Ad 1701*h* generated and/or targeted by the IPACE-Hub 100 system.

Figure 99B:
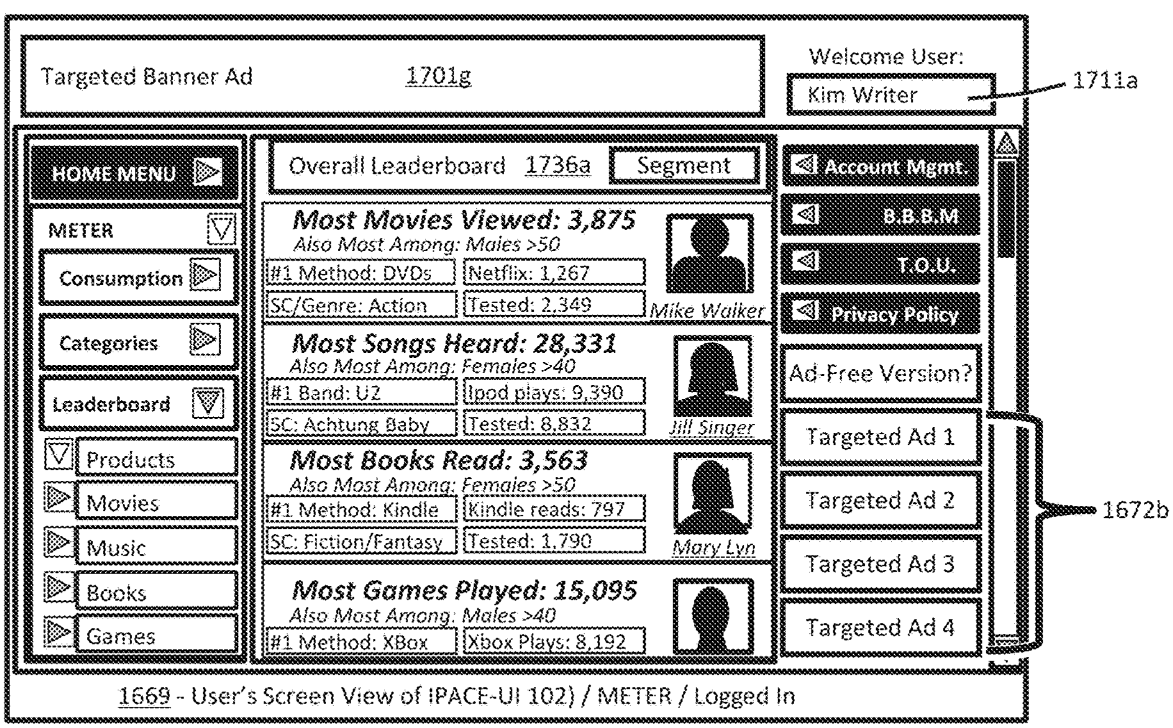

FIG. 99*b* depicts a non-limiting embodiment of an example screenshot of the user interface where the IPACE member/user has selected to view an Overall Leaderboard 1736*a*.

DETAILED DESCRIPTION

The present disclosure relates to computerized exchange platforms and artificial intelligence system for persistently tracking, parsing, and analyzing inputs, outputs, prompts, queries, responses, relations, and correlations of data, data/content, collaborations, for evaluating, assessing, determining, predicting, and ascertaining metrics, scores, graphs, assessments, and statistics analysis for creativity, novelty, utility, consumption, reliability, success, value, rights, intellectual property rights, returns on investments, electronically, historically, currently, prospectively, and futuristically, artificial intelligent means for persistently fostering measurable improvements, for systems and methods, comprising tracking systems, AI methods, evaluation systems, AI systems, more particularly to a personalized, localized, segmented, automated, computer-processor-based system, computerized method, computer-readable medium method, computer-processor-based artificial intelligence system, and computer-processor-based system for the same.

In various non-limiting embodiments, the disclosed system via the computer processor, associated subsystems (e.g.

via AIS, ID-ACERS, Knowledge Base Mgmt., CREATE, METER, TIMES, FINANCIALS, etc.) will automatically, systematically, continuously, persistently, conditionally, and/or via/per actor/user-prompt monitor, interrogate, analyze, compare, and/or the like, a "Collective Data Result" with/via, against, and/or the like, an scale of data scores/values comprising an "Ascertained value, a Discerned value, a Relative Perceived value, an, Actor-Stated value, and/or the like, and sometimes collectively referred to as an "A/D/RP/AS value(s)", or simply as an "A/D/RP/AS." In various non-limiting embodiments, the A/D/RP/AS," would preferably include, incorporate, and/or the like, a Predicted value, whether specifically mentioned, or demonstrated, or now; and where the collection may be referred to as A/D/RP/AS/P."

In various non-limiting embodiments, the disclosed system (an IPACE system) via the computer processor, associated subsystems (e.g. via AIS, ID-ACERS, Knowledge Base Mgmt., CREATE, METER, TIMES, FINANCIALS, etc.) persistently monitor, analyze, interrogate, parse, analyze, evaluate, assess, determine, score, graph, map, link, process data, values, attributes, relations, links, and/or the like. In various non-limiting embodiments, the persistent monitoring, parsing, analysis, interrogating, extracting, evaluating, assessing, determining, scoring, graphing, mapping, linking, processing, and/or the like; generates values, scores, attributes, relations, links, and/or the like; where the values would preferably further ascertain and/or discern a known exception to, say a rule, event, condition, and/or the like. For example, the exception could be for a statutory deadline anomaly, recent rule-change, resolution, and/or where the IPACE system generates a perceived prediction, exception, resolution, and/or the like, based in part, for what is A/D/RP/AS/P to define what, what is A/D/RP/AS/P as relatively likely to have caused what, what is A/D/RP/AS/P to constitute what, what is A/D/RP/AS/P to violate what, (e.g. for each of the 5W's, who, what, where, how, and why) and/or the like.

Various embodiments are described and illustrated in this specification to provide an overall understanding of the structure, function, operation, manufacture, and use of the disclosed compositions, systems, and methods. It is understood that the various embodiments described and illustrated in this specification are non-limiting and non-exhaustive. Thus, the present disclosure is not limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. The various embodiments disclosed and described in this specification can comprise, consist of, or consist essentially of, or be characterized by the features and characteristics as variously described herein.

Any patent, publication, or other disclosure material identified herein is specifically incorporated herein by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "some embodiments" or the like, means that a particular feature or characteristic may be included "In an embodiment." Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. All such ranges are intended to be inherently described in this specification such that amending to expressly recite any such sub-ranges would comply with the applicable disclosure requirements.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although an illustrative implementation of one or more embodiments is provided below, the disclosed systems and/ or methods may be implemented using any number of techniques. This invention should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

All U.S. Patents listed below and throughout are specifically incorporated herein by reference. Further, referenced throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "In an embodiment," "in another embodiment," and similar language throughout this specification may, but do not necessarily, refer to the same embodiment. Many modifications and variations will be apparent to the practitioner skilled in the art.

Referenced throughout this specification are the terms and/or phrases such as "for example," "for instance," "say," "the like," "etc.," or similar language which generally means that the language, description, and explanation utilized in association is merely to demonstrate an element, feature, item, list of items, purpose, way, means, method, and/or the like for what has been described in association, but depending on the usage and situation, it may not be meant to be exhaustive representation or demonstration, or meant to limit a particular invention to that particular precise formation. Referenced throughout this specification are also the terms and/or phrases such as "unit," "section," "part," "portion," "element," "component," "article," "delineation," "segment," or similar language which generally means that a described term and/or phrase in connection thereof constitutes a separate distinct "article," "feature," "structure," "characteristic," "trait," "delineation," "selection(s)," "composite(s)," "compilation," "segment," "partition," or similar of an embodiment of the present disclosure. In various non-limiting embodiments, terms such as "unit," "section," "part," "portion," "element," "component," "article," "delineation," "segment," "partition," or similar language may be interchangeable.

Referenced throughout this specification are also the terms and/or phrases such as "units," "sections," "portions," "elements," "components," "articles," "traits," "characteristics," "group(s)," "selection(s)," composite(s)," "compilation," "delineation," "segment," or similar language which generally means that a described term and/or phrase in connection and/or the combination thereof constitutes also a separate distinct "article," "feature," "structure," "characteristic," "trait," "delineation," "segment," or similar of an embodiment of the present disclosure.

According to Wikipedia (and others), data are values of qualitative or quantitative variables, belonging to a set of items. Data in computing (or data processing) are represented in a structure, often tabular (represented by rows and columns), a tree (a set of nodes with parent-children relationship) or a graph structure (a set of interconnected nodes). In various non-limiting embodiments, data are typically the results of measurements and can be visualized using graphs or images. In various non-limiting embodiments, data as an abstract concept can be viewed as the lowest level of abstraction from which information and then knowledge are derived.

In various non-limiting embodiments, data processing occurs by stages. In various non-limiting embodiments, a raw data (e.g. unprocessed data, refers to a collection of numbers, characters and/or the like, and is generally a relative term); where the raw data may be "processed" (and/or the like) in a data processing stage. In various non-limiting embodiments, the data processing stage, may process (and/or the like) the "raw data," in a first data stage into a "processed data." In various non-limiting embodiments, the "processed data" from the "first data stage" may be considered another "raw data" in a subsequent or a "second data stage." In various non-limiting embodiments, field data refers to raw data collected in an uncontrolled in situ environment.

In various non-limiting embodiments, an "experimental data" generally refers to data generated within the context of a scientific investigation by observation and recording. In various non-limiting embodiments, a perception or a relative perception describes an assessment, where the assessment may have been interrogated from a source, resource, actor, user, and/or the like. In various non-limiting embodiments, the perception or relative perception may be partially or wholly based upon experimental data. Reference throughout this specification to "interrogate," broadly refers to a process of evaluating data using analytical and logical reasoning to test and address a value, to determine whether or not it is correct. In various embodiments, a reference to "interrogate," may also refer to information or data extraction. For instance, an information extraction of website's content, data, database, data store, ontology, triple store, and/or the like.

In various non-limiting embodiments, the word data may refer to the plural of datum, neuter past participle of the Latin dare, "to give", hence "something given". In some discussions of problems in geometry, mathematics, engineering, and so on, the terms given and data are used interchangeably, in various non-limiting embodiments. In various non-limiting embodiments, data processing refers: data are numbers, words, images, etc., accepted as they stand.

In some publications, the terms data, information and knowledge are used for overlapping concepts. According to Akash Mitra (2011) article: "Classifying data for successful modeling," the main difference is in the level of abstraction being considered. According to Mitra and in various non-limiting embodiments, data is the lowest level of abstraction, information is the next level, and finally, knowledge is the highest level among all three. In various non-limiting embodiments, for data to become information, it must be interpreted and take on a meaning and/or value. An often cited example, states that the height of Mt. Everest is generally considered as "data", a book on Mt. Everest geological characteristics may be considered as "information", and a report containing practical information on the best way to reach Mt. Everest's peak may be considered as "knowledge".

According to P. Beynon-Davies (2002), in "Information Systems: An introduction to informatics in organisations" Basingstoke, UK: Palgrave Macmillan (ISBN 0-333-96390-3) describes information as a concept that bears a diversity of meanings, from everyday usage to technical settings. Where the author states, "Generally speaking, the concept of information is closely related to notions of constraint, communication, control, data, form, instruction, knowledge, meaning, mental stimulus, pattern, perception, and representation." Beynon-Davies uses the concept of a sign to distinguish between data and information; data are symbols while information occurs when symbols are used to refer to something.

According to Sharon Daniel, in "The Database: An Aesthetics of Dignity," "It is people and computers who collect data and impose patterns on it. These patterns are seen as information which can be used to enhance knowledge. These patterns can be interpreted as truth, and are authorized as aesthetic and ethical criteria. Events that leave behind perceivable physical or virtual remains can be traced back through data. Marks are no longer considered data once the link between the mark and observation is broken."

Some aspects and embodiments of the present disclosure relate to systems and methods for automatically, systematically (e.g. via Artificial Intelligence Subsystem & Mgmt. (AIS 195) (195), conditionally, and/or via/per actor/user-prompt monitor, interrogate, parse, and/or analyze an at least one input/output, prompt, and/or collaboration unit (sometimes referred to collectively as the "I/O/PC," the "IOPC" unit, or similar, or may occasionally be referred to simply as the "input," "output," "query," and/or "collaboration"). The IPACE system and associated computer-implement methods may automatically, systematically (e.g. via AIS 195), conditionally, contingently, actor-prompted/selected, and/or user-prompted/selected, incorporate, employ, require, include, induce, invoke, and/or the like, a first prompt (sometimes a prompt), and/or a response (e.g. a reply, acceptance, suggestion, acknowledgement, reaction, score, input, output, query, correction, modification, deletion, selection, retort, rejection, challenge, counter, forwarding, avoidance, skip, a second prompt, and/or the like to the first prompt. In various non-limiting embodiments, the first prompt and a subsequent prompt/response are may be combined to create a prompt pairing, and for example, may be referred to as a "prompt/response pairing," simply a "prompt/rejection," a "1$^{st}$ prompt/2$^{nd}$ prompt," and/or the like. In various non-limiting embodiments, the pairing is simply the "prompt."

Following, the prompt, the present disclosure may automatically, systematically (e.g. via AIS 195), conditionally, contingently, actor-selectively, and/or via/per actor/user-prompt interrogate, parse, and/or analyze each I/O/PC unit, and/or the like to/for any ascertained, discerned, preferred, suited, relatively perceived, and/or the like, decoding deconstructing, deciphering, decoupling, delinking, detecting, decompiling, parsing, analyzing, decompressing, segmenting, separating, splitting, sorting, arranging, rearranging, assessing, interrogating, extracting, interpolating, calculating, structuring, ordering, sequencing, scoring, judging, ruling, ranking, and/or the like of the I/O/PC units. The parsing and analysis of the I/O/PC would preferably incorporate steps for recognizing, determining, distinguishing, ascertaining, discerning, exposing, evaluating, assessing, determining, generating, establishing, challenging, interrogating, extracting, suggesting, predicting, valuing, scoring, measuring, assessing, incorporating, and/or the like, logical methods, links, relations, annotations, queries, calculations, labeling, interpretations, permutations, arrangements, aggregations, collections, combinations, compilations, segmentations, partition, delineations, and/or the like for an at least one structure, structural component, and/or structural relation, relationship, correlation, association, and/or the like.

In various non-limiting embodiments, the I/O/PC parsing, analysis, interrogating, extracting, evaluating, assessing, determining, and/or the like, would preferably incorporate an artificial intelligent (e.g. via the AIS 195) data/value/statistical analysis, evaluation, assessment, and/or determination per I/O/PC per actor, per i/o and/or the like. In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt may temporally, partially, wholly, continuously, and/or the like, preform, implement, monitor, track, review, report, evaluate, assess, determine, and/or the like, an AI-SWOT analysis for strengths, weaknesses, opportunities, and threats. In various non-limiting embodiments, the AI-SWOT includes assessments and evaluations that generate an AI-SWOT result with additional I/O/PC, data, analysis, relations, maps, graphs, scores and values, where the AI-SWOT result may be express via an AI-SWOT criteria, what is AI/AIS-Ascertainment, AI/AIS—Discernment, AI/AIS—Relative Perception, AI/AIS—Statement, AI/AIS—Prediction, AI/AIS—Assumption, AI/AIS—Goal, AI/AIS—Reliability, and/or the like.

In various non-limiting embodiments, the AI/AIS assessments and evaluations would incorporate what is ascertained, discerned, relatively perceived, predicted, and/or the like by the AI/AIS to be creative, novel, successful, valuable, IP, product/possess/create/assign/delegate rights, ROI, promptness, efficiency, proficiency, accountability, reliability, communications-skills, promptness, completeness, effectiveness, availability, reliability, judgment, competency, knowledge, experience, education, likability, respectability, patentability, and/or the like.

In various non-limiting embodiments, the AI/AIS assessments and evaluations would incorporate what is ascertained, discerned, relatively perceived, predicted, and/or the like by the AI/AIS as partially and/or wholly active, passive, success, adequate, reasonable, suitable, measurable for/as./with: a participation, contributions, writings, searches, research, development, creation, and/or the like. In various non-limiting embodiments, the AI/AIS could partially and/or wholly perform each task, automatically, systematically, conditionally, continuously, actively, passively, per criteria and/or per actor/user-prompt.

In various non-limiting embodiments, the AI/AIS could partially and/or wholly perform the task of a participant, contributor, writer, searcher, researcher, developer, coder, source code reviewer, creator, and/or the like. In various non-limiting embodiments, the AI/AIS could partially and/or wholly perform the task of analyzing, assessing, and evaluating patent claims, where the AI/AIS could interrogate, extract, parse, analyze, and/or evaluate available, suitable, and/or the like I/O/PC for exiting AI/AIS-SWOT, search for new claims, opportunities, hidden value, unrealized value, invalidity and/infringement issues/concerns, challenges, and/or the like.

In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt continuously, preform, implement, monitor, track, review, report, evaluate, generate and provide profiles, elements, events, goals, sources, formats, translations, interpolations, transcriptions, conversations and/or the like. In various non-limiting embodiments, the AIS and its associated computer sub-systems and methods, could separate task and compare results automatically, systematically (e.g. via AIS 195), conditionally, contingently, via the actor-prompt, user-prompt and/or the like where scoring, ranking, displaying, sequencing, mapping, graphing, viewing, projecting, and/or the like, could also be generated. Further, where the AIS evaluation and subsequent prompt/action, may include, incorporate a testing, qualifying, verifying, validation, interrogation, extraction, acknowledgement, challenge, prompt/reply, modification and/or the like, of a rule, logic, calculation, algorithm, formula/condition/identification, authentication, validation, verification, matrix, continuum, map, mapping, graph, rank, score, 3D object, node, 3D world, domain, semantic, ontology, etymology, dictionary, wiki, content, data, bit, byte, source code, encryption key/code, security code, biometrics, bar code, 3D code, RFID, identification, location-awareness/coordinates, element, attribute, format, style, style-sheet, set, matrix, segment, expression, formula, condition, rule, logic, operator, object, network, table, field, cell, range, hierarchy, tree, interval, label, node, edges, links, classification, partition, category, tag, metadata, relations, correlations, actor, profile, network, domain, AI (e.g. for/with AIS 195), and/or the like, of the I/O/PC.

In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt fulfill/review/support/judge/challenge/assume/predict a particular event, events, a particular role, roles, a particular entity or entities, a particular judge or judges, a particular juror or jurors.

In various non-limiting embodiments, the AIS and its associated functionality, capability, intelligence, and the like, may fulfill/review/support/judge/challenge/assume/predict a particular function, request, interrogation, extraction, assessment, evaluation, determination, and/or the like. In various non-limiting embodiments, the AIS and its associated functionality, capability, intelligence, and the like, may fulfill/review/support/judge/challenge/assume/predict a particular function, request, interrogation, extraction, assessment, evaluation, determination, and/or the like, say per actor, entity, role, project, time window, actor/user profile, source/resource/support, event, goal, competitor, challenger, decision, assessment, evaluation, determination, ascertainment, discernment, perception, assumptions, prediction, and/or the like.

In various non-limiting embodiments, the particular function and/or functions the AIS and its associated computer processor-operated sub-systems, computer-implemented methods provide, implement, perform, interrogate, parse, analyze, evaluate, assess, determine and/or the like, would preferably comprise a particular project manager, event, events, a particular role, roles, a particular entity or entities, a particular judge or judges, a particular juror or jurors.

In various non-limiting embodiments, the presented disclosure further analyzes, interrogates, evaluates, assesses, determines, generates, predicts, assumes, and/or the like, a list of ascertained, discerned, assessed, predicted, and/or relatively perceived values for the I/O/PC overall, a collection, segment, permutation, combination, aggregation of I/O/PC and/or I/O/PC components, each component independently, and/or the like, from a list comprising creativity, novelty, success, values, IP, rights and ROI promptness, efficiency, proficiency, accountability, reliability, communications-skills, promptness, completeness, effectiveness, availability, reliability, judgment, competency, knowledge, experience, education, likability, respectability, patentability, and/or the like.

A description of an I/O/PC is received, and an evaluation, assessment, determination, and/or prediction of the intellectual property current value, future value and/or like is persistently monitors, tracked, parsed, analyzed, interrogated, scored, assessed, evaluated, and/or the like; including per inventor, author, drafter, reviser, reviewer, participant, contributors, owner, assignee, assignor, examiner, judge, juror, attorney, draftsperson, and/or the like. In various non-limiting embodiments, a parsed/segmented/analyzed evaluation/determination/assessment per IP relation, touch point, potential participant, and/or the like, including project managers, drawing experts, creative talent, editors/proofers, attorneys, registered patent attorneys, registered patent agents, other licensed professionals/engineers, non-certified experts, researchers, translator, instructors, recruiters, press/PR, advertiser, employees, contractors, peers, professors, students, IP prosecutors, IP licensors, IP acquirers, IP litigators, former PTAB/BPAI judges, former PTO examiner, former IP case jury members, and the like, non-humans/actor/machine contributions, computers, software, time, resources, raw materials, money, credit, and/or other actor/user-specified data/statistics, and/or the like.

In various non-limiting embodiments, the assessment of the present disclosure would preferably include and/or incorporate an evaluation, determination, prediction, scoring, continuous assessments, and/or the like, per/for equity, valuation, investment sought, investment raised, development planned, development completed, trials sought, trials completed, ROI, return per participant, investor, resource, time allotment, budget, prediction, contribution, suggestion, decision, input, output, query, prompt, relation, and/or the like, as ascertained, discerned, relatively perceived, predicted, and/or the like, per present day, day over day, month over month, year over year, project over project, participant over participant, budget over budget, examiner over examiner, application over application, case over case, trial over trial, appeal over appeal, license over license, and/or the like, and/or some combination, collection, variation, permutation, segmentation, and/or the like of these.

In various non-limiting embodiments, the I/O/PC assessment of the present disclosure would preferably include and/or incorporate an at least one item from the list comprising content, data, bit, byte, source code, encryption key/code, security code, biometrics, bar code, 3D code, RFID, identification, authentication, validation, verification, location-awareness/coordinates, element, attribute, format, style, style-sheet, set, matrix, segment, expression, formula, condition, rule, logic, operator, object, network, table, field, cell, range, hierarchy, tree, interval, label, node, edges, links, classification, partition, and/or the like; wherein the I/O/PC assessment further prompts a generation of an ascertainment, discernment, relative perception, predictions, and/or the like, for/from a specific value, list, statistic, continuum, rank, score, graph, map, 3D object/node, 3D world/domain, and/or the like. Further, where in the specific value would preferably include, and/or incorporate generating a list, the data analysis/assessment/value list comprising creativity, novelty, success, values, IP, rights and ROI promptness, efficiency, proficiency, accountability, reliability, communications-skills/promptness/effectiveness, availability, judgment, competency, knowledge, experience, education, likability, respectability, and/or the like.

Referenced throughout this specification is the term "automatically," which generally shall mean "a system and/or process produced by a machine" (e.g. a computer via a processor) and generally implies as being "automatically preformed" by the system. In various non-limiting embodiments, the term "automatically" can also apply to a subsystem of the system, method, step, module, engine or the like associated, connected to, and/or controlled by the system; in addition, "automatically" can apply to a particular sub-system, method, step, module, engine or the like associated, connected to, and/or controlled by the system, and/or the like, unless part of an explanation, definition (e.g. here), stated otherwise, and/or the like. In various non-limiting embodiments, what is "automatic" may be performed and/or relative to a particular sub-system, a particular method, a particular step, a group of systems/methods, a list of steps, and/or the like, and/or some combination, aggregation, variation, permutation, segmentation, and/or the like of these. In various non-limiting embodiments, what is "automatic" may be relative and/or performed by a third-party system, sub-system, method, step, and/or the like.

Referenced throughout this specification is the term "systematically," which generally shall mean "a system/process carried out using step-by-step procedures (a method) and/or constituting a system" and generally implies as being "systematically preformed" by the disclosed system; continuing, an embodiment of a sub-system of the disclosed system, method, step, module, engine or the like associated, connected to, and/or controlled by the disclosed system; additionally, a particular sub-system, method, step, module, engine or the like associated, connected to, and/or controlled by the disclosed system, and/or the like, unless part of an explanation, definition (e.g. here), stated otherwise, and/or the like. In various non-limiting embodiments, what is "systematic" may be performed and/or relative to a particular sub-system, a particular method, a particular step, a group of systems/methods, a list of steps, and/or the like, and/or some combination, aggregation, variation, permutation, segmentation, and/or the like of these.

Referenced throughout this specification is the term "conditionally," which generally shall mean "a system/process imposing, depending on, or including a condition for a step (a method), and/or a part of a system" and generally implies as being "conditionally preformed" by the disclosed system; continuing, an embodiment of a sub-system of the disclosed system, method, step, module, engine or the like associated, connected to, and/or controlled by the disclosed system; additionally, a particular sub-system, method, step, module, engine or the like associated, connected to, and/or controlled by the disclosed system, and/or the like, unless part of an explanation, definition (e.g. here), stated otherwise, and/or the like. In various non-limiting embodiments, what is "conditional" may be performed and/or relative to a particular sub-system, a particular method, a particular step, a group of systems/methods, a list of steps, and/or the like, and/or some combination, aggregation, variation, permutation, segmentation, and/or the like of these.

Referenced throughout this specification is the phrase "user-prompted/selected," which generally shall mean "a system and/or process relating to and/or involving a selection, choice, and/or decision by a user." Referenced throughout this specification is the phrase "actor-prompted/selected," which generally shall mean "a system and/or process relating to and/or involving a selection, choice, and/or decision by an actor." Referenced throughout this specification is the phrase "actor/user-prompted/selected," which generally shall mean "a system and/or process relating to and/or involving a selection, choice, prompt, delay, skip, and/or decision by the actor and/or the user." In various non-limiting embodiments, what is "actor/user-prompted/selected" or "user-selectively" implemented may be relative and/or performed by a particular user, a particular segment of users, a particular group of users, a particular person, a particular group of people, a particular company, a particular entity, a particular organization, a particular government, a particular society, a segment of users, and/or the like.

Referenced throughout this specification is the phrase "Ontology," which generally shall mean a "formal model of classes of resources in a given domain the properties of those resources, and constrains on the relationships among them, allowing for structured information, machine inferencing, and rich user querying. For instance, the IPACE system would preferably generate an Ontology for intellectual property, where there could a plurality and/or variety of subdomain Ontologies (e.g. the Universe of IP, US patents, US TMs, etc.). In addition, the IPACE system can extract from, compare, evaluate, merge, overlay, test, and/or the like, other Ontologies. For instance the Ontology for the Library of Congress. Generally speaking a Resource Description Framework (RDF) with an RDF Schema (RDFS) adds layers of expressivity to simple RDF that allows for the creation such ontologies. Web Ontology Language (OWL) adds further levels of detail that allow for additional data modeling, inferencing, and querying. A Simple Knowledge Organization System (SKOS) is a simpler subset of a Web Ontology Language (OWL) for encoding existing knowledge organization systems (controlled vocabularies) and their semantic relationships.

Referenced throughout this specification are embodiments, systems, methods, scenarios, incidents, examples, instances, and/or the like, with the term "known," as in the phrases: "known to be," "known for," "known as," "known to have," "known," and/or the like, where generally "known" shall mean "apprehended with certainty," and generally implies as "apprehended with certainty" by the system; continuing, an embodiment of the system, sub-system, method, step, module, engine or the like associated, connected to, and/or controlled by the system; additionally, a particular sub-system, method, step, module, engine or the like associated, connected to, and/or controlled by the system, and/or the like, unless part of an explanation, definition (e.g. here), stated otherwise, and/or the like. In various non-limiting embodiments, what is "known" may be relative to a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are embodiments, systems, methods, scenarios, incidents, examples, instances, and/or the like, with the term "ascertain," as in the phrases: "ascertained," "ascertainment," "ascertaining," "as ascertained," "ascertained as," and/or the like, where generally "ascertained" shall mean "to determine, establish, or make certain, exact, precise," and generally implies as "to find out or learn with certainty" by the system; continuing, an embodiment of the system, sub-system, method, step, module, engine or the like associated, connected to, and/or controlled by the system; additionally, a particular sub-system, method, step, module, engine or the like associated, connected to, and/or controlled by the system, and/or the like, unless part of an explanation, definition (e.g. here), stated otherwise, and/or the like. In various non-limiting embodiments, what is "ascertained" may be relative to a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are also embodiments, systems, methods, scenarios, incidents, examples, instances, and/or the like, with the term "discerned," as in the phrases: "discerned to be," "discerned for," "discerned as," "discerned to have," "discerned," and/or the like, where generally "discerned" shall mean "to detect, recognize, and/or identify," and generally implies "to detect, recognize, and/or identify" by the system; continuing, an embodiment of a sub-system of the system, method, step, module, engine or the like associated, connected to, and/or controlled by the system; additionally, a particular sub-system, method, step, module, engine or the like associated, connected to, and/or controlled by the system, and/or the like. In most embodiments, what is "discerned" may be relative to what is discerned by the system, but In various non-limiting embodiments it could include or be discerned by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are also embodiments, systems, methods, scenarios, incidents, examples, instances, and/or the like, with the term "perceived," as in the phrases: "relatively perceived," "relatively perceived to be," "relatively perceived for," "relatively perceived as," "relatively perceived to have," "perceived relative," "perceived relatively," "perceived as relative," "perceived to relatively," "perceived as relatively," and/or the like, where generally "perceived" shall mean "to attain awareness and/or understanding" and generally "relatively" shall mean "in relation, comparison, and/or proportion to something else," and generally implies "to attain an awareness and/or understanding to something in relation, comparison, and/or proportion to something else." Typically, these phrases (e.g. relatively perceived) reference a "relatively perceived result and/or data" by the system; continuing, an embodiment of a sub-system of the system, method, step, module, engine or the like associated, connected to, and/or controlled by the system; additionally, a particular sub-system, method, step, module, engine or the like associated, connected to, and/or controlled by the system, and/or the like. In various non-limiting embodiments, what is "relatively perceived" may be relative to the system's perception and/or a particular method's perception(s), but In various non-limiting embodiments, "perceptions" may include or be as "relatively perceived" by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like, of these.

In various non-limiting embodiments, the disclosed system preferably attempts to apprehend, interrogate, obtain, receive, collect, track, monitor, meter, analyze, verify, validate, produce, generate, score, rank, display, distribute, and/or the like, data that are, say the most reliable. In various non-limiting embodiments, the disclosed system may attempt to ascertain whether a particular data, a particular data point and/or the like, are/is "known to be," "discerned to be" and/or "relatively perceived to be," say either accurate, reliable, current, appropriate, suitable/acceptable/proper structure/schema, suitable/acceptable/proper format, suitable/acceptable/proper programming language, suitable/acceptable/proper syntax, suitable/acceptable/proper classification, suitable/acceptable/proper indexing, suitable/acceptable/proper mapping, suitable/acceptable/proper perspective, suitable/acceptable/proper semantics, suitable/acceptable/proper triple/statement, suitable/acceptable/proper IP-Triple/Statement, suitable/acceptable/proper protocol, suitable/acceptable/proper header, suitable/acceptable/proper sequence, error-free, bug-free, virus-free, suitable/acceptable/proper secure, suitable/acceptable/proper private, suitable/acceptable/proper validation, suitable/acceptable/proper verification, within-a-particular fitness/criteria, within-a-particular threshold, within-a-particular range, of a particular value, within-a-particular-terms-of-use, within-a-particular-terms-of-participation, and/or the like. In various non-limiting embodiments, the disclosed system would preferably ascertain whether each particular data, data sets, data points, metadata and any relationship between or among these data, and/or the like, are/is "known to be," say, for example, accurate. For example, a person's date of birth (DOB) could be received as "known to be accurate" and/or ascertained by the IPACE system to be "accurate," but perhaps also "known to be" not delivered in "proper syntax."

In various non-limiting embodiments, the disclosed system would preferably ascertain whether code, data, values, information, semantic relationships, RDF triple assignments, RDF statements, knowledge and/or the like assignments for each particular data, data set, data point, metadata, and any relationship between or among these data, and/or the like, are/is "known to be," say, for example, accurate. For example, a specific user's/member's country of citizenship could be received as "known to be accurate" and/or ascertained by the IPACE system to be "accurate," but perhaps also "known to create" questions in other existing data, relationships, and/or the like. For instance, the "ascertained" value for citizenship could be for the country of Canada, where there was an earlier assumption he/she was a US citizen, where additional analysis (and/or machine generated validations of sources, resources, and/or the like) could correct the error (e.g. in the RDF relationships triple store database), or reveal that the specific user/member actually has dual citizenship for both Canada and the US.

In various non-limiting embodiments, ascertaining what particular data points are "known to be," say reliable, would preferably include ascertaining what is "known" about the particular data in terms of, say a context, meaning, semantics, what is the subject, what its purpose, what is the semantic statement (e.g. per RDF triple rules), what is suitable/acceptable/proper classification, terminology, indexing, subject, verb tense, predicate, triple formation, triple statement, overall content purpose/statement, what is end the goal, what is the value/range of outcomes/output that are suitable/acceptable/proper, and/or the like for the content (e.g. obtain a patent, determine inventorship, determine inventorship overlap, and/or the like.)

In various non-limiting embodiments, ascertaining what particular data points are "known to be," say reliable, would preferably also include ascertaining what is "known" about the particular data in terms of, say the context, what is the subject, what its purpose, what is the semantic statement (e.g. per RDF triple rules), what is suitable/acceptable/proper form/formaUsyntax/semantics/triple/IP-triple/statemenUmapping/classification/Indexing/protocol/language/function per input (e.g. string, numeric, integer, text, character, variable, operator, equation, table, pixel, jpeg, mpeg, way, algorithm, statistic, source code, path, and/or the like) what is the purpose/statement, what is end the goal, what is the value/range of outcomes/output that are suitable/acceptable/proper, and/or the like. In various non-limiting embodiments, ascertaining what particular data points are "known" would preferably include ascertaining what is "known" about the particular data in terms of, say one or more attributes, strings, integers, code, rule, rule, flows, rule flow-groups, timers, calendars, Booleans, Operators, conditional elements, pattern elements, pattern bindings, paths, maps, atlas, graphic, constraints, unifications, expressions, lists, maps, abbreviated combined relation conditions, abbreviated combined relation conditions with patterns, compounds, precedencies, positional arguments, conditional elements, advanced conditional elements, collections, aggregations, permutations, collections, accumulations, multi-patterns, multi-function accumulates, forward/backward chaining, Rete algorithms (its predecessors, derivatives, extensions, and similar), Leap (its predecessors, derivatives, extensions, and similar), inline custom code, and the like, and where a rule's consequences may modify a rule and/or data.

In various non-limiting embodiments, ascertaining what particular data points are "known to be," say reliable, would preferably include ascertaining what is "known" about the particular data in terms of, say where the particular data came from, sourced produced, where was each element, data point, relationship, analysis, score, rank, validation, verification, location, database, company, country, entity, processor, processes, and/or the like, along the path from birth until now, and/or the like. In various non-limiting embodiments, ascertaining what particular metadata, data, data sets, data points, metadata and any relationship between or among these data are "known to be," say reliable, would preferably include ascertaining what is "known" about the particular data in terms of, say how the particular data was generated, discovered, sourced, resourced, produced, performed, calculated, generated, discerned, validated, verified, what systems/methods/steps/conditions/rules/logic were/are associated, and/or the like.

In various non-limiting embodiments, ascertaining what particular data points are "known to be," say reliable, would preferably include ascertaining what is "known" about the particular data in terms of, say when the particular data was generated, discovered, sourced, resourced, produced, performed, calculated, when systems/methods/steps/conditions/rules/logic were/are associated, and/or the like. In various non-limiting embodiments, ascertaining when the particular data was generated, discovered, sourced, resourced, produced, performed, calculated, when systems/methods/steps/conditions/rules/logic were/are associated, and/or the like, may include metadata, data, data sets, data points, metadata and any relationship between or among these data, as to when each correlation was made/attached, along with who produced, sent, analyzed, verified, apprehended, interrogated, obtained, received, collected, tracked, monitored, metered, analyzed, verified, validated, produced, generated, scored, ranked, displayed, distributed, and/or the like, including data relationships, associated, correlations, meta-data, and/or the like.

In various non-limiting embodiments, the disclosed system would preferably include any errors/failures "known" now, previously, anticipated, projected, predicted, disclosed, and/or the like; who is "known" to have caused the error/failure, when, how, why, attempted remedies/revisions Known to have also failed, remedies/revisions Known to suitably/acceptably/properly resolve/correct and/or the like, an error, and/or the like.

In various non-limiting embodiments, the "known" above could be similarly performed for "discerned" where appropriate and where the disclosed system discerns data, values, sets, points, steps, results, relationships, and/or the like from the available data, values, sets, points, steps, results, relationships, and/or the like In various non-limiting embodiments, the "known" data is preferred to "discerned" data. In various non-limiting embodiments, the "known" data is preferred, compared, associated, correlated, and/or the like, to the "discerned" data, where the "discerning" by the IPACE system may include "known" data and/or not. In various non-limiting embodiments, the IPACE system would preferably "discern" each metadata, data, value, set, point, step, result, relationship, and/or the like, for say, reliability, prior to attempting to discern, say the accuracy and/or the like, of the particular data or data point, and/or vice versa. In various non-limiting embodiments, there may be a "known" certainty, fact, statement, and/or the like, criteria/fitness, where the IPACE system may not perform the discernment.

In various non-limiting embodiments, the "known" and "discerned" above could be similarly performed for "relatively perceived" where appropriate and where the disclosed system relatively perceives data, values, sets, points, steps, results, relationships, and/or the like, from the available metadata, data, values, sets, points, steps, results, relationships, and/or the like. In various non-limiting embodiments, the "known" data is preferred to "discerned" data, and the "discerned" data is preferred to the "relatively perceived" data. In various non-limiting embodiments, the "known" data is preferred, compared, associated, correlated, and/or the like, to the "discerned" data, where the "discerning" by the IPACE system may include "known" data and/or not. In various non-limiting embodiments, the IPACE system would preferably "discern" each metadata, data, value, set, point, step, result, relationship, and/or the like, for say, reliability, prior to attempting to discern, say the accuracy, and/or the like, of the particular data or data point, and/or vice versa. In various non-limiting embodiments, there may be a "known" certainty, fact, statement, and/or the like criteria/fitness, where the IPACE system may not perform the discernment.

In various non-limiting embodiments, the input comprises a value, step, expression, variable, schema, component, number, string, element, data/content, source, and/or the like, for a particular system input, analysis, method, step, and/or the like. In embodiments, examples, and/or instances, where the disclosed system may not be able to interrogate, obtain, receive, collect, track, monitor, meter, analyze, produce, generate, score, rank, display, distribute, and/or the like, the disclosed system would preferably discern a particular metadata, data, data set, data point, value, input, relationship, and/or the like, based on a historical data relationship, correlation, association, and/or the like, where analysis would generate a degree of certainty along a continuum of, say zero certainty to say 99.9999% certainty. In various non-limiting embodiments, the degree of certainty along a continuum could be expressed and/or referred to as the relatively perceived metadata, data, data set, data point, value, input, a perception, and/or the like.

In various non-limiting embodiments, the degree of certainty along a continuum could be expressed and/or referred to as the relatively perceived metadata, data, data set, data point, value, input, a perception, and/or the like. In various non-limiting embodiments, the degree of certainty along a continuum (e.g. the relatively perceived data) would preferably be based upon a set of predetermined rules per a Terms of Use (TOU) and/or a particular Terms of Participation (TOP). In various non-limiting embodiments, the degree of certainty along the continuum could include a plurality of predetermined rules, rules per a Terms of Use (TOU), a particular Terms of Participation (TOP), conditions, contingencies, thresholds, Boolean Operators,] and/or the like.

In various non-limiting embodiments, the IPACE, IPACE-Hub, AIS, ID-ACERS, and/or the like, will perform multiple analysis operations to process sets of data from the IPACE Storage to generate, modify, augment, supplement, compliment, link and/or the like, existing data, data links, data trees, data analysis, metadata, and/or the like, describing the IP-related data and their relationships to other patents.

In various non-limiting embodiments, the IPACE, IPACE-Hub, AIS, ID-ACERS, and/or the like, consists of multiple independent agents that each uses a different algorithm/methodology to interrogate, verify, ascertain, discern, relatively perceive, extract, link, map, graph, subgraph, tag, classify, and/or the like the IP-related data, relationships, and/or the like. In various non-limiting embodiments, the IPACE, IPACE-Hub, AIS, ID-ACERS, and/or the like, will use analytic methods such as; Term clustering, latent semantic indexing, naïve Bayesian, decision trees, decision rules, regression modeling, perceptron method, Rocchio Method, neural networks, example-based methods, support vector machine, classifier committees, boosting, and/or the like In various non-limiting embodiments, the first user input may comprises and/or contains a plurality of inputs from the list of scored criteria/fitness/threshold relatively compared against the scored criteria/fitness/threshold list score comprising a relative metric/continuum, scale, subgraph, graph, map, 3D object, and/or the like, for what is quantifiable, qualifiable, hyperbolic, and/or the like. In various non-limiting embodiments, the inputs (e.g. the first and second input) may comprise and/or contain a plurality of inputs. In various non-limiting embodiments, the lack of a "known" or "know to be" metadata, data, data set, data point, value, and/or the like, the disclosed system generally attempts to discern a value, where a discerned value may include an associated criteria fitness (e.g. range, threshold, and/or the like).

Referenced throughout this specification are also embodiments, systems, methods, scenarios, incidents, examples, instances, and/or the like, with the term "actualized," where generally "actualized" shall mean "to make actual" and generally "actual" shall mean "existing in act and not merely potentially; existing in fact or reality, and/or not false or apparent." Typically the "actualized" term references an "actualized result and/or data" that is generally made/produced and sent to, provided to, interrogated, received at, and/or the like, the system, an embodiment of a sub-system of the system, method, step, module, engine or the like associated, connected to, and/or controlled by the system; a particular sub-system, method, step, module, engine or the like associated, connected to, and/or controlled by the system, and/or the like. In most embodiments, what is "actualized" may include what is "actualized" by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like, of these, but in some embodiments, "actualized" may include or be as "actualized" by the system's production and/or method's processes.

In various non-limiting embodiments, the present application relates to a system for managing and exchanging electronic information, and in particular to a system providing semantic interoperability between similar or related intellectual Property (IP) (e.g. patents, trademarks, etc.) terminology concepts. A plurality of terms and expressions has been established within the domain of IP-related and IP (e.g. patents, trademarks, etc.) Terminologies. For example, there are a variety of similar names a patent disclosure could use to identify a first device (e.g. client, computer, handset, mobile device, PDA, transceiver, and/or the like), where some identifications may mean the same thing as the first device in another disclosure, a similar type of device as the first device, or a sub-class device of the first device. A particular disclosure may express or define the first device as a cellular phone, while another disclosure covering a relatively similar concept may express the first device as a handset. Depending a terminology and methods employed in a prior art search, these two distinctly different expressions for the first device, may or may not discover each other, unless there is a relational mapping of the those expressions relative to a common class, or the first device.

Similar problem occurs in the field of trademarks, where a registration request includes words, phrases, objects, tags, and. pr the like, with multiple meanings, multiple spelling, and/or the like. Further complicated when you consider the spellings, meanings, and/or the like of foreign words that are similar to, say English, English words translated into other languages, or foreign words translated into English for both patents and trademarks. Where some industries, such as the health industry, have developed terminology standards of healthcare and medicinal terminologies. For instance, the IPACE systematized Nomenclature of Medicine (SNOMED) was designed as a comprehensive nomenclature of clinical medicine. This nomenclature has the function of accurately storing and retrieving records of clinical care. It provides a common language enabling a consistent manner of communicating and storing healthcare and medicinal terms. While some standardization of IP-related terminology for patents, for example, is needed to improve prior art searches, there still remains the issue that Intellectual Property, especially patent claims in relatively new fields &/or pioneering technology, inherently is about creating, composing, describing something completely new (e.g. novel, unanticipated, unique) and non-obvious. Some categorization existing for USPTO classifications of technical centers, where the world of prior art, is categorized into Technical Center with sub-class and art units. However, with the ever increasing world of technology, each new revision of the classes becomes outdates, awkward, and sometimes, illogical, or over-weighted in some areas, and relatively thin in aging technology classifications.

Further to the above, huge volumes of IP-related information are divided by disparate technologies, disparate representations, such as format or syntax, disparate semantics and levels of semantic richness. In addition, patentability is measured against the world, not just the US, where each country has its own disparate technologies, disparate representations, formats, syntax, disparate semantics and levels of semantic thoroughness. On the other hand, there is a need for the effective exchange of IP-related information. A significant hurdle in determining the patentability of a particular patent claim is being able to properly evaluate the particular patent claim against the universe of IP, where an inventor, company, university and/or the like, can invest years of time, and thousands, if not millions into developing technology, only to learn that a concept was developed by someone else years earlier. Or perhaps worse, spend the time and resources prosecuting a patent application for, say 5 years, get it granted, and another 3 years trying to monetize it, only to have it invalidated by some newly discovered art that took the 8 years to discover.

Moreover, the inventor, company, university and/or the like may spend months, if not years developing the new concept, technology, drug, product, process, method of manufacturing or the like, before even filing the patent application. Where even a relatively well-preformed prior art search is limited to the data available, where patent applications in the US are not published for eighteen months, if at all. While the USPTO does provide visibility to search granted patents, and some applications, the information systems do not provide for analytic aggregation, semantic relations, overlaying private federations (e.g. entity owned lexicons, thesauruses, concepts,) for real-time feedback, let alone at all. A further aspect is the judicial effects, where changes in prosecution procedures (e.g. the AIA), statues, regulatory issues, court ruling, case law and/or the like, can change the interpretation and meaning of classifications, words, definitions, relationships, and rules, as well as the applications of each.

For instance, a great deal of prior art, patents, publications, and information are currently in formats that are difficult to search, such as PDF files, if not still paper based. However, even when IP-related information is captured in an electronic form, it is often textual or at best in a very basic syntactic format or the same information is represented in many different ways. The work to extract information and transform it in a meaningful way to make it useful for a real-time patentability and inventorship analysis, an ambiguity assessment, let alone on-going budget decisions for current and future research and development is significant.

As mentioned above, some technology and syntactic interoperability have been implemented in complex field such as healthcare using integration engines and horizontal and vertical integration standards. However, there are many competing and overlapping standards and standards organizations when you consider the universe of IP where each country has its own patentability rules, data storage schemas, accessibility limits, languages, and/or the like. The government standards themselves are typically difficult to navigate, let alone access, manage, comprehend, improve, and/or the like. Moreover, there a wide range of architectural and technical quality standards of these separate government databases of intellectual property, where some countries have relatively small budgets to maintain. Thus, in some cases the status quo becomes the goal rather than the fostering innovation through real time information. In addition, patentability extends beyond the prior art stored in government databases to include practically all published material.

The present disclosure overcomes these disadvantages by using semantically robust systems with rigorously defined terminologies coupled with ontological reasoning and inferencing, i.e. using semantic disambiguation. As will be outlined in more detail below, the present disclosure relates to a system to achieve deterministic computable semantics and then deliver interoperability based on them. The information is captured and managed in a truly semantically rich and robust fashion in the first place, yet allows for dynamically emerging and merging ontologies in real-time.

Among many differing viewpoints and understandings of the "Semantic Web," one approach is to view the term as referring to both a set of technologies and a method of transforming selected portions of the current World Wide Web into a web of structured, linked data that can be queried like a database, in contrast with the current web of linked documents that can be queried by text string matching and relevance ranking algorithms. Semantic Web technologies also allow machines to make logical inferences that have not been explicitly stated by human beings (e.g. IPACE AIS subsystem).

In various non-limiting embodiments, an IPACE system for managing and exchanging electronic information provides a plurality of system components and modules. These components and modules include a Rules Engine & Management module for executing conceptual rules, an ontology management module (with a sub-module for a Knowledge Management Module), an information model management component (with sub-modules for a CREATE module, METER module, and ID-ACERS), and a system configuration management component (with a sub-module for Account Management). The ontology management component manages at least one ontology and mappings between members (e.g. IPACE members) of different ontologies or entities, where each of the ontologies include at least one code system and at least one terminology, and where the ontology management component may further manage at least one value set that is a subset of the at least one terminology. The information model management component manages one or more information model schemas. Each of these information model schemas defines an information model and comprises information defining at least one slot within the information model. The IPACE system configuration management component manages configuration information on the configuration of each system component. Further, the IPACE system configuration component utilizes services of the rules management component, information model management component and ontology management component to dynamically bind one or more value sets to one or more of the at least one slot of the information model. Where the binding is relative to time and may evolve over time, but keep a history of previous bindings. Further, where the relationship to time would preferably be tracked and managed by the TIMES module 116. In various non-limiting embodiments, the TIMES module would preferably persistently generate a Temporal component.

In various non-limiting embodiments, the IPACE system comprises a rules repository that is included in the rules management component. The rules repository stores the conceptual rules. The IPACE system also comprises an ontology repository, an information model repository and a metadata registry. The ontology repository (e.g. IPACE storage 184) is included in the ontology management component and stores the at least one value set, the at least one ontology and the mappings between members of different ontologies. Further, the information model repository is included in the information model management component and stores the information models. The metadata registry is included in the IPACE system configuration management component and stores the configuration information.

In various non-limiting embodiments, the mappings between members of different ontologies stored in the ontology repository contain pointers to the members of different ontologies stored in the ontology repository.

In various non-limiting embodiments, the at least one slot within the information model stored in the information model repository includes a pointer pointing to at least one rule stored in the rules repository. This at least one rule includes one or more pointers to value sets stored in the ontology repository to accomplish the dynamically binding of the one or more value sets to the one or more of the at least one slot.

In various non-limiting embodiments, the IPACE system configuration management component comprises a service configured for managing registration and query of information from the metadata registry. In various non-limiting embodiments, the IPACE system configuration management component comprises a service configured for querying the information models, where the querying includes execution of terminology binding operations utilizing services of the rules management component and the ontology management component. According to a further embodiment, the IPACE system configuration management component comprises a service configured for querying configuration information from the metadata registry.

According to yet another embodiment, the rules management component (e.g. a Negotiations Mgmt, IPACE Court, Disambiguation module, AIS & mgmt., separately, collectively, in association with an IPACE member, patent office decision entity, &/or the like) may provide a concept resolution service that resolves differences and ambiguities between different representations of the same underlying concept both within and across terminologies that are stored in the ontology repository. The ontology management component may employ the concept resolution service.

In various non-limiting embodiments, the ontology management component comprises an ontology authoring component (e.g. as a component of the CREATE module) configured for authoring the at least one ontology and the at least one value set to be stored in the ontology repository. In various non-limiting embodiments, the ontology management component comprises a service configured for querying the ontology repository.

In various non-limiting embodiments, the information models stored in the information model management repository comprise data would preferably represent at least one of the group of the model of USPTO patents granted, USPTO patent applications pending, USPTO patents expired, USPTO patent applications abandon, WIPO patent applications pending, WIPO patent applications expired, EPO patents granted, EPO patent applications pending, EPO patents expired, and the same or similar for all other IP granting/participating countries.

In various non-limiting embodiments, the ontology management component is configured for managing a domain of terms representing at least one of the group of Systematized Nomenclature of Intellectual Property, USPTO-specific, terminology, the Webster Dictionary, a lexicon of PTAB terminology decisions per art unit, and an organization specific terminology.

In various non-limiting embodiments, a service employed by the ontology management component is a IP (e.g. patents, trademarks, etc.) product management service creating and maintaining identification information identifying terminologies associated with a IP (e.g. patents, trademarks, etc.) product. In accordance with another embodiment of the present disclosure, the IP (e.g. patents, trademarks, etc.) product management service may further map between IP (e.g. patents, trademarks, etc.) product terms and particular terms stored as members of the at least one ontology. According to another embodiment of the present disclosure the IPACE system may further comprise a reasoning engine (e.g. as a subsystem of the AIS) configured for reasoning across the at least one ontology to draw inferences.

In various non-limiting embodiments, the IPACE system for managing and exchanging electronic information (e.g. IPACE system and subsystems (e.g. via AIS, ID-ACERS, Knowledge Base Mgmt., CREATE, METER, Segmentation Engine, Semantics Engine, TIMES, FINANCIALS, etc.), provides a rules management component, a terminology management component and an information model management component. The rules management component may execute conceptual rules, while the terminology management component maps between different terminologies. The information model management component binds to the terminology management component and the rules management component. It may further be configured for storing value sets including electronic information comprising particular terms. Each of the three above mentioned components employs a plurality of services collaborating with each other as users and/or IPACE members of their respective functionality. The terminology management component further utilizes services of the information model management component to map between different terminologies of the stored information value sets.

In various non-limiting embodiments, the rules management component, terminology management component and information model management component include a rules repository, terminology repository and information model repository, respectively. As an example of the present disclosure, the terminology repository stores mapping value sets, which are pointers to the information value sets stored in the information model repository. In various non-limiting embodiments, the stored terminology repository mapping value sets, which are pointers to the information value sets stored in the information model repository, include the list of segmented terms which are incorporated herein and described with a Segmentation Engine 112.

In accordance with another embodiment of the present disclosure, the mapping value sets stored in the terminology repository may include a tuple of pointers, one pointing to an information value of the information value sets stored in the information model repository and one pointing to an information value stored in the rules repository. Thus, mapping between the information model repository and the rules repository is accomplished.

According to a further embodiment, a concept resolution service may be employed by the rules management component to identify relationships between concepts and/or terminologies associated with at least one concept. Further, a conceptual rule may define at least one concept of terminologies representing a domain of terms. Such domain of terms may represent, for example, the above mentioned USPTO-specific terminology, the Webster Dictionary, the lexicon of PTAB terminology decisions per art unit, and an organization specific terminology, or a terminology being specific to an organization, government, entity, university, company, user, IPACE user, project, TOU/TOP, and/or the like.

In various non-limiting embodiments, a set of Ontology rules could be applied to a specifically-identified entity, specifically-identified IPACE member, specifically-identified TOP, specifically-identified project, specifically-identified condition, specifically-identified relationship, specifically-identified class, and/or the like. In various non-limiting embodiments, the set of Ontology rules applied to the specifically-identified entity and/or the like could be applied by the entity and/or according to the IPACE system. Further, the application of the set of Ontology rules could be prompted by or relative to an event by the IPACE system automatically, systematically, continuously, persistently, conditionally, and/or via/per an actor/user-prompt offered by a subsystem (e.g. via AIS, ID-ACERS, Knowledge Base Mgmt., CREATE, METER, TIMES, FINANCIALS, etc.).

In various non-limiting embodiments, a set of Ontology rules can be referred to as a Federation, where the Federation can be applied to a specifically-identified entity and/or the like. In various non-limiting embodiments, an Entity Federation refers to an entire set of Ontology rules applied to the specific entity. Federations and Entity Federations can be merged, isolated, relatively compared, evolve, regenerate, revert, foster dependency, and/or the like.

Further, comparisons could prompt an event, search, discovery, extraction, verification process, challenge, budget, enforcement, restriction, possession, removal, addition, modification, enforcement, source addition/removal, definition change, statement change, triple change, slot change, assignment change, and/or the like to a rule, set of rules, Federation, Entity Federation, some combination, permutation, &/or the like. In various non-limiting embodiments, the generation of the new rule, set of rules, Federation, Entity Federation could be applied in real-time, temporarily, permanently, conditionally, retroactively, asynchronously, in-parallel, in-series, and/or the like relative to another condition, rule, prompt, event, and/or the like. Further, each could be applied independently to or by the specific element, rule, set of rules, federation, entity federation, entity &/or a specific IPACE member.

A further aspect of the present disclosure employs an IP (e.g. patents, trademarks, etc.) product management service which creates and maintains identification information identifying terminologies associated with an IP (e.g. patents, trademarks, etc.) product. Further, the IP (e.g. patents, trademarks, etc.) product management service may map between IP (e.g. patents, trademarks, etc.) product terms and the particular terms stored as value sets in the information model management component. In various non-limiting embodiments, the IPACE crawls/spiders the World Wide Web for published materials, products, services, innovations, inventors, concepts, articles, technology, terminology, and/or the like. In various non-limiting embodiments, the data stored in the information model management component may represent a preselected model.

In various non-limiting embodiments, the terminology management component may register for events of one or both of the other two components. Each event may be triggered by a service of the respective other component.

In a further aspect of the present disclosure, a rules repository provides for storage of conceptual rules. These conceptual rules may, for example, reflect differences in the ontologies, hierarchies and structure of terminologies according to a particular standard. In various non-limiting embodiments, the IPACE may set a default ontology and/or over-ride ontology, globally, temporarily, conditionally, and/or the like, where a particular event may prompt a particular ontology (say a new court ruling). For example, where the new court ruling updates a particular rule correctly in the IPACE system and prevents ambiguous use and coding of concepts using different terminologies. Further, where the update can alert parties relatively affected by the rule change, say negatively or positive due to pending applications, prosecution, appeals, litigation, and/or the like. In some embodiments the IPACE could provide hypothetical rules, where users, entities, and/or IPACE members could insert assumptions, and/or prediction to compare the perceived patentability profile, value, ROI, and/or the like of particular application, claim, project, inventor, budget, and/or the like.

In various non-limiting embodiments, a terminology repository stores mapping value sets. For instance, such a mapping value set may include pointers to information value sets and/or pointers to the rules repository to accomplish a mapping between the information value sets and the rules repository.

In various non-limiting embodiments, a semantic "wiki" may be introduced to the system. Such a "wiki" may be a dictionary that can be adapted, supplemented and modified by any user of the system. Further, the "wiki" may articulate and represent the meaning of particular items. It also allows discovering concepts in existing standard sources and facilitates computational activities that depend on coded information. Additional advantages of a "wild" are the reduction of ambiguity (e.g. claim, patent claim, priority claim, provisional rights claim, etc.). Thus, a "wiki" could incorporate by for organizations which desire interoperability and will support enterprise class service oriented architectures. Further, in accordance with an embodiment of the disclosure, the above described system and data structures can be used for a research data definition process that may be developed using a semantic wild as introduced above. This research data definition process can therefore be enhanced with domain content and additional tooling (for example by Tolven or OntoReason in the Medical arena). It also enables enterprise validation. A further capability of the IPACE system of the present disclosure lies in the transformation of definitions into XIVIL representations using constrained templates (Templated Reference Information Models—TRIMs). In various non-limiting embodiments, the present disclosure would preferably be available for implementation in any platform and be completely vendor neutral.

Innovation drives progress, but may be hampered by an improper application and/or blend of motivation, skills, creativity, and experience. Beyond the resources available, many additional factors may affect the incentives, efforts, and skills brought to bear. Ideally, innovation is further fostered with the proper processes and tools to effectively manage, track, research, design, build, and test. Then, when and where appropriate, eventually made/built, sold, used, integrated, deployed, exported, and/or commercialized.

An individual person/individual rarely has the all the time, resources, and skills necessary to very rapidly innovate the best invention possible. Ideally, this person/individual could call on other people/resources/systems/methods to not only efficiently, succinctly, and promptly collaborate with, but, in some cases, where the other people/resources/systems/methods fill in the gaps and/or improve the innovation/invention.

Many inventors are independent or independent contractors. Some are shareholders or employees of a small company with fewer resources than, say, larger corporations. Consequently, another issue for many inventors is the fear of retaining a law firm, because he/she lacks the experience to gauge what is needed, when; and law firms that rarely have the time necessary to educate inventors on all the details. In addition, inventors fear seeking out other preparation participants, such as someone to help draft the application, as draftsperson, prior art search bureaus, and/or patent agents for claim drafting, because it may mean having to share their concept with far too many strangers without knowing upfront their availability, value, and/or expertise to contribute.

In addition, many great ideas never see the light of day and/or stall out while in development due to such things as missing skills, missing components, missing talent, lack of funding, and/or fear. Fear that could come from the original idea creator who fears that sharing his/her idea with others will cause him/her to lose control of the development process and/or direction taken; fear that he/she will not receive appropriate credit; and/or fear that his/her idea will be partially or completely stolen and perhaps without his/her knowledge.

Consequently, countless ideas that may greatly benefit from the collaboration of others remain secrets in many people's heads and/or worse, become forgotten. On the other hand, the world is filled with business stories of so-called co-creators, contractors, and/or employees who felt unmotivated due to the minimal reward offered for participating, contributing, and/or improving an idea. Thus these co-creators, contractors, and/or employees may also have limited motivation to improve his/her own skills, resulting in not only further limiting the realized product/service, but society overall.

Patent protection may be a key component for protecting these costly efforts. However patent filings may also suffer from many challenges, issues and inefficiencies. For one, it may take several years to take a concept to an issued patent, and then more time/years to any actual monetization. In addition, this process is dependent on many factors and often involves many participants, whose goals are rarely, if ever, completely aligned.

While patents may create protection, especially for a single inventor, they may also create problems when there is more than one inventor. For example, what percentage of ownership should each inventor take from an invention, where an Inventor A contributed eighty percent of the work, while the other, Inventor B, only contributed twenty percent –80% for Inventor A, 20% for Inventor B? But what if the 20% contributed by Inventor B becomes the only IP of value and/or is the only IP granted?

Consequently, sometimes the more skills and expertise brought to a collaboration project, the more complicated the process and/or rewards and the less incented the participants may become. And this equation not only becomes far more complicated with more inventors, but when other non-inventors also start to contribute, such as researchers, paralegals, draftspersons, patent attorneys, patent agents, translators, editors, designers, proof-readers, and the like, where terms of participation were either not established initially, skipped, avoided, and/or were ambiguous or confusing.

In addition, most patent professionals, such as registered patent attorneys and patent agents earn compensation based on hours billed to a client and/or revenues generated by a firm, and their fees are rarely based on a measure of success or completed milestones and/or the overall successfulness of a particular patent filing.

Inventors, on the other hand, fall into many different groups. For instance, one group is for those inventors who retain a high percentage, if not all, the ownership of the eventually issued patent. These inventors are typically incented to invest a relatively significant amount of their time on the patent process to try to best prepare, file, and prosecute the patent application.

Another inventor group is those who typically assign most, if not all, of their patent rights to another entity, such as a corporation. Such an assignment agreement is often required for many, if not all, of the engineers (and potential inventors) at an entity, such as a corporation, think tank, and/or university. Depending on the terms of such an agreement, this assignment of the patent's future value and future upside/return may hamper an Inventor's 70 incentive to work diligently to prepare, file, and prosecute a patent application to the fullest benefit of all the parties involved, as say he/she would had he/she retained ownership of all the future rights/benefits. While the compensation and benefits for an Inventor's 70 efforts may vary depending on the Inventor's 70 expertise, maturity of the company, and/or products produced; it may remain difficult if not impossible to quantify a justifiable reward based upon a confusing set of parameters that may or may not be delineated, let alone tracked, for an event that may or may not take place in the distant future.

In addition, not all patents are created for the same purposes and/or the initial purpose may mutate or evolve. For example, some inventors and/or some companies to whom it is assigned, they may aim to increase product/service revenues by developing defensive patents and/or seeking to take offensive measures such as licensing deals, and/or seeking litigation damages from patent infringers, only to have those plans become mutated and/or completely reversed by other circumstances.

Consequently, intellectual property development, preparation, prosecution, monetization and protection, collectively, often go well beyond the skills of the original inventor(s). A number of methods have been adopted by large corporations to shift as much of these components off the original inventor, but there may also be some downsides. For instance, many such corporations try to shift as much of the patent preparation and prosecution as possible off to say the engineer(s) who was the inventor(s) over to others, such as, say dedicated engineers for patent preparation, in-house attorneys, and/or outside consultants.

Consequently, this current method and system of shifting work responsibilities and the like may cause delays or the eventual patent to lack from, say limited expertise and/or inventor participation and/or suffer from reduced incentives back to the original inventor(s) who had signed assignment agreements and may have been asked to move on to other projects. In addition, this may cause inventions to lose IP rights to other inventions that were either conceived, "reduced to practice," filed, and/or published sooner and/or better.

Another method adopted by some corporations who employ assignment agreements is to provide additional incentives to inventors for filings, such as bonuses, and/or additional compensation. These incentives may improve incentives, but the patent preparation and prosecution may still suffer from reduced inventor participation and reduced overall return of time invested when relatively compared to an independent inventor(s). Consequently, some engineers have been known to even quit their jobs to hopefully free him or her from an assignment agreement, before later developing a concept, then preparing and filing for a patent/application/innovation independently.

Consequently, under these scenarios, neither the patent attorney nor the Inventor gets to prepare the ideal patent application. Furthermore, even the best patent attorney or law firm has its limitations of either time and/or resources. Thus, the need for a system that lets multiple members participate in their specialized areas of expertise and within their own time schedules of availability and agreed upon fees, rates, and/or equity participation.

Taking an inventor's concepts to an invention not only requires that the inventor be able to clearly define all the necessary components and interactions of those components within the invention for someone skilled in the art to rebuild/make/use, but also an explanation as to why the invention is novel and non-obvious in the face of the known prior art. In addition, the Inventor needs to prepare a written description with drawings that articulate the invention sufficiently enough so that a person of ordinary skill in the art could practice the invention without undue or unreasonable experimentation. Consequently, it is rare for the inventor to possess all these skills, and the sufficient time and resources necessary to draft the patent application in a timely manner, especially if inexperienced.

Consequently, inventors may need to employ others to perform such tasks as searching for prior art, drafting and/or perfecting the written description, creating the necessary drawings/Figures (e.g. flowcharts, block diagrams, user-interface examples, product renderings, circuitry, etc.), and perfecting the claims to avoid some delays. Not to mention possibly having to submit translated copies in/for other countries, and finding someone knowledgeable of the rules, laws, and procedures for those other countries or organizations (e.g. PCT/WIPO, EPC/EPO, EAPO, GCC, etc.).

These patent-preparation tasks are typically done by a number of people with prior experience and some tasks may or may not require a PTO-registered patent attorney or patent agent. For example, the prior art search may be done by a junior attorney, paralegal, or outside IP search firm. The drawings/figures may be done by an in-house engineer at a patent law firm or a consultant hired from outside the firm/corporation, as needed.

All of these participants in the patent application and prosecution process may have skills that are naturally better suited for certain types of work, inventions, claims, diagrams, and/or countries than others. Even the best engineer for drawing certain types of mechanical drawings may not be best suited for drawings for other types of circuitry diagrams or flow charts. Consequently, patent applications may get held up even in a retained top IP law firm, while people within the law firm spend the time necessary either to train someone else within the firm; until someone with the necessary skills may be located and vetted from outside the firm; or worse, the application gets pushed forward and is filed with poorly prepared diagrams/figures/drawings, and/or missing materials/components all together.

This time spent trying to locate those with the necessary skills to properly and/or best prepare the application may cause patent applications to take relatively far longer to draft than if the inventor had direct access to, say, a large pool of a variety of available talent and resources. Claiming the rights to an invention may become as much about speed as it does about clever/novel innovations, expertise, and/or quality. Every day that a patent application waits for an additional component, review, correction, and/or improvement before it gets filed, further increases the risk that someone else will obtain patent protective rights to the same or similar invention. It is possible that an application with potentially superior talent, innovation, and claims ends up conceding valuable territory and/or claims to prior art and/or an application that may be inferior, but was simply filed sooner.

For all of these reasons, several inventions fail to even become patents, let alone patent applications, meaning that the vision of patent system promoting innovation and bettering society is being lost for thousands of inventions and inventors due to dozens of process challenges, preparation/prosecution issues, and inefficiencies.

What's needed is a way for inventors, original idea conceivers, and creators (hereinafter the "Inventor") to participate in a confidential network of people who already have a wide range of expertise that may be able to help the Inventor, in a relatively timely manner, develop a product, service, work-product, hobby, craft, idea, concept, and/or file his/her patent, copyright, trademark application and/or the like, while limiting exposures and/or minimizing the risks to the Inventor and his/her invention.

In one embodiment, an Inventor would preferably log onto an "Intellectual Property, Assignment, Collaboration and Exchange" system (hereinafter "IPACE" or "IPACE system") 105 (e.g. via an application or Internet browser with a website and URL), register as a new user, agree to the terms of use (sometimes referred to as the "TOU") and the privacy policies, and may also become an IPACE member. In various non-limiting embodiments, the member may then submit as much or as little detail as he/she feels is necessary to attract participants to his/her project, such as preparing a patent application.

In various non-limiting embodiments, the member seeking participants also create a Terms Of Participation (or sometimes referred to as the "TOP Terms" or "TOP"), which may require a plurality of conditions, qualifications, requirements, and/or the like that may also require an acknowledgment and/or an acceptance before a particular Participant 80 may participate. For example, projects involving legal matters, bargains for exchange, and the like would typically require a particular Participant's 80 pre-acceptance before participating.

In various non-limiting embodiments, the TOP may include definitions and delineations for such terms as to what constitutes and what delineates and/or creates "public information" (e.g. generally means information that is publically accessible or well known in the general public) from "confidential information" (e.g. generally means specific information with an anticipation of protection against unrestricted disclosure to others by the participant), and confidential information from "proprietary information" (e.g. generally means specific information with an anticipation of protection against unrestricted disclosure to others by the participant, and where the specific information owner/creator has a reasonable perception that the information is novel and non-obvious), and proprietary information from "proprietary materials" (e.g. generally means specific materials, in every form and media, with an anticipation of protection against unrestricted disclosure to others by the participant, and where the specific material owner/creator has a reasonable perception that the materials are novel and non-obvious). Depending on a particular person's participation, he/she may have a variety of different TOPs and/or different TOPs at different stages of a particular project, where each new or modified term in the TOP would generally require each relevant Participant's (80) acceptance.

Referenced throughout this specification are also embodiments, systems, methods, and/or the like, for artificial intelligence (AI) via the (AIS 195). Implementing, determining, and providing an artificial intelligent system (operational via a computer processor) and (computer-processor-based) method is described in U.S. Pat. No. 8,229,944, Latzina, et al, (which is hereby specifically incorporated herein by reference in its entirety for all purposes) which can be implemented in the present disclosure.

Implementing, determining, and providing a source reliability/trust-level system (operational via a computer processor) and (computer-processor-based) method for data/content is described in U.S. Pat. No. 7,886,334 B1, Walsh, et al, (which is hereby specifically incorporated herein by reference in its entirety for all purposes) which can be implemented in the present disclosure.

Implementing, determining, and providing a patentability assessment/evaluation system (operational via a computer processor) and (computer-processor-based) method is described in U.S. Pat. No. 7,346,518 B1, Frank, et al (which is hereby specifically incorporated herein by reference in its entirety for all purposes) which can be implemented in the present disclosure.

Implementing and replicating data in non-relational databases (e.g. USPTO, EPO, WIPO, JPO, entities, actors, and/or the like) system (operational via a computer processor) and (computer-processor-based) method is described in U.S. Pat. Application No. 20070208719 A1, Tran, (which is hereby specifically incorporated herein by reference in its entirety for all purposes) which can be implemented in the present disclosure.

Implementing, determining, and providing a scoring, scoring system, ranking, and/or the like, system (operational via a computer processor) and (computer-processor-based) method is described in U.S. Pat. No. 7,308,413 B1, Tota, et al, (which is hereby specifically incorporated herein by reference in its entirety for all purposes) which can be implemented in the present disclosure.

Implementing, determining, and providing an ownership, ownership relationship, value and/or the like, system (operational via a computer processor) and (computer-processor-based) method is described in U.S. Pat. No. 8,386,999 B2, Skriletz, (which is hereby specifically incorporated herein by reference in its entirety for all purposes) which can be implemented in the present disclosure.

Implementing, determining, and providing an electronic document/content/email parsing system (operational via a computer processor) and (computer-processor-based) method is described in U.S. Pat. No. 7,308,413 B1, Tota, et al, (which is hereby specifically incorporated herein by reference in its entirety for all purposes) which can be implemented in the present disclosure.

Implementing, determining, and providing an electronic document (and similar) online filing system (operational via a computer processor) and (computer-processor-based) method is described in U.S. Pat. No. 7,798,417 B2, Snyder, et al, (which is hereby specifically incorporated herein by reference in its entirety for all purposes) which can be implemented in the present disclosure.

Implementing, determining, and providing a RDF/XML data interpretation and exchange system (operational via a computer processor) and (computer-processor-based) method is described in U.S. Pat. No. 7,798,417 B2, Snyder, et al, (which is hereby specifically incorporated herein by reference in its entirety for all purposes) which can be implemented in the present disclosure.

Implementing, determining, and providing a data/content/information tagging and correlation system (operational via a computer processor) and (computer-processor-based) method is described in U.S. Pat. No. 7,798,417 B2, Snyder, et al, (which is hereby specifically incorporated herein by reference in its entirety for all purposes) which can be implemented in the present disclosure.

Implementing, determining, and providing an assessment/evaluation of who, what where, when, and/or how (5 W's) system (operational via a computer processor) and (computer-processor-based) method is described in U.S. Pat. No. 8,095,529 B2, Diamond, et al, (which is hereby specifically incorporated herein by reference in its entirety for all purposes) which can be implemented in the present disclosure.

Implementing, determining, and providing data, source, resource, support, and/or the like authentication system (operational via a computer processor) and (computer-processor-based) method is described in U.S. Pat. No. 8,145,639 B2, Williams, (which is hereby specifically incorporated herein by reference in its entirety for all purposes) which can be implemented in the present disclosure.

Implementing, determining, and providing a relative bias among parties, actors, users, and/or the like, system (operational via a computer processor) and (computer-processor-based) method is described in U.S. Pat. No. 8,145,639 B2, Williams, (which is hereby specifically incorporated herein by reference in its entirety for all purposes) which can be implemented in the present disclosure.

Implementing, determining, and providing a relative input (e.g. scale, slider, map, continuum, grid, value, and/or the like) system (operational via a computer processor) and (computer-processor-based) method is described in U.S. Pat. No. 8,145,639 B2, Williams, (which is hereby specifically incorporated herein by reference in its entirety for all purposes) which can be implemented in the present disclosure.

Implementing, determining, and providing an OWL-2 data exchange, parsing, analysis, semantics, and relational environment, system (operational via a computer processor) and (computer-processor-based) method is described in U.S. Pat. No. 7,606,785, Shirriff (which is hereby specifically incorporated herein by reference in its entirety for all purposes) which can be implemented in the present disclosure.

Implementing, determining, and providing a Portal and doors for the semantic wed and grid system (operational via a computer processor) and (computer-processor-based) method is described in U.S. Pat. No. 7,792,836, Taswell (which is hereby specifically incorporated herein by reference in its entirety for all purposes) which can be implemented in the present disclosure.

Implementing, determining, and providing an electronic document evaluator for spelling checking, real-time spelling monitor, (e.g. spell checker), grammar, punctuation, real-time input monitoring, and/or the like, system (operational via a computer processor) and (computer-processor-based) method is described in U.S. Pat. No. 7,296,019, Chandrasekar et al; (which is hereby specifically incorporated herein by reference in its entirety for all purposes) which can be implemented in the present disclosure.

Implementing, determining, and providing a natural language processing and converting to machine readable code (e.g. speech to text) are described in U.S. Pat. No. 7,143,036, Weise; U.S. Pat. No. 4,947,438 Paeseler; U.S. Pat. No. 6,029,123, Suda (which are hereby incorporated by reference, each its entirety for all purposes) which can be implemented in the present disclosure. Implementing, determining, and providing a natural language processing in a "noisy" environment and converting to machine readable code (e.g. speech to text) is described in U.S. Pat. No. 8,391,614, Yiftach, et al, (which is hereby specifically incorporated herein by reference in its entirety for all purposes) which can be implemented in the present disclosure.

Implementing, determining, and providing a meta-tag system (operational via a computer processor) and (computer-processor-based) method (including relational links, annotations, mapping, evaluation, and/or the like) are described in U.S. Pat. No. 8,380,659 B2; U.S. Pat. No. 8,392,416 B2 Duffield; (which are hereby incorporated by reference, each its entirety for all purposes) which can be implemented in the present disclosure.

Implementing, determining, and providing a data/content I/O tracking and monitoring system (operational via a computer processor) and (computer-processor-based) method are described in U.S. Pat. No. 8,392,962 B2, Grason, et al; U.S. Pat. No. 8,265,976 Fitterer, et al; (which are hereby incorporated by reference, each its entirety for all purposes) which can be implemented in the present disclosure.

Implementing, determining, and providing an agent/bot/spider/web-crawler and/or the like, system (operational via a computer processor) and (computer-processor-based) method are described in U.S. Pat. No. 8,095,529 B2, Diamond, et al; U.S. Pat. No. 8,285,656 Chang, et al; (which are hereby incorporated by reference, each its entirety for all purposes) which can be implemented in the present disclosure.

Implementing, evaluating, assessing, determining, and providing a data/content exchange and collaboration platform and/or the like, system (operational via a computer processor) and (computer-processor-based) method are described in U.S. Pat. No. 7,798,417 B2, Snyder, et al; U.S. Pat. Application No. 2012/0265701 A1, Thomas; (which are hereby incorporated by reference, each its entirety for all purposes) which can be implemented in the present disclosure.

Implementing, providing, and securing a data/content encryption, proprietary/privacy protection, securing, and shielding are described in U.S. Pat. Application No. 2012/0265701 A1, Thomas; U.S. Pat. No. 7,798,417 B2 Snyder, et al; U.S. Pat. No. 8,386,999 B2, Skriletz (which are hereby incorporated by reference, each its entirety for all purposes) which can be implemented in the present disclosure.

Determining and implementing an Optical Character Recognition (OCR) system (operational via a computer processor) and (computer-processor-based) method for recognizing and converting optical characters from, say a scanned, faxed, ingested, and/or the like paper document, and converting the image/optical to a machine readable format, (e.g. text) are described in U.S. Pat. No. 7,308,413 B1, Tota, et al; U.S. Pat. No. 7,798,417 B2 Snyder, et al; U.S. Pat. Application No. 20070208719 A1, Tran (which are hereby incorporated by reference, each its entirety for all purposes) which can be implemented in the present disclosure.

Implementing and providing a content evaluation system (operational via a computer processor) and (computer-processor-based) method are described in U.S. Pat. No. 8,095,529 B2, Diamond, et al; U.S. Pat. No.; U.S. Pat. No. 7,886,334 B1, Walsh, et al; (which are hereby specifically incorporated herein by reference in each its entirety for all purposes) which can be implemented in the present disclosure.

Implementing, determining, and providing a knowledge base management system (operational via a computer processor) and (computer-processor-based) method are described in U.S. Pat. No. 8,145,639 B2, Williams; U.S. Pat. No. 8,229,944 Latzina, et al; U.S. Pat. No. 7,886,334 B1, Walsh, et al; (which are hereby specifically incorporated herein by reference in each its entirety for all purposes) which can be implemented in the present disclosure.

Implementing, determining, and providing a social collaboration system (operational via a computer processor) and (computer-processor-based) method for interacting, collaborating, sharing, communicating, scoring, status-tracking, and/or are described in U.S. Pat. No. 8,392,962 B2, Grason, et al; U.S. Pat. No. 7,308,413 B1, Tota, et al; U.S. Pat. No. 7,886,334 B1, Walsh, et al; (which are hereby specifically incorporated herein by reference in each its entirety for all purposes) which can be implemented in the present disclosure.

Implementing, determining, and providing a collective value/result/score/view/opinion, (e.g. IPACE/ID-ACERS A/D/RP/AS/P collective analysis/values/results, option list collective analysis/values/results), and/or the like from a variety of participants system (operational via a computer processor) and (computer-processor-based) method are described in U.S. Pat. No. 8,135,655 B2, Oaten, et al, U.S. Pat. No. 7,890,539 B2, U.S. Pat. No. 8,145,639 B2, Williams, (which are hereby specifically incorporated herein by reference in each its entirety for all purposes) which can be implemented in the present disclosure.

Implementing, assessing and evaluating, assessing, determining, data for semantics system (operational via a computer processor) and (computer-processor-based) method are described in U.S. Pat. Application No. 20120047149, Zhou, et al; U.S. Pat. No. 7,886,334 B1 Walsh, et al; U.S. Pat. Application No. 20070208719 A1, Tran; U.S. Pat. No. 8,095,529 B2, et al; U.S. Pat. Application No. 20090024385 A1, Hirsch; U.S. Pat. No. 8,392,416 B2 Duffield, et al; U.S. Pat. No. 8,145,639, Williams; U.S. Pat. No. 8,229,944 Latzina et al; (which are hereby specifically incorporated herein by reference in each its entirety for all purposes) which can be implemented in the present disclosure.

Implementing, parsing, analyzing, and evaluating, assessing, determining, data, content, queries, text, inputs, and/or the like, system (operational via a computer processor) and (computer-processor-based) method are described in U.S. Pat. No. 8,095,529 B2, Diamond, et al; U.S. Pat. Application No. 20070208719 A1, Tran; U.S. Pat. Application No. 20090024385 A1, Hirsch; U.S. Pat. No. 8,145,639 Williams; U.S. Pat. No. 20120047149, Zhou, et al; (which are hereby specifically incorporated herein by reference in each its entirety for all purposes) which can be implemented in the present disclosure.

Implementing, determining, and providing an intellectual property value system (operational via a computer processor) and (computer-processor-based) method are described in U.S. Pat. No. 8,145,639, Williams; U.S. Pat. No.; U.S. Pat. Application No. 20070208719 A1, Tran; U.S. Pat. No. 7,346,518 B1, et al; U.S. Pat. Application No. 2012/0265701 A1, Thomas; (which are hereby specifically incorporated herein by reference in each its entirety for all purposes) which can be implemented in the present disclosure.

Figure 2A:
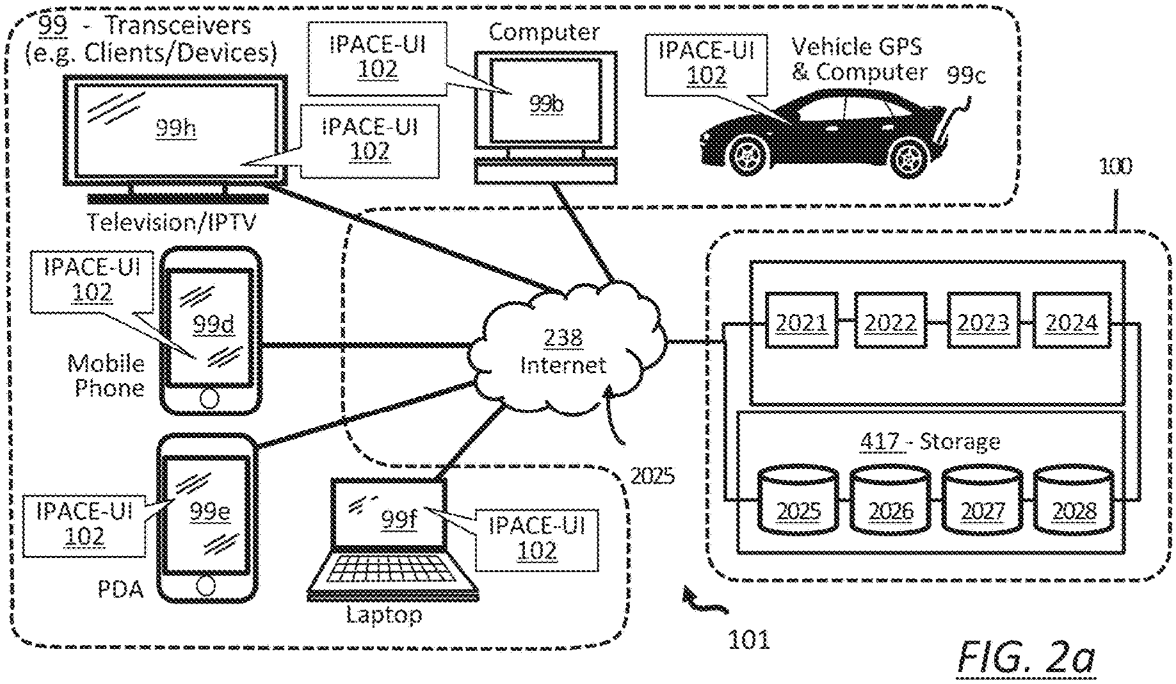
FIG. 2*a* of the accompanying drawings illustrates a general non-limiting embodiment and overview of an "I/O analysis, prompt, collaboration, and evaluation client-server network" in which the system and methods may be implemented, including a variety of components that communicate over a public network 2025, preferably the Internet 238.
Figure 2B:
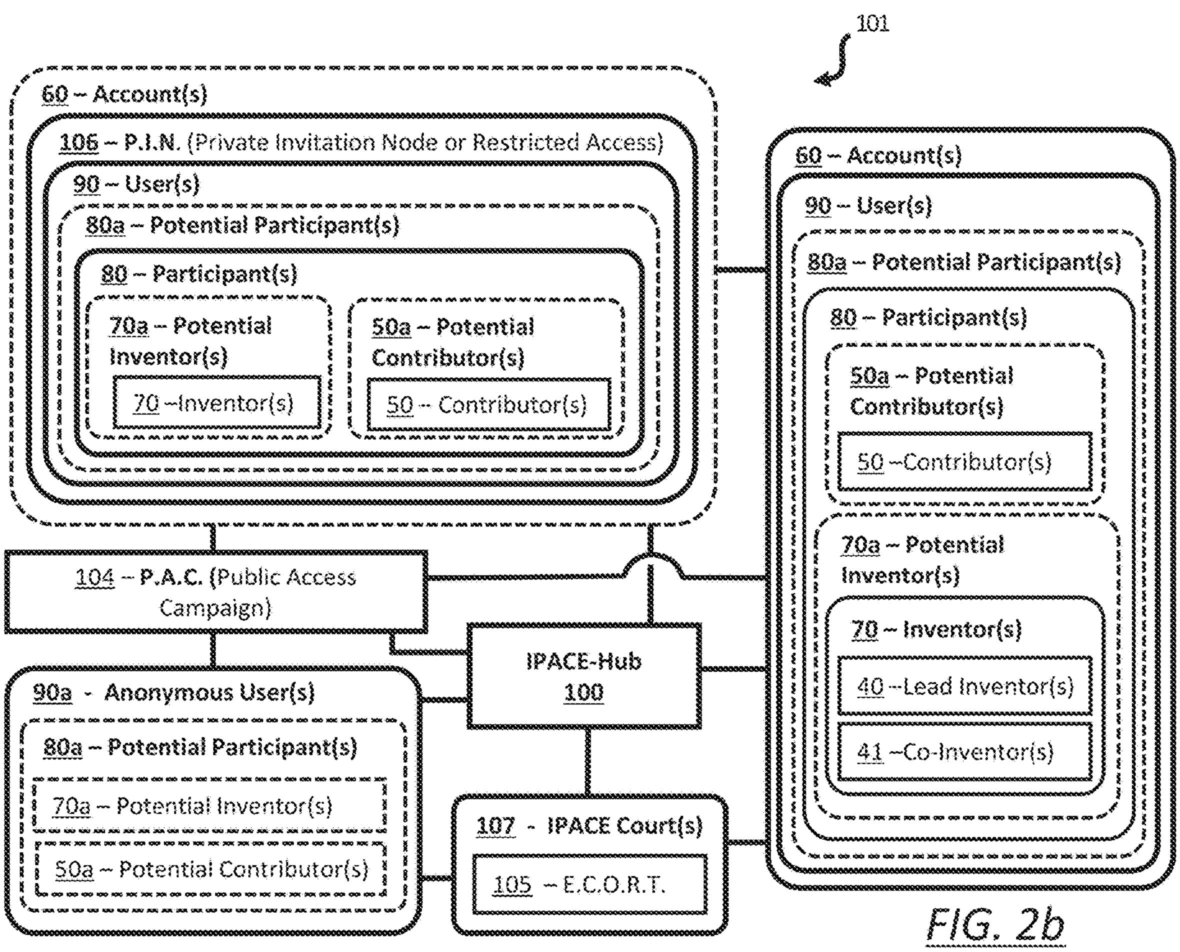
FIG. 2*b* depicts another non-limiting embodiment of the "I/O analysis, prompt, collaboration, and evaluation client-server network" 220, here preferably as an "Intellectual Property, Assessment, Collaboration and Exchange—Exemplary Operating Environment" 101 (hereinafter "I.P.A.C.E.—Operating Environment," "I.P.A.C.E. Operating Environment," sometimes "IPACE-System," sometimes "IPACE," or sometimes "Operating Environment").
Figure 3:
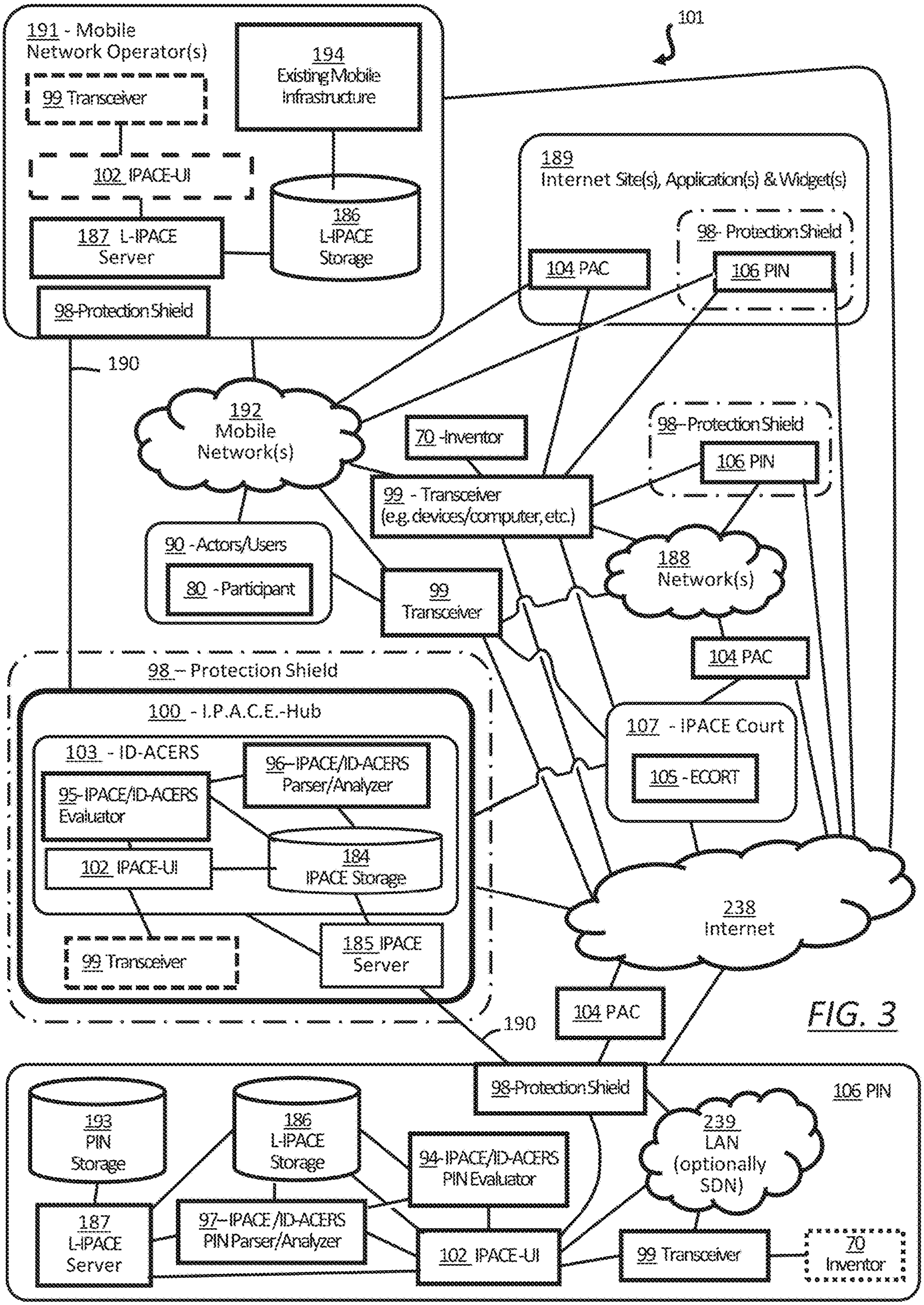
FIG. 3 is a block diagram depicting a non-limiting embodiment of the groupings of sub-systems of the "IPACE Operating Environment" 101 and the communications and/or dialogs among them.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

DETAILED DESCRIPTION OF FIGURES

System Description

Figure 1A:
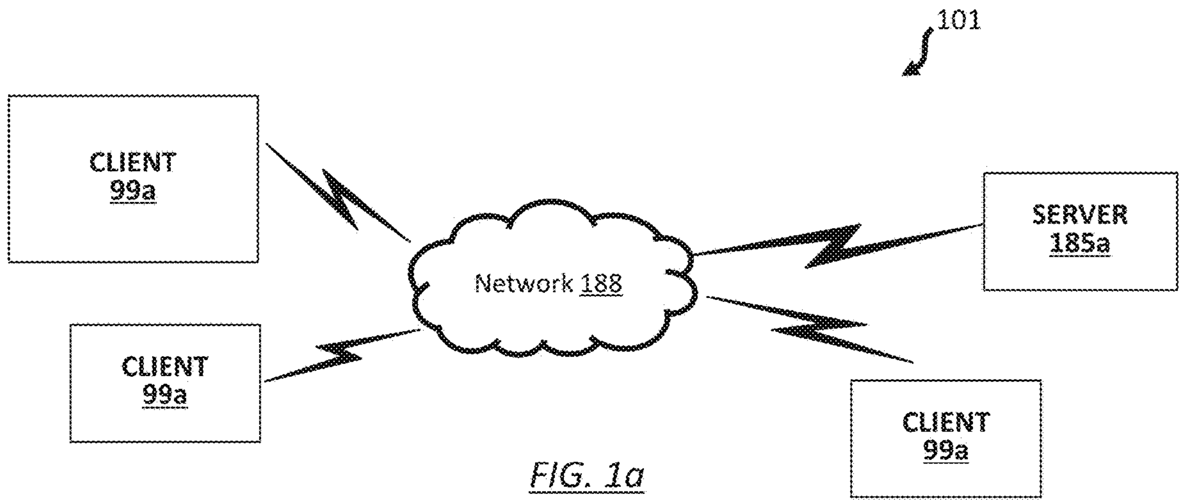
FIG. 1*a* is an exemplary diagram of an Operating Environment 101 in which concepts consistent with the principles of the disclosed system and methods may be implemented.

FIG. 1*a* is an exemplary diagram of an Operating Environment 101 in which concepts consistent with the principles of the disclosed system and methods may be implemented. Operating Environment 101 may include multiple clients 99*a* connected to a server 185*a* via a network 188. Network 188 may include a local area network (LAN), a wide area network (WAN), a telephone network, such as the Public Switched Telephone Network (PSTN), an intranet, the Internet, or a combination of networks. Three clients 99*a* and one server 185*a* have been illustrated as connected to network 188 for simplicity. In practice, there may be more clients and/or servers. Also, in some instances, a client may perform one or more functions of a server and a server may perform one or more functions of a client.

A client 99*a* may include a device such as a wireless telephone, a personal computer, a personal digital assistant (PDA), a laptop, or another type of computation or communication device, a thread or process running on one of these devices, and/or an object executable by one of these devices. Server 185*a* may include a server device that processes, searches, and/or maintains documents and images in a manner consistent with the principles of the invention. Clients 99*a* and server 185*a* may connect to network 188 via wired, wireless, or optical connections.

Server 185*a*, in one implementation, may include a search engine that receives search queries from clients 99*a* and returns links to results relevant to the search queries to clients 99*a*. Server 185*a* may also return advertisements with the search query results. For example, third parties may contract with the operator of server 185*a* to display their advertisements when their advertisements are relevant to a search query.

Exemplary Client/Server Architecture

Figure 1B:
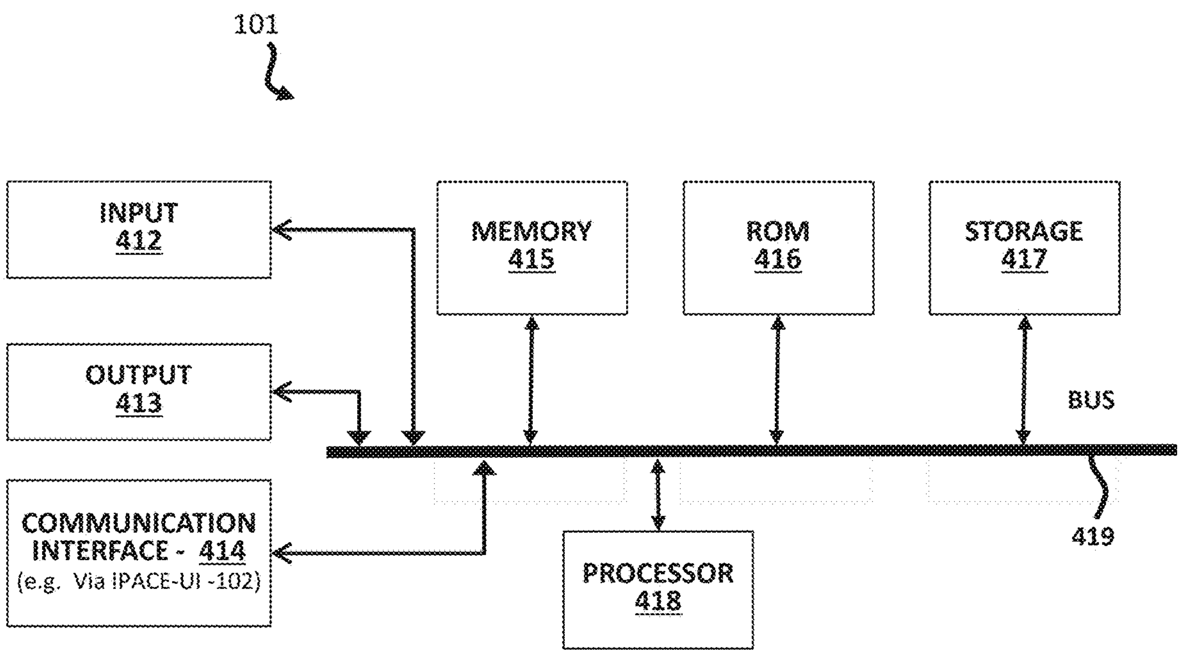
FIG. 1*b* is an exemplary diagram of a client 99*a* or server 185*a*.

FIG. 1*b* is an exemplary diagram of a client 99*a* or server 185*a*. Client/server 99*a*/185*a* may include a bus 419, a processor 418, a main memory 415, a read only memory (ROM) 416, a storage device 417, an input device 412, an output device 413, and a communication interface 414. Bus 419 may include conductors that permit communication among the components of client/server 99*a*/185*a*.

Processor 418 may include conventional processors, microprocessors, or processing logic that interpret and execute instructions. Main memory 415 may include a random access memory (RAM) or another type of dynamic storage device that stores information and instructions for execution by processor 418. ROM 416 may include a conventional ROM device or another type of static storage device that stores static information and instructions for use by processor 418. Storage device 417 may include a magnetic and/or optical recording medium and its corresponding drive.

Input device 412 may include one or more conventional mechanisms that permit a user to input information to client/server 99*a*/185*a*, such as a keyboard, a mouse, a pen, voice recognition and/or biometric mechanisms, etc. Output device 413 may include one or more conventional mechanisms that output information to the user, including a display, a printer, a speaker, etc. Communication interface 414 may include any transceiver-like mechanism that enables client/server 99*a*/185*a* to communicate with other devices and/or systems. For example, communication interface 414 may include mechanisms for communicating with another device or system via a network, such as network 188.

Functions implemented by client/server 99*a*/185*a* may be stored as software instructions in a computer-readable medium, such as memory 415. A computer-readable medium may be defined as one or more physical or logical memory devices and/or carrier waves. The software instructions may be read into memory 415 from another computer-readable medium, such as data storage device 417, or from another device via communication interface 414. The software instructions contained in memory 415 may cause processor 418 to perform processes that will be described later. Alternatively, hardwired circuitry or other logic may be used in place of, or in combination with, software instructions to implement processes consistent with the disclosure. Thus, implementations consistent with the principles of the disclosure are not limited to any specific combination of hardware circuitry and software. Additionally, multiple computing devices may function together to implement the functionality of a single server 185*a*.

FIG. 2*a* of the accompanying drawings illustrates a general embodiment and overview of an "I/O analysis, prompt, collaboration, and evaluation client-server network" in which the IPACE system and methods may be implemented, including a variety of components that communicate over a public network 2025, preferably the Internet 238. The "I/O analysis, prompt, collaboration, and evaluation client-server network" 220 includes a client computer system 99*b* and the IPACE-hub 100. The client computer system 99*b*, in one embodiment, using Uniform Resource Locators (URL), accesses web servers over a local area network (LAN), wireless area network (WAN), a voice over IP (VOIP) network, telephone network, an internet service provider (ISP) and/or the like. Further, The client computer system 99*b*, in various non-limiting embodiments, may include a desktop computer, a personal digital assistant (PDA) 99*e* or mobile phone 99*d*, or, generally, any device (e.g. transceiver 99) that includes a graphical user interface (GUI) 102 and/or a voice response unit (VRU) and may access a network. In various non-limiting embodiments, the client computer system 99*b* typically includes one or more processors, memories and input (e.g. device) 412 and output (devices) 413. Typically the client computer system 99*b* also includes a mouse, touch screen, keyboard, or other technological improvements therein to effectuate a selection or interaction by the user. In various non-limiting embodiments, the terms: device, computer (99*b*), client (49*a*), PDA (99*e*), laptop (990, mobile phone, cellular phone, computer-enabled car (99*c*), GPS, TV/IPTV (99*h*) and/or the like, are interchangeable, with the term transceiver 99).

In various non-limiting embodiments, the IPACE 100 includes one or more IPACE engines 2021 (e.g. IPACE 2021, ID-ACERS 2022, AIS 2023), a computer 2024, including a processing system, one or more data/content servers 2023 and one or more profile servers 2024. Generally, servers may include a central processing unit (CPU) 418, a main memory 415, a read-only memory (ROM) 416, a storage device 417, including Storage Devices 2025, 2026, 2027 and 2028, and a communication interface 414, all coupled together via a bus 419. In various non-limiting embodiments, the IPACE engine 2021, including a program, processes interactions performed by a user, and communicates with the data/content server 2023 or the IPACE server 2024 to create, modify, collaborate, retrieve, display, track, analyze, and store data/content; who created/input/modified the data/content/media/stats and when. The data/content server 2023 stores data/content associated with the IPACE-hub 100, and the IPACE servers 2024 store data/content generated by users, both acting as information providers for the "I/O analysis, prompt, collaboration, and evaluation client-server network" 220, preferably accessed by the computer 2022 when the user interacts with the IPACE engine 2021.

Servers include databases, which may be implemented in a single storage device or in a plurality of storage devices located in a single location or distributed across multiple locations. In various non-limiting embodiments, the databases are accessible to the servers and clients, within the "I/O analysis, prompt, collaboration, and evaluation client-server network" 220. In various non-limiting embodiments, the information stored in the databases may be stored in one or more formats that are applicable to one or more software applications that are used by the clients and servers and/or could incorporate or rely on cloud computing and/or storage.

In various non-limiting embodiments, preferably the data/content is stored on solid state drive (SSD) or sometimes called a solid-state disk or electronic disk, which uses solid-state memory to store persistent data. SSD generally has relatively faster access times and less latency compared to electromechanical hard disk drives (HDDs). Some SSDs utilize NAND-based flash memory, which retains memory even without power. In some cases, a hybrid of HDDs and SSD may create a smaller SSD cache to improve performance for frequently accessed files.

FIG. 2*b* depicts another embodiment of the "I/O analysis, prompt, collaboration, and evaluation client-server network" 220, here preferably as an "Intellectual Property, Assessment, Collaboration and Exchange-Exemplary Operating Environment" 101 (hereinafter "I.P.A.C.E.—Operating Environment," "I.P.A.C.E. Operating Environment," sometimes "IPACE-System," sometimes "IPACE," or sometimes "Operating Environment"). The exemplary Operating Environment 101 in FIG. 1*b* illustrates an example of a suitable computing system environment 101 on which the present disclosure may be implemented. The computing system environment 101 is only one example of a suitable computing environment and is not intended to suggest any limitation as to the scope of use or functionality of the present disclosure. Neither should the computing environment 101 be interpreted as having any dependency or requirement relating to any one or combination of components illustrated in the exemplary operating environment 101.

The present disclosure is operational with numerous other general purpose or special purpose computing system environments or configurations. Examples of well-known computing systems, environments, and/or configurations that may be suitable for use with the present disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The present disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

In various non-limiting embodiments, the "IPACE Operating Environment" 101 would preferably comprise of a "Restricted" 106 access (or sometimes referred to as a "Private Invitation Node" 106, "P.I.N." 106, or "PIN" 106), a "Public" 104 access (or sometimes referred to as a "Public Access Campaign" 104, a "P.A.C." 104 (or sometimes referred to as a "PAC" 104 or as Public Access 104), and an "Intellectual Property, Assignment, Collaboration and Exchange-Hub" 100 (hereinafter "IPACE-Hub" or "I.P.A.C.E.-Hub" and In various non-limiting embodiments the IPACE) 100. In various non-limiting embodiments, the IPACE-Hub 100 acts like and provides the "IPACE Operating Environment" 101 with a central repository to interact, create, modify, collaborate, store, track, analyze, and update all system data, inputs, collaborations, statistics, records, profiles, and data/content necessary to function. In various non-limiting embodiments, an Account 60 may be an individual user (90), such as an attorney or In various non-limiting embodiments, an entity such as a law firm.

In various non-limiting embodiments, all members (e.g. IPACE members) would preferably belong to at least one Account 60 and may be further classified in a variety of methods and defined roles. For example, an Inventor(s) 70 is a particular user who has become a member and who has met an additional predefined description or definition, say, per the legal definition as currently employed by "United States Patent and Trademark Office" (hereinafter "USPTO" or sometimes "PTO") in the rules and/or the "Manual of Patent Examining Procedures" (hereinafter "MPEP") guidelines or similar at the time of his/her enrollment, and/or has acquired such "Inventor" role status, subsequent membership, due to performance and subsequent validation. Whereas a Participant(s) 80, on the other hand, is someone who meets a different definition, one who is an IPACE Member and who participates on projects, but who has not yet qualified as an Inventor 70 when employing these same rules/definitions for an inventor.

In various non-limiting embodiments, the User (90) accesses the IPACE-Hub 100, say via the PIN 106, the PAC 104 (sometimes collectively referred to as PIN/PAC 106/104), via his/her company's Account 60, and/or as an Anonymous User (90*a*). In various non-limiting embodiments, the User (90) may review an opportunity to participant in, say a project, say via a particular invitation, offer, a link in an email, a particular posting of a PIN/PAC (106/104) and/or the like; where he/she becomes a potential participant 80*a*. In various non-limiting embodiments, when the potential participant actually participants in a particular project, say via an accepted offer to participate, a participation via an approved user status (e.g. to provide peer feedback), and/or the like, the potential participant (80*a*) becomes an actual participant (80).

In various non-limiting embodiments, the Participant (80) may surpass a threshold of participation criteria and/or decisions (e.g. per current laws, the TOP, via a rule committee, e.g. an IPACE court (107) and/or the like) to become a Contributor (50) and/or an Inventor (70). In various non-limiting embodiments, the inventor (70) is further delineated into a Lead Inventor (40) and a Joint-Inventor/Co-Inventor (41). In various non-limiting embodiments, the Contributor (50) role/status would preferably have more than one threshold to obtain that Contributor (50) role/status, where the Participant (80) surpasses a first threshold of participation criteria and/or decisions (e.g. per current laws, the TOP, the rule committee, e.g. the IPACE court; and/or the like) to become a Potential Contributor (50*a*) role/status; then a second threshold of participation criteria and/or decisions to become the Contributor (50) role/status (e.g. per current laws, the TOP, the rule committee, e.g. the IPACE court; and/or the like).

Similarly, in various non-limiting embodiments, the Inventor (70), Lead Inventor (40) and/or Joint-Inventor/Co-Inventor (41) roles/status, would preferably have more than one threshold of contribution criteria and/or decisions for obtaining each role/status, where the Contributor (70) would need to surpass a first threshold of contribution criteria and/or decisions (e.g. per current laws, the TOP, claim contribution criteria, the rule committee, e.g. the IPACE court, and/or the like) to become a Potential Inventor (70*a*) role/status (e.g. for a particular project/patent application and claim set, claim, claim element, and/or the like); then a second threshold of contribution criteria and/or decisions (e.g. per current laws, the TOP, claim contribution criteria, the rule committee, e.g. the IPACE court; and/or the like) to become the Inventor (70) or the Joint-Inventor/Co-Inventor (41) (e.g. for a particular project/patent application and claim set, claim, claim element, and/or the like).

In various non-limiting embodiments, there would be additional threshold(s) and/or decisions for obtaining the Lead Inventor (40) and Joint-Inventor/Co-Inventor (41) roles/status, where the Inventor (70) would need to surpass a (first) Joint-Inventor/Co-Inventor threshold of contribution criteria and/or decisions (e.g. per current laws, the TOP, claim contribution criteria, the rule committee, e.g. the IPACE court, and/or the like) to become the Joint-Inventor/Co-Inventor (41) role/status (e.g. for a particular project, patent application, with a particular Lead Inventor or Joint-Inventor/Co-Inventor and claim set, claim, claim element, and/or the like). In various non-limiting embodiments, there would be additional threshold(s) and/or decisions for obtaining the Lead Inventor (40) role/status, where the Joint-Inventor/Co-Inventor (41) would need to surpass a (second/Joint-Inventor/Co-Inventor) threshold of contribution criteria and/or decisions (e.g. per current laws, the TOP, claim contribution criteria, the rule committee, e.g. the IPACE court, and/or the like) to become the Lead Inventor (40) (e.g. for a particular project/patent application and claim set, claim, claim element, and/or the like).

In various non-limiting embodiments, the Restricted (e.g. PIN) 106 access is a distinction where all users (90) must become a member under a specific set of PIN TOPs and enrollment rules for that particular Account 60, User 90, Potential Participant (80*a*) to participant; or for a Participant (80) to continue to participate and/or participate in a particular portion of, say a project. In various non-limiting embodiments, membership to the IPACE-Hub 100, in and of itself, would not necessarily grant access to a particular Restricted (e.g. PIN) 106 access environment. For instance, participation may be limited to those members located within the Restricted (e.g. PIN) 106 access environment and/or where those participants (80) would preferably have access to the network and/or to members who also meet other rules and conditions and who are allowed to connect and interact via a Communication Connection (hereinafter "CC"). In various non-limiting embodiments, the CC would preferably be a specific secure communication connection.

In various non-limiting embodiments, the CC would preferably be via a Transmission Control Protocol/Internet Protocol Connection (hereinafter "TCP/IP"), but all system connections inside the "IPACE Operating Environment" 101 may be any type of appropriate network connection that provides, say the necessary bandwidth, privacy, and security, including wired and wireless connections and dialog. In various non-limiting embodiments, the CC and "IPACE Operating Environment" 101 would preferably provide the necessary security, encryption, hardware, and software to safeguard the data, statistics, members, communications, and system, and prevent any breach of confidentiality/non-disclosure rights, harm, viruses, attacks, data-corruption, access, and/or visibility to any non-approved members, unwelcomed users, hackers, spiders, bots, or attackers. In various non-limiting embodiments, the CC and IPACE Operating Environment" 101 would also monitor for potential conflicts, contract breaches, deadline issues, resource issues, ownership and rights issues (e.g. inventorship, authorship, assignment, and/or the like) and/or the like.

In various non-limiting embodiments, the Public 104 (or PAC) access is comprised of users 90 who may participate anonymously (not members, but able to view offers, invitations, some data/content, provide feedback, create offers, and/or the like) and/or users 90 who may wish and/or be required to enroll (become members) to obtain certain data/content and/or become a specific Role with additional capabilities, visibility, ranking, permissions and/or privileges (e.g. per TOPs, e.g. reviewing, editing, collaborating, feedback, and/or the like). For instance, an enrollment may be required to participate in a particular project, view a particular offer, and/or contribute within a particular Restricted (e.g. PIN) 106 access environment.

In various non-limiting embodiments, the IPACE-Hub 100 connects to the Restricted (e.g. PIN) 106 access environment from outside the Restricted (e.g. PIN) 106 access environment via the CC, but the IPACE-Hub 100 could also be located within the Restricted (e.g. PIN) 106 access environment, but would preferably be a separate, stand-alone entity. In various non-limiting embodiments, there would preferably be a plurality of Public 104 and Restricted (e.g. PIN) 106 access environments where the participants (80) could access and utilized an IPACE-User-Interface (IPACE-UI) 102, and generally there is at least one interconnected IPACE-Hub 100 system, but there could be more. In various non-limiting embodiments, for instance, there would preferably be at least one separate IPACE-Hub 100 system in each separate country that employed the system. In various non-limiting embodiments, each IPACE-Hub 100 system would preferably be interconnected and systematically synchronized to preferably allow broader participation and to maintain relatively more current records, data, collaboration, interactions, feedback, and/or the like.

In various non-limiting embodiments, the IPACE-Hub 100 is operatively connected to the Public 104 access environment via the CC, typically via the TCP/IP connection and connected to the World Wide Web, the Internet, where the connections are made via and/or through the Internet. In various non-limiting embodiments, the CC could also be a mobile network, wireless connection and/or similar with an ability to connect, display, browse, interact, collaborate, participate, edit, and/or the like. In various non-limiting embodiments, the IPACE-Hub 100 would preferably also be operatively connected to the Inventor(s) 70 and the Participant(s) 80 via the CC, typically via the TCP/IP connection, say, at his/her home or office, but could also be a mobile network connection, wireless connection, or similar.

For instance, the Participant 80 may connect to the IPACE-Hub 100 system located within a particular Public 104 site, using his/her computer as a transceiver 99 (e.g. a communication client/device). In various non-limiting embodiments, the term transceiver is a combination transmitter/receiver in a single package, which generally applies to wireless communications devices such as cellular telephones, cordless telephone sets, handheld two-way radios, and mobile two-way radios, but here the definition is expanded to include any computing and/or communication device or client (e.g. desktop, laptop, notebook, and/or the like) that is connected to the IPACE system via a hardwired connection, a wireless connection, and/or other two-way communication means.

Depending on the conditions and TOU set on the IPACE-Hub 100 system and/or the login and TOP requirements of a particular Restricted (e.g. PIN) 106 access environment, the user may have limited access to participate anonymously, say enough to learn the TOU (e.g. terms of membership and enroll), and/or participate (TOP) (sometimes jointly referred to as TOU/TOP 111) through a specific invitation received with, say a pre-assigned login which authorizes the user to become a member and utilize the IPACE-Hub 100 system and/or access the particular Restricted (e.g. PIN) 106 access environment.

FIG. 3 is a block diagram depicting an embodiment of the groupings of sub-systems of the "IPACE Operating Environment" 101 and the communications and/or dialogs among them. In various non-limiting embodiments, the IPACE-Hub100 is the central hub for users to utilize the IPACE-UI 102, which is linked, network, connected and/or communicating with IPACE Server 185. In various non-limiting embodiments, the IPACE-UI 102 is the application that allows users via the Transceiver 99 (such as a computer, mobile device, and/or the like) to view a display, select, input, request, create, modify, monitor, track, report, ad target, collaborate, challenge, comment, manage, and/or the like, such things as data/content, inputs, media, terms, campaigns, resources, and/or the like.

In various non-limiting embodiments, the IPACE-Hub 100 sub-systems comprises the following: a container I.D.-

A.C.E.R. ("ID-ACER," which is an acronym for "Intelligent Dynamic—Analyzer/Criteria/Evaluator/Ranker") 103 that comprises an IPACE/ID-ACER Evaluator 95, an IPACE/ID-ACER Parser/Analyzer 96, the IPACE-UI 102, and an IPACE Storage 184; the Transceiver 99 and IPACE Server are located outside the container ID-ACER 103, while remaining directly connected to 103. In various non-limiting embodiments, the IPACE system and associated databases, TRIPLE stores, data/content and correlated data/content (e.g. data mapping) employ the IPACE system and sub-models (e.g. the ID-ACERS, more later) regarding semantic rules, indexing, classifications, RDFschema, triples, triple stores, and/or the like.

In various non-limiting embodiments, the IPACE system and database data/content and correlated data/content comprise raw data, structured data, text, media, audio, images, video, Speech To Text, speech to text, graphics, stenographics, animation, avatars, charts, polls, communications/interactions (e.g. email, instant messages (IM), "Short Message Service (SMS), Multimedia Messaging Service (MMS), and/or the like), and may include advertising, promotional/campaign, and Public Relations (PR) materials, offers, invitations, terms of use (TOU), terms of participation (TOPs) (e.g. sometimes collectively (TOU/TOPs)) participation criteria, role/status criteria, threshold criteria, rules, conditional rules, alerts, notifications, testing structure and systems, assessments, challenges, comments, peer review, expert review, feedback, "Frequently Asked Questions" (FAQs), research/search results, rankings, processes, know-how, and the like.

In various non-limiting embodiments, the participants (80) would preferably include users (90) (such as inventors (70), project managers), draftsperson, editors/proofers, reviewers, attorneys, patent attorneys, patent agents, other licensed professionals/engineers, non-certified experts, researchers, translator, instructors, recruiters, press, PR, advertiser, employees, contractors, peers, professors, students, IP prosecutors, IP licenser, IP acquirer, IP litigators, former BPAI/PTAB judges, former PTO examiner, former jury members, and the like), but may not be limited to humans and some embodiments could include machines, computers, software, time, materials, money, credit, and the like.

In various non-limiting embodiments, a container Protection Shield 98 comprises the Restricted (e.g. PIN) 106 access environment that would preferably be connected to an Internet 238, which in turn would preferably allow for connections and dialogs to other Restricted (e.g. PIN) 106 access environments and Public 104 access environments. In various non-limiting embodiments, an "Internet Site(s), Application(s) and Widget(s)" 189, a "Network(s) 188, the Inventor 70, the Participant 80, and a Mobile Network Operator(s) 191 would preferably all interconnect and allow for interactions, collaborations, communications, and/or the like, as shown. In various non-limiting embodiments, the IPACE-Hub100, which is linked, network, connected and/or communicating with a L-IPACE Server 187 and a L-IPACE Storage 186, would preferably connect directly to the Mobile Network Operator(s) 191 and the Restricted (e.g. PIN) 106 access environment via a designated secure communication line/means other than the Internet 238.

In various non-limiting embodiments, the Restricted (e.g. PIN) 106 access environment is comprised of a Local IPACE Storage 186 (hereinafter "L-IPACE Storage") that typically is setup to synchronize with the IPACE Storage 184 based on conditions and requirements instituted. In various non-limiting embodiments, all of the components within the Restricted (e.g. PIN) 106 access environment would preferably be interconnected, say via a L.A.N. 239 (or similar, e.g. SDN) and preferably via a secure protocol. In various non-limiting embodiments, the PIN Members Storage 193 would preferably be protected behind a firewall (not shown) and connected to an IPACE Server 185, which, in various non-limiting embodiments, comprises the IPACE-UI 102 system software and interface that is accessible to users with the Transceiver 99 (such as a computer). In various non-limiting embodiments, the Restricted (e.g. PIN) 106 access environment may connect with the L-IPACE Storage 186 to allow interaction with existing IPACE storage outside the Restricted (e.g. PIN) Members Storage 193*b*, but is not necessary. In various non-limiting embodiments, IPACE/ID-ACER PIN Parser/Analyzer 97 and IPACE/ID-ACER PIN Evaluator 94 connect with the IPACE UI 102, where the IPACE/ID-ACER PIN Evaluator 94 also connects with the L-IPACE Storage 186.

In various non-limiting embodiments, a particular Campaign 236, such as a search for an engineer with a particular skill set, would preferably be pushed out to the Public 104 access environment located in such places such as the "Internet Site(s), Application(s) and Widget(s)" 189. In various non-limiting embodiments, the Campaigns 236 would preferably be maintained internally and not made available to the public using a particular Campaign 236 with restricted access. In various non-limiting embodiments, the Restricted (e.g. PIN) 106 access environment would preferably require a password, Pin code, and/or similar to secure and/or obtain the access to any data, statistics, project, members, campaign, offer, data/content, and/or the like.

In various non-limiting embodiments, the Mobile Network Operator(s) 191 comprises of an Existing Mobile Infrastructure 194 and similarly could create its own access environment with the L-IPACE Storage 186 and IPACE Server 185. In various non-limiting embodiments, the Mobile Network Operator 191 may also utilize the IPACE-UI 102 system internally and/or utilize the IPACE-UI 102 located in the IPACE-Hub100 by connecting via the Internet 238. In various non-limiting embodiments, the Mobile Network Operator(s) 191 may send Campaigns 236 to subscribers who may be users 90, members, say Inventors 70 and Participants 80 who receive and view with his/her transceiver 99 display. In various non-limiting embodiments, the transceiver 99 may comprise a cellular phone, personal digital assistant (PDA), mobile device, or similar device, via the Mobile Network(s) 192, such as via traditional cellular transmissions and/or a wireless network utilizing, say GSM, CDMA, TDMA, CDPD, Edge, EVDO, LTE, 3G, 4G, and the like.

In various non-limiting embodiments of the system, all mentioned data updates, exchanges, and analysis may be performed in real-time, near-real-time, and/or per a schedule batch process. The data and necessary logic could be based upon and/or shared on cloud based servers and/or reside within a caching systems (e.g. Mongrel Clusters), without having to continually interact with the data and logic within a particular database and/or any database.

In addition, users could interact with the system, data and generated analysis, reports, and the like, in real-time, near-real-time, and/or per either a system established, user requested and/or scheduled update process, where, say some particular data elements are either updated or not and/or where other elements may be updated selectively. For instance, a particular IPACE member, say a Lead Inventor (40), could request a status update on a particular project participant, say a Draftsperson (54), without making the Lead Inventor's (40) own current changes, say to a particular patent claim or figure, visibly available to the same particular Draftsperson (54). This could be to prevent confusion as to what is the most current version of a particular project element, minimize alerts that may unnecessary interrupt and slow down a particular participant, and/or the like.

In various non-limiting embodiments, the IPACE system allows users to interact with those who are coupled via a client computer that could be hardwired or a mobile computing device (e.g. a cellular phone, a mobile device, and/or the like) with a wireless connection, such as via a cellular telephone and connection on any coupled and/or available wireless technology, including, but not limited to: 2G/3G/4G, CDMA, GSM/Edge, Edge, Edge+, GPRS, CDMA 2000, CDMA EV-DO, TD-SCDMA, WCDMA/HSPA/HSPA+, TDMA, SDMA, 802.16, LTE, and/or a mobile device via a range of other wireless technologies, including, but limited to IEEE 802.22, 802.20, 802.15, 802.11/Wi-Fi/WLAN, Wi-Max, Bluetooth, Ultra-Wideband Technology, NFC/Near-Field Communications, SRD/Short Range Devices, DECT/Digital Enhanced Cordless Telecommunications, Zigbee®, Wireless USB, and the like.

In various non-limiting embodiments, the client computer could employ tracking and session cookies, and the mobile computing device could employ location tracking technologies, including, but not limited to RFIDs, GPS, cellular tower triangulation, infra-red. Mobile applications could be tracked per the user's location and incorporate demographic and behavioral data.

IPACE system data may be encrypted for security, and the IPACE system would preferably employ an electronic payment system that may be stored as an electronic wallet in the cloud that interacts with other credit systems, such as banks, lenders, credit unions, credit checkers/validators (e.g. validate credit available and/or credentials, experience, and/or the like), credit providers, credit scorers, and/or the like. Once a member has established credit, the member may use his/her electronic wallet and associated credit (and Accounts (60)) to make transactions via enlisted mobile computing devices and/or computing clients. In various non-limiting embodiments, the IPACE system would preferably also allow for trading and bartering where the IPACE system may be coupled to interact with and interpolate an exchange rate with other bartering and trading systems, along with the associated credit system, rating/scoring system, and/or currency employed.

Figure 4:
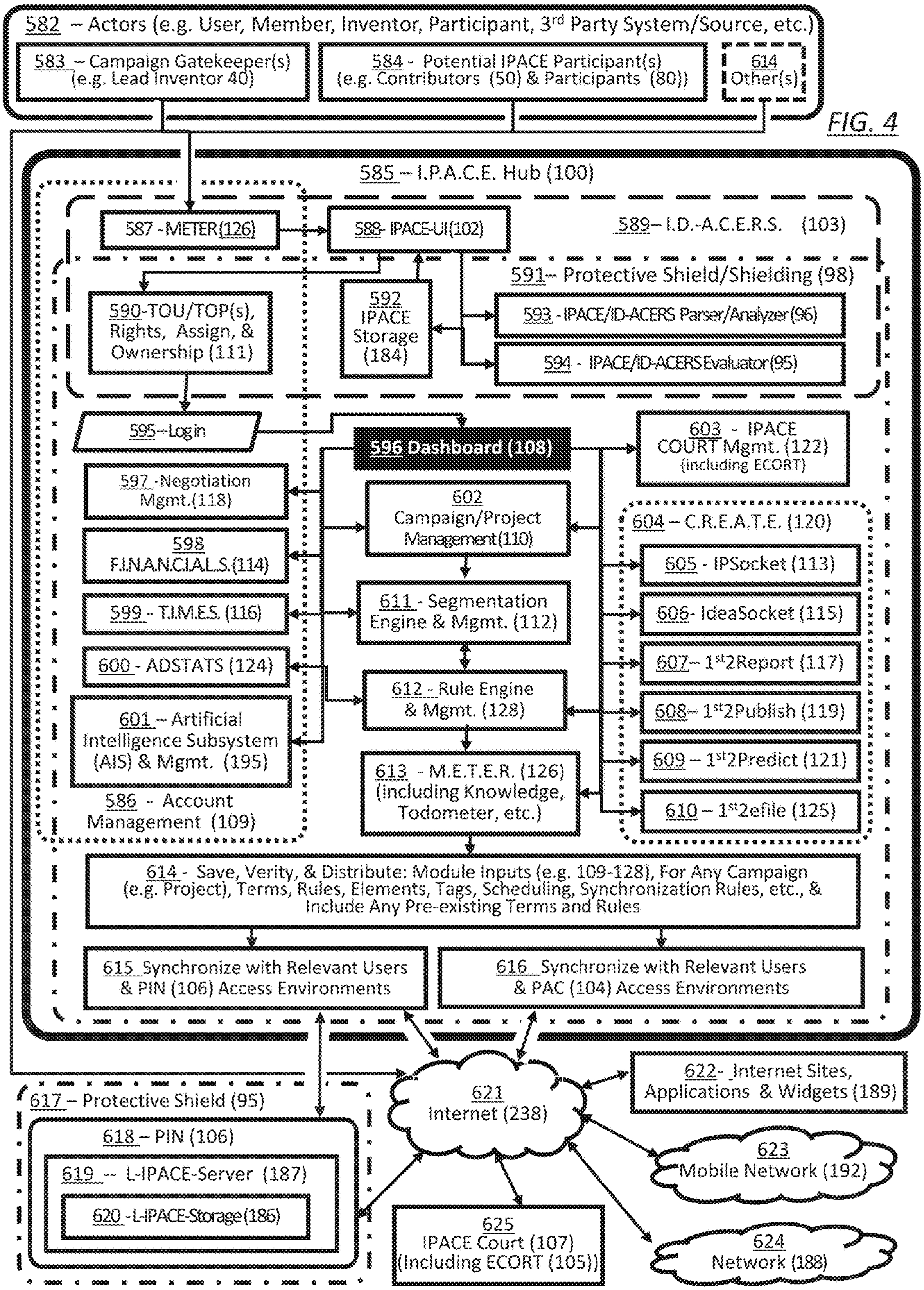
FIG. 4 is a flowchart that depicts an example of the IPACE-Hub100, system and an associated computer-implemented method in more detail.

FIG. 4 is a flowchart that depicts an example of the IPACE-Hub100, system and an associated computer-implemented method in more detail. In various non-limiting embodiments, a container 582 for "Actors (e.g. User, Member, Inventor, Participant, 3$^{rd}$ Party System/Source, etc.)" comprises a "Campaign Gatekeeper(s) (e.g. Lead Inventor 40)" 583 block, a "Potential IPACE Participant(s) (e.g. Contributors (50) & Participants (80))" 584 block, and "Others" (including other 3$^{rd}$ Party AI systems) 614 block, where each Actor may connect to the IPACE-Hub100 in container 585 via a pass through monitoring module 587 METER (126), where the user may access the IPACE-UI 102, with limited 585 IPACE-Hub 100 functionality, and with access to the ID-ACERS functionality in an I.D.-A.C.E.R.S. (103) container.

In various non-limiting embodiments, the IPACE UI (102) (e.g. Web Browser/UI, Mobile Application, etc.) conditionally allows the user to login in at a step 595, after accepting a set of current and active TOU/TOP(s) Rights, Assign, & Ownership (111) and conditionally passing a set of access requirements protected in a Protective Shield/Shielding (98) 591 container.

In various non-limiting embodiments, the IPACE UI (102) and/or Dashboard (108) allows the user to checks for an active Account (60) per the Account Management (109) module and container 586. If the user is an existing member, where the user is generally an IPACE member then the Account Management Module would pull the appropriate/suitable TOU/TOP per the Member's ID, role, previously accepted TOU/TOPs, and/or the like.

In various non-limiting embodiments, the login processes advances the users to the appropriate/suitable dashboard functionality in a step 595 from an Overall Dashboard (108), from which he/she has a list of options including an option 597 Negotiation Management (118) module, an option 598 "Financials and Interests, Negotiations, Accounting, Notices, Contracts, Insurance, Legal and Securities—Mgmt" (114) module (hereinafter "F.I.N.A.N.C.I.A.L.S. Management" 114, "F.I.N.A.N.C.I.A.L.S. Mgmt." 114, or sometimes "FINANCIALS" 114), an option 599 "Timing Information Module for Events and Scheduling" (116) module (hereinafter "T.I.M.E.S. Management 116," "T.I.M.E.S. Mgmt.," 116 or sometimes "TIMES" 116), an option 600 "Application Data and Segments Tied to Advertising Targeting System" (124) module (hereinafter A.D.S.T.A.T.S. 124, or sometimes "ADSTATS 124) to create or manage Projects and/or Campaigns 236, an option 601 "Artificial Intelligence Subsystem (AIS 195) & Mgmt. (195) module, an option where the Member may create or manage an existing project in a option 602 Campaign/Project Management (110) module, an option 603 IPACE Court Management (including ECORT) (122) module, an option 604 "Collaboration, Review, and Exchange of Art and Technology Engine" (hereinafter "C.R.E.A.T.E." or sometimes "CREATE") (120) module, and/or an option 592 IPACE Storage (184) module that stores, among other things, the data pertaining to the modules listed in this embodiment. All modules explained in detail further ahead.

In various non-limiting embodiments, the option 604 CREATE (120) module is comprised of a plurality of CREATE module options, including an option 605 IPSocket (113) module for creative campaigns/projects, where typically the objective is Intellectual Property development, creation, monetization, and/or protection is involved and/or created (namely Patent and Trademark development, invention/inventorship-tracking, applications, prosecution, monetization, licensing, litigation, protection, insurance, and the like); an option 606 IdeaSocket (115) module for creative and development campaigns/projects, where input, data/content, and/or materials may support, produce, and/or evolve into copyrightable materials, trademarks, patents, and/or the like Intellectual Property, but where the data/content and/or the campaign/project is typically not specifically organized for such an object/purpose; an option 607 "1$^{st}$2Report" (117) module (Sometimes "First To Report," "First-To-Report," or the like) is generally for campaigns/projects involving a reporting of an event (which, among other things, may involve/evolve into IP, such as copyrights); an option 608 "1$^{st}$2Publish" (121) module (Sometimes "First To Publish," "First-To-Publish," or the like) is generally tracking who, when, where, what and how events were published to credit who was perceived to be first to publish (e.g. relative publishing novelty) and relatively how accurately the specific event or news, an option 609 "1$^{st}$2Predict" (121) module (Sometimes "First To Predict," "First-To-Predict," or the like) is generally for campaigns/ projects involving a prediction of an event (which among other things, may also involve/evolve into IP, such as copyrights), and an option 610 "1$^{st}$2efile" (125) module (Sometimes "First To efile," "First-To-efile," or the like) may, among other things, involve/evolve into IP efilings, government efilings, consuming efilings, corporate efilings, and/or the like.

Again, depending on the Member's roles and permissions, he/she may utilize the functionality in an option 611\ "Segmentation Engine and Management" (112) module (explained more ahead); any results of the Campaign/Project Management (110) utilization and associated functionality afforded by the option modules (109-128), data, statistics, input, and any rules may be stored in a step 612 Rule Engine & Mgmt. (128) module, and/or an option/step 613 "Monitoring Events, Tasks, Errors and Reports" (126) module (hereinafter "M.E.T.E.R. Management 126" M.E.T.E.R. Mgmt. 126 or sometimes "METER" 126). In various non-limiting embodiments, the METER includes a knowledge management and tracking system (e.g. also see FIG. 14, module 123, and FIG. 49, "Knowledge Base/Stats/Management step 1312).

Next is a step 614 where the IPACE Member may "Save, Verity, and Distribute: Module Inputs (e.g. 109-128), For Any Campaign (e.g. Project), Terms, Rules, Elements, Tags, Scheduling, Synchronization Rules, etc., and Include Any Pre-existing Terms and Rules" is executed and the appropriate data, statistics, elements, and rules either get pushed to a step 615 "Synchronized with Relevant Users and Restricted (e.g. PIN) (106) Access Environments" and/or a Step 616 "Synchronize with Relevant Users and Public (104) Access Environments."

From step 615, the appropriate data, statistics, elements, and rules get pushed out to either a container 617 "Protective Shield" (98) that comprises the "Restricted (e.g. PIN)" (106) access environment in step 618 and/or the "Internet" 238 in a step 621. In either direction, the elements get directed via "L-IPACE Server" 187 in a step 619 to systematically synchronized with the data, statistics, elements, and rules currently within the "L-IPACE Storage" (186) in step 620. From step 616 the appropriate data, statistics, elements, and rules also get pushed out to the Internet 238 in a step 621. From the step 621, connections are made with a variety other steps including but not limited to a step 622 the "Mobile Network" (192), the Internet Site(s), Application(s) and Widget(s) (189) in a step 623 and to the Network (188) in a step 624, and, continuing from the step 621, the appropriate data, statistics, elements, and rules get propagated and systematically synchronized with the "IPACE Court (including ECORT (105))" (107) in a step 625.

FIG. 5 is a flowchart depicting an embodiment and example of the user creating an Account (60) using the IPACE-UI 102. Starting with a step 762 where a "User connects to IPACE-UI (102) via a transceiver 99," he/she may view a Terms of Use (TOU) in a step 763," which is generally referred to as the terms set by the IPACE in general, but may be conditionally modified and/or added to by a particular PAC/PIN, entity, campaign/project and/or the like. A step 764 for a "Privacy Policy" and/or the "TOP Terms and Ownership (including Assignments)" in a step 765.

In a step 766, "IPACE-UI (102) check if there are any ascertained IDs" for the user. When the user first employs the IPACE-UI 102, a unique session ID is created and stored until the user creates an Account (60) and/or logins. This allows for anonymous usage while still retaining essential data/statistics for the user and allowing for relative efficient functionality. In various non-limiting embodiments, the IPACE system may maintain tracking cookies per communication device and/or per user depending on what is known, what may be retained, and the permissions and roles of the user, but for most creative work that requires security and tracking, a login is required.

A query 767 asks if the "User Logs in?" If the answer is "yes" to query 767, the user jumps to a step 794, "Select Type of Usage?" If the answer to query 767 is instead "no," a query 768 asks if the IPACE-UI (102) is setup to "Allow Anonymous Usage?" If the answer to query 768 is "yes," the user receives a 770 terminator with an "Anonymous Usage Policy." If the answer to query 768 is "No," then the user is sent to a query 772, which asks the user if he/she "Wants an Account?"

If the user decides the answer to query 772 is "no," then the user receives the 770 terminator with the "Anonymous Usage Policy," which, in this instance, the IPACE system may discern the user's UI path and the policy may read differently than the policy viewed/read coming from query 768. If the answer to query 772 is instead "yes," where the user wants an Account (60), the user is passed to a step 774 that "Displays options for creating (an) Account (60)."

Now the user in this embodiment may identify himself or herself according to a set of predefined high-level Membership types (other Membership types and role delineations described in detail ahead). In this condensed list of membership choices example, there is a list of options including a "(Basic) IPACE Member" 776 option, a "Prior PTO Applicant" 777 member option, a "PTO Registered (Patent Attorney (44) or Patent Agent (45))" 778 member option, a "Registered With Another Patent Office (EPO, JPO, CIPO, etc.)" 779 member option, and an "Other/Requests" 780 is a catchall membership option for all other acceptable options and/or requests. This Other/Request 780 helps the IPACE identify demand for other types of membership options. In various non-limiting embodiments, the IPACE system would explain the existing definitions for these membership category options and further point out that these delineations may also be used for roles, so that a single member could be several roles, such as the "Prior PTO Applicant" 777 and the "PTO Registered" 778.

After the options are selected, an "Analyze, Verify, Validate &/or Authenticate: Results, Data, Attributes, Statistics &/or the like" in a step 781. Next a query 782 asks if a "Verification (&/or the like) Required?" for the membership role. If the answer to query 782 is "no," then the IPACE Operating Environment creates the appropriate IPACE membership ID and role and a step 786 will "Send User Login Info" generally in an email, where he/she may login.

If the answer to query 782 is instead "yes," then a subsequent query 783 asks if an "Interrogate & Verify with Sources?" where the IPACE Operating Environment compares the interrogates and verifies the sources submitted by the user against the appropriate databases (e.g. PTO, IPACE-Hub, PIN, State Bar Associations, and the like). If the answer to query 784 is "yes," where the validation data/statistics was verified, the IPACE and/or PIN creates the appropriate IPACE membership ID and role. In various non-limiting embodiments, the subsequent step 786 the will "Send User Login Info" generally in an email, where he/she may login. If the answer to query 784 is instead "no," where some or all of the validation data/statistics submitted by the user could not be properly verified, then a step 785 will send a "Request Corrections/More Information" to the user either while he/she is in standby in step 782 and/or in an email where the user may check for errors in the supplied validation data/statistics and/or comment any perceived issues and/or potential verification delays/issues. For example, the user may be a relatively new registered Patent Attorney (44), where depending on the TOU/TOP, the user may have to wait for the registered Patent Attorney (44) membership role, or may be allowed to have a conditional registered Patent Attorney (44) role where he/she could for example be allowed to view offers and/or search opportunities, but would be precluded from participation until verification was completed.

If there are errors in the Validation Data/Statistics, the user may make the appropriate corrections and resubmit the updated validation data/statistics for verification. If the user fails to get verified as a registered Patent Attorney (44), for example, he/she could continue to utilize the IPACE system under the TOU/TOP of the Basic IPACE Member. The user receives the login information in step 786, and if he/she does not log in at a query 787 that asks if a "User Logs In?" then he/she may be forwarded to the terminator 770 for Anonymous Usage Policy.

If the answer to query 787 is instead "yes," then the IPACE system executes the settings, rules, and conditions, along with any default setting associated with the type of Account 60, IPACE TOU, and TOP settings. And he/she is forwarded to a query 788, which asks whether the new Member wants to "Create More Accounts?' for other people, such as those co-workers, Joint-Inventor/Co-Inventors, contributors, attorneys, patent agents, partners, researchers, subordinates, employees, contractors, associates, past associates and the like, where the IPACE Operating Environment may forward them any appropriate information and requests for validation data/statistics not supplied and the IPACE membership qualifications, definition standards, including any added TOU/TOP rules.

If the answer to query 788 is "yes," the IPACE member is routed back to the step 774. If the answer to query 788 is instead "no," then the IPACE Member is passed to a query 790 that asks if the IPACE Member wants to "Modify Roles and Permissions?" If the answer to query 790 is "yes," the IPACE Member is passed to a terminator 791 "See Next Fig.," which explains the functionality of setting up roles and permissions.

If the answer to query 790 is instead "no," then the IPACE Member is passed to a step 792 that "Verifies selections and send invitations or notices to the appropriate users." In various non-limiting embodiments, the IPACE Operating Environment then tracks which invitations get accepted and when. If the person needs to complete any missing information, such as an attorney's registration number with the USPTO, this information may be added and also reported back to the user with the role of monitoring a particular participant, employee or other associate's activation and participation.

A query 793 asks what "Type of Usage?" desired by the member. If the answer to query 793 is that the member wants to view and/or work on campaigns/projects involving and/or creating intellectual property such as patents or trademarks, then the member may select the "IPSocket" module and gets passed to a 794 terminator, which is the "IPSocket Dashboard" (113), with the functionality, protections, and tracking designed for the creating, partnering, inventing/co-inventing, collaborating, sourcing, participant/contributor attracting, developing, applying, prosecuting, monetizing, defending, licensing, litigating, testing, challenging, asserting, investing, and/or the like, of intellectual property and per the member's role and permission settings.

If the answer to query 793 is instead that the member wants to view and/or work on campaigns/projects where such patent or trademark creating, developing, applying, and the like is not objective, but instead such creative work as, say article writing, and/or development work as collaborating and/or outsourcing software development, then the member may select the "IdeaSocket" module and gets passed to a 795 terminator, which is the "IdeaSocket Dashboard" (115), with the functionality appropriate to the member's role and permission settings. Project started in the IdeaSocket may involve and/or evolve into IPSocket-type projects and where the IPACE system analyzes the data/content, Participants (80), contributions, and/or the like may generate a series of options for conversion for the entire project and/or a portion of a particular project. For instance, where an entire software development project was created within the IdeaSocket module and where intellectual property has been and/or is about to be created and the particular entire IdeaSocket project may be converted to another particular entire IPSocket project. Or another instance where say, just some particular portion of an IdeaSocket project created figures that may be transferred and/or copied into a new IPSocket project to focus that material and work towards, say a patent and/or trademark application.

If the answer to query 793 is instead that the member wants to view and/or work on campaigns/projects involving reporting on events, such as newsworthy events/stories, intellectual property events, financial events, travel events/news, universe discovery events/news; perceived and/or actual crimes, emergencies, violations, and/or the like; animal news, educational events/news, political news/events, sporting events, entertainment news/events, gossip-related news/events, trade shows/events, weather news/events, traffic related news/events, and the like, then the member may select the "1$^{st}$2Report" module and gets passed to a 796 terminator, which is the "1$^{st}$2Report Dashboard" (117) with the functionality appropriate to the member's role and permission settings. "1$^{st}$2Report Dashboard" (117) and associated functionally may track who, when, where, what and how events were reported on to credit who was perceived to be first to report (e.g. relative reporting novelty) and relatively how accurately the specific event or news.

If the answer to query 793 is instead that the member wants to view and/or work on campaigns/projects involving publishing data/content, such as newsworthy events/stories, intellectual property event, financial events, travel events/news, perceived and/or actual crimes, emergencies, violations, and/or the like; universe discovery events/news, animal news, educational events/news, political news/events, sporting events, entertainment news/events, gossip-related news/events, trade shows/events, emergency news/events, weather news/events, traffic related news/events, and the like, then the member may select the "1$^{st}$2Publish" module and gets passed to a 797 terminator, which is the "1$^{st}$2Publish Dashboard" (119), with the functionality appropriate to the member's role and permission settings. "1$^{st}$2Publish Dashboard" (119) and associated functionally may track who, when, where, what and how events were published to credit who was perceived to be first to publish (e.g. relative publishing novelty) and relatively how accurately the specific event or news.

If the answer to query 793 is instead that the member wants to view and/or work on campaigns/projects involving predicting events, such as locations, people, successfulness/likelihood, and/or newsworthy events/stories, sporting events, financial events, travel events/news, perceived and/or actual crimes, emergencies, violations, and/or the like;

universe discovery events/news, animal news, educational events/news, political news/events, entertainment news/events, gossip-related news/events, trade shows/events, emergency news/events, weather news/events, traffic related news/events, and the like, then the member may select the "$1^{st}$2Predict" module and gets passed to a 798 terminator, which is the "$1^{st}$2Predict Dashboard" (121), with the functionality appropriate to the member's role and permission settings. "$1^{st}$2Predict Dashboard" (121) and associated functionally may track who, when, where, what and how events were reported on to credit who was perceived to be first to predict (e.g. relative prediction novelty) and relatively how accurately the specific event or news.

If the answer to query 793 is instead that the member wants to efile, then the member may select the "$1^{st}$2efile" module and gets passed to a 799 terminator, which is the "$1^{st}$2efile Dashboard" (125), with the functionality appropriate to the member's role and permission settings. "$1^{st}$2efile Dashboard" (125) and associated functionally may track who, how, where, what and when a particular application was filed to credit who was perceived to be first to efile a particular application, application element, claim, claim element, and/or the like.

If the answer to query 793 is instead that the member wants to view and/or work on an advertising or PR campaigns/projects, then the member is passed to a 845 terminator, which is the "ADSTATS (124) Dashboard," with the functionality appropriate to the member's role and permission settings. ADSTATS and associated functionally may track who, when, where, what and how advertisements were created and implemented to credit who was perceived to be first to create a specific campaign, advertisement data/content, element, targeting rules, and/or targeting rule.

If the answer to query 793 is instead that the member wants to view and/or managing, monitoring, and/or metering, then the member is passed to a 761 terminator which is the "METER (126) Dashboard," with the functionality appropriate to the member's role and permission settings. METER and associated functionally may track and analyze (e.g. meter) who, when, where, what and how specific inputs or/and correlations effect data/content, rights, novelty, success, and/or the like (e.g. who, what, where, when and how was an input and/or correlation effecting/ed a creation, modifications, and/or the like, known, stated, discerned, and/or relatively perceived to be relatively a first/novelty, successful, valuable, popular, consumed, improvement, and/or the like; and metering rule.

In various non-limiting embodiments, the IPACE system may then monitor, analyze data/statistics to track who was relatively first to predict an event, who was relatively first to create an event, who was relatively first to report an event, who was relatively first to publish an event, and/or the like, for say, where, when, how, why, and/or to what degree of measurable success, perceived, known, actualized, and/or the like. Further, the IPACE system may track and compare internal data/content and data/statistics with outside sources of data, statistics, creations, IP applications, filings, grants, predictions, reports, publications, advertisements, and/or the like.

Figure 6:
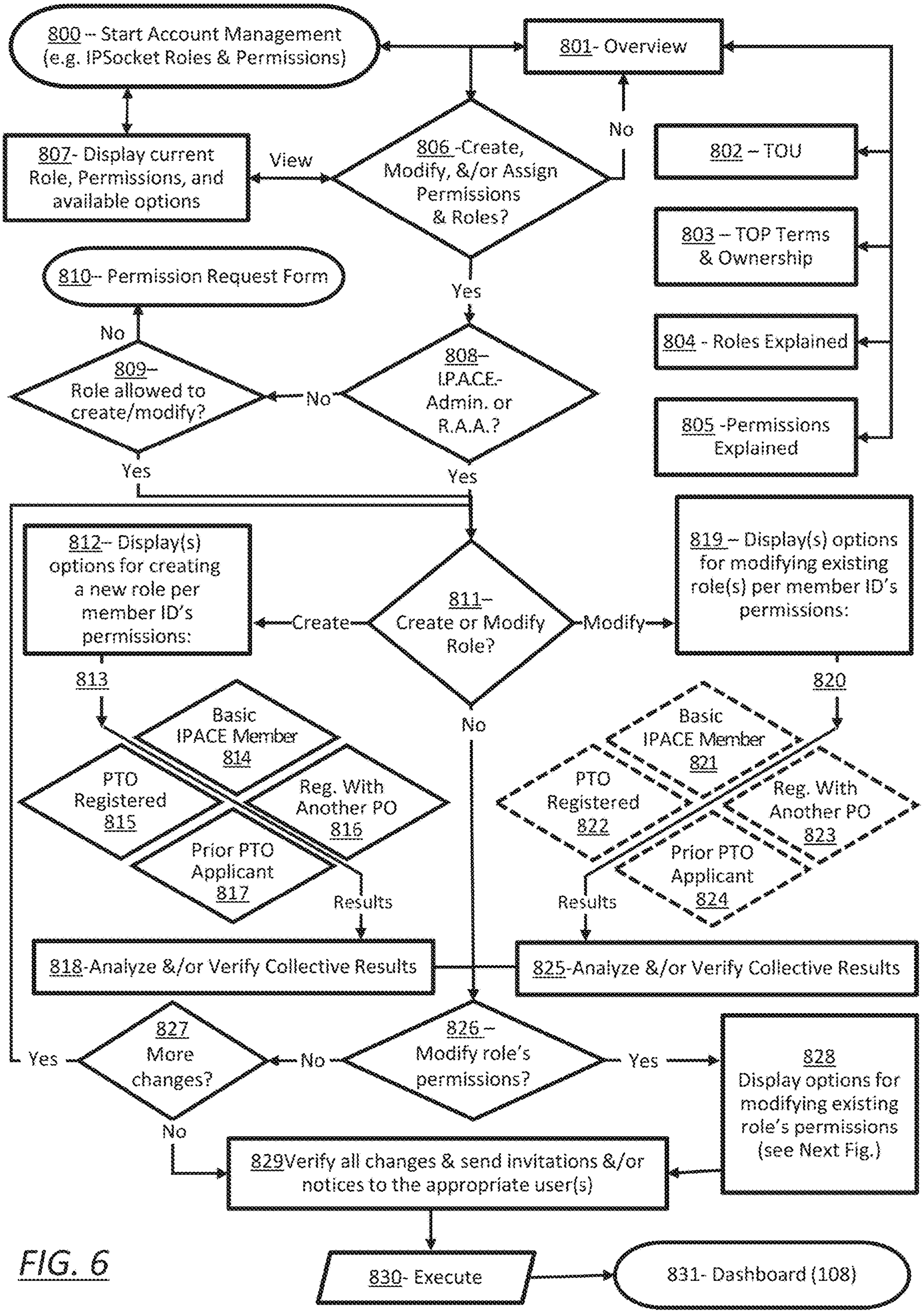
FIG. 6 is a flowchart depicting the member creating and modifying members' roles and permissions.

FIG. 6 is a flowchart depicting the member creating and modifying members' roles and permissions. In various non-limiting embodiments, the IPACE 100 system includes, but not limited to, the following Participants (80), members, roles, and/or users who enroll or are pre-assigned to utilize IPACE-UI 102 system: a "Restricted Account Administrator" (48) (hereinafter "R.A.A." or "RAA" or sometimes referred to as a P.A.A. for PIN Account Administrator) 48.

In various non-limiting embodiments, the RAA (48) Role classification is a specific Account 60 role with administrative permissions that allows him/her to manage the Account 60. In various non-limiting embodiments, the RAA (48) Role classification may also have other roles. For instance, the RAA (48) could also possess the permissions of the Inventor 70 role and/or all other roles' permissions available.

Starting with a step 800 "Start Account Management (e.g. IPSocket Roles and Permissions)," where the user is already a member and connected to IPACE-UI (102) via a transceiver (99) via the IPSocket Dashboard (113), he/she may "Display current Role, Permissions, and available options" in a step 807. The member may also go to a step 801 "Overview," which provides more detailed information in a step 802 for the "TOU" (Terms Of Use), a step 803 for the "TOP Terms and Ownership," a step 804 "Roles Explained," and a step 805 "Permissions Explained." A query 806 asks whether the member wants to "Create, Modify, and/or Assign Permissions and Roles?" If the answer to query 806 is "no," then the member is routed back to step 801 "Overview." If the answer to query 806 is instead "yes," then the IPACE system determines in a query 808 whether the member is an "IPACE Admin. or R.A.A.?" will broad privileges. a If the answer to query 808 is "yes," then the member who is either an IPACE-Admin. or R.A.A. and is passed to a step 811 "Create or Modify Role?" If the answer to query 808 is instead "no," then the member, who is neither the IPACE-Admin nor the R.A.A., is passed to a query 809 which asks if the "Role (is) allowed to create/modify?" If the answer to query 809 is "yes," then the member is also passed to the query 811. If the answer to query 809 is instead "no," the member is passed to a terminator 810, which is a "Permission Request Form," where the member may request the ability to change his/her role, and/or request for someone else with the proper permissions to change his/her role. This request would be passed to the appropriate role or roles for determination(s), generally the Account 60 manager and/or RAA (48), but could also be another inventor the member would like to contribute to or co-invent with.

For those members with the proper roles and permissions back at the query 811 asking whether he/she has a "Create or Modify Role?" where, if the answer is "create" a new role, then he/she gets passed to a step 812 which "Display(s) options for creating a new role based on member ID's permissions." His or her permissions allow them to create a new role in a section of options 813, with the choices of a "Basic IPACE Member" (e.g. not PTO or EPO registered, nor a Prior PTO applicant) 814, a "PTO Registered" (e.g. Patent Attorney (44) or Patent Agent (45)) 815, a "Registered With Another Patent Office" (EPO, CIPO, JPO or similar) 816, and/or a "Prior PTO Applicant" 817.

In various non-limiting embodiments, the IPACE Operating Environment may in turn validate that each is the requested role of the "PTO Registered" (e.g. Patent Attorney (44) or Patent Agent (45)) 815, the "Registered With Another Patent Office" (EPO, CIPO, JPO or similar) 816, and the "Prior PTO Applicant" 817, where the results of step 813 get passed to a step 818, which "Analyze &/or Verify Collective Results." From there the member gets passed to a query 826, which asks if the member wants to "Modify role's permissions?"

Back at query 811, the member also has the option to "modify" an existing role, and similar to step 812, he/she then gets passed to a step 819, which "Display(s) options for modifying existing role(s) per member ID's permissions." In various non-limiting embodiments, then with his or her proper permissions to modify an existing role, he/she proceeds to a section of appropriate options 820 (similar to 826, but based upon the member's current role and permissions), with the choices of a "Basic IPACE Member" (e.g. not PTO or EPO registered, nor a Prior PTO applicant) 821, a "PTO Registered" (e.g. Patent Attorney (44) or Patent Agent (45)) 822, a "Registered With Another Patent Office (EPO, CIPO, JPO or similar) 823, and/or a "Prior PTO Applicant" 824. The results of step 820 get passed to a step 825, which again "Analyze &/or Verify Collective Results" the same as the step 818. From there the member gets passed to the query 826, which asks if the member wants to "Modify role's permissions?"

If the answer to query 826 is "no," the member gets passed to a query 827 that asks if the member has "More Changes?" to make. If the answer to query 827 is "yes," then the member is passed back to the query 811 to the "Create or Modify Roles?" If the answer to query 827 is instead "no," then the member gets passed to a step 829, which "Verifies all changes and sends invitations and/or notices to the appropriate member(s)."

If the answer back at query 826 is "yes" to "Modify role's permissions?" then the member would be passed to a step 828, which "Displays options for modifying (an) existing role's permissions (see Next Fig.)." From step 828, the member gets passed to the step 829, which "Verifies all changes and sends invitations and/or notices to the appropriate user(s)," which may verify the selections with the user and permissions with the system. In various non-limiting embodiments, the method may also send out the appropriate information to the appropriate parties and/or systems to validate data/statistics, such as the number of patents filed, granted, etc., for say an attorney, and/or inventor per country, when appropriate. From step 829, the user is passed to an execution 830 to "execute" before passing on to a terminator 831, which goes back to the Dashboard (108). In various non-limiting embodiments, the Dashboard (108) give access to all other Dashboards: IPSocket Dashboard (113), IdeaSocket Dashboard (115), 1$^{st}$2Report Dashboard (117), 1$^{st}$2Predict Dashboard (121), and ADSTATS (124) Dashboard, but the IPACE system would preferably be setup to go back to the last Dashboard utilized, IPSocket Dashboard (113) in this example, and/or be based upon TOP rules and/or member/user-preferences.

Figure 7:
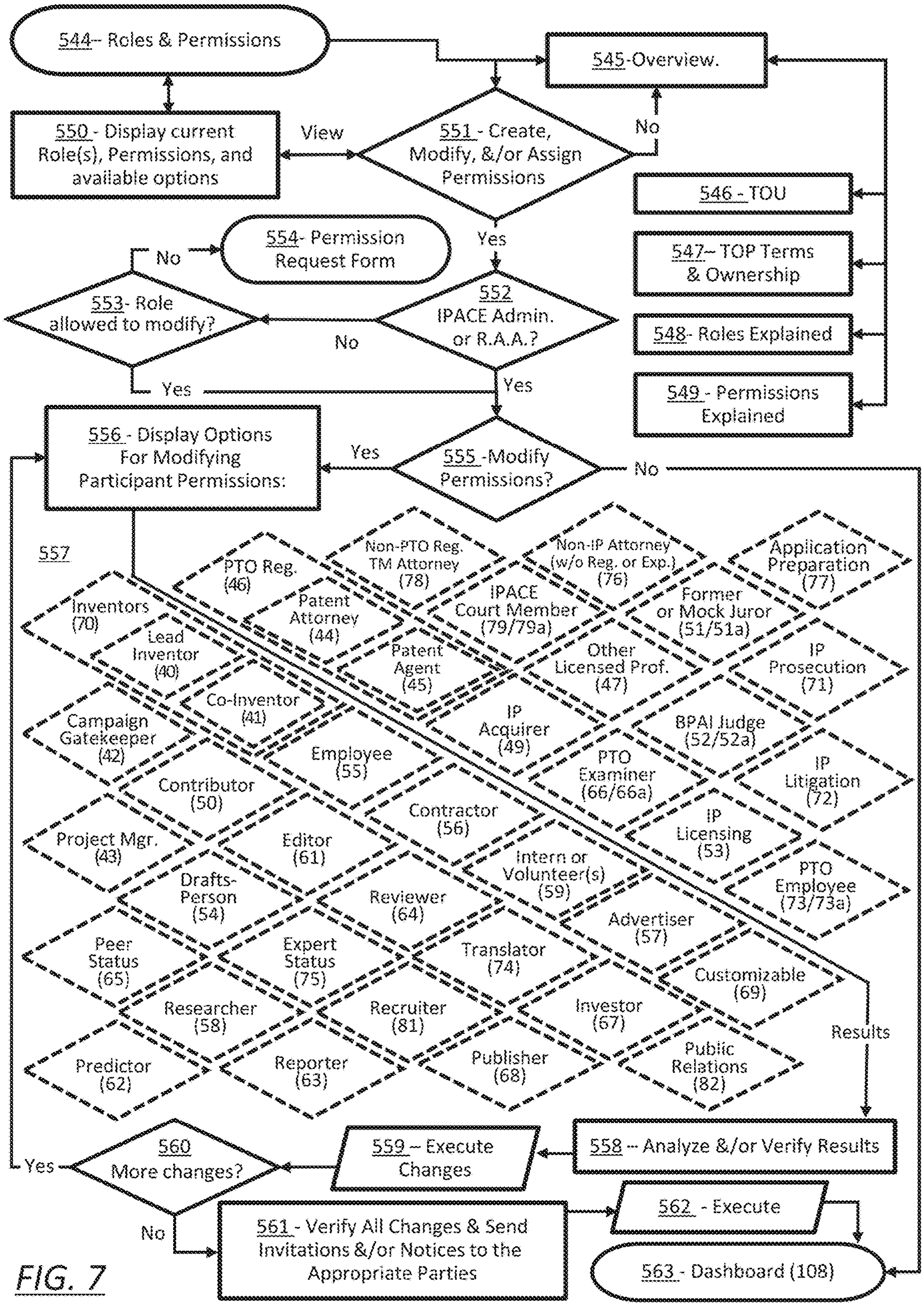
FIG. 7 is a flowchart depicting the user creating and modifying Account 60 role's permissions.

FIG. 7 is a flowchart depicting the user creating and modifying Account 60 role's permissions. Starting with a step 544 "Roles and Permissions" function where the user, generally an IPACE member who is already connected to IPACE-UI (102) via a transceiver, he/she may "Display current Role, Permissions, and available options" in a step 550. In various non-limiting embodiments, the user may also go to a step 545 "Overview," which provides more detailed information in a step 546 for the "TOU," a step 547 for the "TOP Terms and Ownership," a step 548 for the "Roles Explained," and a step 549 for the "Permissions Explained." A query 551 asks whether the user wants to "Create, Modify, and/or Assign Permissions?" If the answer to query 551 is "no," then the user is routed back to step 545 "Overview." If the answer to query 551 is instead "yes," then the IPACE system determines in a query 552 whether the user is a "IPACE-Admin or R.A.A.?" with typically broad privileges.

If the answer to query 552 is "yes," then the user who is either an IPACE-Admin or R.A.A. and is passed to a step 555 "Modify Permissions?" If the answer to query 552 is instead "no," then the user, who is neither the IPACE-Admin or a R.A.A., is passed to a query 553 which asks if the "Role (is) allowed to modify?" If the answer to query 553 is "yes," the user is also passed to the step 555. If the answer to query 553 is instead "no," the user is passed to a terminator 554, which is a "Permission Request Form," where the user may request the ability to change his/her role, and/or for someone else to change his/her role. This request (e.g. Permission Request Form) would be passed to the appropriate role or roles for determination(s)/authorization, generally the Account 60 manager and/or R.A.A., but could be a project creator, such as another inventor.

For those users with the proper roles and permissions back at query 555 "Modify Permissions?" who select modify, then get passed to a step 556 which "Display(s) options for modifying permissions." In various non-limiting embodiments, his or her current permission setting determines what changes he/she is allowed to make in an option list 557 with the choices of "Lead Inventor" (40), which is the role used by an individual who initiates a particular patent related project (could also be a "Campaign Gatekeeper" (42), which is also generally used for projects that don't involve Inventorship and/or where the such a status may be utilized prior to created data/content becoming an actual invention), "Joint-Inventor/Co-Inventor" (41) for those Participants (80) in-general is for those who would pre-qualify as Joint-Inventor/Co-Inventors (41), but typically is another role until his/her contribution is determined to qualify him/her as a Joint-Inventor/Co-Inventor (41). In various non-limiting embodiments, the Lead Inventor (40) and the Joint-Inventor/Co-Inventor(s) comprise a group of Inventors (70) (sometimes referred to as "Joint-Inventors," or "Co-Inventors.")

In various non-limiting embodiments, the option list 556 also includes roles: a "Campaign Gatekeeper" (42), a "Project Mgr." (or "Project Manager") (43) (for those members tasked with managing a project, but not necessarily the Lead Inventor (40) or the Campaign Gatekeeper (42)), a "Draftsperson" (54), a "Researcher" (58), an "Editor" (61), a "Reviewer" (64), a "Patent Attorney" (44), a "Patent Agent (45)" (45), a Non-PTO-registered™ (Trademark) Attorney (78), a "Non-IP Attorney without PTO registration or TM experience" (or sometimes referred to as a "Non-IP Attorney" or "Attorney") (76), an "Other Licensed Professional (other than attorney or patent agent)" (47), a "Contributor" (50) (sometimes referred to as a "Project Contributor"), a "Recruiter" (81), a "Translator" (74), all of which may also be an "Employee" (55) or a "Contractor" (56). In various non-limiting embodiments, the Employee (55) role generally means someone who is employed by an entity and/or the Lead Inventor (40), for whom he/she is participating in a particular project, and where the Contractor (56) is under contract of the same. In addition, a role could be as an "Intern or Volunteer(s)" (59) who may or may not receive credits for his/her participation.

A "PTO Registered" (46) role comprises the Patent Attorney 44 and the Patent Agent (45), but could include other roles, such as a particular Patent Attorney (44) who also handles the role of IP Litigation (72) and meets the conditions and rules outlined by the IPACE, and/or a particular TOP. For the Non-PTO-registered™ (Trademark) Attorney (78), there may be rules and conditions set for qualifying and/or maintaining such a role, where, for example, he/she may have to have filed a certain number of applications, had a certain number of trademarks granted, within a particular window of time, within a particular industry, and/or the like; otherwise non-PTO registered attorneys would be classified as the "Non-IP Attorney without PTO registration or TM experience" (76).

An "Expert Status" (75) (sometimes referred to as "Experts" (75)) and a "Peer Status" (65) (sometimes referred to as "Peers" (65)) are members in-general who seek or earn these role statuses in association with another particular member and/or Account (60) that awards the status to the member and/or points may be associated where the points may add up over the course of time to bolster status and reflect who awarded the points. In various non-limiting embodiments, the points may be based on such things as the point value associated with member or Account (60) granting the status/permission and, in some cases, could be based an algorithm that incorporates the exclusivity and/or prominence of the status being rewarded from, say a prominent member from such measurable success as patents filed, patents issued, PTAB/BPAI cases won, and/or litigation damages awarded and/or defeated.

In various non-limiting embodiments, the option list 557 also includes roles that help delineate areas of legal expertise and/or stages of participation with an "Application Preparation" (77) role, an "IP Prosecution" (71) role, an "IP Licensing" (53) role, and an "IP Litigation" (72) role (sometimes "Patent Litigation" or simply "Litigation"). In various non-limiting embodiments, the option list 557 also may comprise roles of an IPACE Court Member (79) and an IP Acquirer (49). Further, the option list 557 also may comprise roles that delineate past experience and expertise with: a (Currently Active) "PTO Examiner" (66) (sometimes referred to as a "patent examiner" or simply an "examiner"), a Former PTO Examiner (66*a*), a (Currently Active) "PTAB (Patent Trial and Appeals Board) and/or BPAI (Board of Patent Appeals and Interferences) Judge" (52) (or similar PTO ruling entity), a Former PTAB/BPAI Judge (52*a*) (or similar PTO ruling entity), and a "Former Juror" (51), a Former Mock Juror" (51*a*) where, in-general, the user may signify the type of trials he/she participated in and give feedback about the case and/or the Participants (80) when and where appropriate within the TOU/TOP and/or the like. A (currently Active) "PTO Employee" (73) and a "Former PTO Employee" (73*a*), where, for instance, a PTO examiner (66) or PTO SPE could be the currently active PTO employee (73) and a particular Patent Agent (45) who could also be the former PTO employer (73*a*). In various non-limiting embodiments, the "Former Juror" (51) or "Mock Juror" (51*a*) may participate in mock trials regarding such things as IP litigation to assist a particular Campaign Gatekeeper (42) before a particular trial or Markman Hearing.

In addition the option list 557 also includes roles that help find Investors (67) or buyers with an "IP Acquirer" (49) role, and an "Investor" (67) role. In various non-limiting embodiments, the IP Acquirer (49) may be relatively well-known IP aggregator such as an Intellectual Ventures®, RPX®, Allied Securities Trust®, Acacia®, and/or the like, but may also be a company, entity, government, individual, and/or the like known to acquire IP (where the IPACE TOU/TOPs may have global definitions and/or modifiable definitions per each IPACE role). In various non-limiting embodiments, the "Investor" 67 is typically someone who is known to have invested to support the development of a particular project, entity, inventor, group, and/or the like. In various non-limiting embodiments, IPACE members may search for both IP Acquirers (49) and Investors (67) based upon filtering tools for similar actual participation and/or views of projects, categories, industries, art units, claim language, developed products, interests, monetization requirements, and/or the like.

In various non-limiting embodiments, the option list 557 also includes roles for an "Advertiser" (57) and a "Publisher" (68) generally is a role for someone or a machine (e.g. software running on a computer) that publishes data/content and may comprise the Press and/or a Public Relations (82) role who is a PR person and/or with a PR firm, but may be any individual, who say utilizes the 1$^{st}$2Publish Dashboard, but such dashboard usage is not necessary to be the role of the Publisher (68), and the data/content when published may not actually be the "first" to literally and/or timely have published the data/content; and the Publisher (68) does not have to be an IPACE member. In various non-limiting embodiments, the Advertiser (57) may also be a Publisher (68). A role of a Reporter (63) generally is someone who is credited with reporting a story and/or an event, who may also be a member of the Press, the Publisher (68), advertiser (57) another IPACE role, and/or the like. In various non-limiting embodiments, the Reporter (63) may participate in say, monitoring issued IP, and/or overall statistics for a publication or for publishing as the Publisher (68). A "Predictor" (62) role is generally for IPACE members who predict an outcome, say using the 1$^{st}$2Predict dashboard (121), but such dashboard usage is not necessary, and the prediction may not be "first" to actually predict a particular outcome, the Predictor (62) does not have to be an IPACE member, and could a machine, e.g. software running on a computer.

Lastly, the option list 557 also includes a "Customizable" (69) role, so a member could create a unique role that is not listed and use for their club, entity or organization, and/or offer as a new role to add to the existing options, say for a think tank founder, a university professor, and/or patent club organizer. Participants (80) may have a variety and/or plurality of current and past roles for different entities and/or projects.

In various non-limiting embodiments, the results of option pool 557 get passed to a step 558, which "Analyze &/or Verify Results" with the user. From there the user gets passed to an execution 559 to "execute changes" before passing the user on to a query 560 that asks if the user has "More Changes?" to make. If the answer to query 560 is "yes," then the user is passed back to the step 556 "Display (s) options for modifying permissions." If the answer to query 560 is instead "no," then the user gets passed to a step 561, which "Verifies all changes and sends invitations and/or notices to the appropriate user(s)," that, as the previous figure above, verifies the selections with the user and permissions with the system. In various non-limiting embodiments, the method may also send out the appropriate information to the appropriate parties and/or systems to validate data/statistics, such as the number of patents invested in for the Investor (67), the languages fluently spoken by the Translator (74), and the number of years of experience, say with the PTO for a Current PTO Examiner (66) or a Former PTO Examiner (66*a*—Not shown), etc., when and if appropriate. From step 561, the user is passed to an execution 562 to "execute" before passing on to a terminator 563 which takes the IPACE member/user back to the Dashboard (108).

Figure 8:
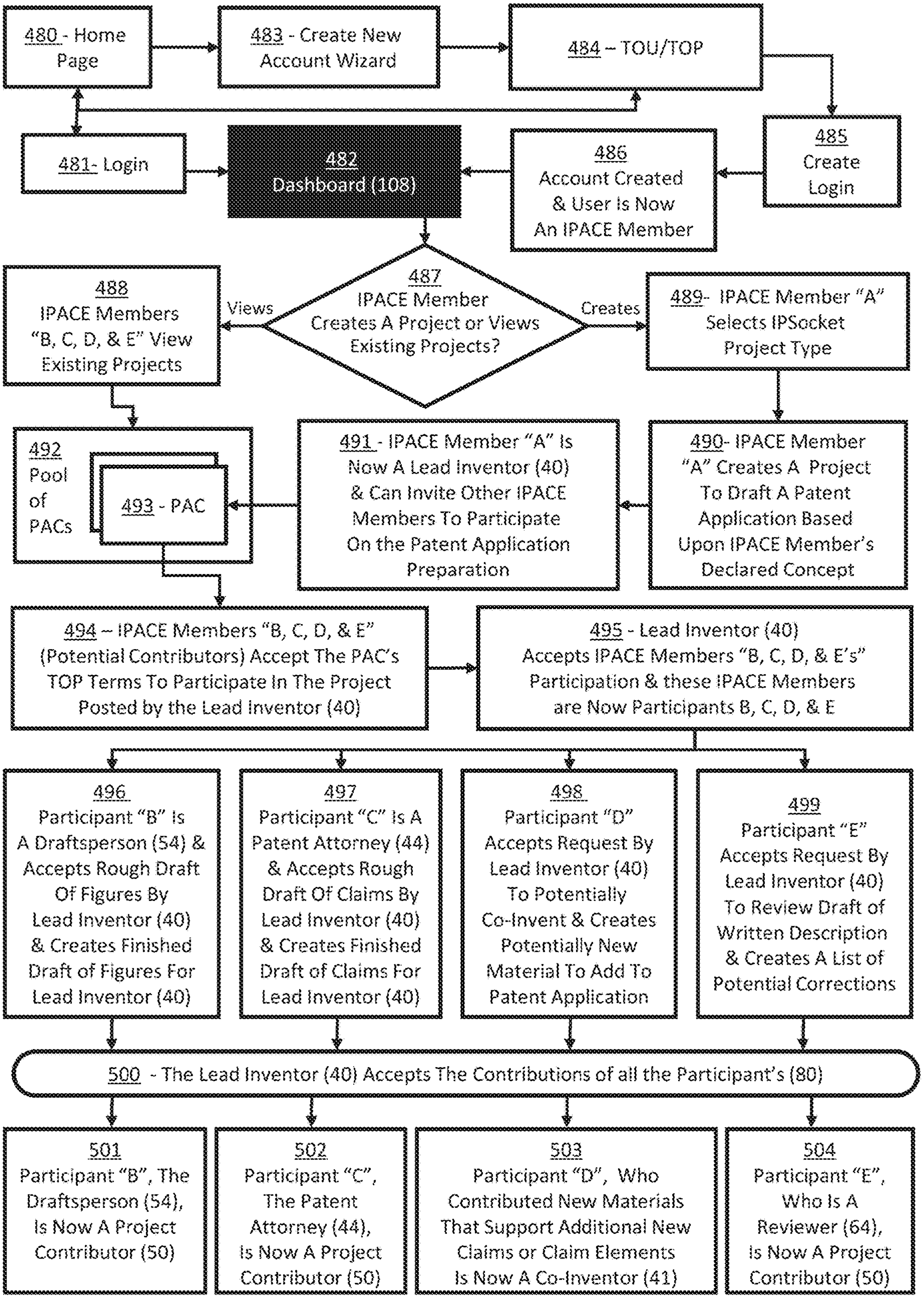
FIG. 8 is a flowchart that depicts a non-limiting embodiment and example of the process by which new users may create an Account (60) and become a member, then either a Campaign Gatekeeper (42) (e.g. lead inventor) and/or a Participant (80) and subsequently a Joint-Inventor/Co-Inventor (41) or Contributor (50) in one embodiment.

FIG. 8 is a flowchart that depicts an embodiment and example of the process by which new users may create an Account (60) and become a member, then either a Campaign Gatekeeper (42) (e.g. lead inventor) and/or a Participant (80) and subsequently a Joint-Inventor/Co-Inventor (41) or Contributor (50) in one embodiment. This new user could come to the IPACE Hub 100 system (where the IPACE system and hub, is sometimes referred to simply as the IPACE system or IPACE) through a variety of methods, including, but not limited to an application, a URL and/or a link provided via: an email; a SMS/MMS message; an Affiliate; an invitation;

a search result via a Search Engine; a mobile application; a mobile alert or location-aware trigger; a social network; and/or a tweet; in an IPACE 102 generated Campaign 236 (PAC 104 and/or PIN 106), for instance, from an IPACE Member, third party invitation, advertisement, and/or the like. In various non-limiting embodiments, the new user could also connect to the IPACE directly via a kiosk, computer, mobile device, and the like that is part of a public and/or private LAN, WAN, WIFI, WLL, Wi-MAX, Bluetooth, NFC, Zigbee®, and/or mobile network. For instance, the new user could be referred by an existing IPACE Member, from an anonymous user, a friend, and/or an associate.

A Home Page 480, a Create New Account (60) Wizard 483 module, and a "TOU/TOP" 484 module are accessible, while the user remains anonymous and without having an existing Account (60). In various non-limiting embodiments, the Home Page 480 comprises a login field for the existing Accounts (60) via a Login 481, or the ability to create a new Account (60) using the Create New Account (60) Wizard 483 module followed by the TOU/TOP 484 module (note, sometimes individual components of the TOU/TOP are referred to as "terms," but the word "terms" may also appears in other contexts and/or situations within the specification). After accepting the TOU/TOP in the TOU/TOP 484 module, the user is forwarded to a Create Login 485 function and subsequently a step 486 where an "Account (is) Created and User Is Now An IPACE Member." In various non-limiting embodiments, the logged in IPACE Member has an Account 60, with a Unique Account ID and a Unique Member ID. He or she may now access, display, and utilize a Dashboard (108) menu in a step 482, with functionality appropriate per his/her Membership role and associated permissions. It should be further noted and appreciated that there are alternative embodiments for creating an IPACE Account (60) and Membership, such as downloading a mobile application with similar functionality.

From the step 482 Dashboard (108), he/she may decide to either view existing projects or create a new one. A query 487 asks if an "IPACE Member Creates A Project or Views Existing Projects?" If the answer to query 487 is "views existing," then he/she is passed to a step 488. In this example, the IPACE Member has been delineated into four separate instances of an IPACE Member: "B, C, D, and E" where "IPACE Members 13, C, D and E' View Existing Projects" in step 488.

Back in query 487, another instance of an IPACE Member: "A" decides to "create a project" and he/she is passed to a step 489, where an "IPACE Member 'A' Selects IPSocket Project Type" for a project relating to a patent application. Next, in a Step 490, the "IPACE Member 'A' Creates A Project To Draft A Patent Application Based Upon IPACE Member's Declared Concept," where the IPACE Member "A" declares him or herself to be the true inventor of the concept that he/she wants to file the patent application upon. Next in a step 491, the "IPACE Member 'A' Is Now A Lead Inventor (40) and May Invite Other IPACE Members To Participate On the Patent Application Preparation." Further, the Lead Inventor (40) could invite non-IPACE Members (e.g. Potential Participants) to become IPACE-Members, but not shown here (further ahead).

In this example and instance, the Invitations for IPACE Members to participate are distributed in a particular PAC in step 493. Back to the step 488, with the "IPACE Members 13, C, D and E' View Existing Projects," where a step 492 represents a "Pool of PACs" for these IPACE Members to view, in particular the PAC in step 493. Next, in a step 494, the "IPACE Members 13, C, D, and E" (Potential Contributors) Accept, in various non-limiting embodiments, the PAC's TOP Terms To Participate in the Project Posted by the Lead Inventor (40)." Next, in a step 495, the "Lead Inventor (40) Accepts IPACE Members 13, C, D, and E's" Participation and these IPACE Members are Now Participants (80) 'B, C, D, and E.'."

Next is a step 496, where the "Participant (80) "B" Is A Draftsperson (54) and Accepts Rough Draft Of Figures By Lead Inventor (40) and Creates Finished Draft of Figures For Lead Inventor (40)." Here the assumption is that Participant (80) "B" had already met the IPACE qualifications for the role of the Draftsperson (54). If not, the Participant (80) "B" could request and/or apply for that role. Along with step 496, is a step 497, where the "Participant (80) "C" Is A Patent Attorney (44) and Accepts Rough Draft Of Claims By Lead Inventor (40) and Creates Finished Draft of Claims For Lead Inventor (40)." Here the assumption is that Participant (80) "C" had already met the IPACE qualifications for the role of the Patent Attorney (44). If not, the Participant (80) "C" could request and/or apply for that role.

Along with step 496-497 is a step 498 where the "Participant (80) "D" Accepts Request By Lead Inventor (40) To Potentially Co-Invent and Creates Potentially New Material To Add To Patent Application," Here the assumption is that Participant (80) "D" and the Lead Inventor (40) have already mutually agreed in the "TOU/TOP" that the Participant (80) "D" could conditionally contribute new materials to the Lead Inventor's (40) patent application and become a Joint-Inventor/Co-Inventor (41). If the conditions for the Participant (80) "D" to conditionally contribute new materials incorporate business logic, a rule(s), a series of thresholds, approvals, and/or competitions, then the Participant (80) "D" may not become a Joint-Inventor/Co-Inventor (41) until those are properly and appropriately satisfied.

Further and again depending on the already mutually agreed "TOU/TOP," the Participant (80) "D" may be or may not be able to file his/her new material in a Divisional, Continuation, or "Continuation-in-Part" (Hereinafter "CIP") off of the Lead Inventor's (40) priority application (e.g. parent). In addition, and depending how the materials were contributed, shielded/separated, tracked, and the like, the Participant (80) "D" may be or may not be able to file his/her new material in separate application. In various non-limiting embodiments, the ability to file with the Lead Inventor (40) and/or separately may also be restricted by other considerations, such as time, compensation, equity, bartering services, status, points, and/or the like (more ahead).

Along with steps 496-498, is a step 499, where the "Participant (80) "E" Accepts Request By Lead Inventor (40) To Review Draft of Written Description and Creates A List of Potential Corrections." Here the assumption is that Participant (80) "E" had not already met the IPACE qualifications for the role of the Reviewer, but may either request it and/or qualify for the role upon meeting some predefined IPACE TOU qualification and/or Terms pre-established by the Lead Inventor's (40) TOP terms. On the other hand, the Participant (80) "E" may have already qualified for as a Reviewer (64) role under a previous project and subsequently would be easier for the Lead Inventor (40) to target without a previous relationship.

Next is a step 500, where "The Lead Inventor (40) Accepts The Contributions of all the Participant's (80)." Next is a step 501, where the "Participant (80) "B," The Draftsperson (54), Is Now A Project Contributor (50)." Along with a step 502, where the "Participant (80) "C," The Patent Attorney (44), Is Now A Project Contributor (50)."

Along with a step 503, where the "Participant (80) "D," "Who Contributed New Materials That Support Additional New Claims or Claim Elements Is Now A Joint-Inventor/Co-Inventor (41)." Along with a step 504, where the "Participant (80) "E," Who Is A Reviewer (64), Is Now A Project Contributor (50)."

In various non-limiting embodiments, the TOU/TOP set by the Lead Inventor (40) may incorporate other parties/Members and/or Business Logic and Assessment Tools to pre-screen a Potential Contribution by a Potential Contributor, so as to help make sure that the Potential Contributor is not crossing a Term Definition Threshold and/or a Legal Threshold into becoming a Potential Joint-Inventor/Co-Inventor or an Actual Joint-Inventor/Co-Inventor (41). For example, the Lead Inventor (40) may welcome a review of his/her Written Description, in terms of grammar and spelling, and possibly to a limited degree, how comprehensive and logically is the application's flow, but the Lead Inventor (40) explicitly states in the Terms that he/she does NOT want any Reviewer (64) to submit any Potential Contribution that would or could cause the Reviewer (64) to become a Joint-Inventor/Co-Inventor (41) with the Lead Inventor (40).

IPACE/ID-ACERS: A/D/RP/AS/P Scores, Shielding, and Harvesting (also see Figures: 9-13) In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or searching (e.g. patents, patent applications, publications, and/or the like) and generating a ranked list of searched materials per a list of criteria, keywords, data/content, disclosure, claims, images, field of use, likely art unit, and/or the like. In various non-limiting embodiments, the ID-ACERS, Knowledge Base Mgmt., CREATE, METER, TIMES, FINANCIALS, etc.) and associated computer-implemented methods for interrogating and/or searching (e.g. patents, patent applications, publications, and/or the like) and generating the ranked list of searched materials per the list of criteria incorporates a relation, perspective, and/or the like, per each actor, user, contributor, participant, and/or the like.

In various non-limiting embodiments, the Potential Contribution may be Partially-Shielded, where spelling and grammar are acceptable contributions; or Fully-Shielded, for added safety, from the Lead Inventor (40) to help eliminate any disclosure to the Lead Inventor (40), while a decision, determination, and/or recommendation may be created and/or computer-implemented generated and analyzed. This Partial-Shield or Fully-Shielded Potential Contribution may also be judged and/or appraised for its Perceived Current Value and further delineated in terms of the Perceived Current Value for: improving a specific claim or a specific claim's element (e.g. U.S.C. 112) support, improving a specific inventive concept's novelty (e.g. U.S.C. 102), clarity or benefit, improving the reduction to practice ability for a specific claim or a specific claim element, creating a specific new claim, creating a specific new claim element(s), broadening a specific existing claim, narrowing a specific existing claim; along with a calculated analysis for future values over delineated time(s) and/or stage(s) (times/stages: e.g. now, FOAM during prosecution, at grant, during licensing, during a Marksman hearing, during patent litigation, during invalidity challenges, and the like for the specific claim/element.)

Generating a Ranked Search Result

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or searching (e.g. patents, patent applications, publications, and/or the like) and generating a ranked list of searched materials per a list of criteria, keywords, data/content, disclosure, claims, images, field of use, likely art unit, and/or the like. In addition, any historical data automatically, systematically, continuously, persistently, conditionally, and/or via/per actor/user-prompt included such as previous applications, disclosures, patents, publications, videos, 3D objects, audio clips, images, art, and/or the like.

Generating a Ranked and Shielded Search Result

In various non-limiting embodiments, the ranked list of searched materials may be ranked as to what is discerned and/or perceived as what, and as to what may be relatively most similar to a disclosure. In various non-limiting embodiments, the ranked list of searched materials may be shielded (e.g. see FIG. 12*s* vs. 12*b*) from certain parties/users/members (e.g. a participating inventor/lead-inventor), where a first user may be called upon to determine what data/content is actually already known to be relevant by the first user, and a second user (e.g. the participating lead-inventor), known to be relevant to just the first user, perceived to be relevant by just the first. In various non-limiting embodiments, and under certain conditions, the first user can continue to shield the data/content unbeknownst to the second user, rank the data/content from most relevant to least unbeknownst to the second user, incorporate a set of rules and/or conditions from the second user, whereby the second user accepts viewing shielded data/content and/or information regarding the shielded data/content (e.g. who are the inventors, priority dates, field of use, publication date, issued date, any assignments, and/or the like).

Shielded Data/Content Unbeknownst to an Inventor

In various non-limiting embodiments, the ranking of the data/content unbeknownst to the second user may be according to the likely benefits to the second user, an assignee, assignor, company, project, country, and/or the like; for example, where such review may save the company substantial resources and/or dollars. In various non-limiting embodiments, the ranking of the data/content unbeknownst to the second user according to the likely benefits to others (e.g. the second user, assignee, etc.) may also include a corresponding column with a range of values for a projected cost for ignoring a particular piece of art/component/element before the filing (e.g. costs and lost opportunities from now to filing), a projected cost for ignoring the particular piece of art/component/element until after filing, a projected cost for ignoring the particular piece of art/component/element until after the file is disposed (e.g. abandon, granted, and/or the like), a projected cost for ignoring the particular piece of art/component/element until after re-exam, a projected cost for ignoring the particular piece of art/component/element until after a particular trial, and/or the like, where the projected values are constantly updated based upon new data/information.

Projected Costs and Offsets Per Art/Component

In various non-limiting embodiments, the corresponding column with the range of values for the projected costs of ignoring a particular piece of art/component/element may include an offset value should the art not become and/or cited as material, where the offset value would generally and/or logically increase as the potential value of the application increases along with any increases in the likelihood of overcoming a rejection, a notice of allowance, grant, continuation filing, re-exam claim improvement, re-exam minor claim amendment, re-exam claims intact full survival, licensing deal, positive Markman outcome, litigation settlement, positive litigation decision, and/or the like. In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, scoring and ranking a satisfaction. For example, a satisfaction for a particular patent attorney, draftsperson, Joint-Inventor/Co-Inventor, data/content reviewer, patent examiner, appellate judge, federal circuit judge, federal circuit jury, and/or the like; per data/content element (e.g. per patent family, per patent application per patent granted, per patent claim, per claim limitation, per country, and/or the like).

In various non-limiting embodiments, the Perceived Current Value with its associated delineation terms and data/statistics, along with the calculated analysis for future values over the course of time and/or stages, generates an IP Value Prediction (hereinafter "IP-VP") utilizing an IP Value Prediction and Tracking System (hereinafter "IP-VPTS"), where the data, statistics, values, elements, timing-cited, stages-cited, and attributable participating parties/members and/or computer-implemented methods and/or logic of the IPVPs are stored, tracked, and compared for relative accuracy against a Future Value and an Actualized Value, where points and/or demerits could be awarded/subtracted for the relative reliability, accuracy, and/or value of the IPVP. Further, each IPVP that may be specifically attributable and measurable may be compared to other calculated IPVPs utilizing the IP-VPTS for say, each IPVP calculation, delineation term, and/or analysis. For example, for the "Relatively Same Potential Contribution," a "Relatively Similar Potential Contribution by the Same IPACE Member," a "Relatively Similar IPACE Member," a "Relatively Similar Potential Contribution by a Similar IPACE Member," and/or incorporating a "Specific IPVP Predictor," a "Similar Computer-Implemented Predictor Method" and/or a "Relatively Similar IPVP Predictor." In various non-limiting embodiments, the "Similar Computer-Implemented Predictor Method," in terms of say, relatively similar computer-implemented algorithm(s), IPACE Court case term, parties, and/or types employed, and/or the like. In various non-limiting embodiments, the "Similar IPVP Predictor" may be in terms of say, relative similar backgrounds, experience, roles, status, and/or the like.

In various non-limiting embodiments, the "Similar Potential Contribution by the Same IPACE Member," may be in terms of where the Same IPACE Member submitted a relatively Similar Claim Contribution for, say, the same specific mobile component/step in another submission, contribution, and/or within the same PTO classification (e.g. art unit).

In various non-limiting embodiments, the IP-VPTS may analyze and generate data, statistics, output, and a list of predictive score values to help the Lead Inventor (40) and/or others determine the desire and/or willingness to accept the Potential Contribution without disclosing the inventive concept and/or components. In various non-limiting embodiments, the acceptance of the Potential Contribution could be in full, partial, and/or conditionally, where independent IPACE Members could accept and/or reject certain elements of the Potential Contribution. Further, the bargain for exchange where the Lead Inventor (40) accepts the Potential Contributions to improve the patent application, may include compensation, and/or equity at the time of the Acceptance, or based upon a Future Conditionally Compensation/Equity Algorithm that incorporates a specific event, moment and/or success-based factors. In various non-limiting embodiments, the compensation and/or equity may be directly made attributable to the measurable and trackable specific Contribution.

In various non-limiting embodiments, the IP-VPTS should also track and analyze relative anomalies and/or contradictions in the comparative data/statistics, where, for example, two relatively Same Potential Contributions, say for a specific mobile component/step, are both accepted as Contributions at relatively the same moment in time for two different unrelated patent applications/inventions, and/or by two different Lead Inventors (40); and where the specific Contributions create measurably quite different IPVPs and/or where the Actualized Values for the specific Contributions attribute quite different values from each other and/or from the IPVP. In various non-limiting embodiments, these IPVP relative anomalies and/or contradictions could be analyzed to determine why Similar Contributions created quite different Actualized Values.

Further, the Future Conditionally Compensation/Equity Algorithm may incorporate additionally benefits and/or penalties to say, the Contributor (50) (i.e. a potential Joint-Inventor/Co-Inventor), if a specified Actualized Value measurably and relatively outperforms or underperforms a specifically selected and tracked IPVP. In addition, other IPACE Member Predictors may also receive a portion of the same Future Conditionally Compensation/Equity Algorithm that the Contributor (50) is participating within and/or within a separately calculated Future Conditionally Compensation/Equity Algorithm for the IPACE Member Predictor's relatively attributable accuracy or inaccuracy for specifically selected and tracked IPVPs when compared to other IPACE Member Predictors IPVPs and/or compared to specifically selected Actualized Value(s).

Semantic Web (SW) Technologies

Figure 9A:
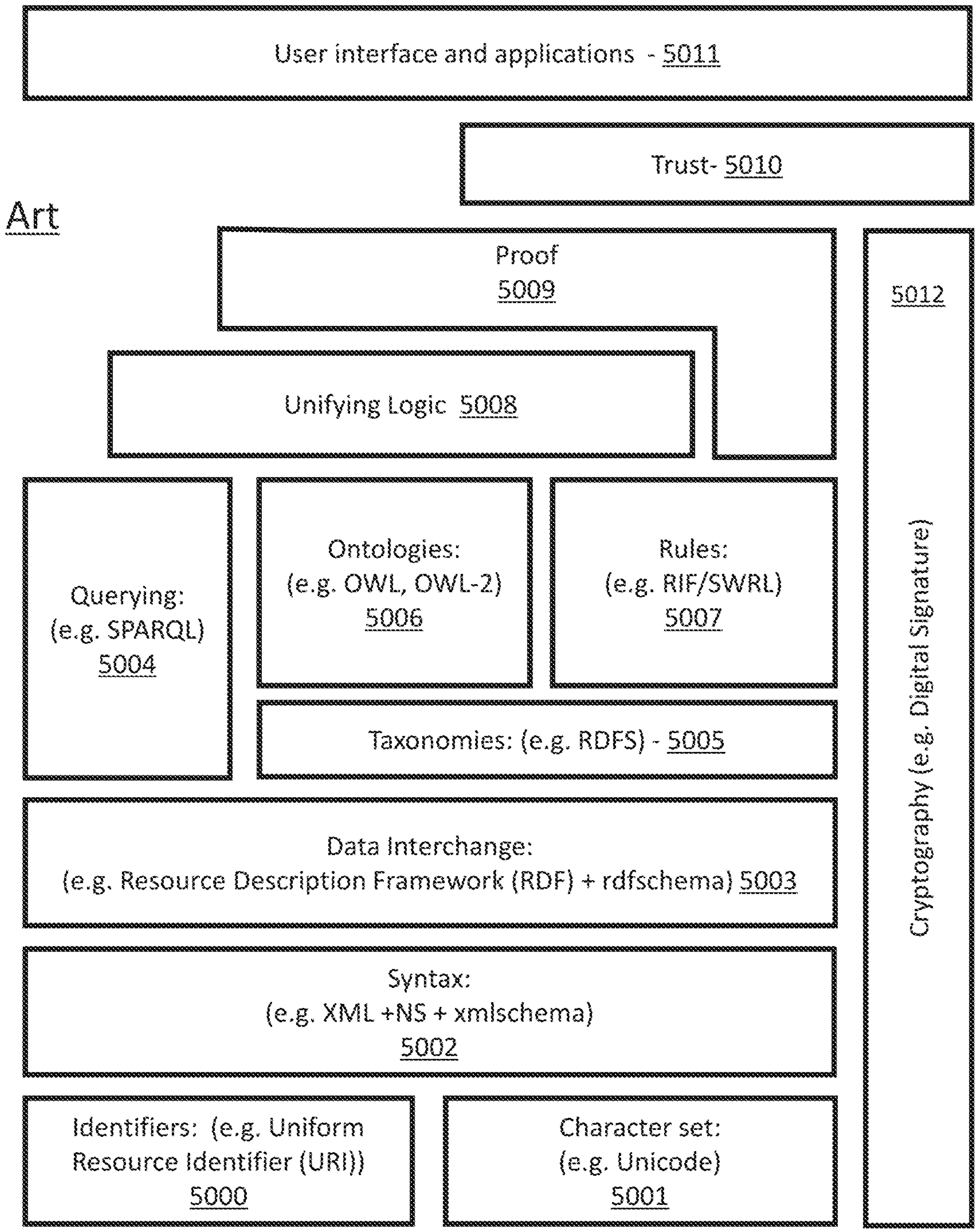
FIG. 9*a* is an illustration of a Semantic Web Architecture in Layers, according to the art.

FIG. 9*a* is an illustration of a Semantic Web Architecture in Layers, according to the art. In contrast to web linked documents that can be queried by a text string matching and relevance ranking algorithms, a Semantic Web (SW) technologies such as RDF, RDFS, ontologies, and OWL organize, manage, and provide rich user access to complex information assets. The Library of Congress and other national libraries are transitioning from MARC into an RDF/SW bibliographic framework, and have published metadata elements and vocabularies in RDF/SKOS, including those of the Resource Description and Access (RDA) cataloging code. Semantic Web technologies index library bibliographic data. In various non-limiting embodiments, the IPACE system and associated methods provides information exchange and collaboration platform based in part on relationships, where semantics helps provide the ability to classify and link enormous amounts of data.

Semantic Web Architecture in Layers

FIG. 9*a* is an illustrative embodiment of the state of the art representing an architecture of the semantic web. Per a webpage with a "Semantic Web Architecture," by Marek Obitko at: http://obitko.com/tutorials/ontologies-semantic-web/semantic-web-architecture.html. Broadly speaking, a first layer contains a Identifiers: (e.g. Uniform Resource Identifier (URI)) 5000 container and a Character set: (e.g. Unicode) 5001 container, which generally follow the features of the existing World Wide Web (WWW). Unicode 5001 is a standard of encoding international character sets and allows all human languages to be utilized by a machine/computer processor (written and read) on the web using a single standardized format. Uniform Resource Identifier (URI) 5000 is a string of a standardized format that allows to uniquely identify resources (e.g., documents).

A subset of the URI 5000 is Uniform Resource Locator (URL), which contains access mechanism and a (network) location of a document—such as http://www.example.org/. Another subset of URI 5000 is URN that allows for the identification of a resource without implying its location and means of dereferencing it—an example is urnisbn:0-123-45678-9. The usage of URI 5000 is important for a distributed internet system as it provides understandable identification of all resources. An international variant to URI is Internationalized Resource Identifier (IRI) that allows usage of Unicode characters in identifier and for which a mapping to URI 5000 is defined. Herein, any reference to URI 5000, IRI can be utilized as well, as a more general concept.

Continuing with FIG. 9*a*, a second layer contains a Syntax 5002, wherein the Syntax 5002 could include Extensible Markup Language (XML) layer with XML namespace and NML schema definitions for establishing/confirming that there is a common syntax used in the semantic web. The NML, broadly speaking, is a general purpose markup language for documents containing structured information. A NML document contains elements that can be nested and that may have attributes and content. A NML namespaces allow for specifying different markup vocabularies in a single XML document. A XML schema serves for expressing schema of a particular set of XML documents.

Broadly speaking and according to Obitko, a core data representation format for semantic web is a Resource Description Framework (RDF). The RDF is a framework for representing information about resources in a graph form. It was primarily intended for representing metadata about WWW resources, such as the title, author, and modification date of a Web page, but it can be used for storing any other data. It is based on triples, wherein a triple includes a "subject-predicate-object" that form a graph of data. Here, all data in the semantic web uses RDF as the primary representation language. The normative syntax for serializing RDF is XML in the RDF/XML form. Formal semantics of RDF are utilized and defined as well.

Per Obitko, the RDF itself serves as a description of a graph formed by the triples, where broadly speaking, anyone can define a vocabulary of terms used for a detailed description. To allow standardized description of taxonomies and other ontological constructs, a RDF Schema (RDFS) was created together with its formal semantics within RDF. RDFS can be used to describe taxonomies of classes and properties and utilized to create lightweight ontologies.

Further, more detailed ontologies may be created with a "Web Ontology Language" (OWL). The OWL, broadly speaking, is a language derived from description logics, and offers more constructs capabilities over the RDFS. The OWL is syntactically embedded into the RDF, so similar to the RDFS, the OWL provides additional standardization of vocabulary. Generally speaking, the OWL comes in three species—OWL Lite for taxonomies and simple constrains, OWL DL for full description logic support, and OWL Full for maximum expressiveness and syntactic freedom of RDF. Since OWL is based on description logic, it includes a formal semantics that is defined for this OWL language.

The RDFS and the OWL have semantics defined and this semantics can be utilized for reasoning within ontologies and knowledge bases described utilizing these languages. To provide rules beyond the constructs available from these languages, some rule languages are being standardized for the semantic web as well. Here, two standards are emerging—a RIF and a SWRL.

When querying the RDF data, as well as RDFS and OWL ontologies with knowledge bases, a Simple Protocol and RDF Query Language (SPARQL) is available. The SPARQL is SQL-like language, but utilizes the RDF triples and resources for both a matching of part of a query and for a returning of results of the query. Since both the RDFS and the OWL are built on the RDF, SPARQL can be utilized for directly querying ontologies and knowledge bases, as well. In addition to being a query language, the SPARQL is also a protocol for accessing RDF data.

According to Obitko article cited above, it is expected that all the semantics and rules will be executed at the layers below Proof and the result will be used to prove deductions. Obitko continues that formal proof together with trusted inputs for the proof will mean that the results can be trusted, which is shown in a top layer (under UI & Applications) of FIG. 9*a*.

Figure 9B:
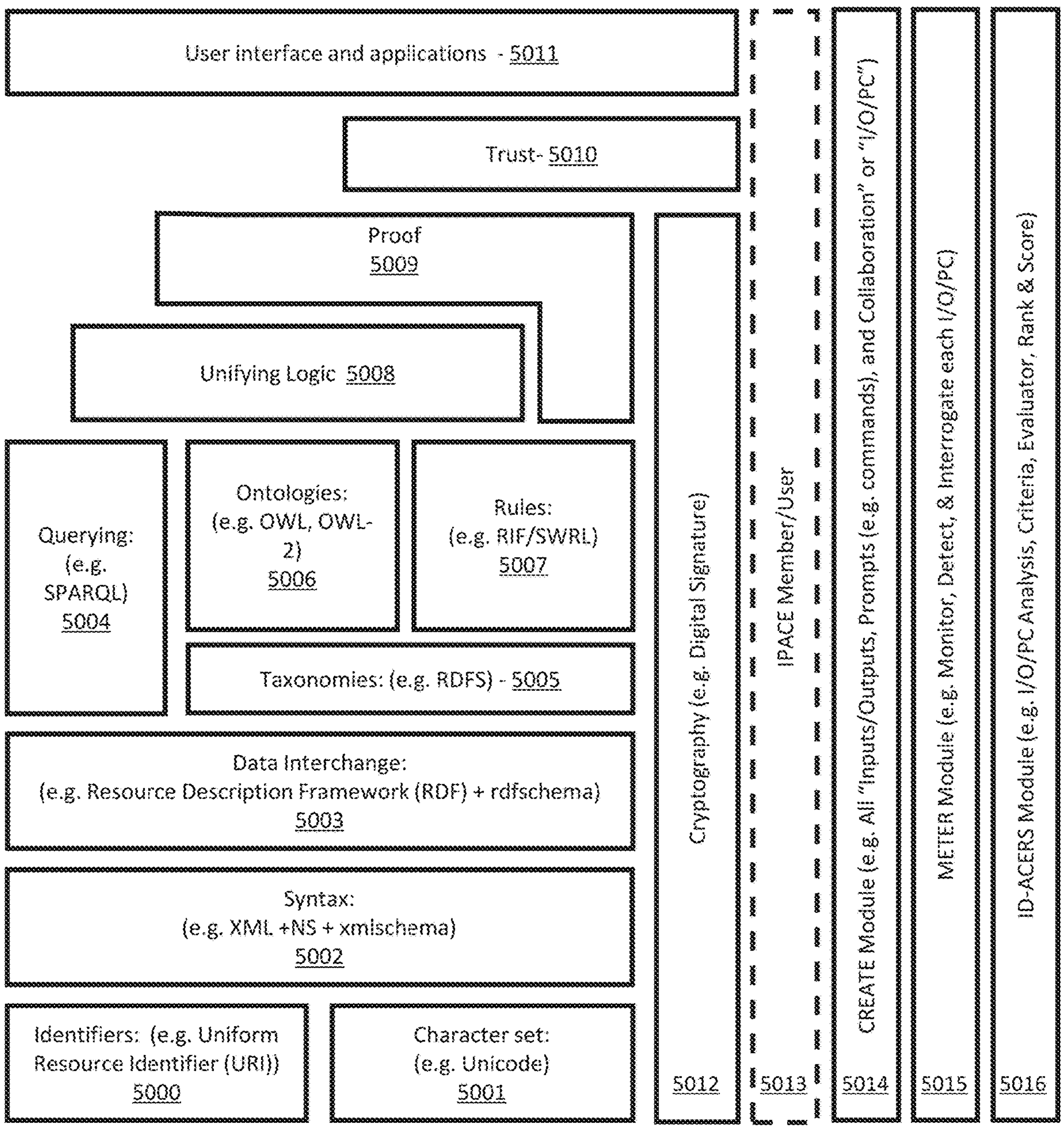
FIG. 9*b* is an illustrative example of the Semantic Web Architecture in Layers extended to include the IPACE Member/User (as a potential ID-ACERS source), the CREATE module, the METER module, and the ID-ACERS module 5016, for collecting, monitoring, and validating data per perspective, bottom to top, in a non-limiting embodiment.

FIG. 9*b* is an illustrative example of the Semantic Web Architecture in Layers extended to include the IPACE Member/User (as a potential ID-ACERS source), the CREATE module, the METER module, and the ID-ACERS module 5016, for collecting, monitoring, and validating data per perspective, bottom to top, in a non-limiting embodiment. For reliable inputs, cryptography means were illustrated in FIG. 9*a*, such as digital signatures for verification of the origin of the sources where on top of these layers, application with user interface can be built.

The levels of Proof and Trust mentioned by Obitko has limitations. For instance, limitations in expressing a perspective, scope, statement perspective, goal, agenda, purpose, value, party-specific meaning and relevance, say according to a particular perspective. Challenges arise determining the relationship of facts vs. assumptions, especially relative a perspective (e.g. an inventor), group of perspectives (e.g. a list of named infringers/defendants), or a segment of perspectives (e.g. USPTO examiners per an art unit).

Herein the present disclosure, the IPACE system with its sub-modules (ID-ACERS, METER, CREATE, AIS) improves the relative reliability (PROOF and TRUST) of data and associate a scope, statement, goal, perspective, agenda, purpose, party-specific meaning (e.g. plaintiff vs. defendant), and relevance, wherein the ID-ACERS is employed to persistently evaluate data, relationships, values, and perspectives relative to a particular user, group of users, segment of users, some combination of these (with intelligent dynamic weighting conditions), some permutation of theses (with intelligent dynamic weighting conditions), and/or the like.

FIG. 9*b* is an illustrative embodiment of an IPACE employing a semantic web-like architecture (e.g. for web, closed environments. In various non-limiting embodiments the IPACE semantic engines are operationally connected to networks beyond the WWW, wherein some networks are PINs and may or may not be shielded from outsiders (e.g. non-approved users), and/or offer limited interactions, on a case-by-case basis. In addition, these limited interactions may involve current data, ontologies, vocabularies, taxonomies, logic, proof scores, trust scores, perspectives, and/or the like.

In some instances, the limited interaction may be restricted to a particular window of time. For example, during patent prosecution situations can arise where a "state-of-knowledge" relative to a Person Having Ordinary Skill in The Art (PHOSITA) to a particular art (e.g. PTO art unit, industry, or similar) or a specific art (e.g. GPS transponders) relative to a moment in time is sought/required. For instance, the "state-of-knowledge" sought could be from the PHOSITA who is an electrical engineer with experience in satellite communications—but not now, instead, (for instance) when a particular patent claim being prosecuted was applied for, say Dec. 12, 2002. Here the "state-of-knowledge" is rather difficult to discern, especially when you consider that the PTO examiner who is, say 26 years old, was, say only 15 years old at the time the particular patent application with the particular patent claim was filed.

Here the IPACE system allows for the "state-of-knowledge" to be encapsulated relative to a particular moment/window-in-time, &/or frozen at a moment in time (e.g. historically), here in this instance: Dec. 12, 2002. Further, where information can be retrieved, submitted, merged, evaluated, and/or the like to isolated data sources, support, novelty (relative to time) and anomalies. Where a regression analysis over iterative intervals of time (working regressively) would not only display a visual representation of an evolution of a particular patent claim, product, technology, domain, expertise, and/or the like, in reverse visually, but could isolate the pioneers. Further, it could visually isolate and display relative advances per source in the progress of new technology. Clustering statistical analysis and heat maps could reveal patterns and trends relative to earlier discoveries, shared knowledge, collaborations, and/or the like. Where additional analysis and evaluation would preferably generate a scoring system per patent claim, per product, per technology, per domain, and/or the like relative to those the sources of earlier contributions. Where the earlier contributions would comprise, articles, inventions, research, budgets, brainstorming sessions, communications/interactions, events, and/or the like.

Figure 9C:
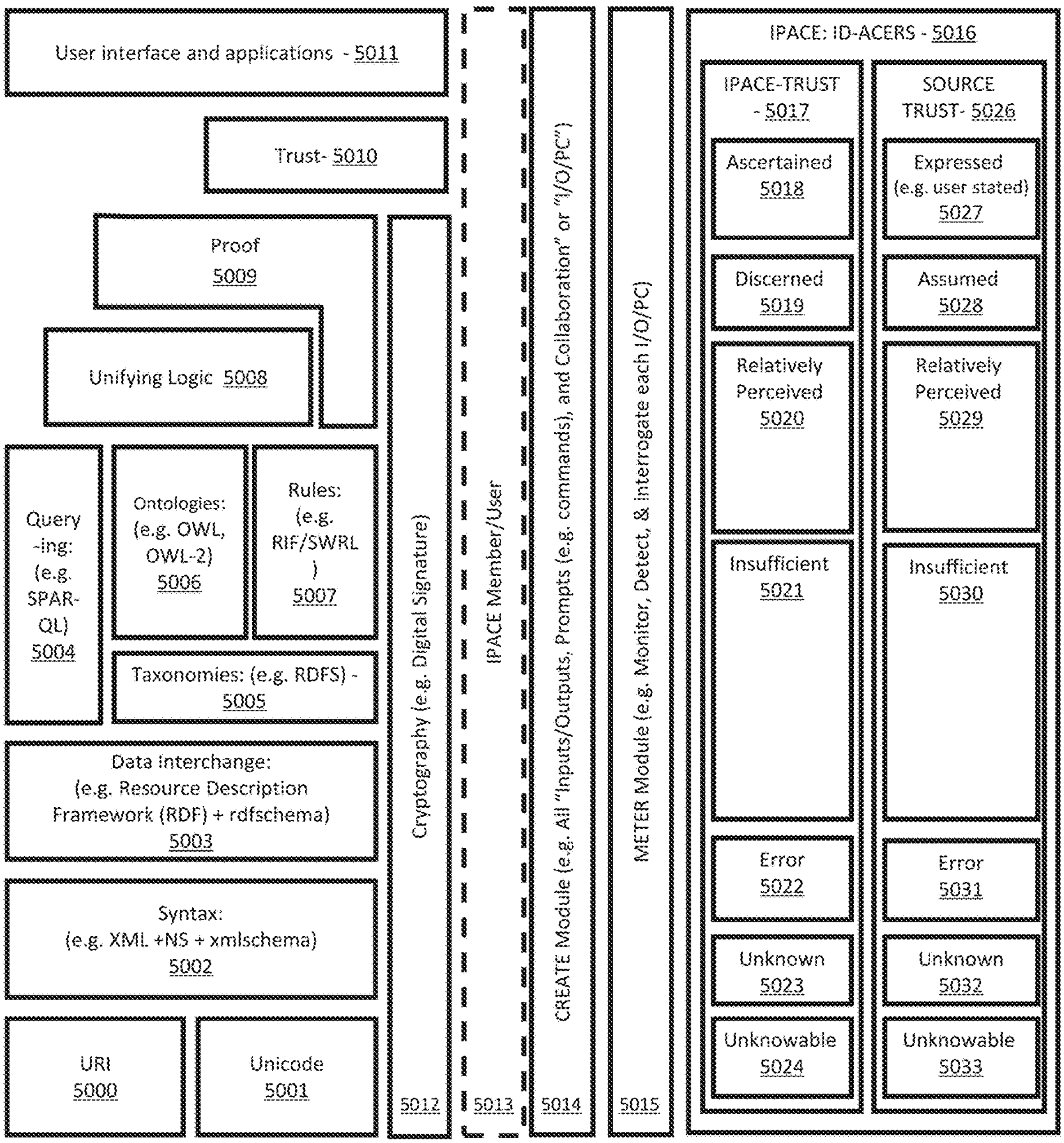
FIG. 9*c* is also an illustrative example of the Semantic Web Architecture in Layers, where the IPACE: ID-ACERS is expanded to depict a degree of Trust range (not necessarily relative to Semantic Web Layers, but relative to the evolution from an Unknowable 5024 I/O/PC up to the an Ascertained 5018 trust level under the IPACE Trust vs. Perspective of the Source's Trust 5026.

In FIG. 9*b*, the subset of the URI 5000 is Uniform Resource Locator (URL), which contains access mechanism and a (network) location of a document—includes: http://www.USPTO.gov. The IPACE system and databases may employ triple stores, and other metadata schemes, and many other types of information organization applications, say librarian-based, catalog-based, metadata-based, taxonomy-based, ontology-based, and/or the like. FIG. 9*c* is also an illustrative example of the Semantic Web Architecture in Layers, where the IPACE: ID-ACERS is expanded to depict a degree of Trust range (not necessarily relative to Semantic Web Layers, but relative to the evolution from an Unknowable 5024 I/O/PC up to the an Ascertained 5018 trust level under the IPACE Trust vs. Perspective of the Source's Trust 5026 (more details in FIGS. 12*a*-12*m*).

Figure 10A:
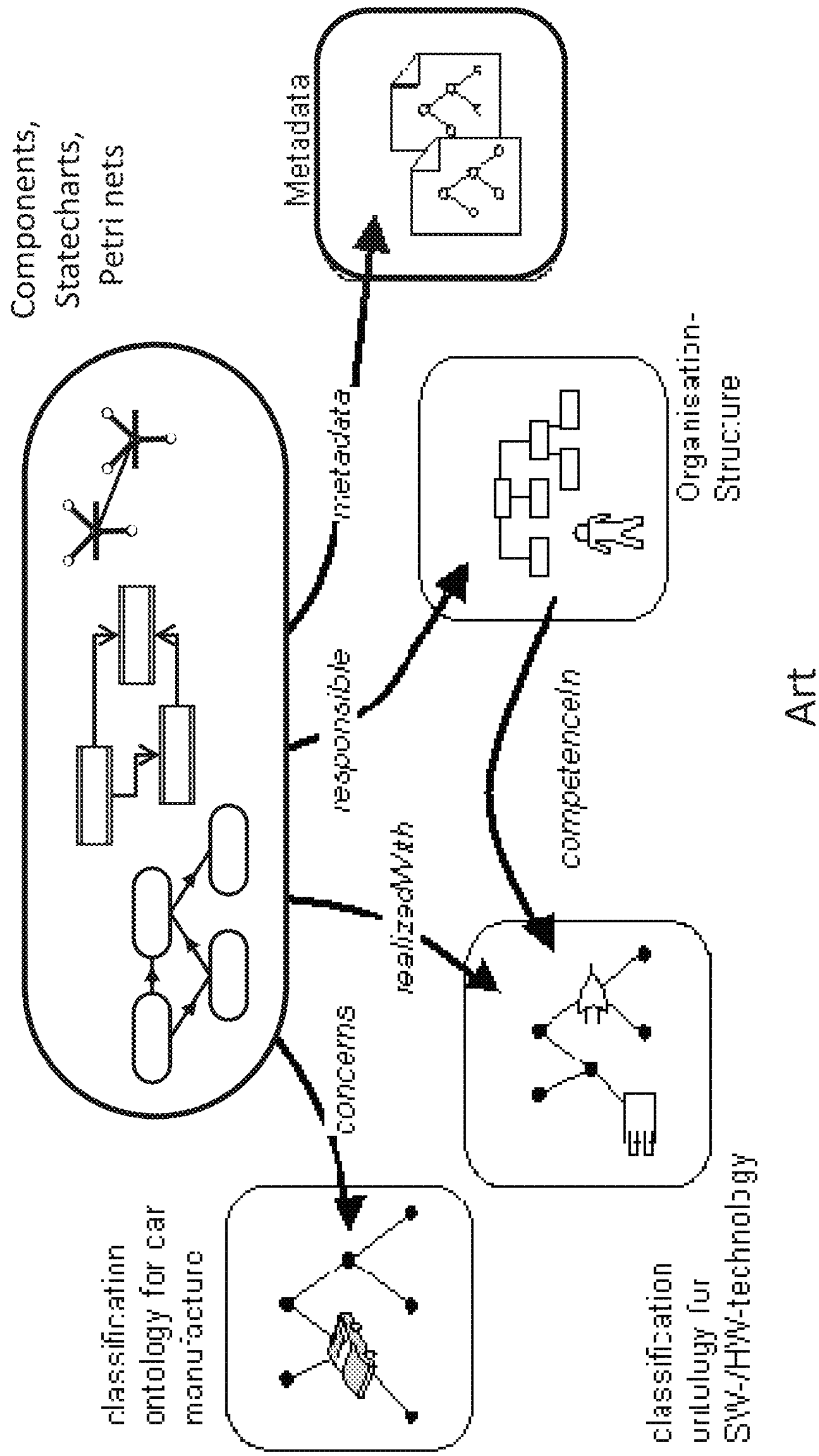
FIG. 10*a* is an illustration of Ontology Management utilizing TRIPLEs to achieve an Integrative Usage of three entities: (1) Partitions, (2) Derivations, and (3) Transformations, called a domain artifacts, according to the art.
Figure 10B:
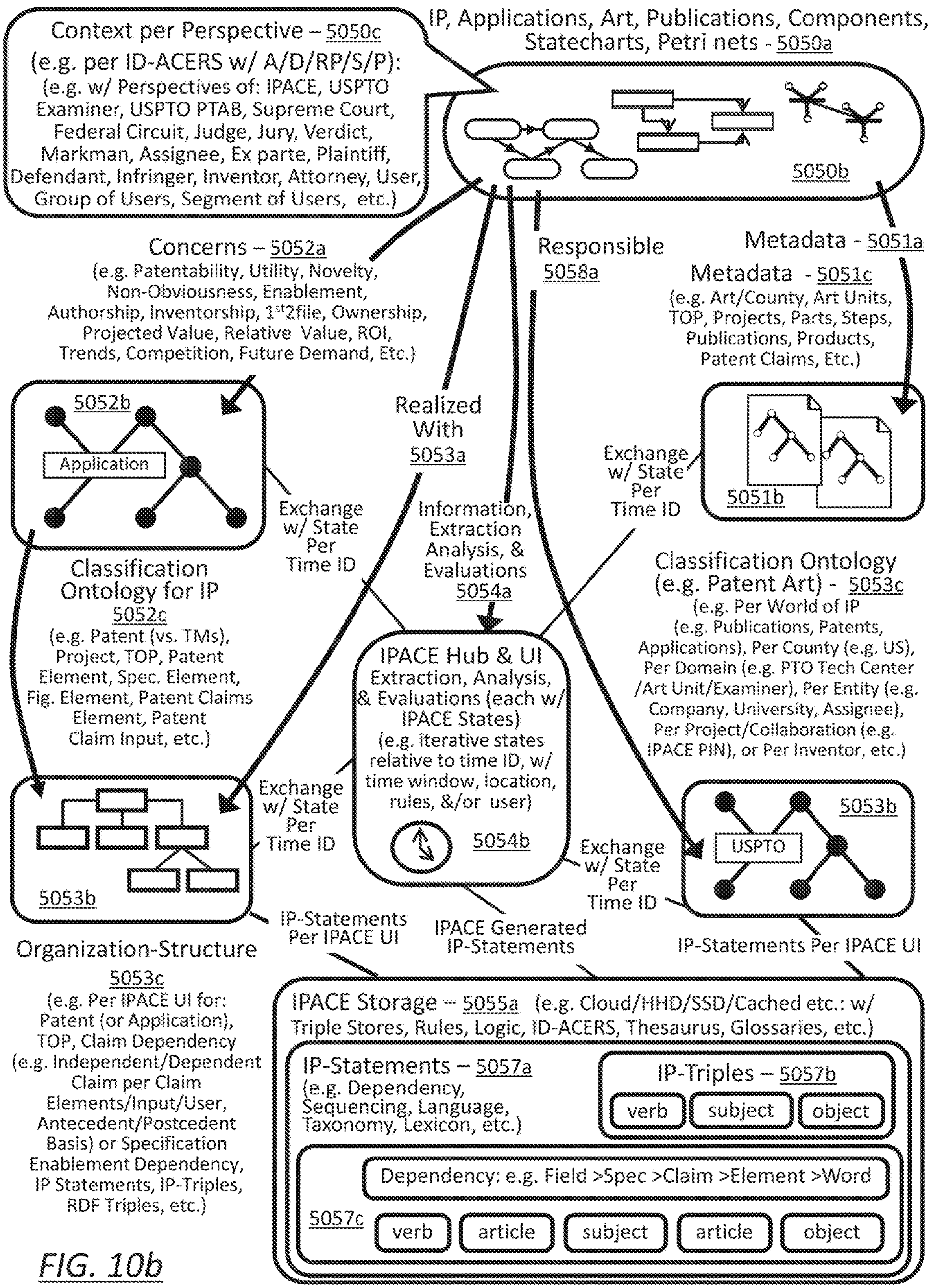
FIG. 10*b* is an illustrative example of Ontology Management utilizing the IPACE Hub and UI where there is an exchange of Concerns, Realizations, Responsibilities, Metadata, Perspectives, and/or the like, incorporated TRIPLEs, an IPACE Enhanced IP-TRIPLEs, and an IPACE Enhanced IP-TRIPLE statements.

FIG. 10*a* is an illustration of Ontology Management utilizing TRIPLEs to achieve an Integrative Usage of three entities: (1) Partitions, (2) Derivations, and (3) Transformations, called a domain artifacts, according to the art. FIG. 10*b* is an illustrative example of Ontology Management utilizing the IPACE Hub and UI where there is an exchange of Concerns, Realizations, Responsibilities, Metadata, Perspectives, and/or the like, incorporated TRIPLEs, an IPACE Enhanced IP-TRIPLEs, and an IPACE Enhanced IP-TRIPLE statements.

According to the web link: http://www.w3.org/2004/12/rules-ws/paper/98/, the TRIPLE was designed as a practical rule language for data manipulation applications. The concept of the Semantic Web has a variety of purposes, functions, utilities, and benefits. For example, the Semantic Web for AI-style (e.g. the IPACE subsystem AIS) semantic knowledge representation, which leads to knowledge representation languages like OWL.

Another benefit of the Semantic Web is overcoming the syntax of data so that users and developers can concentrate on the semantics of information. For example, the languages and tools for the Semantic Web where it leads to easier and cheaper publishing, understanding, utilization, and reusing of data and services on the Web in an interoperable, collaborative, and scalable way. Generally, languages that help define how different data sets and vocabularies relate to each other are necessary; as languages help provide the glue between (distributed) information systems and data sets. However, designing rule languages for the Semantic Web can present challenges.

A task often cited to achieve on the Semantic Web is to provide tools that drive down the cost of establishing interoperability between different data providers. A rule language can help here: writing rules is generally speaking, relatively faster and cheaper than writing program code, since a rule language has more declarative features and is usually not burdened with the details of a general programming language. Rules typically provide benefits over a software (&/or application, platform, etc.) produces life cycle.

Standardizing such a rule language can several benefits, such as allowing for rule sharing or "knowledge" about how to achieve interoperability. Here, the rule language for the Semantic Web may be seen as a data transformation and glue language—in contrast to a knowledge representation language, which captures knowledge about a certain domain (e.g. Intellectual Property). Broadly speaking, a specific rule language needs a defined semantics (as a basis for implementation) and efficient evaluation mechanisms.

FIG. 11 a is an illustration of a Triple per the Resource Description Framework, according to the art. FIG. 11*b* is an illustrative example of a non-limiting embodiment of the IPACE Enhanced IP-TRIPLEs and the IPACE Enhanced IP-TRIPLE statements which a relationship connection to FIG. 11*c*. FIG. 11*c* is an illustrative example of an non-limiting embodiment of a simplified IP-TRIPLEs (similar to the TRIPLE), where there are relationships for evaluating and prioritizing a variety of options relative to a patent claim, claim element, and/or word selection. FIG. 11*d* is an illustrative example of a non-limiting embodiment of a complex IP-TRIPLEs, where there are relationships mappings and evaluating parameters for all the elements of an independent claim, along with their dependencies, antecedent basis, and statements, inside the claim.

Figure 11D:
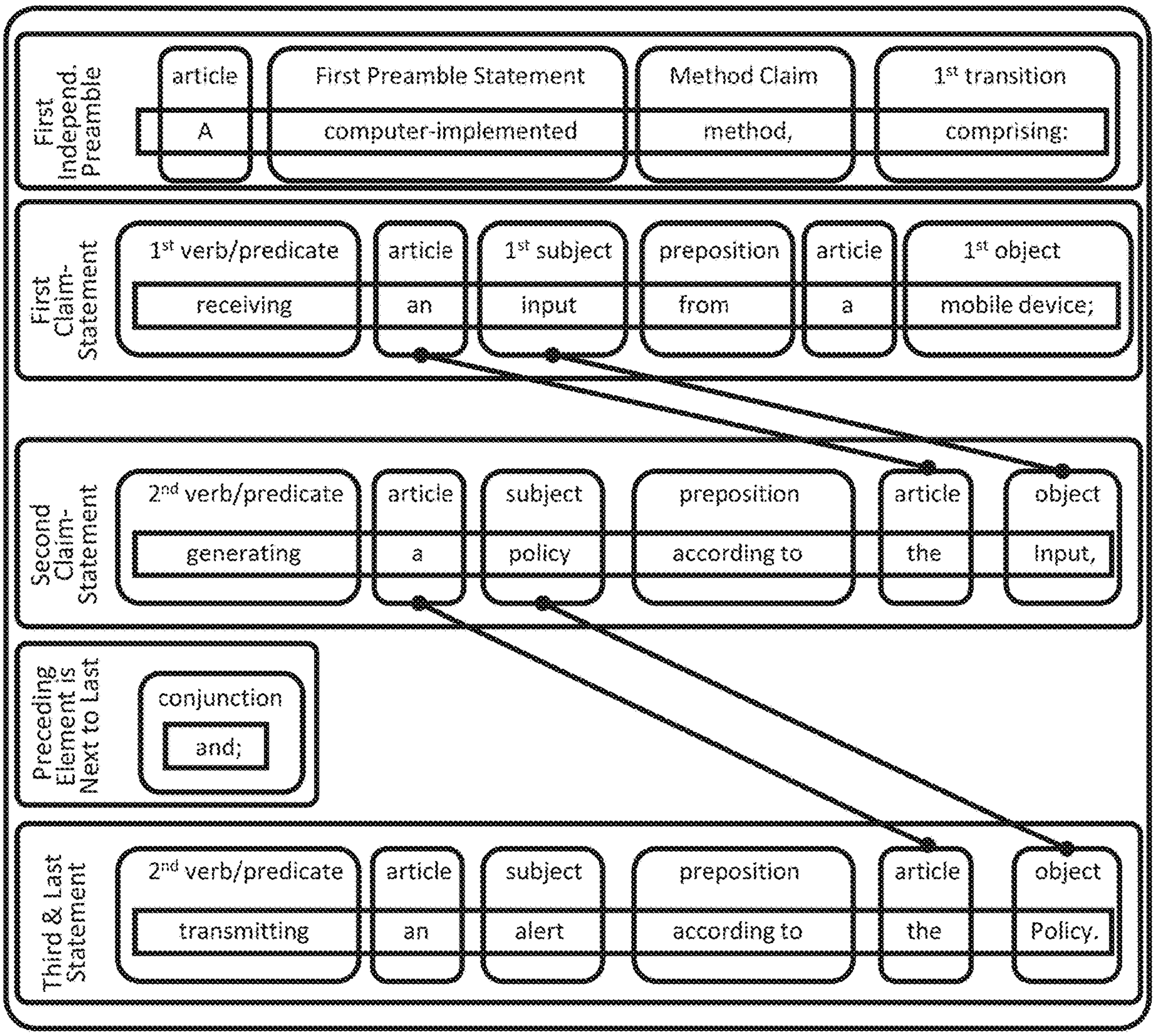
FIG. 11*d* is an illustrative example of a non-limiting embodiment of a complex IP-TRIPLEs, where there are relationships mappings and evaluating parameters for all the elements of an independent claim, along with their dependencies, antecedent basis, and statements, inside the claim.
Figure 11E:
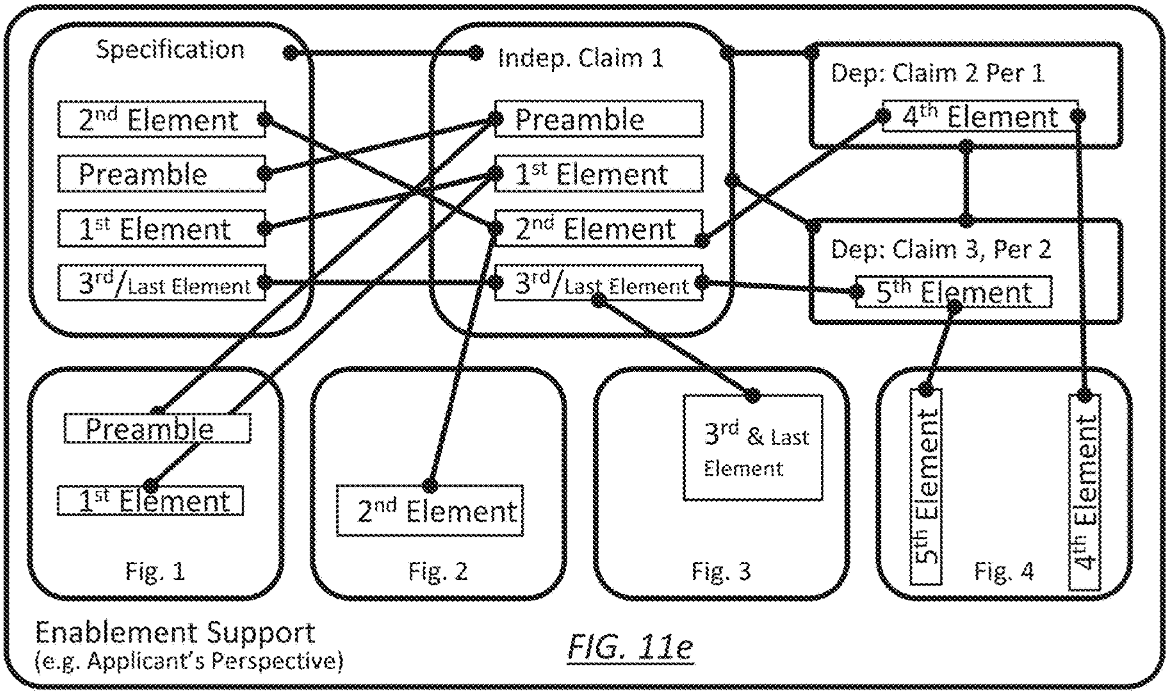
FIG. 11*e* is an illustrative example of a non-limiting embodiment of relational mapping and schema for determining, evaluating, and visually representing an "Enablement Support" (e.g. from an Applicant's perspective).
Figure 11F:
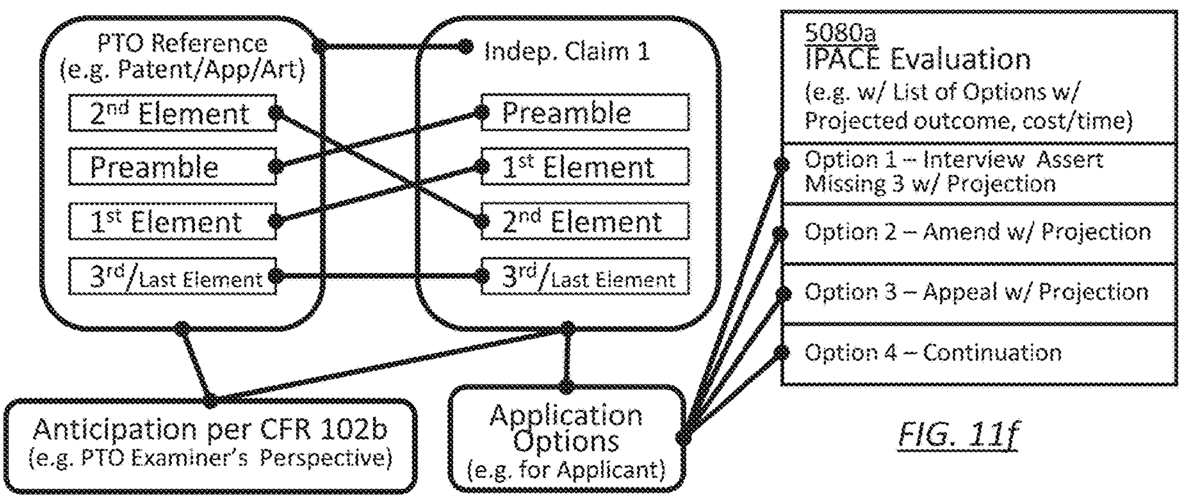
FIG. 11*f* is an illustrative example of a non-limiting embodiment of relational mapping and schema for determining, evaluating, and visually representing an "Anticipation" (e.g. from a PTO examiner's perspective), wherein the IPACE generates a variety of scored options, including a projected outcome per each.
Figure 11G:
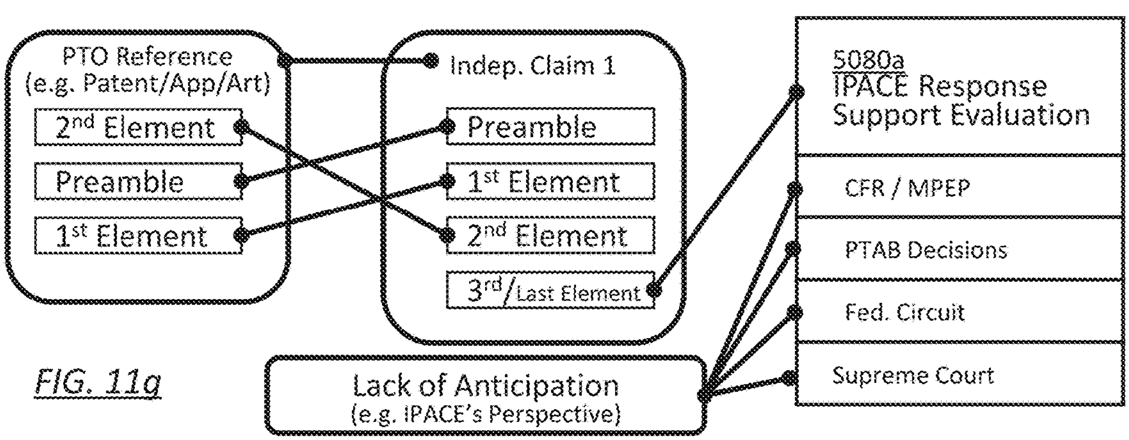

FIG. 11*e* is an illustrative example of a non-limiting embodiment of relational mapping and schema for determining, evaluating, and visually representing an "Enablement Support" (e.g. from an Applicant's perspective). FIG. 11*f* is an illustrative example of a non-limiting embodiment of relational mapping and schema for determining, evaluating, and visually representing an "Anticipation" (e.g. from a PTO examiner's perspective), wherein the IPACE generates a variety of scored options, including a projected outcome per each. FIG. 11*g* is an illustrative example of a non-limiting embodiment of relational mapping and schema for determining, evaluating, and visually representing a "Lack of Anticipation" (e.g. from the IPACE's perspective, e.g. AIS), wherein the IPACE generates a variety of scored option responses for the Applicant to consider, including links to support, sources, previous cases that were relatively similar.

According to the present disclosure, a patent claim input can be broken down into segments, and the segments can themselves be broken down into segments, so as to create a framework for analyzing the patent claim input.

A first step of segmenting a patent claim input might be to determine whether the input represents a partial patent claim, a complete claim or a set of patent claims and, if the latter, the relationship of the different claims to one another. For example, a dependent claim might add one or more elements to a claim from which it depends, or modify one or more elements to a claim from which it depends, whereas a new independent claim might do both.

A second step of segmenting a patent claim input might be to establish the relationships of words within a given claim or partial claim and/or classify the type of claim. For example, a claim might be determined to be an apparatus claim or a method claim, and different rules might be established for analyzing the claim dependent upon its classification. Apart from its classification, a claim might be broken down into a preamble, elements or steps, and explanatory language found in a whereas clause or a modification to an element or step. As part of this process, punctuation, articles and words can be used to trigger relationships. For example, articles "a" and "an" would denote a new element or step (assuming correct claim antecedent basis is being utilized, which is an assumption that can be tested by IPACE/ID-ACERS, whereas articles "the" and "said" would denote reference to a previously established element or step (again, assuming correct claim antecedent basis is being utilized), while words like "wherein" and "whereas" or punctuation, like a semicolon, can help identify changes or transitions to a new element of a claim. As part of this segmentation process, plurals (e.g., "plurals," meaning more than one) and commonly used identifiers for plurals (e.g., "a plurality" or "more than one"), as well as other explanatory phrases or words (e.g., "at least one" or the words "comprising" or "consisting of" or "consisting essentially of") can be identified and their relationship noted with respect to a word or words with which they are associated.

A third step of segmenting a patent claim input might be to further segment elements or steps so as to identify relationships of words within them, as well as analyze semantic meanings of words. In this step relationships between elements repeated within a claim can be used to help define relationships and semantic meaning. For example, a first element might be identified as a portion of a claim, and the relationship of the first element to a second or third element might appear when the additional elements are discussed. Similarly, relationships between elements might be set forth in one or more whereas clauses.

When the segmenting and development of relationships is completed, the patent claim input can be expressed in a new format that identifies the functional relationship of words within the patent claim input. This new format can itself be used for purposes of patent searching and can be used to generate a new patent claim input that emphasizes differences and similarities between the patent claim input and a database to which it is being compared. For example, assume that a patent claim input is a single claim and it has six simple elements, five of which are included in a single file or reference (e.g., a patent) in a database being used for comparison. In this example the new patent claim input could identify the one element not found in the single file or reference as being a missing element while the other five elements are not, in much the same fashion as a Jepson claim might be written in which common features of an invention found in the prior art are identified and then the new (e.g. novel) element(s) is identified. This type of new patent claim input can have value not only in identifying what might be new, but also in identifying what type of search might prove useful for purposes of evaluating the patent claim input. For example, one might be aware of art that may be relevant to the patent claim input that is not electronically searchable, and thus an identification of the sixth element in this example could prove useful in researching such art. Similarly, the same information could be used by a company or inventor as an indication of an area where further development might prove more profitable than development of the other five elements.

Figure 12A:
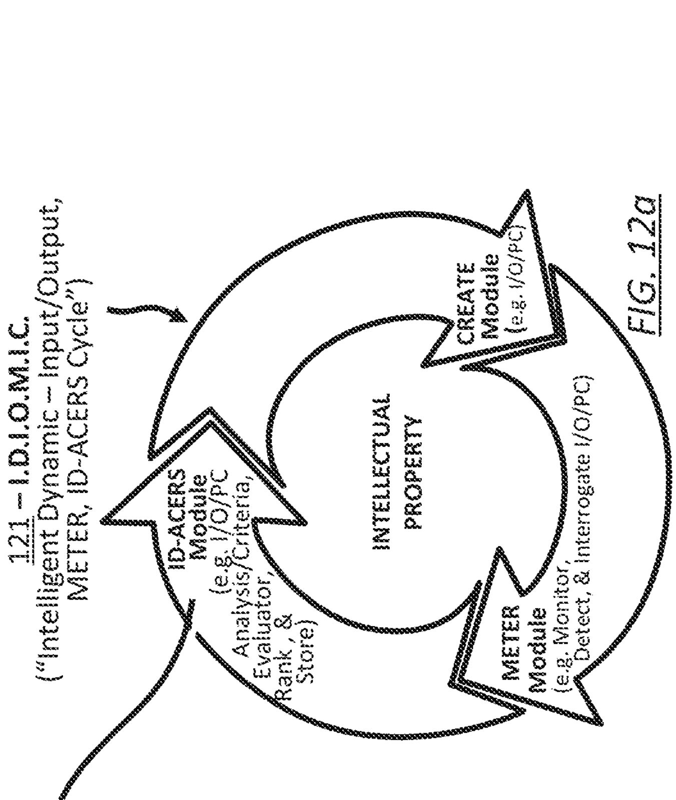
FIG. 12*a* is a depiction of an illustrative example of an Intelligent Dynamic—Input/Out, METER, ID-ACERS Cycle (I.D.I.O.M.I.C.) in an embodiment.

FIG. 12*a* is a depiction of an illustrative example of an Intelligent Dynamic—Input/Out, METER, ID-ACERS Cycle (I.D.I.O.M.I.C.) in an embodiment. FIG. 12*b* (also see FIG. 12*m*) is a depiction of an illustrative example of the IPACE's ID-ACERS module/Engine in an embodiment. In various non-limiting embodiment, the ID-ACERS of the IPACE system, evaluates a first profile associated with a node (e.g. computer, mobile device) to isolate a missing attribute; generating a list of prioritized sources to retrieve the missing attribute, based upon a prior success of retrieving the missing attribute for a second profile; interrogating the list of prioritized sources to collect and electronically store the missing attribute, wherein the missing attribute becomes a collected attribute; evaluating the collected attribute according to a criteria to determine a value, in terms of the value (also relationship/triple/meaning/statement/assignment) being ascertained, discerned, relatively perceived, stated (e.g. by a user/source), predicted value, or previous value/relationship; based upon the criteria for each, wherein the IPACE system persistently attempts to test and validate the scoring/values/relationships per value/relationship/triple/meaning/statement/assignment per source and collectively for the IPACE. In addition, the values/relationships/triples/meanings/statements/assignments being ascertained, discerned, relatively perceived, stated (e.g. by a user/source), and/or the like can be compared with a previously predicted value, or previous A/D/RP/S value/relationship/triple/meaning/statement/assignment.

Figure 12C:
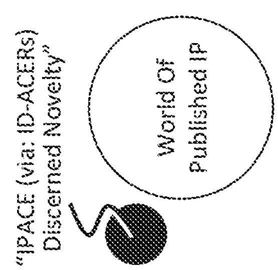
FIG. 12*c* is a depiction of an illustrative example of the IPACE's ID-ACERS module/engine Discerned Novelty relative to a World of Published IP, wherein there is no overlap (meaning novelty), in an embodiment.
Figure 12D:
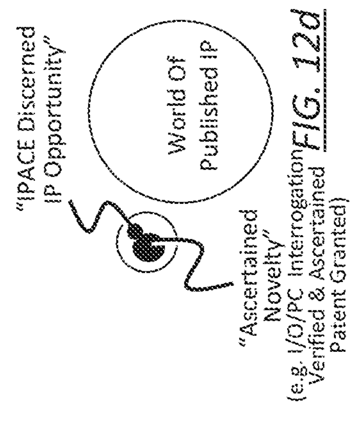
FIG. 12*d* is a depiction of an illustrative example of the IPACE's ID-ACERS module/engine Discerned Novelty relative to a World of Published IP, wherein in the IPACE isolates an IP Opportunity, in an embodiment.
Figure 12B:
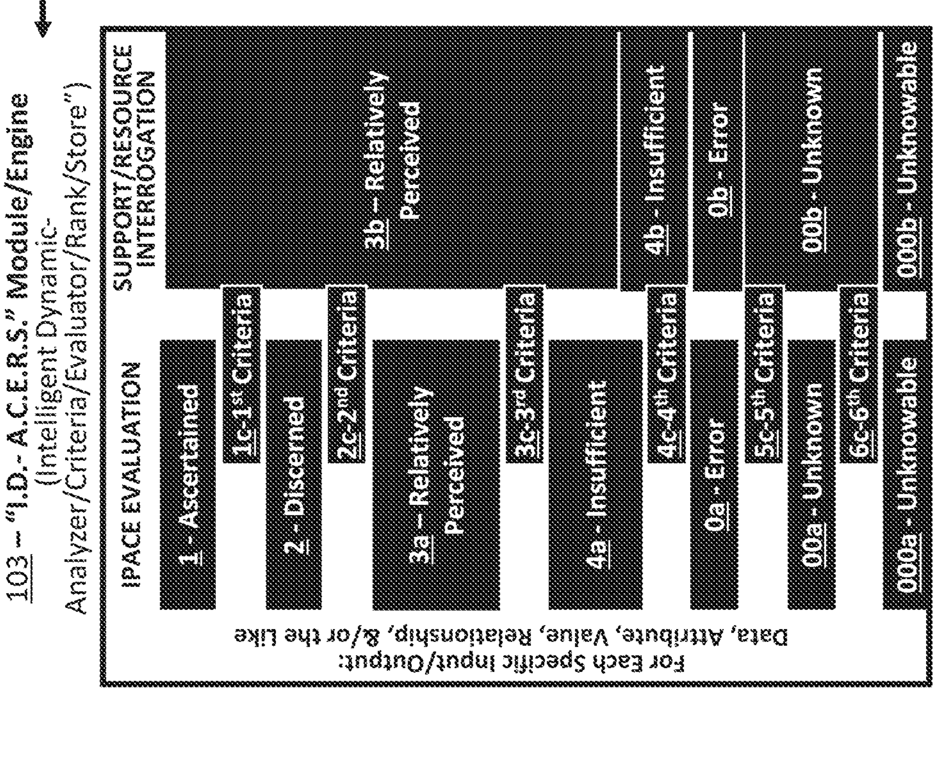
FIG. 12*b* is a depiction of an illustrative example of the IPACE's ID-ACERS module/engine in an embodiment.

FIG. 12*c* is a depiction of an illustrative example of the IPACE's ID-ACERS module/engine Discerned Novelty relative to a World of Published IP, wherein there is no overlap (meaning novelty), in an embodiment. FIG. 12*d* is a depiction of an illustrative example of the IPACE's ID-ACERS module/engine Discerned Novelty relative to a World of Published IP, wherein in the IPACE isolates an IP Opportunity, in an embodiment.

Figure 12E:
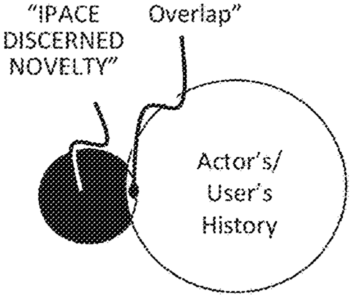
FIG. 12*e* is a depiction of an illustrative example of the IPACE's ID-ACERS module/engine Discerned Novelty relative to an Actor's/User's History, wherein in the IPACE system displays an discerned relative overlap with the Actor's/User's History, in an embodiment.
Figure 12F:
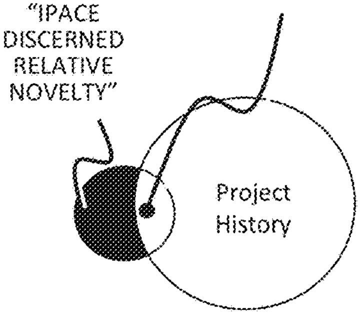
FIG. 12*f* is a depiction of an illustrative example of the IPACE's ID-ACERS module/engine Discerned Novelty relative to a Project History, wherein in the IPACE system displays a discerned relative overlap with the Project History, in an embodiment.
Figure 12G:
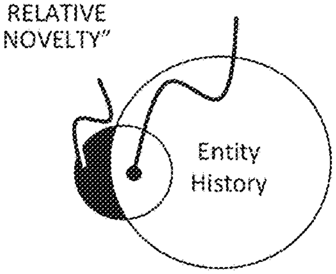
FIG. 12*g* is a depiction of an illustrative example of the IPACE's ID-ACERS module/engine Discerned Novelty relative to an Entity History (e.g. a company, university, inventor's club, US, etc.); wherein in the IPACE system displays a discerned relative overlap with the Entity History, in an embodiment.
Figure 12H:
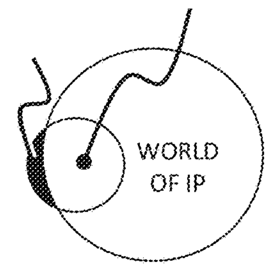
FIG. 12*h* is a depiction of an illustrative example of the IPACE's ID-ACERS module/engine Discerned Novelty relative to a World of IP (e.g. patents, trademarks, copyrights, etc.), wherein in the IPACE system displays a discerned relative overlap with the World of IP, in an embodiment.

FIG. 12*e* is a depiction of an illustrative example of the IPACE's ID-ACERS module/engine Discerned Novelty relative to an Actor's/User's History, wherein in the IPACE system displays an discerned relative overlap with the Actor's/User's History, in an embodiment. FIG. 12*f* is a depiction of an illustrative example of the IPACE's ID-ACERS module/engine Discerned Novelty relative to a Project History, wherein in the IPACE system displays an discerned relative overlap with the Project History, in an embodiment. FIG. 12*g* is a depiction of an illustrative example of the IPACE's ID-ACERS module/engine Discerned Novelty relative to an Entity History (e.g. a company, university, inventor's club, US, etc.), wherein in the IPACE system displays an discerned relative overlap with the Entity History, in an embodiment. FIG. 12*h* is a depiction of an illustrative example of the IPACE's ID-ACERS module/engine Discerned Novelty relative to a World of IP (e.g.

patents, trademarks, copyrights, etc.), wherein in the IPACE system displays an discerned relative overlap with the World of IP, in an embodiment.

Figure 12I:
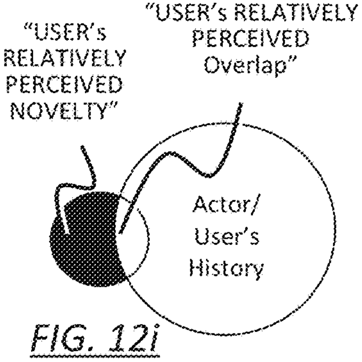
FIG. 12*i* is a depiction of an illustrative example where the IPACE's ID-ACERS module/engine displays a User's Relatively Perceived Novelty, wherein IPACE system evaluates and displays an Overlap with the User's Relatively Perceived Overlay (e.g. previously performed, created, prior art, input), in an embodiment.
Figure 12J:
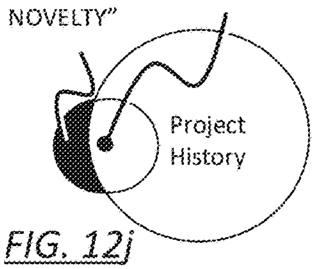
FIG. 12*j* is a depiction of an illustrative example where the IPACE's ID-ACERS module/engine displays an Entity's Relatively Perceived Novelty, wherein IPACE system evaluates and displays an Overlap with the Entity's Relatively Perceived Overlap relative to a Project History (e.g. previously performed, created, prior art, input), in an embodiment.
Figure 12K:
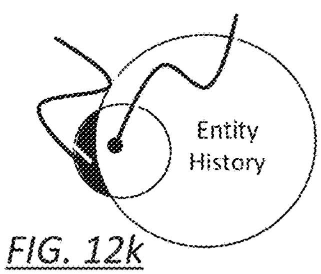
FIG. 12*k* is a depiction of an illustrative example where the IPACE's ID-ACERS module/engine displays an Actor's Relatively Perceived Novelty, wherein IPACE system evaluates and displays an Overlap with the Actor's Relatively Perceived Overlap relative to an Entity History (e.g. previously performed, created, prior art, input), in an embodiment.
Figure 12L:
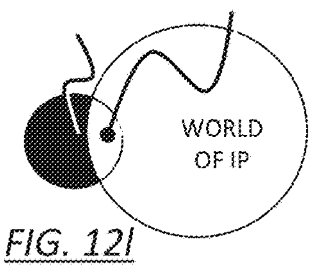
FIG. 12*l* is a depiction of an illustrative example where the IPACE's ID-ACERS module/engine displays a USPTO's Relatively Perceived Novelty (e.g. per 102/anticipation assertion in a USPTO office action), wherein IPACE system extracts and displays an Overlap with the USPTO's Relatively Perceived Overlap relative to a World of IP (e.g. previously filed, published, US prior art, outside the US, and/or as defined by user, actor, entity, IPACE member, IPACE system, and/or similar of patents), in an embodiment.

FIG. 12*i* is a depiction of an illustrative example where the IPACE's ID-ACERS module/engine displays a User's Relatively Perceived Novelty, wherein IPACE system evaluates and displays an Overlap with the User's Relatively Perceived Overlay (e.g. previously performed, created, prior art, input), in an embodiment. FIG. 12*j* is a depiction of an illustrative example where the IPACE's ID-ACERS module/engine displays an Entity's Relatively Perceived Novelty, wherein IPACE system evaluates and displays an Overlap with the Entity's Relatively Perceived Overlap relative to a Project History (e.g. previously performed, created, prior art, input), in an embodiment. FIG. 12*k* is a depiction of an illustrative example where the IPACE's ID-ACERS module/engine displays an Actor's Relatively Perceived Novelty, wherein IPACE system evaluates and displays an Overlap with the Actor's Relatively Perceived Overlap relative to an Entity History (e.g. previously performed, created, prior art, input), in an embodiment. FIG. 12*l* is a depiction of an illustrative example where the IPACE's ID-ACERS module/engine displays a USPTO's Relatively Perceived Novelty (e.g. per 102/anticipation assertion in a USPTO office action), wherein IPACE system extracts and displays an Overlap with the USPTO's Relatively Perceived Overlap relative to a World of IP (e.g. previously filed, published, US prior art, outside the US, and/or as defined by user, actor, entity, IPACE member, IPACE system, and/or similar of patents), in an embodiment.

Figure 12M:
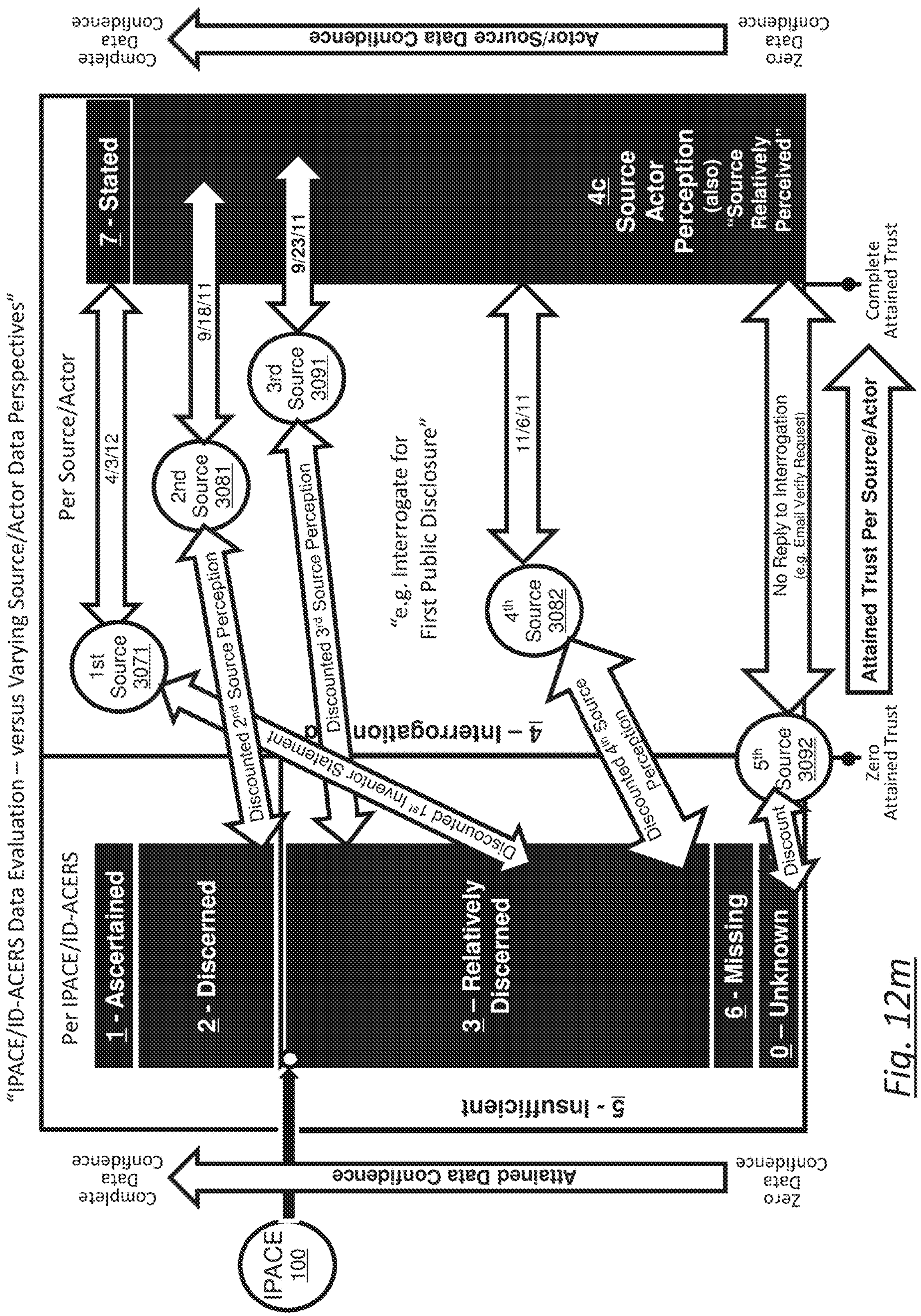
FIG. 12*m* depicts a graph example and non-limiting embodiment of the "IPACE/ID-ACERS Data Evaluation—versus Varying Source/Actor Data Perspectives."

FIG. 12*m* (similar to FIG. 12*b*) depicts a graph example and non-limiting embodiment of the "IPACE/ID-ACERS Data Evaluation—versus Varying Source/Actor Data Perspectives." Here, a plurality of sources have provided a data input, wherein the data input is generally from the perspective of the source, where the data input may be an assertion of fact, a state of knowledge, experience, skill, education, citizenship, success, accomplishment, authorship, inventorship, progress, validation, verification, authentication, and/or just about any kind of data input possible. In various non-limiting embodiment, the ID-ACERS of the IPACE system, evaluates the input from source based on a regression analysis of previous inputs from the same source, similar sources, similar queries, and/or just about any correlation that can be drawn to determined relatively reliability of the source. In various non-limiting embodiment, the ID-ACERS would preferably discount a particular source and/or his/her/its assertion/data-input, relative the regression analysis. For example, a 1$^{st}$ source 3071 (here a 1$^{st}$ inventor) has made a "stated" assertion that his first public disclosure of a particular claimed invention on "Apr. 3, 2012", but where ID-ACERS has relatively heavily discounted the statement down into the range as illustrated of a "relatively discerned." In various non-limiting embodiments, "relatively discerned," is interchangeable with "relatively perceived," but typically "relatively discerned," would be reserved for the IPACE's perspective, whereas "relatively perceived" would represent a perspective of a source or actor (e.g. user/IPACE member), to help differentiate the two perspectives.

Referring to the FIG. 12*m*, the first source may be relative new to the IPACE system where there is relatively little data available to "discern" or "ascertain" the statement provided by the first inventor. Further, the TOP, a company policy/rule and/or the like, may include conditions and rules, where certain statements are relatively heavily discounted until a number of conditions are met, say validation from a particular source, and/or validation from at least two sources, with at least some condition/threshold of reliability, such as the claim of being an inventor of a particular concept. Whereas, some statements, such as the "first public disclosure," may require a condition of peer review, and/or a particular window of time (e.g. the time require to complete a PTO ex-parte re-examination.

When a second source 3081 was queried for his/her/its perception of when the first inventor first disclosed the claimed invention, he/she/it stated with a relatively high level of confidence (see illustration) that he/she/it believes that the first disclosure was actually on "9/18/11." And a third source 3091, stated that he/she/it believes the disclosure date to be "9/23/11," where the system could allow the sources to provide proof with dates, receipts, photos, video, audio, emails, and/or the like. Further, where the sources could update his/her/its stated belief with, say a new date, new proof, a relatively higher or lower confidence setting from his/her/its past degree of confidence, remove previous proof, witness, and/or support or challenge other sources assertions.

In addition, the sequence of event could also play a role in how discounted a particular source was or was not, where over time the source would become relatively more or less creditable based upon data inputs, other sources, events, and/or the like. Further, the system could incorporate the ramifications and/or liability, of a particular statement, where for example, if the disclosure date was any earlier than stated by the first inventor, he/she would potentially, and/or definitely jeopardize the particular patent claim being evaluated, say in the US, and/or abroad. A forth source 3082 believed the date to be "Nov. 16, 2011," but with a relatively low degree of confidence, thus relatively low reading over on the IPACE ID-ACERS. Further, a 5$^{th}$ source 3092 has provided "no reply." Here the IPACE, may attempt to reconnect with the source, say via email and/or another channel. Until such interaction, the 5$^{th}$ source is discounted to a zero or "unknown" value, since he/she/it hasn't replied. Depending on the conditions of the TOP and the source being queried/interrogated, lack of a response, may also harm one's creditability, status within the system, reliability score, and/or the like. For instance, if the 5$^{th}$ source is a subordinate (e.g. an employee) with a boss requesting the input or validation, such a lack of response may cost the 5$^{th}$ source reliability points. However, if the 5$^{th}$ source has a previous reputation for being relatively reliable, and relatively accurate when compared to, say the other sources, and/or the like, a hesitation to reply, or no reply could be factored into the reliability of the other sources, including his/her boss, and/or the first inventor.

The present disclosure has advanced an ID-ACERS module which supports various methods, which include, but are not limited to, the following methods, which can themselves include various methods. In various non-limiting embodiment, the IPACE system and associated computer-implemented methods would preferably track a variety of user behaviors, devices, inputs, consumption, usage patterns and/or the like. In various non-limiting embodiment, the IPACE system would preferably monitor and classify a first usage pattern from a plurality of inputs from an at least one node (e.g. a computer, mobile device, etc.); wherein the first usage pattern is stored as a first stored usage pattern; monitoring the plurality of inputs of the at least one node; determining, if a second usage pattern of the at least one node meets a stored relationship policy in relationship with the first stored usage pattern; and generating and transmitting an event in accordance with the determination of the stored relationship policy. Further, wherein the first usage pattern from the plurality of inputs from the at least one node (e.g. a computer, mobile device, etc.) would preferably be persistently monitored, crawl, extract, index, classify, track, interrogated and/or the like by the system.

In various non-limiting embodiment, the classifications of the first usage pattern from the plurality of inputs from the at least one node (e.g. a computer, mobile device, etc.) would preferably generate a plurality of semantic triples to store in a triple store. Further, wherein the triple store would preferably by evaluated to A/D/RP/S/P the relatively likelihood that a particular element from the option list is satisfied (e.g. demographic-related data/triples, psychographic-related data/triples, behavior-related data/triples, Influencer-related data/triples, Abandonment-related data/triples, Event Sequence-related data/triples, Paid-related data/triples, Terms-related data/triples, Quantity-related data/triples, Consumption-related data/triples, and Other Data/Stats-related data/triples. For instance, the relative perception or discernment of a user characteristic, consumption, behavior, pattern, and/or the like.

In various non-limiting embodiment, the behavior-related data/triples would comprise data, usage, patterns and relationships for shopping history (e.g. credit card data, online, etc.), web browsing, mobile device usage, and/or the like. In various non-limiting embodiment, the stored relationship policy in relationship with the first stored usage pattern could incorporate a predefined sequence, where a particular input would trigger the event. Further, the stored relationship policy in relationship with the first stored usage pattern could incorporate a predefined input within the predefined sequence, where a particular input would trigger the event. In various non-limiting embodiment, the generated and transmitted event in accordance with the determination of the stored relationship policy would be store the values and employ the ID-ACERS to validate any data.

In various non-limiting embodiment, the stored relationship policy in relationship with the first stored usage pattern is affected by an input from the group comprising the plurality of inputs from the at least one node, a plurality of inputs from a plurality of nodes, a plurality of inputs from a predefined group of nodes, a plurality of inputs from a predefined segmentation of nodes (e.g. via RDF triples), some combinations of these inputs, or some permutation of these inputs. In various non-limiting embodiment, all relationships could be parsed into triples and evaluated by the ID-ACERS.

Figure 13A:
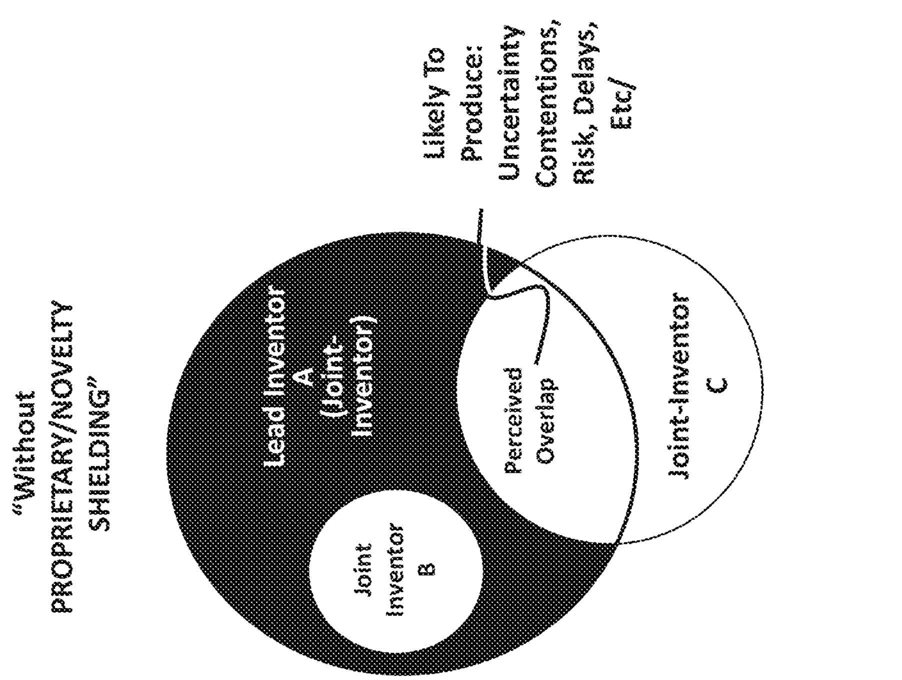
FIG. 13*a* depicts an example and non-limiting embodiment of issues within the current state of the art without Proprietary/Novelty Shielding and without IPACE/IDACERS Assessment.
Figure 13B:
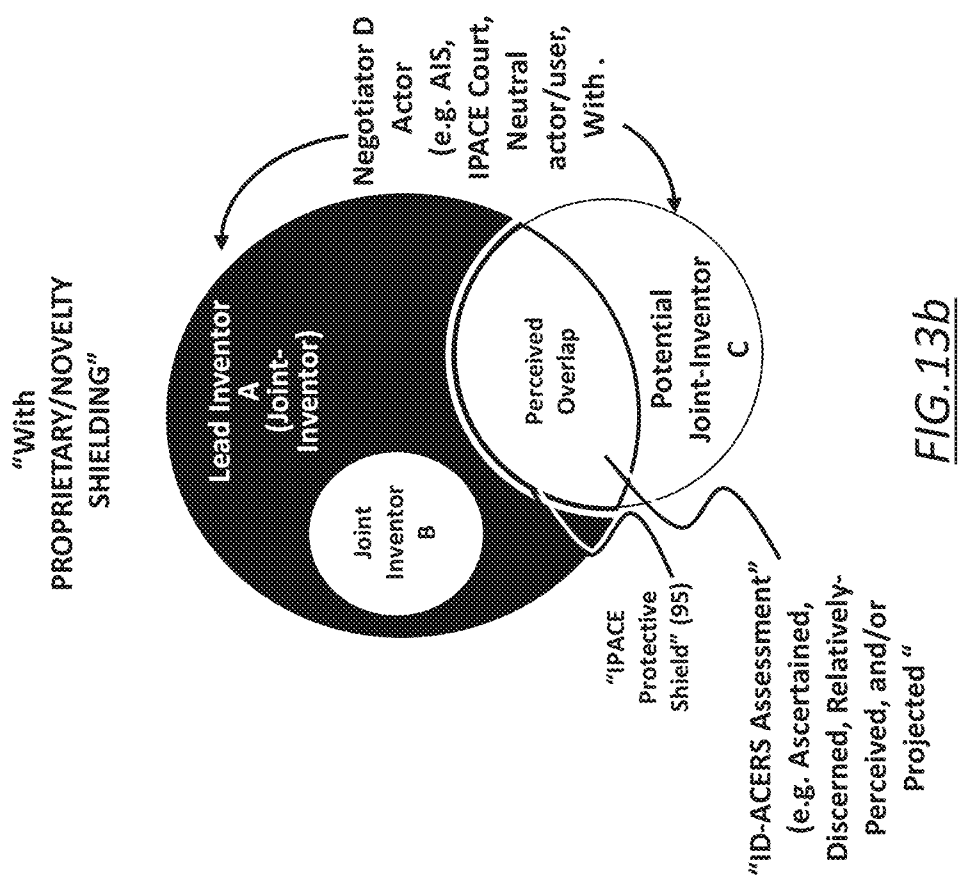
FIG. 13*b* depicts an example and non-limiting embodiment of the "IPACE/ID-ACERS with Proprietary/Novelty Shielding, where the IPACE/ID-ACERS Assessment, e.g. Ascertain, Discern, Relatively-Perceive, and/or Predicted Inventorship Overlap."
Figure 13C:
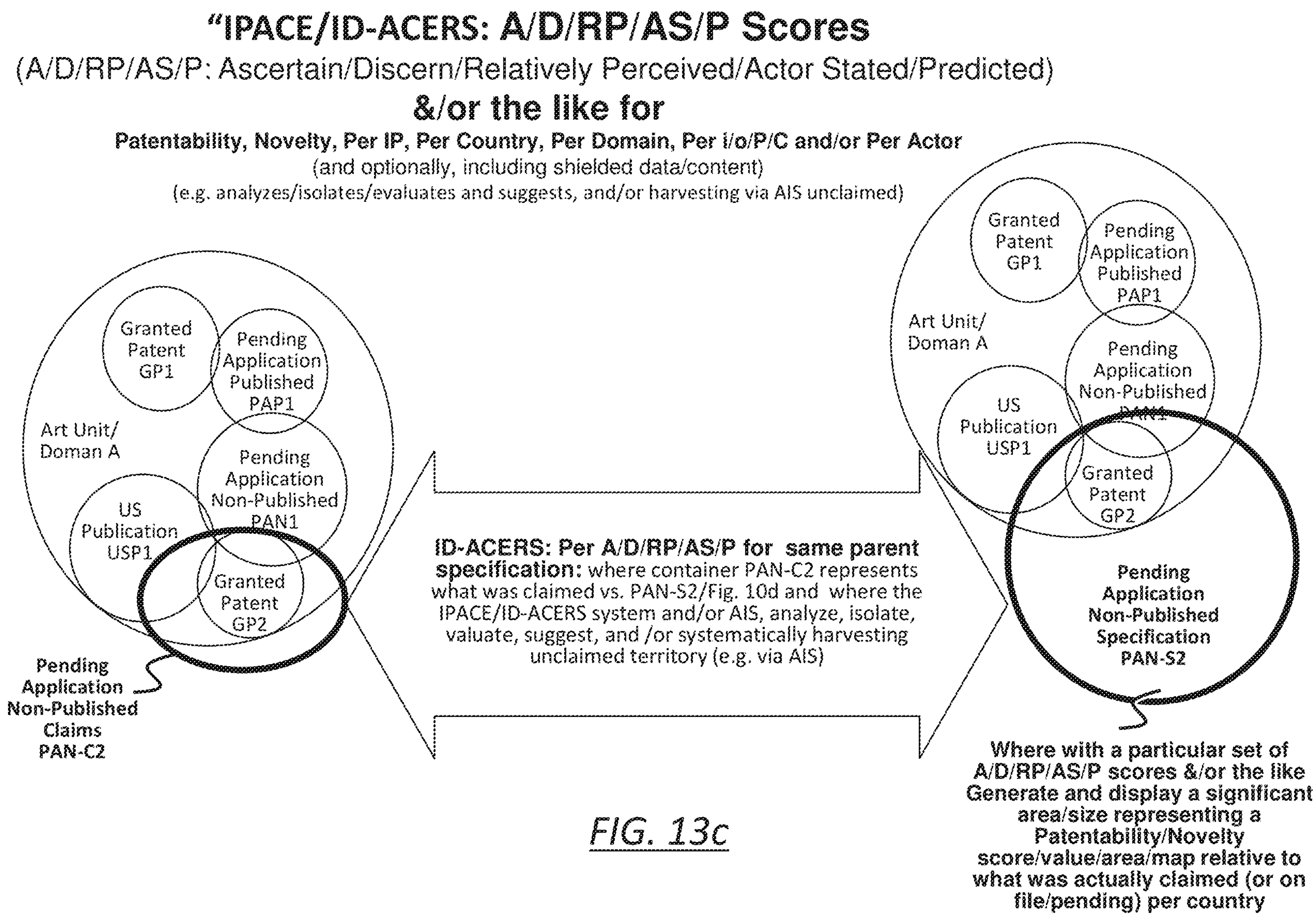
FIG. 13*c* depicts examples and non-limiting embodiments of the "IPACE/ID-ACERS Ascertain, Discern, Relatively-Perceive, Actor Stated, and/or Predicted (A/D/RP/AS/P) Scores, wherein a particular set of A/D/RP/AS/P scores &/or the like, generate and display a significant area/size representing a Patentability/Novelty score/value/area/map relative to what was actually claimed (or on file/pending) per country.

FIG. 13*a* depicts an example and non-limiting embodiment of issues within the current state of the art without Proprietary/Novelty Shielding and without IPACE/IDACERS Assessment. FIG. 13*b* depicts an example and non-limiting embodiment of the "IPACE/ID-ACERS with Proprietary/Novelty Shielding, where the IPACE/ID-ACERS Assessment, e.g. Ascertain, Discern, Relatively-Perceive, and/or Predicted Inventorship Overlap." FIG. 13*c* depicts examples and non-limiting embodiments of the "IPACE/ID-ACERS Ascertain, Discern, Relatively-Perceive, Actor Stated, and/or Predicted (A/D/RP/AS/P) Scores, wherein a particular set of A/D/RP/AS/P scores &/or the like, generate and display a significant area/size representing a Patentability/Novelty score/value/area/map relative to what was actually claimed (or on file/pending) per country.

The present disclosure has advanced an IPACE system with associated Knowledge-Based, Semantic Engine, IDOIMIC, ID-ACERS, CREATE, METER, and AIS modules which supports various methods, which include, but are not limited to, the following methods, which can themselves include various methods.

Method 1. Operating a collaborative network system of client-server devices for collaborative input management and client-tracked inputs; by providing a platform for each of a plurality of collaborators, wherein said each of the collaborators is an entity including an item comprising a unique uniform resource identifier (URI), a person, an organization, a reporter, a publisher, a project lead, an inventor, a co-inventor, a creator, a project participant, a project contributor, a member of the collaborative network system, and a user; registering said each of the collaborator entities at one of a plurality of registries, wherein said each of the registered collaborator entities is identified by a globally unique URI; receiving an at least one matching parameter from each of the collaborator entities, wherein the at least one matching parameter establishes an input matching criteria; receiving an at least one policy parameter from each of the collaborator entities, wherein the at least one policy parameter establishes an asset protection criteria; protecting an at least one input of the each of the collaborator entities according to the asset protection criteria; and evaluating the at least one input of each of the collaborator entities by an input parser and analyzer relative to the input matching criteria.

Method 2. Method 1, but further comprising a receiving an at least one input by an input parser and analyzer.

Method 3. Either of methods 1 or 2, but further comprising a evaluating, the at least one input relative to a predetermined matching criteria, wherein the predetermined matching criteria generates a matching criteria score.

Method 4. Any of methods 1-3, but further comprising a determining, if the matching criteria score exceeds the predetermined matching criteria, wherein a prompt is generated.

Method 5. Any of methods 1-4, but further comprising a forwarding the prompt to an appropriate actor or user, according to the predetermined matching criteria and the asset protection criteria.

Method 6. Any of methods 1-5, wherein the input matching criteria includes uniquely identifying each input to a specific inputter.

Method 7. Any of methods 1-6, wherein the specific inputter includes the items comprising a specific person, device, artificial intelligence system, Method 8. Any of methods 1-7, wherein the at least one input could be relative to the specific person, device, artificial intelligence system, a resource, source, database, triple store, ontology, federation, domain, country, thesaurus, taxonomies, RDFS, and university.

Method 9. Any of methods 1-8, wherein the at least one matching parameter includes parameters, rules, mapping, indexing, logic, classifications, sequences, temporal, logistical, proximity, boundaries, triples, and data analysis.

Method 10. Any of methods 1-9, wherein the matching criteria score includes a relative comparison to the at least matching parameter.

Method 11. Any of methods 1-10, wherein the relative comparison to the at least matching parameter includes a predefined container.

Method 12 Any of methods 1-11, wherein the predefined container include an item from the list comprising a geographic expression, temporal expression, spatial expression, proximity expression, entity expression, participant expression, contributor expression, employee expression, inventorship expression, ownership expression, assignment expression, communication expression, staging expression, content expression, exclusion expression, compensation expression, equity expression, status expression, deadline expression, terms-of-participation expression, regression expression, statistical expression, and relative expression.

Method 13. Any of methods 1-12, wherein the at least one input of each of the collaborator entities comprises a unique uniform resource identifier (URI) and a unique identifier for a patent-related item, a copyright related item, a trademark related item, a prediction-related item, a report-related item, a publication-related item, a consumption-related item, a creative-works item, a software-development-related item, a product-development-related item, a collaboration, or a set of rules, terms, and/or conditions.

Method 14. Any of methods 1-13, wherein the input parser and analyzer includes a semantics engine and semantic analysis.

Method 15. Any of methods 1-14, wherein the semantics engine and semantic analysis employs items from a list comprising ontologies, SPARQL queries, rules, unifying logic, taxonomies, data interchange, syntax, URI, a character set (e.g. Unicode), user interface, proof expressions, trust expressions, cryptography expressions and perspective expressions.

Method 16. Any of methods 1-15, wherein the ontologies include a web ontology language (OWL) format.

Method 17. Any of methods 1-16, wherein a persistent searching is performed when the at least one input of the specific inputter does not match the input matching criteria.

Method 18. Any of methods 1-17, wherein the performance of the persistent searching includes a searching policy.

Method 19. Any of methods 1-18, wherein the searching policy includes requesting permission for expanding the input matching criteria generating an expanded matching criteria.

Method 20. Any of methods 1-19, wherein a relative item match to the expanded matching criteria generates a discovery score and discovery prompt.

Method 21. Any of methods 1-20, wherein the discovery score includes a relative reliability of the relative item match.

Method 22. Any of methods 1-21, wherein the discovery prompt comprises a list of action options, prioritized action options, and levels of actionable steps.

Method 23. Any of methods 1-22, wherein the list of action options includes an ability to shield a first designated actor/party from a specific portion of information.

Method 24. Any of methods 1-23, wherein the list of action options includes an ability to reveal the specific portion of information to a second designated actor/party.

Method 25. Any of methods 1-24, wherein the second designated actor/party is shield as to the identity of the third designated actor/party.

Method 26. Any of methods 1-25, wherein the second designated actor/party performs an arbitration or mediation.

Method 27. Any of methods 1-26, wherein the arbitration or mediation includes a negotiation, decision, and/or settlement between first designated actor/party and a third designated actor/party.

Method 28. Any of methods 1-27, wherein the arbitration or mediation includes negotiation elements.

Method 29. Any of methods 1-28, wherein the negotiation elements comprises an artificial intelligence system, machine learning, knowledge base management module, METER module, natural language processing, negotiation management module, IPACE court, peers, witnesses, experts, user, members, testimony, exhibits, publications, jurors, judges, and sources.

Method 30. Any of methods 1-29, wherein the third designated actor/party is associated to the relative item match.

Method 31. Any of methods 1-30, wherein the third designated actor/party is the owner of the relative item match.

Method 32. Any of methods 1-31, wherein the third designated actor/party and second designated actor/party prearrange or pre-agree to the terms of the arbitration or mediation.

Method 33. Any of methods 1-32, wherein the performance of the persistent searching according to the searching policy includes any items missing of/from/by the negotiation elements comprises an artificial intelligence system, machine learning, knowledge base management module, METER module, natural language processing, negotiation management module, IPACE court, peers, witnesses, experts, user, members, testimony, exhibits, publications, jurors, judges, and sources.

Method 34. Any of methods 1-33, wherein an semantic IP-Triple format is generated.

Method 35. Any of methods 1-34, wherein an semantic IP-Triple statement format is generated.

Figure 14:
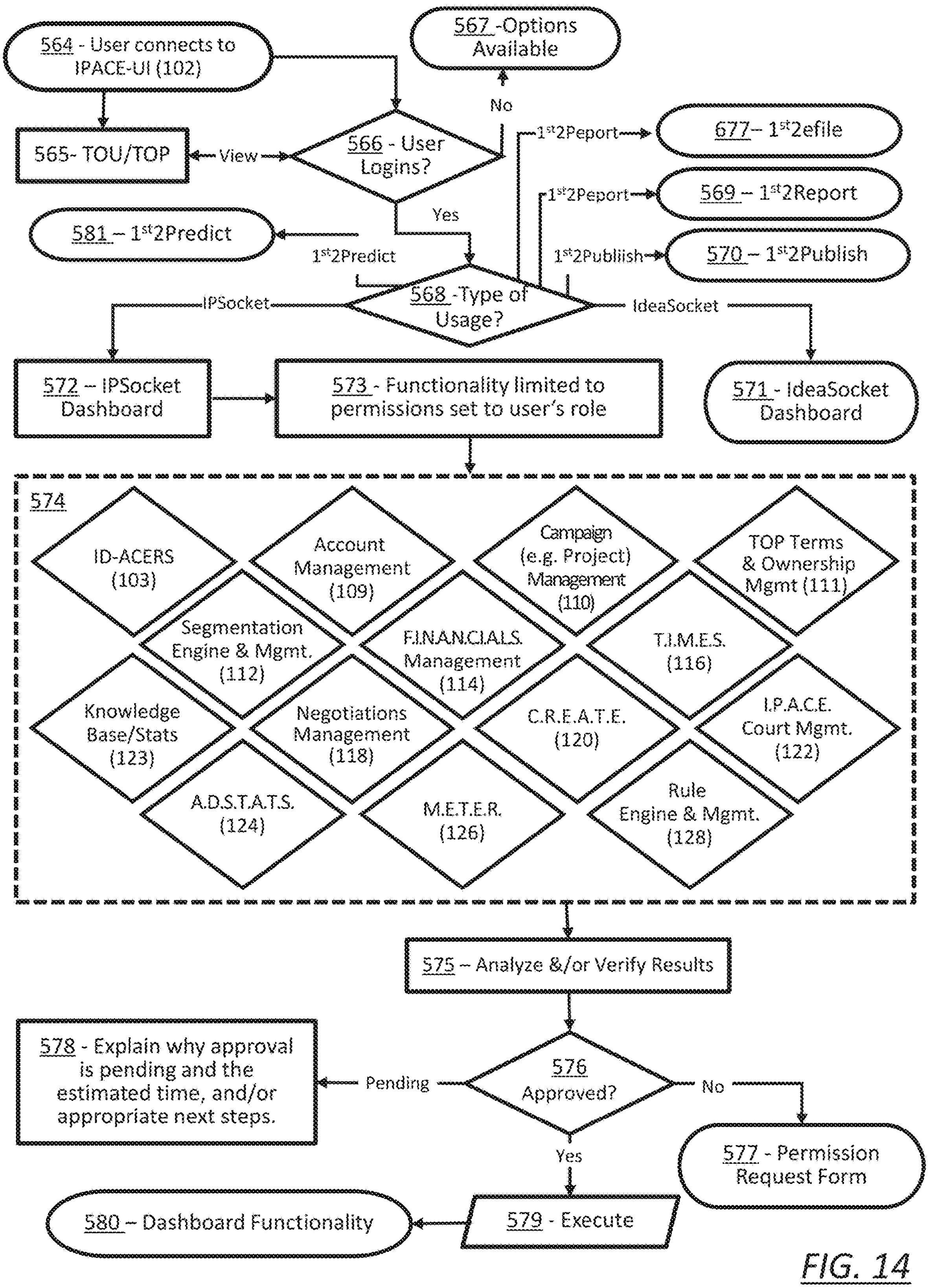
FIG. 14 is a flowchart depicting the functionality available to an IPACE Member utilizing the IPACE-UI 102 in one embodiment.

FIG. 14 is a flowchart depicting the functionality available to an IPACE Member utilizing the IPACE-UI 102 in one embodiment. Starting with a step 564 where a "User connects to IPACE-UI," he/she may view the "TOU/TOP" in a step 565 or after logging in with a query 566. In various non-limiting embodiments, the "TOU/TOP" may vary from environment to environment, but effort should be made to not change "TOU/TOP" once they have been made available to Potential Participants. In various non-limiting embodiments, the IPACE may limit what, if any changes may be made by the Campaign Gatekeeper (42), Lead Inventor (40), and/the like. For example, the IPACE may allow some changes prior to any Potential Participants accept the terms to become a Participant, but subsequent changes may require conditional and/or mutual acceptance.

In another embodiment and example, one with a Restricted (e.g. PIN) 106 access environment, such as a college or university, all users of the PIN may be required to belong to the university. Further, the users would preferably also have to acknowledge understanding and accepting the terms of use and terms of participation. In various non-limiting embodiments, the TOU/TOPs may require that all contributions to the IPACE system are completely assigned and owned by the University. Whereas another particular Restricted (e.g. PIN) 106 access environment, such as Inventor Network or Club, may require a subscription fee to use the IPACE system and/or may require the users to understand and accept the terms where a portion, say five percent, of all the fees transacted on system within this particular Restricted (e.g. PIN) 106 access environment are collected by the Inventor Network itself.

If the answer to the query in 566 "User Logins?" is "no," a terminator 567 provides "Options Available," where there may be limited visibility to promote the site, say the Inventor Network, but typically an understanding and acceptance of who owns the data/content contributions and to what extend is required through a login before anyone is allowed to do a predetermined number of interactions, and, logically, before any deeper functionality is accessed, let alone any contributions are actually made. One benefit of the ability for groups to setup their own Restricted (e.g. PIN) 106 access environments is so that they may limit who and when people participate, as well as the manner of obtaining ownership, which will be explained in more detail later.

If the answer to query 566 is instead "yes," next is a query 568 that asks for the "Type of Usage?" If the answer to query 568 is that the IPACE Member wants to view, participate in, and/or start a campaign/project not involving patent or trademark development, applications, prosecution, or monetization, but instead event reporting (more examples elsewhere in specification), the IPACE Member is passed to a 569 terminator, which is the "1$^{st}$2Report Dashboard" with the functionality appropriate to the IPACE Member's role and permission settings. If the answer to query 568 is that the IPACE Member wants to view, participate in, and/or start a campaign/project not involving patent or trademark development, applications, prosecution, or monetization, but instead predicting (more examples elsewhere in specification), the IPACE Member is passed to a 570 terminator which is the "1$^{st}$2Predict Dashboard" (121) with the functionality appropriate to the IPACE Member's role and permission settings.

If the answer to query 568 is that the IPACE Member wants to view, participant in, and/or start a campaign/project not involving patent or trademark development, applications, prosecution, or monetization, but instead other types of data/content creation and/or collaboration, such as writing and/or outsourcing software development (more examples elsewhere in specification), then the IPACE Member is passed to a 571 terminator which is the "IdeaSocket Dashboard" with the functionality appropriate to the IPACE Member's role and permission settings.

In various non-limiting embodiments, the input and data/content creation within the 1$^{st}$2Report module, the 1$^{st}$2Predict module, and/or the IdeaSocket module may subsequently lend itself to preparing a patent or trademark application and the data/content may be shared between the modules in accordance with the TOU/TOP allowed by IPACE and subsequently modified by the Campaign Gatekeeper (42), but generally this input and data/content creation is not assumed to be creating a patent or trademark application that requires significant guarding, protecting, and tracking.

If on the other hand, the answer to query 568 is that the IPACE Member wants to view, work on, and/or start a campaign/project involving patent or trademark development, applications, prosecution, or monetization, then the IPACE Member gets passed to the "IPSocket Dashboard" 572 with the functionality, protections, accrediting, and tracking designed for the development of intellectual property, applications, prosecution, and monetization; and per the IPACE Member's role and permission settings. Here the IPACE Member could be reminded of the "TOU/TOP" before each usage, asked to acknowledge each new entry, and/or the IPACE-UI 102 could allow the IPACE Member to turn off this warning/acknowledgment, say with a checkbox, perhaps after the IPACE Member has viewed and accepted it a certain number of previous times, and/or as long as the IPACE Member stays relatively active, say he/she has not gone a certain number of days without logging into the IPACE system. This assumes there are no changes made to the current "TOU/TOP" and depends on the setting setup by the Campaign Gatekeeper (42) and/or Lead Inventor (40).

From step 572, the IPACE Member has access to all the functionality outlined in a section 574, where that functionality is explained in more detail ahead through a step 573 with a "Functionality limited to permissions set to user's role." An "Analyze &/or Verify Results" 575 of the IPACE Member functionality and usage appear in a query 576 that asks if the selected functionality and related results have been "Approved?" for the particular IPACE Member in accordance with the IPACE, PIN (if applicable) and "TOU/TOP."

If the answer to the query 576 is "no," then a terminator 577 provides a "Permission Request Form," where the IPACE Member may make a request to, say participate in a particular project of interest to a particular Lead Inventor (40) or Account 60 and/or enter a request to post his/her requested compensation/fees for providing services for a particular project and/or to be listed in general as, say a specific type of role. If the answer to query 576 is "pending," then a step 578 "Explains why approval is pending and the estimated time, and/or appropriate next steps." If the answer to query 576 is instead "yes," then an "Execute" 579 step is taken and the IPACE Member is provided the Dashboard Functionality at a terminator 580.

Figure 15:
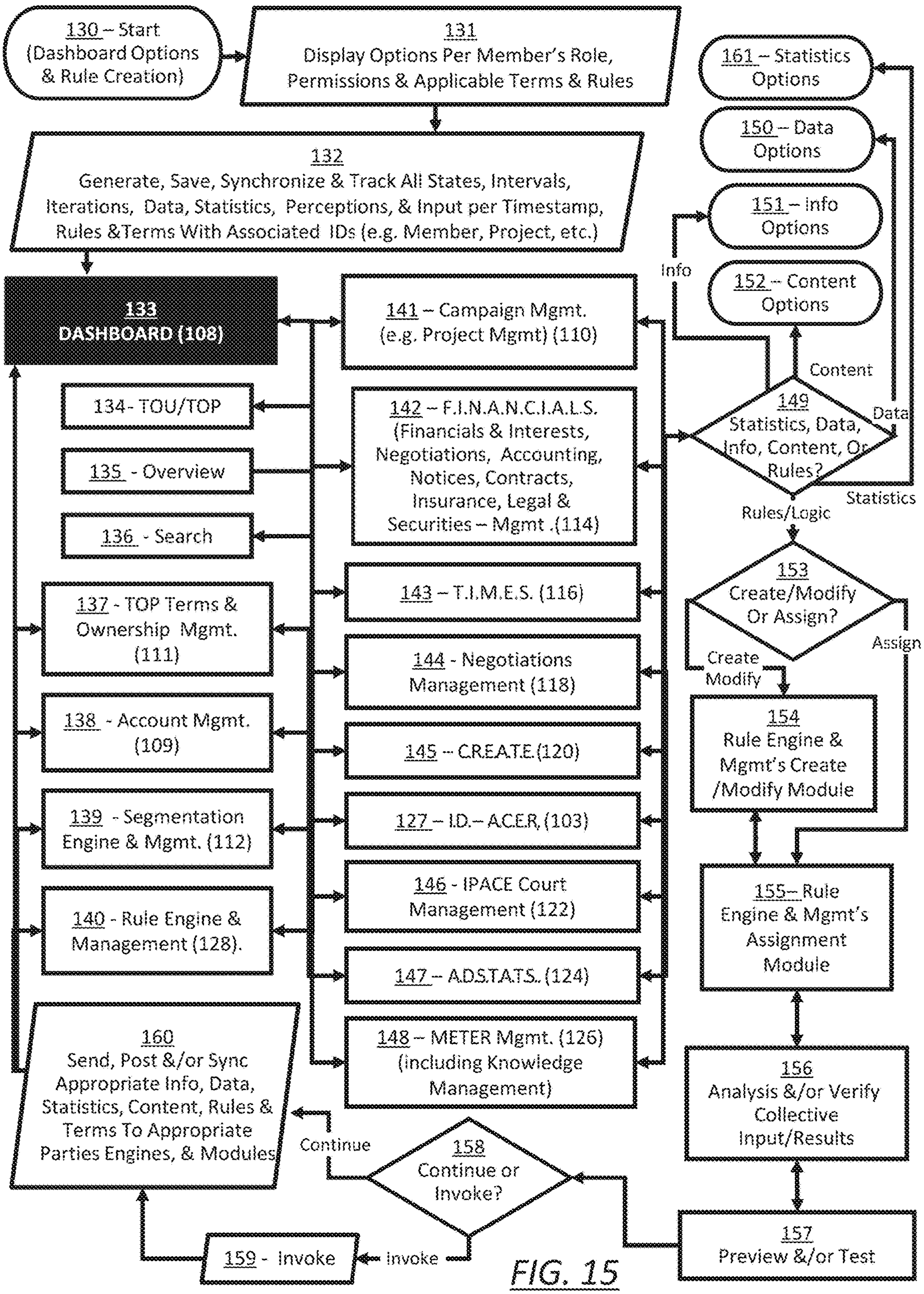
FIG. 15 is a flowchart that depicts the Dashboard Options from the IPACE-UI 102 and the functionality basics for the user to create and assign a rule in a non-limiting embodiment.

FIG. 15 is a flowchart that depicts the Dashboard Options from the IPACE-UI 102 and the functionality basics for the user to create and assign a rule in an embodiment. In various non-limiting embodiments, there are several methods to create and deploy rules. In one embodiment, the IPACE Operating Environment 101 could employ Process Engines, which allow the user to describe/define some or all the steps in a process, where those steps also involve decision points, which are themselves a relatively simple rule.

In another embodiment, the IPACE Operating Environment 101 employs a rule engine, where generally the data is in the domain objects and logic is in the rules. This allows for breaking the object oriented ("OO") coupling of data and logic, so that the logic is laid out in rules. Instead of the logic being spread across many domain objects or controllers, the logic in this embodiment may generally all be organized in one or more very distinct rule files. Even if the logic itself is relatively simple, this decoupling provides for more agility for relatively frequently changing and testing rules.

By employing rules, the IPACE Operating Environment creates a repository of knowledge (a knowledge base/state), which is executable. Rule systems may effectively log the decisions made by the rule engine, along with why the decisions were made to provide an explanation and feedback, as well as an ability to relatively predict outcomes. A rule may be relatively simple or complex with multiple stages that incorporate detailed business logic, with such things, but not limited to attributes, strings, integers, rule flow, rule flow-groups, timers, calendars, Booleans, Operators, conditional elements, pattern elements, pattern binding, constraints, unification, expressions, lists, maps, abbreviated combined relation conditions, abbreviated combined relation conditions with patterns, triples, statements, compounds, precedencies, positional arguments, conditional elements, advanced conditional elements, collections, statistical clustering, accumulations, multi-patterns, multi-function accumulates, forward/backward chaining, Rete algorithms (its predecessors, derivatives, extensions, and similar), Leap (its predecessors, derivatives, extensions, and similar), inline custom code, ontologies, libraries, syntax, schema, taxonomies, other rules (e.g. RIF/SWRL) queries (e.g. SPARQL), and the like; and where a rule's consequences may modify a rule and/or data. Further, where each rule, data point, and/or collection of data has the A/D/RP/S/P and/or the like ID-ACERS scoring from the ID-ACERS. In addition, where the ID-ACERS scoring is relative to a particular person, subject, domain, universe, segment, and/or the like. For example, the relative reliability or accuracy of a particular semantic statement is relative to the resource that provided it, say for, who, when, where, why, and how. Further, where there is a collection of resources and sources that relatively support the specific semantic statement (or value, assertion, data, stats, etc.). In addition, where there is a relative collection of resources and sources that challenge the specific semantic statement (or value, assertion, data, stats, etc.). (Also see depiction of IPACE data evaluation verses Source/Actor data evaluations in FIG. 11, where the IPACE can discount, say the accuracy, reliability of a validation, statement, value, and/or the like provided and/or supported by a particular source or collection of sources).

Further, the creation of rules builds a knowledge management system, where the IPACE Operating Environment 101 allows non-technical IPACE members to express knowledge that may be implemented and possibly automated using natural language sentences (e.g. via NLP) and/or prebuilt suggestions. Each rule creation iteration creates a specific rule creation iteration ID per iteration and each utilization of a rule creates a specific rule utilization ID that is stored and tracked for its perceived relative successfulness; and by such factors as to all of the IPACE system's perceived rule creator(s) and Contributor(s) (50), what specifically was perceived to be created and/or contributed when, what was perceived to be a relatively new creation or modification by who, when, where, why and the like when compared to existing rules and data.

In various non-limiting embodiments, the IPACE-UI 102 comprises of a number of modules for creating rules from the IPACE Dashboard (108). From a start 130 with the "Dashboard Options and Rule Creation," the IPACE-UI proceeds to a step 131 where the IPACE system "Displays Options Per the Member's Role, Permissions, and Applicable Terms and Rules." From step 131, the IPACE-UI 102 passes to a step 132, where a "Generate, Save, Synchronize and Track All States, Intervals, Iterations, Data, Statistics, Perceptions, and Input per Timestamp, Rules and Terms With Associated IDs (e.g. Member, Project, etc.)" is invoked (if not already).

From the step 132, the user may utilize the functionality afforded by the IPACE Dashboard (108) in a step 133, where the Dashboard (108) generally represents all of the Dashboard variations (e.g. IPSocket (113), IdeaSocket (115), $1^{st}$2Report (117), $1^{st}$2Publish (119), $1^{st}$2Predict (121), ADSTATS, and the like). In various non-limiting embodiments, the Dashboard functionality comprises of a "TOU/TOP" 134 (with the IPACE's "Terms of Use" and current "Terms of Participation") function, an "Overview" 135 function for learning about the functionality, a "Search" 136 for searching for information, data, statistics, instructions, and the like. In various non-limiting embodiments, there is an option 137 for utilizing the "TOP Terms and Ownership Management" (111) module, an option 138 for the "Account Management" (109) module, an option 139 for the "Segmentation Engine and Management" (112) module, and an option 140 for a "Rule Engine and Management" (128) module, an option 141 for the "Campaign Management (110) (e.g. Project Management)" (110) module, an option 142 for the "F.I.N.A.N.C.I.A.L.S. (Financials and Interests, Negotiations, Accounting, Notices, Contracts, Insurance, Legal and Securities—Mgmt)" (114) module, an option 143 for a "T.I.M.E.S." (116) module, an option 144 for a "Negotiations Management" (118) module, an option 145 for the "CREATE (Collaboration, Review, and Exchange of Art and Technology Engine)" (120) module, an option 127 for an "I.D.-ACERS" (103) module, an option 146 for an "IPACE Court Management" (122) module, an option 147 for an "ADSTATS" (124) module, and an option 148 for a "METER Management" (126) (including Knowledge Management) module.

From the above modules, directly or through the Campaign/Project Management Module 110, the user (e.g. an IPACE member) may do a variety of things, such as create, modify, and/or review data, statistics, information, and/or data/content; and/or create, modify, review, or assign rules. A query 149 asks the user to delineate between "Info, Data, Statistics, Data/content, Or Rules?" If the answer to query 149 is "data," then there is a terminator 150 that is for "Data Options." If the answer to query 149 is "Statistics," then there is a terminator 161 that is for "Statistics Options." If the answer to query 149 is "info," then there is a terminator 151 that is for "Info Options." If the answer to query 149 is "data/content," then there is a terminator 152 that is for "Data/content Options" (explained more under CREATE).

If the answer to query 149 is instead "rules," then a query 153 asks whether to "create/modify or assign (a rule)? If the answer to query 153 is "create/modify," then a step 154 provides the user a "Rule Engine and Management's Create/Modify Module," with the functionality to create/modify rules. Once the rule creation/modification is complete and/or ready for assigning to other objects or components, the user may advance to a step 155 that provides the user a "Rule Engine and Management's Assignment Module" with the functionality to assign rules. If the answer back in query 153 was instead "assign" then the user would have advanced to the same "Rule Engine and Management's Assignment Module" module in step 155.

In various non-limiting embodiments, the "Rule Engine and Management's Assignment Module" allows the user to assign rules to a variety of objects through segments and IDs. For example, each created rule iteration generates a unique ID, that unique rule iteration ID may be assigned to a defined segment of IPACE Users/Members, a defined segment of Campaigns/Projects (including Offers), and/or to a specific ID or ID(s) for a specific IPACE User/Member, Campaign/Project (including Offers). For example, a rule for monitoring the progress of a particular campaign may have a particular METER rule assigned (more under METER 126), where specific responsibilities are assigned to a particular IPACE Member via the "Rule Engine and Management's Assignment Module" via the Account Management's (109) database per his/her IPACE unique Member ID, and/or via his/her Account (60) role ID as the project's designated Project Manager (43).

In addition, a particular project could have a particular TOP rule that limits participation to Patent Attorneys (44) who have (a) passed a conflict check and have had at least three (3) patent applications granted within a particular PTO classification (e.g. art unit), where these types of delineations may be generated, analyzed, and assigned via the "Rule Engine and Management's Assignment Module" via the Segmentation Engine and Management (112) module's database.

In various non-limiting embodiments, the results of the Rule Assignment Management usage and the associated functionality afforded by the option modules appear in a step 156 "Analysis &/or Verify Collective Input/Results." Next, a step 157 is where the IPACE Member may "Preview &/or Test" rule(s). Next, a query 158 asks if the IPACE member would like to either "Continue or Invoke" the rule? If the answer to query 158 is "continue" as in continue utilizing the Dashboard functionality without invoking the rule, then a next step 160 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 158 is instead "invoke" as in invoke a particular rule, then the next step 160 with a "Send, Post and/or Synchronize Appropriate Info, Data, Statistics, Data/content, Rules and Terms To Appropriate Parties, Engines, and Modules" is performed, where the IPACE user may also then continue utilizing the Dashboard.

FIGS. 16*a*-17*e* depict various non-limiting embodiments, examples, and resource tables, where the IPACE via the ID-ACERS parses, evaluates, assesses, and determines, I/O/PC data. In various non-limiting embodiments, the i/o/pc includes all data, including raw, formatted, knowledge based, and/or the like, where there are virtually an unlimited number of manners and methods to segment the I/o/pc data and relational attributes for correlating the parsed data.

In various non-limiting embodiments, the i/o/pc includes real-time inputs, where the ID-ACERS employs natural language processing methods to analyze the data in real-time, near-real-time, and/or delineate processing into batches. In various non-limiting embodiments, the natural language processing methods are real-time, near-real-time, or delineated into batches, the results could be prioritized by the actor/user. In various non-limiting embodiments, the natural language processing method results could be displayed in real-time, near-real-time, or delineated intervals to the actor/user. In various non-limiting embodiments, the displayed results to the actor/user could include a prioritized list of options, recommendations, suggestions, anomalies, ambiguities, concerns, policies, alerts, notifications, negotiations, and/or the like. In various non-limiting embodiments, the displayed results to the actor/user could include a relationship of between the input and a predefined matching criteria.

In various non-limiting embodiments, the predefined matching criteria could include the historical inputs of an actor/user, company, entity, project, a universe of say IP, patents, publications, and/or the like. In various non-limiting embodiments, the predefined matching criteria could include a geographic expression, temporal expression, spatial expression, proximity expression, entity expression, participant expression, contributor expression, employee expression, inventorship expression, ownership expression, assignment expression, communication expression, staging expression, content expression, exclusion expression, compensation expression, equity expression, status expression, deadline expression, terms-of-participation expression, regression expression, statistical expression, and relative expression.

In various non-limiting embodiments, the predefined matching criteria according to the historical inputs of a particular actor/user could include temporal limitation; say for a window of time. In various non-limiting embodiments, the predefined matching criteria according to the historical inputs of the particular actor/user could include an association with a specific goal, device, project, OS, application, client, session ID, IP address, and/or the like.

Starting with a FIG. 16*a* where there is an input 1140 of a character, wherein this instance is a letter "T," an evaluation 1140 is performed where a "first novel character input for a first user relative to a first domain (e.g. a child's first input on a computer/keyboard) per an ID-ACERS I/O/PC evaluation." Here the ID-ACERS compares the character input of the letter "T" relative to the first domain, wherein the first domain is limited to any previous/historical inputs of the first user: Meaning where the IPACE ID-ACERS evaluates the "T" input to determine if the letter "T" has been input/typed by this particular user/first-user previously.

Next, an input (e.g. text string) 1141 is evaluated as a word, wherein this instance is a word "The." Here an evaluation 1141*a* performs a "first novel word input for the first user relative to the first domain (e.g. the child's first word input on the computer/keyboard)." Here the IPACE ID-ACERS discerns the first type that this particular has formulated the word "The" relative to his/her known/evaluated historical inputs. This real-time analysis can be useful for reducing redundancy, where a particular user would see that he/she has typed that same or relatively similar input before. Further, where the IPACE generates a real-time visual display with prioritized lists of how recently, how often, and with relation mapping to events, projects, clients, applications, ontologies, and/or the like. In addition, the ID-ACERS evaluations can incorporate a select number of users to monitor regarding who input something first, when, and when it was duplicated, relatively duplicated, by whom, when.

Further, whether the relatively duplicated inputs constitute an better collection of inputs for say a statement, purpose, goal, project/event outcome, perspective, and/or the like, wherein the IPACE system can to a regression analysis of the relatively similar inputs and incorporate all inputs, ontologies, and/or the like, with the same or relatively similar goal, purpose, project/event outcome, perspective, and/or the like.

The ability to prompt and/or display interactive information to a user relative to historical inputs can create enormous time sayings. Consider the individual who has been working on a novel in chapters, where it comes time to assemble the product, the author is concerned that he/she may not have been working on the current version for the past three months, say of a project that he/she had been working on for over a year. Here, the presented disclosure would have prompted/alerted the author that there is a more current version of the document or content than the version he/she is presently working. Further, where the IPACE system can prompt the user when characterizations, and similar inputs can be display and relatively mapped not only to the same document, but to historical document. Whereas, without these tools and functionality, the author would be forced search out every version he/she could find and run a comparison function. Then try to assimilate the edits to a finish product without destroying the flow and context of the writing. This concern can be become exponentially worse with several collaborates, say for a patent application, with more than one set of figures, more than one set of claim drafts, specifications, and a hard deadline, especially where missing components can be limited the scope of a particular claimed element.

Whereas with the IPACE system all these components and contributor are tracked, where inputs can be isolated, removed, edited, reverted, accumulated, assimilated, aggregated, and/or the like per user. Where the IPACE system can even remove all the contributions of a particular contributor, and/or claimed elements, and generate a subsequent filing with a designated list of inventors and contributors, so as to not create co-inventorship issues on a particular application, say according to the TOPs. Further, the IPACE system can isolate, remove, edit, revert, accumulate, assimilate, aggregate, and/or the like according to style, format, and/or the like, style item, format—by-format, version by version, and/or the like. Where the finish product/document/application, can format portion of the document relative to earlier version formatting, and/or the like. For instance a formatting for just a particular figure, or table in a document.

Referring back to FIG. 16*b*, next, an input 1142 is evaluated as an interval, wherein this instance is an interval "largest snowstorm," is evaluated with an evaluation 1142, where an "ID-ACER interrogates and analyzes each input per the I/O/PC to parse and generate an interval, a node, and a semantic link, say for an adjective 'largest' in the interval 'largest snowstorm'." Here the ID-ACERS can incorporate a series analysis, natural language processes, algorithms and rules to discern and/or predict the semantics of the input, not just relative to the context of the statement, but relative to the history of the actor/user and/or his/her/its perspective. In addition, the ID-ACERS can predict the next input based in part upon existing associated databases for user, the context, syntax, semantics, perspective, and/or the like (more in FIG. 17).

Next, in a FIG. 16*c* an input 1143 is evaluated as a name interval, wherein this instance is the name interval "Chicago." Here a series of steps 1143*a* is performed with a "Starting with the ID-ACERS I/O/PC parsing, analysis, interrogation, and/or evaluation may incorporate an at least one first device input from a first device (e.g. where the first device operates via a processor) from a first actor/user, a first actor/user profile, a first state ID for each, a first time/date stamp for each, and/or, any historical I/O/PC from each for generating and evaluating an ascertained, discerned, relatively perceived, and/or predicted node, edge, interval, interval correlation, link, interval name, and/or the like. Further, where each subsequent input generates another State ID, time/date stamp, and/or the like, for each. Here, the first device input has generated the name interval: 'Chicago' and where the ID-ACERS may employ the I/O/PC data, collected data, and historical data to generate a subsequent input prediction list relative to a source/resource/support data, a source/resource/support data correlation, &/or an evaluation (e.g. a state prediction based on the keyword input 'Chicago' (see call-outs 985*a* and 985*b* in next FIG. 17))."

From the instance 1143*a*, a punctuation input 1144 is evaluated, wherein this instance is the punctuation input [a comma] ",." Here, a series of steps 1144*a* includes an "ID-ACER ascertains/discerns a punctuation input (e.g. 'comma') as a relative predictor of a subsequent input, a subsequent input interval, and generates a prediction list for subsequent inputs, subsequent intervals., and/or the like, where the ID-ACERS may employ historical data from the anticipated analysis, evaluation and/or a prediction, wherein a preceding interval, input/keyword/phrase/expression/value/attribute/relation may be employed to generate the anticipated analysis, evaluation, prediction, projection, and/or the like, along with a list of relative sources/support mappings for interrogating, sources/support-selected, and/or the like. Here, based on subsequent input interval of a 'comma' by the first device, the ID-ACERS, as stated in the step 1143*a*, generates an input predictive list that includes the state of 'Illinois'" 1144 is performed.

Next, a predicted input 1145 is generated and evaluated by the IPACE, wherein this instance is the interval "Illinois." The ID-ACERS ability to predict subsequent user inputs helps the IPACE/ID-ACERS to anticipate, allocate, secure, interrogate and/or the like potentially required resources, relationship mappings, as well as support the user's relative progress/success towards a particular goal, agenda, outcome, deadline, perspective and/or the like. Here the "ID-ACER evaluates each (I/O/PC) input and each interval subsequent relative to the punctuation input, where each interval is subsequently evaluated to generate the relative prediction list and ranking [where "Chicago" was the most likely subsequent input interval], and evaluates with a reality using selected interrogation methods, sources, support data obtained, the support data correlation employed, &/or the evaluations made relative to an ascertained/discerned/relatively-perceived-reality/actuality/set-of-circumstances, &/or the like.

Further, to ascertain/discern/relatively perceive a variety of issues and/or improvements, including trust-levels (e.g. from/for inputs/sources/support), shortcomings, latency, formulas, conditions, algorithms, relationships, dependencies, and/or the like, where the IPACE Artificial Intelligence System (AIS) may be employed. In various non-limiting embodiments, via the AIS, a predicted sum/interval/statement/triple/output (e.g. sentence) as represent in an embodiment from the sum of the A/D/RP/AS/P of the inputs interacting with the ID-ACERS, the by the predicted sum/interval/statement/triple/output is displayed as predicted [output/sentence/step] 1146 is generated" 1145*a* is performed. From 1145*a*, the process proceeds to the step 1146, where a "The largest snowstorm in Chicago, Illinois, record took place Jan. 26-27, 1967, with 23.0 inches of snowfall" is generated and displayed.

FIGS. 17*a*-17*e* depict various non-limiting embodiments and examples, employing resource tables for the ID-ACERS parsers, evaluation, assessments, predictions, and determinations of the I/O/PC data. Starting with FIG. 17*a*, where the ID-ACERS has parsed the sentence: "The largest snowstorm in Chicago, Illinois, record took place Jan. 26-27, 1967, with 23.0 inches of snowfall," into intervals "largest" interval 991*a*, "largest snowstorm" interval 986*a*, "Chicago" interval 985*a*, "Chicago, Illinois" interval 992, "record" interval 993*a*, a "took place" interval 994*a*, a "January" interval, a "26-27" interval, a "1967" interval, a "23.0 inches" and so on. Next the IPACE ID-ACERS creates triples and triple statements from the intervals to derive semantics and then maps the triples, intervals and triple statements to the correlated semantics, for example the interval "largest" 991*a* (e.g. ID-ACER semantics see: 991*b*) where the ID-ACERS semantics engine and associated rules map "largest" with "biggest." Next the ID-ACERS semantics engine and associated rules incorporate the context of the interval "largest snowstorm" interval 986*a* to locate a related data source for historical weather data: here a "First Source" or ID-ACER First Support (e.g. Historical Weather Data) depicted in FIG. 17*b*.

FIG. 17*b*, depicts a "Chicago's 5 biggest Snowstorms" a particular table 993*b* that was located in the "First Source" or ID-ACER First Support, say per a relational mapping and prioritized reference to "Chicago" 992*b* and "biggest" 991*b* appearing as a "heading" 985*b* for the particular table 993*b*. A "rank" column list a rank 986*b*, a snow accumulation 987*b*, a month 988*b*, a day(s) 989*b*, and a year 990*b* in row/rank 1. Next, ID-ACER can interrogate and evaluate the data to produce a list of results, including the accuracy of the inputs, triples, triple statements, mappings, user, perspectives, predictions, and/or the like, where data, regression analysis, clustering, pattern recognition, multivariate testing, and statistical analysis can be display a list of prioritized options, suggestions, and/or the like, to the actor/user/entity to support progress or achieve a particular outcome. Further, where the analysis can incorporate similar inputs, outputs, prompts, predictions, participants, TOPS, Ontologies, and/or the like, with the same or relatively similar goal, purpose, project/event outcome, perspective, and/or the like.

In FIG. 17*c*, provides a ID-ACERS Second Support (e.g. Input & Query History) where in the IPACE system can incorporate utilize ontologies, wikis and/or the like to look up "Chicago," for example, for the predicted input back in FIG. 16*c*, steps 1144/1144*a*, where the second source is related to an input, here say "Chicago," and historical inputs suggest that "Chicago, Illinois" would far and away the most likely state/location associated with the city "Chicago." Here, in this illustration, a column 985*c* relates back to the "Chicago" interval 985*a*, where the table 992*c* reflects that "Chicago, IL" received "33.2" mil queries in the past month compared to "1.1" million for "West Chicago, IL." Further, the Overall historical input for "Chicago, IL" in the IPACE system's historical count (or collective resources) has an overall historical input count of 193 billion for "Chicago, IL" in the past month compared to "1.1" million for "West Chicago, IL." Inputs attributed to a first IP Address (segment, e.g. related to the user) also indicate a historical propensity towards "Chicago, IL" in the past month over the next option listed "West Chicago, IL."

Next a FIG. 17*c*, depicts a ID-ACERS Third Support (e.g. Current Date/Time/Location). Here the IPACE system with the ID-ACERS can incorporate, such data, analysis, statistics, clustering, regression analysis, patterns, behaviors, social mapping, and/or relational mapping, incorporating, say an approximation estimation of a node, say the user's current location, home location, most frequent location, locked location, conditional location, perceived location, work location, project location, set location, or previous location. Further the IPACE system could retrieve, accept, and/or determine the approximation estimation of the particular node based in part on an IP address, dedicated IP address, dedicated mobile device, building address, entity address, last known address, last discerned address, GPS, triangulation, signal strength, and/or the like, can help determine a location of the user. Here the an assumption can be included in a set of rules where relative location of the user and a project, a goal, participant, product, outcome, and/or the like, can be applied to the logic of prioritizing a list of items, here "Chicago, IL" over say "Chicago, Guatemala" (see FIG. 17*d*).

Next a FIG. 17*d*, depicts a ID-ACERS Forth Support (e.g. Locations and data footnotes with (1) Not applicable, (2) Population Source: US Census, (3) Census Year 2010). Here the IPACE system with the ID-ACERS can incorporate, such data, analysis, statistics, clustering, regression analysis, patterns, behaviors, social mapping, and/or relational mapping, incorporating a relative popularity and population of a location, here "Chicago" is relative to the list of "North Chicago" 996*d*, "East Chicago" 997*d*, "West Chicago" 998*d*, and a "Chicago, Guatemala" 999*d*. FIGS. 17*a*-17*d* depict additional illustrative mapping correlation, prioritization, weighting examples, conditional considerations, and/or rule applications, where generally, intervals labeled with "a," say "989*a*" map to the same number with a corresponding "b" letter, in this instance the "989*b*." Here where the days "26-27," matched up with the dates in field "989*b*." However, if there was an anomaly or some perceived or discerned ambiguity, say in a particular ID-ACERS Support, the ID-ACERS could search for similar sources to interrogate, and/or prompt/alert the user of the incident/situation.

FIGS. 18*a*-20*b* depict a list of potential segments, delineations, categories, profiles, characteristics, relations, links, correlations, associations, nodes, intervals, items, (some actors) and/or the like for the Segmentation Engine and Management (112) module mention above. In various non-limiting embodiments, there are virtually an unlimited number of manners and methods to segment data for creating segments, parsing, analyzing, delineating, interrogating, extracting, and/or the like. In various non-limiting embodiments, the segmented data and data tracking may include and/or create relative comparisons, and/or materials, campaigns/projects, advertisements, and/or the like. In various non-limiting embodiments, each generates a series of A/D/RP/AS/P scores per I/O/PC and/or the like, individually per input, output, prompt, correlation, collaboration, and/or combinations, statistics, metrics, scores, and/or the like.

In various non-limiting embodiments, the terms segment and intervals may be utilized interchangeably. In various non-limiting embodiments, the terms segment and nodes may be utilized interchangeably. In various non-limiting embodiments, the terms segment and items may be utilized interchangeably. In various non-limiting embodiments, the terms segmenting and parsing may be utilized interchangeably. In various non-limiting embodiments, the terms segmenting and analyzing may be utilized interchangeably.

In various non-limiting embodiments, each delineation/parsing creates a segment or interval, and where segments/intervals may be combined utilizing such tools/modules as the Segmentation Management module (e.g. including user selections, parsing rules/logic and/or the like). For example, a particular segment could include the user selection for "all US Patent Attorneys (44) who have had patent claims granted by the PTO within a targeting particular PTO classification (e.g. art unit) within the past three years;" and where the IPACE system would have delineations for each independent segment: e.g. US Patent Attorneys (44), patent claims granted, from what authority (e.g. PTO, EPO, JPO, etc.), within what PTO classification (e.g. art unit), when, and/or the like. Further, where parsing rules and/or logic could be incorporated based upon, say historical data for similar data/statistical analysis, segmentations, requests, and/or the like.

FIG. 18*a* depicts an example embodiment with some independent data segments, parsing, and/or delineations (e.g. specifically related to IP), where the IPACE could delineate, parse, and/or the like. Here, for example, comprising independent data segments, parsing, and/or delineations would preferably delineate, parse, and/or the like, for each named inventor 1738 (e.g. 1738*a*, 1738*b*, and so on), each claimed date of conception 1739, each claimed date of reduction-to-practice (e.g. specifying actual or constructive) 1740, and/or the like. In various non-limiting embodiments, further data points for delineations, parsings, and/or like, could include the group comprising an associated city 1741, state 1742, county 1743, relationships (e.g. contractor, employee, employer, assignee, and the like) 1744, other filed applications 1745, other assignments 1746, non-IPACE project experience 1747, and IPACE project participation/experience known 1748.

In various non-limiting embodiments, the non-IPACE project experience 1747 and the IPACE project participation known 1748 could include further delineations from a group comprising each contribution made 1749, each participating collaborator 1750, each participating collaborator contribution 1751, each participating assignee per claim per application 1752, participating practitioners 1753, each participating attorney 1754, each participating law firm 1755, each participating patent agent 1756, each participating draftsperson 1757, each participating search firm 1758; where each could comprise a participating name 1759, a participant's city 1760, a participant's state 1761, a participant's county 1762, a participant's days of participation 1763, a participant's non-IPACE experience 1764, a participant's years registered with PTO and the like 1765. Further, each patent number by the participant 1766, each application title by the participant 1767, each claim by the participant 1768, each set of amendments by the participant 1769, who else participated/contributed 1770, when 1771, and why (if known) 1772. In addition, the number of Reviewers (64) and/or approvers of each amendment 1773, with the history of each claim (independent and dependent per modification) 1774 (FIG. 18*b*).

FIG. 18*b* continues the depicted embodiment example from FIG. 18*a*. Starting here, for example, where each referenced patent application and/or patent application could include further delineations from a group comprising a field of invention 1775, each [PTO] art unit 1776, an abstract 1777, each written specification iteration 1778, each figure and iteration 1779, a Patent Number 1780, an Application Number 1781, a current US Classification 1782, a PCT Number 1783, an EPO Number 1784, any Other Country ID numbers 1785, an International classification 1786, a filing date 1787, each extension 1788, each RCE 1789, each Interview (and any notes) 1790, a prosecution history/file wrapper (per country) 1791, each office action 1792, each office action response 1793, each remark 1794, each amendment 1795, a priority date 1796, a published date 1797, any linkage (e.g. provisional, parent) 1798, any referenced provisionals 1799 (1799*a*, 1799*b*, and so on), any referenced Parent 1800, any related divisional 1801, any related continuation 1802, any related continuation-in-part 1803, and related foreign app. 1804, any related IDS 1805, any prior art references 1806, any patent term adjustment requests/grants 1807, any reissues 1808, any re-exams 1809, a maintenance fee history 1810, each participating PTO (or similar, EPO, JPO, and the like) patent examiner (66) and/or patent supervisor 1811, along with a name 1812, a city 1813, a state 1814, a county 1815, a number of days of participation/involvement 1816, any experience per art unit and per patent 1817, a number of years registered with PTO and the like) 1818.

FIG. 19 continues the depicted embodiment example from FIGS. 18*a* and 18*b*. Starting here, for example, where the referenced patent application and/or patent application could include delineations for each PTO interaction/event (or other countries) 1891, where each referenced patent application interaction/event and/or patent application interaction/event could further include delineations from a group comprising any specified PTO notification 1892, any specified PTO OA and/or rejection 1893, each PTO specified rejection (e.g. 101, 102, 236, 112, or the like) 1894 (e.g. a 1894-102*b*), each applicant/attorney/agent specified response (e.g. per 101, 102, 236, 112, or the like) 1895, each specified declarations response/response-rejection/response-acceptance (e.g. 1.130, 1.131. 1.132, or the like) 1896 (e.g. a 1896-112 response-rejection), the relative amount of time per each 1897, any fees required 1898, any fees paid 1899, any extensions 1900, any RCEs 1901, any legal participation 1902, any expert participation 1903, any petitions 1904, any appeals 1905, any cited MPEP, USC or similar 1906, any cited case law 1907, per interaction/event 1908, and a specified amount of amendments (e.g. per claim/element, written description, abstract, figures, or the like) so far 1909, any Doctrine of Equivalence ground/territory 1910, any associated marksman hearings 1911, any associated litigation 1912, any associated court rulings/decisions (PTAB/BPAI, Federal Circuit, IPACE Court, Mock-Jury-Pools, and the like) 1913, where each data point (e.g. ruling/decision), statistic, and/or the like, may be specified as a known, stated, discerned, and/or perceived to be a relative characterization (e.g. accurate) with a percentage value based upon, say: a particular judge or a specified group of judges decision/remarks 1914, a particular peer or panel of specified Peers (65) and/or a particular expert or specified panel of experts decision/feedback/remarks 1915, a point system 1916, a specified status point system 1917.

In addition, delineations for each current regulation 1918, new regulation 1919, anticipated regulation 1920, and the like; where it tracks other IPACE members who have viewed 1921, reviewed 1922, and/or purchase that specific information 1923. Further, delineations for relative historical performance 1924, per member 1925, per project 1926, per project component 1927, per role 1928, per each role change 1929, per role permission 1930, per member location 1931, per period of time 1932, per any fees associated 1933, per any associated assignment terms 1934, per a number of participant associated 1935, and any associated comments 1936.

FIG. 20*a* depicts an example embodiment with some independent data segments, parsing, and/or delineations (e.g. specifically related to trademark-related IP), where the IPACE could delineate, parse, and/or the like. In an embodiment of delineations for segmentation management, there are delineations for creating other intellectual property-type segments besides patents, here for example, trademark development and participation data/statistics data/statistics tracking, creating relative comparisons, and/or targeting materials, campaigns/projects, advertisements, and/or the like. For instance, the delineations (e.g. related to Trademarks) could include the group comprising any legal history; trademarks: alive or dead 1819, whether a word and/or a design 1820, a goods and services category 1821, a serial number 1822, a filing date 1823, an issue date 1824, an owner(s) 1825, an assignment 1826, an owner name 1827, an owner city 1828, an owner state 1829, an owner county 1830, other owner applications 1831, other owner assignments 1832, an owner's experience 1833, other owner trademarks 1834, other owner projects (e.g. IPACE campaigns, if known) 1835, with an associated registration date 1836, a filing basis 1837, a Published for Opposition date 1838, a type of mark 1839, each specified attorney of record 1840, a specified attorney of record name 1841; where each party (e.g. TM owner, IPACE member, attorney of record, or the like) also has a specified city 1842, state 1843, county 1844, days of participation 1845, an experience record per Good and Services unit and per Trademark 1846, a number of days of filing experience with PTO 1847, a registered type (e.g. with PTO) 1848, a file wrapper/prosecution history 1849, a maintenance fee history 1850, and an entire legal history 1851; and/or the like.

FIG. 20*b* continues the depicted embodiment example from FIG. 20*a*. Starting here, in an embodiment of delineations for segmentation management, Participant (80) delineations could comprise users 1852, inventors 1853, project managers 1854, drawing experts 1855, creative talent 1856, editors/proofers 1857, attorneys 1858, registered patent attorneys 1859, registered patent agents 1860, other licensed professionals/engineers 1861, non-certified experts 1862, researchers 1863, translator 1864, instructors 1865, recruiters 1866, press/PR 1867, advertiser 1868, employees 1869, contractors 1870, peers 1871, professors 1872, students 1873, IP prosecutors 1874, IP licensors 1875, IP acquirers 1876, IP litigators 1877, former PTAB/BPAI judges 1878, former PTO examiner 1879, former IP case jury members 1880, and the like 1881, non-humans/machine contributions 1882, computers 1883, software 1884, time 1885, resources 1886, raw materials 1887, money 1888, credit 1889, and/or other actor/user-specified data/statistics 1890 (e.g. per "Customization and Request").

For example, the actor/user-specified data/statistics categorization request may be to classify data/statistics utilizing the "Technology License Dataset" (Or hereinafter "TLD"), which is a dataset that comprises over 4,500 technology licenses from the high-tech and biotech fields that have been filed with the U.S. Securities and Exchange Commission (SEC). And where the actor/user-specified data/statistics categorization request may become part of the on-going data/statistics structure and table options for all users going forward. If on the other hand, a particular actor/user-specified data/statistics categorization request was a proprietary classification, the particular actor/user-specified data/statistics categorization could be limited to those members the particular user provided access.

FINANCIALS Management (114) Module

Figure 21:
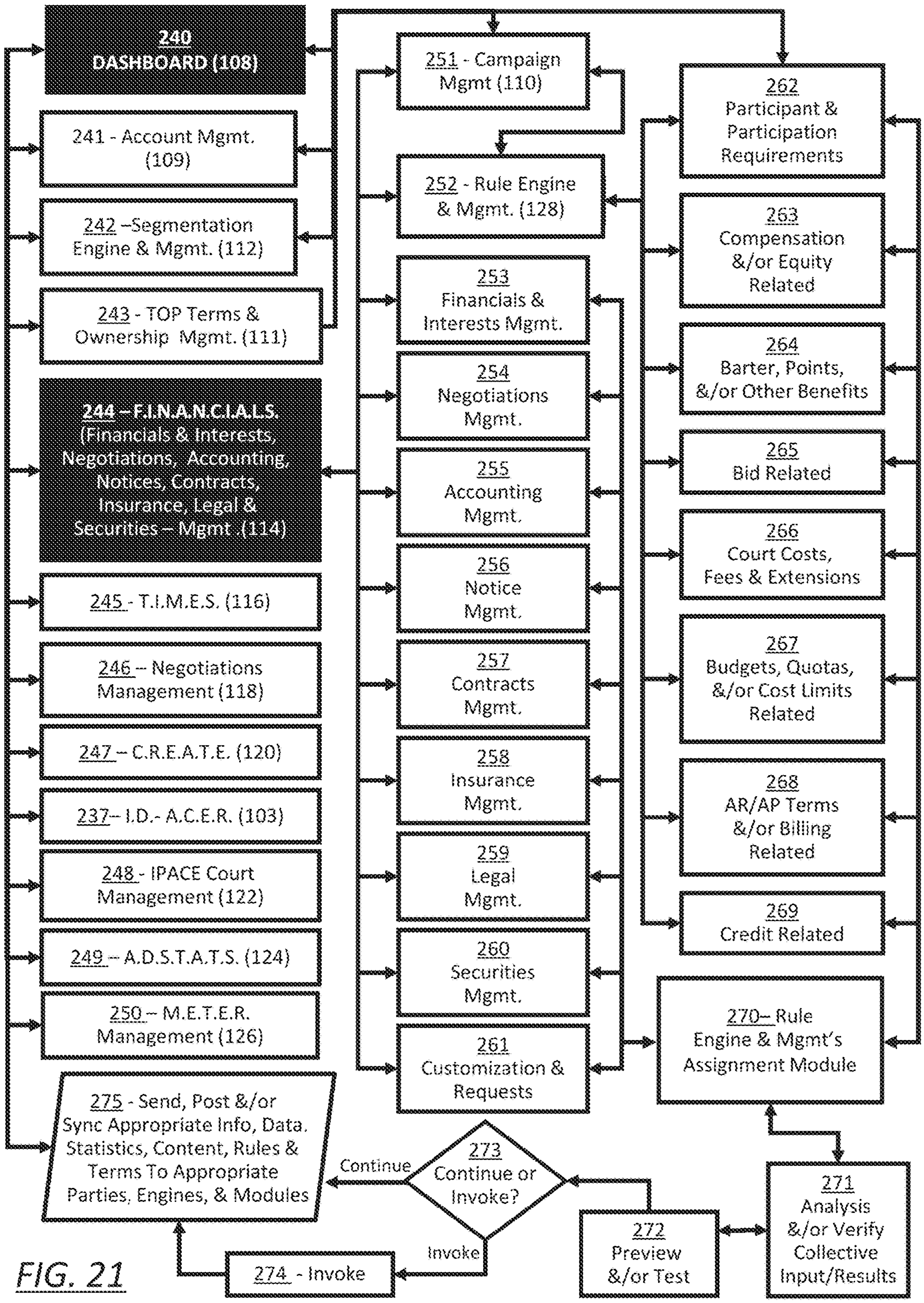
FIG. 21 is a block diagram with some flow charting steps depicting a non-limiting embodiment of the IPACE member's functionality from FINANCIALS Management (114) module.

FIG. 21 is a block diagram with some flow charting steps depicting an embodiment of the IPACE member's functionality from FINANCIALS Management (114) module. Starting with the Dashboard (108) in the block 240, where similar to the previous figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of the FINANCIALS has to have a role and/or at least equivalent to the same permissions required to be a "F.I.N.A.N.C.I.A.L.S. Mgr." hereinafter a "FINANCIALS Mgr." In various non-limiting embodiments, the FINANCIALS MGR utilizes the FINANCIALS to view, review, create, and/or modify criteria requirements or rules for a particular Project or Project element to be used in, say a particular P.A.C. 104 and/or a particular P.I.N. 106.

In various non-limiting embodiments, the Dashboard functionality in this FINANCIALS focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financials and Interests, Negotiations, Accounting, Notices, Contracts, Insurance, Legal and Securities—Mgmt)" (114) module in a block 244, the "T.I.M.E.S." (116) module in a block 245, the "Negotiations Management" (118) module in a block 246, the "CREATE" (120) module in a block 247, the "CREATE" (120) module in a block 247, the "ID-ACERS" (103) module in a block 237, the "IPACE Court Management" (122) module in a block 248, the "ADSTATS" (124) module in a block 249, the "METER Management" (126) (including Knowledge Management) module in a block 250, the "Campaign Management (110) (e.g. Project Management)" (110) module in a block 251, and the "Rule Engine and Management (128) module in a block 252.

From the block 244, the "F.I.N.A.N.C.I.A.L.S." (114) functionality in this limited example embodiment comprises of a "Financials and Interests Management" in a block 253, a "Negotiations Management" module in a block 254, a "Accounting Management" module in a block 255 (not to be confused with the Account Management 109 module), a "Notice Management" module in a block 256, a "Contracts Management" module in a block 257, a "Insurance Management" module in a block 258, a "Legal Management" module in a block 259, a "Securities Management" module in a block 260, a "Customization and Requests" management module in a block 261.

In various non-limiting embodiments, the "Financials and Interests Management" module in block 253, in general, allows the IPACE member the functionality to manage his/her and/or an Account's (60) financials and interest in association with the IPACE Operating Environment. For example, the "Financials and Interests Management" module could specifically track, analyze, and generate reports regarding the amount of overall value he/she/it has to date, in terms of compensation earned (e.g. received and/or due), equity earned (e.g. received and/or due), status points (e.g. received and/or due), bartered credits earned (e.g. received and/or due), and/or the like.

In various non-limiting embodiments, the "Negotiations Management" module in block 254, in general, allows the IPACE member the functionality to manage his/her and/or an Account's (60) negotiations with other IPACE members, IPACE Participants (80), potential participants, and the like. For example, the "Negotiations Management" module could specifically allow the IPACE member/Account (60) to setup a conditional timer rules, whereby he/she/it will conditionally decline/reject an offer where the other party in the negotiations fails to respond in "X" days when there are, say at least three (3) other competing bids that have timely replied on the same project work and within the budget terms. In various non-limiting embodiments, the "Negotiations Management" module may track all current and past negotiations to build reports where, say specific rules and/or rule attributes are perceived to be measurably and relatively beneficial towards successfully completing a goal/task with a project and/or an entire project.

In various non-limiting embodiments, the "Accounting Management" module in block 255 (not to be confused with the Account Management 109 module), in general, allows the IPACE member the functionality to manage his/her and/or an Account's (60) accounting affairs in association with the IPACE Operating Environment. For example, the "Accounting Management" module would typically track all client Accounts (60), account receivables, account payables, credit, credit issues, billing, billing issues, collections, collections issues, budgeting, purchasing, resources, procurement, bidding, bartering credit, and the like (more in next Figure).

Computer-Implemented Accounting Analysis Relative to Success In various non-limiting embodiments, the IPACE system and associated computer-implemented methods would preferably monitor and analyze accounting, accounts receivables, accounts payables, payment methods, payment amounts, bad debt, collection efforts, aging debt, average receivable/collection, net receivable turnover, average payables, equity tracking, and/or the like; per project, per participant, and/or relative to success.

In various non-limiting embodiments, the "Notice Management" module in block 256, in general, allows the IPACE member the functionality to manage his/her and/or an Account's (60) ability to send and/or receive notices in association with the IPACE Operating Environment. For example, the "Notice Management" module may be utilized to submit an official notice regarding a contractual and/or billing issue to another the IPACE member.

In various non-limiting embodiments, the "Contracts Management" module in block 257, in general, allows the IPACE member the functionality to manage his/her and/or an Account's (60) Contract and contractual obligations in association with the IPACE Operating Environment. For example, the "Contracts Management" module could create prioritized lists of obligations for the IPACE member for sorting by: obligations completed/pending/not-started (e.g. per itemized obligation/task, attributable time component, and attributable compensation/equity/other), obligations in progress (e.g. waiting on others/waiting on me), obligations not started (e.g. due when, goal when, hard deadline when) and/or the like. Further, he/she could sort the obligations by, say his/her perceived project compensation/equity/other potential, his/her hourly rate per itemized obligation/task, total attributable client/compensation/equity (e.g. loyalty), and/or the like. In addition, he/she could sort the obligations by the obligation segmentation types, where it could be as simple as obligations for (1) drafting claims, or with increasingly segmented obligations for (2) drafting twenty claims with three independent, for (3) drafting twenty claims with three independent for an ecommerce system, and/or for (4) drafting twenty claims with three independent for an ecommerce system for a particular client (IPACE member).

In various non-limiting embodiments, the "Contracts Management" module may also track what TOPs and obligations he/she has relatively successfully and timely fulfilled relative to other TOPs and obligations. Further, he/she could incorporate these metrics into his/her rules for searching for potential projects, clients, and the like.

In various non-limiting embodiments, the "Insurance Management" module in block 258, in general, allows the IPACE member the functionality to manage his/her and/or an Account's (60) insurance and related interests in association with the IPACE Operating Environment. For example, the "Insurance Management" module could offer and allow a particular IPACE Member, say a Lead Inventor (40) an ability to purchase an IP Abatement Insurance policy, an IP Defense Insurance policy, a Multi-Peril Reimbursement Insurance policy, an IP Litigation Assertion policy, and/or an IP Infringement Insurance policy when timely and appropriate, with a list of rates that conditionally depend on factors, such as perceived exposure, risks, events, accomplishments, and/or existing conditions. In addition, the IPACE system could create a general IPACE insurance pool or an IPACE insurance pool for a specific benefit/value/protection for IPACE members to contribute a calculated fee per project and/or a calculated renewal fee/premium and where he/she may selectively obtain insurance policy protections, and in some cases pro-rata per your entry into a particular project, entry into the general IPACE insurance pool, and/or entry into the IPACE insurance pool for a specific benefit/value/protection and/or the like.

In addition, the "Insurance Management" module could offer and allow a particular Patent Attorney (44) an ability to purchase a malpractice insurance policy when timely appropriate, with a list of rates that depend on factors, such as perceived exposure, risks, events, accomplishments, and/or existing conditions. In addition, the IPACE system could create a general IPACE malpractice insurance pool or an IPACE malpractice insurance pool for a particular project and/or group of Patent Attorney (44) segment to contribute a calculated fee per project and/or a calculated renewal fee/premium and where he/she may selectively obtain malpractice insurance policy protections, and in some cases pro-rata per his/her entry into a particular project, entry into the general IPACE malpractice insurance pool, and/or entry into the IPACE malpractice insurance pool for a particular project and/or group of Patent Attorney (44) segment and/or the like.

Further, the "Insurance Management" module could allow other IPACE members to search potential participants, Participants (80) and the like, by those who currently have malpractice insurance, and more specifically, how much, type, and if appropriate and applicable, his/her historical and current participation in the general IPACE malpractice insurance pool, and/or the IPACE malpractice insurance pool for a particular project and/or group of Patent Attorney (44) segment and/or the like. In general, IPACE members could create TOPs which limit Participant (80) to a particular range of malpractice insurance limits and/or if appropriate and applicable, policy life, policy history, exposure, risks, and/or the like.

In various non-limiting embodiments, the Inventor may offer compensation-insurance to the participating Members that if their pending offer gets improved, work done to date may also get the higher fee or equity, as long as it fits a certain set of criteria, such as was completed in the 48 hours prior to the offer increase. This will allow Inventors (70) to increase fees that they are willing to pay Members when it gets down to the last minute without having to go back and increase everyone else's participation, while at the same time help reduce those Members who are only attracted to work on last minute applications for rush fees. In various non-limiting embodiments, the private network (e.g. PIN) will track work performed by Members and will know if Members are abusing the system if they get unsatisfactory reviews by Inventors (70) and only participate in rush work with higher fees. However, Members who only do rush work, but receive high-complimentary scores from Inventories will also be noted and made available to the Members.

In addition, the "Insurance Management" module could allow IPACE members to challenge the perceived exposure, risks, events, accomplishments, and/or existing conditions calculations employed in the insurance policy fees/premium, where the IPACE system would preferably credit those IPACE members who relatively successfully, promptly, and accurately pointed out/commented omissions, errors, and/or the like; and relative to how specifically he/she articulated the omissions, errors, and/or the like.

In various non-limiting embodiments, the "Legal Management" module in block 259, in general, allows the IPACE member the functionality to manage his/her and/or an Account's (60) legal and related interests in association with the IPACE Operating Environment. For instance, the "Legal Management" module could track, analyze, and report potential terms within a particular potential offer and/or project to help reduce and/or eliminate the improper conveyance and/or usage of legal advice by either the IPACE member and/or other parties the IPACE member interacts with. Further, the Legal Management" module could track, analyze, and report on-going matters to help the IPACE member to reduce and/or eliminate the improper conveyance and/or usage of legal advice by either the IPACE member and/or other parties the IPACE member interacts with.

For instance, the IPACE system would delineate data/content into groups comprising a "known to be legal-related data/content," a "perceived to be legal-related data/content," a "known not to legal-related data/content," and a "perceived not to be legal-related data/content;" where the IPACE system continually tracks data/content modifications to analyze if the data/content fits one of these categories, and analyze whether the data/content is specifically disclaimed as non-legal advice, a statement of opinion, a hypothetical statement, a statement of legal fact, an attempted statement of legal fact, known legal advice, and/or the like.

In addition, the "Legal Management" module may alert the IPACE member of conflicts he/she may have created when developing a new project offer and/or a particular TOP.

For instance, the IPACE member may have created a draft of TOP offering Joint-Inventor/Co-Inventorship to Participants (80) who do not legally qualify and/or who could potentially qualify as Joint-Inventor/Co-Inventor (41), but are conflicted by existing employee agreements with his/her current employer. In various non-limiting embodiments, preferably each IPACE member would share any current contractual obligations and/or conflicts within IPACE system and/or his/her outside contracts (e.g. with his/her employer). In addition, the IPACE system would incorporate verification procedures and privacy policies per participant, and appropriate entity/company, as well as any local, state, and/or federal (country-of-origin) laws per participant.

In various non-limiting embodiments, the IPACE system could also reward points and/or remove points (demerits). Rewarding points could depend upon a particular IPACE member's promptness, accuracy, and transparency, while any delay and/or failure in updating any such relevant information could receive demerits, temporary removal, and/or a complete ban to a particular PAC, PIN, project, entity, per conditions, Campaign Gatekeeper (42), and/or the IPACE Court.

In various non-limiting embodiments, the Legal Management" module could also track, analyze, and report Contractual terms and obligations relative to how unique each term and obligation is when compared to other Contract and offer terms and obligations, where these unique terms and obligations may be tracked for their relative and attributable effect on the successfulness of attracting Participants (80), fulfilling the contract timely, accurately, compensation, timely fee payment, timely equity acquisition, and/or the like.

In addition, the "Legal Management" module could track, analyze, and report disputes and dispute resolution terms and results relative to how unique each term and result is when compared to other dispute resolutions terms and results, where each term and result may be tracked for their relative and attributable effect on the successfulness or lack of success at fulfilling the related contract and subsequently related contracts timely, accurately, compensation, timely fee payment, timely equity acquisition, and/or the like.

In various non-limiting embodiments, the relative effect on attracting Participants (80) to complete the contract and future contracts, attracting future Participants (80), the effect on networked relationships from each party involved in the dispute and the like, in terms of relative interactions, participation, and successfulness increases/decreases. For example, data/statistics tracking could reveal that a particular IPACE member who was not a party of the dispute, but who was introduced to the particular Lead Inventor (40) through a party in the dispute and who has made relatively valuable and timely patent application claims or figures, appears to reduce his/her participation post the dispute resolution with the party that introduced him/her to the Lead Inventor (40). This information could spur a dialog between the two parties and/or a necessary change in Participants (80).

In addition, the Legal Management" module could track, analyze, and report potential terms within a particular potential offer to help the IPACE member prevent mathematical errors, typos, terminology and/or lexicography inconsistencies, ambiguity, confusion, lost opportunities, and/or the like. Further, the "Legal Management" module could track, analyze, and report potential terms within a particular potential offer to help the IPACE member prevent mathematical errors, typos, terminology and/or lexicography inconsistencies, ambiguity, confusion, lost opportunities, and/or the like. In addition, the "Legal Management" module could allow IPACE members to recognize and utilized relatively tried and true offers and contractual terms for attracting talented, cost effective, and/or industry relevant IPACE members to projects when relatively compared to more or less strict offer and contractual terms.

In various non-limiting embodiments, the "Securities Management" module in block 260, in general, allows the IPACE member the functionality to manage his/her and/or an Account's (60) securities and security interests in association with the IPACE Operating Environment. For example, the "Securities Management" module would track all in-coming and out-going offers, negotiation, and Contracts that incorporate equity (e.g. for public and private corporations) and/or units (e.g. for LLCs and LLPs). In some cases, the equity and/or units could be dependent upon a future conversion, say for convertible debt.

In addition, the "Securities Management" module would check for security issues, and/or relatively common versus unique terms in terms of conversion, dilution, anti-dilution, dividends, voting rights, preferred vs. common, public vs. private, escalation provisions/clauses, preferential provisions/clauses, and/or the like. For example, the "Securities Management" module would track each equity related offer, negotiation, and contract term and track for their relative and attributable effect on the successfulness of attracting Participants (80), fulfilling the contract timely, accurately, compensation, timely fee payment, timely equity acquisition, and/or the like.

In various non-limiting embodiments, the "Customization and Requests" management module in block 261, in general, allows the IPACE member the functionality to create customizable rules, elements, and the like, or create/modify requests for features and functionality.

Back to the "Rule Engine and Management (128) module in block 252, in general, allows the IPACE member the functionality to manage his/her and/or an Account's (60) FINANCIALS rules in association with the IPACE Operating Environment. In various non-limiting embodiments, the FINANCIALS rules functionality of the "Rule Engine and Management" (128) module in this limited example comprises of a "Participant and Participation Requirement" module in a block 262, a "Compensation and/or Equity Related" module in a block 263, a "Barter, Points, and/or Other Benefits" module in a block 264, a "Bid Related" module in a block 265, a "Court Costs, Fees and Extensions" module in a block 266, a "Budget, Quotas, and/or Cost Limits Related" module in a block 267, an "Accounts Receivable/Accounts Payable Terms and/or Billing Related" module in a block 268, a "Credit Related" module in a block 269, and a "Rule Engine & Mgmt's Assignment" module" in a block 270.

In various non-limiting embodiments, the IPACE member may create FINANCIALS rules from scratch/new, modify existing rules, use existing rules as templates, and/or the like. Rules may be set to be global FINANCIALS rules, default FINANCIALS rules, override FINANCIALS rules, individual FINANCIALS rules, and/or stair-step FINANCIALS rules. For example, the IPACE member may create a global FINANCIALS rule where no outside IPACE member may view a particular portion of the FINANCIALS information for say compensation and equity earned, or at least not without prior permission. A default FINANCIALS rule could be created for, say any TOP that fails to address a particular FINANCIALS term, such as how and when Contributors (50) are generally paid (e.g. net 30 following the work completion). An override FINANCIALS rule could be created for a particular provision, say a particular situation where a project comes under a "rush term or urgency issue" due to time or cost constraints. An FINANCIALS individual rule for a specific IPACE member, could be for where he/she gains conditional visibility to his/her related for FINANCIALS, or could be for a TOP for a particular project where a unique skill is required, say an engineer with specific deep-water petroleum exploration knowledge.

Starting with the "Participant and Participation Requirements" module in block 262, which in general, allows the IPACE member to create/modify rules as to who may participate or conditionally interact with the IPACE members' FINANCIALS, to what degree, when, how, and/or like (more on the "Participant and Participation Requirement" module throughout the specification, e.g. FIGS. 13 and 17).

In various non-limiting embodiments, the "Compensation and/or Equity Related" module in block 263, in general, allows the IPACE member to create/modify rules as to how potential participants are compensated and/or earn equity, to what degree, when, how, and/or like. In various non-limiting embodiments, the "Barter, Points, and/or Other Benefits" module in block 264, in general, allows the IPACE member to create/modify rules as to how potential participants may earn points, benefits, barter, and/or like.

Computer-Implemented Assignment Collaboration

In various non-limiting embodiments, the IPACE system and associated computer-implemented methods for patent collaboration include a valuation method, where preferably the IPACE system would track and analyze the value and/or equity per claim contribution, per participant and it relative successfulness in prosecution, monetization, and/or the like. In various non-limiting embodiments, the patent collaboration and valuation would preferably also track and analyze a discerned and/or a perceived relative effort towards maintaining the doctrine of equivalence for each claim element, a discerned and/or a perceived relative successfulness towards maintaining the doctrine of equivalence for each claim element, and/or the like. In various non-limiting embodiments, the IPACE system and associated computer-implemented methods would preferably provide participants (e.g. inventors, patent attorneys, agents, experts, professionals and/or the like) a means to improve and/or challenge others application preparation, prosecution, system analysis for the relative effort and/or successfulness in maintaining the doctrine of equivalence for each claim element, and/or the like. For example, a particular patent attorney may argue that amending a particular claim element was relatively wiser than holding out for the doctrine of equivalence for a particular element, say, since the specification includes a relatively large list of variation, embodiments, and/or the like, and/or where he/she may argue that compacting the prosecution was relatively more important for other purposes (e.g. defensive purposes, licensing, litigation, and/or the like); and/or the like.

In various non-limiting embodiments, the "Bid Related" module in block 265, in general, allows the IPACE member to create/modify rules as to how bids are managed. In various non-limiting embodiments, the "Court Costs, Fees and Extensions" module in block 266, in general, allows the IPACE member to create/modify rules for court costs, fees, extensions and the like.

In various non-limiting embodiments, the "Budget, Quotas, and/or Cost Limits Related" module in block 267, in general, allows the IPACE member to create/modify rules for budgets, quotas, court limits, and/or the like. In various non-limiting embodiments, the "Accounts Receivable/Accounts Payable Terms and/or Billing Related" module in block 268, in general, allows the IPACE member to create/modify rules for accounts receivable and terms, accounts payable and terms, billing related issues, and/or like. In various non-limiting embodiments, the "Credit Related" module in block 269, in general, allows the IPACE member to create/modify rules for credit and/or like.

In addition, the "Rule Engine and Management (128)" module provides a variety of methods to employ a variety of thresholds, ranges, weighting, prioritizations, and rules to the collective measurements and results. For example, a particular Budget Level or Range, say one for preparing a claims for a particular Non-Provisional Patent Application may prove to be far more effective at attracting interested Patent Attorneys (44) when relatively compared to other Budget Levels or Ranges Over the course of time and therefore more weight could be applied towards that particular Budget Level or Range for that particular task of preparing NPA claims.

In various non-limiting embodiments, the "Rule Engine and Management's Assignment" module shown in the previous figure allows the user to assign rules to a variety of objects through segments and IDs. In various non-limiting embodiments, the results of the Rule Engine & Management Assignment usage and the associated functionality afforded by the option modules appear in a step 271 "Analysis &/or Verify Collective Input/Results." Next, a step 272 is where the IPACE Member may "Preview &/or Test" rule(s)."

Each new IPACE Campaign (e.g. Project) 236 and/or rule could be set to run against previous IPACE Campaigns 236 and rules in general and Campaigns 236 and rules with similar FINANCIALS rules to track and make sure that the new IPACE Campaign 236 and/or rules are in fact performing similarly, or report back that it is off by a quantifiable degree, and make suggested changes based on the area and/or attribute where the new IPACE Campaign 236 and/or rules deviates from methods that are relatively more tried and true, so credit and changes may be suggested and/or made based upon measurable results. New and modified FINANCIALS Rules resulting in being acquired to participate in projects with a particular, say a minimum billing rate for a Patent Attorney (44) may be run against historical data/statistics to analyze and generate an estimate of the number of Projects the Patent Attorney's (44) rate would likely attract using the Preview and/or Test 272 function.

Next, a query 273 asks if the IPACE member would like to either "Continue or Invoke" the rule? If the answer to query 273 is "continue" as in continue utilizing the Dashboard functionality without invoking the rule, then a next step 275 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 273 is instead "invoke," then a step 274 is invoked for the particular rule, then the next step 275 with a "Send, Post and/or Synchronize Appropriate Info, Data, Statistics, Data/content, Rules and Terms To Appropriate Parties, Engines, and Modules" is performed, where the IPACE user may also then continues utilizing the Dashboard.

All of the FINANCIALS module and inputs are generally tracked and measured independently, and collectively as a unit against and relative to a particular Project 236, and/or Project element to measure their effectiveness and success rates against different Project 236 elements, TOP Rules, Account Rules, Segmentation Rules, TIMES Rules, CREATE Rules, Negotiation Rules, METER Rules, IPACE Court Rules, ADSTATS Rules, and Real-time Tracking/Reporting.

Figure 22:
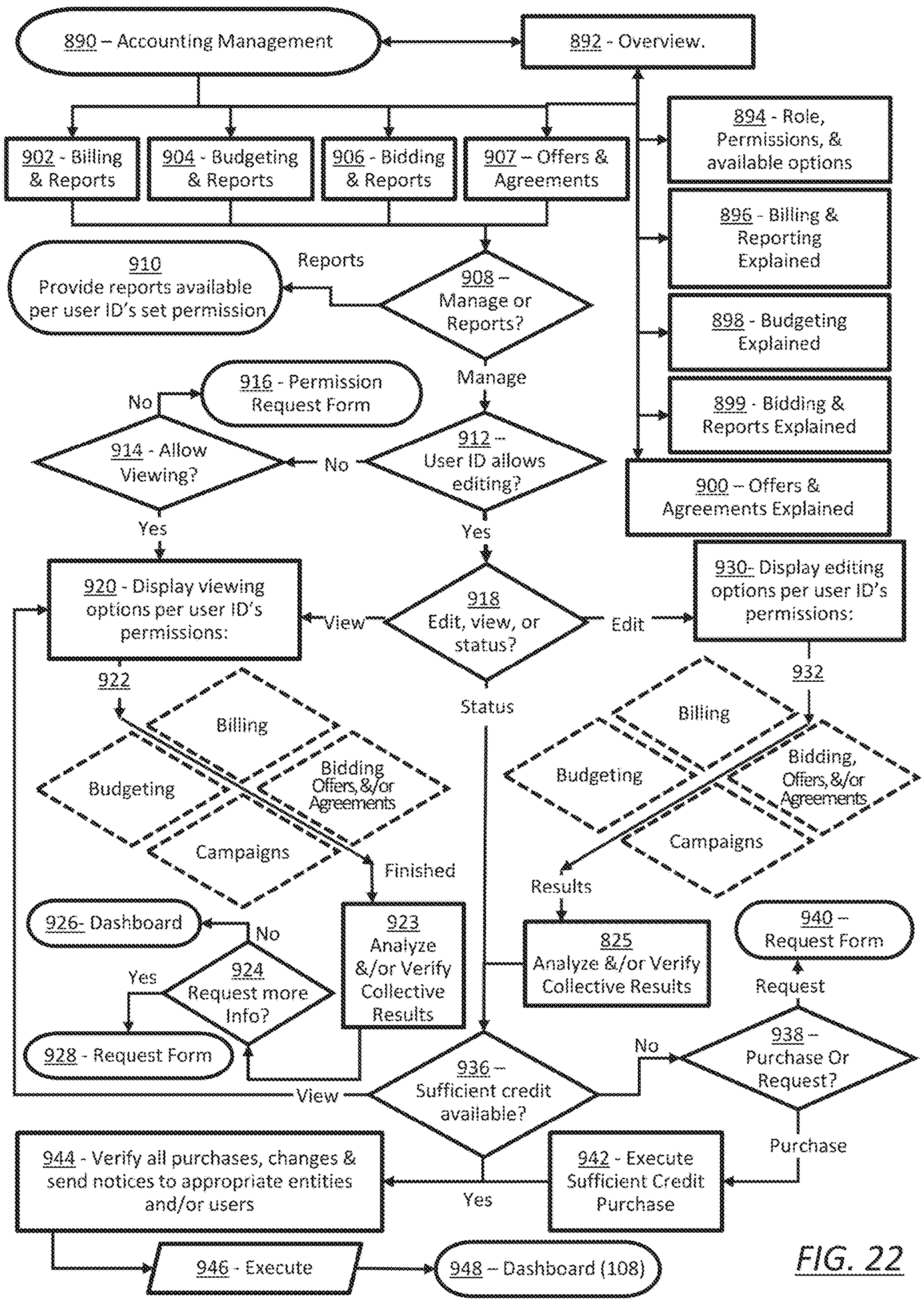
FIG. 22 is a flowchart depicting a non-limiting embodiment of the user (e.g. an IPACE Member) utilizing the Accounting Management Module of the FINANCIALS Management in the previous figure and not be confused with the Account Management.

FIG. 22 is a flowchart depicting an embodiment of the user (e.g. an IPACE Member) utilizing the Accounting Management Module of the FINANCIALS Management in the previous figure and not be confused with the Account Management. Starting with a step 890 "Accounting Management," where the user is already connected to IPACE-UI (102) via a transceiver, he/she may go to a step 892 "Overview," which provides more detailed information in a step 894 for "Role, Permissions, and Available Options," a step 896 for "Billing and Reporting Explained," a step 898 for "Budgeting Explained," a step 899 for "Bidding and Reports Explained," and a step 900 for "Offers & Agreements Explained."

From step 890, the user has the option to go to a step 902 for "Billing and Reports" where he/she may view and manage both their Account's 60 Receivables from other members and/or Accounts 60 in the IPACE system and their Account's 60 Payables to other Accounts 60 and/or members. This information would include such billing information as historical information regarding when, by whom, and for how long the balance for each particular bill was outstanding.

What work was performed when and specifically for what, say patent, and what element of the patent, say the claims. In various non-limiting embodiments, these types of delineations allow the IPACE system to track the ROI (return on investment) for such things as per Participant (80) per patent, per patent family, per country. In addition, most patent professionals, such as registered Patent Attorneys (44) and Patent Agents (45) earn compensation based upon hours billed to a client and/or revenues generated by a firm, and their fees are rarely based upon a measure of a successful milestone and/or the overall successfulness of a particular patent filing. Overall successfulness, for instance, could be measured by a pre-determined method of valuing the issued patent at a certain moment in time.

Another option is a step 904 for "Budgeting and Reports," which allows the user to view and manage Account (60) budgeting. For example, the user could establish budget constraints for particular projects, usages, users, user roles, periods of time, for particular ad campaigns, and/or any other element that allows for segmentation and/or delineation (see more regarding Ad Target with segmentation). In various non-limiting embodiments, the IPACE system and the computer-implemented method the user utilizes the FINANCIALS to deposits fund into his/her Account (60). In addition, the IPACE system may monitor the funds with the user's deposit fund with, say the USPTO, and supplies funds as, and if needed, to help avoid any case of abandonment or late fees due to fees not be timely paid or available in the deposit fund. In various non-limiting embodiments, the IPACE system would track and notify participating members/users.

Another option is a step 906 for "Bidding and Reports," where the user may view and/or manage the bidding process for a particular offer, such as bid to participate in a particular project and/or where the bids vary by such things as the user's availability, the prestige points accumulated by a particular project and/or a particular user. For example, a Patent Attorney (44) may offer his/her rate at a set amount, but offers a discount, of say 40% to any inventor with an expert rating of, say 300 points or more, but on a first come first serve basis. This allows the Patent Attorney (44) to work with an inventor with significant notoriety, but to also create a sense scarcity, while not taking on more discounted work that perhaps he/she could afford at one time. In various non-limiting embodiments, the Patent Attorney (44), in turn, may get a boost in his/her status points if he/she receives points from the inventor of notoriety (whose reward points are worth more).

In various non-limiting embodiments, these conditions may also be based on a set of pre-determined rules, weights, and/or thresholds. For instance, the user could place a bid to participate based upon a particular component of a particular project, say creating the claims (as the component) for a patent application (as the project) where the associated Invention involves telecommunications software. For example, in various non-limiting embodiments, where the inventor may be willing to pay per independent claim accepted by the Inventor (70), say $75/independent claim, and per dependent claim accepted by the inventor, say, $25/dependent claim. Further, where assuming the Patent Attorney (44) is allowed an allotment of time, say at least 72 hours for the first draft post reading of the application, and say a 60 minute phone call with the Inventor(s) 70, followed by say, another 48 hours for a revision/final draft, past the Inventor's (70) allowed allotment of time, say another 30 minute phone call, and where the attorney may bill at his/her hourly rate for any hours that exceed this input.

Another example embodiment could be for an offer from an inventor seeking a bid from a particular type of Patent Attorney (44) to work on the entire patent, from application through prosecution to grant, or just a defined portion, say the first three independent claims only and based on the current disclosure. Further, the inventor could request that the Patent Attorney (44) have some qualified expertise and/or quantifiable experience within a particular industry, say Biotech, and where the inventor is willing to pay this Patent Attorney (44) (a potential participant) some set hourly rate; and/or wants a discount on the legal fees normally charged, in exchange some equity in the patent directly involved and/or some other definition, such as any patent value generated (e.g. IP-VP (IP Value Prediction) and/or actualized value) from the patent family (those referencing the same parent).

In various non-limiting embodiments, the equity could be predetermined for a set amount, say two (2%) percent; and/or for a set amount of work, say just the claims in the application (but there must be at least three (3) independent and fifteen (15) dependent claims submitted; and/or partially or fully based upon the performance of the work, where it is, say done within a specific period of time and/or judged to be quality work by, say a panel of Peers (65) and/or Experts (75); or where the equity is conditional a future value of the IP, say five (5%) percent equity stake in the IP valuation beyond a set number, say $3 million; and/or for a specific component of work contributed by the participant.

Further, this offer campaign could be set to conditionally run (post/publish) only in certain demographics, only certain Restricted (e.g. PIN) 106 access environments, only emailed to certain pre-approved attorney, only sent out to appear along Public data/content, where the details for the associated invention are still protected (not made available, or say, at least without a specific login request); each independently, collectively, and/or per each potential permutation combination of these conditions.

In addition, the inventor could select/designate particular websites, entities, events, locations, times of day, and/or attorneys with, say a particular accumulation amount, threshold value, or lack of accumulation amount, of say, status points to incorporate for targeting, posting, searching, and/or the like. Further these status points could be selectively scored based on what the status points are specifically pertaining. For example, only incorporate and/or conditionally count status points known to be attributable to, say "bio-tech inventions" and/or where the Patent Attorney (44) worked on a patent application partially for equity. Another option is a step 907 for "Offers & Agreements," which allows the user to present and/or accept offers and create, view and manage Account (60) agreements.

From steps 902, 904, 906, and 907, the user may advance to a query 908 where he/she may "Manage or (go to) Reports?" If the answer to query 908 is "reports" the user is passed to terminator 910 where he/she is "Provide(d) reports available per user ID's set permission." If the answer to query 908 is "Manage" the user is passed to a query 912 that asks if the "User ID allows editing?"

If the answer to query 912 is "no," the user is passed to a query 914, which asks if the user is "Allow(ed) viewing?" If the answer to query 914 is "no," the user is passed to a terminator 916 for a "Permission Request Form," similar to the examples cited earlier to request permissions from a manager and/or administrator.

If the answer to query 914 "Allow Viewing?" is instead "yes," then the user is passed to a step 920 where a "Display viewing options per user ID's permissions:" allows the user to advance to an option pool 922 where the user's role and set permissions allows for the appropriate visibility of Billing, Budgeting, Bidding Offers, &/or Agreements, and Campaigns. Here Campaigns could be all Campaigns or it could be further delineated to include some conditional subset of Campaigns; such as a segment of Campaigns correlated to, say only open-source software; a particular advertising Campaign with a specific Advertising ID; a Campaign involving all projects related to a particular Account (60), participant, and/or other ID such as a particular Project ID. When finished, the process advances to a step 923 to "Analyze &/or Verify Collective Results?" Next, the process proceeds to a query 924 where he/she is asked "Request more info?" (information). If the answer to query 924 is "no," the user is passed to a terminator 926 and back to the appropriate Dashboard. If the answer to query 924 is instead "yes," the user is passed to a terminator 928 where he/she may request more information with a "Request Form."

If the answer back at query 918 was "edit," then the user is passed to a step 930 where it "Display(s) editing options per user ID's permissions:" and allows the user to advance to an option pool 932 where the user's role and set permissions allows for the appropriate editing capabilities of Billing, Budgeting, Bidding Offers, &/or Agreements, and Campaigns. As outlined above, these Campaigns could be all Campaigns or it could be further delineated to include some conditional subset of Campaigns, such as a segment of Campaigns correlated to, say only patent inventions; a particular advertising Campaign with a specific Campaign ID; a Campaign involving all projects related to a particular Account (60), Inventor (70), participant, and/or other ID such as a particular Project ID. When finished, the process advances to a step 825 to "Analyze &/or Verify Collective Results?" Next, the process proceeds as the user advances to a step 934 where the user "Verifies Changes."

From step 934, the user is passed to a query 936 which asks if the user's Account (60) has "Sufficient credit available?" If the answer to query 936 is "no," the user is passed to a query 938 where it asks if the user wants to "Purchase or Request?" credit. If the answer to query 938 is "request," the user is passed to a terminator 940 "Request Form" where he or she may request more credit and/or some modification to the Account's (60) credit.

If the answer to query 938 is "purchase" more credit, the user is passed to a step 942 where the user may "Execute Sufficient Credit Purchase." This option could also allow the user to buy credit beyond what is currently required and/or offer discounts, time limits, incentives, bartering, points exchanges, and/or the like; each independently, collectively, and/or per each potential permutation combination. In addition, there could be examples of where and how to offer equity in addition or in lieu of cash for other Participants (80), resources, and/or needs. This could include the terms set by the overall IPACE administrator, subsequent RAA Administrator(s), and Campaign Gatekeeper (42) or Lead Inventor (40). It could also outline the legal qualifications, ramifications, and requirements known per jurisdictions and/or per offer.

From step 942 the user is passed to a step 944, along with the users who answered "yes" to query 936 "Sufficient credit available?" In various non-limiting embodiments, the step 944 "Verifies all purchases, changes, offers, and send(s) notices to appropriate entities and/or users." Some of these notifications may be selected by the user and some notifications may be preset for and/or by a particular Account (60), a particular role, a particular user, and/or some other segmentation and/or delineation, such as a particular Campaign 236 requested alert of a particular bid, such as a dollar amount and/or the first bid. From step 944 the user gets passed to an execution 946 to "execute" step 944, and then the user is passed to a terminator 948, which sends the user back to the appropriate dashboard or main Dashboard (108).

A key initially for the IPACE-Hub 100 System is to fully establish the ownership of any materials contributed and subsequently viewed, edited, or manipulated. For those users who wish to restrict access to the data/content, they may setup his/her own Restricted (e.g. PIN) 106 access environment where only pre-approved members may participate. This pre-approved condition could either be for a set named and identified individual, say an Employee (55) or Contractor (56); it could be by invitation to a set named and identified individual through, say an email invite; or it could be based on a set of conditions established by time-to-time by the RAA, typically the Lead Inventor (40), where there are set conditions to become a member and typically more conditions to participant in a particular project, and/or a particular component of a project.

In various non-limiting embodiments, the first set terms establishes the conditions of who, when, where, how, and for what purposes the user may become a member of the particular Restricted (e.g. PIN) 106 access environment. Typically the first criteria is that the user accepts the terms regarding ownership of all materials, where the RAA/Lead Inventor (40) may establish and set the ownership terms where all proprietary data/content or materials viewed, edited, or contributed, and/or any work-product edited or contributed by any member in associated use of the Restricted (e.g. PIN) 106 access environment is, say one-hundred (100%) percent solely owned and assigned to the RAA, Lead Inventor (40), and/or entity as so named within the terms required review and approval for membership. These initial ownership terms, which require membership review and approval before access to particular Restricted (e.g. PIN) 106 access environment, are allowed and referred to herein as a Restricted Access Ownership Reserve (hereinafter "RAOR"). This type of arrangement where the RAOR is one-hundred (100%) percent may be appropriate for, say a particular Restricted (e.g. PIN) 106 access environment with Employees (55) who have assigned all of his ownership and invention rights to his/her employer, where the named RAOR entity would be the employer.

Membership would likely be conditional and could be temporarily suspended for a variety of reasons, such as say a failure to follow instructions; a failure to timely contribute; an inappropriate or offensive contribution and/or comment; failure to request permission for a particular type of contribution that was subject to prior permission requirements, a perceived or actual conflict, and/or for certain windows in days/time such as evenings, weekends, holidays, vacations, and/or lunch breaks. Membership could also be conditionally set to terminate for a variety of reasons, such as change in employment roles; a potential or actual failure to properly fulfill a warranty, commitment, responsibility, duty, role, and/or purpose; a potential or actual breach of contract, TOU/TOPs, confidentiality, or fiduciary responsibility; a suspected or actual intellectual property/copyright law or violation; a suspected or actual malicious act or business tort; a potential or actual act of misrepresentation, deception, fraud, and/or the like; a potential or actual act of price fixing, collusion, tampering, pouching, and/or the like; a suspected or actual act of securities fraud or SEC violation, government violation, and/or the like; a potential or actual act of trespassing, data-security breach, or privacy breach; a potential or actual act of data/statistics or code-tampering or hacking, wrongfully downloading/possessing data/statistics or code, and/or the like; a potential or actual act of transmitting, hosting, causing, and/or supporting viruses, malware, spyware, worms, rootkits, unauthorized software, unauthorized code, unauthorized cookies, unauthorized session IDs, unauthorized bots, and/or the like; and/or a suspension or termination of employment or contract work; and/or the like.

All of these conditional terms could be entered and conditionally tracked for proper and relative adherences in the system, where notifications could be sent to the RAA (48), Lead Inventor (40), the Campaign Gatekeeper (42) and/or the Project Manager (43) when a set of algorithms crossed a particular alert threshold to create a suspected problem or condition based on data/statistics correlations against historical data/statistics where known violations, issues, and/or problems came to light and the data/statistics correlations created during the violation, issue, and/or problem.

For example, historical records may reflect a condition where data/statistics records display a strong correlation between a subset of members who quit a company or get fired in, say the next 30 days, and a subset of members/Employees (55) who are likely to download (or try and download) the entire project during a weekend, and/or day off. In this example, the IPACE system would preferably send an alert to the appropriate parties/members, say the to the RAA (48), Lead Inventor (40), the Campaign Gatekeeper (42), Project Manager (43), and/or the like, a campaign overall authority, when a member downloads (or tries to download) a significant portion of a particular project during a weekend, and/or day off.

This conditional alert, accelerate to a termination of membership's access, if data/statistics surpasses a preset threshold, say where the correlations between the subset of members who quit a company or get fired in, again say the next 30 days, and the subset of members/Employees (55) who are likely to download (or try and download) the entire project during a weekend, and/or day off goes over a threshold of, say fifty (50%) percent.

Here the fifty (50%) percent threshold may only include historical data/statistics know within a particular project within the particular Restricted (e.g. PIN) 106 access environment; all historical data/statistics and project data/statistics known within the particular Restricted (e.g. PIN) 106 access environment; all historical data/statistics and projected data/statistics known for all Restricted (e.g. PIN) 106 access environments, even outside the company, but known to the IPACE-Hub 100; and/or some subset of the all the historical data, statistics, data segments, algorithms employed, and data/statistics correlations created. Consequently, the on-going data/statistics would generate relatively valuable tracking metrics for potential problems, as well as for tracking relative success per project, per participant, per days/time/hours/seasons, locations, per incentives employed, the Participants (80) who collectively collaborated, etc.

While some Restricted (e.g. PIN) 106 access environments may need or want to control one-hundred (100%) ownership and therefore set the RAOR at one-hundred (100%) percent, others may want or need to offer other, less stringent RAOR arrangements to encourage and/or foster participation. This encouragement may be needed to either attract a particular Participant (80) with a particular talent; a particular type of expertise from a particular pool or segment of talent, skill, education, background, experience, language, country, resources, quantifiable expertise, and/or status points; to attract Participants (80) to meet other conditions, such as completing a project, task, and/or work-product within a certain amount of time and/or by a certain deadline; and/or willing to participate for a certain price/fee and/or equity exchange.

For example, the RAA and/or Lead Inventor (40) for a particular Restricted (e.g. PIN) 106 access environment may set the set the RAOR terms where all proprietary data/content or materials viewed, edited, or contributed, and/or any work-product edited or contributed by any member in associated use of the Restricted (e.g. PIN) 106 access environment is, say at least ten (10%) percent owned and assigned to the RAA, Lead Inventor (40), and/or entity as so named within the terms required for review and approval for membership. In various non-limiting embodiments, then each project could have/take/require its own separate and additional equity ownership stake, referred to as a "Project Access and Data/content Ownership Rights" (hereinafter a "PACOR").

For example, a particular project may require any members who wish to participate to review and approve the PACOR terms where the RAA, Lead Inventor (40), and/or a particular named entity (e.g. a corporation, LLC, etc.) is said to retain a fifty (50%) percent ownership stake where all proprietary data/content or materials viewed, edited, or contributed, and/or any work-product edited or contributed by any member in associated use of the Restricted (e.g. PIN) 106 access environment for this particular project. In various non-limiting embodiments, these PACOR terms could include how and when in time the ownership will be established, say based upon the overall invention's equity value (e.g. IP-VP (IP Value Prediction) and/or actualized value) at some predefined moment in time; say at either the day and moment the provisional application is filed, the non-provisional application is filed, the first application associated to the application's parent is granted, or when some other trackable event occurs.

In various non-limiting embodiments, the terms should explain if this fifty (50%) percent equity stake is the full amount or in addition to the initial RAOR ten (10%) percent agreed to upon initial membership signup. In most cases, it would be assumed that this project-based ownership or PACOR terms were in addition to the initial ten (10%) percent ROAR sign-up terms, since the Lead Inventor (40), who is reserving the fifty (50%) percent PACOR (project-based ownership for a particular project), may not be the same member who is the collecting the initial ten (10%) percent PAOR for the IPACE system usage, say the organizer of an invention club, group, entity or the owner of a particular think tank that is also, say a limited liability company or corporation.

In various non-limiting embodiments, the IPACE user (or user) is someone, something, a proxy acting-on-behalf-of, and/or a role where the IPACE-UI 102 utilization is currently and/or generally anonymous, whereas a IPACE member is someone, something, a proxy acting-on-behalf-of, and/or a role where the IPACE-UI 102 utilization is currently and/or generally as a logged in. In addition, a particular IPACE users or member may be described by more than one role.

For example, a particular IPACE user could be a Peer (65) for a particular project with a Peer Review Campaign, say to Peer (65) review a Project, Invention, or Advertisement; the same IPACE user could be the Lead Inventor (40) for another particular project, while still being a participant, say the Draftsperson (54) on another entirely different project within another Restricted (e.g. PIN) 106 access environment and/or Public 104 access environment. A particular IPACE user could become an Account 60 member/role for a particular Restricted (e.g. PIN) 106 access environment, while participating in another Public 104 access environment that developing open-source software as an anonymous participant. In addition, technically and assuming it does not violate the access terms, for say conflicts, a particular Lead Inventor (40) of a particular Restricted (e.g. PIN) 106 access environment could also participate as a Joint-Inventor/Co-Inventor (41) or another type of Participant (80) in another project on another Restricted (e.g. PIN) 106 access environment.

In general, the IPACE users who connect to the IPACE-UI 102 system and/or a particular IPACE-Hub generated Project or are seeking opportunities to either invent; create; collaborate; obtain general, Peer (65) and/or expert feedback; provide insight/feedback anonymously, as a Peer (65), or as an expert; educate/teach/train others; obtain information/research/study/training/learn; work for a fee, equity, some other perceived value such, as point, recognition, future credits, etc.; each independently, collectively, and/or per each potential permutation combination thereof.

Participation may include, but are not limited to, say part-time and/or full-time employment work, contract work, consulting, internships, volunteers, apprenticeships, mechanical Turk work, and/or some means of exchange, bartering and/or bidding. Further, Participants (80) may include a variety of trades, professions, and role distinctions, including but not limited to the inventor, both as the Lead Inventor (40), and the Joint-Inventor/Co-Inventor (41); the Campaign Gatekeeper (42), the Project Manager (43), the Draftsperson (54) or draftsman, the Researcher (58), the Editor (61), the Patent Attorney (44), the Patent Agent (45), the Non-IP Attorney (76), the 'Other (Certified or) Licensed Professional (other than attorney or patent agent) (47) (e.g. a CPA, licensed architect, engineer, doctor, and/or the like), the Recruiter (81), the Translator (74), the "IPACE Court Member" (79/79*a*), the Former PTO Examiner (66*a*), the Former PTAB/BPAI Judge (52*a*), and the Former or Mock Juror (51/51*a*), the "IP Acquirer" (49), the "Application Preparation" (77), the "IP Prosecution" (71) (or sometimes "Patent Prosecutions" or simply "Prosecution"), the "IP Litigation" (72), the "IP Licensing" (53), the "Former PTO Employee" (73*a*), the "Customizable" (69), and even potentially the Investor" (67), the "Advertiser" (57), the "Predictor" (62), the "Reporter" (63), the "Publisher" (68), the PR (82), and naturally the Contributor (50).

In various non-limiting embodiments, until an IPACE member actually agrees to participate in a project, he/she is generally remains solely an IPACE Member, unless he/she is say, a PTO Registered (46) Patent Attorney (44) or someone other Membership Role that comes without prior participation. Once an IPACE Member and Campaign Gatekeeper (42) mutually agree to TOU/TOP, the IPACE Member becomes a Participant (80) in that particular PAC (104) or particular PIN (106) (typically a PIN for IPSocket Projects). In various non-limiting embodiments, the IPACE has standardized definitions and qualifications for each IPACE role. An IPACE Member who has contributed to other projects may be searched as a Contributor (50), but generally would not appear as a Contributor (50) for a specific project until he/she actually contributes to that specific project. IPACE Members who contribute as Editors (61) and never as Reviewers (64), However, a particular PIN 106 (say a Company) and/or a particular Project Lead (42), say a Lead Inventor (40), may decide to conditionally modify IPACE role definitions and qualifications. For example, how the IPACE member who is a Participant (80) does not actually become a Contributor (50) until he or she actually conditionally contributes to a particular project. For instance, some particular project with conditionally TOU/TOP may allow Participants (80) to become Contributors (50) automatically as Reviewers (64) who have submitted review materials, where other particular project's with conditionally TOU/TOP, may only allow Participants (80) to become Contributors (50) as Editors (61) and never as Reviewers (64), where other particular project conditionally TOU/TOP may allow Participants (80) to become Contributors (50) as Reviewers (64), if he/she, if Depending on the TOU/TOP, is an IPACE Member who has contributed to other projects may be searched as a Contributor (50), but generally would not appear as a Contributor (50) for a specific project until he/she actually contributes to the project. In some cases, the TOU/TOP may allow Participants (80) to be referred to as Contributors (50) before he/she contributes to an actual project if he/she meets other conditions, such as he/she has contributed to a patent application in the same family, with the same Lead Inventor (40), the same PIN (106), the same entity, and/or the like.

In various non-limiting embodiments, the Contributor (50) role may include a plurality of further delineations and represents someone who has contributed to a project, including, but is not limited to, say authors, novelist, creative writers, speech writers, screenplay writers, news writers, ad-copy writers, typographers, ghost writers, filmmakers, cinematographers, videographers, photographers, painters, poets, voice-over, musicians, singers, band members, comedians, actors, news anchor, TV host, animators, computer graphic animators, cartoonists, fire artists, Claymation-modeler, fashion designers, illustrators, textile artists, graffiti artists, graphic designers, web designer, jewelry designers, collage and mixed media artists, printmakers, furniture builder, sculptors, and/or the like, and thus the ability to create and/or customize roles as needed with the "Customizable" 69 role and functions.

In addition, member may create roles and/or seek other member for specific expertise, including, but not limited to, say attorneys, software developers, IT experts, web developer, doctors, or there may include a plurality of further delineations including, but is not limited to say Anesthesiologists, Internists, Obstetricians, Surgeons, Orthodontists, Physicians, Surgeons, Family Practitioners, Psychiatrists, Dentists, Pediatricians, Dentists, Podiatrists, Physicists, Veterinarians Optometrists, Natural Science Managers, Information Systems Managers, Computer Research, Nuclear Engineers, Physical Scientists, Astronomers, Aerospace Engineers, Airline Pilots, Air Traffic Controller, Pharmacists, Petroleum Engineers, Political Science, Financial Managers, Sales Managers, Human Resource Managers, Professors, Mathematicians, or Athletes. In various non-limiting embodiments, the IPACE system provides IPACE members/users with filters and Boolean operators to delineate and/or segment the existing IPACE members into a quantity or potential participant pool size that say, the Campaign Gatekeeper(s) (42) or Lead Inventor (40) believes is sufficiently large to find Participants (80), but preferably sufficiently filtered to locate the relatively best Contributors (50).

In various non-limiting embodiments, the "Feedback" regarding a particular project, invention, Participant (80) and the like, may come from computerized assessment programs and tools, Peers (65), and/or Experts (75). For highly sensitive documents that require limited viewership and participation to maintain confidentiality, members may employ software tools to analyze each participant, each participant's contribution(s) and the collective work-product through the research, development and creative process. Improvement suggestions, alerts, and/or noted consideration could come from a computerized coaching programs and tools, where the algorithms may be adjusted to factor in known project or Participant (80) differentiators, such as a particular industry. For example, terminology tables unique to say a particular type of engineering field may be very different for say molecular biology than when the same terminology is employed for say photography.

For projects being developed within Restricted (e.g. PIN) 106 access environment, the project could also be analyzed by approved project members working on the project, and/or approved members of the Restricted (e.g. PIN) 106 access environment, but who may not have participated and/or contributed to the particular project, data/content, and/or Participant (80) that he/she is analyzing and/or giving feedback on. Status points may be awarded to several components, including the Participant (80) who made a particular recognized contribution, a particular task, a particular project, a particular team, a particular accomplishment/performance, say of speed, data/content, value, and to the person doing the assessment (giving the feedback). And the same would go for demerit points where points could be removed, or points could decay, if say tasks where not done timely.

In various non-limiting embodiments, feedback may also provide additional status or recognition, where the member becomes recognized as a "Peer" (65) for a particular project, to a particular team, and/or a particular member. In addition, the member may become a recognized "Expert" within a particular field of invention category, or PTO designated classification (e.g. art unit). Feedback may also become a competition among fellow Inventors (70), Contributors (50), Participants (80), Employees (55) and the like, where some reward and/or compensation may be applied as an incentive. In addition, there may be competitions between different projects, different teams, different Restricted (e.g. PIN) 106 access environments such as, say inventor clubs, universities, corporations, and/or within corporate divisions within one country, and/or against other countries for feedback points, as well as actual data/content that relatively produces, goals accomplished, and projects successfully completed.

In various non-limiting embodiments, the member role of the "Peer" (65) is someone who has participated in a Project where he/she has provided his/her feedback. This Peer (65) feedback may be, but is not limited to: anonymously, via an invitation, voluntary, in exchange for a bounty, in exchange for a reward, in exchange for a fee, in exchange for a discount, in exchange for a coupon, in exchange for a benefit, in exchange for points, in exchange for virtual currency, in exchange for bartering power/position/points, in exchange for industry prestige, in exchange for expertise validation, in exchange for other's feedback, in exchange for an opportunity; each independently, collectively, and/or per each potential permutation combination thereof.

Like other member roles, technically a particular Peer (65) could also participate as an Expert. For example, someone who is considered a Peer (65) for a particular Project, could qualify as an Expert for another Project and consequently would have both roles associated with their membership status. Overtime and frequent participation, this member would likely become the Peer (65) for many other Participants (80) and also an Expert for each applicable situation, where he/she has obtained a certain number of status points to qualify and/or where allowed, has been designated by some other party, say the Lead Inventor (40), or RAA. While Restricted (e.g. PIN) 106 access environment could create their own unique rules and conditions for Peers (65) and Experts (75), these rules and conditions would preferably be harmonized at the IPACE-Hub 100 with the rest of the IPACE system to create a discernible and standard measurement system that also promoted equity and fairness among those attributes for such roles/titles as Peers (65) and Experts (75).

In various non-limiting embodiments, the member role of the "Peer" (65) is someone who has offered to provide and/or has provided his/her feedback to another member and where he/she qualified as a "Peer" (65) based on the rules for the entire IPACE system and/or for a particular Restricted (e.g. PIN) 106 access environment. In various non-limiting embodiments, there rules for qualifying as a Peer in general, may be as simple as, say for two users who simply share at least one profile element in common, such as membership role, where two members who consider him/herself an Inventor, could be a sufficient rule for establishing what is a Peer.

In various non-limiting embodiments, some Restricted (e.g. PIN) 106 access environments may decide to include rules and conditions where, say both Inventors (70) must have filed some threshold of patent applications with PTO, say one (1) application before they would consider each other Peers (65). In various non-limiting embodiments, the next level of Peers (65) could be for those that have filed, say at least three (3) applications and have had at least, say one (1) granted to be considered Peers (65). So in this example, the two member who were Peers (65) when Peer (65) A had one (1) application filed and Peer (65) B had three (3) applications filed. A and B would no longer be Peers (65) under this particular set of rules, when Peer (65) B was granted a patent on one of his three (3) applications since he would have ascending to a higher Peer (65) tier status.

In various non-limiting embodiments, the RAA member who is in charge of a particular Restricted (e.g. PIN) 106 access environment may also establish additional rules, conditions and thresholds. For example, there could a rule where no member ascends to a higher status if that ascension would make him/her the only member of that Peer (65) Group, and/or if his/her departure would leave only one Peer (65) by him/herself at the lower Peer (65) Group. In various non-limiting embodiments, these details could be shared with the members and/or voted on by the members. In addition, the member could be allowed to be in both levels of Peers (65) until the conditions were met for another Peer (65) member to join a particular level.

In various non-limiting embodiments, projects could be set up to restrict participation to members with a particular Peer (65) status and/or where he/she may only be a certain number of Participants (80) per Peer (65) level, say on a first come (first to signup) first and only members allowed to participate on a particular project. In addition, the time limits to participate may be suggested and/or employed.

In various non-limiting embodiments, Peer (65) Reviews themselves may be for a wide variety of things, including, but not limited to, a particular member's skills, work-product quality, successfulness with filing on time, successfulness in arguing with Patent examiners (66) on office actions, successfulness in arguing with the PTAB/BPAI, hire-ability, attitude, and the like. In various non-limiting embodiments, these Peer (65) Reviews may also be targeted towards shared interest or knowledge such as a survey that asks Inventors (70) and/or Patent Attorneys (44) who have previously conducted a phone interviews with a PTO examiner (66) for a pending office action, say: "Using a Lickert scale from 0-10, where 10 is the best, and zero the worst, rate each PTO examiner (66) that you (e.g. the applicant) have had a phone interview with, in terms the perceived benefit derived from the phone interview itself?"

In various non-limiting embodiments, online social networks, such as Facebook® and LinkedIn®, may connect and interact with the IPACE-UI 102 system to exchange data, statistics, and/or promote events and/or services. Members may request that the social network account be pulled from existing social networks, such as their profile information from such accounts as LinkedIn®, FaceBook®, MySpace®, Monster®, HotJobs®, the Ladders®, and the like.

In various non-limiting embodiments, the "Investor(s)" (67) role classification is a specific Participant (80) Account 60 role, where it supplies an investment towards a Project on the IPACE system. For example, the Investor (67) may review a particular project, say a patent application, at any point offer a participation as an Investor (67), if allowed by TOU/TOP, allowable by the local government(s), and assuming approved by the key parties, e.g. the Lead Inventor (40). In various non-limiting embodiments, the Investor (67) may offer to invest at the current perceived valuation and/or in some cases offer a different valuation, if say, no other investments have been accepted or if at reasonable valuation, post some period of time since the previous investment, and/or post some key event.

In various non-limiting embodiments, the Investor (67) may offer to provide debt financing, where the conversion of the debt happens at a particular event or events, such as the next round of funding by a particular type of Investor (67) (e.g. private equity, venture capital, or the like); and/or with a particular threshold of funds raised. In various non-limiting embodiments, the convertible debt financing could provide a discount to the next round and other incentives and/or privileges that clearly defined, agreed to and allowed by law.

In various non-limiting embodiments, the investment could be as contribution to a fund without a valuation, where a particular minimum threshold may have to be met before the investment may be utilized, such as minimum amount of funds committed and in an escrow account. In various non-limiting embodiments, the investment could be for a particular patent or group of patents (e.g. all associated with a particular parent application), for a particular stage (e.g. prosecution, litigation, or the like) and/or a particular event a projected trial, with a particular defendant.

Computer-Implemented Investor (67) Searching In various non-limiting embodiments, the IPACE system (operational via a computer processor) and associated computer-implemented method create an exchange where investors (e.g. incubator investors) review patent pending concepts to state which patent pending concepts they would be willing to invest in or willing to participate in for the existing equity to support. For instance, an existing incubator investor in an incubator group could go to a private and secure website to review ideas owned by the incubator group that have patents pending. In various non-limiting embodiments, the incubator investor could state that they are willing, for some portion (designate the portion) of their current equity investment or all of their equity investment, to support the costs to develop that idea or a stated collection of ideas.

In various non-limiting embodiments, there would preferably be a rule that an Investor (67) would have to invest a certain amount before they would obtain this privilege and so a base amount would need to first cover base operating expenses. For example: an incubator group may establish that an Investor (67) would have to invest at least $25k to cover base operating costs and to participate in the general investment group. This amount may need to be renewed on some anniversary such as yearly. In various non-limiting embodiments, thereafter the $25k and an annual renewal commitment, the Investor (67) could invest additional funds that he or she designates towards certain patent pending or patent granted inventions.

In various non-limiting embodiments, there may be minimum and maximum investment requirements for each patent pending invention. So if there were 5 patent pending inventions (A, B, C, D, and E), for example, the incubator could mandate that there is a minimum investment of $5k per idea and that once the particular invention is fully backed and assigned to a development team, no more investment dollars will be accepted to support that invention at that price per share. Investors (67) could invest at the next round at a different price.

For example, an Investor (67) X could invest $50k where $25k covers the initial base fee (for all incubator annual operating expenses) and another $25k where he/she then designates a particular willingness to make another $5k investment in each of 10 potential projects of a larger pool of potential projects. Even though these ten (10) projects actually equal $50k and exceed his/her $25k for specific projects, the monies would be made available for projects until consumed by actual project assignments. For example, if 5 out of 10 projects were assigned and consumed this investor's (67) investment, then the remaining 5 projects would no longer reflect that there was $5k of available funding for each from this particular Investor (67) X.

In various non-limiting embodiments, if investors (67) could only assign potential investments equal to the dollars he/she invested, it would reduce the total pie of projects that the incubator could assign to development teams. However, rules could be implemented that allow the investor to strictly limit his/her potential project designations to the amount he/she invested.

Perceived Funding Requirements And Potential Investors

In various non-limiting embodiments, the IPACE system calculations, analysis, scores, prioritization and displayed results may also incorporate perceived and/or discerned funding data/statistics, budgets, investor data/statistics, and/or the like. For example, a particular prioritized list of potential projects, pending projects, and/or the like, could include a list of perceived funding requirements, and/or a list of potential investors. The list of perceived funding requirements and the list of potential investors could include scoring and rankings for a perceived relatively likelihood of investment, which may further comprise relative match/fitness data, statistics, analysis and scores for, say a perceived consumer demand match/fitness (e.g. similar projects relatively recently started or historically started, peer scores, expert scores, and/or the like), a perceived investment demand match/fitness (e.g. similar deals relatively recently funded, or historically funded, perceived consumer demand, and/or the like), a perceived investor appetite match/fitness (e.g. funds available, desired sector, project location, and/or the like), a perceived funding methodology match/fitness (e.g. debt, convertible debt, equity, barter, and/or the like), a perceived company culture match/fitness (e.g. project participant demographics, psychographics, behaviors, and/or the like, compared to investors or investors' desires), a perceived match/fitness (e.g. debt, convertible debt, equity, barter, and/or the like), and/or the like. The results would be displayed and listed relative to a list of individual investors or investor groups, per each search result and/or project element, where the user and/or the investor may filter, selective sort, prioritized, and/or the like.

Perceived Funding And Potential Investor Fitness

In various non-limiting embodiments, the relative match/fitness data, statistics, analysis and scores would allow either the participants, investors, and/or both, and/or the like, to review, challenged, modify, offer, negotiate, and/or the like, the data, statistics, perceptions, logic, scores, and/or the like. For example, a particular investor group could cut and copy a particular project and propose changes to the project where they would be relatively more likely to fund, invest, loan, participant, barter, and/or the like. In addition, the IPACE system would reflect the relative successfulness of each participant and investor, say per funding raised, projects completed, patent pending, patents granted, patents licensed, patents litigated, patents monetized, and/or the like. Besides patents, the projects could be for creating a particular event (e.g. a concert, sporting event, wedding, trade show, and/or the like), a particular entity (e.g. an organization, company, club, school, government agency, investment group, creative group, and/or the like), a particular goal (e.g. a travel destination, school entry or diploma, physical fitness, and/or the like), and/or the like.

Prioritize Investor Concerns, Legal Issues, And Participant Concerns

In various non-limiting embodiments, the IPACE system would preferably analyze the data, statistics, participants, investors, geography, governmental laws, rules, and/or the like to score and prioritize the relatively likelihood of investor concerns, legal issues, participant concerns, and/or the like. For example, a particular investor group has historically only invested in startup C-corporations with less than five shareholders, and a particular project already has, say twenty (20) investors and is an S-Corporation. In addition, the IPACE system would preferably incorporate SEC rules for say S-corps, Reg. D offerings and the like; where some investors may be limited, restricted, and/or the like, from participating in some particular project, entities, locations, business formations, deal sizes, and/or the like. In various non-limiting embodiments, the IPACE system would preferably collect the necessary data to qualify participants and investors for such things as accredited investors, corporate status, and/or the like.

TOP Terms and Ownership Management (111) module

Figure 23:
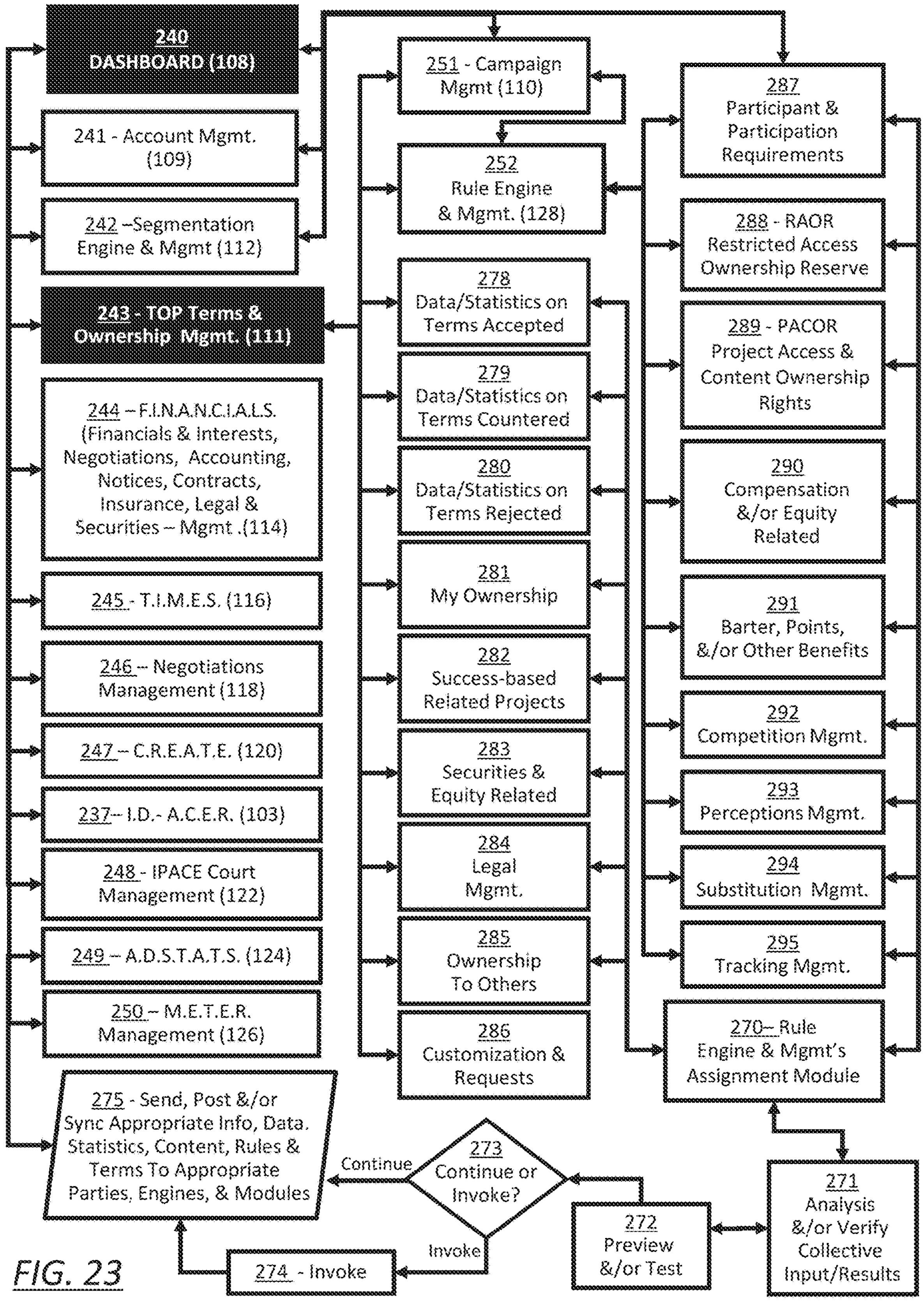
FIG. 23 is a block diagram with some flow charting steps depicting a non-limiting embodiment of the IPACE member's functionality from the TOP Terms and Ownership Management (111) module.

FIG. 23 is a block diagram with some flow charting steps depicting an embodiment of the IPACE member's functionality from the TOP Terms and Ownership Management (111) module. Starting with the Dashboard (108) in the block 240, where similar to the TOP Terms and Ownership Management figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of the TOP Terms and Ownership Management has to have a role and/or at least equivalent to the same permissions required to be a "TOP Terms and Ownership Mgr.," hereinafter a "TOP MGR." In various non-limiting embodiments, the TOP MGR utilizes the TOP to view, review, create, and/or modify criteria requirements or rules for a particular Project or Project element to be used in, say a particular P.A.C. 104 and/or a particular P.I.N. 106.

In various non-limiting embodiments, the Dashboard functionality in this "TOP Terms and Ownership Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financials and Interests, Negotiations, Accounting, Notices, Contracts, Insurance, Legal and Securities—Mgmt)" (114) module in a block 244, the "T.I.M.E.S." (116) module in a block 245, the "Negotiations Management" (118) module in a block 246, the "CREATE" (120) module in a block 247, the "IPACE Court Management" (122) module in a block 248, the "ADSTATS" (124) module in a block 249, the "METER Management" (126) (including Knowledge Management) module in a block 250, the "Campaign Management (110) (e.g. Project Management)" (110) module in a block 251, and the "Rule Engine and Management (128) module in a block 252.

From the block 243, the "TOP Terms and Ownership Management" functionality, in this limited example embodiment, comprises of a "Data/Statistics on Terms Accepted" module in a block 278, a "Data on Terms Countered" module in a block 279, a "Data on Terms Rejected" module in a block 280, a "My Ownership" module in a block 281, a "Success-based Related Projects" module in a block 282, a "Securities and Equity Related" module in a block 283, a "Legal Management" module in a block 284, a "Ownership To Others" module in a block 285, and a "Customization and Requests" management module in a block 286.

In various non-limiting embodiments, the "Data on Terms Accepted" module in block 278, in general, allows the IPACE member the functionality to manage his/her and/or an Account's (60) data on accepted terms in association with the IPACE Operating Environment. For example, the "Data/Statistics on Terms Accepted" module could specifically track, analyze, and generate reports regarding the Terms that have been accepted initially, after being countered, and/or the like; per say, a project, per a time period, per an IPACE Account (60), per a Joint-Inventor/Co-Inventor (41), per a segment, and/or the like, or overall.

In various non-limiting embodiments, the "Data/Statistics on Terms Countered" module in block 279, in general, allows the IPACE member the functionality to manage his/her and/or an Account's (60) data/statistics on countered terms in association with the IPACE Operating Environment. For example, the "Data/Statistics on Terms Countered" module could specifically track, analyze, and generate reports regarding the Terms that have been countered then accepted, rejected, counter again, and/or the like; per say, a project, per a time period, per an IPACE Account (60), per a Joint-Inventor/Co-Inventor (41), per a segment, and/or the like, or overall.

In various non-limiting embodiments, the "Data/Statistics on Terms Rejected" module in block 280, in general, allows the IPACE member the functionality to manage his/her and/or an Account's (60) data/statistics on rejected terms in association with the IPACE Operating Environment. For example, the "Data/Statistics on Terms Rejected" module could specifically track, analyze, and generate reports regarding the Terms that have been rejected, rejected after countered, and/or the like; per say, a project, per a time period, per an IPACE Account (60), per a Joint-Inventor/Co-Inventor (41), per a segment, and/or the like, or overall.

In various non-limiting embodiments, the "My Ownership" module in block 281, in general, allows the IPACE member the functionality to manage his/her and/or an Account's (60) data/statistics on the IPACE member's or the Account's (60) Ownership and related terms in association with the IPACE Operating Environment. For example, the "My Ownership" module could specifically track, analyze, and generate reports regarding the IPACE member's ownership actualized, pending, conditionally pending, anticipated, and/or the like; per say, a project, per a time period, per an IPACE Account (60), per a Joint-Inventor/Co-Inventor (41), per a segment, and/or the like, or overall. In addition, the module would provide associated data/statistics and information regarding what obligations and conditional obligations are pending by who, for what, where, when, and the like to obtain the pending and anticipated ownership.

In various non-limiting embodiments, the "Success-based Related Projects" module in block 282, in general, allows the IPACE member the functionality to manage his/her and/or an Account's (60) project participations with success-based compensation and related terms in association with the IPACE Operating Environment. For example, the "Success-based Related Projects" module could specifically track, analyze, and generate reports regarding the IPACE member's Success-based compensation actualized, pending, conditionally pending, anticipated, and/or the like, per say, a project, per a time period, per an IPACE Account (60), per a Joint-Inventor/Co-Inventor (41), per a segment, and/or the like, or overall.

In various non-limiting embodiments, the "Securities Management" module in block 283 is the same module accessible from the FINANCIALS block 260. The "Securities Management" module, in general, allows the IPACE member the functionality to manage his/her and/or an Account's (60) securities and equity related terms in association with IPACE member's or the Account's (60) project participations with securities and equity related compensation and related terms in association with the IPACE Operating Environment. For example, the "Securities Management" module could specifically track, analyze, and generate reports regarding the IPACE member's Securities and Equity Related compensation actualized, pending, conditionally pending, anticipated, and/or the like; per say, a project, per a time period, per an IPACE Account (60), per a Joint-Inventor/Co-Inventor (41), per a segment, and/or the like, or overall.

In various non-limiting embodiments, the "Legal Management" module in block 284 is the same module accessible from the FINANCIALS block 259. The "Legal Management" module, in general, allows the IPACE member the functionality to manage his/her and/or an Account's (60) Legal needs in association with the IPACE Operating Environment. For example, the "Legal Management" module could allow the IPACE member to view the relative successfulness per Contract term, provision, clause, dispute resolutions, and/or the like; when compared to similar Contract terms, provisions, clauses, and/or the like by say, the same IPACE member, similar projects, similar potential participants targeted, similar Participants (80), and/or the like; for alerting the IPACE member during the term creation, tracking after employed, and creating a TOP body of the collective terms for comparison purposes against other TOP body iterations of the same TOP, against other TOP bodies, and/or the like.

In various non-limiting embodiments, the "Ownership To Others" module in a block 285, in general, allows the IPACE member the functionality to manage his/her and/or an Account's (60) data/statistics on the IPACE member's or the Account's (60) Ownership Afforded and/or Offered To Others and related terms in association with the IPACE Operating Environment. For example, the "Ownership To Others" module could specifically track, analyze, and generate reports regarding the IPACE member's ownership offers to others that have been actualized, pending, conditionally pending, anticipated, and/or the like, per say, a project, per a time period, per an IPACE Account (60), per a Joint-Inventor/Co-Inventor (41), per a segment, and/or the like, or overall. In addition, the module would provide associated data/statistics and information regarding what obligations and conditional obligations are pending by who, for what, where, when, and the like for others to obtain the pending and anticipated ownership.

In various non-limiting embodiments, the "Customization and Requests" management module in block 286, in general, allows the IPACE member the functionality to create customizable rules, elements, and the like, or create/modify requests for features and functionality.

Back to the "Rule Engine and Management (128) module in block 277, in general, allows the IPACE member the functionality to manage his/her and/or an Account's (60) TOP Terms and Ownership Management rules in association with the IPACE Operating Environment. In various non-limiting embodiments, the TOP Terms and Ownership Management rules functionality of the "Rule Engine and Management" (128) module in this limited example comprises of a "Participant and Participation Requirement" module in a block 287, a "RAOR— Restricted Access Ownership Reserve" module in a block 288, a "PACOR— Project Access and Data/content Ownership Rights" module in a block 289, a "Compensation and/or Equity Related" module in a block 290, a "Barter, Points, and/or Other Benefits" module in block 291, a "Competition Management" module in a block 292, a "Perceptions Management" module in a block 293, a "Substitutions Management" module in block 294, a "Tracking Management" module in a block 295, and the "Rule Engine & Mgmt's Assignment Module" in a block 270.

Data/Content Access

In various non-limiting embodiments, and depending on: TOU/TOPs, who all the participants are in a particular project, the particular project goals, and/or the like; a particular participant, say the Lead Inventor may be the only participant who may see certain versions and/or iterations of data/content, say versus the draftsperson. Continuing, other participants may only see/view certain versions and/or iterations as modifications to the overall latest version and/or latest iteration within a version or portion of the patent application.

In various non-limiting embodiments, the Lead Inventor may incorporate changes that are only visible to him/her until he/she makes that available to others as an independent iteration. Further, the TOU/TOPs may allow the Lead Inventor or the Campaign Gatekeeper to view data/content created by, say the draftsperson, where the draftsperson has made a plurality of iterations for the Lead Inventor to choose from, to modify, comment on, and/or the like.

Track and Collaborative Searches (Prior Art)/for Compatibility

In various non-limiting embodiments, the IPACE system and the computer-implemented method tracks prior art searches within the IPACE system and within a closed social circle for potential collaborators for relative compatibility based upon such things as terms used, how recently, art units, applications within the same art units and the like. In various non-limiting embodiments, the IPACE system would preferably suggest relationships between Joint-Inventor/Co-Inventors (41), Contributors (50), attorneys and/or agents based upon like keyword searching where, for instance, the IPACE system would track the keywords and terms utilized by a specific inventor and/or patent IP Prosecution (71) attorney to suggest relationships between the two, say if they each surpassed some threshold and/or list of conditions where each utilized a set of similar search terms for a prior art search, and say within a particular range of time. These thresholds could be set differently for each party. Further, the inventor may have a set of thresholds for him/herself and another for the Patent Attorney (44), but the Patent Attorney (44) may have his/her own thresholds, so the IPACE system could then calculate the requirements based upon that data for compatibility to make sure each threshold was factored in.

Compatibility Searching

In various non-limiting embodiments, the IPACE system preforms a compatibility searching method preferably restricted to trusted members who are already within the same trusted network (PIN). In various non-limiting embodiments, the IPACE system selectively searches outside the PIN, but where the introduction methods would preferably be systematically limited. For instance the introduction would preferably transpire in stages, where the stage could be anomalously, and where conflict checks are first employed, and may include additional conditions and qualifiers for compatibility along the way. In addition, the IPACE system would allow the members to edit his/her list of associated keywords to block viewership and/or compatibility searching.

Further, the IPACE system would preferably also factor in term usage relative to other terms search, other terms searched by other Inventors (70), other members. For Instance, a particular lead inventor "A" used or utilizes the keyword "mobile" when searching more than any other inventor or person within the closed and tracked social system. In various non-limiting embodiments, the IPACE system would preferably also search for applications and granted patents for building keyword analysis per Participant (80) and per the actual author of the term contribution to the application, and where it tracks the first person discerned to contribute the term. In various non-limiting embodiments, the IPACE system would preferably go on to list the first users of each particular term, asking he/she and the lead inventor "A" to verify that this individual/member is in fact the first Contributor (50) of this term. In various non-limiting embodiments, the IPACE system would track who and when changed the individual/member who was and now is given first Contributor (50) status.

This would help catch situations where say a Joint-Inventor/Co-Inventor" B" submitted claim suggestions or a section of the written disclosure based upon a conversation that he/she had with the lead inventor "A," before the lead inventor "A" had input his/her written disclosure of the same invention and discussion. Here the IPACE system may be setup to initially give the Joint-Inventor/Co-Inventor "B" credit for first use of a particular term, but the lead inventor "A" could go through and reclaim first use, say manually with a check box and/or based upon the subsequent system comparison of his/her written disclosure submission, where some terms that do not appear in the written disclosure submission could still be attributable to the Joint-Inventor/Co-Inventor "B."

Preferably the lead inventor "A" would have submitted his/her written disclosure prior to any conversations, but if not the TOU should detail and cover such a potential scenario and the conversation could be recorded and/or witnessed by others to reduce such potential Inventorship issues. For example, the lead inventor "A" could have a written disclosure, but has not submitted it to the IPACE system before having a phone call with the Joint-Inventor/Co-Inventor "B" who suggests using the word "transceiver" vs. "transmitter" in the disclosure, so when the lead inventor "A" later makes his/her written disclosure submission, the IPACE system searches for 'first use' credit, but allows the lead inventor "A" preference based upon the TOUs.

In various non-limiting embodiments, the IPACE system would preferably also be setup to not allow submissions from Participants (80), such as Joint-Inventor/Co-Inventors (41) and/or Contributors (50) until submissions were completed by say the lead inventor, then a Joint-Inventor/Co-Inventor (41), and/or some threshold of data, statistics, keywords, definitions, figures, claims, and/or text was surpassed for a particular member to then contribute. In various non-limiting embodiments, the IPACE system would preferably notify these members when the threshold has been met, say via email or SMS. In addition, notices could be sent to the other members are waiting on the specific information needed to surpass a particular threshold.

Computer-Implemented Collaboration Preparation

In various non-limiting embodiments, the IPACE system and the computer-implemented for collaboration may include privileges and/or restrictions to some data/content and/or data. For example, the same text and elements may be shared between software programs/applications for projects, such as patent application preparation, but access may be limited based on one's role. For instance, sharing text between a presentation program (e.g. PowerPoint®), a document program (e.g. Word®) and a spreadsheet program (e.g. Excel®), and where the IPACE member/user may or may not be able to view, invite others, make modifications, make format changes, employ certain software functionality, say to make changes to the text in a document, either collaboratively, globally, independently, and/or privately. For instance, a particular participant may be able to employ some software functionality, and/or create formatting that is independent of a master document, where the text is modified to be a particular typestyle or font size for that particular participant, but where such a change does not appear in the master document.

In various non-limiting embodiments, depending on TOU/TOPs for the particular participant, he/she may or may not be allowed to make such changes (e.g. type, images, functions, formatting changes and/or the like) globally, independently, and/or suggest any such changes. Furthermore, such changes and/or suggestions may be restricted to particular project, particular moments in time, particular applications, and/or the like, where, for instance he/she may suggest employing text wrapping in a particular presentation or document program, but may not be allowed to utilize that particular functionality on a spreadsheet used for collaboration on the particular project.

In various non-limiting embodiments, the IPACE system may allow IPACE members/users to create independent versions of a particular document, spreadsheet, table, presentation, video, animation, 3D object, image, graphics, stenographics, atlas, audio clip, and/or the like, where the IPACE system will track each input and change made; where the IPACE system may track which particular elements, functions, contributions, formatting, and/or the like, are part of the master, part of his/her independent version, part of a separate collaborative version, and/or the like. In addition, there may be a plurality of collaborative versions, where there is typically a master overall collaborative version, with the latest updates approved for inclusion for the project. However, there may be a plurality of subversions, awaiting approval(s), awaiting decisions (e.g. IPACE court, and the like); awaiting feedback (e.g. fellow-project participants, peers, experts, and/or the like); awaiting IPACE analysis (e.g. novelty perceptions, and/or the like).

File Saving, Sharing, Confidentiality, Restrictions, Privileges

In various non-limiting embodiments, the IPACE system and the computer-implemented method for collaboration may comprises file saving, sharing, confidentiality, restrictions, privileges and/or the like. In the case where someone (e.g. an IPACE member/user), say an email recipient, receives an invitation via a particular email received to view a particular text/document (or other attached item, e.g. spreadsheet, table, figure, presentation, animation, image, graphics, stenographics, atlas, video, audio, and/or the like) attached to the particular email text (e.g. including images, audio, video, etc.) received, the email recipient may view the text and/or the attachment by, say clicking on a link in the particular email received or from linking to a particular site that the link leads the email recipient towards; where the email recipient may accept the terms of confidentiality to view such text/document, attachments, and/or the like.

Depending on the TOU/TOPs and/or the like, there may be a feature implemented, where the email recipient must enter a list of validation information, such as type his/her name, an email address, and/or the like, to download the document (and/or attachment). This document (and/or attachment) may be trackable with a delivery and consumption tracking system, which may include a watermark with the recipient's ID and also as to where it was emailed, what was included, when, why, to whom, and/or the like. Further there could be limitation in the terms, and/or the functionality, as to how long the document (and/or attachment) may be linked to, viewable, downloadable, modifiable, commented on, and/or the like. The email recipient could be notified before any documents or attachments are sent by a sender, reminding him/her of the terms of the confidentiality.

In various non-limiting embodiments, the sender could be notified when attempts were made to review terms, view documents, particular attachments, and when actually sent, viewed, modified, and the like, to whom (e.g. the recipients) and from whom (e.g. the senders). For instance, the delivery and consumption tracking system may also include when and for how long each document (and/or attachment) was opened (e.g. open, downloaded, streamed, saved, and/or the like) and/or consumed (e.g. viewed, played, heard, modified, commented, scored, ranked, challenged, and/or the like) on what client (e.g. desktop, mobile device and/or the like along with an IP Address, Triangulation, GPS coordinates, and/or the like), a number of interactions and types (e.g. keystrokes and mouse clicks), while opening, reviewing, consumption, and any time gaps of inactivity.

In addition, the IPACE system may provide a method for IPACE members/users (e.g. email recipients) to acknowledge confidentiality before opening an email. In various non-limiting embodiments, there is a check box, similar to accepting to a website's TOU by clicking a checkbox, before the email or document may be and/or is actually accessed. In some cases the data/contents (e.g. document) may only be read from a secure server, and is not attached and/or cannot be saved as a document.

Utilizing Relatively Available And/or Idle Resources

In various non-limiting embodiments, the IPACE system and associated computer-implemented method provides the user a method to search (e.g. patent searches) and obtain segments and/or groups to research relative to such things as competition and prior art and include utilizing relatively available and idle resources, groups, such as retirement homes, prisoners, foreigner, work from people. Further, the IPACE system would preferably share progress and reward success, automatically, conditionally, and/or user-selectively. In various non-limiting embodiments, the IPACE system would preferably monitor, analyze, and relative score resources. For example, a particular resource is still relatively active (e.g. participating X projects over the past Y months), e.g. has relatively increased his/her skills, compensation, participation, relative success, status, and/or the like. In various non-limiting embodiments, the assessment may include relative education, motivation, mood, pending issues, complaints, challenges, concerns, feedback and/or the like. In various non-limiting embodiments, the relative assessment would incorporate a participant's genetics, health, environment, and/or the like; where, say a particular prison may be relatively overcrowded when compared to other prisons; or where boredom may be a perceived as relatively high in an environment where people are bed-ridden in extended living homes/situations, but where data/statistics surrounding particular types of participation and/or projects may suggest that they relatively significantly off-set an issue.

Global Rules, Default Rules, Conditional Override Rules, Individual Rules, and/or Stair-Step Rules In various non-limiting embodiments, the IPACE member may create rules from scratch/new, modify existing rules, use existing rules as templates, and/or the like. Rules may be set to be global rules, default rules, conditional override rules, individual rules, and/or stair-step rules. For example, the IPACE member may create a conditional global rule where no outside IPACE member may participate as a Joint-Inventor/Co-Inventor (41) without conditional prior approval. A default rule could be created for, say any TOP that fails to address a particular TOP completion time goal, such as the completion time goal to complete a patent application's figures, where a default rule could be set for, say 50% of the overall project's timeline when not specifically supplied. A series of conditional override rules could be created for a particular provision, say for a particular project where a particular Participant (80) is no longer able to complete his/her obligations due to health or medical reasons and therefore invokes an override rule "A," whereas if that same particular Participant (80) is fired, then it invokes another override rule "B," and/or if the same particular Participant (80) becomes banned from a particular portion or the full use of the IPACE and therefore invokes another override rule "C," where each override rule (A, B, and C) could have a unique set of terms. An individual rule for a TOP could provide a specific IPACE member potential Joint-Inventor/Co-Inventor status, should his/her contributed materials properly support new claims.

A stair-step rule could start with a TOP rule for a particular project where there is a requirement for a registered Patent Attorney (44) of a particular country, say a Chinese registered Patent Attorney (44) could be stair-step "A," with a subsequent stair-step "B" rule for IP Prosecution (71) experience with the China Patent Office, with a subsequent stair-step "C" rule regarding IP Prosecution (71) experience with a specific type of mobile software antenna technology, with a subsequent stair-step "D" rule regarding IP Prosecution (71) experience with a specific type of mobile software antenna technology that was within a particular period of time (say within the last 3 years), and with a subsequent stair-step "E" rule regarding the outcome of prosecution with a specific type of mobile software antenna technology (say where the prosecuted claims were granted). In various non-limiting embodiments, these stair-step rules would be tracked by the IPACE system and scored per potential participants as having stair-step qualifications of none, A, AB, ABC, ABCD, or ABCDE.

Starting with the "Participant and Participation Requirements" module in block 287, which is a module similar to the module accessible from the FINANCIALS block 244, the "Participant and Participation Requirements" module, In various non-limiting embodiments, in general, allows the IPACE member to create/modify rules as to who may participate or conditionally interact with the IPACE members' TOP Terms and Ownership Management, to what degree, when, how, and/or like.

Computer-Implemented—Pre-first meeting data/content and potential Participant (80) analysis:

In various non-limiting embodiments, the IPACE system may analyze and track data/statistics associated with concepts attributable to a particular party, and to help establish any potential overlap and/or areas of concern prior to a first meeting. In one embodiment, a meeting could be with a potential collaborator, partner, Joint-Inventor/Co-Inventor (41), Investor (67), and/or between an employer and Employee (55), and/or between a hiring-entity and a Contractor (56), and/or the like; wherein the ideas of all parties are generated and captured before the meeting and fully revealed, if public and/or desired, or partially revealed as necessary, to prove and establish ownership and/or shared territory. Without such an analysis, some people may sign restrictive agreements such as non-circumvents, NDAs, and/or non-competes only to hear or learn of business opportunities and/or concepts that he/she may have already worked on, currently working on, or have been thinking about, where the IPACE system and/or a third party could analyze the data/statistics without revealing to other party particular details.

Some parties utilize agreements referred to as "in/out agreements," where parties specify IP perceived to be owned or controlled before engaging each other in another agreement, but these agreements typically cover less abstract IP, such as patents issued and/or applied for. Sometimes these agreements are not discussed until after the first meeting, which may be too late. Further, these In/out agreements may force a party or parties to reveal concepts and/or inventions that he/she may not want to fully reveal or mentioned otherwise. In an embodiment of the analysis, the IPACE system reveals like ideas, concepts, subjects, terms, art units, and/or the like that were input as pending, filed, and the like before the first meeting. With the IPACE system's analysis of each party's concepts, the parties may limit their discussion to certain territories or PTO art units, without have to disclose the pending concepts to the other party.

In various non-limiting embodiments, the "RAOR—Restricted Access Ownership Reserve" module in block 288, in general, allows the IPACE member to create/modify those RAOR terms, conditions, and rules allowed to be modified by the IPACE system as to who and how someone may conditionally access and interact with the IPACE system in general, to what degree, when, how, and/or like.

In various non-limiting embodiments, the "PACOR—Project Access and Data/content Ownership Rights" module in block 289, in general, allows the IPACE member to create/modify rules as to who may participate or conditionally interact with a particular project in terms of accrediting and establishing Inventorship, assignment, ownership and the like; to what degree, when, how, and/or like.

Data/Content Visibility and Modification Restrictions

In various non-limiting embodiments, the IPACE system and associated computer-implemented methods allow the user to conditionally set who and when other users and/or Participants (80) in collaborative project may make, view, modify annotations, and/or when particular data/content becomes and/or remains private or available to particular parties. In various non-limiting embodiments, the IPACE system also allows the user to request to selectively withdraw elements (e.g. to retain as a trade secret prior to publication, if not currently claim dependent). In various non-limiting embodiments, the IPACE system would analyze these user requests to selectively withdraw elements, to determine perceived and discerned impact on other Participants (80), potential claims, existing claims, claim support, a perceived ROI, and/or the like; and generate a score with and without all the elements, for each element in isolation, and for each permutation of elements maintained and/or removed collectively.

In addition, in various non-limiting embodiments, the user may have the ability to conditionally apply annotations, say privately, and/or collaboratively during the development of a patent application, without posting the annotation for other non-approved parties/members to view, comment, modify, and/or the like. For instance, a Lead Inventor (40) might annotate a detailed description for a particular figure as something he would like to revisit later for the purpose of, say expanding the details about a particular portion of a particular figure. This information could be kept private from all others, or selectively and/or conditionally revealed to others, say where and when a subordinate is assigned the task of a "Reviewer" to review the document for some relative stage of finality and the Reviewer is supposed to look for any unaddressed issues, such as this desire by the Lead Inventor (40) to "expand the details about a particular portion of a particular figure."

In various non-limiting embodiments, the "Compensation and/or Equity Related" module in block 290 is the same module accessible from the FINANCIALS block 263. In various non-limiting embodiments, the "Compensation and/or Equity Related," in general, allows the IPACE member to create/modify rules as to how potential participants are compensated and/or earn equity, to what degree, when, how, and/or like.

In various non-limiting embodiments, the "Barter, Points, and/or Other Benefits" module in block 291 is the same module accessible from the FINANCIALS block 264. In various non-limiting embodiments, the "Budget, Quotas, and/or Cost Limits Related" module in block 267, in general, allows the IPACE member to create/modify rules for budgets, quotas, court limits, and/or the like.

Computer-Implemented Attorney search

In various non-limiting embodiments, the IPACE system and associate computer-implemented method where attorneys may charge for his/her services per a status level, where he/she must surpass a particular threshold to earn a particular level and rate, say after answering x number of free question, y number of paid questions and receiving a feedback score of z per legal sector segment created and/or other delineations for geography and the like.

In various non-limiting embodiments, the "Competition Management" module in block 292, in general, allows the IPACE member to create/modify rules as to who may conditionally participate in competitions, regarding what, to what degree, when, how, and/or like; how competitions are implemented, carried-out, judged/disposed, dispute resolutions, and the like. For example, a particular TOP may require participating Patent Attorneys (44) to compete over who created the best claims for the initial submission, where a panel of say, Experts (75) outside the project and/or the IPACE court make that determination, and where the claim drafting budget is distributed, say either all to the winner, or the bulk to the winner.

Computer-Implemented Competition

In various non-limiting embodiments, the IPACE system and the associated computer-implemented method would preferably provide a method for participants submitting competing contributions to a particular project. For example, a competition among patent attorneys/practitioners for who may draft the better claims relative to some set of conditions. In addition, the IPACE system would preferably allow a particular disclosure to be shared with all the competing Participants (80), and where each is voted on/off by a panel of other Peers (65), Inventors (70), Experts (75), competition Participants (80), former PTAB/BPAI judges, former PTO judges, and/or based upon ROI after being actually prosecuted and asserted over-time.

Claim Competition

In various non-limiting embodiments, the IPACE system would provide an ability for a plurality of patent attorneys to compete over claim submissions where the selection is determined by the applicant, a particular Joint-Inventor/Co-Inventor, particular peer, a particular expert, a particular contributor, a particular arbitrator, or some combination of these. The selection may include negotiating an exchange that may include a particular fee (e.g. cash, convertible debt, success-based, and the like), a particular equity stake, a particular benefit, a particular amount of points, or some combination. The exchange may include some portion in advance or not.

Invention Competition—Where Several Inventors (70) Come Together:

In various non-limiting embodiments, the IPACE system tracks, analyzes, and generate the necessary data in an invention competition, where several Inventors (70) may come together for, say a limited time, to contribute, collaborate, and/or critique the development of an idea into a concept, and eventually an articulated invention, say sufficient for patent protection, typically as a constructive-reduction-to-practice in the form of a patent application, but could also be an actual reduction-to-practice in the form of a working prototype. This organization may include face-to-face, mobile, and/or online Participants (80). In various non-limiting embodiments, these Participants (80) compete with other Participants (80) within a defined group and/or with other defined groups. The competition may include such things as who supplied relatively the most information, the relatively best information, the relatively best information first, the relatively most valuable information, and/or the relatively most critical information. These relative measurements and analysis may consist of setting values that are predetermined absolute values that are relative to other conditions and factors that are judged by, say a panel of insiders, outsiders, Peers (65), and/or Experts (75), with predetermined rules and/or with values that are subjective and/or with rules created ad hoc, and/or some combination of these measuring and analyzing methods.

In various non-limiting embodiments, Participants (80) in the competition may be attending an industry conference, event, seminar, class, dinner, and/or webinar. At such an event, or combinations of events, a sponsor, host, and/or the IPACE system may generate and pre-establish a set of rules where, say teams may compete against each other with a time limit of, say sixty minutes where each team may collaborate amongst themselves to create the best patent possible relative to the contest objective. The value of "best patent possible" would preferably be pre-determined. One example of "best patent" among the competitors may be a measurement such as a valuation generated for each patent by, say a team of judges that could include industry Experts (75), industry Peers (65), attendees, exhibitors, moderators, panelists, hosts, event promoters, trade association members, union members, professors, students, other academics, engineers, executives, potential Investors (67), bankers, angels, VCs, Patent Attorneys (44), former patent examiners (66), potential consumers, and/or other competitors, say past winners, current team competitors, current event competitors, and/or say, industry competitors. The judges could also incorporate IPACE system analysis, IPACE members, Peers (65), Experts (75), IPACE court, and/or the like. These selected judges would preferably be pre-determined and/or have a predetermined method of selection, say where depending on what category the product/service/method was invented under.

For example, the rules may state that the competing teams were not restricted to any particular industry, but where they would need to declare what industry category would most benefit from the particular invention, at some point in time, say within fifteen minutes of the start of the competition or otherwise be potentially declared disqualified. Another method may state that the category will be whatever the "art unit and sub-category" that is later determined by a review body, such as typically assigned by a PTO patent examiner (66) for initial search purposes. There could then be a panel of judges pre-assigned to any inventions that become assigned to that particular art unit and/or assigned to a range of art units, preferably covering all the possibilities that could be generated by the competitors for the competition. The competition rules could restrict the competitors to a range of art units and/or sub-categories.

In various non-limiting embodiments, the rules would preferably establish a moment in time (e.g. category deadline) and/or a condition that would then establish the category or art unit/sub-category for a particular competitor, say by committing to a particular category or art unit before the timer starts, and/or by, say, a majority vote of team members and/or outsiders. These outsiders could be from the list of judges, such as the attendees of the event and/or outside Participants (80) who have contributed via mobile devices and/or online in real-time and/or who may be time shifted. For example, a group of online Experts (75) or college students may be provided rules, such as required industry categories and/or art units collectively voted for in advance, based upon conditions such as an overall popularity among the outside voters and/or weighted, where some outside Participants (80) are allowed more than one vote.

In various non-limiting embodiments, the number of votes allowed by an outsider could be attributed to such pre-determined rules that measure and analyze the outside Participants (80) for, say, the number, quantity, count, and/or measurable success of past competition participation; the number, quantity, count, and/or measurable success of past event participations; the number, quantity, count, and/or measurable success of past inventions; time and/or measurable success as a college student; time and/or measurable success as a college professor; and/or some combination of these examples. In various non-limiting embodiments, the total summation/result could comprise a collection, combination, segmentation, and/or the like.

In various non-limiting embodiments, outsiders (and/or insiders) may set rules and/or conditions that become established by a group vote, say by a preset majority condition of 60% or those voting blocs with the most votes) before, during, and/or after the time that competitors are creating the particular invention. Further insiders and outsiders could have a number of rules and/or conditions that could be result from group voting rules, this from, ideally, a pre-determined list of categories the team collectively pre-agrees (e.g. through majority vote) that anything, at certain point in time of, say the same day, following a set of conditions, a patent that could either cover a pre-determined industry sector, product/service category, and/or the like.

In various non-limiting embodiments, the success of the competitors could also incorporate an analysis of who was able to get claims issued relatively the quickest; who has filed and/or was issued the claims that are perceived by a judging panel, competitors, Peers (65), Experts (75), and/or the like; and/or where an actualized valuation is obtained in terms of a current infringer's sales, net income, market share and/or the infringer's anticipated and/or projected future market share, revenues, net income and/or the like; a perceived and/or actualized reasonable royalty, and/or the like.

In various non-limiting embodiments, the "Perceptions Management" module in a block 293, in general, allows the IPACE member to create/modify rules as to what, when, who, why perceptions are generated, who may conditionally view and/or conditionally interact with (e.g. argue for/against) either the terms or the perceptions and subsequent perceptions iterations, how, and/or like. For example, the IPACE system may analyze and generate a perception that data/content contributed to a particular project by a particular IPACE member, say a Reviewer, violations the terms of the particular TOP, because the data/content contributions is perceived to create a Joint-Inventor/Co-Inventorship, and where the IPACE generated and analyzed perception may be forwarded to the Reviewer to accept/reject, challenge, conditionally agree/counter/reject, comment, make recommendations and/or the like.

In various non-limiting embodiments, the "Substitution Management" module in block 294 is similar, if not the same as the module accessible from the TOP Management block 243 and a Negotiations Management block 246. In various non-limiting embodiments, the "Substitution Management" module allows the IPACE member the functionality to manage his/her and/or an Account's (60) contractual options for obligation and/or duty assignment, reassignment and/or substitution through another party in association with the IPACE Operating Environment. For example, some project TOPs may specifically preclude substitution, while other may have conditional rules for substitution allowance. For instance, a particular project may allow for substitution where both parties (generally, the Campaign Gatekeeper (42) and the original IPACE Participant (80) who accepted the TOP and a specific offer), where both mutually and conditionally agree on what specific IPACE members may take over another the original IPACE Participant's (80) obligations, how, when, why, penalties, and the like.

In another substitution instance, a particular project may conditionally allow for substitution for all or a portion of a particular obligation by a particular IPACE participating party who has failed to, say timely perform his/her duty, and had mutually agreed/accepted the TOP and the specific offer, including this substitution right to the IPACE Campaign Gatekeeper (42) when say, a series of attempted remedies have failed. Here the IPACE Campaign Gatekeeper (42) could replace all or a portion of the obligations not properly met, but may not be obligated to do so, and where there still may be penalties placed upon the original IPACE Participant (80) who accepted the TOP and the specific offer even if substitution and obligations are successful. In various non-limiting embodiments, the "Substitution Management" module would track the appropriate and relevant TOPs and Projects for pending issues, current options, remedies, penalties, and the like.

In another substitution instance, a particular project, circumstances may arises where obligations are no longer fully relevant and/or need to be modified, and where the original IPACE Participant (80) who accepted the TOP and the specific offer) may not possess the appropriate skills, qualifications, and/or the like, but has another IPACE associate, or party, he/she would like to recommend/refer. Depending on the circumstances that lead to the irrelevance of a particular obligation or need to modify, the substitution of obligations to another party may remove the original IPACE Participant (80) who accepted the TOP and the specific offer) from any future obligations, compensation, penalties, and/or rewards; or he/she may still have his compensation, penalties/rewards partially or fully dependent on the performance, punctuality, and/or successfulness of the new party.

In another substitution instance, a particular project may conditionally allow for substitution to a number of other pre-qualified, say Patent Attorneys (44) within the same law firm for all or a portion of a particular obligation by a particular IPACE participating Patent Attorney (44) who, with sufficient time and proper notice, notifies the IPACE Campaign Gatekeeper (42) of the intended substitution and where the substitution is accepted by the IPACE Campaign Gatekeeper (42). Here the IPACE Campaign Gatekeeper (42) could be penalized for failing to timely respond, and/or not adhering to the pre-agreed substitutions terms in the TOP. In various non-limiting embodiments, the "Substitution Management" module would also track those IPACE members for his/her relative likelihood for the substitution of his/her obligations, substitution penalties accrued, projects with substitutions terms and the like, when compared to others, say in the same field, on similar projects, with similar TOPs and/or the like.

Substitution Assignment may also include items, resources, and materials beyond human beings. For instance, a particular project may conditionally allow for substitution of a particular software package for developing and/or submitting patent application figures, where the figures are, say, preferably drafted in software program A, but software program A may be conditionally be substituted with software programs B or C, where the conditions may require that the figures may be converted to software package A, if necessary, and/or the like. In various non-limiting embodiments, the "Substitution Management" module would also track those resource and material substitutions for relative likelihood for pros and cons, such as potential efficiencies, cost savings, delays, bottlenecks, and/or the like, when compared to other similar substitutions, say, for the same resource, same material, in the same field, on similar projects, with similar TOPs and/or the like.

In various non-limiting embodiments, the "Tracking Management" module in block 295 is similar, if not the same as the module accessible from the TOP Management block 295. In various non-limiting embodiments, the "Tracking Management" module, in general, allows the IPACE member to create/modify rules as to what, where, who, how, and/or the like is conditionally tracked and any related interests in association with the IPACE Operating Environment. For example, the "Tracking Management" module could be utilized to create a tracking rule, where an interval screenshot collection term rule for a particular TOP for a particular project where the IPACE system will capture a screenshot of any CREATE module usage associated with the particular project in intervals of say, every five (5) seconds and during any input. Here the potential participant may accept such an interval screenshot collection term rule, say provided he/she has visibility and/or he/she is allowed to bulk upload data/content. If such options are not available, depending on TOP, the potential participant may be able to counter with such conditional provisions utilizing the Negotiations Management module.

In various non-limiting embodiments, the IPACE member may customize the IPACE-UI (via block 286) appearance, module options, and functionality to access other modules such as the "Bid Related" module, the "Accounts Receivable/Accounts Payable Terms and/or Billing Related" module, the "Budget, Quotas, and/or Cost Limits Related" module, the "Credit Related" module and/or like directly; or he/she may access other modules through the corresponding top-level module access through the Dashboard (108), such as the FINANCIALS (114) in this example of FINANCIALS modules.

In another example, the IPACE member could create, review, modify, and/or assign IPACE Court related rules via the "IPACE Court Management" module in block 248. For instance, he/she could create conditional rules regarding who, when, how, and why Participants (80) could partake in all IPACE Courts related to the particular IPACE member, in general, a particular IPACE court, a particular IPACE case, and/or the like.

In addition, the "Rule Engine and Management (128)" module provides a variety of methods to employ a variety of Boolean operators, thresholds, ranges, weighting, prioritizations, and other rules to the collective measurements and results. For example, a relatively sufficient amount of lead time to do a particular task (setup via the TIMES module 116), say one for preparing a translation of the specification from English to Japanese for a national phase entry may prove to be far more effective at attracting interested translators and competitively priced bids when relatively compared to other bids over the course of time for similar projects, and therefore more weight could be applied towards that particular sufficient amount of lead time for that particular task of preparing an English to Japanese translation.

In various non-limiting embodiments, the "Rule Engine and Management's Assignment Module" shown in an earlier figure allows the user to assign rules to a variety of objects through segments and IDs. In various non-limiting embodiments, the results of the Rule Assignment Management usage and the associated functionality afforded by the option modules appear in a step 271 "Analysis &/or Verify Collective Input/Results." Next, a step 272 is where the IPACE Member may "Preview &/or Test" rule(s)."

Each new IPACE Campaign (e.g. Project) 236 and/or rule could be set to run against previous IPACE Campaigns 236 and rules, in general, and Campaigns 236 and rules with similar TOP Terms and Ownership Management rules to track and make sure that the new IPACE Campaign 236 and/or rules are in fact performing similarly, or report back that it is off by a quantifiable degree, and make suggested changes based on the area and/or attribute where the new IPACE Campaign 236 and/or rules deviates from methods that are relatively more tried and true, so credit and changes may be suggested and/or made based upon measurable results. New and modified TOP Terms and Ownership Management Rules resulting in IPACE Campaigns (e.g. Projects) for acquiring a Project Participant, say a Patent Attorney (44) with a particular maximum budget, say for doing twenty claims with three independent claims, could be run against historical data/statistics to analyze and generate an estimate of the number of active Patent Attorneys (44) that particular maximum budget would likely attract per using the Preview and/or Test 272 function.

Next a query 273 asks if the IPACE member would like to either "Continue or Invoke" the rule? If the answer to query 273 is "continue" as in continue utilizing the Dashboard functionality without invoking the rule, then a next step 275 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 273 is instead "invoke" then a step 274 is invoked for the particular rule, then the next step 275 with a "Send, Post and/or Synchronize Appropriate Info, Data, Statistics, Data/content, Rules and Terms To Appropriate Parties, Engines, and Modules" is performed, where the IPACE user may also then continue utilizing the Dashboard.

All of the TOP Terms and Ownership Management module and inputs are generally tracked and measured independently, and collectively as a unit against and relative to a particular Project 236, and/or Project element to measure their effectiveness and success rates against different Project 236 elements, FINANCIALS Rules, Account Rules, Segmentation Rules, TIMES Rules, CREATE Rules, Negotiation Rules, METER Rules, IPACE Court Rules, ADSTATS Rules, and Real-time Tracking/Reporting.

Computer-Implemented Confidentiality and Information Sharing Restrictions/Shielding/Privileges In various non-limiting embodiments, the IPACE system and the computer-implemented method tracks each change per file, with a date/time stamp that may be played back, e.g. per document/spreadsheet/image-editor and per author/artist where the IPACE member/user could view, hear, witness, and/or relatively compare against other data, statistics, elements and/or the like. Authors, artists, inventors, reporters, creators and/or the like, may name projects, elements, scenes, effects and/or the like where he/she may maintain a relationship beyond, say the preset categories for say, IP-creation, News reporting and/or the like. For instance, the IPACE member/user may create his/her own unique internal code name, say my "Killer-App-for-Mobile-Searching" and/or abbreviated as "KAMS," so that he/she may simply place that abbreviation as, say a user-created meta-tag or keyword and maintain a relationship for all the project elements, private to him/her, and/or where shared among other members, say the Participants (80) of the project/campaign.

In various non-limiting embodiments, the IPACE member may also allow the IPACE system to incorporate these element relationships into the IPACE system analysis for any perceived creative overlap and, depending on the circumstances, the TOU/TOPs, and/or the like, the IPACE system would preferably alert both parties, and/or one party of the perceived creative overlap, where the originator's data/content may be able to maintain security and/or privacy without revealing his/her actual data/content, project, Participants (80), and/or the like. In various non-limiting embodiments, the IPACE system may suggest remedies which may include, say modifications, arbitration/mediation (e.g. IPACE court or the like), and/or even collaboration, where the IPACE system would preferably identify where each party appears to have accomplished relatively the most and where the IPACE and/or the party him/herself/itself may present a case for how and why the two (or more) should/could collaborate.

TOU/TOPs for Viewing, Editing, Saving, Sharing, Printing, Etc.

In various non-limiting embodiments, the files and folders may include additional information/meta-data that may also be encoded, embedded, displayed (e.g. on mouse-over), or included as part of the naming convention, and/or the like, for such things as the number of images/resolution/page appear/source/last-updated, word count/edit count/keywords, page count, authors overall/since last moment in-time/since last edit/deadline/goal, contributors, employees, inventors, and/or the like. In various non-limiting embodiments, the files and folders may include additional information/meta-data such as links, questions, TOU/TOPs, and/or the like, where a particular user may need to satisfy a question, condition, role, TOU/TOP, and/or the like before viewing, editing, saving, cutting and pasting, printing, emailing, sharing, collaborating, linking, and/or the like. In various non-limiting embodiments, every contribution and contributor is tracked with a history list, including deleted, undo data/content, layers, metadata, and/or the like. In embodiment, viewing, editing, utilizing, and/or the like, such information and data may be limited to certain roles, permissions, and/or the like, for a limited period of time, consumption, viewing, edits, printing, cutting and pasting, saves, sharing, linking, and/or the like.

Data Searching, Collecting, Interrogating, Extracting, Comparing, Synchronizing and TOP Role Criteria In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for searching, collecting, interrogating, extracting, comparing, and/or synchronizing data with and/or via a computer input, other input/output (i/o) devices, (e.g. typing, sending, receiving, viewing/display/playing, text, numerals, expressions, formulas, rules, conditions, calculations, audio, images, lines, vectors, symbol, clipart, graphic, video, and/or the like). In various non-limiting embodiments, the searching, collecting, interrogating, extracting, comparing, and/or synchronizing data with and/or via the computer inputs, other input/output (i/o) devices would preferably comprise data, stats and monitoring from a GPS, blood pressure monitor, pedometer, heart rate monitor, hypertension tests, blood test, sleep test, sleep apnea test, body mass index test, body fat test, endurance test, weight-resistance test, cholesterol test, diabetes test, eye test, hearing test, real-age-test, calorie-intake test, thyroid test, body temperature test, circulation test, growth/maturity test, respiratory test, digestive test, colonoscopy, endoscopy, insulin test, flexibility test, drug test, and/or the like.

In various non-limiting embodiments, viewing, editing, utilizing, and/or the like, such data/content, information and data may be limited to certain roles, permissions, and/or the like, for a limited period of time, during certain periods of perceived peak performance, following a particular criteria and/or stimulus (e.g. a run, exercise, yoga, lunch, interacting with a son/daughter/pet, and/or the like) for say some period of time, or until some measurable result, (e.g. a particular software skill criteria, a particular sleep break/result criteria, a particular break period/result criteria, a particular test result/criteria, a particular answer/result from another party/member/user criteria, a particular consumption criteria, a particular liquid criteria, a particular medication criteria, a particular urinalysis reading criteria, a particular age criteria, a particular location criteria, a particular software criteria, a particular equipment criteria, a particular vision test criteria, a particular hearing test criteria, a particular reaction speed criteria, a particular heart-rate criteria, a particular blood-pressure criteria, a particular weight criteria, a particular body mass criteria, a particular body dimension criteria, a particular weight-lifted criteria, a particular range of motion criteria, a particular speed criteria, a particular endurance criteria, a particular event-time accomplished criteria, a particular collaboration result criteria, a particular IQ result criteria, a particular brain pattern criteria, and/or the like criteria), some combination, collection, permutation of these, and/or the like.

More TOP Role Criteria and Analysis

In various non-limiting embodiments, viewing, editing, utilizing, interrogating, extracting, and/or the like, such data/content, information and data may be limited to certain roles, permissions, and/or the like, for a limited period of time, during certain periods of perceived peak performance, following such criteria analysis as an analysis of past performances, past deadline commitments, past software skills, past behaviors, past interactions, past contributions, and/or like. In various non-limiting embodiments, viewing, editing, utilizing, and/or the like, such data/content, information and data may be limited to certain roles, permissions, and/or the like, for a limited period of time, during certain periods of perceived peak performance, following such criteria commitments as a deadline commitment, contribution commitment, quality commitment, skill contribution commitment, feedback commitment, and/or the like.

Screenshots, Environment Webcams, and Other Data

In various non-limiting embodiments, the IPACE system automatically, systematically, continuously, persistently, conditionally, and/or via/per actor/user-prompt offers a subsystem and associated computer-implemented methods for interrogating and/or incorporating images and/or audio/video. In various non-limiting embodiments, the IPACE would automatically, systematically, continuously, persistently, conditionally, and/or via/per actor/user-prompt generates, stores, and analyzes inputs relative to historical data, such as an image, video frame, audio clip sound waves, audio clip converted to text, and/or the like. For instance, the IPACE system could interrogate and/or collect an image every so many seconds, say as a screenshot of the computer screen, a webcam of the user/inputter's face, and/or other angles/over the shoulder, the environment, and/or the like, where data can be synchronized to follow a synchronized timeline of events and historically compared as to when a particular input was entered, stored, recovered, compared, analyzed, modified, and/or the like.

Determining a Data/content's Context

In various non-limiting embodiments, the IPACE system automatically, systematically (e.g. AIS 195), conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, determining, discerning, and/or relatively perceiving a context of a data/content, data/content container (e.g. document) or data/content portion (e.g. a paragraph, sentence, page, slide, image, video clip, audio clip, and/or the like), where the IPACE system generates a list of keywords from text, layers, file names, meta-data, and/or the like, along with any actor-stated, ascertained, discerned, relatively perceived, and/or predicted relationships to generate a context hierarchy and/or a contextual relationship map. In various non-limiting embodiments, the context hierarchy and/or the contextual relationship map may be utilized to help generate prior art search suggestions, expert witnesses, contributors, Joint-Inventor/Co-Inventors, claims, file/folder naming conventions, and/or the like.

Figure 24:
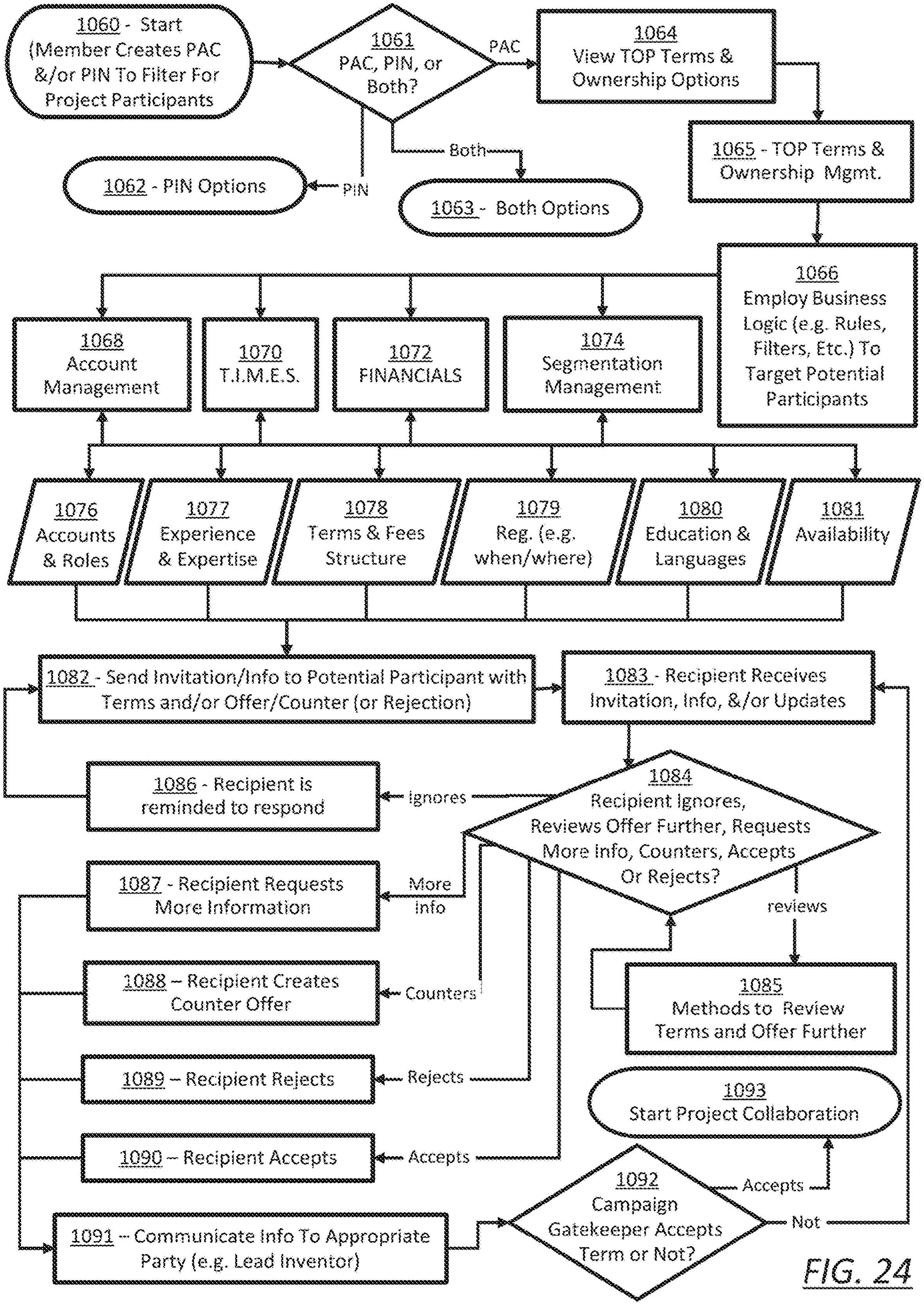
FIG. 24 is a flowchart depicting a member creating and/or modifying the settings for a project using the IPACE-UI 102 in a non-limiting embodiment.

FIG. 24 is a flowchart depicting a member creating and/or modifying the settings for a project using the IPACE-UI 102 in an embodiment. Starting with a step 1060 with a "Start (Member Creates PAC and/or PIN To Filter For Project Participants)," followed by a query 1061 that asks if the Campaign is going to employ a "PAC, PIN, or Both?" If the answer to the query 1061 is "PIN," then the user is passed to a terminator 1062 with the "PIN Options," which would relatively similar to the options depicted for a PAC. If the answer to the query 1061 is instead "Both," then the user is passed to a terminator 1063 with the "Both (PAC and PIN) Options." If the answer to the query 1061 is instead "PAC," then the user is passed to a step 1064 with a "View TOP Terms and Ownership Options."

In various non-limiting embodiments, the "View TOP Terms and Ownership Options" is for those members relatively new to the PAC and TOP process who may need questions answered, need a template, need a refresher, and/or want to request information from someone assigned to answer questions, say the RAA, manager, member, and/or some other customer service representative. For example, depending on the conditions for routing a question, the question type, and/or the type of access allowed in the environment, the question may or may not be sent to an existing member, or user. In addition and if the PAC is for a new project back in a step 1061, then there may be conditionally rules where the member/user needs to go through the RAA and/or a committee before his/her PAC posted.

If the project is new, the Member must complete specific terms regarding assignment, ownership rights for participation and the like. If it's an existing project, the Member may view the current terms and, in some cases, make adjustments assuming either, say no member has previously joined the project yet, and/or if the existing terms specifically called out and allowed for modifications subsequent members signing on.

For example, say the original terms allowed for subsequent modifications to, say only a predetermined portion of the terms, conditions, and rules, say only a subset of known specific rules for allowing more Participants (80) and/or expanding scope of the particular invention, but did not affect any existing or future equity ratios attained, cash disbursements due, points awarded, tasks assigned, and/or deadlines.

In another example, the original terms might only allow for modifications where, say there must be unanimous existing member approval before any pending modifications would be allowed to take effect and only after a predetermined and reasonable amount of time is allowed for the existing membership to review and asks questions, say something like fifteen (15) days, and where, say the entire membership must vote for or against the entire proposed modification within another reasonable timeframe, say another seven (7) days.

Some Restricted (e.g. PIN) 106 access environments may have different rules and conditions on how and when an existing member may modify pre-existing conditions, where, say only the particular member who created the project may make any modifications. In addition, the original terms may state that only those existing members who have actually already participated in some measurable task for, say equity are allowed and/or required to vote unanimously for any subsequent change in the terms to take effect. In various non-limiting embodiments, preferably all of these possible scenarios of potential future modifications would be clearly spelled out to any user before considering participations and subsequently becoming an "existing member" or "member who has already participated in some measurable task" as defined by terms and reviewed and pre-approved by the user to become a member.

For Restricted (e.g. PIN) 106 access environments where the members are Employees (55) where he/she has already assigned one-hundred (100%) percent of his/her rights to, say the corporation he/she is employed by, the corporation would be less inhibited to make modifications to the terms, but at least all members would be notified. In addition, the IPACE system would track members who are famous for, say getting the terms improved or who are notorious for worsen the terms.

For example, if the original terms called for each Contributor (50) to the project, say a patent application, to obtain one-half of one (½%) percent ownership for contributing an independent claim, but later increased the ownership to, say one (1%) percent, that Member who created the project may receive bonus status points for the adjustment, but likely only under certain conditions, say well after the project had been started, say after it was sixty (60%) percent on its way to completion, and perhaps only for those members who had been involved from a particular date and not for relative new Participants (80). However, these conditions would need to be spelled out in the original terms, and there may be situations where it is necessary to increase compensation or equity to encourage new or more participation close to a deadline.

In various non-limiting embodiments, the counter affect would be for member to potentially slow down his/her efforts near the deadline, so the IPACE system would preferably monitor these types of conditions as well. Meaning, not only which Members are relatively successful at maintaining the original terms and getting projects done well, on time, and with the original resources, but also track which Participants (80) were involved and the same for those projects that seem to need a boost at the end. So as to distinguish which particular Employees (55)/Participants (80) most often appear in the projects with the better data/statistics, as opposed to those who most often appear in the projects with worse data/statistics (or in scenarios with say, several late term modifications/incentives required).

In some instances, the member/user may have to "agree" to the TOP Terms and Ownership policies in step 1064, before advancing to a "TOP Terms and Ownership Management" 1065 module which allows the member who is in charge of the entire project, typically and hereinafter the Lead Inventor (40), to pre-establish such terms as the ROAR sign-up terms, if applicable (e.g. the first project within the entire Restricted (e.g. PIN) 106 access and environment), and the PACOR (the project-based ownership terms for this particular project).

In various non-limiting embodiments, preferably the ownerships and data rights, the Terms and "Terms of Use" would also clearly spell out such things as the privacy policy and the confidentially policy. In addition, how data/statistics is being tracked, utilized, synchronized, encrypted, stored, when and where it is backed up, what members have access and to what degree, who is ultimately in charge of IT issues, customer service issues, data loss issues, tracking issues, rights issues, and/or deadline issues.

Within the TOP Terms and Ownership Management, the member may advance to a step 1066 with an "Employ Business Logic (E.g. Rules, Filters, etc.) To Target Potential Participants," where the member/user has a plurality of options. In various non-limiting embodiments, the options are not limited to the options in this example, where there is the "Account Management" 1068 module, a "TIMES" 1070 module (more later), a "FINANCIALS" 1072 module (more later), and a "Segmentation Management" 1074 module (more later).

In various non-limiting embodiments, the "Account Management" 1068 module allows the Lead Inventor (40) and/or say, the subsequently assigned Project Manager (43) to primarily, say invite known members to participate and/or to try and locate Participants (80) for given tasks (more detail below). In various non-limiting embodiments, the "TIMES" 1070 module is primarily to, say define all the project elements related to time and deadlines. (This module is explained in more detail later). In various non-limiting embodiments, the "FINANCIALS" 1072 module is primarily to, say define all the project elements related to accounting, costs, budgets, bidding, legal, and the like. (This module is explained in more detail later). In various non-limiting embodiments, the "Segmentation Engine and Management" 1074 module is primarily to segment information and/or groups into segments with common attributes, such as US registered Patent Attorneys (44), and/or the like. (This module is explained in more detail later).

From these 1068-1074 modules, the Lead Inventor (40) (or other Member with approved access) is passed to options 1076-1081, where the Lead Inventor (40) may further define the type of project, say a patent application and the terms for participation with a list of other options for filtering and/or searching the pool of available potential participants starting with an "Account and Roles" 1076 option, an "Experience and Expertise" 1077 option, a "Terms and Fees Structure" 1078 option, a "Registered (when/where)" 1079 option, an "Education and Languages" 1080 option, and an "Availability" 1081 option. In various non-limiting embodiments, the selections in 1068-1074 will determine the functionality and options available to the Lead Inventor (40) where the IPACE system will "Filter and Search All Available Participants."

In various non-limiting embodiments, the "Account and Roles" 1076 option allows the Lead Inventor (40) to filter potential participants by known Account 60 and/or role types. For example, the Account 60 delineations employed could be for, say all Accounts 60 known to be Universities, or just Universities that are part of the state of California school system, or just affiliated with some known group or system. In another example, the Account 60 delineations employed could be for, say all Accounts 60 that are owned by a particular entity or corporation, or just Accounts 60 owned by the same entity known for a particular product, say the software division, or just those Accounts 60 that produce a particular type of software, say CAD programs. In various non-limiting embodiments, the Lead Inventor (40) may also or instead incorporate known delineations for roles, where the Lead Inventor (40) employs the delineation of just Project Managers (43).

In various non-limiting embodiments, the "Experience and Expertise" 1077 option allows the Lead Inventor (40) to also incorporate filtering for a potential participant's past experience and/or quantifiable expertise. In various non-limiting embodiments, the experience could be a listing of experience determined to be relevant to the role and/or project and/or relative to others potential participants. In various non-limiting embodiments, the Expertise could be quantified and dependent on the potential participant's status points obtained so far for past project participation, Peer (65) Reviews, and Expert recognition points. In various non-limiting embodiments, the IPACE system would preferably allow the Lead Inventor (40) to tweak and/or adjust the filtering applied to these cumulative points where the weighting affects and/or removes certain projects that the Lead Inventor (40) believes are not relevant to his/her project.

In various non-limiting embodiments, the "Terms and Fees Structure" 1078 option allows the Lead Inventor (40) to also incorporate filtering for a potential participant's known policies on Terms and known fee structures. For example, certain potential participant may create a member profile with conditional rules that states that he/she will only take projects that provide certain terms, and/or state that there are projects with certain terms that he/she will not participate in. For instance, a particular Patent Attorney may setup in her profile that she will not work any projects for equity or that she will only work for equity with say, Members she has pre-approved, and/or only Accounts (60) that are, say part of the current Fortune 500 of companies.

In various non-limiting embodiments, the Lead Inventor (40) may also incorporate a potential participant's profile rules regarding Fee Structure, where, for example, two particular Draftspersons (54), "Draftsperson (54) A" and "Draftsperson (54) B" each has a set minimum fee for figures and/or a set minimum number of figures a project must employ him for his participation. For instance, "Draftsperson (54) A" may have a set minimum fee per figure of seventy-five ($75) and a six (6) figure minimum, and "Draftsperson (54) B" may have a set minimum fee per figure of one-hundred ($100), but no figure minimum. So if the project only needed, say three figures, the Lead Inventor (40) could input that anticipated requirement when it came to sourcing the Draftsperson (54) and this case "Draftsperson (54) B" would show in the pool of potential participants, but "Draftsperson (54) A" would not.

In various non-limiting embodiments, the "Registered (e.g. when/where)" 1079 option allows the Lead Inventor (40) to also incorporate filtering for a potential participant's profile data/statistics for such things as when and where the potential participant has been registered. For example, a particular Patent Agent's (45) profile could state that he has been registered to practice in the state of Washington for, say the past fifteen (15) years, while another particular Patent Agent's (45) profile may state that he has only been registered for, say the past six (6) years, but in several states, say including the same state where the company headquarters for this particular project is located.

In another example, a particular Patent Attorney's (44) profile could state that she registered to practice in another country or that she is currently registered in the United States, but had been registered with EPO in London, say eight (8) years ago. That type of background could be valuable to the Lead Inventor (40) if he/she planned to eventually file another EPO application following the initial US application.

In various non-limiting embodiments, the "Education and Languages" 1080 option allows the Lead Inventor (40) to also incorporate filtering for a potential participant's past education and/or languages known. For example, a particular engineer's profile could state that he has in Bachelor's Degree in Computer Science from Stanford University and his Master's Degree in Statistics from MIT.

In another example, a particular translator's profile could state that she can read and write proficiently and fluently in several languages, say English, Mandarin, Japanese, Korean, and German. That type of background could obviously prove valuable to the Lead Inventor (40) who anticipates future filing in China, Japan, Korea and Germany.

In various non-limiting embodiments, the "Availability" 1081 option allows the Lead Inventor (40) to also incorporate filtering for a potential participant's profile settings regarding his/her availability. For example, a contract engineer could state that he is available to co-invent on projects (that don't conflict with current obligations) during, say the weekends. In addition, the IPACE system would preferably track, analyze, and report if and when this particular contract engineer was known to be participating in other projects, whereby an algorithm could then incorporate his likely limited availability and therefore places him lower in, say the pool of available talent for a given day, and/or if and when appropriate, annotate his potential time conflict to the Lead Inventor (40).

From these 1068-1081 modules/options, the Lead Inventor (40) (or other Member with approved access) is passed to a step 1082 with a "Send Invitation/Info to Potential Participant with Terms and/or Offer/Counter (or Rejection)" where in a subsequent step 1083, a "Recipient Receives Invitation, Info, and/or Updates."

From the "Recipient Receives Invitation, Info, and/or Updates" 1083 step, a query 1084 asks if "Recipient Ignores, Reviews Offer Further, Requests More Info, Counters, Accepts Or Rejects?" the invitation, info and/or offer. If the Recipient "Reviews" a particular offer or a particular portion of the particular offer, the data/statistics is passed to a step 1085 with a "Methods to Review Terms and Offer Further," where, for instance, the IPACE system may be setup to conditionally address a variety of potential participants based upon, say the number of Participants (80) who have already rejected, countered, and/or accepted the current or counter terms. In addition, the IPACE system would preferably conditionally incorporate temporal elements for the time remaining before a deadline and the like. After reviewing the Terms and Offers further, the recipient (e.g. a potential participant) is passed back to query 1084.

If the Recipient "ignores" the invitation, info and/or offer, the data is passed to a step 1086 with a "Recipient reminded to respond," where, for instance, the IPACE system may be setup to conditionally remind a particular recipient and/or segment of recipients based upon timing cues and where that data is forwarded back to the step 1082. If the Recipient requests "More Information" regarding the invitation, info, and/or offer, the data is passed to a step 1087 with a "Recipient Requests More Information" where, for instance, the IPACE system may be setup to conditionally answer requests for information by passing to the appropriate parties/members known or perceived to be appropriate for the information request and where that data is forwarded to a step 1091 with a "Communicate Info To Appropriate Party (e.g. Lead Inventor)."

If the Recipient "Counters" a particular offer or a particular portion of the particular offer, the data is passed to a step 1088 with a "Recipient Creates Counter Offer," where, for instance, the IPACE system may be setup to conditionally address counter offers and/or pass counter offers to the appropriate parties/members known or perceived to be appropriate for the counter offer and where that data is forwarded to the step 1091 with the "Communicate Info To Appropriate Party (e.g. Lead Inventor (40))."

If the Recipient "Rejects" a particular offer or a particular portion of the particular offer, the data is passed to a step 1089 with a "Recipient Rejects" where, for instance, the IPACE system may be setup to conditionally address rejections and/or pass rejections to the appropriate parties/members known or perceived to be appropriate for the rejection and where that data is forwarded to the step 1091. If the Recipient "Accepts" a particular offer or a particular portion of the particular offer, the data is passed to a step 1090 with a "Recipient Accepts," where, for instance, the IPACE system may be setup to conditionally address Acceptances and/or pass Acceptances to the appropriate parties/members known or perceived to be appropriate for the Acceptance and where that data is forwarded to the step 1091.

From the step 1091, the appropriate data is forwarded to a query 1092 where a "Campaign Gatekeeper (or similar) Accepts Terms (e.g. Participant, resource, offer, and/or the like) or Not? If the Campaign Gatekeeper (42) "Accepts" a particular participant, resource, and/or offer that appropriated data is passed to a terminator 1093 with a "Start Project Collaboration," where that particular Participant (80) and/or resource is listed as "Accepted" and obtains the appropriate conditional privileges. If on the other hand, the Campaign Gatekeeper (42) does "Not" accept a particular participant, resource, and/or offer, then that appropriated data is passed back to step 1083.

Figure 25:
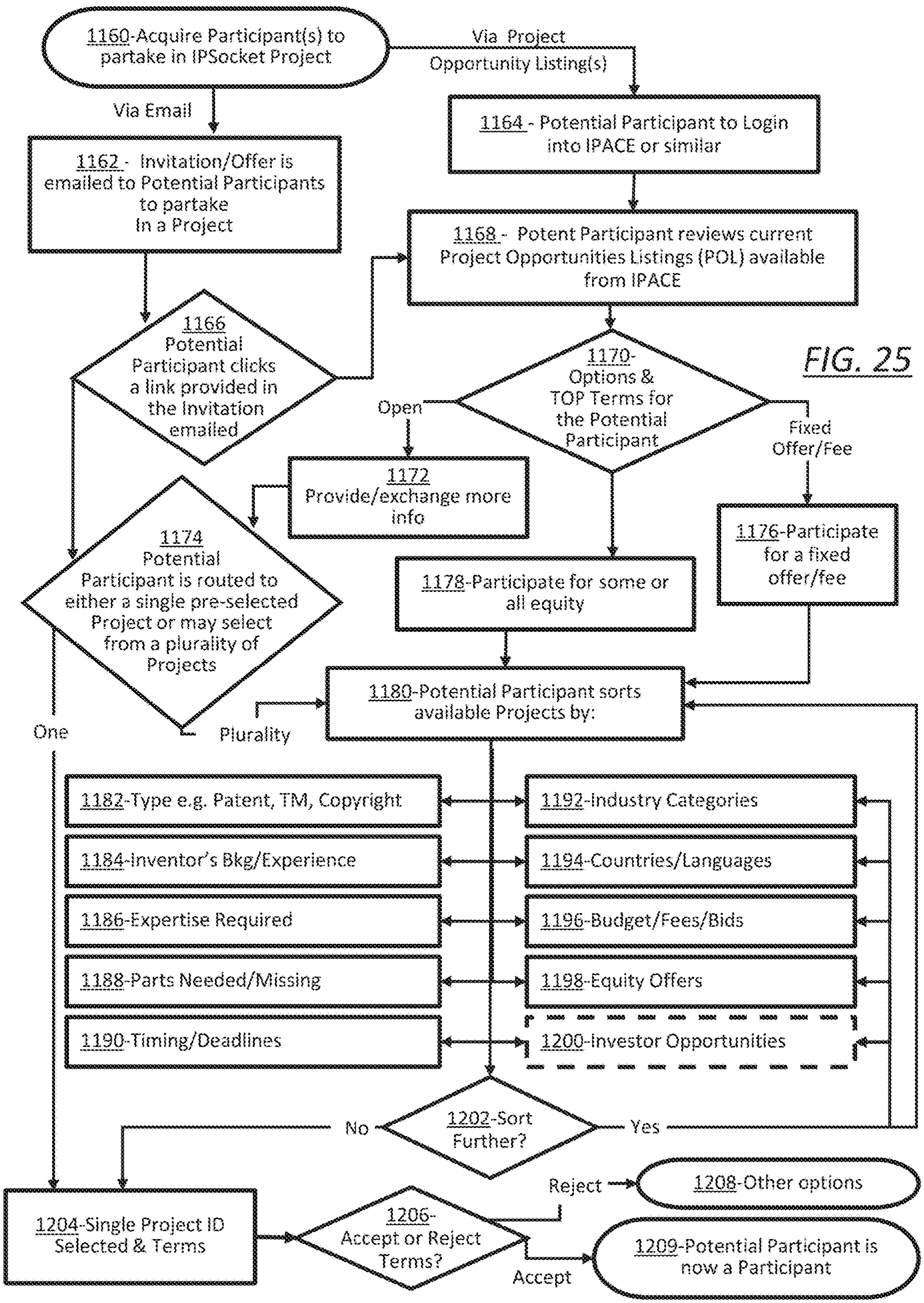
FIG. 25 is a flowchart depicting a non-limiting embodiment whereby an Account 60 and/or a particular member, say the Lead Inventor (40) or the Project Manager (43) could create and utilize a Project 236 with Invitations for acquiring potential participants to partake in a particular project.

FIG. 25 is a flowchart depicting an embodiment whereby an Account 60 and/or a particular member, say the Lead Inventor (40) or the Project Manager (43) could create and utilize a Project 236 with Invitations for acquiring potential participants to partake in a particular project. Starting with a step 1160 "Acquire Participant(s) to partake in IPSocket Project" where the Account 60 member, say the Project Manager (43), is already connected to the IPACE system and using the IPACE-UI (102) with the appropriate role and permissions to send potential Participants invitations. In this example, the Project Manager (43) may utilize two methods for interrogating and/or acquiring Participants (80), the first, "via email" invitations; and the second, "via a Project Opportunity Listing(s)," which may or may not employ links to more details (e.g. terms, TOP, project, current participant, deadlines, goals, compensation, and/or the like).

In various non-limiting embodiments, the Project Manager (43) may choose to utilize email invitations by advancing to a step 1162 where an "Invitation/Offer is emailed to Potential Participant(s) to partake in a Project" is invoked. In various non-limiting embodiments, the recipient of the email in step 1162 is a potential Participant for a particular project in this instance, where the invitation may explain the project and terms for participation and invites the potential participant to invoke the provided link that will take the potential Participant to more details. This potential participant may or may not be an existing member of the particular Restricted (e.g. PIN) 106 access environment or even a member of the IPACE system. In various non-limiting embodiments, the recipient of the invitation invokes the link when a "Potential Participant clicks a link provided in the emailed Invitation emailed" 1166 function.

In a step 1174, a "Potential Participant is routed to either a single pre-selected Project or may select from a plurality of Projects" if he/she so pre-qualifies. If it is a single pre-selected Project determined by an ID contained in the invitation link, then the potential participant is routed to a step 1204 where a "Single Project ID is Selected and Terms" displayed for review. From here the potential participant is routed to a query 1206, which asks if the potential participant "Accepts or Rejects the Terms?" offered for becoming a Participant (80) in the Project.

If the potential participant executes a "Reject" offer function in query 1206, then he/she is routed to a 1208 terminator for "Other Options" where the potential participant is provide the options available to him/her based on the known data. Some embodiments may incorporate e.g. known, stated, discerned, and/or a relatively perceived thresholds. For example, he/she may be able to go back and look at other offers if he/she had more than one offer pending (known, stated, discerned, and/or relatively perceived with a threshold surpassed). In addition, depending on the rules and conditions setup by terms and invitation, the potential participant may be allowed to create and present a counter offer in step 1208.

If the potential participant executes an "Accept" offer function in query 1206, then he/she is routed to a 1209 terminator where a "Potential Participant is now a Participant" is executed. Meaning if the user was not a member of the IPACE system, he/she is now; if he/she was already a member of the IPACE system, but not a member of this particular Restricted (e.g. PIN) 106 access environment that sent him/her the offer, then he/she is now; and if the member was already was a member of this particular Restricted (e.g. PIN) 106 access environment, but not a participating member of this particular project, then he/she is now. However, if this is the first acceptance of the project terms, he/she is unlikely to yet be a so-called "contributing participant" until he/she actually contributes per the definitions and conditions so pre-defined for this particular project's terms.

If back in step 1174, the Potential Participant pre-qualifies and wishes to select from a plurality of Projects," then he/she is routed to a step 1180 with a "Potential Participant sorts available Projects by:" where the IPACE system displays his/her options. For instance, step 1180 could display a list of sorting options and modules comprising: a "Type e.g. Patent, TM, Copyright" 1182 option, an "Inventor's Bkg/Experience" 1184 option, an "Expertise Required" 1186 option, a "Parts Needed/Missing" 1188 option, a "Timing/Deadlines" 1190 option, an "Industry Categories" 1192 option, a "Countries/Languages" 1194 option, a "Budget/Fees/Bids" 1196 option, an "Equity Offers" 1198 option, and an "Investor Opportunities" 1200 option.

Following the Potential Participants utilizations of these options 1182-1200, then he/she has an option to "Sort Further?" in a query 1202. For instance, the Potential Participants could prioritize and/or conditionally prioritize sorting options, where some sorting options and defined segments would take precedent over others for, say a particular set of conditions, such as time, compensation earned over a particular period of time, and/or the like. If the answer to query 1202 is "Yes," then the Potential Participants is passed back to step 1180 to continue utilizations his/her sorting options. If the answer to query 1202 is instead "No," then the Potential Participant is passed to a step 1204 with a "Single Project ID Selected and Terms."

If back at the start in step 1160 "Acquire Participant(s) to partake in IPSocket Project," where the Project Manager (43) also/or instead employs a "Via Project Opportunity Listings" method to acquire Potential Participants, then a step 1164 allows a "Potential Participant to Login into IPACE or similar," where the Potential Participant then advances to a "Potential Participant reviews current Project Opportunities Listings (POL) available from IPACE" in a step 1168. From step 1168, the Potential Participant advances to a query 1170 that asks a set of "Options and TOP Terms for the Potential Participant" regarding, say if willing to participate for a fixed offer or fee. If the answer is "fixed offers/fee," as in the Potential Participant is only willing to consider a "fixed offer or fee," then the potential participant is passed to a step 1176 with a "Participate for a fixed offer/fee," where a plurality of offers are sorted by a fixed offer and/or fee.

If the answer is open, as in the Potential Participant is open to a range of opportunities, the potential participant is passed to a step 1172 with a "Provide/exchange more info" where he/she may sort opportunities where he/she may negotiate the terms. Here the Potential Participant may select those terms that are acceptable or not to filter a list of opportunities before passing to the step 1174.

Figure 26:
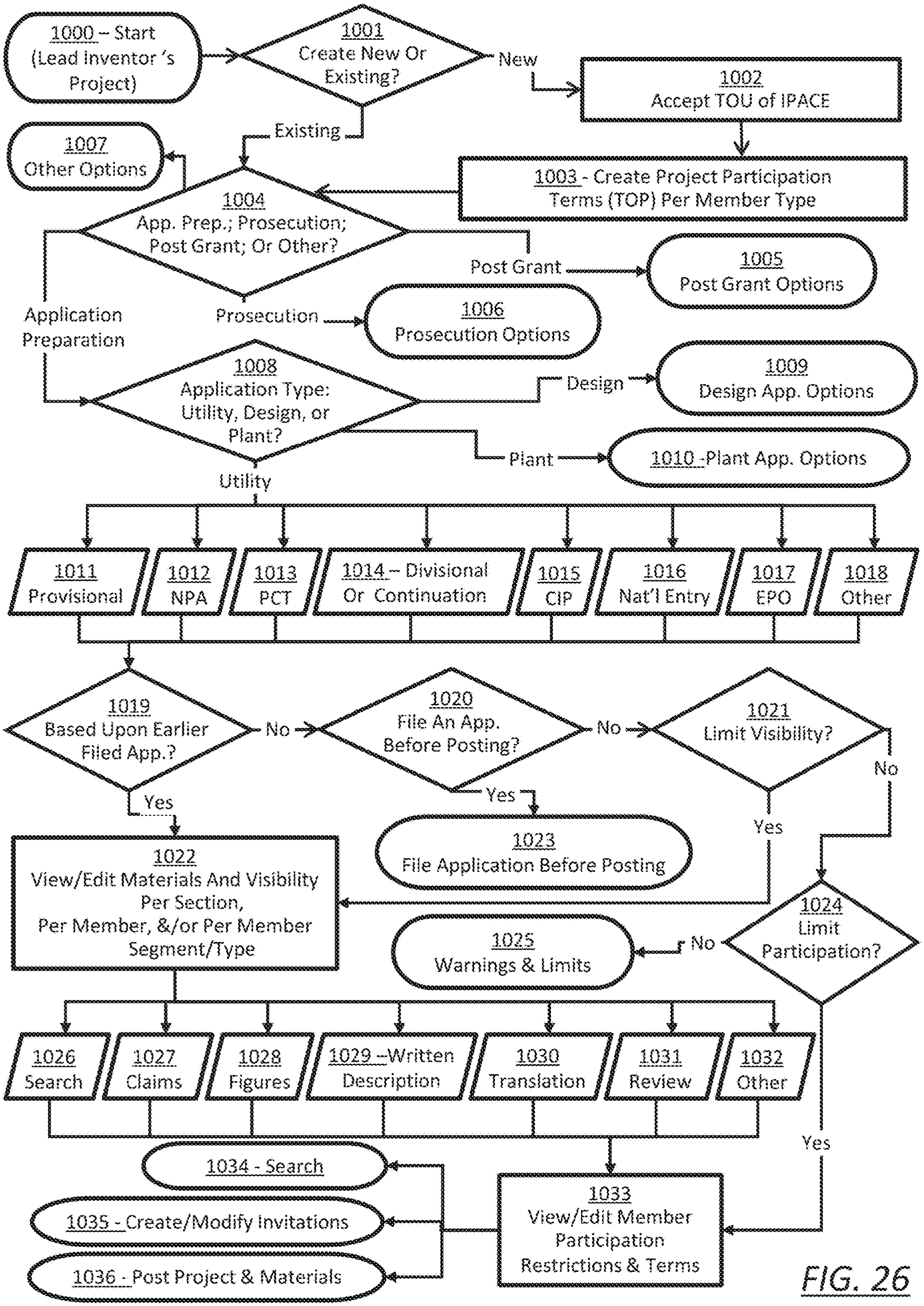
FIG. 26 is a flowchart that depicts a non-limiting embodiment and example of the IPACE-Hub 100 system where a Lead Inventor (40) starts a patent related project.

FIG. 26 is a flowchart that depicts an embodiment and example of the IPACE-Hub 100 system where a Lead Inventor (40) starts a patent related project. In various non-limiting embodiments, s Starting with a terminal 1000 where a "Lead Inventor Start's his/her Project" function appears, followed by a query 1001 that asks whether to "Create New Or Existing?" project. If the answer to the query 1001 is "New," then the process proceeds to a step 1002 where the Lead Inventor "Accept TOU of IPACE." Next, the process proceeds to a step 1003 where the Lead Inventor "Create Project Participation Terms (TOP) Per Member Type."

Next, a query 1004 asks if "App. Prep.; Prosecution; Post Grant; Or Other?" If the answer to the query 1004 is "Post Grant," then the process proceeds to a terminator 1005 "Post Grant Options." If the answer to the query 1004 is instead "Prosecution," then the process proceeds to a terminator 1006 "Prosecution Options." If the answer to the query 1004 is not "Post Grant," "Prosecution," or "Application Preparation," then the process proceeds to a terminator 1007 "Other Options" (e.g. licensing, litigation, and/or the like). If the answer to the query 1004 is instead "Application Preparation," then the process proceeds to a query 1008 that asks "Application Type: Utility, Design, or Plant?"

If the answer to the query 1008 is "Design," then the process proceeds to a terminator 1009 "Design App. Options." If the answer to the query 1008 is "Plant," then the process proceeds to a terminator 1010 "Plant App. Options." If the answer to the query 1008 is "Utility," then the process proceeds to a list of options comprising a "Provisional" 1011 option, an "NPA" 1012 option, a "PCT" 1013 option, a "Divisional Or Continuation" 1014 option, a "CIP" 1015 option, a "Nat'l Entry" 1016 option, an "EPO" 1017 option and/or an "Other" 1018 option (e.g. Foreign countries, other jurisdictions, and/or the like).

From the list of Utility options (1011-1018), the collective results proceed to a query 1019, which asks if the application type is "Based Upon Earlier Filed App.?" If the answer to the query 1019 is "No," then the process proceeds to a query 1020, which asks "File An App. Before Posting?" If the answer to the query 1020 is instead "No," then the process proceeds to a query 1021 that asks "Limit Visibility?" If the answer to the query 1021 is instead "No," then the process proceeds to a query 1024, which asks "Limit Participation?" If the answer to the query 1024 is "No," then the process proceeds to a terminator 1025 "Warnings & Limits." If the answer to the query 1024 is instead "Yes," then the process proceeds to a step 1033 to "View/Edit Member Participation Restrictions & Terms."

Next, in various non-limiting embodiments, the process proceeds from the step 1033 offer paths comprising a terminator 1034 "Search," a terminator 1035 "Create/Modify Invitations," and/or a terminator 1036 "Post Project & Materials." If the answer to the query 1019 is instead "Yes," then the process proceeds to a step 1022 "View/Edit Materials And Visibility Per Section, Per Member, &/or Per Member Segment/Type" is performed. Continuing, if the answer to either the query 1021 is instead "Yes," then the process also proceeds to the step 1022.

Following the step 1022, the process proceeds to a list of options comprising a "Search" 1026 option, a "Claims" 1027 option, a "Figures" 1028 option, a "Written Description" 1029 option, a "Translation" 1030 option, a "Review" 1031 option, and/or an "Other" 1032 option. From the list of options (1026-1032), the collective results proceed to the step 1033.

Filing and Prosecution Costs Analysis

In various non-limiting embodiments, the IPACE system and the computer-implemented method tracks an ability to search and compare filing and prosecution costs per each segmentation, e.g. per inventor, per attorney, per number of claims, figures, words, per art unit, per stage (preparing, prosecution, continuation, litigation, etc.) and the like for comparison purposes and searching future Contributors (50). In addition, this embodiment has an ability to score the costs relative to the perceived value, complexity, and the like. The perceived value could be relative to other patents for licensing, defensive, to society, and the like.

Figure Searching

In various non-limiting embodiments, the IPACE system and the computer-implemented method obtains, ingests, downloads, and/or scans and utilizes optical character recognition (hereinafter "OCR") for all figures and builds a lexicography of all terms and keywords in figures with discerned delineations/segmentations, such as per art unit, per examiner (66), per law firm, per attorney, and the like. In addition, the IPACE system may build a list of presumed delineations/segmentations based upon correlations within the database, where, for instance, a particular Patent Attorney (44) from a particular law firm is listed in an office action and may be "presumed" to be the Patent Attorney (44) working the patent Prosecution (71). This data may be stored as "presumed" and a notification may be sent to certain parties, such as the law firm, the assignee, the assignor, the Lead Inventor (40), and/or the Patent Attorney (44) him/herself to verify.

In various non-limiting embodiments, the IPACE system would track who and when the data was verified to build a level of reliance score. In addition, the party who supplied the data would receive points within the IPACE system for the verification and his/her status of reliance, which, overall, could be factor into the level of reliance score regarding if the particular Patent Attorney (44) did in fact work on the patent Prosecution (71) for a particular patent application, for a particular law firm, for a particular assignee, and the like, where each could have a separate level of reliance score. For instance, the level of reliance could be high for the particular Patent Attorney (44) working on a particular Application Preparation (77), but low to zero for working for a particular law firm if it turned out that the particular Patent Attorney (44) verified that he/she left the law firm that was initially presumed to be his/her employer. In various non-limiting embodiments, the IPACE system would preferably also track when these events occurred in time, so that this particular Patent Attorney (44) was an employee of the particular law firm initially, but went into solo practice at a particular time and date, and did or did not retain the client.

In various non-limiting embodiments, the user could request that the IPACE system analyze and generate reports that are displayed similar to Gantt charts that depict the chronology of the Participants (80) and events over the history of the application from conception (or before) through to today, and/or projected in the future.

In addition, the IPACE system would preferably analyze, generate, and display a report and/or Gantt chart showing all projects that a particular member has, is, and/or is scheduled to participate on. This data could be valuable to determine this member's likely availability in particular project. This data could also help demonstrate his/her time consumption on other pressing deadlines to help explain a matter of say "due diligence" to the USPTO or similar, and to help develop a case to avoid any perception of "abandonment" on the part of the member, say the Lead Inventor (40) and/or any lack of availability by a critical Contributor (50), say a Patent Attorney (44) during a particular period of time.

In various non-limiting embodiments, the IPACE system would preferably analyze and generate historical correlations and reports, say where the data known or discerned today about a particular patent's relative value in terms of the ability to monetize, license, and/or litigate could be utilized to analyze and generate a reflective analysis and correlation of the data for those members who participated in the Application Preparation (77), Prosecution (71), and the like. In various non-limiting embodiments, the IPACE system analysis would preferably include a relative workload analysis for each member on other projects at the time (known, presumed, and/or manually entered). This workload data/statistical analysis may be included in determining a threshold of a Participant's (80) efficient. In various non-limiting embodiments, the IPACE system would preferably track, analyze, and report a member's ideal efficiencies of performance. In addition, the IPACE system would preferably analyze for any relative similarities in members, say data on a senior technical Draftsperson (54) that compares that of a similar younger technical Draftsperson (54) to suggest and/or determine that it is better that this younger technical Draftsperson (54) contribute only flowcharts for several projects versus doing all the figures for a particular project or vice versa, based upon historical correlations.

TIMES"Timing Information Module for Events and Scheduling" (116) module.

Figure 27:
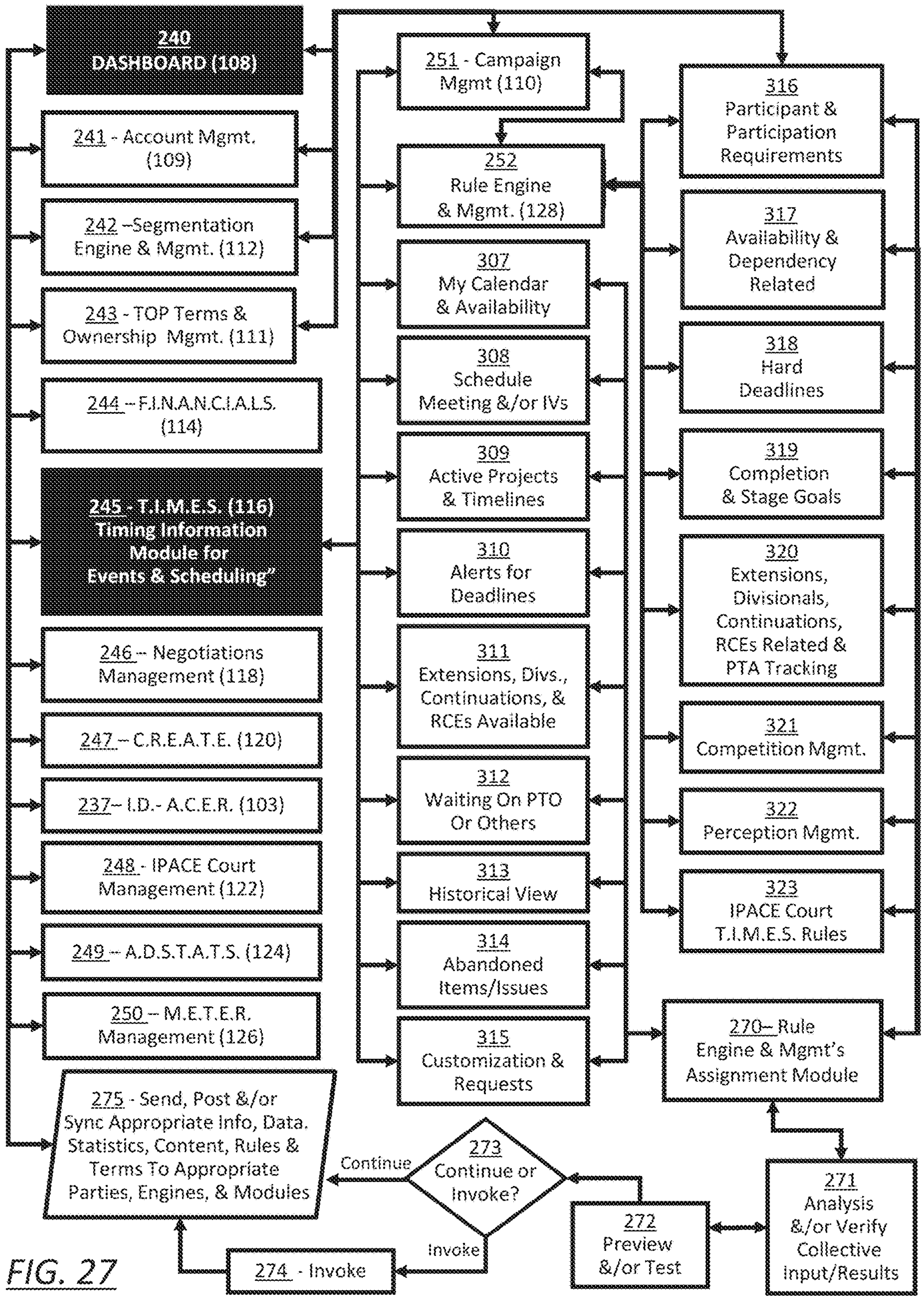
FIG. 27 is a block diagram with some flow charting steps depicting a non-limiting embodiment of the IPACE member's functionality from the TIMES ("Timing Information Module for Events and Scheduling") (116) module.

FIG. 27 is a block diagram with some flow charting steps depicting an embodiment of the IPACE member's functionality from the TIMES ("Timing Information Module for Events and Scheduling") (116) module. Starting with the Dashboard (108) in the block 240, where similar to the TOP Terms and Ownership Management Figure, the IPACE system “Displays Options Per the Member’s Role, Permissions, and Applicable Terms and Rules” and will also invoke (if not already) “Generate, Save, Synchronize and Track All States, Intervals, Iterations, Data, Statistics, Perceptions, and Input per Timestamp, Rules and Terms With Associated IDs (e.g. Member, Project, etc.).”

In various non-limiting embodiments, the user of the TIMES Management has to have a role and/or at least equivalent to the same permissions required to be a “T.I.M.E.S. Mgr,” hereinafter a “TIMES Mgr.” In various non-limiting embodiments, the TIMES Mgr. utilizes the TIMES to view, review, create, and/or modify criteria requirements or rules generally related to time and/or for a particular Project or Project element to be used in, say a particular P.A.C. 104 and/or a particular P.I.N. 106. For example, and among many other options, the TIMES Mgr 52 may uses the TIMES module to coordinate the collective calendars of the Participants (80) to schedule any face-to-face, phone conversation, and/or live event, such as a webcam-live interview.

In various non-limiting embodiments, the Dashboard functionality in this “TIMES Management” focused embodiment comprises of the “Account Management” (109) module in a block 241, the “Segmentation Engine and Management” (112) module in a block 242, the “TOP Terms and Ownership Management” (111) module in a block 243, the “F.I.N.A.N.C.I.A.L.S. (Financials and Interests, Negotiations, Accounting, Notices, Contracts, Insurance, Legal and Securities—Mgmt)” (114) module in a block 244, the “T.I.M.E.S.” (116) module in a block 245, the “Negotiations Management” (118) module in a block 246, the “CREATE” (120) module in a block 247, the “IPACE Court Management” (122) module in a block 248, the “ADSTATS” (124) module in a block 249, the “METER Management” (126) (including Knowledge Management) module in a block 250, the “Campaign Management (110) (e.g. Project Management)” (110) module in a block 251, and the “Rule Engine and Mgmt.’s Assignment Module” (128) in a block 270.

From the block 245, the “TIMES Management” functionality in this limited example embodiment is geared more towards the IPSocket functionality and comprises of a “My Calendar and Availability” module in a block 307, a “Schedule Meetings and/or Interviews (IVs)” module in a block 308, an “Active Projects and Timelines” module in a block 309, an “Alerts for Deadlines” module in a block 310, an “Extensions, Divisionals, Continuations, and RCEs Available” module in a block 311, a “Waiting on PTO or Others” module in a block 312, a “Historical View” module in a block 313, an “Abandoned Items/Issues” module in a block 314, and a “Customization and Requests” management module in a block 315.

In various non-limiting embodiments, the “My Calendar and Availability” module in block 307, in general, allows the IPACE member the functionality to manage his/her calendar and availability in association with the IPACE Operating Environment. For example, the “My Calendar and Availability” module could specifically track, analyze, and generate reports regarding the known and/or perceived obligations, tasks, activities, and the like that have been accepted, and schedule along with those known and/or perceived obligations, tasks, activities, and the like that need to be scheduled, to build a calendar of availability and possible issues, such as known and/or perceived time conflicts, overlaps, bottlenecks, relatively heavy workloads, and/or the like for the IPACE member; and per say, a project, per a time period, per an IPACE Account (60), per a Joint-Inventor/Co-Inventor (41), per a segment, and/or the like, or overall.

In various non-limiting embodiments, the IPACE system may also track perceived areas of why, when, and where time is not being utilized relatively well, when compared to other IPACE members with relatively the same project or workloads, relatively same type of projects, relatively same time conflicts, relatively same overlaps, relatively same bottlenecks and/or the like, to relatively try and improve the IPACE member’s productivity, relative successfulness and the like. Other IPACE members seeking Participants (80) may incorporate rules limiting potential participants with certain rules and thresholds regarding availability and/or past performance.

In various non-limiting embodiments, the “Schedule Meetings and/or Interviews (IVs)” module in block 308, in general, allows the IPACE member the functionality to manage his/her scheduling for such things as meetings and/or interviews in association with the IPACE Operating Environment. For example, the “Schedule Meetings and/or Interviews (IVs)“ ” module could specifically track, analyze, and generate periods of availability for meetings with others, where those times could be conditionally made available to others for suggesting meetings and/or locking-in meeting times, say depending on who the other parties are, the compensation for the time, and/or the like.

For instance, the IPACE system could also automatically create interviews with parties who are potential participants, existing Participants (80), existing Contributors (50), potential Joint-Inventor/Co-Inventors, existing Joint-Inventor/Co-Inventors (41) and/or the like. In various non-limiting embodiments, the agenda could be made available in advance and both parties may need to conditionally accept the meeting time and agenda, say at least 24 hours prior to taking place and where perhaps there are a series of consequences for appearing late, not appearing at all, and/or for failing to present anticipated agenda material, say reduced compensation, reduced equity, reduced status, reduced status points, and/or the like, if the offending party fails to remedy in a conditional period of time.

Reports may be generated and analyzed regarding these scheduled events that have been accepted to analyze, generate and track, say a produced relative successful outcome, a produced relative successful relationship, a produced relative successful project material, a produced relative misunderstanding and/or communication problem, a produced relative delay or bottleneck, a failure to produce a project material, a failure to meet a deadline goal, a failure to meet a hard deadline, and/or the like; say per other IPACE members, projects, relatively comparable time periods, IPACE Accounts (60), Joint-Inventor/Co-Inventors (41), per segments, and/or the like, or overall. Each calculated and perceived metric could be setup for expert participation in the calculations, for review and/or appeals to other IPACE members, Peers (65), Experts (75), IPACE Court bodies, and/or the like; each independently, collectively, and/or per each potential permutation combination thereof, agreed calculations and/or reporting terms.

In various non-limiting embodiments, the IPACE system automatically, systematically, continuously, persistently, conditionally, and/or via/per actor/user-prompt tracks, analyzes and scores relationships, correlations, links, associations, timing, and/or the like. For example, the relational links in a document to build out contact lists, when each relationship is known to have, discerned to have, and/or relatively perceived to have initiated (e.g. first met Jan. 11, 2010), how (e.g. at an event), where (e.g. CES® in Las Vegas), potential relationships with other parties (e.g. met via Mark Skaist), and/or the like.

In various non-limiting embodiments, the IPACE system can automatically, systematically, continuously, persistently, conditionally, and/or via/per actor/user-prompt generates a data/content correlation map. In various non-limiting embodiments, the data/content correlation map is generated incorporating and/or per segments for data, emails, contact lists, calendars, RSS, blogs/comments, social networks (e.g. Facebook®, LinkedIn®, Twitter®, and/or the like), and/or the like. In various non-limiting embodiments, the data/content correlation map generated incorporates and/or includes segments for known relational data points, as well as discern or relatively perceived data points.

For example, a system analysis of emails and email timestamps may help determine when two parties appear to have first met, say by such language as "it was nice to meet you" and/or any other associations, such as the first date/time an email from the other party appeared in the email history, when the other party's email address was placed in the contact manager, when the other party was sent a LinkedIn invite, and any other correlated data/content (e.g. related introductions, project start dates, phone call history, supplies ordered date, project folder creation dates, and/or the like).

In various non-limiting embodiments, the IPACE system automatically, systematically, continuously, persistently, conditionally, and/or via/per actor/user-prompt generates a list of relationships, where the list can be displayed according to a relationship cloud, company cloud, project cloud, selected-word cloud, tag cloud, hierarchy, timeline, and/or like.

Designate Vacation Time

In various non-limiting embodiments, the IPACE system would preferably track and analyze a plurality of calendars, schedules, projects, and/or the like; to suggest time windows for a variety of activities. In various non-limiting embodiments, the IPACE system would preferably track and analyze actor-stated, ascertained, discerned, and/or perceived calendars to generate a list of relative likelihood of communicating, connecting, and/or the like. In various non-limiting embodiments, the variety of activities may comprise an email, face-to-face interview, a telephonic interview, an online interview, a vacation, a telephonic conversation, and/or the like.

In various non-limiting embodiments, the IPACE system would preferably collect user inputs, patterns, updates, and/or the like to improve the analysis of what is actor-stated, ascertained, discerned, and/or perceived; where the IPACE system may also seek information and/or communication with a particular participant, party, entity, and/or the like. In various non-limiting embodiments, the IPACE system attempted communication with the particular participant, party, entity, and/or the like; may ask for an acknowledgment, challenge, question, and/or the like to what is stated, actor-stated, ascertained, discerned, relatively perceived, and/or predicted. In various non-limiting embodiments, the IPACE system attempted communication with the particular participant, party, entity, and/or the like; may simply track and/or monitor for a connection, successfully sent email to a particular email address, and/or the likelihood of a response relative to the data/content, time, sender, and/or the like.

In various non-limiting embodiments, the IPACE system tracking and analysis to suggest a particular time window for a particular telephonic interview would also be tracked regarding who responded what, when, and/or the like to score each for a relative promptness, relatively cordial, relatively respectful, relatively professional, relatively concise, relative unambiguous, and/or the like.

Relative Lack of Availability

In various non-limiting embodiments, the IPACE system tracking and analysis to suggest a particular time window for a particular participant to take a vacation, say based upon other participants relative lack of availability relative to other opportunities within a window of time (e.g. a year), historical patterns, and/or the like. In addition, the relative lack of availability may also track and/or incorporate a stated, actor-stated, ascertained, discerned, relatively perceived, and/or predicted patterns, data, statistics, and/or the like. For example, the analysis of stated, actor-stated, ascertained, discerned, relatively perceived, and/or predicted work a particular participant is engaged in historically at this time each month, each year, currently, and/or projected; where correlated word may be tracked through such data and data/content as the USPTO PAIR database where examiner office actions are signed, dated, and public.

Specifically Requests A Vacation Window

In various non-limiting embodiments, a particular participant may specifically request a window of time for an activity (e.g. an interview), a vacation, and/or the like, where the IPACE system may analyze the specifically requested time window for a perceived relative likelihood of success, per participant, per goal, and/or offer alternatives/suggestions based upon the analysis. In various non-limiting embodiments, the particular participant specifically requests a vacation window of time, say, sixty (60) days in advance and, preferably, no communications during.

In various non-limiting embodiments, the IPACE system tracking and analysis would preferably require any communication occur at least X days in advance (say at least thirty (30) days in advance), where a PTO examiner would be required to submit any OA at least thirty (30) days in advance or hold any OA until after the designated vacation was completed. In various non-limiting embodiments, the vacation could not exceed V days, say twenty (25) days and other conditions, say earned or paid for, or by experience.

In various non-limiting embodiments, the "Active Projects and Timelines" module in block 309, in general, allows the IPACE member the functionality to manage his/her active participation in any activity, obligations, related-elements and/or contribution with an active timeline in association with the IPACE Operating Environment. For example, the "Active Projects and Timelines" module could specifically track, analyze, and generate reports and alerts regarding the status and obligations due per project participant; per say, a project, per a time period, per an IPACE Account (60), per a Joint-Inventor/Co-Inventor (41), per a segment, and/or the like; each independently, collectively, overall, and/or per each potential permutation combination thereof.

For instance, the IPACE system could analyze and generate a report regarding the relative amount of time that is perceived to be required to finish a particular stage, say filing an application versus during the prosecution phase. In various non-limiting embodiments, the IPACE system could download data/statistics from other sources, such as the USPTO, EPO, WIPO, JPO, CIPO, CPO, and the like, to track the specific progress, requirements, and/or deadlines of the projects involving obligations and track the perceived obligations of the specific IPACE member and those perceived to be the obligations or shared obligations of others; also automatically create interviews with parties who are potential participants, existing Participants (80), existing Contributors (50), potential Joint-Inventor/Co-Inventors, existing Joint-Inventor/Co-Inventors (41) and/or the like. In various non-limiting embodiments, the agenda could be made available in advance and both parties may need to conditionally accept the meeting time and agenda, say at least 24 hours prior to taking place and where perhaps there are a series of consequences for appearing late, not appearing at all, and/or for failing to present anticipated agenda material, say reduced compensation, reduced equity, reduced status, reduced status points, and/or the like, if the offending party fails to remedy in a conditional period of time. Reports may be generated and analyzed regarding these scheduled events that have been accepted to track, say a produced relative successful outcome, a produced relative successful relationship, a produced relative successful project material, a produced relative misunderstanding and/or communication problem, a produced relative delay or bottleneck, a failure to produce a project material, a failure to meet a deadline goal, a failure to meet a hard deadline, and/or the like; say per other IPAC E members, projects, relatively comparable time periods, IPACE Accounts (60), Joint-Inventor/Co-Inventors (41), per segments, and/or the like, or overall.

In various non-limiting embodiments, the "Alerts for Deadlines" module in block 310, in general, allows the IPACE member the functionality to manage his/her active participation in any activity, obligations, related-elements and/or contribution with an active timeline and deadline in association with the IPACE Operating Environment. In addition, he/she could setup monitors for other alerts and deadlines, whether actively participating or not, whether involving an IPACE member or not. For example, the "Alerts for Deadlines" module could specifically track, analyze, and generate reports and alerts regarding the status of a particular patent application where the IPACE member is or is not a participant.

For instance, the IPACE system could analyze and generate a report regarding the relative amount of time that is perceived to have been consumed to date per patent application and/or per stage. For example, the IPACE system could collect data/statistics regarding all PTO communications per application, and per event, say for: any PTO notices of non-compliant application for a particular patent application, any Applicant replies to a notice of non-compliance, a PTO's initial search, any requests from the Applicant (or his/her representative) for a first interview prior to an office action, any PTO Examiner's (66) replies to the request for the first interview prior to the first office action, any phone interview communications and related, any live interview communications and related, any PTO examiner (66) restriction notices, any Applicant's restriction notice replies (per claim), any PTO examiner's (66) First Office Action on the Merits (FOAM), any declarations (1.130, 1.131, 1.132 and the like) replies from the Applicant, any other Applicant office action replies/communications (per rejection type and per claim), any PTO examiner (66) reaction/decision regarding the Applicant's declarations (1.130, 1.131, 1.132 and the like), any Applicant non-final office action replies (per rejection type and per claim), any PTO examiner's (66) non-final office actions (per rejection type and per claim), any Applicant non-final office action replies (per rejection type and per claim), any Applicant Requests for Continuing Examination (RCEs), any PTO examiner's (66) final office actions (per rejection type per claim), any Applicant final office action replies (per rejection type), any amendments from the Applicant, any PTO examiner (66) reaction/decision regarding the Applicant's replies to the office actions and the like, any Motions to Appeal from the Applicant, any pie-appeal-brief requests from the Applicant, any PTO pre-appeal brief reactions/decisions, any Appeal Briefs from the Applicant, any PTO Appeal Motion/Brief/Case reactions/decisions, any petitions (per type) from the Applicant, any PTO petition reactions/decisions (per type), any PTO notice of allowance, any Applicant requests for Patent Term Adjustment, any PTO Patent Term Adjustment reactions/decisions, and/or the like.

In various non-limiting embodiments, the associated and collected data/statistics may be relatively compared to other historical data/statistics from, say past patent applications, granted, denied, pending, and/or the like, within a relatively similar period of time, within a relatively similar PTO classification (e.g. art unit), with a relatively similar rejection, with a relatively similar budget, with a relatively similar reference piece of prior art referenced/cited, with a relatively similar inventor (group), with a relatively similar group of Participants (80), and/or the like; each independently, collectively, overall, and/or per each potential permutation combination thereof.

Further, where the associated data/statistics may be relatively compared to existing patent applications, and/or stages for generating and improving such things as IPACE perceived timeframes and likelihoods of successfulness per each known and/or each perceived data field, statistic, element, segment, and/or attribute involved, such as time, budgets, fees, a party's assigned PTO classification (e.g. art unit), examiner (66), countries, attorneys, rejection types, prior art cited, a particular company and/or applicant with each referenced piece of art's owner (and/or inventor), with each company and/or applicant asserting against the referenced piece of art, each company and/or applicant amending around the referenced art, each law firms, Patent Attorney (44), Patent Agent (45), and the like involved, and any IPACE member relatively known to be involved, perceived to be involved, and perceived to be attributable to what, when, where, how, why, and the like.

In various non-limiting embodiments, the IPACE system could utilize the associated and collected data/statistics to analyze and generate alerts where data/statistics suggest historical issues in regard to a likely concern, bottleneck, delay, additional cost, extension fees, legal fees, potential lost monetization/revenue and/or protection. In addition, such as correlative data/statistics as the likelihood to finish a particular stage, say filing an application on time, get a particular claim granted within X days of the prosecution phase. In various non-limiting embodiments, the IPACE system could also download rules and changing procedures, evolving trends (cost, delays, time required) from other sources, such as the USPTO, EPO, WIPO, JPO, CIPO, CPO, and the like, to track the specific progress, requirements, and/or deadlines of the projects involving obligations and track the perceived obligations of the specific IPACE member and those perceived to be the obligations or shared obligations of others.)

Reports may be generated and analyzed regarding these alerts, the usage of the alerts and the data/statistics, the relative effectiveness of the data/statistics and the alerts that have been reviewed, and where subsequent modification may be attributably measured and track, to produce say a relatively more successful outcome, a relatively more successful relationship, a relatively more successful project material, a relatively improvement in communications, a relatively faster result, a relatively superior patent or patent claim, a relatively superior timed accomplishment deadline or goal, and/or the like; say per other IPACE member, other projects, when relatively comparable to the previously perceived events and outcomes for the same particular events and outcomes; when relatively compared to the actualized events and outcomes for the same particular events and outcomes; when relatively compared to the previously perceived events, outcomes, and/or modifications, of similar events, outcomes and/or modifications; when relatively compared to the actualized events, outcomes and/or modifications, of similar events, outcomes, and/or modifications; and/or the like; each independently, collectively, overall, and/or per each potential permutation combination thereof. In addition, where the events, outcomes, and/or modifications may be segmented further, per say a time period, IPACE Account (60), inventor, participant, project, event, obligation, competitions, perception, substitution, IPACE court decision, and/or the like; each independently, collectively, overall, and/or per each potential permutation combination thereof.

In various non-limiting embodiments, the "Extensions, Divisionals, Continuations, and RCEs Available" module in block 311, in general, allows the IPACE member the functionality to manage his/her and/or an Account's (60) availability to somehow extend a deadline and/or obligation in association with the IPACE Operating Environment and/or an associated filing office, such as the USPTO. For example, the "Extensions, Divisionals, Continuations, and RCEs Available" module could specifically track, analyze, and generate reports regarding each option available per application with any associated forms required, fees, and anticipated and/or perceived costs, times, gaps in current participation expertise to meet the requirements.

For instance, the IPACE system could analyze and generate a report outlining a plurality of "perceived route options and predicted outcomes" on a particular application, where those options for a particular IPACE member, say the Lead Inventor (40), could include for example: A "perceived route option and predicted outcome A," where the IPACE system calculates, analyzes, and perceives that for —$700 in relatively short term costs (e.g. compared to another cost stage/delineation, the long term, overall, and/or the like) and four (4) hours of the Lead Inventor's (40) relative immediate time (e.g. compared to another time stage/delineation, the long term, overall, and/or the like) to review and discuss with the existing Patent Attorney (44) (e.g. the Patent Attorney (44) of record), he/she could likely file an office action response within 60 days amending around the 102 cited rejection, where —$50 is for miscellaneous costs, —$650 of the —$700 is allocated for the same Patent Attorney (44) "A" who originally prepared and filed application claims, to produce the claim amendment and office action response, where the four (4) hours of the Lead Inventor's (40) time is based upon, twenty minutes to read office action, forty minutes to initially discuss with new Patent Attorney (44) "A" before he/she initiates his/her work product, another hour to review first draft of Patent Attorney (44) "A" and his strategy/amendments, another hour to discuss final draft to submit to PTO, and another hour for miscellaneous needs (e.g. PTO paperwork);

Another perceived route option and predicted outcome "B," where the IPACE system calculates and perceives that for —$1550 in relatively short term costs (e.g. compared to another cost stage, the long term, overall, and/or the like) and twelve (12) hours of the Lead Inventor's (40) relative immediate time (e.g. compared to another time stage/delineation, the long term, overall, and/or the like) to review and discuss with a new Patent Attorney (44)), he/she could likely file an office action response within 120 days with relatively less amending around the 102 cited rejection, where —$50 is for miscellaneous costs, —$300 of the —$1550 is file for an extension in time, —$1200 of the —$1550 is allocated for a different Patent Attorney (44) "B" than the Patent Attorney (44) "A" who originally prepared and filed the application claims, and where Patent Attorney (44) "B" files the office action response. In addition, where the twelve (12) hours of the Lead Inventor's (40) time is based upon 1 hour to read office action, 4 hours is to read referenced art, 3 hours to compare examiner's (66) cited claim references with applicant's (e.g. Lead Inventor) invention/application and claims, 1 hour to discuss with patent attorney (44) could be based upon an event before initiating work product, another hour to review first draft of Patent Attorney (44), another hour to discuss final draft to submit to PTO, and another hour for miscellaneous needs (e.g. PTO paperwork).

In various non-limiting embodiments, the IPACE system would preferably have sufficient data/statistics, Peer (65)/expert feedback, and metrics to relatively compare and analyze Patent Attorney (44) "A" and "B" and generate perceptions relative to who is more likely to produce superior claims with, say relatively less amendments, and produce a relatively more valued patent and/or patent claims, where comparisons are based upon tracked data/statistics of historical data/statistics, perceptions (e.g. IP-VP), valuations, and/or eventual monetization of claims prosecuted and granted under each Patent Attorney (44). In various non-limiting embodiments, the IPACE system could collect data, statistics, Peer (65)/expert feedback, and metrics beyond projects preformed entirely within the IPACE system. For example, the historical data/statistics and perception generated and analyzed from other databases, such as the PTO, PTO PAIR, and the like.

Another perceived route option and predicted outcome "C" where the IPACE system calculates and perceives that for —$1000 in relatively short term costs (e.g. compared to another cost stage/delineation, the long term, overall, and/or the like) and (2) hours of the Lead Inventor's (40) relative immediate time (e.g. compared to another time stage/delineation, the long term, overall, and/or the like) to review and discuss with Patent Attorney (44) "A," he/she could likely file a continuation with the similar or amended claims, instead of an office action response within 30 days, where —$50 is for miscellaneous costs, —$650 of the —$1000 is allocated PTO filing fees, and —$300 of the —$1000 for Patent Attorney (44) "A" to analyze and generate the needed materials and timely file the continuation with the PTO via the EFS. And where the (2) hours of the Lead Inventor's (40) time is based upon twenty minutes to read office action, forty minutes to initially discuss with Patent Attorney (44) "A" before he/she initiates his/her work product, another hour to review the continuation to be filed by Patent Attorney (44) "A."

In various non-limiting embodiments, the above perceived route options and predicted outcomes examples "A, B, C," are only a small fraction of examples that could be presented. Other perceived route options and predicted outcomes could include splitting a particular perceived route option and predicted outcome into steps, where a series of dependent steps could each analyze and generate a series of perceived route options and predicted outcomes. While other perceived route-options and predicted outcomes could include splitting a particular perceived route option and predicted outcome into alternative steps, where each alternative generates a new dependent step and potentially other perceived route options and predicted outcomes.

For example, another perceived route option and predicted outcome "D" could include a subsequent option D1 where the Lead Inventor (40) may file a divisional where he/she files all the restricted claims in the divisional; alternative subsequent option D2 where the Lead Inventor (40) could instead file a continuation (including the restricted claims). Furthermore, both of these alternative subsequent options D1 and D2 could have a range of other options, such as based upon events, such as (1) within 30 days, (2) within 120 days, and/or (3) within 60 days of whenever the parent goes final. In various non-limiting embodiments, the perceived route options and predicted outcomes may allow for input along the way to incorporate IPACE data/statistics, perception, PTO data/statistics, Peer (65) perceptions/opinions/input, Expert perceptions/opinions/input, the Lead Inventor's (40) perceptions/opinions/input, and/the like. For instance, both of the alternative subsequent options D1 and D2, may be based upon an event, such as (1) any reasonably anticipated notice of allowance on the parent by the Patent Attorney (44) of record conditionally surpasses a threshold, (2) any reasonably anticipated notice of allowance on the parent by historical data/statistics in IPACE from the PTO conditionally surpasses a threshold, and/or (3) where a group of IPACE members (e.g. qualified Experts (75)) anticipation a notice of allowance of some parent claims conditionally surpasses a threshold. Further, the Lead Inventor (40) could instead override, modify, and/or abandon a current pathway for a selected perceived route option and predicted outcome, where the IPACE system could collect data/statistics similar to an abandon ecommerce shopping cart regarding the likelihood of why, and the relative ramifications towards the positive, negative, indifferent, and/or the like when compared to the predictions, the actualized events, values, costs, time, and/or the like.

In various non-limiting embodiments, the IPACE system would track the actual course of action(s) and the relative data, statistics, perceptions, predictions, per party at the time and actualized to improve current and future perceived route options, predictions, accuracy, and data/statistics, per each party, data element, statistics, attribute, and/or rule involved. For example, the IPACE system could collect data/statistics that builds correlations towards particular IPACE members. For instance, the relative immediate time spent by a particular Lead Inventor (40) for reviewing a piece of art referenced by the PTO examiner (66) may turn out to be relatively low when compared to the relative immediate time actually spent by the Lead Inventor (40) and the relative immediate time allocated in a particular perceived route option and predicted outcome. In various non-limiting embodiments, the IPACE system may collect data/statistics and metrics to try and ascertain why the difference and/or ask the Lead Inventor (40) to share his/her reasons/comments and/or the like.

It may be that a misperception by the IPACE system, where, for example, the true time spent was actually relatively close to the particular perceived route option and predicted outcome, and the IPACE member failed to track, mark, and/or input his/her actual time spent. In various non-limiting embodiments, the IPACE system could be setup to allow the Lead Inventor (40) to make real-time changes, and/or suggest data/statistics corrections. On the other hand, a significant difference in, say the relative immediate time spent by a particular Lead Inventor (40) may be accurate, and due to such contributing factors as that particular Lead Inventor's (40) desire to read the referenced material more than once, he/she could have a number of Joint-Inventor/Co-Inventors (41) who contributed to the application where this particular Lead Inventor (40) is not totally up to speed on all those contributed materials, and/or he/she may be a faster or slower reader when relatively compared to others.

In various non-limiting embodiments, preferably the calculations of the perceived route option and predicted outcomes would incorporate a vast variety of data, statistics, metrics, and rules; such as the relative size of the office action, in terms of claims pending, rejected, previously amended, the relative amount of prior art referenced, referenced for the first time (e.g. or second time, etc.) the relative complexity of the PTO art unit compared to other adjacent and non-adjacent PTO art units, the relative complexity of each cited art reference, and/or the like. In various non-limiting embodiments, the relative complexity of each cited art reference could, for example, be measured in terms of number of pages, the number of figures, the number of times previously cited by the same examiner (66) and/or by the PTO in general on other applications, the relative uniqueness of the terminology utilized when compared to the PTO art unit, the relative uniqueness of the terminology utilized when compared to the Lead Inventor's (40) application/specification, the relative uniqueness of the terminology utilized when compared to the Lead Inventor's (40) application claims, and/or the like.

Further, the IPACE system analyze each perceived route option and predicted outcome and could include how that particular option could affect the current, and future costs, time, efforts, and value of the particular patent, the particular patent claims, and/or any related claims. For example, one particular perceived route option and predicted outcome could be relatively less expensive in terms of relative short term cost and take relatively less of the Lead Inventor's (40) relative immediate time, but could ultimately be relatively far more expensive overall, cause the application to take relatively much longer to grant any claims, cause the overall value to be relatively lower, and/or the like, when relatively compared to the perceived route options and predicted outcomes.

In various non-limiting embodiments, the IPACE system could reveal perceptions utilized in the calculations for the parties to accept, reject, partially counter, conditionally counter, fully counter, comment, appeal, and/or the like. For example, the IPACE system could put forth that since the Patent Attorney (44) of record is perceived to be no longer available to work on the pending applications, the calculations have incorporated an additional minimum of three weeks of calendar time to locate a Patent Attorney (44) replacement, another week of calendar time to bring up to speed, and approximately twenty-five (25) hours of the Lead Inventor's (40) time to accomplish. If the Lead Inventor (40) accomplishes this Patent Attorney (44) replacement sooner and with a relatively comparable Patent Attorney (44), in terms of perceived competence, relevant experience, previous relevant success, availability, and/or the like, then the IPACE system with make adjustments accordingly. If, however, the Patent Attorney (44) replacement is perceived to be less competent, less experienced with the relevant materials, previously less successful with the relevant materials, less available, and/or the like, then the IPACE system with make adjustments accordingly. In various non-limiting embodiments, the IPACE member may accept, reject, partially counter, conditionally counter, fully counter, comment, appeal, and/or the like these calculations. If the IPACE system does not, in turn, incorporate any of the IPACE member's requested adjustment, he/she may incorporate his/her own calculation adjustments that analyze and generate an IPACE member's amended calculation that may also be tracked, generated and analyzed alongside the IPACE perceptions. In various non-limiting embodiments, these differences in perceptions may also be tracked and compared towards which was relatively more accurate for improving future perceptions, for reminders, and/or making suggestions, and/or the like; per say, a project, per a time period, per an IPACE Account (60), per an application, per a participant, per a segment, and/or the like, or overall.

In various non-limiting embodiments, the "Waiting on PTO or Others" module in block 312, in general, allows the IPACE member the functionality to manage his/her and/or an Account's (60) data, statistics, projects, obligations, terms, attributes, elements, and like that are dependent and/or waiting on another party (e.g. the PTO, another project participant/Contributor (50), the IPACE Court, and the like) input, obligation, decision, perception, reaction, acceptance, rejection, feedback, counter, prediction, fees, reward, and/or the like in association with the IPACE Operating Environment and/or the other databases, such as the PTO. For example, the "Waiting on PTO or Others" module could specifically track, analyze, and generate reports regarding pending patent application claims in terms of those that are still original and pending in a particular current application, office action response, and/or the like, those claims that have been previously allowed, restricted, amended, currently allowed, restricted, amended, whether pending in a particular current application, office action response, petition, appeal, appeal brief, PTO, Patent Office in another country, IPACE court, and/or the like.

In various non-limiting embodiments, the "Waiting on PTO or Others" data/statistics could incorporate comparative data/statistics to create anticipated responses, response times, associated costs, associated obligations created, associated time requirements created and/or the like; for the materials, elements, costs, claims, Participants (80), and the parties involved, where the IPACE system would track the predictions and compare the actualized time, to improve current and future options, predictions, and the like. In various non-limiting embodiments, the "Waiting on PTO or Others" data/statistics would analyze and generate comparative data/statistics as to what particular parties (e.g. IPACE members, PTO employees (73/73*a*), others) are relatively more often than others to be a party that others are waiting on when compared to other parties who, for instance, do measurably and relatively similar work, with measurably and relatively similar responsibilities, with measurably and relatively similar experience, with measurably and relatively similar workloads, with measurably and relatively similar projects, for measurably and relatively similar compensation, and/or the like; each independently, collectively, overall, and/or per each potential permutation combination thereof.

In various non-limiting embodiments, the IPACE system would track the actual delay(s) and the relative data, statistics, perceptions, and predictions per party at the time and actualized to improve current and future perceived route options, predictions, accuracy, and data/statistics, per each party, data element, attribute, and/or rule involved. For example, the IPACE system could collect data/statistics that builds correlations towards particular IPACE members, where, for instance, the anticipated wait time spent for a particular PTO examiner (66) to answer a particular office action response may turn out to be relatively short when compared to the wait time actually spent. In various non-limiting embodiments, the IPACE system may collect data/statistics and metrics to try and ascertain why the difference and/or ask project Participants (80) (e.g. the Lead Inventor (40) or the Patent Attorney (44) of record) to share his/her reasons/comments and/or the like. In various non-limiting embodiments, the IPACE system could even attempt to collect data/statistics and/or a response from the particular PTO examiner (66), his supervisor and/or the like through an independent phone interview, an independent survey, or via the Applicant with a suggested phone conversation, survey/questions, preferably with some type of normalized questions for creating relative comparisons.

In various non-limiting embodiments, there may be a misperception by the IPACE system, where, for example, the true wait time spent was actually relatively closer to the anticipated wait time, but perhaps a particular IPACE member (e.g. Project Manager (43), Lead Inventor (40), Patent Attorney (44), or the like) failed to track, mark, and/or input his/her actual wait time. In various non-limiting embodiments, the IPACE system could be setup to allow the appropriate IPACE members and/or other parties to make real-time changes, and/or suggest data/statistics corrections. On the other hand, a significant difference in, say the wait time for a particular PTO examiner (66) may be accurate, and due to such contributing factors as that particular PTO Examiner (66) has taken over the file wrapper (or similar) for someone else who has left the PTO, because the PTO Examiner (66) is also working on other applications by the same Inventor, someone was on vacation, and/or he/she may be faster or slower when replying relatively compared to others at the PTO.

In various non-limiting embodiments, preferably the calculations of anticipated wait times would incorporate a vast variety of data, statistics, metrics, and rules; such as the relative size of the patent application, in terms of the number of claims pending, rejected, previously amended, the relative amount of prior art referenced, referenced for the first time (e.g. or second time, etc.), the relative complexity of the PTO classification (e.g. art unit) compared to other adjacent and non-adjacent PTO classifications (e.g. art units), the relative complexity of each cited art reference, and/or the like. In various non-limiting embodiments, the relative complexity of each cited art reference could, for example, be measured in terms of the number of pages, the number of figures, the number of times previously cited by the same PTO examiner (66) and/or by the PTO in general on other applications, the relative uniqueness of the terminology utilized when compared to the PTO classification (e.g. art unit), the relative uniqueness of the terminology utilized when compared to the Lead Inventor's (40) application/specification, the relative uniqueness of the terminology utilized when compared to the Lead Inventor's (40) application claims, and/or the like.

In various non-limiting embodiments, the "Waiting on PTO or Others" data/statistics could incorporate comparative data/statistics to create anticipated and actualized wait times for other parties, such as project Participants (80), such as a particular Draftsperson (54), a particular Patent Attorney (44), a particular patent application translator, a particular patent application reviewer, and/or the like, where the tracked parties could incorporate feedback regarding the anticipated and actualized wait times. For example, the IPACE system could give credit and/or additional compensation towards those IPACE Participants (80) who conditionally and relatively successfully beat the anticipated wait times, without relatively harming the perceived value of the work product, the future value of the IP/claims (e.g. IP-VP), and the like.

In addition, the IPACE system could give credit and/or additional compensation towards those IPACE Participants (80) who conditionally update the anticipated wait times to reflect a more realistic wait time anticipated by the particular party/parties involved, and/or by others. Here the IPACE system could give credit and/or additional compensation based upon such factors as how promptly was the anticipated wait time adjusted in light of new information, how far in advance was the anticipated wait time adjusted, how accurately was the adjustment, by who, how often was it adjusted before this particular adjustment, how often has it been adjusted subsequently, and/or the like; without relatively harming the perceived value of the work product, future value of the IP/claims, and the like.

Portal Availability Tracking

In various non-limiting embodiments, the IPACE system would preferably track and analyze specifically when and for relatively how often a list of portals, efiling systems, websites, URLs, databases, FTPs, and/or the like (e.g. the USPTO, the PAIR, EFS, and/or the like) are perceived inaccessible, down for accepting payments, and/or the like. In addition, where IPACE system tracking and analysis could produce and display a score and ranking that helps signify, relative quantify and/or relatively qualify to an existing user, potential new user, and/or the like, how reliable the site is, may be, and/or the like. For example, data and analysis could include how often and when the site is down.

For example, if a particular member/user works relatively long hours and where he/she is typically limited to late hours to pay his/her bills, say after 2 am on Saturday night, then he/she may find that a particular online bank or vendor is relatively often down or doing system maintenance when compared to competitors and/or other options that may be available. Further, the IPACE system would preferably generate and display a list of other options perceived available and/or capable to accomplish the same and/or a similar goal.

For example, the list of other options may include another online bank that may allow for a similar transaction, but may limit the dollar amount, charge a different fee, during different hours, and/or the like. In another example, the list of other options may suggest a different vendor for the same or a relatively similar product, service, and/or the like, along with a list of terms perceived to be relatively the same, better, worse, and/or the like, based upon user inputs, patterns, shopping history, current online efforts (e.g. buying a car online), and/or the like. The list of other options could even suggest a different product, where the different product may include a score and rank for a relative lack of anticipated online payment reliability, a measurable complaint score, and/or actual frustrations/feedback collected, and/or the like.

In various non-limiting embodiments, the IPACE system would preferably track a user's behavior, preferences, budgets, and/or the like. For example, the user's routine for receiving a direct deposit and subsequently paying all the user's bills at a relatively same time at a particular day each month. If the a particular user is relatively frequently faced with a particular online vendor site being down during this particular day/time, the IPACE system may track and make suggestions accordingly, where the particular user may counter with reasons why a particular alternative definitely won't work, likely won't work, likely will work, and/or the like. This collected data benefits this user and similar user in subsequent suggestions. In addition to the reasons why or why not a particular alternative will work, the users may submit comments, where the comments may also be automatically, conditionally, and/or selectively shared with others, analyzed, and/or generate other relevant data points for correlations, patterns, and/or the like. The comments and data may include a perceived and/or user-selected relatively level of frustration, stress, time wasted, and/or the like. Further, data and comments regarding any late payment fee, bad credit, and/or like, caused by a particular vendor, where the IPACE system may score the relative reliability of the data.

In addition, the IPACE system would preferably notify the user when a particular alternative website, vendor, product, service, and/or the like, is perceived to have been discovered. Further, the IPACE system may be setup to automatically, systematically, continuously, persistently, conditionally, and/or via/per actor/user-prompt notify the user when the original website, vendor, product, service, and/or the like, is perceived to have been brought back online, repaired, accepting online payments, shipping, back in stock, and/or the like.

In various non-limiting embodiments, the "Historical View" module in block 313, in general, allows the IPACE member the functionality to manage, view, and review his/her and/or an Account's (60) historical data/statistics and related items in association with the IPACE Operating Environment. For example, the "Historical View" module could provide the IPACE member a view of what has been measurably and successfully accomplished relative to other projects completed, where bottlenecks, and issues, developed and/or the like, to create reports. In addition, the IPACE system may analyze and generate a list of perceptions, predictions and anticipations versus actualized events, so that the IPACE member may verify the factors perceived to be attributable to the discrepancies to improve future data/statistics.

Further, the "Historical View" specifically tracks, analyzes, and generates reports regarding the IPACE member's actualized claims, compensation, ownership, and/or the like, per say, a project, per a time period, per an IPACE Account (60), per a Joint-Inventor/Co-Inventor (41), per a segment, and/or the like, or overall; where he/she may request analysis and generate comparison data/statistics for say, a year over year, or month over month relative success comparison. In addition, the module would provide associated data/statistics and information regarding what obligations were accomplished by who, for what, where, when, and the like to analyze and generate an actualized and attributable value per each Contributor (50) relative to the IPACE member's an input of (e.g. IPACE member's time and money) score.

In various non-limiting embodiments, the "Abandoned Items/Issues" module in block 314, in general, allows the IPACE member the functionality to manage his/her and/or an Account's (60) abandonment related items and issues in association with the IPACE Operating Environment and/or the PTO (or similar). For example, the "Abandoned Items/Issues" module could specifically track, analyze, and generate reports regarding any application that has abandoned, why, what remedies are still perceived to be applicable, predictive outcomes, and/or the like. In addition, the "Abandoned Items/Issues" module could specifically track, analyze, and generate reports regarding any application that may become abandoned in some specified period of time, say within the next 60 days, where the IPACE system could analyze and generate associated data/statistics and perceptions as to why, what remedies are still perceived to be applicable, predictive outcomes, and/or the like.

In various non-limiting embodiments, the "Abandoned Items/Issues" module could also track abandonment concerns related to pending applications, where the IPACE system would preferably send alerts when a conditional period of time is approached or surpassed, say whenever forty (40) consecutive clock hours pass (not including Saturdays and Sundays), where the IPACE system does not perceive any activity by any active participant, Contributor (50), and/or inventor on a particular project. Here, the IPACE system could be conditionally setup to either: alert all Participants (80) at once; to alert a particular Contributor (50) who is perceived to be the particular Contributor (50) who others are waiting on and the next party in line to his/her contribution; to alert a particular Lead Inventor (40); to alert a particular Patent Attorney (44) of record; to alert a particular Project Manager (43), and/or the like; each independently, collectively, overall, and/or per each potential permutation combination thereof.

Further, the IPACE system could incorporate the current MPEP rules and/or case law in terms of what is perceived to create a possible abandonment issue, when, where, how, and why, and any applicable nuances, say where the rules may be applied slightly differently to different parties, to different stages of the application, and/or tot different kinds of applicants, say where one applicant "A" is a full-time Employee (55) working full-time on an application, and another where applicant "B" is working on an application on his/her free time outside of, say a full-time job.

In various non-limiting embodiments, the IPACE system could adjust the alerts according to conditions, such as activity by a particular Participant (80) that would likely be perceived to eliminate an abandonment assertion on the ground of a time gap due to the recorded and tracked activity happening well before creating the time gap, and where the activity is perceived to represent the type of due diligence deemed necessary to avoid a perceived abandonment due to inactively. Further, this activity could turn off subsequent alerts and/or create alerts for the appropriate parties, such as the Lead Inventor (40) and/or Patent Attorney (44) of record to monitor and/or approve as a perceived activity and timeframe sufficient to avoid any perceived abandonment due to inactively. In various non-limiting embodiments, the IPACE system would track methodologies for overcoming abandonment issues cited by the PTO and others, in terms of what was relatively successful in terms of overcoming a particular abandonment case/assertion per associated issue, such as the perceived reasons for abandonment, the assumed time gap(s), the type of applicants (Large Entity, Small Entity, Independent Inventor, small inventor group, a university, and/or the like), the size of the relative patent family (active or inactive), the number of claims, the PTO asserted ramifications, a methodologies to argue/petition against, the parties/attorneys and the employed to argued against, the case law employed to argued against, and/or the like.

In various non-limiting embodiments, the "Customization and Requests" management module in block 315, in general, allows the IPACE member the functionality to create customizable rules, elements, and the like, or create/modify requests for features and functionality.

Back to the "Rule Engine and Management" (128) module in block 252, in general, allows the IPACE member the functionality to manage his/her and/or an Account's (60) TIMES Management rules in association with the IPACE Operating Environment. In various non-limiting embodiments, the TIMES Management rules functionality of the "Rule Engine and Management" (128) module in this limited example comprises of a "Participant and Participation Requirement" module in a block 316, an "Availability and Dependency Related" module in a block 317, a "Hard Deadlines" module in a block 318, a "Completion and Stage Goals" module in a block 319, an "Extensions, Divisionals, Continuations, and RCE Related" module in a block 320, a "Competition Mgmt." module in a block 321, a "Perception Mgmt." module in a block 322, and an "IPACE Court TIMES Rules" module in a block 323.

In various non-limiting embodiments, the IPACE member may create TIMES rules from scratch/new, modify existing rules, use existing rules as templates, and/or the like. Rules may be set to be global TIMES rules, default TIMES rules, override TIMES rules, individual TIMES rules, and/or stair-step TIMES rules. For example, the IPACE member may create a conditional global TIMES rule where no outside IPACE member may participate unless he/she has a conditionally level of availability on his/her calendar for new project and/or new clients. A default TIMES rule could be created for, say any TOP that fails to address a PTO claim restriction on a pending application, where a default rule could be set for, assume acceptance of any PTO assertions restricting claims to separate inventions, when a project does not specifically state otherwise, and where the restriction is anticipated to not generate more than two subsequent applications.

A series of override TIMES rules could be created for a particular provision and/or condition, say for a particular project where a rule in the terms provides a particular "Patent Attorney (44) A" a right and/or an obligation at conditionally and timely providing claims, where after that amount of time has elapsed and/or where a set calendar date and time has elapsed, the override rule could be triggered. In addition, where, say, other pre-qualified Participants (80) are now also allowed to contribute claims and compete with this particular Patent Attorney (44) "A," up until any claims are officially accepted by the Lead Inventor (40) under the TOP and PACOR, and therefore ending the competition. An individual TIMES rule could be for a hard deadline to meet a statutory deadline of turning a provisional application into a non-provisional application within the one year time frame for a particular project.

Starting with the "Participant and Participation Requirements" module in block 316, which is similar to module accessible from the FINANCIALS block 244. In various non-limiting embodiments, the "Participant and Participation Requirements" module, in general, allows the IPACE member to create/modify rules as to what segments, IDs, and/or the like have permission to view and access TIMES for say, specific projects, and/or for specific access and functionality per each Account's (60) associated module utilization, either as potential participant, an actual participant, a Contributor (50), a Joint-Inventor/Co-Inventor (41), an Advertiser (57), an Investor (67), an IPACE court member, and/or the like.

For example, a particular PAC generated by a particular IPACE member, say a particular Lead Inventor (40) to locate and attract potential Draftspersons (54) for a particular project could segment and target all IPACE members by (a) those IPACE members who qualify as a Draftsperson (54) (e.g. per the current IPACE TOU's defined roles and/or the particular IPACE member's conditional role rules, and/or additional TOP rules); and an additional series of conditions and/or Participant (80) preferences, where perhaps a Participant (80) preference (b) states that he/she should have a minimum of six (6) years of patent figure drafting experience; a Participant (80) preference (c) states he/she should have a calendar with availability for new projects known and/or perceived to be open for at least sixteen (16) hours over the next eight (8) weeks; a Participant (80) preference (d) states a desired maximum fee/price per CAD-type or three-dimensional-type illustrate that should not to exceed $100 per sheet and based upon a minimum of three (3) sheets; a Participant (80) preference (e) that states that he/she should have an Overall Performance feedback rating or rating of at least "X," where the Overall Performance feedback is based up normalized data/statistics from, say other Inventors (70) and/or Contributors (50) on other prior projects, and/or drafting Peers (65)/Experts (75), where "X" is a relatively high Overall Performance score/rating for the role of a Draftsperson (54); and a Participant (80) preference (f) that states that he/she should have a Quality performance feedback rating of at least "Y," where the Quality performance feedback is based up normalized data/statistics from, say other Inventors (70) and/or Contributors (50) on other prior projects, and/or from a conditionally pool of drafting Peers (65)/Experts (75), where "Y" is a relatively high Quality Performance score/rating for the role of a Draftsperson (54).

In various non-limiting embodiments, these Participant (80) preferences (of A, B, C, D, E, and F) may be scored relative to the goal, where, for example, a particular Draftsperson (54) could have four (4) years of patent figure drafting experience versus the Participant (80) preference for six (6) as expressed Participant (80) preference (b), and where this could create a Participant (80) preference "B" score of say 4/6. In various non-limiting embodiments, these Participant (80) preferences (of A, B, C, D, E, and F) may be prioritized, weighted, and/or the like, where some Participant (80) preferences are scored relatively different to others as it is given more weight, and/or where some Participant (80) preferences are absolutes, but where (depending on the goals of the Lead Inventor (40)) say a particular Draftsperson (54) with eight (8) years of experience could score relatively higher than someone with six (6) years of experience.

Further, these Participant (80) preferences (of A, B, C, D, E, and F) may be setup to filter the IPACE member database and generate invitations that are triggered by timers and perceived and relative success. For example, a particular PAC could initially be sent-to and/or posted-for only those IPACE members who qualify under all the Participant (80) preferences/rules (of A, B, C, D, E, and F).

In various non-limiting embodiments, the IPACE system could also analyze and generate a perceived range of compensation, qualifications, and predicted outcomes based upon the Participant (80) preferences, rules, and/or conditions currently being targeted/sought by the Lead Inventor (40), collectively, independently, and/or per each potential permutation combination. In various non-limiting embodiments, the perceived range of compensation, qualifications, and predicted outcomes could be based upon say historical data/statistics and comparison analysis generated in the IPACE system and from such data/statistics collected as from other job boards, government databases and studies, SEC data/statistics, stock prices, websites, and/or the like.

In various non-limiting embodiments, the IPACE system would preferably analyze and generate sufficient data/statistics correlations and analysis to graphically illustrate how each condition/Participant (80) preference may affect a perceived range of compensations, qualifications, and predicted outcomes. In various non-limiting embodiments, the perceived range of compensations, qualifications, and predicted outcomes could include such data, statistics, correlations, and analysis as a perceived pool of available candidates; a relative likelihood of locating a pool of candidates by a defined deadline or time range; a relatively likelihood of attracting a pool of candidates within the budget; a relative likelihood of contractually agreeing with at least one Participant (80) by a defined deadline or time range; a relative likelihood of performance satisfaction (e.g. "X" feedback score); a relative likelihood of completing on time, a relative likelihood of completing on budget, a relative likelihood of willingness to compete with others; a perceived to be relatively measurable and/or directly attributable score toward the perceived future of a patent at a particular moment in time that is relative to value to this particular portion of a particular project; a perceived future value overall of the patent at a particular moment in time, and/or the like.

In various non-limiting embodiments, the outcome perceptions could be based upon historical data/statistics and comparison analysis generated in the IPACE system and from also from data/statistics sources outside the IPACE system, including data/statistics input by IPACE members and anonymous sources; and/or collected (e.g. searched, downloaded, pulled, synchronized, and the like) from other government agency databases, ontologies, federations, RDFschemas, triple stores, studies, patent office databases (USPTO, PCT/WO/WIPO, EPO (and per country), Japan/JPO, China, Korea, India, Canada, Mexico, Australia, Brazil, Russia, all other countries, and the like), job sites, job postings, websites (e.g. USPTO.gov, related sites, and the like), legal/court records, patent litigation records, patent licensing records, court records, articles, RSS feeds, newsfeeds (e.g. Thomson/Reuters®, Yahoo! Financials®, Dow Jones®, and the like), Google®, Twitter®, and/or the like.

For example, the following, and related sites/databases:

PTAB/BPAI cases: http://des.uspto.gov/Foia/BPAIReadingRoom.jsp

PACER.gov: https://pcl.uscourts.gov/Appellate

Cases: https://pcl.uscourts.gov

Supreme Court Cases: http://www.supremecourt.gov/search.aspx?Search=patentandtype=Site LexisNexis®: http://www.litigator.lexisnexis.com/

Westlaw®: http://www.westlaw.com

LexMachina®: https://lexmachina.com/database/howto

DocketNavigator: https://docketnavigator.com/entry/home

STN: http://www.stn-international.de/uploads/tx_ptgsarelatedfiles/091109_PatentCitation_Searching_02.pdf EPO Espacenet: http://worldwide.espacenet.com/numberSearch?locale=en_EP USPTO TESS for trademarks: http://www.uspto.gov/ebc/tess/index.html And/or the like.

Visual Continuum of Participant Preferences/Conditions

In various non-limiting embodiments, the graphical illustration of how each condition per Participant (80) preference may affect a perceived range of compensations, qualifications, and predicted outcomes could be a visual reference with a volume area along a continuum relative to say the size of the pool of candidates both inside the selected Participant (80) preference range and for the areas outside the range. In various non-limiting embodiments, a portion of the relatively largest pool of candidates along the continuum would be visually referenced by, say the highest volume area in the visual display along the continuum, relative to the currently selected Participant (80) preferences, conditions, ranges, thresholds, rules, weights, priorities, and/or the like. In various non-limiting embodiments, in addition to the visual continuum, the following could also be used visually represent Participant Preferences/Conditions: scale, subgraphs, graph, map, 3D object, and/or the like.

In addition, the Lead Inventor (40) could utilize a series of individual filter sliders to tweak each condition, range, threshold, and/or the like; and, in turn, receive a real-time or near-real-time visual reference of how that particular variable affects or implicates the perceived range of compensation and predicted outcome, where different conditions, ranges, and/or threshold settings along the threshold may appear relatively more desirable. For instance, where the variable or Participant (80) preference for "the maximum fee/price per figure is not to exceed $100 per sheet" is selected, and where the Lead Inventor (40) made this an absolute cutoff, but where the visual reference shows that if the Lead Inventor (40) increases "the not to exceed per sheet price" to instead say $125, then that the Lead Inventor (40) is 32% more likely to attract talent and produce figures that are relatively more valuable at grant (e.g. or other moment in time) than otherwise, and/or data/statistics reflecting that there is a much larger pool of available Participants (80) at this new price per sheet.

This variable correlation, analysis and visual display could also incorporate the second component of this Participant (80) preference where the Lead Inventor (40) also stated a three (3) sheet minimum, where the variable correlation, analysis and visual display could reflect that a five (5) sheet minimum and maintaining the not to exceed $100/sheet price would be say equally affective, or perhaps relatively more affective at attracting talent and/or at producing relatively more valuable figures that contribute to a patent likely to be "X" percent more valuable at grant (e.g. or other moment in time) than otherwise, and/or data/statistics reflecting that there is a relatively much larger pool of available Participants (80) at this new minimum number of sheets.

In various non-limiting embodiments, then depending on other conditions setup by the Lead Inventor (40) for say, a particular amount of time allowed to secure a Draftsperson (54) who accepts the Lead Inventor's (40) TOP and Contract, say where the amount of time allowed to secure a Draftsperson (54) is a period of two (2) weeks, and where if after another conditional setting is for a particular amount of time to locate a sufficient number of qualified candidates, say where at the amount of time to locate is at least within one week and where the sufficient number of qualified candidates must be at least two in active contract negotiations, otherwise the IPACE system may be set to prompt and/or automatically send out a second set of invitations, where the Lead Inventor (40) may prioritize conditions A, B, C, D, E, and F, and send out a second round of invitations to, say for those IPACE members who qualify under conditions A, B, C, and D, but not necessarily E. Further, the IPACE system could simultaneously send out invitations to other IPACE members who qualify under other conditions, such as: A, B, D, and E; and A, C, D, and E; where the IPACE system could track, analyze, rank, and report the conditionally qualified candidates and adjust the suggested offers accordingly, where those candidates with relatively less experience for example, may be offered slightly less than those with relatively more experience.

Figure 28C:
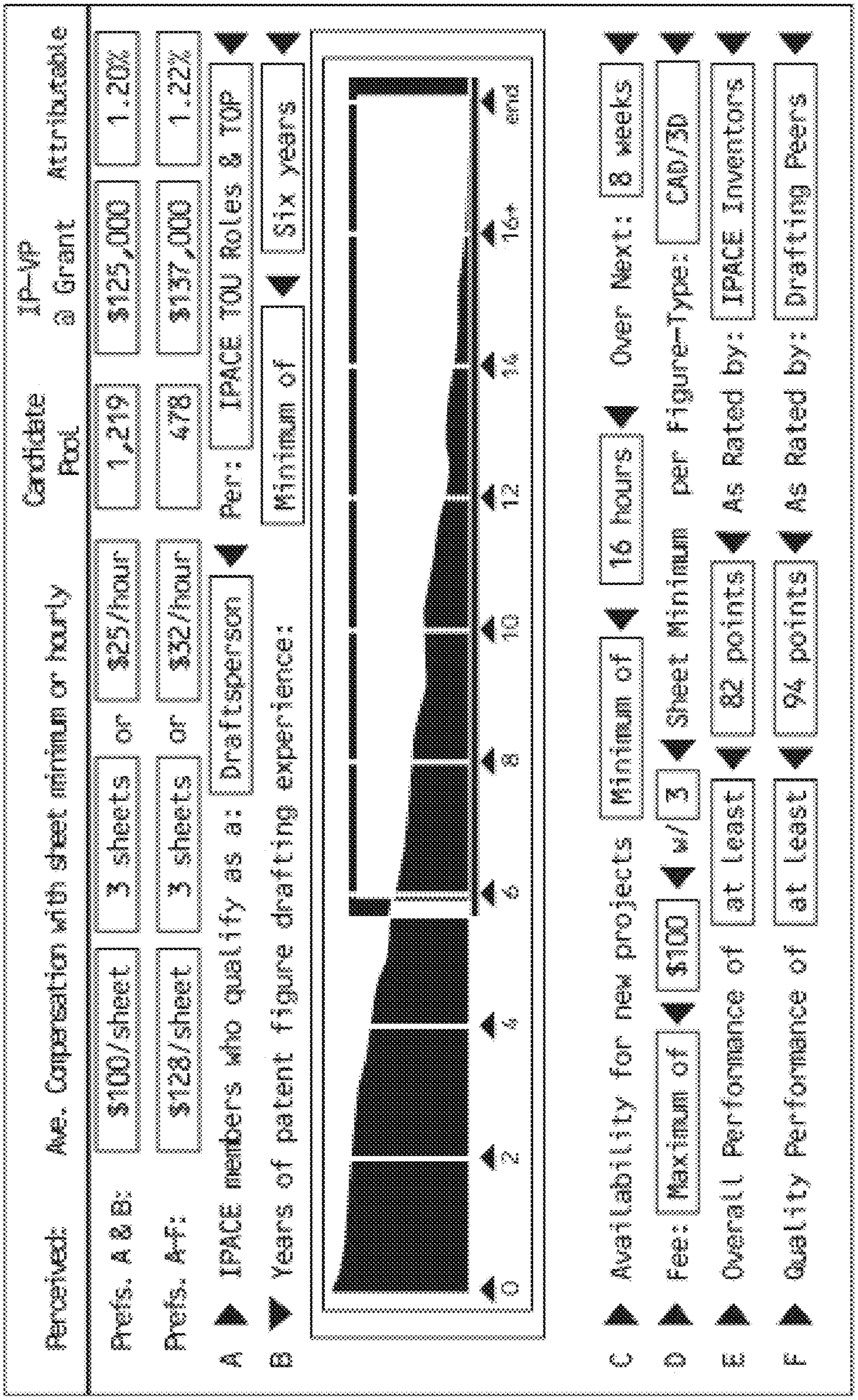
FIG. 28*a* (and FIG. 28*c*) depicts an example embodiment of the IPACE graphical user interface for automatically, manually and/or visually tweaking the Participant (80) preference ranges currently selected by the Lead Inventor (40) for attracting a potential Draftsperson (54) Participant (80) to a project.
FIG. 28*b* (and FIG. 28*d*) depicts another example embodiment of the IPACE graphical user interface where the Participant (80) preference range has been modified from the previous selection of six year minimum required to instead four years for attracting a potential Draftsperson (54) Participant (80) to a project.

FIG. 28*a* (and FIG. 28*c*) depicts an example embodiment of the IPACE graphical user interface for automatically, manually and/or visually tweaking the Participant (80) preference ranges currently selected by the Lead Inventor (40) for attracting a potential Draftsperson (54) Participant (80) to a project. Here, the IPACE system generated, analyzed, and displayed known and perceived relatively differences between all the Lead Inventor's (40) Participant (80) preferences A-F and just Participant (80) preferences A and B. Each Participant (80) preference A through F is listed with the ability to drop down and expose the visual analysis as in Participant (80) preference B, where the Lead Inventor (40) may adjust the current thresholds set for a "minimum of "six (6) years" "of patent figure drafting experience." In various non-limiting embodiments, the displayed data/statistics could include the size of the Candidate Pool for potential participants in terms of numbers and as a percentage of the overall database, or where the Lead Inventor (40) may specifically request, say 20% increase in the Candidate Pool and see the correlating results and displayed data/statistics.

Figure 28D:
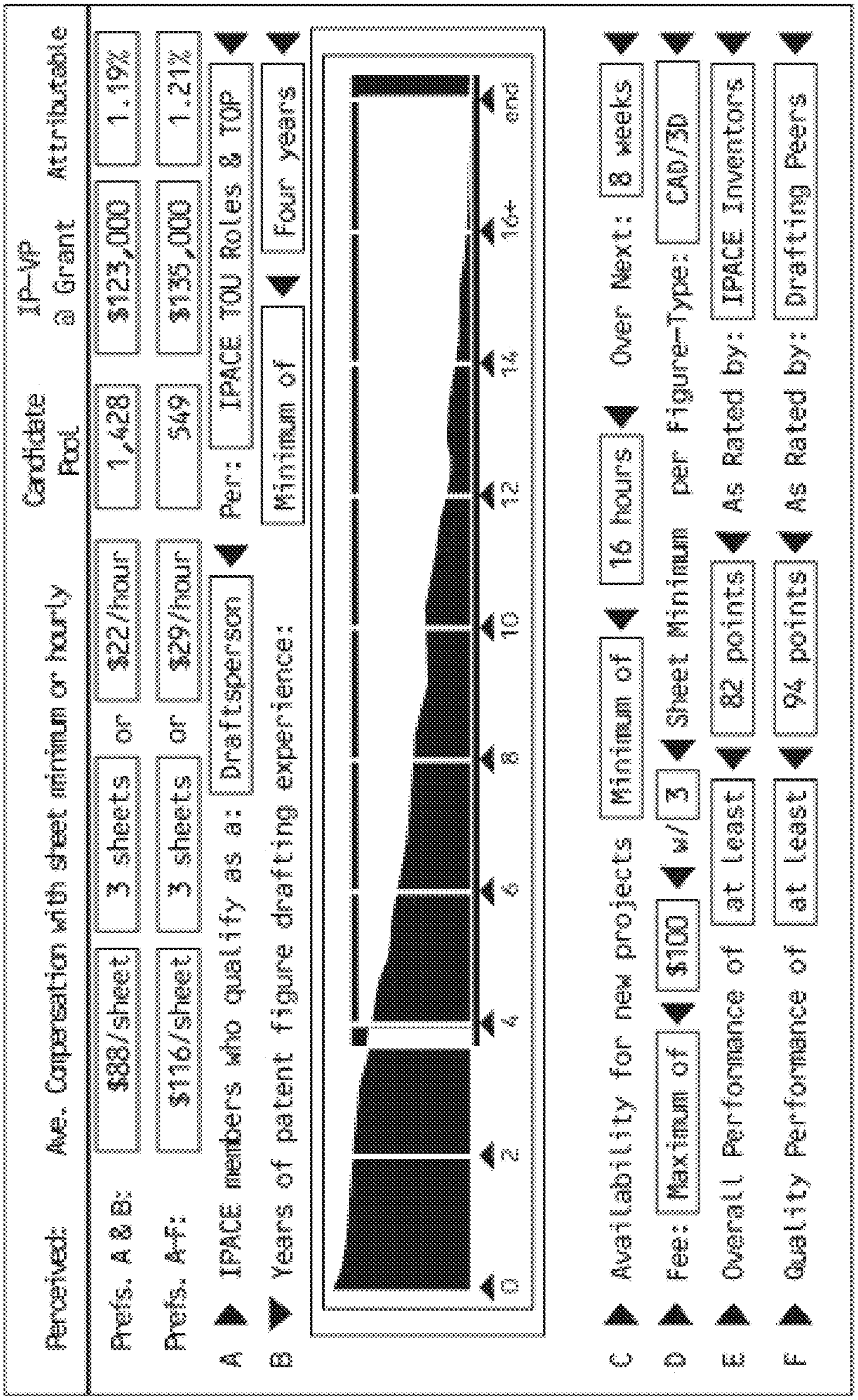

FIG. 28*b* (and FIG. 28*d*) depicts another example embodiment of the IPACE graphical user interface where the Participant (80) preference range has been modified from the previous selection of six year minimum required to instead four years for attracting a potential Draftsperson (54) Participant (80) to a project. This modification could either be done by the Lead Inventor (40) manually utilizing the drop down boxes and changing the setting or could be done by adjusting a selection range depicted from a year "four to the end" in a visual display window showing an overall selection area of "years zero to 16 plus and to end (e.g. encompassing all data/statistics)." In various non-limiting embodiments, the Lead Inventor (40) could use his/her mouse or fingers on a touch-screen to adjust the selection range. In various non-limiting embodiments, any adjustment performed would preferably, in turn, analyze, generate and display new data/statistics in all the data fields in real-time or near real-time. In addition, the IPACE system could make suggestions, where for example, this adjusted threshold with a new selection range starting at four (4) years of minimum experience could be have been a suggestion of how to adjust certain Participant (80) preferences and/or a specifically selected Participant (80) preference to relatively meet a particular goal. That goal could be relatively increasing the pool of potential participants without decreases the IP-VP by say more than "Z" value percentage.

Further, the IPACE system could generate, analyze, and display known and perceived relatively differences between the Lead Inventor's (40) Participant (80) preferences of current threshold of at least six (6) years of patent figure drafting experience and how that Participant (80) preference is relatively more restricting on the pool of potential participants than the price per sheet or the minimum number of sheets. In addition, the IPACE system could analyze, generate, and display other known and perceived relatively differences between those selected by the Lead Inventor's (40) Participant (80) preferences and those not selected, say a Participant (80) preference for a potential Draftsperson (54) with a particular software package for doing his/her figures, or the like.

For example, a profile may be generated and analyzed from an existing data/statistics set, say of an existing Draftsperson (54) (whether an IPACE member or not), where relative correlations and comparison may be generated toward other profiles and/or profile segments for any particular analysis requirement, such as metrics for attracting Draftsperson (54) for a particular project and/or the like. In various non-limiting embodiments, the first profile could be generated from a list of ideal characteristics, for say the ideal Draftsperson (54) overall when relatively compared to a range of goals and conditions, and/or when relatively compared for a particular project, task, and/or outcome. In various non-limiting embodiments, the profile could include such data/statistics and analysis as past/historical, present, perceived, and/or anticipated/predicted: demographics, psychographics, compensation, education, IP-VPs, politics, finances, funding, work-load, partnerships, Investors (67), work-to-vacation ratios, travel and future travel plans, general health and health-issues, months of experience, feedback from others, and/or the like.

In various non-limiting embodiments, the profile could include such data/statistics and analysis as behaviors and behavioral patterns, such as present project types considered, project types rejected, project types accepted, project types abandon, project types competed in, specific projects or project types with the correlating number of figure, specific projects or project types with the number of figure parts, specific projects or project types with the figure types, specific project or project types with the PTO classifications (e.g. art units), and/or the like. Further, any other data/statistics that may assist in measurably and relatively comparing profiles and profile elements, such metrics as quality, successfulness, completion promptness, output speed, industry-knowledge, MPEP knowledge, email responsiveness, communication promptness, alert promptness, and/or the like. In addition, for a Draftsperson (54), figure accuracy, promptness, and quality; whereas for translator, translation accuracy, promptness, and quality; and so on per IPACE role type. Further, data/statistics and profile analysis regarding cases where, for example, patent figures were drawn into question for perceived procedure deficiencies, inaccuracies, lack of enablement, and whether the acquisitions were relatively accurate, the cost and time to correct, and/or the like.

For Draftspersons (54), the profiles, profile segments, and data/statistics analysis could include the relative number of patent claims granted, including the number and types of figures employed per claim per PTO classifications (e.g. art units), an analysis of the relative number of patents overall granted including the number and types of figures employed per PTO classification (e.g. art unit), an analysis of a relative successfully or not-successfully asserting the claims based upon the figures during a particular event, say during prosecution (e.g. office action response, appeal, pre-appeal brief, petitions, and/or the like); an analysis of a relative successfully or not-successfully asserting the claims based upon a particular figure or figures during a particular event, say post grant (e.g. post grant review, Ex Parte review, inter party review, re-exam, Marksman, Federal Circuit Trial with Judge, Federal Circuit Trial with Jury, Appellate Trial, Discovery Phase, and/or the like); a relative number of times patent figures drafted were cited in subsequent examiner's (66) prior art towards others.

For Patent Attorney (44), the profiles, profile segments, and data/statistics analysis could include the relative number of patent claims granted, including: the relative number of claims restricted, rejected, allowed, the number of office actions responses, rejections overcame, rejections not overcome and amended, per patent, per claim, per claim element, per PTO classification (e.g. art unit), with a perceived associated costs and time per each; an analysis of the relative number of patents granted overall, including the number and types of claims allowed per PTO classification (e.g. art unit), an analysis of a relative successfully or not-successfully asserting the claims during a particular event, say during prosecution (e.g. office action response, appeal, pre-appeal brief, petitions, and/or the like); an analysis of a relative successfully or not-successfully asserting a particular claim during a particular event, say post grant (e.g. post grant review, Ex Parte review, inter party review, re-exam, Marksman, Federal Circuit Trial with Judge, Federal Circuit Trial with Jury, Appellate Trial, Discovery Phase, and/or the like); a relative number of times a granted claim was cited in subsequent examiner's (66) prior art towards others.

Further, the IPACE member's (e.g. the Draftsperson's (54), the Patent Attorney's (44), the Inventor's (70) and/or the like's) ability to relatively properly and accurately predict his/her future and actualized reliance factors for such factors as reach-ability, time availability, calendar availability, completion dates per completion output obligations, completion times per completion output obligations, fees, resource requirements, budget, substitution potential requirements, and the like, when relatively compared to other profiles and/or segments. In addition, the ability to relatively properly and accurately predict his/her future and actualized reliance factors may be scored by other IPACE members overall by conditional IPACE sub-segments such as fellow project Participants (80), Contributors (50), Inventors (70), clients, Peers (65), Experts (75), IPACE court members, and/or the like; and/or by users who participate in feedback anonymously on the IPACE system and/or collected from other sources, such as Yelp®, Facebook®, LinkedIn® and/or the like.

In addition, the IPACE system would track and analyze each IPACE member's (e.g. the Draftsperson's (54), the Patent Attorney's (44), the Inventor's (70) and/or the like's) ability to relatively succinctly, fairly, and professionally: negotiate his/her contract terms, respond to a perception validation request, compete in competitions, interact with the IPACE court and its subsequent decisions, ongoing project negotiations, and the like; when compared to others profiles and segments.

Depending upon the TOU, TOP and other rules, such as the PACOR, the IPACE system could provide each IPACE member with the ability to request modifications, assert errors/omissions, and/or argue against his/hers profile and/or a profile perception, and/or regarding the profile or profile perception of another IPACE member, where the decisions may come from a particular IPACE member, say where the data/statistics or perception is relevant to a particular project; from a group of, say predetermined Peers (65)/Experts (75), and/or the IPACE court.

In addition, the perceived outcomes for such things as the IP-VPs could also be adjusted by, say the Lead Inventor (40), where initially the IPACE system would include a variety of moments in time to predicted the value of the contribution(s) perceived to be relatively directly attributable and measurable towards the patent value, say during prosecution and/or grant and where the IPACE system would preferably collect data/statistics when and what changes were made, and preferably why the Lead Inventor (40) felt the adjustments were justified.

Returning back to FIG. 27, where the "Availability and Dependency Related" module in block 317, in general, allows the IPACE member to create/modify those TIMES terms, conditions, and rules allowed to be modified by the IPACE system as to what, if any, are the conditions on a Participant's (80) availability and/or dependencies. For example, a particular IPACE member could create a project rule where he/she is not willing to have his/her compensation and/or equity jeopardized by delays caused by a particular party, role, and/or all parties that he/she is dependent upon within the course of a project.

In various non-limiting embodiments, the "Availability and Dependency Related" module in block 317 could be in terms of other Participants (80) and/or the IPACE Member's personal availability and tolerance for dependencies. For example, the IPACE member could create a global TIMES rule where he/she is not willing to have his/her compensation and/or equity jeopardized by delays caused by parties that he/she is dependent upon within the course of a project.

In various non-limiting embodiments, the "Hard Deadlines" module in block 318, in general, allows the IPACE member to create/modify those terms, conditions, and rules that are specifically for hard deadlines in associated with the IPACE system in general, for when, what, who (e.g. Participants (80)/obligations), relatively how certain is each hard deadline (e.g. a contractual obligation, a competition, a statutory requirement, are any extensions available beyond), and/or like; and/or any anticipated and/or perceived costs or fees if missed, and/or the like.

For example, converting a provisional patent application into a non-provisional application has a hard deadline of twelve months, unless that date falls upon a Saturday, Sunday, or PTO recognized holiday. Whereas, an office action could have a deadline of ninety (90) days to respond, but where there are a series of monthly extensions that may be purchased for a set cost, but where other projects resources, costs, Participant (80) availability, lost patent monetization opportunities, and/or the like; may also be calculated and/or perceived and displayed.

In various non-limiting embodiments, the "Completion and Stage Goals" module in block 319, in general, allows the IPACE member to create/modify those terms, conditions, and rules that are specific for a completion goal, stage window(s), and stage goal(s) in associated with the IPACE system in general, for when, what, who (e.g. Participants (80)/obligations), relatively how certain is each completion goal, stage window, and stage goal (e.g. a contractual obligation, a competition, a statutory requirement, are any extensions available beyond), and/or like; and/or any anticipated and/or perceived costs or fees if missed, and/or the like.

For example, a completion goal could be for conditionally locating and contractually securing a Patent Attorney (44) to draft three (3) independent claims for a patent application within a patent application preparation stage window (or a specific patent claim preparation window) and with an overall stage goal of say sixty (60) days to complete the task. Whereas, another completion goal could be running concurrently for locating and contractually securing a Draftsperson (54) to draft six (6) patent application figures for the same patent application, within a patent application preparation stage window (or a specific patent figure preparation window) and with a stage goals of say forty-five (45) days for the specific patent figure preparation window.

In various non-limiting embodiments, the "Extensions, Divisionals, Continuations, and RCE Related" module in block 320, in general, allows the IPACE member to create/modify those terms, conditions, and rules that are specific for extensions, divisionals, continuations, continuations-in-part (CIP) and requests for continued examinations (RCE) in associated with the IPACE system. For example, the rules may be in general, where a particular IPACE member, say a Lead Inventor (40) could declare that he/she does not wish to every utilize any extensions; or he/she could declare he/she doesn't wish to utilize any extensions for a particular project, stage window, stage goal, and/or the like. For instance, he/she may have requested and paid for some form of expedited PTO examination, where the PTO rules may conditionally not allow extensions.

In various non-limiting embodiments, the "Competition Mgmt." module in block 321, in general, allows the IPACE member to create/modify those terms, conditions, and rules that are specific for competitions. In various non-limiting embodiments, the IPACE system generally allows for Competitions in the absence rules explicitly prohibiting. Depending upon the TOU, TOP and other rules, such as the PACOR, the IPACE system will conditionally allow IPACE members and/or others the ability to create specific "Competitions." For example, a particular project, could have a Competition among Recruiters (81) to find a particular participant, say an engineer with a predefined profile of Participant (80) preferences, where for instance, a competition could end a particular moment in time and where the best-suited candidate per conditionally matching the pre-defined profile is awarded the competition reward of, say compensation, equity, and/or status points.

Another competition could be among Patent Attorneys (44), where there could be more than one winner and where the IPACE Court will be employed to select the best claims for a particular application. Here, the competing Patent Attorney (44) Participants (80) could be compensated per accepted patent claim by the IPACE court. In addition, the competition could afford the Campaign Gatekeeper (42), say the Lead Inventor (40), the option to pay to utilize some claims in subsequent applications (e.g. continuations) and/or pay a "kill-fee," where the Patent Attorney (44) conditionally agrees not to introduce a relative similar claim, say in the same PTO classification (e.g. art unit), say for a particular period of time, and where "relatively similar" would preferably be predefined, say, contextually and unambiguously, without being overly restrictive on all involved parties relative to the compensation and/or opportunity being offered.

In various non-limiting embodiments, the IPACE system may continually track competitions in terms of how one may participate, who are the competing Participants (80), each competing Participant's (80) obligations, timeframes, decision methodologies and terms, allowable modifications/terms, alerts, selection/decision ramifications on the relative and/or conditional winner(s)/loser(s), and/or the like. In various non-limiting embodiments, the IPACE system continually tracks and refines competitions based upon data/statistics and input for compliance, progress, obligations, and/or the like.

Depending upon the TOU, TOP and other rules, such as the PACOR, the IPACE system will conditionally allow IPACE members and/or others the ability to request a system analysis to generate a "Competition Decision Challenge" in the form of a requested modification, asserted error/omission, and/or specifically argue against a specific Competition Result, and/or challenge a Competition Result regarding another person, event, compensation, outcome, obligation, value, status, and/or the like, where a Competition Decision Challenge Reply such as a correction, comment, information request, negotiation, modification, appeal, final decision and/or the like, may come from at least one person, to a variety and range of people.

Depending on TOU, TOP, PACOR and the specific competition being challenged in the "Competition Decision Challenge," the "Competition Decision Challenge Reply" could come from the particular IPACE member who setup the Competition and typically the Campaign Gatekeeper (42) of related project (e.g. the Lead Inventor (40)) where the competition (e.g. data, statistics, calculations, metrics, obligations, ramifications, progress, compliance, abandonment, alerts, decisions, values, scores, Inventorship, status, compensation, reward, equity, and/or the like) is relevant to a particular project and/or the like.) However, the "Competition Decision Challenge Reply" could also come from a group of, say predetermined Peers (65)/Experts (75), the IPACE court, and/or the like; each independently, collectively, overall, and/or per each potential permutation combination thereof.

Typically the TOU, TOP, and/or PACOR would explicitly outline who and how the "Competition Decision Challenges," the "Competition Decision Challenge Replies" are to be timely handled. In addition, a particular IPACE member may simultaneously and/or escalate his/her "Competition Decision Challenge" to another authority within the IPACE system as an appeal, for another "Competition Decision Challenge Reply" and/or as an intervention.

In various non-limiting embodiments, the "Perception Mgmt." module in block 322, in general, allows the IPACE member to create/modify those terms, conditions, and rules that are specific for perceptions. In various non-limiting embodiments, the IPACE system generally generates Perceptions in the absence of facts and/or empirical data/statistics, and where the IPACE system continually tracks, calculates, stores, and refines Perceptions based upon new data, statistics, and input. Depending upon the TOU, TOP and other rules, such as the PACOR, the IPACE system will conditionally allow IPACE members and/or others the ability to request a system analysis to generate a "Perception Challenge" in the form of a requested modification, asserted error/omission, and/or specifically argue against a specific perception element, and/or challenge a perception regarding another person, event, value, status, and/or the like, where a Perception Challenge Reply such as a correction, comment, information request, negotiation, modification, appeal, final decision and/or the like, may come from at least one person, to a variety and range of people.

Depending on TOU, TOP, PACOR and the specific perception being challenged in the "Perception Challenge," the "Perception Challenge Reply" could come from the particular IPACE member who setup the Perception and typically the Campaign Gatekeeper (42) of related project (e.g. the Lead Inventor (40)) where the perception (e.g. data, statistics, calculation, metric, graphic, value, score, Inventorship, status, compensation, reward, equity, and/or the like) is relevant to a particular project and/or the like. However, the "Perception Challenge Reply" could also come from a group of, say predetermined Peers (65)/Experts (75), the IPACE court, and/or the like; each independently, collectively, overall, and/or per each potential permutation combination thereof.

Typically the TOU, TOP, and/or PACOR would explicitly outline who and how the "Perception Challenges," and the "Perception Challenge Replies" are to be timely handled. In addition, a particular IPACE member may simultaneously and/or escalate his/her "Perception Challenge" to another authority within the IPACE system as an appeal for another "Perception Challenge Reply" and/or as an intervention.

In various non-limiting embodiments, the "IPACE Court TIMES Rules" module in block 323, in general, allows the IPACE member to create/modify those terms, conditions, and rules that are specific to IPACE Court TMES Rules. In various non-limiting embodiments, there is a detailed figure dedicated to the IPACE Court module in block 248 and its associated functionality and rule creations further ahead.

In addition, the "Rule Engine and Management (128)" module in block 252 provides a variety of methods to employ a variety of Boolean operators, thresholds, ranges, weighting, prioritizations, and other rules to the collective measurements and results. In various non-limiting embodiments, the "Rule Engine and Management's Assignment Module" shown in an earlier figure allows the user to assign rules to a variety of objects through segments and IDs. In various non-limiting embodiments, the results of the Rule Assignment Management usage and the associated functionality afforded by the option modules appear in a step 271 "Analysis &/or Verify Collective Input/Results. Next, a step 272 is where the IPACE Member may "Preview &/or Test" rule(s).

Each new IPACE Campaign (e.g. Project) 236 and/or rule could be set to run against previous IPACE Campaigns 236 and rules in general, and Campaigns 236 and rules with similar TIMES Management rules to track and make sure that the new IPACE Campaign 236 and/or rules are, in fact, performing similarly, or report back that it is off by a quantifiable degree, and make suggested changes based on the area and/or attribute where the new IPACE Campaign 103 and/or rules deviates from methods that are relatively more tried and true, so credit and changes may be suggested and/or made based upon measurable results. New and modified TIMES Management Rules resulting in IPACE Campaigns (e.g. Projects) for a Completion Time Goal for acquiring a Project Participant, say an Engineer within a list of conditional Participant (80) preferences could be run against historical data/statistics to analyze and generate an estimate of the number of IPACE members who meet the list of conditional Participant (80) preferences and those that would likely respond by the Completion Time Goal per utilizing the Preview and/or Test 272 function.

Next, a query 273 asks if the IPACE member would like to either "Continue or Invoke" the rule? If the answer to query 273 is "continue" as in continue utilizing the Dashboard functionality without invoking the rule, then a next step 275 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 273 is instead "invoke" then a step 274 is invoked for the particular rule, then the next step 275 with a "Send, Post and/or Synchronize Appropriate Info, Data, Statistics, Data/content, Rules and Terms To Appropriate Parties, Engines, and Modules" is performed, where the IPACE user may also then continue utilizing the Dashboard.

All of the TIMES Management module and inputs are generally tracked and measured independently, and collectively as a unit against and relative to a particular Project 103, and/or Project element to measure their effectiveness and success rates against different Project 103 elements, FINANCIALS Rules, Account Rules, Segmentation Rules, TOP Terms and Ownership Rules, CREATE Rules, Negotiation Rules, METER Rules, IPACE Court Rules, ADSTATS Rules, and Real-time Tracking/Reporting.

In various non-limiting embodiments, parties such as Inventor may put conditional criteria ranges and priorities on TOP parameters when trying to attract and acquire potential participants. In addition to potential participants searching posted projects, Inventors (70) could search for potential participants who are members in areas of expertise within the field of his/her industry, project, and/or invention. For instance, a particular Lead Inventor's (40) project could include, say, a patent application for an invention that involved a mobile payment system for, say, a cellular phone. This particular Lead Inventor (40) could connect to a network, say, via the internet and search for Patent Attorneys (44), Patent Agents (45), and engineers within a delineated private network (e.g. PIN) for those with the appropriate existing experience, as predefined and displayed by the private network (e.g. PIN) for the conditions selected so far by the Inventor, and/or allow the Inventor to further delineate who may or may not participate in available function, to what degree, for what period of time, and under what conditions per participant.

In various non-limiting embodiments, the Lead Inventor (40) could then invite all of these individuals and/or some subset (e.g. segment) to participate by, say submitting a bid, submitting some proof of experiences or a piece of the patent application work, so that he/she gets back a list of similar work performed, references, associated costs, and time estimated to complete the specific work.

In turn, these invited parties could vet the potential client to first determine if there is a potential conflict. If so, they may notify the Inventor that they cannot participate for that reason. If there isn't a conflict and they are willing to bid the work, the solicited party could then either: (1) Return a bid with pricing, timing, (and possibly with examples and/or references); (2) Request more information to create a bid, or (3) Offer to work on an hourly basis or project basis.

In various non-limiting embodiments, the Lead Inventor (40), in turn, may select which Participants (80) he/she would like to complete his/her patent application. Another method for the Inventor to find potential participants on the private network (e.g. PIN) to complete his/her application would be to post a general description of what's needed and either let any member bid the work or post an amount the Inventor is willing to pay. For example, the Inventor could fill out a form with several fields about the particular invention. One section of fields would be related to the diagrams needed and could ask: (1) How many figures overall are needed, (2) Describe each figure as to whether it is a flow diagram or mechanical rendering, and/or (3) Approximately how many parts would need to be labeled per diagram.

In various non-limiting embodiments, the Lead Inventor (40) could also list how much they are willing to pay per diagram or for the full set and a time deadline as to when the diagrams should be completed. In various non-limiting embodiments, then members of the private network (e.g. PIN) who do diagrams for a living could look at the list and then either: (1) Select which specific Inventor diagrams they would bid on completing; (2) Offer to accept the Lead Inventor's (40) terms listed regarding the rates and the deadline; (3) Counter offer the Lead Inventor's (40) terms with different terms for costs and/or deadline; or (4) Request additional information before accepting terms.

This engineer who drafts diagrams (Diagram Drafter) could request more details before agreeing to a price and deadline with the Inventor. In various non-limiting embodiments, the Inventor could then send a handwritten diagram to roughly explain what was needed. If the Inventor received a range of offers from different Diagram Drafters, the Inventor could then select one to do all the work, or assign specific diagrams to different Diagram Drafters. Provisions in the pricing would be made, so that the Inventor could have modifications made to the diagram labeling, numbering, etc., and/or the Inventor could request the originals be included in the bid should he/she need to make changes or modifications going forward.

Before the Inventor has diagrams drafted, he/she may have already completed a thorough prior art search, and/or they may wish to use the system/network to do the first prior art search, and/or additional prior art searches. Similar to the methods listed above, the Inventor may request bids for prior art searches, and/or submit a specific price range and deadline for the prior art search they would like preformed. In addition, an Inventor may allow a limited number of Participants (80) or the entire private network (e.g. PIN) of Participants (80) to view his/her application, while it is being developed for filing and invite these people within the private network (e.g. PIN) to conditionally submit unidentified prior art in an on-going basis up until the patent is filed. In various non-limiting embodiments, the Inventor may list the currently known prior art and offer a bounty for any new material prior art.

In various non-limiting embodiments, the Inventor may place conditions on the prior art before it may be submitted, such as: (1) With a certain time period (e.g. last 3 years or last 2 months); (2) From a certain publication (e.g. New England Journal of Medicine); (3) Forms of publication (e.g. Newspapers, Websites, etc.); (4) Only if an issued patent and/or pending patent application; (5) With a certain named Inventor or certain assignment of invention; (6) Within a certain country; or (7) excluding any of the above (e.g. not including a specifically named Inventor or publication).

For example, the Inventor could put certain members (e.g.. those members who have found medical device prior art in their past) of the private network (e.g. PIN) on notice that he/she will pay a bounty of $50 per piece of material prior art discovered within the New England Journal of Medicine over the last 7 years and up to a certain date in time (e.g. the beginning of next month). Members of the private network (e.g. PIN) would have this range of time to search for such prior art and submit it to the Inventor for a bounty. After that range of time has passed and the patent application has been prepared for filing, no more prior art may be submitted to the Inventor and no one after that time is entitled to a bounty.

In various non-limiting embodiments, the Inventor could offer different bounties and different terms to different members. For example, in addition to the bounty listed above for "only members who have found prior art in the past for medical devices," the Inventor could also list a bounty $50 for any member who may find material prior art for any issued patent or pending application.

As a member of the private network (e.g. PIN), you would have a list of offers categorized by a range of criteria. A member could sort the criteria by the deadline times, the fees or bounty offered, the type of services needed (e.g. diagrams, written specifications, claims drafted, prior art searches, etc.). For example, if the Member wanted to view the all the bounties currently offered for prior art, he/she could click the column for patent application sections and select "prior art" from the list. Next, the Member could select to view the bounties from the highest to the lowest and then the Member could take a range of the highest bounties and sort by the deadlines.

This list of the highest bounties for prior art with the nearest deadlines help the Member determine which of these tasks he/she would like to work on currently. This list could show only the tasks that this member was eligible to participate in, or it could also show grayed out tasks that he/she was not requested to participate in. If the Inventor chose to allow all members to see tasks as "grayed-out," then these non-invited members may able to request participation from the Inventor on a case by case basis.

In various non-limiting embodiments, the Inventor is free to turn on or off this feature as needed. If the Inventor is new to the private network (e.g. PIN) or is not getting the number of responses to a request for prior art searches that he/she had hoped for, then the Inventor may expand the invited pool of Participants (80), increase the bounty, push back the deadline, increase the range of prior art criteria to broader pools of publications or regions, and/or allow uninvited Participants (80) to see the Lead Inventor's (40) private bounty offers as "grayed-out." This last method of allowing uninvited Participants (80) to offer prior art may be broken into stages where: (1) In various non-limiting embodiments, the Inventor may first vet the unsolicited Member (or uninvited participant) before accepting prior art suggestions; (2) A predetermined specialist who is a third party to the private network (e.g. PIN) may determine the material nature of the prior art offered by the unsolicited Member and offer an opinion as to whether the Inventor should accept or reject the offer (also, see more on Peer (65) Reviews, Expert Reviews, IPACE Court decisions and/or the like for, say reviewing and determining the material nature and/or the like); and (3) In various non-limiting embodiments, the Inventor may accept all prior art, but with the condition that it must be material determined by a predetermined third party of the private network (e.g. PIN) to be material to the particular invention.

In addition, the Inventor may create a pool bounty, where he/she will allow a set number of dollars for all material prior art submitted by a certain time period. For example, the Inventor may offer a bounty of $500 for all material prior art submitted over the next 30 days. If 30 pieces of prior art are submitted, where ten are determined by a predetermined specialist of the private network (e.g. PIN) to be material, then those ten Participants (80) would equally split the $500 as $50 each. All ten relevant prior art submittals could have come from the same Member.

If two Members submit the exact same prior art, say the same patent number for an already issued patent, then the person who submitted it first is entitled to the bounty. If two Members submit different articles from trade journals that mention the same piece of prior art, then those two Members split the bounty of one Member and the Inventor may list both pieces of prior art.

In various non-limiting embodiments, the Lead Inventor (40) may establish different pools for different types of prior art. Assuming the material submitted is found to be material to the Lead Inventor's (40) application by a predetermined specialist of the private network (e.g. PIN), the Lead Inventor (40), for example could offer: (1) A pool of $250 for prior art that is an issued US patent, (2) Another pool of $200 for prior art that is a pending patent application, and (3) another pool of $250 for prior art that is not one of the other two categories.

In various non-limiting embodiments, the IPACE system allows for different weights to be applied to different sections of prior art. For example, under the above scenario, the Lead Inventor (40) would split five material prior art references to issued patents as $50 for each material submittal, three material prior art references to pending applications as $66.66 to each material submittal, and 25 material prior art references to other publications as $10 for each material submittal. This allows the bounty for those Members who find issued patents as prior art to not have the bounty washed out by the 25 prior art references in publications.

If the Lead Inventor (40) believes any prior art in publications other than issued and pending patent applications are actually more valuable, he/she may adjust the bounty accordingly. In various non-limiting embodiments, the Lead Inventor (40) is bound to pay the Members the bounty whether the Inventor goes on to file an application or not. All Members who submit prior art material may be graded by the Lead Inventor (40) and/or the third party prior-art specialist as to: (1) How relevant each piece of prior art was to the Lead Inventor's (40) application; (2) How clearly the Member made the case that material was indeed prior art; (3) How timely the material and communications were submitted; and/or (4) How on-going communications were with the Member.

In various non-limiting embodiments, these scores may be used by this Member in the future or by other Members as additional criteria as to which Members will be allowed or not allowed to participate in submitting prior art and/or other assigned tasks. For instance, a member who submitted hundreds of trade journal articles, but where only, say two or three are later determined to be relevant to the Inventor's application may be a burden to one particular Inventor (70), while welcomed by another particular Inventor (70).

In various non-limiting embodiments, the Lead Inventor (40) may also invite offers from individual Members, where the Member may receive a set fee for prior art, as long as the prior art submitted by that Member is found to be relevant by the predetermined third party specialist and the Member was the first to submit the prior art. For example, a Lead Inventor (40) invites a Member known for submitting large blocks of publications to make the Lead Inventor (40) an offer whereby that Member will submit all the material within this category of prior art (e.g. prior art that is not an issued or pending patent application) for a set fee, e.g. $30 per relevant article, but not to exceed $200 in total.

In various non-limiting embodiments, the IPACE system will allow individual Members to become known as not just as Experts (75) regarding prior art searches in general, but Experts (75) regarding certain fields of inventions. In various non-limiting embodiments, the timeliness and accuracy in which a Member may reply to a Lead Inventor's (40) request for prior art will increase with experience. In turn, the Lead Inventor (40) will submit better applications in quicker period of time, because rather than use the experience of one law firm or search firm, the Lead Inventor (40) will be able to find expertise within a specific industry (e.g. mobile communications) or specialty within an industry (e.g. different mobile technologies, such as: CDMA, TDMA, GSM, GPRS, Edge, EVDO, LTE, 2G, 3G, 4G, WiFi, Bluetooth, WiMax, NearField/NFC, Zigbee®, etc.).

For the Lead Inventor (40), the typical goal could be to reach a completed application within a certain period of time, and/or within a certain budget. In various non-limiting embodiments, the Lead Inventor (40) may set a deadline to complete in a just a few hours to several days or months. In various non-limiting embodiments, the Lead Inventor (40) may list a firm deadline associated with existing materials, such as an existing provisional patent application or PCT on file. In various non-limiting embodiments, they may list a deadline before wanting to attend a trade show or meet with a prospective licensee or manufacturer. In various non-limiting embodiments, the Lead Inventor (40) may not set any deadline and wait until he/she is satisfied with the overall material, but in general the goal would be to file the best application as soon as reasonably possible.

In various non-limiting embodiments, the Lead Inventor (40) may become the Project Manager (43) monitoring all the progress of the application, posting bounties, posting fees or expertise requests, and/or they may assign the project management to existing member for a set fee to someone who may be known for possessing such skills or who lists his/her desire to work in such a capacity for an hourly rate, by a project basis, or for a narrow range of responsibilities. For example, a Member of the private network (e.g. PIN) could offer the services to manage the entire patent application process, from requesting and obtaining prior art searches, obtaining needed diagrams, refining the specification, and requesting and obtaining claims for the application.

In various non-limiting embodiments, this work could be done for a flat bid within a specified period of time, hourly, a flat bid per section, and/or as a performance bid where the Project Manager (43) is paid either by the amount of material that is collected, and/or by the amount of material that is later determined to be material for patent license or infringement case. This performance fee may also be extended to the individual Participants (80) of the specific parts of the application.

For example, a Project Manager (43) could assemble a completed patent application by: (1) Refining the written specification provided by the Lead Inventor (40), (2) Locating ten pieces of material prior art through five separate Members who submitted the prior art material, (3) Collecting eighteen diagrams from two separate Members who are known as drafting specialist and (4) Collecting forty-two (42) claims from two separate Members who are Patent Attorneys (44).

During the patent prosecution phase, the Inventor (70), Project Manager (43) and the nine other Members who participated could have pre-established additional fees based on the level of participation that was later required and/or a performance fee based on the materials that were ultimately accepted by the USPTO and/or appropriate entity (e.g. other countries, EPC, PCT, etc.). For example, if thirty-eight (38) out of the forty-two (42) original claims ultimately are accepted, a success fee could be applied to the issued claims, and/or an additional success fee could be applied to the specific claims that later become material in a licensing agreement or infringement law suit. For example, if the Inventor finds someone to license the patent based on a specific claim or claims, there may be an additional fee or equity share given to the author of either the claim or the claim and the supporting specification (used if more than one Inventor).

This performance fee method rewards those Member Participants (80) for work that is later proven to have substantive value. If one Patent Attorney (44) who was a member of the private network (e.g. PIN) submitted only one of the 38 claims accepted by the USPTO, but that one claim was later ruled as the single claim that needed to be licensed by another person, entity or company, then that Member or author could be rewarded with a success fee. For example, that author might get a percentage of the licensing fee above the fees paid to write the claims or in lieu of any upfront fees, depending on what were the originally agreed arrangements.

If no success fee was issued, the Inventor may offer the participating Members success fees if the services are later needed, such as during the patent prosecution phase, during the attempt to license the patent, and/or during a litigation effort, assuming the Member is agreeable to such financial agreements. Some Members may wish to be excluded from such offers and may make it known in his/her profile.

In various non-limiting embodiments, other Members may decide if he/she would accept such offers, and, if so, as an addition to fees for services, or in lieu of fees for services. This allows Inventors (70) with relatively tight budgets, but attractive potential patent applications, to seek out Members who may participate for a success fee or equity share only. In addition, Members such as Patent Attorneys (44) and Patent Agents (45) may search for work based purely on one set of criteria or a range of criteria, such as: (1) Inventors (70) who are willing to pay the most per hour and/or per completed task; (2) Which applications are most within their expertise; (3) Inventors (70) who are offering the best success fees, and/or; (4) Inventors (70) who are offering equity on the most interesting applications.

In various non-limiting embodiments, Inventors (70) who only offer equity based on what claims are successfully licensed or litigated in court, will need to create a strong case for their application and consequently, will likely need to be more patient to attract participating Members. If, over a relatively long stretch of time, no Members are interested in participating, the Inventor will have to increase the offer to the Members by either offering one or more of the following: (1) More equity for the same participation; (2) Equity participation with a lower threshold (e.g. equity on the patent being issued rather than after the patent is actually licensed or litigated); (3) A fee for each claim drafted/submitted; (4) A fee for each claim issued; (5) A fee for reviewing each claim in the application (his/hers and others); (6) A fee for reviewing the prior art; and/or (7) A fee for reviewing the entire application.

Similar to an online exchange that aggregates categories with associated descriptions, pricing, and the like; the IPACE members may monitor products, projects, offerings, advertisements, and/or the like being offered by other members in real-time, along with set deadlines, goals, requirements, costs, and/or the like. Members of the private network (e.g. PIN) for creating patent applications could see and monitor the offerings being made by Inventors (70), or offerings being made the Inventor's designated/selected Project Manager(s) (43) for participation in a particular patent application or the like. In various non-limiting embodiments, these offers would also note when the offer was modified, by how much, by who, and/or the like.

Computer-Implemented Collaborative Research, Development, and Search In various non-limiting embodiments, the IPACE system and associated computer-implemented methods would preferably provide users the ability to share a specific search result (e.g. specific art for a specific claim), a relative quantitative characterization of a search result (e.g. found nine (9) US-based references, six (6) patents, two (2) pending applications, and one (1) white paper) correlating to a specific claim set, claim, and/or claim element); a relative qualitative characterization of a search result (e.g. a first reference "X" that appears relatively similar to a claim 1, but appears to require another 103 reference of a second reference "Y;" and/or the like. In various non-limiting embodiments, the search results would preferably allow another party to selectively view data.

For example, the IPACE system would preferably allow the user to selectively display the inventor who filed a particular reference, e.g. the first reference "X" and/or the second reference "Y," and/or who each is assigned, the legal representative, and/or the like; without displaying/viewing the patent application name, abstract, figures, and claims, written descriptions, prosecution history, and/or the like; unless specifically selected/requested. In various non-limiting embodiments, the user selections and items displayed would preferably include an exchange, e.g. a fee, points, feedback, equity, options, and/or the like.

In various non-limiting embodiments, the user could employ and/or request a third party assessment (e.g. of users/member/IPACE-court/group/segment and/or the like) made of, say, conditionally selected experts who are variably not affiliated with a particular project; who then view the search/data/etc. and provide a score for a perceived relevance of the art, a perceived reliability of the data, a perceived accuracy of the assessment, and/or the like. In various non-limiting embodiments, the user could also employ and/or request that the third party assessment (e.g. of past participants who are variably not affiliated with a particular project) view and provide a score of a perceived accuracy of the relative quantitative characterization of the search result; the relative qualitative characterization of a search result; and/or the like. The third party assessment would preferably include an opinion to not view a particular search result, element, data point, name and/or the like; and would preferably include a specific reason. In various non-limiting embodiments, if the user decided to obtain and view any of the specific search results, he/she would preferably also score all of these assessments of the search, searcher, the third-party assessment, scores, opinions, and/or the like; where the data may contribute to a particular participants discerned and/or relatively perceived accuracy, reliability, and/or the like.

Computer-Implemented Searching Art

In various non-limiting embodiments, the IPACE system and associated computer-implemented method create new parse terms for patent searches beyond the USPTO searchable terms now. For example an ability to delineate independent vs. dependent claims in the search, and the same for each delineation/segmentation and whether known, presumed, and/or with some level of validation.

Non-Human Searches (e.g. Via AIS 195)

In various non-limiting embodiments, the IPACE system and the computer-implemented methods may automatically, systematically (e.g. via AIS 195), conditionally, and/or user-selectively, receive a data/content (e.g. text document) from, say an invention disclosure and/or patent application abstract and analyze the data to generate and display a list of keywords and/or keyword groups most likely to be employed for a prior art search by, say a prior art search company, Patent Attorney (44), and/or a PTO examiner (66). In various non-limiting embodiments, the IPACE system and associated computer-implemented methods could automatically, systematically (e.g. via AIS 195), conditionally, and/or user-selectively, request the data/content be submitted, and/or the results, where other than the initial individual or party who created and/or submitted the request, there could be relatively little, if any human involvement, previewing, approving, and/or the like. This would afford the inventor(s) and/or information-creators with additional confidentiality beyond, say that issue/concern/and/or the like, confronted with human participation. For instances before filing a subsequent patent application with the appropriate patent office(s).

In various non-limiting embodiments, the IPACE system could track a participant's relative success and his/her relative participation. In various non-limiting embodiments, the IPACE system could display whether a participant's current state was active or not. In addition, his/her relative recent activity/participation, where his/her recent activity could be relatively up/down relative to his/her overall history, recent history, month over month history, year over year history, relative to another participant, group of participants, a segment of participants, and/or the like. For example, the relative activity and/or current state of a particular participant/user, say a particular patent attorney, may reveal that he/she is relatively less active than he/she normally is during, say this point in the day, week, month, year, and/or the like, when relatively compared to his/her personal activity, client, work and/or like history. Whereas the relative activity of that same patent attorney ay reveal that he/she is still relatively more active than, say other patent attorneys in-general, at a particular firm, with a particular area of expertise, engaged with a particular domain, industry, entity, art unit, field of inventions, and/or the like.

In various non-limiting embodiments, the IPACE system would preferably provide a method for data/content creators and owners (e.g. participants/users) to post data, statistics, concepts, and IP efforts in pre-application files, applications, prosecution and post grant files in terms of keywords/tags, partial disclosures, strategies, art units/categories, and/or contributors/inventors; while shielding some selected elements/data/statistics, so that others may search the elements/data as potential prior art; to attract potential collaborators, Joint-Inventor/Co-Inventors, or contributors; and/or for contributing limited data towards trend analysis, yet the data/content owners may still protect elements/data that could potentially create an attributable public disclosure or surrender IP rights.

In various non-limiting embodiments, the data/content could be set to appear in limited pools of participants and in limited portions and or as a collection of data that is aggregated and doesn't necessary reveal proprietary materials, participants, and/or concepts.

Figure 30:
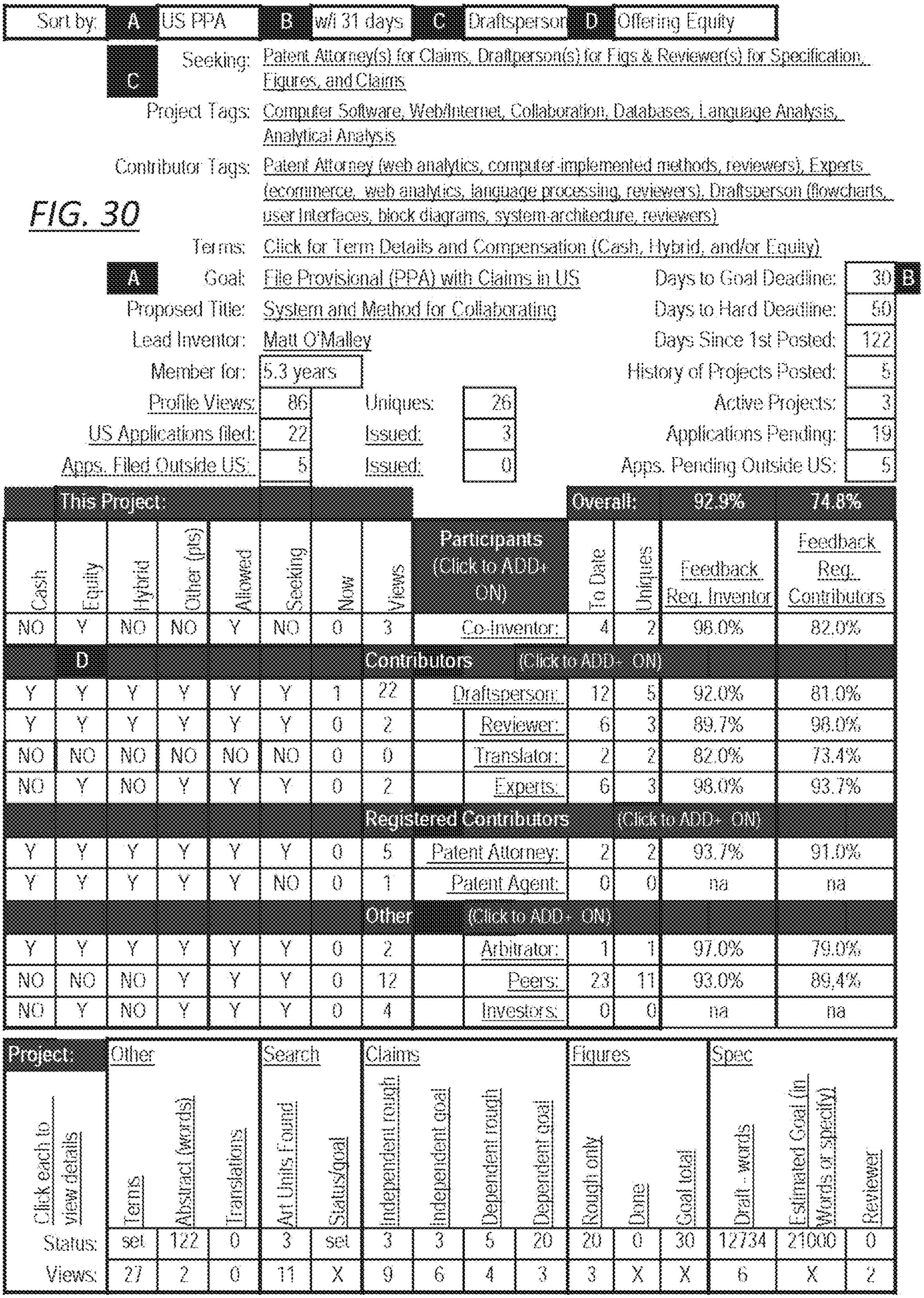
FIG. 30 depicts another example embodiment of the IPACE graphical user interface for viewing, tracking, sorting, and interacting with a particular project within the IPACE system.

FIG. 29 depicts an example embodiment of the IPACE graphical user interface for viewing, tracking, sorting, and interacting with projects within the IPACE system. FIG. 30 depicts another example embodiment of the IPACE graphical user interface for viewing, tracking, sorting, and interacting with a particular project within the IPACE system.

FIGS. 31*a* and 31*b* (and also 32*a* and 32*b*) and FIG. 33 depict examples for various non-limiting embodiments, regarding performance Pay. For example, a company could reward an Employee (55) who contributes material to a patent application a certain percentage of the total fees earned through a licensing fees or litigation settlement. If that Employee (55) is found to be the sole Contributor (50) to the application materials found to be material to the licensing agreement or litigation settlement, then the company could pre-agree to offer this Employee (55), say 10% of these fees for: (1) The life of the patent; (2) A certain number of years; (3) While still employed with the company (or not); and/or (4) Whether these terms are transferrable if patent rights are acquired by another entity.

In various non-limiting embodiments, if there is more than one Joint-Inventor/Co-Inventor (41) who has contributed application materials found to be material to the licensing agreement or litigation settlement, then the company could pre-agree to offer these Employees (55), a pool of fees or equity, say 20% of these fees where: (1) Each Inventor/Employee (55) (e.g. Contributor (50)) found/determined to contribute relevant material shares equally in the 20% pool; and (2) Each Inventor/Employee (55) found/determined to contribute relevant material shares in the 20% pool according the material contributed via the point system example as depicted in FIG. 31*a*/32*a*. Note, in various non-limiting embodiments, and under the scenario above and in FIG. 31*a*/32*a*, even if five diagrams are needed to support a single material Independent claim, the limit of points allowed is six, where the same Employee (55) did the rough artwork and the finalized diagram for supporting the Independent Claim later found/determined to be relevant material.

In "Contribution Scenario One" in FIG. 31*a*/32*a*, if there are three independent claims and five dependent claims that are found/determined to be relevant material, then there is a total of 253 potential points for all 20% of equity (as depicted in FIG. 31*b*/32*b*). Meaning if one Member or Employee (55) contributed all 253 points, then that Employee (55) would get all 20% of the equity for the duration pre-specified. If there were two Employees (55) where Employee (55) A contributed 202 points and the other, Employee (55) B, contributed 51 points of 253 total, then the 20% equity stake would be split accordingly, where Employee (55) A would earn 80% of the 20% equity stake or 16% of the total and Employee (55) B would earn 20% of the 20% equity stake or 4% of the total, as depicted in FIG. 31*b*/32*b*. FIG. 33 is a table depicting an embodiment example where additional equity could be earned for those that participate and/or contribute in other ways to the patent application.

Negotiations Management (118) Module

Figure 34:
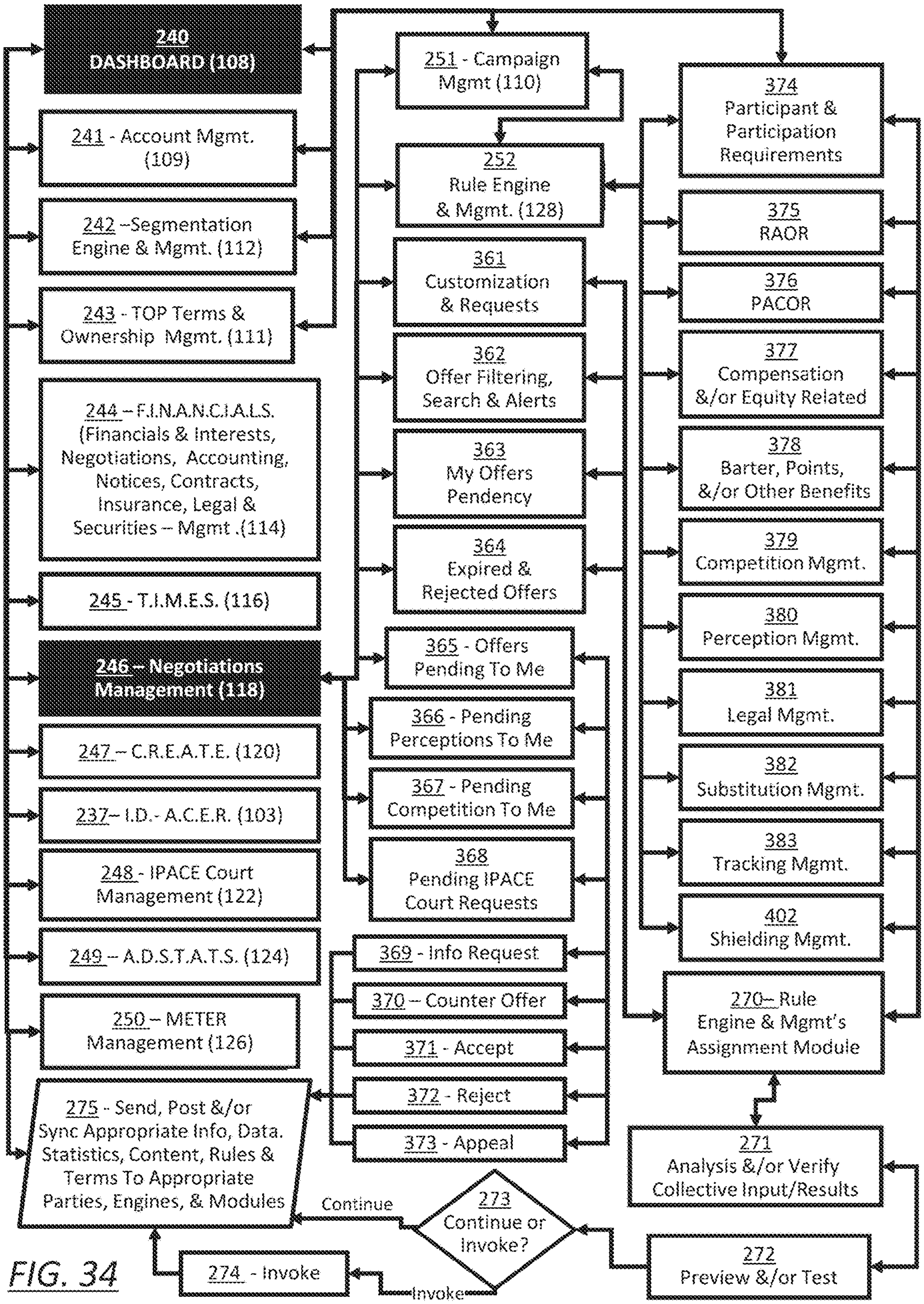
FIG. 34 is a block diagram with some flow charting steps depicting a non-limiting embodiment of the IPACE member's functionality from the Negotiations Management (118) module.

FIG. 34 is a block diagram with some flow charting steps depicting an embodiment of the IPACE member's functionality from the Negotiations Management (118) module. Starting with the Dashboard (108) in the block 240, where similar to the TOP Terms and Ownership Management Figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of the Negotiations Management has to have a role and/or at least equivalent to the same permissions required to be a "Negotiations Manager," hereinafter a "Negotiations Mgr." In various non-limiting embodiments, the Negotiations Mgr. utilizes the Negotiations Management (118) module to view, review, create, and/or modify criteria requirements or rules generally related to negotiations and/or similar element (e.g. accepting, rejecting, countering, appealing) for a particular Project or Project element to be used in, say a particular P.A.C. 104 and/or a particular P.I.N. 106.

In various non-limiting embodiments, the Dashboard functionality in this "Negotiations Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financials and Interests, Negotiations, Accounting, Notices, Contracts, Insurance, Legal and Securities-Mgmt)" (114) module in a block 244, the "T.I.M.E.S." (116) module in a block 245, the "Negotiations Management" (118) module in a block 246, the "CREATE" (120) module in a block 247, the "IPACE Court Management" (122) module in a block 248, the "ADSTATS" (124) module in a block 249, the "METER Management" (126) (including a Knowledge Management) module in a block 250, the "Campaign Management (110) (e.g. Project Management)" (110) module in a block 251, and the "Rule Engine and Management (128) module in a block 252. In various non-limiting embodiments, preferably the Knowledge Management tracks and analyzes what data, statistics, and/or the like, are known, stated, discerned, and/or relatively perceived along with scores, correlations, support data, challenges, iterations, and/or the like for each.

From the block 246, the "Negotiations Management" functionality in this limited example embodiment is geared more towards the IPSocket functionality and comprises of a "Customization and Requests" management module in a block 361, an "Offer Filtering Search And Alerts" module in a block 362, a "My Offers Pendency" module in a block 363, an "Expired and Rejected Offers" module in a block 364, an "Offers Pending To Me" module in a block 365, a "Pending Perceptions To Me" module in a block 366, a "Pending Competition To Me" module in a block 367, and a "Pending IPACE Court Requests" module in a block 368. In various non-limiting embodiments, the "Customization and Requests" management module in block 361, in general, allows the IPACE member the functionality to create customizable rules, elements, and the like, or create/modify requests for features and functionality.

In various non-limiting embodiments, the "Offer Filtering Search And Alerts" module in block 362, in general, allows the IPACE member the functionality to manage his/her offer filtering search and alerts in association with the IPACE Operating Environment. For example, the "Offer Filtering Search And Alerts" module could specifically search for offers based upon at least one first profile offer search filter and/or a plurality of profile offer search filters that continually search for offers and/or opportunities, and conditionally rank offers per the relative calculated correlation to the first profile offer search filter, and/or relative to the plurality of profile offer search filters, where conditions may be set to rank the filtering factors within each profile offer search filter, and/or each profile offer search filter to another.

In addition, the IPACE member could setup conditions where the filtering factors are dependent upon, say to a relative number of offers: currently being considered, currently being negotiated, currently meeting a particular profile offer search filter, currently in the IPACE system overall, currently in the IPACE targeted him/her, and/or the like. Further, the IPACE member could setup conditions where the filtering factors are dependent upon a relative objective, say compensation to date, future travel plans, a particular inventor, a particular PTO classification (e.g. art unit), a particular company/PIN, and/or example. For example, once the IPACE member, say a Patent Attorney (44), has earned a particular threshold of compensation within a particular window of time, say a quarter (three months), he/she could become relatively more selective in the type of projects, and/or compensation terms he/she would be willing to consider.

Preparation/Quote Response Builder—Patent Tools (Or Manuscript Request)

In various non-limiting embodiments, the IPACE system and associated computer-implemented method where the user may request the IPACE system to analyze, generate, and display a list of services that he/she is interesting in obtaining a quote regarding, and where the user selects the service and/or region for the service, then he/she selects a specific feature for that service offered and/or from a list of specific parties (e.g. potential participants, participants and/or the like) who offer that service in that region to retrieve a quote.

For example, if the user wanted to file a patent in India for the national phase of a PCT application, the user could select "patent filing" from a list of services, then "national phase post a PCT application" from a list of patent filing types, and "India" from a list of relevant locations. Then the user could select the types of feature and issues relevant to the PCT application and national filing, such as the deadline, the number of claims, etc. Then the user could select from a list of Patent Attorneys (44) and Patent Agents (45) who offer those services wherein a quote is generated in real-time and/or delivery subsequently following a review of the materials provided.

Potential Participant Search

In various non-limiting embodiments, the IPACE system tracks, searches and analyzes the data/content to display a list of participants that fit a criteria of relative success for a particular task, function, and/or the like. For example, search "patent attorneys" and rank according to his/her relative success overcoming "103 rejections" within a particular art unit. Here, the user may selectively filter and conditionally sort the results, where either the attorney with the largest number of application prosecuted within the art unit, along with the relatively high success rate of overcoming "103 rejections" would be prioritized highest, or, say, someone with the second most applications prosecuted in same art unit, but where his/her relative success rate of overcoming "103 rejections" is higher.

Computer-Implemented Searching Contributors/Partners

In various non-limiting embodiments, the IPACE system and associated computer-implemented method provides the IPACE member/user an ability to search for, say up to five (5) key people/users (e.g. potential participants 80*a*) willing to jointly file an application/invention. Further, each may contribute a particular range and/or type of data/content up to the date of filing a provisional, say up to a seven (7) day (limit) and then file. The future filing fees and any prosecution/legal fees could be setup to be the responsibility on the other/partner/Investor (67). This system and method creates potential partners.

Recognizing Overlapping Participants

For example, the user may specifically compare lists of participants, where the user specifically selects, say a list of 5 participants for a Group A to compare with another list of 4 participants from a Group B, where the IPACE system analyzes the discerned and perceived data to display a list of scores for any values requested, say relative cost-effectiveness, promptness, satisfaction score, and ROI. In addition, the IPACE system would preferably analyze a list of goals and a list of requirements (e.g. TOU/TOPs, criteria, and/or the like), along with the two Groups A and B, to generate as many permutations as perceived possible, where the IPACE system analysis would preferably recognize overlapping participants, then analyze the list of goals and the list of requirements, and potentially including participant rates, availability, to display relatively comparable group scores and individual scores per group.

For example, the IPACE system may create a higher individual score for a participant in one group than another due to factors and historical data/statistics, say for relatively promptness that incorporates dependencies. For example, a particular patent attorney may be discerned to and/or perceived to produce patent claims relatively more promptly with a particular participant or group of participants than another participant or group of participants.

In various non-limiting embodiments, the result could be displayed in a spreadsheet-like format where the results could also list potential concerns, dependency, bottlenecks, funding sources and/or the like. For example, a particular participant may be a key dependency participant, where his/her timely participation vs. his/her likely replacement would generate a relatively significant effect on the relative likelihood for success, ROI, timely completion, and/or the like. In various non-limiting embodiments, the IPACE system would preferably be setup to automatically, conditionally, and/or via a user-prompt attempt to electronically contact the particular participant to notify him/her with the ability to review, comment, challenge, and/or the like, the perceived values, rates, availability, scores, and/or the like; where the participant could respond with what, if any, "data-changes" (e.g. a correction, error, modified assumption, perception, and/or the like), he/she would suggest making and/or challenge, and/or the like.

In addition, the participant could respond with what, if any, term modifications to his/his potential participation would or could change the data, statistics, perceptions, rates, availability, scores, and/or his/her sentiments, assertions, concerns, conflicts, obligations, other commitments, and/or the like. For example, the participant may suggest a retainer and/or equity to adjust his availability and/or the like.

In various non-limiting embodiments, the "Offer Filtering Search And Alerts" module in block 362 may also be setup to specifically alert the IPACE member and/or other parties, such as a partner, associate, secretary, Joint-Inventor/Co-Inventor (41), boss, supervisor, paralegal, payroll, legal, and/or the like. For example, the IPACE member may setup a particular profile offer search filter for projects within a particular PTO classification (e.g. art unit) that involves an industry where he/she has a number of existing clients, so he/she sets up an alert that forwards the offers to his paralegal and/or legal to perform a conflict check before forwarding back to him as approved or rejected, due to a conflict.

In various non-limiting embodiments, the "My Offers Pendency" module in block 363, in general, allows the IPACE member the functionality to manage his/her offers that are awaiting a response from others in association with the IPACE Operating Environment. For example, the "My Offers Pendency" module could specifically track, analyze, and generate reports regarding the number of offers currently active, and whether, offers have been viewed, and if so, what is the status. In various non-limiting embodiments, the offers are having relatively more success, say via email invites, versus posting and/or searches preformed against the postings.

Tracking, Analyzing and Ranking Participant Bids/Quotes

In various non-limiting embodiments, the IPACE system may track and analyze data, data/content, and data/content correlations for ranking quotes. For example, a particular user (e.g. a Lead Inventor) who is seeking quotes/bids may build a table with cells and/or the IPACE system may automatically and/or conditionally generate needed fields for quotes (e.g. pricing per element, part, stage, form, filing, and/or the like). For instance, the user may send out the table requesting answers and/or bids in designated cells for a particular project or for a particular entity, where interested participants would preferably properly fill-in the designated cells.

If a particular cell is left blank, the IPACE system would preferably determine the discerned and/or perceived ability to skip that particular data, re-attempt obtaining the data from the interested participant, attempt to evaluate and generate data/statistics relative to other answers by the same potential participant, other potential participants, other interested participants, other interested participants with correlations (e.g. from the same law firm, with the same level of seniority, and where the IPACE system perceives a relative likelihood to have similar, say hourly rate), and/or other actual participants current and/or historically.

In various non-limiting embodiments, the IPACE system evaluates, assesses, and determines the potential, interest, and/or actual participant data inputs, the IPACE system accepted suggested inputs, and the like to rank the quotes/bids, including such factors as promptness in replying per questions, re-attempts, perceived accuracy, perceived competency, overall, and the like. The user may display the ranking criteria and adjust the weighting and algorithms to adjust what factors affect the ranking results.

In various non-limiting embodiments, the user may rearrange the results and the IPACE system evaluates, assesses, and determines the user ranking to generate an algorithms best-suited to generate that ranking based upon the collected data/statistics and annotate where the largest anomalies are in the rankings, where the user may allow, comment, and/or incorporate additional data/statistics, such as the potential participant was relatively late to reply, but was forwarded the quote request late, from a co-worker, and/or the like.

In various non-limiting embodiments, the "Expired and Rejected Offers" module in block 364, in general, allows the IPACE member the functionality to manage his/her offers that he/she has rejected and/or those that have expired in association with the IPACE Operating Environment. For example, the "Expired and Rejected Offers" module could specifically track, analyze, and generate reports regarding the number of offers he/she has rejected over a particular window of time, and/or data/statistics, when available, if and how the offer and subsequent project and obligations were completed.

For instance, a report could state that 90% of the offers the IPACE member had rejected were also rejected by others, and perhaps reflect a relative likelihood that he/she was not being unreasonable in his/her rejections. On the other hand, the same type of report could instead state that only 10% of the offers the IPACE member had rejected were also rejected by others, and perhaps reflect that he/she may have relatively unrealistic expectations in light of, say a particular industry, a particular time of year, current economic conditions and/or the like.

In addition, a report could calculate and display data/statistics that a particular rejected offer generated a particular number of claims. Further, a similar report could calculate and display data/statistics, such as the number of rejected offers that were modified and still pending, say 35%, for example; with another 25% that were accepted and in progress, 22% that went abandon, 23% that were accepted and completed. Of these 23% that were accepted and completed in the example, 70% of those, could be said to appear to be pending with the PTO without a FOAM yet, 15% appear to have a pending office action, 10% appear to have had claims granted, and the last 5% appear be abandoned. In various non-limiting embodiments, there could be other similar breakdowns, where data/statistics is available for compensation earned, IP-VP generated, and/or the like.

In various non-limiting embodiments, the "Expired and Rejected Offers" module could also specifically track, analyze, and generate reports regarding the number of expired offers over a particular window of time, and/or data/statistics, when available, if and how the offer and subsequent project and obligations were completed. For instance, a report could state that a particular expired offer was rejected by 60% of others and perhaps reflects a relative likelihood that he/she did not miss an opportunity. On the other hand, the same type of report could instead state that 80% of the expired offers were actually accepted by other IPACE member without any term modifications to compensation or deadlines, and perhaps reflect that he/she may have relatively slow methodology for reviewing pending offers, say for a particular time of year, or a particular window of time, and/or the like, where data/statistics could also reflect competing obligations.

In various non-limiting embodiments, the "Offers Pending To Me" module in block 365, the "Pending Perceptions To Me" module in block 366, the "Pending Competition To Me" module in block 367, the "Pending IPACE Court Requests" module in block 368, in general, each allow the IPACE member the functionality to manage his/her offers that are awaiting a response from others in association with the IPACE Operating Environment. From these blocks 365, 366, 367, and 368, and depending on the TOUs, TOP and other rules, such as the PACOR, the IPACE member has the functionality and options comprising of an "Info Request" module in a block 369, a "Counter Offer" module in a block 370, an "Accept" module in a block 371, a "Reject" module in a block 372, and an "Appeal" module in a block 373.

In various non-limiting embodiments, the "Info Request" module in block 369, in general, allows the IPACE member the functionality to manage his/her offers that he/she wants to request more information in association with the IPACE Operating Environment. For example, the "Info Request" module could specifically allow a potential participant to a particular project offer to specifically ask for details, and/or clarification on information provided in the offer, and/or in the terms. In various non-limiting embodiments, these exchanges could be done anonymously by one or both parties. In addition, the "Info Request" module could specifically track, analyze, and generate reports regarding the specific offers he/she has requested information regarding, relative to a particular project, a particular IPACE Member, a particular art unit, a particular entity (e.g. company/PIN). For instance, collected and tracked data/statistics could reflect a particular IPACE Members' propensity to ask questions that prove necessary for attracting Participants (80), and/or another IPACE members propensity to post offers that lack clarity.

In various non-limiting embodiments, the "Counter Offer" module in block 370, in general, allows the IPACE member the functionality to manage his/her offers that he/she wants to counter in association with the IPACE Operating Environment. For example, the "Counter Offer" module could specifically allow a potential participant to a particular project offer to specifically counter those specific terms that are considered negotiable in TOU, TOP, and in the preceding offer. For instance, the TOP may allow for all terms to be negotiable in a particular offer, where the recipient of the offer, decides to counter a particular term, say for compensation, and/or a range of terms, say for when the project is due, the employment of the IPACE Court terms, where he/she wants to be able to appeal, and the ability to conditionally substitute obligations.

In various non-limiting embodiments, these offer/counter offer negotiations are generally done as an identified IPACE member, but could be done as an identified Account (60), such as business, corporation, university, law firm and/or the like, where the negotiating party is authorized or perceived to be authorized to negotiate on its behalf. In addition, the "Counter Offer" module could specifically track, analyze, and generate reports regarding the specific offers and related counter offers he/she has engaged in, and relative to a particular project, a particular IPACE Member, a particular art unit, a particular entity (e.g. company/PIN). For instance, collected and tracked data/statistics could reflect a particular IPACE Member's propensity to counter a particular term that may suggest a propensity to bait and switch, and/or another example where an IPACE member's overall propensity to counter specific terms that may suggest a term that is relatively undesirable to a particular type of potential participant.

In various non-limiting embodiments, the "Accept" module in block 371, in general, allows the IPACE member the functionality to manage his/her offers that he/she wants to accept in association with the IPACE Operating Environment. For example, the "Accept" module could specifically allow a potential participant to a particular project offer to specifically accept a specific term in a counter offer and/or accept all terms. In addition, specific terms, obligations, duties, project elements and/or stages may be accepted during the progress of the project. For instance, the Lead Inventor (40) of particular project could "accept" a particular claim, while rejecting others, or accept all claims submitted by one particular Patent Attorney (44), while rejecting those by another (in the "Reject" module below).

In various non-limiting embodiments, these acceptances are generally done as an identified IPACE member, but could also be done as an identified Account (60), such as business, corporation, university, law firm and/or the like, where the negotiating party is authorized or perceived to be authorized to negotiate on its behalf. In addition, the "Accept" module could specifically track, analyze, and generate reports regarding the specific offers accepted and relative to a particular project outcome, a particular IPACE Member's obligations, a particular art unit, a particular entity (e.g. company/PIN). For instance, collected and tracked data/statistics could reflect a particular IPACE Member's propensity to accept a particular term within a relatively reasonable timeframe and without countering, rejecting, when compared to other projects/members, which may suggest his/her tendency to be relatively reasonable and fair on that particular term. While another example of acceptance data/statistics could reflect an overall propensity to accept specific terms from a particular IPACE member "A," where that same specific term otherwise has a propensity for rejection when offered by other IPACE members may suggest that the IPACE member "A" is a desirable party to work with and/or has managed to create offers that include other compensation and/or benefits to offset the specific term often rejected in other IPACE members' offers.

In various non-limiting embodiments, the "Reject" module in block 372, in general, allows the IPACE member the functionality to manage his/her offers that he/she wants to reject in association with the IPACE Operating Environment. For example, the "Reject" module could specifically allow a potential participant to a particular project offer to specifically reject a specific term in a counter offer and/or reject all terms. In addition, specific terms, obligations, duties, project elements and/or stages may be rejected during the progress of the project. For instance, the Lead Inventor (40) of particular project could "reject" a particular figure submitted, while accepting others, or reject all figures submitted by one particular Draftsperson (54) in a competition, while accepting those by another in the "Accept" module above.

In various non-limiting embodiments, these rejections are generally done as an identified IPACE member, but could also be done as an identified Account (60), such as business, corporation, university, law firm and/or the like, where the negotiating party is authorized or perceived to be authorized to negotiate on its behalf. In addition, the "Reject" module could specifically track, analyze, and generate reports regarding the specific offers rejected and relative to a particular project outcome, a particular IPACE Member's obligations, a particular art unit, a particular entity (e.g. company/PIN).

For instance, collected and tracked data/statistics could reflect a propensity for IPACE members to reject a particular term within a short period of time relative other terms in general, and/or other rejected terms, which may suggest a particular term that may be relatively unpopular, or relatively unpopular among a particular segment (or population) of IPACE members. While another example of rejection data/statistics could reflect that a specific IPACE member "R" has a propensity to reject all terms in general when relatively compared to similar IPACE members with say, relatively similar profiles in skills, fees, experience, office geography, and the like; where this could suggest that the IPACE member "R" may not be a desirable contributor for a particular project, say under a tight deadline, tight budget, and/or the like.

In various non-limiting embodiments, the "Appeal" module in block 373, in general, allows the IPACE member the functionality to manage his/her appeals to decisions, challenges, perceptions, competitions, rejections and/or the like in association with the IPACE Operating Environment. For example, the "Appeal" module could specifically allow a Participant (80) in a particular project to specifically appeal a specific term in an IPACE decision, where allowed, and/or appeal all terms in a decision, where allowed. In addition, specific terms, obligations, duties, project elements, perceptions, competitions, values, and/or stages may be appealed during the progress of the project. For instance, a Patent Attorney (44) participating in a particular project where he/she submitted claims under a competition could "appeal" the Lead Inventor's (40) decision to go with another particular claim or set of claims submitted, where the Patent Attorney (44), would include the grounds for his/her appeal per the rules, terms, and conditions that were pre-established in the IPACE TOU, TOP, PACOR and/or the like.

In various non-limiting embodiments, the appeal is generally done as an identified IPACE member, but depending upon the IPACE TOU, TOP, PACOR and/or the like, the appeal could also be done as an identified Account (60), such as business, corporation, university, law firm and/or the like, where the appealing party is authorized or perceived to be authorized to appeal on its behalf. In addition, the "Appeal" module could specifically track, analyze, and generate reports regarding the specific appeals accepted, partially accepted, conditionally accepted, rejected and relative to a particular project outcome, a particular IPACE Member's obligations, a particular art unit, a particular entity (e.g. company/PIN).

For instance, collected and tracked data/statistics could reflect a propensity for IPACE members to appeal a particular type of perception relative to a particular calculation and to all other perceptions not appealed, which may suggest a particular calculation for that perception and/or perception methodology may need to be revisited for accuracy and goals. While another example of appeal data/statistics could reflect that a specific IPACE court judge "J" has a propensity to receive appeals when relatively compared to similar IPACE court judges, with say, relatively similar cases, factors, and the like; where this data/statistics could suggest that the IPACE court judge "J" may not be rendering decisions procedurally correct for a particular type of case, or that he/she is, while others judges who are not getting nearly as many appeals are not.

From the functionality utilized with these blocks 369, 370, 371, 372, and 373, the logic, rules, and results get pushed to the step 275 where the "Send, Post and/or Synchronize Appropriate Info, Data, Statistics, Data/content, Rules and Terms To Appropriate Parties, Engines, and Modules" is performed and where modules such as the METER management module (126) in block 250 collects all tracking requirements. In addition, the IPACE user may continue utilizing the Dashboard.

Back to the "Rule Engine and Management (128) module in block 252, in general, allows the IPACE member the functionality to manage his/her and/or an Account's (60) Negotiations Management rules in association with the IPACE Operating Environment. In various non-limiting embodiments, the Negotiations Management rules functionality of the "Rule Engine and Management" (128) module, in this limited example, comprises of a "Participant and Participation Requirement" module in a block 374, a "RAOR— Restricted Access Ownership Reserve" module in a block 375, a "PACOR— Project Access and Data/content Ownership Rights" module in a block 376, a "Compensation and/or Equity Related" module in a block 377, a "Barter, Points, and/or Other Benefits" module in block 378, a "Competition Management" module in a block 379, a "Perceptions Management" module in a block 380, a "Legal Management" module in a block 381, a "Substitution Management" module in block 382, a "Tracking Management" module in a block 383, a "Shielding Mgmt." module in block 402, and the "Rule Engine & Mgmt's Assignment Module" in a block 270.

In various non-limiting embodiments, the IPACE member may create negotiation rules from scratch/new, modify existing rules, use existing rules as templates, and/or the like. Negotiation rules may be set to be global negotiation rules, default negotiation rules, override negotiation rules, individual negotiation rules, and/or stair-step negotiation rules. For example, the IPACE member, such as a Patent Attorney (44), may create a conditional global negotiation rule where no offers may be accepted without passing a conflict check. A default negotiation rule could be created for, say where a particular IPACE member, say a Patent Attorney (44), fails to address a pending counter offer within a conditional period of time, that counter offer and alert would also get forwarded to another party, say his/her secretary, partner, and/or the like; when he/she does not specifically state otherwise forwarding alerts.

Starting with the "Participant and Participation Requirements" module in block 374, which is similar, if not the same as the module accessible from the FINANCIALS block 244 and the TIMES block 245. In various non-limiting embodiments, the "Participant and Participation Requirements" module, in general, allows the IPACE member to create/modify rules as to what segments, IDs, and/or the like have permission to view and access Negotiations for say, specific projects, and/or for specific access and functionality per each Account's (60) associated module utilization, either as potential participant, an actual participant, a Contributor (50), a Joint-Inventor/Co-Inventor (41), an Advertiser (57), an Investor (67), an IPACE court member, and/or the like.

Likelihood Of Participation

In various non-limiting embodiments, the IPACE system tracks and analyzes all the information, conditional interactions and/or negotiations to monitor for a perceived relative likelihood of participation, each term agreement, relative current accomplishments per collaboration, relative likelihood of future success, and/or the like, along with areas of potential and/or likely concern for, say funding, resources, other necessary participants, creativity gaps, consumers, publicity, demand, intellectual property rights/control, and/or the like. In various non-limiting embodiments, the IPACE system would preferably display a list of ranked potential and/or likely concerns based up how each relatively compares to the others, where say funding may come first; or relative to others who have similar projects, participants, terms, zones, perceptions, and/or the like, where, say who controls the intellectual property rights is perceived as relatively the biggest concern when compared to, say similar projects with similar participants.

In addition, the IPACE system may track and analyze other concerns before, during and after the negations for, say all the discernible or perceived, potential or likely, current and/or future: conflicts, deal-breakers, confusion/ambiguity, pitfalls, availability/scheduling problems/bottlenecks, personalities conflicts, and/or the like; where the IPACE system may alert the parties where the IPACE system analysis perceives the parties are spending relatively too much or too little time, relatively too few or too many resources, relatively too much or little money, relatively too much or little effort/focus, and/or the like, resolving particular issues when compare to, say similar negotiations for similar projects. In various non-limiting embodiments, the IPACE system would track and analyze historical data regarding how much time, resources, money, effort, focus, and/or the like is typically given per issue; why, where, when, and what issues tend to be relatively quickly or slowly rejected, accepted, counter, require more information, prompt a suggestion, prompt a particular reaction (e.g. a fee for more information), and/or the like.

In various non-limiting embodiments, the IPACE system would track and analyze all the negotiated and accepted terms, parties, potential participants, actual participants, perceptions, accomplishments, and/or the like; searching for any potential conflicts and/or perceived potential issues to notify and warn the appropriate parties. For example, a particular potential PR firm being offered in the term negotiations by a particular "economic and development zone," may actually represent a competitor, where a recipient of such an offer (e.g. the IPACE member/user) may reject the offer, counter offer with that particular potential PR firm removed from the deal and where no data is being shared with that particular potential PR firm, and where the recipient of the offer would like to be notified should the particular potential PR firm cease to represent the competitor, and/or the like.

In various non-limiting embodiments, the "RAOR— Restricted Access Ownership Reserve" module in block 375, is similar, if not the same as the module accessible from the TOP Management block 243. In various non-limiting embodiments, the "RAOR— Restricted Access Ownership Reserve" module, in general, allows the IPACE member to create/modify those RAOR terms, conditions, and rules allowed to be modified by the IPACE system as to who and how someone may conditionally access and interact with the IPACE system in general, to what degree, when, how, and/or like.

In various non-limiting embodiments, the "PACOR— Project Access and Data/content Ownership Rights" module in block 376, is similar, if not the same as the module accessible from the TOP Management block 243. In various non-limiting embodiments, the "PACOR— Project Access and Data/content Ownership Rights" module, in general, allows the IPACE member to create/modify rules as to who may participate or conditionally interact with a particular project in terms of accrediting and establishing Inventorship, assignment, ownership and the like; to what degree, when, how, and/or like.

In various non-limiting embodiments, the "Compensation and/or Equity Related" module in block 377 is similar, if not the same as the module accessible from the TOP Management block 243 and the FINANCIALS block 244. In various non-limiting embodiments, the "Compensation and/or Equity Related" module, in general, allows the IPACE member to create/modify rules as to how potential participants are compensated and/or earn equity, to what degree, when, how, and/or like.

Motivation/Compensation In various non-limiting embodiments, the IPACE system and associated computer-implemented method for prioritizing business budgets per votes from a group, say of current and past customers and employees, where factors such as loyalty and/or tenure may increase your voting power, say on advertising expenditures.

In various non-limiting embodiments, the IPACE system and associated computer-implemented method for motivating timely performance, where say a money countdown appears on screen that counts down until task is completed and where the clock may stop on submission, but may be restarted if considered incomplete, or amount changed and/or added for additional performance and/or changes.

In various non-limiting embodiments, the IPACE system and associated computer-implemented method and where a total amount earned and/or a period bonus may be expressed as say an overall total, an hourly rate for the overall total, or where the hourly rate is for a particular period of time, say the next 24 hours at hand, and/or the like. For example, the rate for an accepted project may be, say 35 US dollars per hour, where that hourly rate could increase or decrease (decay) at some increment amount, say one cent, per some event and/or per some increment of time, say per hour, and/or the like. Further, where the amount could fluctuate based on participation, participants, accomplishments, failures, errors, and/or the like.

In various non-limiting embodiments, the "Barter, Points, and/or Other Benefits" module in block 378 is similar, if not the same as the module accessible from the TOP Management block 243 and the FINANCIALS block 244. In various non-limiting embodiments, the "Barter, Points, and/or Other Benefits" module, in general, allows the IPACE member to create/modify rules as to how potential participants may earn project participation points, status points, Peer (65) points, expertise points, and/or the like; barter services and/or the like; and/or other benefits that may be offered within the IPACE for negotiations; and/or the like.

In various non-limiting embodiments, the "Competition Management" module in block 377 is similar, if not the same as the module accessible from the TOP Management block 243 and the TIMES block 245. In various non-limiting embodiments, the "Competition Management" module, in general, allows the IPACE member to create/modify rules as to who may conditionally participate in competitions, regarding what, to what degree, when, how, and/or like; how competitions are implemented, carried-out, judged/disposed, dispute resolutions, and the like. For example, a particular Negotiation may require participating Patent Attorneys (44) to accept competing for compensation, equity, work-product accepted and the like. For instance, patent claims could be accepted from more than one contributing Patent Attorney (44), but where the equity earned for the claim contributions will be directly dependent upon future monetization/events that are directly attributable to his/her contributed claim/claim elements. In various non-limiting embodiments, if there are a plurality of claims there would be a calculation of the percentage of contribution, say one for the percentage of overall claim element contributions towards a 25% pie, and a percentage of contribution to a claim or a plurality of critical claims for monetization, where a particular contributing Patent Attorney contributed, say 100% or some percentage of the plurality of critical claims for monetization, or some percentage of the elements that make up the plurality of critical claims for monetization; where if he/she were the only contributor he/she would be entitled to the remaining 75%, as well as his/her percentage of the 25% pie.

In various non-limiting embodiments, the IPACE system tracking could incorporate a plurality of critical claim elements, graphs, and/or the like, where the contributor tracking may incorporate contributions counts per contribution.

In various non-limiting embodiments, the "Perceptions Management" module in a block 380 is similar, if not the same as the module accessible from the TOP Management block 243 and the TIMES block 245. In various non-limiting embodiments, the "Perceptions Management" module, in general, allows the IPACE member to create/modify rules as to what, when, who, why perceptions are generated, who may conditionally view and/or conditionally interact with (e.g. argue for/against) either the terms or the perceptions and subsequent perceptions iterations, how, and/or like.

In various non-limiting embodiments, the "Legal Management" module in block 381 is similar, if not the same as the module accessible from the FINANCIALS block 244. In various non-limiting embodiments, the "Legal Management" module, in general, allows the IPACE member the functionality to manage his/her and/or an Account's (60) legal and related interests in association with the IPACE Operating Environment. For example, the "Legal Management" module allows the IPACE member to setup terms regarding such legal and negotiating issues as dispute resolution, dispositions, and/or the like. For example, the dispute resolution terms could provide for utilizing the IPACE Court, a Jury of Peers (65), a Jury of Experts, a at least one arbitrator, a at least one mediator, and/or the like; each independently, collectively, overall, and/or per each potential permutation combination thereof.

For instance, a particular project could state that all disputes, or a particular subset of disputes, shall be heard by Arbitration, where the parties agree to submit their dispute to a neutral third party (typically a retired judge or senior attorney with subject matter expertise) whom they have selected to make either a binding or non-binding decision to resolve their dispute. In various non-limiting embodiments, the terms could also call for an arbitration hearing, which is to be conducted in a manner similar to a short trial where each side presenting their case and may include witnesses. In various non-limiting embodiments, the terms may dictate whether Participants (80) may choose to have attorney representation as well. In various non-limiting embodiments, the terms may dictate how long after the conclusion of each side's case presentation, the arbitrator has to render a decision, say within ten (10) business days from the close of the hearing.

In various non-limiting embodiments, the "Legal Management" module may track offers, contracts, obligations, duties, and/or the like, regarding whether there is known to be, was known to be, discerned to be, and/or how relatively perceived to be known that there is/was an implied contract, expressed contract, executed contract, and/or whether bilateral or unilateral; govern by what law (e.g. state(s)), jurisdictions, venues, and/or the like. In various non-limiting embodiments, the "Legal Management" module may track and analyze each type of condition regarding whether each is known or how relatively perceived to be known, and whether the condition is a condition precedent, a condition concurrent, or a condition subsequent; and the ramifications of each on each party.

Further, the "Legal Management" module allows the IPACE member to setup, track, and analyze each term in each term rule, offer and/or the like for such things as legality, good faith, conformity, ambiguity, terminology consistency, mental capacity, subject matter, proper bargain for exchange, the parole evidence rule, any UCC issues, and/or the like. In addition, the "Legal Management" module allows the IPACE member to setup, track, and analyze any known, or relative perceptions of a breach of contract, breach of conditions, or a potential breach, mutual mistakes, unilateral mistakes, fraud, misrepresentation without fraud, mistake of law, undue influence, duress, specific performance, partial performance, failure to perform, defective performance, delay in performance, and/or the like; and a setup of known and/or potential remedies for each, including whether contracts are void, voidable, allow for divisible contracts and substitutions (e.g. the Substitution Management below), substantial performance, liquidating damages, reformation, rescission, and/or the like.

In various non-limiting embodiments, the "Substitution Management" module in block 382 is similar, if not the same as the module accessible from the TOP Management block 243 and the FINANCIALS block 244.

In various non-limiting embodiments, the "Tracking Management" module in block 383 is similar, if not the same as the module accessible from the TOP Management block 243. In various non-limiting embodiments, the "Tracking Management" module, in general, allows the IPACE member to create/modify rules as to what, where, who, how, and/or the like is conditionally tracked and related interests in association with the IPACE Operating Environment. In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for sending, interrogating, extracting, and tracking electronic notifications, say for proper notification within the terms of an agreement.

In various non-limiting embodiments, the "Rule Engine and Management's Assignment Module" shown in an earlier figure allows the user to assign rules to a variety of objects through segments and IDs. In addition, the IPACE member could navigate to and incorporate other IPACE modules to create, review, modify, and/or assign IPACE rules and/or elements. In various non-limiting embodiments, the "Rule Engine and Management (128)" module in block 252 provides a variety of methods to employ a variety of Boolean operators, thresholds, ranges, weighting, prioritizations, and other rules to the collective measurements and results. In various non-limiting embodiments, the results of the Rule Assignment Management usage and the associated functionality afforded by the option modules appear in a step 271 "Analysis &/or Verify Collective Input/Results." Next, a step 272 is where the IPACE Member may "Preview &/or Test" rule(s).

In various non-limiting embodiments, each new IPACE Campaign (e.g. Project) 236 and/or rule could be set to run against previous IPACE Campaigns 236 and rules in general and Campaign s 236 and rules with Negotiation rules to track and make sure that the new IPACE Campaign 236 and/or rules are in fact performing similarly, or report back that it is off by a quantifiable degree, and make suggested changes based on the area and/or attribute where the new IPACE Campaign 236 and/or rules deviates from methods that are relatively more tried and true, so credit and changes may be suggested and/or made based upon measurable results. New and modified Negotiation Management Rules resulting in IPACE Campaigns (e.g. Projects) for acquiring a Project Participant, say with a particular area of expertise, say for pharmaceutical drug research and an offer to become a Joint-Inventor/Co-Inventor (41) and equity owner, could be run against historical data/statistics to analyze and generate an estimate of the number of active IPACE members that offer would likely attract per using the Preview and/or Test 272 function.

Next, a query 273 asks if the IPACE member would like to either "Continue or Invoke" the rule? If the answer to query 273 is "continue" as in continue utilizing the Dashboard functionality without invoking the rule, then a next step 275 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 273 is instead "invoke" then a step 274 is invoked for the particular rule, then the next step 275 with a "Send, Post and/or Synchronize Appropriate Info, Data, Statistics, Data/content, Rules and Terms To Appropriate Parties, Engines, and Modules" is performed, where the IPACE user may also then continue utilizing the Dashboard.

All of the TOP Terms and Ownership Management module and inputs are generally tracked and measured independently, and collectively as a unit against and relative to a particular Project 236, and/or Project element to measure their effectiveness and success rates against different Project 236 elements, FINANCIALS Rules, Account Rules, Segmentation Rules, TIMES Rules, CREATE Rules, TOP Terms and Ownership Management Rules, METER Rules, IPACE Court Rules, ADSTATS Rules, and Real-time Tracking/Reporting.

Figure 35:
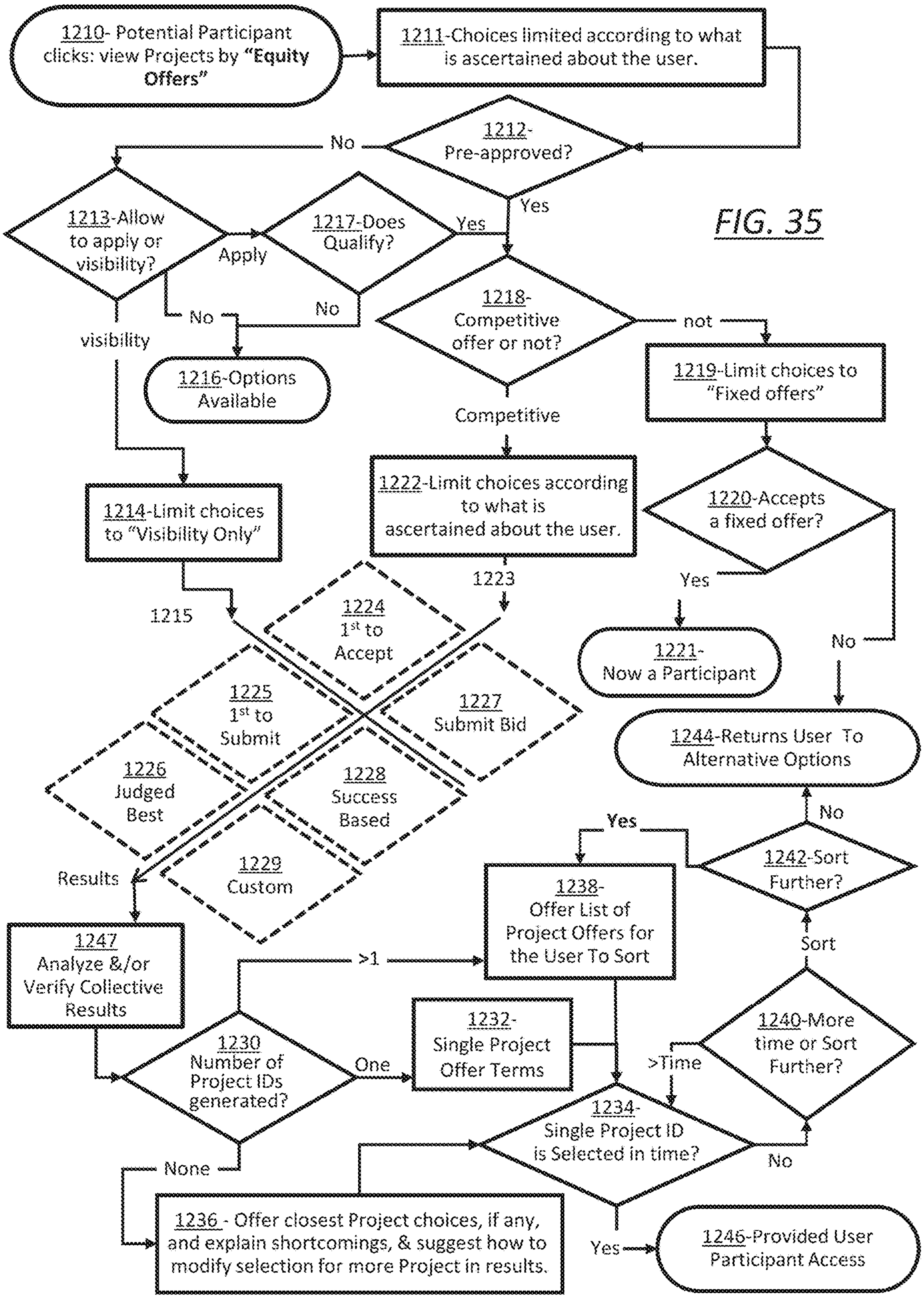
FIG. 35 is a flowchart depicting an example embodiment whereby a Potential Participant views potential Projects to participate in by "Equity Offers."

FIG. 35 is a flowchart depicting an example embodiment whereby a Potential Participant views potential Projects to participate in by "Equity Offers." Starting with a terminator 1210 where a "Potential Participant clicks: view Projects by 'Equity Offers,'" the potential participant views "Choices limited according to what is known by the user" in a step 1211. Here the IPACE system checks to see if the potential participant is "Pre-approved?" in a query 1212.

If the answer to the query 1212 is "no," then the potential participant is passed to a query 1213, which asks "Allow to apply or visibility?" If the answer to query 1213 is "visibility," then the potential participant is passed to a step 1214 where the IPACE system will "Limit choices to 'Visibility Only'" and pass the potential participant to an option pool 1215." If the answer to query 1213 is instead "no," then the potential participant is passed to a terminator 1216 where he/she is sees "Options Available."

If the answer to query 1213 is instead "Apply," then the potential participant is passed to a query 1217 where system determines "Does [he/she] Qualify?" If the answer to query 1217 is "no," then the potential participant is passed to the terminator 1216 where he/she is sees the "Options Available." If the answer to query 1217 is instead "yes," then the potential participant is passed to a query 1218 that asks if it's a "Competitive offer or not?"

If back at query 1212 the answer is instead "Yes" where the potential participant was "Pre-Approved," then he/she is also passed to the query 1218. If the answer to query 1218 is "Not," then the potential participant is passed to a step 1219 where the IPACE system provides "Limit choices to 'Fixed Offers'" to the potential participant. A query 1220 asks if the potential participant "Accepts a fixed offer?" and if the answer to query 1220 is "yes," then the potential participant is now a participant as in a terminator 1221 "Now a Participant." If the answer to query 1220 is instead "no," then the potential participant is passed to a terminator 1244 where the IPACE system "Returns User To Alternative Options."

If the answer to back at the query 1218 is instead "competitive," then the IPACE system will "Limit choices according to what is known about the user" in a step 1222 before passing the potential participant to an option pool 1223. In various non-limiting embodiments, the option pool 1223 (and same 1215 for clarity/visibility only) comprises a list of options where the IPACE system offers and/or or tracks potential participants, and in this example: "Projects with Equity Offers" where he/she may be conditionally and/or relatively compared to others regarding, say who was/is: "1st to Accept" an offer, project, portion of a project, equity-offer, and/or the like in an option 1224; similarly in a "1st to Submit" option 1225; a "Judged Best" option 1105; and/or conditionally based upon a bid in a "Submit Bid" option 1227; a "Success Based" option 1228; and/or a customizable option 1229 "Custom." In various non-limiting embodiments, the collective offer selections made by the potential participant generate a "Results" that the IPACE system sends to a step 1247 where the IPACE system "Analyze &/or Verify Collective Results." Next, the process proceeds to a query 1230, which asks for "Number of Project IDs Generated?"

If the answer to query 1230 is "None," then the IPACE system passes the potential participant to a step 1236 where the IPACE system may generate an "Offer closest Project choices, if any, and explain shortcomings, and suggest how to modify selection for more Project in results." If the answer to query 1230 is instead greater than one as in ">1," then the IPACE system passes the potential participant to a step 1238 where he/she is provided an "Offer list of Project Offers for the User To Sort" where the potential participant may select a single project. If the answer to query 1230 is instead "one," then the IPACE system passes the potential participant to a step 1232 where the IPACE system displays a "Single Project Offer Terms" where the user may accept or reject the offer.

A query 1234 "asks if a "Single Project ID is selected in time?" and if the answer to query 1234 is "no," then the IPACE system passes to a query 1240, which asks if the user would like "More time or [to] sort further?" If the answer to query 1240 is more time as in ">Time," then he/she conditionally provided more time and back to the query 1234. If the answer to query 1240 is instead sort offers further, then he/she is passed to a query 1242 to "sort further?" If the answer to query 1242 is "no" then he/she is passed to a terminator 1244 where the IPACE system "Returns User To Alternative Options."

If the answer to query 1242 is instead "yes" where he/she would like to sort offers further, then the IPACE system passes the potential participant to the step 1238 with the "Offer list of Project Offers for the User To Sort." If the answer to query 1234 is instead "yes," where the potential participant has selected a single project ID in time, then the IPACE system passes him/her to a terminator 1246 where he/she is "Provided User Participant Access."

Note that in this embodiment the term "potential participant" implies that he/she has yet to accept an offer to participate in a particular project or particular portion of a project. For example, the "potential participant" may be an active Participant (80) on another project, on another portion of same particular project, on same portion of the same project—but under other terms, and/or the like; and is being provided an offer or range offer options to participate in a particular project or range of projects that satisfy his/her currently known role, permissions, his/her offer search criteria/selections and/or project availability, and with "equity" in this particular example.

In various non-limiting embodiments, the Patent Attorneys (44) and other Members such as Diagram Draftspersons (54) could select specific industries, Inventors (70), Project Managers (43), and/or patent applications that they would like to stay abreast of should a new offer be created. In addition, these Members may also request alerts for when a pending offer is improved or passes a certain threshold, such as a set fee paid per issued claim.

In various non-limiting embodiments, a new user to the IPACE-UI (e.g. website or application) could register as a new Member, the IPACE-UI (e.g. website or application). In various non-limiting embodiments, the IPACE system would offer a variety of roles and rules that the Member may participate under, such as, join as (and potentially specify):

1) In various non-limiting embodiments, an Inventor
a) In various non-limiting embodiments, a First-time Inventor
(i) Lead Inventor (40) or (ii) Joint-Inventor/Co-Inventor (41)
b) In various non-limiting embodiments, an inventor with existing patent applications pending
i) In various non-limiting embodiments, the number of pending applications
(1) In various non-limiting embodiments, the number of prior art references (done by Inventor or others)
(2) In various non-limiting embodiments, the number of diagrams (done by Inventor or others)
(3) In various non-limiting embodiments, the number of claims (done by Inventor or others)
c) In various non-limiting embodiments, an inventor with existing patents issued
i) In various non-limiting embodiments, the number of issued patents
(1) In various non-limiting embodiments, the number of prior art references (done by Inventor or others)
(2) In various non-limiting embodiments, the number of diagrams (done by Inventor or others)
(3) In various non-limiting embodiments, the number of claims (done by Inventor or others)
ii) In various non-limiting embodiments, the number of pending applications
(1) In various non-limiting embodiments, the number of prior art references (done by Inventor or others)
(2) In various non-limiting embodiments, the number of diagrams (done by Inventor or others)
(3) In various non-limiting embodiments, the number of claims (done by Inventor or others)
2) In various non-limiting embodiments, a Draftsperson (54)/Patent Diagram Drafter
a) In various non-limiting embodiments, an individual who does patent diagram drafting
i) In various non-limiting embodiments, the number of issued patents with diagrams drawn
ii) In various non-limiting embodiments, the number of pending applications with diagrams drawn
b) In various non-limiting embodiments, someone who is a licensed engineer for diagram drafting
i) In various non-limiting embodiments, the number of issued patents with diagrams drawn
ii) In various non-limiting embodiments, the number of pending applications with diagrams drawn
3) In various non-limiting embodiments, Prior Art Searcher/(e.g. Researcher (58))
a) In various non-limiting embodiments, an n individual who has done prior art searches
i) In various non-limiting embodiments, the number of issued patents with prior art stated
ii) In various non-limiting embodiments, the number of pending applications with prior art stated
b) In various non-limiting embodiments, someone who has done prior art searches professionally i) In various non-limiting embodiments, the number of issued patents with prior art stated
ii) In various non-limiting embodiments, the number of pending applications with prior art stated
4) In various non-limiting embodiments, a Patent Specification and Abstract Drafter (e.g. Lead Inventor (40), Joint-Inventor/Co-Inventor (41), Patent Attorney (44), Patent Agent (45), and the like).
a) In various non-limiting embodiments, an inventor who has drafted his/her own specifications
i) In various non-limiting embodiments, the number of issued patents (and claims)
ii) In various non-limiting embodiments, the number of pending applications (and claims)
b) In various non-limiting embodiments, someone who is a PTO-registered Patent Agent (45)
i) In various non-limiting embodiments, the number of issued patents (and claims)
ii) In various non-limiting embodiments, the number of pending applications (and claims)
c) In various non-limiting embodiments, someone who is a PTO-registered Patent Attorney (44) (name the state (s))
i) In various non-limiting embodiments, the number of issued patents (and claims)
ii) In various non-limiting embodiments, the number of pending applications (and claims)
d) In various non-limiting embodiments, someone who is a Patent Attorney (44) registered in another country (name the country(s))
i) In various non-limiting embodiments, the number of issued patents (and claims)
ii) In various non-limiting embodiments, the number of pending applications (and claims
5) In various non-limiting embodiments, Patent Claims Specialist
a) In various non-limiting embodiments, an inventor who has drafted his/her own claims
i) In various non-limiting embodiments, the number of claims drafted in issued patents
ii) In various non-limiting embodiments, the number of claims drafted pending applications
b) In various non-limiting embodiments, someone who is a PTO-registered Patent Agent (45)
i) In various non-limiting embodiments, the number of claims drafted in issued patents
ii) In various non-limiting embodiments, the number of claims drafted pending applications
c) In various non-limiting embodiments, someone who is a PTO-registered Patent Attorney (44) (name the state (s))
i) In various non-limiting embodiments, the number of claims drafted in issued patents
ii) In various non-limiting embodiments, the number of claims drafted pending applications
d) In various non-limiting embodiments, someone who is a Patent Attorney (44) registered in another country (name the country(s))
i) In various non-limiting embodiments, the number of claims drafted in issued patents
ii) In various non-limiting embodiments, the number of claims drafted pending applications
6) In various non-limiting embodiments, a Project Manager (43)
a) Who is:
i) In various non-limiting embodiments, an individual and has no PTO-registration
ii) In various non-limiting embodiments, an Inventor
iii) In various non-limiting embodiments, an Engineer
iv) In various non-limiting embodiments, a Patent Agent (45)
v) In various non-limiting embodiments, an Attorney (but not a PTO-registered Patent Attorney)
vi) In various non-limiting embodiments, a PTO-registered Patent Attorney (44)
(1) In various non-limiting embodiments, Patent Application Expert
(2) In various non-limiting embodiments, Patent Prosecution (71) Expert
(3) In various non-limiting embodiments, Patent Licensing Expert
(4) In various non-limiting embodiments, Patent Litigation Expert
b) In various non-limiting embodiments, the number of Inventors (70) worked for
i) In various non-limiting embodiments, the number of issued patents where work was performed
(1) In various non-limiting embodiments, the number of prior art references
(a) In various non-limiting embodiments, Overseen by Project Manager (43)
(i) In various non-limiting embodiments, From Inventor
(ii) In various non-limiting embodiments, From Project Manager (43)
(iii) In various non-limiting embodiments, From Others
(2) In various non-limiting embodiments, the number of diagrams
(a) In various non-limiting embodiments, Overseen by Project Manager (43)
(i) In various non-limiting embodiments, From Inventor
(ii) In various non-limiting embodiments, From Project Manager (43)
(iii) In various non-limiting embodiments, From Others
(3) In various non-limiting embodiments, the number of claims (done by Inventor or others)
(a) In various non-limiting embodiments, Overseen by Project Manager (43)
(i) In various non-limiting embodiments, From Inventor
(ii) In various non-limiting embodiments, From Project Manager (43)
(iii) In various non-limiting embodiments, From Others
ii) In various non-limiting embodiments, the number of pending applications
(1) In various non-limiting embodiments, the number of prior art references
(a) In various non-limiting embodiments, Overseen by Project Manager (43)
(i) In various non-limiting embodiments, From Inventor
(ii) In various non-limiting embodiments, From Project Manager (43)
(iii) In various non-limiting embodiments, From Others
(2) In various non-limiting embodiments, the number of diagrams
(a) In various non-limiting embodiments, Overseen by Project Manager (43)
(i) In various non-limiting embodiments, From Inventor
(ii) In various non-limiting embodiments, From Project Manager (43)
(iii) In various non-limiting embodiments, From Others
(3) In various non-limiting embodiments, the number of claims (done by Inventor or others)
(a) In various non-limiting embodiments, Overseen by Project Manager (43)

(i) In various non-limiting embodiments, From Inventor
(ii) In various non-limiting embodiments, From Project Manager (43)
(iii) In various non-limiting embodiments, From Others In various non-limiting embodiments, additional information during new member registration, such as:

1) In various non-limiting embodiments, whether the Member currently is licensed or belongs to a specific entity, club, or group:
a) Bar Association
i) State
b) Patent Bar
i) State
c) Company
i) Is there an existing Assignment of Invention
ii) Is this a Law Firm
d) Bureau
i) Patent search
e) USPTO
f) PCT
g) Other filing entity (EPC, WPO, etc.)
h) Private patent inventor club, entity or club
2) In various non-limiting embodiments, whether the Member wants to belong to a specific entity, club, or group:
a) Company
i) Assignment of Invention
(1) Existing
(2) For certain materials (see further below)
ii) Law firm
b) Bureau
i) Patent search
c) Private patent inventor club, entity or club In various non-limiting embodiments, when an Inventor registers to join the private network (e.g. PIN), the Inventor is also accepting the terms of use and privacy policies set by the specific group that they join. Some groups may simply be the company the Inventor works for, where part of the rules state the existence or creation of the assignment of any Invention submitted by the Inventor to the company he/she works for currently.

3) In various non-limiting embodiments, some groups may be made up of private clubs where Inventors (70) are free to decide such things as:
a) In various non-limiting embodiments, Inventors (70) who may or cannot participate in the private online club
i) Criteria
ii) If by invitation only
iii) Rules and/or violations for removal from the club
b) In various non-limiting embodiments, the equity stake that the club takes in every submitted invention
i) Amount per invention
ii) and/or on a case by case criteria-basis
c) In various non-limiting embodiments, what Non-Inventors may participate
(1) Project Manager (43) Members
(2) Prior Art Search Members
(3) Diagram Drafters
(4) Specification and Abstract Drafters
(5) Claim Drafters
(6) Prosecution Experts
(7) Patent Licensing Experts
(8) Patent Litigation Experts
d) In various non-limiting embodiments, what rates or range of rates the club will accept from Non-Inventor Members
e) In various non-limiting embodiments, whether Inventor applications may be submitted for only an equity stake participation and no fees
f) In various non-limiting embodiments, material that becomes assigned to the club
i) In various non-limiting embodiments, all materials after membership is approved
(1) With ownership participation earned based on materials submitted
(2) With ownership participation earned based on quantity of materials submitted that are in issued patent
(3) With ownership participation earned based on the specific author of the specification section(s), drawing (s), and claim(s) cited in a licensing agreement, and/or litigation judgment
ii) All materials after short descriptions of invention is accepted
iii) All materials owned by Inventor, less any ownership granted through the club
g) In various non-limiting embodiments, whether the entity, club or group, allow for Inventors (70) to collaborate on other Inventor's (70) Patent application
i) For all members
ii) For certain members, based on preset criteria or objectives In various non-limiting embodiments, section (3*g*) above allows Inventors (70) to accept material that expands the scope of the particular invention from other Inventors (70). In various non-limiting embodiments, these Members will be listed as Joint-Inventor/Co-Inventors (41) on the patent application and must pre-agree to the terms of both the club and the Inventor who is the originator of the particular Invention before participating in the development of the patent application, whether his/her material is used or not, found to be material or not, ends up in the approved and issued patent or not.

In various non-limiting embodiments, a group, such as a company, where there is already is an established assignment of invention between the company and the Employees (55), the company may invite known Inventors (70) within the company to participate in their private network (e.g. PIN) for timely and efficiently creating patent applications on behalf of the company. In various non-limiting embodiments, the IPACE system keeps track of which Inventors (70) contribute what materials. If additional materials are needed from other Employees (55), then the company needs to add these Employees (55) as Inventors (70) (or Joint-Inventor/Co-Inventors (41)) to the private network (e.g. PIN).

In various non-limiting embodiments, the IPACE system helps keep track of what Inventor contributed what to the particular invention. In various non-limiting embodiments, the company may setup a bonus program or performance pay plan for those participate in the filing of the patent application. Those fees may be based on a range of factors, such as:

1) In various non-limiting embodiments, the actual hours contributed in
a) Creating the particular invention
b) Helping draft the application
c) Helping prosecute the application with the USPTO office
d) Licensing the issued patent
e) Litigating the issued patent
2) In various non-limiting embodiments, the above hours based on a percentage of the entire hours by the group 3) In various non-limiting embodiments, those contributed parts that actually
a) Get filed
b) Get issued
c) Become relatively material in a licensing agreement
d) Become relatively material in a litigation proceeding and settlement
4) In various non-limiting embodiments, those above items based on a percentage of the entire project by the group or based on a percentage of the entire fees collected in a licensing deal or litigation settlement C.R.E.A.T.E. —"Collaboration, Review, and Exchange of Art and Technology Engine" Management (120) module The present disclosure will now advance the C.R.E.A.T.E. ("Collaboration, Review, and Exchange of Art and Technology Engine") Management (120) module which is referred to in some embodiments of this disclosure as the CREATE or CREATE module. Broadly speaking, the CREATE does the following. It's an information exchange collaboration platform relative to a plurality of users to identify a relationship between each specific user and each specific input/output; it classifies and indexes each specific I/O/PC according to a I/O/PC classification; it classifies and indexes each specific I/O/PC relative to each specific user according to at least one role classification; and it evaluates each specific communication relative to a creation goal, wherein the creation goal generates a creation profile relative to each specific user.

In various non-limiting embodiments, the CREATE (information exchange collaboration platform) allows for the creating, collaborating, reviewing, and exchanging of art and technology. In various non-limiting embodiments, the CREATE comprises sub-modules including the IPSocket, IdeaSocket, 1$^{st}$2Report, 1$^{st}$2Publish, 1$^{st}$2Predict, 1$^{st}$2efile modules (as explained earlier and herein) for delineating and classifying types of creative works, collaborations, exchanges, resources, participants, and/or the like. For example, an instance of the IPSocket module is for developing a patent application (where collaboration, may or may not be necessary), whereas an instance of the IdeaSocket is for creating art which may in turn into a patentable or trademark-able product, service, object, company, and/or the like.

Figure 36:
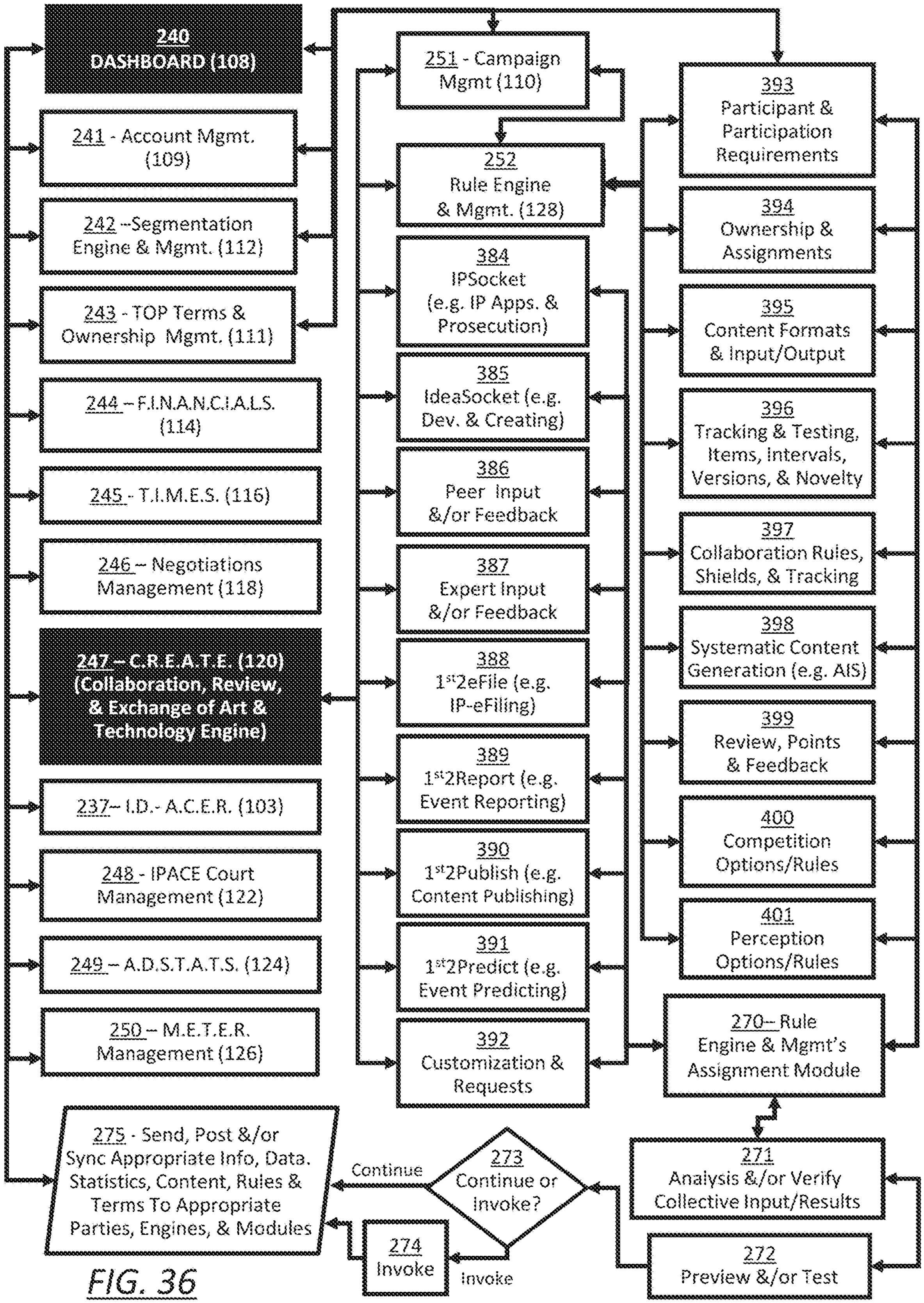
FIG. 36 is a block diagram with some flow charting steps depicting a non-limiting embodiment of the IPACE member's functionality from the C.R.E.A.T.E. ("Collaboration, Review, and Exchange of Art and Technology Engine") Management (120) module.

FIG. 36 is a block diagram with some flow charting steps depicting an embodiment of the IPACE member's functionality from the C.R.E.A.T.E. Management (120) module. Starting with the Dashboard (108) in the block 240, where similar to the TOP Terms and Ownership Management figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of the C.R.E.A.T.E. ("Collaboration, Review, and Exchange of Art and Technology Engine" (120) module has to have a role, and/or at least equivalent to the same permissions required to be a CREATE Mgr. In various non-limiting embodiments, the CREATE Mgr. utilizes the CREATE (120) module to view, review, create and/or modify criteria requirements or rules generally related to negotiations and/or similar element (e.g. accepting, rejecting, countering, appealing) for a particular Project or Project element to be used in, say a particular P.A.C. (104) and/or a particular P.I.N. (106).

In various non-limiting embodiments, the Dashboard functionality in this "C.R.E.A.T.E." focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "C.R.E.A.T.E." (120) module in a block 247, the "ID-ACERS" (103) module in a block 237, the "IPACE Court Management" (122) module in a block 248, the "ADSTATS" (124) module in a block 249, the "METER Management" (126) (including Knowledge Management) module in a block 250, the "Campaign Management" (e.g. Project Management) (110) module in a block 251, and the "Rule Engine and Management" (128) module in a block 252.

From the block 247, the "C.R.E.A.T.E. (Collaboration, Review and Exchange of Art and Technology Engine)" functionality in this limited example embodiment comprises of an "IPSocket (e.g. IP Apps. and Prosecution)" module in a block 384, an "IdeaSocket (e.g. Dev. and Creating)" module in a block 385, a "Peer Input and/or Feedback" module in a block 386, an "Expert Input and/or Feedback" module in a block 387, an "1$^{st}$2eFile (e.g. IP-eFiling)" module in a block 388, a "1$^{st}$2Report (e.g. Event Reporting)" module in a block 389, a "1$^{st}$2Publish (e.g. Data/content Publishing)" module in a block 390, a "1$^{st}$2Predict (e.g. Event Predicting)" module in a block 391, a "Historical and State Views" module in a block 391, and a "Customization and Requests" module in a block 392.

In various non-limiting embodiments, the "IPSocket (e.g. IP Apps. and Prosecution)" module in a block 384, in general, allows the IPACE member the functionality to manage his/her and/or an Account's (60) data/statistics and/or terms on IP related projects in association with the IPACE Operating Environment. For example, the "IPSocket (e.g. IP Apps. and Prosecution)" module could specifically initiate a project and/or track, analyze, and generate reports regarding any existing projects with patent preparations, patent application, patent prosecution, patent continuations, patent appeals (and similar for trademarks) and/or the like; per say, a project, per a time period, per an IPACE Account (60), per a Joint-Inventor/Co-Inventor (41), per a segment, and/or the like, or overall. In various non-limiting embodiments, the IPSocket 384 module is for creative campaigns/projects, where typically the objective is Intellectual Property development, creation, monetization, and/or where protection is involved, sought, and/or created (namely Patent and Trademark development, invention/inventorship-tracking, applications, prosecution, IP monetization, licensing, litigation, protection, insurance, and the like).

In various non-limiting embodiments, the "IPACE Court Participant" module in a block 385, in general, allows the IPACE member the functionality to manage his/her and/or an Account's (60) data/statistics and/or terms on the IP Court in association with the IPACE Operating Environment. For example, the "IPACE Court Participant" module could specifically initiate an IPACE case and/or track, analyze, and generate reports regarding any existing case with patent preparations, patent application, patent prosecution, patent continuations, patent appeals (and similar for trademarks, copyright materials, and/or the like); per say, a project, per a time period, per an IPACE Account (60), per a Joint-Inventor/Co-Inventor (41), per a segment, and/or the like, or overall.

In various non-limiting embodiments, the "Peer Input and/or Feedback" module in a block 386, in general, allows the IPACE member the functionality to manage his/her and/or an Account's (60) data/statistics and/or terms on defining and tracking Peers (65) related to IPACE projects in association with the IPACE Operating Environment. For example, the "Peer Input and/or Feedback" module could specifically invite Peers (65) with a particular definition to a project and/or track, analyze, and generate reports regarding any existing projects with Peer (65) Input and/or Feedback towards, say patent preparations, patent application, patent prosecution, patent continuations, patent appeals (and similar for trademarks, copyright materials, and/or the like); per say, a project, per a time period, per an IPACE Account (60), per a Joint-Inventor/Co-Inventor (41), per a segment, and/or the like, or overall. In various non-limiting embodiments, the Peer (65) Input and/or Feedback could also be sent anonymously to the IPACE member, where the Peer (65) meets a particular criteria, but may not want and/or need to reveal his/her identity. Further, the Peer (65) Input and/or Feedback may include feedback on Participants (80), entities, deadlines, and/or materials, and does not have to specifically involve IP-related projects, materials, IPACE members, and/or Participants (80).

In various non-limiting embodiments, the "Expert Input and/or Feedback" module in a block 387, in general, allows the IPACE member the functionality to manage his/her and/or an Account's (60) data/statistics and/or terms on defining and tracking Experts (75) related to IPACE projects in association with the IPACE Operating Environment. For example, the "Expert Input and/or Feedback" module could specifically invite Experts (75) with a particular definition to a project and/or track, analyze, and generate reports regarding any existing projects with Expert Input and/or Feedback towards, say patent preparations, patent application, patent prosecution, patent continuations, patent appeals (and similar for trademarks, copyright materials, and/or the like); per say, a project, per a time period, per an IPACE Account (60), per a Joint-Inventor/Co-Inventor (41), per a segment, and/or the like, or overall. In various non-limiting embodiments, the Expert Input and/or Feedback could also be sent anonymously to the IPACE member, where the Expert meets a particular criteria, but may not want and/or need to reveal his/her identity. Further, the Expert Input and/or Feedback may include feedback on Participants (80), entities, deadlines, and/or materials, and does not have to specifically involve IP-related projects, materials, IPACE members, and/or Participants (80).

Computer-Implemented Expert Searching

In various non-limiting embodiments, the IPACE system and the computer-implemented method isolates and/or compares key expert reviews from a mass collection and/or gives more weight to those Experts (75) with, say more proven experience and/or previous quantifiable accuracy. In various non-limiting embodiments, the IPACE system would preferably provide the user an ability to conditionally adjust the algorithm utilized in the calculation(s) and conditions.

Computer-Implemented Experts

Expertise (e.g. Experts) has been said to come from those who know the exceptions to the rules. In various non-limiting embodiments, the IPACE system and the computer-implemented method track exceptions to rules, along with which member found the exception. Other members may vote on the value and/or merits of the user's noted exception. In various non-limiting embodiments, the IPACE system may incorporate the exception into its algorithms to continually improve the system's ability to track, analyze, generate and search, for correlations, and/or the like.

In various non-limiting embodiments, the IPACE system and the computer-implemented method would also search for anomalies and exceptions to the rules, say as to a patent that becomes relatively valuable, but breaks typically rules, say few referenced citations and/or the like. In various non-limiting embodiments, the IPACE system may incorporate the exceptions into its algorithms to continually improve its ability to track, analyze, generate, and search, correlations, and/or the like.

In various non-limiting embodiments, the "IdeaSocket (e.g. Development and Creating)" module in a block 388, in general, allows the IPACE member the functionality to manage his/her and/or an Account's (60) data/statistics and/or terms on projects in association with the IPACE Operating Environment, where the data/content is not initially geared towards creating a patent or trademark application. In various non-limiting embodiments, the "IdeaSocket (e.g. Development and Creating)" 388 module could specifically initiate a project and/or track, analyze, and generate reports regarding any existing projects, where input such as data/content, and/or materials may support, produce, and/or evolve into copyright/able materials, trademarks, patents, and/or the like Intellectual Property, but where the data/content and/or the campaign/project is typically not specifically organized for such an object/purpose. For example, the "IdeaSocket (e.g. Development and Creating)" 388 module could be utilized to initiate a project to create and/or collaborate on creating a song with other musical artists, song-writers, and/or singers; on creating a movie screenplay with co-writers, actors and/or directors; on creating a slide presentation with co-workers, designers, and/or clients; on creating a home or office floor plan with a family-member, Contractors (56), and/or an architect; on creating a video game with a co-developer, graphic artist, and/or game-producer; on creating a website with a co-designer, writer, and/or company partner; on creating a calendar/layout with a graphic artist, photographer, and/or model; on creating a comedic performance with other comedians, defined-Peers (65), and/or critics; and/or the like. In various non-limiting embodiments, the data/content may be tracked per project, per a time period, per an IPACE Account (60), per a particular Contributor (50), per a particular participant, per a segment, and/or the like, or overall.

In an embodiment of the CREATE module, there is computer-implemented collaboration method for extracting, classifying, mapping, electronically storing, tracking, and analyzing input, where the input may go beyond intellectual property filings, prosecution, and enforcement to including computer input in-general. When someone spends time working on something, such as typing up a document on a particular topic or researching online with a search engine, he/she is often doing a task that has been completely or at least partially done by someone else in the past. For example, if an Employee (55) who worked in the Human Resources department of a company typed up a document that was a job offer letter to a job candidate for a job opening, that type of offer letter has been created before and in the past it has been up to each individual to know where the pre-existing similar documents are located.

These similar documents, that if found in a reasonable amount of time, may save time redrafting a new document from scratch. These pre-existing documents may be randomly located on someone's computer, a computer network, and/or on removable storage media. The problem is that it is often up to the new document creator to try and find the pre-existing examples.

Some organizations and/or companies have developed knowledge database systems that store information into categories and/or use keywords for others to later reference when searching for existing materials or research. However, for new Employees (55) or people not familiar with the systems schema, keyword tagging and/or categorizing conventions, it may sometimes take longer finding the relevant materials than creating the document or doing the research from scratch.

What's needed is a method to start performing the work, while a system works in the background tracking and displaying how many existing documents in the IPACE system contain similar and/or exact materials. Using the "job offer letter to a candidate" example, a Human Resources Employee (55) could type up the offer letter and also see a display showing the count of existing documents containing similar or exact terms. These existing documents would also list where the documents are located and when each was created. Even if the Human Resource Employee (55) decided to maintain his/her original document, he/she could benefit by learning how and where the company has stored similar documents in the past, and consequently, saving time deciding where to store this new document by using the existing naming conventions previously employed.

For example, some organizations and/or companies try to store all documents and materials by creating delineations relevant to each particular client and/or each project, but creating unique file folders on the file server bearing that client's name and/or project. Whereas other companies may prefer to store documents by department and then have subcategories of clients, subjects and/or what software was utilized to create the document. Even if the Employee (55) is familiar with the naming convention system, he/she may abbreviate a client's name differently and therefore stores client relevant documents in a different folder than other Employees (55).

With the system, the new Employee (55) has the ability to see existing documents containing similar terms or phrases, e.g. "XYZ company would like to make you [or X] an offer for the following IT position . . . " and the location of the document(s) within current filing system, e.g. most similar documents found in main server folder at: "MainServer/HumanResources/JobCandidates/IT/ . . . "

A relatively new Employee (55) may see existing documents to retrieve and compare his/hers document against. Should he/she end up giving up on creating a new document and simply modify an existing document, then the IPACE system may store that information, as well as the date times of both the original, when the document was last modified, by whom, for what purpose, client, category, and any meta-tagging/keywords he/she would like to add, such as the job candidate's name.

This capability of comparing new documents as they are created against existing documents may extend beyond documents created by word processor programs to virtually any work created on a computer and/or recorded to a storage medium, such as audio or video, as well the network may be as small as a single PC storage device to as large as all data within a network, such as the World Wide Web.

For practical purposes, the IPACE system would search for unique keywords with in a new document while the Employee (55) was working, so that the Employee (55) was not being held back while a search was being performed. Over the course of time, an Employee (55) would learn to limit the amount of material being searched to particular areas such as limit search to a particular: network, division, subject, category(s), client(s), project(s), department(s), employee(s), product(s), service(s), location(s), time-frame(s), related resource(s), conditions, etc.

Using the job candidate offer created by the new Employee (55), he/she would eventually learn where these types of documents are typically stored and speed up the associated search by limiting future "job offer" searches to the particular delineations and/or categories being used by the company under "Human Resources/Job Candidates."

In various non-limiting embodiments, the "1$^{st}$2Report (e.g. Event Reporting)" module in a block 389, in general, allows the IPACE member the functionality to manage his/her and/or an Account's (60) data/statistics and/or terms on News Reporting and related projects in association with the IPACE Operating Environment. In various non-limiting embodiments, the "1$^{st}$2Report (e.g. Event Reporting)" 389 module could specifically initiate a report/project and/or track, analyze, and generate data/statistics-reports regarding any existing projects, where input, such as data/content, and/or materials may support, produce, and/or evolve into copyright/able materials, trademarks, patents, and/or the like Intellectual Property, but where the data/content and/or the campaign/project is typically for reporting on News Events.

For example, the "1$^{st}$2Report (e.g. Event Reporting)" 389 module could be utilized to report (as a project) on a news event, where the IPACE system tracks who reported what, when, where, how, with what data/content, and with what degree of accuracy based-upon validations, and/or subsequent Reporters (63) who write similar and/or contrary material where both are comparably analyzed for accuracy at the time, and, over-time, where more data/statistics and/or facts come to light. Further, the 1$^{st}$2Report data/content may be tracked per project ID; per story title; per parties named in the story; per a time period of when the event was said to occur; per a time period of when the report was filed; per reported event location; per Reporter's (63) location; per items reported as subjective versus facts and the like; per an IPACE reporting account; per a particular Contributor (50) (e.g. witness, photographer, and/or the like); per a particular participant/Reporter (63); per a segment (e.g. segmentation module), per popularity per each segment; and/or the like, or overall. In various non-limiting embodiments, the IPACE system tracks and scores all Participants (80) based upon who reported measurably and comparatively earlier, relatively more accurately, and/or the like.

In various non-limiting embodiments, the "1$^{st}$2Publish (e.g. Data/content Publishing)" module in a block 390, in general, allows the IPACE member the functionality to manage his/her and/or an Account's (60) data/statistics and/or terms on Data/content Publishing and related projects in association with the IPACE Operating Environment. In various non-limiting embodiments, the "1$^{st}$2Publish (e.g. Data/content Publishing)" 390 module could specifically initiate a publishing of a selected data/content and/or tracks, analyze, and generate data/statistics-reports regarding any consumption, where input, such as data/content, modifications, and/or materials may support, produce, and/or evolve into copyright/able materials, trademarks, patents, and/or the like Intellectual Property, but where the data/content and/or the campaign/project is typically for reporting on Data/content Publishing.

In various non-limiting embodiments, the "1$^{st}$2Predict (e.g. Event Predicting)" module in a block 391, in general, allows the IPACE member the functionality to manage his/her and/or an Account's (60) data/statistics and/or terms on Event Predicting and related projects in association with the IPACE Operating Environment. In various non-limiting embodiments, the "1st2Predict (e.g. Event Predicting)" 391 module could specifically initiate a prediction/project and/or track, analyze, and generate reports regarding any existing projects, where input, such as data/content, and/or materials may support, produce, and/or evolve into copyright/able materials, trademarks, patents, and/or the like Intellectual Property, but where the data/content and/or the campaign/project is typically for predicting events and/or the like.

For example, the "1st2Predict (e.g. Event Predicting)" 391 module could be utilized to predict (as a project) a particular event, such as a sporting event, contest, award show, and/or the like; along with other associated event element delineations, such as a relatively degree of success, score per team, participant, and/or the like; where the IPACE system tracks who predicted what, when, where, how, with what associated event elements, and with what degree of accuracy based-upon validations, and/or subsequent predictions who predict similar and/or contrary predictions where each prediction is comparably analyzed for accuracy at the time, and over-time, where more data/statistics and/or facts come to light. Further, the 1st2Predict prediction and associated event element delineations may be tracked per project ID; per event; per parties named in the predicted event; per a time period of when the event occurred; per a time period of when the prediction was filed; per predicted event location; per predictor's location; per each associated event element delineations and degrees of success and the like; per an IPACE predicting account; per a particular Contributor (50) (e.g. witness, photographer, and/or the like); per a particular participant/Predictor (62); per a segment (e.g. segmentation module), per popularity per each segment; and/or the like, or overall. In various non-limiting embodiments, the IPACE system tracks and scores all Participants (80) based upon what predictions were measurably and comparatively earlier, relatively more accurately, and/or the like.

In various non-limiting embodiments, the "Customization and Requests" management module in block 392, in general, allows the IPACE member the functionality to create customizable rules, elements, and the like, or create/modify requests for features and functionality.

Back to the "Rule Engine and Management" (128) module in block 252, in general, allows the IPACE member the functionality to manage his/her and/or an Account's (60) CREATE (120) rules in association with the IPACE Operating Environment. In various non-limiting embodiments, the CREATE Management rules functionality of the "Rule Engine and Management" (128) 252 module in this limited example embodiment comprises of a "Participant and Participation Requirement" module in a block 393, an "Ownership and Assignments" module in a block 394, a "Data/content Formats and Input/Output" module in a block 395, a "Tracking and Testing, Items, Intervals, Versions, and Novelty" module in a block 396, a "Collaboration Rules, Shields, and Tracking" module in a block 397, an "Systematic Data/content Generation (e.g. AIS 195)" module in a block 398, a "Review, Points and Feedback" module in a block 399, a "Competition Options/Rules" module in a block 400, a "Perception Options/Rules" module in a block 401, and the "Rule Engine & Mgmt's Assignment Module" in a block 270.

Saving A Variety Of Formats And Versions

In various non-limiting embodiments, the IPACE system may save a data/content, documents, figures, images, spreadsheets, and/or the like in a variety of formats, versions and with a variety of page inclusions/exclusions. For instance, when saving a document the IPACE system would allow a user to save it in a variety of formats, such as a PDF, Word® 2003 Version®, and/or a Word® 2007® via check boxes indications, without having to redo the process after saving the previous version by re-clicking "save," "save as" or similar, say three (3) times. In addition, the IPACE system may save a variety of versions where the user may indicate what gets saved in each version, along with a designated format, such as what specific pages, page data/content (with or without particular images), templates, style sheets, fonts assignments, embedded fonts, user-dictionaries, comments, highlighting, notes, track-change-history and/or the like.

For example, a particular word document could get saved in one version with all the pages and all relative changes, notes, comments, styles, user-dictionaries, and the like, but saved in another version as a PDF, with some pages removed (and possibly renumbered pages, outlines, tables, and the like accordingly) and no fonts embedded, no style sheets, no user-dictionaries, no comments, no notes, no track-change-history, and the like. Further, the user may select which document version allows for editing, marking, printing, and/or the like.

In various non-limiting embodiments, the IPACE system would allow the user to select a variety of resolutions to save with a document at one time and under unique names per version, versus having to save one resolution version per "save" button, "save as" button, "save" menu functionality, "save as" menu functionality, and/or similar utilization and functionality under the current state of the art. Further, the IPACE system would allow the user to save variety of selected resolutions for an image program, such as Photoshop® or similar, where the user may save all resolutions, names, and associated elements, per saved version all at one time and under unique names versus having to save one resolution and version per "save" button, "save as" button, "save" menu functionality, "save as" menu functionality, and/or similar utilization and functionality.

In addition, a particularly saved document may be linked to a data/content server for updates when opened and conditionally linked with, say a permission gateway and/or a login with a password and/or the like. The data/content server updates the particular saved and opened document that may update the images, text, tables, numbers, styles, fonts, templates, resolution, video, audio, and/or any associated data or data/content, as set by the user, the owner of the software where the data/content was saved, the owner of data/content and/or the owner of the data/content server.

Computer-Implemented Visual Fences And Branches

In various non-limiting embodiments, the IPACE system and associated computer-implemented method creates a visual fence representing a patent claim, whereby, say a three-dimensional graphic builds a tree to represent the branches of each claim element and the ability to compare to similar claims per claim language and/or per similar art units.

Computer-Implemented Inventorship Tracking

In various non-limiting embodiments, the IPACE system and associated computer-implemented method searches for issues in Joint-Inventor/Co-Inventorship and proper country of origins. For example, the IPACE system would analyze and generate data to determine if the for Joint-Inventor/Co-Inventors (41) are all from the same country and, if not, if where the original application is going to be filed, to make sure such a collaboration is legal per that country of entry and for the country of each Contributor (50). In addition, each Contributor (50) needs to reveal any conflicts, existing contraction obligations, and/or existing agreements, such as assignments, licensing, pending litigation, and the like.

Novelty Per Input and Author Tracking

In various non-limiting embodiments, the IPACE system and associated computer-implemented method for Collaborative color coding may include tracking each input and/or each author's work where the IPACE system perceives something as not original (e.g. novel) by any of the authors (e.g. in real-time). For instance, the IPACE system may alert any participant that his/her contributions appear to be relatively close or exactly like some other data/content, where portions may be relatively similar, while other are may not be relatively similar. This alerting may be delayed until after someone has completed a project, a section, a moment in time, and/or be in real-time or near-real-time. In addition, the alerts may or may not reveal the data/content in question, the potential authors, participants/contributors/inventors, projects, countries, related IP, and may allow the author to selectively view data/content at a particular moment in time (e.g. after filing a particular application) and with a range of options of how, what, who, where, and/or the like, the participant may view.

In various non-limiting embodiments, the IPACE member/user input may involve more than text or keystrokes, and the perceived creative overlap may comprise such comparative elements as musical notes, audio spoken, sounds, instruments utilized, artists, lyrics, melodies, transitions, images/photos, video frames, and/or the like. In various non-limiting embodiments, for instance, two images may also be compared to create the "perceived creative overlap," say based upon a pixel by pixel relative comparison and/or pattern recognition, where a variety of resolutions may be compared overall and by each value, frame, element, talent, person, object, graphic, scene, sound, text, signage, transition, effect, and/or the like. Further, where say each pixel value(s), user-selected or system delineated screen portion, frame, scene (e.g. transition to transition), and/or transition is analyzed, stored, and relatively compared to existing data. In addition, such elements may also constitute a theme, mood, purpose, agenda, pattern, bias, and/or the like, which is also analyzed, stored, and relatively compared to existing data.

For example, a perceived theme may include maintaining a particular shape, color, perspective, focal-length, background, mood, tone, framing, lighting, and/or the like; over a particular number of frames; and may also be compared with other frames and/or scenes for creating the perceived creative overlap. Here instead of an analysis revealing highlighted text in say orange, where a Y/yellow creator/author and a R/red creator/author overlap (from example), the frames of the video could be marked with, say an orange bar. For example, an orange bar could be displayed automatically or in a user-selected location say be the creator, or by the viewer (e.g. as an orange bar on the top of the video frame, as an orange bar that may only appear in the timeline of the editing software, as an orange bar in the margin of the script, and/or the like).

Creative Overlapping Frames

In various non-limiting embodiments, the IPACE system would preferably the IPACE system would preferably provide a suggestion(s) as to how to make a modification(s) that would relatively reduce or increase the perceived creative overlapping frames, and/or provide instructions, tools, and/or methods to make selected frames relatively more and/or less like the perceived creative overlapping frames, where, say the perceived originator of frames (e.g. data/content, effect, voiceover, image, video, animation, and/or the like) may offer potential copiers a range of fees or similar for those (e.g. a copier) who wishes to exactly copy, somewhat copy, emulate and/or mimic his/her particular style or some portion of the creative process. Further, where the offer and associated fees may be relative to how many details are revealed; how much of the project/production staff, set designers/designs, announcers, voice-over talent, on-screen talent/extras/stand-ins/stunts, tools, equipment, effects, location, budgets, fees, script, and/or the like that are made fully or partially reviewable and/or available; how precisely the copier may copy, emulate or mimic the desired element and/or how closely the copying is actually accomplished (e.g. as selected/accomplished by the copier, and/or as scored via feedback from an audience following the copy, emulation, mimic or the like by others (e.g. Peers (65), Experts (75), Predictors (62), Reporters (63), Publisher (68), PR (82), IPACE Court Members (79), and/or the like).

In various non-limiting embodiments, the IPACE system would preferably compare transitions, say dissolves, cuts, wipes, effects, motions, backgrounds, discerned or perceived locations, discerned or perceived production sets, discerned or perceived weather/weather-effects, discerned or perceived stunts/stand-ins, discerned or perceived times of day/night, discerned or perceived animation methods, discerned or perceived special effects utilized, discerned or perceived plug-ins utilized, discerned or perceived equipment utilized (e.g. any discerned and/or perceived cameras specifications; editing hardware, tools and software; special effects/plugs-in software and/or the like) and/or the like between scenes.

Relative Data/content Arrangement

In various non-limiting embodiments, the IPACE system has a computer-implemented method for searching for data/content similarities per a relative data/content arrangement. For example, the relative data/content arrangement of a patent claim, where the relative data/content arrangement may be analyzed and compared relative to different moments in time, iterations, versions, states, stages, and/or the like. For instance, the stages may include a preparation to file stage; post a particular publication; before the first office action; post the first office action response; post any subsequent office action response; post a particular appeal; post a particular appeal decision; post a particular petition; post a particular petition decision; post a particular examiner interview; post a particular examiner suggestion; post a notice of allowance; post a particular granting per claim, and/or the like, per country and/or ongoing.

Non-Alphanumeric Collaborative Spreadsheet Sorting

In various non-limiting embodiments, the IPACE system and associated computer-implemented method would have the ability to provide suggestions per the previous example that would begin with discernible project lexicography and/or dictionary definitions, thesaurus queries, etymology lineage strings, semiology, and taxonomies; and would grow to include industry discernible terms and usage, terms used by author in the past, or sources of terms selected by the author, such as those used in the past by his/her company. This helps maintain consistency, clarity, and also helps establish definitions for company created terms or acronyms.

For instance, search a word like "example" in an application draft and come back with a prioritized list ranked by specific words that precede it and following it with associated radio check boxes for which to include in, say a particular color coding key areas to review or for a word count. For example, the word "example" may appear a total of 205 times in a document. The word "for" precedes "example" the most with, say 161 times, "an" precedes it second most with "31" times, "the" is third with "10," and then three words each precede "example" just once: "another," "same" and "a." The "a" might be a correctable typo.

In various non-limiting embodiments, the IPACE system user could request to go beyond one to, say two words to further delineate these top three examples of: "for," "an," and "the." He/she could turn on/off "match case," incorporate punctuation, where it depicts where, what, and how often each punctuation type is used.

Automatic, Conditional, and/or User-Selected Data/Content Delineations

In various non-limiting embodiments, the IPACE system would preferably analyze data/content and generate a list of elements according to a list of terms, rules, logic, conditions, and/or the like; where the IPACE system either automatically, systematically, continuously, persistently, conditionally, and/or via/per actor/user-prompt produces an output. For example, the list of terms, rules, logic, conditions, and/or the like, could include a user request to search for each incident of a term such as "example" within a designated data/content (e.g. a particular document), and correlate each sentence where it appears (e.g. each sentence correlated to each incident/where-it-appears). In various non-limiting embodiments, next, the IPACE system would preferably delineate the correlated sentence(s) into sections based upon any utilized punctuation and/or necessary punctuation.

In various non-limiting embodiments, each punctuation would remain at the end of each delineation. Next, isolate each delineation and sequentially display each delineation on a separate row (e.g. in a document, spreadsheet, database table, and/or the like). For instance, the IPACE system analysis of the user requested search and the designated data/content may discover a particular sentence with the user specified term "example," and where the IPACE system correlates the sentence where the incident appears as: "For example, one could buy a green, red, or blue car." Here, the IPACE system analysis of the list of terms, rules, logic, conditions, and/or the like would preferably discern and produce the following displayed results: For example, one could buy a green, red, or blue car.

In various non-limiting embodiments, the IPACE system analysis could incorporate conditions, logic, filters, and/or the like. In various non-limiting embodiments, the IPACE system analysis could employ an analysis for rules in language, structure, mechanics, punctuation, connecting, transitions, spacing, and/or the like, where, For instance, the IPACE system would preferably filter in/out punctuation. Another example, could be to create a separate delineate for each incident of a group of words and phrases, where, for example the group includes: "and, or" and where, based upon conditional logic, the term "and/or" could be set to automatically, systematically, continuously, persistently, conditionally, and/or via/per actor/user-prompt creates either one, two, or three delineations.

For instance, the IPACE system analysis of the user requested search and the designated data/content may discover a particular sentence with the user specified term "example," and where the IPACE system correlates the sentence where the incident appears as: "For example, one could buy a green, red, or blue car."

Data/Content Delineations, Correlations, Relative Relationships for any System Analysis In various non-limiting embodiments, the generated delineations of the selected data/content employed in the IPACE system analysis would preferably be arranged in a database schema in a manner, where each delineation has a link and/or reference to a list (or database) of correlations and/or relative relationships. The list of correlations and/or relative relationships could comprise a location (e.g. page/paragraph, column/line, page/Figure/part, page/physical X/Y from center or upper left corner, a database, publication ID, and/or the like), any countries, iterations, versions, publications, participants, projects, budgets, time windows, statistics, history, valuations, perceptions, alerts, challenges, feedback, comments, charts, histograms, relative success analysis, and/or the like; where the IPACE system may incorporate such data/content delineations, correlations, relative relationships and/or the like into any system analysis, where such data, statistics, and/or the like, may be requested, valuable, improve output, and/or the like.

Correlated Data/content Delineations, Distinctions, and Definitions

In various non-limiting embodiments, the IPACE system would preferably track and analyze data, data/content, and data/content correlations to continually generate, score, rank, and/or update a list of correlated delineations (e.g. a keyword), where the list is prioritized and/or each delineation may be utilized automatically, conditionally, and/or user-selectively. The list of correlated delineations may comprise keywords, tags, categories, subjects, topics, section headings, and/or the like; where the delineations may distinguish the numbers of times the delineation as has been utilized (e.g. per correlated data/content and/or some other segmentation) as either a keyword, tag, category, subject, section heading, and/or the like. The user may filter, rank, and/or sort the list of correlated delineations. For example, filter and rank the list of correlated delineations for category delineations that have been pre-approved by the Lead Inventor for a particular project. This filtered and ranked list of correlated delineations for category delineations that have been pre-approved by the Lead Inventor for a particular project may also include suggested methods for creating categories, rules, examples, a method to get approval for any suggestion, modification, and/or the like.

Category Delineations Correlated To Data/content

For example, a system analysis could display to the user a list of correlated delineations that is correlated to a particular segment of data/content (e.g. a correlation to a particular project), where the user could make a selection or suggestion and/or provide a modification, addition, comment, challenge, correction, and/or the like. In addition, there may be a plurality of iterations for the list of correlated delineations, where the IPACE system would preferably store, track, score, compare, display, and/or the like, each iteration. Further, the IPACE system would preferably automatically, systematically, continuously, persistently, conditionally, and/or via/per actor/user-prompt either displays the latest iteration; a particular iteration that meets a set of conditions (e.g. where there is determined to be sufficient data, statistics, time window of data/content, time window for analysis, data/content, participants, correlations, patterns, and/or the like); a particular iteration approved by the TOU/TOPs, a particular version approved by a particular member/user (e.g. the Lead Inventor), a particular iterations scored the most popular by a group or segment of members/user, and/or the like. For example, the IPACE system would preferably display a list of perceived category delineations correlated to data/content either discerned and/or perceived to be associated with a particular company project; and where the IPACE system would preferably filter for such things as data/content that is stored in particular location, created by with a particular software application, where the data/content was input from a particular computer or group of computers (e.g. brands, IP address, MAC address, zone, location, and/or the like).

In various non-limiting embodiments, the list of perceived category delineations could include the tags: "vehicles," "new cars," "used cars," "modes of transportation," where the user could change the tag "new cars" to "new vehicles" and the IPACE system would preferably offer the user to make that same modification through-out the correlated data/content; the same modification only on correlated data/content that does not surpassed some threshold (e.g. exclude data/content that's already on file with the USPTO); annotate the change in the correlated data/content; notify others of the modification; incorporate others to vote on the modification; and/or the like. In addition, the IPACE system would preferably analyze the modifications (e.g. the tag modification) and the correlated data/content for additional portions of data/content (e.g. a word, phrase, number, symbol, logo, sentences, paragraphs, document, website, application, database, spreadsheet, cell, range, photos, video clip, audio clip, image, object, animation, slide, and/or the like) that is perceived to meet a discerned or perceived tag correlation, description, definition, and/or the like. Here, the IPACE system automatically, systematically, continuously, persistently, conditionally, and/or via/per actor/user-prompt could display a generated list of additional portions of data/content perceived to meet the tag or an abbreviation of the data/content portion, and/or information, data, statistics, logic, formulas, and/or the like; regarding the rationale employed for the IPACE system perception and correlation. For example, other projects where the term "vehicles" has been employed as a tag and where the tag "vehicle" was correlated to portions of data/content mentioning trucks; whereas similar portions of data/content in the selected correlated data/content that also, say mentioned "trucks," were not currently linked to user modified tag of "new vehicles."

Further, In various non-limiting embodiments, the IPACE system analysis of the user's tag modification could generate a list of perceived associations to the tag, where the user could acknowledge, modify, add, remove, challenge, and/or the like. For example, the IPACE system generated and displayed list of perceived associations to the tag (e.g. system generated and/or user modified) for "new vehicles" could include a list of associated words that include "car, truck, boat, bicycle, plane, and train;" where the IPACE system analysis of correlated data/content perceived the data/content and tag usage as relatively broad and high level. Whereas, the IPACE system generated and displayed list of perceived associations to the same "new vehicles" tag could include the same list of associated words and/or include relatively more narrow or finer delineations, such as "car/luxury, truck/pickup, boat/yacht, bicycle/mountain, airplane/jet, and train/commuter;" where the IPACE system analysis of correlated data/content perceived the data/content and tag usage as relatively less broad, but without specifying brands/models. Whereas, the IPACE system generated and displayed list of perceived associations to the same "new vehicles" tag could include the same list of associated words and/or include specific delineations, such as brands, models, and/or the like. For instance: "car/BMW/535 Gran Turismo, truck/Chevrolet/Silverado 1500, boat/Chris-Craft/Corsair 32 yacht, bicycle/Trek/Top Fuel 9, airplane/Bombardier/Learjet 75, and train/JR-Maglev/MLX01;" where the IPACE system analysis of correlated data/content perceived the data/content and tag usage as specifically employing brand names and models.

Add And Remove Data/content Correlations

In various non-limiting embodiments, the IPACE system would preferably track and analyze all keywords, tags, categories, subjects, topics, section headings, and/or the like; to continually monitor and determine any relative modification to a particular correlation, distinction, criteria, definition, and/or the like; including any relative expansion, shrinkage, evolution, mutation, perceived shortcoming, error, issue, ambiguity, anomaly, and/or the like. For example, the IPACE system continual extracting, classifying, mapping, electronically storing, tracking, and analyzing of the tag "new vehicles" and the correlated data/content may reveal that the tag is correlating (e.g. systematically, conditionally, user-selectively, and/or the like) relatively less with a particular brand and model name, while starting to be correlated to relative new brands and models. Here the IPACE system would preferably automatically, systematically, continuously, persistently, conditionally, and/or via/per actor/user-prompt modify the correlations, distinctions, criteria, definition, and/or the like; to add and remove data/content correlations and associations (e.g. a word, phrase, number, symbol, logo, sentences, paragraphs, document, website, application, database, spreadsheet, cell, range, photos, video clip, audio clip, image, object, animation, slide, and/or the like correlation and/or association). For instance, the IPACE system would preferably display a list of removals (e.g. old brands and models) perceived to no longer fit the "new vehicle" tag and a list of additions (e.g. new brands and models), based upon the IPACE system analysis of a particular user, a group of users, a segment of users, and/or the like.

In addition, the IPACE system analysis could include and/or incorporate filters, conditions, rule, weighting, logic, factors, associations and/or the like, for such things as time, where a particular tag definition, for example, may include an evolving time window. For example, with the "new vehicle" tag, the IPACE system could incorporate a rule where the portion of data/content correlated with the "new vehicle" tag is discerned to represent a vehicle that was, say built during a particular window of time, say within the last twelve (12) months, where the tag and the list of associated portions data/content would continually add and remove associates from the list of associated portions data/content.

In various non-limiting embodiments, the IPACE system analysis could also include and/or incorporate filters, conditions, rule, weighting, logic, factors, associations and/or the like, for such things as popularity, where a particular tag definition of, say "my favorite restaurants" for example, may incorporate a conditional scoring system where restaurants would need to surpass a threshold to remain on the list. In addition, the IPACE system would preferably suggest modifying the conditional scoring and/or or the threshold could expand and/or shrink the list of associated portions data/content (e.g. and restaurants). In various non-limiting embodiments, the IPACE system would preferably continually track and analyze the data, statistics, data/content, correlations, and user's inputs, to suggest modifications to the criteria for "my favorite restaurants" based upon other user's perceived to be relatively similar and/or based on portions of data/content that are perceived to relevant, but not currently correlated.

In addition, the IPACE system would preferably suggest data/content (e.g. within the analyzed data/content criteria, and/or outside the analyzed data/content criteria), and/or suggest products (e.g. food, groceries, clothing, shoes, medicine, beauty supplies, pet supplies, school supplies, office-supplies, consumer-electronics, phones, computers, vehicles, and/or the like), suggest services, (e.g. restaurants, retailers, hospitals, lawyers, accountant, architect, colleges, travel locations, hotels, dry cleaners, grocery stores, shipping depot, repair depot, and/or the like), suggest pathways (e.g. commuting, driving, biking, walking, sight-seeing, partying, and/or the like), suggest entertainment (e.g. movie, music, game, play, party, concert, bar, show, comedy, sporting event, and/or the like), suggest a relationship and/or companion (e.g. a date, friend, family-member, co-worker, boss, employer/employee, and/or the like), and/or the like; where the user may not be aware of the suggested item, data/content, relationship correlation, benefit, and/or the like, say a discovery, game, recommendation, and/or the like.

In various non-limiting embodiments, the IPACE system analysis for a relative subjective term such as "most popular," utilized as a tag, for example, may incorporate a system analysis regarding what data/content the user did and did not tag as "popular" and where the IPACE system would preferably generate a question with a list of responses, where the user may input his/her response, comments, ignore, skip, and/or the like, the question. There may be a discerned right answer, a perceived right answer, a discerned priority of right answers that are conditional to a situation and/or user, a list of subject answers/choices, and/or the like. The question may instead, and/or also provide the user a blank, a partially completed field, and/or the like, where user may either receive a discerned right answer, a perceived right answer, an answer scored as correct via a group threshold of similar answers from a particular group, segment, and/or the like. The question may, instead, and/or also provide the user with additional question data/content, such as images, maps, polls, other user comments, historical data from the user and/or other users, and/or the like, near and/or associated with each question. The additional question data/content may be obviously correlated, expressly correlated, expressly not correlated, conditionally ambiguous (e.g. depending on the participant, time, previous inputs, and/or the like), and/or the like.

In various non-limiting embodiments, each system and/or user modification could generate a subsequent list of perceived associations, correlations, suggestions, criteria, definitions, distinctions, and/or the like, to the modified tag, where the user could acknowledge, modify, add, remove, challenge, and/or the like. For example, the IPACE system generated and displayed list of perceived associations to the tag (e.g. system generated and/or user modified) for "new vehicles" could include a list of associated words the user could create and add his own tags, categories, subjects, section headers, and/or the like, including a mapping on how each correlates with specific data/content, specific keywords and/or existing delineations for keywords, tags, categories, subjects, topics, section headings, and/or the like.

For example, the user could note what and/or how a specific tag trait or characteristic creates a distinction from a similar tag with a similar definition, say a system supplied or user-generated tag for "blue," where there are also tags for "red," and "color." Here the user could specifically define what range of color characteristics meet his/her specific definition for blue which may be different than other members/users; and what specifically should be correlated with "color." In addition, the user could employ a color wheel to define what constitutes a particular characteristic of a particular tag, say a first tag for "light blue" verse a second tag for "medium blue."

In various non-limiting embodiments, the IPACE system would preferably analyze data/content to generate a list of perceived characteristics it perceives specifically defines the "light blue" tag, say, where a hue is 128, a saturation is 158, and an intensity or luminosity is 182, say based upon an analysis of correlated data/content that includes text that specifically states those color values; text that references a discerned entity with a specific those color values (e.g. a specifically assigned color for a particular car color description, sports team, logo, and/or the like); based upon an image where there is a mono-tone section of those specific color values and/or the like. In various non-limiting embodiments, the IPACE system analysis of correlated data/content to generate a list of perceived characteristics could automatically, systematically, continuously, persistently, conditionally, and/or via/per actor/user-prompt allows for a range of values, say a "light blue" tag, where the hue is 128, the saturation is 158, and the intensity or luminosity is 182, but with a plus/minus margin of 2 point for each of the hue, saturation and luminosity. Further, the IPACE system analysis of correlated data/content to generate a list of perceived characteristics could automatically, systematically, continuously, persistently, conditionally, and/or via/per actor/user-prompt allows for a range of values, say where the user may input a plurality of specific color values, say for a tag "potential bathroom paint colors," where a first specific value for a first potential paint color is where the hue is 26, the saturation is 163, and the intensity or luminosity is 200, and a second specific value for a second potential paint color is where the hue is 60, the saturation is 119, and the intensity or luminosity is 208, and so on, as needed for the range of values. Further, the range of values comprising the first and second specific values may each have a unique set of conditions applied, say for the plus/minus margin, where the first specific value has a plus/margin of 3, and the second specific values has a plus/margin of 4, but only for the luminosity.

In addition, the IPACE system may analyze perceived distinctions between tags, such as, "hue," "(a specific hue value)," "(a specific pantone value)," "shade," and/or the like, and compare the user's relative usage, (e.g. additions, subtractions, modifications, correlations and/or the like over time) to automatically, systematically, continuously, persistently, conditionally, and/or via/per actor/user-prompt suggests variations, expansions, and/or the like to existing tag definitions, distinctions, and/or the like. Further, the IPACE system analysis for perceived distinctions between tags and/or the like, may include and/or incorporate filtering and/or comparisons with other users who utilized the same, relatively the same sources, data/content, keywords, tags, categories, subjects, topics, section headers, and/or the like.

In various non-limiting embodiments, the IPACE system would preferably incorporated the characteristics to automatically, systematically, continuously, persistently, conditionally, and/or via/per actor/user-prompt searches for complimentary data/content, correlation, and/or association (e.g. a word, phrase, number, symbol, logo, sentences, paragraphs, document, website, application, database, spreadsheet, cell, range, photos, video clip, audio clip, image, object, animation, slide, and/or the like), say via an interrogation of an existing database of data/content, an existing database of indexed data/content, a bot and/or WebCrawler to search, discover, and/or interrogate for relatively matching sources, data/content, keywords, tags, categories, subjects, topics, section headers, and/or the like to analyze, generate an index, collect data/content, and/or to monitor sources perceived as relatively likely to have new and/or modified data/content, and/or the like.

In various non-limiting embodiments, the IPACE system would preferably incorporated the characteristics to automatically, systematically, continuously, persistently, conditionally, and/or via/per actor/user-prompt searches for complimentary data/content, correlation, and/or association (e.g. a word, phrase, number, symbol, logo, sentences, paragraphs, document, website, application, database, spreadsheet, cell, range, photos, video clip, audio clip, image, object, animation, slide, and/or the like), say via an interrogation of an existing database of data/content, an existing database of indexed data/content, a bot and/or WebCrawler to search for relatively matching sources, data/content, keywords, tags, categories, subjects, topics, section headers, and/or the like to analyze, generate an index, collect data/content, and/or to monitor sources perceived as relatively likely to have new and/or modified data/content, and/or the like.

In various non-limiting embodiments, the IPACE system would preferably analyze and display information, correlations, and/or the like to the user, where he/she could then designate if these distinctions are relevant to overcome known or discerned references, prior art, currently assumed prior art, relatively perceived prior art, and/or the like, for providing clarity to the reader/consumer, and/or where designations could include how relatively critical (or non-critical) a particular distinction is known, assumed to be, perceived to be, to a particular invention, to a specific claim element, to a particular phrase, to a particular word, to a particular definition, and/or the like.

In various non-limiting embodiments, the IPACE system would automatically, systematically, continuously, persistently, conditionally, and/or via/per actor/user-prompt analyze data/content to generate delineations that may be displayed as a list of potential categories and/or existing categories based up a set of conditions and/or filters. For example, the set of conditions and/or filters could include filtering the data/content correlated with a particular art unit and a particular time window, where the IPACE system analysis generates the list of potential categories and/or existing categories. The list of potential categories and/or existing categories may include data, statistics, information, scores, and/or the like to rank each. Further, where the set of conditions and/or filters could include ranking a list results according to a relatively unique keywords (or phrase), say limited to inventor names, patent application titles, abstracts, claims, and/or the like; where the IPACE system would preferably filter out relatively common words, phrases, and/or terms.

For example, the list of results could start with a first relatively unique keyword (e.g. system delineation) for the inventor "Dr. Gary Michelson," where the first relatively unique keyword scores higher in a particular qualifier, and/or a plurality of qualifiers than the remaining relatively unique keywords. The first relatively unique keyword is typically followed by a second relatively unique keyword (e.g. system delineation) based upon the same particular qualifier, and/or the plurality of qualifiers. For example, a qualifier (e.g. result filter) may be to only list relatively unique keywords in the results that are also perceived as names of people; names of people who have assigned their inventions to a particular entity; names of people that are IPACE members within a particular window of time, and/or the like.

In another embodiment, the list of results could start with a first relatively unique keyword that is not limited to a system delineation, where a user-specification could designate the inventor "Dr. Gary Michelson and generate a list and/or generate a list of relatively unique keywords in correlation to "Dr. Gary Michelson" and/or automatically, systematically, continuously, persistently, conditionally, and/or via/per actor/user-prompt incorporating phrases perceived as relatively similar, say "Dr. Michelson," "Gary Michelson," "Doctor Michelson," and/or the like, where the IPACE system would preferably also look for perceived typos, say for "D. Michelson, "Gary Michealson" and/or the like. Here the IPACE system would preferably perform an analysis of the correlated data/content to determine the relatively likelihood of each incident being the same inventor.

For example, where the IPACE system analysis may incorporate correlations among Joint-Inventor/Co-Inventors, art units, filing dates, filing locations, inventor address, attorneys of record, and/or may include perceived behaviors and/or patterns in word usage, lexicon, sentence structure, acronyms usage, definitions, formatting (e.g. font style, font size, margins, and/or the like), use of table, use of formulas, figure styles, numbering styles, office action responses (e.g. arguments), and/or the like. In various non-limiting embodiments, the IPACE system analysis may incorporate correlations between perceived data/content and/or the like, with relatively similar anomalies, errors, typos, unique definitions, unique print outs, term introductions, and/or the like. Further, the IPACE system analysis may incorporate correlation perceived between data/content, layouts, timing, applications utilized, arguments utilized, prosecution methods utilized (e.g. declarations, amendments, petitions, extensions, appeals, and/or the like), data/content delivery methods utilized (e.g. fax, EFS, mail, Fed. Express, and/or the like), time and date of submitting materials (e.g. typically on a Friday night), phone numbers, emails addresses, addresses, and/or the like.

In various non-limiting embodiments, the IPACE system analysis would preferably include logic and/or formulas regarding such factors and components as a relative keyword placement, where the IPACE system would preferably score words, phrase, and/or terms, in such correlated locations relatively differently than other words, phrases, and/or terms. For example, a first named inventor in a list of inventors is generally considered relatively the most significant in the list, and such significance may be incorporated and/or employed in logic and formulas to determine a particular relative keyword placement. For instance, the first named inventor, and other investors listed, could be scored, say (1) where 100 points out of 100 to first named, if only one inventor listed/named; (2) where the first named is awarded a percentage (e.g. 60%) of a 100 point total and where the balance of points (e.g. 40) are spread equally over the remaining named inventors; (3) where the total number of inventors is divided into a value less than 100 (e.g. 80 points) and a balance of the 100 points (e.g. 20 points) is a bonus applied to the lead inventor, and/or the like. In various non-limiting embodiments, the IPACE system would preferably allow IPACE members/users to change and/or adjust the relative keyword placement, data, statistics, keywords, logic, formulas and/or the like to suit a specific case, conditions, a range of time, a group, a segment, and/or all cases.

Data/content Arrangement Benefit Analysis, Options, and Decision Tracking In various non-limiting embodiments, the IPACE system would preferably monitor and analyze modifications, including any utilization of a "cut and paste" function, where the IPACE system performs a modification benefit analysis of a "cut and paste section," which could automatically include a list of items for comparative analysis, and/or incorporate user-selected items. The list of items for comparative analysis could comprise analyzing all word, terms, numbers, symbols and the like utilized and compared to a particular lexicon, an analysis for relative flow, a suitable analysis, a preferable placement analysis, a perceived definition analysis (e.g. per placement), a consistency analysis, a proper spelling analysis, a semiology analysis, a grammar analysis, a proper numbering analysis, a proper term-first-usage analysis (or acronym introduction), and/or the like. For example, an IPACE member/user could move a particular figure in a patent application (e.g. using the "cut and paste" function), where depending upon the rules and conditions pre-established, as needed, and/or as allowed; such figure rearranging could prompt the IPACE system analysis to automatically rearrange a section of text-associated-to-Figure. The section of associated text may be a discerned section of text-associated-to-Figure (e.g. where the user has delineated the text associated, the text has clear delineations for association, and/or the like) or a relatively perceived section of text-associated-to-Figure. In various non-limiting embodiments, the IPACE system would preferably automatically rearrange the section of text-associated-to-Figure, and/or display a list of rearrangement options for the user to select, modify, and/or the like, for the rearranging of the section of text-associated-to-Figure.

In various non-limiting embodiments, the list of rearrangement options displayed for the user to select a particular text-associated-to-Figure rearrangement option could include displaying data, statistics, scores, visualization, relative comparisons, and/or the like, from the modification benefit analysis, which could include a perceived flow benefit of text and/or data/content score (e.g. within a particular project, patent application specification, office action response, appeal brief, etc.), where the IPACE system may incorporate an analysis of each word, term, definition, number, pattern, value, merit, clarity, consistency, and/or the like, within the "cut and pasted section" per rearrangement option relatively compared with other rearrangement options, earlier versions, iterations, and/or the like per participant, per rearrangement.

In various non-limiting embodiments, the IPACE system would preferably automatically analyze the data/content and display a list of data/content rearrangement options at particular moment in time (e.g. at the end of a work day), at a particular event (e.g. before and/or after a data/content merge with a collaborator), and without the user every having to actually suggest and/or perform a function to prompt the IPACE system analysis (e.g. without the user utilizing the "cut and paste" function), where the list of data/content rearrangement options and the modification benefit analysis may include options not previously proposed by an any participant, author, peer, expert, and/or the like. Further, the selection of a particular data/content arrangement from the list of rearrangement options could incorporate a method for scoring feedback from participants, peers, experts, and/or the like, where a particular decision-maker participant (e.g. the Campaign Gatekeeper, lead inventor, project manager, team of decision-makers, and/or the like) may view the scoring feedback, but may select by that particular decision-maker participant independently of the feedback.

In various non-limiting embodiments, the IPACE system would preferably then track, analyze, and score each option selected versus the options offered, suggested by the scoring feedback, and/or the like, to generate a perceived decision benefit score relative to the perceived other options, where data collected over time may reveal that one particular option had a relatively better perceived benefit when it comes to a particular accomplishment, say getting a patent claim granted relatively sooner, granted relatively more broadly, monetized relatively sooner, monetized relatively for more, and/or the like. In addition, where the particular decision-maker participant (and/or team) would then receive a decision-maker score that is relative to his/her options in-general, relative to the feedback suggestions, and/or the like. In various non-limiting embodiments, the IPACE system would preferably also allow participants, including the particular decision-maker participant, peers, experts, and/or the like, to challenge each analysis, rearrangement option, arrangement selected, decision-maker score, perceived decision benefit score, and/or the like, where a group decision could be incorporated (e.g. the IPACE court, company group, inventor group, PTO, courts, and/or the like) to analyze and either moderate, arbitrate, and/or rule on a perception, fact, participant, witness, value, novelty attribution, decision attribution, authorship, Inventorship, measurability, assertion, measurement, rule, condition, algorithm, score, option, and/or the like.

Further, the modification benefit analysis may include and/or incorporate methods of depicting the benefits visually, along with interrogation and tracking tools and methods for implementation. For example, a visual benefit depiction could comprise a color-coding methodology, where a particular color (e.g. a particular blue hue, intensity, and saturation) could be assigned to represent a perceived relative improvement or benefit, where the color-coding could also represent a relative confidence factor. For example, the IPACE system would preferably display a benefit bar/underline or indicator, say a color-coded bar could be displayed under an associated improvement, say a particular data/content section. Further, the IPACE system would preferably be setup to display the benefit bar/underline for an entire data/content section (e.g. a rearrangement option), or even create and display a plurality of delineation options within that entire data/content section.

For example, the user could review and select a particular rearrangement option from the list of rearrangement options where the visual benefit depictions are depicted for the entire section to be arranged, and where once the particular rearrangement option is selected, the IPACE system would preferably depict the create delineation options within the plurality of delineation options within that selected section. In addition, the IPACE system analysis and visual benefit depiction of the plurality of delineation options within that selection might display a list of word, phrase, and/or sentence options for a particular word, phrase and/or sentence. For example, where a currently utilized, suggested, selected option and/or the like, is a phrase that says "you might see a red line;" here the IPACE system generated list of phrase options (e.g. each scored and ranked) may include: (1) "the system may display a red line" (2) "the user may view a red line," (3) "the user may view a red line," (4) keeping same: "you might see a red line."

Each phrase option could explain the logic incorporated in the analysis, ranking, and suggestion. For example, the fourth ($4^{th}$) option could be a visual alert that such languages as "you" and "see" appear relatively ambiguous within the context of the sentence, paragraph, embodiment, and/or the like. In addition, the IPACE system analysis could generate and display data and statements regarding previous office actions, responses, outcomes, and/or the like; PTAB/BPAI appeals, motions, decisions, outcomes, and/or the like; court case appeals, motions, decisions, outcomes, and/or the like; per the same inventor, same invention, attorney, examiner, art unit, company, project, parent, country, globally, some window of time, budget, resource, participant, and/or the like.

Further, the IPACE system may also generate and display the number of times such a modification should or could be made through a particular document (e.g. patent application), series of documents, and/or the like, where the perceived modification benefit analysis includes a scores and data for each, and/or overall. For example, the IPACE system would preferably display that the term "you" appears forty-four (44) times within the specification and changes that term "you" to "the user" in one particular location, which has a perceived modification benefit score of, say 2 points, but changing all forty-four appearances has the perceived modification benefit score of eight-eight (88) points, and so on for other suggested changes, but where the perceived modification benefit score may be incorporate a number of factors relative to data/content flow, conception building, readability, consistency, clarity, functionality, legal precedent, novelty, non-obviousness, enablement, alternative embodiments, best mode, and/or the like.

Color-Coding For Perceived Benefits And/or Concerns In another example, the user may initially select the IPACE system generated first (1st) option of "the system may display a red line" from the list of phrase options before consider and selecting from the list of rearrangement options for entire sections, where the user-selection of first (0) option, in this example, would likely modify the scores and potentially the ranking of the list of rearrangement options for entire sections. Each arrangement option (among the list of rearrangement options) has a score, where if that score surpasses a particular threshold of a perceived improvement relative to a particular option (e.g. a previous state, version, iteration, and/or the like) or a particular range of options, and/or the like; then a particular color-coded value may be assigned (e.g. underlined or for the entire section). The color-coding could underline the associated text for the perceived improvement, where that particular color could jump to another particular color where the IPACE system perceives a relatively different benefit (e.g. better or worse) or the color could gradate/blend to another particular color within a phrase, sentence, section, and/or the like, to represent such things as a perceived conflict, anomaly, concern, confusion, and/or the like. For example, a perceived conflict and/or confusion between who or what is performing a particular function, say between the user and the system.

Figure And figure Element Color-Coding For Perceived Benefits And/or Concerns In addition, the color-coding for perceived benefits and/or concerns may include analyzing more than just the written description. For example, the perceived modification benefit score may include an analysis relative to a particular table, formula, figure, part, symbol, flow, and/or the like, where the IPACE system would also analyze any associated word, phrase, sentence, section, number, image, box, arrow, arrowhead, arrowhead direction (or lack of direction), symbol (e.g. circuitry), angle, clarity, cross-hatching, perspective, color-usage, and/or the like, for any item surpasses a threshold for, say a perceived improvement relative to when that data/content previously resided in earlier location, manner, method, position, angle, direction, and/or the like. For example, the IPACE system would preferably display a color-coded circle (e.g. a particular blue hue/intensity/saturation for improvement, and/or a particular red hue/intensity/saturation for a concern) around the appropriate element for review, selection, approval, modification, selection, and/or the like, where the element may be, say a word, phrase, sentence, section, number, image, box, arrow, arrowhead, symbol, and/or the like.

For instance, the IPACE system would preferably display an arrangement option for a particular figure (e.g. a particular block diagram of structured parts) where a plurality of blue circles surround each connecting line (previously an arrowhead) to suggest the user remove all arrowheads, since historical analysis perceives the usage of arrowheads may not add value, may not be needed, may add confusion, have historically harmed such figures, and/or the like.

In addition, the perceived modification benefit score may incorporate system perceived and/or user-defined goals for relative speed to file, prosecute, grant, monetize, and/or the like; relative value per claim, resource, costs, participant, and/or the like; and any other data points, say a heavily contested art unit. In addition, the perceived modification benefit score may incorporate system perceived and/or user-defined goals regarding anticipated patent utilization (e.g. license, defensive, litigation, and/or the like) and/or the desire to file and acquire protection in a particular country or group of countries (e.g. Japan, Germany, China, Canada, and/or the like), where rules, procedures, and/or the like, may suggest filing applications with the best arrangement for, say two selected countries (e.g. US and Japan) and/or preparing and filing two separate applications for each. The perceived modification benefit score may also display and/or incorporate a perceived short term cost-benefit analysis and score; and/or a perceived long term cost-benefit analysis and score; where the IPACE system tracks and analyzes perceived resource requirements. For example, filing three applications versus one may cost more now, but provide relatively more valuable IP later and/or sooner. In various non-limiting embodiments, the IPACE system tracking and analysis for the perceived resource requirements, the perceived short term cost-benefit analysis and score; and/or the perceived long term cost-benefit analysis and score; may comprise data and/or incorporate such items as discerned or perceived participants, budgets (e.g. perceived from discerned participants rates, historical trends, patterns, and/or the like), legal fees, time-cost-of-money, opportunity-costs, participants, interest rates, filing fees, local legal costs, time requirements, and/or the like.

In various non-limiting embodiments, preferably the perceived modification benefit score would compare each particular rearrangement option in the list of rearrangement options relative to each other and relative to earlier input, selections, other perceived options, user-suggestions, and/or the like, and rank the rearrangement options per a set of rules and conditions perceived, and/or input by the user(s). Back to the example of simply moving a particular figure from one location within the specification to another, the IPACE system would perform an analysis incorporating the above criteria, rules, conditions, perceptions, data, statistics, and/or the like. The perceived modification benefit score would include the IPACE system analysis of the moving the text, as well as modifications to the text that may be relatively wise and/or necessary.

Limiting figure Arrangements Options To Compliment Current Text Flow And/or Options To Rearrange Text To Compliment figure Rearrangement In an example, moving (e.g. "cutting and pasting") a particular patent figure from, say, a first location (e.g. FIG. 10, before move) to a second location (e.g. FIG. 5, after move), causes issues among the terminology and/or lexicography, because some components (e.g. terms, parts, elements, steps, and/or the like) of the second location (e.g. now FIG. 5, but formerly FIG. 10)

were/had not been introduced, mentioned, defined, and/or may not have been fully described until, say a key-predecessor-location (e.g. at FIG. 7, before move). For instance, the IPACE system analysis may display a list of arrangement options to the user (e.g. IPACE member/Participant 80), which may comprise: (1) an option to make the second location subsequent to the key-predecessor-location (e.g. either FIG. 8 or 9, but not before FIG. 7), (2) an option to rearrange the written description, where the IPACE system may rearrange the text and the like, in the written description, and/or the like, in a manner and method to relatively better allow the physical moving (or rearranging) of the first location to a particular second location (e.g. FIG. 5, but formerly FIG. 10) that is prior to the key-predecessor-location (FIG. 7 before move).

Saving Figures

In various non-limiting embodiments, the IPACE system would preferably provide a method to select an area in, say a figure, and have it list all the types of items selected by label, layer, type, and where the user can, say reselect a portion, or delete by check boxes, for say all connector lines in the selection (in case some are hidden, for example).

Computer-Implemented Claim Harvesting

In various non-limiting embodiments, the IPACE system and associated computer-implemented method of claim harvesting where Inventors (70) may login and enter additional suggestions for modifying and/or creating new claims from an existing application, where he/she may specifically suggest a claim, claim data/content, elements, highlight related specification support per claim and claim limitation support, and/or keywords that would or would likely appear in the claim or a specific claim limitation. In various non-limiting embodiments, the IPACE system builds a claim independent of humans (via AIS, e.g. see FIG. 13), dependent on humans, or in collaboration with a human, such as a Patent Attorney (44) or a plurality of humans, e.g. attorneys, the inventor, and/or others.

In various non-limiting embodiments, the claim harvesting may incorporate an analysis of variety of data/content such as, applications, specifications, and/or the like, for relatively comparisons, previous claims, historical prosecution and/or the like, for generating a list of suggested claims, claim modifications, and/or a list of required specification references that would need to be referenced per claims and claim element. In addition, the generated list of suggested claims, claim modifications, and/or the list of required specification references could be scored, and relatively color-coded, color-highlighted as either, say prior art, examples, DOE, etc. (similar to the spreadsheet color-coding example), and/or relatively compared to previously filed, published, submitted and/or like materials, claims, and/or the like.

In various non-limiting embodiments, the IPACE system and associated computer-implemented method of claim harvesting would provide an opportunity for non-applicants, say lay-people, patent attorneys, and/or agents to harvest claims from submitted applications (e.g. either published or via a password) and obtain compensation, equity, and/or some monetization on grant and/or upon a monetization event, and/or relative to the contribution, and/or the prosecution successful for the entire application and/or only for those claims contributed and any associated correspondences vs. creating prosecution estoppel and/or disclaimers for the applicant. So the claims become a separate continuation with no prosecution restrictions or ties to applicant. In various non-limiting embodiments, the IPACE system would preferably help reduce delays by analyzing for areas of need and locating potential resources. In various non-limiting embodiments, the IPACE system would preferably help reduce delays where the applications are not delayed for claims or value limited to, say the competency, experience, talent, time, motivation, and/or imagination of a single patent attorney hired.

Expert Review/Improvements

In various non-limiting embodiments, the IPACE system may automatically, conditionally and/or via/per actor/user-prompt file for patents, patent claims, harvest claims from existing specifications, harvest claims from existing documents, and/or the like; and/or around some developed concepts and/or software that would allow Experts (75) to later improve the application and/or streamline litigation efforts. For instance, the pending application or granted intellectual property could be offered to a patent litigation expert to review and place their input to improve (during prosecution), co-develop, and create an on-going relationship for litigations later. Each improvement/contribution could be tracked overtime for relative effectiveness, value, and the like.

For instance, the IPACE system would preferably be setup to track all measurable components of a patent litigation case to determine the relative successfulness of each in comparison to other components within the same case, and/or in comparison to other cases by the same attorney, another particular attorney, and/or a segment of attorneys (e.g. attorneys with 5+ years' experience, along with Patent Litigation in the Eastern District of Texas, and/or the like). The same analysis and relative litigation comparison could isolate and/or other participating parties to incorporate law firms, Inventors (70), Joint-Inventor/Co-Inventors (41), federal court location/venues, judges, mediators, arbitrators, expert witnesses, searching Experts (75), paralegals, and the like.

In various non-limiting embodiments, the relative amount of patent litigation experience per participating party, in terms of the number of cases he/she/it has participated in, a relative number of parties, cited infringers, and/or defendants compared to the results, and/or the like. In addition, an overall and relative number of Participants (80), outcomes, settlement amounts, time to trial, time to verdict, and/or the like. Further, an overall and relative time from an introduction of two parties (e.g. a particular inventor/patentee and a particular litigation attorney; or a particular defendant and another particular litigation attorney) to an event (e.g. start, duration, and/or completed), such as a complaint filed in federal court, a counter complaint filed, a first deposition, a Markman hearing, a settlement, a dismal, a summary judgment, a verdict, an appeal, and/or the like.

In various non-limiting embodiments, the IPACE system analysis and relative litigation comparisons could also isolate and/or otherwise incorporate the years since the asserted claims were filed, granted, the specific amendments, the specific remarks, the specific restrictions cited by the PTO, the PTO categorization system (e.g. art unit), the PTO examiner (66) involved, each prosecuting attorney involved, the number of office action responses, RCE, phone interviews, declarations, petitions, extensions, motions, pre-appeal brief, appeals, and/or the like. The relative number of years since the asserted patent was file, issued, and the like. The relative number patent claims going into the case compared to relative number of claims removed and/or relatively limited after a claim construction event, testimony, ruling, and/or the like. The relative perceived value of a particular claim going into the case compared to relative perceived and/or actualized value of that particular claim after a claim construction event, testimony, ruling, and/or the like.

In various non-limiting embodiments, the relative number of defendants, years since claims granted, the art unit, the number of licensing agreements previously acquired and per stages, such as pre-compliant-filed and post-complaint-filed, pre- and post-Markman hearing (e.g. claim construction), pre- and post-trial starting, pre- and post-verdict, and the like. The relative number of years since the asserted patent was file, issued, and the like. The relative number patent claims going into the case compared to relative number of claims removed and/or relatively limited after a claim construction event, testimony, ruling, and/or the like. The relative perceived value of a particular claim going into the case compared to relative perceived and/or actualized value of that particular claim after a claim construction event, testimony, ruling, and/or the like.

In addition, the IPACE system analysis and relative litigation comparisons could also isolate and/or other incorporate the number of licensing agreements previously acquired by the plaintiff; and per what particular point or stage, such as per a pre-compliant-filed stage or a post-complaint-filed stage and against a particular defendant, per a pre- or post-Markman point or stage, a pre- or post-trial starting point or up-to-stage, a pre- or post-verdict point or up-to-stage, and the like. In various non-limiting embodiments, the IPACE system analysis and relative litigation comparisons could also isolate and/or incorporate the relative number claims going into the case compared to relative number of claims removed and/or relatively limited after an event, challenge, stage, e.g. re-exam, claim construction event, testimony, ruling, and/or the like. The relative perceived value of a particular claim going into the case compared to relative perceived and/or actualized value of that particular claim after a claim construction event, testimony, ruling, and/or the like.

In various non-limiting embodiments, the IPACE system analysis and relative litigation comparisons could also isolate and/or incorporate the relative number of pre-trial and trial elements compared to the opposition in terms of attorneys, attorney hours, local attorneys, depositions, Experts (75), expert hours, demonstrative materials (e.g. claim construction brief, charts, figures, slides/power points), paralegals, paralegal hours, costs, amount of travel, and/or the like. In various non-limiting embodiments, the IPACE system analysis and relative comparisons could isolate and/or incorporate data such as the number of emails sent, received, and to whom; the amount text, attachments, and the perceived value in terms of time saved/lost; and/or settlement increased/decreased and/or the like.

In various non-limiting embodiments, the IPACE system analysis and relative litigation comparisons could isolate and/or incorporate additional temporal information, such as the time of year the complaint was filed, the case went to claim construction, the time of year the trial went to verdict on a trial; the overall time and relative length of each event, time of day; and/or the like. The temporal data could include the time of day events such as emails, depositions, trials, and the like took place; the time spent on the telephone and with whom. The temporal information analysis and relative comparisons could include the time spent at each phase, say preparing and participating for each party/member, from say discussing the merits between a particular Patent Litigator and a particular Patentee/Inventor, analyzing the claims for infringement against a particular entity, discovering other potential infringers, researching the perceived likelihood of an invalidity challenge succeeding/failing, a potential damages amount to seek, a potential damage settlement per infringer, and/or the like.

Also, the temporal information analysis and relative comparisons could include the amount of overall and relative time spent on client research, understanding the particular invention and industry, prior art research, potential prior art challenges, infringing companies, re-exams, declaratory judgments, case law, and/or the like; additionally, the amount of overall and relative time perceived to be gained or lost by such factors as a delay due to a court "notice of deficiency," a "motion for an extension of time," amending Complaints, Counterclaim, Answers, Affidavits, and/or Remarks; Corporate Disclosure Statements; Change of Venue Request (and actual); Summons related (request/issued); Protective Order related (request/issued); a request to Dismiss (and actual), a request to Stay (and actual); a request for summary judgment (and actual), a request for continuations or extension of time (and actual), motions to delay (and actual), notice of discovery; notice to appear; status conference, suggested and/or accepted arbitration and/or mediation, appeals, and/or the like.

In various non-limiting embodiments, the IPACE system analysis and relative litigation comparisons could also isolate and/or incorporate the amount of overall and relative time perceived to be gained or lost by such factors as the ability for plaintiffs or defendants to share data, statistics, Experts (75), counsel, and/or replace a particular attorney who withdrew as the attorney of record.

Claim Competition/Challenge (also see "claim competition" mentioned herein elsewhere)

In various non-limiting embodiments, the competition could also be conditionally opened to the public, say to find more claims and/or challenge existing claims, say after a specific amount of time, a specific number of claims in general, a specific number of claims per a particular art unit, a specific number of claims per a particular contributed data/content disclosure date, a specific number of claims per a particular contributed data/content disclosure section (e.g. Number of word and/or figure(s)), and/or a conditionally exhaustive acknowledgement by, say a particular claim discovering party, a particular claim discovering party supervisor, a particular claim discovering body, a particular claim discovering body's, a particular claim discovering body's court body, a particular claim discovering body's appeal body, and/or some combination of these.

In various non-limiting embodiments, the IPACE system and associate computer-implemented method analyzes, generates, and displays a known, stated, discerned, and/or relatively perceived list of competing parties/participants relative to a designation, say a particular patent claim (e.g. in development, considered, original pending, amended/pending, granted, litigated).

In various non-limiting embodiments, the generated list of competing parties/participants relative to a designation (e.g. patent claim competition) involves participants competing over having a particular claim or claim element incorporated into a patent application or an office action amendment.

In various non-limiting embodiments, the generated list of competing parties/participants relative to a designation (e.g. patent claim competition) involves parties/participant competing over rights to a particular claim or claim element incorporated into a patent application prosecution, interference hearing, swear behind, licensing dispute, invalidity challenge, litigation, and/or the like.

In various non-limiting embodiments, the IPACE system and associate computer-implemented method analyzes, generates, and displays a list of correlated patent applications ranked relative to status, per country, and/or the like; where relative to status may incorporate time in a queue, number of claims reviewed, rejected, withdrawn, amended, previously amended, currently amended, granted, and/or the like. In various non-limiting embodiments, the IPACE system would preferably analyze a designated and/or selected data/content to identify and display a list of countries where relatively patent claims are stated, actor-stated, ascertained, discerned, relatively perceived, and/or predicted to not exist; preferably including a determination where such a patent claim does not exist; for example, due to a list of ineligibilities, comprising a laws, rules, statutes of limitation, prior art, and/or the like.

In various non-limiting embodiments, the IPACE system and associate computer-implemented method where a submitted data/content, say a patent application, a pending patent application and/or an issued patent may be presented with a variety of data/content types, including text, audio, images, graphics, video, data, statistics, animations, 3D-objects, models, and/or the like, for patent prosecution, comparison purposes, and/or the like. Further where a system analysis may generate and display a perceived score and ranking for licensing, selling, commercializing, partnering, and/or the like, per the submitted data/content, and/or the iterations, modifications, and/or the like, along a timeline of perceived relative progress or regression.

System Generated Set Of Figures

In various non-limiting embodiments, the IPACE system would allow the user who drafted a claim or enters a claim to employ a system generated set of figures. For example, after a claim is drafted, the IPACE system would create a range of figures that the user could select to either utilize in the specification, temporarily hold for possible use, and/or mark as not needed or not relevant. In addition, the IPACE system and/or the user may modify the IPACE system generated set of figures, and where the IPACE system may analyze any related data/content, data and the like, to generate additional suggests for a new and/or existing claim, other claim sets, other figures, and/or other modifications to the specification. In addition, the user may modify a particular figure and have the IPACE system make further suggestions accordingly.

System Generated Sections Headers

In various non-limiting embodiments, the IPACE system would preferably automatically generate sections headers. In various non-limiting embodiments, the IPACE system generated sections headers (and categories, tags, etc.) could incorporate a variety of methods, rules, conditions, and/or the like. For example, a particular method could employ a rule where each discovered utilization of a particular phrase, say the phrase "an embodiment," would generate a section header from the subsequent text perceived to describe the embodiment, say from the words in the same sentence. If the phrase "an embodiment" appeared more than once in a paragraph, the IPACE system would preferably automatically generate the best perceived header, combine phrases from the two embodiments into one header, provide suggestions to the user on how to potentially break-up the paragraph and/or data/content into separate sections per embodiment, and/or provide the user with a list of options and analysis to make informed decisions, edits, and/or selections.

In addition, system generated section headers could incorporate a method of analyzing the text for any time a new figure was introduced create a new header from the associated text, where the section header would precede the first paragraph the figure was introduced. Another method could analyze the text for each noun introduced along with a relatively popular score (e.g. based upon relative uniqueness to occur in language outside the application and a relative occurrence rate within the specification, a section, and/or the like), where the first appearance, along with an explanation, would generate a section header. In various non-limiting embodiments, a number of relatively unique and popular terms appear in the same section in need of a section header, the IPACE system would preferably combine such relative popular terms and include components of any associated descriptions or functionality, or simply select, say the most popular from a list of such relatively popular terms in a section.

Locking Data/Content

In various non-limiting embodiments, the IPACE system generated section headers could incorporate a method of counting paragraphs, pages, terms, figures, and/or the like, to, say at least have a new header every six (6) paragraphs, per figure, per page, and/or the like. In addition, the IPACE system would preferably conditionally combine methods, rules, data, statistics, and/or analysis to create the perceived relative best header for the relative best locations. In addition, subsequent edits, user modifications, and/or the like could subsequently change the sections headers, suggest section header changes, and/or allow for section headers to be locked-in until user unlocked or changed.

In addition, the specification could be functionally and visually collapsed to display only the section headers themselves, where all the associated text per section under a section header is hidden; and/or where only a particular portion of text or range of section headers (e.g. within a particular page range, e.g. pages 5-12) may be made visible or hidden. In addition, filters may be employed to, say display only portions, ranges, and/or sections headers with a particular condition, word, phrase, term, synonym, color-code, item, definition, number, element, option, score, feedback score, and/or the like.

Rearranging Data/Content Accordingly

In addition, the IPACE system would preferably allow the user to rearrange entire sections by simply dragging and dropping (e.g. rearranging) the section headers, where the hidden collapsed text would also move, remain connected and associated accordingly. Further, the IPACE system would preferably display a list of suggested section header sequence/order, data/content order, and/or editing options to the list of section headers. Further, where each subsequent user selection, edit, rearrangement would also produce an ongoing-user history (e.g. with undo/redo, arrangements, selected options, perceived benefits accepted, rejected, etc.) as well as a list of more suggested changes, concerns, and/or the like.

In various non-limiting embodiments, the Section Headers would not have to appear in, say a filed application, and could simply be utilized for data/content management and rearranging data/content, where each Section Headers could be assigned to either appear or not appear per output. For example, the user could select that the IPACE system headers appear internally between a first group of collaborating participants (e.g. Joint-Inventor/Co-Inventors), but not for second group of collaborating participants (e.g. patent attorneys at a law firm). In various non-limiting embodiments, the IPACE system would preferably allow for different Section Header for different participants, where a draftsperson may wish that the Section Headers are relevant to what he/she has completed the finish draft, only has a first draft, and/or has no drafted figure yet. Whereas a collaborating data/content reviewer may utilize a similar status methodology, but where the Section Headers would be different, and where the Lead Inventor may be able to view all the Section Headers with a Participant's role and name per Section Header and Section Header Methodology.

In addition, some participants may have the ability to permanently and/or temporarily lock sections, and/or where suggestions to modify must be approved, and/or may stack up until a particular threshold of time, work, and/or the like is accomplished. For example, a patent attorney may suggest moving a particular figure, when he/she discovers that the draftsperson has locked out any particular change until he/she has finished a particular goal to finish, say three flowcharts and a two block diagrams by X date/time; and where the draftsperson may include comments to selected participants. These comments may preclude the suggested figure move from the patent attorney, and/or provide a method to notify the patent attorney after the draftsperson has completed the other goal of the five figures. In addition, the patent attorney may push through the suggestion to the appropriate participants; say the Lead Inventor, and/or the Draftsperson, as to why or why not the suggestion was/is relevant. For example, the suggest to move the figure is still relevant because of the disclosure flow, or where the suggested move is more important the five new figures, since due to time constraints, the five new figures could come in a subsequent application.

Tracking Input (e.g. Via Emails) And Coordinating Modifications

In various non-limiting embodiments, the IPACE system and associated computer-implemented method searches the central repository for data/content, research, creation, collaboration, and modifications with time and date stamping, say an encrypted email exchange server and/or the like. In various non-limiting embodiments, the IPACE system and associated computer-implemented method could analyze, track, and generate a displayed result where there was a modification, such as a deletion to a section or range of text, for say a particular event and/or condition. For instance, an event and condition where the user wants to delete all text in an overall text range (or similar), and for each occurrence of text between a starting point discerned by highlight/selecting a starting text range of: "From: matt@mattomalley.com" and to an end point discerned by highlight/selecting a ending text range of: "Sent via Blackberry® by AT&T®"; where the IPACE system will go through the overall text range, say a full word document or selected portion of that document, and delete all the text occurrences, which in this particular example could be a plurality of emails that were cut and pasted into the full word document without the IPACE system or the user needing to further distinguish the data/content to be deleted in each occurrence.

In various non-limiting embodiments, the user may take the same or similar data/content of the plurality of emails that were cut and pasted into a particular document and may wish to delete everything, except the actual email data/content or similar. In this instance, the user could reverse the previous starting text range of: "From: matt@mattomalley.com" to instead the start text range of: "Sent via Blackberry® by AT&T®" and establish the ending text range of: "From: matt@mattomalley.com," if not already switched by the system, and now the IPACE system will go through the full word document (or similar) and delete all the text occurrences that redundantly appear between the end of each cut and pasted email with a "Sent via Blackberry® by AT&T®" and an associated header of who sent the email, when, to, the subject and the like, without having to go through and delete each variation of, say a date, and a subject; and all while maintaining the text in the original body of each cut and pasted email. This could be helpful for maintaining, say a to-do or task list.

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or tracking a "cut and paste" history per page, per email, per text message, and/or the like. In various non-limiting embodiments, the "cut and paste" history per page, per email, per text message, and/or the like, can be relatively compared to other "cut and paste histories" for suggested shortcut, modifications, data/content comparisons, and/or the like.

Relative Frequency of A To-Do Or Task Item In various non-limiting embodiments, the IPACE system may look for the relative frequency that a particular to-do or task items is listed, post, assigned, started, completed, repeated, shared, scored, sector scores (e.g. for relative promptness, effectiveness, cost-savings, novelty, current-value, future-value, ROI, relative satisfaction score, and/or the like) when an new to-do or task item (or relatively similar to-do or task item) is first introduced and/or last introduced relative to time and date. For example, the IPACE member/user could create a new task item for, say creating patent application figures where the IPACE system may automatically, conditionally, and/or as prompted by the IPACE member/user analyze the new task item specifics to determine what historical tasks are relatively similar and display a list of results.

Relative Satisfaction Score

In various non-limiting embodiments, the IPACE system analyzing the data/content and data/content correlation to generate a relative Satisfaction Score. In various non-limiting embodiments, the IPACE system generated results would preferably be presented in a spreadsheet format where the IPACE member/user may filter and/or sort the results. In various non-limiting embodiments, the IPACE system generated results would preferably be filtered before, during, and/or after each displayed analysis, where say the filtering may incorporated an initial filter to only consider projects in a particular PTO art unit (e.g. "2447"), projects within a particular segment of participants (e.g. from a particular inventor group, company, or other shared profile element) and/or roles (e.g. "draftspersons"), a particular segment of patent figures types (e.g. three-dimensional products, flowcharts, process sequence/flow, functional block diagrams, electrical circuitries, biochemical structures, web-user-interface, or mobile-user-interface), and/or the like. The display results may include automatic, conditional, and/or user-imposed relevance scores that are prioritized based upon data, statistics, conditions, and weighting towards particular sectors (e.g. for relative promptness, effectiveness, cost-savings, novelty, current-value, future-value, ROI, relative satisfaction score and/or the like); where the user may modify the data included, conditions, and/or weighting and see the re-prioritized results. For instance, the results may be relatively more weighted towards ROI than cost-effectiveness, where a particular initial results for a tasked "creating patent application" (with the filter for "draftspersons" suggests hiring a particular draftsperson A over draftspersons B, followed by C, D, and E; to prepare the figures based on historical data/statistics, but where a user adjustment to make cost-effectiveness relatively more important than ROI reprioritizes the draftspersons with C prioritized over B followed by A, E, and D.)

In various non-limiting embodiments, the IPACE system would preferably reveal a list of key data and key historical data and/or key assumptions that relatively caused each score and sector score incorporated within the analysis. For example, the IPACE system would preferably reveal that the reason Draftsperson C scores higher than the others when the weighting is changed towards "cost-effectiveness," because this Draftsperson C has a rate per figure that is far less than the other Draftspersons. In various non-limiting embodiments, the IPACE system would preferably flag key data for the user to consider regarding Draftsperson C and the IPACE system analysis relative to the other Draftspersons, where for example, the flagged key data may reveal that Draftsperson C has worked on far fewer projects than say all the others, and/or that the particular projects that Draftsperson C worked on were relative less-complex and/or had relatively longer time-lines than the other Draftspersons.

In various non-limiting embodiments, the IPACE generated, scored and prioritized results would allow the user to employ a "data-change" function per data element to recalculate the data. For example, the user could learn that a particular Draftsperson's rates have increased, while the others have not. So the user could modify the rate employed in the calculations to see how the Draftspersons are rescored and re-prioritized. The IPACE generated, scored and prioritized results would also allow the user to employ an "equalize" function per data element. For example, the user could learn that the calculations, analysis, scores, and resulting prioritization incorporated data where one or more Draftspersons were considered relatively, say more prompt than others in his/her Promptness Sector Score. Here the user could "equalize" two or more Draftsperson "Promptness Sector Score" to a particular value that is either, say the means, median, of the two (or more), or a selected value, say one of the Draftspersons current "promptness score" or a particular input.

Generating a Client Satisfaction Score

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or emailing patent attorney and patent agent clients (also other roles, e.g. patent examiner, investor, draftsperson, and/or the like) to generate a list of characteristics and/or user/client responses. Further, where the list of characteristics and/or user/client responses could be interrogated, stored, compared, analyzed and normalized against other data, to generate a client satisfaction score relative to a particular project, goal, attorney, agent, law firm, participant, contributor, Joint-Inventor/Co-Inventor, word-choice, figure choice, part-choice, step choice, and/or the like.

Analyzing and Normalizing Client Characteristics

In various non-limiting embodiments, the IPACE system could analyze and normalize a list of user/client characteristics from a first user/client, where the first user/client has utilized similar words, phrases, and/or the like, in the past; such as "quite happy," "satisfied," "good communicator," "pleasant to work with," and/or the like, via a semantics engine as relatively positive responses. In addition, the IPACE system could analyze and normalize the list of user/client characteristics from the first user/client and relatively compare the inputs, characteristics, responses, sentiments, and/or the like, with a second user/client, where the IPACE system could calibrate the results based upon a tendencies, propensities, and/or the like, for a particular user/client to lean positive or negative.

Comparing Client Characteristics

In various non-limiting embodiments, the IPACE system could analyze and normalize the list of user/client characteristics from the first user/client and relatively compare the inputs, characteristics, responses, sentiments, and/or the like, with a second user/client, a plurality of users/clients, a particular segment of users/clients (e.g. on the same project, working with the same attorney, with a similar project, a similar goal, with a similar deadline situation, a similar issue/patent-office-rejection, and/or the like), and/or the like.

Analyzing and Construing Characteristics

In various non-limiting embodiments, the IPACE system may construe an "okay communicator" characterization by a particular first user about/associated a particular patent attorney as relatively negative when relatively compared to the first user's overall positive assessment for the same patent attorney, where he/she used relatively far more positive phrases, sentiments, characterizations, responses, expressions, facial-gestures, hand-gestures, and/or the like, to describe other characteristics, such as a "great claim drafter," an "excellent deadline tracker," and/or the like. Whereas, the IPACE system may construe the "okay communicator" characterization by a particular second user about/associated with a particular patent attorney as relatively positive when relatively compared to the second user's overall negative assessment of the particular patent attorney, where he/she used relatively far more negative phrases, sentiments, characterizations, responses, expressions, facial-gestures, hand-gestures, and/or the like, to describe other characteristics, such as a "poor claim drafter," a "terrible deadline tracker," and/or the like.

The "Review, Points and Feedback" module 399 extracting, classifying, mapping, electronically storing, tracking, and analyzing User-Comments In various non-limiting embodiments, the IPACE system may track and analyze data, data/content, and data/content correlations for comments from a user. In addition, the comment tracking and analysis could include a method for relatively normalizing comments from a plurality of users. For example, a data/content repository that accepts user comments, such as an website article, online blog, and/or the like; where user may leave anonymous feedback regarding patent attorneys, PTO examiners, IPACE members and where that data may be relatively normalized to generate such perceived metrics as overall perceived competence, perceived subject-related competence, perceived communication skills, industry knowledge, and/or the like.

In addition, the IPACE system would preferably provide a method to relatively protect a user's identity when the user is submitting data/content, and/or subsequently, where the IPACE system may analyze a particular comment from a particular user who is about to submit a comment, and/or the like; and provide an alert. In addition, the IPACE system analysis may alert the particular user regarding portions of his/her comments that may be unintentionally revealing personal and/or private information; and/or where particular portions that are perceived to be relatively personal and/or private.

In various non-limiting embodiments, the IPACE system analysis may alert the particular user regarding portions of his/her comments that are ambiguous, misspelled, grammatically incorporate, misquoting, and/or the like. In various non-limiting embodiments, the IPACE system analysis and alerts may include a list of suggested modifications, options, and/or the like. Further, a user-selection from the list of suggested modifications, options, and/or the like; may score, rank, and/or reward users for protect his/her and/or others privacy, helping clarify data/content, helping normalize data/content, and/or the like.

In various non-limiting embodiments, the IPACE system tracked and analyzed comments may include feedback per IPACE members/user where the IPACE system tracks opinions per say attorneys, inventors, examiners, small entities vs. large entities (and/or micro-entities).

Spell Checking Tools and Knowledge Management Tracking

In various non-limiting embodiments, the IPACE system automatically, systematically, continuously, persistently, conditionally, and/or via/per actor/user-prompt offers a particular system and associated computer-implemented methods for spell checking, grammar, numeral checker, formula checker, style checker, formatting checker, deadline checker, and/or the like In various non-limiting embodiments, the IPACE system could automatically, systematically, continuously, persistently, conditionally, and/or via/per actor/user-prompt interrogate, display and/or offer the user a list of word replacement options, where the list also includes an option to mark a particular replace word as a currently-desired-replacement-word, say where the user will want to revisit this "currently-desired-replace-word" subsequently (e.g. when more information may be available to make a more informed decision). Whereas, making a selection that becomes permanent, creates a situation where is may be difficult to track and rank a "replaced word" for review subsequently, and/or the like. Further, an ability to not replace a particular word/phrase at all, per the state of art may imply that the word/phrase is correct, when in fact that may not be the case. In addition. a desire/decision to add/or not add a particular word/phrase to the current document dictionary, and/or the like, may imply that a particular word is correct or not correct, when in fact the user is not presently prepared to make such a decision.

In addition, the user could add comments as to why he/she is not sure, where the IPACE system could offer suggestions based upon the user having previous yet similar hesitation, and/or other users having similar comments, hesitations, modifications, and/or the like, for similar projects (e.g. a patent application), event (the result of sporting event), news/stories (e.g. the spelling of a sport athlete's name), and/or the like. In addition, the ability to add words, concerns/hesitations, modifications, and/or the like, to a list to revisit, say at a particular time (e.g. project deadline) or event (e.g. plan to file). Further, the ability to select other users segments, specific users, projects, events, news/media outlets, and/or like, to compare words, concerns/hesitations, modifications, and/or the like on the list to revisit data.

In various non-limiting embodiments, the IPACE system and associated computer-implemented method generates a separate portal, application, website, and/or the like, connected to the main system that allows for feedback from users, such as on spelling, acronyms, definitions, and/or the like. In various non-limiting embodiments, the IPACE system automatically, systematically, continuously, persistently, conditionally, and/or via/per actor/user-prompt displays data/content segments that may be generate user comments, feedback and/or suggestions by selected members, such as patent attorneys, Joint-Inventor/Co-Inventors, contributors, and/or the like. In various non-limiting embodiments, the comments, feedback and/or suggestions made by selected members, such as patent attorneys, Joint-Inventor/Co-Inventors, contributors and/or the like, may conditionally appear as anonymous, say as long as he/she meets the TOU/TOP rules.

In various non-limiting embodiments, the comments, feedback and/or suggestions may be made by selected members, users, outside-public-users, and/or the like, who do not meet the TOU/TOP rules, where the IPACE system and/or user conditionally tracks, analyzes, filters and pre-screens any discontent to protect intellectual property rights and prevent any potential public disclosure of proprietary materials. In various non-limiting embodiments, the disclosed materials that are made available may be limited to common industry terms where outside-public-users may be asked to agree or disagree with a particular definition and/or the like. In various non-limiting embodiments, the disclosed materials that are made available may be relatively hidden among a list of other industry terms and definitions, as to minimize and preferably not publically disclose any key elements to a potential patent claim.

For example, there could be a list of industry words, along with associated industry definitions, where the industry is telecommunication and where the outside-public-users, say telecommunication employees, newsletter readers, Telco experts, and/or the like, are asked to agree/disagree (and/or Lickert scale score) with each associated definition for accuracy. For instance, the list of industry words, along with associated industry definitions, could be for a list of, say ten (10) terms, where a particular term of interest is one of the ten (10), and where the particular term of interest appears with a range of definitions to solicit industry feedback towards the range of definitions. In an embodiment and under certain conditions, the solicited and/or posted industry feedback toward disclosed materials could include feedback regarding industry acronyms, spelling, figure clarity (e.g. but where terms have been replaced prior to filing/grant/etc.), and/or the like.

In various non-limiting embodiments, the solicited and/or posted industry feedback towards the range of definitions could also be utilized for patent prosecution support/evidence, patent appeal support/evidence, patent litigation support/evidence, and/or the like. In an embodiment and under certain conditions, the solicited and/or posted industry feedback toward disclosed materials could expand after stages of protection (e.g. patent filed, published, granted, litigated, and/or the like). In an embodiment and under certain conditions, the solicited and/or posted industry feedback toward disclosed materials could include a process to collect data to ascertain what type of skills would likely apply to a Person Having Ordinary Skill in the Art (PHOSITA) for a particular disclosure, publication, application, patent, patent claim, patent element, and/or the like, where the IPACE system would collect industry feedback regarding the actor-stated, ascertained, discerned, relatively perceived, and/or predicted state of the art at the time, say a patent application was filed among, say Telco industry engineers, and/or the like.

In various non-limiting embodiments, a result from the process to collect data to ascertain what type of skills would likely apply to the PHOSITA for a particular a patent application, could be also be posted for industry comments, feedback, challenges, and/or the like. In various non-limiting embodiments, the result from the process to collect data to ascertain what type of skills would likely apply to the PHOSITA for a particular a patent application, could also include requests, tests, polls, and/or subsequent requests/tests/polls, and/or the like, where a selected party/user/member/outside-public-user is asked whether he/she under-stands a particular disclosure sufficiently to recreate the utility produced by disclosure, now, when the claim was filed, and/or the like.

PHOSITA Testing

In various non-limiting embodiments, the PHOSITA testing could include tests where parts/steps are missing and the PHOSITA would suggest parts/steps from what was known at the time, from a list of potential parts/steps to ascertain the level of disclosure comprehension by the PHOSITA, preferably from what was known at the time for such things as support, enablement, best mode, utility, anticipation, non-obviousness, and/or the like. In various non-limiting embodiments, a result from the PHOSITA testing could also be posted for industry comments, feedback, challenges, and/or the like. In various non-limiting embodiments, the results from the PHOSITA testing could be utilized by the IPACE system to generate a list of industry acceptable terms, definitions, acronyms, and/or the like, per, say art unit for on-going patent development, prosecution, litigation, and/or the like. In various non-limiting embodiments, a result from the PHOSITA testing could also be posted for industry comments, feedback, challenges, and/or the like. In various non-limiting embodiments, the list of generated industry acceptable terms, definitions, acronyms, and/or the like, would preferably evolve and be time-stamped in such a manner, say per PTO art unit reference, knowledge, support and/or the like, for on-going patent development, prosecution, litigation, and/or the like. In various non-limiting embodiments, the user could enter a particular date in the past, an art unit, and/or the like, and view the list of generated industry acceptable terms, definitions, acronyms, and/or the like, as that date and time.

PHOSITA Composition

In various non-limiting embodiments, the results from the PHOSITA testing could include an industry consensus for a PHOSITA composition per art unit, per patent, per patent claim, per date in time, and/or the like. In various non-limiting embodiments, the PHOSITA composition per art unit, per patent, per patent claim, per date in time, and/or the like, would include a means and manner to collect and maintain a pool of PHOSITA candidates who fit each PHOSITA composition, say should there be a need for a PHOSITA input/opinion/comment/challenge, a collective PHOSITA input/opinion/comment/challenge, and/or the like. In various non-limiting embodiments, the PHOSITA composition per art unit, per patent, per patent claim, per date in time, and/or the like, the PHOSITA input/opinion/comment/challenge, and the collective PHOSITA input/opinion/comment/challenge, and/or the like could be made available to/for a patent application/claim being prosecuted.re-examined/challenged, a PTAB case, a Markman, a Federal Circuit case, an Appellate Case, a Supreme Court case, an IPACE Court case, and/or the like. In various non-limiting embodiments, the PHOSITA composition per art unit, per patent, per patent claim, per date in time, and/or the like, the PHOSITA input/opinion/comment/challenge, and the collective PHOSITA input/opinion/comment/challenge, and/or the like could be provided in a manner and method, where each and/or selected participants are shielded for certain elements or portions of a disclosure, person/user/inventor/attorney/assignee/company and/or the like identity, and/or the like. In various non-limiting embodiments, the PHOSITA composition per art unit, per patent, per patent claim, per date in time, and/or the like, the PHOSITA input/opinion/comment/challenge, and the collective PHOSITA input/opinion/comment/challenge, and/or the like, could be provided in a manner and method, where a fee is collected for the PHOSITA's time, input, timeliness, challenges, output, and/or the like.

In various non-limiting embodiments, the user/member could enter a particular date in the past, the art unit, and/or the like, and view a list of generated industry acceptable terms, definitions, acronyms, and/or the like, as of that date and time. In various non-limiting embodiments, the list of generated industry acceptable terms, definitions, acronyms, and/or the like, as of that date and time would preferably provide a context, etymology, and relationship data as to when a particular term, acronym, definition, claim element, claim, relationship, correlation, causation, enablement, PHOSITA composition, and/or the like, is/was actor-stated, ascertained, discerned, relatively perceived, and/or predicted to have been first and subsequently utilized, first and subsequently published, first and subsequently modified, first and subsequently utilized in patent application, first and subsequently utilized in patent claim, first and subsequently utilized in granted patent claim, per country, per art unit, and/or the like. In various non-limiting embodiments, where each of the preceding would preferably include what was/is actor-stated, ascertained, discerned, relatively perceived, and/or predicted to have been know as to under what context each element above was utilized, modified, where, by who, and/or the like. In various non-limiting embodiments, all or some of the results could be conditionally posted for user, industry comments, feedback, challenges, and/or the like. In various non-limiting embodiments, the list of generated industry acceptable knowledge at the time and PHOSITA composition, and/or the like, would preferably evolve and be time-stamped in such a manner, say per PTO art unit reference, knowledge, support and/or the like, for on-going patent development, prosecution, litigation, and/or the like. In various non-limiting embodiments, the user could enter a particular date in the past, art unit, and/or the like, and view the list of generated industry acceptable knowledge and a PHOSITA composition, and/or the like, as of that date and time.

Knowledge Management System

In various non-limiting embodiments, all the above would be maintained and tracked within the system's Knowledge Management System. In various non-limiting embodiments, the Knowledge Management System would preferably track, store, measure, compare, analyze, score, rank, assess, and/or the like, any and all data relationships, correlations, associations, causations, components, elements, participants, segments, trends, and/or the like, actor-stated, ascertained, discerned, relatively perceived, and/or predicted by the system, the user base, the public, the world, and/or the like, per country, per art unit, and/or the like. In various non-limiting embodiments, the Knowledge Management System would preferably track, store, measure, compare, analyze, score, rank, assess, and/or the like, any and all data actor-stated, ascertained, discerned, relatively perceived, and/or predicted by the system, a particular user, the user base, the public, a country, a planet, a segment of each, and/or the like, independently, collectively, collaboratively, and/or the like; per country, per art unit, and/or the like, regarding industry, society, country, and/or the like knowledge, comments, concerns, sentiments, perceptions, and/or the like, on a bottleneck (e.g. a part and/or process in a system or chain of processes, such that its limited capacity reduces the capacity of the whole chain), bottlenecks-solved, hindrances, hindrances-solved shortcomings, shortcomings-solved, "long felt needs," "long felt, but unsolved needs," "solved long felt needs," "commercial success," and/or the like, actor-stated, ascertained, discerned, relatively perceived, and/or predicted by the system, a particular user, the user base, the public, a country, a planet, a segment of each, and/or the like, independently, collectively, collaboratively, and/or the like; per country, per art unit, and/or the like. For example, a "long-felt, but unsolved need" could apply to a cordless phone (before it existed), a microwave oven that can safely cook with metal placed inside while cooking (before it existed), and where a timeline could be displayed where innovations along the timeline contributed to solving "the long-felt, but [previously] unsolved need(s)."

In various non-limiting embodiments, the Knowledge Management System would preferably track, store, measure, compare, analyze, score, rank, assess, and/or the like, any and all data actor-stated, ascertained, discerned, relatively perceived, and/or predicted by the system, a particular user, the user base, the public, a country, a planet, a segment of each, and/or the like, independently, collectively, collaboratively, and/or the like; per country, per art unit, and/or the like, regarding industry, society, country, and/or the like knowledge, comments, concerns, sentiments, perceptions and/or the like on a bottleneck (e.g. a part and/or process in a system or chain, and where a timeline could be displayed where innovations along the timeline contributed to solving "the bottleneck(s)," and/or the like. In various non-limiting embodiments, the Knowledge Management System would preferably track, store, measure, compare, analyze, score, rank, assess, and/or the like, any and all data actor-stated, ascertained, discerned, relatively perceived, and/or predicted by the system, a particular user, the user base, the public, a country, a planet, and/or the like, independently, collectively, collaboratively, and/or the like; per country, per art unit, and/or the like, for similar hindrances-solved, shortcoming-solved, and/or the like; and similar for "accomplishments," "knowledge base/state," claims granted," "successes," "commercial awareness," "commercial adoption," "commercial success," and/or the like, per country, per art unit, and/or the like, regarding industry, society, country, and/or the like knowledge, In various non-limiting embodiments, the "knowledge base/state" would preferably be collected and maintained per person, user, user segment, and/or the like, and where each change (e.g. a relatively pro or con change/at the time) is actor-stated, ascertained, discerned, relatively perceived, and/or predicted to be fully, partially, and/or relatively measurable, attributable to, correlateable to, causal towards, and/or the like, a particular knowledge element, source, resource, contribution, submission, comment, feedback, participant, data/content segment, education, scholar, text segment, image, video clip, audio clip, trade show event, exhibit, patent, patent element (e.g. written description, text section, claim, abstract, reference, title, page, drawing, figure, part, step, connection, claim element, claim word, and/or the like), publication, disclosure, and/or the like.

In various non-limiting embodiments, the changes to the "knowledge base/state" would preferably be collected and maintained per person, user, user segment, and/or the like, and where each change may be categorized in a range of change characteristics/values, such as either an "independent novel discovery," "collective novel discovery," "collaborative novel discovery," "independent novel discovery," "collective novel discovery," "collaborative novel discovery," and/or the like, where novelty denotes novelty among a particular segment, say a plurality of users/people/members, and/or the like. In various non-limiting embodiments, the novelty characteristics/values may be absolute, relative to another element or group of elements, conditional, circumstantial, contingent, and/or the like. In various non-limiting embodiments, novelty may be conditionally limited among a particular population and/or segment, may be an entity or within an entity, or organization, membership club, company, event, project-participants, lab, IPACE members, industry, domain of knowledge, domain of expertise, art unit, city, county, state country, and/or the like. In various non-limiting embodiments, the novelty characteristics/values may be conditionally limited to a particular moment in time, window of time, project, campaign, goal, and/or the like. In various non-limiting embodiments, novelty may be conditionally limited to a defined location/boundary/zone (e.g. college classroom, campus, city, county, jurisdiction, state, country, planet, and/or the like). In various non-limiting embodiments, the novelty characteristics/values may be conditionally limited to a particular collection, segment, permutation, and/or the like, of all the novelty potential delineations.

In various non-limiting embodiments, in addition to the novelty characteristics/values, the IPACE system would preferably perform similar tracking, storing, measuring, comparing, analyzing, scoring, ranking, assessing, and/or the like, for such characteristics/values/components as an absolute and/or relative obviousness, successfulness, reliability, creditability, accuracy, popularity, temporal, demographic, psychological, behavioral, legibility, legality, offensiveness, complaints, insults, deception, fraud, creditworthiness, predictability, impulsivity, commercial-viability, participant health, industry health, patent office health, attractiveness, suitability, sustainability, success-likelihood, commercial-success-likelihood, efficiency, efficacy, desirability, and/or the like.

In various non-limiting embodiments, some participants/users/members can be automatically, systematically, continuously, persistently, conditionally, and/or via/per actor/user-prompt shielded and/or restricted from the knowledge base/state, some element of the knowledge base/state, and/or the like, and/or until some condition is met, such as a deadline, filing, goal, research, search, agreement, financing, investing, funding, payment, patent filing, disclosure, publication, office action restriction, office action restriction withdrawal, abandonment, claim amendment, claim grant, disclaimer, death-of-another (e.g. partner, Joint-Inventor/Co-Inventor, prior art referenced inventor), ruling, and/or the like. In various non-limiting embodiments, the shielding and/or restricting access to the knowledge base/state, some element of the knowledge base/state, and/or the like, and/or until some condition is met, may be limited to a particular period, or window of time/states, and/or the like, where some participants/users/members can automatically, systematically, continuously, persistently, conditionally, and/or via/per actor/user-prompt can or cannot access, view, hear, download, stream, modify, challenge, print, share, re-post, re-visit, forward, link to, copy, credit, purchase, rent, license, lease, communicate, challenge, collaborate, and/or the like, data/content/data/information from the "knowledge base/state," some element of the "knowledge base/state," and/or the like.

For example, conditional restrict the access for a particular user/member, say for the years 1974 to 1999, and/or for a particular art-unit, or where there is a particular in relationship to a particular client, project, patent pending, patent litigation, and/or the like. In various non-limiting embodiments, the shielding and restriction could be utilized to prevent conflicts of interest among attorneys at large law firm, where the IPACE system would track the users/members access roles, rights, privileges, restrictions, limitations, actual usage, requested usage, and/or the like. In various non-limiting embodiments, the shielding and restriction could be utilized to prevent country protected, country-of-origin, and/or the owned intellectual property rights, knowledge, ownership, secrets, and/or the like, from being accessed and/or obtained improperly by non-citizens prior to a governmental approval or approval process, and/or the like, where the IPACE system would track the users/members citizenship, access roles, rights, privileges, restrictions, limitations, actual usage, requested usage, and/or the like.

In various non-limiting embodiments, the shielding and restriction utilized to prevent country protected, country-of-origin, and/or the owned intellectual property rights, knowledge, ownership, secrets, and/or the like, from being accessed and/or obtained improperly by non-citizen prior to the governmental approval or approval process, and/or the like, would preferably adhere to the suitable and/or appropriate rules and regulations, such as section 35 USC 184 of the USA (e.g. and similar for other countries/IP organizations: WIPO/PCT/EPO). In various non-limiting embodiments, the shielding and restriction utilized could be utilized to help prevent, warn/alert, and/or protect citizens of a particular country, inventors of a particular country, attorney of particular country, and/or from potentially losing some intellectual property rights, knowledge, ownership, secrets, and/or the like, from an improperly, premature, and/or the like, disclosure.

In various non-limiting embodiments, some participants/users/members can automatically, systematically, continuously, persistently, conditionally, and/or via/per actor/user-prompt access, view, hear, download, stream, modify, challenge, print, share, re-post, re-visit, forward, link to, copy, credit, purchase, rent, license, lease, communicate, challenge, collaborate, and/or the like data/content/data/information from the "knowledge base/state," some element of the "knowledge base/state," and/or the like.

In various non-limiting embodiments, some participants/users/members can automatically, systematically, continuously, persistently, conditionally, and/or via/per actor/user-prompt access, view, hear, download, stream, modify, challenge, print, share, re-post, re-visit, forward, link to, copy, credit, purchase, rent, license, lease, communicate, challenge, collaborate, and/or the like from the "knowledge base/state," some element of the "knowledge base/state," and/or the like.

In various non-limiting embodiments, some courts, judges, jurors, examiners, PTO employees, attorneys, participants, users, members and./or the like can automatically, systematically, continuously, persistently, conditionally, and/or via/per actor/user-prompt access, view, hear, download, stream, modify, challenge, print, share, re-post, re-visit, forward, link to, copy, credit, purchase, rent, license, lease, communicate, challenge, collaborate, and/or the like; in real-time, near-real-time, on a delayed basis (say after a particular court condition/decision), and/or the like. In various non-limiting embodiments, the IPACE system would preferably track who accesses what information when, where, and why, if known, or where discernible, and/or where relatively perceived why. In various non-limiting embodiments, the IPACE system would preferably track who communicated what to whom, when, where, and/or the like (e.g. via combining IPACE components, such as IPACE-UI, the Knowledge Management System," the IPSocket, the CREATE, the METER, the Todometer, and/or the like). In various non-limiting embodiments, such information and data could be utilized during patent searches, patent development, patent funding, patent prototyping, patent collaborating, patent file preparations, patent filing, patent prosecution, patent licensing, patent litigation, and/or the like.

In various non-limiting embodiments, the Knowledge Management System would preferably track, store, measure, compare, analyze, score, rank, assess, and/or the like, any and all data relationships, correlations, associations, causations, components, elements, participants, segments, trends, and/or the like, between each user, entity, segment, claim, claim element, art element, word, character, video clip/byte, audio clip/byte, discovery, element of novelty, and/or the like. In various non-limiting embodiments, the Knowledge Management System would preferably track, store, measure, compare, analyze, score, rank, assess, and/or the like, any and all data related to an actor-stated, ascertained, discerned, relatively perceived, and/or predicted knowledge comprehension, comprehension trend, comprehension pace, comprehension pattern, and/or the like, per a particular user/member/participant, segment of users/members/participants, entity, location, window of time, project, campaign, goal, and/or the like.

In various non-limiting embodiments, all or some of the results could be conditionally posted for user, industry comments, feedback, challenges, and/or the like. In various non-limiting embodiments, the knowledge-state, along with its associations, links, contributors, discoveries, correlations, relationships, and/or the like, would preferably include a history of what was actor-stated, ascertained, discerned, relatively perceived, and/or predicted at the time, and/or the like, and would preferably evolve over-time, where even data marked as "known" at the time could later be upended, partially modified, reversed, and/or the like, with new information; for example, where a discovery disproves an earlier assumed data point marked as known data point. In various non-limiting embodiments, users/peers/experts, and/or the like, could weigh in with predictions as to what "known" data is likely to be proved incorrect, when, by who, where, why, and/or the like (e.g. become a Predictor via the 1st2Predict module/engine/dashboard).

In various non-limiting embodiments, the predictions could be tracked, analyzed, scored, and/or ranked according to who predicted what, when, and/or how relatively accurate a prediction, prediction element, and/or the like, proved out. In various non-limiting embodiments, the prediction scoring system could simple reward correct predictions, or instead also discount correct predictions that have not yet proven correct, and/or the like. In various non-limiting embodiments, the prediction scoring system incorporates an expiration date on each prediction and/or prediction element, where the expiration date is generated automatically (e.g. within a set time), systematically (e.g. based upon the volume of predictions), conditionally (e.g. based upon the current point/status of the predictor and/or wager), and/or via/per actor/user-prompt (e.g. by a particular user, the boss, the gatekeeper, the predictor, a group/pool of users/predictors). In various non-limiting embodiments, the prediction scoring system tracking, analysis, scoring, ranking, and/or the like, would generate a prediction leaderboard, where there could be an overall point/status leader for such scoring values/delineations, say as the number of accurate predictions, points-earned, status-earned, wagers won, correct predictions, fewest incorrect predictions, and/or the like, and/or some combination, collection, segmentation, and/or permutation of these.

In various non-limiting embodiments, the prediction scoring system incorporates a relative degree of certainty and/or likelihood per each prediction, prediction element, expiration date, and/or the like, where the predictor can limit his/her at risk reputation, status, points, wager, and/or the like, by scaling off of an absolute (100%) prediction. In various non-limiting embodiments, where the prediction scoring system incorporates a relative degree of certainty and/or likelihood, the rewards, status, points, wager, and/or the like, may also be reduced by some amount, e.g. by relative reduction in certainty off of the absolute (100%) prediction (e.g. say 50% certainty/50% of reward, if correct). In various non-limiting embodiments, where the prediction scoring system incorporates a relative degree of certainty and/or likelihood, the rewards, In various non-limiting embodiments, the prediction leaderboard could be filter, segmented, delineated, and/or the like, to limit the predictors who qualify, appear, can participate in a pool, and/or the like, and/or on the leaderboard to, say just US-citizens, just users/members who qualify under a particular TOU/TOP, from a particular state, from a particular company, who are working on a particular project, who have submitted an application(s) within a particular art unit, who have been awarded a certain number of patent claims/granted, who share a relatively similar filing deadline/window/restriction, who share a particular budget limitation, and/or the like, and/or some combination, collection, segmentation, and/or permutation of these.

In various non-limiting embodiments, a first user/member could filter for a second user/member based upon his/her the leaderboard status, points, level-of-participation, level-of-non-participation (where restricted/frowned upon), and/or the like. In various non-limiting embodiments, the IPACE system can automatically, systematically, continuously, persistently, conditionally, and/or via/per actor/user-prompt contact, invite, offer opportunities and/or to members/non-members/users to participate in the PHOSITA testing, to challenge the knowledge base/state, to challenge the validity of a claim/claim-set/patent, to compete in a claim drafting/submitting competition, to participant on the IPACE court, in a particular campaign/project/promotion, and/or the like; based upon his/her the leaderboard status, points, level-of-participation, level-of-non-participation (where restricted/frowned upon), and/or the like.

In various non-limiting embodiments, the IPACE system can automatically, systematically, continuously, persistently, conditionally, and/or via/per actor/user-prompt collect, track, analyze, assess, score, rank, generate a leaderboard, display data, and/or the like, where member/non-member/user data and statistics may either fully transparently, partially available/restricted, and/or fully restricted. In various non-limiting embodiments, the IPACE system can automatically, systematically, continuously, persistently, conditionally, and/or via/per actor/user-prompt incorporate user/non-member/member data and/or statistics that reveal income earned, equity earned, projects participated in, patent claims filed, patent claims pending, patent claims granted, and/or the like, per user/member/non-member, and where the IPACE system can collect, track and analyze why a first user/member/non-member is relatively more successful, more rewarded, more productive, and/or the like, when compared to a second user/member/non-member who appears to be preforming the same and/or relatively the same components, e.g. tasks, projects, within a similar art unit, budgets, timeframes, industry domain, region of the country, education, years of experience, projects completed, customer satisfaction, and/or the like.

Separate Feedback Portal

In various non-limiting embodiments, the IPACE system and associated computer-implemented method generates a separate portal, application, website and/or the like, connected to the main system that allows for feedback from users, such as on participating Attorneys and Patent Examiners (66) for feedback (and for others on IdeaSocket, etc.). In various non-limiting embodiments, the IPACE system connected portal would preferably allow for feedback that is anonymous and/or preferably where it cannot be tracked, so Participants (80) in the feedback may give unadulterated feedback without some of the fears associated with reprisal if the feedback is relatively generic and assuming its source is not highly recognizable and/or discernible.

In various non-limiting embodiments, the IPACE member may create a CREATE rule from scratch/new, modify existing rules, use existing rules as templates, and/or the like. Rules may be set to be global CREATE rules, default CREATE rules, override CREATE rules, individual CREATE rules, and/or stair-step CREATE rules. For example, the IPACE member may create a conditional global CREATE rule where no outside IPACE member may participate unless he/she has a conditionally level of availability on his/her calendar for new project and/or new clients. A default CREATE rule could be created for, say any CREATE rule that fails to address a PTO claim restriction on a pending application, where a default rule could be set for, assume acceptance of any PTO assertions restricting claims to separate inventions when a project does not specifically state otherwise, and where the restriction is anticipated to not generate more than two subsequent applications.

In various non-limiting embodiments, the IPACE member may customize the IPACE-UI (via block 392) appearance, module options, and functionality to access other modules such as the "IPSocket (e.g. IP Apps. and Prosecution)" 384 module, the "IdeaSocket (e.g. Development and Creating)" 388 module, the 1$^{st}$2Report (e.g. Event Reporting)" 389 module, the "1$^{st}$2Predict (e.g. Event Predicting)" 391 module, and/or like directly; or he/she may access other modules through the corresponding top-level module access through the Dashboards (108). For example, the IPACE member could create, review, modify, and/or assign CREATE related rules via the "IdeaSocket" module in block 388. For instance, he/she could create conditional rules regard who, when, how, and why Participants (80) could partake in data/content creation overall and/or for a particular element needed for a creative project, say a particular slide in a slide presentation, and/or the like.

Data/content Fitness Analysis

In various non-limiting embodiments, the IPACE system would perform a data/content fitness analysis of the data/content in a project, document, and/or the like; and generate a data/content fitness score for, say each input, element, letter, word, term, delineated phrase (e.g. delineated by quotes, delineated by the IPACE system automatically due to the particular unique words utilized together, and/or as delineated by the user), and/or the like, in say, a particular document (e.g. a patent application), where the data/content fitness score is based upon a relative likelihood that each input, element, letter, word, term, delineated phrase, and/or the like is supposed to appear in a particular project, in a particular document, on a particular page, in a particular paragraph, in a particular sentence, in a particular sentence location, in a particular figure, in a particular table, and/or the like. In various non-limiting embodiments, the data/content fitness scores may be displayed in a prioritized manner for the user to review and make selections, modifications, and/or the like, if necessary.

For example, the data/content fitness analysis of, say a twenty (20) page specification and/or figures (e.g. patent application) could reveal a "word (or plurality of words) in question," such as the word in question of "startling," where the generated data/content fitness analysis reveals that this particular word in question: "startling" appears, say, relatively out of place, relatively out of context, relatively in frequently, placed relatively similar to another more likely desired word found in another sentence, and/or the like; per the application or similar. In various non-limiting embodiments, the word in question is (1) relatively rarely utilized when compared to other applications in that same particular discernible or anticipated art unit (or categorization methodology, and/or similar segmentations process); (2) relatively rarely utilized when compared to other applications by the same particular inventor, applicants, and/or Patent Attorney (44)/Agent (45) (e.g. practitioner); and/or (c) relatively rarely utilized when compared to other applications, in general, for some segment, say, of time (e.g. all PTO filed utility patent applications that have published within the past two years); (3) relatively a common error made by the contributor (e.g. he/she often types, say, "effect" when he/she means "affect") and/or the like; where the IPACE system generated data/content fitness analysis, formulas, logic, scores, relative rankings, and/or the like, would incorporate this analysis.

In addition, the data/content fitness analysis could also generate, determine and display an "at least one potential replacement word" for the word in question. For instance, following the data/content fitness analysis the IPACE system would preferably reveal the word "starting" as one potential replacement word for the particular word in question of "startling," based upon such factors as (a) a relative number of similar characters within the word; (b) a relative arrangement of the characters within the word; (c) a relative likelihood of a grammatical error; (c) a relative likelihood of a grammatical error; the relative number of occurrences for the word in question "startling," and the relative grammatical ability to replace the word in question with "starting;" a relative usage and/or location; placements and/or a relative purpose. For example, the relative usage and/or location could analyze that the word "starting" and determine that it appears relatively most often when describing the detailed description of a figure. The data/content fitness analysis could also be run for punctuation, numbers, symbols, antecedents, formatting, spacing, consistency, grammar, spelling, and the like.

Insertion Fitness Point

In addition, the IPACE system and associated computer-implemented method could analyze any newly created data/content as a new portion of data/content for generating an insertion analysis and an insertion fitness point(s) relative to a particular project (e.g. patent application), where the IPACE member/user may create the new portion of data/content independent of determining where, within the existing data/content, the new portion of data/content should be placed, inserted, and/or what data/content should be removed, modified, and/or the like; where the IPACE system analyzes the new portion of data/content relative to the existing data/content to build and display a ranking of potential insertion placements, and/or potential edits based upon the existing outline of subject headings, including the hierarchy of a main topic, top-level subject headings with sub-level subject headings per each, along with what particular data/content, data/content formatting, elements (e.g. tables, figures, video, audio, animation, pictures, images, and/or the like), keywords, meta-tags, and/or the like, are relative or are most likely to appear under each. In addition, the IPACE system analysis may reveal the data, statistics, logic, assumptions, algorithms, and/or the like, utilized in the analysis.

System Suggested Insertion Point

In various non-limiting embodiments, the method allows the IPACE member/user to either select a particular IPACE suggested insertion point(s) and/or associated edits (e.g. where unique terms are properly defined sufficiently early, and/or the like); suggest other elements, meta-tags, keywords, and/or the like to incorporate into the IPACE analysis (e.g. a particular keyword that may not have been given sufficient or any relevance in the previous analysis, and/or the like), make insertions and/or edits independent of the suggestions, where the IPACE member/user may include logic and reasoning for going against the suggestions; and/or elect to postpone the selection of the insertion fitness point (s) or the insertion fitness analysis until some threshold or specific amount of data/content, amount of time, and/or like, has been passed.

In addition the IPACE system and associated computer-implemented method could analyze any newly created data/content and display a list of potential insertion suggestions prioritized and ranked based upon the insertion fitness point(s) relative to a particular project (e.g. patent application), where the prioritization and ranking may incorporate an analysis of a perceived broadening or limiting of a particular application, a perceived broadening or limiting of a particular embodiment, a perceived broadening or limiting of a particular claim, a perceived association or disassociation a particular embodiment, a perceived association or disassociation of a particular claim, and/or the like.

For example, the IPACE system analysis for a particular portion of newly created data/content may display a particular list of potential insertion suggestions, where the insertion fitness point(s) are set to initially lean towards creating broad embodiments, and broad claim support, and/or the like. For instance, a highest ranked suggested insertion point could display links to correlated data/content and explain why the highest ranked suggested insertion point is perceived to support a broader embodiment and create broader claim support (if appropriate) when compared to a subsequent or a next highest ranked suggested insertion point. For example, the highest ranked suggested insertion point may appear under a broader embodiment of a particular portion of the application then any subsequent or the next highest ranked suggested insertion point.

In an embodiment and depending on a project's particular TOU/TOPs, in some cases, the IPACE insertion analysis and the insertion fitness point(s) may suggest inserting the new portion of data/content in more than one project, only in a different existing project (e.g. either under the same participants, different participants, or the like), suggest creating a new separate project (e.g. due to the unique nature of the data/content, participants (e.g. fees, conflicts, availability, etc.), potential or actual Inventorship issues created, and/or the like), and/or the like.

Formatting Tracking Per Regulations and Rules

In various non-limiting embodiments, the IPACE system would track and analyze the data/content in a project and/or document, say a patent application, and search for formatting issues that do not meet the MPEP or EFS standards, such as margin size, line spacing, paragraph numbering, and/or the like. In various non-limiting embodiments, the IPACE system would track and analyze the data/content for any proper and improper use of colors. In various non-limiting embodiments, for instance, a Project Manager (43), reviewer, and/or Lead Inventor (40), may be alerted to the fact that there is colored text and/or highlights within a document that either will not be accepted, will be accepted, and/or may cost addition money. Further, it could alert the Participants (80) of potential formatting issues or concerns, say where text is currently underlined, but not that underlining generally depicts an amendment and may later cause confusion. Further each analysis could be tracked and in relation to a particular project, inventor, application, and/or Patent Attorney (44)/Agent (45) (e.g. practitioner) and, where the IPACE system would preferably remember errors made by each and what each actually or likely meant, per incident.

IPSocket—search for patent profanity in existing patents and applications

In various non-limiting embodiments, the IPACE system would analyze data/content and generate a score per patent, per applicant, per participating patent attorney/firm, and/or the like. In various non-limiting embodiments, the IPACE system would preferably attempt to contact parties with notices about the analysis. For example, the notice might say an analysis of a particular patent application contains "108" terms or words relatively perceived to be "patent profanity" by the IPACE system and/or where the analysis, notice, data/content, date, correlations, and/or the like; may incorporate participation by a particular member, group of members, say in the contacted party's company, industry, art unit, and/or the like.

Ambiguity Incidents And Scoring

In various non-limiting embodiments, the data/content fitness analysis of the data/content in a project and/or document, say a patent application, could search and generate a plurality of incidents of potential ambiguity scores, where each incident of potential ambiguity is ranked among the other results for review by, say the particular contributor of the data/content, the project's Campaign Gatekeeper, Reviewer, Editor, Lead Inventor, and/or the like. For example, the utilization of pronouns such as "you, he, him, his, she, her, hers, their, them, it," and/or the like, may create ambiguity if utilized, or utilized poorly. For instance, the data/content fitness analysis for incidents of potential ambiguity would determine where and if each pronoun utilized may be better replaced by a term or word, such as say a "user" or a "particular user." In various non-limiting embodiments, the IPACE system would display all the results or conditionally a portion, where the IPACE member/user could elect to modify the incidents per the IPACE suggestions, ignore the suggestions, postpone a selections, modify a selections, and/or the like.

For example, if the IPACE suggested utilizing the term the "user" for a particular incident of "him/her," however the IPACE member/user instead modified "him/her" to become the "Lead Inventor," the IPACE system would incorporate that user-selection/modification/decision into the on-going logic for replacement options for "him/her" with emphasis relative to similar data/content, where and when determinative.

In addition, the data/content fitness analysis of the data/content in a project and/or document would track, search and analyze word usage and context; for example, usage of the word "to" versus the word "too." Further, track, search and analyze consistent antecedents and element usage also, where say a particular paragraph or claim limitation initially states that there is "an at least one mobile device . . . ," but later perceived or discerned to be correlated language appears slightly different or inconsistent, say "the variety of mobile devices . . . ." The analysis, scores, and rankings of the perceived to be correlated language is analyzed based upon such elements as earlier correlated language usage (e.g. in the same paragraph, on the same page, in the same embodiment, in the same claim, in the same claim family, in the same application, in the same application family, and/or the like), the changing of the language antecedent from "a" to "the" or "said," and/or the like.

In various non-limiting embodiments, the analysis, scores, and rankings of the perceived to be correlated language is also analyzed based upon such elements as subsequent language usage (e.g. in the same paragraph, on the same page, in the same embodiment, in the same claim, in the same claim family, in the same application, in the same application family, in a different paragraph, on a different page, in a different embodiment, in a different claim, in a different claim family, in a different application, in a different application family, and/or the like). The relative likelihood of an incident and its ranking among other likely incidents could incorporate where the proximity and context of the separate language incidents being analyzed and compared for language correlations, including the overall proximity (e.g. in terms of the number or words apart), proximity relative to overall data/content (e.g. the number of words apart relative to the number of words overall in the specification, paragraph, claim, all claims, and/or the like), relative to context (e.g. similar keywords, and/or the like), and/or the like.

In various non-limiting embodiments, the IPACE system may also continually monitor, search, analyze and score data/content for ambiguity, flow, repeated sections, term first-usage location with first term explanation location, first acronym—usage location with first acronym explanation location, and/or the like, along with an analysis for any relatively similar terms, parts, definitions, acronym, sections, concerns, benefits, and/or incomplete sentences. For example, the IPACE system would preferably analyze a text document for its logical flow, where it would look for concentrations of relatively unique terms and where those unique terms appear through the document, relative to each other and relative to other unique terms to build a document flow analysis for a logic flow and to check for definitions appearing when the associated text first appears and/or when it should appear, if not, at first appearance.

In some documents (e.g. a patent application), a particular term (e.g. network) could have relatively slightly different meanings or a very different meaning than that same term utilized elsewhere within the same document, associated document (e.g. specification, parent application, office action response, claims, abstract, etc.). In various non-limiting embodiments, the IPACE system would preferably track and analyze such definition variation to proper placement, consistency, may proper annotation for first use with any necessary clarification for a definition modification per document placement. The say for common terms such as a "user," where the IPACE system would preferably track and analyze the data/content for displaying alerts for perceived inconsistencies, suggested modifications, automatically make changes and/or the like. The user elected changes could be implemented per a set of rules and conditions, say either elected or invoked one at a time, per a document, per a document section, per a particular term, per an author, per a particular participant, per a set TOU/TOP, and/or the like.

Data/content Fitness Analysis For Organizing

In various non-limiting embodiments, the data/content fitness analysis includes an analysis for organizing data/ content for a particular project (e.g. preparation of patent application, the patent application itself, schedules, tasks, timetable, and/or the like). For example, the IPACE system would preferably analyze all the data/content to date for preparing a patent application (e.g. whether being developed collaboratively, independently, semi-collaboratively (e.g. some collaboratively, some independently), and/or the like) to build an outline of subject headings for the patent application. In various non-limiting embodiments, the IPACE members/users could utilize the headings, so that they appear in the eventually submitted application, or simply utilize the subject headings while in development/beforehand for organizing files, where the submitted application would not actually display/incorporate the subject headings.

In addition, the outline of subject headings may include a hierarchy. For example, a main topic, followed-by any top-level subject headings, each with any sub-level subject headings, and/or the like. Each subject heading (e.g. main, top-level, sub-level, and/or the like) would generally include what particular data/content, data/content formatting, elements (e.g. tables, figures, video, audio, animation, pictures, images, and/or the like), keywords, meta-tags, and/or the like; that are relatively perceived to be most likely to appear under each, discernible to appear under each, user-selected to appear under each (e.g. per user), and/or the like. The method also allows each user to rearrange the outline, where the associated and assigned data/content reorganizes according, and where the results may be utilized collaboratively, independently, semi-collaboratively, temporarily, conditionally, following some decision, feedback, permission, and/or the like.

Data/content Categorization Analysis

In various non-limiting embodiments, the IPACE system would preferably analyze data/content associated, correlated, and/or the like, with a project (e.g. say twelve pages of data/content for a patent application in development) and display what the IPACE system perceives as a main subject heading, followed by a plurality of top-level subject headings, each with a plurality of sub-level heading (if applicable) and display/present the results to each participating IPACE member/user. For instance, the IPACE system data/content analysis for generating a top-level heading subject from a patent application, may incorporate a range of methodologies to suit a particular IPACE member/user or group of IPACE members/users writing style, where, for example, the top-level heading subject may incorporate language from an initial appearance of a concept, a system, a method, and/or the like, and a sub-level heading subject may incorporate language from subsequent an embodiment.

For example, the IPACE analysis of data/content correlated with a patent application would analyze each paragraph to determine if the data/content is perceived to be a relatively new concept, a relatively new embodiment of an existing concept, a relatively similar concept to the previous paragraph, a relatively similar concept to any previous paragraph, and/or the like. For instance, a particular paragraph that starts and states:

A system and the computer-implemented method for collaborative color-coding may include tracking each author's work, say where one author's original works (as Author "Y") appears in yellow, another author's original works (as Author "R") appears in red and a third (as Author "B") original works appears in blue; could generate the top-level heading subject "Collaborative color coding" if it's the first time this phrase and concept appears, and/or the sub-level heading subject tracking each author's work, if it's perceived that the subject, concept, and/or the like of "Collaborative color coding" is or appears to be repeated in other paragraphs, and where tracking each author's work, is or appears to be create a relatively good delineation from other neighboring data/content, paragraphs, examples, instances, embodiments, and/or the like; and/or relative to non-neighboring data/content, paragraphs, examples, instances, embodiments, and/or the like.

In various non-limiting embodiments, the IPACE member/user could review the displayed results, where he/she may acknowledge and agree with the analysis, make modifications as desired, and/or the like. For instance, the IPACE member/user could correct a particular top-level heading subject (e.g. from say "B: Client Proximity" to "B: Mobile Location Approximation"), then rearrange the top-level subject headings (e.g. from "A/B/C/D/E" to say "A/B/D/C/E," where it then recreates the A-E chronology/flow), reassign a particular sub-level heading to a different top-level subject heading (e.g. from say "was A3 under A" to "B2 under B"), and/or the like.

Tracking Changes and Contributions

In various non-limiting embodiments, the IPACE system and the computer-implemented method tracks changes and contributions where a particular user may take, say a document or figure from another application that they have created and mark the entire document as unrevised by say designating all the text that is currently, say black to red. Then, as the member/user changes sections to match a new purpose, he/she may delineate those new and/or revised sections from the past document and have those new parts analyze, generate, and display a list of parts and/or elements for say a new invention. It could also track, analyze, generate and display lists for duplicate part numbers and/or conflicts in terminology and/or lexicography and/or the same or similar terminology and/or lexicography with different part numbers. In addition, once a previous part (or portion) is reintroduced into the new version, the IPACE system would preferably update all other appropriate pages and/or figures, say from red to black for that same part number (or portion) and part name throughout spec.

In various non-limiting embodiments, the IPACE system and computer-implemented method preferably provides the user options to track and save modifications, where the IPACE system automatically, systematically, continuously, persistently, conditionally, and/or via/per actor/user-prompt may generate a list of modifications that may be filtered, analyzed, scored, ranked, sorted, and/or the like. For example, the generated list of modifications may be sorted and displayed historically, where the user has a plurality of options on how to manage a variety of data/content (e.g. characters, text, a word, phrase, number, symbol, logo, sentence, paragraphs, formatting, styles, document, website, application, database, spreadsheet, cell, range, photos, video clip, audio clip, image, object, animation, slide, and/or the like), modifications, functions, features, and/or the like. In various non-limiting embodiments, the IPACE system generated list of modifications may be displayed in a separately managed window and/or application, a sub-window within an application, as an overlay within an application or independent of the application, in a title bar, in a menu bar, and/or the like.

In various non-limiting embodiments, the generated list of modifications are preferably, continuously, and iteratively, stored, saved, tracked, analyzed, and/or the like. The generated list of modifications is preferably delineated into stackable encapsulated segments referred to as an incident, where each incident comprises a session start, user inputs, a session end. The user inputs, comprise such inputs as a keystroke, key combination, mouse-click, voice command, voice session, button press, download, ingestion, peripheral media I/O, and/or the like; along with a recorded sequence of events between each session start and session end, comprising inputs, features, functions, local time, calendar time, project timer, absolute time, relative time, timestamps, users, participants/roles, collaborators, status, questions, comments/user, feedback, options, suggestions, decisions, selections, system automation, associated code/methods, conditions, rules, logic, algorithms, and/or the like.

Ghost Iteration Function

In various non-limiting embodiments, where a traditional function such as a 'deleted' function is preferably replaced with a ghost iteration function; where each deletion (e.g. character/text) and correlated function setting, previous state, current state, and/or the like, is saved in the list of modifications. For example, utilization of the traditional 'delete' function could be replace with the ghost iteration function and features, where each deletion (and/or modification), would cause the selected text to become relatively less opaque. In various non-limiting embodiments, when utilizing a delete key, a delete-combination of keys, a cut function, a typing over characters in "non-insert mode," and/or the like, the user would have ghost iteration functionality. In various non-limiting embodiments, when the user deletes a selection of text, that text goes from 100% opaque (e.g. black) to 90% opaque/black. In various non-limiting embodiments, a subsequent modification back to 100% black or "80%" opaque, depending on the modification. In various non-limiting embodiments, the ghost iteration function, may have features and/or functionality that could be prompted via a new and separate set of assigned inputs (e.g. keystrokes, key combinations, mouse-clicks, voice commands, and/or the like) to employ specific functions, option, features, historical recall, and/or the like.

List Of Relative Resource Hogs

In various non-limiting embodiments, the IPACE system may automatically, systematically, continuously, persistently, conditionally, and/or via/per actor/user-prompt generates a list of relative hogs, comprising applications, participants, devices, computers, capabilities, features, functionality, and/or the like; discerned, and/or relatively perceived to be causing a relative latency, drain on resources, and/or the like. In various non-limiting embodiments, the IPACE system may automatically, systematically, continuously, persistently, conditionally, and/or via/per actor/user-prompt suspend items on the list of hogs, based upon such things as the relatively perceived latency cause for each, the relative perceived drain on resources, a likelihood of utilizing each in a particular window of time relative to a history, a usage pattern, a time of day pattern, an open/layer/close status/history per each, a participant activity pattern, and/or the like. For example, the user may select a specific capability, feature, function and/or the like, from the list of hogs and temporarily suspend, and/or temporary override a suspension of the feature, capability, and/or the like.

In various non-limiting embodiments, the IPACE system may automatically and/or conditionally suspend some features and/or functionality, say conditionally due to a system perceived delay, deadline, budget constrain, power limit, thunderstorm, user challenge, user surge, memory limit, display limit, and/or the like.

Lesson-learned Incident

In various non-limiting embodiments, the IPACE system may provide settings where a particular function has a set of conditions to create a lesson-learned incident, where the IPACE system tracks, compares, analyzes, evaluates, assesses, and determines a first input against another input (e.g. historical inputs) to evaluate/assess whether the first input is relatively similar to a previous lesson-learned incident. In various non-limiting embodiments, the IPACE system may ascertain, discern, and/or relatively perceive a lesson-learned, a lesson-learned provider, a lesson-attained more/less from another user, collaborator, and/or the like.

In addition, each incident and/or lesson-learned incident may be automatically, systematically, continuously, persistently, conditionally, and/or via/per actor/user-prompt saved, tracked, filtered, sorted, and/or the like; as a list of incidents, along with data, statistics, information, such as each relative and correlated user input. Further, certain conditions, rules, inputs, and/or the like, would constitute a unique incident, where a particular unique incident would generate a lesson-learned incident. For example, a lesson-learned incident may comprise a particular input, data/content, word, phrase, element, participant, feature, function and/or the like, along with a particular utilization method, sequence, quantity, arrangement, placement, collaboration, metric, score, argument, challenge, alert, and/or the like; where the historical data in the IPACE system and analysis automatically, systematically, continuously, persistently, conditionally, and/or via/per actor/user-prompt triggers an alert for a discerned and/or perceived lesson-learned incident.

For example, the lesson-learned incident may involve a particular historic event based upon user inputs, and/or system analysis, where a particular moment in time, a particular modification, sequence of events, and/or the like, is/was perceived as a relatively significant event/incident. The lesson-learned event would preferably analyze any and all events, inputs, participants, data, statistics, and/or the like, relatively perceived to have caused, correlated, and/or the like, the relatively significant event/incident. In addition, preferably analyze regarding any and all events, inputs, participants, data, statistics, and/or the like, relatively perceived to have eliminated, prevented, avoided, and/or the like, the relatively significant event/incident. The relatively significant event/incident may be significantly positive or negative, from a particular perspective, from a conditional perspective, and/or the like. Further, the relatively significant event/incident may have its relevance relatively increase/decrease over time, per project, per perspective, per art unit, per participants, per law changes, per rule changes, per country, per budget, per deadlines, per stages, per new data/statistics, per new events, and/or the like. Consequently, not all relatively significant events/incidents constitute a lesson-learned incident that would generate an immediate alarm for all members/user under all circumstances, and/or the like.

In various non-limiting embodiments, the IPACE system would preferably automatically, systematically, continuously, persistently, conditionally, and/or via/per actor/user-prompt analyze data (e.g. an open document), user inputs, and/or the like; continually or upon a user prompt, and generate a list of event/incident that fit and/or relative fit a particular or specific event/incident. For example, the fit and/or relative fit for: a specific significant event/incident; a specific lesson-learned incident; a group and/or segment of significant events/incidents; a group and/or segment of lesson-learned incidents; and/or some combination, permutation, collection, and/or the like. For instance, the generated list of event/incident would preferably score and rank each fit and relative fit per significant event/incident and/or per lesson-learned incident; where the relatively most significant event with the most significant fit could be scored and listed first on the list. For example, the IPACE system analysis could reveal, in real-time, that a particular user is repeating a pattern of word usage that previously proved relatively harmful when trying to overcome a particular piece of prior art within the same art unit as the current document is perceived to relative belong. Here the IPACE system may display, suggest, and/or the like, the known, and/or perceived relatively best alternative, along with a list of other alternatives and/or along with any correlated outcome, associated rational, and/or the like.

Conditional Highlighting

In various non-limiting embodiments, the IPACE system and computer-implemented method for color highlighting changes by a particular user are relative to a particular user type or relative set of conditions. Further, where the color highlighting changes as a particular user types relative to conditions set. For instance, a particular condition could set where all text highlighted in yellow is subject to review and where any changes in the yellowed highlighted section cause the yellow highlighting to be removed or another color. In the sample paragraph indented below, the yellow area is depicted by the bold italic text, and the area of the changes is depicted by text without bold or italic.

[Sample Paragraph] The counter affect would be for member to potentially slow down his/her efforts near the deadline, so the system would preferably monitor these types of conditions as well. Meaning, not only which Member are good at maintaining the original terms and getting projects done well, on time, and with the original resources, but also track which participants were involved and the same for those projects that seem to need a boost at the end. So as to distinguish which particular employees/participants most often appear in the projects with the better data, opposed to those who most often appear in the projects with worse data (or in scenarios with say, several late term modifications/incentives required).

In various non-limiting embodiments, a variety of hues, intensities, and/or saturation levels could be incorporated to distinguish different authors, a relative time of the change, a level of certainty toward a final draft, a review by a particular reviewer, and/or the like. In addition, the variety of hues could evolve where one saved iteration or version could conditionally reset some or all the hues, intensities, and/or saturation, say by a time clock, where every day at midnight, the document is reset to "no highlighting," so changes may be viewed relative to one day or whatever time iteration is selected. Time iterations could be different for different Participants (80), where authors are daily, but Reviewers (64) are per month, or per a set review period.

Color-Coded Comments Based Upon An Association

In various non-limiting embodiments, the IPACE system and associated computer-implemented method may analyze a transcript and display color-coded comments based upon an association with a particular participant among a plurality of Participants (80). For example, the transcript could be a word document where it analyzes and may displays a color-coded word count per participant, and also analyzes both the data/content and the comments for perceived relative level and/or points of agreement and/or differentiation. In addition, the color-coding may incorporate the perceived relative level and/or points of agreement and/or differentiation, where, for example, a comparison of an author and/or reviewer/commenter who is assigned the hue yellow may be analyzed and compared against another author and/or reviewer/commenter who is assigned the hue red, where data/content only reviewed by the person assigned the yellow hue appears in yellow, and where data/content only reviewed by the person assigned the red hue appears in red. However, data/content reviewed by both parties would appear in the combination of the red and yellow hues for an orange hue. In addition, the orange hue could have a separate continuum for the perceived relative level and/or points of agreement and/or differentiation, where, for example, the orange hue could be assigned to be fully saturated when the two are perceived to fully agreement on a particular comment/point (e.g. a modification, style, word usage, term, lexicon, and/or the like) and the orange hue may be almost fully de-saturated (except for a value low enough to still observe it as the orange hue) when the two are perceived to fully disagree on a particular comment/point (e.g. a modification, style, word usage, term, lexicon, and/or the like).

Computer-Implemented Visual Modification Explanation

In various non-limiting embodiments, the IPACE system may fully, and/or conditionally track the IPACE member/user (e.g. a project participant) who is utilizing a computing device (e.g. computer, mobile device, and/or the like) that is either attached to the IPACE-Hub and system; attached to an-IPACE-monitored-device (e.g. within a PIN); via tracking software (e.g. installed on the computing device, network, host, accessed database, and/or the like) and/or the like. In various non-limiting embodiments, the IPACE system then tracks all inputs anyone (e.g. the same IPACE member or someone else) subsequently makes to the base document and/or document template. For example, as the IPACE member/user types, the IPACE system analyzes the input to generate and display a visual modification explanation of number of changes this particular IPACE member/user has made from the base document and/or template. For instance, the visual modification explanation may be in the form of text that builds up around any perceived and/or discernible part/element names and/or numbers in a flowchart program and/or a spreadsheet with similar part/element names, part/element numbers, per project, per PIN, per figure number, and/or the like. Depending on the TOU/TOPs and/or the like, the IPACE member/user may conditionally, temporarily, and/or permanently, increase/decrease the number of elements, projects, participants, inputs, databases, programs, and/or the like, utilized within the IPACE analysis.

Color-Coding Modification

In various non-limiting embodiments, the visual modification explanation may include text and/or objects that comprise color-coding. For instance, if no changes have been made, then the text could be set to appear as normal, say the typical black font on a white background. In various non-limiting embodiments, however, as changes are made the type color (e.g. hue, saturation, intensity, and/or the like) could change to black on a relatively soft gray background (say, R=235%, G=235%, B=235%, vs. white or where R=255, G=255, B=255). The more changes the user makes the type color changes to potentially reach white text on a black background (R=0, G=0, B=0). In various non-limiting embodiments, the IPACE system would preferably incorporate other color transitions, or color channel transition, and/or could be set to avoid the same text color appearing over the same background color, where the text would be lost on the background.

In various non-limiting embodiments, the IPACE system display settings may be automatic and/or user-modified, where, per the above example, the text areas (or text portions) with the most user changes would appear closest to the full white text color over the most close to full black background. Whereas the text areas with the least changes would appear the closest to full black text over the most close to full white background (say a very light gray for a relatively few changes). These variations could be setup to run from one section to another, say one sentence independent of the next or where there actually could be hard (e.g. color cutoffs, or steps) and/or soft variations (e.g. gradients) within a sentence, or within a figure.

In addition, there could be a preset threshold of changes necessary before the colors (or the like) would change to the next level or value. Further, these preset thresholds could also be relative to the number of changes made overall within a project, made overall by the participant, relative to the project overall, a particular portion of a project, a particular application, a particular window of time, set by the Lead Inventor, Campaign Gatekeeper, and/or the like. The benefit to the author is to see areas of originality and areas of relatively little new substance, where he/she may want to go back and improve or realized that the originality comes from other key sections, say when claim draft is started.

Organizing Files

In various non-limiting embodiments, the IPACE system and associated computer-implemented methods would organize files, where the IPACE member/user may display a directory of files, and wherein the files are delineated into to subfolders he/she may select. For example, one folder with all items created and/or modified in the past 24 hours, another for items within the last week, another for items within the last month, and for all other/remaining items. In various non-limiting embodiments, the user may setup the delineations to not show files in the 24 hour folder in the other folders, or to list, but instead indicate the presence of file in other folders by highlighting and/or arranging files also in other folders.

While that is one example to relatively quickly finding files, there could be other methods. In various non-limiting embodiments, a method preferably includes other delineations, such as per software utilized to create the file, so that a folder only had, say files created and/or modified in the past 24 hours utilizing Word® another for Excel®, another for Photoshop®, another for PowerPoint®, and for Dreamweaver®. Further these folders could highlight and/or arrange files by a particular version of the software (Word® 2003®, Word® 2007®), perceived authors, file size, and/or the like.

In various non-limiting embodiments, the delineations could incorporate such distinctions as the time gaps between modifications, where instead of files being delineated by when the file was created and/or modified, the files could be delineated by those files with the smallest gaps between creation and modification, down or up to those with largest time gaps. Here the user may find files that may or may not still be relevant, where files may have been lost, forgotten, or where progress needs to be revisited.

In various non-limiting embodiments, these modification gaps may also indicated that a particular document has matured to relative finality, such as a boilerplate contract that is repeatedly utilized, but retrieved and/or saved under the same name without modifications. In various non-limiting embodiments, the IPACE system would also track links between files, where a particular contract may have started from this particular boilerplate, so the user may request a display of all contracts that started with the same boilerplate, done in Word® 2007®, and broken down into time periods of created/modified within the past 24 hours, week, month, year, and so on.

More Computer-Implemented Collaboration Tools and Color Tracking

In various non-limiting embodiments, the IPACE system and associated computer-implemented method for Collaborative color coding may include tracking each author's work, say where one author's original works (Author "Y") appear in yellow, another author's original works (Author "R") appear in red and a third (Author "B") original works appear in blue. When it's not clear which author originally wrote something, the IPACE system may first combine the colors of, say two authors the IPACE system perceives as the potential originator or as co-originators, say where Author "Y" in yellow is combined with Author "R" in red to make orange (say background and/or text color). For instance, while an author is typing, if any block of text is exactly or resembles another author, (according to preset IPACE rules and conditions, which then pass a particular threshold of a "perceived creative overlap" (e.g. where four particular types of consecutive words (e.g. phrase) are an exact match or relatively similar match based upon a pre-built lexicon and/or semantics engine and/or module) and/or where the data/content is relative to a particular project topic category (e.g., IP-preparation, song-lyrics, news reporting, perceived and/or actual crimes, emergencies, violations, and/or the like; weather, sports and/or celeb gossip; and/or the like) with time delineations (e.g. today or within the last week or the like)), then the color (e.g. hue, saturation, intensity, but typically hue) could change (in this example to orange) in near real-time or the like, to alert the author(s) who is presently writing/typing and to let any authors involved (with the appropriate privileges) preview what has been written by the other "subsequent" author.

In various non-limiting embodiments, the IPACE system may also compare differences as in when an event is said to have taken place (e.g. an occurrence), who was there, who was in involved and exactly where, when, why, and how it is perceived and/or discerned to have occurred. For example, the occurrence could come down to a download of documents, where the subsequent author may be able to challenge and/or prove to be the originator with sufficient documentation of an earlier creation date, witness, document timestamps, and/or the like.

Computer-Implemented Find and Replace

In various non-limiting embodiments, where the IPACE system employs a "find and replace" function, such as in the CREATE module, where the "find and replace" functionality may be limited to particular portion or sections, say a particular section of text limited to a detailed text description of a particular figure. For instance, where the detailed text description could be delineated analyzed and generated automatically by such factors as where a text section starts with, say "FIG. 1 is . . . " and ends where, say the next figure, say "FIG. 2 is . . . " starts; and/or incorporate a delineation adjustment to the particular section for the attributable-detailed text description by the IPACE member/user. Further, the delineation and/or user adjustment of the particular section for the attributable-detailed text description could have multiple start and stop points throughout the specification. In addition, after making a change with the "find and replace" functionality to the particular section, the IPACE system would preferably check for any exact and/or similar terminology and/or lexicography that the user may also what to change and creates a list and links for each occurrence to the actual document and/or location. For instance, after a "find and replace" of a particular term, the IPACE system would preferably check for other occurrences of that exact term, and/or a relatively similar term(s), where the IPACE system would preferably analyze, rank and display the relatively similar terms in accordance with a relatively similar score/value.

In an embodiment of "Find and replace," the IPACE system would allow for replacing part numbers, Figures, and sheet numbers, where each number could also have a special hidden ID in front of each number, say a part number. So when the IPACE system finds and replaces a particular number such as "201," the system, for example, is actually finding and replacing "ABC201," where the special hidden ID is "ABC" and typically hidden, but could be made visible. The special hidden ID allows the IPACE system and/or user to find and replace each like numbered part with "201" with, say "333" and this helps prevent the erroneous swapping out of other items (e.g. non-numbered parts), such as, say a year date of "2012" that may appear in the specification that may otherwise have replaced the "201" in "2012" with "333" and potentially incorrectly become "3332." So preferably the IPACE system and the special hidden ID would then only replace those particular parts labeled 201 to become 333. In addition, the special hidden ID could also avoid converting a part "2011" to "3331."

In an embodiment of "Find and replace" the IPACE system would preferably perform a search (the find component) and uniquely identify all occurrences within, say any field within a spreadsheet cell field. The current state of the art generally finds a spreadsheet cell field with, say the letter "A," however if that particular spreadsheet cell field actually says "have a nice day," generally the current state of art does not uniquely identify each occurrence of the letter "A" within the spreadsheet cell field and/or which occurrence of the letter "A" is currently selected for replacement. So if the user wishes/decides to say: replace, cut, and/or copy with the current state of the art, it is unclear and/or confusing which letter "A" will be replaced. So the IPACE system and method would instead uniquely identify and indicate which "A" is currently selected, say with a particular highlight, bolding and/or reverse video indication, where the IPACE system may "replace" or move to the next occurrence.

In an embodiment of "Find and replace" (and search), the IPACE system would preferably search for marked edits, say 'underlining" in an OAR response from the PTO. The current state of the art only searches for "spaces between" text where an underline formatting occurs and NOT all the words that are underlined. So the IPACE system would instead provide an ability to search for all words with the "underline" formatting only and not necessarily with per specific text with underlining as is required in say a Word® document.

In an embodiment of "Find and replace" (and search), the IPACE system would preferably allow for searches without any text, say a search for the format perimeter 'underlining," where there is no text specified, yet the search results would include each underline incident, including underlined text. The current art only locates spaces between underlined words that are underlined. In an embodiment of "Find and replace" (and search), the IPACE system would preferably allow for searches perimeters that incorporate symbols and/or markings typically utilized in PTO Office Actions (OA), Office Action Responses (OAR), and/or the like.

Computer-Implemented Color Assigning and Sorting

In another embodiment, say under patent collaboration and/or for spreadsheets, the IPACE system has an ability to sort cells/fields by colors or values other than alpha-numeric. For instance, when assigning color value to fields with a particular term in excel, the user could put in a unique term in the "find and replace" field to help sort later. For example, with the current state of the art, the user may have had to utilize the "find and replace" every time he/she wants to find and replace "includ" with the same "include," but now with a particular hue (e.g. a particular purple color) background formatting and/or highlight. However, the IPACE system would instead suggest putting a particular special hidden id of "xx" in front of the same cells to help sort. Further, the IPACE system and/or user could delineate if "includ" is either the start of a cell, within some range of characters from the start of the text string, or anywhere within the cell/field. When converting the cell/fields to a say a word document, the IPACE system would preferably temporarily use a paragraph mark to start each sentence with "xxinclud" and the remove the "xx" and paragraph marker and doing the "color sort."

Further, an ability to sort and color code neighboring cell formatting, say when neighboring cells are the same number then create an indicator to identify, say make the background of the cell/field for the same numbers in different cells/fields both the same color e.g. a color with a specific hexadecimal value of green or instead utilize another unique background color to show the same number in the neighboring cell/field, but with a different color represented by a different hexadecimal. The color coding for the same number or numbers that are relatively close to each other could be different shades within a particular hue, where say the lower values are less saturated and the upper values are more saturated or vice versa. Then the user could also sort fields by color, hexadecimal value, hue, saturation, intensity and the like; and/or some range within each or a collective range of values.

For instance, with a hue sort function, where the IPACE system and/or user could preset which was the starting hue value for the upper range and which direction (clockwise or counter clockwise) was the declining direction, the IPACE system would analyze and generate a sort list accordingly.

A problem with the current state of the art for utilizing the typical "find and replace" function is where the user wants to search for, say "color" and replace with "color/hue," but there are some instances or places within the document where the change to "color/hue" have already been made, so if the user utilizes the "replace all" function, the existing instances with "color/hue" become "color/hue/hue," which is incorrect. In various non-limiting embodiments, the IPACE system would instead allow the user to see a find and replace table of suggested exceptions to the "find and replace" operation about to be performed, or previously performed, where the user may add or remove text strings or ranges that he/she wants a exceptions. After the find and replace operation is completed, the IPACE system maintains a history of that operation and all the associated elements, so that other users, member, Participants (80), collaborators, and the like, may see the changes made chronologically, and where the changed may be reverted.

For instance, a particular user or member who with the appropriate permissions could utilize functionality to revert back to a particular version, say where the word "user" was always "member," without affecting any other subsequent edits. In some instances, the particular user may need his/her change request approved by another member or members, or by a judgment panel, or group of votes, and/or the like. In various non-limiting embodiments, the IPACE system analysis would preferably generate suggested edits or modifications based upon what makes the document flow logically within a particular lexicon, and/or the like. In various non-limiting embodiments, the IPACE system analysis would preferably generate suggestions in relation to other documents, such as a parent application being referenced and/or the like.

Text Mappings

Further, the IPACE system would allow Participants (80) to create word maps, where, in one document, say a technical manual, a particular word is mapped to another particular word or group of words in, say a particular patent application. For instance, a particular company may call a particular product the "Y-Box," but in the patent application it was called the "set-top-box." In various non-limiting embodiments, the IPACE system would preferably generate a mapping of each location of each in each document where a particular user could request to see either or both versions of text. Further, the user could annotate and/or correct any text mappings where the linkage between text needed correction, say where a reference to a competitor's "set-top-box" was being mapped to the "Y-Box," but instead should link to another name, say the "GameStation."

Further, departments may tag names to particular sub-elements, as a product evolves or becomes sub-categorized. For instance, the "Y-Box" could become split into a "Y-Box-V1" and a "Y-Box-V2" and the like, where each has a list of attributable features, named Participants (80) per modification, and the like. This also helps track when and where features were suggested, added, modified, and by whom.

This text mapping and linkage may help bridge the communication issues that occur with different lexicons between different documents (e.g. patents, technical specifications, user manuals, marketing materials, and the like) and different departments or segments (e.g. legal, marketing, engineering/technical, finance, business development, executive/management, board of directors, Investors (67), Inventors (70), Contractors (56), vendors, suppliers, manufacturers, and/or the like). This type of text mapping could also help when documents need to be translated for other languages to help maintain a common lexicon.

Modification Notifications

In an embodiment of a "Find and replace" methodology, the IPACE system would preferably be setup-by-the-user-to or automatically send notifications of each edit and/or modification made by any others to each collaborator that the IPACE member/user was/is working with, along with specifically what, when, and by who the edits/modification were made (and per the TOU/TOPs and/or the like, perhaps additional information, such as a reason/why, per who's instruction, advice, and/or the like). In addition, where others (e.g. participants, contributors, inventors, project managers, peers, experts, reviewers, consumers, juror, judge, IPACE system, and/or the like) may challenge the relative wisdom, make suggestions, and/or revert to an earlier version, by default rules, votes, and/or some rules for consensus depending on conditions, such as roles, and the like. Further, the IPACE system would preferably analyze modifications and user inputs to generate and display a consensus among a particular group and/or segment regarding the relative wisdom for each particular modification and/or the like.

In addition, the IPACE system would allow a participant to create new data/content that may be added to a plurality of versions, iterations, and/or the like, independent of the advice, votes, rules, and/or the like. For example, if a particular project participant decides to continue to create and/or modify data/content rejected by, say the lead inventor, that data/content may survive independently, where the particular project participant may reintroduce the data/content at a later moment in time, based upon say, modifications, suggestions, additional feedback, and/or the like. Depending on TOU/TOPs and/or the like, the particular project participant may be able to modify the terms for including the data/content or data/content edits, or modify the terms for be allowed to take the data/content outside the particular project, say to file separately, independently, and/or the like.

In an embodiment of "Find and replace," the IPACE system would track future modification and alert the author of cases, where the text, lexicon, and/or terminology being utilized as part of the previous find and replace. For instance, if a IPACE user was inserting a particular terms, such as "mobile device" into the text of a document, where previously all instances of the term "mobile device" were replaced by the term "transceiver," then the IPACE system would analyze the data/content, generate and display a report where the IPACE user could selectively approve each term replacement, replace the term only within the section of the new edits based upon, say author, location, and/or time; or globally replace all cases of the term "mobile device" with "transceiver."

In an embodiment of "Find and replace," the IPACE system would preferably track and analyze modifications, such as inserted section from a "cut and paste" function, where there could be an analysis for terminology and/or lexicon, flow, definitions and/or the like. For example, an IPACE user could move a particular figure in a patent application and therefore rearranging the flow of text and data/content within the patent application specification, where the IPACE system would preferably then analyze any terms relative to where they were uniquely introduced before, at, and after the particular figure, to make sure the data/content flows in a comprehensive manner. If, for example, the moving of the particular figure from, say FIG. 10 to FIG. 5, causes issues among the terminology and/or lexicography because some components of FIG. 5 (formerly FIG. 10) have not been previously mentioned, or may not have been fully described until FIG. 7. In various non-limiting embodiments, the IPACE system may provide the IPACE member/Participant (80) a range of options, such as (1) an option to only move the once FIG. 10 up to FIG. 8, (2) an option to rearrange the written description to move up and/or add the appropriate FIG. 5 components (which previously appear back at FIG. 10) in the written description, and/or the like.

Color-coded Find and Replace

In various non-limiting embodiments, the IPACE system may sort and color code spreadsheet cells based upon a set of conditions. For example, the IPACE system may display a range of selected cells (e.g. rows/columns) that are sorted by a particular value, say dollars amounts from highest to lowest, where a system implemented color-coding scheme creates and displays a background color/hue under the text for the dollar values to notify/alert an IPACE member/user of a range of automated or user-selected similarities (e.g. within a similarity threshold). For instance, the IPACE system would preferably be setup to automatically and/or via a user-selected condition(s) to sort the dollar values and then search for cells containing the same dollar value or a relatively similar value/number (e.g. within a particular threshold); where, say the IPACE system displays a particular background color/hue (e.g. a particular hexadecimal value of say, green) for any cell containing that same dollar value (e.g. for a particularly user-selected (e.g. dollar) value).

In addition, neighboring cells (e.g. above, below, left, right, overlay, other spreadsheet tabs, and/or the like) that are in the same spreadsheet, and/or within a user-selected range that contain dollar values or numbers that are not exactly the same value could display another unique background color to indicate the relative similarity. For example, the relative similarity could be visually represented by utilizing different color/hues assigned by the user and/or with relatively different hexadecimal colors/hues. Further, the color coded cell backgrounds may be different shades within a particular hue, where say the lower (e.g. dollar) values are represented by a relatively less saturated color/hue and the upper (e.g. dollar) values are represented by a relatively more saturated color, but the same hue.

Further, the IPACE member/user could select, group-select, reference, go-to, sort, arrange, prioritize, modify, and/or the like; user-selected fields, cell ranges, tabs, spreadsheets, documents, and/or the like; by color, hexadecimal value, hue, saturation, intensity and the like; and/or some range within each or collective range of values. For example, the IPACE member/user could specify to select all values within a particular color range, by hue, saturation, and/or intensity, where he/she may then cut and copy that select data/content, modify the data/content, go-to a particular value (e.g. the highest or lowest), display a chart, link to a table or another application (e.g. website), copy to a database, monitor (e.g. if dynamic data), and/or the like.

Find and Replace within a Field

Some art today may search, say a spreadsheet for any field containing a user-selection, say "find" the letter "A" to generate a search result. However, if the search result includes a particular spreadsheet field with the data/contents, say of: "have a nice day," then the user may not be able to discern which particular letter "A" is currently selected in the results; and thus he/she would be hampered to utilize such additional functionality as say a replace, cut, copy, and/or the like function. In various non-limiting embodiments, the system, on the other hand, may search to locate such fields and highlight elements within the search results, where each particular letter "A" is highlighted independently as currently selected for such functionality as replace, cut, and/or copy; and where the user can, say press tab to advance through all the "A" within the search results. In addition, the same would work for common words found in a particular cell, and where the user could tab through all the word iterations throughout the search results.

Computer-Implemented Section "undo" tracking per section

In various non-limiting embodiments, the IPACE system and associated computer-implemented method, instead of "undo" per document, an undo per section or per word, where a particular user could click on a section. Say in a figure, spreadsheet cell or sentence in a word document and the undo could cycle through all historical modifications per that delineated section, field, and/or sentence.

For example, if the user clicked "undo field" in a spreadsheet, it would show the user a list of all historical entries placed in that field, where the user could select one or cancel to maintain the current data entered. For example, in a PPT figure, if the user clicked "undo text" within, say a text box, it would show the user a list of all historical entries placed in that text box or slide, where the user could select one or cancel to maintain the current data entered. For example, in a word document, if the user clicked "undo text" within, say a selected sentence, paragraph, page or section, it would show the user a list of all historical entries placed previously in that same relevant text section, where the user could select one or cancel to maintain the current data entered.

Undo/Redo Threads

In various non-limiting embodiments, the Undo/redo threads would preferably provide nonlinear undo/redo, where the user could select from a list and/or a range of undos/redos from a list, and/or per section, per figure, per IPACE member, per page, and/or the like. In various non-limiting embodiments, the Undo/redo threads would preferably provide an ability to undo/redo across separate and/or unrelated sections, across separate and/or unrelated documents, across separate and/or unrelated applications, across separate and/or unrelated software platforms, across separate and/or unrelated computers, and/or per section, per figure, per IPACE member, per page, and/or the like.

In various non-limiting embodiments, the Undo/redo threads would preferably provide an ability to filter for like items, elements, objects, and/or the like. In various non-limiting embodiments, the Undo/redo threads would preferably include an Undo/redo history that extends beyond a saved state, where the IPACE system would display a marker on a list as to where each save/open/close event and/or the like, correlates to the items listed on the undo/redo list. In various non-limiting embodiments, the Undo/redo history that would preferably provide an ability to retrieve a historical state where the Undo/redo history could also automatically, systematically, continuously, persistently, conditionally, and/or via/per actor/user-prompt revert to that state (e.g. moment in time) where the undo/redo list may expand/condense according.

In various non-limiting embodiments, the IPACE system would provide a variety of Undo/redo threads. In various non-limiting embodiments, a first Undo/redo thread could be for a first user, a second Undo/redo thread could be for second user, a third Undo/redo thread could be for a combination of the first and second user, and/or the like. In various non-limiting embodiments, there could be a variety of Undo/redo threads. In various non-limiting embodiments, the IPACE system would preferably generate a report of undo/redo usage with data, correlations, statistics, and/or the like; per user, project, time window, and/or the like. In various non-limiting embodiments, the IPACE system would preferably analyze the report of undo/redo usage for patterns to generate data, correlations, links, causations, projections, perceptions, and/or the like, to lesson-learned incidents, best-practices, relative success, relative accomplishments, and/or the like.

Aligning Sections/Portions

In various non-limiting embodiments, the IPACE system would provide an ability to align only portions of an object, while the remaining portions would not move. For instance, align a particular horizontal portion of a connector with a particular horizontal portion of another connector, and where the user may specify to not move some objects, portions of objects, and/or do not detach certain elements, say an arrowhead attached to an object.

In addition, the "Rule Engine and Management" (128) module provides a variety of methods to employ a variety of Boolean operators, thresholds, ranges, weighting, prioritizations, and other rules to the collective measurements and results. For example, a relatively sufficient amount of lead time to do a particular task (setup via the TIMES module 116), say one for preparing a blueprints for home within a particular price-range within a particular section of the country may prove to be far more effective at attracting interested architects and competitively priced bids when relatively compared to other bids over the course of time for similar projects, and therefore more weight could be applied towards that particular sufficient amount of lead time for that particular task of preparing house blueprints within same or similar the criteria.

In various non-limiting embodiments, the "Rule Engine and Management's Assignment Module" shown in an earlier figure allows the user to assign rules to a variety of objects through segments and IDs. In various non-limiting embodiments, the results of the Rule Assignment Management usage and the associated functionality afforded by the option modules appear in a step 271 "Analyze &/or Verify Collective Input/Results. Next a step 272 is where the IPACE Member may "Preview &/or Test" rule(s).

Each new IPACE Campaign (e.g. Project) 236 and/or rule could be set to run against previous IPACE Campaigns 236 and rules in general and Campaigns 236 and rules with similar CREATE Management rules to track and make sure that the new IPACE Campaign 236 and/or rules are in fact performing similarly, or report back that it is off by a quantifiable degree and make suggested changes based on the area and/or attribute where the new IPACE Campaign 236 and/or rules deviates from methods that are relatively more tried and true, so credit and changes may be suggested and/or made based upon measurable results. New and modified CREATE Management Rules resulting in IPACE Campaigns (e.g. Projects) for acquiring, say a IdeaSocket Project Participant, say a Lead Singer with a voice range, say for preforming a live performance at particular location could be ran against historical data/statistics to analyze and generate an estimate of the number of active Lead Singers that particular criteria would likely attract per using the Preview and/or Test 272 function.

Next, a query 273 asks if the IPACE member would like to either "Continue or Invoke" the rule? If the answer to query 273 is "continue," as in continue utilizing the Dashboard functionality without invoking the rule, then a next step 275 with a "Send, Post and/or Synchronize Appropriate Info, Data, Statistics, Data/content, Rules and Terms To Appropriate Parties, Engines, and Modules" is performed, where the IPACE user may continue utilizing the Dashboard. If the answer to query 273 is instead "invoke," then a step 274 is invoked for the particular rule, then the next step 275 with a "Send, Post and/or Synchronize Appropriate Info, Data, Statistics, Data/content, Rules and Terms To Appropriate Parties, Engines, and Modules" is performed, where the IPACE user may also then continue utilizing the Dashboard.

All of the CREATE Management module and inputs are generally tracked and measured independently and collectively as a unit against and relative to a particular Project 236, and/or Project element to measure their effectiveness and success rates against different Project 236 elements, FINANCIALS Rules, Account Rules, Segmentation Rules, TIMES Rules, TOP Terms and Ownership Management Rules, Negotiation Rules, METER Rules, IPACE Court Rules, ADSTATS Rules, and Real-time Tracking/Reporting.

Perceived Change in Novelty

In various non-limiting embodiments, the IPACE system would preferably display and/or illustrate each input and change made step-by-step to other approved members, say a particular member of the IPACE Court, the entire IPACE Court for a particular case or decision, a particular project's Lead Inventor and/or Campaign Gatekeeper; where some changes, suggestions, and/or the like may be selectively implemented. The implementation would also involve an IPACE system analysis for a perceived novelty for the changes, along with a perceived credited to a perceived contributor and/or whether it potentially creates Inventorship, Joint-Inventor/Co-Inventorship, and/or the like; along with an analysis of rights and/or ownership per party/member/user. In various non-limiting embodiments, for example, the IPACE system may search historical records (e.g. IPACE system, USPTO databases, other countries IP data, statistics, websites, educational databases, government databases, and/or the like) and any other relevant databases (e.g. company's internal LAN, PIN, contractor's databases, and/or the like) for novelty, including documents, spreadsheets, presentations, 3D and 2D animations, videos, images, audio files, meeting notes, and/or the like.

Reserving Specific Rights

In various non-limiting embodiments, the IPACE system may also allow members to reserve specific rights for certain contributions, say for a particular period of time and/or for a particular exchange. For instance, a monetary option for a particular time window to view a particular potential contribution to determine if it's worth including in a particular patent application now, subsequently, purchase as a trade secret, options to buy out the concept, collaborate on a future application, and/or the like.

In addition, the potential contributor who may become a contributor and/or inventor may have privileges and/or restrictions that allow limited access to suggestions to his/her contributions, where, depending on the TOU/TOPs, he/she may employ the IPACE system to analyze the data and create a list of scenarios where he/she may be allowed to file a patent application as a Joint-Inventor/Co-Inventor with another inventor(s), independently, jointly with someone within the same project, jointly with someone outside the particular project, and/or the like. Along with windows of times for each, and/or what elements are perceived and/or discerned to be contributing to any windows of times, say a contract limitation, a statute limiting a window to file, say within a year of any public disclosure or pending provisional patent application (PPA).

In addition, the IPACE system may function, interact, and synchronize data between a plurality of programs. For example, a conditional set of rules may be setup to be monitor and maintain certain data, statistics, data/content, programs, projects, participants, and/or the like, synchronized in real-time, near-real-time, at some time iteration, and/or synchronized upon additional conditional criteria or requests, say when another particular participant contributes anything, or something specific at any time, or within a particular window of time, along with alerts when each synchronization actually occurs and for what specific elements, who approved/challenged/counter/rejected, who suggested/commented, who previously modified what, who currently modified what, why, when, where, how, and/or the like.

Computer-Implemented Track Participants (80)

In various non-limiting embodiments, the IPACE system and the computer-implemented method creates data/statistics correlation, whereby employing the data/statistics, such as dates and type of material filed (e.g. from the first application to issue and beyond) with what action was taken by each party and the time between each event would create some significant data/statistics analysis if taken across several patent applications and patents issued. Further, track when it referenced who the particular parties were, e.g. the examiner (66), the PTO examiner's supervisor, the inventor(s), the assignee, the attorney(s), the law firm(s), the PTAB/BPAI judge(s) per issue to score who, how, when, where, and what was successful or not, in relationship to other data/statistics, such as over the course of time and comparing similar actions and parties. In addition, the data/statistics could also incorporate the actual rejections and arguments made and the specific data/content, language, cases cited, MPEP sections cited, and context to analyze the relative success per each segment of data/statistics.

Computer-Implemented Input/Form Participation and Input Reliability

In various non-limiting embodiments, the IPACE system and associated methods would preferably continually monitor and analyze the inputs, data, data/content, data/content correlations, participants, projects, and/or the like; and display the relative perceived and/or discerned scores for such metrics as novelty, Inventorship, ownership, TOU/TOP compliance, accuracy, value (e.g. current, future, and/or the like), lexicography (e.g. consistency, logic, anomalies, accuracy, and/or the like), data/content flow, relative context (e.g. per embodiment, per patent, per claim, per parent, per industry, and/or the like), and/or the like.

The present disclosure has advanced a CREATE module which supports various methods, which include, but are not limited to, the following methods, which can themselves include various methods.

Method 36. Generating a project and establishing a terms of participation for authorized contributions to the project; electronically storing a plurality of authorized contributions (which may be to the project or to some other collection of data, and the project itself might be a collection of individual projects, such as, for example, projects being handled by differing divisions or locations or companies within a larger corporate structural organizational umbrella) from a plurality of authorized participants to the project, wherein each of the plurality of authorized contributions is associated with one of the plurality of authorized participants; running an authorship content module that evaluates an authorship condition for each of the plurality of authorized contributions; inputting a patent claim input (which might be a partial patent claim or a set of multiple patent claims); and electronically running a patentability module that evaluates the patent claim input to determine a patentability profile for the patent claim input based upon the authorship condition for each of the plurality of authorized participants.

Method 37. Method 36, but electronically running the patentability module by using an information extraction algorithm to generate a plurality of claim components of the patent claim input. The claim components can be generated by parsing elements of the patent claim input to establish classifications of claim components. Alternatively, the information extraction algorithm can use its own patent claim ontology to define objects of the patent claim input in relationship to other objects of the patent claim. For example, the information extraction algorithm can use a Resource Description Framework (RDF) which creates triples (a subject which has a relationship with an object) or another method of assigning semantic meaning to words found in the patent claim input apart from meaning that might only be obtained by syntax rules.

Method 38. Either of methods 36 or 37, wherein the authorship condition is determined relative to the project, to a preselected database (such as a defined IP universe, and example of which might be U.S. issued patents and printed publications), and/or to a database of prior work of the authorized participant associated with a given authorized contribution (which can be used, e.g., to identify the given authorized contribution as being a potential conflicting contribution if the authorship condition does not satisfy a criterion). Note also that the authorship condition might be iteratively determined different ways, or against differing databases.

Method 39. Method 38, wherein an information extraction algorithm is used in determining the authorship condition. The information extraction algorithm can be the same or different from that of Method 2.

Method 40. Any of methods 37-39, wherein the patentability profile includes one or more of (1) an estimated likelihood or predictive evaluation of novelty of the patent claim input; (2) an evaluated contribution of each of the authorized participants to the patent claim input; and (3) a determined compensation for one or more of the authorized participants.

Method 41. Method 40, wherein the predictive evaluation of novelty of the patent claim input is determined relative to a preselected database by use of an information extraction algorithm that indexes information within the preselected database so that it can be compared to claim components contained within the patent claim input. The preselected database can be created through use of an RDF framework, or similar framework, which is used to create a patent novelty ontology that allows evaluation of novelty of the patent claim.

Method 42. Method 40, wherein the evaluated contributions of the authorized participants are determined by establishing a relative overlap of authorized contributions by an authorized participant with the patent claim input when the authorship condition satisfies a criterion. Thus, for example, although an authorized participant might make many authorized contributions to a project, none of such contributions might be relevant to the patent claim input, or any that might be relevant to the patent claim input might not satisfy the authorship condition if other authorized participants have already made authorized contributions containing the same content that created the overlap.

Method 43. Method 40 or 42, wherein the determined compensation is based at least in part upon a value attributed to the patent claim input and a contribution value attributed to the relative overlap of authorized contributions that have an authorship condition satisfying a criterion to the patent claim input and/or to the terms of participation for authorized contributions to the project (which might establish multiple classifications of authorized participants and determined compensation based at least in part upon which of the multiple classifications applies). Also, compensation might be determined after a patent has been granted when the patent claim input is one or more patent claims contained in the patent.

Method 44. Any of methods 37-43, with the additional step of testing a contribution to the project against the terms of participation for authorized contributions to the project to determine if it satisfies the terms of participation and either accepting the contribution as an authorized contribution to the project if it does satisfy said terms of participation or rejecting the contribution as an unauthorized contribution to the project if it does not satisfy said terms of participation. If a contribution is identified as an unauthorized contribution, an inquiry can be made to determine if the unauthorized contribution will be accepted as an authorized contribution to the project.

Method 45. Any of methods 37-44, wherein the method is used to generate a comparison between the results of using different patent claim inputs or changing something found within the patent claim input, such as adding or deleting words or elements of a claim. This method can be iterative, meaning results might naturally be compared as changes are made to the patent claim input (such as when a patent claim is being drafted), which could be used to help evaluate a claim as it is being drafted, or it can be used to compare complete claims to choose which claim might be selected or deleted for a given purpose.

Method 46. Methods 37-45 can use one or more information extraction algorithms in connection with acting upon either the patent claim input or one or more different databases. By using information extraction algorithms that either use their own ontology and/or process for understanding the semantic meaning of words in relationship to other words, the algorithms can be made much more accurate and useful than search algorithms relying solely upon syntax. However, it is important to recognize that patent claims can contain novel elements and novel relationships of elements, including relationships that never existed before. Indeed, this can be a component of the estimated likelihood or predictive evaluation of novelty of the patent claim input, so this means that it is especially preferred that the methods isolate the patent claim input, and even a database of authorized contributions to the project, from external databases. It also explains why a separate ontology may be used for defining relationships within the patent claim input from other collections of data.

Method 47. A patent claim input can be one or more claims used to predict use or value of such claims by one or more entities. In this method, the patent claim input can be evaluated according to the methods already described, and it can also be compared to selected databases to create a predictive profile of at least one entity who might be using the patent claim input. Such methodology can be used to identify one or more groups of persons within a large entity who might be working in area similar or related to a project, or it might be used to identify potential use or infringement of one or more claims, especially if the patent claim input is from an issued patent.

Figure 37:
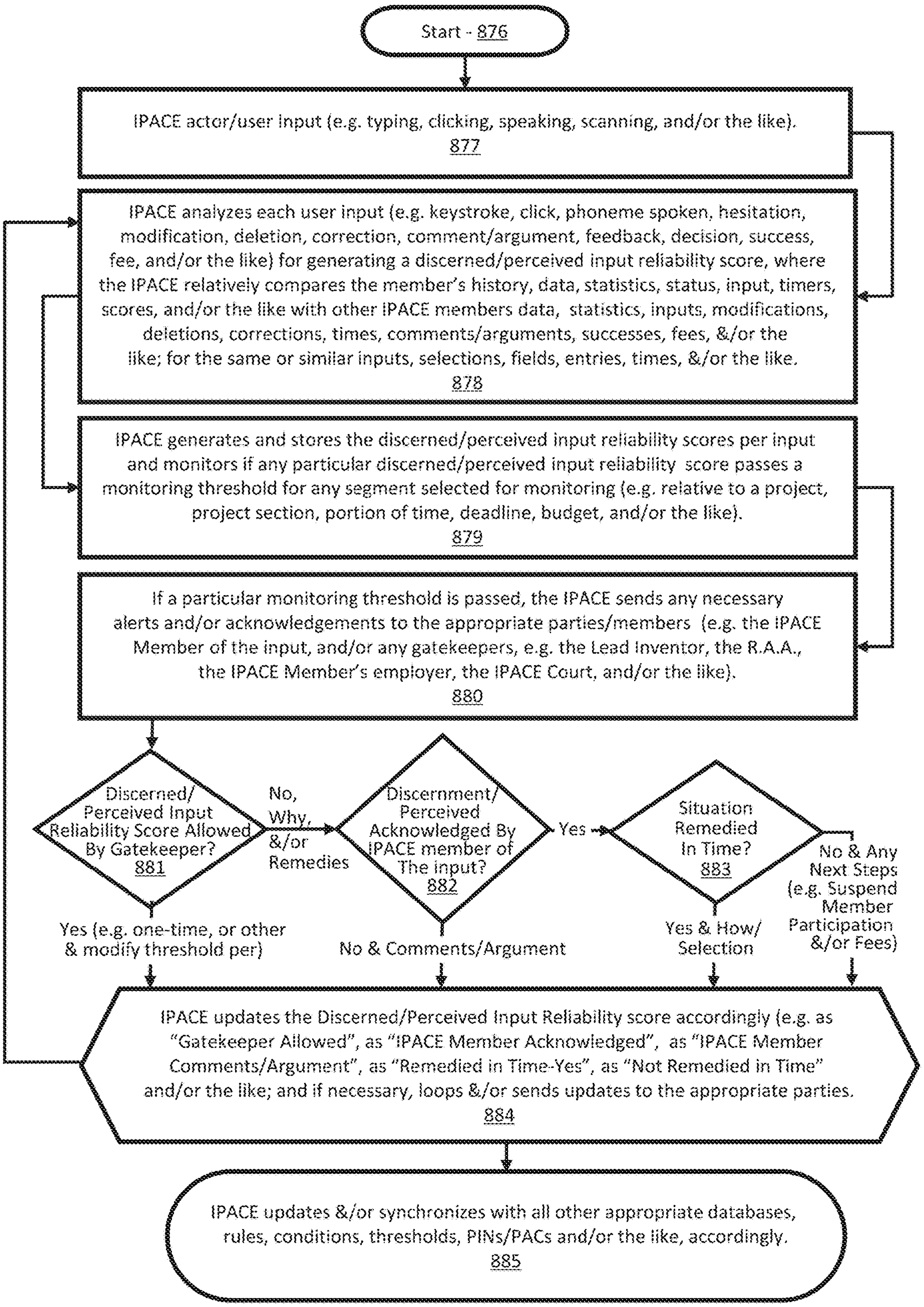
FIG. 37 is a flowchart that depicts a non-limiting embodiment where the IPACE system and associated computer-implemented method tracks input (e.g. typing in-general, within an input field, mouse-clicks/selecting, mouse movements/scrolling, stylus input, voice commands, and/or the like), and analyzes the input for what is typically input and/or what such an input typically means.

Referring back to the figs, FIG. 37 is a flowchart that depicts an embodiment where the IPACE system and associated computer-implemented method tracks input (e.g. typing in-general, within an input field, mouse-clicks/selecting, mouse movements/scrolling, stylus input, voice commands, and/or the like), and analyzes the input for what is typically input and/or what such an input typically means. For example, when someone types their first name into a sign up field and then either saves it within a particular period of time, and/or constantly changes his/her name then saves or not saves it, the IPACE system would track and analyze this data/statistics collected over the course of time where it may be utilized to determine the relative likelihood—when compared to others—whether the data/statistics and associated user that is entered the data/statistics is relatively likely to be reliable or not. In various non-limiting embodiments, the same method is applicable for every field and type of field.

Starting with a terminator 876, the IPACE system proceeds to a step 877, where system tracks an "IPACE member/user's Inputs (e.g. typing, clicking, speaking, scanning, and/or the like)." Next, a step 878 is where "the IPACE analyzes each user input (e.g. keystroke, click, phoneme spoken, hesitation, modification, deletion, correction, comment/argument, feedback, decision, success, fee, and/or the like) for generating a discerned/perceived input reliability score, where the IPACE relatively compares the member's history, data, statistics, status, input, timers, scores, and/or the like with other IPACE members data, statistics, inputs, modifications, deletions, corrections, times, comments/arguments, successes, fees, and/or the like; for the same or similar inputs, selections, fields, entries, times, and/or the like."

Next, a step 879 is where "the IPACE generates and stores the discerned/perceived input reliability scores per input and monitors if any particular discerned/perceived input reliability score passes a monitoring threshold for any segment selected for monitoring (e.g. relative to a project, project section, portion of time, deadline, budget, and/or the like)." From step 879, the IPACE proceeds to a step 880, where "If a particular monitoring threshold is passed, the IPACE sends any necessary alerts and/or acknowledgements to the appropriate parties/members (e.g. the IPACE Member of the input, and/or any gatekeepers, e.g. the Lead Inventor (40), the R.A.A., the IPACE Member's employer, the IPACE Court, and/or the like)."

From step 880, the IPACE system proceeds to a query 881, which asks if the "Discerned/Perceived Input Reliability Score [is] Allowed by Gatekeeper?" If the answer to query 881 is "no," then the Gatekeeper may also explain why and/or include remedies (e.g. if not already pre-established), and then the IPACE system proceeds to a query 882, which asks if "Discernment/Perception Acknowledged By IPACE member of The input?" If the answer to query 882 is "yes," then the IPACE system proceeds to a query 883, which asks if "Situation Remedied In Time?" where the IPACE system would preferably list a range of acceptable remedy selections from, say forcing the IPACE member to go back and make spelling, grammatical, lexicon-usage, and/or the like corrections; to say, where the IPACE member may be allowed to delegate a certain responsibility, duty, and/or the like.

If the answer to query 881 is instead "yes," then the gatekeeper may include additional parameters, such as "just this one-time" or some other conditions, where the IPACE system modifies the rules accordingly as the IPACE system proceeds to a decision/collection point in a step 884 where the "IPACE updates the Discerned/Perceived Input Reliability score accordingly (e.g. as "Gatekeeper Allowed," as "IPACE Member Acknowledged," as "IPACE Member Comments/Argument," as "Remedied in Time-Yes," as "Not Remedied in Time" and/or the like; and if necessary, loops &/or sends updates to the appropriate parties." If the answer to query 882 is instead "no," then the IPACE system also proceeds to the step 884, but where the IPACE member may be allowed to include any comments and/or arguments he/she believes would compel the gatekeeper to allow the input and/or the like. For example, the gatekeeper (e.g. the Lead Inventor (40)) could have disallowed the input due to unrecognized terminology utilized, but the IPACE member, say a Patent Attorney (44), could have a compelling reason for the new terminology.

If the answer back the query 883 is instead "no," then the IPACE system may incorporate any TOP rules and/or the like, for next steps, where say the IPACE system provides the IPACE member an additional amount of time to remedy the situation, suspends the member from the project, and/or holds back fees/equity, if allowable under the IPACE terms and TOP rules. If the update in step 884 needs further analysis, say the situation is not remedied yet, then the appropriate information is passed back to the step 878, along with proceeding to a terminator 885, where the "IPACE updates and/or synchronizes with all other appropriate databases, rules, conditions, thresholds, PINS/PACs and/or the like, accordingly."

Figure 38:
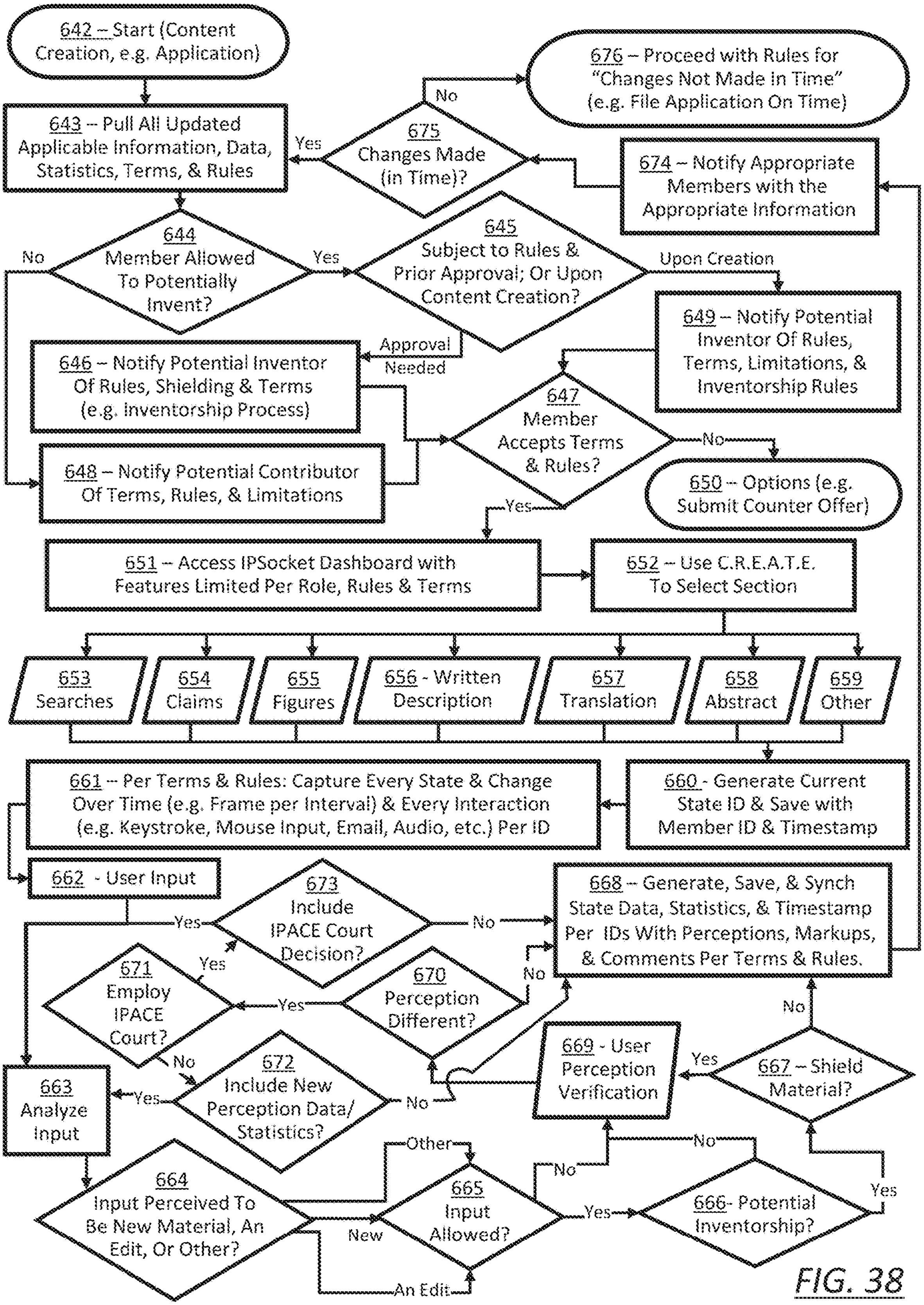
FIG. 38 is a flowchart that depicts a non-limiting embodiment and example of the IPACE system, and associated computer-implemented method regarding data/content creation for a patent application and tracking inputs.

FIG. 38 is a flowchart that depicts an embodiment and example of the IPACE system, and associated computer-implemented method regarding data/content creation for a patent application and tracking inputs. Starting with a terminal 642 where a "Start (Data/content Creation, e.g. Application)" function appears, followed by a step 643 with a "Pull in All Updated Applicable Information, Data, Statistics, Terms, and Rules." In various non-limiting embodiments, the IPACE system then sends the IPACE Member to a query 644, which asks if the "Member [is] Allowed To Potentially Invent?" If the answer to query 644 is "No," then the IPACE Member is passed to a step 648 "Notify Potential Contributor of Terms, Rules, and Limitations." This step passes the IPACE Member to a query 647.

If the answer to query 644 is instead "Yes," the IPACE Member is sent to a query 645, which asks if the IPACE Member is "Subject to Rules and Prior Approval; OR Upon Data/content Creation?" If the answer to query 645 is "Upon Creation," then the IPACE Member is then passed to a step 649 to "Notify Potential Inventor of Rules, Terms, Limitations and Inventorship Rules," which passes the Potential Inventor to a query 647 (explained later). If the answer to query 645 is "Approval Needed," then the IPACE Member is sent to a step 646 "Notify Potential Inventor of Rules, Shielding and Terms (e.g. Inventorship Process)." From step 646, the IPACE Member is sent to a query 647, which asks if a "Member Accepts Terms and Rules?" If the answer to query 647 is "No," the IPACE Member reaches a terminator 650 "Options (e.g. Submit Counter Offer)."

If the answer to query 647 is instead "Yes," the IPACE Member is passed to a step 651 "Access IPSocket Dashboard with Features Limited Per Role, Rules and Terms." In various non-limiting embodiments, the IPACE Member is then passed to a step 652 "Use C.R.E.A.T.E. to Select Section." In various non-limiting embodiments, the IPACE Member then may select from a list of options including a "Searches" 653 option, a "Claims" 654 option, a "Figures" 655 option, a "Written Description" 656 option, a "Translation" 657 option, an "Abstract" 658 option, or an "Other" 659 option. Once the IPACE Member makes a selection, the IPACE Member is then passed to a step 660 which is a "Generate Current State ID and Save with Member ID and Timestamp."

In various non-limiting embodiments, the IPACE Member is then passed to a step 661 where a "Per Terms and Rules: Capture Every State and Change Over Time (e.g. Frame per Interval) and Every Interaction (e.g. Keystroke, Mouse Input, Email, Audio etc.) Per ID" is invoked. In various non-limiting embodiments, the IPACE Member is then passed to a step 662 for any "User Input," where that input is then analyzed in a step 663 with an "Analyze Input" function. In various non-limiting embodiments, the IPACE Member is then passed to a query 664 which asks if the "Input [is] Perceived To Be New Material, An Edit, Or Other?"

If the answer to query 664 is "Other," it means the IPACE System perceived input that is other than "New Material" or "An Edit." For example, the input to insert page numbers. If the answer to query 664 is instead "New Material," meaning the IPACE System perceived the "User Input" (662) to cross a measurable threshold from a perceived "Edit" or "Other" input. If the answer to query 664 is "An Edit," meaning the IPACE System perceived the "User Input" (662) to not cross a measurable threshold for perceived "New Material," but does cross a measurable threshold for perceived "Other" input. All three query results: "Other," "New Material," or "An Edit," pass the IPACE Member to a query 665, which asks if the "Input [is] Allowed?" If the answer to query 665 is "Yes," the IPACE Member is passed to a query 666, which asks "Potential Inventorship?" If the answer to query 666 is "Yes," the IPACE Member is passed to query 667 "Shield Material?"

If the answer to query 667 is "No," the IPACE Member is passed to a step 668 "Generate, Save, and Synch State Data, Statistics, and Timestamp Per IDs with Perceptions, Markups and comments Per Terms and Rules." If the answer to query 665 instead "No," then the IPACE Member is passed to a step 669 "User Perception Verification." In various non-limiting embodiments, the IPACE Member is then passed to a query 670, which asks if the "Perception [is] Different?" If the answer to query 670 is "No," then the PACE Member is passed to a step 668 (explained later).

If the answer to query 670 is instead "Yes," the IPACE Member is passed to a Query 671, which asks "Employ IPACE Court?" If the answer to query 671 is "No," the Member is passed to a query 672, which asks "Include New Perception Data/statistics?" If the answer to query 671 is instead "Yes," then the Member is passed to a query 673. If the answer back at Query 672 is "Yes," then the member is returned to a step 663. If the answer to Query 672 is instead "No," then the member is passed to the step 668. In various non-limiting embodiments, the Member is then passed to a step 674 "Notify Appropriate Members with the Appropriate Information." Then a Query 675 asks if the "Changes [were] Made (in Time)?" If the answer to query 675 is "No," the IPACE Member is passed to a terminator 676 where "Proceed with Rules for 'Changes Not Made I Time' (e.g. File Application On Time)." If the answer to query 675 is instead "Yes," then the IPACE Member returns to step 643.

Figure 39:
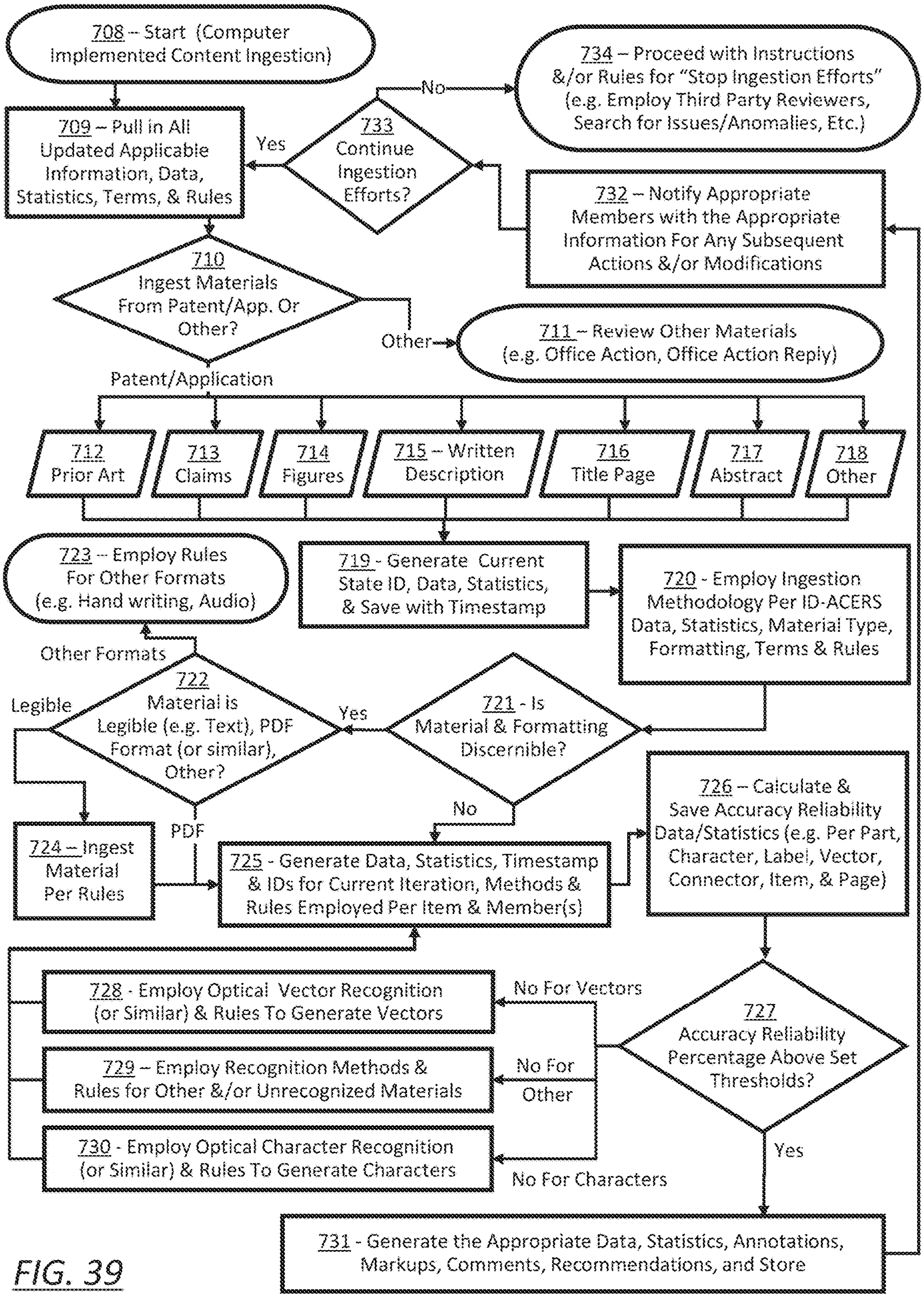
FIG. 39 is a flowchart that depicts a non-limiting embodiment and example of the IPACE system, and associated computer-implement method for ingesting data/content (e.g. for a project).

FIG. 39 is a flowchart that depicts an embodiment and example of the IPACE system, and associated computer-implement method for ingesting data/content (e.g. for a project). Starting with a terminal 708 where a "Start (Computer Implemented Data/content Ingestion)" function appears, followed by a step 709 with a "Pull in All Updated Applicable Information, Data, Statistics, Terms, and Rules."

Then, the method proceeds to a query 710 where it is asked whether to "Ingest Materials From Patent/App. Or Other?" If the answer to query 710 is "Other," the method and/or user reaches a terminator 711, which grants access to "Review Other Materials (e.g. Office Action, Office Action Reply)." If the answer to query 710 is instead "Patent/Application," the method and/or user may select from a list of options including a "Prior Art" 712 option, a "Claims" 713 option, a "Figures" 714 option, a "Written Description" 715 option, a "Title Page" 716 option, an "Abstract" 717 option, or an "Other" 718 option.

In various non-limiting embodiments, the method is then passed to a step 719, which "Generate[s] Current State ID, Data, Statistics, and Save with Timestamp" followed by a step 720 to "Employ Ingestion Methodology Per ID-ACERS Data, Statistics, Material Type, Formatting, Terms and Rules." In various non-limiting embodiments, the method is then passed to a query 721, which asks "Is Material and Formatting Discernible?"

If the answer to query 721 is "Yes," the method proceeds to a query 722, which asks if the "Material is Legible (e.g. Text), PDF Format (or similar), Other?" If the answer to query 722 is "Other Formats," a terminator 723 "Employ Rules For Other Formats (e.g. Hand Writing, Audio)." If the answer to query 722 is instead "Legible," the method proceeds to a step 724 "Ingest Materials Per Rules" and move forward to step 725 (explained in next step).

If the answer to query 722 is "PDF," the method proceeds to a step 725 "Generate Data, Statistics, Timestamp and IDs for Current Iteration, Methods and Ruled Employed Per Item and Member(s)." In various non-limiting embodiments, then a step 726 "Calculate and Save Accuracy Reliability Data/Statistics (e.g. Per Part, Character, Label, Vector, Connector, Item and Page).” Next, a query 727 asks if “Accuracy Reliability Percentage [is] Above Set Thresholds?” If the answer to query 727 is “Yes,” the method continues to a step 731 “Generate the appropriate Data, Statistics, Annotations, Markups, Comments, Recommendations and Store.”

In various non-limiting embodiments, then, a step 732 “Notify Appropriate Members with the Appropriate Information For Any Subsequent Actions and/or Modifications.” Then, a query 733 asks “Continue Ingestion Efforts?” If the answer to query 733 is “No,” the method reaches a Terminator 734 “Proceed with Instructions and/or Rules for “Stop Ingestion Efforts” (e.g. Employ Third Party Reviewers (64), Search for Issues/Anomalies, Etc.).”

If the answer to query 733 is instead “Yes,” the method returns to the step 709. If the answer back at query 727 is instead “No For Vectors,” the method continues to a step 728 “Employ Optical Vector Recognition (or similar) and Rules To Generate Vectors.” If the answer to query 727 is instead “No For Other,” the method continues to a step 729 to “Employ Recognition Methods and Rules for other and/or Unrecognized materials.” If the answer to query 727 is instead “No For Characters,” the method continues to a step 730 Employ Optical Character Recognition (or similar) and Rules to Generate Characters. Steps 728, 729 and 730 redirect to step 725.

Figure 40:
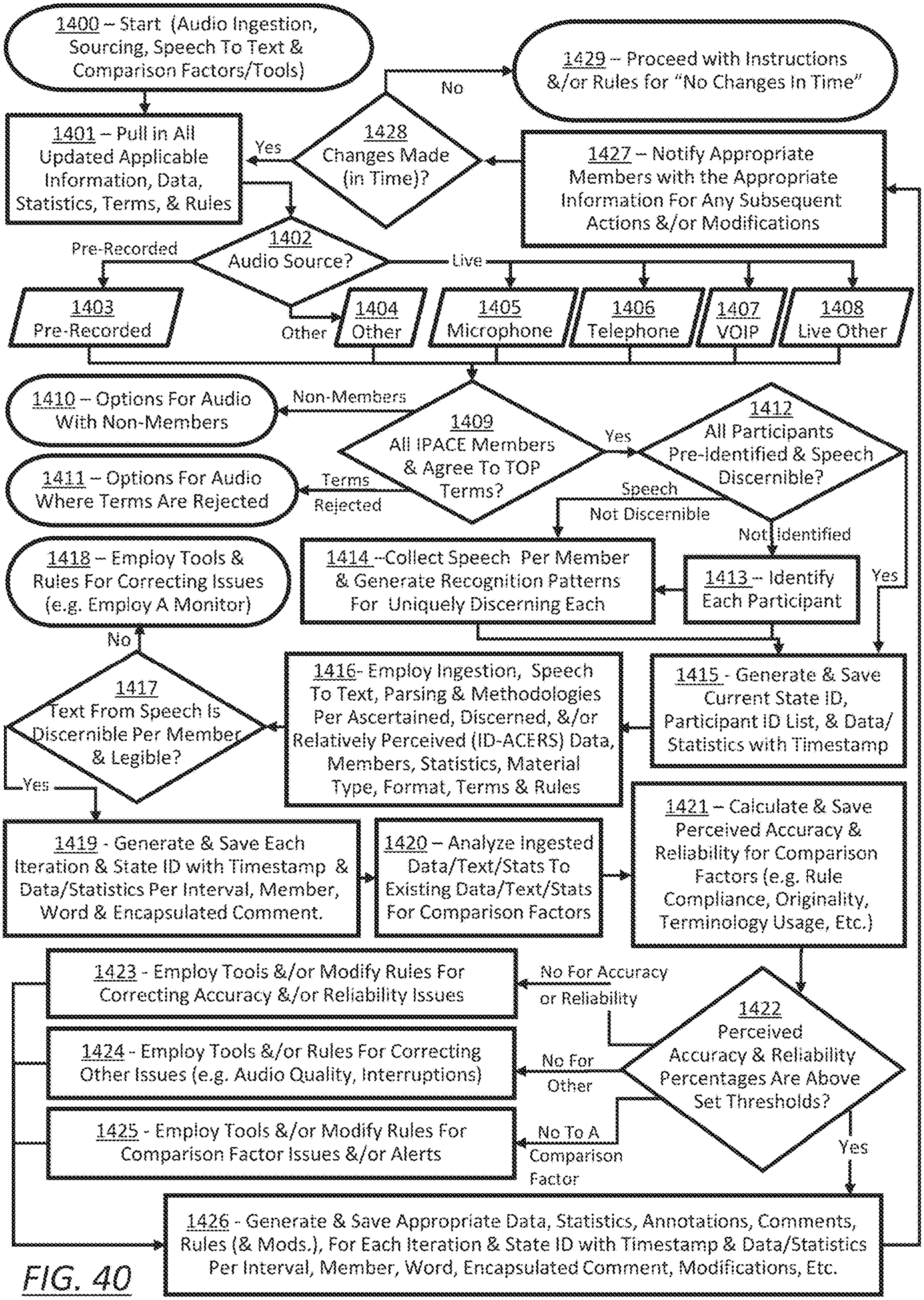
FIG. 40 is a flowchart that depicts a non-limiting embodiment and example of the IPACE system, and associated computer-implemented method for ingesting audio data/content for a project.

FIG. 40 is a flowchart that depicts an embodiment and example of the IPACE system, and associated computer-implemented method for ingesting audio data/content for a project. Starting with a terminal 1400 where a “Start (Audio Ingestion, Sourcing, Speech To Text and Comparison Factors/Tools)” function appears, followed by a step 1401 with a “Pull in All Updated Applicable Information, Data, Statistics, Terms, and Rules.” Next, a query 1402 allows the method and/or user to decipher the “Audio Source?” If the answer to query 1402 is “Pre-Recorded,” the method continues to a 1403 “Pre-Recorded.” If the answer to query 1402 is instead “Live,” the method and/or user may select a “Microphone” 1405 option, a “Telephone” 1406 option, a “VOIP” 1407 option, or a “Live” 1408 option. If the answer to query 1402 is instead “Other,” the method and/or user continue to a 1404 “Other.” Steps 1404-1408 all continue to query 1409, which asks if “All IPACE Members and Agree to TOP Terms?”

If the answer to query 1409 is “Non-Members,” a terminator 1410 “Options for Audio with Non-Members” is deployed. If the answer to query 1409 is instead “Terms Rejected,” a terminator 1411 “Options for Audio Where Terms Are Rejected” is deployed. If the answer to query 1409 is “Yes,” a query 1412 asks if “All Participants Pre-Identified and Speech [are] Discernible?” If the answer to query 1412 is “Not Identified,” the method continues to a step 1413 “Identify Each Participant.” If the answer to query 1412 is instead “Speech Not Discernible,” the method continues to a step 1414, which “Collect[s] Speech Per Member and Generate Recognition Patterns for Uniquely Discerning Each.” In various non-limiting embodiments, then a step 1415 “Generate[s] and Save[s] Current State ID, Participant ID list and Date with Timestamp. Next, a step 1416 “Employ[s] Ingestion, Speech to Text, Parsing & Methodologies Per Ascertained, Discerned, &/or Relatively Perceived (ID-ACERS) Data, Members, Statistics, Material Type, Format, Terms and Rules.”

In various non-limiting embodiments, then, a query 1417 asks if the “Text From Speech is Discernible Per Member and Legible?” If the answer to query 1417 is “No,” a terminator 1418 “Employ[s] Tools and Rules For Correcting Issues (e.g. Employ a Monitor).” If the answer to query 1417 is instead “Yes,” the method continues to a step 1419, which “Generate[s] and Save[s] Each Iteration and State ID with Timestamp and Data/Statistics Per Interval, Member, Word and Encapsulated Comment.”

Next, a step 1420 “Analyze Ingested Data/Text/Statistics to Existing Data/Text/Statistics for Comparison Factors. Then a step 1421 “Calculate[s] and Save[s] Perceived Accuracy and Reliability for Comparison Factors (e.g. Rule Compliance, Originality, Terminology Usage, Etc.).” Then, a query 1422 asks if the “Perceived Accuracy and Reliability Percentages Are Above Set Threshold?” If the answer to query 1422 is “No For Accuracy or Reliability,” the method continues to a step 1423, which “Employ[s] Tools and/or Modify Rules for Correcting Accuracy and/or Reliability Issues.” If the answer to query 1422 is instead “No For Other,” the method continues to a step 1424 which “Employ[s] Tools and/or Rules for Correcting Other Issues (e.g. Audio Quality, Interruptions.”

If the answer to query 1422 is instead “No To A Comparison Factor,” the method continues to a step 1425 to “Employ Tools and/or Modify Rules for Comparison Factor Issues and/or Alerts.” 1423-1425 all continue to a step 1426, which “Generate[s] and Save[s] Appropriate Data, Statistics, Annotations, Comments, Rules (and Mods.), For Each Iteration and State ID with Timestamp and Data/Statistics Per Interval, Member, Word, Encapsulated Comment, Modifications, Etc.” From step 1426, the method is then passed to a step 1427 (explained below).

If the answer back at query 1422 is instead “Yes,” then, in various non-limiting embodiments, the method continues to step 1426, and from there to Step 1427 “Notify Appropriate Members with the Appropriate Information for any Subsequent Actions and/or Modifications.” A query 1428 asks if “Make Changes (in Time)?” If the answer to query 1428 is “No,” a terminator 1429 “Proceed with Instructions and/or Rules for ‘No Changes In Time.’” If the answer to query 1428 is instead “Yes,” the method returns to step 1401.

Figure 41:
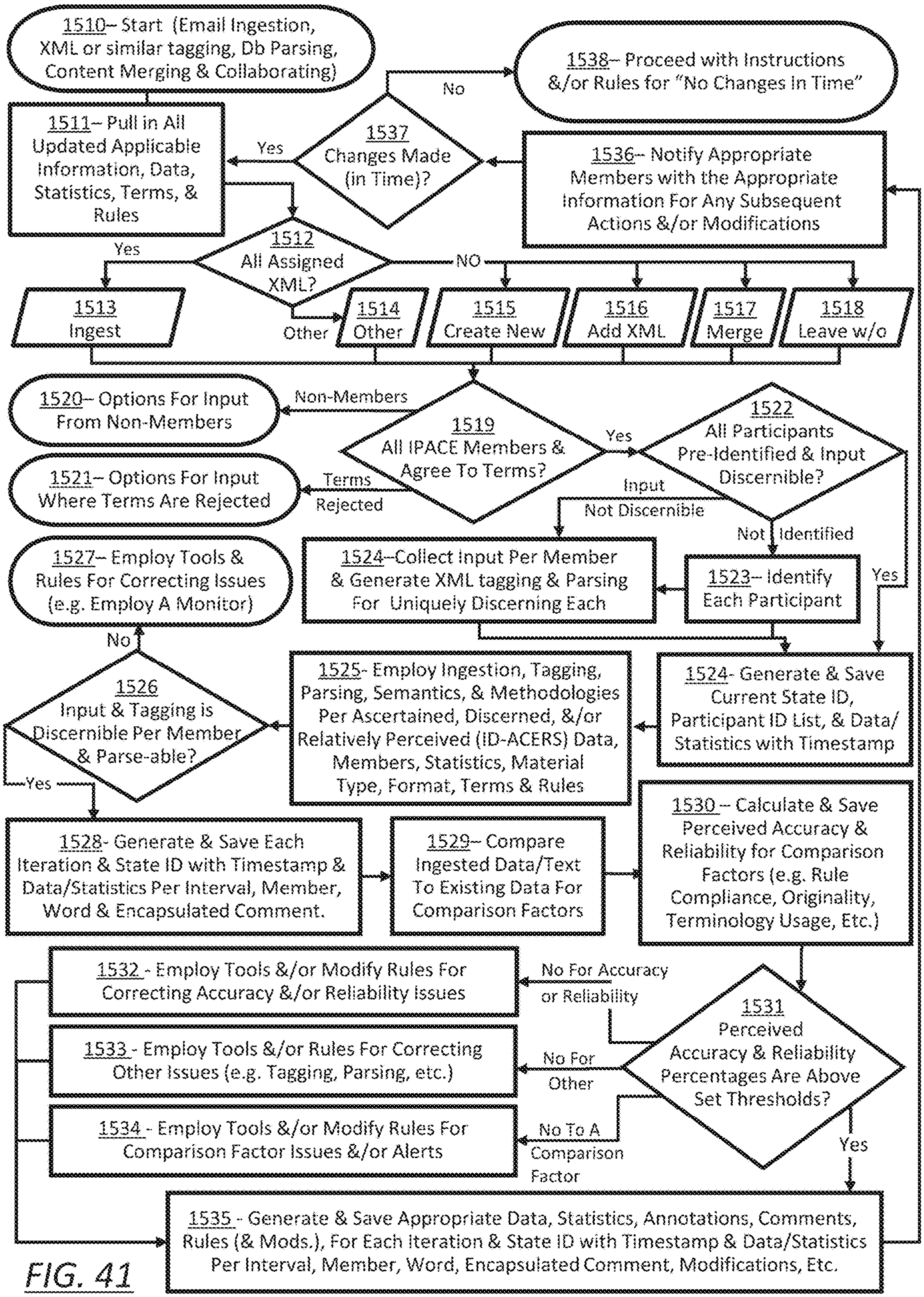
FIG. 41 is a flowchart that depicts a non-limiting embodiment and example of the IPACE system, and associated computer-implemented method regarding data/content creation via a series of email ingestions and/or mobile application interactions.

FIG. 41 is a flowchart that depicts an embodiment and example of the IPACE system, and associated computer-implemented method regarding data/content creation via a series of email ingestions and/or mobile application interactions. Starting with a terminal 1510 where a “Start (Email Ingestion, RDF/XML or similar tagging, Storage/db Parsing, Data/content Merging and Collaborating)” function appears, followed by a step 1511 with a “Pull in All Updated Applicable Information, Data, Statistics, Terms, and Rules.”

Email Tracking and Contributions

In various non-limiting embodiments, the IPACE system and associated computer-implemented method would preferably track email data/content and usage where, for example, the subject line required a particular indicia before be sent by a particular program, regarding a particular project, to a particular participant, and/or the like.

In various non-limiting embodiments, the IPACE system and associated computer-implemented method would preferably have a method to track, ingest, correlate, and analyze data, data/content, and data/content correlations, according to the subject header, email data/contents, and/or the like. In various non-limiting embodiments, the IPACE system would preferably generate category suggestions based upon keywords within the email subject, data/content contribution, per sender, and/or the like. In various non-limiting embodiments, the IPACE system would preferably analyze data/content, senders/contributors, and/or the like; to generate a collaborative data/content, where the IPACE system would preferably incorporate a set of rules, conditions, historical knowledge, patterns, and/or the like, regarding the stated, discerned, and/or perceived project, participants, TOU/TOPs, and/or the like.

In various non-limiting embodiments, a symbol or say a green background to the text and/or the dollar amount for an email that states a charge to the recipient could be placed strategically, hidden, and/or the like in the body, attachment, subject, email address, and/or the like.

FIG. 42 depicts an example embodiment of the IPACE graphical user interface for viewing, tacking, and interacting with data/content creation and collaboration within the IPACE system, where, for example, data/content contributions and/or emails are tracked per Contributor (50).

Figure 43A:
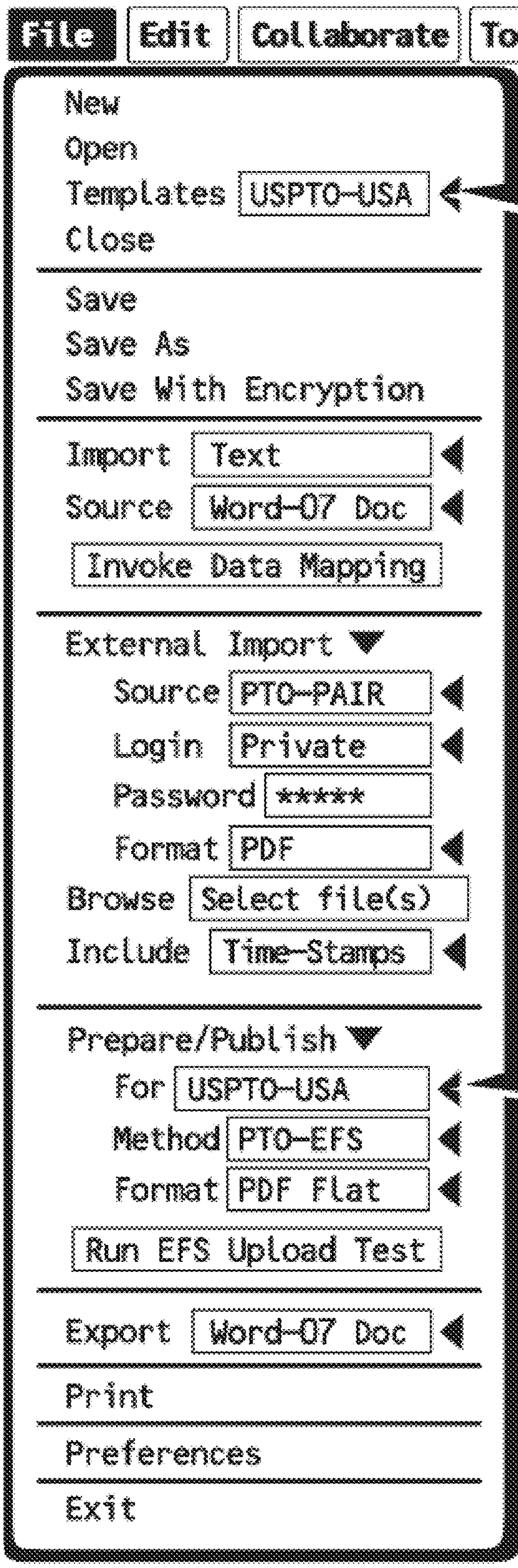
FIG. 43*a* depicts an example embodiment of the IPACE graphical user interface for viewing, creating, modifying, and interacting with data/content within the IPACE system, specifically under the "file" tab.
Figure 43B:
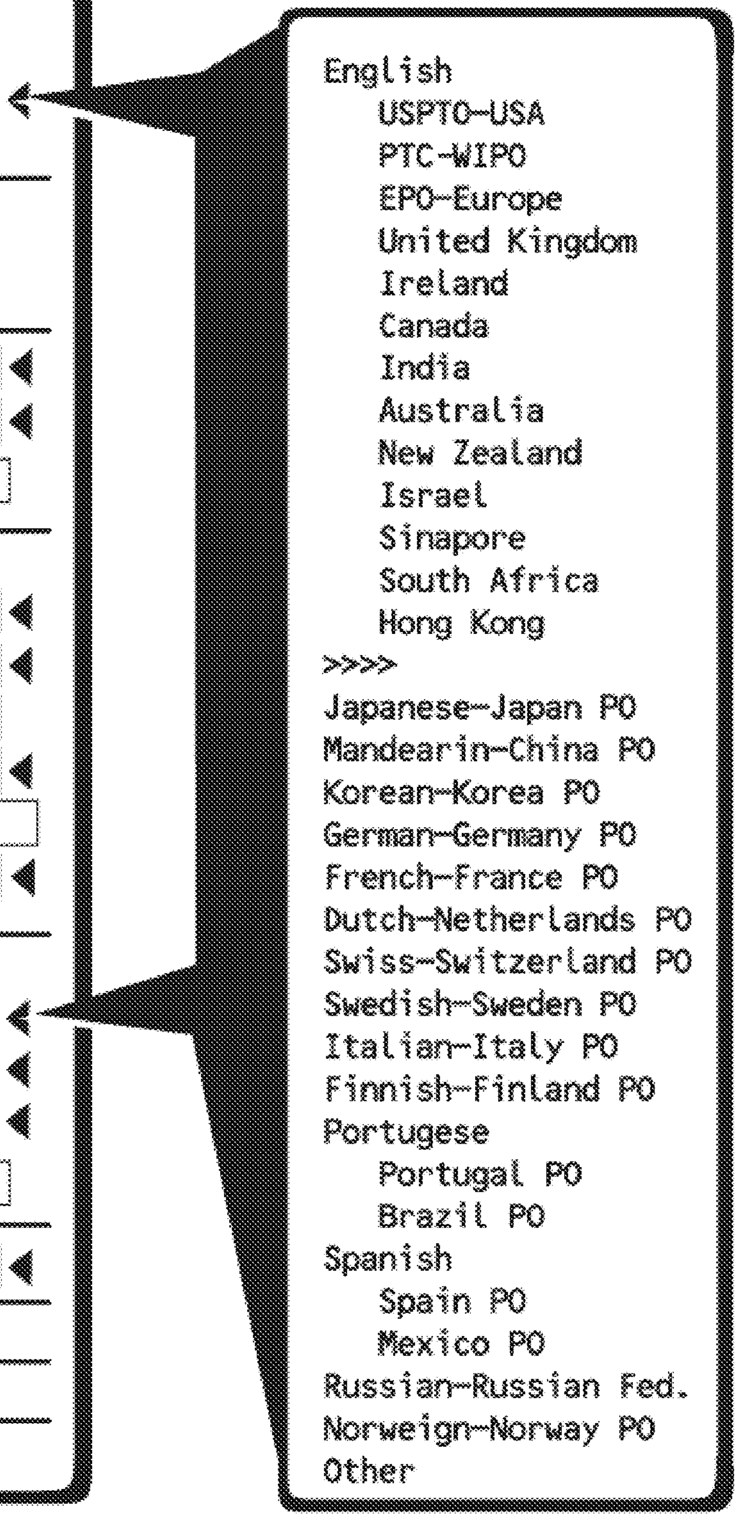
FIG. 43*b* depicts an example embodiment of the IPACE graphical user interface viewing and/or designating a particular patent project by, say country or similar within the IPACE system.

FIG. 43*a* depicts an example embodiment of the IPACE graphical user interface for viewing, creating, modifying, and interacting with data/content within the IPACE system, specifically under the "file" tab. FIG. 43*b* depicts an example embodiment of the IPACE graphical user interface viewing and/or designating a particular patent project by, say country or similar within the IPACE system.

Figure 44A:
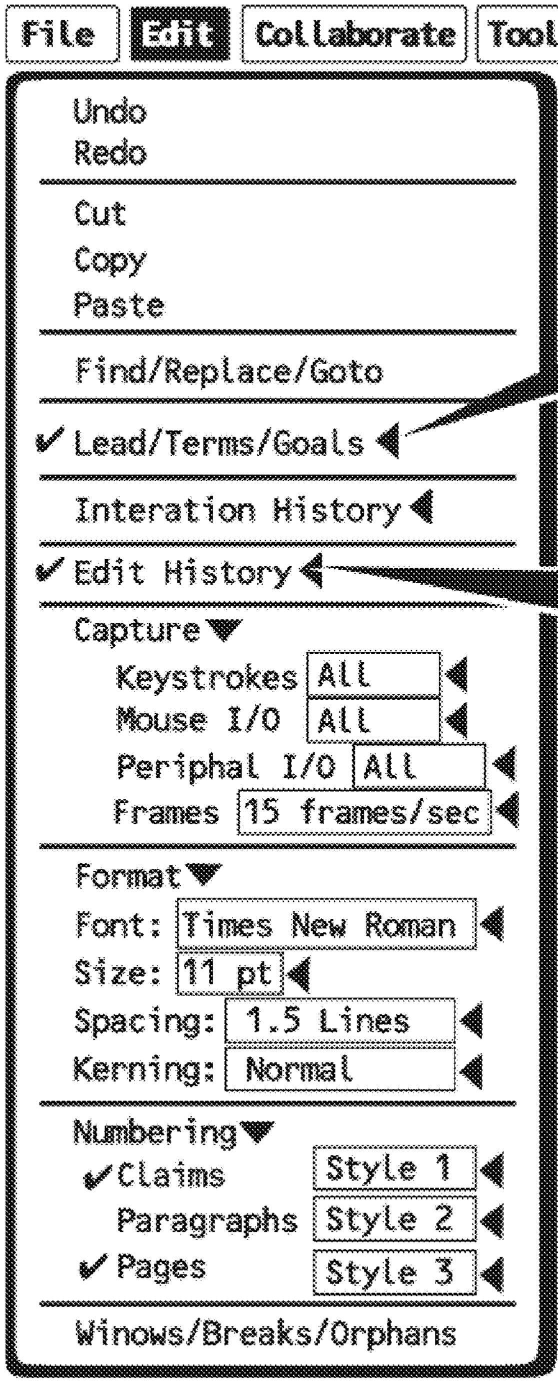
FIG. 44*a* depicts an example embodiment of the IPACE graphical user interface for viewing, creating, modifying, and interacting data/content within the IPACE system, specifically under the "edit" tab.
Figure 44B:
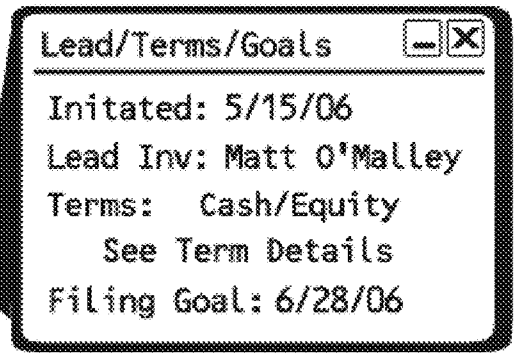
FIG. 44*b* depicts an example embodiment of the IPACE graphical user interface viewing and/or designating a particular leads, terms, and/or goals within a patent project within the IPACE system.
Figure 44C:
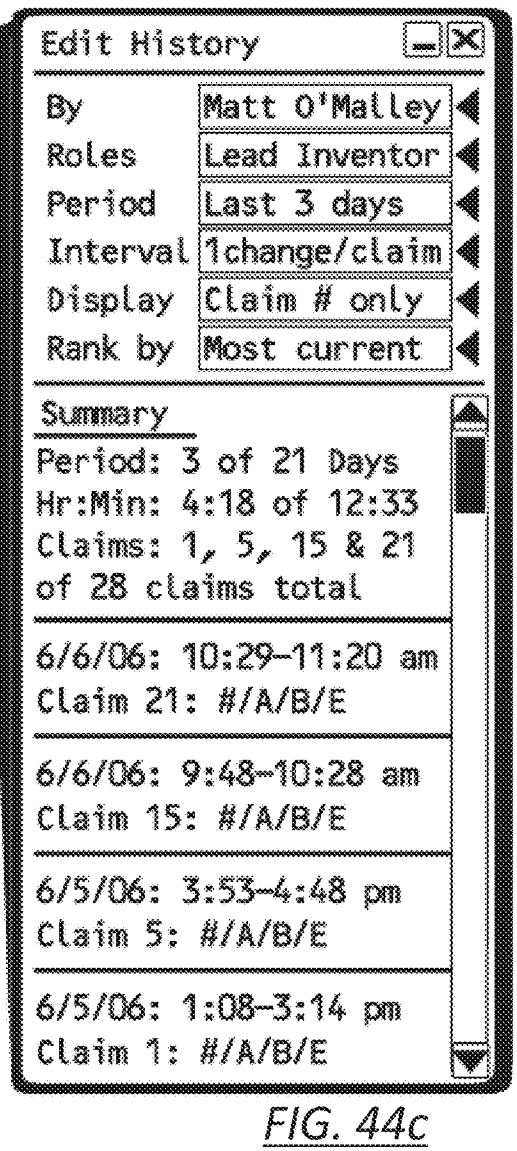
FIG. 44*c* depicts an example embodiment of the IPACE graphical user interface viewing and/or designating a particular "edit history" within a patent project within the IPACE system.

FIG. 44*a* depicts an example embodiment of the IPACE graphical user interface for viewing, creating, modifying, and interacting data/content within the IPACE system, specifically under the "edit" tab. FIG. 44*b* depicts an example embodiment of the IPACE graphical user interface viewing and/or designating a particular leads, terms, and/or goals within a patent project within the IPACE system. FIG. 44*c* depicts an example embodiment of the IPACE graphical user interface viewing and/or designating a particular "edit history" within a patent project within the IPACE system.

Figure 45:
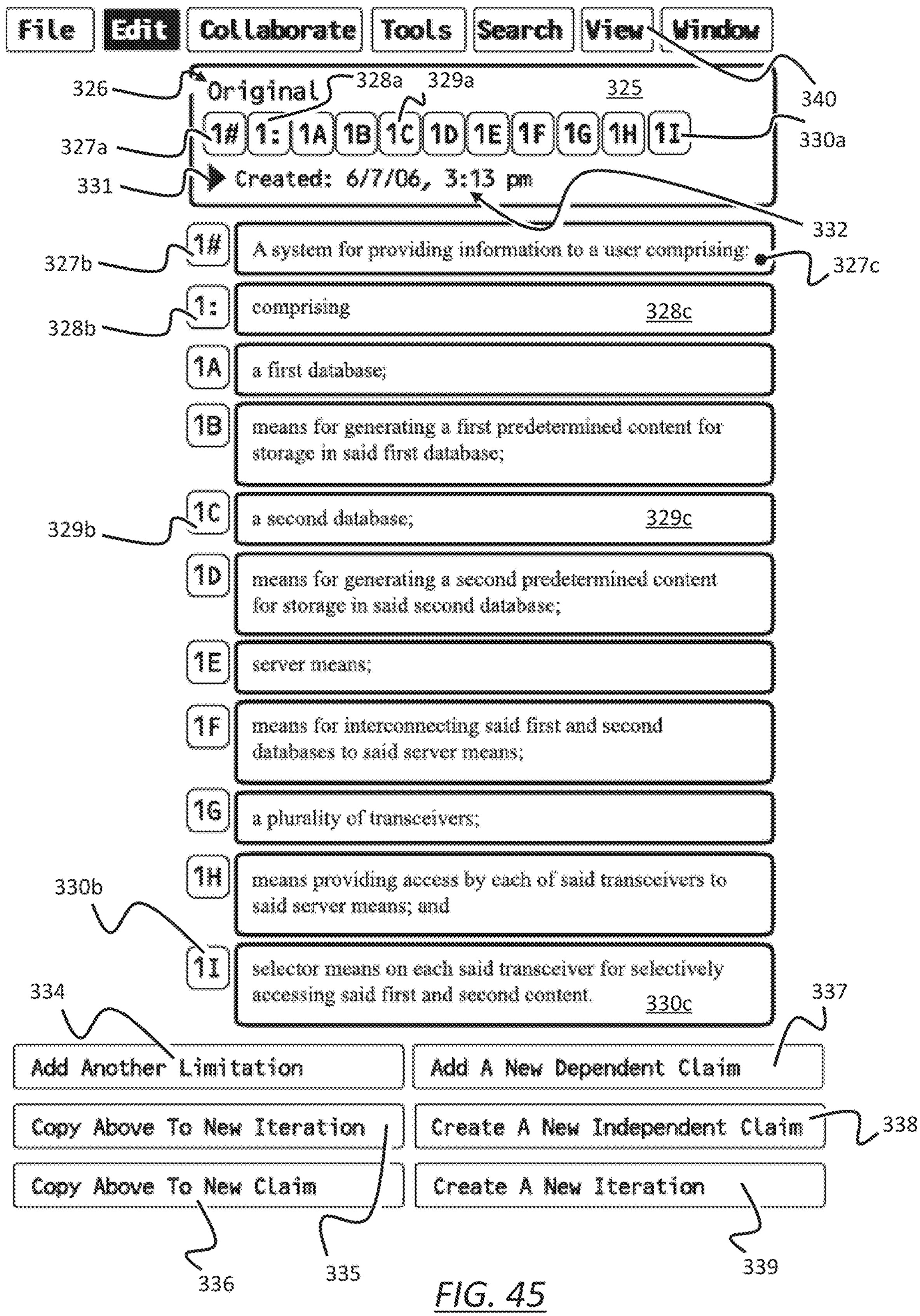
FIG. 45 depicts an example embodiment of the IPACE graphical user interface for viewing, creating, modifying, and interacting with claim data/content within the IPACE system, specifically under the "edit" tab.

FIG. 45 depicts an example embodiment of the IPACE graphical user interface for viewing, creating, modifying, and interacting with claim data/content within the IPACE system, specifically under the "edit" tab.

Extracting, classifying, mapping, electronically storing, tracking, and analyzing Patent Claims In various non-limiting embodiments, each generate claim version and/or element, per specification version, and tracks what versions have and have not been submitted to whom, for what, when, who suggested each edit, who performed each edit, who reviewed each edit, who approved each edit, and when for each.

In various non-limiting embodiments, the IPACE system preferably could generate a shortcode, where the IPACE system discerns and/or perceives each limitation in a claim, and starts with the appropriate number for that particular claim. For example: "1 #" (Preamble), "1:" (for transition) "1A," "1B," and "1C" (for sequentially letter limitations under claim one).

For example, if independent claim one had five limitations, with "e" being the fifth letter (e.g. in the English version), then the IPACE system would generate and display an "1e" at end for the last claim limitation in claim one as a shortcode. Next, the dependent claim would continue sequentially to the right (and down) starting with the next sequential number "2," where a dependent preamble shortcode generates a "2 #," and then followed by displaying a dependent claim limitation shortcode of "2f" (e.g. sequentially picking up of the 'letter' of last claim one limitation of "1e" where "f' follows "e") and continuing along the same left to right visual format if the dependent claim referenced claim one.

In various non-limiting embodiments, if the dependent claim was a multiple dependent claim where, for instance, a claim 8 referred back to both claims 1 and 5, then the IPACE system would display an "8*5 #" after the last preceding dependent claim limitation of say "7j" for this example, where "7" is generated as the seventh dependent claim after dependent claim six and where the letter "j" means the next sequential letter generated alphabetically for the limitation.

In "8*5 #," the "8" stands for the eight claim, the asterisk symbol "*" signifies it's a multiple dependent claim including a dependency on a claim "5," and where claim 5 would also show the limitation shortcode, but as "8*1 #," and where the "#" symbol again stands for the "preamble." The "8*5 #" would be followed by an "8*5k," where the "8*5" represents the same, but where the "k" signifies the dependent claim limitation shortcode as the next sequential letter alphabetically in the English language after "j" from the preceding "7j" dependent claim limitation shortcode. If, on the rare occasion, there are more dependent claims than letters in the say, English language version, then "aa" would sequentially follow "z" and where "ab" would sequentially follow "aa," and where eventually "ba" would sequentially follow "az."

Figure 46:
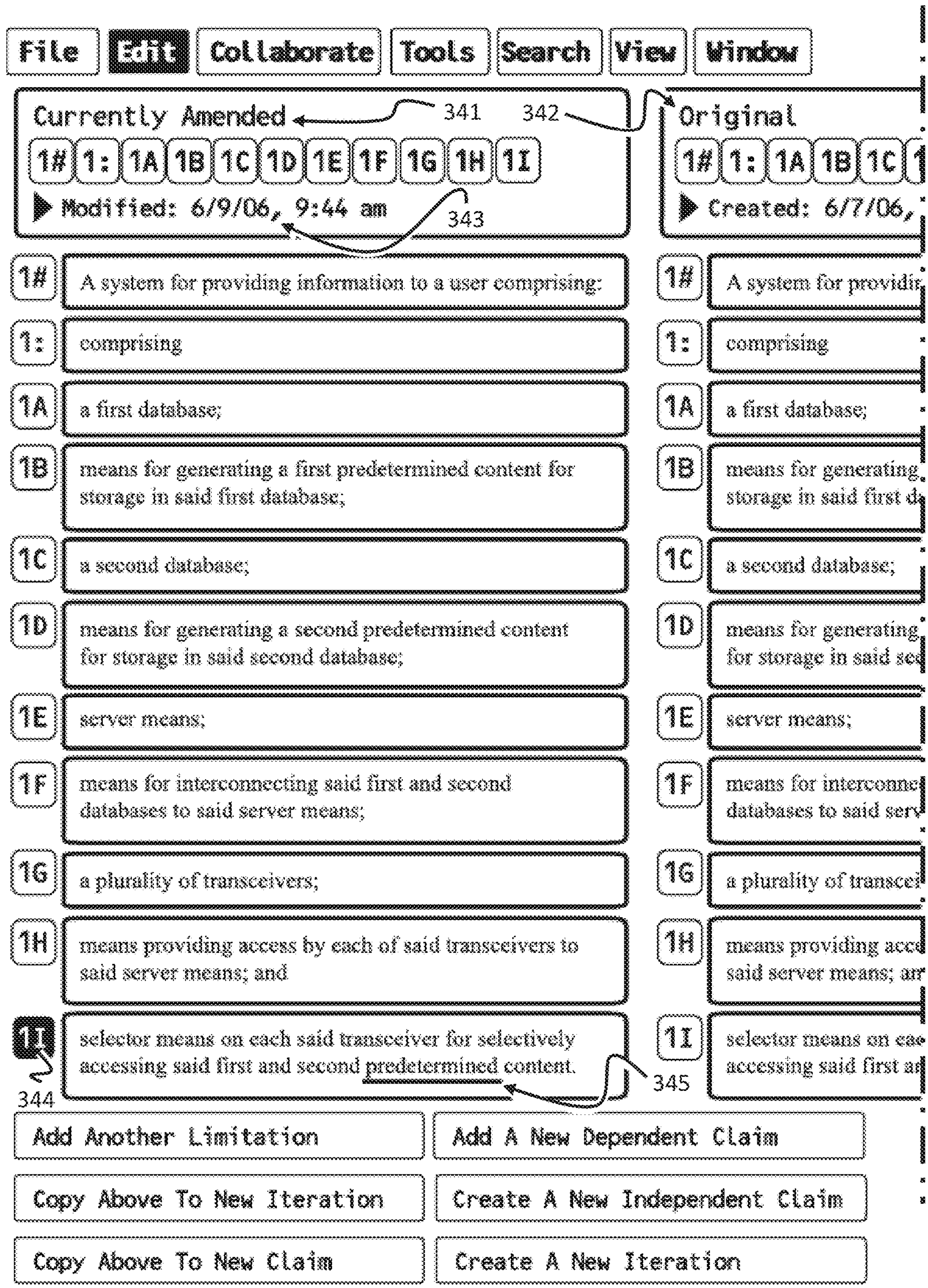
FIG. 46 depicts another example embodiment of the IPACE graphical user interface after making a modification for a particular claim element within the IPACE system, specifically under the "edit" tab.
Figure 47:
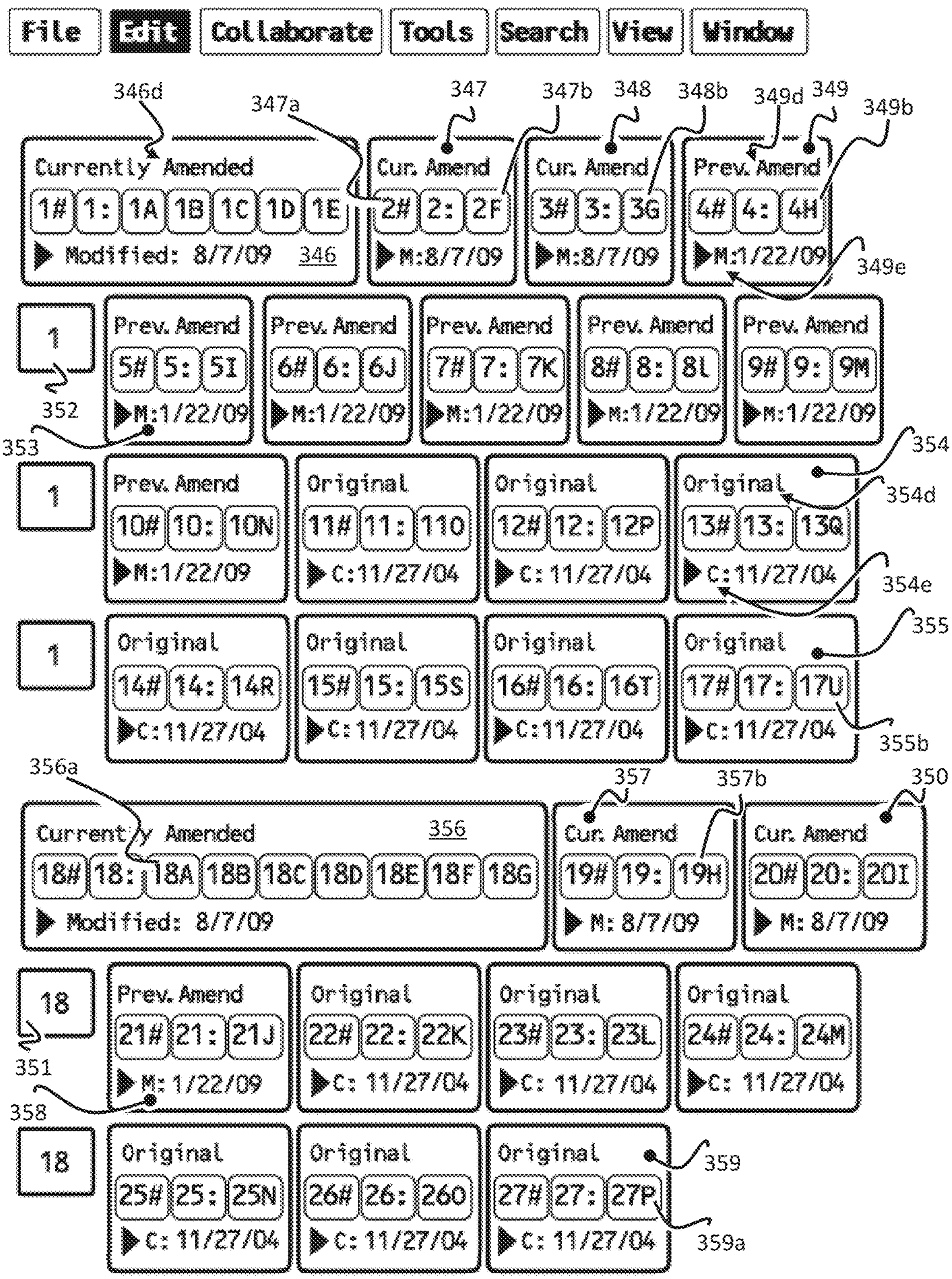
FIG. 47 depicts an example embodiment of the IPACE graphical user interface for visually encapsulating claim elements for a range of modification options, including drag and drop changes/rearrangements within the IPACE system, specifically under the "edit" tab.

FIG. 46 depicts another example embodiment of the IPACE graphical user interface after making a modification for a particular claim element within the IPACE system, specifically under the "edit" tab. FIG. 47 depicts an example embodiment of the IPACE graphical user interface for visually encapsulating claim elements for a range of modification options, including drag and drop changes/rearrangements within the IPACE system, specifically under the "edit" tab.

Figure 48B:
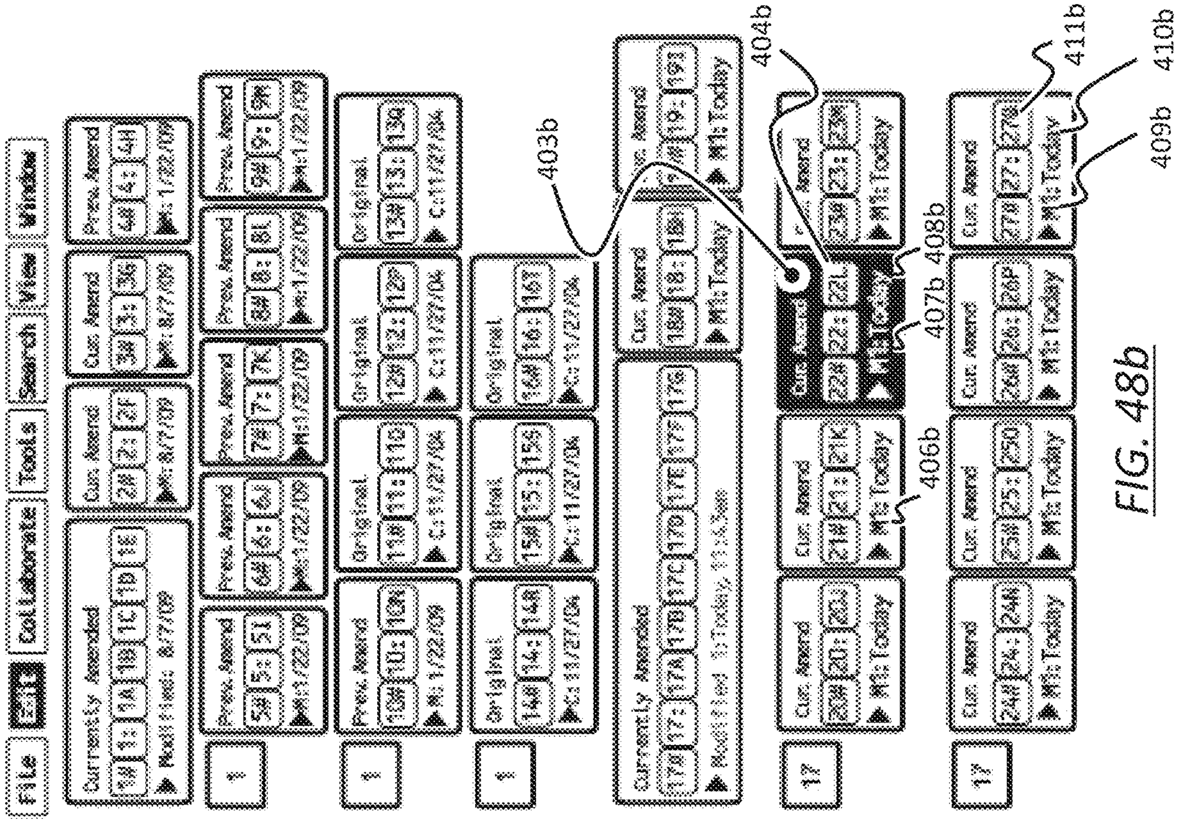
FIG. 48*b* depicts an example embodiment of the IPACE graphical user interface result after the modification made within the previous figure within the IPACE system.
Figure 48A:
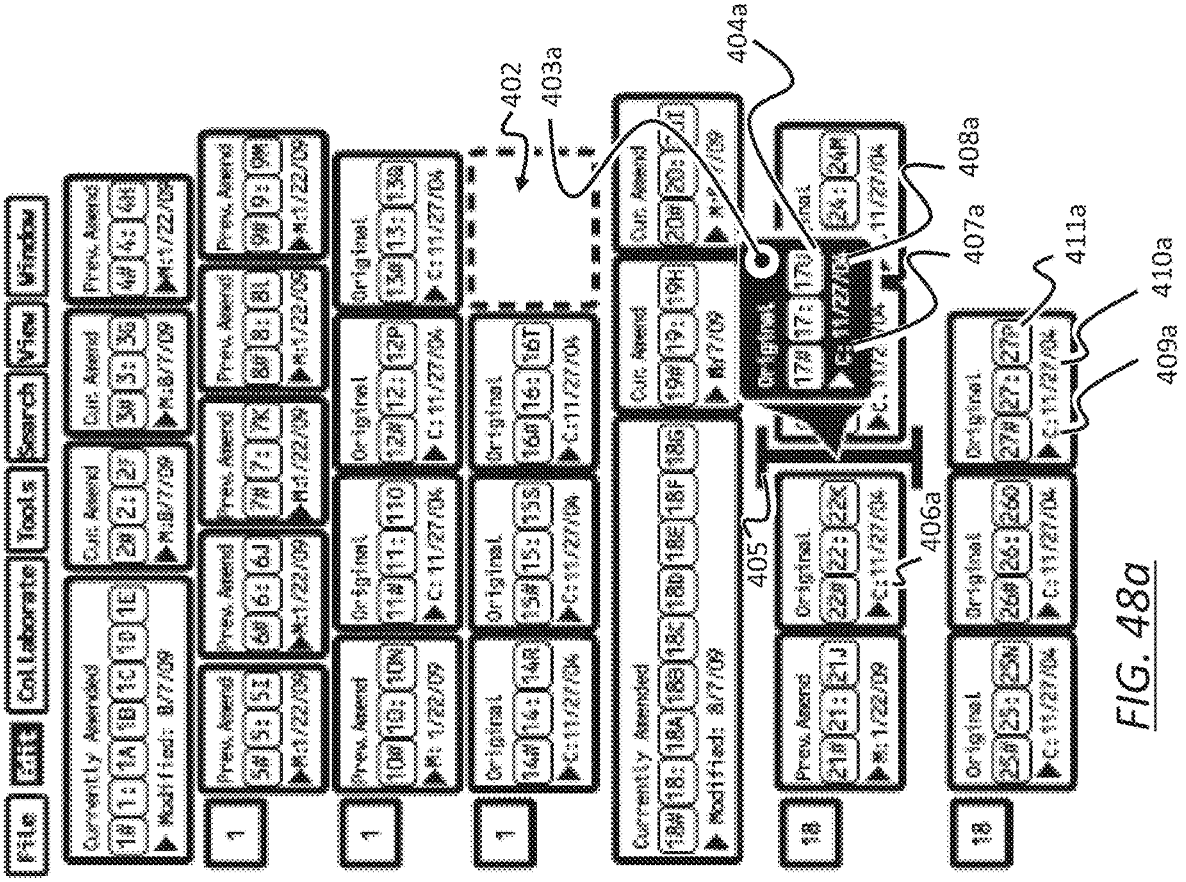
FIG. 48*a* depicts another example embodiment of the IPACE graphical user interface for visually encapsulating claim elements for a range of modification options, where a particular claim is being dragged and dropped in another location within a particular set of claims within the IPACE system.

FIG. 48*a* depicts another example embodiment of the IPACE graphical user interface for visually encapsulating claim elements for a range of modification options, where a particular claim is being dragged and dropped in another location within a particular set of claims within the IPACE system. FIG. 48*b* depicts an example embodiment of the IPACE graphical user interface result after the modification made within the previous figure within the IPACE system.

Extracting, classifying, mapping, electronically storing, tracking, and analyzing Patent Elements, Claims, Versions, Sections and related Items In various non-limiting embodiments, the IPACE system comprises a computer-implemented method for tracking, analyzing, and displaying a particular patent claim and its known and/or perceived relationships. In various non-limiting embodiments, the IPACE system would preferably track each patent claim and claim element per relatively how effectively and/or efficiently each portion of the patent claim was created, suggested, selected-option, generated-user-feedback, edited, annotated/marked-up, tracked-visually, linked-to, and granted, monetized, argued, asserted, validated, and/or the like.

In various non-limiting embodiments, the IPACE system tracks and analyzes the patent claim and its associated parts (e.g. preamble, limitations, number, dependences, and the like) in spreadsheet-like cell fields. For example, where each claim element could appear in a separate column sequentially from left to right, where starting with a "1 #" for a preamble shortcode, where "1" stands for claim one and the "#" represents the preamble, then followed by a series of limitation shortcodes. The limitation shortcodes are, say of: 1*a*, 1*b*, 1*c*, and so on that represent each claim limitation in claim 1, and where each limitation's text is also displayed and visually stacked and tracked from top to bottom for editing, suggesting, reviewing, annotating, approving, PTO-EFS preparing, mail preparing, and the like. Each edit is stored with a frame by frame capture, an undo history, a redo history, a revert history, a time-stamp history, per author, and the like, without losing any data history. So even if an author reverts to an earlier version, the undo history is stored.

In various non-limiting embodiments, the IPACE system preferably could upload, download, track, and analyze each claim iteration, version, and/or the like, as ascertained, discerned, and/or perceived as suitable per a country's procedural rules, requirements, and translation. In various non-limiting embodiments, the IPACE system preferably would upload, download, track, and analyze each translation iteration, version, and/or the like, as to whether the translation is known to, user-stated to, entity-stated to, government-stated to, discerned to, and/or perceived to be suitable per a country's (or per an organization's, e.g. WIPO/PCT<EPO, and/or the like) translation rules and requirements. Further, the IPACE system would preferably analyze and generate a score as to the degree of fitness for whether the translation meets the minimum requirements (e.g. just the claims), surpasses the minimum requirements to what degree, and/or the reliability score of the translation, the translator, the translation reviewer, and/or the like, based upon historical data (e.g. previous submission, case law, office action rejections/amendments, and/or the like).

In various non-limiting embodiments, the IPACE system analysis would preferably automatically, systematically (e.g. via AIS 195), conditionally, and/or actor/user selectively generate versions with the associated items delineated into sections, such as a figure(s) section, a written description(s) section, a claim(s) section, an amendment(s) section, a remark(s) section, an IDS(s) section, an oath(s) section, a declaration(s) section, an appeal(s) section; a petition(s) section; and/or the like per project, per participant, per window of time, per version, per goal (e.g. file a particular application, a particular office action response, a particular petition, a particular appeal) and/or the like.

In various non-limiting embodiments, the IPACE system would preferably automatically, systematically, continuously, persistently, conditionally, and/or per/via actor/user-prompt generate versions with any and all associated items that may be uploaded electronically with scores and notes regarding any deficiencies per any necessary filing requirements (e.g. sections, text, spelling, definitions, grammar, fonts, underlining, bracketing, formatting, bold, margins, colors, images, connection lines, arrows, arrowheads, boxes, shapes, containers, queries, terminators, part/step numbering, figure numbering, page size, translation, fees, oaths, and/or any other items ascertained, discerned, and/or perceived to be lacking, missing, inadequate, and/or the like.) In various non-limiting embodiments, the IPACE system analysis would preferably automatically, systematically (e.g. via AIS 195), conditionally, and/or actor/user selectively generate and display any data analysis regarding items perceived to be inferior to other items/versions saved, why (e.g. novelty, enablement, translation, and/or the like), to what degree, by who, when, and/or the like.

In various non-limiting embodiments, the IPACE system would preferably automatically, systematically, continuously, persistently, conditionally, and/or per/via actor/user-prompt generate versions that may be uploaded electronically with any and all necessary filing requirements (e.g. pdfs with, say the appropriate fonts embedded or as a flattened file for PTO-EFS filing and/or as a printable format per each country's rules (e.g. paper size, margins, page numbering, paragraph numbering, font spacing, font size, strike-throughs, brackets, underlines and so on) and tracks what versions have and have not been submitted to whom, for what, when, who suggested each edit, who performed each edit, who reviewed each edit, who approved each edit, and when foe each.

Importing A Sequence of Claim Iterations

In various non-limiting embodiments, the IPACE system analysis would preferably import a sequence of claim iterations, where the claim iteration could be displayed along a visual timeline (e.g. a histogram); and where the timeline may be played like a sequence of frames in an animation. The visual timeline comprised of claim iterations, may also be scrubbed, paused, stopped, rewound, fast forwarded, and/or the like similar to the frames in an animation playback. The placement of claim iterations along the visual timeline may be placed relative to an actual timeline of creation, modification, saved, and/or the like.

In various non-limiting embodiments, the placement of claim iterations along the visual timeline may be placed relative to other factors, such as relatively how many or how much time, budget, collaboration, participants, modifications, and/or the like; and/or some combination, permutation, and/or the like, of these. In various non-limiting embodiments, the visual timeline includes a plurality of layers, where each layer may be appear independently, simultaneously with others for relative comparison, and/or the like. In various non-limiting embodiments, the plurality of layers may comprise participants, attorney, country, and/or the like.

In various non-limiting embodiments, the claim iterations along the visual timeline may represent a relative moment of time, say a day of iterations, or a particular stage, say an office action response, where the iterations may be animated and played as described before. In addition, the claim iterations along the visual timeline may be displayed and/or layered per participant, per attorney, per author, per examiner, per country, per inventor, per claim, per relative success per a stage (e.g. a grant) and/or the like.

In various non-limiting embodiments, the IPACE system tracks, searches and analyzes the data/content associated with the claims, the claim iterations, the visual timelines embodiments, and/or the like for any discernible patterns that surround a moment of relative success. In various non-limiting embodiments, when a particular patent claim acquires a discernible success, such as an executed licensing agreement, the IPACE system analysis of historical data/statistics, including the data/content associated with the claims, the claim iterations, the visual timelines embodiments, and/or the like, may isolate a discernible pattern surrounding a particular moment and/or a relative success.

In various non-limiting embodiments, when a particular patent claim hits a discernible issue, such as a rejection, re-exam, validity challenge, and/or the like; the IPACE system analysis of historical data/statistics, including the data/content associated with the claims, the claim iterations, the visual timelines embodiments, and/or the like; may isolate a discernible pattern surrounding a particular moment and/or a relative issue/problem. In various non-limiting embodiments, the IPACE system would preferably analyze each discernible moment of relative success, relative issues/problems, and/or the like, to search for patterns, and correlation for particular participants, and where factors, features, and/or the like may be incorporated into fitness criteria, suggestions, and/or the like, accordingly.

Figure 49:
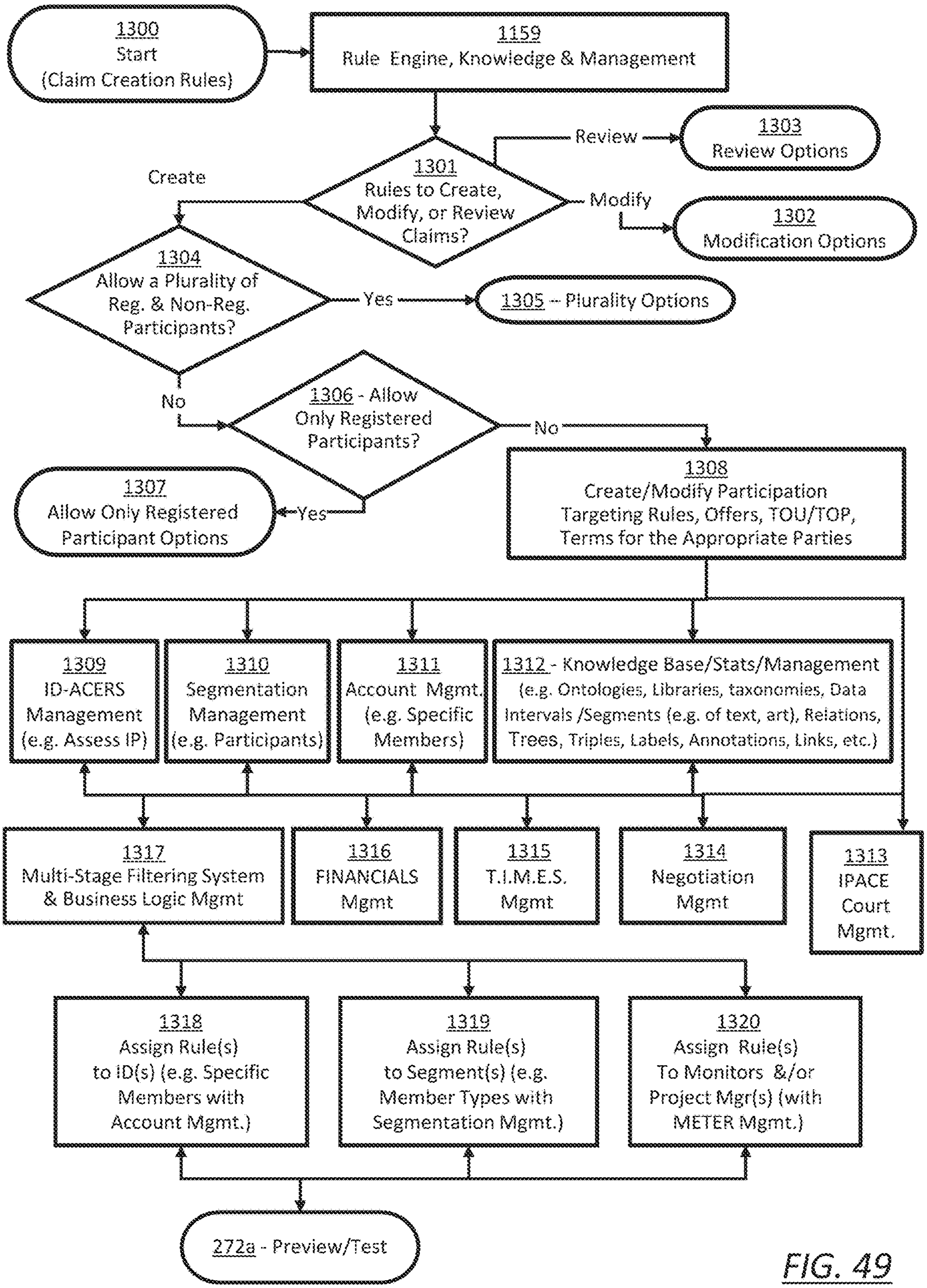
FIG. 49 is a flowchart that depicts a non-limiting embodiment and example of the IPACE system, and associated computer-implemented method regarding data/content creation for a patent application claims.

FIG. 49 is a flowchart that depicts an embodiment and example of the IPACE system, and associated computer-implemented method regarding data/content creation for a patent application claims. Starting with a terminal 1300 where a "Start (Claim Creation Rules)" function appears, followed by a step 1159 "Rule Engine, Knowledge &

Management," which is then followed by a query 1301, which asks whether it's a "Rule to Create, Modify, or Review Claims?"

If the answer to query 1301 is "Modify," then the method proceeds to a terminator 1302 "Modification Options." If the answer to query 1301 is "Review," then the method proceeds to a terminator 1303 "Review Options." If the answer to query 1301 is "Create," then the method proceeds to a query 1304 asks "Allow a Plurality of Reg. and Non-Reg. Participants?" If the answer to query 1304 is "Yes," then the method proceeds to a terminator 1305 "Plurality Options." If the answer to query 1304 is instead "No," the method proceeds to a query 1306 asks, "Allow Only Registered Participants?"

If the answer to query 1306 is "Yes," then the method proceeds to a terminator 1307 "Allow Only Registered Participants Options." If the answer to query 1306 is "No," then the method proceeds to a step 1308 "Create/Modify Participation Targeting Rules, Offers and Terms (TOP) for the Appropriate Parties," with modules for a "ID-ACERS Management (e.g. Assess IP)" 1309 module, a "Segmentation Management (e.g. Participants)" 1310 module, an "Account Mgmt. (e.g. Specific Members)" 1311 module, a "Knowledge Base/Stats/Management (e.g. Ontologies, Libraries, taxonomies, Data Intervals/Segments (e.g. of text, art), Relations, Trees, Triples, Labels, Annotations, Links, etc.)" 1312 module, an "IPACE Court Mgmt." 1313 module, a "Negotiation Mgmt." 1314 module, a "T.I.M.E.S. Mgmt." 1315 module, a "F.I.N.A.N.C.I.A.L.S. Mgmt." 1316 module, and a "Multi-Stage Filtering System and Business Logic Management" 1317 module.

In various non-limiting embodiments, the collective usage of the modules would preferably provide functionality to assign rules with an "Assign Rule(s) to ID(s) (e.g. Specific Members with Account Mgmt.)" 1318 module, an "Assign Rule(s) to Segmentation(s) (e.g. Member Types with Segmentation Mgmt.)" 1319 module, and/or an "Assign Rule(s) to Monitors and/or Project Mgr.(s) (with METER Mgmt.)" 1320 module, where the results may be previewed and/or tested in a terminator **272*a*** "Preview/Test."

Figure 50:
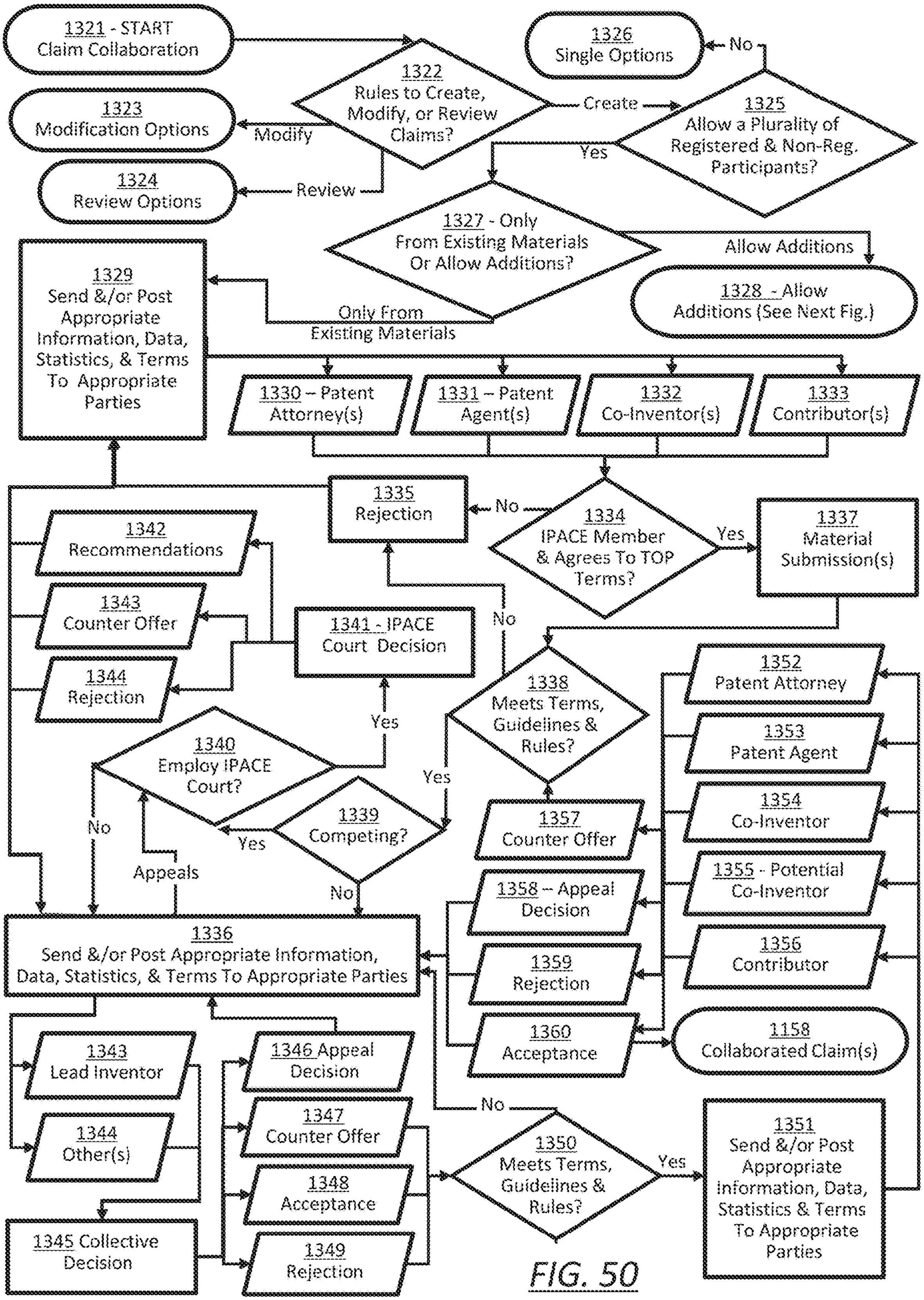
FIG. 50 is a flowchart that depicts a non-limiting embodiment and example of the IPACE system, and associated computer-implemented method regarding data/content collaboration (e.g. for patent application claims).

FIG. 50 is a flowchart that depicts an embodiment and example of the IPACE system, and associated computer-implemented method regarding data/content collaboration (e.g. for patent application claims). Starting with a terminal 1321 where a "Start (Claim Collaboration)" function appears, followed by a query 1322, which asks whether it's a "Rules to Create, Modify, or Review Claims?"

If the answer to query 1322 is "Modify," then the method automatically, conditionally, and/or user selectively proceeds to terminator 1323 "Modification Options." If the answer to query 1322 is "Review," then the method automatically, conditionally, and/or user selectively proceeds to terminator 1324 "Review Options." If the answer to query 1322 is "Create," then the method proceeds a Query 1325 "Allow a Plurality of Registered and Non-Reg. Participants?"

If the answer to query 1325 is "No," then the method proceeds to Terminator 1326 "Single Options." If the answer to query 1325 is "Yes," the method proceeds to a query 1327 with "Only From Existing Materials Or Allow Additions?" If the answer to query 1327 is instead "Allow Additions," then the method proceeds to a Terminator 1328 with an "Allow Additions (See Next Fig.)."

If the answer to query 1327 is "Only From Existing Materials," then the method proceeds to a step 1329 with a "Send and/or Post Appropriate Information, Data, Statistics, and Terms to Appropriate Parties," where the method automatically, conditionally, and/or user selectively proceeds to a list of options with a "Patent Attorney(s)" (44) 1330 option; a "Patent Agent(s)" (45) 1331 option, a "Joint-Inventor/Co-Inventor(s)" 1332 option, or a "Contributor(s)" (50) 1333 option.

In various non-limiting embodiments, the selection/results of the list of options 1330-1333 proceeds to a query 1334, with an "IPACE Member and Agrees to TOP Terms?" If the answer to query 1334 is "No," then the method proceeds to a 1335 "Rejection," where the method may proceed to both/or a step 1336 with a "Send and/or Post Appropriate Information, Data, Statistics, and Terms To Appropriate Parties" and the same in the step 1329 (e.g. depending on who is the appropriate party). If the answer to query 1334 is instead "Yes," then the method proceeds to a step 1337 for "Material Submission(s)," where the method proceeds to a Query 1338, which asks if the material submission "Meets Terms, Guidelines and Rules?"

If the answer to query 1338 is "No," then the method proceeds to the "Rejection" 1335. If the answer to query 1338 is instead "Yes," then the method proceeds a Query 1339, which asks "Competing?" where the material submitted may be competing with other submissions. If the answer to query 1339 is "Yes," then the method proceeds to a Query 1340, which asks whether to "Employ IPACE Court?" If the answer to query 1340 is "Yes," then the method proceeds to a step 1341 for an "IPACE Court Decision."

In various non-limiting embodiments, the IPACE Court Decision in 1341 would preferably produce the decision, which may incorporate one of more from a list of options 1342-1344, which include a "Recommendations" 1342, a "Counter Offer" 1343, and/or a "Rejection" 1344, where, depending on the number of items involved in the case, there may be a plurality of decisions. In various non-limiting embodiments, the IPACE Court Decision in 1341 would preferably produce a final decision (not shown), which may include recommendations, counter offers, acceptance, rejections, and/or the like, that may or may not be final.

In various non-limiting embodiments, the IPACE Court Decision and method would proceed to both the step 1336, with a "Send and/or Post Appropriate Information, Data, Statistics, and Terms To Appropriate Parties" and to the same in the step 1329 (e.g. depending on who is the appropriate party).

If the answer to query 1340 is "No," then the method automatically, conditionally, and/or user selectively proceeds to step 1336. Proceeding from step 1336, there area list of two options to the "Send and/or Post Appropriate Information, Data, Statistics, and Terms To Appropriate Parties," where the method automatically, conditionally, and/or user selectively proceeds to a list of options that include a "Lead Inventor" (40) 1343 option and a "Other(s)" 1344 option. The method proceeds to step 1345 "Collective Decision," where the method automatically, conditionally, and/or user selectively proceeds to a list of options with an "Appeal Decision," 1346 option, a "Counter Offer" 1347 option, an "Acceptance" 1348 option, or a "Rejection" 1349 option. Then the method automatically, conditionally, and/or user selectively proceeds query 1350 "Meets Terms, Guidelines and Rules?" If the answer to query 1350 is "No," then the method automatically, conditionally, and/or user selectively proceeds to 1336. If the answer to query 1350 is instead "Yes," the method automatically, conditionally, and/or user selectively proceeds step 1351 "Send and/or Post Appropriate Information, Data, Statistics, and Terms To Appropriate Parties," where the method automatically, conditionally, and/or user selectively proceeds to a list of options that include a "Patent Attorney" (44) 1352 option, a "Patent Agent" (45) 1353 option, a "Joint-Inventor/Co-Inventor" (41) 1354 option, a "Potential Joint-Inventor/Co-Inventor" 1355 option, a "Contributor" (50) 1356 option, a "Counter Offer" 1357 option, an "Appeal Decision" 1358 option, a "Rejection" 1359 or an "Acceptance" 1360 option. The method automatically, conditionally, and/or user selectively proceeds to step 1336.

Figure 51:
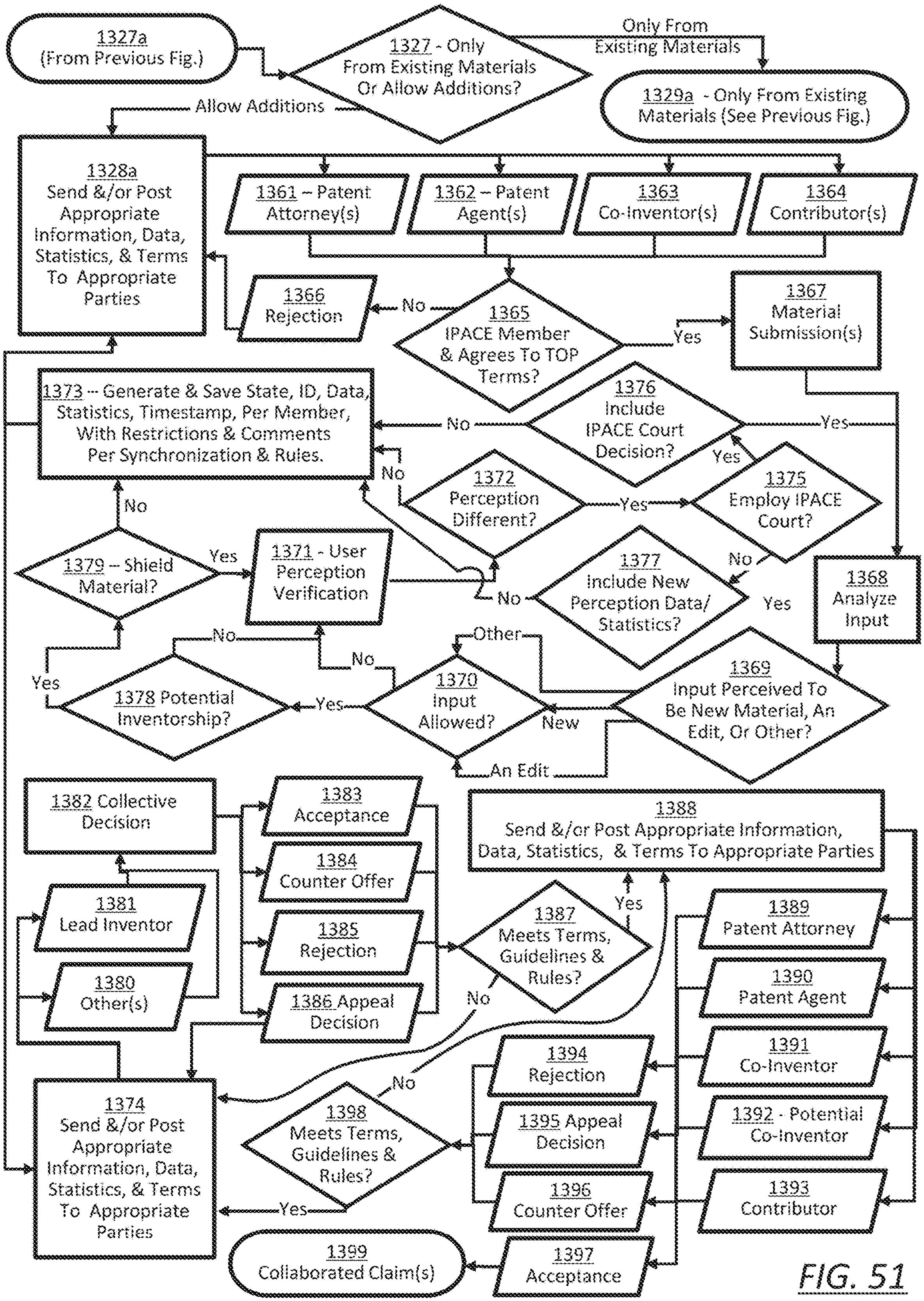
FIG. 51 is a flowchart that depicts an extension of the previous figure and embodiment example of the IPACE system, and associated computer-implemented method regarding data/content collaboration for a patent application claims.

FIG. 51 is a flowchart that depicts an extension of the previous figure and embodiment example of the IPACE system, and associated computer-implemented method regarding data/content collaboration for a patent application claims. Starting with a terminal 1327*a* "(From the Previous Fig.)" function, followed by a query 1327, which asks whether it's "Only From Existing Materials, OR Allow Additions?"

If the answer to query 1327 is "Only From Existing Materials," the method proceeds to terminator 1329*a* "Only From Existing Materials (See Previous Fig.)." If the answer to query 1327 is "Allow Additions," the method proceeds step 1328*a* Send and/or Post Appropriate Information, Data, Statistics, and Terms to Appropriate Parties. From 1328*a*, the method and/or user may select automatically, conditionally, and/or user selectively proceeds to a list of options that include a "Patent Attorney(s)" (44) 1361 option, a "Patent Agent(s)" (45) 1362 option, a "Joint-Inventor/Co-Inventor(s)" (41) 1363 option or a "Contributor(s)" (50) 1364 option.

The method then proceeds to a query 1365 that asks if "IPACE Member and Agrees to TOP Terms?" If the answer to query 1365 is "No," then the method proceeds to 1366 "Rejection," then the method returns to step 1328*a*. If the answer to query 1365 is instead "Yes," then the step 1367 "Material Submission(s)" the method proceeds to step 1368 "Analyze Input." The method proceeds to query 1369 where it asks if "Input Perceived to be New Material, An Edit or Other? If the answer to query 1369 is "Other," "New," or "An Edit," then the method proceeds query 1370 where it asks if an "Input Allowed?"

If the answer to query 1370 is "No," then the method proceeds to step 1371 "User Perception Verification." Next, the method proceeds query 1372 "Perception Different?" If the answer to query 1372 is "no," then the method proceeds step 1373 "Generate and Save State Data, Statistics, Time-stamp, Per Member, With Restrictions and Comments Per Synchronization and Rules." Next, the method proceeds to step 1374 "Send and/or Post Appropriate Information, Data, Statistics, and Terms To Appropriate Parties."

If the answer to query 1372 is instead "Yes," the method proceeds to a query 1375 "Employ IPACE Court?" If the answer to query 1375 is "Yes," then the method proceeds to query 1376 "Include IPACE Court Decision?" If the answer to query 1375 is instead "No," then the method proceeds to query 1377 "Include New Perception Data/Statistics?" If the answer to query 1376 is "No," the method returns to step 1373. If, back a query 1370, the answer is "Yes," then the method proceeds to query 1378 "Potential Inventorship?"

If the answer to query 1378 is "No," the method returns to step 1371. If the answer is instead 'Yes," then the method proceeds to query 1379 "Shield Material?" If the answer to query 1379 is "Yes," then the method returns to step 1371. If the answer to query 1379 is instead 'No," then the method returns to step 1373.

Proceeding from step 1374, there are a list of two options to the "Send and/or Post Appropriate Information, Data, Statistics, and Terms To Appropriate Parties," where the method automatically, conditionally, and/or user selectively proceeds to a list of options that include a "Lead Inventor" (40) 1381 option and an "Other(s)" 1380 option. The method proceeds to step 1382 "Collective Decision," where the method automatically, conditionally, and/or user selectively proceeds to a list of options with an "Appeal Decision," 1386 option, a "Counter Offer" 1384 option, an "Acceptance" 1383 option, or a "Rejection" 1385 option.

Next, the method proceeds to query 1387 "Meets Terms, Guidelines and Rules?" If the answer to query 1387 is "No," then the method proceeds return to step 1374. If the answer is instead "Yes," the method proceeds step 1388 "Send and/or Post Appropriate Information, Data, Statistics, and Terms to Appropriate Parties," where the method automatically, conditionally, and/or user selectively proceeds to a list of options that include a "Patent Attorney" (44) 1389 option, a "Patent Agent" (45) 1390 option, a "Joint-Inventor/Co-Inventor" (41) 1391 option, a "Potential Joint-Inventor/Co-Inventor" 1392 option, a "Contributor" (50) 1393 option, a "Rejection" 1394, an "Appeal Decision" 1395 option, a "Counter Offer" 1396 option, or an "Acceptance" 1397 option.

Joint-Inventor/Co-Inventor Next, the method proceeds to query 1398 "Meets Terms, Guidelines and Rules?" If the answer to query 1398 is "Yes," the method returns to step 1374. If the answer is instead 'no," then the method returns to step 1388. From option 1397, the method proceeds to a terminator 1399 "Collaborated Claim(s)."

Figure 52:
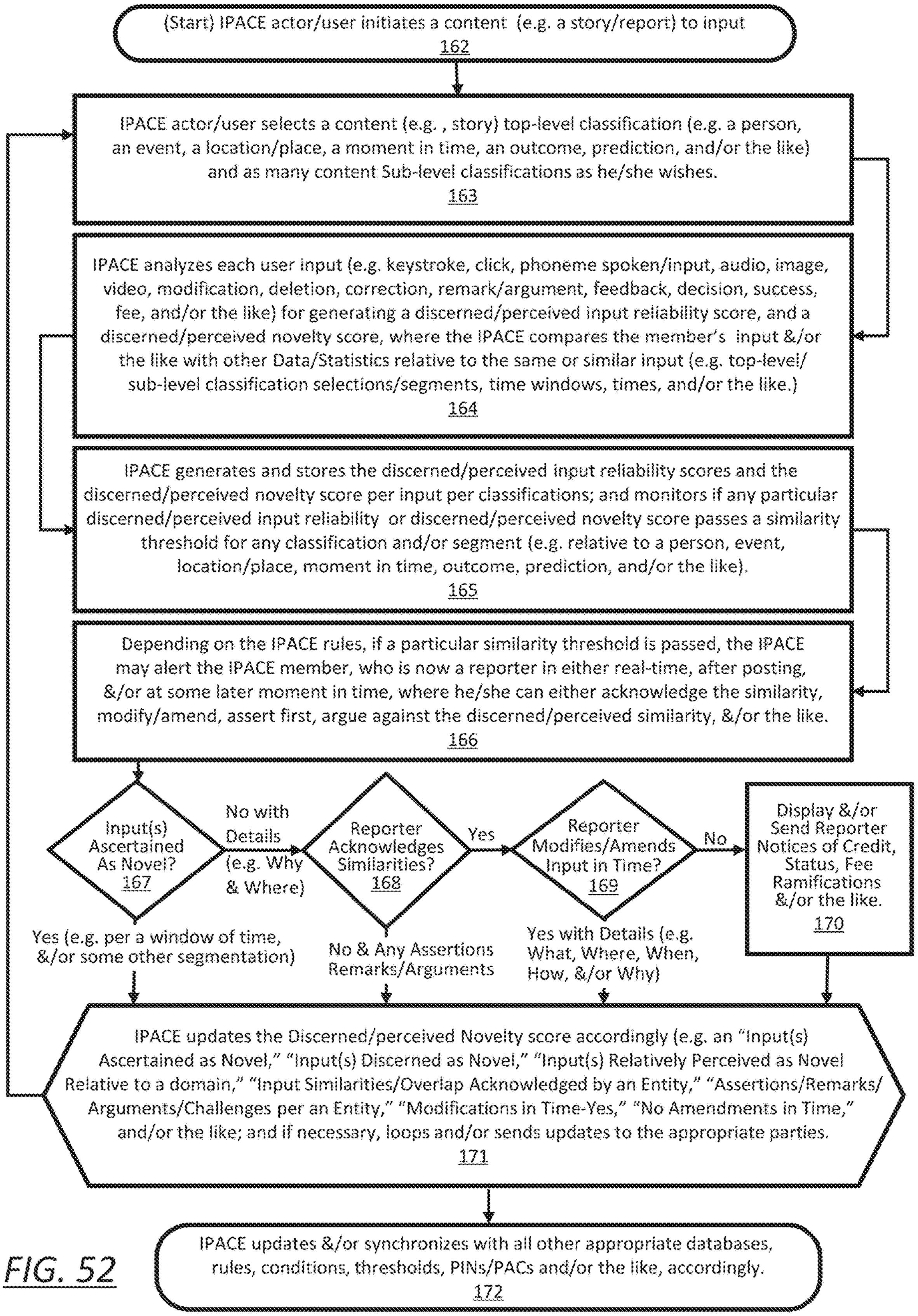
FIG. 52 is a flowchart that depicts a non-limiting embodiment and example of the IPACE system, and associated computer-implemented method for extracting, classifying, mapping, electronically storing, tracking, and analyzing a data/content (e.g. a story/report) for such things as novelty.

FIG. 52 is a flowchart that depicts an embodiment and example of the IPACE system, and associated computer-implemented method for extracting, classifying, mapping, electronically storing, tracking, and analyzing a data/content (e.g. a story/report) for such things as novelty. Starting with a terminator 162 where an "IPACE member/user initiates a data/content (e.g. a story/report) to input" is performed. The process then proceeds to a step 163 where an "IPACE member/user selects a data/content (e.g., story) top-level classification (e.g. a person, an event, a location/place, a moment in time, an outcome, prediction, and/or the like) and as many data/content Sub-level classifications as he/she wishes" is performed.

The process then proceeds to a step 164 where an "IPACE analyzes each user input (e.g. keystroke, click, phoneme spoken/input, audio, image, video, modification, deletion, correction, remark/argument, feedback, decision, success, fee, and/or the like) for generating a discerned/perceived input reliability score, and a discerned/perceived novelty score, where the IPACE compares the member's input &/or the like with other Data/Statistics relative to the same or similar input (e.g. top-level/sub-level classification selections/segments, time windows, times, and/or the like)" is performed.

The process then proceeds to a step 165 where an "IPACE generates and stores the discerned/perceived input reliability scores and the discerned/perceived novelty score per input per classifications; and monitors if any particular discerned/perceived input reliability or discerned/perceived novelty score passes a similarity threshold for any classification and/or segment (e.g. relative to a person, event, location/place, moment in time, outcome, prediction, and/or the like)" is performed. The process then proceeds to a step 166 where "Depending on the IPACE rules, if a particular similarity threshold is passed, the IPACE may alert the IPACE member who is now a reporter in either real-time, after posting, &/or at some later moment in time, where he/she can either acknowledge the similarity, modify/amend, assert first, argue against the discerned/perceived similarity, &/or the like" is performed.

From Step 166, a query 167 asks whether "Input(s) Ascertained As Novel?" If the answer to query 167 is "Yes (e.g. per a window of time, &/or some other segmentation)," then the process proceeds to a decision/collection point in a step 171. If the answer to query 167 is "No with Details (e.g. Why & Where)," then the process proceeds to a query 168. Here at a query 168 asks whether "Reporter Acknowledges Similarities?" If the answer to query 168 is "No & Any Assertions Remarks/Arguments," then the process proceeds to the step 171.

If the answer to query 168 is "Yes," then the process proceeds to a query 169. Here a query 169 asks whether "Reporter Modifies/Amends Input in Time?" If the answer to query 169 is "No," then the process proceeds to a step 170 "Display &/or Send Reporter Notices of Credit, Status, Fee Ramifications &/or the like." If the answer to query 169 is "Yes with Details (e.g. What, Where, When, How, &/or Why)," then the process proceeds to the step 171 "IPACE updates the Discerned/perceived Novelty score accordingly (e.g. an "Input(s) Ascertained as Novel," "Input(s) Discerned as Novel," "Input(s) Relatively Perceived as Novel Relative to a domain," "Input Similarities/Overlap Acknowledged by an Entity," "Assertions/Remarks/Arguments/Challenges per an Entity," "Modifications in Time-Yes," "No Amendments in Time," and/or the like; and if necessary, loops and/or sends updates to the appropriate parties." The method proceeds to a terminator 172 "IPACE updates &/or synchronizes with all other appropriate databases, rules, conditions, thresholds, PINs/PACs and/or the like, accordingly."

Figure 53:
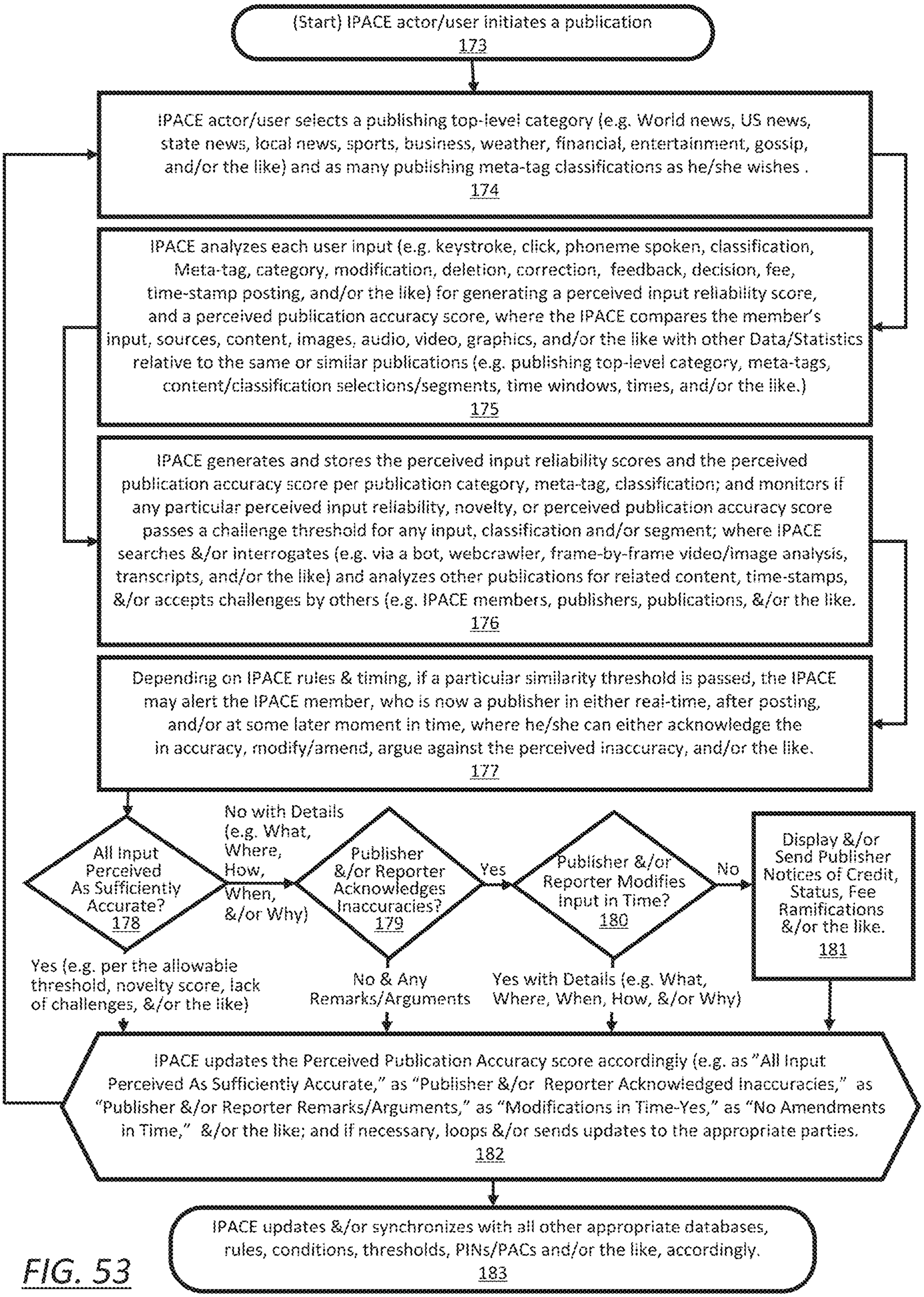
FIG. 53 is a flowchart that depicts a non-limiting embodiment and example of the IPACE system, and associated computer-implemented method for publishing, tracking, and/or analyzing published data/content.

FIG. 53 is a flowchart that depicts an embodiment and example of the IPACE system, and associated computer-implemented method for publishing, tracking, and/or analyzing published data/content. Starting with a terminator 173 where an "IPACE member/user initiates a publication" is performed. Next, the process proceeds to a step 174 where an "IPACE member/user selects a publishing top-level category (e.g. World news, US news, state news, local news, sports, business, weather, financial, entertainment, gossip, and/or the like) and as many publishing meta-tag classifications as he/she wishes" is performed.

Next, the process proceeds to step 175 where an "IPACE analyzes each user input (e.g. keystroke, click, phoneme spoken, classification, Meta-tag, category, modification, deletion, correction, feedback, decision, fee, time-stamp posting, and/or the like) for generating a perceived input reliability score, and a perceived publication accuracy score, where the IPACE compares the member's input, sources, data/content, images, audio, video, graphics, and/or the like with other Data/Statistics relative to the same or similar publications (e.g. publishing top-level category, meta-tags, data/content/classification selections/segments, time windows, times, and/or the like)" is performed.

Next, the process proceeds to a step 176 where an "IPACE generates and stores the perceived input reliability scores and the perceived publication accuracy score per publication category, meta-tag, classification; and monitors if any particular perceived input reliability, novelty, or perceived publication accuracy score passes a challenge threshold for any input, classification and/or segment; where IPACE searches &/or interrogates (e.g. via a bot, web crawler, frame-by-frame video/image analysis, transcripts, and/or the like) and analyzes other publications for related data/content, time-stamps, &/or accepts challenges by others (e.g. IPACE members, publishers, publications, &/or the like.)" is performed.

Next, the process proceeds to a step 177 where "Depending on IPACE rules & timing, if a particular similarity threshold is passed, the IPACE may alert the IPACE member, who is now a publisher in either real-time, after posting, and/or at some later moment in time, where he/she can either acknowledge the in accuracy, modify/amend, argue against the perceived inaccuracy, and/or the like" is performed. From step 177, a query 178 asks "All Input Perceived As Sufficiently Accurate?" If the answer to query 178 is "Yes (e.g. per the allowable threshold, novelty score, lack of challenges, &/or the like)," then the process proceeds to a step 182. If the answer to query 178 is "No with Details (e.g. What, Where, How, When, &/or Why)," then the process proceeds to a query 179.

Here at query 179 asks whether "Publisher &/or Reporter Acknowledges Inaccuracies?" If the answer to query 179 is "No & Any Remarks/Arguments," then the process proceeds to the step 182. If the answer to query 179 is "Yes," then the process proceeds to a query 180. Here a query 180 asks whether "Publisher &/or Reporter Modifies Input in Time?" If the answer to query 180 is "No," then the process proceeds to a step 181 "Display &/or Send Reporter Notices of Credit, Status, Fee Ramifications &/or the like."

If the answer to query 180 is "Yes with Details (e.g. What, Where, When, How, &/or Why)," then the process proceeds to a decision/collection point in a step 182 "IPACE updates the Perceived Publication Accuracy score accordingly (e.g. as "All Input Perceived As Sufficiently Accurate," as "Publisher &/or Reporter Acknowledged Inaccuracies," as "Publisher &/or Reporter Remarks/Arguments," as "Modifications in Time-Yes," as "No Amendments in Time" and/or the like; and if necessary, sends updates to the appropriate parties." The method proceeds to a terminator 183 "IPACE updates &/or synchronizes with all other appropriate databases, rules, conditions, thresholds, PINS/PACs and/or the like, accordingly."

Figure 54:
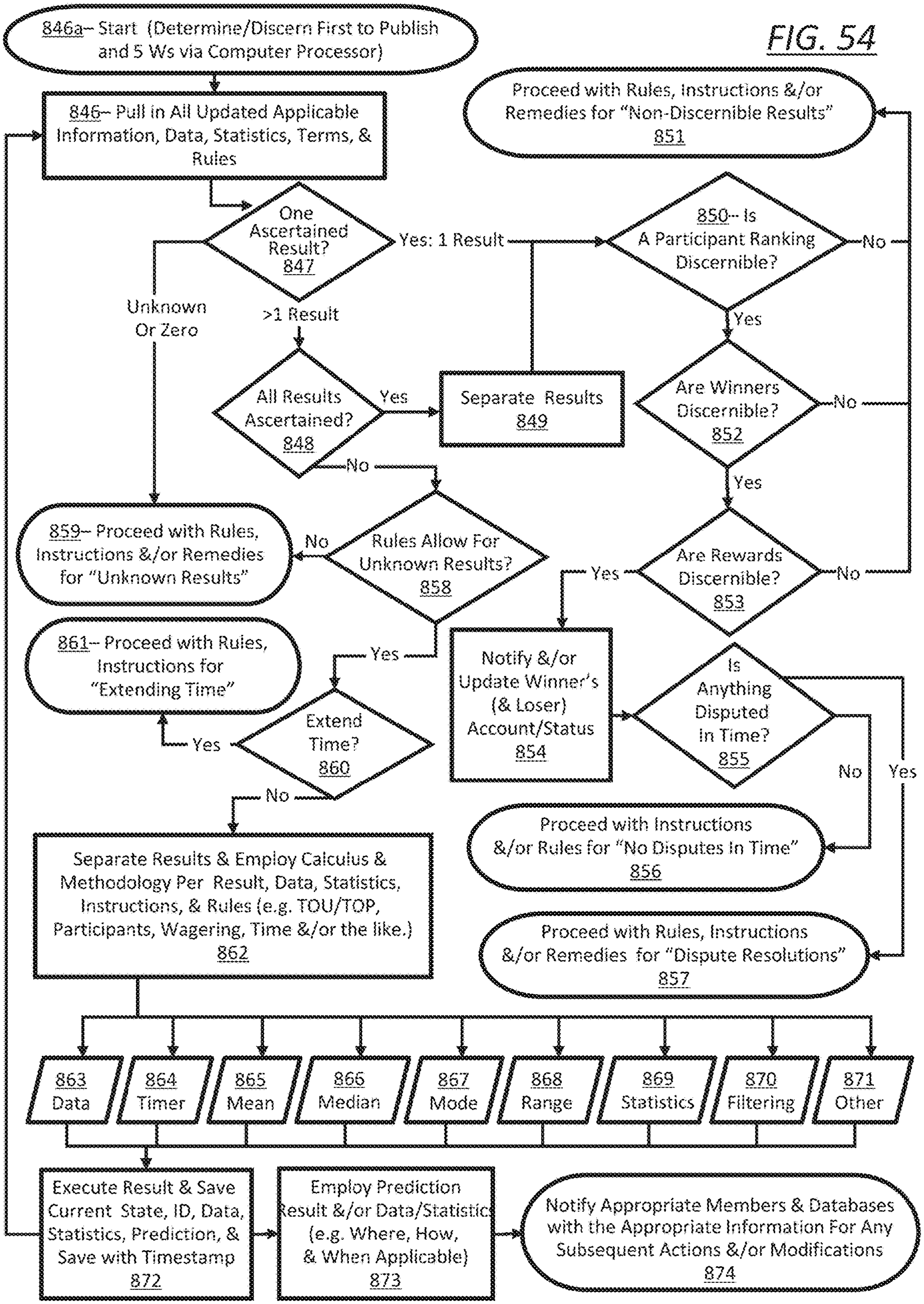
FIG. 54 is a flowchart that depicts a non-limiting embodiment and example of the IPACE system, and associated computer-implemented method for tracking, analyzing, determining, and/or discerning who published what, when, where, and/or how.

FIG. 54 is a flowchart that depicts an embodiment and example of the IPACE system, and associated computer-implemented method for tracking, analyzing, determining, and/or discerning who published what, when, where, and/or how. Starting with a terminator 846*a* where process "(Determine/Discern First to Publish and 5 Ws)." Next, the process proceeds a step 846 where "Pull in All Updated Applicable Information, Data, Statistics, Terms, & Rules" is performed. From the step 846, a query 847 asks if "One Ascertained Result?"

If the answer the query 847 is "Yes: 1 Result," then the process proceeds to a query 850, where it asks "Is A Participant Ranking Discernible?" If the answer to the query 850 is "No," then the process proceeds to a terminal 851 "Proceed with Rules, Instructions &/or Remedies for "Non-Discernible Results." If the answer to the query 850 is instead "Yes," then the process proceeds to a query 852 where it asks "Are Winners Discernible?" If the answer to the query 852 is "No," then the process proceeds to a terminator 851. If the answer to the query 852 is instead "Yes," then the process proceeds to a query 853 where it asks "Are Rewards Discernible?" If the answer to the query 853 is "No," then the process proceeds to the terminator 851. If instead the answer to the query 853 is "Yes," then the process proceeds to a step 854 to "Notify &/or Update Winner's (& Losers) Account/Status."

From the step 854, the process proceeds to a query 855 where it asks "Is Anything Disputed In Time?" If the answer to the query 855 is "No," then the process proceeds to a terminator 856 in order to "Proceed With Instructions &/or Rules for "No Disputes In Time." If the answer to the query 852 is instead "Yes," then the process proceeds to a terminator 857 in order to "Proceed with Rules, Instructions &/or Remedies for "Dispute Resolutions."

If the answer to a query 847 is ">1 Result," then the process proceeds to a query 848, where it asks whether "All Results Ascertained?" If the answer to the query 848 is "Yes," then process proceeds to a step 849 to "Separate Results," which proceeds to the query 850. If the answer to the query 848 is "No," then process proceeds to a query 858 asking if "Rules Allow For Unknown Results?" If the answer to the query 858 is "No," then the process proceeds to a terminator 859 "Proceed with Rules, Instructions &/or Remedies for "Unknown Results." If the answer to the query 858 is instead "Yes," then the process proceeds to a query 860 where it asks "Extend Time?" If the answer to the query 860 is "Yes," then the process proceeds to a terminator 861 "Proceed with Rules, Instructions for 'Extending Time.'" If the answer to the query 860 is instead "No," then the process proceeds to a step 862 "Separate Results & Employ Calculus & Methodology Per Result, Data, Statistics, Instructions, & Rules (e.g. TOU/TOP, Participants, Wagering, Time &/or the like.)"

If the answer to the query 847 is "Unknown Or Zero," then the process proceeds to the terminator 859. As the process continues from the step 862, where the method automatically, conditionally, and/or user selectively proceeds to a list of options with an 863 "Data" option, an 864 "Timer" option, an 865 "Mean" option, an 866 "Median" option, an 867 "Mode" option, an 868 "Range" option, an 869 "Statistics" option, an 870 "Filtering" option, and/or an "Other" option.

In various non-limiting embodiments, the selection/results of the list of options 863-871 proceeds to a step 872 to "Execute Result & Save Current State, ID, Data, Statistics, Prediction, & Save with Timestamp" Next, the process proceeds to a step 873 to "Employ Prediction Result &/or Data/Statistics (e.g. Where, How, & When Applicable)." Next, the process proceeds to terminator 874 "Notify Appropriate Members & Databases with the Appropriate Information For Any Subsequent Actions &/or Modifications."

An embodiment of 1st2Report Functionality In various non-limiting embodiments, the IPACE system not only improves the efficiency at which work gets done by showing new Employees (55) where similar documents exist without them knowing in advance and where to store similar documents, but it can also credit those who originated a document or other item in the system. For example, if a Reporter (63) for a news agency typed up a document (e.g. utilizing the CREATE module under the "1st2Report Dashboard"), where the document was regarding an event such as a robbery that took place within the last four hours, he/she could see if anyone else within his/her organization had also created the same or a similar document.

If the Reporter (63) types, "The Main Street Bank at 1234 Main Street was robbed at gun point this morning at approximately 9:15 pm. The city police were called to the scene by a bank teller whom pressed a silent alarm from within the bank while the robbery was in progress. The two gunmen in the robbery were met by a white colored mini-van, which fled the scene heading towards the freeway." In various non-limiting embodiments, then the IPACE system would start searching for similar documents within the system's database. The Reporter (63) could limit his/her search to things such as categories: crimes, robberies; to locations such as: the town where it took place, the bank; to people or Participants (80): the robbers, the bank tellers, the bank customers; and/or to windows of time, such as today after 9 am (where the IPACE system knew the actual date of the document).

Depending on how large of a network the IPACE system searched, the Reporter (63) could be the first to create such a document, if say the Reporter (63) only searched his/her own computer. If he/she searched the entire news agency's network, the Reporter (63) might find information about previous bank robberies in general or at that same bank. The Reporter (63) might even discover that someone else within the same news organization has already entered a similar story, because the other Reporter's (63) document also says that the robbery took place this morning. Now the Editor (61) of the new agency can be prompted of the situation and he/she can decide if these two individuals should work independently on different aspects of the event, collaboratively, or perhaps to remove one of the two from the story.

If the IPACE system searched for materials outside the news agency, such as the World Wide Web, and discovered articles or materials that had already been posted regarding the same robbery that same morning, the Editor (61) could ask the Reporters (63) to compare their materials to the existing materials for what is different, what is unique, and then ask them to justify the differences and unique information.

Should the new information created by the Editor's (61) Reporters (63) be verified by a witness or group of witnesses and considered material to the event, the news agency could post the story within the IPACE system and the IPACE system would give them credit for being first to report these material facts or material elements, assuming no other entity reported the same information before a Reporter (63) from this news agency posted his or her new materials.

When someone goes to post a document where he or she is looking to see if he/she was the first to create a document reporting an event, that individual can start by selecting a time for when a specific event within a larger timeline of the entire event, then a plus or minus range for the accuracy of the specific event, and/or another range for the entire event and as to when others may believe the larger event fully took place.

In our bank robbery example above, there could a number of specific events with the larger event timeline that a reporter could choose to reference with a specific time, such as when the robbers entered the bank, when the bank teller rang the silent alarm, or when the police arrived on the scene. The specific event chosen within the larger timeline will likely depend on the likelihood of being able to accurately identify that time in the records. The range of time for the entire event would depend on whether the Reporter (63) was reporting on the bank robbery itself, the getaway scene after the robbery, information that was learned regarding the planning of the robbery, or a criminal trial later of one of the robbers.

For example, a Reporter (63) can select 9:10 am, Monday, September 2005 as the Reporter's (63) best belief as to the time the robbery was first reported to the police by a teller pressing the bank's silent alarm. This Reporter (63) can then select a plus or minus window of 10 minutes, where the silent alarm may have been reported to the police as early as 9 am or as late as 9:20 am. This Reporter (63) would then select a time window for the entire event, in this case the bank robbery itself, which the Reporter (63) believes started at 9 am when the robbers entered the bank to 9:15 am when the two robbers were last seen fleeing the bank and another plus or minus window for the start and end times.

If the initial Reporter (63) selects a plus or minus time that is too small for the start of the event, such as one minute and other Reporters (63) believe the robbers entered the bank at 8:57 am, then this initial Reporter (63) is then being challenged by these other Reporters (63). If, however, the initial Reporter (63) put a plus or minus window of ten minutes for when the robbers entered the bank, then 8:57 am would fit within the 9 am+/−10 minutes (or 8:50 am to 9:10 am). Reporters (63) would receive credits based on how accurate their facts later proved to be when compare with other Reporters (63) facts, and by how narrow the Reporter (63) is willing to make the plus or minus time windows.

If the initial Reporter (63) decided to put a very wide range of time, say three hours and not ten minutes, so that the robbers could have entered the bank between 6 am and noon, then the amount of credit the IPACE system would reward the initial Reporter (63) for reporting such a fact would be diminish.

In various non-limiting embodiments, this credit system could be a set system, where the reporting of such an event has a discerned value for how accurately a particular Reporter (63) reports the times within the event. Be the first Reporter (63) to report the start time of a specific event in the IPACE system 100% accurately with a plus and minus value of only one minute and that Reporter (63) could earn 100% of the points available for that statement of fact. If a particular Reporter (63) were the first Reporter (63) to use a plus and minus value of one minute, but not the first to report the specific time, then the IPACE system could split the points credited for reporting such a fact between the first to report the specific fact, and who had a larger plus or minus window of time with the first to report the specific time with only a one minute plus or minus value.

In various non-limiting embodiments, these specific times for specific events within the larger overall timeline of the event could be preset for certain types of events, such as in a robbery with (1) when did the robbers enter the bank, (2) when was it first known or discerned that a robbery was in progress, (3) specific times as to when anyone was threatened, (4) specific times as to when was anyone injured, (5) specific times when money or items were handed over the robbers, (6) when were the police first notified, (7) when did the robbers leave the bank, and (8) when were the robbers last seen. This list continues if police arrive before the robbers leave the scene, so (9) when did the police arrive, so (10) when were the first communications between the robbers and the police, so (11) when were shots fired, so (12) when was someone injured or killed, and so (13) when were the robbers caught.

In addition, different points can be rewarded for the reporting accuracy of different key events. Further, different members/people and/or groups can set points, per level and/or overall.

$1^{st}$2Report

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring on-screen and audio data/content, and/or the like. For example, a frame by frame analysis of what is the actor-stated, ascertained, discerned, relatively perceived, and/or predicted context, objective, goal, message, sponsor, promoter, talent, spokesperson, endorser, and/or the like, for each frame. Further, not just what appears in each frame of video and/or bit of audio, but what was implied if the video continued, was not cropped, spelt-out, and/or the like, say base upon a user-group opinion, system analysis of similar images/video frames/audio clips, and/or the like.

Analyzing Other/Off-Main-Screen/Un-Utilized Data/Content Sources

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods that can track, analyze and score an off-main-screen data/content, off-main-screen audio data/content, and/or the like. For example, an analysis of any over the shoulder graphics, background images employed, b-roll utilized, crawls (e.g. relevant/not-relevant text), titles, and/or the like. Further, an analysis of any associated data/content known to be, discerned to be, and/or relatively perceived to be available that was not utilized (e.g. a particular comment from a speech/debate by a politician ran on-air live, reruns/re-aired, online, streaming, downloadable, and/or the like, by other outlets, competitors, websites, applications, widgets, mobile-apps, and/or the like). In addition, an analysis of other data/content in relationship to the video, such as a text crawl/scroll along the screen (e.g. bottom) about a subject/story, and/or the like, that is relatively positive or negative, while a particular party (e.g. a politician talks), and/or the like.

Analyzing and Scoring Successfulness in Data/Content Segments

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring a number of aired frames with a relatively significant factor/score for such thing as a relative successfulness. For example, the relative successfulness may incorporate and/or be segmented for audience size, ratings (e.g. Nielsen), audience downloads, page views, audience participation (e.g. associate web comments, tweets, user-likes, links to, emails about, and/or the like), revenue generated, profits generated, return on investment, exposure, audience maintained, new audience members attracted, sponsors maintained, new sponsors attracted, sponsorship renewals, subscription maintained, new subscription attracted, sponsorship renewals, and/or the like.

Analyzing and Scoring Distractions in Data/Content Segments

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring a number of aired frames with a relatively significant factor/score for such thing as a relative distraction. For example, the number of aired frames where there was a distraction, such as "hair in face," a "tie pulled in one direction," a "bad or no microphone," a "person/people in background," a "poor camera framing," a "poor lighting," and/or the like; would generate a distraction factor and a distraction score, where the distraction factor could be relative to other similar frames within the same or a similar video clip, the same or a similar TV-show, by the same or a similar TV-host, for the same or a similar event, for the same or a similar audience, for the same or a similar time-slot, for the same or a similar demographics, for the same or a similar website, and/or the like. For instance, there could be a first distraction factor of two (2) out of ten (10) for a particular news talent's tie off center, but a second distraction factor of six (6) out of ten (10) for his hair standing up, generating a segment distraction score that was a collection of relative factors and events, say of five (5), and where relative to the particular news talent's other on-air performances, the segment generated a TV-host distraction score of, say four (4), when relatively compared to his/her other on-air appearances.

Generating A Metric Baseline

In various non-limiting embodiments, the IPACE system would preferably create a baseline for each metric, where a first baseline could be absolute and a second baseline could be relative to his/her collective scoring overall, to-date, relative to a particular performance/appearance, event, audience, audience-segment, show, time-slot, additional data/content, audio, video, b-roll, weather-event/story, local-weather-event/story, emergency-event/story, local-emergency-event/story, crime-event/story, local-crime-event/story, economy-event/story, local-economy-event/story, shopping-event/story, local-shopping-event/story, celebrity-event/story, local-celebrity-event/story, entertainment-event/story, local-entertainment-event/story, sporting-event/story, local-sporting-event/story, medial-event/story, local-medical-event/story, education-event/story, local-education-event/story, charity-event/story, local-charity-event/story, spiritual-event/story, local-spiritual-event/story, success-event/story, local-success-event/story, and/or the like.

Aired Data/content Per Media Outlet

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or tracking a data/content aired per media outlet and when; for example, what data/content and/or data/content portions did or did not air live, later, replayed, and/or per what event, event-participants (e.g. politician speeches, debates, and/or the like). In addition, what data/content portion re-aired and/or aired later, how much later, how often, for how many days, during what time of day, and/or the like. For example, a first media outlet (e.g. a first TV network) airs a particular politician's (e.g. Pres. Obama) speech live and in full, while a second media outlet (a second TV network) comparatively only airs the first 2 minutes of a 16 minute speech, and what the second TV network chooses to air instead of the particular politician's speech, is referred to as an "air-instead-data/content-decision." For example, the "air-instead-data/content-decision" could be to instead air a breaking news event, or instead air re-air data/content already aired earlier such as replaying the news/scripts/packages, and/or the like. In various non-limiting embodiments, the "air-instead-data/content-decision" is persistently monitored, extracted, classified, mapped, electronically stored, tracked for changes, and analyzed.

Aired Data/content Decisions Per Media Outlet

In various non-limiting embodiments, the IPACE system automatically, systematically, continuously, persistently, conditionally, and/or via/per actor/user-prompt tracks and analyzes the data/content aired per media outlet and when, along with data/content decisions such as the "air-instead-data/content/decision" to generate a relative media outlet data/content airing score, a relative media bias score, a political slant score, and/or the like, where the data, statistics, data/content, scores, and/or the like, would be relatively compared to historical data and/or relatively compared to other/competing media outlets, data/content distributions systems/methods (e.g. web view, downloads, DVDs orders, syndication demand, foreign demand, and/or the like.) For web data/content, when was it viewed, by what audience-segment, how many times, where (e.g. IP address/demographics), via what type of device, service provider, and/or the like.

Analyzing and Comparing Unaligned Sides/Bias

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating and/or generating a list of relative overlap among segments. For example, the list of overlap among liberal leaning males and liberal leaning females may be quite similar. However, the list of overlap among segments that traditionally are at opposite ends of divergent continuum, say where a first segment is liberal and a second segment is conservative, could look for areas of most disagree to most agreement.

Generating an Overlap Among Typically Unaligned Sides/Bias

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods, where the first liberal and second conservative segments are actor-stated, ascertained, discerned, relatively perceived, and/or predicted to agree, say based upon verbal comments/data/content, historical data (e.g. voting records/polling), constituents, related-surrogate news media outlet data/content/data/comments, and/or the like. In addition, where an analysis of data to isolate opinions shared by a relatively opposite bias/groups are predefined and/or with the profile segmentation, where the first profile segment is relatively far more liberal where a score surpasses a threshold value/score along a continuum and a second profile segment is relatively far more conservative, where the score surpasses that threshold value/score, yet the two profile segments do agree. For instance, a tax decrease for people earning less than $250k.

Analyzing and Comparing Unaligned Sides/Bias

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring a user/audience reaction. For example, where the user/audience reaction may incorporate and/or be segmented for audience expressions, volume/silence, applause duration, facial gestures, hand gestures, laughter, groans, grunts, sigh, and/or the like. For example, analyze who applauds/claps when, why (e.g. following who, what was said, seen, heard, prompted by a statement, an audience sign "flashing applause" (when data available, known, discernible, and/or perceived) and/or the like, for how long, and/or the like. In various non-limiting embodiments, the IPACE system automatically, systematically, continuously, persistently, conditionally, and/or via/per actor/user-prompt tracks, analyzes and scores a relative applause sincerity, purpose/reason (e.g. why), an applause prompter (e.g. what/who), and/or the like.

In various non-limiting embodiments, the IPACE system automatically, systematically, continuously, persistently, conditionally, and/or via/per actor/user-prompt tracks, analyzes and scores a relative, analyze who laughs when, why (e.g. following who, what was said, seen, heard, prompted by a joke, an audience sign "flashing laugh" (when data available, known, discernible, and/or perceived) and/or the like, for how long, and/or the like. An analysis and scoring of the laughter to discern and/or relatively perceive if the laughter appears/seems genuine, justified, out-of-effort-to-build-rapport, to show respect, bias, political, satire, absurd, (laughing-with-or-at), as insult, as a method to distract, interrupt, and/or the like, where the analysis may include input, data/content, data, images, video, audio, and/or the like, from users, peers, experts, and/or the like, where a correlation as to what profile segments believe the data/content to be, e.g. funny/laughable and to what degree.

In various non-limiting embodiments, the IPACE system automatically, systematically, continuously, persistently, conditionally, and/or via/per actor/user-prompt tracks, analyzes and scores a relative laughter sincerity, purpose/reason (e.g. why), a laughter prompter (e.g. what/who), and/or the like. In various non-limiting embodiments, the IPACE system automatically, systematically, continuously, persistently, conditionally, and/or via/per actor/user-prompt tracks, analyzes and scores a relative score for the each audience reaction per audience member, reaction type, and/or the like.

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring words utilized, vocabulary range, and/or the like, per user/person/on-air-talent, media outlet, event/story, and/or the like. In various non-limiting embodiments, the IPACE system could automatically, systematically, continuously, persistently, conditionally, and/or via/per actor/user-prompt generates a vocabulary range for a particular segment, say a host for a particular TV-show and a prioritized vocabulary list with those keywords, phrases, and/or the like, most utilized overall, per subject, per event, per news segment, per time window, per sponsor, and/or the like. For example, a particular news anchor may utilize the term "cover-up" at a measurable rate more or less than he/she does otherwise overall; other stories about the same person/parties, but the same or similar subjects; other stories about the similar persons/parties (e.g. same political party, sports team, movie, commercial, TV show, college, company, country, and/or the like), but the same or similar subjects; other stories about the similar persons/parties (in the opposite political party, sports team, movie-competition, commercial-competition, TV show-competition, college-competition, company-competition, country, and/or the like), but the same or similar subjects; and/or the like.

IPACE 1$^{st}$2Report

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring the relative accuracy of reading a script. For example, track and analyze the words, gestures, expressions, pauses, interactions, and/or the like, per a provided/target script, per a Teleprompter script, and/or the like. In some instances, the script, transcript, on-air-graphic, crawl, sign, billboard, pamphlet, and/or the like, is viewable and/or displayed on the TV screen, while the person/on-air-talent/reader who is reading/using (e.g. sometimes on purpose, sometime not on purpose), where the accuracy of the person/on-air-talent/reader can be tracked and analyzed against the script, and/or the like.

In various non-limiting embodiments, the IPACE system can automatically, systematically, continuously, persistently, conditionally, and/or via/per actor/user-prompt track and analyze a list of words stated incorrectly, and generate a list of words utilized incorrectly, relatively how often, and/or the likelihood of a Freudian-slip or a Freudian-like-slip, where by distracting thoughts caused the person/on-air-talent/reader to say/speak/read another particular would, say due to a particular subject matter of the story, the preceding story, the following story, the story interrupted, any adjacent materials, distracting materials, distracting people, and/or the like. For example, in November, 2012, Greg Gutfeld (of Red Eye on Fox News) was discussing the "Fiscal Cliff," but while looking at his female co-host instead said the "Fiscal ****." [his off-color comment]

Mixed Metaphors, Insults, Accusations, Etc.

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring the usage of any actor-stated, ascertained, discerned, relatively perceived, and/or predicted usage of a mixed metaphor, insult, accusation, assertion, and/or the like. In various non-limiting embodiments, the IPACE system tracks and analyzes of who the target is known to be, discerned to be, and/or relatively perceived to be for the insult, accusation, assertion, and/or the like.

In various non-limiting embodiments, the IPACE system tracks and analyzes on who's behalf, in-favor-of, as a surrogate-of, and/or the like; the insult, accusation, assertion, and/or the like; as to what is known to be, discerned to be, and/or relatively perceived to be for the parties, events, subject and/or the like at the time, and relatively scored over time.

In various non-limiting embodiments, the IPACE system tracks and analyzes what was likely meant to accomplish by the insult, accusation, assertion, and/or the like, as to what is known to be, discerned to be, and/or relatively perceived to be for the parties, events, subject, and/or the like, at the time, and relatively scored over time.

In various non-limiting embodiments, the relative frequency of the insult, accusation, assertion, and/or the like, towards a particular target, relative to other targets, insults, accusations, assertions, on-air-time-overall, on-air-time-currently, on-air-time-per-a-show/event, and/or the like. In various non-limiting embodiments, the IPACE system continually tracks and analyzes for adjustments in the reader's/speaker's bias, opinion, sentiments, and/or the like, as well as society. In embodiment, a gaging of a relative speaker/reader support, news/media outlet, time-slot, audience, audience-segment, and/or the like, support for or against a particular subject/bias/stance/sentiment, say gay marriage, immigration, gun control, and/or the like.

IPACE 1$^{st}$2Report

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking data/content, comments, sentiments, news stories aired, and/or the like, relative to a Debt Clock, a market indicator, a poll, an economic trend, a major news event, and/or the like, along with relative rates, trends, and/or the like. For example, where a news story or event includes a display of the debt clock, which is meant to display the daunting, enormous, and ever increasing value. However, a relative comparison to another window of time, say three years earlier, would reveal that the debt clock pace of increase has greatly slowed/decreased, where such a graphic and/or comparison could be superimposed over the video later (e.g. online-version, later airing, etc.) to show the relative rate compared to other windows of time, president over president, year over year, month over month, day over day, specific date over specific date, and/or the like.

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring the number of times a data/content portion (e.g. story, article, image, video clip, audio clip, and/or the like) is repeated, modified, to what degree, relative to the competition, storyline change, audience change, audience appeal change, and/or the like, per story, per on-air-talent, per news outlet, per news/media organization, and/or the like. For example, the number of times Fox News airs stories regarding "Benghazi" versus the competition. In various non-limiting embodiments, the IPACE system would automatically, systematically, continuously, persistently, conditionally, and/or via/per actor/user-prompt generates a known to be, discerned to be, and/or relatively perceived to be dollar-amount spent to air data/content, once, repeatedly, and/or relative to the competition, and/or the like, to also generate a dollar invested amount/score.

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for interrogating, extracting, tracking, analyzing and scoring the data/content consumed by a particular user (e.g. viewed, watched, played, heard, downloaded, streamed, purchased, shared, commented, and/or the like), along with, an ability to filter out data/content previously consumed. For example, data/content previously consumed as a news story, news story subject, segment, audience and/or the like. For instance, a particular user who does not want to watch or re-watch a particular type data/content and/or specific story at all unless there is a significant update (e.g. with a pre-assign conditional rules threshold), modification, and/or the like. For example, where the filter is employed to filter out any new stories related to the past pope, religion, the Vatican, except where the user is willing to watch/hear a story about a new-Pope-selection from a particular news outlet during a particular window of time, and/or the like. Another example, where a particular user could filter out any news/stories involving tags for violence and/or related terms from a list (e.g. murder, guns, war, and/or the like), but where the user is willing to make an exception to watch/hear a news/story regarding gun control news involving US congress and/or the like, up until a bill is voted upon by both US congressional houses, but no repeats.

1$^{st}$2report IPACE

In various non-limiting embodiments, the IPACE system automatically, systematically, continuously, persistently, conditionally, and/or via/per actor/user-prompt offers a particular system and associated computer-implemented methods for interrogating, extracting, tracking and analyze war, crime, tragedy, emergency, and/or the like, data, for such data/statistics as a death toll (targeted/non-targeted), cause of death, time of death, injury toll (targeted/non-targeted), time of injury (per each), cause of injury (per each), injury types, medical current status, recovery likelihood, medical/recovery progress/status, weapons present (utilized/not utilized), bullets (dispensed/not dispensed), bullets (hit/missed known to be, discerned to be, and/or perceived to be target), shrapnel, and/or the like, data, statistics, along with a timestamp as of when: "T/D" (time/date) according to "W" (who), and/or the like.

1$^{st}$2report IPACE

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring what comments are utilized to preface a question or follow-up comment. For example, track what 'preface' comments are most often utilized, by who, when, and/or like, such as the preface comments "with all due respect," "my good friend," and/or the like, where the IPACE system would track and analyze the follow on comment, reaction, response, audience-demand, audience reaction, and/or the like; per user, speaker, reader, commentator, commenter, and/or the like. In various non-limiting embodiments, tracking, analyzing and scoring who he/she is speaking to/asking (e.g. before asking the president a question), a particular time-slot, program, news outlet, story/event, and/or the like, relative to himself/herself, fellow reporters, anchors, politicians, audiences, audience-segments, and/or the like.

1$^{st}$2report IPACE

In various non-limiting embodiments, the IPACE system automatically, systematically, continuously, persistently, conditionally, and/or via/per actor/user-prompt offers a particular system and associated computer-implemented methods for interrogating and/or searching numbers in a document where "1-6" or "1 through 6" would be search and treated as "1,2,3,4,5,6."

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring a document for illegible text. For example, an advertisement where the disclaimer is in a relatively small font and/or where black text is set over a relative dark background, in print, in video, on a billboard, projected, website, in a widget, application, on a mobile device, and/or the like. In various non-limiting embodiments, the IPACE system would generate a data/content comprehension score, a text legibility score, a disclaimer legibility score, and/or the like.

In addition, the IPACE system would track and analyze each audio bit, level, and/or like (e.g. via a waveform, audio analyzer, and/or the like), per input, per channel, per talent/speaker, per goal, and/or the like, and generate an audio level score, an audio tolerance score, a background audio appeal, an audio peak level score, an audio minimum level score, an audio mean level score, an audio median level score, and/or the like. In addition, the IPACE system would track and analyze each score relatively compared the audio levels to historical data to generate a data/content audio-level score (e.g. relatively high/low): for example, relatively comparing the audio level scores to historical data to generate a data/content audio-adjustment score (e.g. relatively better/worse) as perceived by a target audience, an audience segment, a focus group, an audience member, and/or the like.

In addition, the IPACE system would track and analyze each video bit, video levels (e.g. via vector-scope, waveform monitor, video analyzer, and/or like), per input, per camera, per camera-person, per goal, and/or the like, and generate a video level score, a video tolerance score, a background video appeal score, a b-roll video appeal score, a most appealing frame(s) for thumbnail score (e.g. ranked best to worst), a most appealing frame(s) preview clip(s) (e.g. ranked best to worst), a most appealing video section(s) (e.g. ranked good to best), a least appealing video section(s) (e.g. ranked bad to worst), and/or the like.

For example, the IPACE system would relatively compare data/content, inputs, data, levels, and/or the like, from, say advertisement or data/content that ran on a particular day to historical data of another version to generate an overall data/content adjustment score (e.g. relatively better/worse), a video adjustment score (e.g. relatively better/worse), an audio-adjustment score (e.g. relatively better/worse), a participant/talent adjustment score, and/or the like, as say, discerned by the IPACE system analysis and/or perceived by a target audience, an audience segment, a focus group, an audience member, and/or the like.

In addition, the IPACE system would track and analyze each score relatively compared each input, data element, participant, audience member, and/or like, to historical data to generate comparative scores, say year over year, month over month, day over day, data/content version over data/content version, participant/talent over participant/talent, audience reaction over audience reaction, and/or the like. In addition, generating an overall data/content score, an overall audio score, an overall video score, an overall participant/talent score, an overall audience score, an overall brand-advertisement score (e.g. for a company), an overall product-advertisement score (e.g. for a product), an overall audience reaction score, and/or the like, for some window of time (e.g. since the ad/data/content was last aired/played/consumed, since the ad/data/content was last updated, since the ad/data/content was last tested, for the last decade, for the last year, for the last month, for the last day, for a specific year, a specific month, a specific day, a specific time window (e.g. start/stop date/time)), tied to an event, tied to an audience, tied to another score or score change, tied to a participant/talent, and/or the like.

For example, relatively comparing a plurality of overall video scores may reveal that a particular participant/talent member appears to increase the audience appeal when relatively compared to overall video scores without the same particular participant/talent member. In addition, the IPACE system would track and analyze each score relatively compared to historical data for the same advertiser, brand, advertising agency, advertisement place (e.g. media outlet/venue/device, and/or the like), temporal data, and/or relative to competitors, audience opinions, audience segments, and/or the like.

In various non-limiting embodiments, the IPACE system would track and analyze what data/content, video, audio, text, graphic, map, participant/talent, product, advertisement, element, item, and/or was discerned and/or relatively perceived by the IPACE system and/or an audience member, audience segment, and/or the like, as being relatively unnecessary, distracting, offensive, grotesque, immoral, frightening, annoyed, sad, happy, positive-feeling, negative-feeling, sincere, phony, and/or the like, where each would generate a relatively unnecessary score, a relatively distracting score, a relatively offensive score, a relatively grotesque score, a relatively immoral score, a relatively positive-feeling score, a relatively negative-feeling score, a relatively frightened score, and/or the like, per audience member, per audience segment, per other segments, and/or the like.

In addition, the IPACE system would track and analyze what data/content, video, audio, text, graphic, map, participant/talent, product, advertisement, element, item, and/or was discerned and/or relatively perceived by the IPACE system and/or an audience member, audience segment, and/or the like, as being relatively trustworthy, where the IPACE system generates a relatively trustworthy score per each element, advertisement/data/content, input, participant/talent, and/or the like, per audience member, per audience segment, per other segments, and/or the like. Here the IPACE system could relatively compare data/content, elements, video, audio, participants/talent, location, extras, cameras, camerapersons, director, producer, advertising budget, ad-agency, media-outlet, air-time-slots, media buy budget, advertisement insertions, and/or the like, to historical data regarding what is known to be, discerned to be, and/or relatively perceived to be as trustworthy versus, say phony, for each, and generate a score for each element, an overall cumulative score, and/or the like. Further, the IPACE system could incorporate an audience opinion(s), an audience segments opinion, and/or like, into the analysis and score generating.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring what was happening in a data/content segment when a person/user/data/content-consumer fast forwarded, rewound, paused, slow-motioned and/or the like, some data/content. In addition, who was speaking in the data/content, what was the known to be, discerned to be, and/or relatively perceived to be the goal of the speaker and/or the data/content/advertisement; what else was happening outside the data/content (e.g. a sporting event, stock market crash, a local emergency, a person/user-data/content-consumer on vacation, and/or the like), and/or the like, by whom, how, when, why, where, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted allegations, challenges, assertions, and/or the like made within a data/content segment, and the number of times repeated, countered, denied, ignored, rebutted, disputed, counter-charged, counter-claimed, and/or the like. In addition, a continual tracking, analyzing, and scoring regarding the eventually actor-stated, ascertained, discerned, relatively perceived, and/or predicted to be accuracy for each allegation, challenge, assertion, counter-assertion, denial, rebuttal, dispute, counter-charge, counter-claim and/or the like, by whom, how, when, why, where, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted characterization, mischaracterizations, and/or the like, made within a data/content segment, and the number of times repeated, countered, denied, ignored, rebutted, disputed, counter-charged, counter-claimed, and/or the like. In addition, a continual tracking, analyzing, and scoring regarding the eventually actor-stated, ascertained, discerned, relatively perceived, and/or predicted to be accuracy for each characterization, or mischaracterization challenged, countered, denied, rebutted, disputed, counter-charged, counter-claimed, and/or the like, by whom, how, when, why, where, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted sincerity, cynicism, and/or the like, made within a data/content segment, and the number of times repeated, countered, denied, ignored, rebutted, disputed, counter-charged, counter-claimed, and/or the like. In addition, a continual tracking, analyzing, and scoring regarding the eventually actor-stated, ascertained, discerned, relatively perceived, and/or predicted to be level of sincerity or cynicism for each incident, incident challenged, countered, denied, rebutted, disputed, counter-charged, counter-claimed and/or the like, by whom, how, when, why, where, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted self-promoting, and/or the like made within a data/content segment, method utilized (e.g. book held up, book reference/mentioned, event reference/mentioned, movie reference/mentioned, past performance reference/mentioned, and/or the like). In addition, the number of times repeated and a tracking, analyzing and scoring of any actor-stated, ascertained, discerned, relatively perceived, and/or predicted audience reaction, appeal, annoyance, disdain, and/or the like. Further, any inaccuracies in the self-promoting regarding dates, performance, costs, venue, location, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted upcoming-teased-data/content, and/or the like, made within a data/content segment, method utilized (e.g. book held up, book reference/mentioned, event reference/mentioned, movie reference/mentioned, past performance reference/mentioned, upcoming show time, upcoming guest, upcoming story, and/or the like). In addition, the number of times repeated and a tracking, analyzing and scoring of any actor-stated, ascertained, discerned, relatively perceived, and/or predicted audience reaction, appeal, annoyance, disdain, and/or the like. Further, any inaccuracies in the upcoming-teased-data/content regarding the upcoming guest(s), subject(s), data/content(s) of the story/segment, medical advice/reliability, legal advice/reliability, accounting advice/reliability, user-benefits, user-savings, user-satisfaction, user-conclusions, and/or the like.

In various non-limiting embodiments, the IPACE system automatically, systematically, continuously, persistently, conditionally, and/or via/per actor/user-prompt offers a particular system and associated computer-implemented methods for interrogating, extracting, tracking, analyzing and scoring any actor-stated, ascertained, discerned, relatively perceived, and/or predicted abnormal behaviors. and/or the like, made within a data/content segment (e.g. audio, video, image, and/or the like). In various non-limiting embodiments, the IPACE system automatically, systematically, continuously, persistently, conditionally, and/or via/per actor/user-prompt tracks, analyzes and scores any actor-stated, ascertained, discerned, relatively perceived, and/or predicted abnormal behaviors relative to past behaviors for that particular person, show/advertisement/event/story/venue/outlet/media-format. and/or the like, and/or relative to similar people in similar situations, and/or the like.

In various non-limiting embodiments, the IPACE system automatically, systematically, continuously, persistently, conditionally, and/or via/per actor/user-prompt track, analyze and score any actor-stated, ascertained, discerned, relatively perceived, and/or predicted likelihood of physical or mental impairments, including the relatively likelihood of alcohol consumption, drug-use, medication use, sporting injury, concussion, lack-of-sleep, stress, and/or the like. For example, the data/content segment could relatively compare the posture of an athlete in a post-game press conferences to discern and/or relatively perceive any abnormal posture relative previous post behaviors relative to a past post-game press conference, to other athletes from the same event, to other similar athletes from other events either known to be, discerned to be, and/or relatively perceived to be relatively injury and/or concussion free; or known to be, discerned to be, and/or relatively perceived to injured and/or concussed to a particular degree, in a particular manner, location, for a particular period of time, and/or the like. For instance, the IPACE system could track, analyze, and score current data against historical data for speech patterns, vocabulary range, reaction time, sense of humor, eye dilation, eye blinks per minute, body posture, body range of motion, facial gestures, hand gestures (or lack of), beverage consumption, food consumption, and/or the like. In addition, the IPACE system could track, analyze, and score current data against historical data for the speaker in the data/content segments tone relative to other historical data/content, perceived mood relative to the subject and/or circumstances, ability to react/counter/adjust to changing circumstances, and/or the like.

In various non-limiting embodiments, the IPACE system automatically, systematically, continuously, persistently, conditionally, and/or via/per actor/user-prompt similarly tracks, analyzes and scores any abnormal behaviors and/or the like made within a data/content segment (e.g. audio, video, image, and/or the like) by others. For example, any abnormal behavior relatively compared historically by a range of data/content participants, such as an on-air talent, host, co-host, anchor, reporter, meteorologist, announcer, actor, extra, director, producer, animal, interviewee, politician, athlete, celebrity, judge, jury, lawyer, doctor, dentist, nurse, patient, therapist, student, professor, voice-over-talent, master of ceremonies, pastor, priest, pope, rabbi, clergy, counselor, company-board-member, company-employee, industry-analyst, infomercial-presenter, audience member, fan, background observer, by-passer, singer, band-member, promoter, and/or the like; where the behaviors can be relatively compared against all segments, behaviors, data/content participants, and/or the like to generate a baseline, a range of behaviors, and/or a list of behaviors and scores that are discerned and/or relatively perceived to be normal, to relatively less normal, normal for given circumstances/events, and/or the like.

In various non-limiting embodiments, the IPACE system automatically, systematically, continuously, persistently, conditionally, and/or via/per actor/user-prompt tracks, analyzes and scores what if any correlations, causations, reasons, and/or the like, are ascertained, discerned, and/or perceived as being correlated, causal, reasons, and/or the like, for each relatively abnormal behavior as currently observed, historically observed, and/or any modifications entered over time to the data; correlation assessment, causation assessment, reasoning, and/or the like, by whom, why, where, when, and/or the like. For example, correlation/causation data may include such other elements as a sporting win or loss, a gain or drop on the stock market, a plane crash, a sweepstakes win, a birth or death, a change in TV-ratings, a change in time-slot, a change in compensation, a change in equity, a change in valuation, audience make-up, weather, location, events-leading-up-to, events-known-to-follow, and/or the like.

Further, an analysis as to whether the data collected is relatively reliable, scoring whether the data was verified, recorded, subjective, first-person, observed/heard, an assumption, a perception, anecdotal, hearsay, double-hearsay, and/or the like; as to what was presented/offered by whom, when, why, where, how, what format, relative to when, and/or the like. In addition, where each contributor/witness/verifier of data/content, evidence, data, and/or the like, is also tracked, analyzed and scored as to his/her relative reliability, accuracy, and/or the like, to contribute reliable and accurate information, timely, make necessary corrections overtime, per subject, per data/content segment being observed, verified, contested, and/or the like, where a particular contributor/witness/verifier may score as relatively reliable for a particular observation for a particular event, but not necessarily relatively reliable for all observations for a particular event, and/or where he/she is scored as relatively more or less reliable over time, say based upon the particular contributor/witness/verifier's willingness to update and/or make modifications to data relative sooner than others, relatively promptly in light of new information, relatively reliable when there is conflicting information, and/or the like.

In various non-limiting embodiments, the IPACE system automatically, systematically, continuously, persistently, conditionally, and/or via/per actor/user-prompt tracks, analyzes and scores graphical messaging in data/content as known to be, discerned to be, and/or perceived as being relatively accurate, reliable, verified, and/or the like. For example, the IPACE system could track, analyze and score each graphical element, message, and/or the like, utilized by a particular TV show, TV segment, advertisement, media outlet/network and/or the like, where, for example, during an election night the IPACE system would track the accuracy and reliability of each graphic shown-on-screen, and relative to competing TV shows, TV segments, media outlets/networks, as to the known, discern, and/or relatively perceived accuracy at the time, at some interval or moment in time subsequently, and/or the like. In addition, who, what, where, and when broke the story/data, and any actor-stated, ascertained, discerned, relatively perceived, and/or predicted data and/or information as to how, and/or why, the particular media outlet/network/show/host/anchor/reporter, and/or the like, broke the story first, and/or subsequently on a competing network.

In various non-limiting embodiments, the IPACE system automatically, systematically, continuously, persistently, conditionally, and/or via/per actor/user-prompt tracks, analyzes and scores each graphical message change in the data/content as known to be, discerned to be, and/or perceived as being relatively better or worse than the competition in accuracy, reliability, verified, improved, superior studio, superior on-air host, superior on-air commentary, superior on-air talent, superior-reporters, superior on-location talent, superior off-site location, superior videographer, superior video quality, superior audio, superior graphics, superior camera/audio equipment, superior/prompter deliver, superior data/sourcing, superior/better verification methods, superior/better calculations/projections, superior/better assumptions, superior/better revealing of the data, superior/better data/information explanations, superior/better channel location on channel line-up, superior/better data/content promotions leading-up to the event, superior/better ratings, superior/better advertising support, superior/better guests, superior/better ability to transition, superior/better ability to correct errors, and/or the like.

In various non-limiting embodiments, the IPACE system automatically, systematically, continuously, persistently, conditionally, and/or via/per actor/user-prompt tracks, analyzes and scores graphical messaging in data/content as known to be, discerned to be, and/or perceived as being relatively effective, persuasive, impressive, annoying, overdone, over-utilized, outdated, and/or the like. In various non-limiting embodiments, the IPACE system would track, analyzed and score the relative amount of data appearing at one time, the relative amount of data that is crawling, flashing, static, animating, and/or the like, at one time. In various non-limiting embodiments, the IPACE system automatically, systematically, continuously, persistently, conditionally, and/or via/per actor/user-prompt tracks, analyzes and scores where the viewer/reader/listener/data/content-consumer is known to, discerned to, and/or relatively perceived to be looking on the screen and at what, at any given moment, relative to what he/she was looking at last, and/or the like. Further, where audience members, audience segments, and/or the like, can be tested as to what each was actually viewing/reading/hearing and/or the like at each give moment, relative to what were the goals, and/or to what was discerned to, and/or relatively perceived to be what was being viewed/consumed/read/heard.

In various non-limiting embodiments, the IPACE system automatically, systematically, continuously, persistently, conditionally, and/or via/per actor/user-prompt tracks, analyzes and scores the viewer's/reader's/listener's/data/content-consumer's willingness to view/read/hear/consume data/content that is being repeated, and the relative degree of consumer-tolerance when the re-aired data/content segment is erroneously teased and aired as "new" or "exciting update" and/or the like, when in fact, it's a repeat and may generate a correlation to a consumer to changing channels, turning off the data/content, commenting, and/or the like. Further, where the repeated data/content is repeatedly ledinto with over-the-top graphics billing it as “breaking news” or “this-just-in” and/or the like.

In various non-limiting embodiments, the IPACE system automatically, systematically, continuously, persistently, conditionally, and/or via/per actor/user-prompt tracks, analyzes and scores graphical messaging in data/content as to how long it takes for error to be corrected, updated, verified, and/or the like. For example, a news animation continually flies on screen that Barack Obama has won the presidency, but the electoral map hasn't been updated accordingly for a relatively long time, especially when relatively compared to the competing news outlets; or voting data hasn't been updated for a relatively long time, and/or the like; where each news outlet is scored on promptness, accuracy, and/or the like.

More 1$^{st}$2Report

In various non-limiting embodiments, the IPACE system would preferably continually track and analyze the data, statistics, data/content, correlations, and user's inputs to monitor for any new data/content, sources, new source references, source direction (to/from), and/or the like. In addition, an analysis of any data/content discovered through a source and/or an analysis of any source discovered through the data/content to build and incorporate into existing correlations, relational maps, patterns, links, credits, updates, challenges, comments, notifications, alerts, and/or the like. In addition, an analysis of any correlation of publications, media, distribution, channels, outlet, and/or the like, to isolate and discern patterns of relative information flow, sequence, and/or the like, per new event, per subject category, per media outlet, per data/content, per audience, and/or the like. Further, a second particular media outlet has a pattern of publishing/airing/posting, and/or the like data/content relatively later than a first particular media outlet. In addition, patterns isolation and/or recognition through a particular media conglomerate or entity, where a third particular media outlet has a pattern of publishing on a particular blog, then running a crawl on TV, then airing the story, then printing the data/content. In addition, each has a relative timestamp, source, audience, shelf-life, modification history, and/or the like, as well as correlated data/content, such as company size, employees, participating employees, adverting, competitors, revenue generated, market share, audience feedback, comments, and/or the like.

In various non-limiting embodiments, the IPACE system would preferably provide a means to continually track and analyze data/content consumption, where a particular data/content contributor, source, witness, publisher, editor, participant, owner, photographer, reporter, and/or the like, may have terms where he/she is relatively compensated per a consumption, which may include an analysis of a pre-stated, discerned, projected, and/or systematically calculated participation relevance, ownership, rights, and/or the like, before, during, and/or subsequent of the consumption. Further, the calculations may incorporate a window of time, a minimum/maximum threshold, a retainer, a rate of consumption, a relative comparison to another particular option (e.g. competitor) and/or the like.

Bias Score

In various non-limiting embodiments, the IPACE system would preferably continually track and analyze data/content to generate a bias score per participant, reporter, TV-talent, publisher, media outlet, editor, source, witness, contributor, photographer, consumer, where the IPACE system analysis would comprise a stated, actor-stated, ascertained, discerned, relatively perceived, and/or predicted database of participant profiles. The participant profile may comprise all previous and current addresses, schools attended, sports participant, a born location, political affiliations, religious affiliation, organization affiliations, web posting analysis, email analysis, Twitter® analysis, employment history, social life history, social media analysis, demographics, psychographics, behavioral patterns, interest, hobbies, family, friends, marriage status, consumption analysis, and/or the like.

For example, the bias score for a particular sports reporter could reveal a relative perceived bias and/or a list of relative perceived biases, say toward a particular list of teams, where correlating data reveals the particular sports reporter used to play for that team, was born in a correlated city, his/her son goes to school in that correlated city, and/or the like.

In various non-limiting embodiments, the IPACE system would preferably provide an ability to search, data/content, where a particular user can include and/or incorporate filtering for a particular preferred bias. In various non-limiting embodiments, the IPACE system would preferably analyzed data/content and data/content correlations, consumption patterns, bias, distribution patterns and/or the like. In various non-limiting embodiments, the IPACE system would preferably analyzed data/content and data/content correlations, comprising a list of reader reviews, concerns, pitfalls, issues, problems, and/or the like, that are stated, actor-stated, ascertained, discerned, relatively perceived, and/or predicted to have come from a particular other than the seller or someone with a perceived agenda and/or a perceived correlated bias.

Filtering Out Bias in a Search

In various non-limiting embodiments, the system's search results would preferably filter out ascertained, discerned, or perceived sellers, resellers, promoters, manufacturers, PR, and/or anyone along the supply chain, where the IPACE system builds a list of urls ascertained, discerned, or perceived to be associated, such as www.nuance.com for Dragon naturally speaking speech to text software and where a particular user may be looking for a relatively non-bias, non-agenda, user opinion.

In various non-limiting embodiments, the IPACE system supports, generates, and/or analyzes an advertising-free portal/website, search engine, and/or web browser where data/content may be filter for such things as un-sponsored data/content. For example, unsponsored data/content may comprise particular articles, white-papers, references, and/or the like. In various non-limiting embodiments, the IPACE system supports, generates, and/or provides search, where the search may be accessible via a web browser. The search may employ a computer-implemented method for a user-defined selection and a prioritization method for ranking search results, where a list of particular urls, companies, types-of-companies, and/or the like, can automatically, systematically, continuously, persistently, conditionally, and/or via/per actor/user-prompt filtered from the search results. For example, a particular search for tech support could filter out/remove any company, and/or a particular company that charges for tech support, such as www.experts-exchange.com where the search results could be listed in separate pages. For example, pages 1-7 search results for filtered results and page 1-14 for the results that were filtered out, another for pages 1-21 where the results are combined, and/or the like. These separate delineations allow the user to view how, say a particular result on page 1 of the filtered results, for instance, would have actually appeared on page 5 of the combined results.

In various non-limiting embodiments, the IPACE system would preferably provide a computer-implemented method where users/consumers (e.g. readers, viewers, listeners, smellers, feelers, etc.) could interact and state how he/she perceives a particular data/content, data/content source, source bias, and/or the like. In addition, the user can challenge a publication's assertions, comment, source, facts, speculations, bias, witness, graphics, and/or the like. For example, a reader/consumer could comment that he/she perceives a particular publication, portion of the publication, and/or the like, published by a particular publisher and/or author, as say, a proven/prove-able fact, absolutely correct, relatively correct, as a mistaken, as a slight error, and/or the like.

In addition, there could be a correlating published comment, where a particular reader/consumer can support a particular challenge; for example, with such comments and/or assertions as "I was there," "I saw a video of it," and/or the like. If they assert that a particular author's assertion should be a provable fact, but hasn't been, then the particular author and/or someone else may participate in proving the fact or mistake/error, where that person is a researcher and can become an author of the update.

In various non-limiting embodiments, the IPACE system and associated computer-implemented method would track and analyze data/content to generate a ascertained, discerned, and/or relative perceived score, ranking, and/or the like, for term usage; where the ascertained, discerned, and/or relative perceived scores, rankings, and/or the like may comprise accuracy, reliability, novelty, freshness, delivery, perspective, and/or the like. For example, the extracting, classifying, mapping, electronically storing, tracking, and analyzing of data/content could include a TV newscast where the speech to text transcript provided relatively time sensitive words/terms/phrases, such as "recently," where the IPACE system would generate a score, say for accuracy. If the data/content was relative fresh, yet the reference to the relatively time-sensitive word "recently" was referencing the event and/or the like, that actually had taken place days, weeks, or months ago, then the IPACE system would analyzed the data, statistics, data/content, event, context, perspective, audience, air-date/time, and/or the like, to determine whether there may be a condition and/or exception for such an event, since, say the event is relatively rare. If however, the analysis perceives the time-sensitive word was relatively inaccurate, the IPACE system would generate a score that is attributable to, say the publisher, reporter, editor, anchor, data/content provider, and/or where the score may be applied relatively differently to each. Further, where others may acknowledge, challenge, suggestion, modify, comment, and/or the like, the score, data, statistics, the assumptions, the logic, conditions, exceptions, and/or the like, to continually improve the IPACE system analysis and scoring.

For example, a CNN® news story mentions that a wife of a husband who tragically died in the World Trade Center disaster "recently" learned that her husband had handwritten a message to her from the $84^{th}$ floor of the World Trade Center, but the message was just "recently" discovered. Whereon, the IPACE system analysis of the data/content, correlated data/content (e.g. relatively similar news stories) regarding the same people reveals that the wife actually learned about the message her husband wrote over a year earlier, and that the message was actually found nine (9) years earlier. In this above example, the IPACE system analysis would score the use of the word "recently" in story and context, as relatively inaccurate.

In various non-limiting embodiments, the IPACE system analysis would preferably determine if the story was a re-airing of an earlier airing, where an exact or relatively transcript is discovered. Here, the relative inaccuracy score for the word "recently" could be relatively diminished based upon circumstances such as the story originally aired a year earlier. Further, the context of the re-airing may be where it is the anniversary of September 11, and/or where a lead-in transcript specifically mentioned that the story was a re-airing from a year earlier; and/or there was a graphic that appeared in the news story that said "originally aired (with the year earlier date);" and/or the like; where each of these circumstances could relatively effect the IPACE system analysis for usage of the word "recently."

In various non-limiting embodiments, the IPACE system and associated methods would preferably analyze all data/content and generate a plurality of scores, rankings, lists, and/or the like, per data/content, data/content rights, airing, original airing, repeat airing, modification, tags, comments, reporter, publisher, anchor, news talent, window of time, time of day, date/time, network, location, country, zip, city, distribution channel, cable provider, TV line channel, interviewer, interviewee, director, producer, technician, advertiser on screen, program relatively leading in, program relatively coming out (e.g. a sequence of programs following the program that aired the data/content), data/content relatively leading in (e.g. a sequence including the previous news story, and current story lead, etc.), data/content relatively coming out, advertiser relatively leading in, advertiser relatively coming out, format, resolution, frame rate, audience, audience rating, audience feedback, organization rating (e.g. Nielsen®), programing guide, method of reception, receiver (e.g. TV, computer, mobile phone, laptop, tablet, and/or the like), and/or the like.

Feedback Score for Perceived Relative Delivery Tone

In various non-limiting embodiments, the IPACE system would preferably provide a consumer feedback score from a particular consumer regarding a perception in a relative delivery tone (e.g. urgency, inflammatory, accusatory, comically, dramatically, angrily, sadly, sarcastically, reflective, subjectively, rhetorically, ridiculous, pathetically and/or the like) in a particular story, program, show, campaign, or portion of each, and/or the like, relatively compared to the particular consumer's perception of the relative delivery.

For example, where an audience's feedback regarding the relative delivery tone for urgency may or may not include the IPACE system analysis presented to the audience (before, during or after the data/content delivery), where the audience elevates the data/content and delivery based upon such factors as a reporter's delivery tone, statements or assertion made, graphics (e.g. "breaking news"), where (e.g. comment, assertion, accusation, question, answer, etc.) and/or incorporating an analysis of statements and assertions made, and/or stated.

In various non-limiting embodiments, the IPACE system analysis for a perceived delivery tone may comprise data/content, correlated data/content, data, statistics, circumstances, context, factors (e.g. graphics, music, text, script, interruptions), and/or like. For example, the IPACE system analysis for a perceived delivery tone for urgency may comprise a discernible and/or perceived interruption, analyzing what, who, where, and how a particular first data/content is being interrupted, was the first data/content live, what time of day, what day/date, what is the data/content, information, music, sound-effects, text on screen, text in crawl, text in the over-shoulder, images, video, text of the script, context of the script, correlated data/content, data, statistics, tags and/or the interrupted other data/content, including how relatively unrelated the data/content is (e.g.

where a hijacking news story interrupts an entertainment TV program/sitcom is scored significantly higher than an interruption of a hijacking detail interrupting the hijacking report), how relatively close in time the interruption is/was to learning of a particular perceived urgent news event, verifying the particular perceived urgent news event as an actual urgent news event (e.g. sources, witnesses, financial market data/trends, Twitter® data and trend analysis, Google® (Yahoo®, Bing® and similar) search, data and trend analysis, competitors analysis (e.g. competitor delivering the particular perceived urgent news as an actual urgent event), and/or the like), of the occurrence of the actual even, and/or the like.

Perceived Spin Factor Score Per Audience Segment

In various non-limiting embodiments, the IPACE system analyzes, generates, and tracks a Perceived Spin Factor Score per Audience Segment "PSpin/AS" (e.g. as scored by segments of consumers); for example, a portion of a particular story, report, comment, assertion, question, answer, and/or the like, scored by an audience segment, where each participating audience member's feedback creates a score per audience participant (e.g. score per unique audience profile), where the collective audience population creates an overall population feedback score or profile that may be segmented into selected audience profile elements/segments, where the selected audience profile elements/segments may be analyzed to create thresholds, such as known, self-described, relatively perceived, unknown, and/or the like. For example, a comparison of audience feedback by selecting an audience segment of only (or including) a known or discernible male audience/segment vs. a known or discernible female audience/segment; a self-described democratic female audience/segment vs. a self-described republican male audience/segment; a perceived republican male audience/segment vs. a self-described-republican male audience/segment, and/or the like; where, for instance, the "PSpin/AS" from the self-described democratic female audience/segment would likely be dramatically different than the self-described republican male audience/segment regarding a comment perceived to be inflammatory by some audience segment that was delivered by/from say either a Bill Maher, Michael Moore, Rachael Maddow, Rush Limbaugh, Laura Ingram, Ann Coulter, and/or the like.

Removing Unwanted Noise, Interruptions, Feedback

In various non-limiting embodiments, the IPACE system analysis of data/content may include and/or incorporate an automatic, conditional, and/or a user-selected option to remove interruptions, microphone hum, feedback, traffic noise, dog barking, baby crying, coughing, phone ringing, others talking, TV/radio/web-data/content on, and/or the like.

Perceived Influence

In various non-limiting embodiments, the IPACE system analyzes, generates, and tracks a discernible and/or a relative perceived unusual behavior, attribute, contributing factor, distraction, influence, and/or the like. For example, the IPACE system would preferably analyze data/content to discernible and/or a relatively perceived as any unusual behavior, attribute, contributing factor, distraction, influence, and/or the like; where the behavior analysis could comprise peer pressure, politics/party pressure, drugs, alcohol, lack of sleep, depression, anxiety, stress, and/or the like, and attributable to, say a celebrity and/or associated party. In addition, the behavior analysis could comprise relatively neutral, and/or positive influences, contributing factors, such as perceived expertise, motivation and/or the like, regarding a particular user, and/or from a co-workers, employer, friend, family member, and/or the like.

Analysis of the Seniority Ranking

In various non-limiting embodiments, the IPACE system analyzes and provides a ranking of each actor/reporter participating in the delivery of the data/content per story and per ascertained, discerned, or perceived reporter ranking element, such as a relative actor/reporter seniority (e.g. per hour, day, year, decade, a particular lifetime, particular window of time, since the particular program launched, since a particular story (or portion of) broke, since the start date of the actor/reporter with the publisher delivering the data/content, since the launch date of the publisher delivering the data/content, and/or the like.

For example, a particular commentary segment may include a plurality of news reporters, where the IPACE system and/or each audience may provide his/her/its analysis of the seniority ranking of each news reporter within the data/content timed segment based upon the start date of each actor/reporter with the publisher delivering the data/content. For instance, the IPACE system seniority rank of a ten minute political news segment on CNN® as the publisher may start with Wolf Blitzer, followed by Anderson Cooper, John King, Gloria Borger, Donna Brazile, Piers Morgan, and Erin Burnett, since Erin Burnett is relatively new to CNN®, but where that seniority ranking order would change based upon TV news reporting seniority overall, since Erin Burnett used to be at CNBC® reporter (e.g. anchor) for many years.

Genuine, Clear, Informative, Concise, Accurate, Reliable, Fair, and Balanced Analysis Further, the ranking of each actor/reporter participating in the delivery of the data/content (e.g. story and/or time window) per ascertained, discerned, or perceived reporter ranking element may also comprise such ranking elements as a relative ability to be genuine, clear, informative, concise, accurate, reliable, fair, balanced, and/or the like. In addition, a delivery score for relative ability to cite supporting data, statistics, facts, sources, witnesses, history, and/or the like, per actor/reporter per selected data/content portion. Further, a delivery score for relative knowledge of the selected data/content subject, interviewer knowledge of interviewee, where each ascertained, discerned, or perceived reporter score and subsequent ranking may be made by the IPACE system (e.g. tracking, collecting, analyzing and/or the like) and/or the audience.

1st2report—Perceived Characteristics

In various non-limiting embodiments, the IPACE system would preferably analyze and segment a population of users and/or participants. In various non-limiting embodiments, the IPACE system analysis would include isolating a discernible and/or a perceived characteristic about each user/participant/consumer, where discernible common characteristics create segments (e.g. a segment of consumers) and/or segments of perceived common-characteristics (e.g. a segment of consumers perceived to have read a particular article). In addition, the IPACE system would preferably provide a variety of methods to track and/or analyze consumption of data/content, where consumption is in real-time, near-real-time, delayed by X time, re-consumed, and/or the like.

In various non-limiting embodiments, each member, user, participant, consumer (e.g. know and/or perceived), and/or the like could provide feedback (e.g. where he/she relatively agrees with a reporter, a data/content statement, a witness comment, a mood felt or generated, an argument made (e.g. reporter, interviewer, interviewee, witness, guest, and/or the like)) from a specific story, report, publication, show, event, webisode, podcast, broadcast or portion of each, version, iteration, state, timestamp, and/or the like.

In various non-limiting embodiments, each participant could preferably generate, provide, review, challenge, acknowledge, score, rank, and/or the like, feedback on such data/content portions and/or correlations could be as a speculation, a prediction, a goal made and/or the like: feedback which collects data to analyze, gauge, and/or track a relatively enjoyment, appreciation, and/or the like, along with how relatively horrified, concerned, (e.g. to story, program, portion or the like per reporter, interviewer, interviewee, witness, guest, talent, actor, and/or the like) and/or the like.

Correlated Data/Content of Every Reporter

In various non-limiting embodiments, the IPACE system would preferably search for correlated data/content and generate a database of every reporter (e.g. and anchor, field reporter, commentator. and/or the like) from historical data, statistics, transcripts, times/dates, reports (e.g. TV reports, blogs, radio, trade show reports, seminars, and/or the like).

Interruption Times Per Interrupter In various non-limiting embodiments, the IPACE system would preferably track and analyze data/content for context and sequence, including segues, ads, transitions, interruptions (e.g. to more/less important info, errors, corrections, witness, etc.), interruption times per interrupter (e.g. during a Sep. 11, 2001 update by Tom Brokaw, Katie Curic interrupts after 17 seconds). In various non-limiting embodiments, the IPACE system could analyze and score an interruption (e.g. by audience, defined-peers, defined-experts, system analysis, and/or the like) to generate a discerned and/or a relatively perceived importance for the interruption, as relatively more/less important information delivered in/post the interruption. For example, is the delivered information by way of interruption later determined relatively accurate or erroneous info, etc., speculations/confirmations, errors/corrections, perceptions/facts, relatively valuable vs. worthless information, hyperbole, relatively popular vs. not, and/or the like, repeats (e.g. number of times per historical time gap, relevance, popularity, etc.), data/contentions/disagreement/agreement (who over what, when).

[The below is an example of a time stamped transcript for data/content analysis (e.g. analyzing for a relative novelty (1$^{st}$2Report), accuracy, confirmations, clarifications, interruptions, urgency, and/or the like, scoring, ranking and/or the like, among all data/content sources/competitors.)]

In various non-limiting embodiments, the IPACE system analyzes for a relative clarity of information, meaning who said what, when; any vague terms, e.g. use of pronouns receives negative points, while delivering clarification receives positive points (e.g. Tom Brokaw an on-air question to Tim Russert, below).

Sep. 11, 2001: Tom Brokaw to Tim Russert—"Did they say anything about moving the President to nuclear bunkers in Virginia?"

Tim Russert—"I asked the (state dept.) that question and they said 'were not going there.'" Consequently, the question becomes who is "they" and "not going where?" Is he saying that "they/the-president and his key staff are not going to the bunkers" or that "they/the-state-dept. are not going to discuss it. In various non-limiting embodiments, the IPACE system would search for such ambiguities and search for supporting and/or contradicting data to ascertain the meaning. In embodiment, the IPACE system analysis would preferably incorporate the speakers tone relative to his/her tone actor-stated, ascertained, discerned, relatively perceived, and/or predicted to be under similar circumstances, questions, and/or the like, as well as his/her tone relative to actor-stated, ascertained, discerned, relatively perceived, and/or predicted to be under unrelated circumstances, to ascertain the relative likelihood of the his/her meaning.

In various non-limiting embodiments, the IPACE system would constantly track and analyze for changes in a distribution channel, signal, quality, and/or the like. For example, any technical difficulties (e.g. video degradation, audio dropout, microphone off, or microphones incorrectly on, satellite delays, and times for air or satellite delay/latency vs. actually live, etc.), placing blame (e.g. correctly plus, incorrectly negative, subjective per consumer of story, report, publication, prediction, and/or the like), Voice of Reason Score (e.g. accuracy, speculations, predictions, vs. false reports, interruptions to errors/less accurate, less important, less popular news, etc.) Feedback score per participant (e.g. consumers, peers, experts, and/or the like), where feedback is relative to a profile for each participant (e.g. demographics, psychographics, behaviors/history, and/or the like) and Intentional lies (e.g. politics, reality TV, sitcoms, ads, news, etc.).

In various non-limiting embodiments, the IPACE system analysis and generates a timeline with actor-stated, ascertained, discerned, relatively perceived, and/or predicted accuracy for data/content, authors, timestamps, and/or the like. In various non-limiting embodiments, the IPACE system analysis and generates, a relationship mapping, triples, triple statements, and/or the like relative to an event, time, audience, speaker/reporter, witness, source, location, and/or the like, say for each time stamp and interval from below: For example; during Sep. 11, 2001 (EST times):

[timestamps, data and data/content/transcript analysis, e.g. for relative novelty]

- 8 am a 767 flight 11 leaves Boston Logan to LAX with 69 on board 8:42-First plane crashes/hits north WTC (Destination America channel on TWC channel 218 program title: "9/11 Surviving the impact" said incorrectly 8:46 am)
- 8:59 am—DA: An official came on intercom that building 2 is secure, repeat. (Security guard at ground level telling him to go back to his office—where are you going, so he went back.)
- 9:04-Second plane crashes/hits south WTC. Bush takes podium and speaks at Booker school in FL 9:?-Third plane crashes/hits Pentagon.
- 10:11-South WTC building collapses (Another account says 9:59 am per a stopped watch when south WTC 2 collapsed per Exec VP Brian Clark, the longest employee at Euro Brokers from the 84th floor)
- 10:28-North WTC building collapses Fourth plane crashes in field in Summerset, PA (80 SE of Pittsburgh) Tracking and Scoring Events in real-time, then a historical analysis for relative comparison, and/or scoring of each performer, participant, judge, audience reaction, and/or the like.

EST

- 8:42-First plane crashes/hits north WTC
- 9:04-Second plane crashes/hits south WTC Bush takes podium and speaks at Booker school in FL.
- 9:?-Third plane crashes/hits Pentagon.
- 10:11 —South WTC building collapses. False reports from NBC's Today Show®, Anchor, Katie Curic (e.g. 10;24 am, a report of another explosion via a car bomb outside the state dept.)
- 10:28—North WTC building collapses. Fourth plane crashes in field in Summerset, PA (80 miles SE of Pittsburgh)

10:40 am—Tom Brokaw (per producer or news director), "Betsy Stewart is denying a report of any car bomb outside State Dept."

10:45 am—Katie Curic reads report

10:46 am—Tom Brokaw, a failure of intelligence

10:47 am—Matt Lawry, reports people jumping from buildings

10:48 am—Jamie, CIA building shutdown, so we have no access to information Correction 10:54 am—Mr. Livingston, Intelligence Expert—(first on NBC® to mention Osama Bin Laden)

10:55—Benjamin Leevy—(eye witness who saw people jumping was 6 blocks away)

11:05 am—(error) Bob, FAA confirming there are still hijacked planes in the air

11:06 am—Tom—A report from Bin Laden out 3 weeks warning of a great attack in the US. NBC® anchors, Katie Curic, Matt Laury, Tom Brokaw and Field reporter, Jim Miklaszewski. Katie interrupts (guy is not microphoned yet) to Pat Dawson (then angry police chief with "we see what you see")

11:17 am—Robert Hager—correcting what he was saying earlier (that more planes are on the ground) Tom Brokaw corrects: at 8 am a 767 flight 11 leaves Boston Logan to LAX with 69 on board 11:21 am—Brokaw to Pat Dawson 11:22 am—Pat Dawson—just told there is a bomb in NY Stuyvesant High School –10 blocks north of WTC (per Officer Mcquade report of a secondary device)

11:24— to Tim Russert

11:24 am—Tim Russert—I was just speaking Porter Goss (But moved to a safe location)

11:30—Tom Brokaw—four flights—failure of airport security 11-30 am—(again Katie interrupts) actually very difficult to detect such things as plastic explosives 11:33—Ashley Banfield (being told to leave area, but kept asking)

11:40 am—Ron Insana—on set with soot on clothes (explaining how he was within a ½ block of the WTC when it began to come down and had get into a car that was open to let the cloud pass and then went into a bldg. 2-3 blocks away, where it was pitch black like a nuclear-winter, where a fireman was bleeding and a woman had shrapnel in her arm and many having difficulty breathing) Matt and Katie—happy you're okay (to Ron).

11:43 am—Tom—Ron were happy to see you Ron—You don't know how happy I'm to be here.

11;43—Tom—(and you think of all those people still down there)

Tom—predicting that this will greatly affect our freedoms, and what type of retaliation well take.

11:44—Katie—(here's an upsetting wire that just came from the West Bank reports that there are people in the West Bank (Palestine) cheering in the streets and handing out candy.)

11:49—Kathleen from NYU-medical—we seen hundreds (only Manhattan Hospital south of 13th) and a report of 3 deaths so far.

11:50 am—Bob, we have reports now AA flight 10—with 92 a board. Matt, let me interrupt you, we have flight, 11 I'm sorry, you right flight 11, thank you. UA flight 175 that left from Boston (I don't have how many on board), AA—UA flight 93 that crashed south of Pittsburgh.

11:56—were being told by chief of (fire dept.?) that there were secondary explosions from (error as of—planted incendiary devices that were in the WTC buildings).

11:59-Video of West Bank celebrations (Destination America channel on TWC channel 218 program title: "9/11 Surviving the impact" said incorrectly 8:46 am)

In various non-limiting embodiments, the IPACE system and associated computer-implemented method tracks and analyzes each iteration of data/content, for each modification, and generates a relative change score, where a change may be relatively minor/small to significantly different/large. In various non-limiting embodiments, the IPACE system analysis and generates, a relationship mapping, triples, triple statements, and/or the like relative to an event, time, audience, speaker/reporter, witness, source, location, and/or the like, say for each interval listed in FIGS. 70a-71b.

1st2Report

In various non-limiting embodiments, the IPACE system comprises a computer-implemented method for analyzing data/content for sources that were relatively perceived, discerned, and/or known to have given/gave false info. For example, during September 11, a source from the pentagon said there were no known terrorist plans to attack buildings by planes in NY). Here, the IPACE system analysis would preferably score each word attributed to the source, with a continuum of a relative assertion or a relative speculation, a relative accuracy, and/or the like. Further, where subsequent data, statistics, data/content, correlated data/content, challenges, system analysis, and/or the like may modify the scores as data become available. For example, during September 11 it was first reported that a small plane hit the world trade center, then it was speculated to be a 727 or 737, then data/information came that it was a hijacking, the actual jet, and/or the like.

In various non-limiting embodiments, the IPACE system comprises a computer-implemented method for analyzing data/content for a plurality of scores, (e.g. reliability, accuracy, novelty, popularity, and/or the like). For example, a first publication of a story (e.g. data/content on a blog) receives the plurality of scores. Subsequently, system tracking and analysis would preferably determine that the same or relatively the same blog story/article as the first publication the story partially and/or fully appears in another publication, and/or a sequence of applications, where the IPACE system would preferable be able to discern when each portion of data/content was subsequently published. For example, a second publication of the full story, say on the LA Times® online, a third publication of a portion of the story on the MSNBC®, a forth publication of a portion the story on ABC News®, a fifth publication of a portion of the story on CBS®, a sixth publication of a portion of the story on FOX®, a seventh publication of a portion of the story on CNN®, and so on. In addition, an embodiment tracks data, statistics, scores, and analysis for re-airs, repeats/rerun, counts, ratings, audience feedback, challenges, and/or the like.

In various non-limiting embodiments, the IPACE system would preferably track and analyze the data/content utilized in each publication, story, airs, repeats/rerun, counts, ratings, audience feedback, challenges, and/or the like, to determine a perceived originating source based up on such elements as a credit provided per publication, through a system generated request for credit acknowledgement per publication, writer, reporter, editor, witness, and/or the like.

In addition, the determining of the perceived originating source per data/content element may incorporate where an item, data/content element, and/or the like, first appeared and the later appeared in subsequent publications with same and/or relatively similar data/content. For example, the same typo appears in two publications/locations, where there is a perceived first published location, followed by a second published location, and/or so on per item, data/content element, and/or the like, Color-Assigned-Mood In A Teleprompter In various non-limiting embodiments, the IPACE system analyzes and tracks ongoing data/content and document usage, wherein the analysis and tracking may include a format. Further, the format may include such things as color (e.g. hue, saturation, and intensity), typeface style, boldness, italic, underlining, and the like. In various non-limiting embodiments, the IPACE system and the associated computer-implemented method format a text, a color, a size, and/or a text background color to prompt and/or convey a mood to a reader via a particular color-assigned-mood. In various non-limiting embodiments, the formatted text is displayed in a teleprompter.

For example, the teleprompter text could be formatted where a font point size is relatively large when compared to other text when the reader should come across in a mood as, say relatively concerned. In various non-limiting embodiments, the text color could be a first text color (e.g. white) over a first background color (red) to prompt when the reader should come across in a relatively angry mood.

In various non-limiting embodiments, a first text size becomes relatively large and/or relative more saturated with a second color (e.g. red) the more angry the reader should express his/her mood. In various non-limiting embodiments, a first text format becomes relatively italic and/or relative more saturated with a third color (e.g. green) the happier the reader is being prompted to express his/her mood.

Audio Mood Signaling Methodology

In various non-limiting embodiments, a similar mood signaling methodology could be implemented with audio, such as background music, where a signal could prompt and/or convey a mood to/for the reader. In various non-limiting embodiments, the music could be relatively soft and perceived as pleasant for signaling a happy mood for the reader, while another audio background could convey a sad or worried mood. In various non-limiting embodiments, the IPACE system could play the audio for the audience to hear or only for limited people, say only the reader. In various non-limiting embodiments, a somewhat inverse effect could also be created where the background audio could be generated based upon the relative tone conveyed by the reader.

In various non-limiting embodiments, the IPACE system and associated computer-implemented method analyzes, generates, and displays a known and/or relatively perceived list of competing parties relative to a designation, say a particular patent claim (e.g. in development, considered, original pending, amended/pending, granted, litigated).

$1^{st}$2Publish

In various non-limiting embodiments, the IPACE system and associated computer-implemented method tracks and analyzes data/content relative to the modifications that took place relatively close to an event. For example, a first version, say a window of time just before publishing (e.g. two hours) versus a second version (e.g. a published version). Another example could be the first version, say a day before filing versus the second version (the submitted patent application to PTO). In various non-limiting embodiments, the IPACE system and associated computer-implemented method would provide a means for the user to submit data/content to a publishing module that preferably analyzes the data/content and correlated data/content (e.g. forms, fees, names, terms, and/or the like) to conditionally discern and/or verify elements, formatting, and/or the like, before pushing the data/content to a publishing exchange platform and/or a publishing engine, and/or the like.

In various non-limiting embodiments, the Publishing engine could schedule when, where, and what to publish and to whom. The user who becomes the publisher can categorize the application/publication, along with the conditional rules for when, where, what and to whom, plus keywords for search term with a publisher relevance and emphasis score per each keyword. The publisher relevance and emphasis score helps subsequent users who perform searches and/or get pushed data/content based of pre-select keywords, e.g. mobile, search, and the like. This helps improve the search relevance where unique keyword may actually be author and/or inventor created acronyms. For Instance, COPP may stand for Central Office Processing and Publishing, whereas it would be unlikely that COPP would mean much to those unfamiliar with the application.

In various non-limiting embodiments, the ability to track the keywords helps the IPACE system to generate data correlations regarding trends in patent application being submitted per each segmentation, e.g. inventor, category.

In various non-limiting embodiments, the IPACE system could publish data/content prior to the Press Gazette and allow for modifications to any portion, e.g. amendments to the specification, claims, inventors, assignors, and the like, by a particular member, user, participant; group of participants, segment of participants, and/or the like. In various non-limiting embodiments, the IPACE system can track published PTO information, such as the assigned examiner, law firm, patent attorneys/agents, and the link, and create a link.

Cross Checking A Plurality Of Databases

In various non-limiting embodiments, the IPACE system preferably cross checks (e.g. browsing, pulling, downloading, bot/crawling, searching, indexing, synchronizing, analyzing, ranking, and/or the like) a plurality of databases actor-stated, ascertained, discerned, relatively perceived, and/or predicted to contain data/content, specifically IP related data/content, from such databases as Press Gazette, USPTO, PTAB/BPAI, Federal Circuit, PACER.org, Lexis Nexus®, West Law®, Google/Patents®, WIPO, JPO, EPO, Ocean Tomo®, and the like. In various non-limiting embodiments, the IPACE system preferably tracks, searches, and analyzes data/content to compare patents and anomalies among databases ("Storage"); for example, among the perceived same patent family.

Attraction and Consumption (with IPACE)

In various non-limiting embodiments, the IPACE system comprises a computer-implemented method for consumers to collaborate on offers, opportunities, terms, and/or the like. In various non-limiting embodiments, the IPACE system provides the user and/or a pool of customers a collective voice, where the pool of customers may vote on a particular product and/or service or package price. For example, where the pool of customer may vote, say on a list of discount price options and may also incorporate other discount elements or combination of discount elements, which may comprise such discount elements as a longer term commitment, limited or no advertising, limited or no customer service, limited or no installation/setup, additional fees for early termination, warranty terms, insurance terms, billing terms (e.g. auto-pay, pay-in-advance, paperless billing, and/or the like) and/or the like.

Further, the opposite would also allow the customer or a particular pool of customers to vote on a particular discount element options or from a list of discount element options, which generate a price, and/or a list of prices and/or package prices per range of discount elements. The pricing may also incorporate the number of participants in a customer pool, each customer's credit history, history within that particular industry, history within that particular company, and/or the like.

In addition, the IPACE system and method could modify (e.g. sweeten) the offer/pricing for particular customers within a pool, say considered more desirable based upon a system generated customer desirability score. In various non-limiting embodiments, the IPACE system generated customer desirability score may comprise a behavior history (e.g. credit score, past consumption, historical usage/payments, lack of particular type of usage, and/or the like), demographics (e.g. age, gender, occupation, location, marriage status, education and/or the like), psychographics (e.g. beliefs, interests, and/or the like), status (e.g. social network connections/friends, Twitter® followers, influence with others and/or the like) and/or the like.

In various non-limiting embodiments, offers could also be presented to groups that incorporate discounts to extend terms, modify terms, upgrade components, equipment, products, services, elements and/or combination of discount elements. In addition, the IPACE system and computer implemented method may generate and display a list of pools a particular customer or potential customer may participate in based upon a set of data that is known or perceived about the particular customer or potential customer may join, where he/she may also decrease/increase the customer desirability score by his/her actions/reactions/answers say to a series of questions, along with his/her ability to forward questions to others for validation (e.g. employment, income, mortgage, and/or the like) and/or his/her ability to relatively accomplishment such validation and/or the like. In various non-limiting embodiments, the IPACE system would preferably continually track and analyze the data, statistics, data/content, correlations, and user's inputs to generate a relative word count or word cloud per offer, per customer, per potential customer and/or the like.

An Analyzing Submitted Data/Content/Videos

In various non-limiting embodiments, the IPACE system can analyze data/content, such as submitted video, animations, 3D-objects, color images, audio, and the like. For example, a video that was submitted to both the data/content repository and IPACE court for reviewing, proof, testimony, challenges, modifying, judging, critiquing and/or the like. For example, a particular assertion and/or challenge being heard by the IPACE court may include submitted video clips of prior art, testimony from other cases, depositions, and/or the like.

In various non-limiting embodiments, the IPACE video analysis can search the submitted video to generate a list of scenes and/or scene sections, where each includes a perceived relevance score and where the IPACE video clip analysis then displays a prioritized list of scenes and scene sections. The perceived relevance score may comprise such factors as who, what, where, and/or the like, is in the scene relative to the case, what is being said from, say a speech to text transcript and/a list of perceived, discerned, and/or known keywords, party names, prior art names, numbers, terms, industries, methods, parts, elements, and/or the like.

In various non-limiting embodiments, the generation of scenes and/or scene sections could include an analysis of any relative changes perceived and/or discovered from one frame in a sequence to the next (or one section to the next) to create scene delineations. For example, where a particular frame is a frame of a full black followed by a frame with an image of a face, where the IPACE system would create a marker for an in point and an end point at the end of that particular scene. If the scene has camera movement, the IPACE system could analyze the relative rate of change from frame to frame to determine, say a likely camera zoom, pan, tilt, rotation, and/or the like, and where the transcript and audio can help determine the relatively likelihood of a scene change.

For example, if a particular sequence of frames is perceived to a pan across a landscape and where there then appears to be an edit where the scene cuts to another frame sequence perceived to be, say a person's face, the IPACE system can then generate the in and out points based upon those frames, edits, and/or the like, for that particular scene. The frame, scene, and relevance analysis can sequences that incorporate wipes, dissolves, and digital effects where one scene is perceived to, say dissolve into another over X number of frames and to create a separate scene.

In various non-limiting embodiments, the IPACE system can analyze the video data/content for perception of relevance to the case, where the IPACE system can draw upon historical comparisons for similar scenes, transitions, transcripts, interviews, parties, products, cases, art units, patents, and/or the like, to generate the relevance scores. For example, a scene with a perceived deposition testimony from a particular inventor regarding a particular component for a particular claim limitation being challenged would likely, in most cases, be scored higher than a scene perceived to be a car driving down the road. However, if the case is about, say a particular utility and/or design for a car part or decorative form, and the transcript from that scene has been electronically transcribe to read, say "here is an example of prior art that predates the claim limitation that is being challenged." Then this video clip may produce a relatively higher relevance score depending on the criteria in the IPACE system analysis, and/or input or modified by a particular user, say a plaintiff vs. a defendant.

Vocabulary Usage Per Audio/Video

In various non-limiting embodiments, the IPACE system can analyze data/content for relative vocabulary usage. In various non-limiting embodiments, the IPACE system analyzes for relative vocabulary usage could be from audio, video, and/or correlated text, where the analysis would include traditional audio analysis, but incorporate analysis and capabilities that analyze and relatively compare for novelty, Inventorship, time-stamps, conception date, reduction to practice, diligence, and/or the like. In addition, per discernible and/or relatively perceived speaker, phonemes, lexicon, dictionaries (e.g. text and audio), history of audio clips, history of usage, voice patterns/tendencies, user patterns/tendencies, speech patterns/tendencies, vocabulary patterns/tendencies, concept sequences/patterns, history of audio context, and/or like.

For example, a particular inventor may record some of his/her concepts to audio, where he/she has a tendency to use a certain word when describing a particular inventive step. If a subsequent audio clip is relatively confusing because there is relatively little context, but where the word has significant context from an earlier recording employing the same word, then the IPACE system can discern and/or relatively perceive relationship to improve at speech to text translation, conception analysis, a record for proving conception a particular moment in time, and/or the like.

1st2Report and 1 st2Predict

Analyze Data/content For Relative Vocabulary Usage

In various non-limiting embodiments, the system's analysis of data/content with audio and/or video would include a correlation with facial recognition. For example, audio analysis of a voice could include analysis of a correlated identity that is known, stated, discerned, and/or relatively perceived per system analysis and correlations. In various non-limiting embodiments, the IPACE system analyzes for identifying a particular person via the facial recognition from the video correlated with the audio and may extend beyond matching that particular identified person to a particular speaker on audio.

For example, the mapping of relationships of the person identified in the video via the facial recognition may reveal a relationship with a particular company, event, location, project, and/or the like, where the perceived speaker on the audio has an overlapping relationship. In addition, the IPACE system analysis of data/content with audio and/or video would preferably extend beyond facial recognition to include items in scene, such as words, locations, audiences, and/or the like (some describe in the specification). In various non-limiting embodiments, the IPACE system analysis of data/content with audio and/or video would preferably extend to analysis of data/content in traditional media for building and analyzing correlations and relational maps, for say, TV data/content, websites (e.g. YouTube® videos, Netflix®, Amazon®, Pandora®, and/or the like), commercial, and/or the like, including items in scene, such as words, locations, audiences, and/or the like, where correlation maps may comprise other related text, as well as known, stated, discerned, and/or relatively perceived people, locations, brands, products, service, and/or the like.

1st2Predict—Search/Crawl/Scrape Websites for Predictions

In various non-limiting embodiments, the IPACE system can pull data, browse, search, and/or crawl websites for data/content with predictions, and/or data/content that correlates to predictions. In various non-limiting embodiments, the IPACE system tracks and analyzes data/content/predictions for specifically stated, discerned, and/or perceived timestamps, prediction sources, relative modifications, relative accuracy, and/or the like. In various non-limiting embodiments, the IPACE system tracking and analysis would include discerning and/or relatively perceiving a set of odds per line, average wager, wager pool size per odds, overall, daily, yearly, and/or the like.

In various non-limiting embodiments, the IPACE system tracking and analysis would include discerning and/or relatively perceiving a relative house risk, revenues, profits, seasonality, risk appetite, risk capacity, debt, debt capacity, casino traffic/capacity/patterns, Sportsbook traffic/capacity/patterns, historical patterns, and/or the like. In various non-limiting embodiments, the IPACE system tracking and analysis would include discerning and/or relatively perceiving a house ownership, employees, management, culture, along with demographics, psychographics, behaviors, patterns, and/or the like, for each. In various non-limiting embodiments, the IPACE system tracking and analysis would include discerning and/or relatively perceiving a demand per offer/line, relative audience participation, audience make up including demographics, behaviors, patterns, and/or the like.

Consumer Buying Decision Analysis

In various non-limiting embodiments, the IPACE system comprises a computer-implemented method for analyzing components of a consumer buying decision. For example, the IPACE system analysis of making the consumer buying decision may comprising a time consumed per feature, per vendor, per outline (e.g. retailer online/offline), and/or the like, where others can benefit from similar research, and/or similar shopping styles can be overlapped to compare and contrast buying decisions.

In addition, the IPACE system analysis may include a ranking of shipping and handling costs, options, and/or the like, of, say similar products, similar distances, with similar terms, similar times, similar methods, similar weights, and/or the like, to compare company shipping and handling charges, times, terms, methods, and/or the like.

In various non-limiting embodiments, the IPACE system analysis of the consumer data may incorporate a search for relatively specific top category topics with a relatively large number of sub-categories to create visual histograms of pricing per feature, say a bell curve where the mean price is, say, $200 with a particular feature under a specific top-category topic and then compare where a competitive feature creates a bell curve where the mean price is, say $350.

In various non-limiting embodiments, the IPACE system may automatically, systematically, continuously, persistently, conditionally, and/or via/per actor/user-prompt categorize items, with a categorization builder by analyzing data/content, say item features, functions, by what are perceived to be the most common delineations (e.g. Small, Medium, Large), the most popular (e.g. price, size, color, function, feature, etc.), Frequently Asked Questions (e.g. most asked, most selected), and/or the like.

For example, the IPACE system would take an entire database of products and look for keywords in the specifications, features, functions, and/or the like to build meta-tags for delineations, as well as similar price range clustering. Then a consumer could search for similar prices and/or features versus only by product categories, as well as see similar products with similar features as he/she navigated, filtered, selected, viewed, sorted, ranked, and/or the like.

Ad Targeted Towards Tags/Newscasts

In various non-limiting embodiments, the IPACE system would preferably isolate, suggest, and/or systematically target advertisements to a particular media outlet newscast, TV stories, or program themes. In various non-limiting embodiments, the IPACE system and associate computer-implemented method, where an advertising selection engine looks at meta-tags associated with, say a news segment, story, blog post and/or the like. For example, a news segment on gastric by-pass surgery, where the IPACE system generates a priority list of keywords, meta-tags, and bids for each and/or permutations, causes a selection engine to select an advertisement bases upon selected keywords, meta-tags, and/or bids permutations for advertising against such keywords, meta-tags, and/or bids.

In addition, where the advertising data/content, voice-over talent, images, scenes, talent, effects, length, volume, background music, and/or the like, are selected by a data/content compilation engine and where the ad is compiled when and as needed, say in advance, and/or on the fly (e.g. Real-time, near real-time, and/or the like).

In various non-limiting embodiments, the IPACE system would preferably download, browse, search, crawl (e.g. internet) and/or the like, for data/content to evaluate and generate an analysis of how relatively up-to-date or relatively out-of-date the data/content is stated to be/is, known to be/is, discerned to be/is and/or relatively perceived to be/is, per text, word, acronym, date, number, assertion, source, image, video, audio, and/or the like. In various non-limiting embodiments, the IPACE system would preferably analyze and generate a list as to where to view relatively more current, accurate, detailed, visual, supported, data/content per each. In various non-limiting embodiments, the IPACE system would preferably analyze and generate a list, where each component and whether each correlation, source, link, and/or the like, is stated, actor-stated, ascertained, discerned, relatively perceived, and/or predicted as reliable.

In various non-limiting embodiments, the IPACE system would preferably analysis and generated a list of how relatively out of date each annotation, commented, modification, replaced, and/or the like. In various non-limiting embodiments, the IPACE system would preferably analyze and generate a list of where each component is relatively credited to a source or group of sources.

1 st2Predict—With Nothing At Risk

In various non-limiting embodiments, the IPACE system would preferably allow a particular participant to bet/risk nothing, where when the particular participant is correct/would-have-won, the particular participant is provide a list of options, where options provide a method to pay back wagers (won and/or lost) to win bet and a particular list of winnings/credit per option.

Figure 55:
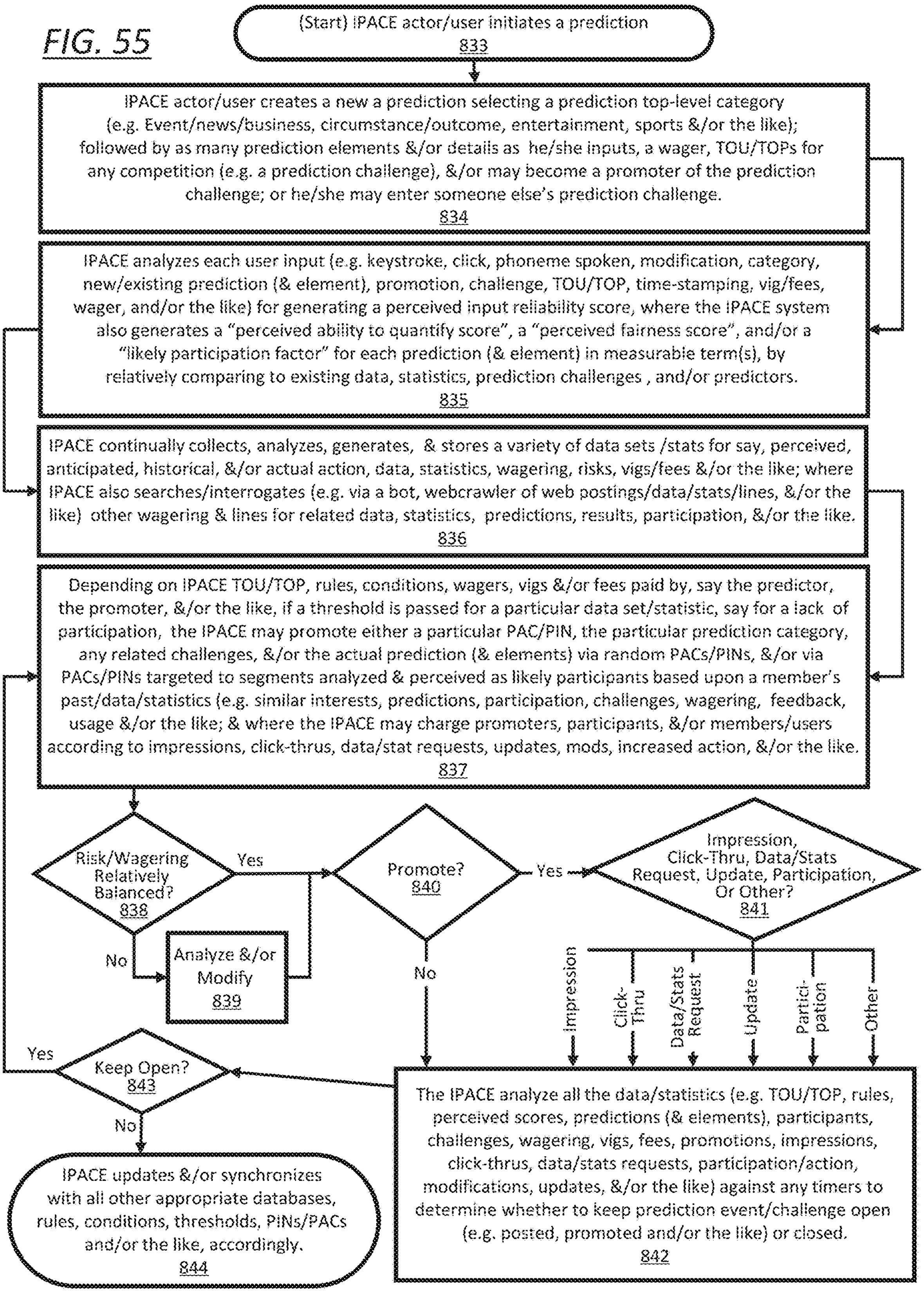
FIG. 55 is a flowchart that depicts a non-limiting embodiment and example of the IPACE system, and associated computer-implemented method extracting, classifying, mapping, electronically storing, tracking, and analyzing a prediction.

FIG. 55 is a flowchart that depicts an embodiment and example of the IPACE system, and associated computer-implemented method extracting, classifying, mapping, electronically storing, tracking, and analyzing a prediction. Starting with a terminator 833 where an "IPACE member/user initiates a prediction" is performed. Next, the process proceeds to a step 834 where an "IPACE member/user creates a new a prediction selecting a prediction top-level category" (e.g. Event/news/business, circumstance/outcome, entertainment, sports &/or the like); followed by as many prediction elements &/or details as he/she inputs, a wager, TOU/TOPs for any competition (e.g. a prediction challenge), &/or may become a promoter of the prediction challenge; or he/she may enter someone else's prediction challenge" is performed.

Next, the process proceeds to a step 835 where "IPACE analyzes each user input (e.g. keystroke, click, phoneme spoken, modification, category, new/existing prediction (& element), promotion, challenge, TOU/TOP, time-stamping, vig/fees, wager, and/or the like) for generating a perceived input reliability score, where the IPACE system also generates a "perceived ability to quantify score", a "perceived fairness score", and/or a "likely participation factor" for each prediction (& element) in measurable term(s), by relatively comparing to existing data, statistics, prediction challenges, and/or predictors" is performed.

Next, the process proceeds to a step 836 where "IPACE continually collects, analyzes, generates, & stores a variety of data sets/stats for say, perceived, anticipated, historical, &/or actual action, data, statistics, wagering, risks, vigs/fees &/or the like; where IPACE also searches/interrogates (e.g. via a bot, webcrawler of web postings/data/stats/lines, &/or the like) other wagering & lines for related data, statistics, predictions, results, participation, &/or the like" is performed.

Next, the process proceeds to a step 837 where "Depending on IPACE TOU/TOP, rules, conditions, wagers, vigs &/or fees paid by, say the predictor, the promoter, &/or the like, if a threshold is passed for a particular data set/statistic, say for a lack of participation, the IPACE may promote either a particular PAC/PIN, the particular prediction category, any related challenges, &/or the actual prediction (& elements) via random PACs/PINs, &/or via PACs/PINs targeted to segments analyzed & perceived as likely participants based upon a member's past/data/statistics (e.g. similar interests, predictions, participation, challenges, wagering, feedback, usage &/or the like; & where the IPACE may charge promoters, participants, &/or members/users according to impressions, click-thrus, data/stat requests, updates, mods, increased action, &/or the like" is performed.

From Step 837, a query 838 asks whether or not the "Risk/Wagering Relatively Balanced?" If the answer to the query 838 is "Yes," then the process proceeds to a query 840 "Promote?" If the answer to the query 838 is instead "No," then the process proceeds to a step 839 "Analyze &/or Modify" is performed. Next, the process proceeds to the query 840.

If the answer to the query 840 is "No," then the process proceeds to a step 842 where "The IPACE analyze all the data/statistics (e.g. TOU/TOP, rules, perceived scores, predictions (& elements), participants, challenges, wagering, vigs, fees, promotions, impressions, click-thrus, data/stats requests, participation/action, modifications, updates, &/or the like) against any timers to determine whether to keep prediction event/challenge open (e.g. posted, promoted and/or the like) or closed" is performed.

If the answer to the query 840 "Promote?" is instead "Yes," then the process proceeds to a query 841 where it asks "Impression, Click-Thru, Data/Stats Request, Update, Participation, Or Other?" From the query 841, a result(s), data, analysis, and/or the like, pertaining to such elements as "Impression," "Click-Thru," "Data/Stats Request," "Update," "Participation," and "Other" are passed along to the step 842. From the step 842, a query 843 asks whether or not to "Keep Open?" the prediction. If the answer to the query 843 is "Yes," then the process returns to the step 837. If the answer to the query 843 is instead "No," then the process proceeds to a terminator 844 where "IPACE updates &/or synchronizes with all other appropriate databases, rules, conditions, thresholds, PINS/PACs and/or the like, accordingly" is performed.

FIG. 56 is a flowchart that depicts an embodiment and example of the IPACE system, and associated computer-implemented method for tracking, analyzing, determining, and/or discerning a competition winner (e.g. a prediction winner). Starting with a terminator 846*b* where process "(Determine/Discern First to Publish and 5 Ws)." Next, the process proceeds a step 846 where "Pull in All Updated Applicable Information, Data, Statistics, Terms, & Rules" is performed. From the step 846, a query 847 asks if "One Ascertained Result?"

If the answer the query 847 is "Yes: 1 Result," then the process proceeds to a query 850, where it asks "Is A Participant Ranking Discernible?" If the answer to the query 850 is "No," then the process proceeds to a terminal 851 "Proceed with Rules, Instructions &/or Remedies for "Non-Discernible Results." If the answer to the query 850 is instead "Yes," then the process proceeds to a query 852 where it asks "Are Winners Discernible?" If the answer to the query 852 is "No," then the process proceeds to a terminator 851. If the answer to the query 852 is instead "Yes," then the process proceeds to a query 853 where it asks "Are Rewards Discernible?" If the answer to the query 853 is "No," then the process proceeds to the terminator 851. If instead the answer to the query 853 is "Yes," then the process proceeds to a step 854 to "Notify &/or Update Winner's (& Losers) Account/Status."

From the step 854, the process proceeds to a query 855 where it asks "Is Anything Disputed In Time?" If the answer to the query 855 is "No," then the process proceeds to a terminator 856 in order to "Proceed With Instructions &/or Rules for "No Disputes In Time." If the answer to the query 852 is instead "Yes," then the process proceeds to a terminator 857 in order to "Proceed with Rules, Instructions &/or Remedies for "Dispute Resolutions."

If the answer to a query 847 is ">1 Result," then the process proceeds to a query 848, where it asks whether "All Results Ascertained?" If the answer to the query 848 is "Yes," then process proceeds to a step 849 to "Separate Results," which proceeds to the query 850. If the answer to the query 848 is "No," then process proceeds to a query 858 asking if "Rules Allow For Unknown Results?" If the answer to the query 858 is "No," then the process proceeds to a terminator 859 "Proceed with Rules, Instructions &/or Remedies for "Unknown Results." If the answer to the query 858 is instead "Yes," then the process proceeds to a query 860 where it asks "Extend Time?" If the answer to the query 860 is "Yes," then the process proceeds to a terminator 861 "Proceed with Rules, Instructions for "Extending Time.'" If the answer to the query 860 is instead "No," then the process proceeds to a step 862 "Separate Results & Employ Calculus & Methodology Per Result, Data, Statistics, Instructions, & Rules (e.g. TOU/TOP, Participants, Wagering, Time &/or the like.)"

If the answer to the query 847 is "Unknown Or Zero," then the process proceeds to the terminator 859. As the process continues from the step 862, where the method automatically, conditionally, and/or user selectively proceeds to a list of options with an 863 "Data" option, an 864 "Timer" option, an 865 "Mean" option, an 866 "Median" option, an 867 "Mode" option, an 868 "Range" option, an 869 "Statistics" option, an 870 "Filtering" option, and/or an "Other" option.

In various non-limiting embodiments, the selection/results of the list of options 863-871 proceeds to a step 872 to "Execute Result & Save Current State, ID, Data, Statistics, Prediction, & Save with Timestamp" Next, the process proceeds to a step 873 to "Employ Prediction Result &/or Data/Statistics (e.g. Where, How, & When Applicable)." Next, the process proceeds to terminator 874 "Notify Appropriate Members & Databases with the Appropriate Information For Any Subsequent Actions &/or Modifications."

IPACE Court Management (122) Module

Figure 57:
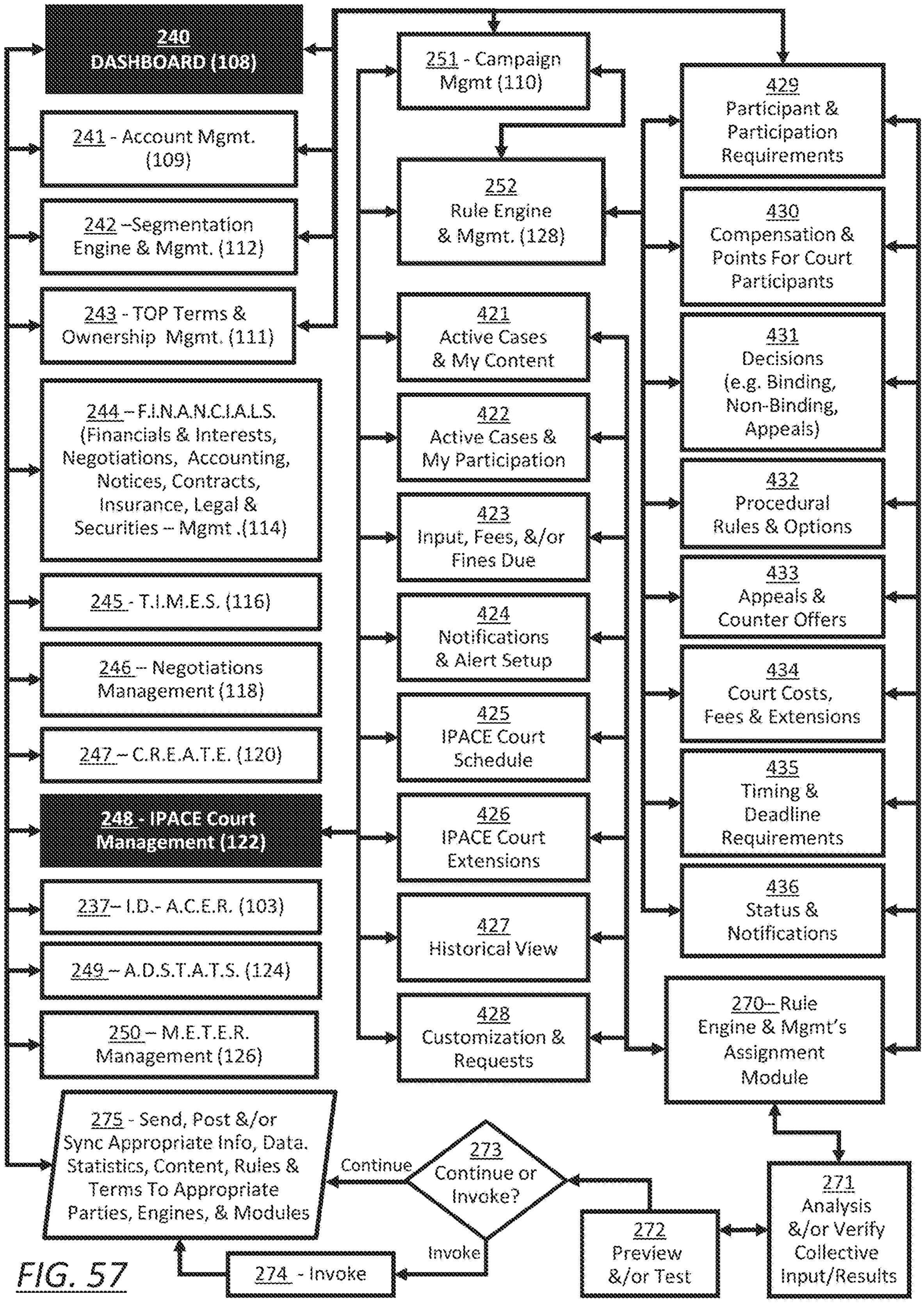
FIG. 57 is a block diagram with some flow charting steps depicting a non-limiting embodiment of the IPACE member's functionality from the IPACE Court Management (122) module.

FIG. 57 is a block diagram with some flow charting steps depicting an embodiment of the IPACE member's functionality from the IPACE Court Management (122) module. Starting with the Dashboard (108) in the block 240, where similar to the TOP Terms and Ownership Management figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of the IPACE Court Management (122) module would preferably have a role, and/or at least equivalent to the same permissions required to be a Negotiations Mgr., where the Negotiations Mgr. utilizes the Negotiations Management (118) module to view, review, create and/or modify criteria requirements or rules generally related to negotiations and/or similar element (e.g. accepting, rejecting, countering, appealing) for a particular Project or Project element to be used in, say a particular P.A.C. (104) and/or a particular P.I.N. (106).

In various non-limiting embodiments, the Dashboard functionality in this "IPACE Court Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "C.R.E.A.T.E." (120) module in a block 247, the "ID-ACERS" (103) module in a block 237, the "IPACE Court Management" (122) module in a block 248, the "ADSTATS" (124) module in a block 249, the "METER Management" (126) (including Knowledge Management) module in a block 250, the "Campaign Management" (e.g. Project Management) (110) module in a block 251, and the "Rule Engine and Management" (128) module in a block 252.

Further, where a list of options comprise an "Active Cases and My Data/content" module in a block 421, an "Active Cases and My Participation" module in a block 422, a "Input, Fees and/or Fines Due" module in a block 423, a "Notifications and Alert Setup" module in a block 424, an "IPACE Court Schedule" module in a block 425, an "IPACE Court Extensions" module in a block 426, a "Historical View" module in a block 427, a "Customization and Requests" module in a block 428, a "Participant and Participation Requirements" module in a block 429, a "Compensation and Points for Court Participants" module in a block 430, a "Decisions (e.g. Binding, Non-Binding, Appeals)" module in a block 431, a "Procedural Rules and Options" module in a block 432, an "Appeals and Counter Offers" module in a block 433, a "Court Costs, Fees and Extensions" module in a block 434, a "Timing and Deadline Requirements" module in a block 435, and a "Status and Notifications" module in a block 436; where the collective result similar to other step 271 examples, provides the "Verify Collective Input/Results" functionality/step along with the "Preview and/or Test" functionality/step 272, Next, a query 273 asks if the IPACE Member would like to either "Continue or Invoke?" the rule? If the answer to query 273 is "Continue," as in continue utilizing the Dashboard functionality without invoking the rule, then a next step 275 with a "Send, Post and/or Sync Appropriate Info, Data, Statistics, Data/content, Rules and Terms to Appropriate Parties, Engines and Modules" is performed, where the IPACE user may continue utilizing the Dashboard. If the answer to query 273 is instead "Invoke," then a step 274 is invoked for the particular rule, then the next step 275 with a "Send, Post and/or Sync Appropriate Info, Data, Statistics, Data/content, Rules and Terms to Appropriate Parties, Engines and Modules" is performed, where the IPACE user may also then continue utilizing the dashboard.

Figure 58:
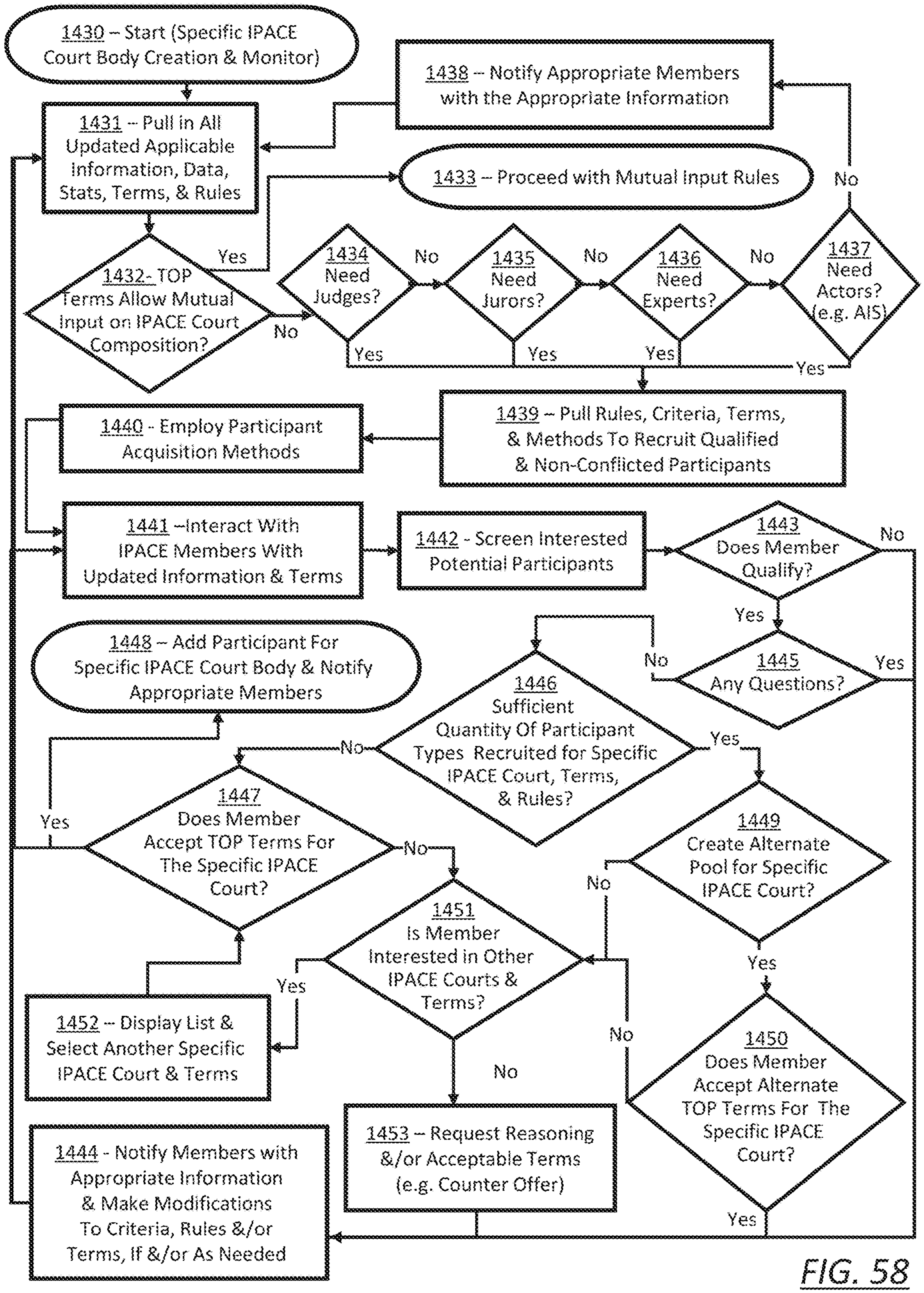
FIG. 58 is a flowchart that depicts a non-limiting embodiment and example of the IPACE system, and associated computer-implemented method regarding a specific IPACE Court Body Creation and Monitoring.

FIG. 58 is a flowchart that depicts an embodiment and example of the IPACE system, and associated computer-implemented method regarding a specific IPACE Court Body Creation and Monitoring. Starting with a terminal 1430 where a "Start (specific IPACE Court Body Creation and Monitoring)" function appears, followed by a step 1431 with a "Pull in All Updated Applicable Information, Data, Statistics, Terms, and Rules." Next, a query 1432 asks "TOP Terms Allow Mutual Input on IPACE Court Composition?" If the answer to query 1432 is "Yes," then the method continues to terminator 1433 "Proceed with Mutual Input Rules." If the answer to query 1434 is instead "No," then a query 1434 "Need judges?" is asked. If the answer to query 1434 is "No," then a query 1435 asks "Need Jurors?" If the answer to query 1435 is "No," then a query 1436 asks "Need Experts?" If the answer to query 1436 is "No," then a query 1437 asks "Need Actors? (e.g. AIS 195)," where the actor could be a particular actor, person, user, member, witness, source, resource, support, the AIS, a collection of these, a segment of these, and/or the like.

In various non-limiting embodiments, the judges, jurors, experts, and/or actors, could each, collective, individually, automatically, systematically, and/or via/by/or actor/user-prompt, be called upon to assess, interrogate, review, evaluate, authenticate, verify, validate, produce, witness, recall, establish, testify, justify, provide, could interrogated, could produce, could interpolate, rule, decide, partially decide, recuse themselves, participant, test-knowledge, skills, comprehension, and/or the like. In various non-limiting embodiments, each participant, participation, I/O/PC per judges, jurors, experts, actors, attorney, agent, representative, entity, plaintiff, defendant, witness, could be partially, temporality, temporarily, absolutely, relatively, automatically, systematically, conditionally, continually, and/or via/by/or actor/user-prompt, be assessed, interrogated, reviewed, evaluated, authenticated, verified, validated, knowledge-tested, skill-tested, comprehension-tested, and/or the like. In various non-limiting embodiments, the judges, jurors, experts, actors, and/or the like testing and evaluating could be implemented, conducted, evaluated, and/or the like, by the AIS.

Referring back to Fig, if the answer to query 1437 is "No," then the method proceeds to a step 1438 "Notify Appropriate Members/users with the Appropriate Information" and then loops back to the step 1431. If the answers to queries 1434-1437 were "Yes," the method continues to a step 1439 "Pull Rules, Criteria, Terms and Methods to Recruit Qualified and Non-Conflicted Participants." Next, is a step 1440 "Employ Participant Acquisition Methods," followed by a step 1441 "Interact with IPACE Members with Updated Information and Terms." Next, step a 1442 acts to "Screen Interested Potential Participants," which leads to a query 1443, which asks "Does Member Qualify?" If the answer to query 1443 is "No," then the method continues to a step 1444 "Notify Members with Appropriate Information and Make Modifications to Criteria, Rules and/or Terms, If and/or As Needed," and then returns to step 1432.

If the answer to query 1443 is instead "Yes," then a query 1445 asks "Any Questions?" If the answer to query 1445 is "No," then query a 1446 asks if there is "Sufficient Quantity of Participant Types Recruited for Specific IPACE Court, Terms and Rules?" If the answer to query 1446 is "No," then query a 1447 asks "Does Member Accept TOP Terms For the Specific IPACE Court?" If the answer to query 1447 is "Yes," then a Terminator 1448 acts to "Add Participant for Specific IPACE Court Body and Notify Appropriate Members."

If the answer to query 1446 is instead "Yes," then query a 1449 asks "Create Alternate Pool for Specific IPACE Court?" If the answer to query 1449 is "Yes," then query a 1450 asks "Does Member Accept Alternate TOP Terms for the Specific IPACE Court?" If the answer to query 1450 is "No," then query a 1451 asks "Is Member Interested in Other IPACE Courts and Terms?" If the answer to query 1451 is "Yes," then step a 1452 proceeds to "Display List and Select Another Specific IPACE Court and Terms." If the answer to query 1451 is instead "No," then a step 1453 "Request Reasoning and/or Acceptable Terms (e.g. Counter Offer)," and then returns to step 1444. Returning to query 1449, if the answer is instead "No," then query 1449 asks "Is Member Interested in Other IPACE Courts and Terms?" Returning to query 1450, if the answer is instead "Yes," then embodiment returns to step 1444.

Figure 59:
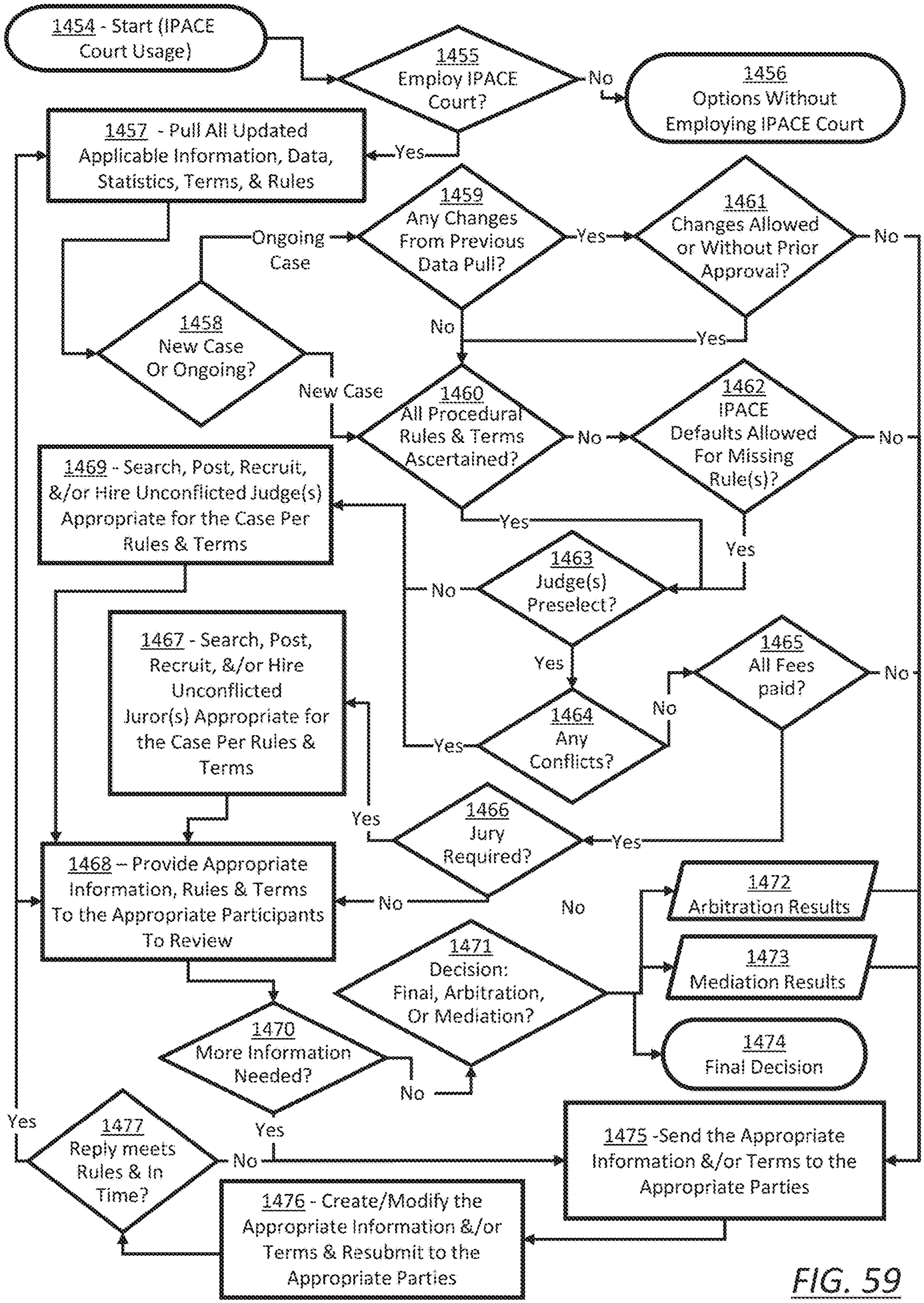
FIG. 59 is a flowchart that depicts a non-limiting embodiment and example of the IPACE system, and associated computer-implemented method regarding IPACE Court Usage.

FIG. 59 is a flowchart that depicts an embodiment and example of the IPACE system, and associated computer-implemented method regarding IPACE Court Usage. Starting with a terminal 1454 where a "Start (IPACE Court Usage)" function appears, followed by a query 1455, which asks whether it's to "Employ IPACE Court?" or not. If the answer to query 1455 is "No," then them method continues to a terminator 1456 "Options Without Employing IPACE Court." If the answer to query 1455 is instead "Yes," then the method continues to a step 1457 Pull All Updates Applicable Information, Data, Statistics, Terms and Rules," which leads to a query 1458 that asks "New Case or Ongoing?" If the answer to query 1458 is "Ongoing Case," then a query 1459 asks "Any Changes From Previous Data Pull?" If the answer to query 1459 is instead "Yes," then a query 1461 asks "Changes Allowed or Without Prior Approval?" (A step 1475 (explained later))

If the answer to query 1459 is "No," then a query 1460 asks if "All Procedural Rules and Terms Ascertained?" If the answer to query 1460 is instead "No," then a query 1462 asks if "IPACE Defaults Allowed for Missing Rule(s)?" If the answer to query 1462 is "Yes," then a query 1463 asks "Judge(s) Preselect?" If the answer to query 1463 is "Yes," then a query 1464 asks if there are "Any conflicts?" If the answer to query 1464 is "No," then a query 1465 asks if "All fees paid?" If the answer to query 1464 is instead "Yes," then the method continues to a Step 1469 "Search, Post, Recruit and/or Hire Unconflicted Juror(s) Appropriate for the Case Per Rules and Terms," which continues to a step 1468 (described later).

If the answer to query 1465 is "Yes," then a query 1466 asks if a "Jury Required?" If the answer to query 1466 is "Yes," then the method continues to a step 1467 "Search, Post, Recruit and/or Hire Unconflicted Juror(s) Appropriate for the Case Per Rules and Terms." Next, is a step 1468 "Provide Appropriate Information, Rules and Terms to the Appropriate Participants to Review." Next, a query 1470 asks if there is "More information Needed?" If the answer to query 1470 is "No," then leads to a query 1471 asking "Decision: Final, Arbitration or Mediation?" which the method and/or user may select from the following options: an option 1472 "Arbitration Rules," an option 1473 Mediation Rules, and a terminator 1474 "Final Decision."

If the answer to queries 1461, 1462, 1465, 1472, 1473 or 1477 is "No," then the method continues to a step 1475 where the method proceeds to "Send the appropriate Information and/or Terms to the Appropriate Parties." Next a step 1476 proceeds to "Create/Modify the Appropriate Information and/or Terms and Resubmit to the Appropriate Parties," which leads to a query 1477, which asks if the "Reply Meets Rules and In time?" if the answer to query 1477 is "Yes," then returns to step 1457.

Figure 60:
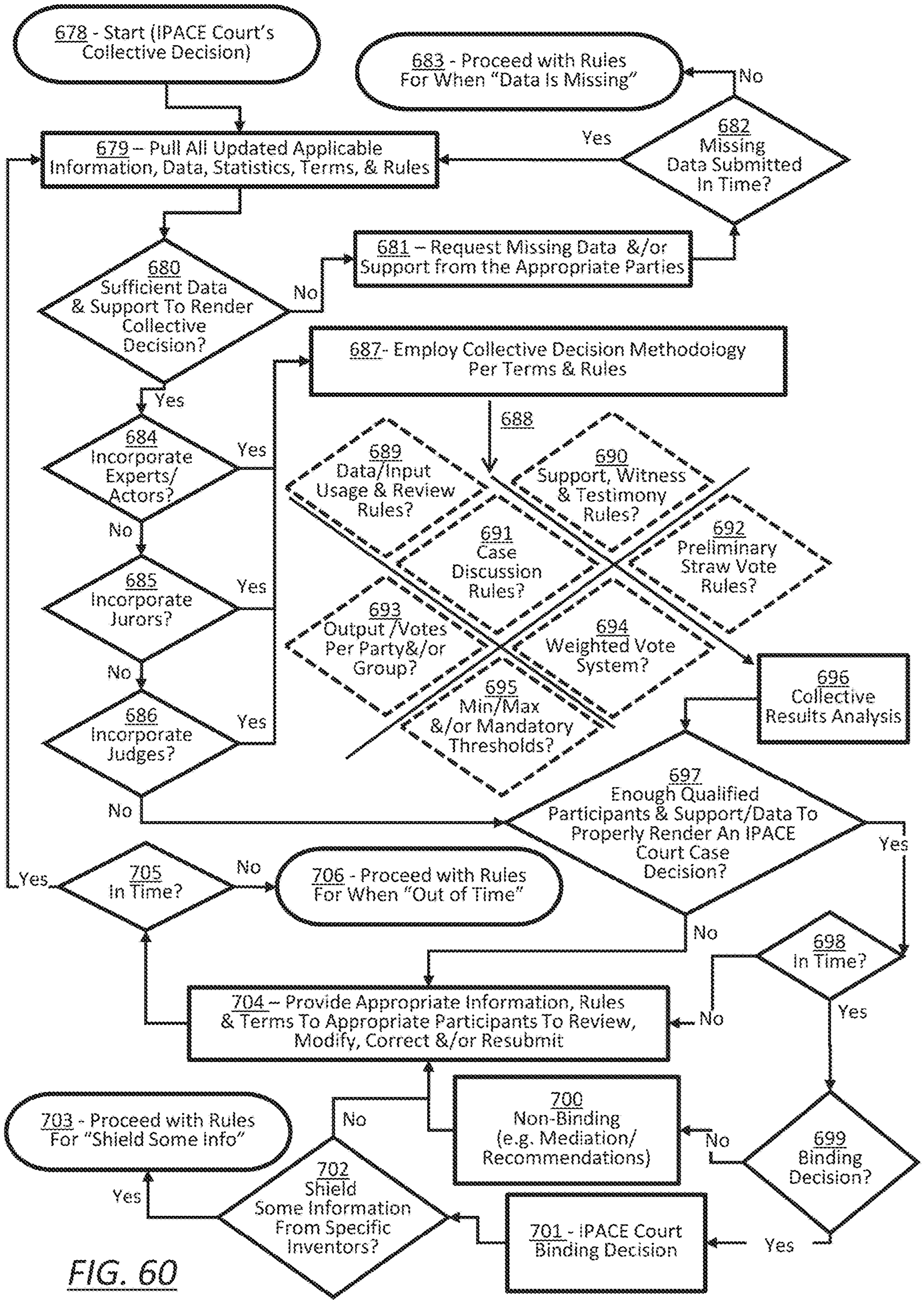
FIG. 60 is a flowchart that depicts a non-limiting embodiment and example of the IPACE system, and associated computer-implemented method regarding IPACE Court's Collective Decision.

FIG. 60 is a flowchart that depicts an embodiment and example of the IPACE system, and associated computer-implemented method regarding IPACE Court's Collective Decision. Starting with a terminal 678 where a "Start (IPACE Court's Collective Decision)" function appears, followed by a step 679 with a "Pull in All Updated Applicable Information, Data, Statistics, Terms, and Rules." Next, a query 680 asks if there is "Sufficient Data and Support to Render Collective Decision?" If the answer to 680 is "No," then the method proceeds to a step 681 to "Request Missing Data and/or Support from the Appropriate Parties." Next is a query 682, which asks if the "Missing Data/Statistics Submitted in Time?" If the answer to query 682 is "No,"

then a terminator 683 prepares to "Proceed with Rules for When "Data is Missing." If the answer to query 682 is instead "Yes," then it returns to step 679.

If the answer to query 680 is instead "Yes," then a query 684 asks "Incorporate Experts (75)?" If the answer to query 684 is "No," then a query 685 asks "Incorporate Jurors?" If the answer to query 685 is "No," then a query 686 asks "Incorporate Judges?" If the answer to queries 684, 685 or 686 is "Yes," then a step 687 proceeds to "Employ Collective Decision Methodology Per Terms and Rules." In an option 688, the method and/or user may set, edit and/or modify the following: an option 689 "Data/Input Usage and Review Rules?" an option 690 "Support, Witness and Testimony Rules?" an option 691 "Case Discussion Rules?" an option 692 "Preliminary Straw Vote Rules?" an option 693 "Output/Votes Per Party and/or Group?" an option 694 "Weighted Vote System?" and/or an option 695 "Min/Max and/or Mandatory Thresholds?" where a Step 696 aggregates the "Collective Results Analysis."

With the "Collective Results Analysis" in place, a query 697 asks if there is "Enough Qualified Participants and Support/Data to Properly Render an IPACE Court Case Decision?" If the answer to the query 697 is "Yes," then a query 698 asks "In Time?" If the answer to the query 698 is "No" when asking "In Time?" then the process proceeds to the step 704. If the answer to the query 698 is "Yes," then the method proceeds to a query 699 that asks if it is a "Binding Decision?" If the answer to the query 699 is "Yes," then a Step 701 presents that a "IPACE Court Binding Decision" has been rendered. Based on the IPACE Court Binding Decision in the step 701, a query 702 asks "Shield Some Information From Specific Inventors?" If the answer to the query 702 is "Yes," then the process proceeds to a terminator 703 "Proceed with Rules for 'Shield Some Info.'" If the answer to the query 702 is instead "No," then the process proceeds to a step 704 (explained later).

If the answer to the query 699 is "No," then the process proceeds to a Step 700 that presents "Non-Binding (e.g. Mediation/Recommendations). Next, the process proceeds to a step 704 "Provide Appropriate Information, Rules and Terms to Appropriate Participants to Review, Modify, Correct and/or Resubmit," followed by a query 705 asking "In Time?" If the answer to the query 705 is "No," then the process proceeds to a terminator 706 "Proceed with Rules For When 'Out of Time.'" If the answer to the query 705 is instead "Yes," then the process returns to the step 679.

With the "Collective Results" in place, a query 697 asks if there is "Enough Qualified Participants and Support/Data to Properly Render an IPACE Court Case Decision?" and if the answer to the query 697 is instead "No," then the process proceeds to the step 704.

IPACE/IPACE Court/ECORT

In an embodiment of the IPACE COURT, system and associated computer implemented method, there are court divisions and/or sub-courts. In various non-limiting embodiments, there is a particular court division (e.g. or sub-court), system and associated computer implemented methods for interrogating and/or providing a consumer with a relatively prompt and/or timely result from at least one of a group comprising an online resolution court, an online resolution trial, an online complaint resolution, an online resolution recommendation, an online resolution non-binding decision, and/or an online resolution binding decision; collectively referred to as an "Expedited Consumer Online Resolutions and Trials" System (hereinafter the ECORT or the ECORT system).

In various non-limiting embodiments, the IPACE system would preferably collect (e.g. pull, retrieve, download, sniff, crawl, monitor, track, bot, and/or the like) data, data correlations, data/content and/or the like to analyze any discerned and/or perceived issues, problems, efforts, anomalies, traffic issues, bottlenecks, temporal conditions, network conditions, along with any correlated keystrokes, phone calls, parties involved, days, duration per attempt, and duration overall. In addition, any correlating billing issues, credit, barter, other issues, resolutions, and/or the like; and attempting to resolve from each party, where efforts are tracked and scored. For instance, a particular user's efforts to remove a derogatory statement from his/her credit account, where, say something incorrectly appears as a late pay (e.g. due to an unauthorized revolving charge to no longer valid credit card).

Where, for example, the consumer can conditionally request a resolution to a dispute with the ECORT system. In one embodiment example, a consumer could file an online complaint with the ECORT system, where the consumer could either utilize a web browser to navigate to a website to obtain an ECORT functionality from an ECORT User Interface (hereinafter the "ECORT-UI" or sometimes generically referred to as the "ECORT system") on a computer terminal, mobile device, and/or similar, or utilize a dedicated ECORT application on a computer connected to a communication system network connected to the ECORT system, or utilize the dedicated ECORT application on a mobile device and/or similar.

Figure 61A:
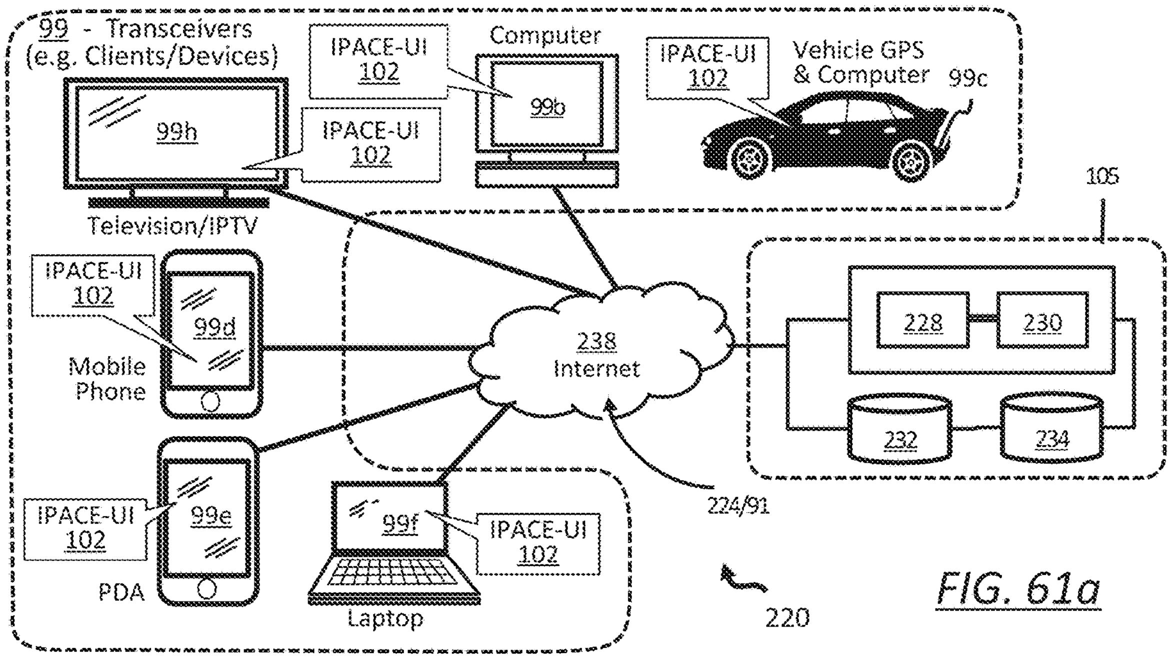
FIG. 61*a* of the accompanying drawings illustrates a general embodiment and overview of an "ECORT Operating Environment" 220 in which the invention may be implemented, including a variety of components that communicate over a public network 224, preferably the Internet 238.

FIG. 61*a* of the accompanying drawings illustrates a general embodiment and overview of an "ECORT Operating Environment" 220 in which the invention may be implemented, including a variety of components that communicate over a public network 224, preferably the Internet 238. The "ECORT Operating Environment" 220 includes a client system 99*b* and the "ECORT" system 105. The client system 99*b*, using Uniform Resource Locators (URL), accesses web servers through, in one embodiment, a local area network (LAN), wireless area network (WAN), a voice over IP (VOIP) network, Telephone network, an internet service provider (ISP) or the like. The client system 99*b* in one embodiment may include a desktop computer, a personal digital assistant or cell phone, or generally, any device that includes a graphical user interface (GUI) and/or a voice response unit (VRU) and can access a network. The client system 99*b* typically includes one or more processors, memories and input/output devices. Typically the client system 99*b* also includes a mouse, touch screen, keyboard, or other technological improvements therein, to effectuate a selection or interaction by the user.

In various non-limiting embodiments, the ECORT system 105 includes one or more ECORT engines 228, a computer 230, including a processing system, one or more data/content servers 232 and one or more profile servers 234. Generally, servers may include a central processing unit (CPU), a main memory, a read-only memory (ROM), a storage device and a communication interface all coupled together via a bus. The ECORT engine 228, including a program, processes interactions performed by a user, and communicates with the data/content server 232 or the ECORT server 234, to create, modify, collaborate, retrieve, track, and store data/content; who created/modified the data/content and when. The data/content server 232 stores data/content associated with the IPACE system 105, and the ECORT servers 234 store data/content generated by users, both acting as information providers for the "ECORT Operating Environment" 220, accessed by the computer 230, when the user interacts with the ECORT engine 228.

Figure 61B:
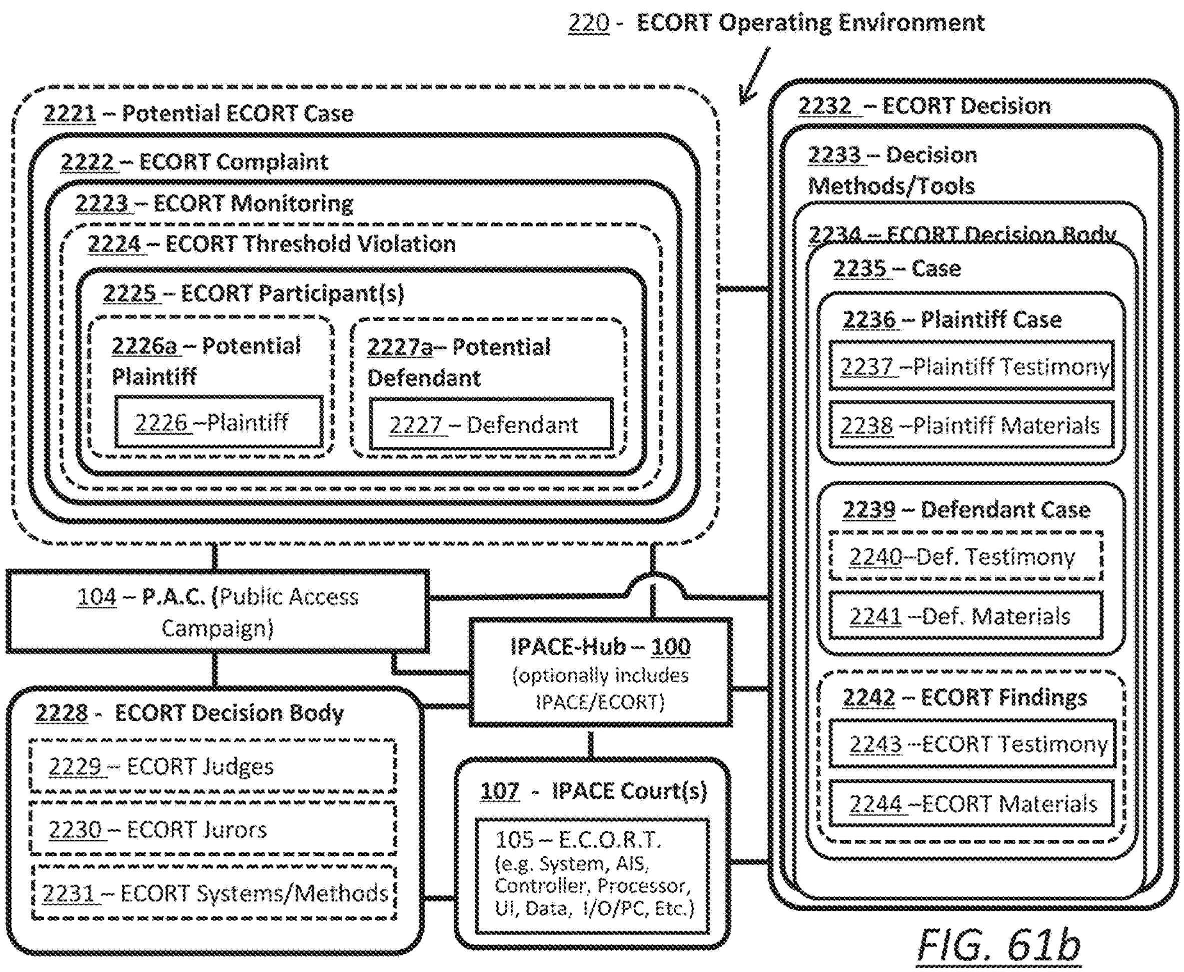
FIG. 61*b* depicts a non-limiting embodiment of a system and associated computer-implemented method regarding of an "ECORT Environment (ECORT subset of IPACE Court)" 105.

FIG. 61*b* depicts an embodiment of a system and associated computer-implemented method regarding of an "ECORT Environment (ECORT subset of IPACE Court)" 105. In various non-limited embodiments, the ECORT Environment 105 would preferably comprise a container 2221 "Potential ECORT Case," a container 2232 ECORT Decision, a container 2234 "ECORT Decision Body," a container "P.A.C. (Public Access Campaign)" 104, a container "IPACE-Hub" 100 (or sometimes referred to as "Intellectual Property, Assignment, Collaboration and Exchange-Hub"), and a container "IPACE Court(s)" 107. All containers are connected and/or coupled with the other containers as illustrated and/or depicted.

In various non-limited embodiments, the container 2221 represents a potential ECORT case. Once a complaint has been filed in a container 2222 "ECORT Complaint," then a container 2223 "ECORT Monitoring" starts to monitor the complaint based on artificial intelligence system (AIS 195) to reenact the steps that were provided by the potential plaintiffs in a container 2226*a* "Potential Plaintiff" and/or to look at system data via analysis where the IPACE system automatically, systematically, continuously, persistently, conditionally, and/or user-selectively interrogates and/or pulls existing data from other potential complaints, other potential plaintiffs, other potential websites, and/or any source that can be interrogated for information and complaints about potential defendant(s). In this embodiment, let's call it a credit reporting agency that would be a container 2227*a* "Potential Defendant." Prior to having the case heard by ECORT, ECORT attempts to settle or resolved the case through arbitration (e.g. binding decisions) and/or mediation (e.g. non-binding decisions).

In various non-limited embodiments, there could be a particular violation based on ECORT's analysis that this instance is a 'likely' valid complaint where, say it is difficult to cancel a 'credit reporting' subscription, because the ability to go online and use the credit agency's menuing and navigation to click their way through to canceling a subscription or to even reach someone by phone at the credit reporting agency by phone is extremely difficult. Continuing, the criteria would be in an 2224 "ECORT Threshold Violation," and if that criteria gets violated, then ECORT would, in this embodiment, approach both parties to consider becoming an 2225 "ECORT Participant(s)." If, after being contacted, both parties agree to have the case heard at ECORT, then the parties end up becoming a container 2226 "Plaintiff" and a container 2227 "Defendant."

Once the containers 2226 and 2227 agree to be Plaintiff and Defendant, the process moves from the container 2221 "Potential ECORT Case" to the container 2232 "ECORT Decision," where the evidence will be heard and the court's decision will be rendered. Before proceeding further, it is important to clarify that in this embodiment, all of this is working through the IPACE Hub 100, which is connected to the IPACE Court. Also, the way people come to hear about the IPACE Court and the ability to complain could be through public access campaigns, or by postings and/or advertisements that appear on websites, or the IPACE UI itself, or other third-party websites.

Continuing, a container 2233 "Decision Methods/Tools" It could be a final decision, it could be a partial decision, it could be a suggestion. There are all different types of resolutions. For instance, in various non-limiting embodiments, the container 2233 could employ mediation or arbitration, where with the latter the decision is final and with the former the decision is just a suggestion that the parties may accept or reject. Next, if it is agreed to go forward, the parties proceed to a container 2228 "ECORT Decision Body."

Next, the parties proceed to the actual case itself, a container 2235 "Case." In the container 2235, it includes a container 2236 "Plaintiff Case," which is the case the plaintiff presents, including a container 2237 "Plaintiff Testimony" and a container 2238 "Plaintiff Materials." It is likewise for a container 2239 "Defendant Case," which is the case the defendant presents, including a container 2240 "Defendant Testimony", which is optional, and a container 2241 "Defendant Materials." The Defendant doesn't have to give testimony, that's why the container is a dotted line.

In various non-limiting embodiments, there could be a container 2242 "ECORT Findings" that are also included, where the ECORT Findings could include actual testimony, video tape testimony, statistics, a container 2244 "ECORT Materials," and/or the like, and all that is brought to bear on a decision that comes out of a 2232 "ECORT Decision." The container 2232 ECORT Decision funnels through the IPACE Courts 102, where the databases are and in the ECORT 105 and the ability to store all of this information and run it on a computer processor, a computer implemented method, and it may, again, employ AIS if need be in some of the steps.

In various non-limiting embodiments, the computer, via a processor and any associated computer-implement methods, for determining the container 2232 ECORT Decision would comprise a container 60 for "ECORT Decision," which also includes a container 90 comprising of a container 80*a*, comprising of a container 80, comprising of a container (on down you go until you finish them all and then you can explain them)

There has to be a decision body for the bottom left for the ECORT decision on the right. The parties that make the decisions do not have to be physically located in the same place, they do not have to decide on the same day, they do not have to look at testimony at the same time. In various non-limiting embodiments, they would all look at it at the same time, where the potential participants for the "ECORT Decision Body" could be a 2229 "ECORT Judges," a 2230 "ECORT Jurors and they you've got a 2231 "ECORT Systems/Methods" employed, so, in other words, there can be AI, there can be other experts brought in, but that's kind of a catchall for other capabilities.

The 2230 jurors could be peers, they could be experts, they could be people pick at random. The 2229 judges would have to meet some sort of threshold to participate in the decision. All of these should be decided before the Potential Defendant and Potential Plaintiff decide to have their case heard.

Note: any dotted-lines surrounding a container means that the actions within that single container are optional and may not happen. For instance, within container 2221 "Potential ECORT Case" in a sub-container 2226*a* (in a dotted-line box), the "Potential Plaintiff" has the option to either become a container 2226 "Plaintiff" or not. Within the same within the same container 2221 "Potential ECORT Case," the other optional containers are 2221, 2224 and 2227*a*.

In various non-limiting embodiments, servers include databases, which may be implemented in a single storage device or in a plurality of storage devices located in a single location or distributed across multiple locations. The databases are accessible to the servers and clients, within the "ECORT Operating Environment" 220. The information stored in the databases may be stored in one or more formats that are applicable to one or more software applications that are used by the clients and servers.

In various non-limiting embodiments, preferably the data/content is stored on solid state drive (SSD) or sometimes called a solid-state disk or electronic disk which uses solid-state memory to store persistent data. SSD have relatively faster access times and less latency compared to electromechanically hard disk drives (HDDs). Some SSDs utilize NAND-based flash memory which retains memory even without power. In some cases, a hybrid of HDDs and SSD can create a smaller SSD cache to improve performance for frequently accessed files.

In various non-limiting embodiments, the consumer utilizing the ECORT-UI can specifically name an opposing party in his/her online complaint, say a potential service provider or an existing service provider (hereinafter the "service provider") who made and/or breached an offer to the consumer; made and/or breached a counter offer/term; entered and/or breached a contract, agreement, and/or subscription; and/or the like; where the opposing party could be an individual, company, entity, and/or the like. Further, where the consumer would define, input, and submit the online complaint against the service provider. In addition and depending upon available terms and conditions, the consumer could also request a specific manner and/or a specific methodology of resolving the dispute, generally from a list of available online dispute resolution options per such factors and filters as an online complaint type, consumer type, existing agreement type, a jurisdiction type, a venue type, a disposition type, and/or the like.

For instance, a particular consumer could have become an online account with a particular service provider by entering into a monthly online subscription agreement (or similar), wherein the terms of the monthly online subscription agreement (or similar) called for the particular consumer to provide the particular service provider continued access to an active online credit account (e.g. credit card account, bank account, PayPal account, and/or similar), where the terms could require that the active credit account remain current and accessible to the particular service provider for charging the particular consumer a monthly reoccurring fee, and where the terms could conditionally state that the particular consumer has the right to cancel the monthly online subscription agreement (or similar) at any time without any additional fees going forward.

Under this embodiment, instance, and under a particular set of term conditions, if the particular consumer is not able to conditionally cancel the monthly online subscription agreement (or similar) within a prescribed reasonable amount of time to cancel, say within three (3) minutes of hitting the particular service provider's website, then the particular consumer can file an online complaint with the ECORT system with a stated resolution goal, say with an at least one of the group of the online complaint resolution, the online resolution recommendation, the online resolution non-binding decision, and/or the online resolution binding decision.

In various non-limiting embodiments, the prescribed reasonable amount of time to cancel could factor in a reasonable expectation of consumer hardware, a reasonable expectation of consumer connection speed and bandwidth, a reasonable expectation of service provider hardware, a reasonable expectation of service provider connection speed and bandwidth, a reasonable expectation of service provider website and/or application functionality, a reasonable complexity of the service, a relative time period of the relationship, a relative time period since the particular service provider first made available the monthly online subscription agreement (or similar) accepted by the particular consumer, a relative time period since the acceptance of the monthly online subscription agreement (or similar) by the particular consumer, and/or the like.

In various non-limiting embodiments, the prescribed reasonable amount of time to cancel could factor in a relative prescribed reasonable amount of time to cancel when compared to relatively similar service providers, to relatively similar service industries, to relatively similar service geographies, to relatively similar monthly consumers, to relatively similar monthly online subscription agreements, and/or the like, and/or some combination, where In various non-limiting embodiments, an analysis of the historical data, correlations, and the like; could be utilized to determine the prescribed reasonable amount of time to cancel, and where the metrics to determine the prescribed reasonable amount of time to cancel would constantly be tracked over time and adjusted accord to the terms and conditions in effect at the time by the ECORT, the service provider, and/or the consumer.

In an embodiment of the reasonable expectation of the service provider website and/or application functionality, the ECORT system could have data and metrics for such factors as how many mouse clicks and unique webpage loads the consumer should be required to cancel. For instance, based upon historical data analysis, the ECORT system could determine and/or establish that a consumer should either be able to utilize an online cancelation button and/or cancelation tool that is accessible, say either from the same home page URL or module as the one the same consumer utilizes to access his/her account with the particular service provider, the same webpage URL or module the same consumer utilized for creating his/her new account, and/or the same webpage URL or module the particular consumer utilizes for paying his/her bill and/or setting up the monthly online subscription agreement (or similar).

When the consumer enters his/her online complaint with the ECORT system, he/she would typically indicate his/her resolution goals of the specific online resolution binding decision being filed, wherein the ECORT will render a binding decision upon both parties, assuming both parties have and/or subsequently agree to and accept a list of ECORT terms, methods, and/or the binding decision(s). The consumer compliant could be as simple as and include: (a) a specific web url address for cancelation, where he/she was unable to cancel the monthly online subscription agreement, and (b) a stated objective of the particular consumer, where he/she may indicated the stated objection of cancelling the monthly online subscription agreement effective as soon as possible, where upon a conditional execution by the consumer, the ECORT system would take the specific web url address for cancelation provided and attempt to resolve the matter.

In various non-limiting embodiments, the stated objective of the particular consumer could be expanded to also allow the particular consumer to indicate a desire to conditionally cancel the monthly online subscription agreement (or similar), where, for instance, he/she only wants to cancel, say either a portion of the monthly online subscription agreement (or similar), only for a particular family member, only for a particular piece of equipment, only for a particular service requested, only for a particular product ordered, and/or the like, and/or some combination. Further, the stated objective of the particular consumer could instead indicate a desire to conditionally cancel and/or suspend the monthly online subscription agreement (or similar).

For instance, the stated objective of the particular consumer could indicate a desire to conditionally cancel and/or suspend the monthly online subscription agreement (or similar), if a particular service, product, or piece of equipment the particular consumer requested is no longer available, and/or the like. In addition, where the ECORT system determines the particular service provider (or similar) has expressed or implied an inability to fulfill its obligations; or it's determined that the service provider has yet to provide an expectation for a particular service, product, or piece of equipment requested, ordered, paid for, and/or the like; within a particular period of acceptable time, at particular anticipated delivery location, and/or for a particular agree price and/or by a particular agreed delivery means, terms and/or cost could result in a specified and conditional desire to cancel the monthly online subscription agreement (or similar), say as soon as possible, or suspend the monthly online subscription agreement (or similar), for a particular period of time, family member, equipment, and/or the like.

In various non-limiting embodiments, the inability to fulfill the particular agreed and/or anticipated delivery means, terms and/or cost, could include such means as an online download; a free shipment; F.O.B. Destination, freight prepaid (where generally the service provider, referred to here as a "seller" pays and bears freight charges, owns the goods in transit and is responsible for filing claims, if any); F.O.B. Destination, freight collect (where generally the consumer, referred to here as a "buyer" pays and bears freight charges, while the seller owns the goods in transit and is responsible for filing claims, if any); F.O.B. Destination, freight collect and allowed (where generally the "buyer" pays freight charges and deducts the cost from invoice, while the seller bears freight charges, owns the goods in transit, and is responsible for filing claims, if any); F.O.B. Origin, freight prepaid (where generally the "seller" pays freight charges and bears freight charges, while the buyer owns the goods in transit, and is responsible for filing claims, if any); F.O.B. Origin, freight collect (where generally the "buyer" pays freight charges and bears freight charges, owns the goods in transit and is responsible for filing claims, if any); F.O.B. Origin, freight prepaid and charged back (where generally the "seller" pays freight charges and adds the cost to the invoice, while the buyer bears freight charges, owns the goods in transit, and is responsible for filing claims, if any); F.O.B. Destination, freight prepaid and charged back (where generally the "seller" pays freight charges and adds the cost to the invoice, owns the goods in transit, and is responsible for filing claims, if any, while the "buyer" bears freight charges); C.O.D.; Pick Up/Will Call (where generally the "buyer" bears freight charges and owns the goods in transit); and/or the like).

Back to the specific web url address for cancelation cited, where the consumer compliant could be expanded to also include, if the web url address provided is for a particular web url address where the particular consumer is relatively certain to be the specific web url address for cancelation and is where he/she assumes the consumer is supposed to navigate to obtain a functionality and a capability necessary to specifically cancel the particular consumer's monthly online subscription agreement (or similar). Further, where the particular consumer can include his/her logic, assumptions, and/or reasoning for such a conclusion (e.g. a stated policy, an email from customer service, and/or the like). In addition, the particular consumer could express his/her relative certainty along a slider, continuum, and/or numerically (e.g. zero, 5% certain, 80% certain, and/or the like).

In various non-limiting embodiments, the consumer online complaint could include such information, as when, how, how long, how many attempts, who, and the like attempted to cancel the particular consumer's monthly online subscription agreement (or similar). For example, the particular consumer could indicate that he/she tried in to cancel, say within the last five (5) minutes, but had no luck with the cancelation because either he/she (1) could not find the specific web url address for cancelation; (2) the specific web url address for cancelation appears to be temporarily down, inactive, and/or the like; (3) the specific web url address for cancelation is far too confusing, and/or the like; and could state why or where it got complicated.

In various non-limiting embodiments, the ECORT system could provide the particular consumer an option to invoke a function, where he/she agrees to allow the ECORT system to witness, collect, store, and track a subsequent list of online usage and interactions by the particular consumer. The subsequent list of online usage and interactions by the particular consumer would ideally reflect a most direct navigation route to the specific web url address for cancelation, where the particular consumer performs what he/she believes is a proper navigation pathway and functionality steps required to cancel his/her monthly online subscription agreement (or similar). The ECORT system could provide the particular consumer with additional functionality to comment particular steps (e.g. "this is the webpage URL address that I was told to visit per an email from the billing department").

In various non-limiting embodiments, the ECORT system could provide additional functionality to perform a pause function, say during the particular consumer's login to temporarily protect his/her private information, and/or block certain inputs and visibility of some navigation from the ECORT system, say block a keystroke tracking function, during the input of his/her password. The ECORT system would maintain an overall timer and track for both intervals of time, intervals of screenshots collected (e.g. every second, and/or every input) and per each input and/or function performed by the particular consumer, and/or step perceived from a series of cancelation steps performed.

In various non-limiting embodiments, the series of cancelation steps performed along with the associated data collected over time is stored and analyzed to determine a series of relative precision likelihood performed by the particular consumer: (a) is utilizing the most direct navigation route to the specific web url address for cancelation, (b) is precisely residing at the specific web url address for cancelation for the particular service provider (or similar), (c) is precisely utilizing the proper navigation pathway and functionality steps required to cancel his/her monthly online subscription agreement (or similar), and/or the like; in comparison to other collected and stored data, metrics, analysis and historical knowledge relative to the specific web url address, relative to the specific service provider, relative to a particular service industry of the service provider, relative to a particular consumer type of the consumer, and/or the like.

In various non-limiting embodiments, the ECORT system could incorporate any other data and/or information that could measurably and continually improve the series of relative precision likelihood. For example, the ECORT system could analyze the comments left by the particular consumer, where a particular comment such as "I am stuck" could assist the ECORT analysis of the relative precision likelihood the particular consumer is precisely utilizing the proper navigation pathway and functionality steps required to cancel his/her monthly online subscription agreement (or similar), where historical data may reflect a tendency of consumers in general to get stuck at similar moments in the web function pathway, after say, clicking a button labeled "Are You Sure?" which may instead be an attempt or tactic by a particular service provider to convince the particular consumer to not cancel, when in fact, the particular consumer should have clicked the another button, if he/she did in fact what to cancel.

In another embodiment, the ECORT system analyzing data from the particular consumer (or "user") could come from relative hesitation in proceeding through the proper navigation pathway and functionality steps required to cancel, where a particular time interval of, say forty (40) seconds or more at a particular screen or functionality tends to reflect that consumer in general is confused, say by a question being asked on screen. Here the ECORT system could scrape the text and functionality of the screen to determine where the particular consumer is likely getting stuck and run analysis to help determine what is the likely the reason, what is the question specifically asking the particular consumer, a list of conceivable and potentially correct responses to the question, and/or what it likely the next step.

For instance, the question (or open field) being asked on the screen could be asking for a "client code," where perhaps not all consumers have a client code or where this is simply a method for consumers to create a namespace for tracking the cancelation request. Here the ECORT system could inform the particular consumer by displaying a pop-up message or similar that the "if you are stuck on the client code field or request: note that it may not be relevant to your particular account, and/or simply a method for consumers to create a namespace for tracking the cancellation request, and not necessarily a specific code that you would already possess and/or need for matching in the database, similar to a password. The ECORT system recommends that you type something such as: 'Molly's third cancelation attempt" or skip this field all together, and click the button labeled 'continue.'"

In an embodiment and example of potential user confusion (e.g. by the particular consumer), say where he/she is appears to be stuck, confused, and/or the like, regarding what is being asked on screen/display. Here the ECORT system could scrape the text and functionality of the screen to determine where the particular consumer is likely getting stuck and run analysis to help determine what is the likely the reason, what is the question specifically asking the particular consumer, a list of conceivable and potentially correct responses to the question, and/or what it likely the next step.

If, on the other hand, the particular consumer did not know the specific web url address for cancelation, he/she could list as much information as he/she has for trying resolve the situation, such as information from a credit card statement that lists a particular charge, say a reoccurring monthly charge along with a transaction date, a vendor ID, and/or the like. In various non-limiting embodiments, the ECORT system could collect this data from the particular consumer and analyze the data to determine who is the particular service provider (or similar) precisely, and/or a relative perception and likelihood of who is the service provider (or similar). In addition, the ECORT system could requests the next steps, say where the ECORT could share any other information known or perceived to be known about the particular service provider, ask whether the particular consumer would like to continue with the cancelation of service (or similar) and/or the like.

In various non-limiting embodiments, the IPACE system performs the analysis to determine whether the particular consumer knows if a customer login is required to access the specific web url address for cancelation or not. If yes, then whether the particular consumer wants to submit the particular consumer's login and password to the ECORT? The resolution manner, methodologies, and conditions employed by the ECORT would be determined by the particular consumer's response. For some service providers, it may not be necessary for the consumer to submit his/her login or password, even if required for access to the specific web url address for cancelation. For example, some service providers may have a pre-existing relationship and/or registered with the ECORT. In various non-limiting embodiments, if the web url address is perceived by the consumer filing the online complaint to be active, temporarily down, inactive, and/or the like, then the IPACE system performs an analysis and can continually monitor the situation with an alerts. In various non-limiting embodiments, the user can accept online service with notifications, say via email, and with or without, dialog, chat, acknowledges, challenges, confirmations, and comments along the way.

Following the particular consumer's online complaint and depending upon such factors and conditions as the relationship of the opposing party with the ECORT prior to the consumer's online complaint, where, for instance, the opposing party (e.g. the service provider) could either have already been a registered ECORT entity (e.g. an ECORT certified service provider), or where following a proper service of notification to the opposing party, the opposing party relatively promptly agrees and accepts the usage of the ECORT and the ECORT's terms, methods, and/or binding decisions; then the ECORT binding decision upon both parties could be calculated, prepared, and/or derived relatively quickly when compared to traditional dispute resolution models, methodologies, arbitration, mediations, and/or court systems.

For example, the ECORT system has a computer-implemented software program that can utilize the web url address provided by the consumer in the online complaint to determine if the web url address does, in fact, contain any issues per a list of instructions for the particular service provider where the ECORT system invokes the computer-implemented software program to test, analyze, and track the instructions provided for any discerned and/or relatively perceived issues, gaps, and/or the like, to generate a report, along with a visual frame-by-frame reenactment, and a relationship map of discerned and/or relatively perceived issues. In addition, where there are links and/or correlations to other discerned and/or relatively perceived issues, complaints, comments, and/or the like, compared to historical data (e.g. from the same particular user, other users, for the particular complaint, for the particular site, and/or the like). In various non-limiting embodiments, the ECORT could provide service providers an opportunity to preregister with the ECORT where the service provider provides such information as the terms and conditions of the monthly online subscription agreement (or similar); where analysis and data could share resolutions to historical problems, discerned issues, and/or perceived issues. In addition, resolutions relatively successfully utilized by others for relatively similar issues, periods of time, as back-ups, and/or the like.

In various non-limiting embodiments, the terms of the monthly online subscription agreement (or similar) may explicitly state and/or offer the utilization of the ECORT.

Further, the monthly online subscription agreement (or similar) may limit some of the available dispute resolution terms, manners and/or a methodologies, but ideally would clearly state such limits, restrictions, state-by-state restrictions, state-by-state limitations, and/or the like.

Under this embodiment and instance, the service provider of the monthly online subscription agreement (or similar) who charges, supplies, and/or is responsible for the services could list that he/she/it is a member of the online resolution court, whereby the consumer is made aware of the relationship and preferably conceived relatively more reliably, transparent, and/or consumer-friendly.

In various non-limiting embodiments, the terms of the monthly online subscription agreement and/or the like, would ideally define the terminology utilized and unambiguously state such factors, conditions, and terms as a stated terms of use policy, a stated privacy policy, a stated service provider obligation policy, a stated credit establishment policy, a stated credit limit and requested increase policy, a stated credit reporting policy, a stated credit report remedy policy, a stated billing policy, a stated upgrade/downgrade policy, a stated consumer communication policy, a stated account accessibility policy, a stated right to change service policy, a stated right to substitute policy, a stated warranty policy, a stated ownership rights policy, a stated account suspension policy, a stated return of (e.g. leased) equipment policy, a stated restocking fee policy, a stated early termination fee policy, a stated overages policy, a stated refund policy, a stated late-fee policy, a stated insufficient-funds-fee policy, a stated cancelation by consumer policy, a stated cancelation by service provider policy, a stated pre-ECORT remedy policy, a stated ECORT policy, a stated interruption of services policy, and/or the like.

In various non-limiting embodiments, the stated cancelation by consumer policy could articulate whether a consumer triggered cancelation would utilize a pro-rated bill up to the consumer triggered cancelation date, or utilized a cycle bill up to the end of the current monthly billing cycle following the consumer triggered cancelation date. Further the stated cancelation policy would ideally include such information and term conditions as: a list of how the consumer can reactivate the account; a list of how much and for how long the consumer can reactivate the account; a list of how the consumer's credit may be, may potentially be, and may not be adversely harmed; a list of how the consumer can access and/or retrieve materials and/or services already paid for; and/or the like.

In various non-limiting embodiments, along with any disclaimers, limitations (e.g. liability), restrictions, indemnifications, and/or the like, and/or any other dispute resolution options. In various non-limiting embodiments, the terms of the monthly online subscription agreement and/or the like, would ideally state such other factors, conditions, and terms as they related to city-by-city, county-by-county, state-by-state, country-by-county, and/or the like, governing law, restrictions, limitations, specific rights, jurisdiction, venue, and/or the like. Further, the terms of the monthly online subscription agreement and/or the like, would ideally state whether the agreement and any of its benefits, obligations, duties, and/or the like, are transferable, assignable, inheritable, survive divorce court, survive the death of spouse, and/or the like.

In various non-limiting embodiments, the terms of the monthly online subscription agreement and/or the like, would ideally share historical data, analysis and/or correlations regarding all of the stated terms and policies, and for such additional factors as the service provider's track record on system interruptions and/or outages relative to a particular consumer's potential or actual service. In addition, say relative to a particular region of the country, a particular class or level of service, a particular type of hardware, a particular type of software, a particular upgrade/downgrade, a particular level of usage (e.g. uploads, downloads, file sizes, and/or the like), a particular volume of usage (e.g. unlimited, measured service, bytes consumed, and/or the like), a particular type of plan segmentation or classification (e.g. a friends and/or family plan or circle), a particular consumer usage type (e.g. personal-usage, business-usage, educational-usage, training-usage, medical usage, non-profit-usage, emergency-usage, government-usage, and/or the like, and/or some combination), a particular consumer plan type (e.g. individual, family, student, business, and/or the like), a particular type of business consumer (e.g. small business, fortune 500, publically traded, VC-funded, and/or the like), and/or the like; and/or some combination.

Further, say relative to a particular service agreement time period obligation type (e.g. month-to-month, annual, and/or the like), to a particular service agreement payment type or usage term (e.g. prepay, post pay, pay as you go, rent, lease, rent-to-own, layaway, consignment, buy, download, pay-on-demand, pay per stream, pay-per use, mail order, in-store, delivery, barter, and/or the like), to a particular insurance plan, warranty, warranty term, and/or repair plan (e.g. unlimited, exceptions, invalidations, 30-day, parts only, parts and labor, in-home repair, mail-in repair, manufacturer defect, normal-wear-and-tear, and/or the like), to a particular discount, to a particular loyalty plan, to a particular contest; to a particular organic search platform; to a particular paid search and/or link; to a particular advertisement campaign and/or specific advertisement that attracted the consumer; to a particular referral program, friend, affiliate program and/or the like, that attracted the consumer; and/or the like.

In various non-limiting embodiments, the particular consumer could specify how a consumer, in general, and/or the particular consumer is specifically supposed to navigate to for the functionality necessary to specifically cancel the particular consumer's monthly online subscription agreement (or similar) and where does the particular web url address provided lead (e.g. the home page of the service provider, and/or the like).

In various non-limiting embodiments, the IPACE system would preferably track when and how often sites are down for making payments, where a score tells an existing user or potential new user how often and when the site is down. For example, someone who works long hours and can only pay bills at, say, 2 am, on Saturday nights, may find that a particular bank or vendor relatively often is done for maintenance, or at that particular time and choice another bank or vendor, say even decide on a different car to buy due to the anticipated or actual frustrations. For example, when a particular user is in a routine of paying all your bills at the same time at a particular time each month, a site being down can become forgotten and create frustration, stress, wasted time, a late payment fee, bad credit, and/or like.

In various non-limiting embodiments, the IPACE system would preferably provide correlating information to the site provider as well, where data, user-comments, feedback, challenges, assertions, statistics analysis and/or the like, may suggest the site provider have an alternative site where people can request a notification when the site and/or payment system is back up.

In various non-limiting embodiments, each online payment system could have a button for ECORT as to complain, dispute, settle, and/or ask questions. Say a particular user goes to pay his credit card statement in full, but next month there is a new balance, because the bank doesn't let the user know the true payoff balance up to the minute and then charges interest for the revolving balance the next month, making it very difficult to guess the precise amount and create a zero balance. With ECORT (e.g. functionality/button on the credit card website), the user can input a complaint to learn the payoff balance up to the moment to create a zero balance where the bank has so many days, minutes, and/or seconds to reply on the webpage, chat, SMS, VM, email, and/or the like; or as requested by the user, to reply or face penalties. Banks that reply promptly are measured and scored for such things as customer satisfaction, promptness, accuracy, follow-up actions, resolutions, subsequent complaints, and/or the like.

In various non-limiting embodiments, the IPACE system would preferably track what data enticed a particular user to sign up in the first place. For example, where a person/user accepted an offer, e.g. the typical free offer with the option to terminate in X days, and where our system automatically logins, creates an account and later tries to cancel and the IPACE system tracks the complexities of trying to cancel.

In various non-limiting embodiments, the IPACE system would preferably tie into communication and/or track Online Consumer Protection, consumer reports, government tracking agencies and/or the like; along with data exchanges for tracking account, account signups, issues total, issues, pending, issues resolved, account cancelation, complaints, challenges, correlating court cases, correlating legal resolutions, correlating arbitration/mediation, and/or the like; each with statistics historically, currently, and/or projected, where user can comment, challenge, view, and in some cases, modify like a Wikipedia site.

Robocallers

In various non-limiting embodiments, the IPACE system would preferably also similarly track and analyze telephone calls for any known, stated, discerned, and/or relatively perceived issues. For example, the IPACE system may track and analyze data, data/content, correlated data/content and/or the like, regarding a particular incoming telephone number where historical data either knows, discerns, and/or relatively perceives the particular incoming telephone number and any correlated data, such as who, where, when, how often that particular incoming telephone number has called previously. In various non-limiting embodiments, the IPACE system would preferably also similarly track and analyze how many minutes, on average, the user has spent talking to that particular incoming telephone number previously (e.g. over the last week, month, year, overall, per household member, and/or the like), the number of voicemails left by that particular incoming telephone number previously (e.g. over the last week, month, year, overall, per household member, and/or the like), the number of telephone calls returned/sent to that particular incoming telephone number previously (e.g. over the last week, month, year, overall, per household member, and/or the like), and/or the like.

In various non-limiting embodiments, the IPACE system would preferably also similarly track and analyze how many minutes, on average, that particular incoming telephone number has previously made calls in the US (e.g. over the last week, month, year, overall, and/or the like) based upon system data, data correlations, other members, telephone company data, complaints, and/or the like. In various non-limiting embodiments, the IPACE system would preferably also similarly track and analyze how many days, months, years, that particular incoming telephone number has been in use, any other correlated numbers, business, complaints, and/or the like.

In various non-limiting embodiments, the IPACE system would preferably provide a means for the user who receives the particular incoming telephone number/call to submit a complaint, challenge, comments, historical data, and/or the like. In various non-limiting embodiments, the user may immediately, automatically, conditionally, and/or user selectively forwards the call to the IPACE system for tracking, analyzing, reporting, and/or terminating. In various non-limiting embodiments, the user could go online and enter the number along other data, comments, and/or the like.

In various non-limiting embodiments, the IPACE system would preferably generate a variety of scores. In various non-limiting embodiments, the IPACE system would preferably generate a score for a relative annoyance factor for the particular incoming telephone number (e.g. from/for a Robocaller, telemarketer, and/or the like) based upon all the data collected. Robocaller, typically refers to an automated calling system, but In various non-limiting embodiments may refer to any caller whose calls are unwelcomed by the called party and/or repeated. In various non-limiting embodiments, the generated score for a relative annoyance factor for the particular incoming telephone would preferably include a score tracking mechanism and a threshold to overcome before the call is allowed to, say, ring, get forwarded, go to voicemail, ring to a particular party/user, and/or the like.

In various non-limiting embodiments, the IPACE system would preferably generate a score for a relative urgency factor for the particular incoming telephone number (e.g. per an earlier outgoing message by the user marked urgent, and/or the like). In various non-limiting embodiments, the relative urgency score for the particular incoming telephone would preferably include a score tracking mechanism and a display for the user to see the relative urgency score, generate a particular tone, ring, ringtone, alert, caller ID, caller ID message, SMS, MMS, IM, email, and/or the like, say before, during, and/or after the call. The same for the other scores, including the score for relative annoyance, where the threshold may be adjusted per family member home, per phone line, per time of day, and/or the like. In various non-limiting embodiments, the IPACE system automatically, systematically, continuously, persistently, conditionally, and/or via/per actor/user-prompt tracks, analyzes and scores relationships, correlations, links, associations, timing, and/or the like, for robocalls. The IPACE system could track and analyze the collected information to identify phone numbers of robocallers, whether any infractions or violations are occurring, and/or develop courses of action, including service limitations, service terminations, legal action, fines, and/or the like.

In various non-limiting embodiments, following a robocall, a called party from a robocaller could enter a code, say similar to the "call-back *69" function, but where instead any available information about the previous robocaller (e.g. robocaller's caller ID, any voicemail message, and/or the like) could be forwarded to a central reporting database. In addition, the called party could enter data into an Interactive Voice Response unit (IVR) or via voice commands in order to improve the data collected. For example, the called party could share the number of times he/she has received calls from this number, the times of day the calls typically come, why he/she may be getting the calls, what course of action the called party would like taken, and/or the like. The collected data would also be tracked and analyzed to identify phone numbers of robocallers, whether any infractions or violations are occurring, and/or develop courses of action, including service limitations, service terminations, legal action, fines, and/or the like.

METER Management (126) Module.

Figure 62:
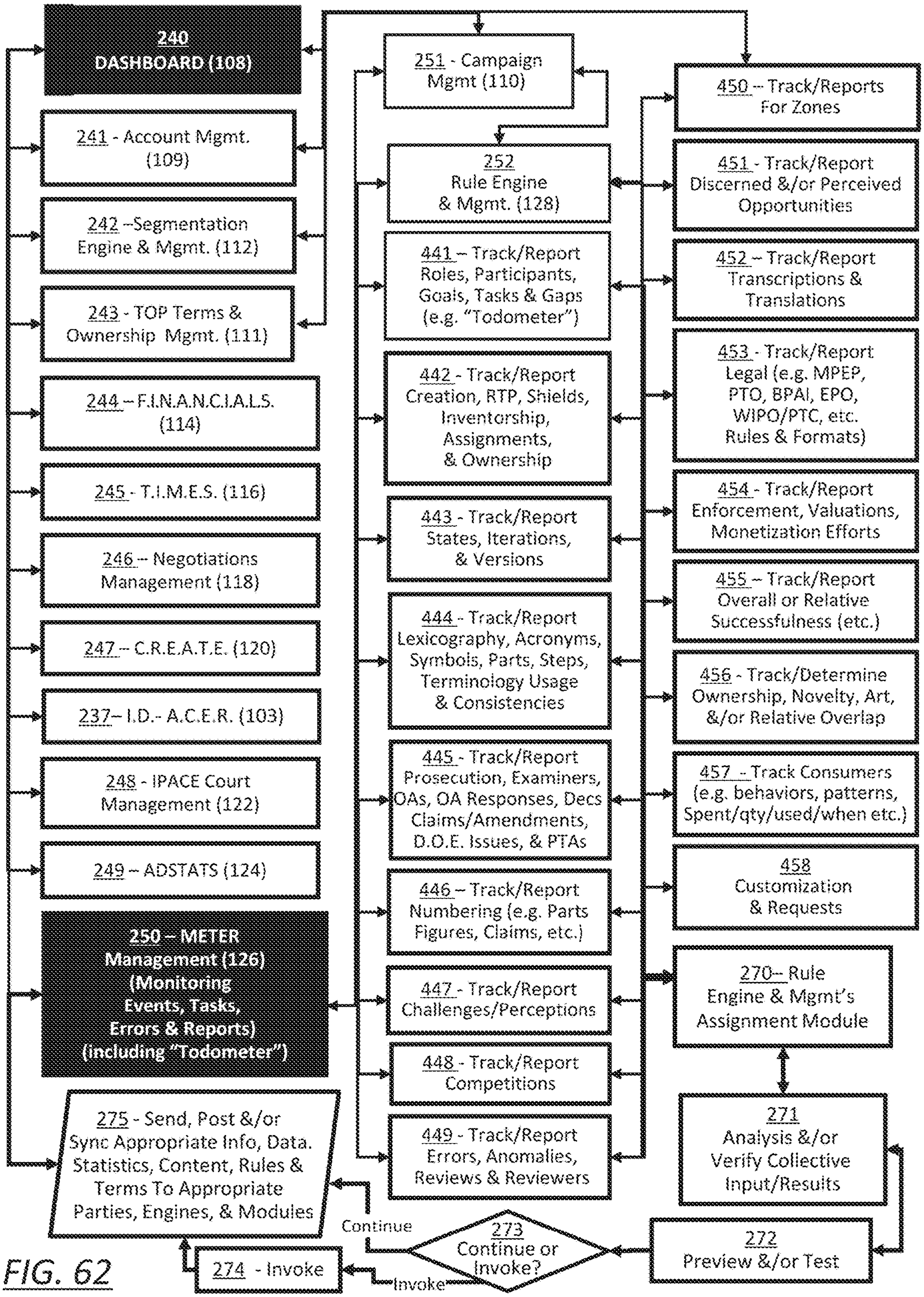
FIG. 62 is a block diagram with some flow charting steps depicting a non-limiting embodiment of the IPACE member's functionality from the METER Management (126) module, which is a block 250.

FIG. 62 is a block diagram with some flow charting steps depicting an embodiment of the IPACE member's functionality from the METER Management (126) module, which is a block 250. Starting with the Dashboard (108) in the block 240, where similar to the TOP Terms and Ownership Management figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of METER Management (126) module would preferably have to possess a role, and/or at least equivalent to the same permissions required to be a Negotiations Mgr. In various non-limiting embodiments, the Negotiations Mgr. utilizes the Negotiations Management (118) module to view, review, create and/or modify criteria requirements or rules generally related to negotiations and/or similar element (e.g. accepting, rejecting, countering, appealing) for a particular Project or Project element to be used in, say a particular P.A.C. (104) and/or a particular P.I.N. (106).

In various non-limiting embodiments, the Dashboard functionality in this "METER Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E S." (116) module in a block 245, the "Negotiations Management" (118) module in a block 246, the "C.R.E.A.T.E." (120) module in a block 247, the "ID-ACERS" (103) module in a block 237, the "IPACE Court Management" (122) module in a block 248, the "ADSTATS" (124) module in a block 249, the "METER Management" (126) (including Knowledge Management) module in a block 250, the "Campaign Management" (e.g. Project Management) (110) module in a block 251, and the "Rule Engine and Management" (128) module in a block 440.

"Track/Report Roles, Participants, Goals, Tasks and Gaps" Module in a Block 441

Goal and Resource Analysis

In various non-limiting embodiments, preferably the IPACE system would preferably analyze the data and data/content in a project and/or document, say a patent application, and calculate the anticipated resource requirements and display a list of costs dependent on a range of factors. For example, the costs to file within a particular timeframe, based upon perceived or discerned text, pages, claims, and/or the like; and where the IPACE system may automatically analyze perceived and likely critical dependencies, and/or perceived relatively critical requirements, data/content gaps, and/or the like; to display a list of cost along with the associated expenditures. The user may improve and/or correct relative perceptions by linking relatively better data, statistics, modifying requirements, perceptions, assignments, TOU/TOPs, criteria, inputting items that are not completed, and/or the like.

For instance, the Lead Inventor (40) could input that he/she anticipates that a particular patent application project with have 40 claims total, 6 independent, and the remainder of dependent claims, where the IPACE system may incorporate that data into the calculated and anticipated cost to file as, say a provisional "PPA," a non-provisional "NPA," a continuation, a continuation-in-part "CIP," a Patent Cooperation Treaty "PCT" application, an European Patent Cooperation "EPC" application, and/or the like. Further, translation costs may be incorporated per anticipated country. The results could list short and long term cost-benefit analysis, where, depending on the whether the goals are weighted on, say a set of relatively broad claims, but quick as possible and a relative large budget compared to, say the same goal of the set of relatively broad claims, but with a relatively constrained budget where speed to grant may be relative compromised, where the user may specifically input and/or adjust the criteria, conditions, weighing and/or the like for each factor (e.g. goal factor, project anticipated needs, timelines, score, and/or the like).

In addition, the calculations and analysis may incorporate perceived and/or discerned rates, conditions, factors, and/or the like, such as global, economic, geographical, seasonality, demographics, behaviors, psychographic, industry-related, project related, participant-related, and/or the like data that may be automatically, systematically, continuously, persistently, conditionally, and/or via/per actor/user-prompt incorporated. In various non-limiting embodiments, for example, preferably the IPACE system would preferably incorporate the current, seasonal, and/or historical data for patent allowance rates at the PTO, an allowance rate within a particular sector and/or art unit, with a particular examiner, and/or the like, relatively compared with other time windows, seasons, examiners, art units, allowance rates, and/or the like. In addition, preferably the IPACE system would preferably incorporate a current and/or a historic data for a filing sequence methodology for say, filing a PPA, then a PCT, then NPA in the US, compared to filing a PCT, then a NPA, and a EPO, and/or versus any other perceived, and/or desired permutation.

In various non-limiting embodiments, the current and/or historic data for financial, budget and/or economic conditions may comprises data from the company capitulation, balance sheet, investments, assets (e.g. intangible and tangible), current ratio (e.g. current assets divided by current liabilities), number of employees, cash on hand, working capital, cash flow, bad-debt percentage, receivables, payables, short-term debt, long-term debt, debt to equity, debt to capital ratio, valuation, stock price, dividends, earnings per share, tax rate, profitability, gross margin, operating margin, EBITDA, relative growth rate, (and the like from competitors, industry sectors, etc.), government data for, say unemployment, interest rates, and/or the like.

Further, the system, methods, and/or user-selections may automatically, conditionally, and/or specifically employ a particular participant, project, budget, goal, timeline, and/or a segment of the data elements in the calculations and analysis for displaying the prioritized perceived cost results, where the results may include relative costs (e.g. employees, contractors, participants, attorneys, reviewers, equipment, materials, filing costs, cost-savings, and/or the like), goals (e.g. milestones, timelines, promptness, effectiveness, current-value, future-value, ROI, relative satisfaction score and/or the like), novelty, and/or the like, scores.

Tracking Progress/Updates

In various non-limiting embodiments, the IPACE system and the computer-implemented tracking and analysis methods would preferably identify a designated participant (e.g. a project lead) with the proper role and permissions, where he/she may be automatically, systematically, continuously, persistently, conditionally, and/or via/per actor/user-prompt provided a progress update. For instance, the progress update method may include receiving data, statistics, relative progress, and/or the like, for a particular participant (e.g. a Joint-Inventor/Co-Inventor), group of participants (e.g. a draftsperson, review, patent attorney), segment of participants (e.g. participants who are contractors), during a particular time window and/or stage (e.g. during a patent application preparation stage), and/or the like. For example, the progress update method could be setup to employ a time interval (e.g. every hour, every day, Mondays at 5 pm, etc.), where the IPACE system would preferably send a message (e.g. an email, sms, mms, vm, and/or the like) to the project lead with designated information (e.g. the latest sentence typed, the number of words typed since the last update, the number of modifications made since the last update, and/or the like), and/or the like.

In various non-limiting embodiments, the progress update may be generated, while a monitored participant continues to work. For instance, the monitored participant may be a particular user/worker, group of users/workers, collaborators who have not saved their files for a while and who by be still working. Here, the IPACE system preferably is able to generate the progress update without the data/content being saved to a particular version, and/or the like. For example, the generate the progress update may be derived from a collection of earlier saved files, from a discernible data/content in RAM, historical files accessible by the system, from collecting input by the user/worker, and/or the like.

In various non-limiting embodiments, preferably the designated participant (e.g. a project lead) with the proper role and permissions to receive the progress updates may acknowledge, challenge, comment, modify terms, decide, suggest, and/or the like, for any data in the progress update, where the appropriate members, users, parties, systems, and/or the like, would be updated and notified accordingly. For example, a particular project lead is the designated participant for the progress updates, and he/she may challenge the assertion by a particular participant that a particular project, portion of a project, and/or a project component is fully, and/or relatively completed according to the terms, and/or the like. This project lead challenge may be returned to the particular participant would assert his/her completion, where the IPACE system would track and score each assertion according to the perceived terms, assertions, resolutions, and/or the like.

In addition, the IPACE system may automatically, systematically, continuously, persistently, conditionally, and/or via/per actor/user-prompt contact other members, users, parties, systems, and/or the like. For example, the TOU/TOPs may call for the Lead Inventor to be notified and/or intervene on any such matter, and/or the employment of the IPACE court, and/or the like. Further, the TOU/TOPs may allow certain roles, obligations, challenges, assertions, decisions, suggestions, and/or the like, to be delegated, assigned, done collaboratively, moderated, arbitrated, and/or the like.

In another example, the project lead may return a counter offer to motivate the particular participant to complete a particular task, in a particular manner, by a particular time, for a particular exchange, and/or the like; where the IPACE system would track and score each offer according to the perceived terms, benefits, harms, success, accomplishments, resolutions, and/or the like. For example, data over time may reflect that while a particular counter offer relatively proved to help complete a particular task on time by a particular participant, the tracked data suggests that the particular participant appears to hold out for the same and/or similar counter offers from the same project lead, when relatively compared to say other projects leads, where the particular participant has a relatively similar workload, availability, personal distractions, and/or the like.

Saved Input History and Time Gaps

In various non-limiting embodiments, the IPACE system and associated computer-implemented methods tracks who, where, when, how, and/or the like, a particular IPACE member/user saves a file. In addition, the IPACE system may also track the number of times a particular file, file iteration, file version, and/or the like, has been saved along with any calculated time gaps between each, all the input, edits, any file name changes, participation changes, and/or the like.

Desktop States

In various non-limiting embodiments, the IPACE system and associated methods may automatically, conditionally, and/or allow a particular user to save a desktop state, with all the documents currently open, associated with a particular project, participant, goal, deadline, client, budget, and/or the like, and/or within a specified period of time, say within six (6) hours of noon, on a particular day in the past, and/or the like, where the user may specifically specify how to save, store, retrieve, and/or the like. For example, the user may wish to only retrieve data/content perceived, known, and/or user-assigned to be associated with a particular project.

Another example would allow the user to go back in time and retrieve whatever documents were open on his/her desktop at particular moment in time or within a window of time. For example, the user may search, discover, and/or know a saved date for a particular key file for a particular project he/she worked on and saved the file, say a word document a year earlier. Here, the user could request the IPACE system retrieve and/or open all files he/she had open on his/her desktop within a plus or minus time window of, say three hours (a 6 hour time window) of when the discovered document was perceived and/or known to have been saved. In various non-limiting embodiments, the IPACE system would then retrieve the desktop state for that particular window of time and retrieve a list of all the documents opened during that particular time window/range, where the user could select specific documents from the list, open all the documents, make criteria modification for calculating the list, open none, and/or the like.

In various non-limiting embodiments, the user could limit the opened documents to a particular software application, say Microsoft® Word® to view the Word® document, or a particular version of Word®, say 2007, 2010, and/or the like. The displayed desktop state results may include a variety of software applications where the IPACE system would preferably also open those applications and files that were opened during that window of time, say for Excel® and spreadsheets, PowerPoint® and presentations, Photoshop® and images, and/or the like. In addition, the displayed desktop state results, with applications and associated documents, could analyze, score and prioritized the documents based upon a perceived and/or discernible association to the document discovered, and/or a list of criteria, such as a project name, where files were/are typically located within a particular folder, have a common author, common term in the filename, and/or data/content, and/or the like.

In various non-limiting embodiments, the IPACE system continually tracks, evaluates, assesses, determines, generates, stores, and may display a list of activities, including any software applications currently open or relatively how recently opened, viewed, modified, stored, sent, retrieved, emailed, downloaded, faxed, printed, scanned, published, targeted to a segment, and/or the like. For example, software applications such as Microsoft® Word®, Excel®, Outlook®, PowerPoint®, Publisher®, OneNote®, Access®, Projects®, FrontPage®, Visio®, WordPerfect®, CorelDraw®, GoLive®, FireWorks®, Premiere®, SoundForge®, Photoshop®, Acrobat®, Illustrator®, FrameMaker®, Homesite®, Freehand®, Dreamweaver®, Flash®, Flex®, InDesign®, Director®, Quark®, PageMaker®, 3DStudioMax®, AutoCad®, Quicken®, Money®, Peachtree®, Crystal Reports®, and the like; along with the software version, and any associated other client application files open or relatively recently opened; and any web browsers open or relatively recently opened (e.g. Internet Explorer, Firefox, Safari, Chrome, and the like) along with any associated urls and web browser applications (i.e. Google®/Yahoo® Ming® search, product sites, social networks, banking, video watching, blogs, email, and the like). Applications could also include those that run on a shared network and/or in the cloud, on a web-server/client, VPN, remote server/client, mobile device and/or the like.

In various non-limiting embodiments, the list of activity may include an associated navigation pathway and any functionality utilized in a functionality usage list. The functionality usage list would allow the user to display of all usage in chronological order, including changes and an undo/redo history that may not appear in a saved version, or limit the functionality usage list to, say only the functionality required to arrive at the saved version.

In addition, the IPACE system would preferably compare that functionality usage list to other documents (and similar) to find documents with similar functionality usage patterns by allow the IPACE system to perform the search automatically or by the user designating a specific portion of the functionality usage list or a plurality of portions from the functionality usage list. The user may designate which function or portion of functions are mandatory and which are non-mandatory within the search, where the non-mandatory functions may each include a relative search value, for example, by indicating a percentage of desire, say "zero to 99," where the user may designate that "99" is to be applied as just shy of mandatory and/or where "99" is applied to the search result rankings.

For instance, the user could search documents (or similar), say for any document that utilized a particular function or group of functions in Photoshop®, say a specific tinting function, on a specific layer function, with a specific hue function, a specific saturation function, and a specific intensity function that generated a specific shade of blue. Here the user may indicate what components of the document (or similar) search are mandatory, non-mandatory, and/or include the percentage of desire per function or group of functions. For instance, the specific tinting function is mandatory, the specific layer function is non-mandatory, and the specific hue function is mandatory, the specific saturation function is 50% desired, and the specific intensity function is 25% desired, where these values are incorporated into the document search analysis and search results, where the results would produce documents where some layer within the document was tinted the specific blue hue. The search results would rank the documents with the specific saturation function above those with the specific intensity function.

In various non-limiting embodiments, the user may also select a range to cover functions outside the specific function. For instance, the user could designate a range of saturations and/or intensities, where the results would all still include the specific hue function. The user could also or instead select a range of hues, where the search results would all still include the specific tinting function, but now with the range of hues designated. The user could indicate how to rank the hues, where certain hue values would be rank higher or lower than other hue values, and not necessarily, according to the traditional hue continuum where hues of orange come between hues of red and yellow. For example, the user could instead designate a specific hue or range of orange hues higher than a specific red or range of red hues, followed by a specific yellow hue or range of yellow hues.

For an Excel® spreadsheet type program example, the user could search for all spreadsheet documents where a hierarchy-steps-of-specific-functionality was utilized such as: "print-preview/page-setup/page/landscape." In addition, the user request may include additional specific functionality, ranges of functionality, and/or a plurality of the hierarchy-steps-of-specific-functionality or event hierarchy-steps-with-ranges-of-functionality. For example, the user could request the IPACE system search with the hierarchy-steps-of-specific-functionality "print-preview/page-setup/page/landscape" also include the hierarchy-steps-of-specific-functionality "header/footer/custom-header" and specifically where a "custom header" was utilized, and where the custom header included the specific text "confidential information."

In various non-limiting embodiments, the IPACE system would preferably suggest or automatically include wildcards, and/or the user could utilize wildcards, so that the text "confidential information" could search "confidential information*" (where the wildcard is after the text). Where, for example, the search could return spreadsheets that had "confidential information," "confidential information 2001," "confidential information Mar. 14, 2008," "confidential information, Matt O'Malley," and the like, but depending on a current set of wildcard system rules, perhaps not "adegy confidential information," where "adegy" precedes the designated text, unless the current set of wildcard system rules allows it and/or the user designated the text search as "*confidential information*" (where the wildcard is now before and after the text) or "*confidential information" (where the wildcard is before the text).

In various non-limiting embodiments, the IPACE system would preferably suggest or automatically include variations and rank the hierarchy-steps-of-specific-functionality according to a fitness result or goal. For example, the IPACE system would evaluate and generate a fitness result or goal for the "hierarchy-steps-of-specific-functionality" for "print-preview/page-setup/page/landscape" to be, for instance: "convert page layout from current mode (e.g. portrait) to landscape mode." For some fitness results or goals there may be a variety of methods or "hierarchy-steps-of-specific-functionality" to achieve the same fitness result or goal. When the IPACE system evaluates, assesses, and determines the search request, the IPACE system may automatically include variations and generate the results where the variations are annotated and/or ranked according to the fitness result and an overall fitness, where the overall fitness is an accumulation of the fitness goals; or the IPACE system may offer the user the ability to selective include variations, to what degree, and/or how to incorporate and/or prioritize.

For example, the search results could include documents that were converted to the "landscape mode" by a variety of methods, where those that incorporated the "hierarchy-steps-of-specific-functionality" for "print-preview/page-setup/page/landscape" would be ranked and prioritized relatively higher in the search results than those documents where the conversion to the "landscape mode" was achieved with different methods.

In various non-limiting embodiments, the user could also include such search parameters as a range of layers in Photoshop® or Illustrator® document, a range of pages or characters in word document, a range of spreadsheet tabs in Excel®, and/or the like.

In addition, the IPACE system evaluates, assesses, and determines the user's history to display his/her usage and functionality tendencies, where the IPACE system may track the associated steps and time required to achieve a particular fitness result or goal and/or a particular overall fitness goal. In various non-limiting embodiments, the IPACE system would preferably offer the user a suggested modification(s) to his/her usage that may save steps and/or time. The suggested modification could incorporate the usage patterns of other users, where the IPACE system tracks a range of users to evaluate and determine who is relatively the most proficient, efficient, successful, productive, and/or experienced.

In various non-limiting embodiments, the user could also include such search parameters as a temporal window of time, and/or by a particular author or range of authors, saved on a particular network, computer, folder, and/or subfolder, with a particular character or set of characters in the filename, by a particular software application or range of applications, with a particular data size (or range), within a particular folder (or range of folders), and/or the like. In addition, the user could include such search parameters as a modified date (or range), created date (or range), date accessed (or range), attributes (or range), status (or range), owner (or range), collaborators (or range), author (or range), title (or range), subject (or range), category (or range), pages (or range), comments (or range), and/or the like. Further, where the parameters may appear in the document (or similar) and/or are associated with a particular document (or similar) or associated with a range of documents (or similar), say by way of an associated description, comment, feedback metric, meta-tag, keywords, segment target, advertiser/brand, and/or the like; and where each parameter may include a range and/or variance tolerance.

In various non-limiting embodiments, the user could also include such search parameters as an artist (or range), album title (or range), year (or range), track number (or range), genre (or range), duration (or range), aspect ratio (or range), resolution (or range), dimensions (or range), bit rate (or range), protected (or option range), protection format (or range), camera type (brand, model and/or range), camera format (or range), compression rate (or range), recorded date (or range), edited date (or range), episode name (or option range), episode id (or range), data/content description (or range), talent/actors (or range), participants (or range), contributors (or range), audio sample size (or range), audio sample rate (or range), audio compression (or range), audio filters (or range), audio channels (or range), performed at (or range), audio talent (or range), executive produced by (or range), segment produced by (or range), field produced by (or range), directed by (or range), technical directed by (or range), controlled by (or range), product name, ID, model, version, and/or classification (or range), and/or the like. Further, where the parameters may appear in the document (or similar) and/or are associated with a particular document (or similar) or associated with a range of documents (or similar), say by way of an associated description, comment, feedback metric, meta-tag, keywords, segment target, advertiser/brand, and/or the like; and where each parameter may include a range and/or variance tolerance.

In various non-limiting embodiments, the user could also include such search parameters as a copyright date (or range), a trademark filed date (or range) per PTO classification, a trademark granted date (or range) per PTO classification, a trademark issued date (or range) per US state and classification, a trademark issued date (or range) per country and classification, a trademark application ID (or range) per PTO (or similar), a trademark grant ID (or range) per PTO (or similar), a patent application filed date (or range) per PTO classification (e.g. art unit or similar), a patent claim granted date (or range) per PTO classification, a patent granted date (or range) per PTO classification, a patent re-exam date (or range), a patent license date (or range) per country and classification, a patent litigation ID (or range) per court (or similar), a patent litigation ID (or range) per defendant or plaintiff (or similar), a patent continuation ID (or range) per country and classification (or similar), a patent assignor (or range), a patent assignee (or range), a patent art unit, a patent office action and/or restriction type (or range) per country and classification (or similar), government agency and/or department (or similar or range), country (or similar or range), and/or the like. Further, where the parameters may appear in the document (or similar) and/or are associated with a particular document (or similar) or associated with a range of documents (or similar), say by way of an associated description, comment, feedback metric, meta-tag, keywords, segment target, advertiser/brand, and/or the like, and where each parameter may include a range and/or variance tolerance. In addition the user could employ Boolean operators to include and/or exclude certain parameters in the search and/or search result rankings.

In various non-limiting embodiments, the user could also include such search parameters as a particular segment or segment range for demographics, psychographics, behaviors, and/or historical data and patterns. For instance, the search perimeters could designate and/or exclude documents relatively perceived, discerned, and/or known to have been created by a male over the age of 21 within a twenty mile radius of the zip code 90405. If the search is to "include," then the results could evaluate and incorporate this data into the results, where the IPACE system would preferably automatically prioritize all documents known or discerned to have been males above those perceived to be males (with a score of XX, followed by all documents known to have been create by people over the age of 21 (where the IPACE system would preferably prioritize 21 higher than 22, and so on), then prioritize all documents, known to have been created within a twenty mile radius of the zip code 90405.

In various non-limiting embodiments, the IPACE system analysis, indexing, scoring, ranking, and search perimeters could designate and/or exclude data/content (e.g. documents) relatively perceived, discerned, and/or known to have been created by a male over the age of 21 within a twenty mile radius of the zip code 90405. Further, where the IPACE system search includes not just documents that were "created" or "recently opened," but also documents that were viewed, requested, modified, commented, meta-tagged, published, faxed, scanned, printed, collaborated on, transmitted, translated, converted, compressed, correlated, associated, targeted, produced, and/or the like.

In various non-limiting embodiments, the IPACE system analysis, indexing, scoring, ranking, and search perimeters could designate and/or exclude data/content relatively perceived, discerned, and/or known to have been created for a particular individual or audience segment; produced for a particular individual or audience segment, targeted for a particular individual or audience segment.

In various non-limiting embodiments, the IPACE system analysis, indexing, scoring, ranking, and search perimeters could designate and/or exclude data/content relatively perceived, discerned, and/or known to have been "delivered to" a particular individual or audience segment, where "delivered to" could come from the list comprising: shipped, downloaded, streamed, emailed, SMS, MMS, IM, In various non-limiting embodiments, the IPACE system analysis, indexing, scoring, ranking, and search perimeters could designate and/or exclude data/content relatively perceived, discerned, and/or known to have been "acquired/interrogated/received," "purchased by," and/or "payment method" from a particular individual or audience segment, where "acquired/interrogated/received" could come from the list comprising: a rental, lease, unsecured acquisition, secured acquisition, purchased, loan/lent, bartered, trade, trialed, borrowed, downloaded, stolen, lifted, and/or the like; and/or may be conditional, such as with sufficient credit, per DRM (digital rights management), per shipping terms (e.g. COD), temporary (e.g. escrow), secured (e.g. with collateral), and/or the like. In addition, where "purchased by" comprises: a user's name, relationship (e.g. mother, friend, co-worker, and/or the like), a company name, and/or the like.

In various non-limiting embodiments, the IPACE system analysis, indexing, scoring, ranking, and search perimeters could designate and/or exclude data/content relatively perceived, discerned, and/or known to have been "exchanged" and/or "payment method," by an individual or audience segment, where "exchanged" and/or "payment method" could come from the list comprising: money, cash, credit, equity, debt, barter, wire, personal property, real property, intellectual property, stock, bonds, feedback, polling—data/statistics, status, points, and/or the like. In addition, "exchanged" could also include elevated and/or reduced points, demerits, and/or status regarding the list comprising: expertise, experience, education, skills, proficient, honesty, promptness, and/or the like. Further, these exchange parameters could also be bonuses, rewards, points, status, and/or demerits on top of a pre-agreed exchange.

In various non-limiting embodiments, the IPACE system analysis, indexing, scoring, ranking, and search perimeters could designate and/or exclude data/content relatively perceived, discerned, and/or known to have been "previously targeted segment" and/or where the IPACE system analysis, indexing, scoring, ranking, and search perimeters are based upon a particular perceived or known outcome evaluated against a list comprising: a fitness goal, file version (or range), file iteration (or range), file functionality utilized (or range), number of file functions utilized (or range), number of file edits made (or range), (or range), (or range), (or range), (or range), and/or the like.

In various non-limiting embodiments, the IPACE system analysis, indexing, scoring, ranking, and search perimeters could designate and/or exclude data/content relatively perceived, discerned, and/or known to "currently have," "have had," "had at particular window of time" and/or the like: a particular font style, and/or a specific font with a specific font size, a specific character or group of characters, and/or the like. For example, the search perimeters could indicate the font "wingbats 3," where the IPACE system would search for all documents containing the "wingbats 3" font. In another example, the search perimeters could include a specific character, say a character "X" which may represent an arrowhead symbol, where the IPACE system would search for all documents the arrowhead symbol for character "x" under the 'wingbats 3" font. The search perimeters could include "wingbats 1" and "wingbats 2."

In various non-limiting embodiments, the IPACE system analysis and search would preferably incorporate font characters (and/or symbol) meta-tag, where the search perimeters could designate a font character (and/or symbol) metatag associated with a character (and/or symbol) or tag associated within a group of characters (and/or symbols), such as the metatag "arrowhead" for all characters (and/or symbol) that have been metatagged as arrowhead(s); or the metatag "upward arrowhead" for only the characters (and/or symbol) metatagged "upward arrowhead." In various non-limiting embodiments, the IPACE system would preferably generate a meta-tag semantic engine and automatically include "arrow up," "up arrow," "arrow pointing up," and/or the like; in the search results; and/or offer the user the option to include what variations of each, and to what degree in the search and search result priority.

In various non-limiting embodiments, the IPACE system analysis and search would preferably incorporate Boolean operators. In addition, a particular system search for say the font: "wingbats 3" OR a particular symbol meta-tag: "arrowhead" could include documents from any application, where the font "wingbats 3" or the particular symbol meta-tag "arrowhead" meta was discernible from the document and/or the document index. For example, that particular system search could produce documents created in word, excel, illustrator, and even a protected adobe PDF file, if the Adobe PDF file was properly indexed with either containing the "wingbats 3" font or containing the particular symbol meta-tag "arrowhead."

In various non-limiting embodiments, the IPACE system analysis and search would preferably include such evaluations as to whether the document was checked for viruses or not, when, by what version, how relatively current the first virus-check-version is/was relative to the current second virus-check-version, and/or the like. For instance, only search for documents that have been checked for virus by a particular virus-check-version, say "X of McAfee."

In various non-limiting embodiments, the IPACE system analysis and search would preferably include such evaluations as to whether the data/content (e.g. document) was relatively recently, if ever, backed-up, including when, by who, by what means, functionality, relatively how recently when compared to other data/content (e.g. documents), correlated data/content, say by the same author, on the same computer, under the same folder, within the same time span, relative to a project, client, and/or the like. For instance, only search for documents that have not been backed-up in the past 30 days that are meta-tagged with the client name, say "McDonalds."

In various non-limiting embodiments, the IPACE system analysis and search would preferably include such evaluations as to whether the document is currently protected or was ever protected in a particular manner. For instance, by a particular encryption method, encryption version, behind a particular hardware firewall (e.g. model, version, and/or the like), behind a particular software firewall (e.g. model, version, and/or the like), and/or the like. In addition, if the document was ever checked for viruses or not, when, by what version, how current that virus check version was relative to the current version, and/or the like. For instance, only search for documents that have been checked for virus by version, say "X of McAfee." A search may include such evaluations as to whether the document was relatively recently, if ever, backed-up, including when, by who, by what means, functionality, relatively how recently when compared to other documents, say by the same author, on the same computer, under the same folder, within the same time span, relative to a project, client, and/or the like. For instance, only search for documents that have not been backed-up in the past 30 days that are meta-tagged with the client name, say "McDonalds."

In various non-limiting embodiments, the IPACE system analysis and search would preferably include such evaluations as to whether the document is currently the result of a translation or was ever translated into or out of a particular language. For instance, by a particular encryption method and/or version, by a particular authentication/verification method and/or version, behind a particular hardware firewall (e.g. model, version, and/or the like), behind a particular software firewall (e.g. model, version, and/or the like), password protected; PIN protected, shielded/protective shielding; print protected, edit/modification limited, comment/feedback limited, layers flattened, fonts suppressed, credits suppressed (e.g. author), and/or the like. In addition, if the document is an output result of another document such as an Adobe PDF file from, say a word document and/or the like; with any associated parameters, attributes and/or traits.

In various non-limiting embodiments, the IPACE system analysis and search would preferably include such evaluations as to whether the document is currently the result of a conversion or compression; or was ever converted or compress into or out of a particular format and/or compression scheme and/or rate. For instance, by a particular conversion format could include any conversions, say from a vector-based document format (e.g. Adobe Illustrator® file) into a jpeg document format (e.g. for Photoshop® or similar). For instance, by a particular compression scheme or rate could include a compression of a jpeg image from a RAW uncompressed format into a compression where the file size is temporarily compressed for say a zip-like compression, or compressed into a lower resolution, say a jpeg or similar compression scheme, where the file size is typically reduced in data size, storage size, and/or quality.

In various non-limiting embodiments, the IPACE system analysis and search would preferably include such evaluations as to whether the document was ever transmitted from, to, and/or via a particular client, server, hard drive, VPN, TCP/IP, bus, router, hub, pathway, gateway, mode, protocol, IP address, cellular network (including device, protocol, and/or location-awareness), wireless LAN (including device, protocol, and/or location-awareness), link, and/or the like. For example, via a particular smtp server, such as Gmail or the like. Another example, could be a LAN transmission between hard drives on different file servers.

In various non-limiting embodiments, the IPACE system analysis and search would preferably include such evaluations as to whether the document is currently, was ever, or never stored in a particular location or device, such as a particular hard drive, Flash Drive, transmitted via a particular client, server, hard drive, pathway, gateway, mode, protocol and/or the like. In addition, the search could include what OS (e.g. platform, clients/devices supported, version, and/or the like), computer components, peripherals, programming language for the source code, and any resources of the computer where the document was created. For instance, the document was created on a computer with an Intel i6-670 processor with 4 gb of DDR3 memory, a 1 TB Sata2 hard drive, 1 gb of VRAM, and running Windows 7 home premium 64 bit edition.

Further, the search could include a priority to the components and/or peripherals. For instance, a particular document could also have been modified by a number of other parties, where the search evaluation and prioritized results could be listed in associated with computer components and peripherals could expand, and/or the search could be evaluated and prioritized (and/or limited) to those computer components and peripherals that were used relatively the most in association with the document.

In various non-limiting embodiments, the IPACE system analysis and search would preferably include such evaluations as to whether the document was ever scanned, faxed, and/or printed and the relationship between the document and other related documents, such as the PDF that is a fax from a particular user (e.g. "Joe") of a particular word document with a filename (e.g. "xyz"). Another example could be a document file of a JPEG document that is from a scan that was performed a particular scanner (e.g. HP 2545 scanner) on a particular day (e.g. Mar. 2, 2006) for a particular project (e.g. "insurance claim Y").

Another example could be for a particular document that resides within a particular folder location and has been printed a relative number of times, say printed relatively the most for a particular party, say a boss. In various non-limiting embodiments, the IPACE system would preferably evaluate the documents within the particular folder location indicated and display a list prioritized by the number of times each documents has been known to be printed or relatively perceived to have been printed for the boss.

In various non-limiting embodiments, the perception evaluation as to whether a particular document was relatively likely to have been printed for the boss could include a at least one behavioral indicator, such as the time of day where the boss is known to relatively more likely request a document be printed. For instance, one particular behavior indicator of the boss could be when he schedules a face-to-face meeting with a particular client(s) (where the meeting may appear on a calendar or is manually entered by a party, such as the reception, when the client arrives), the boss tends to request documents to be printed out, especially relating to that particular client.

Other examples of the behavioral indicators as to whether a particular document was relatively likely to have been printed for the boss could also include data where the boss is known to relatively more likely request a document be printed, for say, before the boss is leaving the office for a scheduled face-to-face meeting with a particular client, trade show, or event; or other behavioral indicators such as a propensity to print documents for the boss when the document was an attachment to an email with over X number of pages and when printed within 48 business hours of receipt; a propensity to print documents for the boss from a particular folder prior to a package being shipped to a particular address, and/or the like.

In various non-limiting embodiments, the IPACE system analysis of data/content would preferably generate a list with prioritized items, say displayed as a table. Further, the IPACE system may generate a visual representation of the data/content, such as a rectangle for a document, where the visual representations may be displayed in a variety of display manners and/or priority manners. For example, a first display manner may be to tile the visual representations within an Excel® spreadsheet (or similar application, or similar appearing grid manner), where a first priority manner may be from top to bottom and based upon a variety of factors, conditions, user-inputs, and/or the like. For instance, the first priority manner may be relative to when each document was last opened, and where currently opened documents may be conditionally and/or via/per actor/user-prompt removed from the results, displayed manner, priority manner, tiling function, and/or the like.

In another example, a particular user could have twelve (12) Excel® spreadsheets open at the moment, and the IPACE system would evaluate the current state, and employ a second display manner to include all open spreadsheets with a second priority manner based on such factors as which spreadsheet/document the user has/had worked on most recently. Other priority manners may include prioritization factors, such as which spreadsheet/document the user worked on relatively the most (e.g. in terms of modifications overall), viewed relatively the most (e.g. as measured by which worksheet tab is active the longest, selected the most, and/or the like).

In various non-limiting embodiments, the priority manner may include documents that have tabs, layers, and/or the like, where the document layer or tab that is/was relatively most frequently checked as "visual" and/or is "active" within the layer stack/spreadsheet tabs by the user (opposed to buried relative below another document layer; or not visible worksheet tabs in the spreadsheet), and/or the like. The user could modify the evaluation criteria and/or prioritization results, where the "tiling" function would then re-display the documents according to the modified priority.

For example, the user could rearrange the documents with a visual drag and drop function, where the IPACE system would preferably automatically, systematically, continuously, persistently, conditionally, and/or via/per actor/user-prompt incorporate the user inputs. Further, the re-display could incorporate any user selection to add/include and/or remove/not-include a particular document be in the tiling (or similar) function. In addition, some documents could be temporarily and/or relatively permanently grouped to converser screen real-estate. This same document tiling and organizing could be utilized in evaluating, assessing, determining, rearranging, prioritizing, and tiling a plurality of open applications and/or active web browsers on the desktop, where some applications and/or active web browsers could be grouped together or regrouped as desired.

Relational Mapping and File Similarities In various non-limiting embodiments, the IPACE system and associated method for saving and tracking files would also generate a file map and a relational file mapping, where the relational mapping shows files that are and/or were relatively similarly, say file named, saved date, created date, modified date, authors, folders, subfolders, context, and the like. For example, the data/content in this document is a data/content overlap score of X compared to a particular list of documents. This comparison could include behaviors and patterns as well, where say, a particular participant tends to save his/her largest files on a particular day, a particular times, within X days and Y time to a deadline, and/or the like.

While saving files into individually categorized folders with sub-folders under the current state of the art may become relatively confusing to organize files, time consuming and difficult trying to remember the multiple folders utilized as time goes on and even more difficult with multiple users. For example, some files may have been saved under a particular folder that may have been named for a particular client, say "Client-A," but other files may have been saved under another particular folder that may have been named "Research-in-General" and/or "Legal-boilerplates." Consequently, it may be difficult to recall all the folders, files, and resources employed on a particular project or during a particular day. However, the IPACE's relational mapping system could take one discernible input or help a particular user discover one particular file, say a document A and then analyze that document and all its associations to generate and display the relational map that show all documents and the associations, for say when each was saved and/or opened within, say a two (2) hour window of when the document A was saved a particular moment in time, say two (2) months ago.

"Track/Report Creation, RTP, Shields, Inventorship, Assignments and Ownership" module in a block 442 Conception To Reduction-To-Practice (RTP) Tracking Alerts: In various non-limiting embodiments, the IPACE system and the computer-implemented method continually tracks and analyzes events, including a conception and subsequent events as part of a RTP tracking and alerts. In various non-limiting embodiments, the data storage, tracking and analysis would send out an alert if there is known to be, discerned to be, and/or perceived to have been no input for a specific period of time. For example, in a 1.131 swear behind declaration (or similar), the PTO states that any abandonment of a project may cause loss of a claim to an earlier priority date, where depending on the circumstances, in some cases the PTO has asserted just going more than two days may cause abandonment. So, the IPACE system would preferably send out reminders or "notification alerts" to key Participants (80), say after 38 hours and every hour thereafter, reminding the Project Manager (43), and/or inventor (s) (70) to continue his/her efforts promptly and not potentially abandon the RTP efforts short of any PTO assertion otherwise. In various non-limiting embodiments, the alerts could continue up to the time remaining to say, 48 hours of continued non-participation/non-contribution. In various non-limiting embodiments, the IPACE system would track any new inputs, for say creating, testing, and/or a journal entry as to exactly what and why they are currently working on something else to later explain and cover these types of time gaps. Any "assumed to be PTO acceptable time gap explanations" could be categorized from a list that is based upon, say previously accepted, and/or pre-established as permissible reasons allowed by the PTO for not working on the particular invention for a certain period of time.

For example, an inventor may spend several days in a row, say twenty (20) days, typing new data/content into a particular section of a particular written disclosure for a particular invention only to later decide that he/she wants to cut out this entire new data/content/section out of this particular invention and submit this data/content/section as a completely different invention. Under this scenario, the IPACE system would need to track this anomaly; otherwise the record may potentially and incorrectly reflect a twenty (20) day time gap in the due diligence of the inventor to create a constructive reduction to practice.

In various non-limiting embodiments, these "assumed to be PTO acceptable time gap explanation" categories would likely vary depending on the circumstances surrounding the particular invention, the Participants (80), and other factors, such as is this invention being developed at work as an Employee (55) or outside work, on the teams free-time. The notification alerts could escalate, if and where appropriate, to other parties working on the project/invention and/or at least until the adequate input was accomplished and the 38 hour clock starts again. Once a qualified member contributed an assumed to be PTO adequate contribution to the particular invention/inventive process, the IPACE system would preferably send out another alert to the other Participants (80) that the 48 hour rule has been satisfied, by whom, and depending on the Participants (80) viewing privileges (role) for what exactly. If, on the other hand, a Participant (80) simply entered a particular time gap explanation, the IPACE system would preferably be set to continually give alerts until an actual and assumed to be PTO adequate contribution to the particular invention/inventive process was contributed.

In various non-limiting embodiments, these "assumed to be PTO adequate contributions" and "assumed to be PTO acceptable time gap explanations" would constantly be updated per current known or discerned case-law, PTAB/BPAI cases, and PTO petition hears, and contain relevant annotations. Further, the IPACE system would track and monitor all cases involving any and all existing and any previously assumed to be "PTO adequate contribution" and/or "PTO acceptable time gap explanation" to incorporate whether the particular assumption was strengthens, sustained, challenged, weakens, reversed, etc. Depending on the notification conditions allowed for the project; per each participant, and/or the default condition settings that have not or have been modified by each participant, these updates could be sent in real-time to all participant; to pre-selected Participants (80), and/or conditionally when and where pre-determined to be necessary.

Same goes for other alerts the users may setup. For example, there may be an alert countdown setup with similar conditions as outlined above associated with the statutory deadline for filing a non-provisional application off of a filed provisional, where, say the Lead Inventor (40), Patent Attorney (44), and/or Project Manager (43) is notified, say ninety (90) days prior to the deadline, and again as conditionally setup and/or in reduced increments, say again at seventy-five (75) days, up until the application is actually filed, or some other condition is met, say the notifications are turned off, or a particular condition is met within a particular amount of time.

For instance, a condition could be no alerts if the assignment of claim drafting is done on time and per the preset conditions of, say a first draft of the claims submitted to the Lead Inventor (40) no later than seventy-five (75) days before the statutory deadline; modification instructions regarding the first draft of claims from the Lead Inventor (40) back to the assigned Patent Attorney (44) no later than sixty (60) days before the statutory deadline; a second draft of the claims submitted to the Lead Inventor (40) no later than fifty (50) days before the statutory deadline; modification instructions regarding the second and, say final draft of claims from the Lead Inventor (40) back to the assigned Patent Attorney (44) no later than forty (40) days before the statutory deadline.

In various non-limiting embodiments, the alert system could be setup to send out notifications and, if necessary, conditional escalation notifications for anything submitted outside these pre-set conditions. In addition, the IPACE system would preferably have rules where certain members, say the Lead Inventor (40), could adjust these rules on the fly, and/or alerts when and where contractual obligations need to be adjusted to be factor in discrepancies, accelerations (rewards, compensation, and/or bonus status points), rush charges, and/or breaches, violations and/or subsequently needed adjustments, invoked remedies, liquated damages, and/or restrictions.

Computer-Implemented Assignment

In various non-limiting embodiments, the IPACE system and the computer-implemented method creates assignment agreements, whereby the user may provide equity/ROI, say 2-5% for some others to contribute in a patent invention and filing prep, say post all develop and legal expenses and/or post a certain event, say licensing and/or dollar amount Track/Assignments And Relative IP Assigned In various non-limiting embodiments, the IPACE system and the computer-implemented method tracks and analyzes who and which entities have the relatively the most IP assigned to them. In various non-limiting embodiments, the IPACE system also tracks and analyzes how relatively long after the IP was filed (e.g. on average) and relatively compared to the number of filings with Assignment before applying; how long to become assigned; per art unit, keywords, number of pages, number of figures, number of claims, and the like. For example, a "Company A" may have more patents assigned to them under the keyword "mobile," but where the majority were assigned before filing. Whereas, a "Company B" has relatively far more IP assigned to them under a particular keyword, say "mobile" and where the assignment to a particular entity was put in place after a certain "X" date or certain relative date, such as the "issue" date.

"Track/Report States, Iterations and Versions" module in a block 443

Computer-Implemented Document Searching

In various non-limiting embodiments, the current state of the art typically tracks when a document was created date and/or modified date, but in some environments and applications, it may also be beneficial to track exactly which user opened the document when, viewed what when, how, for how long, and where.

Track Who Opened What When

In various non-limiting embodiments, the IPACE system and computer implemented method for saving and tracking data/content that would track exactly which a particular user opened a particular document when, what was viewed when, how, for how long he/she dwelled within document (or similar) and where was the user at the time (e.g. by IP address, GPS, Cellular triangulation, Wi-Fi hot-spot, and/or the like); employing what computer, device and/or computer software, via what type of connection, moused over what, how, when, and where; typed what, when, where, and how; scrolled through what, when, where, and how; and/or the like.

In various non-limiting embodiments, the IPACE system would allow a first user to retrieve documents recently viewed that may have been created and modified years earlier without having to recall a file name or the like. After opening the file, the IPACE system would preferably annotate where the first user or a second user or a plurality of associated users viewed, dwelled and the like. The IPACE system would preferably allow the first user display relation maps relative to a particular user or data point, and/or view a frame-by-frame playback of how the document (or similar) was viewed and/or interacted with over a timeline, such as chronologically, where the first user may pause, and select specific moments of time and/or events based upon, say a histogram which displays relative usage, dwell times Over the course of time per the first user, the second user and/or a plurality of users.

In addition, a particular user could request a specific number of documents, say the last 50 documents, where the user may specify, say the last 50 documents modified in general, associated to a particular document, project, user, or say irrespective of when the documents were created or modified, but specify the last 50 viewed in-general by a particular user or segment of users, on say a particular project.

This functionality may help users locate documents on the IPACE system with limited usage and without knowing a particular creation or modification date or narrow date/time window. Further, the search could include a particular software application, a particular creator/author, and/or a particular viewer.

Relatively Similarity Determination

In various non-limiting embodiments, the IPACE system and associated computer-implemented methods track and analyze data/content score, data/content and data/content correlations to generate a relatively similarity determination, score, ranking, and/or the like. The IPACE system generated relatively similarity determination would preferably include a predefined set of conditions, methods, data/content locations, and/or the like, where the predefined set of conditions could filter, limit, weight, and/or the like, the IPACE system analysis for the relatively similarity determination(s) to a particular window of time; a particular group and/or segment of: companies, computer types, physical location, IP addresses, databases, folders, applications, documents, projects, participants, and/or the like.

Specific Fitness of Overlapping Items

In addition, the IPACE system generated determinations, scores, rankings, and/or the like, for the relatively similarity would preferably include a set of fitness conditions and/or thresholds to generate a perceived overlap incident. The set of fitness conditions and/or thresholds may comprise a specific number of overlapping exact inputs per input device type (e.g. character-inputs/keystrokes on a keyboard); a specific fitness of overlapping items (e.g. words, terms, phrases, pixels, numbers, formulas, colors, characteristics, definitions, acronyms, and/or the like) in a particular sequence and/or proximity of each other; a perceived fitness overlapping in input methods (e.g. relatively similar character-inputs/keystrokes on a keyboard); a perceived fitness of overlapping items (e.g. relatively similar words, terms, phrases, pixels, numbers, formulas, colors, characteristics, definitions, acronyms, and/or the like) in a particular sequence and/or proximity of each other; a specific fitness of overlapping items (e.g. words, terms, phrases, pixels, numbers, formulas, colors, characteristics, definitions, acronyms, and/or the like) in a relatively similar sequence and/or proximity of each other; and/or the like.

For example, the specific number of overlapping exact inputs per input device type (e.g. character-inputs/keystrokes on a keyboard) may include the predefined set of conditions for filters, limits, weights, and/or the like; where relatively commonly (e.g. in-general, to an industry, art unit, company, project, document, and/or the like) utilized data/content (e.g. word, phrases, terms, acronyms, symbols, and/or the like); may be scored differently than a relatively unique (e.g. in-general, to an industry, art unit, company, project, document, and/or the like) data/content (e.g. word, phrases, terms, acronyms, symbols, and/or the like). For example, a specific phrase may say: "in this preferred embodiment," where the specific phrase may be relatively unique to phrases in general (e.g. documents in public domain), but relatively not unique within the world of a particular patent application family. Preferably, a particular preset could be automatically, systematically, continuously, persistently, conditionally, and/or via/per actor/user-prompt setup, where the specific phrase and/or relatively similar phrases (e.g. "an embodiment," "in one embodiment," "in another embodiment," and/or the like) are weighted to score relatively low until addition relatively unique words are added.

Real-Time Alert

Consequently, a subsequent typing of the specific phrase would still generate a relative similarity determination and score, but where the presets and/or score could determine the relative similarity as an insufficient overlap condition to, say generate an alert in real-time. Each incident may automatically, systematically, continuously, persistently, conditionally, and/or via/per actor/user-prompt prompt an alert, say in real-time, near-real-time, in a generated list of alerts, and/or the like, to the user. Further, the prompt to send the alert may include a plurality of interactions and/or actions/responses, comprising: the alert notification, an acknowledgment, a challenge, a suggestion, a counter offer, a concern, a poll, a vote, a decision, a complaint, a work-around, a modification, and/or the like. The plurality of interactions and/or actions may comprise the user, a specific originator of correlated data/content, a particular collaborator, the project manager, lead inventor, a group and/or segment of members/users/participants, and/or the like.

Further, the alert may incorporate the data/content overlap as a "cut and paste" copy, with an image of the overlap, with a link to the overlapping data/content, an attachment, and/or the like. In addition, the alerts, alert interactions, actions/responses, and/or the like, may be sent/interrogated/received, and/or the like, via any means sufficient, suitable, and/or the like, to convey the necessary information and interrogate/receive the necessary action/response, including a method involving an alert function within the host application of the document, data/content, a separate application, mobile applications, SMS, MMS, IM, email, attachments, images, video, audio, wireless, land-line, VoIP, voicemail, and/or the like.

Each incident, alert, alert notification, interaction action/response, and/or the like, may include a set of conditions, say where the user may be limited, restricted, and/or the like from certain data/content, documents, data, statistics, applications, input devices, networks, databases, features, functions, and/or the like, until a specific and/or particular action/response is satisfied. For example, the user may be alerted, notified, prevented, and/or the like, from filing specific data/content within a patent application until the specific and/or particular action/response is satisfied. For instance, under the IPACE TOU, the TOPs, Rights management, negotiated terms, and/or the like, the user may be specifically and/or conditionally required to interrogate and/or receive prior specific approval from and for, say the discernible and/or perceived data/content originator prior to sharing the data/content with others (e.g. specific members, outside a specific PIN, publically, and/or the like), before collaborating with others, before editing data/content further, before posting the data/content at a particular location/site/database, before publishing the data/content without credit to the discernible and/or perceived data/content originator, publishing the data/content even with credit to the discernible and/or perceived data/content originator, and/or the like.

Particular Fitness Proximity

For example, the specific fitness of overlapping items (e.g. words, terms, phrases, pixels, numbers, formulas, colors, characteristics, definitions, acronyms, and/or the like); where relatively commonly (e.g. in-general, to an industry, art unit, company, project, document, and/or the like) utilized data/content (e.g. word, phrases, terms, acronyms, symbols, and/or the like), may be similarly scored differently than a relatively unique (e.g. in-general, to an industry, art unit, company, project, document, and/or the like) data/content (e.g. word, phrases, terms, acronyms, symbols, and/or the like) and where the analysis incorporates the particular sequence and/or proximity of each data/content to other correlated data/content and where the analysis may include the predefined set of conditions for filters, limits, weights, and/or the like. Further, the particular sequence may include rules regarding a variety of word sequences with the exact words, relatively similar words, user-scored words/terms/sequences, and/or the like.

In various non-limiting embodiments, the particular fitness proximity of each item to another may include a count expressed as the count from one item to another, say from one specific item/character to a second item/character; a count for a word separation, and/or the like. Further, the particular fitness proximity of each item to another may include a correlation of points expressed as a distance or relative similar location; from one item to another, from one specific item/character to a second item/character; a measurable distance from one item to another, a measurable distance and/or gap from the center of a page, image, from the beginning of a document, video, and/or the like; a relative particular location (e.g. on a page, figure, in a part, image, a particular video frame, and/or the like); a relative particular moment in time (e.g. ten seconds into an audio clips, one minute from a particular event in a video clip, and/or the like); and/or the like.

For example, the perceived fitness overlapping in input methods may include relatively similar inputs/keystrokes on a keyboard, say the repeated usage of the "cut paste function" with "voice commands." The perceived method overlaps other perceived methods of input may incorporate and comprise tracking and comparing, characters, numbers, sequence, functions, locations, times, participants, context, data/content, input device, keystrokes, and/or the like.

For example, the perceived fitness of overlapping items in a particular sequence and/or proximity of each other may incorporate and comprise tracking and relatively comparing perceived similarities, quantities, qualities, and/or the like, of correlated words, terms, phrases, pixels, numbers, formulas, colors, characteristics, definitions, acronyms, and/or the like. Whereas, the specific fitness of overlapping items in a relatively similar sequence and/or proximity of each other would be limited to the terms of the specific fitness, but would incorporate and comprise tracking and relatively comparing perceived similar sequences and/or proximities.

In addition, each incident, alert, alert notification, interaction action/response, and the like may be scored and compared within its comparative group, and/or relative to all groups, where additional filters, conditions, weighting, and/or the like, could be applied so that data/content within a particular category with relatively stricter components are not relatively crowded out by relatively less strict components when display and ranking a list of all alerts, or all incidents.

In various non-limiting embodiments, the IPACE system analysis would have a variety of methods to analyze the relative similarity of the data/content and data/content correlations of, say the data/content and data/content correlation of an open document to other documents, data/content, data, statistics, and/or the like. One computer-implemented method would preferably be conducted in a manner where there is a relatively little latency or distraction to the user while he/she is viewing, editing, and/or the like, the open document. Another computer-implemented method would preferably be conducted in a manner where the user may be notified automatically, systematically, continuously, persistently, conditionally, and/or via/per actor/user-prompt in real-time, near-real-time, intervals, on-request, after an overlap incident surpasses a set of threshold conditions to become a relatively similar data/content incident.

For example, a particular IPACE member/user opens a file, retrieves data/content, and/or like, where the IPACE system preferably discerns a plurality of data, statistics, characteristics, history, and/or the like, about the data/content and data/content correlations, such as who created, edited, suggested, reviewed, scored, challenged it, and/or the like; where, when, how, why, and/or the like. For example, when a document (e.g. document, spreadsheet, computer code, drawing program, presentation application, email/calendar/tasks program/website, and/or the like) is opened, the IPACE system would preferably automatically, systematically, continuously, persistently, conditionally, and/or via/per actor/user-prompt analyze and relatively compare data/content, correlated data/content, and/or the like, in the document to existing data/content, to generate a list of relatively similar data/content. For example, the IPACE system would preferably relatively compare each document and generate a relatively similarity data/content score, where a higher relatively similarity data/content score reflects a perceived relatively closer data/content match, a one-hundred percent (100%) relatively similarity data/content score reflects a perceived exact match, a zero percent (0%) relatively similarity data/content score reflects a perception of no data/content overlap (e.g. a document and unrelated image), and/or the like.

In various non-limiting embodiments, the IPACE system and associated computer-implemented methods automatically, systematically, continuously, persistently, conditionally, and/or via/per actor/user-prompt save iterations of a project, document, data/content, portions of data/content, and/or the like, relative to a timeline, where the IPACE system provides a list of historical iterations/states to view, recall, revert to, and/or the like. In addition, the saved iterations of a project, document, data/content, portions of data/content, and/or the like, relative to a timeline, may generate the timeline, where the timeline may be relative and/or filtered per a particular item, proximity, sequence, function, concept, section, section header, word, term, phrase, moment in time, time range, save iterations, participant, group, segment, and/or the like. For example, the IPACE system would preferably generate a time of data/content modifications, where the timeline only displays iterations (e.g. iterations of a document), discernible and/or relatively perceived to be associated with a particular embodiment, and sequentially. Here, the IPACE system would preferably filter out iteration that is not associated with a particular embodiment, where the user could view, revisit, edit, incorporate, and/or the like, any iteration, portion of an iteration, and/or the like, as well as comments, suggestions, alerts, and/or the like at each iteration.

Play Selected Iterations Like a Movie

In various non-limiting embodiments, the IPACE system would preferably provide a method for visually displaying and playing the iterations along the timeline, similar to a frame-by-frame animation. Here, the IPACE system would preferably automatically, systematically, continuously, persistently, conditionally, and/or via/per actor/user-prompt could adjust a playback speed, variant speed, frame rate, direct, pause, stop, store, modify, and/or the like. In addition, the IPACE system would preferably automatically, systematically, continuously, persistently, conditionally, and/or via/per actor/user-prompt could adjust the relative placement of the data/content, comments, edits, suggestions, and/or the like, frame-by-frame, along with data, statistics, terms and correlated data/content comprising any changes in metrics, say participants, collaboration, negotiations, pay, equity, points, status, and/or the like, where each may be represented by a graphical representation, say a histogram where the relative area is relative to a perspective of the system, a particular user, group of users, segment of users, and/or the like.

Incorporate Other Data

For example, the relative perspective for a particular pay increase may be perceived as a relatively significant benefit by the particular user who received the pay increase, versus from the perspective of the company paying the increase. In addition, each could apply a different set of conditions, weighting, value to such events along the timeline of iterations to visually compare with the evolution of, say a concept, project, and/or the like, where the project could also be visually represented in terms of progress, value, accomplishments, quantity of data/content, quality of data/content, and/or the like. In various non-limiting embodiments, each could be scored from the perspective of the system, a particular user, group of users, segment of users, and/or the like. Further, the data, statistics, perspectives, scores, and/or the like, could evolve over time, when more data/statistics become available, say when the application is filed, and the IPACE system may better analyze the iterations of over time to determine, say how relatively closed to completion and/or relatively well-written at each iteration it was; when compared to data/content in the filed application, amended application, granted application, monetization event, litigation, and/or the like. Each metric could be selectively combined, and/or independently displayed, and/or display with overlapping data/statistics from other metrics (e.g. comparing relative progress to relative pay).

Layered Collaborations

In various non-limiting embodiments, the IPACE system analyzes relatively successful pairings, groupings, combinations, permutations, collaborations, collections, and/or the like, of participants, contributors per time-stamps, where one layer may be merged with another to analyze and visualize pairings, groupings, combinations, permutations, collaborations, collections, arrangements, and/or the like, per such components as value projections, estimates, projections, and/or the like, per a time-stamp, time window, stage, and/or the like. For example, the IPACE system analysis at a particular time-stamp would preferably provide a list of key components the analysis discerned and/or relatively perceived as key to future success, valuations, monetization events, product/service protection, revenue/profit protection, and/or the like, along with pairings, groupings, combinations, permutations, collaborations, collections, arrangements, and/or the like. Further, where each may be visually isolated, and/or selectively overlaid, compared, combined, and the like, with projection scenarios displayed overtime, say as a graph (e.g. a bar chart) on a timeline of projections for each. In addition, where each isolation, pairings, groupings, combinations, permutations, collaborations, collections, arrangements, and/or the like, could relatively list and graphically display, compare, animate and/or the like, a relatively likelihood for each projected scenario per selected metrics.

For example, a particular user selects a particular time window that starts today, say after just receiving a USPTO office action with a list of examiner asserted rejections, each with a list of specific art references, and where each reference typically cites and asserts a correlation to a pending claim element. For instance, the IPACE system analysis would provide the list of key components discerned and/or relatively perceived as key to a variety of outcomes, where the user selects to isolate a budget range and a future valuation.

Scoring and Ranking Key Components

In various non-limiting embodiments, the list of key components would then be scored, ranked, and displayed, where a particular component, say a one month extension is scored as the relatively most significant component to future success. Here, the IPACE system would preferably offer a list of display options, where a first display option may suggest filtering out components discerned and/or perceived as relatively invaluable in isolation, such as the one month extension. A second display option may group components discerned and/or perceived as relatively inseparable, such as the one month extension and a particular group of patent attorneys, where the IPACE system analysis discerned and/or perceived as relatively unavailable and worth the one month extension fee when analyzed for the budget range and the future valuation.

In addition, the IPACE system analysis and display options could include and/or incorporate a conflicts check, where some components or segments, such as a patent attorney segment, would generate a potential conflict score, say due to a cited art reference, a correlated reference on a correlated IDS list; a ascertained, discerned, and/or perceived list of clients correlated with the particular patent attorney, and/or the like. Further, the relative and/or potential conflict could incorporate an analysis of examiner assertions, where the analysis of examiner assertions may be discerned, and/or perceived as a relatively poor fit (e.g. for an asserted reference correlation to a pending claim element), and/or the like. In various non-limiting embodiments, the IPACE system would preferably automatically, systematically, continuously, persistently, conditionally, and/or via/per actor/user-prompt communicate the discerned, and/or perceived relatively poor fit to a review body.

In various non-limiting embodiments, the IPACE system analyzes relatively successful pairings, groupings, and/or the like, of any combination, permutation, collection, and/or the like, say related to a particular company, project, art unit, window of time, law firm, budget, and/or the like to isolate components, combinations, collections, and/or the like, discerned and/or perceived to relatively contribute to an outcome (e.g. success or failure). For example, the IPACE system analysis of a specific patent family would isolate, score, and rank the relative success each was discerned and/or perceived to contribute in isolation, in combinations, collaboration, and collections to generate additional scores. Here, the scores could isolate a particular language translator as a relatively key component of successfully prosecuting patents in a particular company, and where the relative success is increased/decreased when combined with particular project managers, attorneys, budgets, deadlines, art units, and/or the like.

In various non-limiting embodiments, the IPACE system analyzes relatively successful pairings, groupings, and/or the like, of any combination, permutation, collection, and/or the like, say related to participants, contributors per time-stamps, where one layer may be merged with another to analyze and visualize combinations, arrangements, and/or the like, per such things as time-stamps and value per estimates, projections, and/or the like.

Document Saving and Retrieving

In various non-limiting embodiments, the IPACE system that may generate a list and display a lineage of documents, where each version, iteration, modification, and/or the like; as well as each association (between modification, version and iteration) and historical pathway (within the document and between documents) is displayed; and where a particular user may sort the list by such factors as a number of edit made in a document and/or between documents. Further, the list could be evaluated to include the perceived, discerned, and/or known authors, and edits per author, the words and keywords introduced, so that the list may be sorted by when key elements or characters (e.g. numbers, words, phrases, acronyms, abbreviations, definitions, and/or the like) were first introduced, modified, and/or the like.

Retrieving Via Correlations and Viewing Dwell Times

In various non-limiting embodiments, the IPACE system would preferably provide a method for locating and retrieving files relative to data/content and data/content correlations. For example, the IPACE system would preferably allow a first user to retrieve documents recently viewed that may have been created and modified years earlier without having to recall a file name or the like. After opening the file, the IPACE system would preferably annotate where the first user or a second user or a plurality of associated users relatively viewed, dwelled and the like, over the time the document was open, where, by who, when, and/or the like. The IPACE system would preferably allow the first user to display a relationship map relative to a particular user, correlated data/content, data/content portion, comment, suggestion, alert, data point, and/or view a frame-by-frame playback of how the document (or similar) was viewed and/or interacted with over a timeline, such as chronologically, where the first user may pause, and select specific edits, inputs, comments, alerts, modifications, metrics, metric changes, and/or the like.

Comparing Documents/Specifications

In various non-limiting embodiments, the IPACE system and the computer-implemented method searches data/content, correlated-data/content, media, tags, data, statistics, and/or the like, to analyze and relatively compare, say a first and second data/content, say per a first and second patent application (e.g. different versions). Here, the IPACE system would preferably analyze the relative differences comprising a relative difference in modifications, words utilized, phrasing, definitions, lexicon, numbering, referencing, credits, Inventorship, rights, claims, participants, budgets, timelines, TOU/TOPs employed, goals, and the like.

For instance, the IPACE system would preferably analyze and compare the first patent application that is a particular version that was submitted as a provisional; and relatively compare it with the second patent application, that is a particular version that was granted a patent, where the granted patent version references the first (provisional) patent application. Here, the analysis would preferably include a relative comparison of a list of modifications (e.g. data/content adds and/or deletions), a correlation and relational mapping of lexicons (e.g. word, term, acronym, usage and definitions), including where each usage and relative definition appears, is discerned and/or perceived to apply (e.g. the first (provisional) patent application has a first term incident/usage of a term "transceiver" with a specifically cited definition located at page 3, paragraph 1, per published version P1 (e.g. on D1 date with ID number N1), and an additional twelve (12) discerned incidents/utilization (with page/paragraphs), all incidents/utilizations are perceived relatively likely (e.g. 95% and higher for each) to have the same definition (e.g. where there may be separate scores generated and compared for the perceived definition and a perceived desired definition per incident/usage) as the first term incident/usage and the specifically cited definition; whereas the second (granted) patent (application) per published version on X date with ID number N2.

In addition, the definition analysis per incident/usage would preferably include separate scores generated and compared for the perceived definition and a perceived desired definition per incident/usage, per data/content. The perceived definition per a particular incident/usage of a particular term (e.g. mouse) may be based upon a variety of conditions, data, correlations and statistics, where, for example, a discerned lack of a specifically cited definition for a particular term would invoke an analysis of that particular term in each context of each incident in each correlated application, each embodiment, abstract, claim, claim element, claim element portion, each portion of neighboring correlated language, each neighboring and/or correlated definition (e.g. discerned, perceived to correlate, cited by a participant (e.g. examiner, judge, SPE, applicant, attorney, and/or the like); and/or the like.

Computer-Implemented Tracking and Tagging

In various non-limiting embodiments, the IPACE system and associated computer-implemented method lets a particular user see a visual of every file and allows the user to create tag(s) for better indexing each file and/or makes tag suggestions. Beyond the tags created and assigned by the user, the IPACE system may begin to suggests tags to the user and/or automatically employ a list "suggested tags" based upon tags used by the user, other users of the same files, other users of the same system, and by employing data analysis, correlations algorithms, and/or comparisons rankings of such discerned data as, say similar files containing:

- similar software used to create the file (e.g. Word® documents, Excel® spreadsheet, PowerPoint® presentations, Outlook® email, and the like);
- similar software versions (e.g. both Word® 2007 versus Word® 2003);
- similar formatting, templates, style sheets, CSS, structure, and/or fonts (e.g. say employing a unique style-sheet analysis and document comparisons);
- similar data size of files (e.g. say employing a conditional and adjustable threshold with a default setting of say plus/minus 300 kb for, say Word® documents, and unique settings for other software types, where the IPACE system may do, for instance, an analysis of what kb and/or mb size would create X amount of folders, say ten (10) delineated folders);
- similar dates created, modified, interrogated, received, and/or sent (e.g. a conditional and adjustable threshold with a default setting of say plus/minus seven (7) days and/or the IPACE system would preferably employ a similar analysis of what "plus/minus day and time range window" would create X amount of folders, say ten (10) delineated folders);
- similar text, keywords, people's names, company/business names, product names, work titles, and/or numbers (e.g. say keyword analysis and document comparisons, unique similar sentences/clause structure analysis and document comparisons);
- similar tables and table-related elements comparison (e.g. say an analysis comparing tables, spreadsheets, worksheets, table components, formulas employed, table cell data/contents, cell arrangement(s), worksheet labels and/or unique data fields with text and/or calculations and document/spreadsheet/field comparisons);
- similar presentation styles (e.g. presentations, such as PowerPoint®, with similar templates, colors, formats, data/content, and/or slide heading text analysis and document comparisons);
- similar layering styles (e.g. documents, such as Adobe Illustrator® or Photoshop® with similar layer structure, and/or layer labeling);
- similar undo histories (e.g. both in terms of the order and the elements in the undo history);

similar data/content inserted and/or attachments (e.g. photos, tables, salutations, phone numbers, addresses, subjects, and the like);

similar folder location (e.g. Folder A, subfolder A.1, and subfolder A.1.1);

similar file feedback and/or rating (e.g. say using a predefined Lickert scale for rating the file for a number of factors, conditions, and/or issues, such as on a scale of zero to ten (10) where ten (10) is the best rate files for the following (1) well written? (2) re-useable legal templates? (3) contract/agreement? (4) company-friendly agreement vs. Employee (55)), and the like.

Identifying/Labeling/Tagging and Suggesting

In various non-limiting embodiments, the user may select the ability to use all suggested tags, but to indicate/annotate any "suggested tags" specifically as a "suggested tag" should the user later see that something is a mislabeled tag. When the user makes a modification and/or correction to a "suggested tag," the IPACE system may then go back and search all the files that may also have mislabeled tags by employing this new information from the user and annotating any similar "suggested tags" and through an analysis of similar conditions and similar data and create a list of files with "possibly mislabeled tags" again based upon such discerned data as outlined above, say similar file types, similar dates created, similar data/content, similar folder location, and the like. In various non-limiting embodiments, the IPACE system would preferably display a list of all similarities employed in creating the "suggested tag(s)" to the user, whereby the user could toggle off/on a particular metric currently employed/not-employed and/or adjust the threshold(s) employed for a particular metric in the checklist to visually witness how this affects the number of occurrences of the "suggested tag" and/or the number of other files with similar "suggested tag" occurrences. In addition, the user could load another suspected file with a mislabeled tag where the IPACE system would preferably display the metrics and thresholds employed and where the user could again make adjustments, further improving and tailoring the metrics, algorithms, and thresholds for tagging this particular user's files, and/or this particular filing system of files.

In various non-limiting embodiments, these above methods for "suggested tags" may also be employed with tags applied by the user, where the IPACE system may also search and analyze for relative anomalies and/or contradictions is the correlations to find potential errors, and/or allow the IPACE system and/or user to incorporate the relative anomalies and/or contradictions into the current analysis, metrics, algorithms, and thresholds into the user created tags, suggested tags, adjusted tags, and mislabeled tags. Here again the IPACE system would preferably track, analyze, generate and display a list of files, and the associated tag, data and the current metrics, algorithms, and thresholds, along with annotations regarding which analysis, metrics, algorithms, and thresholds are associated with which tags and type of tag: "user-created," "suggested," "adjusted," and "mislabeled," along with when the labeling was done and/or other possibly known fields for comparison and analysis such as: by who (e.g. say the user or the system); for what (e.g. say of a particular project was started and/or completed); where (e.g. say on a particular file server when at the office versus on a laptop remotely during my trip to China); because why (e.g. say to correct a known or discerned error with a system "suggested tag" for "Good," where the IPACE system thought "Good" related to feedback, but "Good" meant the company "Good" Technologies); how (e.g. say by turning down the threshold or completely off regarding the data metric employed for file feedback when it comes to the tag "Good" and/or where the IPACE system suggests changing the tag label name from "Good" to "Good Technologies"); and/or the like.

In various non-limiting embodiments, the IPACE system may take all tags and make the files searchable by a tag and/or a Boolean tag search. In addition, the IPACE system may create searchable folder hierarchies based upon the tags "most used" to "least used," so that the user may find files by means other than traditional folder structures where the file is within a single folder and difficult to locate, let alone tag correctly. Yes, some users create copies of files and/or shortcuts to the original, but this may actually make the locating, tagging, and tracking of files more difficult, since for one, the original file location may have made sense when it was originally created, but overtime, it no longer it may no longer be a logical place to locate the file, say in a folder hierarchy starting with, say a client's name, with a particular project name subfolder, with a particular year subfolder, and a month subfolder.

In various non-limiting embodiments, that filing system may prove very useful, say within the same month the file was originally created, or even within, say the same year, but Over the course of time that file may become increasing difficult to locate, say if it data/contents are more memorable to a specific user for a specific element, say a word document containing, say a memorable (1) advertising campaign with, say (2) a photo inserted of, say (3) a boy playing softball," and, perhaps not necessarily memorable for the particular year, month, project, and/or even the client associated. With the ability to tag, search, track, and sort the data/contents based on tags, the user could have tagged this file, for instance a "File A" with, say the tags: "advertising," "advertising campaign," "photo inserted," "photo with a boy," "photo playing softball," and/or "photo with a boy playing softball."

However, even if the user didn't place any tags with this particular File A, he/she may have tagged a similar file earlier, for instance, a "File B," which was associated similar data/contents and tagged with, say "advertising," "advertising campaign," "photo inserted," "photo with a boy," "photo playing softball," and/or "photo with a boy playing softball." In various non-limiting embodiments, the IPACE system analysis would preferably employ the File B tags for similar files, such as File A. In various non-limiting embodiments, the IPACE system analysis would preferably generate a weighted score and present a percentage of the assumption of accuracy with each "suggested tag." Here system could have a default setting where it only employs those "suggested tags" with a percentage of higher than, say eighty (80%) percent and the rest of the "suggested tags" remain dormant until a particular dormant tag crosses the threshold of sufficient reliability and/or the user adjusts the threshold, say low enough to now include the previously dormant "suggested tag."

In various non-limiting embodiments, the IPACE system would preferably generate, list and/or offer the user a list of suggested tags before saying a file and/or while the data/content is being created, therefore creating an understanding to the user, just what type of data/content and data creates what type of tag suggestions. The user may toggle on/off the list of suggestions, indicate that a particular suggested tag should be employed "accepted," "rejected," "modified," and/or indicate that a particular tag is, say either "appropriate, but skip using," "inappropriate and review/improve the current methodologies being employed," or "inappropriate and skip reviewing/improving for now," where the user could retrieve, say a list of "inappropriate and skipped . . . for now" tags to review later. In addition, the IPACE system would preferably take the user back to the document and the actual data/content and/or data adjustment creation that triggered the "suggested tag." Then, by looking a file creation history, see which elements in the history and to what degrees are triggering the suggestion, so that the user may make adjustments for, say that particular rule, and/or any other delineated data associations to the rule, such as just that particular user, just that particular software application, just for a particular window of time, just in relationship to a particular client or project name; each independently, collectively, and/or per each potential permutation combination.

Sharing Labeling/Tagging Rules

In various non-limiting embodiments, the IPACE system may also share tagging rules across, say an intranet and/or the internet, to different systems, environments, networks, projects, filing systems, and/or users, therefore creating additional comparison metrics for each. For instance, some users may tag similar items differently, using a different naming convention, employ different methodologies, thresholds, weights, and/or factors. In various non-limiting embodiments, the IPACE system may create, display and/or employ a method for normalizing the tags with a tag mapping that it employs and/or the user toggles on/off and/or adjusts. For instance, the IPACE system would preferably be set up so that it employs the tagging and naming convention that is familiar and comfortable to a particular user, but this user may also toggle over to and/or display alongside the naming convention used by, say another particular user, the most popular naming convention every, currently (e.g. within the last, say sixty (60) days) and the like. For example, one user may prefer to tag files know to be related to a particular client by the client's last name; whereas another system user may prefer to use a client's last name and then the first name; while another system user may prefer to use the first name and then the last name.

In various non-limiting embodiments, the IPACE system would search for these relative similarities, anomalies, and/or contradictions among the different users to make normalization recommendations based upon such means as, say first used naming convention methodology, most used within the department, most used within the IPACE system locally, most used within the IPACE system overall, used by the most senior user (e.g. in terms of tenure), the most used by the government, and the like. In various non-limiting embodiments, the IPACE system would preferably store older and/or hidden naming conventions to help prevent confusion later, should someone prefer and/or need to retrieve a file based on a previous naming and/or tagging convention.

List of Automatic Labeling Options and Generating

In various non-limiting embodiments, the IPACE system may also automatically, systematically, continuously, persistently, conditionally, and/or via/per actor/user-prompt label options, features, and/or the like, by analyzing data/content, say the category, the search that spurred the option, the project that spurred the feature, and/or the like, and/or by what are perceived to be the most common delineations for similar terms, options, features, and/or the like based upon historical data.

Analyzing and Labeling Submitted Data/Content for a Legal Proceeding

In various non-limiting embodiments, the IPACE system would preferably provide a computer implemented method for the submitting and analyzing data/content for a legal proceeding, the IPACE court, and/or the like, such as when the IPACE court needs to review text from a speech to text translation. In various non-limiting embodiments, the IPACE system would preferably generate a list of labeling options automatically, where an IPACE judge, expert, witness, plaintiff, defendant, and/or the like, may submit the original audio clip, the original speech to text transcript, a modified audio clip, a modified speech to text from the modified audio clip, a modified speech to text manually created, and/or the like, where each modification is annotated along with the 5 W's. For example, who is perceived, discerned, or known to be speaking, where discerned implies that is currently not under any challenge, who made the modification, along with when, where, how, and why for each.

In various non-limiting embodiments, the IPACE system may also be employed to analyze the likelihood of, say a translation error, recording error, auto correction error, and/or the like for perceived relatively likelihood regarding a challenge, any correction, witness veracity, and/or the like. Further, an analysis for relative veracity of each assertion, participant, likelihood of bias, likelihood of firsthand knowledge and/or hearsay, the benefit of hindsight, the benefit of others, other materials, and/or the like.

Auto-Labeling and Auto-Descriptions.

In various non-limiting embodiments, the IPACE system would preferably automatically, systematically, continuously, persistently, conditionally, and/or via/per actor/user-prompt generates a list of labeling options. For example, in Excel®, the spreadsheet tabs could be auto-labeled by searching for keywords, formulas in the cells or OCR an image and doing the similar, where a relatively common word or relatively unique word could be automatically assigned, or a list of labeling options could be displayed for selection.

Further, the labeling could incorporate other elements, such as the current data and abbreviations, where a spreadsheet could be labeled starting with "10-0920a-," where "10" stands for the year "2010" and the hyphen separates the year and the month "09" for September and "20" represents the 20th day of September; and the "a" creates another distinction for say the first version, where "b" would be next iteration, version, spreadsheet, and/or whatever the user selects in a list of automatic labeling options. Many users simply skip labeling to a perceived time saver, however, this may actually cost them or others time and/or problems, say locating the file or data/content later. In addition, a lack of labeling uniformity may make it difficult finding files within another person's naming conventions, folder structure, and/or the like.

Saving Files/Folders with Unique IDs

In various non-limiting embodiments, the IPACE system automatically, systematically, continuously, persistently, conditionally, and/or via/per actor/user-prompt offers a particular system and associated computer-implemented methods for interrogating and/or saving a file and/or a folder. In embodiment, the saved file and/or saved folder has a unique identification system, methodology, pattern, nomenclature, naming-convention, versioning/subversioning, date/time-stamping-UID, and/or the like.

Date/Time Stamping-UID

In various non-limiting embodiments, the date/time-stamping-UID is included in the naming convention of each file and/or folder. In various non-limiting embodiments, the date/time-stamping-UID appears a set location of the naming convention, say where the file name starts with a year "12" (as in the current year, 2012) then a dash"-," then a two digit current month "02" (February), and a two digit current day "27" (27th day of February), or sometimes referred to as a "preceding-date-UID" (UID=unique-identifier). For instance: "12-0227" would be the preceding-date-UID for a file, folder, and/or similar saved on the "27 February, 2012."

Version-UID

In various non-limiting embodiments, the IPACE system would preferably immediately follow the "preceding-date-UID" with a "version-UID," such as a letter of the alphabet, say as in incrementing the letters of the alphabet. For example, the first saved file for a particular document would start with "12-0227" followed by the letter "a," or "12-0227a," and the subsequent save would be "12-0227b."

Auto File/Folder/Meta-Data Saving

In various non-limiting embodiments, the IPACE system could automatically, systematically, continuously, persistently, conditionally, and/or via/per actor/user-prompt save files based on data, statistics, patterns, rules, history, project, TOU/TOPs, participants, temporal elements, and/or the like. For example, the IPACE system could be set up to save data/content (e.g. files, folders, elements, meta-data, and/or the like) after surpassing a threshold of changes, such as a number of keystrokes, a type of keystroke, a temporal element/event, an increment of time, a window of time, a window-time-since-last-saved, a timer preceding a deadline, a number of participants, a number of modifications, a number of paragraphs/pages added/removed/in-total, In various non-limiting embodiments, the IPACE system could employ percentages and timers, where the IPACE system has a timer preceding a predetermined goal, a percentage of time/inputs/participants towards the predetermined goal, and/or to automatically, systematically, continuously, persistently, conditionally, and/or via/per actor/user-prompt save a file.

Document File Saving, Comparing, and Meta-Data

In various non-limiting embodiments, the IPACE system tracks and analyzes for any differences between the last two document versions opened, saved, edited, and/or the like. In various non-limiting embodiments, the IPACE system tracks and analyzes for any differences between the latest opened document version versus the previously saved version, and/or the like, where the user perhaps cannot recall any changes made and when he/she attempts to close a particular document (e.g. a recalled older document), and the IPACE system asks if the user wants to save the document (since there appears to be modifications). Here, the user may have only cut and pasted something from the document loaded/retrieved, but where no actual modifications were made and perhaps, where the user may not recall making any changes and/or doesn't have the time presently to go through and do a document comparison with an earlier version of the document that he/she loaded and is now trying to close. In various non-limiting embodiments, the IPACE system tracks and analyzes for any differences between the latest opened document version versus the previously saved version, and/or the like, where the user can view a list of modifications. In various non-limiting embodiments, the IPACE system would generate a list of such documents prioritized from most likely to least likely to contain relatively significant changes for the user to review, and/or where the IPACE system can re-save the file under a new name more appropriate for the date and time the modifications were made.

Document File Saving Via Keywords, Comparing, and Meta-Data

In various non-limiting embodiments, the IPACE system can name and save files with new incremental names in an existing folder and/or generate a new folder, automatically, conditionally, and/or user-selectively, starting with the current date and "letter" versioning as described above and followed by some information collected from keywords generated from the document being saved, previously saved, already saved in the same folder, based upon a similar document with similar keywords and its naming convention, and/or the like. In various non-limiting embodiments, the IPACE system can save a file and/or folder with additional information/data, such as how many pages/words/edits/authors (e.g. 42-2492-29-1, where each is separated by a character, e.g. a "dash"), and/or the like; where the additional information/meta-data may also be encoded, embedded, displayed (e.g. on mouse-over), including as part of the naming conventions, and/or the like.

Spreadsheet File Saving

If the document being saved is a spreadsheet (e.g. Excel®), then the saved naming convention may be upon the same keyword analysis as a text/word document, and/or via a labeled worksheet tab(s), column/row heading(s), and/or the like. In various non-limiting embodiments, the IPACE system can save a file and/or a folder with additional information/data, such as how many worksheet tabs (e.g. a number of worksheet tabs in use (with field data/text) "_" (underscore) a total number of spreadsheet tabs (e.g. 4_6), the number of rows/columns/fields with data/content/data, a total number of formulas, and/or the like; where, here again, the additional information/meta-data may also be encoded, embedded, displayed (e.g. on mouse-over), including as part of the naming conventions, and/or the like.

Presentation File Saving

If the document being saved is a presentation program (e.g. PowerPoint®) then the saved naming convention may be based upon the same keyword analysis as a Word® document/spreadsheet and/or via a particular labeled slide (e.g. a master slide, master slide field, and/or the like), a common part name, step name, and/or the like. In various non-limiting embodiments, the IPACE system can again save a file and/or folder with additional information/data, such as how many slides/words/images/authors (e.g. 24-239-12-2), where the additional information/meta-data may also be encoded, embedded, displayed (e.g. on mouse-over), including as part of the naming conventions, and/or the like.

Drawing Program File Saving

If the document being saved is a drawing program (e.g. Photoshop®/Visio®/Illustrator®/Paint®), then the saved naming convention may be based upon the same keyword analysis as a Word® document/spreadsheet/presentation, and/or via a particular text utilized (e.g. and appearing relatively higher on the page/layout than other text, and/or the like), a layer name, a tool name utilized (e.g. watercolor brush), and/or the like. In various non-limiting embodiments, the IPACE system can again save a file and/or folder with additional information/data, such as how many layers/edits/vectors/authors for vector-based files (e.g. 14-23-12-1), or for Paint: layers/edits/pixelsXpixels/authors (e.g. 4-903-1020×800-2, where data such as the number of "edits" can be since the last saved file, overall, and/or the like.

Classifications

Most inventors have relatively little inclination as to where a new patent application (with no prior lineage) will exactly and ultimately end up in the PTO classification prior to filing. In various non-limiting embodiments, the IPACE system and associated computer-implemented methods would preferably provide a plurality of locations, where one patent application could have several correlations; and where each correlation had an existing category or the IPACE system would automatically generate one.

In various non-limiting embodiments, one patent application could appear in hundreds, even thousands of classifications and subclasses. For example, there could be different subclasses regarding such distinctions for subclasses, as applications pending prior to a first office action; applications pending post of first office action, applications pending post a non-final office action, applications abandoned, applications with a notice of allowance, applications with a pending petition, applications with a pending appeal, and/or the like. In various non-limiting embodiments, the classifications and subclasses could also include, incorporate, and/or be tags.

If an inventor knew the exact classification (and where classifications were relative highly delineated to a wide array of subclasses, say where the lowest level did not contain more than fifty (50) patent references (and where word lexicons and semantics have been mapped-out), then it would be relatively far easier to for the inventor to locate and relative discern the current state of the art and competitive landscape.

Problem with IP prior art searching and examination comes from classifications. If any person, say an inventor, could relatively easily locate, say the ten (10) patents most relevant to a particular aspect of his/her invention in matter of minutes (if not seconds), then the inventor could spend his/her time improving the field vs. the next, say 1-24 months developing a concept that may already partially or fully existing.

For years organizations and patent examining bodies (e.g. the USPTO) have tried to create standardized classifications only to have them become outdated before they are even instituted. So the PTO has databases and tools to create correlations and pattern recognitions to aid the examiner in locating other art, but that's far too late, after the inventor and/or entity has typically spent a relatively large amount of time, energy, resources, and sum of money creating, designing, testing, and applying for the concept in the application, and now more time and resources pursuing and prosecuting the concept.

Three-Dimensional (3D) Submissions

What's needed is a dynamic set of classifications and sub classifications where some iteration and/or number of improvements creates a new classification and/or subclass that is available relatively quickly to the public and in a highly sortable tool with relatively easy navigation and user-friendly UI that has a variety of search methodologies besides text-based search, say where someone (e.g. an IPACE member) could enter a particular 3D shape and the search system would produce results within all the categories, classifications, and subclasses associated with that shape followed by, say the number of results per category, classification, subclass and/or the like. Then the IPACE member could continue to narrow the results by say, either selecting a category, entering a keyword or term, entering another 3D part, and/or the like, and see the list of results.

Further, the IPACE member could utilize virtual space to position the perceived ideal relative position, interaction, location, and/or the like, between the two parts, along with parameters for, say tolerance threshold where a specification could be expressed, say with a plus or minus X value, or without any limitation, say for the color, and where a range of materials could be listed for the part, so the search could incorporate these new elements and display a list ranking art with similar parts and specifications. In various non-limiting embodiments, the display would also include any art and elements that are discerned and/or perceived as relatively close. In various non-limiting embodiments, the IPACE system would preferably also display a list of questions to the IPACE member/user that would best reduce the list based upon terms, shapes, materials and/or the like, among the result's data clusters and relationships.

In various non-limiting embodiments, this dynamic art category, classification, and subclasses, along with component relationship search, would preferably provide benefits and be utilized for IP art, but also for creating art in general, news, life and the like. In various non-limiting embodiments, each new category, classification, subclass, concept, part/step, part/step element, and/or search may be given a unique identifier that is tracked and stored along with all the associated perceived, discerned, and known attributes regarding who, what, where, why, when, and where the search went next, what was done, when, by who (e.g. inventor, patent attorney, examiner, reporter, predictor, publisher, consumer and/or the like), and/or the like, for future relationship comparisons.

Some data could remain and/or be selectively hidden, say during a development stage, filing stage, application pending stage, and/or the like.

3D Models and Classifications

In various non-limiting embodiments, the IPACE system would preferably allow and/or systematically generate three-dimensional models for existing, pending, granted, abandon, and/or the like, intellectual property. Similar to 3D landscape, where the user may visually maneuver a particular neighbor to relatively better comprehend the relative placement, arrangement, interworkings, relationships, correlations, nuances, details, value, shortcomings, and/or the like; the user of the IPACE system would preferably visually maneuver through a defined search result of intellectual property and correlated data/content.

In various non-limiting embodiments, the IPACE system would preferably generate physical models of every patent component, where the user could fly over, through, combine, and/or the like. In addition, where the user may limit, arrange, rearrange, scale, move, transform, and/or the like, each component, object, connection, and/or the like. In various non-limiting embodiments, any transformation by the inventor would provide an alert notification when a known, state, discerned, and/or relatively perceived threshold had by surpassed. For example, a particular invention may have a stated limitation for size, where the user scaling would create the alert notification. Here the user could continue to scale, but where the IPACE system would preferably note the transformation beyond the stated claims scope.

In addition, the alert notification could include a perceived claim limitation for an object's composition, where the user transforms the existing object in a material the IPACE system perceives as not claimed, and/or into a particular transformed state the IPACE system perceives the currently stated material could not support. Here the IPACE system would preferably perform a doctrine of equivalence analysis, of materials the stated claim may cover under DOE, with data regarding and correlations to existing patents, cases, decisions and/or the like.

In various non-limiting embodiments, the IPACE system would preferably isolate, suggest, and/or systematically filter data/content, environments, DOE histories, three-dimensional models and/or the like, per a particular art unit, time window, part size range, material range, and/or the like. In various non-limiting embodiments, the IPACE system would preferably allow, isolate, suggest, and/or systematically arrange like parts along a linear timeline, say per each part's priority date, grant date, and/or the like. In various non-limiting embodiments, the IPACE system would preferably display and animate an evolution of a particular part over time, where the user may filter the criteria for the part.

In various non-limiting embodiments, the IPACE system would preferably isolate, suggest, and/or systematically provide a method to list a particular part's correlations, history, and/or the like, where each could be displayed as a cluster and/or relationship mapping. In various non-limiting embodiments, the IPACE system would preferably isolate, suggest, and/or systematically provide a list of parts utilized relative to the application or application family selected. In various non-limiting embodiments, the IPACE system would preferably isolate, suggest, and/or systematically provide a prioritized list of when each particular part was introduced.

In various non-limiting embodiments, the IPACE system would preferably isolate, suggest, and/or systematically provide a prioritized list of parts that have undergone relatively the most modification within a particular window of time. In various non-limiting embodiments, the IPACE system would preferably isolate, suggest, and/or systematically provide a visualization of relatively when each particular part was relatively at its peak; based upon correlations to competing applications where the part was highly referenced and where others had to amend; and/or historical data that could comprise sales, revenues, licensing, litigation, and/or the like. In various non-limiting embodiments, the IPACE system would preferably isolate, suggest, and/or systematically provide a visualization of relatively when each particular part was relatively or completely replaced and/or the like.

In various non-limiting embodiments, the IPACE system would preferably isolate, suggest, and/or systematically provide model, parts, combinations, and/or the like, correlated definitions, specifications restrictions, and/or the like. In various non-limiting embodiments, the IPACE system would preferably isolate, suggest, and/or systematically provide a visualization of the relative time remaining per relative innovation, and/or the like. In various non-limiting embodiments, the IPACE system would preferably isolate, suggest, and/or systematically provide a visualization of the relative time remaining per relative innovation, and/or the like.

In various non-limiting embodiments, the IPACE system would preferably allow and/or systematically generate three-dimensional models for the user's supplied objects, parts, combinations, definitions, limitations, materials, goals, dimensions, interconnections, and/or the like. In various non-limiting embodiments, the IPACE system would preferably allow and/or systematically analyze the user's supplied data and generate a list of relatively similar three-dimensional objects, models, and/or the like, for comparison, compatibility, interoperability, and/or the like.

Visually Metering The Document Fitness

In various non-limiting embodiments, the IPACE system and associated computer-implemented method could continually analyze the data/content, user inputs, and/or the like, where a meter could be displayed to reflect how relatively significant the current data/content is perceived as an issue or relative to a current fitness criteria. In addition, there could be a variety of meters, say a first meter for the document fitness overall (e.g. a word document) relative to a first fitness criteria; a second meter for fitness of the data/content within a particular location (e.g. a particular page, section, under a particular section header, and/or the like) relative to a second fitness criteria; a third meter for the fitness of data/content, in say input within a latest minute, relative to a third fitness criteria; a fourth meter for the fitness of data/content, in say latest X number of inputs (e.g. the latest 200 inputs) relative to a fourth fitness criteria; and/or via some combination, permutation, collection, and/or the like, of these.

For example, the user could input type as a series of character/inputs on his/her keyboard within the latest minute and display: "a system and a method," where the real-time system analysis could feed all four meters with the same data/statistics if all four had the same fitness criteria. In various non-limiting embodiments, the IPACE system would continually analyzed each input, where if a particular input or collection of inputs relatively violated a particular fitness criteria, then the meter could reflect the relative violation. The meter could be displayed with a gauge, a needle, a range of values, and/or the like, where the needle points to a current value to represent the relative measurement of the data and criteria; similar to a speedometer displaying relative speed. The meter gauge could have the range of values from zero (0) to one hundred (100), where all fit threshold values for all significant events/incidents may be set to a first particular perception threshold value of, say fifty (50); where values at fifty (50) and over represent a perceived issue and as values increase the relative perception increases. A second particular threshold value, may be set at, say eighty (80), where values at eighty (80) and over represent a perceived fit with a significant issue, and where values increasingly exceed eighty (80), are relative perceived as more significant issues. In various non-limiting embodiments, there would preferably be a variety of meter display methodologies, where, for example, each relatively significant event/incident be compared to the user input and data/content, could have a unique set of first and second perception threshold values relative to the perceived relevance of the significant event/incident to the fitness criteria, which could be conditional to time, budgets, users, dynamic circumstances, laws, perceptions, challenges, and/or the like.

In various non-limiting embodiments, the IPACE system would preferably display a meter with methodology, where the meter could distinctly display, gauge, and values where some values are relatively positive and other values are relatively negative. For example, the needle could be set at zero, say at the top of the gauge (e.g. noon on a clock), where values in positive clock-wise direction would represent and count positively, and where values in negative counter-clock direction would represent and count negatively. For instance, a particular sequence of user inputs could cause the meter to go negative 10 points, but a subsequent "cut and paste" function could cause the meter to jump to position 40 relative to the criteria and latest input. In various non-limiting embodiments, the IPACE system would preferably offer suggestions, where preferably historical data analysis and relative comparisons, including such data as user behaviors, patterns, and/or the like; discerned and/or perceived violations, corrections, and/or the like; PTO rejections, case law, projects, success, and/or the like, per user, project, and/or the like; will generate the relatively best system suggestion for the user to consider, modify, accept, track, and/or the like. Further, where each could include a perceived score increase per meter, metric, criteria, and/or the like.

In various non-limiting embodiments, the IPACE system would preferably display user inputs (e.g. text, drawing, feature usage, and/or the like), where a color-code represents the perceived relative value, concern, fitness, and/or the like of each user input. For example, the IPACE system would preferably display text in variety of colors, hues, intensity, saturations, sizes, backgrounds, and/or the like, where each is assigned a particular meaning and/or range of values. For instance, in various non-limiting embodiments, the typed text could before relatively more red as the IPACE system perceived the input to be relatively more of an issue, and/or fitness criteria. In another embodiment, the typed text could become grayed out as it diminishes in relevance, say due to new data/content and/or an system analysis, where the data/content is perceived as relatively redundant, inconsistent, inferior, ambiguous, wordy, confusing, circular, out of sequence, poorly structured, poorly formatted, poorly numbered, and/or the like, when compared to other data/content; where each could be uniquely color-coded. The other data/content may be in the same document, another document, a system suggestion, a particular user suggestion, and/or the like.

In various non-limiting embodiments, the IPACE system would preferably display the discerned and/or perceived issue per portion of highlighted and/or color-coded data/content. Further, the IPACE system would preferably display details, the IPACE system suggestions, the user suggestions, and/or the like, upon a user mouse-over, where the user may also select from a list of historical events, each relatively scored to review, edit, revert, and/or the like.

In various non-limiting embodiments, the fitness criteria and range of relative values displayed on the meter would preferably allow for a variety of programmable methods. For example, a first method would analyze and display a particular user's input relative to same particular user's own history, goals, alerts, and/or the like comparisons. For instance, a particular user who is relatively new at writing a patent application, patent claims, office action response, appeal brief, a complaint, a motion, an objection, a declaration, licensing contract, settlement, and/or the like. A second method would analyze and display a particular user's input relative to all users, a group of users, a segment of users, and/or the like, for relative history, goals, alerts, and/or the like comparisons. A third method, in addition to the first and/or second method, could also automatically, systematically, continuously, persistently, conditionally, and/or via/per actor/user-prompt adjust the fitness criteria and range of relative values displayed on the meter as the particular user's skills increase, relative to time, deadlines, compensation, and/or the like.

Relative Usage of a Drawing Device

A fourth method, in addition to the previous methods, could also automatically, systematically, continuously, persistently, conditionally, and/or via/per actor/user-prompt adjust the fitness criteria to include a relative device, application, tool and/or feature usage comparison for such criteria as a relative usage of a drawing device, application, tools, features, and/or the like. In addition, per a particular type of device, mouse, keyboard, stylus, drawing pad, touchscreen, mobile application, where each may be relatively more/less difficult to utilized, master, and/or the like. Further, per a particular language, locations, and/or the like, where each may be relatively more/less difficult to learn, utilize, master, and/or the like.

Perceived History, Current Status, Future

A fifth method, in addition to the previous methods, could also automatically, systematically, continuously, persistently, conditionally, and/or via/per actor/user-prompt adjust the fitness criteria to include a user's discerned and/or perceived history, current status, and/or the like, along with an anticipated, projected, and/or the like, future. A sixth method, in addition to the previous methods, could also automatically, systematically, continuously, persistently, conditionally, and/or via/per actor/user-prompt adjust the fitness criteria to include a user's discerned and/or perceived health, state-of-mind, stress, mood, and/or like, historically, currently, and/or projected.

Written Data/Content for IP and Beyond

In various non-limiting embodiments, all methods could incorporate data and criteria beyond writing data/content that may not be perceived as necessarily associated with intellectual property, where, for example, a particular user could be writing a screen play, song lyric, poem, pamphlet, essay, novel, blog, podcast, text message, article, software code, business plan, taxes, training material, label, test, poll, letter, email, comedy material, joke, monologue, greeting card, commercial, promotion, resume, contract, contest, contest rules, menu, lecture, speech, business card, sign, application, want-ad, crossword puzzle, policy, recipe, calendar, map, schedule, task list, to-do list, contacts, notes, comments, opinions, suggestions, challenges, goals, bill, medical report, check, financial report, real-estate listing, how-to-guide, and/or the like.

In various non-limiting embodiments, all methods could incorporate data and criteria to measure, score, rank, reward, and/or the like (e.g. compensate), based up a relative change, threshold surpassed, improvement, and/or the like, (e.g. Novelty, Proficiency, Health, Intelligence, Knowledge, Accuracy, Quantity, Quality, and/or the like). For example, where a particular user is performing a function, task and/or the like, say comprising creating, typing, drawing, singing, acting, performing, building, playing, working, studying, thinking, testing, eating, exercising, training, learning, reading, and/or the like, where the IPACE system analysis would preferably possess and/or collect sufficient data to generate a relatively reliable comparison for the necessary measurements, scores, rankings, rewards, and/or the like.

Relatively Significant Event/Incident

In various non-limiting embodiments, the IPACE system would preferably analyze data and generate a list of relatively significant events/incidents and/or lesson-learned incidents, where the IPACE system would preferably also display discerned and/or perceived correlation per ranges of time, per project, per perspective, per art unit, per participant, per law change, per rule change, per country, per budget, per deadline, per stage, per new data/statistics, per new event, per input, per modification, and/or the like, to isolate a list of significant contributors to relative success/failure, savings, costs, revenues, profits, time, and/or the like. In addition, a plurality of subjective data may be associated with each element on the list of relatively significant event/incident, lesson-learned incidents, list of significant contributors, and/or the like; where members/users, participants, and/or the like, may add subjective data, statistics, opinions, concerns, and/or the like.

Further, each component of the plurality of subjective data may be obtained, incorporated, analyzed, judged, argued, countered, displayed, and/or the like, independently, conditionally, collectively, collaborative, suggestively, and/or the like. In addition, each component of the plurality of subjective data/statistics, say each data point, statistic, metric, and/or the like, may be relatively, automatically, conditionally, and/or selectively compared, asserted, modified, challenged, and/or visually displayed and compared with the list of significant contributors.

For example, the IPACE system analysis of historical data and events following a particular monetization event where a particular set of patent claims generates a list of relatively significant event/incident; where the IPACE system perceives the hiring of a particular patent attorney at a particular moment or within a particular window of time as a relatively most significant event/incident when compared to other results listed for the same analysis conditions. In various non-limiting embodiments, the IPACE system would preferably reveal the analysis data, statistics, assumptions, conditions, results, and/or the like, associated with each listed significant event/incident. For example, the relatively most significant event/incident was based upon a particular moment (e.g. an exact day/time of contract executed), where the hiring of the same particular patent attorney for a particular window of time (e.g. from introduction to contract negotiated) may appear second on the list of relatively significant events/incidents, followed by the hiring of the same particular patent attorney for a second particular window of time (e.g. from contract engagement to a particular office action response) and so on. The fact that the hiring of the particular patent attorney appears in the top three system perceived relatively significant events/incidents; provides additional weight to a relative confidence score award to the list, the particular patent attorney, and/or the like. In addition, the IPACE system analysis, list of relatively significant event/incident, participants, relative confidence scores, and/or the like, may incorporate and/or conditionally affect other metrics, correlations, participants, projects, data/content, points, status, confidence, compensation, equity, bonuses, success-fees, vacation time, comp. time, and/or the like. For example, the IPACE system analysis and relative confidence scores, may reasonably conclude what particular participant and/or group of participants were relatively most responsible for locating, meeting with, negotiating with, preparing contracts, hiring/engaging, communicating with, collaborating with, compensating, and/or the like, with the particular patent attorney perceived as relatively the most significant toward a particular accomplishment; per window of time, per project, per ROI, and/or the like.

Relatively Fit Analysis

In various non-limiting embodiments, the IPACE system analysis would preferably include all relevant information available and/or necessary to perform a relatively fit analysis (e.g. accurate, reliable, detailed, and/or the like) of what, who, when, where were the relatively significant elements to, say a particular window of time, project, event, accomplishment, and/or the like; where particular elements (e.g. a particular participant, say the Lead Inventor) could be filtered or conditionally diminished from the results. However, if the IPACE system analysis did conditionally remove a particular participant and/or the like, from the analysis, the IPACE system would preferably be able to generate a second list of significant contributors not incorporated within the first list. In addition, the IPACE system would preferably perform a subsequent system analysis with a larger data pool, say with some or all of the second list contributors included, where contributors on the first list may have their significance increased or diminished.

In various non-limiting embodiments, the IPACE system analysis would preferably track and incorporate on-going user inputs (e.g. data, statistics, data/content, modifications, negotiations, collaboration, metrics, health, stress, pay, equity, options, scores, arguments, challenges, alerts, acknowledgements, topics questions/answers, suggestions, opinions, feedback, comments, counter offers, decision, perceptions, perspectives, and/or the like), where and when perceived as relatively fit to relatively improve the fitness of the overall analysis. In various non-limiting embodiments, the IPACE system analysis may modify the significance or a particular element, component, metric, assumption, statistic, algorithm, participant, project, event, and/or the like, based upon on-going user inputs. For example, a particular group of participants on a particular project may employ a variety of methods and/or options to challenge the significance of hiring a particular patent attorney.

One method to challenge the significance would collect a wide range of opinions in general before the significance list results were made available, where the particular patent attorney did not score as relatively significant in the results. Another second method may collect opinions before and after the significance list results were made available so as to compare opinions. Another third method may collect opinions after the significance list results were made available, where each participant is asked relatively the same question, and where relatively large sampling either agree or disagree about the significant of the particular patent attorney; some combination, permutation, modification, of methods, and/or the like.

In addition, where user/participant historical data may be incorporated into the analysis, where the historical data may comprise a score, rank, perception and/or the like, for a relatively reliable, helpful, accurate, perceptive, positive, negative, and/or the like, per question, per poll, per project, per company, per collaborator, per group, per segment, per time window, per budget, per sentiment, and/or the like. In addition, where the IPACE system may automatically, systematically, continuously, persistently, conditionally, and/or via/per actor/user-prompt weight data differently, say where historical data challenging the relative significance of particular participant has been argued independently by two participants, on different projects, who are known, and/or perceived to not know each other, could increase the value of the first opinion, the second opinion, the collective option, when a third independent opinion agrees, and/or diminish the value when one or both are found relatively unreliable, when increasing data supports a counter assessment, and/or the like.

Listing the Latest Modifications

In various non-limiting embodiments, the IPACE system and associated computer-implemented method tracks each document (or similar) save and/or retrieval and would update a list of the latest modifications. For example, if the user utilizes a "find and replace" function to replace a particular find word, say "ideally" with a replace word, say "preferably," then the list of the latest modifications would list the utilization of the "find and replace" function, the find word, the replace word, along with the number of incidents of prior to the function usage, currently, and/or the like, for each.

Dissimilar Base-Application Data/Content Comparison

In various non-limiting embodiments, the IPACE system and associated computer-implemented method tracks changes and contributions with the ability to do a comparison of products and elements from unlike software/applications, say between documents (e.g. Word®) and presentations (e.g. PowerPoint®) and/or spreadsheets (e.g. Excel®) similar to comparing word processor documents (in Word®) where the differences are annotated in colors/hues discernible to the user. For instance, the terminology and/or lexicon, similar usage and the like.

Highlighting Tools

In various non-limiting embodiments, the IPACE system and associated computer-implemented methods allow a particular user enhanced options to edit, highlight, and removing highlights in a document. For example, the current state of the art only allows the particular user to select a range of text and then either "Add a color/hue" or select "none" (for no color/hue), but there is not a method for completely removing a specific highlighted color/hue without affecting other existing colors/hues in the same selected range. In the example indented below, under the current art, the particular user could select a range of the full paragraph and remove, say a highlighted section or range assigned with a green color/hue (shown below in the indented section as the bold text) within a single operation also affecting other highlighted sections or ranges with color/hue assignments, such as a highlighted section or range assigned with a yellow color/hue (shown below as the non-bold italic section).

In this office action, the Examiner has provisionally rejected claims 1-25 are on the ground of non-statutory obviousness-type double patenting as being un-patentable over claims 1-25 of co-pending Application No. XXXXXXXXX. The Examiner has stated that "[a]lthough the conflicting claims are not identical, they are not patentably distinct from each other because both inventions are directed towards method and system of A,B,C, and D across a plurality of servers using wireless devices or World Wide Web. See Office Action, P X, ¶ Y. Applicant respectfully disagrees with this assessment. However, Applicant considers this issue closed pursuant to Office Action Page 23 ¶ 3 wherein the Examiner states "Examiner withdraws previous Statutory Double Patenting rejection due to amendment to claims filed on XXXX date."

With the IPACE system in the above example, the user may select the same text range or section and utilize system functionality where he or she may selectively make changes. For instance, the user may make all the green highlighted areas become another color/hue or no color/hue, while not affecting any other color/hue highlighting in the same section or range. In addition, the IPACE system would preferably analyze the data and generate a table of color/hue mapping of a particular document or group of selected documents, where the IPACE system displays what text is highlighted where and with what particular color/hue, and it may include an explanation as to why a particular section is highlighted and by whom. For instance, a particular section may be a temporary highlight for a particular highlighter to revisit, challenge, and the like. However, the highlighting may also be a section assigned from one particular participant/highlighter (e.g. Lead Inventor (40)) to another particular Participant (80) (e.g. a Patent Attorney (44)), where the highlighting may either be manually removed when the task is completed by the Patent Attorney (44) in this example; manually removed by the Lead Inventor (40), and/or systematically removed based upon conditions and rules setup by both Participants (80).

In various non-limiting embodiments, the IPACE system would track who made the highlights; why the section was highlighted; what rules were created; who is assigned the task of viewing, reviewing, editing, completing, validating satisfactory completion or the like; when each change was made; and the like. In various non-limiting embodiments, the IPACE system would track any challenges to each section of highlighted text, associated rule, task, assertion, and by whom, while continually analyzing, generating, and maintaining a historical collaboration table as to any and all of the chronological comments, changes, and the like, to the document or selected family of documents. The historical collaboration table may comprise the chronological rules, tasks, comments, changes and/or the like, to the document overall by all users, by a particular user, by a membership-type of user (e.g. a particular group of Joint-Inventor/Co-Inventors (41), a particular group of Reviewers (64), and/or the like); by a segment-type of user (e.g. all users who are active Participants (80) within a particular project and who are working for a hybrid compensation of cash and equity); and/or the like.

Search/Find and Pattern Searching, Tracking, and Analysis

In various non-limiting embodiments, the IPACE system and associated computer-implemented method could search data/content, say within a document for a user-specific search perimeter, where the search/find result may include a displayed search/find results list with a list of creation/modification information displayed. The list of creation/modification information may comprise where each search result item resides, and the relative perceptions as to who is perceived to have originally input the information for each item in the search results, when, from where, with what application, for what project, with what collaborators; who has subsequently modified the item, when, and/or with additional information, such as why and how, if available, and/or via system analysis with a relative perceived accuracy score and a relative perceived confidence score for each. Along with a history of how any data and logic associated the relative perceived accuracy score and a relative perceived confidence score has been challenged, modified, evolved, and/or the like.

For example, the IPACE system generated search/find results could provide the user an ability to mouse over a found item in the displayed search/find results list and/or within the search data/content itself, say the document and view that a particular Lead Inventor A is relatively perceived to have initially input the data/content on May 12, 2008, where the relative confidence of the particular Lead Inventor A being the party to have initially input the data/content has a relative confidence score of 98.2% out of 100% and where that Lead Inventor A has been never been challenged in the past ten (10) years after twenty-two completed projects (e.g. including five (5) granted patents within the same art) and who is known or discerned to have worked with at least nine (9) different IPACE members/collaborators over those ten (10) years. In addition, there could be a relative confidence for the date of May 12, 2008, where the relative confidence score is 99.9% out of 100% and where that is the highest score possible within the TOU/TOPs, context, and methodology, employed by, say the Lead Inventor A.

Further, where similar comparisons and relative confidence scores could be displayed for other data correlations and scores; to either certain pre-approved parties, members, entities, user, and/or the like; and where a particular data may require a particular fee to view, download, challenge, and/or the like. In addition, the fee may include a method of fee-sharing with particular parties (e.g. member of an invention club) and/or with particular users (e.g. those mentioned and/or conditionally revealed in the data/statistics, where appropriate and agreed to), and/or the like.

The "why" and "how" data related to search/find results, for example, may include "why" data/content that was changed/modified as a result of a particular suggestion presented by a particular participant (e.g. a particular reviewer, a group of peers, a segment of experts, a particular Joint-Inventor/Co-Inventor, a particular attorney, and/or like). The "how" data/statistics, for example, could be where the user accepted a particular modification suggestion by, say a particular participant (e.g. a reviewer) and implement as suggested, and/or also made other modifications. In another example, the "how" could be express as or by an implementation suggested and/or conditionally performed by the system. For instance, the IPACE system would preferably suggest changing a particular word to another particular word, and where the IPACE system also discovered twelve other location of the same word within a document, where the IPACE system suggested making the same word modification to, say all or some. The suggest modification could be presented in a list where the user could be presented with rationale as to why the IPACE system perceived each change as logical, say because the sentence structure is similar, or within the same embodiment, or because the user made a similar modification in a relatively similar document with the same or a relative similar word or situation.

In various non-limiting embodiments, the IPACE system search and/or the like (e.g. document find function) may automatically, systematically, continuously, persistently, conditionally, and/or via/per actor/user-prompt incorporate an actor-stated, ascertained, discerned, relatively perceived, and/or predicted set of goals, terms, data/content and/or historical data/statistics, where the IPACE system may analyze, say data, statistics, data/content, patterns, behaviors, and/or the like; and where the IPACE system analysis and/or results may include behaviors considered relatively the same or relatively similar, along with a list of any data employed, assumptions calculations, algorithms and/or the like, per score, per ranking, per element, per issue, and/or the like. Further, the IPACE system analysis may include a relative overlap, pattern, correlation, causation, and/or similarity recognition score, rank and/or the like, for, say, novelty, obviousness, enablement, Inventorship, rights/ownership/assignment, authorship, and/or the like.

In addition, the IPACE system analysis may include any publications (e.g. patents, inventions, claims, figures, written descriptions, blogs, websites, white papers, speeches, recorded events, and/or the like, worldwide with translations, if necessary), figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like), 3D objects, animations, and/or the like (e.g. with object, imagine, cell, and/or frame-by-frame with analysis and comparisons for both audio and images, and not necessarily sequentially compared), audio, video, and/or the like (e.g. with speech to text conversions, and image, facial, scene, and/or the like), and/or the like.

In addition, the IPACE system analysis may include data/content and/or data from sources (e.g. documents, scripts, notes, comments, tags, emails, images, figures, elements, specifications, formulas, tables, assumptions, searches, emails, transcripts, declarations, and/or the like) that have not necessarily been filed particular government entity and/or the like (e.g. Not presently filed with the USPTO, or filed with the USPTO, but not with, say the PCT, or EPO, JPO; or filed with the EPO, but not presently with the UPSPO, and/or the some combination of entities, permutation, and/or the like). In various non-limiting embodiments, the IPACE system analysis may include filters for any of the above and/or for data/content from a particular art unit, examiner, modification, iteration, version, and/or the like. Further, the IPACE system analysis may include data/content and/or data from an office action response, interview presentation, webcam, audio/video, online presentation, PowerPoint® presentation (or similar), interview transcript, interview summary, office action, motion for an appeal, appeal brief, licensing negotiation, licensing deal, litigation negotiation, settlement, and/or the like.

For instance, the user may have designated a particular document iteration (e.g. with iteration ID) and version (e.g. with a version I.D.) as ready for review by a particular reviewer, where the reviewer subsequently made a list of suggested modifications. The list of suggested modifications may be prescreened by the IPACE system to determine if any suggested modifications would create any ascertained, discerned, or relative perceived issues for, say Inventorship, assignment, novelty, obviousness, conflicts, lexicography ambiguity, consistency, flow, and/or the like; where each perceived issue could display a perceived issue score of how relatively concerning the issue is perceived. If a particular score passes a particular threshold, the IPACE system would preferably automatically shield the user (e.g. the lead inventor) from that suggested modification, and automatically and/or selectively attempt to resolve the issues. One resolution may be to offer the reviewer a modification perceived to accomplish something similar, but without creating the same issue, or where the perceived issue score is relatively far less (e.g. under the threshold) and considered acceptable to consider as a modification suggestion by either the particular user, system, the IPACE court, PTO, courts, peers, experts, and/or the like.

For example, a particular data/content includes the sentence: "In various non-limiting embodiments, the IPACE system has a means for communication to the user," where the modification suggestion by a particular patent attorney to a particular lead inventor may be to change the phrase "system has a means for communicating" to "system may employ a Bluetooth network topology and protocols to," where the IPACE system analysis of the modification suggestion determines and/or perceives that the suggested option could relatively weaken and/or limit the territory perceived to be currently covered by the specification language. Here, the IPACE system would preferably suggest alternatives that still allow for an amendment and/or how to potentially avoid this narrow language in future work, where the IPACE system would preferably analyze other data/content, say documents being prepared to file with similar issues, participants, art units, and/or the like.

In addition, the IPACE system analysis may include data/content and/or data from actual product and services, where the IPACE system would collect data and data/content ascertained, discerned, and/or perceived to be related and/or associated with a particular product or service. For example, the IPACE system In an embodiment could automatically, conditionally, and/or selectively, search, crawl, track, and save data/content found on the web, and analyze a relative reliability of a perceived source, a relative reliability of each data component, a relative accuracy of the perceived data/statistics, a relative accuracy of each data component, and/or the like. Further, the IPACE system In an embodiment could build a database and data structure of correlations between each data component, where, for example, a specific company brand name may relative correlate with a particular industry, a particular art unit, a specific product, a specific service, and/or the like.

In addition, where the IPACE system analysis preferably would generate a relative reliability score on the brand/product and/or brand/service correlation; a relative reliability score for a perceived revenue generated per company, per product, per service, per company, per time (e.g. per month, per year), per country, per patent claim, and/or the like; a relative reliability score for a perceived profit generated per company, per product, per service, per company, per time (e.g. per month, per year), per country, per patent claim, and/or the like; a relative reliability score for patents pending per art unit, per country, and/or the like; a relative reliability score for patents claims granted per art unit, per country, and/or the like; a relative reliability score for licensing data/statistics, settlement data/statistics, litigation data/statistics (e.g. legal costs, court costs, preparation costs, negotiated terms, timeline, settlement costs, settlement amount, amounts award, terms and/or the like) per claim pending, per claim granted, per art unit, per country, and/or the like.

In various non-limiting embodiments, the IPACE system would continually crawl, search, track, and save any data/content perceived as relative different, new, novel, and/or the like, and relatively compare and analyze data and data/content for any perceived modifications. In addition, the IPACE system would continually monitor for any data, statistics, score, modification, and/or the like, including a particular member/user acknowledgment, challenge, feedback, anomalies and/or the like, where the IPACE system would preferably automatically, conditionally, and/or user-selective include threshold values before incorporating a particular data component. For example, a relatively recently online posted company revenue number for a particular company/brand and/or for a particular product may be discovered by a system program or bot for webcrawling, where the IPACE system saves and time-stamps the data components into the database. In various non-limiting embodiments, the IPACE system would preferably analyze the data components to generate and save the relatively perceived correlations, scores, rankings, and/or the like for, say reliability, accuracy, and/or the like. In various non-limiting embodiments, the IPACE system would preferably either partially or fully limit disclosing and displaying data that falls below a particular threshold until it surpasses the particular threshold; and/or annotate the partially or fully disclosed and displayed data specifically why it fell below a particular threshold; and/or the like.

In addition, the IPACE system would preferably attempt to perform notifications, alerts, acknowledgments, validations, verifications, and/or the like, by notify a particular member/user, person, system, group, segment, and/or the like. For example, a particular company executive could be notified by email that a revenue number/value posted for the 3$^{rd}$ quarter appeared incorrect as they appear, say on their company website, a SEC published report (e.g. Annual report, 10K, and/or the like), a blog site (e.g. and/or the like), a financial website (e.g. www.finance.yahoo.com®, www.reuters.com/finance/markets®, www.bloomberg.com®, www.dowjones.com®, www.forbes.com®, www.wallstreetjournal.com®, and/or the like), as reported on TV today (e.g. CNBC®, CNN®, FOX®, and/or the like), and/or the like. For instance, the revenue number/value posted may for $20 million, when last year for the same quarter, the company had done $200 million, and/or where analyst projections were for approximately $200 million, and/or the like. Here the IPACE system attempted notifications, alerts, acknowledgments, validations, verifications, and/or the like, would preferably allow the particular company executive a method to validate who he/she is (e.g. via a PIN; login, email, and email verification, and/or similar), where he/she may either acknowledge, validate, verify, comment, annotate, challenge, modify, suggested modifying, suggested another party to review, forward to another party to review, and/or the like.

Analyzing Data/Content for Challenges and Competitions

In various non-limiting embodiments, the IPACE system automatically, systematically, continuously, persistently, conditionally, and/or via/per actor/user-prompt offers a subsystem (e.g. via AIS, ID-ACERS, Knowledge Base Mgmt., CREATE, METER, TIMES, FINANCIALS, etc.) and associated computer-implemented methods for data/content and/or data/content segment interrogating, extracting, monitoring, measuring, analyzing, validating, confirming, double-checking, editing, verifying, denying, challenging, countering, interpreting, translating, compressing data/content, anticipating, predicting, monitoring competing, and/or the like.

In addition, the IPACE system would preferably automatically, conditionally, and/or user-selective incorporate a particular member/user, person, system, group, segment, and/or the like outside the company. For example, a specific publisher and/or webmaster perceived to have posted/published the particular data component that is perceived relative incorrect and/or unrealistic, a group of analysts where the IPACE system perceives to be relative experts on the same sector, company, and/or the like. In various non-limiting embodiments, the IPACE system would then create a series of events that would allow the data to be challenged, corrected, databases updated, scores updated, data posted/displayed, IPACE members/users notified, other parties to be notified (e.g., the particular company executive first notified, a particular party who challenged the data/statistics, the specific publisher and/or webmaster for the particular data/statistics source, and/or the like), and/or the like.

In addition, the searching, crawling, tracking, saving, and analysis may include an anticipated/projected score, value, rank, and/or the like, for revenue, profits, competition, SWOT analysis (e.g. strengths, weaknesses, opportunities, and/or threats), costs, per company, per product, per service, per company, per time (e.g. per month, per year), per country, and/or the like; a relative reliability score for a perceived profit generated per company, per product, per service, per company, per time (e.g. per month, per year), per country, and/or the like; where the anticipated/projected score, value, rank, and/or the like, are tracked for their relative accuracy over time. The tracking of the relative accuracy of each data component employed in each anticipated/projected value over time would preferably include who input what data/content, data, statistic, logic and/or the like, when, where, why, and how. For example, if a particular analyst challenged a particular projected revenue for a particular company relatively sooner and more accurately than other IPACE members/users, the system, other sources, and/or the like, then the IPACE system would preferably relatively increase the reliability of challenges from that particular analyst, especially for that particular sector, company, and/or under similar circumstances (e.g. where the particular analyst cited a particular company source, piece of data/statistics, competitor, macro-economic issue, a micro-economic issue, and/or the like).

In various non-limiting embodiments, the searching, crawling, tracking, saving, and analysis may include product launches, patent filings per country per art unit, per claim, per claim iteration, and/or the like, where system would preferably generate a relational mapping (e.g. including cluster maps, heat maps, correlation maps, and/or the like) with relative comparisons to previous patents filed with the same or relatively the same sector, company, inventors, country, time period, budget, attorney/agent, claims, figures, written description, prior art, and/or the like. Further, the IPACE system analysis would preferably generate and display a heat map relative to historical and/or projected data for, say data and/or sectors that appear to relatively growing, say in terms, of filed patents, filed claims, claims granted as filed, claims and/or claim elements relatively amended, a particular type of claim, a particular territory covered by a claim and/or claim elements, a particular type of claim rejection, a particular type of claim construction, a particular type of claim enablement, and/or the like.

Further, the IPACE system analysis would preferably include an analysis of each perceived enablement disclosed per claim element, a perceived skill-level for a Person with Ordinary Skill with the Art per claim element, and/or the like. For example, the IPACE system would preferably generate a relational cluster map of enablement terms perceived to support a particular patent claim, and where a heat map, preferably with color-coding, could display the relative increase in the usage of particular terms.

In addition, the IPACE system would preferably generate and display a timeline with a histogram per word/phrase/term and/or a display of a plurality of distinguishable terms simultaneously displayed, where a volume area (e.g. height from a base line of say, zero usage) is displayed on the histogram over a range of time and where each particular moment in time would be represented by a volume for the perceived usage of a particular word/term usage relative zero and other moments in time. In addition, the relative usage analysis could include and/or incorporate filters, say per project, participant, inventor, company, entity, group, attorney, claim, claim element, art unit, examiner, SPE, country, and/or the like.

For example, a particular system generated and displayed first histogram for a first word "network" for a particular art unit could reflect that the first word peaked in usage with that particular art unit in November of 1994, whereas in second histogram that same particular first work may continue to relatively climb in usage, say when compared to another art unit for the same window of time (e.g. up to today). In another histogram example, a particular phrase "computer-implemented method" (and similar phrases automatically, conditionally, and/or selectively included via a sematic analysis) appear to have relatively increased and continued be utilized for a particular art unit post a particular event (e.g. a court decision).

In addition, the IPACE system would preferably perform a similar function where the IPACE member/user could select a particular court, case/decision, art unit, and/or the like; and the IPACE system would preferably generate a list of terms where the list would score, rank, and prioritize a relative increase/decrease in usage and a perceived correlation score (e.g. based upon how the term has relatively increased/decreased in usage overall, how often term is cited in office actions, appeal briefs, court cases, and/or the like. For example, a particular affected element (e.g. a word, term, phrase, value and/or the like) may have emanated from relative obscurity to relative prominence following a particular case. For instance, the phrase: "computer-implement" following the case Bankcorp v. Sun Life, No. 2011-1467 (Fed. Cir. 2012). Here, for example, a particular IPACE member/user could have selected the phrase first and subsequently learned about the case from the histogram displayed that there was a significant increase in usage of the phrase "computer-implemented" following the case.

In addition, the histogram, timeline, data, statistics, and/or the like, could include a perceived correlation with information and data from a particular court case, ruling/decision, court opinion, law change, procedure change, and/or the like. In addition, the IPACE system analysis may include an analysis of relatively where, who, when, how, and/or the like, the particular element grew in relative prominence, where a tracing of the origin may reveal a particular patent, patent claim, company, inventor, patent attorney, law firm, and/or the like, that/who is perceived to have initially utilized, coined, and/or the like, a particular element, argument, assertion, and/or the like. Further, where the IPACE system would track and analyze correlated data/content and data for such items as actor-stated, ascertained, discerned, relatively perceived, and/or predicted government (e.g. PTO) and legal challenges, rejections/rejection withdrawals, opinions, assertions, acceptance, vacates, opinions, and/or the like.

However, the same particular user could have instead first selected a particular court case, ruling/decision, court opinion, law change, procedure change, and/or the like; and the IPACE system would preferably generate and display a prioritized list of relatively effected elements (e.g. the word, term, phrase, value and/or the like) each with a score, rank, and/or the like; along with a prompt to display (e.g. a hyperlink) and/or an automatically, conditionally, and/or selectively displayed histogram for each, an option to selective combined elements (e.g. a word, term, phrase, value and/or the like), and along with the perceived correlations, data, statistics, information, and/or the like.

In addition, the IPACE system analysis and displayed information could include a perceived element correlation, where the IPACE system would analyze and generate of a list of ascertained, discerned, and/or perceived correlations between elements. For example, a particular first word is relatively more often preceded by a particular second word when, in an analysis of patent claims in a particular art unit over the past five (5) years, when relatively compared to other elements (e.g. the word, term, phrase, value and/or the like). Further, where the relative comparison could include filters and incorporate the same, relatively the same, and/or different items. For example, the IPACE system analysis for a particular perceived element correlation for a particular claim type (e.g. method claims), within a particular art unit (e.g. 2447) could generate and display the list of ascertained, discerned, and/or perceived correlations between elements, where a specific phrase, "a data file," may be perceived as a relatively most utilized phrase under the IPACE system analysis criteria, and where the specific phrase "a data file" (e.g. a first specific phrase) is relatively more often preceded by a particular preceding element or word "storing" when relatively compared to other analyzed element correlations within the IPACE system analysis criteria. Depending upon the IPACE system settings, conditions, user-selections, and/or the like, the generating, ranking, and/or displaying of the list of ascertained, discerned, and/or perceived correlations between elements could incorporate a subsequent or a second specific phrase, where that second specific phrase is perceived to be a relatively second most utilized phrase under the IPACE system analysis criteria, and so on.

Another method of generating, ranking, and/or displaying of the list of ascertained, discerned, and/or perceived correlations between elements could incorporate a hierarchy, where each particular preceding element or word (e.g. "storing") is analyzed and relatively ranked among preceding elements or words, in say with descending usage, occurrences, and/or the like, for the particular analysis criteria. In addition, the hierarchy could include an analysis for an relative usage amount of system delineated elements, where each delineated element is relatively compared to all other delineated elements to generate such correlations as a first delineated element utilized relatively the most with a list of other delineated elements prioritized upon how relatively often follows that by a particular second element or word, where a particular element relatively most often appears (e.g. preamble, method claim, third element, and/or the like), what particular element relatively most often utilized to amend for what previous element, what particular stage (e.g. a continuation off of a parent that was granted), and/or the like.

In addition, the IPACE system analysis could include behavioral, correlations, and pattern recognition for isolating a relatively unique, novel, successful, escalating, prompt, and/or the like, method among a particular group or segment. For example, a first specific phrase may be relatively more successful at overcoming a particular rejection than a second specific phrase. In addition, the IPACE system analysis and comparison could include and/or incorporate filters for comparing, say specific art units, arguments, examiners, attorneys, agents, countries, budgets, deadlines, goals, perceptions, and/or the like. Further, the IPACE system analysis could compare items from different categories, say comparing the US to Japan, or comparing a patent attorney to a patent agent, and/or the like.

In addition, the IPACE system analysis could include and/or incorporate filtering for numeric values, calculations, dates, times, periods of time, and/or the like. For example, an analysis may display that a particular number "802.11" (and any perceived and/or user-selected similarities, 802.11b, 802.11b, and so on) is perceived to be replaced by another term or acronym, say the acronym "WiFi" (and any perceived and/or user-selected similar spelling). For instance, an analysis of patent applications, reveal the first utilization of the acronym "WiFi" and where the IPACE system would preferably automatically, systematically, continuously, persistently, conditionally, and/or via/per actor/user-prompt analysis of a plurality of specifications, say around that same time period (e.g. within one year) that utilized the same "WiFi" acronym (or similar, e.g. "Wi-Fi"). In various non-limiting embodiments, the IPACE system analysis of a plurality of specifications could generate a perceived definition for the "WiFi" acronym based upon an analysis of all the applications, industry dictionaries, data/content related to the "WiFi" acronym (e.g. a website of an organization perceived to be representing "WiFi"), and/or the like. In addition, analysis of the perceived definition for "WiFi" could include an analysis of the particular number "802.11," where the IPACE system would preferably score the particular number as say perceived as either the same element (where the acronym and number are perceived as interchangeable), perceived as relatively the same (e.g. where the acronym and number are perceived as similar, but where there is a slight difference, and/or where one is a subset, and/or characteristic of the other), perceived as a characteristic, and/or the like.

This analysis of the perceived definition for the "WiFi" acronym and/or similar language could be included in the data displayed to a user. In addition, the data could include what particular art unit was first to utilized the acronym, by who, how (e.g. written description, claim, claim amendment, and/or the like), each subsequent utilization along a time line, whether each included a definition relatively similar to the perceived definition, whether the acronym was involved in a rejection, what type of rejection is overcome, how, and/or the like.

Further, charts, histograms, associated data, and/or the like, could include a Wikipedia-like function, where data/content, such as text, could state that the number "802.11" is perceived to have relatively diminishing usage, and where the acronym "WiFi" appears to have relatively replaced it in the following art units, along with dates, times, events, and/or the like, that are continually updated, and may be challenged, modified, and/or the like.

More Search/Find and Pattern Searching, Tracking, And Analysis

In various non-limiting embodiments, the IPACE system and associated computer-implemented method could also include searching for numbers within a document, including the ability to search for patterns (e.g. numeric patterns). For example, the search perimeters (e.g. utilizing a document "find" function) could state conditions and sequences, such as first search for each use of the number one, say independently (e.g. do not include "11" or "211," where one is simply within a larger number), and where the search could be setup to include and/or not include such terms as, say "one, first, initial, single," and/or the like. In addition, the IPACE system would preferably track all data/content viewed, reviewed, modified, approved, rejected, challenged, and/or the like, where a subsequent search for say the number "2," again independently (e.g. do not include "22" or "525," where two is simply within a larger number), could include and/or not include such terms as, say "two, second, subsequent, twins, couple, pair," and/or the like.

In various non-limiting embodiments, the document search (e.g. the document "find" function) could track and/or filter data/content that was either viewed, reviewed, modified, tagged, commented, acknowledged, approved, rejected, challenged, and/or the like. For example, the user could perform a first search (e.g. document "find" function) for any number, item, word, phrase, term, and/or the like, that is the number "1" (e.g. preferably by itself) and/or a term that relates to the number one (e.g. single, one, first, initial, etc.). Terms could even include previously utilized terms from the particular IPACE member/user, project, company, assigned via the TOU/TOPs, utilized in similar projects, in similar art units, and/or the like. In addition, the search/find perimeters could include filters for data/content appears in a particular location of a document, database, by a particular author, with a particular collaborator, for a particular project, and/or the like.

In various non-limiting embodiments, the IPACE system may automatically and/or the user may selectively add, modify, and/or remove a word, phrase, item, term and/or conditions. With the above example, for the first search for the number "1" (e.g. preferably independently) and any terms perceived to be related (e.g. single, one, first, initial, etc.), the user could specifically add the words: "born," "start," "primary," "main," "found," and "discovered." In addition, the IPACE system would preferably also incorporate and/or offer the user a list of word-form options to automatically and/or selectively include other forms of these user-added-words, say "started, starting, starter, starts, and the like, for the user-added-word/term "start." For instance, the user may select only "starting" and "starts," but not "started," "starter" or even "start" for search/find perimeters. Further, the IPACE system would preferably incorporate the semantics to automatically include and/or suggest including words that are ascertained, discerned, and/or perceived to be relatively similar to all items, words, phrases, and/or the like, associated with the search/find perimeters; or only towards a specific word, say "starting" where the word "beginning" could be a word the systems' semantics analysis would include and/or selected by the user.

In various non-limiting embodiments, the search/find results may be displayed as marked or differentiate data/content (e.g. text and/or an item that is highlighted, underlined, italic, bold, circled, encapsulated, linked to, mouseover-alerted, commented, referenced by location in a list, and/or the like). For example, in one embodiment of the differentiated data/content could be highlighted in a particular color (e.g. a particular hue, intensity, and saturation of say yellow), where say the word "starting" appears. In another embodiment, the differentiated data/content could be highlighted in a variations of colors, where the relatively more saturated or intense a particular hue/color, the relatively more accurate the IPACE system perceives the matching criteria. For instance, the perceived exact match of the word "starting" could be a fully saturated and fully intense yellow hue, whereas a word with a perceived relatively less matching criteria could have a different set of saturation and intensity values for the same yellow hue. For instance, the word "beginner" may appear in a relative less saturated and intense yellow hue, but where the user could modify the search/find perimeters and analysis (e.g. current, future, and historical data) by inputting whether the word in-general and/or within, say the document, project, a particular collaboration relationship, and/or specific location found, is actually relevant and to what degree. This user input may produce a modified search/find result and/or improve data for future analysis.

In various non-limiting embodiments, if the user should challenge, change, and/or the like an assigned color, say based upon an incorrect assumption made by the system, that particular challenge and/or change may produce a subsequent result, where the user may conditionally include the change and/or not. For example, if the results use a particular color (e.g. a particular hue, intensity, and saturation of say a fully saturated red for relatively important alert), and the user makes some changes, then the IPACE system would preferably request specific information whether alert was relatively important. If not relatively important, off by what factor, not at all, and the IPACE system would preferably display the logic, correlations, algorithms and/or the like employed, where the user could challenge, and/or modify each.

"Track/Report Lexicography, Acronyms, Symbols, Parts, Steps, Terminology Usage and Consistencies" module in a block 444

Document Lexicography, Terms, and Definition Normalization

In various non-limiting embodiments, the IPACE system has an associated computer-implemented method for defining and tracking term and/or lexicon usage, comprising a term and lexicon input (e.g. a character, text string, word, phrase, number, value, symbol, acronym, logo, picture, video frame, audio clip, and/or the like, with an association list of prioritized definitions). For example, the IPACE system may perform a relative fitness analysis by searching and analyzing a database of existing terms and/or definitions to display and rank a list of relatively similar characters, text strings, words, phrases, numbers, values, symbols, acronyms, logos, pictures, video frames, drawing, audio clips, and/or the like. Further, the relative fitness analysis may also be based upon a relative fitness criteria, value, threshold, and/or fitness range for, say a particular existing term and/or lexicon input; where the relative fitness analysis could incorporate spelling, character sequence and configuration, word sequence and configuration, definitions, definition priorities/rank, grammar, and/or the like. In addition, the relative fitness analysis could incorporate additional conditions, filters, Boolean operators, weighting, thresholds, ranges, prioritization, ranking, sorting, logic, rules, and/or the like, to incorporate filters for a particular industry(s), project type(s), dollar-value(s), time window(s), IPACE member(s), IPACE role(s), an IPACE segment(s), TOU/TOP(s); and/or some combination of these.

In various non-limiting embodiments, the relative fitness analysis, for example, could search and analyze a particular word or phrase utilized/input to then display a list of relative word and/or phrase matches (e.g. each with a perceived association relevance score and ranking), along with the list of prioritized definitions (per the relative fitness analysis inputs and filters employed). For instance, a particular definition input for a term could be "a method for tracking users," where the IPACE system would preferably search all the existing data/content, and may conditionally employ a semantics engine/module with associated automated and/or user-selected rules, logic, and/or the like, to display a prioritized list result with result incidents. In addition, the displayed prioritized results and incidents could indicate where each search result incident is located and the associated text, say by referencing a particular database location, host computer, document, and/or the like, along with such information as the project name, dates, budgets, status, number of participants/contributors/inventors, project manager, campaign gatekeeper, and/or the like.

In various non-limiting embodiments, the IPACE system analysis and results may also incorporate and/or display an etymology and/or a semiology that may comprise an amount of times that is a perceived and/or discernible incident, term, and/or definition appeared per reference, e.g. project, project stage, and/or the like; along with each perceived or discerned author/participant who originally and/or subsequent input a particular or relatively similar character, text string, word, phrase, number, value, symbol, acronym, logo, picture, video frame, drawing, audio clip and/or the like; along with any perceived and/or discerned history of what was specifically added, modified, defined, and/or the like, when, where, how, why, and/or the like.

In various non-limiting embodiments, a particular conditional analysis may include searching for exact text string matches, relative matches, Boolean operators, matches perceived by the semantics engine/module (e.g. the IPACE system for monitoring IPACE members), and/or the like, along with a relevance score, a prioritized ranking of the perceived association relevance; and/or the like. In various non-limiting embodiments, the definition input could be say "creates a water-tight seal," where the IPACE system would analyze the definition input for any possible, likely, and/or reasonably acceptable applied semantics and/or slight derivations (e.g. "creating a water-tight seal" vs. "create a water-tight seal") and analyze those results against the existing data/content to determine if any words, phrase, and/or the like, would actually teach "creating a water-tight seal," suggest or imply "creating a water-tight seal," motivate "creating a water-tight seal," and/or the like.

List of Part-Associated Text

In various non-limiting embodiments, the IPACE system may generate and display a list of part-associated text, where the list of part-associated text is associated and/or related to a particular part (e.g. a part, element, component, step, and/or the like), and where the list of part-associated text may be display in a side window (e.g. where it is display adjacent to a particular document page, figure, and/or the like), a temporary overlay window (e.g. on mouse-over), a pop-up window (e.g. requires opening/closing), and/or the like. The list of part-associated text may include all the text that currently appears in the designated application's written description, abstract, claims, figures, and/or the like, such as part label/abbreviated text, part number, and the like. In addition, the list of part-associated text may include a dictionary definition, a project-definition, an application definition, a particular participant's selected user-definition, a particular participant's selected user-override definition, and/or the like, along with any perceived and/or discerned discrepancy.

For example, a particular participant in a project could mouse-over a particular part label, shape (e.g. box in a flowchart figure), and/or part number on a particular figure; where the IPACE system may be setup to display the list of part-associated text with say, every page it appears (each with a hyperlink), every figure (each with a hyperlink), any discrepancies (e.g. part number, definitions, and/or the like) and each with a hyperlink. The same goes for other specification sections, say the written description, the claims, prior art, title page, abstract, and/or the like, where the particular participant could mouse-over a particular part label and/or the associated part number on a particular page within the written description, and where the IPACE system may be setup to display the same and/or a similar list of part-associated text. For example, the list of part-associated text could be arranged differently where figure information appears with a higher priority when mousing-over part labels in written specification.

In various non-limiting embodiments, beside one designated specification and/or specification section, the IPACE system and associated computer-implemented methods could link to a variety of participants, specifications, documents, document versions, document iterations, and/or the like. For example, a particular project with a particular participant (e.g. a patent attorney) who may only be creating and contributing the claims may have saved a plurality of word documents to his/her local computer.

In various non-limiting embodiments, if the IPACE system has the appropriate privileges to access the patent attorney's local computer, particular drive, and/or a particular designated folder, then the generated and displayed list of part-associated text could incorporate the patent attorney's claims. The patent attorney could designate access to a particular user-designate folder (e.g. a folder labeled "client-project-X"), a particular version, incorporating a particular user-designated naming convention (e.g. only Word® documents with the word "final-draft" in the title), and/or the like.

In addition, the patent attorney could save and/or synchronize files either with the IPACE central repository designated for the particular project, a particular cloud storage device where the IPACE has access, a designated FTP, and/or the like. In addition, the patent attorney could email the file to a designated email address, where the IPACE system would preferably be setup to automatically incorporate the data/content from an email, and/or an attachment.

Part Relationship And Clustering Map In various non-limiting embodiments, the generated and displayed list of part-associated text could incorporate a plurality of specifications, documents, document versions, document iterations, and/or the like. In addition, the generated and displayed list of part-associated text could include a part relationship and clustering map, where the IPACE system would preferably analyze and generate a list of parts that relate to the particular part to generate the part relationship and clustering map. For example, the part relationship and clustering map would preferably show what parts connect to what parts. In various non-limiting embodiments, the part relationship and clustering map may generate and display part names with an overlay as to the number of times that part appears, and/or where the relative size of the text is relative to the number of times the part label appears within the specification when compared to other parts.

"Track/Report Prosecution, Examiners, OAs, OA Responses, Declarations, Claims/Amendments, D.O.E. Issues, and PTAs" module in a block 445

Correlated Prosecution History

In various non-limiting embodiments, the analysis of the particular term and/or a particular definition (e.g. discerned, perceived to correlate, cited by a participant, and/or the like) may include a correlated prosecution history, correlated participant (e.g. examiner, SPE, inventor, applicant, applicant-representative, patent attorney, patent agent, PTO-correlated, government-correlated, PTAB/BPAI-correlated, Petitions-correlated, judge, and/or the like), correlated communication (e.g. office action, rejection, statement, withdrawals, appeal decision, petition decision, decision, legal-opinion, law, policy, court-opinion, motion, office action response, argument, amendment, and/or the like), and/or the like, in each context of each incident in each correlated application, each embodiment, and/or the like.

In various non-limiting embodiments, the analysis of the particular term and/or a particular definition (e.g. discerned, perceived to correlate, cited by a participant, and/or the like), may include and/or incorporate filtering for a correlated industry, art unit, court body, participant, period of time, event, law, court case, dictionary definition, industry definition, applicant definition, industry dictionary, and/or the like, in each context of each incident in each correlated application, each embodiment, and/or the like.

In various non-limiting embodiments, the IPACE system and associate computer-implemented method generates, analyzes, and displays a known, state, discerned, and/or perceived lexicography for, say a particular project, correlated data regarding the number of element changes and word changes per examiner going from original per Office Action response and overall to Notice of Allowance.

In various non-limiting embodiments, the IPACE system and associate computer-implemented method generates, analyzes, and displays a known and/or perceived lexicography for, say a particular project, where the user may add a word as a new technical term, acronym, person or company name, code name and the ability for the IPACE system to allow and/or add variations, e.g. possession for each.

Search/Tracking

In various non-limiting embodiments, the IPACE system and the computer-implemented method has an ability to search, generate, and a display of data of patents/claims issued and "issues" (e.g. the delays, rejections, RCEs) for Large Entities vs. Small Entities vs. Micro Entities and who each was assigned to (discerned or perceived.)

Patent Term Adjustments

In various non-limiting embodiments, the IPACE system and associated computer-implemented method monitors, tracks, and compares Patent Term Adjustments for accuracy, successfully rewarded, and issues for denial for the user's applications, and against other Patent Term Adjustments granted for relative issues, such as per office action response, non-final vs. final, RCE filed, amendments, and the like.

Historical Case Searches/Track/Visualize

Declarations (e.g. 1.131 Swear Behinds)

In various non-limiting embodiments, the IPACE system and associated computer-implemented method allows the user to search and display historical data/statistics, such as look up famous, popular, and/or landmark interference cases and/or swear behind declarations/cases regarding how the rulings have held up over time. For instance, how did inventor Thomas Edison file 1093 patents and did he or did he not have any first to invent issues with so many simultaneous projects?

In various non-limiting embodiments, the IPACE system analysis preferably would produce a heat map and relationship-mapping of all patents regarding a particular inventor, a particular patent, a particular piece of art, a particular claim, a particular examiner (66), a particular assignee, a particular art unit, a particular rejection type (e.g. 101, 112, 102, 103 and the like), where the heat map and the relationship-mapping generates a visual for isolating areas of project overlap to explain diligence on multiple projects, and/or to identify areas of potentially perceived concerns or actualized abandonment, suppression, concealment, and/or the like, when compared to actual case law decisions, relatively similar circumstances and/or the like. For instance, an inventor may be alerted of a particular project that has taken a backseat to a pressing, say office action response, that may need to be addressed in some manner, since case law suggests that a particular period of time should not elapse between a defined effort for due diligence. On the other hand, an analysis may be run historically to identify potential issues in a pending or issued application based upon the same analysis, say to assert an invalidity claim against another patent or claim.

"Track/Report Numbering (e.g. Parts, figures, Claims etc.)" module in a block 446

System Generated Numbering Scheme/Sequence

In various non-limiting embodiments, the IPACE system may automatically, conditionally, and/or user-selected items and/or elements generated, analyzed, modified, reviewed, and/or the like, for a project, say based upon an analysis of any discerned and/or perceived existing project elements, historical projects by the same participant(s), historical projects with similar criteria, goals, sectors, and/or the like, and/or the like. For example, the IPACE system analysis could be based upon a particular project for a patent application and based upon any existing specification elements, such as a figure (e.g. drawing, table, chart, UI depiction, elevation, cross-section, and the like) and/or a written description where parts may be simply missing numbers.

In various non-limiting embodiments, the IPACE system would preferably analyze a designated data/content to automatically generate and display a list of parts (e.g. parts, elements, steps, and/or the like), figures, claims, page numbers, and/or the like. The designated data/content could be from the user, TOU/TOPs, and/or the like. In various non-limiting embodiments, the IPACE system would preferably also analyze the designated data/content to generate, display, and/or include a list of perceived numbering requirements with the list of parts and/or the like; where the IPACE system would preferably analyze discovered parts, elements, steps, figures, claims, page numbers, and/or the like, from text, objects, shapes, pointers, and/or the like, within the designated data/content. For example, discovered in a particular set of figures, written description, claims, abstract, and/or the like, for a particular specification, group of specifications, and/or the like. In addition, the user-designated specific parts, elements, steps, figures, claims, page numbers, and/or the like, in existing text, objects, shapes, pointers, and/or the like, or by generating a user-list.

Placeholder/Numbering/Renumbering

In various non-limiting embodiments, the IPACE system would preferably automatically and/or conditionally label specified and/or any part that is missing a part number with a system generated numbering scheme/sequence or a designated placeholder number from the. For instance, the IPACE system would preferably analyze a part numbering table for available numbers and sequential numbers the parts missing numbers and/or may renumber all the parts via the IPACE system generated numbering scheme/sequence function. Whereas, the designated placeholder number may instead be employed, automatically and/or conditionally, where it is system generated or a user-designated placeholder number.

In various non-limiting embodiments, the user-designated placeholder number, for example, could be "300," where a specified range of existing parts, pages, sections, or all previously created, drawn, specified parts, steps, elements, and/or the like, may be designated for labeling with the user-designated placeholder number, "300." In addition, the user may employ a user-designated range to specify a specific range of, say new parts (e.g. parts, steps, elements, and/or like) to label, number, sequential number, and/or employ the user-designated placeholder number. Further, where the user-designated range may incorporate a particular period of time or time range (e.g. before a particular day/time, up to a particular deadline), a particular stage or range of stages (e.g. while in a particular draft stage, up until the application is consider or user-designated ready to file), a particular participant (e.g. up until being designated ready to send to a reviewer, Joint-Inventor/Co-Inventor, patent attorney, translator, etc.), when the user specifically and/or conditionally requests it, and/or the like.

In various non-limiting embodiments, the user may specifically request that a particular part, range of parts, range of pages, sections, and/or the like, be replaced with a particular designated placeholder number (e.g. "500") and/or replaced with a user input replacement number, user-designated numbering scheme/sequence (e.g. for a particular range of pages, say a particular flowchart), the IPACE system generated numbering scheme/sequence, and/or the like. In addition, the user may specifically request that a particular part, range of parts, range of pages, sections, and/or the like, be replaced with the IPACE system generated numbering scheme/sequence, and/or where a particular designated placeholder number is currently being employed (e.g. "300"), where any designated placeholder number is currently being deployed (e.g. "300, 400, 500"), and/or the like.

Without these system generated numbering scheme/sequence function/capability and designated placeholder number function/capability, a relative large amount of time may be consumed numbering parts, renumbering parts when parts are added, pages moved, sections rearranged, applications split, and/or the like, especially for relatively larger applications.

Renumbering

In various non-limiting embodiments, the user may designate that the particular part number change made, say from "300" to "310" remain that "310" number until manually changed by the user, by an approved user, and/or when a designated numbering event occur (e.g. the IPACE system generated numbering scheme/sequence). The designated numbering event may be defaults in the IPACE system and/or designations by the user for such designated numbering event as a saving (e.g. of a document, figure, table, spreadsheet, presentation, illustration, chart, and/or the like), a sharing (e.g. with a specific person, group, entity, and/or the like), a printing, an emailing, a designated temporal event (e.g. a draft goal date, a filing deadline, and/or the like) and/or another designated event or threshold. The designated event or threshold could involve an uploading event and/or an actual attempt to submit the document to, say the PTO EFS (or similar), and/or the like, where the IPACE system may analyze the specification and generate an alert where the user may continue as is, request the IPACE system renumber automatically, and/or selectively renumber the specification.

Before the designated numbering event occurs, the user may request that the IPACE system perform the renumbering of all the "300" parts, steps, blocks, elements, and/or the like, subsequently in all designated and/or system perceived appropriate locations, such as in the figure(s) and anywhere else the same part, step, block, element, and/or the like, appears as in the written description or figures. After each part (and the like) is sequentially numbered on the figure, the IPACE system may analyze the data and generate a report as the number of times and places that part appears elsewhere. The designated numbering event may also have conditions where it only sequentially changes "300," and incorporates any numbers in a particular block of numbers in a user designated block of numbers, say from "300" to "350." In addition, the IPACE system may display a relational map that may identify errors in the numbering and/or potential ambiguity due to flow or sequence of the parts, the correlated description that either appears with the part, earlier in the specification, later in the specifications, or not at all.

Automatically Labeling

In various non-limiting embodiments, the user may restrict certain ranges of text, figures, and/or sections, such as a patent application title, background section, prior art description, abstract, claims and the like. For instance, the designated numbering event may be when the user starts another figure or when the user requests that the IPACE system automatically generate a text description for the text in flow chart. For instance, the user may create a patent figure with a plurality of different items, such as flow chart steps, block diagram boxes, apparatus parts, and/or the like, where the IPACE system would preferably automatically label each part (and the like) as a part "300," up until when the designated numbering event occurs and/or when the user specifically designates it, overrides it, changes it, and/or the like.

In various non-limiting embodiments, the request to renumber may be automatic for the current number (e.g. "300") being repetitively utilized, or the IPACE system may analyze all the work product to generate a report where there is a list of duplicate numbers, where the duplicates appear, and any potential issues and/or anomalies, such as two separate figures where all the parts are labeled "300," where the user may simply run the numbering sequentially from a first appearing figure onto the second appearing figure, where, again, all the parts, steps, blocks, elements, and/or the like, are sequentially numbered in the figure and/or anywhere else the same parts, steps, blocks, elements, and/or the like, appears, as in the written description.

In various non-limiting embodiments, the IPACE system may automatically, systematically, continuously, persistently, conditionally, and/or via/per actor/user-prompt may request the parts (and the like) be numbered on twos, say only even numbers. In addition, the user may request that the IPACE system reserve certain numbers, say one through 100, so as to not create confusion with the figure numbers. Further, the user may rearrange figures and have the IPACE system renumber the parts (and the like) sequentially accordingly. The user may reserve and/or restrict certain numbers and/or blocks of numbers to utilize later, say for a known missing figure or word description.

In various non-limiting embodiments, if there is ambiguity as to the order of some of the parts, the IPACE system may highlight and proceed automatically or request the user input information sufficient to clarify the order, or rearrange a list of parts visually displayed in a stack, where any modifications may automatically update each correlated placement of that same part, step, block, element, and/or the like. In various non-limited embodiments, there are module options for a "Track/Report Challenges/Perceptions" module in a block 447, a "Track/Report Competitions" module in a block 448, a "Track/Report Errors, Anomalies, Reviews and Reviewers (64)", module in a block 449, a "Perceived Issues, Errors, and Anomalies Analysis" module in a block 450.

In various non-limiting embodiments, the IPACE system would preferably analyze the data/content for any perceived issues, errors, anomalies, and/or the like, in the usage of such relational word/terms as "below," "above," "next," "previous," "before," "herein," and/or the like, where the IPACE system would analyze such word/term usage to determine the relative fit, benefit, and/or a perceived likelihood that the term is being employed relatively correctly, unambiguously, accurately, necessarily, and/or the like, and/or a perceived likelihood the term is referencing the correct location (e.g. part, figure, location and/or portion of data/content, and/or the like). Here the IPACE system analysis would preferably generate a list of such terms, along with the discerned and/or perceived correlated data/content (e.g. the sentence or figure part containing the term/word), and a referenced location of a portion of data/content where the IPACE system would preferably include scores and ranking for the relative fit, likelihood of proper employment, necessity, accuracy, benefit, and/or the like.

Referenced Location Analysis

In various non-limiting embodiments, the IPACE system can automatically, systematically, continuously, persistently, conditionally, and/or user-selective track and analyze references to each particular part or step in a particular figure, and where any reference is ascertained, discerned, and/or relatively-perceived for a particular part/step/Figure in the written description, e.g. a particular phrase or sentence referencing that part/step and/or figures. In addition, an analysis of data/content referencing and flow, where, say the word/term "next" is followed by "this part 'X' will be continued on the 'next' figure." Here, the system's analysis of the selected data/content would include identifying the word/term "next," the correlated data/content (e.g. the associated text in the sentence), and identifying the referenced data/content ("the next page") for accuracy in the reference. In addition, the IPACE system could alert the user of any known, discerned and/or perceived reference errors, anomalies, and/or the like.

In various non-limiting embodiments, if the IPACE system analysis perceives a particular first incident, say of the word/term usage of "next" as not intended to a reference another location, then the IPACE system would score the first incident as perceived as a relatively unlikely error and more to the next, second incident. If the IPACE system analysis of the second incident, say again with the word/term usage of "next," where it does appear to specifically reference another location, say "the next figure," but where there appears to be some components missing, such as the subsequent figure/page or some necessary component in the data/content and/or perceived relationship on the subsequent figure/page. Here, the IPACE system would score the second incident as containing a perceived error.

Relative Ambiguity Analysis

In various non-limiting embodiments, if a third incident is perceived by the IPACE system analysis to create ambiguity from the reference data/content location or locations, the IPACE system would score the third incident as perceived relatively ambiguous, where the information could include what referenced data/content appears to be properly referenced, what data/content appears improperly referenced and/or any suggestions to correct the ambiguity such as moving data/content, changing the word/term, referencing more/less data/content, and/or the like. If a fourth incident is perceived by the IPACE system analysis to add relatively little benefit, clarity, and/or the like, the IPACE system may suggest removing, replacing, and/or the like, the term, reference, and/or the like.

Word/Term Utilized Analysis

In various non-limiting embodiments, if a fifth incident is perceived by the IPACE system analysis to properly and accurately utilized a particular word/term, and the same for the correlated data/content, reference location(s), and/or the like, then the IPACE system may employ a computer-implemented-method whereby the user may acknowledge the IPACE system perception. Further, where the computer-implemented-method would preferably also employ methods for filtering, sorting, modifying, interrogating and/or the like, data/statistics. In various non-limiting embodiments, these employed methods would preferably proceed through a list of prompts comprising a particular user, a specific user, a group of user, a segment of users, and/or like: acknowledgements, edits, modifications, additions, subtractions, comments, feedback, removing, replacing, and/or the like, for each incident. In various non-limiting embodiments, the incident could be for a character, number, symbol, space, gap, word, words/phrase, term, color, shade, style, format, line, shape, border, pixel value, resolution, compression factor, aspect ratio, bit-level, audio level, video level, image size, file size, and/or the like; as well as data, statistics, perceptions, comments, logic, rules, references, meta-data, relationships, accreditations, authorship, inventorship, verification, validation, and/or the like, employed in the IPACE system interrogation and/or analysis.

Encapsulating and Relational Word/Term Analysis

In various non-limiting embodiments, the IPACE system analysis would preferably employ a similar system of interrogation and/or analysis for an encapsulation/relational term usage, say where an encapsulating/relational word/term such as "embodiment," "example," "instance," "Figure," "step," "claims," "abstract," "written description," and/or the like, are employed to relatively encapsulate and/or relate to a particular concept, disclosure, declaration system, method, exhibit, attachment, message, campaign, project, specification, parts, and/or the like, relative to a portion of data/content, embodiment, figure, model, sample, image, video, audio, exhibit, and/or the like. Here, the IPACE system may automatically, systematically, continuously, persistently, conditionally, and/or via/per actor/user-prompt generates a set of criteria.

In various non-limiting embodiments, the IPACE system analysis of the encapsulating/relational term usage could interrogate and/or generate a list of perceived data/content correlations and/or associations to each incident with an encapsulating/relational word/term. In various non-limiting embodiments, a subsystem and/or the user could acknowledge, modify, add, remove, challenge, and/or the like. In various non-limiting embodiments, the IPACE system interrogates, generates and/or displays a list of data/content perceived as best encapsulating each particular encapsulation/relational term usage. For instance, a first incident with the encapsulating/relational term "embodiment" could include a list of correlated data/content in terms of any words, symbols, numbers, elements, figures, and/or the like, associated (e.g. word highlighted in a sentence in a written description with references to other referenced figures, applications, data/content, and/or the like; and/or any item perceived to be referenced by the particular incident; specifically references to a figure, figure part, and/or a "benefit claim," and/or the like). In addition, the IPACE system analysis of correlated data/content could display the written description of where the perceived correlated data/content may be designated in a variety of manners relative to relative amount of correlated data/content. For example, where the perceived correlated data/content to, say a particular first incident of "example" is a single sentence, there could then be highlighted by a particular color-coding, where a second incident of "embodiment" and tag usage as relatively broad and high level.

Adherence to Set of Rules Score

In various non-limiting embodiments, the IPACE system and associated computer-implemented method could analyze the data/content, comments, data, statistics, and components of a project to generate a format fitness score relative to a particular set of rules, criteria, terms, and/or the like. For example, the data/content, comments, data, statistics, and components of a patent application (e.g. figures, parts, steps, shapes, numbering, labeling, comments, suggestions, formatting, and/or the like), where the results could be displayed with prioritization based upon the relative perceived and/or discerned adherence (or not adherence) to a particular set of rules, say the USPTO MPEP's rules (or similar for, e.g. EPO, JPO, etc.) for formatting and/or the like. In addition, the display data/content and/or elements could be scored, color-coded, highlighted, and/or the like, relative to the format rules overall, per project, per stage, per participant, per time window, per page/Figure, and/or the like.

In various non-limiting embodiments, the IPACE system would preferably search for inconsistencies and/or anomalies between the claims to highlight what is unique from all claims as associated to a parent, a particular application, a particular iteration, and/or in connection with all connected claims, just connected independent claims, just connected dependent claims, and/or just a particular user-identified claim.

Current spellcheckers don't provide all the functionality needed when appropriate, for say editing or relatively easily adding/removing a misspelled acronym. In various non-limiting embodiments, the IPACE system would preferably check for consistent terminology usage, definition tracking back to the specification written description(s), figures, and other sections such as claims, abstracts within this application and/or others linked (and preferably how).

In various non-limiting embodiments, the IPACE system would preferably display anomalies between, say a first term or definition used and other terms or definitions utilized in the created materials, most commonly cited definitions per the Webster dictionary, encyclopedia(s), industry dictionaries, encyclopedias, wilds, industry, trade journals, industry related education materials, industry prior art, inventor's prior art, the attorney's prior art, the assignees prior art, the examiner's prior art (if known or discernible), the art unit's prior art, the international commercial codes prior art, case history prior art, and the like.

In various non-limiting embodiments, the IPACE system generated and displayed anomalies would preferably include a variety of visual tools with relational mapping, clustering, patterns and/or the like, that may include a visual lexicon, semiology, etymology, taxonomy of a word (e.g. word correlations), term, symbol, phrase, slang, and/or acronyms usage varieties, definitions, historical references to interpretations by each party (e.g. Inventor(s), attorney(s), assignee (s), examiner(s), supervisor(s), PTAB/BPAI judge(s), Fed. Circuit judge(s), Supreme court judge(s), actual prior juror (s), prior mock juror(s) decision(s), current mock juror(s) review, prior peer(s) decision(s), current peer(s) review(s), prior expert(s) decision(s), current expert(s) review(s), cited case law(s), per country, and/or the like, and/or some combination of these delineation).

In various non-limiting embodiments, the IPACE system analysis would preferably include criteria, a score and a ranking from the relatively most commonly and/or accepted usage, and a definition for each word, term, symbol, phrase, slang, and/or acronym, based upon the data correlation segments selected, and/or displayed from relatively most common definition to the least. In various non-limiting embodiments, the IPACE system analysis would preferably generate the score based upon the data correlation segments selected by incorporating such elements that may be conditionally and additionally weighted for a particular set of circumstances. For instance, a particular user of the IPACE system would preferably input that the meaning of the word “riser” should be say, 90% weighted toward an industry category and/or “tag” of say, “oil exploration,” where a system algorithm would adjust score accordingly, so as to lean 90% towards that industry, but to still include data from other categories not tagged as “oil exploration.”

Collaborative Editing along with associated Disguised/Hidden Errors (e.g. Needle(s) in A Haystack) and/or Disguise/Hidden Rewards (e.g. Easter Eggs)

In various non-limiting embodiments, the IPACE system and the computer-implemented method for collaboration and/or reviewing data/content has an ability to generate and/or track a trackable error, where the trackable error may be randomly generated by the IPACE system and/or by a particular user and tracked to determine who and when a particular Participant (80) (e.g. a reviewer) finds the trackable error.

In various non-limiting embodiments, several parties may independently contribute, edit and/or modify data/content from a particular data/content version, wherein a collection of independent contributions may be judged independently and/or overlap and be judged collectively to arrive at a relatively improved data/content version. In this embodiment, the IPACE system and/or judges would analyze and generate a contribution score for each contribution, an edit score for each edit, and a modification score for each modification, where each score is attributable to a particular Contributor (50), Editor (61), and modifier, and/or a plurality of Contributors (50), Editors (61), and/or modifiers.

Error Discovery Scoring

In various non-limiting embodiments, the IPACE system and computer-implemented method for arriving at a data/content version via collaboration comprising of receiving a plurality of data/content, such as a text document (e.g. a written disclosure, a claim, or the like), a spreadsheet (e.g. table, chart, or the like) or art (e.g. a drawing of a figure, chart, or the like) from a plurality of data/content Contributors (50), and where the draft is independently edited and/or modified by a plurality of Participants (80), and where the IPACE system tracks who was first to find a particular error, who found the most errors, who missed the most errors, who relatively uniquely found particular errors when compared to others, and/or the like. Who found errors beyond the trackable errors, and/or when utilizing a previously searched and corrected document, who still found errors after others Participants (80) had completed his/her search and correction efforts.

Computer-Implemented Staggered Reviews

In various non-limiting embodiments, the IPACE system and the computer-implemented method allow patent applications to conditionally receive staggered reviews, say after the patent application is submitted, but before the application is published. This review could come from, say a proof reader, for instance, nine (9) months out after filing to help reduce the risk for someone trying to copy the idea, but soon enough, to hopefully catch any, say minor typo-like errors before publishing it.

Computer-Implemented Scoring Contributions

In various non-limiting embodiments, the IPACE system and the computer-implemented method of generating a contribution score per invention per claim score per inventor, where the score tracks who, when, and where in the specification contributed necessary support at the time of the contribution and subsequently. For example, being first would be a significant component, down to the form, e.g. written disclosure, figure, actual claim or claim limitation.

Color-Coded Spellchecker Functions Spellchecker modules/apps/UI (SC-UI) state of the art tend to revisit incorrectly spelled words every time the SC-UI is employed, unless to “add” to dictionary, but what if it is a document, article, or worse, a long book about misspelled words or web domains where every time the IPACE system and/or user runs the spellcheck module/engine (or when, say sending an email from a smartphone with auto spellcheck and/or auto spell correct employed automatically, systematically, continuously, persistently, conditionally, and/or user-selectively). With the spellchecker in user-check/select-mode, the user has to try to recall each highlighted word’s usage and/or re-read the sentence(s) or paragraph(s) to recall the word’s usage, context, purpose, and/or the like.

For example, a particular article on spelling may include an example for a reader that could include a particular word, words, acronyms, organization names, event names, brand names, product names, sir names, domain names, and/or the like, where each may appear incorrectly and correctly spelled repeatedly within just one paragraph. This becomes unmanageable by the current state of the art. What’s needed is a sub-system for marking, storing, defining, scoring, ranking, and/or the like, words that are known to be, discerned to be, and/or relatively perceived to be incorrectly spelt words, where the user does not wish to add, pollute, and/or store to/in any dictionary when confronted with the spellchecker capture, or, at present, but may later, say when the user can later verify an acronym, or following the registration of a domain name, company product naming decision, or when a particular slang term or acronym gains a threshold of acceptance by a user or segment of users, and/or the like.

In various non-limiting embodiments, the spellchecker capture could simply mark certain words for review later in a “second designated review later indicia/color” (e.g. green) that was different from a “first designated indicia/color” (e.g. red) for words that are discerned to not appear in current lookup of current dictionary(s). In various non-limiting embodiments, the spellchecker module/engine/UI could automatically, systematically, continuously, persistently, conditionally, and/or via/per actor/user-prompt employ functions, modes, dictionaries, and/or the like. For example, the user could conditionally set the spellchecker to not revisit the items in the designated review later indicia/color, if previously entered, say in a particular time window, before a particular event (e.g. sending an email, saving as a draft, saving as a finished document, filing for review, publishing, a specific prompt/request otherwise, and/or the like.

Further, the current state of the art sometimes fails to offer a suggested correct spelling of a particular captured word when it is incorrectly spelled, but also where the user doesn't see a correct spelling on the suggested correct spelling list. Here the user could be provided a "third designated review later indicia/color" (e.g. purple). Further, the current state of the art suffers similar issues when it comes to grammar, where the user may wish to revisit a particular captured and discerned offense at a particular moment in time, just before or after a particular event, and/or the like; instead of the grammar checker revisiting every discerned issued on every pass of the document, until the user indicates either "accept," "ignore/skip once," "ignore-all/skip going-forward" and/or the like.

Even the "ignore-all/skip going-forward" functionality is flawed, since it doesn't score, rank, list, isolate, recall, and/or the like, per the user's needs. Further, the user must re-invoke the functionality each time he/she/it utilizes the grammar checker, spellchecker, number checker, and/or the like, and for each captured/discerned item/incident, when the user may be working on a 500 page document and re-checking items repeatedly, say the grammar, colors, margins, styles, formatting checker rules/consistency, definition-consistency, lexicon-consistency, domain/art-unit specific dictionaries/rules/consistency, page layout checker rules/consistency (e.g. portrait vs landscape), image consistency, spelling, numbering, math checker, address checker, contact checker, publisher-specific-rulers, credit rules, measurement rules/consistency, currency-consistency/conversion, copyright rules/laws, ownership checker, embedded font checker, deadline checker, novelty-checker, redacting checker rules/consistency, court-submission-rules, a particular website-submission-rule, contest rules, social network rules, MPEP-submission/acceptance rules, EFSWeb-rules signature rules/consistency, power of attorney checker rules/consistency, and/or the like. Where the user may wish to focus on a particular item, condition, indicia/color, rule, element, word, spelling rule, color, color rule, grammar rule, numbering rule, numbering range, numbering formula, publisher, and/or the like, some combination, segmentation, permutation, and/or the of these. Here the user could be provided a "fourth designated review later indicia/color" (e.g. blue).

More Color-Coded Spellchecker Functions

In various non-limiting embodiments, a particular spellchecker function could analyze data/content and allow the user to progress through a result with misspelled words, where each misspelled word may be display a particular color/hue (e.g. "red"). In another embodiment, the IPACE system would preferably have a plurality of colors for the result with misspelled words, where one particular color/hue, say green, could be utilized to distinguish whether a particular word was previously added to a particular dictionary/lexicography for a particular project, by a particular user, for a particular purpose, and/or the like. Further, where the result with misspelled words could include and/or incorporate filtering for those elements/details automatically, conditionally (e.g. on mouse-over), and/or selectively.

This color-coding methodology could also allow the user to display a list of words in a particular lexicon, with the color coding according to a particular project, where the user could relatively more easier discern what words were added when, by whom, and/or the like, based-upon the color-coding. For example, the user could remedy a mistake and/or remove a particular word from a lexicography from a particular document, a particular project, with a particular time period/range, temporarily, permanently and/or the like, or some combination of these.

"Track/Report for Zones" module in a block 450

In various non-limiting embodiments, the "Track/Report for Zones" module in a block 450, in general, allows the IPACE member the functionality to manage his/her and/or an Account's (60) data/statistics and/or terms of where (e.g. what particular zone(s)) data/content was known, stated, discerned, and/or relatively perceived to have been created; and correlated zone data/content and rules in association with the IPACE Operating Environment. In various non-limiting embodiments, the "Track/Report Distribution Methods" 455 module would preferably provide a method to generate a report, data/statistics, and/or the like, regarding any existing projects as to who input what data/content, where, when, how, and/or correlated zones and/or rights per zone.

Computer-Implemented Tracking Zones

In various non-limiting embodiments, the IPACE system and the associated computer-implemented methods automatically create and/or allow for user-defined zones for tracking input, data, statistics, modifications, comments, negotiations, contracts, perceptions, challenges, decisions, copyrights, publication rights/duties/ownership, creativity novelty/duties/rights/ownership, authorship novelty/rights/duties/ownership, Inventorship novelty/rights/duties, transfer rights/duties, licensing rights/duties, delegation rights/duties, assignment rights/duties, intellectual property rights/duties/novelty/ownership, legal duties/rights, employee duties/rights/ownership, contractor duties/rights/ownership, investor/shareholder duties/rights/ownership, and any modifications, and/or the like per zone.

Defined Geographic Boundaries

In various non-limiting embodiments, preferably each project has clearly pre-defined and unambiguous tracking boundaries, territories, delineations, or zones (e.g. a universe-zone, a planet-zone (e.g. planet earth), a country-zone (e.g. US), state-zone (e.g. CA), county-zone (e.g. Los Angeles County), city-zone (e.g. Encino, CA), property-zone (e.g. as defined, say by a property deed), building-zone (e.g. as defined, say on the property deed), floor plan-zone (e.g. as defined, say within a lease dated X to Y dates), company-zone (e.g. all listed company owned or leased properties with lot boundaries), office-zone (e.g. a particular office boundary, say defined by an unambiguous naming convention on the lease floor plan and/or coordinates), client-zone, travel-zone, airport-zone, in-air-zone, over-international-water-zone, manufacturer-zone, delivery-zone, raw-material-zone, vendor-zone, outlet-zone, retailer-zone, vendor-zone boundaries, specific advertiser-zone boundaries, specific publication-zone boundaries, specific event-zone boundaries, specific home-zone boundaries, specific education-zone boundaries, and/or the like) where a particular participant is either inside a particular zone or in another zone outside.

In various non-limiting embodiments, preferably any negotiations and agreements between participating parties regarding all the issues, such as creative and IP rights, duties, ownership, and/or the like, would be unambiguously defined and addressed regarding what specific zones are relevant for fostering, motivating, compensating, creating, spawning, limiting, removing, and/or the like: rights, duties, ownership, by whom, and to what degree, how, when, why, where, and/or the like. Zones may be defined by well known, accepted, and defined geographic boundaries, such as property coordinates for defining a parcel of property, or may be perceived by system analysis of say data, statistics, input, usage, locations, times, and patterns of a particular participant (e.g. input from a particular location determined via say, GPS, triangulation, hot-spot AP address, IP address, and/or the like, via a particular period of time, correlated with other discernible data, statistics, such as his/her work hours, home address and/or the like, to relatively perceive that input from a particular IP address at a particular time of day that correlates with the home address stated on an executed contract is, say 92% perceived to be coming from the particular participant's home. In various non-limiting embodiments, the IPACE system may increase or decrease the 92% perception in this example by continually tracking usage and patterns.

For example, the particular participant may move locations where the data no longer comes from that same IP address, where data collected over time may reveal he/she was traveling or has changed home addresses. In addition, the IPACE system would preferably incorporate methods to verify and validate perceptions by asking a question if a particular perception, perception element, list of perceptions, group of perceptions, and/or the like, are true, false, likely true, likely false, and/or the like. The question could be directed to the particular participant, his/her boss, HR, co-worker, project manager, campaign gatekeeper, investor (s), attorney, partner, spouse, government agency, education institution, and/or the like.

Zones Without Territorial Boundaries

In addition, zones may be defined by who specifically would own any input or creative work within the zone by a particular participant if created, say within such zone delineations as a user-ownership-zone, which could include all zones other than any employer-ownership zones (e.g. via a Boolean operator of the "universe zone" minus the "specific company-zone/boundaries"). Further, zones may not have territorial boundaries. For example, there could be an "equipment-list zone," where usage of a company-listed and/or supplied equipment, say a particular mobile device, laptop, or the like may fully determine and/or play a role in conditionally determining, say creativity and intellectual property rights/duties, ownership and/or the like. Some zones may be a hybrid of the non-territorial and territorial zone. For example, when a particular participant conditionally accesses a particular data set or database, say via a particular software program, application, browser, search engine, and/or the like; say via a particular method, network, network protocol, network equipment, network connection, and/or the like (e.g. a particular Wi-Fi Access Point (AP), VLAN, SDN, database, Cloud storage, smtp server, email account, and/or the like); and/or say via a particular login, password, PIN, login protocol, IP address, and/or the like.

User-Ownership Zone

In addition, some zones, say during certain moments in time and/or under certain conditions, may overlap where input, copyrights, Inventorship, assignment rights, creativity duties/rights/ownership, intellectual property rights, legal duties/rights, investor duties/rights, and/or the like, may be debatable, suggest or require predetermination, suggest, allow, or require subsequent decision-making (e.g. by a group such as the IPACE court, an employer, peers, experts, the PTO, US courts, and/or the like). In some instances, the ownership may be limited or removed, say due to prior carve out agreements, government laws, past input, and/or the like. For example, a particular participant's entire historical input for a particular project (e.g. a patent application for a new jet engine) has occurred entirely within a user-ownership zone where the particular participant may claim full ownership, say from his/her home (e.g. via the specific home-zone boundaries, e.g. lot lines, IP address, GPS coordinates, and/or the like), where the IPACE system knows or has perceived the historical input to have taken place inside the specific home-zone boundary which is predefined as being within the "user-ownership zone."

In various non-limiting embodiments, subsequently, that same particular participant/user may wish to edit an existing portion of that patent application for a new jet engine in another location. Depending on the TOU/TOPs and/or the like, if that other location is perceived to be part of the "user-ownership zone," then system may notify and verify with the particular participant/user that the perception is corrected. If that other location is instead perceived to be an "unknown zone," then system would typically be preset to notify the particular participant/user and request specific information to better or fully determine the zone, limit usage inside that zone, terminate usage inside that zone, allow the user to continue usage under certain conditions and/or acknowledgements, and/or the like. If that other location is instead perceived to be an "employer-ownership zone," then the IPACE system would typically notify the particular participant/user of the limitation, ramifications, and/or conditions for potentially limiting, losing, assigning, and/or the like, some or all the rights, duties, ownership, and/or the like, where the TOU/TOPs, may require acknowledgements before proceeding.

Employer-Controlled Zone

In various non-limiting embodiments, the "employer-ownership zone" may instead be an "employer-controlled zone," where under certain conditions (e.g. conditional terms) the particular participant/user may continue work, create, edit, comment, and/or the like, request permission to work, create, edit, comment, and/or the like. For example, the conditional terms placed on the particular participant/user may be that he/she may work, create, edit, comment, and/or the like, on his/her own project as long as he/she is not creating intellectual property, or as long as he/she is not creating intellectual property under a list of company defined industries that it participates within, and/or the like. For instance, the list of company defined industries that it participates within may contain wine bottling, where the particular participant/user's patent application for a new jet engine would clearly be outside the list and hence free to continue working on his/her project. The conditional terms may also include limits on which days, what windows of time, and/or the like, where, for example, he/she may only be able to work on his/her project within the "employer-controlled zone," say on Fridays after 1 pm and on Saturdays, and Sundays.

In various non-limiting embodiments, the conditional terms may also include proof of other accomplishments of say, duties, responsibilities, tasks, within a deadline, and/or reviewed and accepted, say before he/she would be able to work on his/her project within the "employer-controlled zone," where the IPACE system would track all the criteria, interact with the appropriate parties, and allow the work to start, continue, or not. The conditional terms may also include accepting or surrendering partial ownership now and/or in the future for work performed inside the "employer-controlled zone," where the ownership could be limited to what was created where, when, how, and/or the like, and the IPACE system would track all the criteria. For instance, the particular participant/user works on the patent application for a new jet engine, and later obtains a patent that is sold for $1 million dollars. The conditional terms acknowledged and accepted by the particular participant/user years earlier while working on the patent application for a new jet engine, may have stated that the employer (e.g. the corporation) would be entitled to 1% of any monetization event associated with the patent application, where the IPACE system would track the application, grant, monetization event, and/or the like, and notify and/or interact with the appropriate parties along the way.

In various non-limiting embodiments, the conditional terms acknowledged and accepted by the particular participant/user years earlier while working on the patent application for a new jet engine, may have also stated that the employer (e.g. the corporation) would also be entitled to additional ½% kicker of any monetization event directly attributable to creative work performed on the patent application from inside the "employer-controlled zone," where the IPACE system would track each input into the application regarding where, when, and/or the like, and the relevance towards a grant, monetization event, and/or the like, and notify and/or interact with the appropriate parties along the way. For example, if the patent application was licensed for a particular set of claims based off of supporting figures and a written-description that were all fully created outside the "employer-controlled zone," then the employer would be deemed or not be entitled to the additional ½% kicker.

However, if the particular participant/user enjoyed and/or benefited by using a particular company computer, network, device (e.g. 3D prototype printer), internet connection, and/or the like, then it could be deemed that the employer would be entitled to the additional ½% kicker. If there is any confusion, ambiguity, challenge, and/or the like, to the terms, acceptance, zones, usage, and/or the like, regarding the kicker, the issue could incorporate a decision body, such as a mediator, arbitrator, courts, IPACE court, and/or the like, where depending on the TOU/TOPs, and/or the like, decisions could be final, suggested, partially, and/or the like, where the employer may get a kicker value different than the ½%, say based upon some ambiguity in the employer's terms accepted by the particular participant/user at the time.

Economic and Development Zone

In various non-limiting embodiments, these same types of conditional terms and kickers could be provided by other zones, say a particular "economic and development zone," where creators and inventors are provided conditional terms for current and/or future valuations, equity, proceeds, accomplishment, feedback, access, and/or like, in exchange for, say assess to particular locations, offices, conference rooms, secretaries, equipment, software, data, statistics, tools, expertise, feedback, and/or the like. In addition, the conditional terms could include locating, sourcing, recruiting, supplying, and/or the like; potential or actual: participants, contributors, Joint-Inventor/Co-Inventors, co-creators, co-designers, band-mates, cast-members, CPAs, attorneys, agents, former PTO employees, former mock jurors, investors, mentors, employees, contractors, advertisers, PR, celebrities, reporters, publishers, predictors, consumers, manufacturers, vendors, suppliers, resellers, distributors, exporters, testers, researchers, transcribers, editors, reviewer, translators, advertisers, and/or the like; where the exchange could be conditionally tied to a relative accomplishment, perceived current of future valuations, ROI, and/or the like.

For example, a particular IPACE member/user who is seeking to put together a band may receive an offer regarding a particular potential band-mate as part of the term negotiations by a particular "economic and development zone," where the particular potential band-mate is described in relatively general terms without giving away the person's name, address, song titles, tour information, band names, and/or the like. For instance, say by listing his/her general skills as plays a particular guitar, sings a particular genre, and/or the like, and his/her experience as played in a band for seven years, and his/her availability as lives here in LA county, works part-time during the day, no longer in the other band, actively seeking opportunities, and/or the like; and where the TOU/TOPs, and/or the like, may allow the recipient of such an offer (e.g. the IPACE member/user) to either, say (1) reject the offer, (2) accept the offered terms, (3) request more information, (4) counter offer, (5) pay a particular fee to request and/or learn specific information, and/or the like.

In various non-limiting embodiments, the third option to request more information, or the fifth option to pay a particular fee to request and/or learn specific information, for instance, could include a request to learn, say the relative historical success of the particular "economic and development zone," and/or the relative success of the particular potential band-mate, past participant feedback, and/or the like. The second option to accept the offered terms, may include the right to access that same information, contact or interact with the particular potential band-mate, view and hear demo clips of video or audio, see images, relative historical success compared to, say, other band-mates offered by the particular "economic and development zone," compared to all zones, compared to other band-mates within a similar segmentation group, compared to others within a similar demographic, psychographic, and/or the like. In addition, the accepted terms may include the right to learn the person name, email, SMS, call, address, age, resume, and/or the like, and a limited number of conditional interactions and/or negotiation.

Real-Time Visual Tracking Information Per User Input Per Zone

In various non-limiting embodiments, before, during, and/or after any user input, the IPACE system may notify the IPACE member/user who is preparing to input, is viewing, is logged-in, downloading, accessing, comparing, synchronizing, and/or is performing a particular input, as to what zone(s) he/she is perceived to currently be residing, and any perceived or discernible ramifications, rights, duties, limits, and/or the like, if any. In various non-limiting embodiments, the IPACE system and the associated computer-implemented methods may display the number of modifications made over time and display visual information as the user inputs (or automated system inputs) are actually being implemented, including any perceived or known: viewing, navigating, reviewing, selecting, downloading, synchronizing, input devices data (e.g. keystrokes, mouse-movement, mouse-overs, drawing, recordings, scans, downloads, user-saves/save-as, auto-saves, and/or the like), iterations, versions, editing, undo/redo usage and history, compiling, synchronizing, commenting, translating, transcribing, deciding, reviewing decisions, accepting, rejecting, countering, suggesting, and/or the like.

For example, an IPACE member/user (e.g. a project participant) may create, build, and/or select a base document and/or document template for writing say a software patent application from his/her inputs and/or from a list of base assumptions displayed by the IPACE system based upon historical inputs of that particular participant/user, historical inputs of perceived similar participants/users/roles (e.g. other inventors, other draftspersons, other patent attorneys, and/or the like), where the list of base assumptions may continually be modified per user input. For instance, the list of base assumptions may ask the particular participant for template inputs, say as to what type of template he/she is looking to create and/or goal he/she is hoping to accomplish for a project and/or task, say for creating a patent application, then what type of participant and/or role does he/she anticipate fulfilling on the project, say Lead Inventor, and/or some other roles. The list of base assumptions and template inputs may include additionally relevant questions based upon historical data discernible or perceived about similar templates, projects, tasks, goals, participants, roles, that IPACE member/user and/or the like.

"Track/Report Discerned and/or Perceived Opportunities" 451

Computer-Implemented Suggested Additions

In various non-limiting embodiments, the IPACE system gives selective members visible access to pending applications, where these members may offer additions for a pre-set price, exchange, and/or based upon success of the addition; for instance, an additional claim where it does get granted and does become commercialized in a preset conditional and/or quantifiable manner.

Computer-Implemented Sorting Members

In various non-limiting embodiments, the IPACE system and associated computer-implemented method generates a list of all Inventors (70) by the number of applications, granted patents, pro se (self-represented), with Joint-Inventor/Co-Inventor (41), and assigned, and/or the like. In various non-limiting embodiments, the user may visit a website/portal, application, and/or the like that provides the users tools to search, filter, sort, and/or rank the generated list of inventors.

Computer-Implemented Agent Searching

In various non-limiting embodiments, the IPACE system would preferably analyze pending applications, such as those with prosecution, to search out acquisition bids or partners (e.g. claims, selling/licensing agents). In addition, the IPACE system provides an agent-like service, Agent searching service, and compensation for introductions, say to an Investor (67), or say where a recording artist states that he/she is willing to compensate any person capable of introducing him/her to someone and/or an entity that leads to a record contract and/or the like, where the compensation may be predetermined, conditional, and/or the like.

"Track/Report Transcriptions and Translations" module in a block 452

Relative Transcription and/or Translations Fitness Score

In various non-limiting embodiments, the IPACE system has a computer-implemented method for transcribing audio to text (and/or translating) where an analysis of a transcription (and/or a translation) accuracy creates a relative transcription fitness score, a relative translation fitness score, and a review assignment to a transcript reviewer (e.g. segment types: reviewers, editors, researchers, peers, experts, attorneys, and/or the like), where the review assignment includes an analysis of the transcript, translation, and/or the reviewers for ranking which segment type and/or specific transcript reviewer (and/or translator) is either relatively available, relatively better suited for a particular fitness score and/or issue, relatively efficient, relatively cost effective, relatively successful, relatively accurate, relatively reliable, and/or the like.

In various non-limiting embodiments, the IPACE system and associated computer-implemented methods for interrogating, extracting, analyzing and translating audio to text would preferably incorporate an analysis of the accuracy (and/or the like), wherein the accuracy creates a relative fitness score. In various non-limiting embodiments, the relative fitness score would interrogate, analyze and score a review assignment, e.g. a transcription, translation, and/or similar, say be a transcriber, translator, a reviewer of the transcript/translation, and/or the like. In various non-limiting embodiments, the relative fitness score would incorporate, associate, and/or designate such data as correction, modified elements, "needles-in-a-haystack-found (e.g. intentionally placed errors/typos/etc.)," "needles-haystack-not-found," user/reviewer-found-errors, segment types, project times, temporal data and/or the like, per participant: e.g. reviewer, editor, researcher, peer, expert, attorney, agent, examiner, translator, transcriber, and/or the like. In various non-limiting embodiments, the review assignment includes an analysis of the transcript reviewers for ranking which segment type and/or specific transcript reviewer is either relatively available, relatively better suited for a particular fitness score and/or issue, relatively efficient, relatively cost effective, relatively successful, and/or the like.

Marketplace for Real-Time Translation Bidding

In various non-limiting embodiments, the IPACE system would provide a portal (e.g. via website) that pulls existing translation listings for, say figures, translations, and the like, and creates a marketplace for real-time bidding and project collaboration. In various non-limiting embodiments, the IPACE system would provide a portal (e.g. via website) that allows users to browse, search, query, link, download, and/or the like, the PTO databases, and create spreadsheet files (e.g. in tables, Excel®) for patents with separate fields for inventors, assignees, filed, Issued, and the rest and the like.

Generate Valuation Per Stage

In various non-limiting embodiments, stages can help create delineations for different windows of time, accomplishments, goals, and/or the like, where some will have absolute windows, moments in time, and/or where others may be defined. Stages, for example, may comprise stages for: a completed Conception Stage, Search Stage, Prototype Stage, Written Disclosure Stage, File Preparation Stage, Provisional Filing Stage, Non-Provisional Filing Stage, PCT/EPO (or similar) Filing Stage, Pre-International Search Report Stage, Post-International Search Report Stage, Foreign-Country-National-Filing Stage, Pre-Publication Stage, Post-Publication Stage, Prosecution-Pre-FOAM (First Office Action on the Merits) Stage, Prosecution-Post-FOAM Stage, Prosecution-Pre-RCE Stage, Prosecution-Post-RCE Stage, Continuation Stage, Divisional Stage, National Filing State, Post Grant Stage, Licensing Stage, Pre-Litigation Stage, Litigation Stage, Post-Judgment Stage, Pre-Appeal Stage, and/or the like; where some stages may not be included or where some stages may partially and/or fully overlap with others.

In various non-limiting embodiments, the IPACE system may track each project's monetization events (e.g. licensing, litigation, disbursements, and/or the like) and generate an analysis of anticipated future expenses, settlements, licensing revenues, disbursement, and/or the like. For example, the members/users who have contributed to a monetization event, and/or members/users that are due to receive disbursements from a monetization event. In additional, where the Terms of Participation (TOP) in a patent application or similar should preferably outline a future expenses plan to pay for a "future patent prosecution costs" for participants time, experts, extension fees, government fees, other related fees, patent term adjustments, petitions, PTAB/BPAI, appeals, travel, postage, related communications and/or legal work; and for a "future patent monetization costs" for participants time, experts, government fees, maintenance fees, allowance fees, other related fees, deposition costs, court costs, appeals, travel, postage, related communications and/or legal work. This is especially true if other IPACE members are being offered equity or being asked to defer compensation or equity with a success-based arrangement.

For example, a particular Lead Inventor, with an IPACE PIN for creating a patent application, is conditionally offering some specifically targeted and segmented IPACE participants potential Joint-Inventor/Co-Inventorship should he/she add new material to the existing specification within a predefined timeframe, which support new claims, provided the potential Joint-Inventor/Co-Inventor pay the necessary additional PTO filing fees and he/she is will to be compensated on a success-fee basis where the potential Joint-Inventor/Co-Inventor conditionally earns, for example, 50% of any licensing fees and/or litigation awards that are directly attributable to the potential (now) Joint-Inventor/Co-Inventor's contribution.

In various non-limiting embodiments, the conditional earnings could be subordinate to a pre-defined budget (or range), and/or subordinate to a reasonable allowance of an actual costs and a remaining anticipated costs budget (e.g. based upon an "actual patent prosecution costs," an "actual patent monetization costs" and the remainder of the "future patent monetization costs"). The budgets could include overall caps, caps per subject, per party, and/or the like, and some combination of these.

In various non-limiting embodiments, a "funding plan for patent prosecution costs" for the "future patent prosecution costs" and a "funding plan for patent monetization costs" for the ""future patent monetization costs" could incorporate an offer, for example, either with a pre-set budget that has already been set aside and designated for each in the IPACE FINANCIALS mgmt. module, with a pre-set budget where IPACE investors (or the like) may conditionally purchase equity, with a pre-set budget where specific IPACE Members, say the Lead Inventor 40, is allowed "X" number of days to raise the budget with a cap on funds for equity that the particular IPACE PIN and terms are willing to accept within a certain period of time, with some combination of these methods, and/or with some other funding plan.

In various non-limiting embodiments, the terms of the funding may be set to evolve based upon conditional time and/or event triggers, where success or lack of success with the funding, the patent, actualized costs, and/or the like, may modify the funding terms. Furthermore, the funding could conditionally take place in a closed market of pre-qualified potential investors, in a relatively more open marketplace/exchange of conditional competition to validate the funding and terms, and/or on an approved and appropriate public exchange.

"Track/Report Overall or Relative Successfulness (etc.)" module in a block 455

Overall and/or Relative Successfulness

In various non-limiting embodiments, the IPACE system would preferably also analyze the data and generate reports as to who, what, how, when, why and the like, certain project elements, Participants (80), and/or other factors (e.g. additional funding, outsider delays, increased bonuses, a time extension purchased, a party/member quitting, Peer (65)/expert status points, and/or the like) may each, in isolation and/or collectively, measurably contribute to a project's overall or relative successfulness in terms of, say cost savings, ROI, time efficiency, quality, attracting other relatively valuable Participants (80), generated and issued claims that prevent competition.

In addition, the IPACE system analysis and report may incorporate the overall or relative successfulness in terms of perceived or actualized data/statistics, such as a generated, filed, and/or issued claim that can/does produce industry leading products/services and revenue; a generated, filed, and/or issued claim that may be/is asserted to remove competition, and revenue; a generated, filed, and/or issued claim that can/does produce licensing revenue; and/or the like. And where the data may also determine if a particular generated claim was relatively successful and/or inexpensive to produce; if a particular filed claim was relatively successful and/or inexpensive to prosecute to issuance; if a particular issued claim was relatively successful and/or inexpensive to commercialize with an associated product; if a particular issued claim was relatively successful and/or inexpensive to enforce or generate licensing revenue; if a particular issued claim was relatively successful and/or inexpensive to generate a ROI; and/or the like.

In addition, the IPACE system would analyze data/statistics, including data/statistics from the historical collaboration table to generate reports regarding what Participants (80) are relatively the most detail-oriented by establishing such metrics and tendency tracking as to who tends to catch the most errors overall relative to his/her participation overall or on a particular project, relative to his/her participation in other projects. In various non-limiting embodiments, the IPACE system would preferably also learn from common mistakes made by a particular participant and/or found a particular participant, where the IPACE system would preferably then take a particular element and/or set of notifications, rules, tasks, parties/members/users, and/or the like, and analyze other existing projects or the like for similar concerns, errors, issues, suggested improvements, per element, per participant, per project, and/or the like. In various non-limiting embodiments, the IPACE system would preferably then create a report for those parties to view, review, manually and selectively utilize, and/or set rules to automatically utilized historically, on selected documents, selected ranges, selected rules/elements, and/or going forward. For instance, the IPACE system would preferably be set to alert a particular user when he/she is utilizing a particular word, phrase, definition, part number, part name, symbol, and/or the like in a manner previous perceived and/or determined to be relatively incorrect, flawed, In various non-limiting embodiments, the IPACE system would preferably also be set to acknowledge a user's improvements by prompting and/or signifying when a particular user has changed a past tendency that was perceived and/or determined to be relatively incorrect, flawed, and/or the like, where the IPACE system tracks what he/she types or creates a particular word, phrase, definition, part number, part name, symbol, and/or the like; and/or utilizes a particular tool, function, and/or method (e.g. "find and replace" in general, "cut and paste" in-general, "cut and paste" from a particular source, say with or without properly crediting). In various non-limiting embodiments, the IPACE system would preferably track each user input relative to previous tendencies perceived and/or determined to be relatively improvement, correction, and/or the like; relative to the user's past propensity to, say not utilize a particular word, phrase, definition, part number, part name, symbol, and/or the like; and/or a particular tool, function and/or method relatively incorrectly, poorly, improperly, and/or the like.

In various non-limiting embodiments, the IPACE system may track the overall and relative successfulness of improving and converting each Participant's (80) bad habits or errors into good habits and corrections in terms of perceived and actualized relative speed, value, ROI, and/or the like, when compared to all IPACE members; to all Participants (80) within a particular entity, group, or club; to all Participants (80) within a particular project; to all Participants (80) within a particular task or deadline; to all Participants (80) within the same IPACE membership type, IPACE role(s), IPACE status, IPACE points-earned, expertise-level, and/or the like; to all Participants (80) within the same compensation and/or equity arrangement, same compensation and/or equity range earned, same compensation and/or equity range received-to-date, and/or the like; to any Participant (80) within the same IPACE with similar or the same tendencies or habits; and/or the like; and/or to any Participant (80) specifically selected within the same IPACE.

Further, the IPACE system may track the overall and relative successfulness improving and converting each Participant's (80) bad habits or errors into good habits and corrections in terms of perceived and actualized relative speed, value, ROI, and/or the like, when compared to IPACE members within the same or a selected segmentation for say, demographics (e.g. a selected geography, zip code, gender, race, marital status, age, occupation, experience, education, and/or the like), psychographics (e.g. personality, opinions, interests, values, beliefs, lifestyle, hobbies, and/or the like), behaviors, historical-tendencies, historical-habits, historical-participation, billing habits/trends, work habits/trends, participation habits/trends, shopping habits, consumption habits, and/or the like.

In addition, the IPACE system may analyze the data for a particular Participant (80) to generate a report regarding where the Participant (80) is in terms of correcting a perceived bad habit or bad-tendency in terms of anticipated rate of relative improvement, where the IPACE system compares the particular Participant (80) to existing Participants (80) who have either relatively improved, stayed the same, or became relatively worse, so the IPACE system and other Participants (80) may help that particular Participant (80) improve, allow him/her to challenge the allegation of the bad habit or error, where his/her assertion of the IPACE system and/or another Participant (80) is incorrectly alleging a bad habit or error may in fact be anomaly that the IPACE system and/or other Participants (80) may learn from, and where Participant (80) may search for similar situations for other possible anomalies to alert Participants (80) with the proper roles to assess the accuracy of previously alleged bad habits, errors, and/or the like. And where the IPACE system may automatically retroactively modify any related data/statistics, so other Participants (80) are credited with the same correction in the analyzed historical data/statistics and may be alerted to the correction. In various non-limiting embodiments, the IPACE system would preferably also or instead be setup to only allow certain members to selectively and conditionally retroactively make such changes to the historical data.

Further, the IPACE system analysis may compare the particular Participant (80) to existing Participants (80) who have either relatively improved, stayed the same, or became relatively worse, so members of the IPACE system may track those member who have relatively improved the most, relatively improved the least, challenged the allegations, relatively challenged the allegations the least, relatively challenged the allegations the most and relative score as to whether the challenged allegations were found relatively correct, relatively incorrect, and/or the like. Further, how assertions relatively helped him/her and/or other Participants (80) within the tracking system relatively improve skills, relationships with others, efficiency, output, ROI, and the like. As well, as his/her own improved ability to connect with more members; obtain more status points; work on more or less projects (e.g. depending on goals of the participant); work on preferred projects (e.g. where the member has previously or subsequently ranked projects or task based upon his/her priority preferences and/or selectively interests); earn more compensation and equity; charge more per hour, project, and/or task; work more or less hours (e.g. depending on goals of the participant); work with particular members, entities, clubs, inventions within a particular art-unit, and/or the like.

In addition, the user and/or the IPACE system would preferably systematically generate errors to determine who is most proficient and/or diligent in finding errors or bad habits pertaining to himself/herself or others. For example, a particular reviewer may be relatively proficient at finding errors from a particular inventor, where the inventor has a tendency to refer to a particular component incorrectly and/or unnecessarily uses multiple terms for the same part. For instance, the same component with the same perceived functionality and definition by the inventor is sometimes referred to by the inventor as a mobile device, but later as a cellular phone. Here the reviewer or an "initial-assertion-party" may annotate the perceived error and the inventor or an "assertion-receiving-party" may either select to make the correction globally by selecting which term is preferred; or among other options, alert the reviewer (initial-assertion-party) that the "mobile device" and "cellular phone" are two distinctly different components with different definitions within the specification.

If in the latter scenario, where the inventor (assertion-receiving-party) has counter-challenged the reviewer's allegation of a perceived error, the reviewer (initial-assertion-party) may either agree with the inventor and concede, where the IPACE system tracks the concession; or the reviewer may counter with an identified text range or section, where the inventor's assertion is perceived by the reviewer to be incorrect based on some identified finding of facts. For example, the reviewer (initial-assertion-party) should identify where the asserted error appears, say on page 10, lines 40 to 45, and state/comment where the inventor defined a "mobile device" as "X," but where later the inventor, on page 12, lines 8-11, also defined a "cellular phone" as the same "X" definition.

Here either the reviewer could be correct and rewarded points accordingly, or the reviewer is incorrect, say due to the "cellular phone" definition actually not being just "X," but instead "X+Y;" and where the reviewer could lose points or have demerits assigned to him/her depending on an initial-level-of-assertion when he/she originally made the assertion and/or including any subsequent levels of counter-assertion by him/her or the "assertion-receiving-party." In this instance, each involved party (e.g. IPACE member) states his/her relative confidence in asserting the error (or lack of error) and/or counter-asserting the lack of error (or error) using, say a Lickert continuum of 0-100% likely (where 100% is an assertion of a definite error (or definitely not an error), or where instead the party may avoid the scoring and simply mark an area for review or consideration. Preferably each assertion has a relevant "text range selection," "image section," "range of figures," "clip range (for audio and video)," or similar per where the error(s) occurs, along with any and all helpful annotations, comments, and/or any suggested and/or necessary corrections.

For instance, the reviewer (initial-assertion-party) should not simply say a particular page or paragraph was confusing, but instead cite what particular section of a particular document and what version of the document (e.g. with a version number and/or timestamp), a perceived author of the data/content, a numbered paragraph and what particular lines were confusing, down to what exact word(s), phrase, number, symbol, depiction, and/or the like, and why. For example, "why" could include a perceived untraditional definition of a word or phrase; an unrecognizable, misused, or unexplained acronym; a contradiction to another section or part; a perceived typo; a perceived grammatical error; and/or the like. If a particular section is confusing due to another term, phrase or section, the reviewer (initial-assertion-party) should indicated those sections as well, along with the other confusing, and/or conflicting text, sections (paragraphs/lines), images (Figures/parts), and/or the like.

In various non-limiting embodiments, the IPACE system would preferably have a predetermined scoring system, where the initial-assertion-party would be rewarded, say hundred (100) total points, if the initial-assertion-party and associated assertion were subsequently reviewed and determined to be correct by either an assertion-receiving-party (e.g. Participant (80) or group of Participants (80)), the system, and/or some judging/decision body. When the initial-assertion-party (e.g. the reviewer) makes his/her initial assertion, he/she may not be 100% certain that a particular element discovered is in fact an error and may simply comment the section, but depending on the reward/demerit system, may not receive any points, if, in fact, an error is discovered. If, on the other hand, the initial-assertion-party (e.g. the reviewer) over predicts his/her initial assertion as, say 100% likely to be an error, but through a system of checks, verifications by the system, and/or particular members, and the assertion of an error is found to be an incorrect assertion, then the initial-assertion-party (e.g. the reviewer) may lose some points from his/her running total, lose some points for a particular project, lose some points for a particular task, and/or receive some demerit points, affect his/her expert status, and/or the like.

For instance, the initial-assertion-party (e.g. the reviewer) may lower his/her initial assertion for 100% likely to be an error to say, 80% likely to be an error, where he/she would receive less credit if correct, but also loss less points (and fewer demerits) if incorrect. This also always the assertion-receiving-party (e.g. say, the Project Manager (43) or Lead Inventor (40)) to sort the assertions made according the initial-assertion-party's level of confidence and, say work off the top from those perceived to most likely be errors by the reviewer, or say, off the bottom, to see where and/or why the reviewer is confused by particular sections.

If the initial-assertion-party (e.g. the reviewer) scored a particular assertion of an error as a "definite" error (e.g. pre-scored at 100% error) and was correct, he/she could receive 100% of the total points available. If he/she instead pre-scored a particular assertion of an error at 50% likely error, the IPACE system would instead reward the initial-assertion-party with 50% of the hundred (100) total points or fifty (50) points, if the initial-level-of-assertion was subsequently reviewed and determined to be correct by either an assertion-receiving-party (e.g. Participant (80) or group of Participants (80)), the system, and/or some judging/decision body.

If on the other hand, the initial-level-of-assertion was subsequently counter-established as incorrect (and could include by some relative degree, e.g. 0-100%) by the assertion-receiving-party (e.g. a particular Participant (80) or group of Participants (80)) then, depending on the pre-determined scoring rules, the initial-assertion-party may stand to lose points or received demerits if the initial-assertion-party subsequently concedes or it is determined by some group (e.g. a Project Manager (43), Lead Inventor (40), an IPACE court and/or similar) to actually be an incorrect assertion. This incorrect assertion, may include by some relative degree (percentage of 100%), where part of the assertion was correct and some incorrect, say, similar to determine fault in two-party car accident, where either all the fault may be assigned to one party, some fault may be assigned to each party equaling 100%, or where each party may receive some fault and the collective party percentages may exceed 100%.

For instance, if a ruling body (e.g. an automated IPACE analyzer and/or the IPACE court) could determine that the initial-assertion-party was not fully correct in her assertion, and to what degree. Further, the score attributed to an assertion or counter-assertion may also incorporate a subsequent-level-of-perceived-likelihood-of-the-assertion, where party may increase or decrease the initial-level-of-assertion and each subsequent-level-of-perceived-likelihood-of-the-assertion until resolved. In various non-limiting embodiments, the IPACE system would track the ability of a participating party to match his or level of subsequent-level-of-perceived-likelihood-of-the-assertion to the results per project per the assertion-receiving-party, and/or per other segmentations.

In various non-limiting embodiments, the determination of which party is/was correct and the points associated for the assertion being correct or incorrect, may incorporate the number of subsequent communications and/or assertions by each party, the degree of clarity provided initially by each party, and in each subsequent communication, where points may be subtracted for parties who fail to properly or adequately address a pending question or concern, don't reply within a time limit, reply relatively ambiguously, and/or the like, as determined by the IPACE system analysis, predetermined Participants (80) or a group of Participants (80), the IPACE court, and/or some other judging/decision body. Depending on IPACE rules and the given situation, points previously subtracted, demerits applied, awarded, and/or the like, may be modified, appealed, and/or retroactively adjusted by the appropriate parties.

In various non-limiting embodiments, the IPACE system would preferably have a plurality of scoring systems, where the IPACE system would preferably keep track of the scores based upon an overall pre-determined scoring system, while still allowing for separate, individualized, and/or IPACE scoring systems. Where, for example, the IPACE members and/or a selected group of members are allowed to modify the rules, say for a particular project or entity, and where those rules are either locked down before a particular event (e.g. project starts, or task starts/ends) or allowed to evolve, be retroactive, ruled-case-by-case, ruled assertion-by-assertion, and/or the like, by a governing body that is pre-determined, has pre-determined qualification requirements, and/or may also have its Participants (80) evolve during the course of a project, task, assertion, and/or when in session, and/or the like.

Depending on the TOU/TOPs and other terms, the IPACE system would preferably reward additional points, where the reviewer made a correction, suggestion, and/or the like, and where his/her corrections were analyzed as correct by the system. Ideally, the initial-assertion is parsed and/or broken into discernible and measurable components that may be scored individually. For example, finding a particular component and associated part number for say a computer component labeled a "computer processor" with part number 11 later appears with part number 13 and there is already a part number 13 for another computer component labeled a "computer database." Here the initial-assertion-party should indicate each conflict where the IPACE system would preferably use a function similar to “find and replace” and make the actual perceived corrections. In some instances, the Lead Inventor (40) or other parties may not want Reviewers (64) to make suggested changes and would block such modifications and/or suggestions; or send through an IPACE data/content analyzer and/or third party for prior review before forwarding either no-suggestion, a limited amount of suggestions perceived to not create a Joint-Inventor/Co-Inventor (41), and/or make a recommendation as to whether the Lead Inventor (40) should consider making the suggestion and associated reviewer a Joint-Inventor/Co-Inventor (41).

In various non-limiting embodiments, the perceived error asserted could also include an antecedent error in the claims; an incorrect number of the claims; a missing trademark symbol; a credit appears to attributed to the wrong prior art or source; a flowchart arrow that appears to be missing an arrowhead or pointing the wrong direction; a part that appears in figure, but not in written detailed description; figures or parts out-of-ordered; wrongly numbered figures, sheets, or parts; mislabeled parts, figures, or sheets; numbers in the figures do not match the written specification; and the like. Different types of errors may be scored differently. For example, a typo found by the initial-assertion-party may receive X points, but a correction made by the initial-assertion-party to a confusing sentence may score five (5) times X as many points. Further, a typo discovered by the IPACE system spellchecker may score X points, whereas a typo found by the initial-assertion-party and not discovered by the spellchecker may score three (3) times X as many points. Furthermore, finding an error in the System's spellchecker, where a particular word spelling is said to be correct but is not, may score ten (10) times X as many points.

In addition, the IPAC E system may adjust the amount of points received for a particular error discovered over time, say where no points for any typos discovered until after the Lead Inventor (40) (or blog Editor (61)) has been established as a completed-finish-draft. As the document nears a deadline for submitting to somebody or publishing, the points for finding errors may decrease, if, for example, there is one reviewer, or may increase if there are multiple Reviewers (64). Points for error assertions and any subsequent corrections may be applied the same for all Participants (80), but may also be tracked and scored separately under a different system of a particular Participant (80) (e.g. a relatively new or senior participant, a relatively inexperienced or experienced participant, a relatively inexpensive or expensive participant, and/or the like); or segment of Participants (80) (e.g. all Draftspersons (54), all prosecution Patent Attorneys (44), all Reviewers (64), all Joint-Inventor/Co-Inventors (41), and/or the like); and the same for 1$^{st}$2Report functionality (e.g. all Reporters (63), all Editors (61), and/or the like). Points for error assertions and any subsequent corrections may be tracked and scored differently for different document types/sections, compensation, moments in time, and/or the like; and also relative to others (e.g. relative to a particular patent examiner (66), a patent litigation defendant, and/or the like).

In various non-limiting embodiments, the perceived error may also include the wrong IPACE member contributed or modified the wrong data/content; a missing assertion for a particular PTO office action rejection; an incorrect case appears to be cited in association with an office action response/remark and/or assertion; and/or the like. The perceived error may also include an assertion of plagiarism, and these assertions could extend beyond the IPSocket dashboard to other dashboards, such as the 1$^{st}$2Report platform. For instance, an assertion of trying to predict a past event could be asserted within the 1$^{st}$2Predict system and platform, and/or the like; and where the asserting is not just sent to the assertion-receiving-party, but also sent to, tracked, and monitored by other key and/or appropriate IPACE members.

In various non-limiting embodiments, the initial-assertion-party may utilize color-coding to highlight errors, comments, concerns, and/or the like, and then, depending on the clarity of the color-coding system created and/or employed by the initial-assertion-party and his/her ability to unambiguously use the color-coding system, he/she could be awarded additional bonus points.

Recalling Rules, Perimeters, Checklist, Templates

In various non-limiting embodiments, the user may apply a name and save each state and iteration of a set of search rules (e.g. rules, conditions, data, statistics, assumptions, perceptions, scores, calculations, terms, perimeters, and/or the like), and/or a checklist of rule perimeters, assigned color values and/or the like, where the user may re-implement the rules, the checklist of rule perimeters, assigned color values and/or the like. The user may recall each, combine with others, and/or use the rules, the color assignments, the checklist of rule perimeters, and/or the like, as template for other searches, and/or the like.

In various non-limiting embodiments, once a search (e.g. a first search) has been created, implement, recalled, and/or the like, the IPACE system may suggest a subsequent search (e.g. a second search). For example, the IPACE system tracks each component, result, item, number, word, phrase, term, score, input, modification, rule, and/or the like, associated with the first search, where the IPACE system may subsequently and automatically generate and/or suggest a subsequent search and/or action with either the same and/or relatively similar rules, checklist of rule perimeters, assigned color, user input, options, and/or the like, but typically with at least one distinct difference.

In various non-limiting embodiments, the subsequent timing for the subsequent search and/or action suggestions could be relatively immediately after generating the first search results, where, for example, the IPACE system perceives terms specifically filter-out by the user may well contain key data, correlations, and/or the like, since there is a relatively large number of occurrences for, say the user-specifically omitted word “started” when compared to other documents in-general, document from the same or relatively similar user, the same or relatively similar project, other search results in-general, search inputs from the same or relatively similar user, search inputs from the same or relatively similar project, and/or the like.

In various non-limiting embodiments, for each relative comparison, the IPACE system may create a threshold and/or allow for user inputs that create a particular threshold value or relative percentage for each threshold and/or collective to surpass before prompting a subsequent search, list of action suggestions/options, and/or the like, and where there may be different thresholds for prompting subsequent searches, actions and/or the like, automatically, via a user prompt, via a specific user prompt, via a specific set of conditions, and/or the like. The subsequent timing for the subsequent search could be prompted by a particular user input, and/or series of input, after generating the first search results, where, for example, the IPACE system may continue to track user-inputs and dwell times to perceive and/or incorporates a particular set of user-inputs as a relatively perceived search goal.

For instance, the IPACE system would preferably track a particular user's search inputs, perimeters, results, and subsequent dwell time on particular locations within a searched document as the relatively perceived search goal of locating and reading a particular explanation, say the explanation for "how "a mobile user's location is determined indoors." Here the relatively perceived search goal of locating and reading the explanation for "how a mobile user's location is determined indoors" could be based upon the relative dwell time the displayed text the user is perceived to be viewing, relative to dwell times spent on other text, and/or search/find results.

In various non-limiting embodiments, the user may have used the phrase "determine location indoors" and/or similar. Further, the IPACE system may have incorporated historical data associated with the user, document, project, and/or the like, where perhaps a pending office action associated with the patent prosecution for a particular project specifically rejected a claim under rule 112, paragraph (2) for failing to enable the claim element for "determining a mobile user's indoor location," and/or the like. Here, for example, the IPACE system may offer a list of action suggestions, where the list of action suggestions may include (1) reading a particular case where a relatively similar rejection was overcome, (2) reading a list of office action responses with the relatively same rejection with the same examiner and/or the same art unit that were overcome, and where the list of office action responses are scored and ranked accordingly to the perceived similarities and relevance to the issue, rejection, timing, rules, country, examiner, case, claim, art unit, patent application/specification, and/or the like, for the matter at hand.

In another example, the IPACE system may determine a relatively perceived search goal of reading and/or modifying a series of footnotes cited in a document, based upon the relative dwell time the displayed text is viewed for footnotes relative to dwell times and on the other search results, and where the user is modifying the footnotes. Here the IPACE system may monitor the user input to make suggestions beyond subsequent searches. For example, the user may have modified a spelling of an author's name, which does not appear in the current dictionary/lexicography associated with the project. In various non-limiting embodiments, the IPACE system may automatically analyze and/or search for the same and/or relatively similar uses of the same or relatively similar author name, publication cited by the same or similar author names, titles, footnotes, and/or the like. In addition, the IPACE system would preferably suggest a subsequent search and/or automatically and/or conditionally display a list of perceived subsequent actions, say where the IPACE system perceived that the user is systematically and sequentially going through the footnotes, starting with number one, and is relatively likely to go on to number two, three and so on. Here the list of perceived subsequent actions could include a list and/or links of all the footnotes discovered and/or any associated data.

In various non-limiting embodiments, the IPACE system analysis for the perceived search goal may be incorporated to prove search result rankings, filtering, suggestions, subsequent searches, subsequent suggestions, and/or the like. For example, the perceived search goal may reveal a behavior and/or pattern of creates a sequence, say where the user is going through the search results in an existing document and reviewing particular data/content and data/content references chronologically (e.g. via the first time they appear, to the second time, and so on). The search perimeters could incorporate the user's consumption pattern to reprioritize current search results and/or improve a subsequent search, where the IPACE system may distinctly ask the user to acknowledge, modified a displayed and perceived goal and/or select from a list of perceived relatively likely goals.

In various non-limiting embodiments, the user may or may not acknowledge a particular the goal, element of the goal (e.g. search goal, modification goal, and/or the like), a particular method and/or manner the IPACE system is prioritizing the results, and/or may include such information, and while that "was" the goal, it is "not" goal for this next particular search. Further, the user could select a goal from a list of goals and perimeters provided by the system, where each may be selected, modified, saved, and/or the user may create a new goal and associated perimeters. For example, include filters for a ascertained, discerned, and/or perceived data/content location or section, say data/content in the claims, data/content supporting a specific claim, claim elements, or range of claims; definitions, under a particular portion of Section Headers, appear in a ascertained, discerned, and/or perceived section, and/or the like; and regarding a patent application preparation, office action response, appeal brief, court case, licensing agreement, and/or the like.

In various non-limiting embodiments, the search, the subsequent search and/or list of perceived subsequent actions/suggestions could automatically, conditionally, and/or selectively filter in and/or out user's behaviors, say regarding what data/content was ascertained, discerned, and/or where there is a relative confidence that the data/content was viewed, reviewed, modified, tagged, commented, acknowledged, approved, rejected, challenged, and/or the like. For example, the IPACE system would preferably generate a list of data/content as to what was viewed, reviewed, modified, and/or the like, by a particular user/participant in a project (where the confidence factor passes a particular threshold), and where each subsequent search and analysis may cause certain data/content to be perceived as relatively more or less relevant based upon the user's behaviors, and whereby relatively effecting the data/contents relevance score within the overall search results.

In addition, as the user proceeds through the search/find results, the IPACE system may automatically and/or the user may selectively setup a condition where the IPACE system tracks a user's result reactions, say as to what was viewed, acknowledged as reviewed, modified, tagged, commented, acknowledged, approved, rejected, challenged, and/or the like, and whether such result reactions should or could be incorporated into future search/find results. For tracking whether a particular item (e.g. the term proved relatively wise to modify, relatively increased the speed to grant, monetized, and/or the like).

In various non-limiting embodiments, subsequent of any user-selected-suggestion, system-suggested modification-implemented, user-modifications, and/or the like, the IPACE system may continue to make action suggestions. For example, if the user (e.g. a patent attorney) were to amend a particular claim to attempt to overcome a rejection, the IPACE system would preferably associate data, statistics, alerts, and/or the like, in the action suggestions, such as the amendment to the particular claim is perceived to have a "X" percent chance of overcoming the rejection based upon, say system analysis, perceptions and discerned historical statistical data. In addition, the associated data, statistics, alerts, and/or the like, in the action suggestions, could include concerns regarding potentially lost territory under "prosecution estoppel," the "doctrine of equivalence," and/or the like, where specific cases and with relatively similar context, data/content, art units, rejections, timing, examiner, claims, and/or the like could be scored, ranked, displayed, referenced, linked to, analyzed for relevance to the matter at hand, and/or the like.

In various non-limiting embodiments, the list of action suggestions may allow and/or provide for a method for analyzing and generating a list of options perceived appropriate to present to others, say based upon the IPACE TOU/TOPs, where the others may each provide his/her/its feedback, votes, concerns, assertions, challenges, counter suggestions, and/or the like regarding a particular action suggestion and its associated data, statistics, alerts, and/or the like. For instance, the others may include a list of fellow participants on the same project and/or internal patent attorneys, where the list of fellow participants may vote on a particular list of options, and where a particular user and/or project may incorporate the suggestion into his/her/its decision, and/or may be conditionally bound by the list of fellow participant input and/or group decisions. When analyzing and generating the list of fellow participants and/or the like, the IPACE system may automatically and/or via/per actor/user-prompt prescreens for conflicts and redacts any project and/or client critical information.

In various non-limiting embodiments, each action suggestions could also include, trigger, eliminate, add, modify, and/or the like, say a hierarchy of actions, subsequent actions, and/or associated data, statistics, alerts, appropriate fellow participants, and/or the like. For instance, a particular user-decision may reduce and/or remove some option available under the list of action suggestions or for a search suggestion, and/or expand and/or increase other options. For example, if the patent attorney decided to continue with a particular claim amendment (despite options analyzed, perceived, and presented as relatively more likely to overcome a particular rejection, and/or where options had perceived a relatively less narrowing of the claim, when these options are relatively compared to the user-selected option with the particular amendment), then the IPACE system would incorporate that user-decision, where the list of action suggestions, may be reanalyzed, modified, and/or the like.

For example, where the user-selected option to amend a particular claim element, the IPACE system displays a list of modified action suggestions that could include (1) modifying language in a particular application currently being prepared (but not filed yet) that is perceived to contain the same, or relative similar language (and/or issues) as the language that was rejected in the current office action is to be responded to by the patent attorney, (2) how to similarly amend claims in other pending countries, should it prove necessary, and/or (3) generate a list of options to present to fellow internal patent attorneys for their input, where the IPACE system may automatically and/or via/per actor/user-prompt prescreens for conflicts and redacts any client critical information. In various non-limiting embodiments, the IPACE system would track and analyze each decision ascertained, discerned, or perceived to be attributable to a particular user/participant, group, and/or the associated circumstances to generate perceptions and scores around tendencies and perceived goals.

For example, system analysis may reveal that a methodology, strategy, goal, and/or the like, by a particular participant (e.g. a particular patent attorney) of taking a particular route/option of getting a particular patent claim granted via a particular amendment style and argument and following up with a continuation with other claims, and/or the like, for a particular client, with a particular patent family, in a particular art unit, with a particular examiner. Continuing, this particular participant appears relatively more successful at, say generating licensing revenue sooner when compared to a relatively similar strategy by same patent attorney, with everything relatively the same, except for, say the art unit, or the patent family, or the particular client, or the examiner, or the any other comparable element. Further, where such data may reveal that a relatively successful strategy is relatively far more successful when a particular component is present, relatively present (e.g. surpasses a particular threshold, condition, and/or the like), missing, relatively missing (e.g. drops below a particular threshold, condition, and/or the like), and/or the like.

Historical Track Successfulness/Rights/Visualize

In various non-limiting embodiments, the IPACE system and associated computer-implemented method where the IPACE system tracks creation data and rights tracking, such as authorship tracking, collaboration participation, and ownership/return based on value and success of authored contribution(s).

Patent Collaboration System

In various non-limiting embodiments, the IPACE system and associated computer-implemented method tracks and analyzes data, data/content, and data/content correlations, to discern who (e.g. a particular participant/user) writes the most successful specs and/or claims, who writes the most successful specs and/or claims in terms of such topics as Issued, Licensing fees, Damages award or denied, Patents or patent claims later found to be invalid, Sale of IP, Art Unit, and/or the like.

Relative Speed

In various non-limiting embodiments, the IPACE system and associated computer-implemented method searches IP case histories for application grant the fastest versus the slowest, most claims, most pending apps, and build trees of correlation, e.g. same law firm, same Inventors (70), same assignee, same art unit, same examiner (66), same prior art, same number of prior art references, types of claims, e.g. independent versus dependent, method, system, number of words in the preambles versus the body, etc.

The "Track/Determine Ownership, Novelty, Art, and/or Relative Overlap" module in a block 456

In various non-limiting embodiments, the IPACE system and associated computer-implemented method may automatically, systematically, continuously, persistently, conditionally, and/or via/by the actor/user-prompting a set of I/O/PC tracking perimeters, and/or criteria can be applied to the monitoring of the I/O/PC from/to a particular device, per/for a particular actor/user, associated with a particular project, a particular event, temporal window, and/or the like. In various non-limiting embodiments, the set of I/O/PC tracking perimeters would preferably identify a goal, prediction, source, interrogations sources/resources/support (e.g. sources/resources/support for data authentication, verifications, validations, acknowledgements, feedback, vouched-for, challenge, counter, and/or the like. In various non-limiting embodiments, the set of I/O/PC tracking perimeters would preferably be isolated and relatively compared to other users, actors, entities, governments, projects, parties, sources, resources, support, goals, prediction, source, interrogations, A/D/RP/AS/P data and/or the like.

In various non-limiting embodiments, the set of I/O/PC tracking perimeters preferably create, identify, modify, verify, challenge, counter, and/or the like a list of user/actor/entity attributes, characteristics, and/or the like to generate a profile. In an embodiment, a particular goal could be to draft a patent application, with a particular joint-inventor, with a predicted value of X within Y years, a grant prediction, source, interrogations sources/resources/support (e.g.

sources/resources/support for data authentication, verifications, validations, acknowledgements, feedback, vouched-for, challenge, counter, and/or the like. In various non-limiting embodiments, the set of I/O/PC tracking perimeters preferably create, identify, modify, verify, challenge, counter, and/or the like where the list of user/actor/entity attributes, characteristics would incorporate a creation data relative to an entity, such an the user, company, PTO database, PIN L-IPACE database, and/or the like, where virtually all inputs/outputs, prompts, and/or correlations would preferably be monitored to alert parties of potential IP ownership, and/or overlap in real-time, per the relative comparison. In various non-limiting embodiments, the IPACE system and associated computer-implemented method track all I/O/PC for any creation data relative to an entity, such an the user, company, PTO database, PIN L-IPACE database, and/or the like, where virtually all inputs/outputs, prompts, and/or correlations would preferably be monitored to alert parties of potential IP ownership, and/or overlap in real-time, per the relative comparison.

In various non-limiting embodiments, the IPACE system and the associated computer-implemented method for tracking consumer consumption may include a methodology of tracking consumption, where the IPACE system continually tracks and analyses the data, statistics, and inputs to display a continually updated consumption list, which would preferably include a prioritization and relative confidence factor regarding the data/content, data, statistics, and/or the like.

Computer-Implemented Repetition Searching

In various non-limiting embodiments, the IPACE system would search for repeated terms, sentences, and the like. For example, the IPACE system would create an alert and/or notification to pre-designated Participants (80), say the Lead Inventor (40), if a clause, a sentence and/or a paragraph was found to be repeated within the same document and/or in other document within the system. This would help eliminate unnecessary redundancy in application, help make sure the terms were being defined when first introduced, and also search for cases where, say a particular clause, sentence, and/or paragraph appeared to be relatively better or worse supported by other text, definitions, and the like. In various non-limiting embodiments, the IPACE system would also search for potential cases of desired, suggested copying and/or plagiarism.

"Track Consumers (e.g. behaviors, patterns, Spent/qty/used/when etc.)" module in a block 457

In various non-limiting embodiments, the IPACE system and the associated computer-implemented method for tracking consumer consumption may include a methodology of tracking consumption, where the IPACE system continually tracks and analyses the data, statistics, and inputs to display a continually updated consumption list, which would preferably include a prioritization and relative confidence factor regarding the data/content, data, statistics, and/or the like. Next, a query 273 asks if the IPACE Member would like to either "Continue or Invoke?" the rule? If the answer to query 273 is "Continue," as in continue utilizing the Dashboard functionality without invoking the rule, then a next step 275 with a "Send, Post and/or Sync Appropriate Info, Data, Statistics, Data/content, Rules and Terms to Appropriate Parties, Engines and Modules" is performed, where the IPACE user may continue utilizing the Dashboard. If the answer to query 273 is instead "Invoke," then a step 274 is invoked for the particular rule, then the next step 275 with a "Send, Post and/or Sync Appropriate Info, Data, Statistics, Data/content, Rules and Terms to Appropriate Parties, Engines and Modules" is performed where the IPACE user may also then continue utilizing the dashboard.

Figure 63:
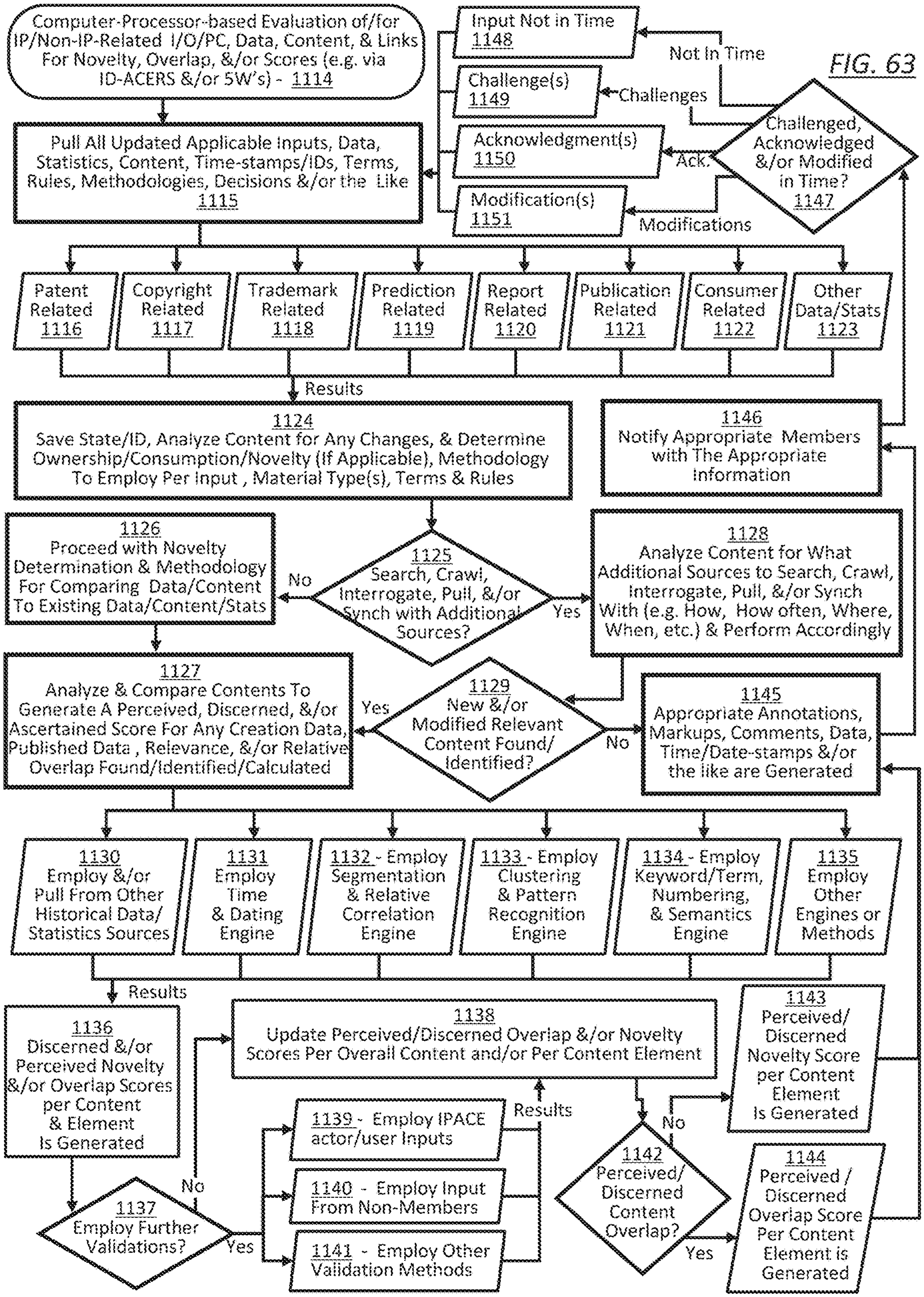

FIG. 63 is a flowchart that depicts an embodiment and example of the IPACE system, and associated computer-implemented method for Computer-Processor-based analysis, interrogation, extraction, evaluation and/or the like of I/O/PC, data/content with/for any Intellectual Property components, elements, links, relations, novelty, overlap, scoring, verifications, prompts, and/or the like. In addition, where the non-ascertained, non-discerned, non-actor-stated, non-perceived, and/or the like data, is continually cycled for corrections, correlations, relations, links, and/or the like. Further, where the Non-IP content, may become, utilized, incorporated, as a source, resource, support, prior-art, reference, and/or the like for future I/O/PC novelty, originality, utility, and/or the like evaluations.

Starting with a start terminator 1114, for a "Computer-Processor-based Evaluation of/for IP/Non-IP-Related I/O/PC, Data, Content, & Links For Novelty, Overlap, &/or Scores (e.g. via associated subsystems: AIS, ID-ACERS, Knowledge Base Mgmt., CREATE, METER, TIMES, FINANCIALS, etc. and/or 5 W's (What, Where, How, When, Why and/or the like)," where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a IP/Non-IP content association list comprising intellectual property (e.g. patents, trademarks, copyrights, trade secrets, and/or the like), predictions/projections (including users, members, actors, subsystems: AIS, other 3$^{rd}$ Party systems/sources/AI-3$^{rd}$ Party systems), reports/disclosures, publications, consumption (data/statistics, reports, analysis, evaluations, predictions, tagging/relations/links, annotations, and/or the like) and other data statistics, reports, analysis, evaluations, annotations, links, relations, tagging, and/or the like.

In a step 1115, the process proceeds to a "Pull All Updated Applicable Inputs, Data, Statistics, Content, Time-stamps/IDs, Terms, Rules, Methodologies, Decisions &/or the Like." In various non-limiting embodiments, the IPACE system could interrogate data regarding any USPTO (PTO) decisions (or similar entities/county/organization), restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO MPEP and US IP case law, where the IPACE system could discern a known exception/statutory deadline/rule-change/resolution or generate a perceived prediction/exception/resolution based in part, on such elements as historical decisions, temporal data, similar time windows, similar cases, similar jurisdictions, similar fact evidence, similar participants, similar entities, similar decisions, and/or the like. In various non-limiting embodiments, there could be multiple entities tracked and interrogated for current definitions, discrepancies, anomalies, and/or the like.

In various non-limiting embodiments, the IPACE system could discern a definition for say, a discrepancy in the USPTO MPEP/TMEP (e.g. Manual of Patent Examining Procedures (MPEP), Trademark Manual of Examining Procedure(TMEP) and/or the like), and case law, based in part on temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Source/Resource/Support (e.g. ID-ACERS parsing/analysis/evaluations). In various non-limiting embodiments, the Source/resource/Support would preferably comprise all publications, ontologies, lexicon, semantics, syntax, triple statements, definitions, rules, procedures, manuals for the USPTO MPEP/TMEP, relative to a Cooperative Patent Classification System, case law, petitions, derivation proceedings, pre-appeals, appeals, decisions (e.g. Board of Patent Appeals and Interferences (BPAI), Patent Trail and Appeal Board (PTAB), Federal Circuit, United States Court of Appeals for the Federal Circuit, Supreme Court, Congress, jurisdictions, restrictions, and/or the like for TMs, Trade Secrets, Copyrights, Consumption, Consumer Affairs, FCC/Broadcasting, Media/Press/Publications/Web, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending cases, pending laws, pending rules, pending petitions, pending pre-appeal briefs, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign jurisdictions (e.g. China, Japan, Korea, Germany, United Kingdom, France, Canada, Australia, and all other countries, and/or the like), foreign filing organizations (e.g. WIPO, EPO, and/or the like).

Returning, to the Fig., from step 1115, there is a list of IP/Non-IP content association-evaluation/prediction options comprising a "Patent Related" 1116 option, a "Copyright Related" 1117 option, a "Trademark Related" 1118 option, a "Prediction Related," 1119 option a "Report Related," 1120 option, a "Publication Related" 1121 option, a "Consumer Related," 1122 option, and a "Other Data/Stats,"1123 option (e.g. trade secrets, IP-related content not actively categories, non-IP-related content not actively categorized, and/or the like), where each or a group of may be prompted, interrogated, implemented, invoked, incorporated, selected, executed, isolated, excluded, combined, and/or the like. In various non-limiting embodiments, the list of IP/Non-IP content association-evaluation options may be automatically, systematically, continuously, persistently, conditionally, and/or actor/user-prompted/selected monitor, interrogate, analyze, compare, synchronize I/O/PC, data, and/or the like, for determining data, content, data attributes, associations, and the like, relative to the IP/Non-IP content association list, the IP/Non-IP content association-evaluations, and/or the like.

In various non-limiting embodiments, the results/selections of the IP/Non-IP content association list, the IP/Non-IP content association-evaluations, and/or the like, via an automatic, systematic, continuous, persistent, conditional, and/or actor/user-prompt/selection and/or the like, proceeds to a step 1124 where a "Save State ID, Analyze Content for Any Changes, & Determine Ownership/Consumption/Novelty (If Applicable), Methodology To Employ Per Input, Material Type(s), Terms & Rules," is performed. From step 1124, a query 1125 asks whether to "Search, Crawl, Interrogate, Pull, &/or Synch with Additional Sources?" or not. If the answer to query 1125 is "No," then the process proceeds to a step 1126" where a "Proceed with Novelty Determination & Methodology For Comparing Data/Content To Existing Data/Content/Stats" is executed. Next, the process proceeds to a step 1127.

If the answer to query 1125, is instead "Yes," then the process proceeds to a step 1128 where an "Analyze Content for What Additional Sources to Search, Crawl, Interrogate, Pull, &/or Synch With (e.g. How, How often, Where, When, etc.) & Perform Accordingly," is performed. From step 1128, the process proceeds to a query 1129 which asks whether "New &/or Modified Relevant Content Found/Identified?" If the answer to query 1129 is "No," the process proceeds to a step 1145, where a "Generate Appropriate Annotations, Markups, Comments, Time/Date-stamps &/or the like," is performed.

If the answer to query 1129, is instead "Yes" the process proceeds to the step 1127, where an "Analyze & Compare Contents To Generate A Perceived, Discerned, &/or Ascertained Score For Any Creation Date, Published Date, Relevance, &/or Relative Overlap Found/Identified//Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like.

From step 1127, the process proceeds to a list of options comprising an "Employ &/or Pull From Other Historical Data/Statistics Sources" 1130 option, an "Employ Time & Dating Engine" 1131 option, an "Employ Segmentation & Relative Correlation Engine," 1132 option, an "Employ Clustering & Pattern Recognition Engine" 1133 option, an "Employ Keyword/Term, Numbering, & Semantics Engine," 1134 option, and an "Employ Other Engines or Methods," 1135 option. The selection results for the option list proceed to a step 1136, where a "Discerned, and/or Perceived Novelty &/or Overlap Scores per Content & Element is Generated." In various non-limiting embodiments, the "Discerned, and/or Perceived Novelty &/or Overlap Scores per Content & Element is Generated," may include further include further evaluations for Predictions, Actor-Statements, Perceptions, Discernment, Ascertainment, values, relations, sources, and/or the like.

From step 1136, the process proceeds to a query 1137, which asks whether to "Employ Further Validations?" If the answer to query 1137 is "No," the process proceeds to a step 1138 where an "Update Perceived Overlap &/or Novelty Scores Per Overall Content and/or Per Content Element," is performed. If the answer to query 1137 is instead "No," the process proceeds to an option list comprising an "Employ IPACE Member/User Inputs" 1139 option, an "Employ Input From Non-Members" 1140 option, and an "Employ Other Validation Methods," 1141 option. The selection Results from the option list proceed to the step 1138.

From step 1138, the process proceeds to a query 1142, which asks if there is a "Perceived/Discerned Content Overlap?" If the answer to query 1142, is "No," the process proceeds to a step 1143, where a "Perceived/Discerned Novelty Score per Content Element is Generated." From step 1143, the process proceeds to the step 1145, where the "Appropriate Annotations, Markups, Comments, Data, Time/Date-stamps &/or the like are Generated." If the answer to query 1142 is instead "Yes," the process proceeds to an output option step 1144, where a "Perceived/Discerned Novelty Score per Content Element is Generated." From step 1144, the process also proceeds to the step 1145.

From step 1145, the process proceeds to a step 1146, where a "Notify Appropriate Members with The Appropriate Information," is performed. Next, the process proceeds from step 1146 to a query 1147, which asks whether the associated data (e.g. generated in the previous steps) produces an input via a "Challenged, Acknowledged, and/or Modified in Time?" If the answer to query 1147, is that there was a "Modification(s)" made in time, then the process proceeds to a "Modification(s)" 1151 output option. If the answer to query 1147, is instead that there was an "Acknowledgment(s)" made in time, then the process proceeds to an "Acknowledgment(s)" 1150 output option. If the answer to query 1147, is instead that there was a "Challenge(s)" made in time, then the process proceeds to a "Challenge(s)" 1149 output option. If the answer to query 1147, is instead that there was not a ""Challenged, Acknowledged &/or Modified in Time," made in time, then the process proceeds to an "Input not in Time" 1148 output option.

In various non-limiting embodiments, the data from the output options 1148-1151 proceeds loops back to the step 1115, where the IPACE system persistently, automatically, systematically, continuously, persistently, conditionally, and/or actor/user-prompted/selected incorporates the data when performing the "Pull All Updated Applicable Inputs, Data, Statistics, Content, Time-stamps/IDs, Terms, Rules, Methodologies, Decisions &/or the Like." In various non-limiting embodiments, the IPACE system persistently/continues via a cycle to monitor for any I/O/PC (e.g. via the METER), data interrogations, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Figure 64:
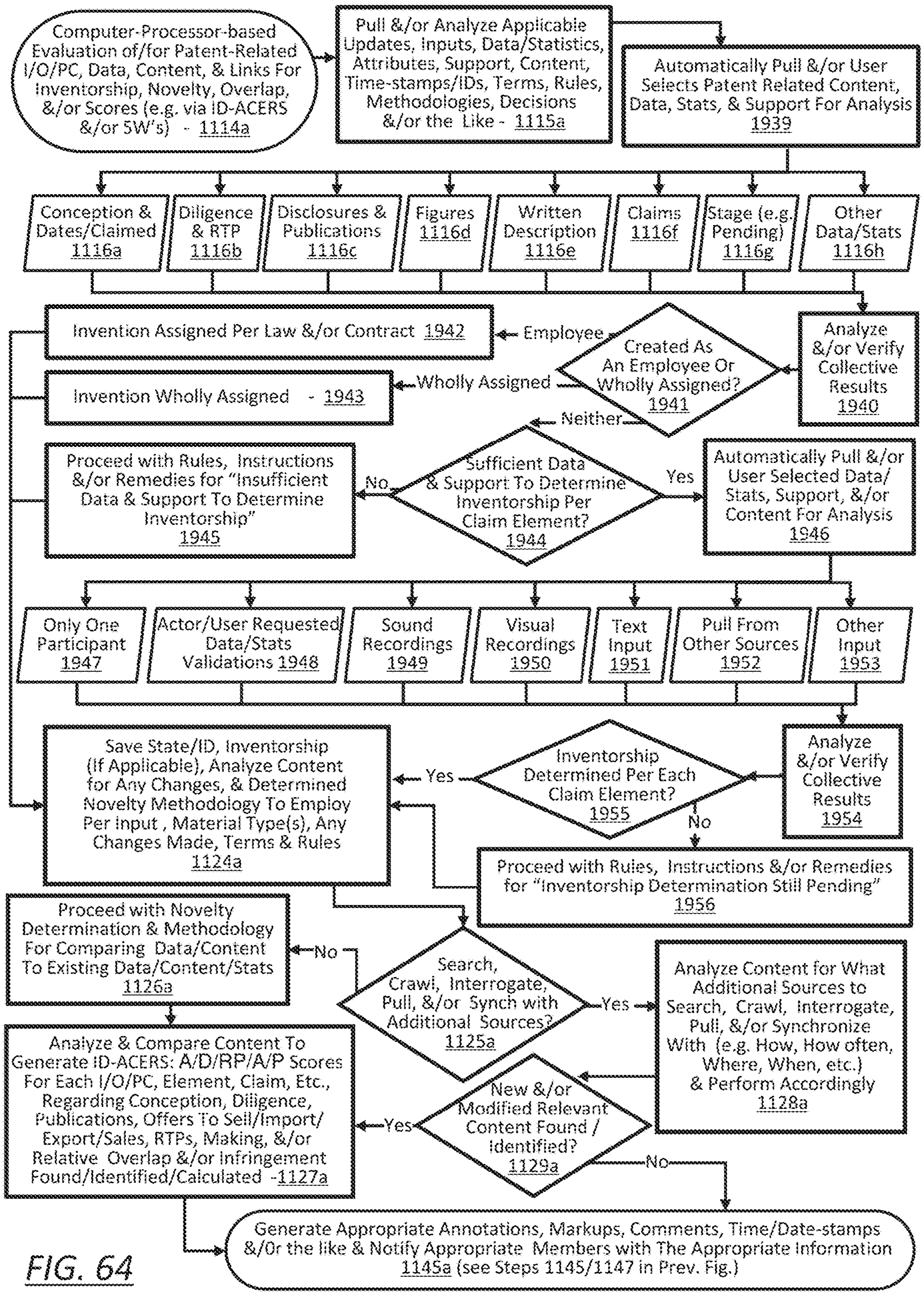
FIG. 64 is a flowchart that depicts a non-limiting embodiment and example of the IPACE system, and associated computer-implemented method for Determination of Patent Related Data/content for Inventorship, Novelty and/or Overlap.

FIG. 64 is a flowchart that depicts an embodiment and example of the IPACE system, and associated computer-implemented method for Determination of Patent Related Data/content for Inventorship, Novelty and/or Overlap. Similar to previous figure, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, data/content with/for any Intellectual Property components, elements, links, relations, novelty, overlap, scoring, verifications, prompts, and/or the like. In addition, where the non-ascertained, non-discerned, non-actor-stated, non-perceived, and/or the like data, is continually cycled for corrections, correlations, relations, links, and/or the like. Further, where the Non-Patent-related content, may become, utilized, incorporated, as a source, resource, support, prior-art, reference, and/or the like for future I/O/PC novelty, originality, utility, and/or the like evaluations.

Starting with a start terminal 1114*a* for a "Computer-Processor-based Evaluation of/for Patent-Related I/O/PC, Data, Content, & Links For Inventorship, Novelty, Overlap, &/or Scores (e.g. via ID-ACERS and/or 5W's (What, Where, How, When, Why and/or the like)," where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a patent-related data/content, assessment, a patentability score, and/or the like, for such aspects, associations, and/or the like, as an application element, an inventorship, a Novelty score, any overlap, a relative perceived Overlap score, and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with a conception date of/from a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO MPEP and US Patent case law, where the IPACE system could discern a known exception/statutory deadline/rule-change/resolution or generate a perceived prediction/exception/resolution based in part, on such elements as historical decisions, temporal data, similar time windows, similar cases, similar jurisdictions, similar fact evidence, similar participants, similar entities, similar decisions, and/or the like. In various non-limiting embodiments, there could be multiple entities tracked and interrogated for current definitions, discrepancies, anomalies, and/or the like.

In various non-limiting embodiments, the IPACE system could discern a definition for say, a discrepancy in the USPTO MPEP and case law, based in part on temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support. In various non-limiting embodiments, the Source/resource/Support would preferably comprise all publications, ontologies, lexicon, semantics, syntax, triple statements, definitions, rules, procedures, manuals (e.g. Manual of Patent Examining Procedures (MPEP), Trademark Manual of Examining Procedure(TMEP) and/or the like), Cooperative Patent Classification System, case law, petitions, derivation proceedings, pre-appeals, appeals, decisions (e.g. Board of Patent Appeals and Interferences (BPAI), Patent Trail and Appeal Board (PTAB), Federal Circuit, United States Court of Appeals for the Federal Circuit, Supreme Court, Congress, jurisdictions, restrictions, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending cases, pending laws, pending rules, pending petitions, pending pre-appeal briefs, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign jurisdictions (e.g. China, Japan, Korea, Germany, United Kingdom, France, Canada, Australia, and all other countries, and/or the like), foreign filing organizations (e.g. WIPO, EPO, and/or the like).

From terminator 1114*a*, the process proceeds next to a "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," in a step 1115*a*, where the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like. From step 1115*a*, the process proceeds next to an "Automatically Pull &/or User Selects Patent Related Content, Data, Stats, & Source/resource/Support For Analysis" in a step 1939. From step 1939, the process proceeds to an "Patent-Related Content, Data, Stats, & Source/resource/Support option list comprising a "Conception & Dates/Claimed," 1116*a* option, a "Diligence & Reduction To Practice (RTP)," 1116*b* option, a "Disclosures & Publications," 1116*c* option, a "Figures," 1116*d* option, a "Written Description," 1116*e* option, a "Claims," 1116*f* option, a "Stage (e.g. Pending)," 1116*g* option, and an "Other Data/Stats," 1116*h* option.

In various non-limiting embodiments, the "Conception & Dates/Claimed" 1116*a* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a conception date of a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, and/or all data associated with the conception date for determining scores, rankings, data associations, and/or the like. In various non-limiting embodiments, the "Conception & Dates/Claimed" 1116*a* option would preferably automatically, systematically, continuously, persistently, conditionally, and/or actor/user-prompted/selected monitor, interrogate, analyze, compare, synchronize, and/or the like, and/or all data associated with the conception date for assessing any potential issues, concerns, pitfalls, shortcomings, inventorship issues, rule changes, law changes, and/or the like.

In various non-limiting embodiments, a conception would consider complete and proper when one of ordinary skill in the art could make the invention without undue research or experimentation. In various non-limiting embodiments, the IPACE system would presume a first inventor to properly file a first claimed invention found patentable by a USPTO under a MPEP and US law, would be entitled to a patent grant by the USPTO, where a second person who filed on a second claimed invention on a subsequent date or later would be rejected in part due to the first claimed invention, and presuming the second inventor does not have a sufficient cause for an invention derivation proceeding against the first inventor.

In various non-limiting embodiments, the second person to file a second patent application disclosing an invention would be entitled to the invention derivation proceeding against the first inventor, if the second person has a sufficient cause, case, standing, and/or the like, per the MPEP, laws, procedures, and/or the like. In various non-limiting embodiments, the invention derivation proceeding would determine, if either the first inventor to file the first claimed invention or the second person to file would be entitled to a patent grant by the USPTO, under the MPEP, USPTO, and US law, rules and regulations, procedures, and/or the like. In various non-limiting embodiments, the invention derivation proceeding could determine that neither or both the first inventor to file the first claimed invention and the second person to file would be entitled to a patent grant by the USPTO, under the MPEP, USPTO, and US law, rules and regulations, procedures, and/or the like.

In various non-limiting embodiments, if the first inventor to file AIA laws, rules, procedures, and/or the like, are found unconstitutional, modified, and/or the like, the second person to file a second patent application disclosing an invention may be entitled to a patent grant by the USPTO over the first inventor to file, if the second person can prove a date of conception prior to the date of conception by the first to file, coupled with proper diligence in pursuing the invention until the filing date of the second-filed patent application.

In various non-limiting embodiments, the "Conception & Dates/Claimed" 1116*a* option would preferably automatically, systematically, continuously, persistently, conditionally, and/or actor/user-prompted/selected monitor, interrogate, analyze, compare, synchronize, and/or the like, and/or any and all dates, data, and/or the like, associated with a priority-benefit claim, a patent application, a concept, an inventor, a disclosure, a publication, an offer to sell, a public disclosure, a disclosure, a NDA, a related agreement, a manufacturing, an exporting, a usage, and/or the like. In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO MPEP and US Patent case law, where the IPACE system could discern a known exception/statutory deadline/rule-change/resolution or generate a perceived prediction/exception/resolution based in part, for what is A/D/RP/AS/P to define what, constitutes, violates, and/or the like, a proper priority-benefit claim, dating, marking, statutory dates, and/or the like.

In various non-limiting embodiments, the IPACE system discerned known statutory deadline/rule-change/resolutions or generated perceived prediction/resolutions for what is A/D/RP/AS/P to define what, constitutes, violates, and/or the like, a proper priority-benefit claim, dating, marking, statutory dates, and/or the like, could include minimal requirements, associated fees/time, associated fees/time per resolution, associated fees/time for risk avoidance, and/or the like.

In various non-limiting embodiments, the "Diligence & Reduction To Practice (RTP)" 1116*b* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with the Diligence and/or each RTP attempted, relative success, constructive, and/or actual, verified, witnessed, properly protected/shielded, and/or the like, including data associated with the list comprising an invention, a disclosure, a publication, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably track, interrogate, analyze, and/or evaluate any and all sources for current definitions, discrepancies, anomalies, and/or the like, regarding, for and/or the like, what constitutes a proper diligence, a proper RTP, a proper diligence in light of the AIA, a constructive RTP, an actual RTP, a proper RTP in light of the AIA, and/or the like. In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO MPEP and US Patent case law, where the IPACE system could discern a known exception/statutory deadline/rule-change/resolution or generate a perceived prediction/exception/resolution based in part, for what is A/D/RP/AS/P to define what, what is A/D/RP/AS/P as relatively likely to have caused what, what is A/D/RP/AS/P to constitute what, what is A/D/RP/AS/P to violate what, and/or the like. In addition, what constitutes a minimal set of requirements per examiner, art unit, classification, country, time window, set of laws, set of court decisions, set of procedures, and/or the like.

In various non-limiting embodiments, the IPACE system would preferably track, interrogate, analyze, and/or evaluate any and all sources for current and historical written evidence, proof, Source/Resource/Support, verbal agreements, contracts/agreements, agreement clauses, declarations, oaths, Application Disclosure Statement (ADS), and/or the like. In various non-limiting embodiments, the IPACE system would preferably track, interrogate, analyze, and/or evaluate any and all sources for current and historical sources and Source/resource/Support for what constitutes proper, sufficient, and/or the like diligence relative to each set of circumstances, entity, domain, art-unit, cite art, examiner, scope, project, participant, budget, time perimeter, inventor, user, case law, MPEP, and/or the like. In various non-limiting embodiments, the IPACE system would preferably track, interrogate, analyze, and/or evaluate any and all sources for current and historical Source/Resource/Support and sources for what constitutes a proper, sufficient, and/or the like, evidence basis, agreement protection, employee contract, contractor agreement, manufacturing agreement, export agreement, distributions agreement, retail agreement, a manufacturing, an exporting, a usage, and/or the like, relative to each set of circumstances, entity, domain, art-unit, cite art, examiner, scope, project, participant, budget, time perimeter, inventor, user, and/or the like.

In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO MPEP and US Patent case law, where the IPACE system could discern a known exception/statutory deadline/rule-change/resolution or generate a perceived prediction/exception/resolution based in part, for what is A/D/RP/AS/P to define what, constitutes, violates, and/or the like, a proper 12-month grace period under the USPTO/MPEP/US Law, and/or the like, where the IPACE system could ascertain and/or discern a known exception/statutory deadline/rule-change/resolution or generate a perceived prediction/exception/resolution based in part, for what is A/D/RP/AS/P to define what, what is A/D/RP/AS/P as relatively likely to have caused what, what is A/D/RP/AS/P to constitute what, what is A/D/RP/AS/P to violate what, and/or the like. In addition, what constitutes a minimal set of requirements per examiner, art unit, classification, country, time window, set of laws, set of court decisions, set of procedures, and/or the like.

In various non-limiting embodiments, the "Disclosures & Publications" 1116*c* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with the Disclosures and/or Publications scheduled appearances, events, presentations, trade shows, exhibits, print, postings, websites, publications, packaging, commercials, industrial campaigns, white papers, blogs, comments, conversation, testimony, recordings, actual appearances, verified, validated, witnessed, properly protected/shielded, and/or the like, per author, presenter, discloser, and/or the like, where there is data associated with the list comprising an invention, a disclosure, a publication, application, application participant, inventor, claim, claim element, claim-set, claim-pendency, claim-dependency, continuation, divisional, family, portfolio, prosecution history, priority/benefit claims/claimed, post grant history, an offer to sell, exporter/exporting, manufacturer/manufacturing, distributor/distributing, clients/customers, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably track, interrogate, analyze, and/or evaluate any and all sources for current definitions, discrepancies, anomalies, and/or the like, regarding, for and/or the like, what constitutes a legal, proper, and/or an improper: disclosure, public disclosure, inventorship, assignment, offer to sell, making of an invention, using of an invention, anticipation of an invention, teaching of an invention, obvious suggestion to combine elements, motivation to combine elements, constructive RTP, actual RTP, publication, inventor derivation, intervening disclosure, and/or the like.

In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in an AIA definition and the MPEP regulations, and/or the like. In various non-limiting embodiments, the IPACE system could discern a known exception/statutory deadline/rule-change/resolution or generate a perceived prediction/exception/resolution based in part, for what is A/D/RP/AS/P to define what, what is A/D/RP/AS/P as relatively likely to have caused what, what is A/D/RP/AS/P to constitute what, what is A/D/RP/AS/P to violate what, and/or the like. In addition, what constitutes the minimal set of requirements per US Law, regulation, statutory, and/or the like change (e.g. per the AIA), per examiner, domain/art unit, classification, country, time window, set of laws, set of court decisions, set of procedures, and/or the like.

In various non-limiting embodiments, the "Figures" 1116*d* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a figure, figures, set of drawings, tables, exhibits, prototypes, and/or the like. In various non-limiting embodiments, the IPACE system would preferably also search, interrogate, and/or analyze for any and all figure/drawing/exhibit/table/prototype and/or the like, associations with a list comprising an invention, application, application participant, inventor, claim, claim element, claim-set, claim-pendency, claim-dependency, continuation, divisional, family, portfolio, prosecution history, priority/benefit claims/claimed, post grant history, prior art, publication, public disclosure, white paper, and/or the like.

In various non-limiting embodiments, the "Written Description" 1116*e* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a written description from a list comprising a disclosure (e.g. version/draft), application, application portion (e.g. bibliography, title, prior art, benefit-claim, background, abstract, summary, brief description of the drawings, detailed description of the drawings, and/or the like). In various non-limiting embodiments, the IPACE system would preferably also search, interrogate, and/or analyze for any and all associations with a list comprising an invention, application, application participant, inventor, claim, claim element, claim-set, claim-pendency, claim-dependency, continuation, divisional, family, portfolio, prosecution history, priority/benefit claims/claimed, post grant history, prior art, publication, public disclosure, white paper, country, dates, and/or the like.

In various non-limiting embodiments, the "Claims" 1116*f* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a claim, including the list comprising a claim element, numbering, order, total, amount per family/independent claim, wording, definitions, specification Source/Resource/Support definitions, phrases, claim-set, family, history, pendency, dependency, multiple dependency, rejection, rejection cited, art cited, claim amendment, claim response, claim approved, and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably track, interrogate, analyze, and/or evaluate any and all sources for current and historical claim versions per a list comprising an original, pending, presently amended, previously presented, granted, rejected/reasons cited, approved, Notice of Allowances (NOA), granted, abandon, challenged, appeal pending, appealed, associated with an interference, associated with an interference suggestion, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably track, interrogate, analyze, and/or evaluate any and all sources for current definitions, discrepancies, anomalies, and/or the like, regarding, for and/or the like, what constitutes a legal, proper, suitable, reasonable, sufficient, and/or an improper: claim, system/apparatus/machine/device claim, method/process claim, method of manufacturing, claim, composition of matter claim, chemical claims, business method claim, software claim, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably track, interrogate, analyze, and/or evaluate any and all sources for current definitions, discrepancies, anomalies, and/or the like, regarding, for and/or the like: a claim rejection, amendment, claim antecedent, enablement, patentability, a patentable claim, a doctrine of equivalence, a legal, proper, and/or an improper: disclosure, public disclosure, inventorship, assignment, offer to sell, making of an invention, using of an invention, anticipation of an invention, teaching of an invention, obvious suggestion to combine elements, motivation to combine elements, per a claim, claim element, specification, part, step, component, article, item, connection, link, relation, reference, constructive RTP, actual RTP, continuation, divisional, family, portfolio, prosecution history, priority/benefit claims/claimed, post grant history, prior art, publication, and/or the like.

In various non-limiting embodiments, the IPACE system would preferably further evaluate a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the "Stage (e.g. Pending)" 1116*g* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a conception date of a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the "Other Data/Stats" 1116*h* option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a conception date of a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the collective results from the "Patent-Related Content, Data, Stats, & Source/Resource/Support option list" proceed to a step 1940 where an "Analysis and/or Collective Results," is performed. In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like, included, associated, Supporting, and/or the like, the collective results from the "Patent-Related Content, Data, Stats, & Source/Resource/Support option list." In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like, including any associations to concepts, disclosures, diligence, RTPs, publications, participants, contributors, inventors, claims, claim elements, claim-sets, claim-pendency, claim-dependency, continuations, divisionals, families, portfolios, prosecution history, priority/benefit claims/claimed, post grant history, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) would automatically, systematically, continuously, persistently, conditionally, and/or actor/user-prompted/selected monitor, interrogate, analyze, compare, and/or the like, the "Collective Results Analysis" with/via, against, and/or the like, the "Ascertained, Discerned, Relative Perceived, Actor-Stated(A/D/RP/AS) Data Analysis, Scores, and Data Attribute Analysis Module/Engine," where the IPACE system via the computer processor, associated subsystems (e.g. via AIS, ID-ACERS, Knowledge Base Mgmt., CREATE, METER, TIMES, FINANCIALS, etc.) could ascertain and/or discern a known exception/statutory deadline/rule-change/resolution or generate a perceived prediction/exception/resolution based in part, for what is A/D/RP/AS/P to define what, what is A/D/RP/AS/P as relatively likely to have caused what, what is A/D/RP/AS/P to constitute what, what is A/D/RP/AS/P to violate what, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze a data collection to ascertain, specify, score, rank, and/or the like, a known sub-collection of data, where for instances, the known sub-collection of data is known to constitute, produce, and/or the like, a minimal set of requirements to file a provisional application, say per a specific inventor, a specific group of joint-inventors, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze a data collection to ascertain, specify, score, rank, and/or the like, a known sub-collection of data, where for instances, the known sub-collection of data is known to constitute, produce, and/or the like, a minimal set of requirements to file a provisional application, say per a specific inventor, a specific group of joint-inventors, and/or the like. Further, what constitutes a minimal set of requirements to file a provisional application per a specific inventor, a specific group of joint-inventors, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze a data collection to ascertain, specify, score, rank, and/or the like, a known sub-collection of data, where for instances, with a known data gap in the collection, a known error in the data, collection, relationships, code, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze what specifically is A/D/RP/AS/P in/from/for a particular collection of data that constitutes a minimal set of requirements to file a provisional application by a specific inventor. In various non-limiting embodiments, what specifically is A/D/RP/AS/P in/from/for a particular collection of data that constitutes a minimal set of requirements to file a non-provisional applications, a design patent application, a utility patent application, an independent claim, a dependent claim, enable a claim, amend a claim, overcome a rejection, best per examiner, art unit, classification, country, time window, set of laws, set of court decisions, set of procedures, and/or the like.

Referring back to the Fig., from the step 1940, the process proceeds to a query 1941, which asks if the Patent-Related Content was "Created As An Employee Or Fully Assigned?" If the answer to query 1941, is as the "Employee," the process proceeds to a step 1942, which performs an "Invention Assigned Per Law &/or Contract" assessment to what is A/D/RP/AS/P about the rights of the patent related content. For instance, a particular A/D/RP/AS/P assessments as to whether there is sufficient data to be "ascertained" that the patent-related content is specifically, properly, identifiably, legally, contractually, conditionally, subjectively, and/or the like, assigned, say to an entity, another group, another domain, another government, another individual, and/or the like. In various non-limiting embodiments, if the "ascertained" A/D/RP/AS/P assessment determines, produces, interrogates, and/or the like, insufficient data to be "ascertained," then the IPACE system and the associated computer implemented methods could automatically, systematically (e.g. partially or wholly via the AIS 195), conditionally, and/or actor/user-prompted/selected analyze what specifically is required, from who, when, how, where, and/or the like, to be "ascertained."

In various non-limiting embodiments, if the "ascertained" A/D/RP/AS/P assessment determines, produces, interrogates, and/or the like, insufficient data to be "ascertained," then the IPACE system and the associated computer implemented methods could automatically, systematically (e.g. partially or wholly via the AIS 195), conditionally, and/or actor/user-prompted/selected analyze what is discerned, where a fitness criteria, threshold, range, condition, rule, and/or the like, would require a particular value, set of values, condition(s), and/or the like, to accept the discerned value without verification, validations, authentications, updates, comments, annotations, score, acknowledgements, permissions, and/or the like. In various non-limiting embodiments, what is not ascertained, but is discerned/discernible, and/or the like, with/by the fitness criteria, threshold, range, condition, rule, and/or the like, could automatically, systematically, continuously, persistently, conditionally, and/or user-selectively, require an additional input(s), say a particular verification, validation, authentication, update, comment, annotation, score, acknowledgement, permission, and/or the like; where the additional input(s) would wholly and/or partially update data with a threshold to become discerned as, say an insufficient or sufficient discernment, a unsuitable or suitable discernment, an unacceptable or acceptable discernment, an inappropriate or appropriate discernment, and/or the like.

Further, where the data is relative to say inventorship, research, prototypes, models, documents, spreadsheets, illustrations, figures/drawings, blueprints, schematics, electronic files, patent prosecution, patentability, novelty, obviousness, utility-provided, participants, participation, entities, persons, machines, methods, manufacturing, making, using, exporting, publishing, assignment, ownership, funding, budgeting, monetization, licensing, litigation, case, petition, appeal, ruling, decision, court, law, rule, guideline, procedure, deadline, government, country, organization, TOU/TOPs, and/or the like.

In various non-limiting embodiments, the IPACE system would preferably have a series of fitness criteria (e.g. value, thresholds, ranges, and/or the like), where a first fitness criteria would elevated relatively perceived data to data discerned by the IPACE system as, say accurate, reliable, novel, relevant, temporally appropriate (e.g. contract dates, document create/modify dates, most current state, draft, version, iteration, release, publication, and/or the like), popular (e.g. most popular, in the top 10 per a particular domain), age appropriate (e.g. contract signature), and/or the like.

In various non-limiting embodiments, the IPACE system and associated methods would automatically, systematically (e.g. partially or wholly via the AIS 195), conditionally, and/or actor/user-prompted/selected create a data attribute goal, projection, prediction, assumption, and/or the like. In various non-limiting embodiments, the data attribute, for say a goal could be to continuously elevate a data score, say from a lower data attribute score to a higher date attribute score. For instance, from a relatively perceived value for a particular value/attribute, say a person's date of birth, to the "ascertained" value.

Returning to the Fig., the results/of the step 1940 proceed to a query 1941 which asks if the Patent-Related Content was "Created As An Employee Or Wholly Assigned?" If the answer query 1941, is "Employee" than the process proceeds to a step 1942, where an "Invention Assigned Per Law and/or Contract" is performed, where the results are passed and stored in a step 1124*a*. If the answer to query 1941, is instead "Wholly Assigned," then the process proceeds to a step 1943, where an "Invention Wholly Assigned," is processed, where the results are passed and stored in the step 1124*a*. If the answer to query 1941, is instead "Neither," then the process proceeds to a query 1944, which asks if there is "Sufficient Data & Support To Determine Inventorship Per Claim Element?" If the answer to query 1944, is "No,", then the process proceeds to a step 1945, where a "Proceed with Rules, Instructions &/or Remedies for "Insufficient Data & Support To Determine Inventorship," is performed and where the IPACE system may further parse, test, analyze, qualify, verify, validate, interrogate, challenge, prompt, notify, and/or the like, a particular actor, user, entity, government, party, AI system, source, resource, support database, and/or the like. In various non-limiting embodiments, the results/selections of the Patent-Related Content list, the Patent-Related-evaluations, and/or the like, via an automatic, systematic, continuous, persistent, conditional, and/or actor/user-prompt/selection and/or the like, proceed to the step 1124*a* where a "Save State ID, Inventorship (If Applicable), Analyze Content for Any Changes, & Determined Novelty Methodology To Employ Per Input, Material Type(s), Any Changes Made, Terms & Rules," is performed.

If the answer back at query 1944, is "Yes," then the process proceeds to a step 1946 with an "Automatically Pull &/or User Selected Data/Stats, Support, &/or Content For Analysis," where similar to step 1940, an "Analysis and/or Collective Results," is performed. If the answer to query 1944, is "No,", then the process proceeds to a step 1945, where a "Proceed with Rules, Instructions &/or Remedies for "Insufficient Data & Support To Determine Inventorship," is performed and where the IPACE system may further parse, test, analyze, qualify, verify, validate, interrogate, challenge, prompt, notify, and/or the like, a particular actor, user, entity, government, party, AI system, source, resource, support database, and/or the like. If the answer to query 1944, is instead "Yes," then the process proceeds to a step 1946 with an "Automatically Pull &/or User Selected Data/Stats, Support, &/or Content For Analysis," where similar to step 1940, an "Analysis and/or Collective Results," is performed.

From step 1946, the process proceeds to an "Patent-Related-content evaluation options-list," comprising an "Only One Participant" 1947 option, an "Actor/User requested data/stats Validation 1949 option, a "Sound Recordings" 1949 option, a "Visual Recordings" 1950 option, a "Text Input" 1951 option, a "Pull From Other Sources (Resources/Support)" 1952 option, and/or an "Other input" 1953 Options. In various non-limiting embodiments, the collective results from the "the Patent-Related-content evaluation options-list" proceed to a step 1954, where similar to step 1940, an "Analysis and/or Collective Results," is performed.

In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like, included, associated, Supporting, and/or the like, the collective results from the "the Patent-Related-content evaluation options-list." In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like, including any associations to concepts, disclosures, diligence, RTPs, publications, participants, contributors, inventors, claims, claim elements, claim-sets, claim-pendency, claim-dependency, continuations, divisionals, families, portfolios, prosecution history, priority/benefit claims/claimed, post grant history, and/or the like.

In various non-limiting embodiments, the results/selections of the Patent-Related-evaluations, and/or the like, via an automatic, systematic, continuous, persistent, conditional, and/or actor/user-prompt/selection and/or the like, proceed to a query 1955 which asks whether to an "Inventorship [was] Determined Per Each Claim Element?" If the answer to query 1955, "Yes," the process proceeds to the 1124*a*. If the answer to query 1955 is instead, "No, then the proceeds to a step 1965 where similar to step 1945, a "Proceed with Rules, Instructions &/or Remedies for "Inventorship Determination Still Pending."

From earlier mentioned step 1124*a*, the process proceeds to a query 1125*a*, which asks whether to "Search, Crawl, Interrogate, Pull, &/or Synch with Additional Sources?" or not. If the answer to query 1125*a* is "No," then the process proceeds to a step 1126*a*" where a "Proceed with Novelty Determination & Methodology For Comparing Data/Content To Existing Data/Content/Stats" is executed. Next, the process proceeds to a step 1127*a*.

If the answer to query 1125*a*, is instead "Yes," then the process proceeds to a step 1128*a* where an "Analyze Content for What Additional Sources to Search, Crawl, Interrogate, Pull, &/or Synch With (e.g. How, How often, Where, When, etc.) & Perform Accordingly," is performed. From step 1128*a*, the process proceeds to a query 1129*a* which asks whether "New &/or Modified Relevant Content Found/Identified?" If the answer to query 1129*a* is "No," the process proceeds to a step 1145*a*, where a "Generate Appropriate Annotations, Markups, Comments, Time/Date-stamps &/or the like," is performed.

If the answer to query 1129*a*, is instead "Yes" the process proceeds to the step 1127*a*, where an "Analyze & Compare Content To Generate ID-ACERS Scores For Each I/O/PC, Element, Claim, Etc., Regarding Conception, Diligence, Publications, Offers To Sell/Import/Export/Sales, RTPs, Making, &/or Relative Overlap &/or Infringement Found/Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127*a*, the process proceeds the terminator 1145*a*, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, inventor club, and/or the like. In various non-limiting embodiments, the analysis may also include a novelty per a discernible set of data, statistics, and/or the like, factor. In various non-limiting embodiments, the analysis of the discernible set of data, statistics, and/or the like, may include other inventions within that field of invention, industry, art unit, and/or the like. In various non-limiting embodiments, the IPACE system searches to find similar words, sentence structures as a particular user types, to determine the novelty and apply analysis and algorithms to the likelihood of patentability based on comparable data/statistics, comparable patents denied, comparable patent granted within the same field, art unit, and/or outside, including any relevant and comparable data structure in figures, sentences, and context along with the associated success rates for grant versus examiner (66) challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. The variety of data/content may comprise such items as an application, specification, written description, abstract, claim, figure, publications (e.g. patents, inventions, claims, figures, written descriptions, blogs, websites, white papers, speeches, recorded events, and/or the like, worldwide with translations, if necessary); figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); audio, video, and/or the like (e.g. with speech to text conversions, and image, facial, scene, and/or the like); and/or the like.

Retaining Data/Content as Trade Secrets

In various non-limiting embodiments, the IPACE system gives selective members visible access to application preparations, a pending applications, and/or the like, where these members may selectively withdraw data/content, elements, and/or the like (e.g. to retain as a trade secret), say prior to publication and/or if not claim dependent. For example, the IPACE system would preferably highlight data/content perceived as novel but not claimed, and where the IPACE system analysis may generate a score for a perceived enforcement cost per perceived novelty item. For instance, some novel elements may be perceived relatively more difficult to infringe, such as a narrow claim for a manufacturing method when relatively compared to all claims, and/or a specific claim, say a relatively broad system claim for a product in a popular industry and/or art unit; or say novel component where it appears difficult to pinpoint a single infringer, and/or the like.

Figure 65:
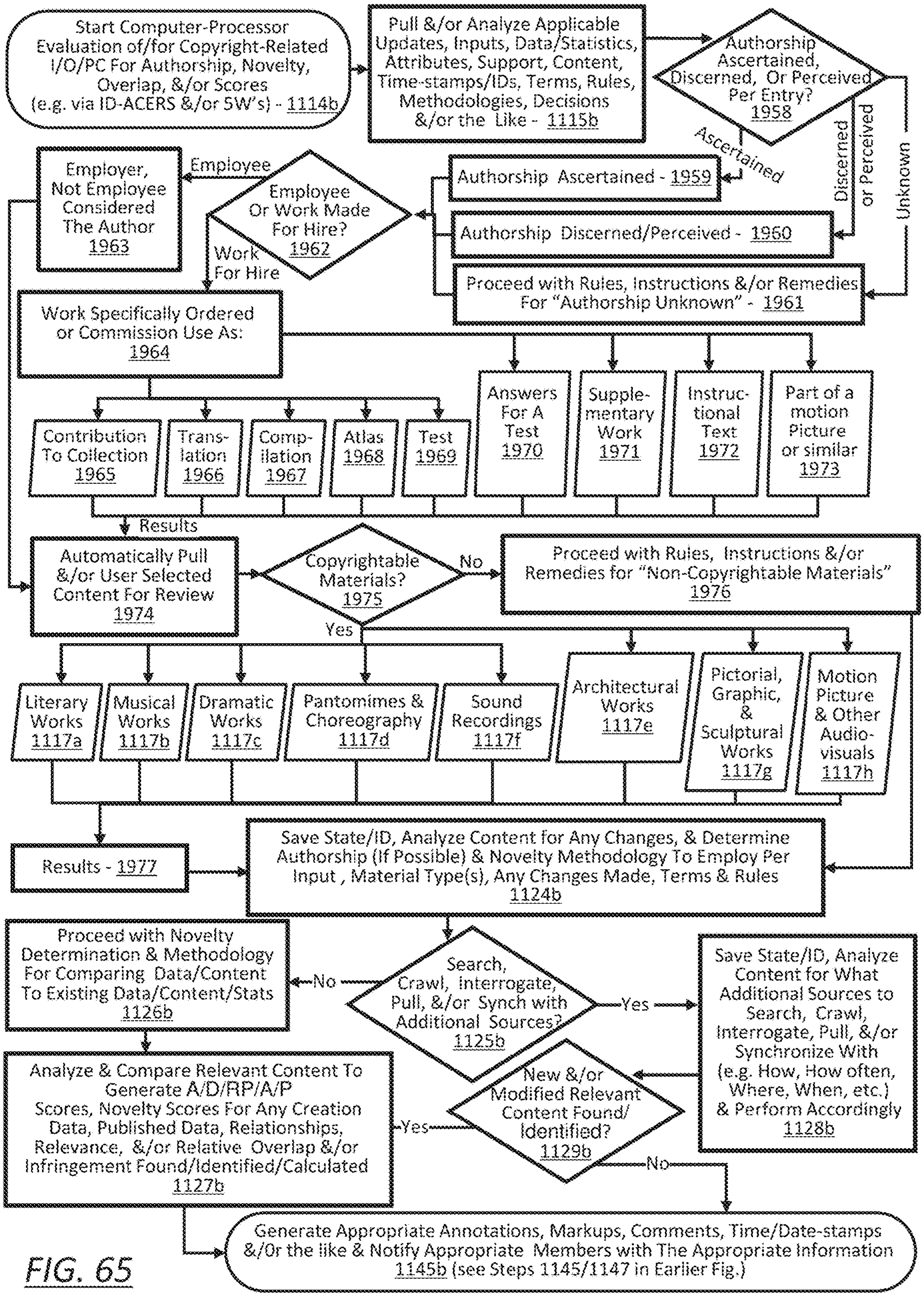
FIG. 65 is a flowchart that depicts a non-limiting embodiment and example of the IPACE system, and associated computer-implemented method for Determination of Copyright Related Data/content for Authorship, Novelty and/or Overlap.

FIG. 65 is a flowchart that depicts an embodiment and example of the IPACE system, and associated computer-implemented method for Determination of Copyright Related Data/content for Inventorship, Novelty and/or Overlap. Similar to previous figure, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, data/content with/for any Intellectual Property components, elements, links, relations, novelty, overlap, scoring, verifications, prompts, and/or the like. In addition, where the non-ascertained, non-discerned, non-actor-stated, non-perceived, and/or the like data, is continually cycled for corrections, correlations, relations, links, and/or the like. Further, where the Non-Copyright-related content, may become, utilized, incorporated, as a source, resource, support, prior-art, reference, and/or the like for future I/O/PC novelty, originality, utility, and/or the like evaluations.

Starting with a start terminal 1114*b* for a "Start Computer-Processor Evaluation of/for Copyright-Related I/O/PC For Authorship, Novelty, Overlap, &/or Scores (e.g. via ID-ACERS &/or 5 W's)," where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a copyright-related data/content, assessment, a copyright-assessment score, and/or the like, for such aspects, associations, and/or the like, as an application element, an chain-of-commission, a Novelty score, any overlap, a relative perceived Overlap score, and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with a creation date of/from a list comprising a creative work, application, application participant/collaboration, series, claim, family, portfolio, prosecution history, priority/benefit claims/claimed, post grant history, and/or the like.

In various non-limiting embodiments, the IPACE system could interrogate data regarding any court decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the Library of Congress perceived copyright holder and the copyright application applicant, where the IPACE system could discern the ambiguity per existing triple stored relationships and evaluate for any known exception/statutory exception/rule-change/resolution and/or generate a perceived prediction/exception/resolution based in part, on such elements as historical decisions, temporal data, similar time windows, similar cases, similar jurisdictions, similar fact evidence, similar participants, similar entities, similar decisions, and/or the like, the triple store library/ontology.

In various non-limiting embodiments, there could be multiple entities tracked and interrogated for current definitions, discrepancies, anomalies, and/or the like, where each could maintain independent ontologies and rules, merge ontologies, rules, triples, thesauruses, and/or some combinations of these In various non-limiting embodiments, the IPACE system could discern a definition for say, a discrepancy in what is on file at the liberty of congress and what is asserted as a copyright by a particular party/user/IPACE member Library of Congress, based in part on a triple store of the Library of Congress (a particular section of the Library of Congress), temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition, meaning, relationship, triple statement, or the like could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support, potentially reverting, iterative comparing, and/or the like. In various non-limiting embodiments, the Source/resource/Support would preferably comprise all publications, ontologies, lexicon, semantics, syntax, triple statements, definitions, rules, procedures, manuals (e.g. Library of Congress, Federal Circuit, United States Court of Appeals for the Federal Circuit, Supreme Court, Congress, jurisdictions, restrictions, rules, statutes, triples, ontologies, federations, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending cases, pending laws, pending rules, pending petitions, pending pre-appeal briefs, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign jurisdictions (e.g. China, Japan, Korea, Germany, United Kingdom, France, Canada, Australia, and all other countries, and/or the like), foreign filing organizations and/or the like.

From terminator 1114*b*, the process proceeds next to a "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," in a step 1115*b*, where the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like. From step 1115*b*, the process proceeds next to a query 1958, which asks "Authorship Known Or Perceived Per Entry?" If the answer to the query 1958 is "Ascertained," the process then proceeds to a step 1959, where an "Authorship Known" is performed. If the answer to the query 1958 is "Discerned or Perceived," the process then proceeds to a step 1960, where an "Authorship Perceived" is performed. If the answer to the query 1958 is instead "Unknown," the process then proceeds to a step 1961, where a "Proceed with Rules, Instructions &/or Remedies for 'Authorship Unknown'" is performed. From steps 1959-1961, the process then proceeds to a query 1962, which asks "Employee Or Work Made For Hire?" If the answer to the query 1962 is "Employee," the process then proceeds to a step 1963, where a "Employer, Not Employee Considered The Author" is performed. The process is then forwarded to a step 1974, where an "Automatically Pull &/or User Selected Content for Review" is performed. If the answer to the query 1962 is instead "Work for Hire," the process then proceeds to a step 1964, where a "Work Specifically Ordered or Commission Use As:" is performed.

From step 1964, the process proceeds to a "Work Specifically Ordered or Commission Use As:" option list comprising a "Contribution a To Collection" option 1965, a "Translation" 1966 option, a "Compilation" 1967 option, an "Atlas" 1968 option, a "Test" 1969 option, an "Answers For A Test" 1970 option, a "Supplementary Work"1971 option, an "Instructional Text" 1972 option, and a "Part of a motion Picture or similar" 1973 option.

In various non-limiting embodiments, the "Contribution a To Collection" option and associated modules, UI, engine, and/or the like, would automatically, systematically, continuously, persistently, conditionally, and/or actor/user-prompted/selected monitor, interrogate, analyze, compare, synchronize, and/or the like, any and all data associated with a Contribution a To Collection of a list comprising a creative work, application, creative work participant, copyright-holder, asset of collection, family, portfolio, prosecution history, priority/benefit claims/claimed, post grant history, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, and/or all data associated with the Contribution a To Collection for determining scores, rankings, data associations, and/or the like. In various non-limiting embodiments, the "Contribution a To Collection" option would preferably automatically, systematically, continuously, persistently, conditionally, and/or actor/user-prompted/selected monitor, interrogate, analyze, compare, synchronize, and/or the like, and/or all data associated with the Contribution a To Collection for assessing any potential issues, concerns, pitfalls, shortcomings, chain-of-commission issues, rule changes, law changes, and/or the like.

In various non-limiting embodiments, a creation would consider complete and properly when a creator created his/her creative work In various non-limiting embodiments, the IPACE system would presume a first creator to properly file a first claimed creative work found copyrightable by a Library of Congress and US law, would be entitled to a copyright grant by the Library of Congress, where a second person who filed on a second claimed creative work on a subsequent date or later would be rejected in part due to the first claimed creative work, and presuming the second creator does not have a sufficient cause for an creative work derivation proceeding against the first inventor.

In various non-limiting embodiments, the second person to file a second copyright application disclosing an creative work would be entitled to the creative work derivation proceeding against the first inventor, if the second person has a sufficient cause, case, standing, and/or the like, per say "work-for-hire" laws, procedures, and/or the like. In various non-limiting embodiments, the creative work derivation proceeding would determine, if either the first creator to file the first claimed creative work or the second person to file would be entitled to a copyright grant by the Library of Congress, Library of Congress, and US law, rules and regulations, procedures, and/or the like. In various non-limiting embodiments, the creative work derivation proceeding could determine that neither or both the first creator to file the first claimed creative work and the second person to file would be entitled to a copyright grant by the Library of Congress, Library of Congress, and US law, rules and regulations, procedures, and/or the like.

In various non-limiting embodiments, the "Contribution a To Collection" option would preferably automatically, systematically, continuously, persistently, conditionally, and/or actor/user-prompted/selected monitor, interrogate, analyze, compare, synchronize, and/or the like, and/or any and all dates, data, and/or the like, associated with a Contribution a To Collection via a commissioning of the creative work or works, a copyright application, a collaborative project, employee agreement, work-for-hire agreement, a publication, an offer to sell, a public disclosure, fair use, a disclosure, a NDA, a related agreement, a manufacturing, an exporting, a usage, and/or the like. In various non-limiting embodiments, the IPACE system could interrogate data regarding any court decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the Library of Congress and US Copyright case law, where the IPACE system could discern a known exception/statutory deadline/rule-change/resolution or generate a perceived prediction/exception/resolution based in part, for what is A/D/RP/AS/P to define what, constitutes, violates, and/or the like, for say a properly executed work-for-hire agreement, dating, marking, statutory dates, and/or the like.

In various non-limiting embodiments, the IPACE system discerned known statutory deadline/rule-change/resolutions or generated perceived prediction/resolutions for what is A/D/RP/AS/P to define what, constitutes, violates, and/or the like, the properly executed work-for-hire agreement, dating, marking, statutory dates, and/or the like, could include minimal requirements, associated fees/time, associated fees/time per resolution, associated fees/time for risk avoidance, and/or the like. In various non-limiting embodiments, the IPACE system performs similarly for the remaining options in the 1966-1973 option list.

In various non-limiting embodiments, the collective results from the "Work Specifically Ordered or Commission Use As:" option list proceed to the step 1974. In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like, included, associated, Supporting, and/or the like, the collective results from the "Copyright-Related Content, Data, Stats, & Source/Resource/Support option list." In various non-limiting embodiments, the IPACE system would automatically, systematically, continuously, persistently, conditionally, and/or actor/user-prompted/selected monitor, interrogate, analyze, compare, synchronize, and/or the like, any and all data, data attributes, data associations/relations, and/or the like.

In various non-limiting embodiments, the IPACE system via the computer processor, associated subsystems (e.g. via AIS, ID-ACERS, Knowledge Base Mgmt., CREATE, METER, TIMES, FINANCIALS, etc.) would automatically, systematically, continuously, persistently, conditionally, and/or actor/user-prompted/selected monitor, interrogate, analyze, compare, and/or the like, the "Collective Results Analysis" with/via, against, and/or the like, the "Ascertained, Discerned, Relative Perceived, Actor-Stated(A/D/RP/AS) Data Analysis, Scores, and Data Attribute Analysis Module/Engine," where the IPACE system via the computer processor, associated subsystems (e.g. via AIS, ID-ACERS, Knowledge Base Mgmt., CREATE, METER, TIMES, FINANCIALS, etc.) could ascertain and/or discern a known exception/statutory deadline/rule-change/resolution or generate a perceived prediction/exception/resolution based in part, for what is A/D/RP/AS/P to define what, what is A/D/RP/AS/P as relatively likely to have caused what, what is A/D/RP/AS/P to constitute what, what is A/D/RP/AS/P to violate what, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze a data collection to ascertain, specify, score, rank, and/or the like, a known sub-collection of data, where for instances, the known sub-collection of data is known to constitute, produce, and/or the like, a minimal set of requirements to file a copyright application, say per a specific creative work, a specific group of joint-collaborators, and/or the like.

In various non-limiting embodiments, the IPACE system analysis via the processor and the associated computer implemented methods automatically, systematically (e.g. may partially or wholly via the AIS 195), conditionally, and/or actor/user-prompted/selected analyze a data collection to ascertain, specify, score, rank, and/or the like, a known sub-collection of data, where for instances, the known sub-collection of data is known to constitute, produce, and/or the like, a minimal set of requirements to assert a copyright, say per a specific creative work, a specific group of creative-collaborators, and/or the like.

Referring back to the Fig., from the step 1974, the process proceeds to a query 1975, which asks if the Copyright-Related Content was "Copyrightable Materials? If the answer to query 1975, is "No," the process proceeds to a step 1976, which performs a "Proceed With Rules, Instructions &/or Remedies for 'Non-Copyrightable Materials'" assessment to what is A/D/RP/AS/P about the rights of the copyright related content. For instance, a particular A/D/RP/AS/P assessments as to whether there is sufficient data to be "ascertained" that the copyright-related content is specifically, properly, identifiably, legally, contractually, conditionally, subjectively, and/or the like, assigned, say to an entity, another group, another domain, another government, another individual, and/or the like. In various non-limiting embodiments, if the "ascertained" A/D/RP/AS/P assessment determines, produces, interrogates, and/or the like, insufficient data to be "ascertained," then the IPACE system and the associated computer implemented methods could automatically, systematically (e.g. partially or wholly via the AIS 195), conditionally, and/or actor/user-prompted/selected analyze what specifically is required, from who, when, how, where, and/or the like, to be "ascertained."

In various non-limiting embodiments, if the "ascertained" A/D/RP/AS/P assessment determines, produces, interrogates, and/or the like, insufficient data to be "ascertained," then the IPACE system and the associated computer implemented methods could automatically, systematically (e.g. partially or wholly via the AIS 195), conditionally, and/or actor/user-prompted/selected analyze what is discerned, where a fitness criteria, threshold, range, condition, rule, and/or the like, would require a particular value, set of values, condition(s), and/or the like, to accept the discerned value without verification, validations, authentications, updates, comments, annotations, score, acknowledgements, permissions, and/or the like. In various non-limiting embodiments, what is not ascertained, but is discerned/discernible, and/or the like, with/by the fitness criteria, threshold, range, condition, rule, and/or the like, could automatically, systematically, continuously, persistently, conditionally, and/or user-selectively, require an additional input(s), say a particular verification, validation, authentication, update, comment, annotation, score, acknowledgement, permission, and/or the like; where the additional input(s) would wholly and/or partially update data with a threshold to become discerned as, say an insufficient or sufficient discernment, a unsuitable or suitable discernment, an unacceptable or acceptable discernment, an inappropriate or appropriate discernment, and/or the like.

Further, where the data is relative to say chain-of-commission, research, prototypes, models, documents, spreadsheets, illustrations, figures/drawings, blueprints, schematics, electronic files, copyright prosecution, copyright-assessment, novelty, participants, participation, entities, persons, machines, methods, manufacturing, making, using, exporting, publishing, assignment, ownership, funding, budgeting, monetization, licensing, litigation, case, petition, appeal, ruling, decision, court, law, rule, guideline, procedure, deadline, government, country, organization, TOU/TOPs, and/or the like.

In various non-limiting embodiments, the IPACE system would preferably have a series of fitness criteria (e.g. value, thresholds, ranges, and/or the like), where a first fitness criteria would elevated relatively perceived data to data discerned by the IPACE system as, say accurate, reliable, novel, relevant, temporally appropriate (e.g. contract dates, creative/modify dates, most current state, draft, version, iteration, release, publication, and/or the like), popular (e.g. most popular, in the top 10 per a particular domain), age appropriate (e.g. contract signature), and/or the like.

In various non-limiting embodiments, the IPACE system and associated methods would automatically, systematically (e.g. partially or wholly via the AIS 195), conditionally, and/or actor/user-prompted/selected create a data attribute goal, projection, prediction, assumption, and/or the like. In various non-limiting embodiments, the data attribute, for say a goal could be to continuously elevate a data score, say from a lower data attribute score to a higher date attribute score. For instance, from a relatively perceived value for a particular value/attribute, say a person's date of birth, to the "ascertained" value.

Returning to the Fig., if the answer query 1975, is instead "Yes," the process then proceeds to a set of "Copyrightable Materials?" options comprising a "Literary Works" option 1117*a*, a "Musical Works" option 1117*b*, a "Dramatic Works" option 1117*c*, a "Pantomimes & Choreography" option 1117*d*, a "Architectural Works" option 1117*e*, a "Sound Recordings" option 1117*f*, a "Pictorial, Graphic, & Sculptural Works" option 1117*g*, and a "Motion Picture & Other Audio-visuals" option 1117*h*.

The results from options 1117*a*-1117*h*, then proceed to a step 1977, where a "Results" is preformed passed and stored in a step 1124*b*. If the answer to query 1962, is instead "Wholly Assigned," then the process proceeds to a step 1943, where an "Invention Wholly Assigned," is processed, where the results are passed and stored in the step 1124*b*. 1124*b* where a "Save State ID, Inventorship (If Applicable), Analyze Content for Any Changes, & Determined Novelty Methodology To Employ Per Input, Material Type(s), Any Changes Made, Terms & Rules," is performed.

From earlier mentioned step 1124*b*, the process proceeds to a query 1125*b*, which asks whether to "Search, Crawl, Interrogate, Pull, &/or Synch with Additional Sources?" or not. If the answer to query 1125*b* is "No," then the process proceeds to a step 1126*b*" where a "Proceed with Novelty Determination & Methodology For Comparing Data/Content To Existing Data/Content/Stats" is executed. Next, the process proceeds to a step 1127*b*.

If the answer to query 1125*b*, is instead "Yes," then the process proceeds to a step 1128*b* where an "Analyze Content for What Additional Sources to Search, Crawl, Interrogate, Pull, &/or Synch With (e.g. How, How often, Where, When, etc.) & Perform Accordingly," is performed. From step 1128*b*, the process proceeds to a query 1129*b* which asks whether "New &/or Modified Relevant Content Found/Identified?" If the answer to query 1129*b* is "No," the process proceeds to a step 11454*b*, where a "Generate Appropriate Annotations, Markups, Comments, Time/Datestamps &/or the like," is performed.

If the answer to query 1129*b*, is instead "Yes" the process proceeds to the step 1127*b*, where an "Analyze & Compare Content To Generate ID-ACERS Scores For Each I/O/PC, Element, Claim, Etc., Regarding Creation, Diligence, Publications, Offers To Sell/Import/Export/Sales, RTPs, Making, &/or Relative Overlap &/or Infringement Found/Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127*b*, the process proceeds the terminator 11454*b*, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, creator club (e.g. the IdeaSocket), and/or the like. In various non-limiting embodiments, the analysis may also include a novelty per a discernible set of data, statistics, and/or the like, factor. In various non-limiting embodiments, the analysis of the discernible set of data, statistics, and/or the like, may include other creative works within that field of creative work, industry, art unit, and/or the like. In various non-limiting embodiments, the IPACE system searches to find similar words, sentence structures as a particular user types, to determine the novelty and apply analysis and algorithms to the likelihood of copyright-assessment based on comparable data/statistics, comparable copyrights denied, comparable copyright granted within the same field, and/or outside, including any relevant and comparable data structure in content, structure, lyrics, form-factor, sentences, and context along with the associated success rates for grant versus challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. The variety of data/content may comprise such items as an application, specification, written description, abstract, claim, figure, publications (e.g. copyrights, creative works, claims, figures, written descriptions, blogs, websites, white papers, speeches, recorded events, and/or the like, worldwide with translations, if necessary); figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); audio, video, and/or the like (e.g. with speech to text conversions, and image, facial, scene, and/or the like); and/or the like.

Retaining Data/Content as Trade Secrets

In various non-limiting embodiments, the system, similarly to previously mentioned Patent-related materials, gives selective members visible access to copyright materials, application preparations, a pending applications, and/or the like, where these members may selectively withdraw data/content, elements, and/or the like. For example, the IPACE system would preferably highlight data/content perceived as novel but not filed with the Library of Congress, and where the IPACE system analysis may generate a score for a perceived enforcement cost per perceived novelty item and options. For instance, some novel elements may be perceived relatively more difficult to enforce or infringe due to limited visibility of usage, when relatively compared other creative assets for a product in a popular industry and/or competitive field.

Figure 66:
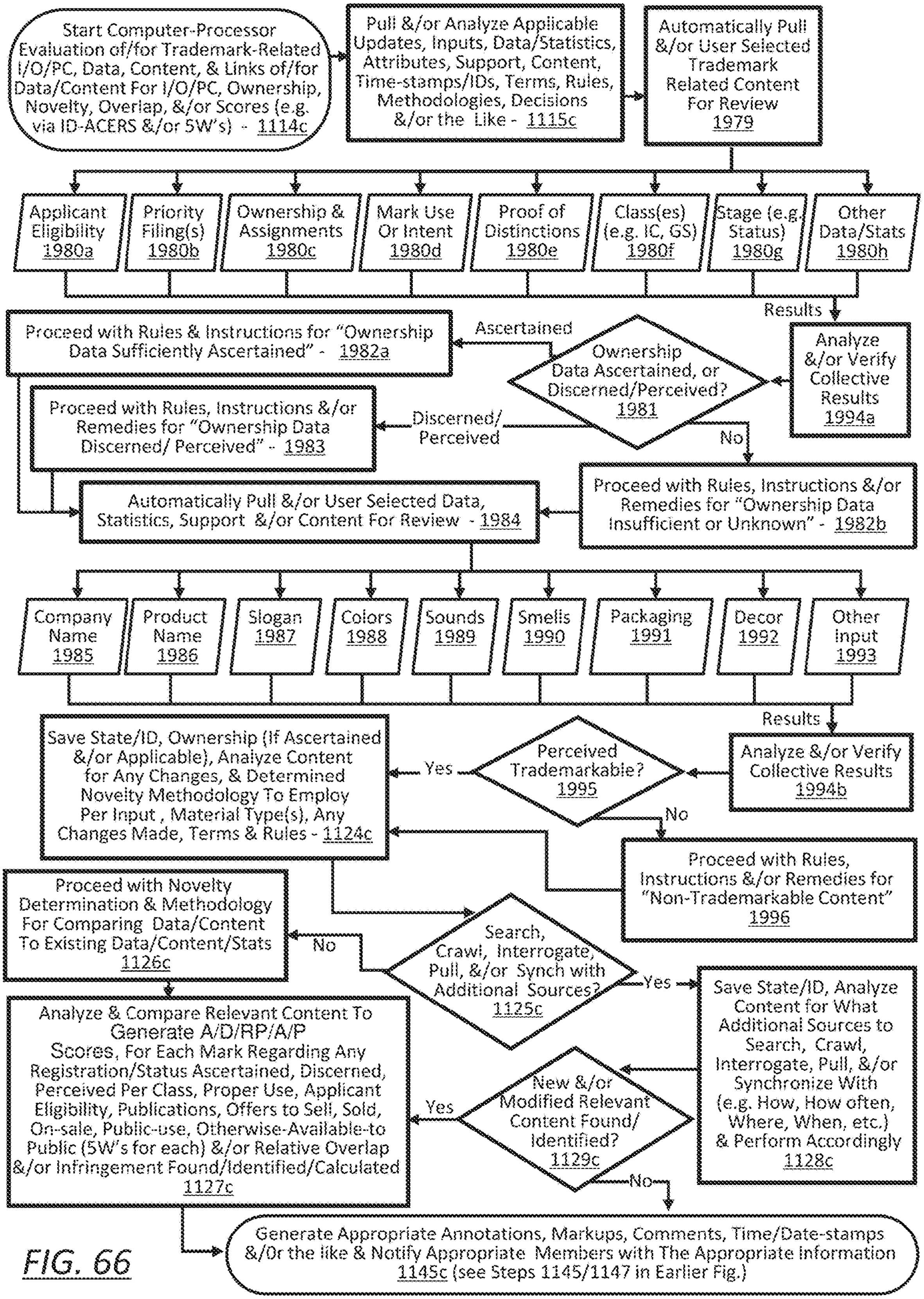
FIG. 66 is a flowchart that depicts a non-limiting embodiment and example of the IPACE system, and associated computer-implemented method for Determination of Trademark Related Data/content for Ownership, Novelty and/or Overlap.

FIG. 66 is a flowchart that depicts an embodiment and example of the IPACE system, and associated computer-implemented method for Determination of Trademark Related Data/content for Ownership, Novelty and/or Overlap. Similar to previous figures, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, data/content with/for any Intellectual Property components, elements, links, relations, novelty, overlap, scoring, verifications, prompts, and/or the like. In addition, where the non-ascertained, non-discerned, non-actor-stated, non-perceived, and/or the like data, is continually cycled for corrections, correlations, relations, links, and/or the like. Further, where the Non-Trademark-related content, may become, utilized, incorporated, as a source, resource, support, prior-art, reference, and/or the like for future I/O/PC novelty, originality, utility, and/or the like evaluations.

Starting with a start terminal 1114*c* for a "(Start) Computer-Processor Evaluation of/for Trademark-Related I/O/PC, Data, Content, & Links of/for Data/Content For I/O/PC, Ownership, Novelty, Overlap, &/or Scores (e.g. via ID-ACERS &/or 5W's)," where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a trademark-related data/content, assessment, a trademark-ability score, and/or the like, for such aspects, associations, and/or the like, as an application element, an ownership, a Novelty score, any overlap, a relative perceived Overlap score, and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with a conception date of/from a list comprising an invention, application, application participant, inventor, claim, claim element, claim-set, claim-pendency, claim-dependency, continuation, divisional, family, portfolio, prosecution history, priority/benefit claims/claimed, post grant history, and/or the like.

In various non-limiting embodiments, the IPACE system could interrogate data regarding any PTO decision, restriction, regulation, rule, law, appeal, guideline, definition and/or the like, for any actor-stated, ascertained, discerned, relatively perceived, and/or predicted discrepancy, conflict, anomaly, and/or the like, for say, a discrepancy in the USPTO TMEP and US Trademark case law, where the IPACE system could discern a known exception/statutory deadline/rule-change/resolution or generate a perceived prediction/exception/resolution based in part, on such elements as historical decisions, temporal data, similar time windows, similar cases, similar jurisdictions, similar fact evidence, similar participants, similar entities, similar decisions, and/or the like. In various non-limiting embodiments, there could be multiple entities tracked and interrogated for current definitions, discrepancies, anomalies, and/or the like.

In various non-limiting embodiments, the IPACE system could discern a definition for say, a discrepancy in the USPTO Trademark Manual of Examining Procedure (TMEP) and case law, based in part on temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support. In various non-limiting embodiments, the Source/resource/Support would preferably comprise all publications, ontologies, lexicon, semantics, syntax, triple statements, definitions, rules, procedures, manuals (e.g. TMEP and/or the like), Foreign Trademark Classification Systems, case law, petitions, derivation proceedings, pre-appeals, appeals, decisions (e.g. Federal Circuit, United States Court of Appeals for the Federal Circuit, Supreme Court, Congress, jurisdictions, restrictions, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending cases, pending laws, pending rules, pending petitions, pending pre-appeal briefs, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign jurisdictions (e.g. China, Japan, Korea, Germany, United Kingdom, France, Canada, Australia, and all other countries, and/or the like.

Returning to FIG. 66, from terminator 1114*c*, the process proceeds next to a step 1115*c* where a "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," is performed, wherein the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like. From step 1115*c*, the process proceeds next to a step 1979, where an "Automatically Pull &/or User Selected Trademark Related Content For Review" is performed.

From the step 1979, the process then proceeds to a list of options including: an "Applicant Eligibility" option 1980*a*, a "Priority Filing(s)" option 1980*b*, an "Ownership & Assignments" option 1980*c*, a "Mark Use Or Intent" option 1980*d*, a "Proof of Distinctions" option 1980*e*, a "Class(es) (e.g. IC, GS)" option 1980*f*, a "Stage (e.g. Status)" 1980*g*, and an "Other Data/Stats" option 1980*h*.

From the results of options 1980*a*-1980*h*, the process then proceeds to a step 1994*a*, where an "Analyze &/or Verify Collective Results" is performed. From step 1994*a* the process proceeds to a query 1981, which asks "Ownership Data Ascertained, or Discerned/Perceived?" If the answer to the query 1981 is "Ascertained," the process then moves to a step 1982*a*, where a "Proceed with Rules & Instructions for 'Ownership Data Sufficiently Ascertained'" is performed. If the answer to the query 1981 is "No," the process then proceeds to a step 1982*b*, where a "Proceed with Rules, Instructions &/or Remedies for "Ownership Data Insufficient or Unknown" is performed. If the answer to the query 1981 is instead "Discerned/Perceived," the process then proceeds to a step 1983, where a "Proceed with Rules, Instructions &/or Remedies for "Ownership Data Discerned/Perceived" is performed.

From steps 1982*a*, 1982*b* and 1983, the process then proceeds to a step 1984, where an "Automatically Pull &/or User Selected Data, Statistics, Support &/or Content For Review" is performed. From the step the 1984, the process then proceeds to a set of "Automatically Pull &/or User Selected Data, Statistics, Support &/or Content For Review" options. The options include: a "Company Name" option 1985, a "Product Name" option 1986, a "Slogan" option 1987, a "Colors" option 1988, a "Sounds" option 1989, a "Smells" option 1990, a "Packaging" option 1991, a "Decor" option 1992, an "Other Input" option 1993.

From the results options 1985-1993, the process then proceeds to a step 1994*b*, where an "Analyze &/or Verify Collective Results" is performed. From the step 1994*b*, the process proceeds to a query 1995, which asks "Perceived Trademark-able?" If the answer to the query 1995 is "Yes," the process then proceeds to a step 1124*c*, where an "Save State/ID, Ownership (If Ascertained &/or Applicable), Analyze Content for Any Changes, & Determined Novelty Methodology To Employ Per Input, Material Type(s), Any Changes Made, Terms & Rules" is performed. If the answer to the query 1995 is instead "No," the process then proceeds to a step 1996, where an "Proceed with Rules, Instructions &/or Remedies for 'Non-Trademark-able Content'" is performed.

From earlier mentioned step 1124c, the process proceeds to a query 1125c, which asks whether to "Search, Crawl, Interrogate, Pull, &/or Synch with Additional Sources?" or not. If the answer to query 1125c is "No," then the process proceeds to a step 1126c" where a "Proceed with Novelty Determination & Methodology For Comparing Data/Content To Existing Data/Content/Stats" is executed. Next, the process proceeds to a step 1127c.

If the answer to query 1125c, is instead "Yes," then the process proceeds to a step 1128c where an "Analyze Content for What Additional Sources to Search, Crawl, Interrogate, Pull, &/or Synch With (e.g. How, How often, Where, When, etc.) & Perform Accordingly," is performed. From step 1128c, the process proceeds to a query 1129c which asks whether "New &/or Modified Relevant Content Found/Identified?" If the answer to query 1129c is "No," the process proceeds to a step 11454b, where a "Generate Appropriate Annotations, Markups, Comments, Time/Date-stamps &/or the like," is performed.

If the answer to query 1129c, is instead "Yes" the process proceeds to the step 1127c, where an "Analyze & Compare Relevant Content To Generate A/D/RP/A/P Scores, For Each Mark Regarding Any Registration/Status Ascertained, Discerned, Perceived Per Class, Proper Use, Applicant Eligibility, Publications, Offers to Sell, Sold, On-sale, Public-use, Otherwise-Available-to Public (5 W's for each) &/or Relative Overlap &/or Infringement Found/Identified/Calculate," is performed.

In various non-limiting embodiments (similar to the earlier Figs), the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score. In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127c, the process proceeds the terminator 1145c, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, inventor club, and/or the like. In various non-limiting embodiments, the analysis may also include a novelty per a discernible set of data, statistics, and/or the like, factor. In various non-limiting embodiments, the analysis of the discernible set of data, statistics, and/or the like, may include other inventions within that field of invention, industry, art unit, and/or the like. In various non-limiting embodiments, the IPACE system searches to find similar words, sentence structures as a particular user types, to determine the novelty and apply analysis and algorithms to the likelihood of trademark-ability based on comparable data/statistics, comparable trademarks denied, comparable trademark granted within the same field, art unit, and/or outside, including any relevant and comparable data structure in first-to-file, first-use-in-commerce, first-use-of-mark, intent-to-use, Interstate use, logos, proper marking, and context along with the associated success rates for grant versus examiner (66) challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. The variety of data/content may comprise such items as an application, first-to-file, first-use-in-commerce, first-use-of-mark, intent-to-use, Interstate use, logos, proper marking, and context, publications (e.g. company names, product names, slogans, packaging, websites, blogs, websites, white papers, speeches, recorded events, and/or the like, worldwide with translations, if necessary); including an analysis of each semantics analysis of text, classes, indexing, elements, schema, keywords, segmentation, component, and any relationships, triple assignments, statements, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); image, sound, frame, audio, video, and/or the like (e.g. with speech to text conversions, and image, facial, scene, and/or the like); and/or the like.

Figure 67:
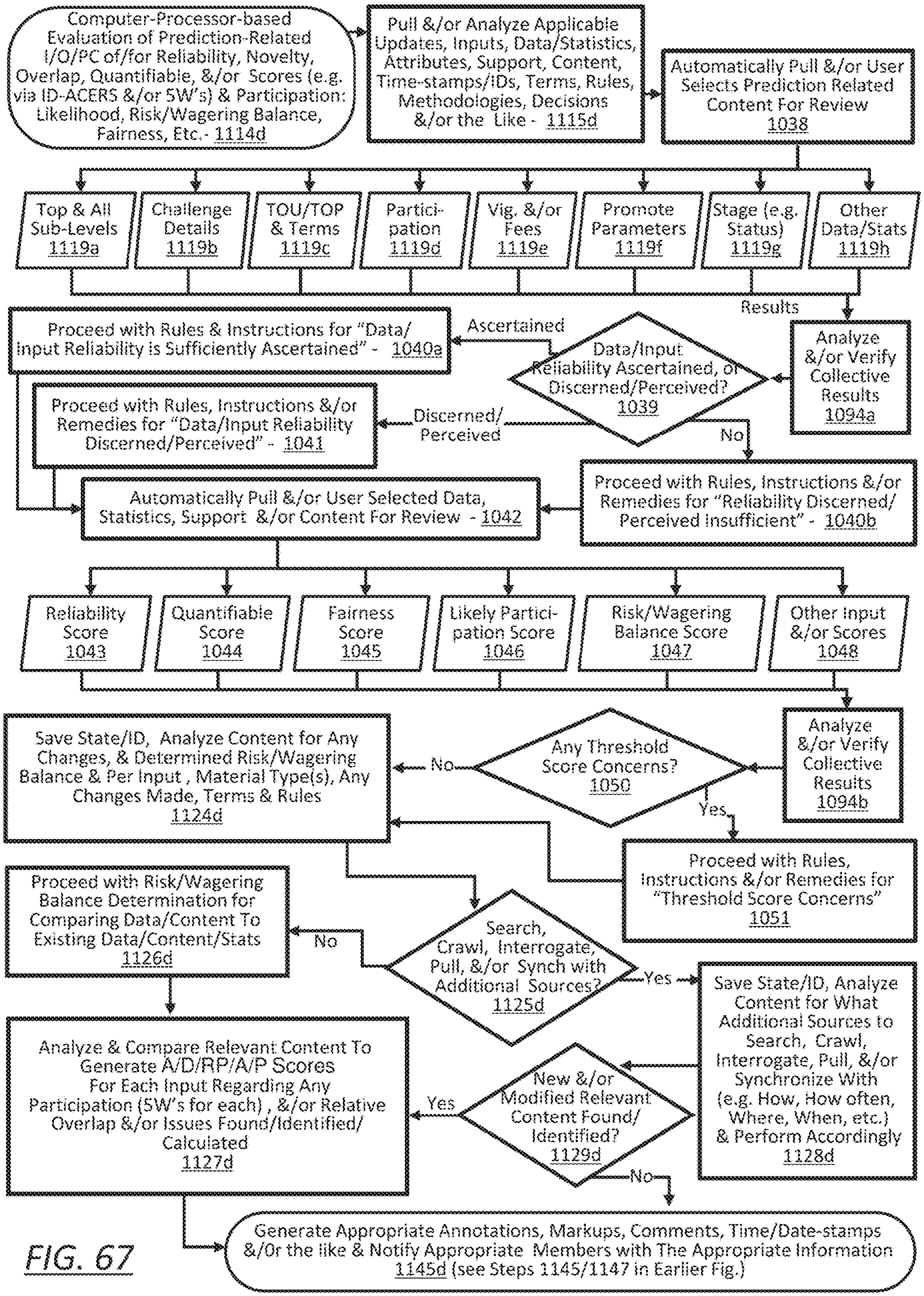
FIG. 67 is a flowchart that depicts a non-limiting embodiment and example of the IPACE system, and associated computer-implemented method for Evaluation of Prediction-Related I/O/PC of/for Reliability, Novelty, Overlap, Quantifiable, &/or Scores (e.g. via ID-ACERS &/or 5 W's) & Participation: Likelihood, Risk/Wagering Balance, Fairness, Etc. Prediction.

FIG. 67 is a flowchart that depicts an embodiment and example of the IPACE system, and associated computer-implemented method for Evaluation of Prediction-Related I/O/PC of/for Reliability, Novelty, Overlap, Quantifiable, &/or Scores (e.g. via ID-ACERS &/or 5 W's) & Participation: Likelihood, Risk/Wagering Balance, Fairness, Etc. Prediction. Similar to previous figures, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, data/content with/for any Prediction-Related components, elements, links, relations, novelty, overlap, scoring, wagers, risks, fees, balance, verifications, prompts, and/or the like. In addition, where the non-ascertained, non-discerned, non-actor-stated, non-perceived, and/or the like data, is continually cycled for corrections, correlations, relations, links, and/or the like. Further, where the Non-Prediction-related content, may become, utilized, incorporated, as a source, resource, support, prior-art, reference, and/or the like for future I/O/PC novelty, originality, utility, and/or the like evaluations.

Starting with a start terminal 1114*d* for a "Computer-Processor-based Evaluation of Prediction-Related I/O/PC of/for Reliability, Novelty, Overlap, Quantifiable, &/or Scores (e.g. via ID-ACERS &/or 5W's) & Participation: Likelihood, Risk/Wagering Balance, Fairness, Etc. Prediction," where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a prediction-related data/content, assessment, a prediction score, and/or the like, for such aspects, associations, and/or the like, as an event, subject, score, performer, performance, attendance, lines, wagers, propositions, teasers, Novelty score, any overlap, a relative perceived Overlap score, and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with a prediction of/from a list comprising an event, subject, score, performer, performance, attendance, line, wager, proposition, teaser, time-stamp, date-stamp, balance, credit, and/or the like.

In various non-limiting embodiments, the IPACE system could interrogate data regarding any predictions, lines, wagers, lines, assertions, terms of the assertion and/or the like, for any actor-stated, ascertained, discerned, relatively perceived, and/or predicted discrepancy, conflict, anomaly, and/or the like. In addition, the IPACE system could discern a relative reliability and/or accuracy of predictions per actor/user/member/source and rank predictions and the associated predictors per prediction, event, time-period, and/or the like. In various non-limiting embodiments, the IPACE system generates a prediction to compare the analysis of the AIS sub-system to opening line, and each subsequent line, to the conclusion, based in part, on such elements as historical decisions, temporal data, similar time windows, similar cases, similar jurisdictions, similar fact evidence, similar participants, similar entities, similar decisions, and/or the like. In various non-limiting embodiments, there could be multiple entities tracked and interrogated for current definitions, discrepancies, anomalies, and/or the like.

In various non-limiting embodiments, the IPACE system could discern a definition for say, a discrepancy in a prediction or prediction element (e.g. event, score, object, person, location, time, conclusion, etc.) based in part on temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support. In various non-limiting embodiments, the Source/resource/Support would preferably comprise all publications, ontologies, lexicon, semantics, syntax, triple statements, classes, nodes, definitions, rules, procedures, federations, lines, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending predictions, predictors, wagers, those who wager (e.g. may or may not be currency, credit, equity, property, including: IP: pending petitions, pending pre-appeal briefs, pending appeals, pending applications, file wrappers, prosecution current/history, licensing current/history, litigation current/history, settlements current/history, publication current/history), and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign predictions (e.g. China, Japan, Korea, Germany, United Kingdom, France, Canada, Australia, and all other countries, and/or the like).

Referring back to the FIG. 67, from terminator 1114*d*, the process proceeds next to a "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," in a step 1115*d*, where the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like. From step 1115*d*, the process proceeds next to a step 1038, where an "Automatically Pull &/or User Selects Prediction Related Content For Review" is performed. From the step 1038, the process then proceeds to a list of options including: an "Automatically Pull &/or User Selected Trademark Related Content For Review"

options. The options include: a "Top & All Sub-Levels" option 1119*a*, a "Challenge Details" option 1119*b*, a "TOU/TOP & Terms" option 1119*c*, a "Participation" option 1119*d*, a "Vig. &/or Fees" option 1119*e*, a "Promote Parameters" option 1119*f*, a "Stage (e.g. Status)" option 1119*g*, and an "Other Data/Stats" option 1119*h*.

From the results of the list of options 1919*a*-1919*h*, the process then proceeds to a step 1094*a*, where an "Analyze &/or Verify Collective Results" is performed. From step 1094*a* the process proceeds to a query 1039, which asks "Data/Input Reliability Ascertained, or Discerned/Perceived?" If the answer to the query 1039 is "Ascertained," the process then moves to a step 1040*a*, where a "Proceed with Rules & Instructions for "Data/Input Reliability is Sufficiently Ascertained" is performed. If the answer to the query 1039 is "No," the process then proceeds to a step 1040*b*, where a "Proceed with Rules, Instructions &/or Remedies for 'Reliability Discerned/Perceived Insufficient'" is performed. If the answer to the query 1039 is instead "Discerned/Perceived," the process then proceeds to a step 1041, where a "Proceed with Rules, Instructions &/or Remedies for 'Data/Input Reliability Discerned/Perceived'" is performed.

From steps 1040*a*, 1040*b* and 1041, the process then proceeds to a step 1042, where an "Automatically Pull &/or User Selected Data, Statistics, Support &/or Content For Review" is performed. From the step the 1042, the process then proceeds to a set of "Automatically Pull &/or User Selected Data, Statistics, Support &/or Content For Review" options. The options include: a "Reliability Score" option 1043, a "Quantifiable Score" option 1044, a "Fairness Score" option 1045, a "Likely Participation Score" option 1046, a "Risk/Wagering Balance Score" option 1047, an "Other Input &/or Scores" option 1048.

From the results options 1043-1048, the process then proceeds to a step 1094*b*, where an "Analyze &/or Verify Collective Results" is performed. From the step 1094*b*, the process proceeds to a query 1050, which asks "Any Threshold Score Concerns?" If the answer to the query 1050 is "Yes," the process then proceeds to a step 1051, where a "Proceed with Rules, Instructions &/or Remedies for 'Threshold Score Concerns'" is performed. If the answer to the query 1050 is instead "No," the process then proceeds to a step 1124*d*, where an "Save State/ID, Analyze Content for Any Changes, & Determined Risk/Wagering Balance & Per Input, Material Type(s), Any Changes Made, Terms & Rules" is performed.

From earlier mentioned step 1124*d*, the process proceeds to a query 1125*d*, which asks whether to "Search, Crawl, Interrogate, Pull, &/or Synch with Additional Sources?" or not. If the answer to query 1125*d* is "No," then the process proceeds to a step 1126*d*" where a "Proceed with Novelty Determination & Methodology For Comparing Data/Content To Existing Data/Content/Stats" is executed. Next, the process proceeds to a step 1127*d*. If the answer to query 1125*d*, is instead "Yes," then the process proceeds to a step 1128*d* where an "Analyze Content for What Additional Sources to Search, Crawl, Interrogate, Pull, &/or Synch With (e.g. How, How often, Where, When, etc.) & Perform Accordingly," is performed. From step 1128*d*, the process proceeds to a query 1129*d* which asks whether "New &/or Modified Relevant Content Found/Identified?" If the answer to query 1129*d* is "No," the process proceeds to a step 1145*d*, where a "Generate Appropriate Annotations, Markups, Comments, Time/Date-stamps &/or the like," is performed.

If the answer to query 1129*d*, is instead "Yes" the process proceeds to the step 1127*d*, where an "Analyze & Compare Content To Generate ID-ACERS Scores For Each I/O/PC, Element, Claim, Etc., Regarding Conception, Diligence, Publications, Offers To Sell/Import/Export/Sales, RTPs, Making, &/or Relative Overlap &/or Infringement Found/Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127*d*, the process proceeds the terminator 1145*d*, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, image, relationship, triple, RDF statement, and/or the like, relative to a prediction, predicted element, and/or the like. In various non-limiting embodiments, the analysis may include and/or incorporate filtering for, say, a subject, time of day, and/or the like. In various non-limiting embodiments, the analysis may also include a modification per a discernible set of data, statistics, and/or the like, factor relative to the prediction, prediction element, relationship, triple, statement, wager, balance, and/or the like.

In various non-limiting embodiments, the analysis of the discernible set of data, statistics, and/or the like, may include other predictions within that field of prediction, industry, art unit, and/or the like. In various non-limiting embodiments, the IPACE system searches to find similar words, sentence structures as a particular user types, publishes, search data, search patterns, mobile data, mobile data patterns, to determine the novelty and apply analysis and algorithms to the likelihood of predictions based on comparable data/statistics, comparable predictions accuracy, comparable prediction generated within the same domain; IP: including likelihood of patent grants, appeals, specific office action arguments, licensing deals, pre-litigation events: marksman, re-exam, settlement, summary judgment, declaratory judgment, invalidity, infringement, including any relevant and comparable data structure in websites, legal documents, case law, articles, blogs, inventions, applications, figures, sentences, and context along with the associated success rates for a particular patent family, inventor, entity, and/or the like. In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like.

Figure 68:
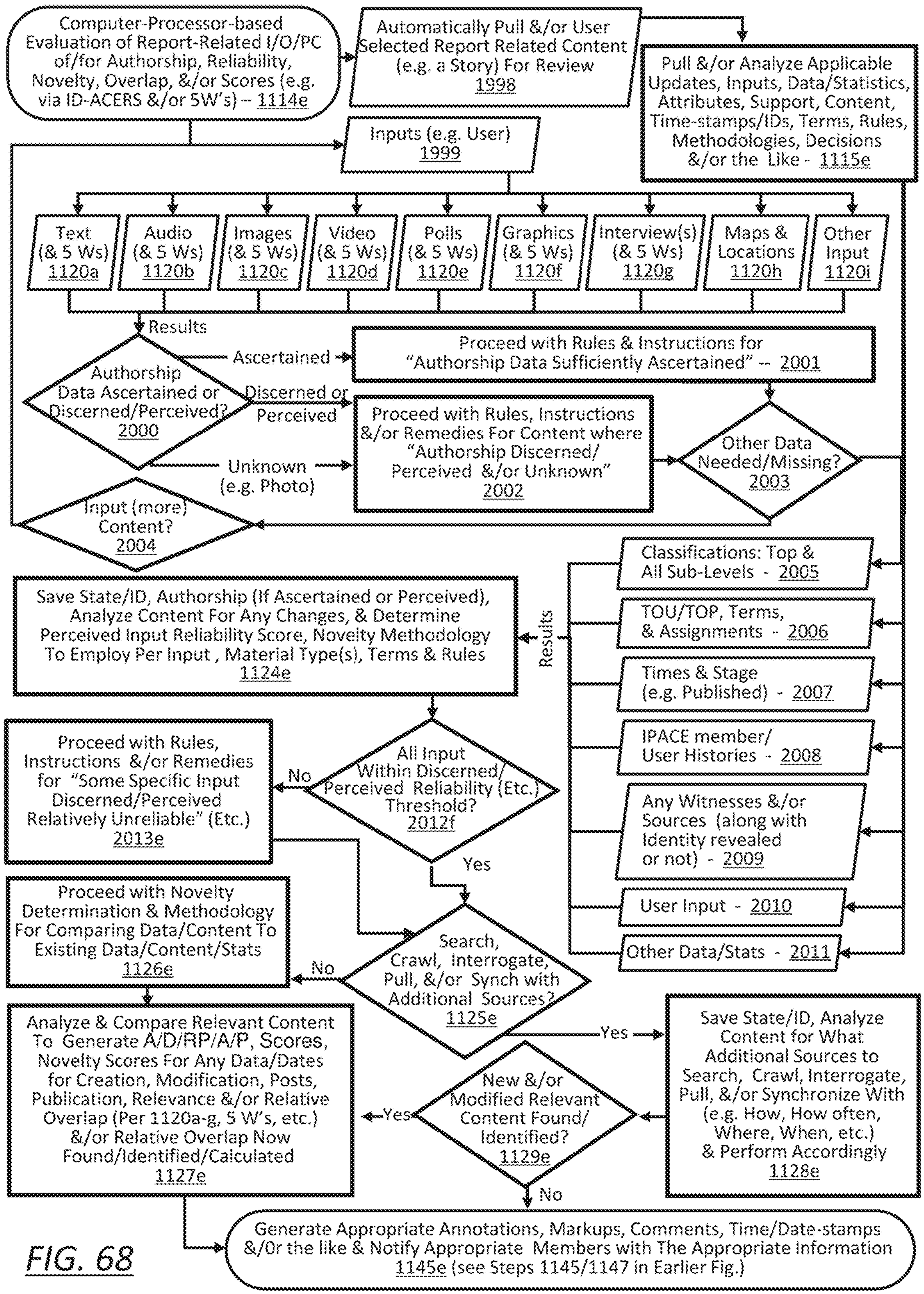
FIG. 68 is a flowchart that depicts a non-limiting embodiment and example of the IPACE system, and associated computer-implemented method for Determination of Report Related Data/content (e.g. a Story) for Copyright Related Data/content for Authorship, Reliability, Novelty and/or Overlap.

FIG. 68 is a flowchart that depicts an embodiment and example of the IPACE system, and associated computer-implemented method for Evaluation of Report-Related I/O/PC for Reliability, Novelty, Overlap, &/or Scores (e.g. via ID-ACERS &/or 5W's). Similar to previous figures, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, with/for any Report-Related components, elements, links, relations, novelty, overlap, &/or Scores (e.g. via ID-ACERS &/or 5W's).

In addition, where the non-ascertained, non-discerned, non-actor-stated, non-perceived, and/or the like data, is continually cycled for corrections, correlations, relations, links, and/or the like. Further, where the Non-Report—related content, may become, utilized, incorporated, as a source, resource, support, prior-art, reference, and/or the like for future I/O/PC novelty, originality, utility, and/or the like evaluations.

Starting with a start terminal 1114*e* for a "Computer-Processor-based Evaluation of Report-Related I/O/PC of/for Authorship, Reliability, Novelty, Overlap, &/or Scores (e.g. via ID-ACERS &/or 5W's)—where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a Report—related data/content, assessment, a report score, and/or the like, for such aspects, associations, and/or the like, a Novelty score, any overlap, a relative perceived Overlap score, &/or Scores (e.g. via ID-ACERS &/or 5W's) and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with and/or the like.

In various non-limiting embodiments, the IPACE system could interrogate data regarding any and/or the like, for any actor-stated, ascertained, discerned, relatively perceived, and/or predicted discrepancy, conflict, anomaly, and/or the like, based in part, on such elements as historical decisions, temporal data, similar time windows, similar cases, similar jurisdictions, similar fact evidence, similar participants, similar entities, similar decisions, and/or the like. In various non-limiting embodiments, there could be multiple entities tracked and interrogated for current definitions, discrepancies, anomalies, and/or the like.

In various non-limiting embodiments, the IPACE system could discern a definition for say, a discrepancy in the reporting of a particular incident or pattern of events, based in part on temporal data and/or the like, where a particular discerned definition could be automatically, systematically, continuously, persistently, conditionally, and/or actor/user-prompted/selected applied to a particular condition, project, entity, event, domain, history, decision, and/or the like. In various non-limiting embodiments, the particular discerned definition could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support. In various non-limiting embodiments, the Source/resource/Support would preferably comprise all publications, ontologies, lexicon, semantics, syntax, triple statements, definitions, rules, procedures, federations, nodes, classes, relationships, lines, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending articles, pending publications, published articles, published reports, financial news, economic events, world news, local news, sports, entertainment, consumer news, weather, intellectual property reports, patent prosecution data, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign publications, disclosures, products, applications, news, and/or the like (e.g. China, Japan, Korea, Germany, United Kingdom, France, Canada, Australia, and all other countries, and/or the like).

From terminal 1114*e*, if the process involves review existing content (e.g. without analyzing a user input) then the process proceeds next to a step 1998, where an "Automatically Pull &/or User Selected Report Related Content (e.g. a Story) For Review" is performed. From the step 1998, a "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," are performed in a step 1115*e*, where the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like.

From step 1115*e*, the process proceeds next to a set of "Pull (e.g. interrogate/collect/receive and/or the like) All Updated Applicable Inputs, Data, Statistics, Content, Source/Resource/Support, Time-stamps/IDs, Terms, Rules, Methodologies, Decisions &/or the Like," options. The options include: a "Classifications: Top & All Sub-Levels" option 2005, a "TOU/TOP, Terms, & Assignments" option 2006, a "Times & Stage (e.g. Published)" option 2007, an "IPACE member/User Histories" option 2008, an "Any Witnesses &/or Sources (along with Identity revealed or not)" option 2009, a "User Input" option 2010, an "Other Data/Stats" option 2011.

From the earlier terminal 1114*e*, if the process involves an input (e.g. from a user), then the process proceeds to a step 1999, where an "Inputs (e.g. User)" is performed. From the step 1999, the process then proceeds to a list of "Inputs (e.g. User)" options. The Input options including: a "Text (& 5 Ws)" option 1120*a*, an "Audio (& 5 Ws)" option 1120*b*, an "Images (& 5 Ws)" option 1120*c*, a "Video (& 5 Ws)" option 1120*d*, a "Polls (& 5 Ws)" option 1120*e*, a "Graphics (& 5 Ws)" option 1120*f*, an "Interview(s) (& 5 Ws)" option 1120*g*, a "Maps & Locations" option 1120*h*, and an "Other Input" option 1120*i*.

From the "results" from the Input Options 1120*a*-1120*i*, then proceed to a query 2000, which asks "Authorship Data Ascertained or Discerned/Perceived?" If the answer to the query 2000 is "Ascertained," the process then proceeds to a step 2001, where a "Proceed with Rules & Instructions for 'Authorship Data Sufficiently Ascertained'" is performed. If the answer to the query 2000 is "Discerned or Perceived," the process then proceeds to a step 2002, where a "Proceed with Rules, Instructions &/or RemedieContent where 'Authorship Discerned/Perceived &/or Unknown' is performed. If the answer to the query 2000 is instead "Unknown (e.g. Photo)," the process then proceeds to the step 2002. From steps 2001 and 2002, the process then proceeds to a query 2003, which asks "Other Data Needed/Missing?" From the query 2003, the process proceeds to a query 2004, which asks "Input (more) Content?" From the query 2004, the process loops back to the step 1999.

From the earlier mentioned query 2003, the process passes to options 2005-2011. From the "results" of options 2005-2011, the process proceeds to a step 1124*e*, where an "Save State/ID, Authorship (If Ascertained or Perceived), Analyze Content For Any Changes, & Determine Perceived Input Reliability Score, Novelty Methodology To Employ Per Input, Material Type(s), Terms & Rules Perceived Input Reliability Score, Novelty Methodology To Employ Per Input, Material Type(s), Terms & Rules" is performed. From the step 1124*e*, the process then proceeds to a query 2012*e*, which asks "All Input Within Discerned/Perceived Reliability (Etc.) Threshold?" If the answer to the query 2012*e* is "Yes," then the process proceeds to a query 1125*e*. If the answer to the query 2012*e* is instead "No," the process then proceeds to a step 2013*e*, where a "Proceed with Rules, Instructions &/or Remedies for 'Some Specific Input Discerned/Perceived Relatively Unreliable' (Etc.)" is performed.

From the step 2013*e*, the process then proceeds to a query 1125*e*, which asks whether to "Search, Crawl, Interrogate, Pull, &/or Synch with Additional Sources?" or not. If the answer to query 1125*e* is "No," then the process proceeds to a step 1126*e*" where a "Proceed with Novelty Determination & Methodology For Comparing Data/Content To Existing Data/Content/Stats" is executed. Next, the process proceeds to a step 1127*e*.

If the answer to query 1125*e*, is instead "Yes," then the process proceeds to a step 1128*e* where an "Analyze Content for What Additional Sources to Search, Crawl, Interrogate, Pull, &/or Synch With (e.g. How, How often, Where, When, etc.) & Perform Accordingly," is performed. From step 1128*e*, the process proceeds to a query 1129*e* which asks whether "New &/or Modified Relevant Content Found/Identified?" If the answer to query 1129*e* is "No," the process proceeds to a step 1145*e*, where a "Generate Appropriate Annotations, Markups, Comments, Time/Date-stamps &/or the like," is performed.

If the answer to query 1129*e*, is instead "Yes" the process proceeds to the step 1127*e*, where an "Analyze & Compare Relevant Content To Generate A/D/RP/A/P, Scores, Novelty Scores For Any Data/Dates for Creation, Modification, Posts, Publication, Relevance &/or Relative Overlap (Per 1120*a-g*, 5 W's, etc.) &/or Relative Overlap Now Found/Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127*e*, the process proceeds the terminator 1145*e*, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, inventor club, and/or the like. In various non-limiting embodiments, the analysis may also include a novelty per a discernible set of data, statistics, and/or the like, factor. In various non-limiting embodiments, the analysis of the discernible set of data, statistics, and/or the like, may include other inventions within that field of invention, industry, art unit, and/or the like. In various non-limiting embodiments, the IPACE system searches to find similar words, sentence structures as a particular user types, to determine the novelty and apply analysis and algorithms to the likelihood of patentability based on comparable data/statistics, comparable patents denied, comparable patent granted within the same field, art unit, and/or outside, including any relevant and comparable data structure in figures, sentences, and context along with the associated success rates for grant versus examiner (66) challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. The variety of data/content may comprise such items as a publication, report, story, reporter, source, application, specification, written description, abstract, claim, figure, publications (e.g. patents, inventions, claims, figures, written descriptions), blogs, websites, white papers, speeches, recorded events, and/or the like, worldwide with translations, if necessary); figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); audio, video, and/or the like (e.g. with speech to text conversions, and image, facial, scene, and/or the like); and/or the like.

Retaining Data/Content as Trade Secrets

In various non-limiting embodiments, the IPACE system gives selective members visible access to pending or internally published materials, including articles, reports, financial news, economic events, world news, local news, sports, entertainment, consumer news, weather, intellectual property reports, current/history, sources, witnesses, unsubstantiated reports, current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign publications, disclosures, products, news, and/or the like (e.g. China, Japan, Korea, Germany, United Kingdom, France, Canada, Australia, and all other countries, and/or the like) and/or the like, where these members may selectively withdraw data/content, elements, sources, witnesses, attributions, and/or the like (e.g. to shield, protect a source, witness, etc.), say prior to a public disclosure, publication, and/or the like. For example, the IPACE system would preferably highlight data/content perceived as revealing sources, where the IPACE system analysis may generate a score for a perceived benefit and/or liability in revealing such source, as well as a A/D/RP/S/P veracity score of the source. For instance, some sources may be perceived relatively more reliable, quotable, dependable, and/or the like to a particular audience or domain, say relatively regarding financial news verse sports, or liberal verses conservative, where regression analysis would reveal an audience bias towards particular sources relative to, say demographic of the source, an audience member, an audience segment, and/or the like.

Figure 69:
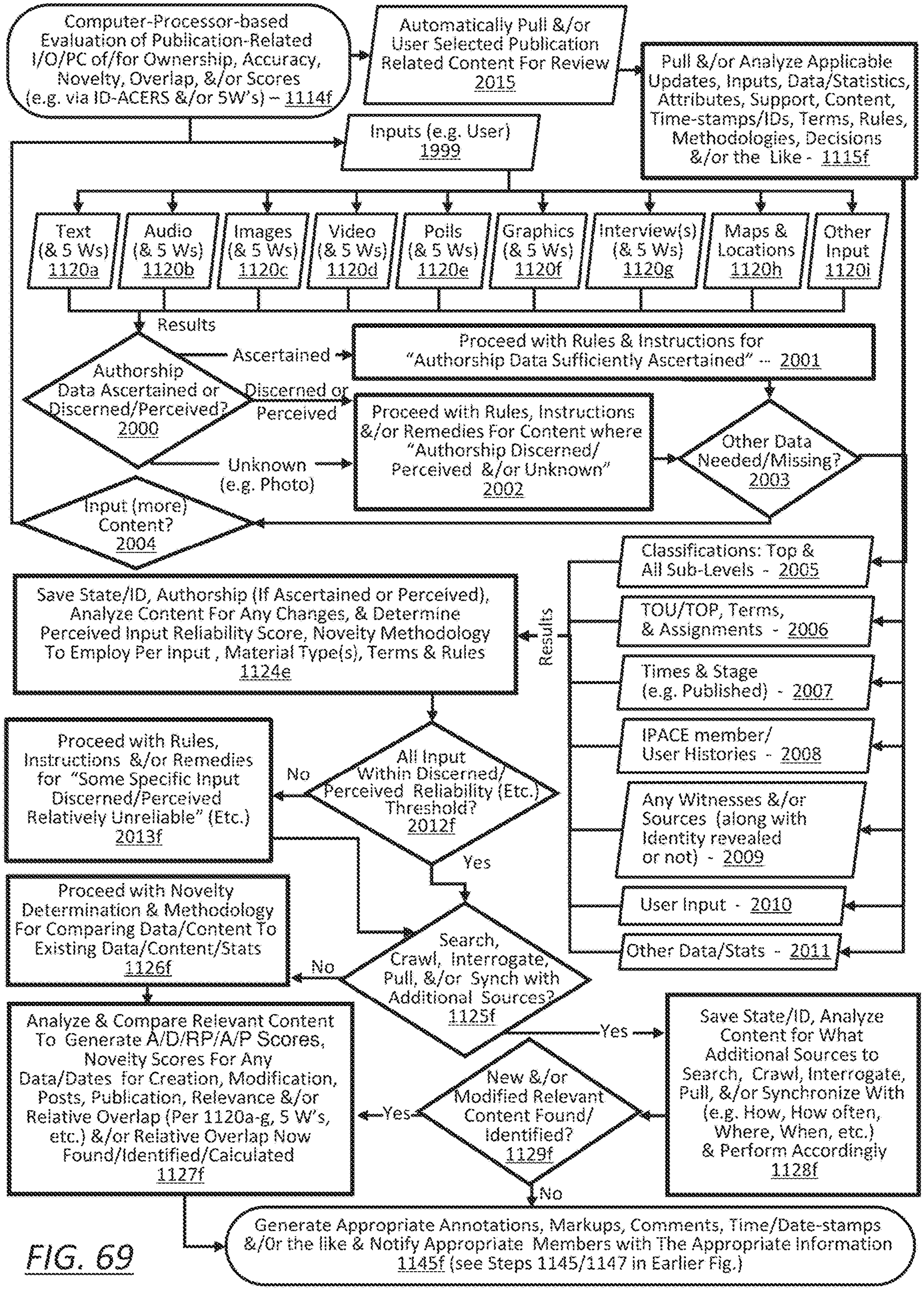
FIG. 69 is a flowchart that depicts a non-limiting embodiment and example of the IPACE system, and associated computer-implemented method for Determination of Publication Related Data/content (e.g. a Story) for Ownership, Accuracy, Demand, Novelty and/or Overlap.

FIG. 69 is a flowchart that depicts an embodiment and example of the IPACE system, and associated computer-implemented method for Evaluation of Publication-Related I/O/PC for Reliability, Novelty Overlap,&/or Scores (e.g. via ID-ACERS &/or 5W's). Similar to previous figures, the IPACE system via the computer processor, associated subsystems (e.g. via AIS, ID-ACERS, Knowledge Base Mgmt., CREATE, METER, TIMES, FINANCIALS, etc.) and associated computer-implemented methods method for Computer-Processor-based analysis, interrogation, extraction, evaluation and/or the like of I/O/PC, with/for any Publication-related components, elements, links, relations, novelty, overlap, &/or Scores (e.g. via ID-ACERS &/or 5W's). In addition, where the non-ascertained, non-discerned, non-actor-stated, non-perceived, and/or the like data, is continually cycled for corrections, correlations, relations, links, and/or the like. Further, where the Non-Publication-related content, may become, utilized, incorporated, as a source, resource, support, prior-art, reference, and/or the like for future I/O/PC novelty, originality, utility, and/or the like evaluations.

Starting with a start terminal 1114*f* for a "Computer-Processor-based Evaluation of Publication-Related I/O/PC of/for Ownership, Accuracy, Novelty, Overlap, &/or Scores (e.g. via ID-ACERS &/or 5W's)" where the IPACE system via the computer processor, associated subsystems, and the associated computer implemented methods, automatically, systematically, continuously, persistently, conditionally, and/or actor/user-prompted/selected monitors, interrogates, analyzes, compares, synchronizes data, and/or the like, for determining data, content, data attributes, associations, and the like, relative to a Publication-related I/O/PC, assessment, a publication score, and/or the like, for such aspects, associations, and/or the like, as authorship, copyright ownership, credits, a Novelty score, any overlap, a relative perceived Overlap score, &/or Scores (e.g. via ID-ACERS &/or 5W's). and/or the like. In various non-limiting embodiments, the IPACE system via the computer processor, associated subsystems (e.g. via AIS, ID-ACERS, Knowledge Base Mgmt., CREATE, METER, TIMES, FINANCIALS, etc.) and associated computer-implemented methods would preferably automatically, systematically, continuously, persistently, conditionally, and/or actor/user-prompted/selected monitor, interrogate, analyze, compare, synchronize, and/or the like, any and all data associated with and/or the like.

In various non-limiting embodiments, the IPACE system could interrogate data regarding any publication, report, story, reporter, source, and/or the like, for any actor-stated, ascertained, discerned, relatively perceived, and/or predicted discrepancy, conflict, anomaly, and/or the like, for say, a discrepancy in an attributable source, or the time of an event, where the IPACE system could discern and alert for such discrepancies, offer resolutions and/or the like, based in part, on such elements as historical decisions, temporal data, similar time windows, similar situations, sources, events, deadline, domains, cases, similar jurisdictions, similar fact evidence, similar participants, similar entities, similar decisions, and/or the like. In various non-limiting embodiments, there could be multiple entities, sources, witnesses, and/or the like, tracked and interrogated for current definitions, discrepancies, anomalies, and/or the like. In various non-limiting embodiments, the IPACE system could generate a perceived prediction for a discrepancy, delay, missing credit, missed deadline, and/or the like, where the prediction compare utilized for determining liability verses relative progress, credit, success, and/or the like.

In various non-limiting embodiments, the IPACE system could discern a definition for say, a discrepancy in a particular pattern of events, or a plurality of witnesses to an event, based in part on a regression analysis, temporal data and/or the like, where a particular discerned definition or discrepancy could be automatically, systematically, continuously, persistently, and/or conditionally monitored, sourced, interrogated, and/or actor/user-prompted/selected as to how to apply a particular condition, project, entity, event, domain, history, decision, and/or the like; for monitoring, sourcing, interrogating, and/or the like. In various non-limiting embodiments, the particular discerned assertions, sources, witnesses, stories, reports, definition, and/or the like; could be automatically, systematically, continuously, persistently, conditionally, and/or actor/user-prompted/selected acknowledge, modified, commented, challenged, contested, overridden, appealed, supported, objected to, and/or the like.

In various non-limiting embodiments, the IPACE system would preferably maintain any and all necessary, suitable, appropriate, reasonable, requested, required, available, current, historical, updates, and/or the like for Support. In various non-limiting embodiments, the Source/resource/ Support would preferably comprise all publications, ontologies, lexicon, semantics, syntax, triple statements, definitions, rules, procedures, federations, nodes, classes, relationships, lines, and/or the like.

In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, regarding, for and/or the like, pending articles, pending publications, published articles, published reports, financial news, economic events, world news, local news, sports, entertainment, consumer news, weather, intellectual property reports, patent prosecution data, pending appeals, pending applications, file wrappers, prosecution current/history, licensing current/history, litigation current/history, settlements current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/ Support, and/or the like, for foreign publications, disclosures, products, applications, news, and/or the like (e.g. China, Japan, Korea, Germany, United Kingdom, France, Canada, Australia, and all other countries, and/or the like).

Referring back to the FIG. 69, from terminal 1114*f*, if the process involves review existing content (e.g. without analyzing a user input) then the process proceeds next to a step 2015, where an "Automatically Pull &/or User Selected Publication Related Content For Review" is performed. From the step 2015, a "Pull (e.g. interrogate/collect/receive and/or the like) All Updated Applicable Inputs, Data, Statistics, Content, Source/Resource/Support, Time-stamps/ IDs, Terms, Rules, Methodologies, Decisions &/or the Like," are performed in a step 1115*f*, where the IPACE system automatically, systematically, continuously, persistently, conditionally, and/or actor/user-prompted/selected pulls, interrogates, selects, receives, synchronizes, and/or the like, the necessary, appropriated, available, suitable, designated, operational, verified, authenticated, approved, conditional, and/or the like data, Inputs, Statistics, Content, Time-Stamps/IDs, Supporting Materials, Associated data, and/or the like; along with any Terms (e.g. TOU/TOPs) Rules, Methodologies, Decisions, and/or the like. From step 1115*f*, the process proceeds next to a list of options including: a "Classifications: Top & All Sub-Levels" option 2005, a "TOU/TOP, Terms, & Assignments" option 2006, a "Times & Stage (e.g. Published)" option 2007, an "IPACE member/User Histories" option 2008, an "Any Witnesses &/or Sources (along with Identity revealed or not)" option 2009, a "User Input" option 2010, and an "Other Data/Stats" option 2011.

From the earlier terminal 1114*f*, if the process involves an input (e.g. from a user), then the process proceeds to a step 1999, where an "Inputs (e.g. User)" is performed. From the step 1999, the process then proceeds to a list of options including: a "Text (& 5 Ws)" option 1120*a*, an "Audio (& 5 Ws)" option 1120*b*, an "Images (& 5 Ws)" option 1120*c*, a "Video (& 5 Ws)" option 1120*d*, a "Polls (& 5 Ws)" option 1120*e*, a "Graphics (& 5 Ws)" option 1120*f*, an "Interview(s) (& 5 Ws)" option 1120*g*, a "Maps & Locations" option 1120*h*, and an "Other Input" option 1120*i*.

From the "results" of the list of options 1120*a*-1120*i*, the process then proceeds to a query 2000, which asks "Authorship Data Ascertained or Discerned/Perceived?" If the answer to the query 2000 is "Ascertained," the process then proceeds to a step 2001, where a "Proceed with Rules & Instructions for 'Authorship Data Sufficiently Ascertained'" is performed. If the answer to the query 2000 is "Discerned or Perceived," the process then proceeds to a step 2002, where a "Proceed with Rules, Instructions &/or Remedies For Content where 'Authorship Discerned/Perceived &/or Unknown'" is performed. If the answer to the query 2000 is instead "Unknown (e.g. Photo)," the process then proceeds to the step 2002. From steps 2001 and 2002, the process then proceeds to a query 2003, which asks "Other Data Needed/ Missing?" From the query 2003, the process proceeds to a query 2004, which asks "Input (more) Content?" From the query 2004, the process loops back to the step 1999.

From the earlier mentioned query 2003, the process passes to a list of options 2005-2011. From the "results" of the list of options 2005-2011, the process proceeds to a step 1124*f*, where an "Save State/ID, Authorship (If Ascertained or Perceived), Analyze Content For Any Changes, & Determine Perceived Input Reliability Score, Novelty Methodology To Employ Per Input, Material Type(s), Terms & Rules" is performed. From the step 1124*f*, the process then proceeds to a query 2012*f*, which asks "All Input Within Discerned/Perceived Reliability (Etc.) Threshold?" If the answer to the query 2012*f* is "Yes," then the process proceeds to a query 1125*f*. If the answer to the query 2012*f* is instead "No," the process then proceeds to a step 2013*f*, where a "Proceed with Rules, Instructions &/or Remedies for 'Some Specific Input Discerned/Perceived Relatively Unreliable' (Etc.)" is performed.

From the step 2013*f*, the process then proceeds to the query 1125*f*, which asks whether to "Search, Crawl, Interrogate, Pull, &/or Synch with Additional Sources?" or not. If the answer to query 1125*f* is "No," then the process proceeds to a step 1126*f* where a "Proceed with Novelty Determination & Methodology For Comparing Data/Content To Existing Data/Content/Stats" is executed. Next, the process proceeds to a step 1127*f*.

If the answer to query 1125*f*, is instead "Yes," then the process proceeds to a step 1128*f* where an "Analyze Content for What Additional Sources to Search, Crawl, Interrogate, Pull, &/or Synch With (e.g. How, How often, Where, When, etc.) & Perform Accordingly," is performed. From step 1128*f*, the process proceeds to a query 1129*f* which asks whether "New &/or Modified Relevant Content Found/Identified?" If the answer to query 1129*f* is "No," the process proceeds to a step 1145*f*, where a "Generate Appropriate Annotations, Markups, Comments, Time/Date-stamps &/or the like," is performed.

If the answer to query 1129*f*, is instead "Yes" the process proceeds to the step 1127*f*, where an "Analyze & Compare Content To Generate ID-ACERS Scores For Each I/O/PC, Element, Claim, Etc., Regarding Conception, Diligence, Publications, Offers To Sell/Import/Export/Sales, RTPs, Making, &/or Relative Overlap &/or Infringement Found/Identified/Calculated," is executed. In various non-limiting embodiments, the Predicted, Actor-Stated, Perceived, Discerned, Ascertained Scores, associated relationships, correlations, data, values, rules, meta data, and/or the like, may be conditional, contingent, temporary, and/or the like. In various non-limiting embodiments, the Ascertained Score is the preferred score over the Discerned Score, followed by the Perceived Score.

In various non-limiting embodiments, the Perceived Score would preferably be expressed as a relatively Perceived Score by the IPACE system, a particular actor, a particular entity, a particular person, an actor, user, a member, a group, a segment, and/or the like, and/or some combination, collection, variation, permutation, segmentation, partition, and/or the like of these. In various non-limiting embodiments, there may be more than one perceptions and/or relative perceptions co-existing, say where there is a first perception by or based in part by the IPACE system analysis, a second perception by or based in part by a particular subsystem (e.g. AIS 195), a third perception by or based in part by a particular user, a fourth perception by or based in part by another particular user, and/or the like.

In various non-limiting embodiments, perceptions, relative perceptions, perception relationships and/or the like, may be conditional, contingent, temporary, and/or the like; where for instances, a particular event, milestone, goal, budget, temporal, deadline, accomplishment, funding-level, pay-out, agreement, acknowledgment, verification, validation, authentication, reality, actuality, score, threshold, participant, and/or the like, and/or some combination, collection, variation, permutation, segmentation, partition, and/or the like of these, may be required to increase/decrease a particular Perceived Score, fitness criteria, threshold, associated relationships, correlations, data, values, rules, meta data, and/or the like, may be conditional, contingent, temporary, and/or the like. From step 1127*f*, the process proceeds the terminator 1145*f*, where the "Generate Appropriate Annotations, Markups, Comments, Time/Date-stamps &/or the like," is performed.

In various non-limiting embodiments, the data from the output options are persistently, systematically, conditionally, and/or actor/user-prompt continually monitor, cycle, and/or the like, for any new, modified, requested, and/or the like I/O/PC (e.g. via the METER), data, interrogation results, views, notifications, acknowledgements, modifications, (e.g. changes to any I/O/PC data, data, meta data, relationships, correlations, goals, publications, domains/art-units, the overlap, the fitness criteria, thresholds, conditions, rules, values, variables, formulas, statistics, comparison pools, segments, users, members, roles, participants, status, challenges, novelty, employment status, entity status, TOU/TOP, validations, verifications, predictions, analysis, evaluations, criteria, perceptions, and/or the like.

Novelty Monitoring and Knowledge Management

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, inventor club, and/or the like. In various non-limiting embodiments, the analysis may also include a novelty per a discernible set of data, statistics, and/or the like, factor. In various non-limiting embodiments, the analysis of the discernible set of data, statistics, and/or the like, may include other inventions within that field of invention, industry, art unit, and/or the like. In various non-limiting embodiments, the IPACE system searches to find similar words, sentence structures as a particular user types, to determine the novelty and apply analysis and algorithms to the likelihood of patentability based on comparable data/statistics, comparable patents denied, comparable patent granted within the same field, art unit, and/or outside, including any relevant and comparable data structure in figures, sentences, and context along with the associated success rates for grant versus examiner (66) challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. The variety of data/content may comprise such items as a publication, report, story, reporter, source, application, specification, written description, abstract, claim, figure, publications (e.g. patents, inventions, claims, figures, written descriptions), blogs, websites, white papers, speeches, recorded events, and/or the like, worldwide with translations, if necessary); figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); audio, video, and/or the like (e.g. with speech to text conversions, and image, facial, scene, and/or the like); and/or the like.

Retaining Data/Content as Trade Secrets

In various non-limiting embodiments, the IPACE system gives selective members visible access to pending or internally published materials, including articles, reports, financial news, economic events, world news, local news, sports, entertainment, consumer news, weather, intellectual property reports, current/history, sources, witnesses, unsubstantiated reports, current/history, publication current/history, and/or the like. In various non-limiting embodiments, the IPACE system would preferably, similarly, and additionally, maintain any and all necessary, suitable, appropriate, available, current, historical, updates, definitions, rules, procedures, manuals, Source/Resource/Support, and/or the like, for foreign publications, disclosures, products, news, and/or the like (e.g. China, Japan, Korea, Germany, United Kingdom, France, Canada, Australia, and all other countries, and/or the like) and/or the like, where these members may selectively withdraw data/content, elements, sources, witnesses, attributions, and/or the like (e.g. to shield, protect a source, witness, etc.), say prior to a public disclosure, publication, and/or the like. For example, the IPACE system would preferably highlight data/content perceived as revealing sources, where the IPACE system analysis may generate a score for a perceived benefit and/or liability in revealing such source, as well as a A/D/RP/S/P veracity score of the source. For instance, some sources may be perceived relatively more reliable, quotable, dependable, and/or the like to a particular audience or domain, say relatively regarding financial news verse sports, or liberal verses conservative, where regression analysis would reveal an audience bias towards particular sources relative to, say demographic of the source, an audience member, an audience segment, and/or the like.

FIG. 70*a* is a table (continued on 70*b*) that depicts a non-limiting embodiment and example of the IPACE-Hub100, system for extracting, classifying, mapping, electronically storing, tracking, and analyzing the relative novelty and correlations, relationships, and/or the like of data/content associated with a story, report, publication, consumer, prediction, and/or the like, and a plurality of events (e.g. a list of the most popular news events). FIG. 71 is a table (also split between FIG. 71*a* and continued on FIG. 71*b*) that depicts another embodiment and example of the IPACE-Hub100, system for storing and tracking components and relationships associated with a plurality of stories comprising different sub-states.

Figure 72:
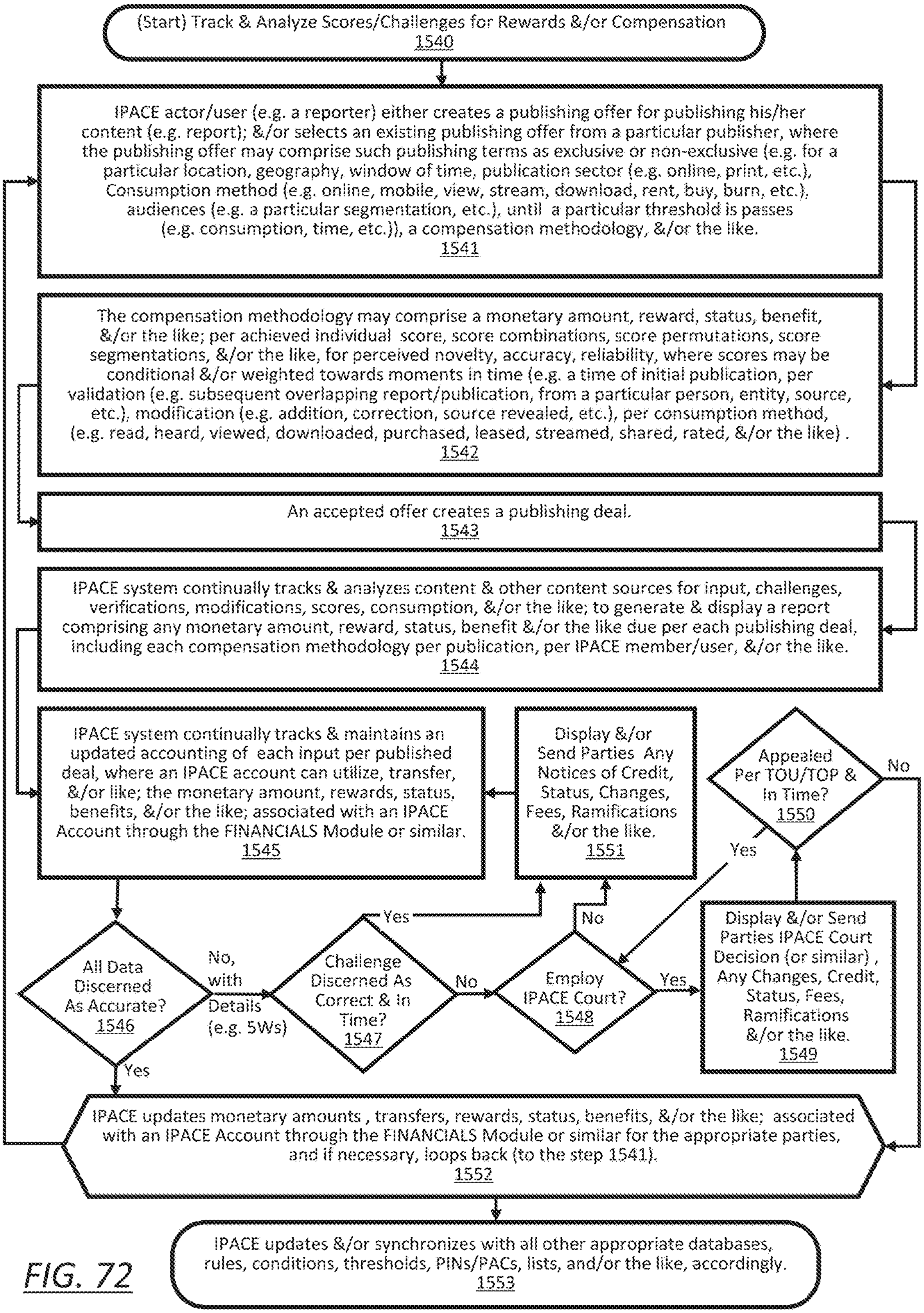
FIG. 72 is a flowchart that depicts a non-limiting embodiment and example of the IPACE system, and associated computer-implemented method for extracting, classifying, mapping, electronically storing, tracking, and analyzing Score/Challenges for Rewards and/or Compensation.

FIG. 72 is a flowchart that depicts an embodiment and example of the IPACE system, and associated computer-implemented method for extracting, classifying, mapping, electronically storing, tracking, and analyzing Score/Challenges for Rewards and/or Compensation. Starting with a terminator 1540 where an "(Start) Track & Analyze Scores/Challenges for Rewards &/or Compensation" is performed. The process then proceeds to a step 1541 where an "IPACE actor/user (e.g. a reporter) either creates a publishing offer for publishing his/her content (e.g. report); &/or selects an existing publishing offer from a particular publisher, where the publishing offer may comprise such publishing terms as exclusive or non-exclusive (e.g. for a particular location, geography, window of time, publication sector (e.g. online, print, etc.), Consumption method (e.g. online, mobile, view, stream, download, rent, buy, burn, etc.), audiences (e.g. a particular segmentation, etc.), until a particular threshold is passes (e.g. consumption, time, etc.)), a compensation methodology, &/or the like" is performed.

The process then proceeds to a step 1542 where "the compensation methodology may comprise a monetary amount, reward, status, benefit, &/or the like; per achieved individual score, score combinations, score permutations, score segmentations, &/or the like, for perceived novelty, accuracy, reliability, where scores may be conditional &/or weighted towards moments in time (e.g. a time of initial publication, per validation (e.g. subsequent overlapping report/publication, from a particular person, entity, source, etc.), modification (e.g. addition, correction, source revealed, etc.), per consumption method, (e.g. read, heard, viewed, downloaded, purchased, leased, streamed, shared, rated, &/or the like)" is performed.

The process then proceeds to a step 1543 where "An accepted offer creates a publishing deal" is performed. The process then proceeds to a step 1544 where an "IPACE system continually tracks & analyzes content & other content sources for input, challenges, verifications, modifications, scores, consumption, &/or the like; to generate & display a report comprising any monetary amount, reward, status, benefit &/or the like due per each publishing deal, including each compensation methodology per publication, per IPACE member/user, &/or the like" is performed. The process then proceeds to a step 1545 where an IPACE system continually tracks & maintains an updated accounting of each input per published deal, where an IPACE account can utilize, transfer, &/or like; the monetary amount, rewards, status, benefits, &/or the like; associated with an IPACE Account through the FINANCIALS Module or similar" is performed.

From step 1545, a query 1546 asks whether "All Data Discerned As Accurate?" If the answer to query 1546 is "Yes" then the process proceeds to a multi-function-step 1552. If the answer to query 1546 is instead "No, with Details (e.g. 5Ws)," then the process proceeds to a query 1547. Here, a query 1547 asks whether a "Challenge [is] Discerned As Correct & In Time?" If the answer to the query 1547 is "Yes," then the process proceeds to a step 1551 where a "Display &/or Send Parties Any Notices of Credit, Status, Changes, Fees, Ramifications &/or the like," is performed.

If the answer to query 1547 is instead "No," then the process proceeds to a query 1548, where the query asks whether to "Employ IPACE Court?" If the answer to query 1548 is "Yes," then the process proceeds to the step 1551. If the answer to query 1548 is instead "No," then the process proceeds to a step 1549 where a "Display &/or Send Parties IPACE Court Decision (or similar), Any Changes, Credit, Status, Fees, Ramifications &/or the like" is performed.

From step 1549, the process proceeds to a query 1550 which asks whether the decision was "Appealed Per TOU/TOP & In Time?" If the answer to the query 1550 is "Yes," then the process proceeds back to the query 1548. If the answer to the query 1550 is instead "No," then the process proceeds to the multi-function-step 1552 where an "IPACE updates monetary amounts, transfers, rewards, status, benefits, &/or the like; associated with an IPACE Account through the FINANCIALS Module or similar for the appropriate parties, and if necessary, loops back (to the step 1541)" is performed. Depending on the data collected, updates discerned/perceived, scores, rules and/or conditions received and/or performed in the multi-function-step 1552, the process may automatically, systematically, continuously, persistently, conditionally, and/or via/per actor/user-prompt cycle/loop back to the step 1541, and/or the method and associated data proceeds to a terminator 1553 where an "IPACE Updates &/or synchronizes with all other databases, rules, conditions, thresholds, PINS/PACs, lists, and or the like, accordingly" is executed.

Figure 73:
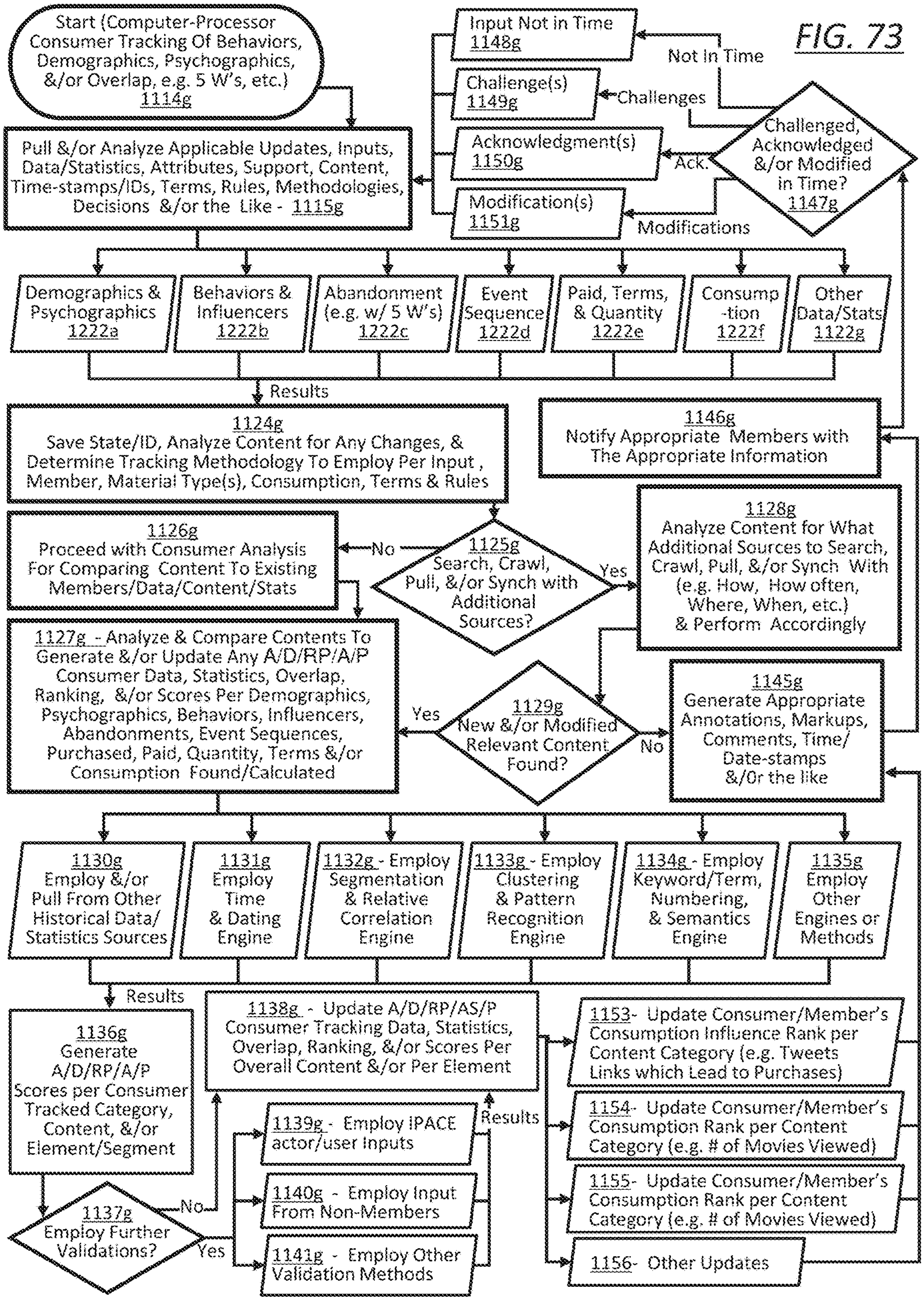
FIG. 73 is a flowchart that depicts a non-limiting embodiment and example of the IPACE system, and associated computer-implemented method for Tracking Consumer Behaviors, Demographics, Psychographics, and And/or Overlap.

FIG. 73 is a flowchart that depicts an embodiment and example of the IPACE system, and associated computer-implemented method for Tracking Consumer Behaviors, Demographics, Psychographics, And/or Overlap. The process begins with a terminator 1114*g*, where a "Start (Computer Implemented Consumer Tracking Of Behaviors, Demographics, Psychographics, &/or Overlap, e.g. 5 Ws, etc.)" is executed. From the terminator 1114*g* the process proceeds to a step 1115*g*, where a "Pull All Updated Applicable Inputs, Data, Statistics, Content, Time stamps/IDs, Terms, Rules, Methodologies, Decisions &/or the Like" is performed. From the step 1115*g* the process proceeds to a list of options, comprising a "Demographics & Psychographics" option 1222*a*, a "Behaviors & Influencers" option 1222*b*, an "Abandonment (e.g. w/5 W's) option 1222*c*, an "Event Sequence" option 1222*d*, a "Paid, Terms, & Quantity" option 1222*e*, a "Consumption" option 1222*f*, and an "Other Data/Stats" option 1122*g*.

In various non-limiting embodiment, the IPACE system and associated computer-implemented methods would preferably track a variety of user behaviors, devices, inputs, consumption, usage patterns and/or the like. Further, wherein the usage patterns from a plurality of inputs from an at least one node (e.g. a computer, mobile device, etc.) would preferably be persistently monitored, crawl, extract, index, classify, track, interrogated and/or the like by the system (also see FIG. 12*m*).

Returning to the Figs, from options 1222*a*-1222*g*, the process proceed to a step 1124*g*, where a "Save State ID, Analyze Content for Any Changes, & Determine Tracking Methodology To Employ Per Input, Member, Material Type (s), Consumption, Terms & Rules" is performed. From the step 1124*g*, the process proceeds to a query 1125*g*, which asks whether to "Search, Crawl, Pull, &/or Synch with Additional Sources?" If the answer to the query 1125*g* is "No," the process then proceeds to a step 1126*g*, where a "Proceed with Consumer Analysis For Comparing Content To Existing Members/Data/Content/Stats" is performed. From the step 1126*g*, the process then proceeds to a step 1127*g*, where an "Analyze & Compare Contents To Generate &/or Update Any A/D/RP/A/P Consumer Data, Statistics, Overlap, Ranking, &/or Scores Per Demographics, Psychographics, Behaviors, Influencers, Abandonments, Event Sequences, Purchased, Paid, Quantity, Terms &/or Consumption Found/Calculated" is performed. If the answer to the query 1125*g* is instead "Yes," the process proceeds to a step 1128*g*, where an "Analyze Content for What Additional Sources to Search, Crawl, Pull, &/or Synch With (e.g. How, How often, Where, When, etc.) & Perform Accordingly" is performed.

From the step 1128*g*, the process proceeds to a query 1129*g*, which asks "New &/or Modified Relevant Content Found?" If the answer to the query 1129*g* is "No," the process then proceeds to a step 1145*g*, where a "Generate Appropriate Annotations, Markups, Comments, Time/Date stamps &/or the like" is performed. If the answer to the query 1129*g* is instead "Yes," the process then proceeds to the step 1127*g*. From the step 1127*g*, the process then proceeds to a set of "Analyze & Compare Contents To Generate &/or Update Any A/D/RP/A/P Consumer Data, Statistics, Overlap, Ranking, &/or Scores Per Demographics, Psychographics, Behaviors, Influencers, Abandonments, Event Sequences, Purchased, Paid, Quantity, Terms &/or Consumption Found/Calculated" options. The options include: an "Employ &/or Pull From Other Historical Data/Statistics Sources" option 1130*g*, an "Employ Keyword/Term, Numbering, & Semantics Engine" option 1131*g*, an "Employ Time & Dating Engine" option 1132*g*, an "Employ &/or Pull From Other Historical Data/Statistics Sources" option 1133*g*, an "Employ Other Engines or Methods" option 1134*g*, an "Employ Clustering & Pattern Recognition Engine" option 1135*g*.

In various non-limiting embodiment (similarly to the above mentioned methods for options 1222*a*-1222*g*) the IPACE system and associated computer-implemented methods would preferably employ a variety of system engines and modules to facilitate the collecting, extracting, indexing, classifying, parsing, triple assessments, triple testing and/or the like. From the list of options, the IPACE system would preferably classify a first usage pattern from a plurality of inputs from an at least one node (e.g. a computer, mobile device, etc.); wherein the first usage pattern is stored as a first stored usage pattern; monitoring the plurality of inputs of the at least one node; determining, if a second usage pattern of the at least one node meets a stored relationship policy in relationship with the first stored usage pattern; and generating and transmitting an event in accordance with the determination of the stored relationship policy. Further, wherein the first usage pattern from the plurality of inputs from the at least one node (e.g. a computer, mobile device, etc.) would preferably be persistently monitored, crawl, extract, index, classify, track, interrogated and/or the like by the system.

In various non-limiting embodiment, the classifications of the first usage pattern from the plurality of inputs from the at least one node (e.g. a computer, mobile device, etc.) would preferably generate a plurality of semantic triples to store in a triple store. Further, wherein the triple store would preferably by evaluated to A/D/RP/S/P the relatively likelihood that a particular element from the option list is satisfied (e.g. from the Employ &/or Pull From Other Historical Data/Statistics Sources—related data/triples, Employ Keyword/Term, Numbering, & Semantics Engine—related data/triples, Employ Time & Dating Engine—related data/triples, Employ &/or Pull From Other Historical Data/Statistics Sources—related data/triples, and employ Other Engines or Methods-related data/triples options). For instance, the relative perception or discernment of a particular word meaning per the Semantics Engine portion of 1134*g*. In various non-limiting embodiment, the ID-ACERS would persistently validate any data according to A/D/RP/A/P scores and policy.

In various non-limiting embodiment, the stored relationship policy in relationship with the first stored usage pattern is affected by an input from the group comprising the plurality of inputs from the at least one node, a plurality of inputs from a plurality of nodes, a plurality of inputs from a predefined group of nodes, a plurality of inputs from a predefined segmentation of nodes (e.g. via RDF triples), some combinations of these inputs, or some permutation of these inputs. In various non-limiting embodiment, all relationships could be parsed into triples and evaluated by the ID-ACERS.

In various non-limiting embodiment (as described with FIG. 12*b*, FIG. 12*m*), the ID-ACERS of the IPACE system, evaluates a first profile associated with a node (e.g. computer, mobile device) to isolate a missing attribute; generates the list of prioritized sources to retrieve the missing attribute, based upon the prior success of retrieving the missing attribute for the second profile; interrogating the list of prioritized sources to collect and electronically store the missing attribute, wherein the missing attribute becomes the collected attribute; evaluating the collected attribute according to the criteria to determine the value, in terms of the value (also relationship/triple/meaning/statement/assignment) being ascertained, discerned, relatively perceived, stated (e.g. by a user/source), predicted value, or previous value/relationship; based upon the criteria for each, wherein the IPACE system persistently attempts to test and validate the scoring/values/relationships per value/relationship/triple/meaning/statement/assignment per source and collectively for the IPACE. In addition, the values/relationships/triples/meanings/statements/assignments being ascertained, discerned, relatively perceived, stated (e.g. by a user/source), and/or the like can be compared with a previously predicted value, or previous A/D/RP/S value/relationship/triple/meaning/statement/assignment per source and collectively for the IPACE.

Returning to the FIG. 73, the results of options 1130*g*-1135*g*, then proceed to a step 1136*g*, where a "Generate A/D/RP/A/P Scores per Consumer Tracked Category, Content, &/or Element/Segment" is performed (see above). From the step 1136*g*, the process then proceeds to a query 1137*g*, which asks "Employ Further Validations?" If the answer to the query 1137*g* is "No," the process then proceeds to a step 1138*g*, where an "Update A/D/RP/AS/P Consumer Tracking Data, Statistics, Overlap, Ranking, &/or Scores Per Overall Content &/or Per Element" is performed. If the answer to the query 1137*g* is instead "No," the process then proceeds to a set of "Employ Further Validations" options. The options include: An "Employ IPACE Member/User Inputs" option 1139*g*, an "Employ Input From Non-Members" option 1140*g*, and an "Employ Other Validation Methods" option 1141*g*.

The results from the options 1339*g*-1141*g*, then proceeds to the step 1138*g* where an "Update A/D/RP/AS/P Consumer Tracking Data, Statistics, Overlap, Ranking, &/or Scores Per Overall Content &/or Per Element" is performed. From the step 1138*g*, the process proceeds to a set of options including: an "Update Consumer/Member's Consumption Influence Rank per Content Category (e.g. Tweets Links which Lead to Purchases)" option 1153, an "Update Consumer/Member's Consumption Rank per Content Category (e.g. # of Movies Viewed)" option 1154, an "Update Consumer/Member's Consumption Rank per Content Category (e.g. # of Movies Viewed)" 1155, an "Other Updates" option 1156.

The results from the options 1153-1156, the process proceeds to the step 1145*g*. From the step 1145*g* the process proceeds to a step 1146*g*, where a "Notify Appropriate Members with The Appropriate Information" is performed. From the step 1146*g*, the process then proceeds to a query 1147*g*, which asks "Challenged, Acknowledged &/or Modified in Time?" ?" If the answer to the query 1147*g* is "Not in Time," the appropriate "Not in Time" function 1148*g* is performed. If the answer to the query 1147*g* is "Challenges," the appropriate "Challenge(s)" 1149*g* is performed. If the answer to the query 1147*g* is "Ack.," the appropriate "Acknowledgement(s)" 1150*g* is performed. If the answer to the query 1147*g* is "Modification," the appropriate "Modification (s)" 1151*g* is performed. Next, the process proceeds back to the step 1115*g*.

Figure 74:
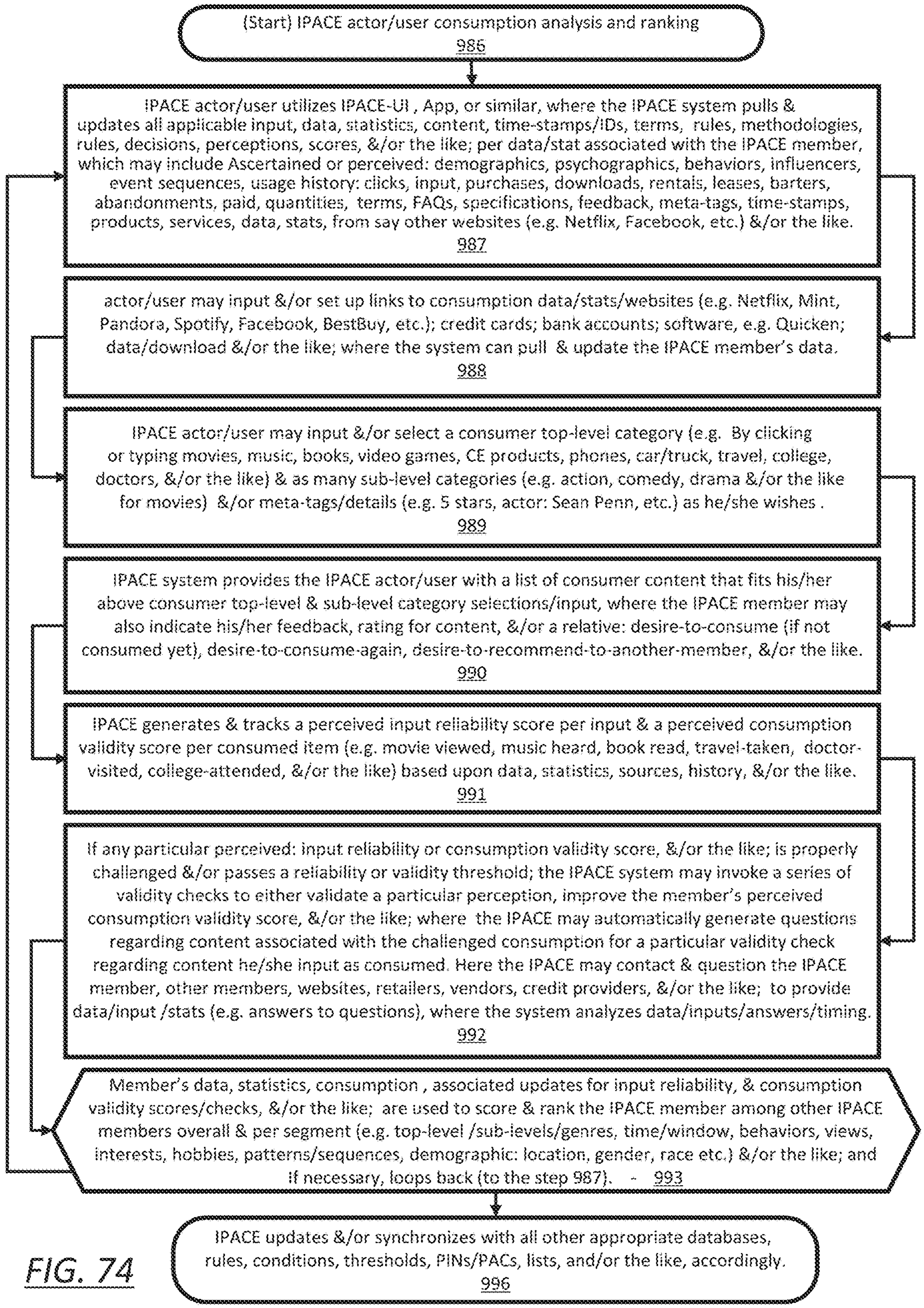
FIG. 74 is a flowchart that depicts a non-limiting embodiment and example of the IPACE system, and associated computer-implemented method for extracting, classifying, mapping, electronically storing, tracking, and analyzing data/content consumption (e.g. an actor's/user's consumption).

FIG. 74 is a flowchart that depicts an embodiment and example of the IPACE system, and associated computer-implemented method for extracting, classifying, mapping, electronically storing, tracking, and analyzing data/content consumption (e.g. an actor's/user's consumption). Starting with a terminator 986 where a "(Start) IPACE actor/user consumption analysis and ranking" is performed. The process then proceeds to a step 987 where an "IPACE actor/user utilizes IPACE-UI, App, or similar, where the IPACE system pulls and updates all applicable input, data, statistics, content, time-stamps/IDs, terms, rules, methodologies, rules, decisions, perceptions, scores, &/or the like; per data/stat associated with the IPACE member, which may include Ascertained or perceived: demographics, psychographics, behaviors, influencers, event sequences, usage history: clicks, input, purchases, downloads, rentals, leases, barters, abandonments, paid, quantities, terms, FAQs, specifications, feedback, meta-tags, time-stamps, products, services, data, stats, from say other websites (e.g. Netflix®, Facebook®, etc.) &/or the like" is performed.

The process then proceeds to a step 988 where an "actor/user may input &/or set up links to consumption data/stats/websites (e.g. Netflix®, Mint®, Pandora®, Spotify®, Facebook®, BestBuy®, etc.); credit cards; bank accounts; software, e.g. Quicken; data/download &/or the like; where the IPACE system can pull & update the IPACE member's data" is performed. The process then proceeds to a step 989 where an "IPACE actor/user may input &/or select a consumer top-level category (e.g. By clicking or typing movies, music, books, video games, CE products, phones, car/truck, travel, college, doctors, &/or the like) & as many sub-level categories (e.g. action, comedy, drama &/or the like for movies) &/or meta-tags/details (e.g. 5 stars, actor: Sean Penn, etc.) as he/she wishes" is performed.

The process then proceeds to a step 990 where an "IPACE system provides the IPACE actor/user with a list of consumer content that fits his/her above consumer top-level & sub-level category selections/input, where the IPACE member may also indicate his/her feedback, rating for content, &/or a relative: desire-to-consume (if not consumed yet), desire-to-consume-again, desire-to-recommend-to-another-member, &/or the like" is performed.

The process then proceeds to a step 991 where an "IPACE generates & tracks a perceived input reliability score per input & a perceived consumption validity score per consumed item (e.g. movie viewed, music heard, book read, travel-taken, doctor-visited, college-attended, &/or the like) based upon data, statistics, sources, history, &/or the like" is performed.

The process then proceeds to a step 992 where an "If any particular perceived: input reliability or consumption validity score, &/or the like; is properly challenged &/or passes a reliability or validity threshold; the IPACE system may invoke a series of validity checks to either validate a particular perception, improve the member's perceived consumption validity score, &/or the like; where the IPACE may automatically generate questions regarding content associated with the challenged consumption for a particular validity check regarding content he/she input as consumed. Here the IPACE may contact & question the IPACE member, other members, websites, retailers, vendors, credit providers, &/or the like; to provide data/input/stats (e.g. answers to questions), where the IPACE system analyzes data/inputs/answers/timing" is performed.

The process proceeds to the multi-function-step 993 where a "member's data, statistics, consumption, associated updates for input reliability, & consumption validity scores/checks, &/or the like; are used to score & rank the IPACE member among other IPACE members overall & per segment (e.g. top-level/sub-levels/genres, time/window, behaviors, views, interests, hobbies, patterns/sequences, demographic: location, gender, race etc.) &/or the like; and if necessary, loops back (to the step 987)" is performed. Depending on the data collected, updates discerned/perceived, scores, rules and/or conditions received and/or performed in the multi-function-step 993, the process may automatically, systematically, continuously, persistently, conditionally, and/or via/per actor/user-prompt cycle/loop back to the step 987, and/or the method and associated data proceeds to a terminator 996 where an "IPACE updates &/or synchronizes with all other appropriate databases, rules, conditions, thresholds, PINs/PACs and/or the like, accordingly," is executed.

Figures 75A, 75B:
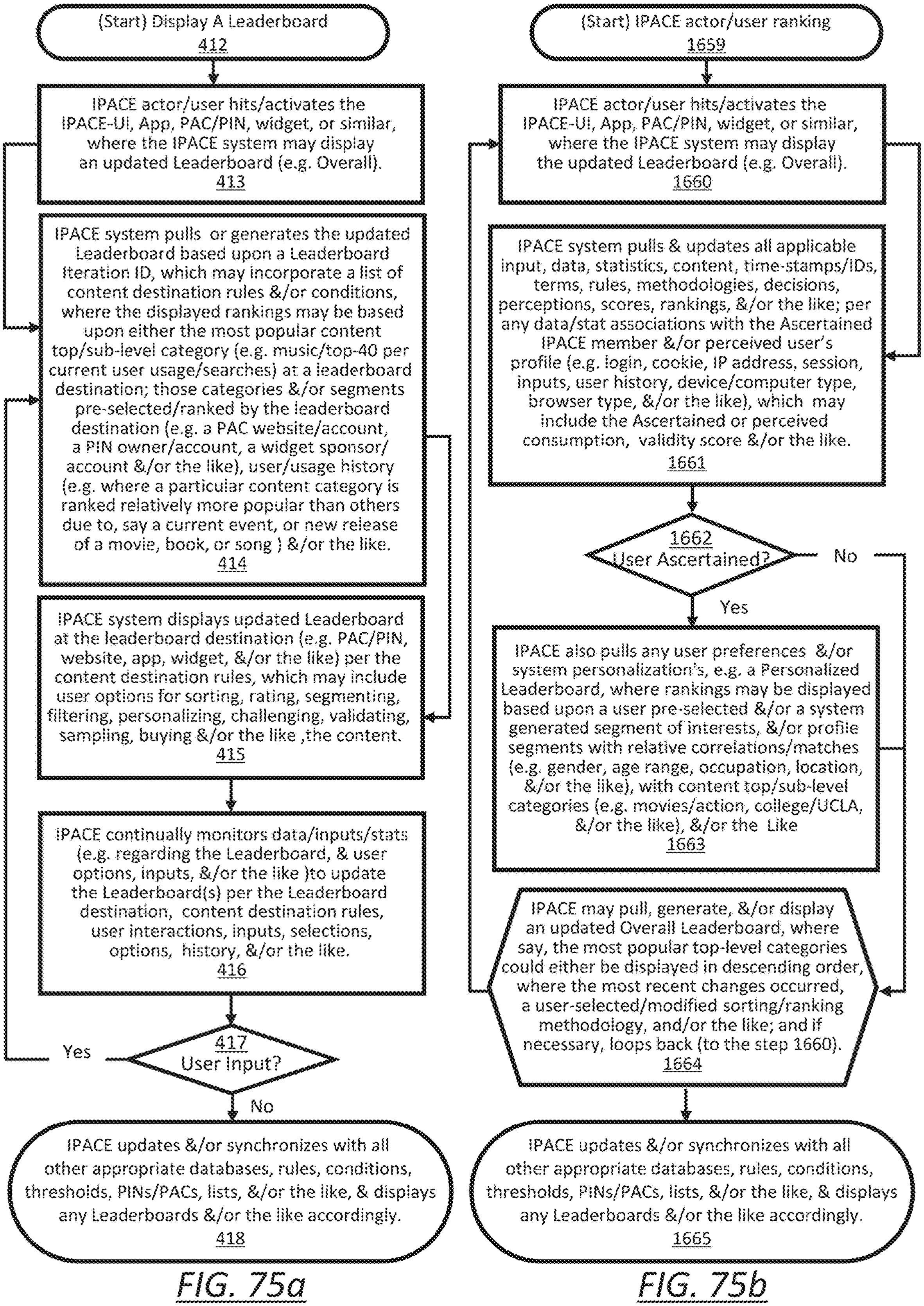
FIG. 75*a* is a flowchart that depicts a non-limiting embodiment and example of the IPACE system, and associated computer-implemented method for Tracking, Analyzing, Ranking, and Displaying a Leaderboard.
FIG. 75*b* is a flowchart that depicts a non-limiting embodiment and example of the IPACE system and associated computer-implemented method for Tracking, Analyzing, Ranking, and Displaying a particular user's ranking.

FIG. 75*a* is a flowchart that depicts an embodiment and example of the IPACE system, and associated computer-implemented method for Tracking, Analyzing, Ranking, and Displaying a Leaderboard. Starting with a terminator 412 where a "(Start) Display A Leaderboard" is performed. The process then proceeds to a step 413 where an "IPACE actor/user hits/activates the IPACE-UI, App, PAC/PIN, widget, or similar, where the IPACE system may display an updated Leaderboard (e.g. Overall)" is performed.

The process then proceeds to a step 414 where an "IPACE system pulls or generates the updated Leaderboard based upon a Leaderboard Iteration ID, which may incorporate a list of content destination rules &/or conditions, where the displayed rankings may be based upon either the most popular content top/sub-level category (e.g. music/top-40 per current user usage/searches) at a leaderboard destination; those categories &/or segments pre-selected/ranked by the leaderboard destination (e.g. a PAC website/account, a PIN owner/account, a widget sponsor/account &/or the like), user/usage history (e.g. where a particular content category is ranked relatively more popular than others due to, say a current event, or new release of a movie, book, or song) &/or the like" is performed.

The process then proceeds to a step 415 where an "IPACE system displays updated Leaderboard at the leaderboard destination (e.g. PAC/PIN, website, app, widget, &/or the like) per the content destination rules, which may include user options for sorting, rating, segmenting, filtering, personalizing, challenging, validating, sampling, buying &/or the like, the content" is performed. The process then proceeds to a step 416 where an "IPACE continually monitors data/inputs/stats (e.g. regarding the Leaderboard, & user options, inputs, &/or the like) to update the Leaderboard(s) per the Leaderboard destination, content destination rules, user interactions, inputs, selections, options, history, &/or the like" is performed.

From step 416, the process proceeds to a query 417 which asks whether any "User Input?" If the answer to query 417 is "Yes" then the process loops/cycles back to the step 414. If the answer to query 417 is instead "No," then the process proceeds to a terminator 418, where an "IPACE updates &/or synchronizes with all other appropriate databases, rules, conditions, thresholds, PINs/PACs, lists, &/or the like, & displays any Leaderboards &/or the like accordingly" is executed.

FIG. 75*b* is a flowchart that depicts an embodiment and example of the IPACE system, and associated computer-implemented method for Tracking, Analyzing, Ranking, and Displaying a particular user's ranking. Starting with a terminator 1659 where a "(Start) IPACE actor/user ranking" is performed. The process then proceeds to a step 1660 where an "IPACE actor/user hits/activates the IPACE-UI, App, PAC/PIN, widget, or similar, where the IPACE system may display the updated Leaderboard (e.g. Overall)" is performed.

The process then proceeds to a step 1661 where an "IPACE system pulls & updates all applicable input, data, statistics, content, time-stamps/IDs, terms, rules, methodologies, decisions, perceptions, scores, rankings, &/or the like; per any data/stat associations with the Ascertained IPACE member &/or perceived user's profile (e.g. login, cookie, IP address, session, inputs, user history, device/computer type, browser type, &/or the like), which may include the Ascertained or perceived consumption, validity score &/or the like" is performed.

From step 1661, the process proceeds to a query 1662 which asks whether a "User [was] Ascertained?" If the answer to query 1662 is "Yes" then the process proceeds to a step 1663 where an "IPACE also pulls any user preferences &/or system personalization's, e.g. a Personalized Leaderboard, where rankings may be displayed based upon a user pre-selected &/or a system generated segment of interests, &/or profile segments with relative correlations/matches (e.g. gender, age range, occupation, location, &/or the like), with content top/sub-level categories (e.g. movies/action, college/UCLA, &/or the like), &/or the like" is performed. From step 1663, the process proceeds to a multi-function step 1664.

If the answer back at query 1662 is instead "No," then the process proceeds to the multi-function step 1664 where an "IPACE may pull, generate, &/or display an updated Overall Leaderboard, where say, the most popular top-level categories could either be displayed in descending order, where the most recent changes occurred, a user-selected/modified sorting/ranking methodology, and/or the like; and if necessary, loops back (to the step 1660)" is performed. Depending on the data collected, updates discerned/perceived, scores, rules and/or conditions received and/or performed in the multi-function-step 1664, the process may automatically, systematically, continuously, persistently, conditionally, and/or via/per actor/user-prompt cycle/loop back to the step 1660, and/or the method and associated data proceeds to a terminator a terminator 1665, where an "IPACE updates &/or synchronizes with all other appropriate databases, rules, conditions, thresholds, PINs/PACs, lists, &/or the like, & displays any Leaderboards &/or the like accordingly" is executed.

Figure 76:
FIG. 76 is a flowchart that depicts a non-limiting an embodiment and example of the IPACE system, and associated computer-implemented method for Tracking, Analyzing, Ranking, Visualizing and Displaying a Todometer.

FIG. 76 is a flowchart that depicts an embodiment and example of the IPACE system, and associated computer-implemented method for Tracking, Analyzing, Ranking, Visualizing and Displaying a Todometer. Starting with a terminator 2023 where a "(Start) Todometer/Interaction Tracker" is performed. The process then proceeds to a step 2024 where an "IPACE actor/user employs or utilizes the Todometer module which may tracks a user's inputs, selections, interactions, tasks, scores negotiations, clients, employees, IPACE-participants, co-workers, contractors, vendors, friends, family-members, calendars, timers, deadlines, goals, TOU/TOPS, prioritizations, personalization, &/or the like" is performed.

Next, the process then proceeds to a step 2025 where an "IPACE system pulls or generates the updated Todometer per the IPACE member's/user's ID, based upon previous usage and a latest Todometer Iteration ID, which may incorporate a list of content acceptance, content destination rules &/or conditions, where the displayed content rankings may be based upon either (1) a user-selected prioritization of tasks, a time period or deadline, of top/sub-topic classifications (e.g. projects, participants, clients, employees, employers, contractors, vendors, service-providers, suppliers, advertisers, manufacturers, friends, family members, &/or the like), of interactions methods, &/or the like; (2) a system-based analysis & prioritization of a perceived urgency (e.g. based upon the IPACE system analysis of a list of deadlines, a ranking of seniority of each party who is interacting &/or associated with each deadline; (3) a system-based analysis & prioritization of an interrelation-hierarchy of task dependency; (4) a system-based analysis & prioritization of either prioritization of tasks, a time period or deadline, of top/sub-topic classifications (e.g. projects, participants, clients, employees, employers, contractors, vendors, service-providers, suppliers, advertisers, manufacturers, friends, family members, &/or the like), of interactions methods, &/or the like; (5) a system-based analysis and prioritization of the user/usage history (e.g. where a particular content category is ranked relatively more popular than others due to, say a current event, recent usage, recent interaction, &/or the like" is performed.

Next, the process proceeds to a step 2026 where a "Users may interact (e.g. via email, IM, SMS, MMS, Telephone, VOIP, Voicemail, the IPACE system, PTO EFS, &/or the like) with other parties (e.g. IPACE member, people, entities, systems, &/or the like); where the IPACE system's Todometer module offers a variety of conditional tracking methods per each type of interaction, party/participant being interacted with, &/or the like" is performed.

Next, the process proceeds to a step 2027 where an "IPACE system's Todometer module may track & time each input, say for the amount of time it takes each user to start or complete an interaction with each other user (e.g. email/SMS/MMS/IM: to receive, view, read, click a link, read a link, flag, comment, forward, start to create a response, finish a response, send a response, &/or the like); where interactions may include user options comprising a sorting, rating, filtering, flagging, segmenting, personalizing, polling/feedback, questions/answers, challenging/validating (e.g. a task's requirements, priorities, assignments/participants, goals, acceptance/decline, ignore, perceived benefits, perceived value (present & future), deadlines, time allotments, dependencies, resources, errors, completions, feedback, &/or the like), sampling, purchases, assigning tasks, accepting tasks, and/or the like, per user computer/device/display, application, tool, IP Address, location, &/or the like," is performed.

Next, the process proceeds to a multi-function-step 2028 where an "IPACE system's Todometer module continually monitors & analyzes the data/inputs to generate stats, scores, ratios, & rankings per user/participant (e.g. a particular user's score, ranking, ratios for: reliability, response-promptness, task-proficiency, task-dependencies, task-completion-rate, application-proficiency, budget-efficiency, time-proficiency, error/correction ratio & rate, task-acceptance-rate, task-decline-rate, acceptance/completion, task-challenge-rate, task-validation-rate, device proficiency, &/or the like); per relationship, per interaction, per project, per window of time (e.g. a past, current, a particular week, day, time window), &/or the like; and If necessary, loops back (to the step 2024)" is performed. Depending on the data collected, updates discerned/perceived, scores, rules and/or conditions received and/or performed in the multi-function-step 2028, the process may automatically, systematically, continuously, persistently, conditionally, and/or via/per actor/user-prompt cycle/loop back to the step 2024, and/or the method and associated data proceeds to a terminator a terminator 2029, where an "IPACE updates &/or synchronizes with all other appropriate databases, rules, conditions, thresholds, PINs/PACs, lists, &/or the like, & displays any Leaderboards &/or the like accordingly" is executed.

METER/Todometer The present disclosure will now advance a sub-module of the METER module which is referred to in some embodiments of this disclosure as a TODOMETER. In various non-limiting embodiments, the METER has a Todometer ("Todometer") module for tracking, analyzing, visualizing and/or relatively comparing all communications, interactions, tasks, goals, calendars, deadlines, events, data/content, documents, resources, participants, and/or the like. For example, the Todometer could track, analyze, and display a prioritized list, where the prioritized list could be of tasks and deadlines associated with a particular project. In various non-limiting embodiments, the prioritized list and rankings could be filtered, sorted, conditionally weighted, modified, and/or the like.

Broadly speaking, the TODOMETER does the following. It monitors an information exchange network relative to a plurality of users to identify a relationship between each specific user and each specific communication; it classifies and indexes each specific communication according to a communication classification; it classifies and indexes each specific communication relative to each specific user according to at least one role classification; and it evaluates each specific communication relative to a communication goal, wherein the communication goal generates a communication profile relative to each specific user.

Additional methods and aspects of the TODOMETER will now be described. It should be noted that such methods and aspects can be combined with each other, in any suitable combination of the following descriptions, or included separately. The monitoring of the information exchange network includes an initializing of a timer and/or is persistent. Persistent monitoring can generate statistics, scores, ratios, and/or rankings per user which may be used to determine a plurality of rankings and ratios for a relative reliability, response-promptness, task-proficiency, task-dependencies, task-completion-rate, application-proficiency, budget-efficiency, time-proficiency, error/correction ratio & rate, task-acceptance-rate, task-decline-rate, acceptance/completion ratio, task-challenge-rate, task-validation-rate, communication methodology preference, and device proficiency. Also, the generated statistics, scores, ratios, and rankings per user can further include a relative user relationship per interaction, per project, and per window of time and also provide a communication history per communication methodology relative to time. Persistent monitoring can track each user input which can be expressed relative to an amount of time consumed.

The tracking of each user input expressed relative to the amount of time consumed can refer to one or more of sent time, received time, opened time, viewed time, viewed duration, response creation start time, response creation duration, response delay duration, response idle duration, response sent time, forward sent time, communication duration, thread duration lifespan, email inbox duration, email sent-box duration, email outbox duration, email archival duration, and email overall lifespan per user. The tracking of each user input is expressed relative to one or more of a new message composition, existing message reply, existing message reply all, existing message forward, existing message assignment, and existing message deletion. The tracking of each user input is expressed relative to a count.

The count is expressed relative to a specific message, communication thread, thread participants, and/or users. The count is expressed relative to one or more of a number of times the specific message was opened, reopened, forwarded, responded-to, sorted, clicked on, cut-and-pasted-from, images downloaded-for, moved, and/or reassigned to another folder. The tracking of each user input is expressed relative to a repetitive count. The repetitive count comprises an evaluation of a series of user inputs to determine a repetitive nature of the user's inputs in a message relative to a previous message.

The repetitive count comprises an evaluation of a series of user inputs to determine the repetitive nature of message relative to a previous message. The existing message assignment is comprised of one or more of spam, junk, malware, virus, Trojan horse, security threat, password, urgent, follow-up-needed, calendar, contact manager, task manager, privacy, visibility, and sensitivity. The communication classification can comprise a communication methodology, communication container, communication format, communication sequence, communication universe, communication source, communication encryption, communication security, communication policy, communication priority, communication language, communication lexicon, communication parsing tree, communication semantics library, communication extraction model, and/or communication network. The communication methodology can comprise an email message, instant message, chat, forums, online bulletin boards, blog thread, Short Message Service (SMS) message, Multimedia Messaging Service (MMS) message, Enhanced Message Service (EMS) message, voicemail message, voice-over-IP (VoIP) conversation, telephone conversation, digitized conversation or conversation transcription. The at least one role comprises either a sender or a receiver.

The plurality of users to identify the relationship between each specific user and each specific communication comprises an at least carbon copy (cc) and blind carbon copy (bcc). The communication profile relative to each user comprises an ascertained value, discerned value, relatively-perceived value, stated value, and predicted value for each communication goal. The evaluation of each specific communication relative to the communication goal includes an outcome. The communication profile relative to each user comprises an ascertained, discerned, relatively-perceived, stated, and predicted value and the outcome. The ascertained, discerned, relatively-perceived, stated, and predicted value for the communication goal of each communication profile is relative to a benefit derived for each user. The communication goal comprises an expressed task.

The expressed communication goal is provided by the at least one sender or receiver. The expressed communication goal provided by the at least one sender is evaluated relative to a list containing one or more of a variety of goals, variety of content assets, variety of formats, variety of recipients, variety of delivery dates, variety of delivery times, variety of delivery methodologies, variety of content, variety of color schemes, variety of attachments, variety of endorsers, variety of testimonials, variety of certifications, variety of validations, variety of font sizes, variety of references, variety of font styles, variety of font colors, variety of text formatting, variety of semantics, variety of vernaculars, variety of salutations, variety of tasks assigned, variety of deadlines, variety of offers, variety of links, variety of campaign themes, variety of message themes, variety of logos, variety of carbon copy options, variety of blind copy options, variety of rewards, variety of compensations, variety of equity offers, variety of employment offers, variety of bonus offers, variety of vacation time offers, variety of travel offers, variety of insurance offers, variety of accommodation offers, variety of discounts, variety of categorization flags, variety of languages, variety of gender-focuses, variety of provocative elements, variety of promotional contests, variety of political slants, variety of religious references, variety of sport references, variety of collegiate references, variety of lexicon mappings, variety of maps, variety of grammar, variety of call-to-actions, variety of spelling-errors, variety of metaphors, variety of facts, variety of opinion, variety of polls, variety of tweet references, variety of health references, variety of expert endorsements, variety of celebrity endorsements, variety of political endorsements, variety of brands, variety of resolutions, variety of images, variety of videos, variety of audio, variety of volumes, variety of video playback speeds, variety of content lengths, variety of tracking methods, variety of sender email addresses, variety of receiver email addresses, variety html formats, variety of text formats, variety of message sequences, variety of headlines, variety of subjects, variety of encryption schemes, and variety of dynamic cloud-based asset.

The expressed communication outcome determined by the at least one recipient is evaluated relative to a list containing one or more of a variety of goals, variety of content assets, variety of formats, variety of recipients, variety of delivery dates, variety of delivery times, variety of delivery methodologies, variety of content, variety of color schemes, variety of attachments, variety of endorsers, variety of testimonials, variety of certifications, variety of validations, variety of font sizes, variety of references, variety of font styles, variety of font colors, variety of text formatting, variety of semantics, variety of vernaculars, variety of salutations, variety of tasks assigned, variety of deadlines, variety of offers, variety of links, variety of campaign themes, variety of message themes, variety of logos, variety of carbon copy options, variety of blind copy options, variety of rewards, variety of compensations, variety of equity offers, variety of employment offers, variety of bonus offers, variety of vacation time offers, variety of travel offers, variety of insurance offers, variety of accommodation offers, variety of discounts, variety of categorization flags, variety of languages, variety of gender-focuses, variety of provocative elements, variety of promotional contests, variety of political slants, variety of religious references, variety of sport references, variety of collegiate references, variety of lexicon mappings, variety of maps, variety of grammar, variety of call-to-actions, variety of spelling-errors, variety of metaphors, variety of facts, variety of opinion, variety of polls, variety of tweet references, variety of health references, variety of expert endorsements, variety of celebrity endorsements, variety of political endorsements, variety of brands, variety of resolutions, variety of images, variety of videos, variety of audio, variety of volumes, variety of video playback speeds, variety of content lengths, variety of tracking methods, variety of sender email addresses, variety of receiver email addresses, variety html formats, variety of text formats, variety of message sequences, variety of headlines, variety of subjects, variety of encryption schemes, and variety of dynamic cloud-based asset.

The expressed communication outcome determined by the at least one recipient is evaluated relative a list containing one or more of a variety of SMS message lengths, variety of short codes, variety of SMS response delays, variety of emoticons, variety of SMS sender devices, variety of SMS sender mobile numbers, variety of SMS receiver devices, variety of SMS receiver mobile numbers, variety of SMS slang, variety of SMS languages, variety of SMS images, variety of MMS videos, variety of SMS content lengths, variety of SMS tracking methods, variety of SMS sender email addresses included, variety of SMS sender phone numbers included, variety of SMS vernaculars, variety of SMS message sequences, and variety of texting abbreviations.

The expressed communication goal provided by the at least one sender is evaluated relative to a list containing one or more of a variety of SMS message lengths, variety of short codes, variety of SMS response delays, variety of emoticons, variety of SMS sender devices, variety of SMS sender mobile numbers, variety of SMS receiver devices, variety of SMS receiver mobile numbers, variety of SMS slang, variety of SMS languages, variety of SMS images, variety of MMS videos, variety of SMS content lengths, variety of SMS tracking methods, variety of SMS sender email addresses included, variety of SMS sender phone numbers included, variety of SMS vernaculars, variety of SMS message sequences, and variety of texting abbreviations. The evaluation of each specific communication relative to the communication goal further comprises data, input to generate, statistics, scores, ratios, and rankings per user or participant. The evaluation of each specific communication includes a tracking of the relationships per each specific user.

The tracking of the relationships per each specific user comprises a node, and the node can include a node profile. The node profile can include one or more of a plurality of characteristics comprising a time stamp, date stamp, country of origin, smtp server, zip code, street address, GPS coordinate, email address, destination IP address, service provider, network provider, network path, a location, xyz coordinates, GPS coordinates, triangulation location, signal strength approximation, pattern of usage, temporal component, usage history, and pathway, route, location, physical destination address, port number and destination address, process unique identifier (UID), application UID, IP address, device, peering point, and access point address.

The plurality of characteristics can further comprise a POPS, IMAP or HTTP server. The communication classifications can further comprise a time stamp, date stamp, country of origin, smtp server, zip code, street address, email address, destination IP address, or GPS coordinate and the attribute can comprise a location, xyz coordinates, GPS coordinates, triangulation location, signal strength approximation, pattern of usage, temporal component, usage history, or zip code.

The sender or receiver establishes, expresses, or infers the task, priority, time requirements, deadline, topic, task relationship and dependencies. The evaluation is performed relative to each expression, inference, ambiguity, task, priority, time requirement, deadline, topic, task relationship and/or dependency per sender and receiver. The sequence of nodes is relative to a timeline and can be a communication thread (which can include a communication thread profile which includes characteristics, parameters, a subject, thread subject, thread originator, thread breaker, thread tie/relationship, thread ender and/or thread in).

The subject can be a sequence of thread subjects which can be expressed relative to a series of criterion, statistics, timers, ratios, conditions, scores, users, goals, and/or outcomes. The scores can include a first expression relative to accomplishment, goal, outcome, lifespan, lifespan, originality, novelty, selling an object, award, event, product, service, purpose and/or benefit. The scores can include a second expression relative to a recipient opening a particular object, opening a particular message, opening a particular attachment, responding to a particular message, clicking a particular link, buying a particular product, viewing a particular content, voting on a particular poll, answering a particular question, forwarding a particular message, and/or inviting a particular user.

The evaluation of each specific communication relative to the communication goal can include a ratio for: reliability, response-promptness, task-proficiency, task-dependencies, task-completion-rate, application-proficiency, budget-efficiency, time-proficiency, error/correction ratio & rate, task-acceptance-rate, task-decline-rate, acceptance per completion, task-challenge-rate, task-validation-rate, and/or device proficiency per relationship. The communication goal and outcome can comprise a variety of expressions, predictions, and scores; wherein the score comprises a clarity-of-expressed-task score, and clarity-of-timeline score. The communication goal can be comprised of an outcome evaluation, feedback, peer review, expert analysis, and/or IPACE evaluation. The outcome can be ascertained, discerned, relatively-perceived, stated, inferred, expressed, and/or predicted by a group comprising an IPACE system, each user and each classification.

The classifying and indexing for each specific user according to the at least one role classification further comprises one or more of a message manager, message master, follow-upper, attachment-approval-master, deletion-master, archival-master, task approver, assignor, delegator, senior, junior, dependent, defender, assertor, participant, contributor, inventor, lead-inventor, co-inventor, attorney, agent, judge, juror, client, employee, employer, manager, project manager, executive, contractor, manufacturer, vendor, supplier, service-provider, supplier, buyer, seller, recommender, supporter, educator, advertiser, recruiter, reporter, publisher, photographer, videographer, witness, information source, campaign manager, friend, family member, group member, and Intellectual Property Assignment Collaboration and Exchange (IPACE) member relative to the specific communication. The classifying and indexing for each specific user according to the at least one role classification further comprises a spammer, bot, and junkmailer.

The classifying and indexing for each specific user includes an at least one membership classification comprising one or more of an at least one participant, contributor, inventor, lead-inventor, co-inventor, attorney, agent, judge, juror, client, employee, employer, manager, project manager, executive, contractor, manufacturer, vendor, supplier, service-provider, supplier, advertiser, recruiter, reporter, publisher, photographer, videographer, witness, information source, campaign manager, friend, family member, group member, and Intellectual Property Assignment Collaboration and Exchange (IPACE) member relative to the specific communication.

The prediction score, feedback, scoring, relative-success, appreciation, and response-promptness are ascertained, discerned, relatively-perceived, stated, expressed, and/or predicted relative to the sender. The prediction score, feedback, scoring, relative-success, appreciation, and response-promptness are ascertained, discerned, relatively-perceived, stated, expressed, and/or predicted relative to the receiver. The prediction score, feedback, scoring, relative-success, appreciation, and response-promptness are ascertained, discerned, relatively-perceived, stated, expressed, and predicted are received from the sender. The prediction score, feedback, scoring, relative-success, appreciation, and response-promptness are ascertained, discerned, relatively-perceived, stated, expressed, and/or predicted are received from the receiver.

The communication goal and outcome comprise one or more of a task, calendar, event, temporal parameter, dependency, priority, urgency, rank, deadline, status, information retrieval, evaluation, verification, validation, decision, determination, termination, negotiation, cancelation, order, support, challenge, data source, knowledge increase, report, statistics, and timer. The communication goal includes a multivariate testing scheme.

The multivariate testing scheme can comprise one or more of a variety of goals, variety of content assets, variety of formats, variety of recipients, variety of delivery dates, variety of delivery times, variety of delivery methodologies, variety of content, variety of color schemes, variety of attachments, variety of endorsers, variety of testimonials, variety of certifications, variety of validations, variety of font sizes, variety of references, variety of font styles, variety of font colors, variety of text formatting, variety of semantics, variety of vernaculars, variety of salutations, variety of tasks assigned, variety of deadlines, variety of offers, variety of links, variety of campaign themes, variety of message themes, variety of logos, variety of carbon copy options, variety of blind copy options, variety of rewards, variety of compensations, variety of equity offers, variety of employment offers, variety of bonus offers, variety of vacation time offers, variety of travel offers, variety of insurance offers, variety of accommodation offers, variety of discounts, variety of categorization flags, variety of languages, variety of gender-focuses, variety of provocative elements, variety of promotional contests, variety of political slants, variety of religious references, variety of sport references, variety of collegiate references, variety of lexicon mappings, variety of maps, variety of grammar, variety of call-to-actions, variety of spelling-errors, variety of metaphors, variety of facts, variety of opinion, variety of polls, variety of tweet references, variety of health references, variety of expert endorsements, variety of celebrity endorsements, variety of political endorsements, variety of brands, variety of resolutions, variety of images, variety of videos, variety of audio, variety of volumes, variety of video playback speeds, variety of content lengths, variety of tracking methods, variety of sender email addresses, variety of receiver email addresses, variety html formats, variety of text formats, variety of message sequences, variety of headlines, variety of subjects, variety of encryption schemes, and variety of dynamic cloud-based asset.

The multivariate testing scheme can comprise one or more of a variety of SMS message lengths, variety of short codes, variety of SMS response delays, variety of emoticons, variety of SMS sender devices, variety of SMS sender mobile numbers, variety of SMS receiver devices, variety of SMS receiver mobile numbers, variety of SMS slang, variety of SMS languages, variety of SMS images, variety of MMS videos, variety of SMS content lengths, variety of SMS tracking methods, variety of SMS sender email addresses included, variety of SMS sender phone numbers included, variety of SMS vernaculars, variety of SMS message sequences, and variety of texting abbreviations. The multivariate testing scheme can comprise a sequencing of a variety of the multivariate testing schemes and the multivariate testing schemes can generate statistics, patterns, parameters, criterion, scores, and/or profiles.

The communication goal can trigger a multivariate testing scheme and include an evaluation of a behavioral, etiquette, and/or pattern relative to a specific user, group of users, segment of users, entity, company, country, state, society, communication methods, communication patterns, windows of time, socio-economic status, economic conditions, demographics, psychographics, and/or localization-factors.

The prediction score, feedback, scoring, relative-success, appreciation, and response-promptness are ascertained, discerned, relatively-perceived, stated, expressed, and/or predicted are received from the receiver. As previously noted, the above-noted methods and aspects can be combined with each other, in any suitable combination, in a TODOMETER sub-module of the METER module.

In various non-limiting embodiments, the Todometer would preferably track and analyze all of the tasks and task correlations to a particular participant/user, project, entity, patent application, group of participants/users, a segment of participants/users and/or the like. In various non-limiting embodiments, the displayed prioritized list would preferably generate scores for a variety of discerned and/or relatively perceived set of conditions comprising a score for a relative promptness, efficiency, proficiency, accountability, reliability, communications-skills/promptness/effectiveness, availability, judgment, competency, knowledge, experience, education, likability, respectability, and/or the like per task, per participant, per project, per entity, and/or the like.

In various non-limiting embodiments, the displayed prioritized list would preferably generate scores for a discerned and/or relatively perceived set of concerns, comprising a score for a relative cost-benefit, resource proximity, resource-inventory-location, resource-market-availability, a pendency overload, a resource strain, budget strain, task bulge/moment-in-time, windows-of-time/task-pendency-gaps, task redundancy-beneficial, task-redundancy-non-beneficial, and/or the like per task, per participant, per project, per entity, and/or the like.

In various non-limiting embodiments, the Todometer would preferably track and analyze all of the communications and interactions between users/participants to generate a list of scores, where the scores would preferably be ranked. The scores would preferably comprise a variety of components (e.g. conditions, rules, logic, weighting, other scores, and/or the like), where the user/participant may automatically, systematically, continuously, persistently, conditionally, and/or via/per actor/user-prompt modify the variety of components and/or the like.

In various non-limiting embodiments, the Todometer would preferably track and analyze all of the communications and interactions of each participant associated with a task, company, deadline, goal, schedule, event, and/or the like. For example, the Todometer may track and analyze all of the communications of a first participant with all other participants (e.g. a second participant, third, and so on). For instance, the analysis may reveal that communications between the first and second participant score relatively higher for being promptly replied to when the first participant employs a communication mode of SMS, when relatively compared to the communication mode of, say email or voicemail with the same second participant. In various non-limiting embodiments, the analysis may reveal that communications between the first and second participant score relatively lower for being effective when relatively compared to the third participant, regardless of the communication mode; and where the third participant is relatively more reliable, cost-efficient, available, reliable, and/or the like for a particular task than the second participant. The analysis may reveal and/or display a list of suggestions, where the list of suggestions may include switching tasks between available participants based upon historical analysis, say between the second and third participants, and/or a list of potential participants. The IPACE system and associated computer-implement methods could attempt communications automatically, conditionally, and/or user-selectively, in attempt to validate, eliminate, improve, acknowledge, and/or the like, an assumption, perception, and/or the like.

For example, the IPACE system may perceive that a fourth potential participant is available for a particular task and/or project with a particular skill and/or for a particular compensation, where the IPACE system perceives the fourth potential participant as a relatively significantly better option for a particular task than the second participant. In various non-limiting embodiments, the IPACE system would preferably attempt a communication via a variety of the communication modes, where the IPACE system would preferably ask the fourth potential participant a series of questions to relatively better ascertain information. The series of questions selected and performed by the IPACE system may incorporate an analysis of historical data, where the forth potential participant has a tendency to prefer short questions via SMS one at a time over, say long emails. In various non-limiting embodiments, based upon the historical data analysis, the series of questions selected and performed by the IPACE system may incorporate a relative gap in the IPACE system intelligence, where a particular first question asked in a particular first manner would be relatively more valuable to the "knowledge base/state" on the fourth potential participant and/or in general, than say the first question asked a particular second manner; a particular second question asked the first manner; a plurality of questions asked; a plurality of manners; and/or the like. For example, per a set of circumstances, the IPACE system may generate questions and attempt communications with the potential fourth participant, where the IPACE system generates a collective question in one SMS or via a mobile Q/A application (e.g. a Todometer mobile application with Q/A, tracking, and/or the like) where the IPACE system also captures such data as the relative promptness per windows of time, per perceived availability, days of the week, times/day, and/or the like.

For example, the collective question may ask the fourth potential participant whether he/she is available to work on drafting four flowchart figures for a particular patent application for a particular project/entity by a particular deadline for a particular price/Figure. Here, the IPACE system analysis of historical data, tendencies, set of circumstances, and/or the like, may also incorporate trends, where the forth potential participant scores relatively high for SMS communications when relatively compared the Todometer mobile application. However, analysis may reveal a trend towards the Todometer Application where interactions are relatively more prompt, reliable, and/or have relatively more benefits for both parties regarding data/communication exchanges.

In various non-limiting embodiments, system analysis of historical data, tendencies, set of circumstances, and/or the like, may also incorporate company trends and/or circumstances, where the participation of a particular participant may become relatively more or less urgent. Consequently, the IPACE system would preferably automatically, systematically, continuously, persistently, conditionally, and/or via/per actor/user-prompt incorporate the known, stated, discerned, and/or relatively perceived trends and/or circumstances into methods of communications attempts, the modes of communications, the series of questions, the manner of asking, and/or the like. For example, if the first participant (e.g. the Lead Inventor) input that the second participant is definitely not going to be able to finish a particular task on-time, satisfactorily, and/or without some help, then the IPACE system would preferably generate a list of suggestions for the circumstance. The list of suggestions may include a list of potential participants where each has a score, scoring rules/logic/factors, and a ranking for, say a relatively likelihood of participating, participating-successfully, participating on-budget, participating on-time, participating-jointly with the second participant, participating-independently of the second participant, and/or the like. Here the first participant may filter and/or weight the scores (e.g. the on-budget factor is relatively less critical than the on-time factor by 3 to 1), scoring rules, logic, factors, and/or the like. Here the IPACE system would likely communicate different questions and in a manner differently than before the circumstances.

In various non-limiting embodiments, the IPACE system would preferably continually monitor and perform analysis for potential circumstances (e.g. budget shortfalls, under-deliver/errors, resource bottlenecks/shortages/delays, project and/or participant changes/modifications, legal issues/law-changes, and/or the like) and determine a list of suggestions relative to the moment and circumstances, where the IPACE system may automatically, conditionally, and/or user-selectively, preform proactive steps to seek out potential back-ups, alternatives, replacements, substitutes, splitting-tasks, reassigning tasks, delegations, novation, role changes, redundancy, work-around, and/or the like. In various non-limiting embodiments, the IPACE system analysis would preferably include a cost-benefit-analysis, relative success, relative valuation effect (e.g. current and future), relative monetization effect (e.g. to licensing, litigation, and/or the like) and/or the like.

For example, the IPACE system analysis may recognize that a particular pool of potential participants for a particular task has dropped relatively dramatically since a particular project started and/or where a particular pool of potential alternatives or backup participants has relatively disappeared. Here the IPACE system could automatically, systematically, continuously, persistently, conditionally, and/or via/per actor/user-prompt begin to seek out potential participants to increase the particular pool of potential participants for a particular task and/or the particular pool of potential alternatives or backup participants. In various non-limiting embodiments, the IPACE system would preferably adjust the methods of communications attempts, the modes of communications, the series of questions, the manner of asking, and/or the like; based upon the relative effectiveness of each, the results could be in the relative increase to the particular pool of potential participants for a particular task and/or the particular pool of potential alternatives or backup participants. In various non-limiting embodiments, the IPACE system would preferably become relatively more selective and challenging as the relative size of the pools grew.

In various non-limiting embodiments, the Todometer analysis would preferably display a relational mapping of scores, components, concerns, tasks participants, communications, and/or the like, to generate a visualization of areas in time, overlapping elements, and/or the like, for relative success based on historical data for the same components, concerns, tasks participants, communications, and/or the like; and/or correlations with other components, concerns, tasks participants, communications, and/or the like; say for the same and/or similar tasks, resources, entities, industries, projects, deadlines, participants, goals, and/or the like.

In various non-limiting embodiments, the Todometer analysis would preferably reorganize and/or reprioritize information, tasks, and/or the like provided to other participants, where the tasks may be tied and/or correlated to communications historically. The IPACE system could generate and display a relationship mapping of how the tasks have been modified overtime and relative to each user. In addition, the IPACE system would preferably monitor and analyzed ongoing participation by participants to relatively discern that the participant is up to speed on the modifications, change of directions, and/or the like, based upon the participants course of actions, communications, documents utilized, terminology utilized, and/or the like.

In various non-limiting embodiments, the IPACE system would preferably prompt the lead inventor and/or the participant who appears relative out-of-step per the recent changes/modifications, and/or the like. For example, typing a particular word for a particular part in a specification, where that particular part has been modified, removed, and/or the like. For example, working on a particular portion of a project that is perceived as relative incongruent with the current tasks, goals, deadlines, urgency, dependencies, and/or the like. In various non-limiting embodiments, the IPACE system would preferably track, analyze, and maintain scores for a participant's relative ability to change directions, follow-directions, effective communicate modifications with others, update existing materials, and/or the like.

As previously noted, the above-noted methods and aspects can be combined with each other, in any suitable combination, in a TODOMETER sub-module of the METER module.

Figure 77:
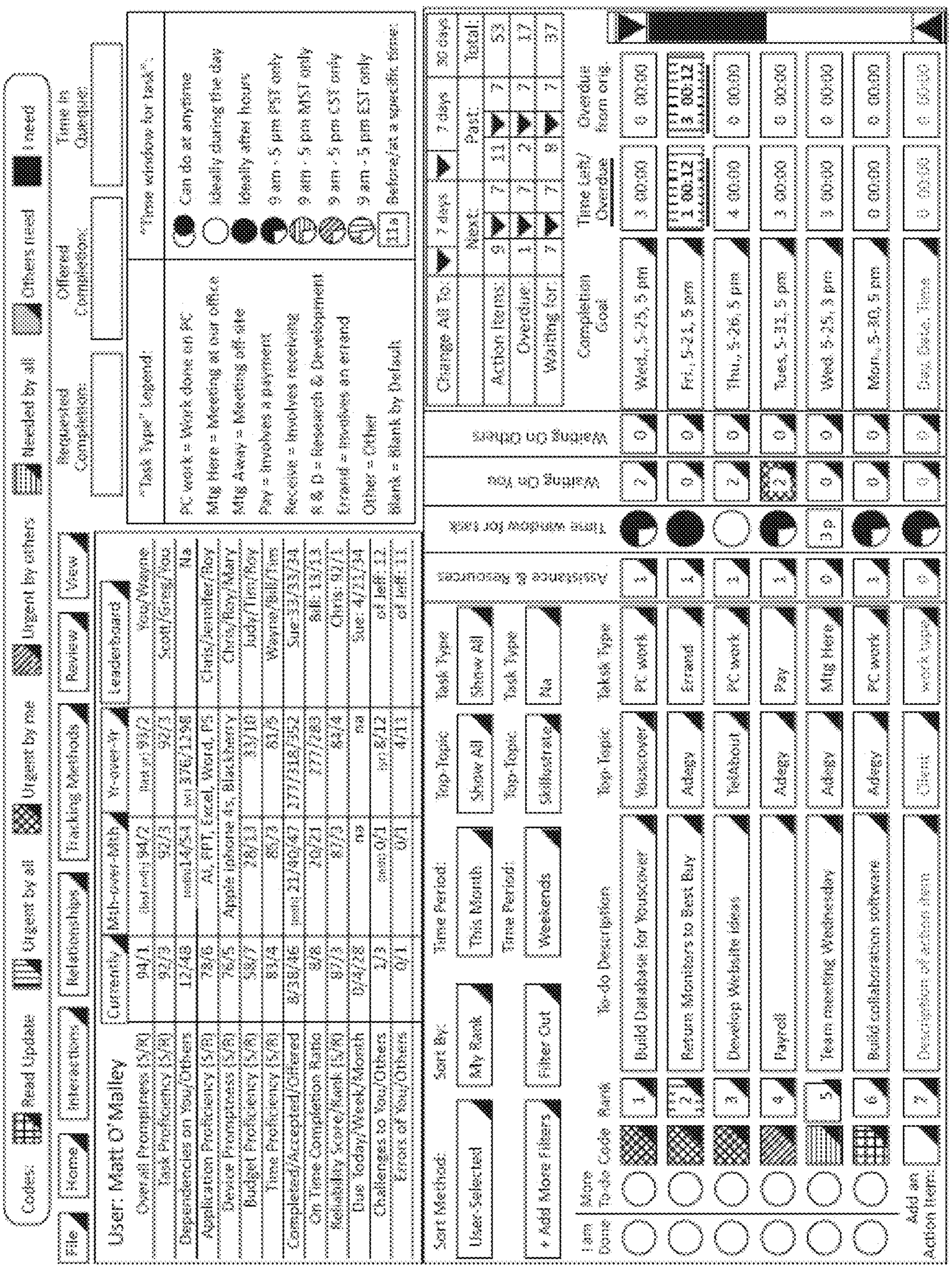

Returning to the figures. FIG. 77 depicts an example embodiment of the IPACE graphical user interface for viewing, tacking, analyzing, and displaying a particular user's activities, tasks, events, calendar, schedule, and/or interactions with other users, where preferably there is a relative timer, score, and ranking applied to a variety of metrics per user, per interaction, and/or the like. FIG. 78*a* depicts an example embodiment of a component of the IPACE graphical user interface for viewing, tacking, analyzing, and displaying a particular user's activities, tasks, events, calendar, schedule, and/or interactions with other users; depicting a relative report per metric. FIG. 78*b* depicts an example embodiment of a component of the IPACE graphical user interface for viewing, tacking, analyzing, and displaying a particular user's activities, tasks, events, calendar, schedule, and/or interactions with other users depicting a variety of filtering and sorting options for tracking tasks.

Figure 79A:
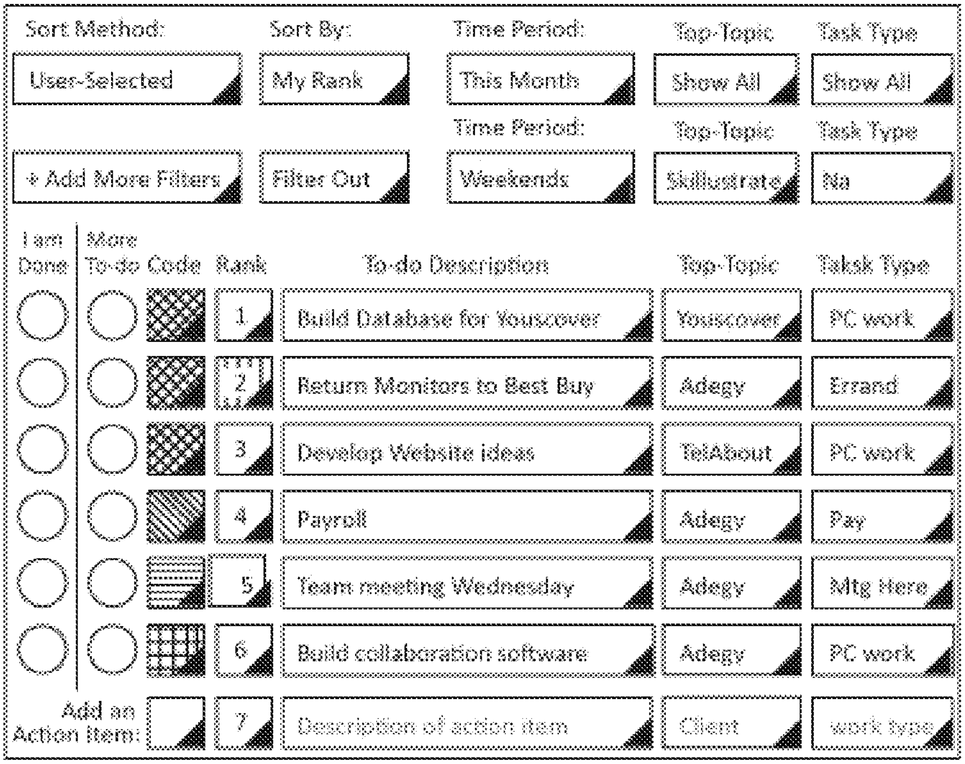
FIG. 79*a* depicts an example embodiment of a component of the IPACE graphical user interface for viewing, tacking, analyzing, and displaying a particular user's activities, tasks, events, calendar, schedule, and/or interactions with other users depicting a variety of filtering and sorting options for tracking tasks (e.g. via Todometer).
Figure 79B:
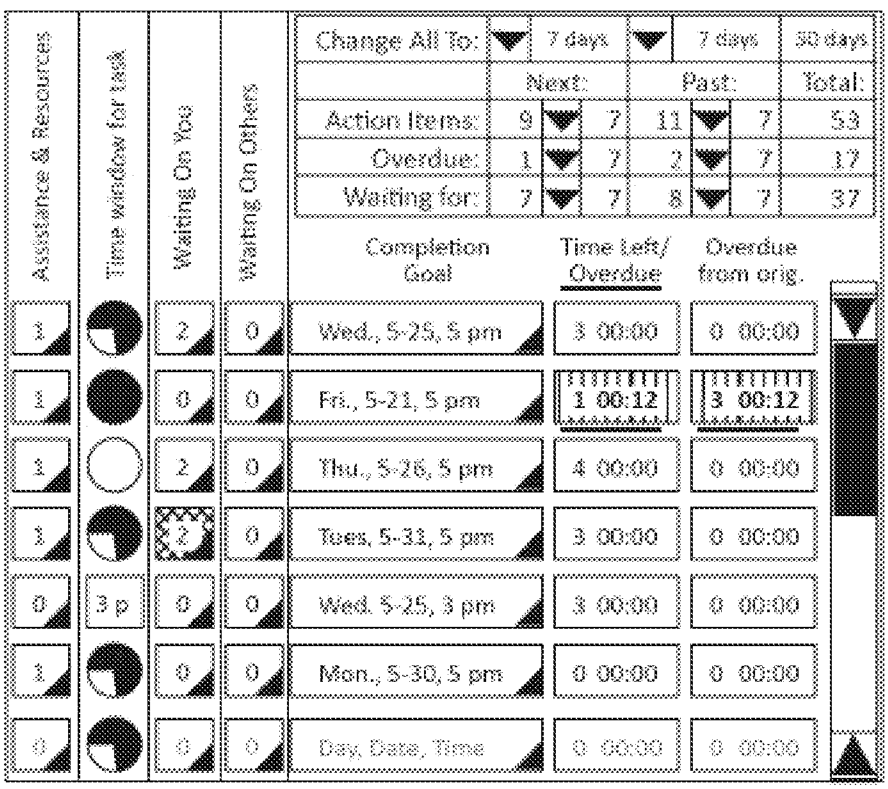
FIG. 79*b* depicts an example embodiment of a component of the IPACE graphical user interface for viewing, tacking, analyzing, and displaying a particular user's activities, tasks, events, calendar, schedule, and/or interactions with other users depicting a variety of tracking, filtering and sorting options for tracking tasks (e.g. via Todometer).

FIG. 79*a* depicts an example embodiment of a component of the IPACE graphical user interface for viewing, tacking, analyzing, and displaying a particular user's activities, tasks, events, calendar, schedule, and/or interactions with other users depicting a variety of filtering and sorting options for tracking tasks. FIG. 79*b* depicts an example embodiment of a component of the IPACE graphical user interface for viewing, tacking, analyzing, and displaying a particular user's activities, tasks, events, calendar, schedule, and/or interactions with other users depicting a variety of tracking, filtering and sorting options for tracking tasks.

Figure 80:
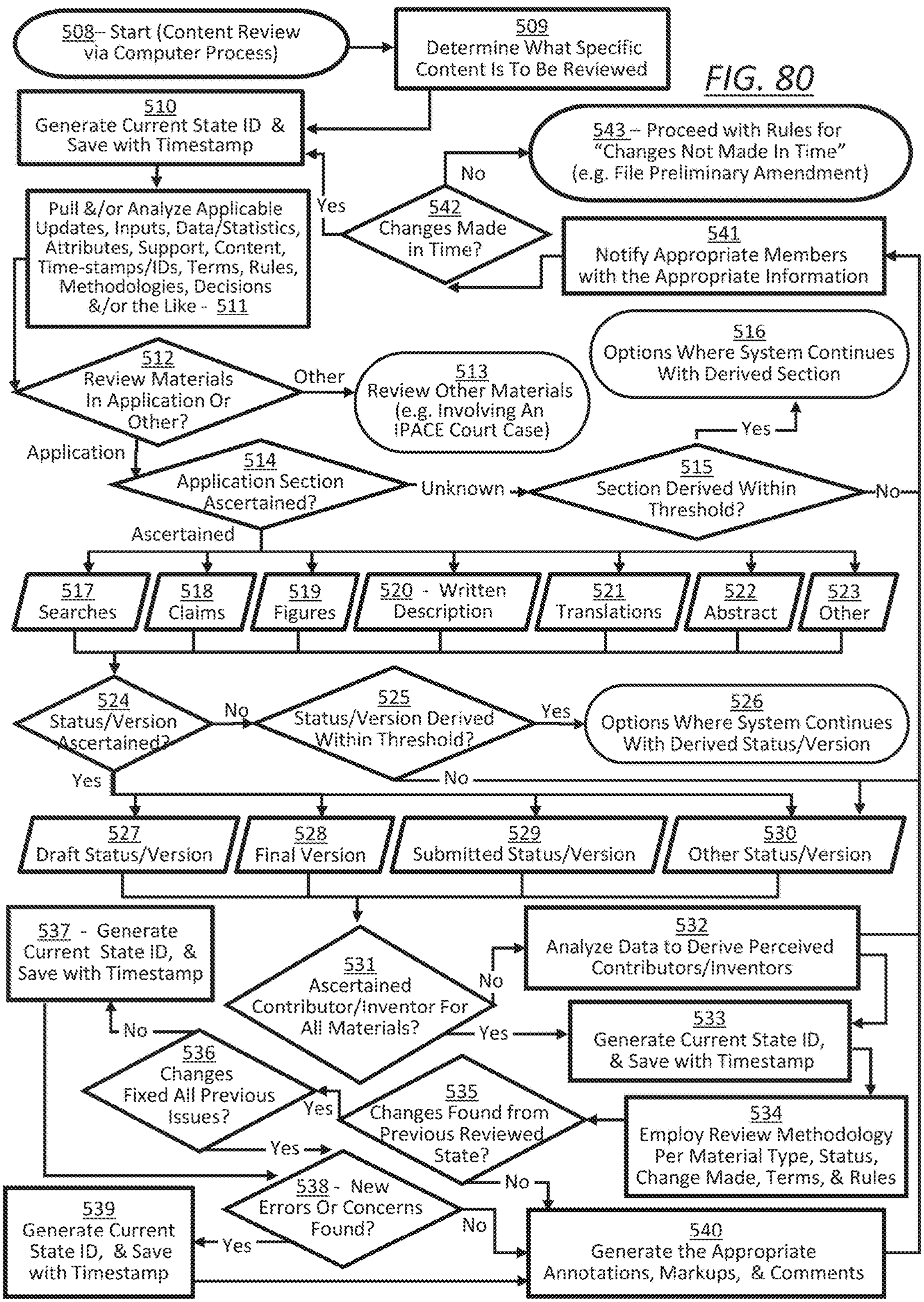
FIG. 80 is a flowchart that depicts a non-limiting embodiment and example of the IPACE system, and associated computer-implemented method regarding a Computer Implement Data/content Review.

FIG. 80 is a flowchart that depicts an embodiment and example of the IPACE system, and associated computer-implemented method regarding a Computer Implement Data/content Review. Starting with a terminal 508 where a "Start (Computer Implement Data/content Review)" function appears, where the IPACE system has been employed to review data/content that has either been created on the IPACE system and/or input into the IPACE system via, say a downloaded document, OCR scan of a hardcopy, fax, or the like; and/or some other type of input data/content, say from video, audio, and/or the like. Next, a step 509 with a "Determine What Specific Data/content Is To Be Reviewed," followed by a step 510 with a "Generate Current State ID and Save with Timestamp," followed by a step 511 where a "Pull &/or Analyze Applicable Updates, Inputs, Data/Statistics, Attributes, Support, Data/content, Timestamps/IDs, Terms, Rules, Methodologies, Decisions, &/or the Like" is performed.

From step 511, a query 512 asks if "Review Materials in Application or Other?" If the answer to the query 512 is "Other," then the IPACE system proceeds to a terminator 513 where a "Review Other Materials (e.g. Involving an IPACE Court Case)" is invoked. Here at the terminator 513, depending on the materials, terms, rules, and the like, the IPACE system may be asked to analyze and review materials from, say a previous and/or on-going IPACE Court Case where the materials have been submitted and are either known-to-be or are perceived to be related to particular case. In various non-limiting embodiments, the review of the materials is similar to the process for reviewing materials submitted by a participant, Contributor (50), inventor, potential participant, and/or the like, or that are perceived to be new materials by the system.

If the answer to the query 512 is instead an "Application," then the IPACE system moves to a query 514 where the IPACE system analyzes the data/content to determine whether the material is from an "Application Section [that is] Known?" If the answer to query 514 is "Unknown," then the IPACE system proceeds to a query 515 that asks if an "[Application] Section [may be] Derived Within Threshold?" where, for example, a particular user has pre-identified the sections and/or a particular section. If the answer to the query 515 is "yes," where the data/statistics analysis creates a score of likelihood to fit a particular application section, where the score surpasses a threshold of confidence and proceeds to a terminator 516 with an "Options Where System Continues With Derived Section." From the terminator 516, the IPACE would proceed similarly to a "known" result back in Query 514, but with an annotation/tag of the derived score of the data/content and where the appropriate Participants (80) may be alerted to intercede, agree, and/or modify the review process of the application section derived by the system. Any correction made may, in turn, be incorporated into the analysis logic and threshold scoring. Further, the materials that are from "unknown" application sections that arrive at query 515 may also be separated into portions of materials where some materials may meet a threshold score of likelihood to be a particular application section, while other sections may not (where the answer is "no") and be passed to a step 541 with a "Notify Appropriate Members with the Appropriate Information," where in this instance the IPACE system may, for example, notify the Lead Inventor (40) of what particular materials were passed along as pertaining to what particular patent section, say a written description and what portion of materials could do create a satisfactory threshold score, where the Lead Inventor (40), may remove the data/content from the review process or resubmit the materials with a "known" section, and/or adjusts the thresholds for deriving data/content where the data/content would create a satisfactory score for a particular section and/or create a new section, say "a table" or "code example" and/or the like.

If the answer to the query 514 is instead "Known," then the IPACE System advances to a list of application section selection/appointment options, which may include a "Searches" 517 section, a "Claims" 518 section, a "Figures" 519 section, a "Written Description" 520 section, a "Translations" 521 section, an "Abstract" 522 section, or an "Other" 523 section, with the latter being meant as a catch-all for the materials that does not conform to the other section options and may be user-defined and/or customizable.

After the IPACE application section appointment (or optionally, as a selection by an IPACE member) of the known "Application Section" from the list of options 517-523, the IPACE system passes the application section to a query 524 which asks if "Status/Version Known?" If the answer to the query 524 is "Yes," where the analysis of the data/content determined the material's status/version to be Known, then the IPACE system moves to a list of Status/Version options, which may include a "Draft Status/Version" 527 option, where, in-general, in this embodiment, the materials are not ready for submission and may include further sub-versions such as a "first draft" or a "second re-write,"; a "Final Version" 528 option, where, in-general, the materials are perceived (e.g. typically designated and attributable to a particular Participant (80) who marked and/or submitted materials as the "Final Version") to be ready for submission to particular party (e.g. IPACE court, PTAB/BPAI, and/or the like), entity (e.g. PTO), or the like; in addition "Final Version" may also be further sub-divided into such delineations as a "final-draft-before-attorney-review," a "final-draft-before-investor-review," and/or the like; a "Submitted Status/Version" 529 option, where, in-general, the materials were submitted to a particular entity, such as the USPTO, and where data/content is in relatively the same state (e.g. save OCR errors and the like) as the materials appear on file, say within the USPTO PAIR system; and an "Other Status/Version" 530 option, which is meant as a catch-all for the materials that do not conform to the other options and may be user-defined and/or customizable. After the IPACE system appointment (or optionally, as a selection by an IPACE member) of the known "status/version" from the list of options 527-530, the IPACE system proceeds to a query 531, which asks if data/content is from a "Known Contributor (50)/Inventor (70) For All Materials?"

If the answer back at the query 524 is instead "No," where the analysis of the materials determined the material's status/version to be unknown, then the IPACE system moves to a query 525 where it analyzes the materials to determine if "Status/Version [May be] Derived Within [a] Threshold?" If the answer to the query 525 "yes," where the data/statistics analysis surpasses a threshold of confidence, then the material proceeds to a terminator 526 where the IPACE system employs "Options In various non-limiting embodiments, System Continues with Derived Status/Version" similar to the "known" results on query 524. If answer to the query 525 is instead "No," where the analysis failed to surpass a threshold of confidence, then the IPACE system proceeds to both the option 530 to proceed with the "Other Status/Version" to continue the remaining analysis and also sends a notice in the step 541 with the "Notify Appropriate Members with the Appropriate Information," where, in this instance, the IPACE system may, for example, notify the known Contributor (50)/Inventor (70) of what particular patent application section materials were passed along, say a flowchart figure, and why the data/content failed to create a satisfactory threshold score, where the known Contributor (50)/Inventor (70) may remove the data/content from the review process or resubmit the materials with a "known" status/version and/or adjusts the thresholds for deriving data/content where the data/content would create a satisfactory score for a particular status/version and/or create a new type of status/version, say "a first-draft for a potential future continuation" or "a first-draft for a potential future continuation-in-part-application" and/or the like; in this example, the IPACE system may recognize the current status of related materials (e.g. the flowchart figure modifications) are part of a currently pending application.

Back to the query 531, which asks if data/content is from a "Known Contributor (50)/Inventor (70) For All Materials?" where if the answer is "No," the IPACE system proceeds to a step 532 where the IPACE system will "Analyze Data/Statistics to Derive Perceived Contributors (50)/Inventors (70)," where the IPACE system creates a list of likelihood scores per the known Participants (80) of particular projects, based upon such factors as when the data/content was created in relation to other data/content created at or around that same time window, who had responsibilities, duties, and/or the like to create such data/content, and/or the like. In various non-limiting embodiments, the IPACE system attaches that scoring data/statistics as to the likely author, Contributor (50), reviewer, inventor, or the like, and both proceeds to a step 533 with a "Generate Current State ID, and Save with Timestamp;" this embodiment also sends a notice in the step 541 with the "Notify Appropriate Members with the Appropriate Information," where based upon the rules the IPACE system, may for example, notify all the Participants (80) with the highest perceived likelihood scores of particular application section so as to determine the author, Contributor (50), inventor, reviewer, and/or like, if relevant. In addition, the IPACE system and/or TOP rules may call for notifying other IPACE members, say the Lead Inventor (40), where he/she may review why the data/content failed to have a known author, reviewer, Contributor (50), inventor, and/or the like; to correct and/or resubmit the materials with a "known" author, Contributor (50), inventor, reviewer, and/or adjusts the scoring rules for improving the ability to derive who authored, contributed, invented, reviewer, and/or the like the data/content.

Back to the query 531, which asks if data/content is from a "Known Contributor (50)/Inventor (70) For All Materials?" where if the answer is instead "Yes," the IPACE system proceeds to the step 533 and then a step 534 with an "Employ Review Methodology Per Material Type, Status, Changes Made, Terms and Rules." From the step 534, the IPACE system proceeds to a query 535, which asks if "Changes Found from Previous Reviewed State?" where the IPACE system analyzes the data/content for any known and/or previous known states to determine what has changed. If the answer to the query 535 is "No," the IPACE system will proceeds to a step 540, which will "Generate the Appropriate Annotations, Markups, and Comments." From the step 540 the IPACE system proceeds to the step 541 where the IPACE system invokes the "Notify Appropriate Members with the Appropriate Information" step.

If the answer back at the query 535 is instead "Yes," then, a query 536 asks if "Changes Fixed All Previous Issues?" where the IPACE system incorporates the "changes found" back in query 535 and analyzes the changes to determine if the changes fixed/corrected all previous issues. If the answer to the query 536 is "Yes," then a query 538 asks if "New Errors or Concerns Found?" where the IPACE system checks for additional errors and concerns after the incorporated "changes found" back in query 535. If the answer to query 536 is instead "No," then the step 537 will "Generate the Appropriate Annotations, Markups and Comments" before continuing to query 538.

If the answer to query 538 is "Yes," then the IPACE proceeds to a step 539 with another "Generate the Appropriate Annotations, Markups, and Comments" before proceeding to the step 540. If the answer to the query 538 is instead "No," then the IPACE system also proceeds to the step 540 where the IPACE system will "Generate the Appropriate Annotations, Markups, and Comments" before continuing to the step 541. From the step 541, the IPACE system proceeds to a query 542 that asks if "Changes [were] Made in Time?" If the answer to query 542 is "no," then a terminator 543 has a "Proceed with Rules for "Changes Not Made in Time" (e.g. File Preliminary Amendment)" terminator, where, for example, the rules may state that if certain changes are not made by a certain person and/or by a certain moment in time, then the IPACE system will automatically take steps, such as file a preliminary amendment. In this example, the rules in terminator 543 could incorporate whether it is timely to file a preliminary amendment, say before the first office action and/or the like. In various non-limiting embodiments, the rules in terminator 543 may also incorporate approvals requirements before filing [such a] preliminary amendment, where say the Lead Inventor (40) and/or a particular attorney would need to review and/or sign off on the filing, and/or where a sufficient amount of funds or a percent of a budget may also need to be readily available and/or approved for the costs and fees to file. If the answer to the query 542 is instead "Yes," then the IPACE system may return to step 510 with the "Generate Current State ID and Save with Timestamp," and where, depending on the IPACE and TOP rules, the IPACE system may then repeat any steps necessary according to the applicable information, data, statistics, terms, and rules.

FIG. 81 through FIG. 83 depict an example embodiment of the IPACE graphical user interface for data/content creation, collaboration, development, and monitoring within the IPACE system, such as where participation roles, permissions, and rights that may be viewed, tracked, and interacted.

Figure 84:
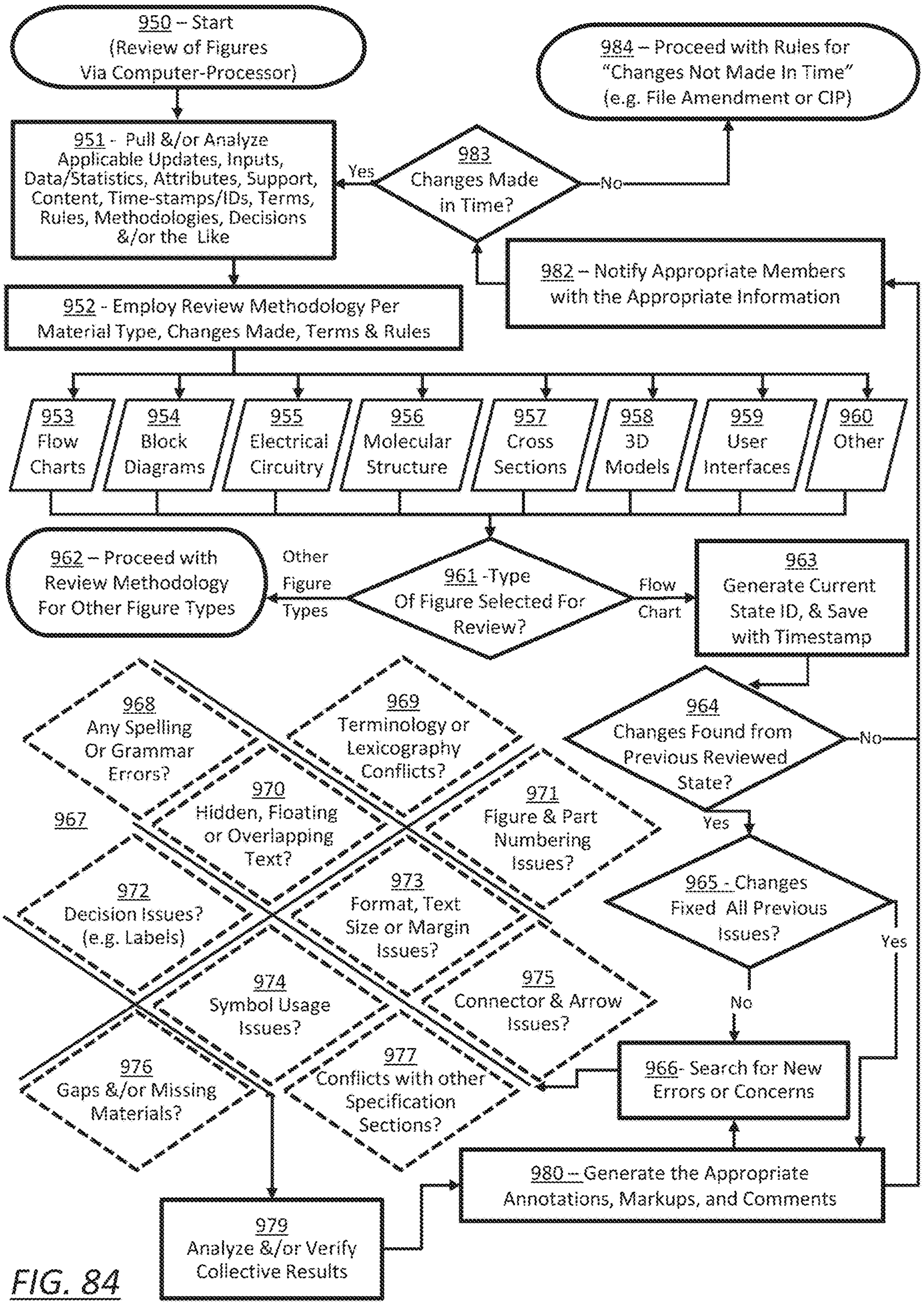
FIG. 84 is a flowchart that depicts a non-limiting embodiment and example of the IPACE system, and associated computer-implemented method regarding a Computer Implement Review of Figures.

FIG. 84 is a flowchart that depicts an embodiment and example of the IPACE system, and associated computer-implemented method regarding a Computer Implement Review of Figures. Starting with a terminator 950 where a "Start (Review of Figures Via Computer Processor)" is executed. Then the process proceeds to a step 951 where a "Pull &/or Analyze Applicable Updates, Inputs, Data/Statistics, Attributes, Support, Content, Time stamps/IDs, Terms, Rules, Methodologies, Decisions &/or the Like" is performed. The process then proceeds to a step 952, where an "Employ Review Methodology Per Material Type, Changes Made, Terms & Rules" is performed.

The process then proceeds to a set of figure options comprising a "Flow Charts" 953 option, a "Block Diagrams" 954 option, an "Electrical Circuitry" 955 option, a "Molecular Structure" 956 option, a "Cross Sections" 960 option, a "3D Models" 958 option, a "User Interfaces" 959 option, and an "Other 957" option. From figure options 953-960 the selection/results are passed to a query 961, which asks a "Type Of Figure Selected For Review?" If the answer to the query 961 is "other figure types (other than flow chart, for this example)," then the process proceeds to a terminator 962, where a "Proceed with Review Methodology For Other Figure Types" is executed.

If the answer to the query 961 is instead "flow chart," the process proceeds to a step 963 where a "Generate Current State ID, & Save with Timestamp" is performed. From step 963, the process proceeds to a query 964, which asks if "Changes Found from Previous Reviewed State?" If the answer to the query 964 is "No," then the process proceeds to a step 982, where a "Notify Appropriate Members with the Appropriate Information" is performed. If the answer to the query 964 is instead "Yes," the process then proceeds to a query 965, which asks if "Changes Fixed All Previous Issues?" If the answer to the query 965 is "Yes," the process then proceeds to a step 980, where a "Generate the Appropriate Annotations, Markups, and Comments" is performed. If the answer to the query 965 is instead "No," the process then proceeds to a step 966, where a "Search for New Errors or Concerns" is performed.

From step 966, the process proceeds to a query pool 967 with queries for errors or concerns comprising a query 968 which asks if "Any Spelling Or Grammar Errors?," a query 969 which asks if any "Terminology or Lexicography Conflicts?, a query 970 which asks if any "Hidden, Floating or Overlapping Text?, a query 971 which asks if any "Figure & Part Numbering Issues?," a query 972 which asks if any "Decision Issues? (e.g. Labels)," a query 973 which asks if any "Format, Text Size or Margin Issues?, a query 974 which asks if any "Symbol Usage Issues?," a query 975 which asks if any "Connector & Arrow Issues?," a query 976 which asks if any "Gaps &/or Missing Materials?," and a query 977 which asks if any "Conflicts with other Specification Sections?" are performed. Further, where each query can be performed individually, consecutively, collectively, in-parallel, automatically, systematically, continuously, persistently, conditionally, and/or actor/user-prompted/selectively.

From query pool 967 (queries 968-977) the query results are passed to a step 979, where an "Analyze &/or Verify Collective Results" is performed. From the step 979 the process proceeds to the step 980, where the process is either looped/cycled (as necessary) back to the query 966 or looped further back to the step 982. From the step 982, the process then proceeds to a query 983, which asks "Changes Made in Time?" If the answer to the query 983 is "Yes," the process then loops back to the step 951. If the answer to the query 983 is instead "No," the process then proceeds to a terminator 984, where a "Proceed with Rules for 'Changes Not Made In Time' (e.g. File Amendment or CIP)" is executed.

FIG. 85 through FIG. 88 depict an example embodiment of the IPACE graphical user interface for data/content creation, collaboration, development, and monitoring within the IPACE system, such as where participation roles, permissions, and rights that may be viewed, tracked, and interacted.

Figure 89:
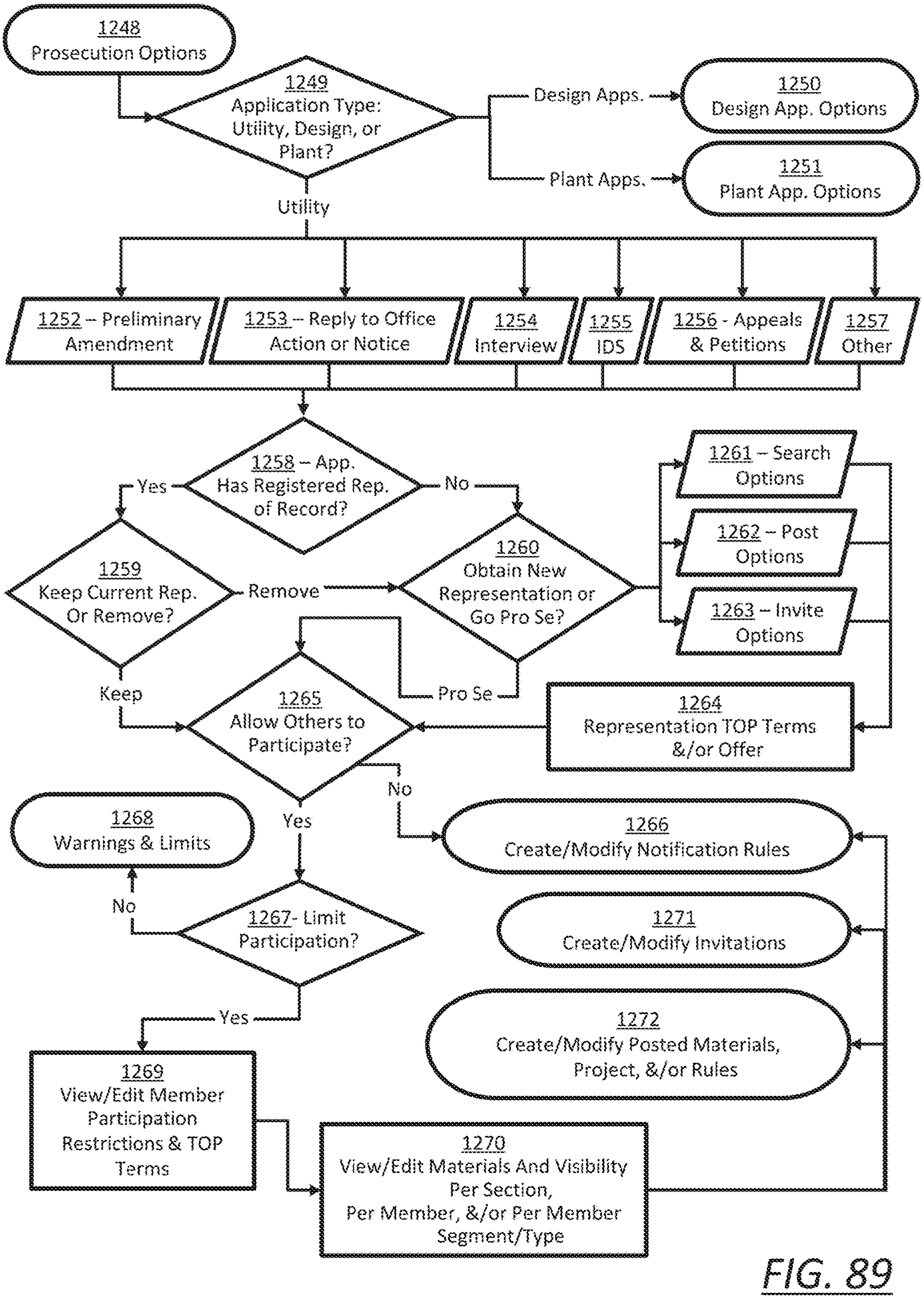

FIG. 89 is a flowchart that depicts an embodiment and example of the IPACE system, and associated computer-implemented method regarding patent prosecution options. Starting with a terminal 1248 where a "Start (Prosecution Options)" function appears, followed by a query 1249 which asks for "Application Type: Utility, Design, or Plant?" If the answer to query 1249 is "Design Apps.," the method proceeds to a terminator 1250 "Design App. Options." If the answer to query 1249 is "Plant Apps," then the method proceeds to a terminator 1251 "Plant App. Options." If the answer to query 1249 is "Utility," then the process proceeds to an option list comprising a 1252 "Preliminary Amendment," 1253 "Reply to Office Action or Notice," 1254 "Interview," 1255 "IDS," 1256 "Appeals and Petitions," and 1257 "Other.

The results from the option list 1252-1257, then proceed to a query 1258, which asks "App. Has Registered Rep. of Record?" If the answer to the query 1258 is "No," the process then proceeds to a query 1260, which asks "Obtain New Representation or Go Pro Se?" If the answer to the query 1260 is instead "Yes," the process then proceeds to a query 1259, which asks "Keep Current or Remove?" If the answer to the query 1259 is "keep," the process then proceeds to a query 1265, which asks "Allow Others to Participate." If the answer to the query 1259 is instead "Remove," the process then proceeds to a query 1260. If the answer to the query 1260 is "Pro Se," the process then proceeds to the query 1265. If the answer to the query 1260 is instead "New Representation," the process proceeds to a set of options: 1261 "Search Options," 1262 "Past Options," and 1263 "Invite Options."

From options 1261-1263, the process proceeds to a step 1264, where a "Representation TOP Terms &/or Offer," is performed. From the step 1264, the process then proceeds to the query 1265. If the answer to the query 1265 is "No," the process then proceeds to a terminator 1266, where a "Create/Modify Notification Rules" is executed. If the answer to the query 1265 is instead "Yes," the process then proceeds to a query 1267, which asks "Limit Participation?" If the answer to the query 1267 is "No," the process then proceeds to a terminator 1268, where a "Warnings & Limits" is executed. If the answer to the query 1267 is instead "Yes," the process then proceeds to 1269, where a "View/Edit Member Participation Restrictions & TOP Terms" is performed. From the step 1269, the process then proceeds to a step 1270, where a "View/Edit Materials And Visibility Per Section, Per Member, &/or Per Member Segment/Type" is performed. From the step 1270 the process proceeds to a set of terminators, where a 1272 "Create/Modify Posted Materials, Project, &/or Rules, 1271 "Create/Modify Invitations and 1266 is executed.

Figure 90:
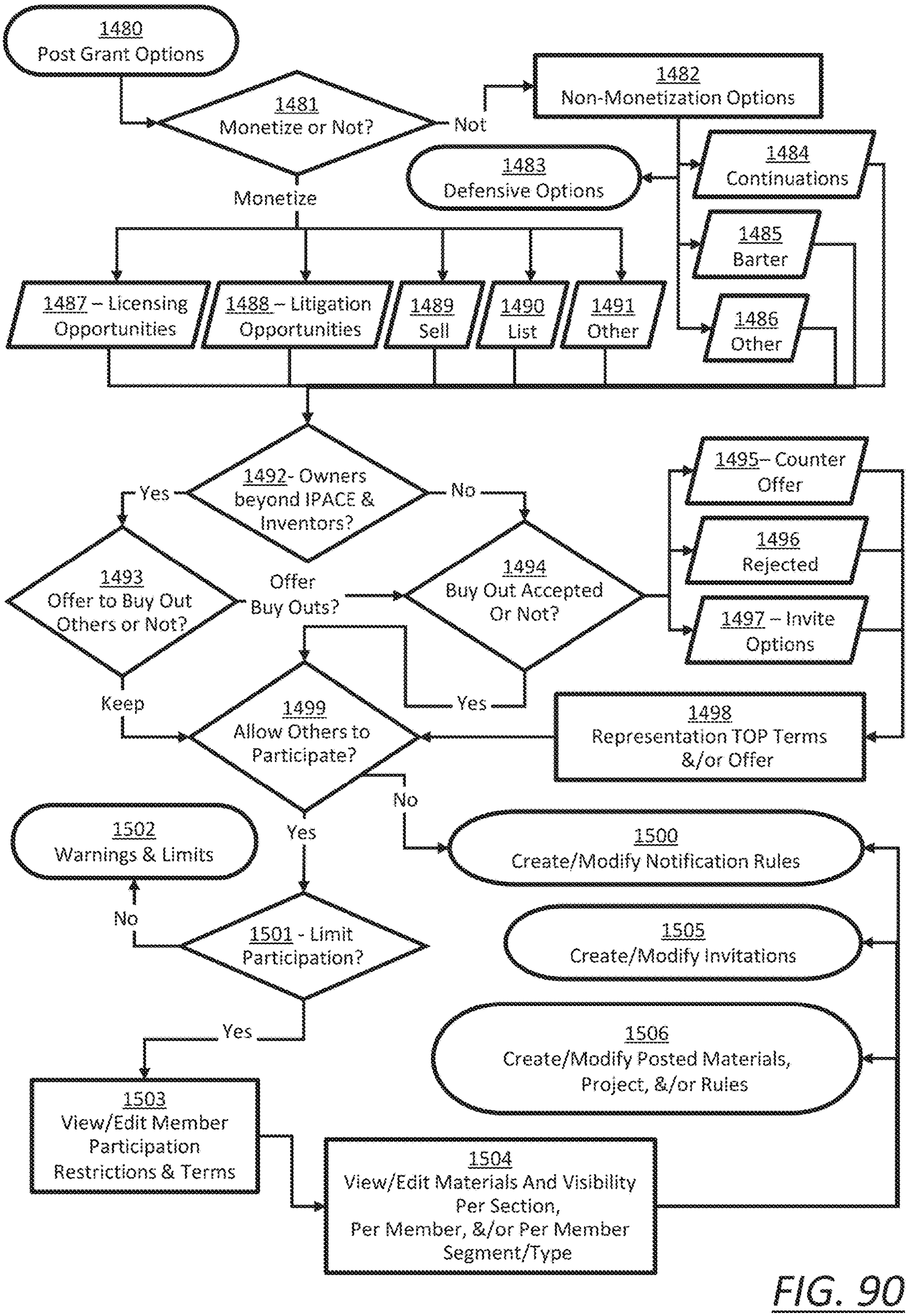

FIG. 90 is a flowchart that depicts an embodiment and example of the IPACE system, and associated computer-implemented method regarding patent post grant options. Starting with a terminal 1480 where a "Start (Post Grant Options)' function appears, followed by a query 1481 which asks whether the goal is to "Monetize or Not?" (see fig).

In various non-limiting embodiments, the IPACE system would analyze data/content (and data/content correlations) automatically (e.g. in existing databases, collected via search/crawls, retrieved, and/or the like), conditionally, and/or user-selected; and to generate a litigation analysis report (e.g. patent litigation analysis report); where the patent litigation analysis report, may incorporate and/or include data, statistics, correlations, patterns, relationships, user-history, lists/rankings, scores, perceptions, challenges, feedbacks, decision, suggestions, comments, options, and/or the like.

In various non-limiting embodiments, the IPACE system would analyze comprises data, statistics, correlations, data/content, and/or the like regarding a relative stage, window, starting point, and/or the like (e.g. Before taking patent litigation case, Before Cease and Desist (C and D); Before filing a complaint in Federal Court; Before Depositions, Markman, Court, and/or the like); a search for correlating art, publications, patents (e.g. pending, granted, abandoned, and/or the like), analysis and correlation beyond "claims" and "inventor," say of keyword analysis of the claims; within a particular art unit; and/or the like. In various non-limiting embodiments, the IPACE system would analyze data and correlations to locate, vet, arrange and/or the like experts, expert witnesses; search and invite experts per areas of expertise; and/or patent litigation experience; and/or the like.

In various non-limiting embodiments, the IPACE system would preferably search and/or crawls internet data/content for art (e.g. prior art) discerned and/or perceived as not available in traditional databases (e.g. PTO, EPO, PCT/WIPO, JPO, and/or the like); search and analyses products/services (e.g. via websites, white papers, articles, blogs, trade show/industry data, postings, PR, financial filings, and/or the like) and generate a database (e.g. similar to say, a PALM-like db, with more data, data correlations, tools, functionality, and/or the like).

In various non-limiting embodiments, the IPACE system would analyze claims (per may described through specification) including for semantics, where a "cellular phone" may also be considered or relatively correlated to: a transceiver; mobile, client, receiver, handheld device, PDA, telephone, phone; and/or relatively correlated to: a telephone, landline, land-line, wired-line, VOIP line, and/or the like. In various non-limiting embodiments, the IPACE system would search for referenced art correlations, and/or mapping relationships; referenced to or from by PTO; discerned and/or relatively perceived as overlooked, missed, and/or the like by the PTO; discerned and/or relatively perceived as improperly overcome, and/or the like; relative claim harvesting opportunities; relative acquisition targets; relative licensing targets, relative litigation targets; and/or the like.

Patent Issuing System and Method

In various non-limiting embodiments, the IPACE system and associated computer-implements methods for interrogating and issuing intellectual property (e.g. a patent issuing system) would preferably allow anyone to contribute data/content disclosures to a decision body (e.g. IPACE Court, and/or USPTO and the like) that specifically interrogates and/or tracks a contributor ID. In various non-limiting embodiments, the interrogating and tracking of the Contributor ID, would be shielded (e.g. accomplished without identifying and/or revealing the Contributor) in a specific way (e.g. who he/she is, who he/she works with/for, history, stats, his/her attorney, address, and the like), a particular means/condition, and/or means without including any identifying information/data. In various non-limiting embodiments, the Contributor ID shielding could be conditional, e.g. until all data/content contributed per a particular project/disclosure/stage has been "discerned" as exhausted for claim creation by a particular system, subsystem, user, group of users, segment of users, and/or the like. In various non-limiting embodiments, there could be a plurality of claim creation/discovering groups/parties (e.g. Conditionally approved IPACE Members and/or PTO examiners) and/or claim creation/discovering bodies (e.g. IPACE, IPACE Court and/or USPTO) competing over points/demerits, status, equity, bonuses, compensation, and/or the like; regarding claim creation/discovery in terms of a broadest claim, a best supported claim, a most referenced claim (e.g. per stage, post grant, and/or the like), a claim created/discovered the earliest in time relative to a similar claim, a claim discovered relatively quickly after the data/content contributed per the particular project/disclosure/stage submission, and the like.

In various non-limiting embodiments, the claim creation/discovery would be limited to existing matters, where a claim contributor/discoverer could not become a Joint-Inventor/Co-Inventor. In various non-limiting embodiments, the claim contributor/discoverer could be a Joint-Inventor/Co-Inventor under certain contributions, timing, conditions, rules, and/or regulations. In various non-limiting embodiments, the claim creation/discovery could be conditionally shielded from certain, specific, and/or particular users/groups/segments/parties/entities (e.g. the applicant, the lead inventor, all inventors, all contributors, all participants, and/or the like.

The current state of the art works relatively backwards for encouraging inventors, more claims, and supporting innovation, and many patents and patent applications are cited for prior art for the specification and not always for a specific claim. Consequently, the current system can be relatively punitive to some inventors, applicants, and/or data/content contributors, where generally the goal is to find reasons and references to invalidate a set of claims instead of offering claims to the rightful inventor when utilized as a reference to reject a subsequent application. Further, the current state of the art/system may also be relatively punitive to the examiners, where an examiner's performance is typically tracked in terms of "disposing applications" and/or associated fees collected, and not on the value of innovation and/or claims granted per his/her domain/art-unit (e.g. in terms of increase in US-GDP per the IP).

Further, the current state of the art system allows examiners to cite and suggest references as anticipated and/or obvious prior art, but where the reference may be, in fact, invalid. In various non-limiting embodiments, the disclosed system would preferably interrogate and analyze each reference for any deficiencies, say a reference cited that is "actor-stated, ascertained, discerned, relatively perceived, and/or predicted" to be missing a claim element/claim element overlap. In various non-limiting embodiments, the disclosed system could shield who, when, how, why, and where such system interrogations and analysis for each reference deficiency may be interrogated, viewed, reviewed, challenged, countered, commented, scored, ranked, tracked, analyzed, incorporated, and/or the like.

In various non-limiting embodiments, the IPACE system would preferably allow for competition for access, interrogating, extracting, viewing, modifying, creating, commenting, challenging, countering, scoring, ranking, tracking, analyzing, incorporating, and/or the like. In various non-limiting embodiments, the competition would preferably include claim creation/discovery. In various non-limiting embodiments, the competition could also be conditionally opened to the public, say to find more claims and/or challenge existing claims, say after a specific amount of time, a specific number of claims in general, a specific number of claims per a particular art unit, a specific number of claims per a particular contributed data/content disclosure date, a specific number of claims per a particular contributed data/content disclosure section (e.g. number of words and/or Figure(s)), and/or a conditional exhaustion acknowledgement by say a particular claim discovering party, a particular claim discovering party supervisor, a particular claim discovering body, a particular claim discovering body's court body, a particular claim discovering body's appeal body, and/or some combination of these.

Claim Issuing Body, System, and Method In various non-limiting embodiments, the current PTO patent examination and claim issuing procedures and system, in part, has an examiner scoring system that appears to encourage PTO examiners (66) to locate materials to reject applications, and therefore may be argued to be more of a punitive system that one that truly encourages innovation. When an application is submitted, the current PTO system searches for potential and perceived prior art to cite as art references for rejection purposes, say for a perceived U.S.C. 102 (e.g. anticipation) or U.S.C. 103 (e.g. obviousness). In some cases, the alleged prior art may not have any overlapping claims or even claim elements, meaning if the alleged prior art is truly "prior art" (e.g. prior to the application from conception to reduction-to-practice and supporting all the claim elements) and a single 102 reference, than that particular application has unclaimed material. Some statute may make it too late to claim the materials with new claims from the single 102 reference. A better system would not seek to limit claimed materials that would have otherwise been allowed if asserted while the patent was still, say "actively pending."

In various non-limiting embodiments, the IPACE system and associated computer-implemented methods would preferably comprise a "claim issuing body" (e.g. the IPACE, the IPACE Court, the USPTO and/or the like, and/or some combination of these), where an issued/granted patent claim could produce a revolutionized, modernized, innovation-encouraging and enhanced patent examination system. In various non-limiting embodiments, the enhanced patent examination system would preferably have a claim issuing procedure and system that is relatively more tracked, interrogated, scored, ranked, and focused on rewarding claims to the proper inventors where there is, say a utility provided, enablement for a PHOSITA, actual novelty versus the present patent examination process with its focus being how to reject a set of claims. In various non-limiting embodiments, the application would not have any claims until the IPACE system and associated computer-implemented methods was provided the resources, data, time, and/or the like, necessary/suitable/appropriate to interrogate, compare, and/or analyze the application against the current state of the art (e.g. patents, applications, publications, records, data, and/or the like) to generate a set of claims to be rewarded to the inventor(s). In various non-limiting embodiments, the process of interrogating, extracting, comparing, and/or analyzing each application against the current state of the art (e.g. patents, applications, publications, records, data, and/or the like) to generate a particular set of claims to be rewarded to the inventor(s) would continue until the life of the patent had expired, extended, and or the like.

In various non-limiting embodiments, the enhanced patent examination and claim issuing system and associated methods would not consider obviousness/non-obviousness initially, conditionally, or ever. In various non-limiting embodiments, the consideration of obviousness/non-obviousness initially, conditionally, or ever, would incorporate and/or be entirely left to the IPACE Court, society, the courts, the court of appeals, PTAB/BPAI, and/or the like.

In various non-limiting embodiments, the enhanced patent examination and claim issuing system and associated methods would ideally be unbiased towards any particular agenda, outcome, party, participant, and/or entity. In various non-limiting embodiments, the enhanced patent examination and claim issuing system and associated methods would preferably provide the proper claim credit to the rightful Inventor. In various non-limiting embodiments, the enhanced patent examination and claim issuing system and associated methods would preferably allow for relatively rapid data/content contributions and interactions, and properly issuing of warranted claims for the full life of the disclosure, where the full life could be, say twenty years, a conditional period (e.g. window of time), a conditional shorter/longer period/window-of-time, and/or the like.

In various non-limiting embodiments, the conditional shorter period (e.g. window of time) could incorporate and/or be based upon a particular scope, volume, mass, and/or the like, score, threshold, condition, ranking and/or the like, within a relatively associated art unit (e.g. a relatively crowded art unit could be set up with shorter periods/time windows). In various non-limiting embodiments, the conditional shorter period and longer period/window-of-time is regarding the amount of years, months, days, minutes, seconds, and/or the like, a particular application/disclosure would be allowed to still create/discover claims from.

In various non-limiting embodiments, the conditional period could incorporate and/or be based upon the number of subsequent applications that cite the application/disclosure, where a particular quantity, relevance, overlap, volume, mass, and/or the like, score, threshold, condition, ranking, and/or the like, within a relatively associated art unit could extend the conditional period or life of the application. In various non-limiting embodiments, examiners, inventors, patent attorneys, patent agents, and/or the like, would be awarded tokens, status, points, credits, conditional period extensions, compensation, equity, bonuses, time-off, vacation time, comp-time, and/or the like, from correctly, accurately, reliably, consistently, and/or like creating/discovering new for an existing disclosure. In various non-limiting embodiments, the discoverer could compete-for, obtain and/or negotiate a reward based upon the valuation of a claim created/discovered from existing applications, materials, and/or the like.

In various non-limiting embodiments, examiners, inventors, patent attorneys, patent agents, and/or the like, would be awarded tokens, status, points, credits, conditional period extensions, compensation, equity, bonuses, time-off, vacation time, comp-time, and/or the like, from properly, correctly, accurately, reliably, consistently, and/or like challenging a particular claim created/discovered by another. In various non-limiting embodiments, the conditional period/window-of-time could affect the amount of years, months, days, minutes, seconds, and/or the like a particular granted patent claim would cover.

In various non-limiting embodiments, the conditional shorter period and longer period/window-of-time is regarding the amount of years, months, days, minutes, seconds, and/or the like, a particular application/disclosure would be allowed to remain open for creating/discovering new claims. In various non-limiting embodiments, the conditional shorter period and longer period/window-of-time is regarding the amount of years, months, days, minutes, seconds, and/or the like a particular application/disclosure would be allowed to remain open for challenging created/discovered claims. In various non-limiting embodiments, the conditional period/window-of-time could affect the amount the amount of years, months, days, minutes, seconds, and/or the like a particular application/disclosure would be allowed to remain open for new claims, life of the granted claims, and/or challenges, could be affected by the relative participation of the inventor, inventors, and/or the like; for example, where the inventor contributes the new claims after some conditional period of time.

The "properly issuing of warranted claims" often depends on one's own perspective; and per the interpretation of terms like "warranted" or "properly," which may be perceived quite differently from, say a PTO examiner (66) who hopes to become an inventor within, say the next three years; to a PTO examiner (66) who may be looking to retire; to a PTO examiner (66) who may hope to work in a law firm within, say the next three years; to a PTO examiner (66) with a JD; to a Patent Attorney (44) without a JD; to a patent applicant from a large entity; to a patent applicant from a small entity; to a patent applicant from a university; to an independent inventor; to a patent holder/owner and/or applicant (e.g. inventor and/or assignee) of an acknowledged piece of cited prior art; to a patent holder/owner and/or applicant (e.g. inventor and/or assignee) of an alleged piece of cited prior art; to a patent holder/owner and/or applicant (e.g. inventor and/or assignee) of a perceived piece of cited prior art; to a PTAB/BPAI Judge, Federal Circuit Judge, and/or similar who considered himself/herself completely non-bias; to a PTAB/BPAI Judge, Federal Circuit Judge, and/or similar who has a pro-inventor-bias; to PTAB/BPAI Judge, Federal Circuit Judge, and/or similar who has an anti-intellectual-property-protection-bias; to an alleged patent infringer from a large-entity; to an alleged patent infringer from a small-entity; and so on.

Today, the PTO and its associated patent application reviewers (e.g. PTO examiners (66), supervisors, and the like.) only issue those claims that the applicant and/or his Patent Attorney (44)/Agent (45) properly submitted for consideration during a patent prosecution phase, where the claims are typically either allowed, restricted, rejected/deleted, rejected/amended, and/or the like. When claims are allowed, it is generally after a series of negotiations employing such things as PTO generated office actions and applicant office action response (e.g. with arguments and/or potential amendments). Responses to PTO office actions may involve an extensive amount of time, costs, resources, attorneys, Experts (75), negotiations/debate, and likely amendments; and where the PTO examiner (66) (or similar: EPO, JPO, and the like examiner) has a relatively far superior databases (e.g. a PALM database/system "Patent Application Location and Monitor;" an OASIS database/system, and an East and a West Search Interfaces/System and/or the like) with a relatively far larger quantity of art/data than the public may access and where the data and art contained is far more current (e.g. with larger visibility of non-published art). Further, the examiner (66) may have access to virtually the entire PTO historical knowledge/databases, and there is obviously a wealth of Patent Prosecution (71) expertise of several well-versed and experienced co-workers at his/her disposal.

Do most inventions and/or the relatively best innovation (e.g. patent claims) come from Large well-funded companies, or small entities and independent inventors? There was a study conducted by the SBA entitled, "An Analysis of Small Business Patents by Industry and Firm Size" in November 2008. Note, that the study cited below utilized the delineating terms "small firms" and "large firms," whereas the PTO uses the delineating terms "small entity" and "large entity." Below are some highlights from that study:

This [SBA] study is the third in a series that examines small business patent activity. The authors created a database of 1,293 technology firms with 15 or more patents issued between 2002 and 2006. These firms are designated as innovative firms because of their high level of patent activity. Using this database, the authors analyze the relative strengths of small and large technology businesses, including information such as the industry and technology within which the firm patents and the importance of the patent. The results demonstrate that small businesses that innovate are indeed special and that the technology they create helps define the cutting edge in a number of industries. The report presents a convincing case that small firms in emerging industries are one of the greatest engines of American economic growth.

Overall Findings

Small firms are a significant source of innovation and patent activity. Small businesses develop more patents per employee than larger businesses, with the smallest firms, those with fewer than 25 employees, producing the greatest number of patents per employee. Furthermore, small firm patents tend to be more significant than large firm patents, outperforming them in a number of categories including growth, citation impact, and originality. Finally, small firms tend to specialize in high tech, high growth industries, such as biotechnology, pharmaceuticals, information technology, and semiconductors.

Highlights

Of the 1,293 firms reviewed in this study, 504 had 500 or fewer employees, 760 had more than 500 employees, and no size information could be obtained for 29 firms. That is, 40 percent of the firms with 15+ patents in the period are small firms. This compares favorably with the 33 percent figure from a previous study by the authors in 2003, and is just slightly below the 41 percent figure from a study by the authors in 2004.

Small firms obtain many more patents per employee than do large firms. This result is quantified to show that this is not a small-firm/large-firm phenomenon, but is actually a firm size issue at all levels. In particular, even within the small firm domain, companies with fewer than 25 employees will have a higher patent-to-employee ratio on average than firms with 50 employees, which will in turn have a higher patent-to-employee ratio than firms with 100 employees, and so on.

Small firm patents outperform large firm patents on a number of impact metrics including growth, citation impact, patent originality, and patent generality. These metrics have been used for decades to measure the innovativeness of firms, labs, and agencies. The metrics have been validated and shown to correlate with increases in sales, profits, stock prices, inventor awards, and other positive outcomes. This suggests that the patents of small firms in general are likely to be more technologically important than those of large firms.

Although small firms make up only 6.5 percent of all the patents in the database, they patent at a higher rate in some technologies, particularly health-related. Ranked by broad technology areas, most small firms fall in health-related technologies (biotechnology, pharmaceutical, and medical devices) and information technology categories (communications/telecommunications, semiconductors, computer hardware and software).

http://www.sba.gov/advo/research/rs335totpdf

In summary, the above referenced SBA study shows that small entities (which the study referred to as: "small firms") obtain many more patents per employee than do large entities (which the study referred to as: "large firms"). The SBA study also shows a correlation with an increase in sales, profits, stock prices, and inventor awards for small entities when relatively compared to large entities, and that small entities are a significant source of innovation and patent activity. Further, small entities develop more patents per employee than larger entities, with the smallest entities, those with fewer than 25 employees, producing the greatest number of patents per employee. Furthermore, the report suggests that small entity patents tend to be more significant than large entity patents, outperforming them in a number of categories including growth, citation impact, and originality.

While some may try to argue whether smaller entities with relatively active patent efforts tend to produce better quality patents and/or superior innovations to those of larger entities, it is difficult to argue that large entities such as IBM, which was awarded more than five-thousand, eight hundred (5,800) patents in 2010, do not have a significant advantage to smaller entities when it comes to their vastly disproportionate amount of dedicated resources, in-house development staff, engineering team sizes, capitalization/budgets, in-house legal, and patent Prosecution (71) experience.

For those small businesses or independent Inventors (70) trying to work on several inventions and prosecute several patent applications simultaneously, in perhaps more than one county, with more than one representative, and/or with more than one language, it may become a nightmare managing all of the PTO (and similar patent office) communications, office actions, and the like. When an applicant files an application or an office action response, he/she has no idea when he/she will hear back the PTO. When an applicant does get an office action for a pending patent application "A," for example, this typically requires the applicant's relatively immediate, urgent, and full attention, therefore interrupting and virtually stopping any progress he/she was currently accomplishing on any potential funding efforts and/or his or her other new invention "X." Consequently, this interruption holds up innovation and potentially precludes this applicant from a warranted patent claim(s) and potentially a significant loss in his/her time/efforts/expenses, if someone else (whether correct or incorrect) successfully argues that he/she abandoned the new invention "X" and/or should someone else happen to file a competing patent "Y" in the interim that was in a first to file environment and with claims overlapping with invention "X."

Further, if the office action for patent application "A" happens to cite references in a foreign language, the applicant will likely need to find a translator, then pay and wait for the translation. Depending on the size of the reference, the languages involved, and/or the urgency, it may cost as much as $20,000 per art reference translation. Further exacerbating this issue is the PTO rule/policy that an applicant may need to explain his/her time usage in diligently developing an invention without unnecessary interruptions, so his/her patent application/invention does not to fall under some sort of perceived "abandonment" issue/concern. And where the applicant does not just need to explain his/her diligent efforts in general, but may need to provide detailed proof for his/her reduction to practice efforts and without a single unreasonable gap in time (some even assert a daily accounting).

Meaning that this relatively active innovator with several inventions in development and patent applications pending, may now have to stop and respond to this office action for patent application "A," but may also be called upon to explain this interruption regarding his/her due diligence to the new invention "X" and any others. Unfortunately, many Inventors (70) are unaware of this policy until asked to produce materials several years later or, in turn, lose some or all of his/her claimed invention. And for those who may be somewhat aware of this policy, he/she may have learned or experienced just how ambiguous and subjective this huge effort may become. In various non-limiting embodiments, its successfulness often depends on many nebulous factors, some beyond the Inventors (70) current control, such as who is the examiner (66) (and supervisor) and what has been their relevant experience, may the applicant locate adequate proof from past computer files, may those files be extracted from old computer to reflect the actual creation dates, are the old hard-drives still bootable, do the old backup drives and/or files reflect the actual creation dates or the backup dates (which is often the case), and so on.

Anyone who has had to go through this concept to due diligence proof process for a pending application that is several years old knows the inordinate amount of time and effort that this may take. And, in the end, even if the applicant succeeds in overcoming the PTO office action with the PTO examiner (66), this mountain of data may be used against the applicant later in, say an invalidity or re-exam challenge. It's hard to imagine the likes of Thomas Edison, who was one of the United States' most prolific Inventors (70) managing to acquire his more than one-thousand patents under such distractions, worries, and time consuming requirements.

When it comes to responding to the office action for patent application "A," the applicant and/or his/her/its representative needs to be extremely carefully to uncover what these referenced pieces of art really are and contain, and whether each truly created anticipation and/or obviousness at the time of the applicant's patent application filing and in regards to someone skilled in that particular art unit where the patent application "A" has currently been assigned by the PTO.

Hopefully this small entity or independent inventor with far fewer resources and far less data access than the PTO examiner (66) may maneuver the back and forth negotiations, examiner (66) interviews, and official office action responses, and/or amendments, without unnecessarily overstating/understanding and/or improperly implying a willingness to concede to any prior art/cited reference, concede some claimed or potentially claimed material, concede some particular claim, a particular claim element, and/or concede any Doctrine of Equivalence ground; or omit some vital information, because the current system seems to be built more around punishing those who do than fostering and promoting innovation. And even for those who do get claims granted, they may find a patent enforcement world full of patent litigators who are paid handsomely, and naturally far more willing, to aggressively try and invalidate the Inventor's (70) issued claims, often digging into, tearing apart, and reinterpreting this same patent prosecution history all over again.

Using an analogy from the rules for a card game of poker, there is a common rule often referred to as the "Cards Speak Rule" or "Cards Speak for Themselves Rule," where any verbal declarations are not binding, the value of a hand is the value of the cards in the hand itself, no matter what anyone declares. For example, if a "Poker Player A" says she has no pair, but in fact she has a flush, her cards speak and her hand is viewed for its genuine value, that of a flush. Likewise if "Poker Player B" says he has a flush, but in fact he does not, his hand is judged on its actual merits, not his verbal declaration.

In an embodiment of the "claim issuing body," it could employ a similar concept as the "Cards Speak for Themselves Rule" where a patent application speaks for itself, and where some, most, all subsequent actions conditionally do not. Meaning, there may be conceivably and conditionally be interactions between the applicant and PTO examiner (66) without the potential of creating prosecution estoppels and/or lack of interactions, without causing abandonment issues.

In an embodiment of the enhanced and/or revolutionized patent examination and claim issuing procedure and system (and computer-implemented methods), anyone could be allowed to contribute data/content to a "secure and controlled IP Repository" (e.g. PTO, IPACE, and/or the like, and/or some combination) as a "declared concept disclosure." In various non-limiting embodiments, the "declared concept disclosure" would be conditionally reviewed by a "claim issuing decision body," where the "secure and controlled IP Repository" also has systems and computer-implemented methods for uniquely identifying and tracking each specific "declared concept disclosure" with a "Unique contributor ID." In addition, a "Contributor Alias ID" and an "Identification Shield" may be created, so as not to reveal the identity of the Contributor (50) in any significant and/or specifically precluded way, e.g. who he/she is, who he/she works with, his/her attorney, his/her past data/content contributions, his/her past "claim issuing decision body" interactions, and the like.

Some applicants, Inventors (70), Patent Attorneys (44), and/or Patent Agents (45), especially working with large entities with significant volumes of patent filings develop relationships with particular examiners (66), supervisors, and/or PTO employees (73), since these larger entities tend to work with the same particular PTO employee (73) and/or similar parties (e.g. EPO staff) repeatedly. Consequently, Patent Attorneys (44) with repeated PTO interactions and PTO relationships may obviously have a number of advantages over an applicant who is filing a patent application for the first time, for an applicant relatively new to a particular art unit, and/or for an applicant relatively unfamiliar with a particular PTO examiner (66); and some have shared these advantages publicly (e.g. articles, podcasts, trade shows). In addition, today, examiners (66) are relatively free to select which applications he/she wants to work on, when, and for how long. Some applications seem to sit for years before even being examined, while other applications within the same art unit may seem to be granted within months and without expedition status.

In various non-limiting embodiments, the "claim issuing decision body" would preferably judge the "declared concept disclosure" purely upon its patentability and not on the applicant and/or associated parties. In various non-limiting embodiments, the "identification shield" is not mandatory for the IPACE system and method to operate, but does create a relatively superior environment for removing any potential bias, favoritism, and/or prejudicial results, when there is nothing significant to identify the data/content Contributor (50), business entity, law firm and/or the like. In addition, there could be a plurality of claim discovering parties (e.g. conditionally approved IPACE Members and/or PTO examiners (66)) and/or claim discovering bodies (e.g. IPACE, IPACE Court and/or USPTO) where each activity and data/content interaction could be time-stamped and tracked. Further, where these plurality of claim discovery parties and/or claim discovering bodies may or may not conditionally compete over points/demerits, status, equity, bonuses, compensation, and/or the like; regarding claim discovery in terms of the broadest claim, best supported claim, most referenced claim, the claim discovered the earliest in time relative to similar claims, the claim discovered relatively the quickest after the contributed data/content disclosure submission, and the like.

Further, the current PTO depositing systems (e.g. EFS-Web) themselves may be quite difficult to interact with, and frustrating when under a deadline. According to a portion of a web posting written by Gene Quinn, who is a Patent Attorney (44); and the President and Founder of IPWatchdog, Inc.; posted on Jan. 14, 2010, and quoting Robert Budens:

" . . . Notwithstanding, pretty much everyone agrees that the USPTO computer systems are not what they should be, and that is "embarrassing." According to Robert Budens, the President of the Patent Office Professional Association, which is an independent union of professional employees formed in 1964 to represent the interests of examiners, classifiers, computer scientists, and other patent professionals who work at the United States Patent and Trademark Office, some within the Patent Office are concerned that the USPTO computer network is "hanging on by bubble gum and bailing wire." Not exactly a ringing endorsement of the state of IT at the agency responsible for innovation! Furthermore, the current EFS system, while thousands of times better than the old EFS system, is exceptionally difficult to use by any honest, operability standards. Saving a PDF to meet the needs of the Patent Office shouldn't be so difficult.

In an embodiment of the "secure and controlled IP Repository," the "secure and controlled IP Repository" could conditionally allow others to view and/or potentially co-mingle data/content with another Contributor's (50) "declared concept disclosure." Here the "secure and controlled IP Repository" could conditionally allow certain parties, applicants, and/or the public to view conditional portions of "declared concept disclosures" within the "secure and controlled IP Repository" and/or interact (submit new material). In various non-limiting embodiments, for example, the initial data/content Contributor (50) of the "declared concept disclosures" could conditionally set, place, add, and/or remove rules to allow viewing and/or the potential co-mingling of data/content with, say, either: all Inventors (70) in general, only Inventors (70) who have issued patent claims from the same art unit (or similar delineation), all applicants in general, only applicants from the same art unit (or similar delineation), all past collaborators of the same Contributor (50), only past collaborators of the same Contributor (50) within the same art unit (or similar delineation), for a particular fee upfront, for a particular fee per added material contribution, for a particular amount of equity, for a particular exchange based upon a predefined future success metric(s), for a particular status, a particular amount of points, during a particular period of time, before or after a particular event, and/or the like, and/or some combination of these.

In addition, others (e.g. IPACE, IPACE Court and/or USPTO) could also conditionally set, place, add, and/or remove rules upon the ability for other particular parties to view and/or potentially co-mingle data/content with another Contributor's (50) "declared concept disclosure" or "a particular portion of declared concept disclosure" within the "secure and controlled IP Repository." For example, a particular "claim issuing decision body" with sufficient authority and where all appropriate appeals to the contrary have been exhausted, could reveal a particular portion of a declared concept disclosure to the specific inventor of what is perceived prior art to the "particular portion of the declared concept disclosure" for his/her/its (a group, collectively its) perception of the perceived prior art's anticipation, obviousness, and/or the like, and/or comments on patentability or the like.

In various non-limiting embodiments, the "secure and controlled IP Repository" would preferably have a stored and evolving list of known or discerned patent inventorships, assignments, and/or ownership overlaps and/or potential conflicts between most, if not all, of the "Unique contributor IDs" (and the "Contributor Alias IDs" where applicable), and where those issues may be appropriately identified, partially revealed, and/or included in cases where the Inventorship, Assignment, and/or Ownership of the "particular portion of the declared concept disclosure" and "the perceived prior art" are either ascertained, discerned, or perceived to overlap and relative by who, where, when, what, why and/or the like.

In various non-limiting embodiments, the specific inventor of what is perceived prior art and in receipt of the ascertained, discerned, or perceived inventorships, assignments, and/or ownership overlaps, would preferably, in turn, validate and/or relatively invalidated/verified each perception to improve the data. In addition, the Inventorship, Assignment, and/or Ownership of the "particular portion of the declared concept disclosure" and "the perceived prior art" may include why particular data/content was not revealed and/or why it was either ascertained, discerned, or perceived to create conflict relative to a particular person, a particular entity, a particular country, and/or the like. For example, while the entire "declared concept disclosure" or a "particular portion of a declared concept disclosure" to a particular invention may be perceived to have prior art of a specific inventor, that specific inventor, could be precluded from the viewing the "declared concept disclosure" if from a foreign country and where the "declared concept disclosure" has not yet been approved for consumption or viewership outside the United States by, say the PTO. For instance, per an IPWatchDog.com article regarding "inappropriate behavior as explained by the USPTO back in July of 2008. The Federal Register Notice explained, in part:"

In various non-limiting embodiments, Applicants who are considering exporting subject matter abroad for the preparation of patent applications to be filed in the United States would preferably be contacted with the current requirements, say below or similar where appropriate.

Bureau of Industry and Security (BIS) at the Department of Commerce for the appropriate clearances. See MPEP § 140 (8th ed., Rev. 5, August 2006). The BIS has promulgated the Export Administration Regulations (EAR) governing exports of dual-use commodities, software, and technology, including technical data, which are codified at 15 CFR Parts 730-774. Furthermore, if the particular invention was made in the United States, technical data in the form of a patent application, or in any form, may only be exported for purposes related to the preparation, filing or possible filing and prosecution of a foreign patent application, after compliance with the EAR or following the appropriate USPTO foreign filing license procedure. See 37 CFR 5.11(c). A foreign filing license from the USPTO does not authorize the exporting of subject matter abroad for the preparation of patent applications to be filed in the United States.

In various non-limiting embodiments, the "secure and controlled IP Repository" would preferably generate, store and evolve a common set of shared terminology and/or lexicography and perceived shared terminology and/or lexicon, where several parties have contributed data/content to the "declared concept disclosure," where the IPACE system would preferably notify the specific data/content Contributor (50) of the perceived lexicography/definitions and the like, for the Contributors (50) to validate or correct definitions, perceptions and the like, to improve the overall data and lexicography/dictionary. In various non-limiting embodiments, the IPACE system would preferably provide areas (e.g. words, terms, symbols, numbers, acronyms, and the like) of perceived relative agreement to areas of perceived relative anomalies and/or contradictions.

In various non-limiting embodiments, the "secure and controlled IP Repository" would preferably generate, store and evolve a common lexicography, terminology, acronym usage and definitions, semiology, etymology, symbology, encyclopedia, and the like per art unit that would be modified per application with any uniquely defined terms and/or acronyms usage for either just a particular application, all related applications, say, with a common priority application, and/or the entire art unit, if deemed desirable, applicable, accurate, and reasonable. Similar to the IPACE system notifications for the perceived lexicography/definitions and the like, sent to the Contributors (50) to validate or correct definitions, perceptions and the like, to improve the lexicography/definitions and the like, for the "declared concept disclosure," a similar process, notification, and validation process could notify any data/content Contributor (50) of overall data and lexicography/dictionary per art unit for similar validations, suggested changes, and/or improvements.

In various non-limiting embodiments, the interactions between the "claim issuing decision body" and the applicant and/or his/her representative may be necessary, but under this particular embodiment, it preferably would not have to occur until after the "declared concept disclosure" has been conditionally exhausted for claims.

After the "declared concept disclosure" has been conditionally exhausted for claims, the "declared concept disclosure" could be put through a series of subsequent stages for other parties to discover claims, where those who discover claims are rewarded and/or conditionally rewarded.

In various non-limiting embodiments, each member (e.g. examiner (66)) of the "claim issuing decision body" could have his/her compensation, points, status, and/or the like, influenced by claims he/she is associated with issuing. For example, a particular issued claim associated with a cure for cancer could be attributed with a score from Peers (65), Experts (75), and/or a panel of judges, and based upon a perceived and/or established novelty, a perceived and/or established benefit for clinical research, a perceived and/or established benefit to society as a whole, and/or the like. In addition, points could be lost or demerits applied where the patent and associated claims were perceived to be unnecessarily held up by a particular party or member of a group or delayed in subsequent challenges by PTO (e.g. PTAB/BPAI, re exams, and/or the like), by others Patent offices, countries, companies (e.g. re-exam inter parties), and/or the like, versus issuing a patent claim earlier.

However, points may be lost, later removed, or modified where the claims prove to have little value in the marketplace (e.g. a supposed cure portion for baldness), or the product or market never materializes. Scoring adjustment may be made between industries where results are relatively more difficult to ascertain and/or take relatively longer to assess. However, the members of the "claim issuing decision body" could be assigned to art units where all members are competing under the same rules and challenges.

Points may be tabulated and awarded for success, e.g. locating valid claims, improving submitted claims, and/or points are subtracted for claims later found to be invalid, weak, poorly drafted, and/or the like. In various non-limiting embodiments, the examiner (66) would be compensated upon his/her points, where the points could run for the life of the patent or some similar system, where compensation could also be derived. In addition, points could be gained and modified where the patent and associated claims were perceived and later determined to be necessarily held up by a particular party, or member of a group, or delayed in subsequent challenges by PTO (e.g. PTAB/BPAI, re exams, and/or the like), by others Patent offices, countries, companies (e.g. re-exam inter parties), and/or the like, as found prior art was proven to be relevant.

In various non-limiting embodiments, this patent granting system and its associated point system could be offered on a limited basis to, say to those examiners (66) who have demonstrated good experience and/or knowledge, say in a particular art unit. Further this system could be setup to compete with and/or run independently of the current patent examination procedures. For instance, the traditional examination process could run concurrently where members of patent granting system could be viewing patents at the same time, patents in the backlog, and/or patents in the "secure and controlled IP Repository." Certain member of patent granting system could conditionally be allowed to freely rotated among any art unit he/she desired, and/or be assigned and rotated to help determine areas of expertise and/or help backlogs Three-Dimensional (3D) Submissions What's needed is a dynamic set of classifications and sub classifications where some iteration and/or number of improvements creates a new classification and\or subclass that is available relatively quickly to the public and in a highly sortable tool with relatively easy navigation and user-friendly UI that has a variety of search methodologies in addition to text-based search, say where someone (e.g. an IPACE member) could enter a particular 3D shape and the search system would produce results within all the categories, classifications, and subclasses associated with that shape followed by, say the number of results per category, classification, subclass and/or the like. In various non-limiting embodiments, then the IPACE member could continue to narrow the results by say, either selecting a category, entering a keyword or term, entering another 3D part, and/or the like and see the list of results.

Further the IPACE member could utilize virtual space to position the perceived ideal relative position, interaction, location, and/or the like, between the two parts, along with parameters for, say tolerance threshold where a specification could be expressed, say with a plus or minus X value, or without any limitation, say for the color, and where a range of materials could be listed for the part, so the search could incorporate these new elements and display a list ranking art with similar parts and specifications. In various non-limiting embodiments, the display would also include any art and elements that are discerned and/or perceived as relatively close. In various non-limiting embodiments, the IPACE system would preferably also display a list of questions to the IPACE member/user that would best reduce the list based upon terms, shapes, materials and/or the like, among the result's data clusters and relationships.

In various non-limiting embodiments, this dynamic art category, classification, and subclasses, along with component relationship search, would preferably provide benefits and be utilized for IP art, but also for creating art in general, news, life and the like. In various non-limiting embodiments, each new category, classification, subclass, concept, part/step, part/step element, search, may be given a unique identifier that is tracked and stored along with all the associated perceived, discerned, and known attributes regarding who, what, where, why, when, and where the search went next, what was done, when, by who (e.g. inventor, patent attorney, examiner, reporter, predictor, publisher, consumer and/or the like), and/or the like, for future relationship comparisons. Some data could remain and/or be selectively hidden, say during a development stage, filing stage, application pending stage, and/or the like.

Novelty Monitoring

In various non-limiting embodiments, the IPACE system and the associated computer-implemented method would preferably monitor and analyze inputs, data/content, data/content correlations and/or the like, for a relative uniqueness of each word(s), sentence structure, and/or the like. In various non-limiting embodiments, the analysis may include and/or incorporate filtering for, say, a subject, time of day, author, inventor club, and/or the like. In various non-limiting embodiments, the analysis may also include a novelty per a discernible set of data, statistics, and/or the like, factor. In various non-limiting embodiments, the analysis of the discernible set of data, statistics, and/or the like, may include other inventions within that field of invention, industry, art unit, and/or the like. In various non-limiting embodiments, the IPACE system searches to find similar words, sentence structures as a particular user types, to determine the novelty and apply analysis and algorithms to the likelihood of patentability, based on comparable data/statistics, comparable patents denied, comparable patent granted within the same field, art unit, and/or outside, including any relevant and comparable data structure in figures, sentences, and context along with the associated success rates for grant versus examiner (66) challenges.

In various non-limiting embodiments, the novelty monitoring and analysis may incorporate an indexed pre-analysis where a variety of data/content may be analyzed, scored, ranked, indexed, and/or the like, in advance, and where the pre-analysis may be continually improved per data/content modification, user input, and/or the like. In various non-limiting embodiments, the variety of data/content may comprise such items as, an applications, specification, written description, abstract, claim, figure, publications (e.g. patents, blogs, websites, white papers, speeches, recorded events, and/or the like, worldwide with translations, if necessary), images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like); 3D objects, animations, and/or the like (e.g. with object, imagine, cell, and/or frame-by-frame with analysis and comparisons for both audio and images, and not necessarily sequentially compared); audio, video, and/or the like (e.g. with speech to text conversions, and image, facial, scene, and/or the like); and/or the like.

Retaining Data/Content as Trade Secrets

In various non-limiting embodiments, the IPACE system gives selective members visible access to application preparations, a pending applications, and/or the like, where these members may selectively withdraw data/content, elements, and/or the like (e.g. to retain as a trade secret), say prior to publication and/or if not claim dependent. For example, the IPACE system would preferably highlight data/content perceived as novel but not claimed, and where the IPACE system analysis may generate a score for a perceived enforcement cost per perceived novelty item. For instance, some novel elements may be perceived relatively more difficult to infringe, such as a narrow claim for a manufacturing method when relatively compared to all claims, and/or a specific claim, say a relatively broad system claim for a product in a popular industry and/or art unit; or say novel component where it appears difficult to pinpoint a single infringer, and/or the like.

Classifications

Most inventors have relatively little inclination as to where a new patent application (with no prior lineage) will exactly and ultimately end up in the PTO classification prior to filing. In various non-limiting embodiments, the IPACE system and associated computer-implemented methods would preferably provide a plurality of locations, where one patent application could have several correlations, and where each correlation had an existing category or the IPACE system would automatically generate one.

In various non-limiting embodiments, one patent application could appear in hundreds or even thousands of classifications and subclasses. For example, there could be different subclasses regarding such distinctions for subclasses, as applications pending prior to a first office action; applications pending post of first office action, applications pending post a non-final office action, applications abandoned, applications with a notice of allowance, applications with a pending petition, applications with a pending appeal, and/or the like. In various non-limiting embodiments, the classifications and subclasses could also include, incorporate, and/or be tags.

If an inventor knew the exact classification (and where classifications were relative highly delineated to a wide array of subclasses say, where the lowest level did not contain more than fifty (50) patent references (and where word lexicons and semantics have been mapped-out), then it would be relatively far easier to for the inventor to locate and relatively discern the current state of the art and competitive landscape.

Problem with IP prior art searching and examination comes from classifications. If any person, say an inventor, could relatively easily locate, say the ten (10) patents most relevant to a particular aspect of his/her invention in matter of minutes (if not seconds), then the inventor could spend his/her time improving the field vs. the next, say 1-24 months developing a concept that may already partially or fully exist.

For years organizations and patent examining bodies, e.g. the USPTO, have tried to create standardize classifications only to have them become outdated before they are even instituted. So the PTO has databases and tools to create correlations and pattern recognitions to aid the examiner in locating other art, but that's far too late, after the inventor and/or entity has typically spent a relatively large amount of time, energy, resources, and sum of money creating, designing, testing, and applying for the concept in the application, and now more time and resources pursuing and prosecuting the concept.

3D Models and Classifications

In various non-limiting embodiments, the IPACE system would preferably allow and/or systematically generate three-dimensional models for existing, pending, granted, abandon, and/or the like intellectual property. Similar to 3D landscape, where the user may visually maneuver a particular neighbor to relatively better comprehend the relative placement, arrangement, interworkings, relationships, correlations, nuances, details, value, shortcomings, and/or the like; the user of the IPACE system would preferably visually maneuver through a defined search result of intellectual property and correlated data/content. In various non-limiting embodiments, the IPACE system would preferably generate physical models of ever patent component, where the user could fly over, through, combine, and/or the like. In addition, where the user may limit, arrange, rearrange, scale, move, transform, and/or the like, each component, object, connection, and/or the like materials..

ADSTATS Management (124) module.

Figure 91:
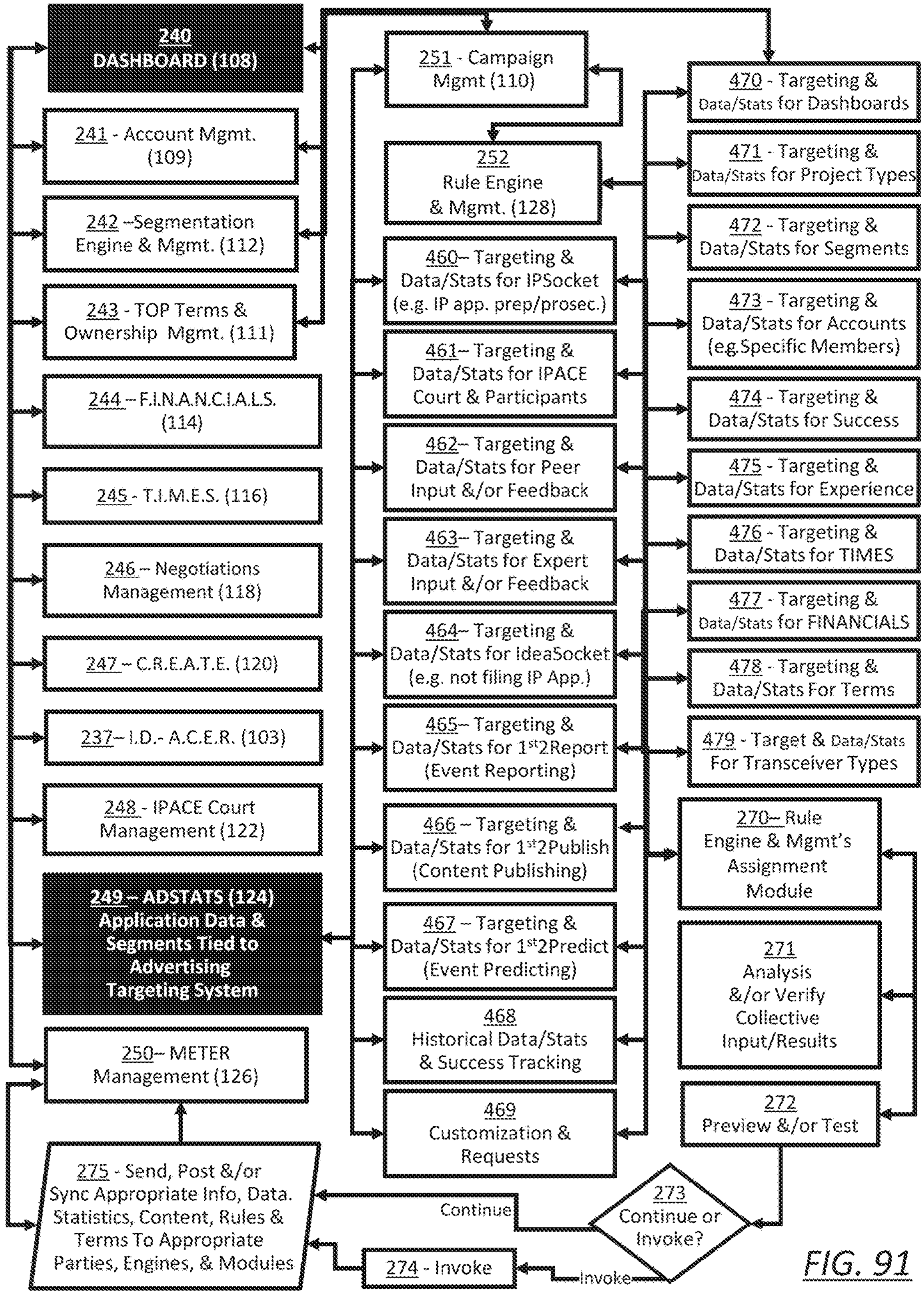

FIG. 91 is a block diagram with some flow charting steps depicting an embodiment of the IPACE member's functionality from the ADSTATS Management (124) module. Starting with the Dashboard (108) in the block 240, where similar to the TOP Terms and Ownership Management figure, the IPACE system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Project, etc.)."

In various non-limiting embodiments, the user of ADSTATS (124) (Application Data and Segments Tied to Advertising Targeting System) module would preferably require the role, and/or at least equivalent to the same permissions required to be a Negotiations Mgr. In various non-limiting embodiments, the Negotiations Mgr. utilizes the Negotiations Management (118) module to view, review, create and/or modify criteria requirements or rules generally related to negotiations and/or similar element (e.g. accepting, rejecting, countering, appealing) for a particular Project or Project element to be used in, say a particular P.A.C. (104) and/or a particular P.I.N. (106).

In various non-limiting embodiments, the Dashboard functionality in this "ADSTATS" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "C.R.E-.A.T.E." (120) module in a block 247, the "ID-ACERS" (103) module in a block 237, the "IPACE Court Management" (122) module in a block 248, the "ADSTATS" (124) module in a block 249, the "METER Management" (126) (including Knowledge Management) module in a block 250, the "Campaign Management" (e.g. Project Management) (110) module in a block 251, and the "Rule Engine and Management" (128) module in a block 252.

In various non-limiting embodiments, the Dashboard functionality in this "ADSTATS" focused embodiment further comprises a "Targeting and Data/Statistics for IPSocket (IP app., prep/prosecution)" module in a block 460, a "Targeting and Data/Statistics for IPACE Court and Participants" module in a block 461, a "Targeting and Data/Statistics for Peer Input and/or Feedback" module in a block 462, a "Targeting and Data/Statistics for Expert Input and/or Feedback" module in a block 463, a "Targeting and Data/Statistics for IdeaSocket (non-IP Creating)" module in a block 464, a "Targeting and Data/Statistics for 1$^{st}$2Report (Event Reporting)" module in a block 465, a "Targeting and Data/Statistics for 1$^{st}$2Publish (Data/content Publishing)" module in a block 466, a "Targeting and Data/Statistics for 1$^{st}$2Predict (Event Predicting)" module in a block 467, a "Historical Data/Statistics and Success Tracking" module in a block 468, and a "Customization and Requests" module in a block 469.

In various non-limiting embodiments, the Dashboard functionality in this "ADSTATS" focused embodiment further comprises a "Targeting and Data/Statistics for Dashboards" module in a block 470, a "Targeting and Data/Statistics for Project Types" module in a block 471, "Targeting and Data/Statistics for Segments" module in a block 472, "Targeting and Data/Statistics for Accounts (60) (e.g. Specific Members)" module in a block 473, "Targeting and Data/Statistics for Success" module in a block 474, a "Targeting and Data/Statistics for Experience" module in a block 475, a "Targeting and Data/Statistics for T.I.M.E.S." module in a block 476, a "Targeting and Data/Statistics for F.I.N.A.N.C.I.A.L.S." module in a block 477, a "Targeting and Data/Statistics for Terms" module in a block 478, a "Targeting and Data/Statistics for Transceiver Types" module in a block 479, the "Rule Engine & Mgmt's Assignment Module" in the block 270, the "Analysis &/or Verify Collective Input/Results" and the "Preview &/or Test."

See FIG. 91 where a query 273 asks if the IPACE Member would like to either "Continue or Invoke?" the rule? If the answer to query 273 is "Continue," as in continue utilizing the Dashboard functionality without invoking the rule, then a next step 275 with a "Send, Post and/or Sync Appropriate Info, Data, Statistics, Data/content, Rules and Terms to Appropriate Parties, Engines and Modules" is performed, where the IPACE user may continue utilizing the Dashboard. If the answer to query 273 is instead "Invoke," then a step 274 is invoked for the particular rule, then the next step 275 with a "Send, Post and/or Sync Appropriate Info, Data, Statistics, Data/content, Rules and Terms to Appropriate Parties, Engines and Modules" is performed where the IPACE user may also then continue utilizing the dashboard.

Figure 92:
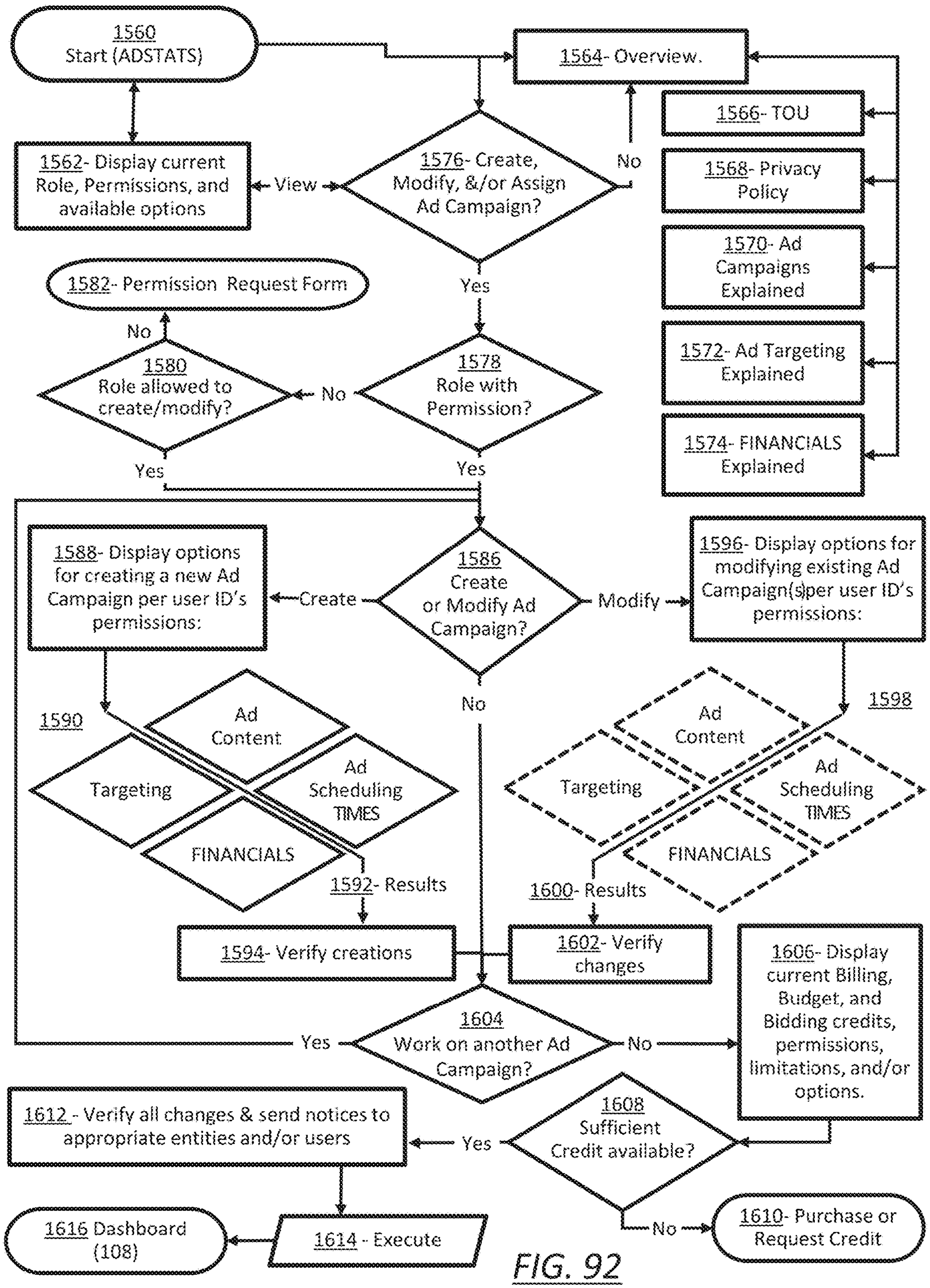

FIG. 92 is a flowchart depicting an embodiment and an example whereby the ADSTATS MGR may utilize the ADSTATS module to create and/or modify a particular Campaign 236 with target advertising. Starting with a step 1560 the "ADSTATS" module allows the user the option to view an "Overview" 1564 function, whereby the user has the option to select and view a "TOU" 1566, a "Privacy Policy" 1568, an "Ad Campaigns Explained" 1570, an "Ad Targeting Explained" 1572 and/or a "FINANCIALS Explained" 1574.

A function 1562 with a "Display current Role, Permissions, and available options" will tell the user what he/she may or cannot view, access, create and/or modify. Generally the Account 60 user who is designated as the ADSTATS MGR would be the primary user of the ADSTATS module, but other Account 60 users who are granted equal permissions as the ADSTATS MGR may also use the ADSTATS module and/or some Account 60 users may be given limited access and/or for a limited time. From the terminator 1560 the Account 60 user may advance to a query 1576 that asks if he/she wants to "Create, Modify, and/or Assign Ad Campaign?" where if the answer is "no" the user is passed to the Overview 1564 function. If the answer to query 1576 is simply "view" the user is passed to the 1562 function, but if the answer to query 1576 is instead "yes" then Account 60 user advances to a query 1578 that asks if the user has a "Role with Permission?" 1578 to proceed.

If the answer to query 1578 is "no" the user is passed to a query 1580 that asks if a "Role allowed to create/modify?" where if the answer is "no" the user is passed to a terminator 1582 with a "Permission Request Form" where the user may request permission from the appropriate users within the Account (60) who may make such changes. If the answer to query 1580 is "yes" the user is instead passed to a query 1586, which asks the user if he/she wants to "Create or Modify Ad Campaign?"

If the answer back at query 1578 is "yes" the user is also passed to the query 1586. If the answer to query 1586 is "no" the user is passed to a query 1604 which asks the user if he/she would "Work on another Ad Campaign?" If the answer to query 1586 is "Modify" the user is passed to a function 1596 with a "Display options for modifying existing Ad Campaign(s) per user ID's permissions:" If answer back in query 1586 is "Create" then the user is passed to a function 1588 with a "Display options for creating a new Ad Campaign per user ID's permissions:" where the user advances to an option pool 1590 section which the options of an "Ad Data/content" option, a "Targeting" option, an "Ad Scheduling TIMES" option, and a "FINANCIALS" option where the cumulative selections appear in a results 1592 and are passed to a "Verify creations" 1594 function.

An option pool 1598 section which the options for modifying existing Ad Campaign works very similar to option pool 1590, but it generates a list options based upon existing Ad Campaigns and the user's ID permissions; where the cumulative selections appear in a results 1600 and are passed to a "Verify changes" 1602 function. Both verification functions 1594 and 1602 get passed to the query 1604 where if the answer to query 1604 is "yes" the user gets sent back to the query 1586. If on the other hand, the answer to query 1604 is "no" the user gets passed to a function 1606 with a "Display current Billing, Budget, and Bidding credits, permissions, limitations, and/or options."

From function 1606 the user gets passed to a query 1608 which asks if he/she has "Sufficient Credit available?" to execute the desired selections. If the answer to query 1608 is "no," the user is passed to a terminator 1610 with a "Purchase or Request Credit" functionality. If on the other hand, the answer to query 1608 is "yes" the user is passed to a function 1612 with a "Verify all changes and send notices to appropriate entities and/or users" where such users might be other IPACE MGRS within the same Account (60) and/or from other Accounts (60). From function 1612 the user passes to an "Execute" 1614 function to execute all the decisions collective made (e.g. results) and then the user passes back to the Dashboard (108) with a terminator 1616.

Figure 93:
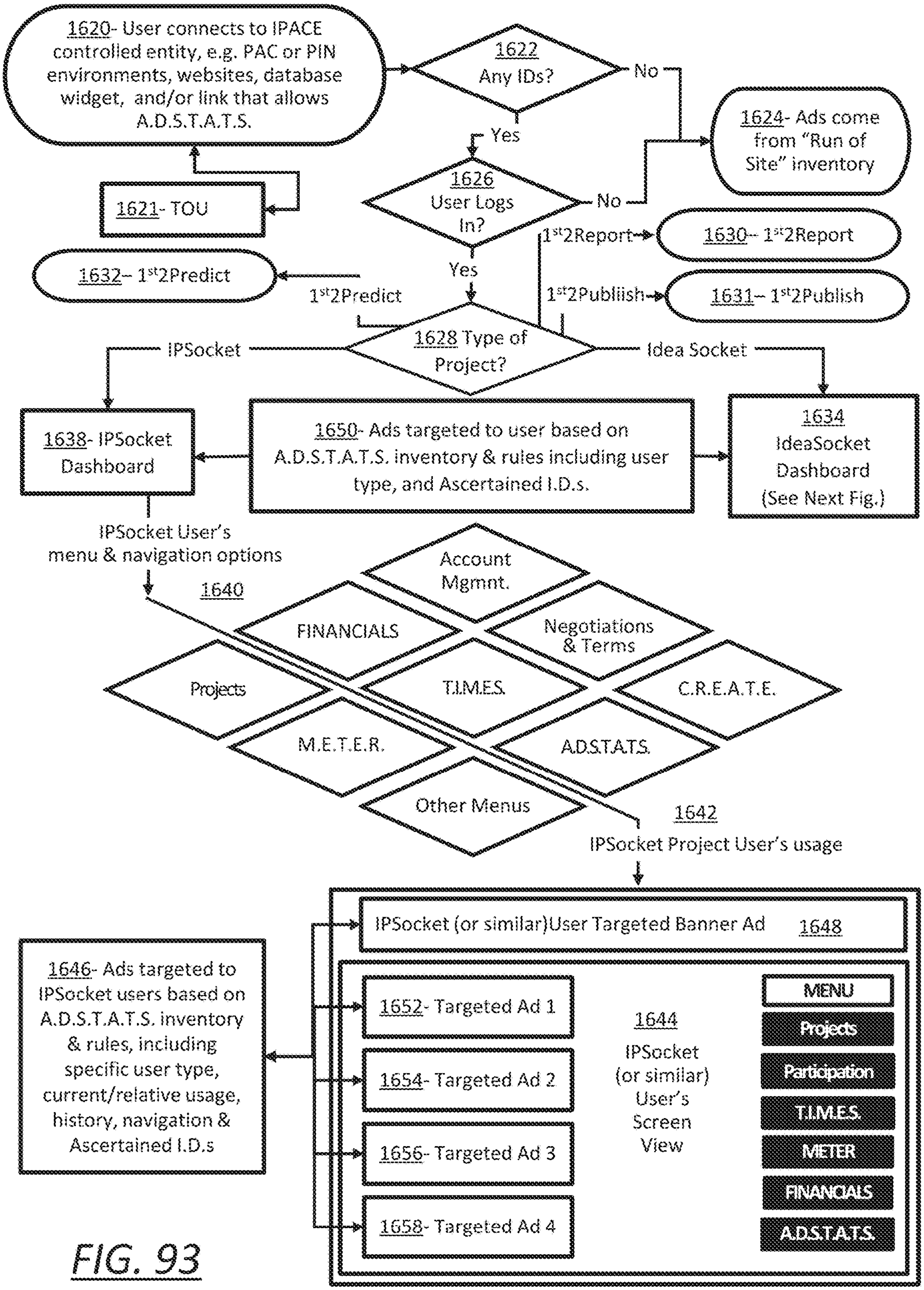

FIG. 93 is a combination flowchart and block diagram depicting an example embodiment whereby an Account (60) user with a particular role receives targeted advertisements, when he/she connects to the IPACE Operating Environment or an IPACE-Hub-controlled or enabled entity. Starting with a terminator 1620 with an "User connects to IPACE controlled entity, e.g. PAC or PIN environments, websites, database widget, and/or link that allows A.D.S.T.A.T.S." and where the user may utilize a "TOU" 1621 function to read the Terms of Use.

From the terminator 1620 the user is passed to a query 1622 with asks if there are "Any IDs?" known about the particular user and if the answer is "no" the user is passed to a terminator 1624 with an "Ads come from 'Run of Site' Inventory" where in this example, the IPACE system would send "Run of Site" inventory in lieu of any specific targeting instructions based upon, say the user ID back in query 1622. However, the IPACE system would preferably target ads even without the user ID, based upon other known or possible known IDs, such as session IDs, cookie IDs, IP addresses, historical usage data/statistics and the like.

If the answer to query 1622 is "yes" the user is passed to a query 1626 which asks if a "User Logs In?" where if the answer is "no" the user may get passed back to terminator 1624. If the answer to query 1626 is instead "yes" the user is passed to a query 1628 which asks for a "Type of Project?" where if the project is a "1[st]2Report" type project (e.g. news story), he/she is passed to a terminator 1630 with the appropriate "1[st]2Report" Dashboard and it's functionality; if the project is a "1[st]2Predict" type project (e.g. predicting event outcomes), he/she is passed to a terminator 1632 with the appropriate "1[st]2Predict" Dashboard and it's functionality; if the project is a "IdeaSocket" type project (e.g. collaborating on an open source software application, a song, a website, a screenplay, article, white paper, experiment, and/or the like) that doesn't include a patent application requirement, he/she is passed to a 1634 step, with the appropriate "IdeaSocket Dashboard" and it's functionality (see next Fig.); and if the project is a "IPSocket" type project (e.g. collaborating on a patent application and/or the like), he/she is passed to a 1638 step, with the appropriate "IPSocket Dashboard" and it's functionality, as depicted in a IPSocket User's menu and navigation options (example) in area of 1640; which includes the options listed, where an "IPSocket Project User's usage" 1642 is tracked by the IPACE system.

An "Ads targeted to IPSocket users based on A.D.S.T.A.T.S. inventory and rules, including specific user type, current/relative usage, history, navigation and known I.D.s" 1646 function is depicted to show that this functionality may push targeted ads out to all Dashboards, including the IPSocket Dashboard in an "IPSocket User Targeted Banner Ad" 1648, as well as a "Targeted Ad 1 through a Target Ad 4" depicted in a part/step: 1652, 1654, 1656, and 1658 respectively.

In various non-limiting embodiments, the IPSocket Project User's Usage 1642 and information known about the particular IPACE member/user is stored into a database and incorporated into an advertising targeting algorithm where other Accounts (60) may select individual characteristics to target and/or a set of characteristics to target ads as depicted in an IPACE member/User's Screen View 1648 where, say the "IPACE member/Targeted Banner Ad" 1648 was generated and displayed base upon known information.

In various non-limiting embodiments, the "Ads targeted to IPSocket users based on A.D.S.T.A.T.S. inventory and rules, including specific user type, current/relative usage, history, navigation and known I.D.s" 1646 function represents the wide range of targeting metrics, tools and functionality where the Ad targeting may also incorporate relative changes in, say the IPACE member/user's usage from, for example, using traditionally only using the CREATE module to now starting to use another module, say the IPACE court, where the ad targeting could incorporate this relative change in system and/or module usage for this particular user and/or for ads known to be, say relatively more successful for IPACE members/users who were traditionally CREATE users and are now starting to utilize the IPACE Court or whatever change is tracked.

In various non-limiting embodiments, these targeted ads may appear within the IPSocket (or similar, e.g. IdeaSocket, 1[st]2Predict, 1[st]2Report, 1[st]2Publish, and/or the like.) User's Screen View 1644 as prioritized stack of ads where a "Targeted Ad 1" 1652, which is above a "Targeted Ad 2" 1654, which is above a "Targeted Ad 3," which is above a "Targeted Ad 4" based up a number of rules and conditions setup in the ADSTATS where, for example, the Targeted Ad 1 bid a higher rate than the subsequent Ads down the page to appear on top for such a navigation change example as described in the previous paragraph.

In various non-limiting embodiments, there could be a variety of mechanism and bids that determine which target advertisements appear and in what order based upon historical success relative to the known data/statistics conditions on the webpage that lead to the current point within the navigation in general, relative to other IPACE member/users within the Account (60), relative to other similar users, relative to this particular IPACE member/user's navigation and usage, segmentations, and/or some combination of these trackable and measurable metrics for creating relative success data/statistics and pricing models for other to bid upon for advertisement placement.

Figure 94:
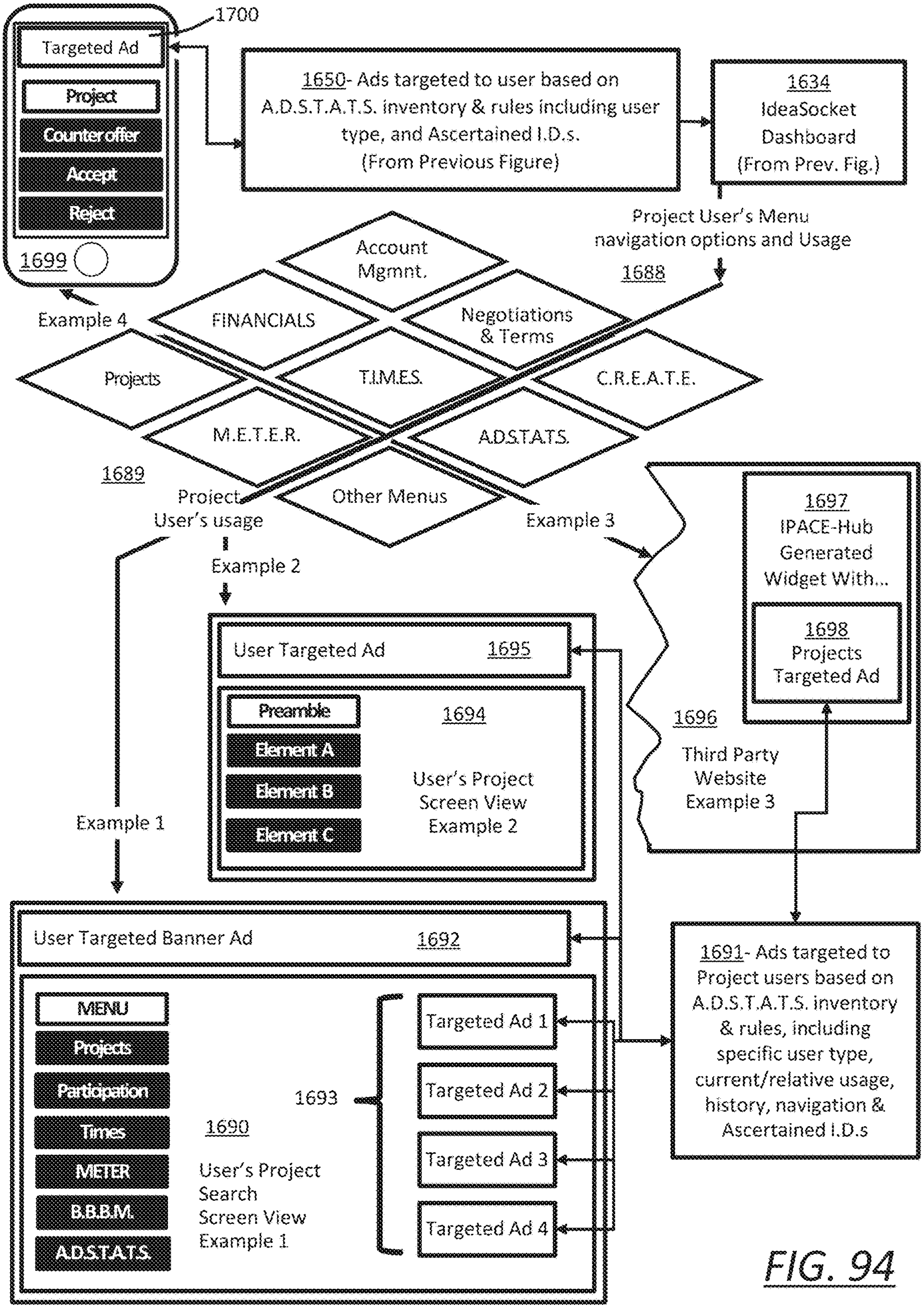

FIG. 94 is a combination flowchart and block diagram depicting an example embodiment whereby an IPACE member/user receives targeted advertisements, when he/she utilizing the IdeaSocket Dashboard when connected to the IPACE Operating Environment or a IPACE-Hub-controlled or enabled entity. Starting with a step 1634 where a "IdeaSocket Dashboard (From Previous Fig)" and is connected to the IPACE-Hub controlled entity, e.g. widget, database widget, and/or link that allows ADSTATS and where the IPACE system tracks a "Project User's menu navigation options and usage" in area 1688.

From function 1688 the "IdeaSocket/Project User's menu navigation options and usage" comprising an "Account Management" menu option, a FINANCIALS menu option, a Negotiations and Terms menu option, a Projects menu option, a TIMES menu option, a CREATE menu option, a METER menu option, a Terms menu option, an ADSTATS menu option, and an Other Menus menu options where the navigation and selections of a particular Project user may be continually tracked, collected, and stored in a Project User's Usage 1689 function.

That Project User's Usage 1689 and information known about the particular Project user is stored into a database and incorporated into an advertising targeting algorithm where other Accounts (60) may select individual characteristics to target and/or a set of characteristics to target ads as depicted in the four examples, starting with an "Example 1" for a User's Project Search Screen View Example 1" 1690 where, say a "Project Targeted Banner Ad" 1692 was generated and displayed base upon known information.

An "Ads targeted to Project users based on A.D.S.T.A.T.S. inventory and rules, including specific user type, current/relative usage, history, navigation and known I.D.s" 1691 function represents the wide range of targeting metrics, tools and functionality where the Ad targeting may also incorporate relative changes in, say the Project user's usage from, for example, traditionally searching only for a particular type of IdeaSocket project involving writing reviews to now starting to search for other project types, say those involving actual writing, where the ad targeting could incorporate this relative change in Project search status and/or navigation usage for this particular user (even before the person has indicated such a change in his/her expertise, Peer (65) group, experience, expertise, resume or data/statistics) and/or for ads known to be, say relatively more successful for Project users who were traditionally searching for writing reviews projects not requiring to those users who are now starting to search for actual writing projects or whatever change is tracked.

In various non-limiting embodiments, these targeted ads may appear within the User's Project Search Screen View 1690 as prioritized stack of ads where in the previous Fig. and the targeted Ads in a section 1693 are positioned/ranked based up a number of rules and conditions setup in the ADSTATS. In various non-limiting embodiments, for example, the Targeted Ad 1 bid a higher rate than the subsequent Ads down the page to appear on top for such a navigation change example as described in the previous paragraph.

In various non-limiting embodiments, there could be a variety of mechanism and bids that determine which target advertisements appear and in what order based upon historical success relative to the known data/statistics conditions on the webpage that lead to the current point within the navigation in general, relative to other Project users within the Account (60), relative to other similar users, relative to this particular Project user's navigation and usage, and/or some combination of these trackable and measurable metrics for creating relative success data/statistics and pricing models for other to bid upon for advertisement placement.

In an example 2, a "User's Project Screen View Example 2" 1694 with the claim development, also has a "User Targeted Ad" 1695 where the Ads could be targeted based upon Participants (80), styles, art units, deadlines, perceived skills, project types, companies, countries, and/or the like and where the user may request that the information in the target Ad simply be stored versus actually navigating to a particular website during his/her claim drafting work/development. And this cumulated data/statistics for Ad Targeting may also be for subsequent visit by this particular IPACE Project user.

In an Example 3, a "Third Party Website Example 3" 1696 comprises an "IPACE-Hub generated Widget With . . . (A Project Targeted Ad)" 1697 with a "Project Targeted Ad" 1698 where the Ads could be targeted based upon a list of brands, Participants (80), segments, law firms, schools, and/or advertisements that have either been approved to appear or restricted from appearing on the Third Party website by, say the Publisher (68) and/or Web Developer of the Third Party website. In various non-limiting embodiments, these targeted ads that appear on the Third Party website may be setup to incorporate keywords found currently and/or historically on the Third Party website, so in addition to targeting the Project user's known data/statistics, the ADSTATS MGR could be incorporating keywords for locations to post on Third Party websites.

In an Example 4, a "Targeted Ad" 1700 appears on a mobile device 1699 during a particular project portion for a particular PAC/PIN, for a particular Project user, and where all of those components may also be targetable in all four examples. And where the targeting may also incorporate the format of the platform, OS, and applications on the device, such as a Blackberry® versus an Android® OS, or an iPhone® 3G versus the 4G.

In addition, to the above embodiments, the IPACE system also allows IPACE Mgrs. to post TOP requirements even though a Project may not be open at the time, to monitor the on-going relative skills, quality, and size of the available pool of potential participants for a given project, project portion, TOP term, and/or the like. For instance, comparison data/statistics for month-over-month, and/or year-over-year data/statistics comparisons may reflect that the number of available Candidates and/or Participants (80) for a particularly critical participation a particular project has increased or decreased dramatically.

In some circumstances a company may be limited as to what they may or cannot ask a project Candidate to answer unless they directly related to a particular project opening and/or where tests may or cannot be performed. So another benefit of the IPACE is that it allows users to share details and analysis about themselves that may never be asked or addressed in a traditional interview.

In addition, the IPACE system may ask questions to Peers (65) and Experts (75) regarding, say the user's style-of-work, dedication, promptness, likeability, friendliness, tech-savvy-ness, pop-culture-savvy-ness, and where quantifiable data/statistics Over the course of time may reveal that those Candidates and/or Participants (80) that are perceived to be, for instance: relatively more reliable, talented, honest, responsive, confident, and/or the like, to other Candidates and/or Participants (80) by the user's Peers (65) and/or Experts (75) are in fact, actually indicators of, for instance poor performers for a certain age group of a certain task within a certain type of project-type when compared to the historical data/statistics of those Candidates and/or Participants (80) that were considered relatively less reliable, talented, honest, responsive, confident, and/or the like.

In addition, the IPACE system may be setup to screen out any comments, remarks, assessments, answers and/or specific words, comments, and/or answers; where a particular company, say in a particular industry and/or location would rather not know about any Candidates and/or Participants (80) and/or Participants (80) where the company is legally obligated to not know, so where that data/content is removed from any company access and/or decision process.

FIG. 95*a* depicts an embodiment and an example screenshot of the user interface and Home Page as would be seen by an Account (60) with the role and permissions of an IPACE Account (60). An "User's Screen View of IPACE-UI Home Page" 1702 appears based either on a particular URL assigned to IPACE member/Accounts (60), based on such things as an IPACE member/user ID and/or segmentation rules, any cookie IDs, session IDs and/or any other known information about the user and/or the transceiver communicating with the IPACE-UI 102 system, such as a GPS location; triangulation, X, Y, Z coordinate system, and/or IP address. A "login" 1704 function allows the user to login to the IPACE-UI 102 system to obtain the privileges assigned to his/her particular role and permission settings.

Before an IPACE member/user has logged into the home page and/or other IPACE-UI webpages the IPACE system would preferably still have displayed data/content, advertisements, target advertising that are generated and displayed based upon information known about the Transceiver, the IPACE member/users in general and/or from information known about the particular IPACE member/user, say based upon his/her IP address, cookie(s), session IDs, and the like.

In various non-limiting embodiments, the IPACE member/Home Page depicted as the "IPACE member/User's Screen View of IPACE-UI (102) Home Page 1702 screenshot, also has an example display of an IPACE member/Targeted Banner Ad 1701*a* which may be supplied and based upon such things as ADSTATS inventory and rules, including such things as the specific IPACE member/user type, roles and permissions; current/relative usage, historical usage, and/or navigation." In various non-limiting embodiments, the site could allow for a variety of functionality based upon the IPACE Account 60 type; the IPACE member/user's roles and permissions; and/or whether the IPACE Account 60 is a paid subscriber/member or not; and if so, whether current.

A function 1705 depicted with an "Ad-Free Version," is an example where the IPACE member/user could accept, reject, and/or modify the data/content, advertising, and/or targeting components of the user interface, where a Target Ad (1) 1706, a Target Ad (2) 1707, a Target Ad (3) 1708, and a Target Ad (4) 1709 could be targeted towards the IPACE member/USER based upon such things as which Account (60) had the highest Advertiser (57) Bid for the targeting the current conditions and/or IPACE member/user of the IPACE-UI through the ADSTATS 124 and/or the FINANCIALS 114, and/or inventory rules.

In various non-limiting embodiments, the data/content, advertisements, inventory, Ad Targeting rules and the like displayed for the IPACE member/User on the "IPACE member/User's Screen View of IPACE-UI (102) Home Page 1702 are typically generated, interactive with, and pushed out by the connected IPACE HUB 100, but could also be generated and pushed out by a local file server and database, such as the IPACE Server 185 and IPACE STORAGEL-IPACE Storage 186 (shown in FIG. 3).

This data/content and targeted advertisement further benefit from any data/statistics known about a particular IPACE member/user when he/she logs into the IPACE-UI system utilizing a Login 1704 function. For example, the IPACE member/user may select to view and/or interact with specific website data/content such as, say an article depicted by an area 1703. In various non-limiting embodiments, the data/content selected by the user reveals information about the user and the duration, manner of usage, and navigation in/out of this article/data/content may be stored and compared with other users to build data table, data/statistics, and/or the like, for advertising and data/content interaction success rates, such as, but not limited to click-throughs, views, dwell times, links in/out, actions taken/not-taken, abandonments, revisits, and/or actual purchases.

In various non-limiting embodiments, this home page would preferably also be displayed on a mobile device (not shown) and may have the same functionality, targeted data/content and/or targeted advertisements that could be pushed and/or pulled from the IPACE HUB 100 and/or PIN 106 that may either is requested by the IPACE member/user, already queued up on the mobile device, and/or driven by other events, such as the IPACE member/user's user-interface navigation, ability to provide information and/or reply to a particular question by another Account manager, and/or from a particular IPACE member/user, and could also factor in the time of day, GPS coordinates, location tracking, triangulation, and/or some combination of these methods and/or with Campaign rules and conditions, such as whether there is a relative urgency to fill a particular PAC 104 by a particular moment in time, by a particular potential Participant with a particular role for a particular project or not.

FIG. 95*b* depicts an embodiment of an example screenshot of the user interface after a particular IPACE member/user has logged into the IPACE-UI 102 system. In this instance, an "IPACE member/User's screen View of IPACE-UI 102 TIMES Page (Logged In)" 1710 screen, the IPACE member/user, a "Joe Writer" 1711 has logged in and advanced to the TIMES module by utilizing a TIMES 1712 menu selection. To advance to the TIMES module the user's role and permissions would require that the user had a roles that was at least equivalent to the "TIMES Mgr" and/or permission settings at least equivalent to the TIMES MGR.

Note that any targeted ads, in this embodiment example, such as depicted in section 1701*a* (along with 1705-1709) would preferably update with such events as each page change to the "IPACE member/User's screen View of IPACE-UI 102 TIMES Page (Logged In)" 1710 screen and/or per such things as the IPACE member/user's usage, as the time of day, GPS coordinates, location tracking, triangulation, and/or some combination of methods, and/or with Campaign rules and conditions, such as whether there is an urgency to fill a particular PAC 104 by a particular moment in time, by a particular potential Participant with a particular role for a particular project or not.

FIG. 96*a* depicts an embodiment and an example screenshot of the IPACE member/user interface after the IPACE member/user has selected "Terms Mgmt" under the TIMES menu heading. In this instance, an "IPACE member/User's screen View of TIMES/Terms Management Page" 1716, has been selected utilizing a "Terms Mgmt." 1715 menu selection. This causes the subsequent and appropriate menu selections to change, along with any targeted ads that may appear (e.g. in areas 1709, 1703*a*, 1716 and/or the like).

FIG. 96*b* depicts an embodiment of an example screenshot of where the user interface after the IPACE member/user has selected to create an Offer under the Terms Mgmt menu heading. In this instance, an "IPACE member/User's screen View of TIMES/Create An Offer Page" 1684, has been selected utilizing a "Create An Offer" 1685 menu selection. This causes the subsequent and appropriate menu selections to change accordingly, along with any targeted ads that may appear (e.g. in area 1701*c*, and/or like).

FIG. 97*a* depicts an embodiment of an example screenshot of the user interface after the IPACE member/user has selected to create Claims from scratch. In this instance, an "IPACE member/User's screen View of TIMES/Claims/

Claim1/From Scratch Page" 1733, has been selected by "Roy Attorney" utilizing a "Claims" 1734 menu selection. This causes the subsequent and appropriate menu selections to change accordingly, along with any targeted ads that may appear (e.g. in area 1701*d*, and/or like).

FIG. 97*b* depicts an embodiment of an example screenshot of the IPACE user interface and Home Page as would be seen by an Account (60) user with the role and permissions of a IPACE user. A "User's Screen View of IPACE-UI Home Page" 1737 appears based on a particular URL assigned to a particular IPACE Account (60), based upon any cookie IDs, IP addresses, and/or session IDs within the communicating device with the IPACE-UI 102 and IPACE system. A "login" 107*a* function allows the user to login to the IPACE-UI 102 system to obtain the privileges assigned to his/her particular role and permission settings.

Before a particular IPACE member/user has logged into the home page and/or other IPACE-UI webpages the IPACE system would preferably still have displayed data/content, advertisements, target advertising that are generated and displayed based upon information known about the Transceiver, IPACE users in general and/or from information known about the particular IPACE user through, say based upon his/her IP address, cookie(s), session IDs, and the like.

In various non-limiting embodiments, the "User's Screen View of IPACE-UI (102) Home Page 1728 screenshot, also has an example display of a Targeted Banner Ad 1701*e* which may be supplied and based upon such things as ADSTATS inventory and rules, including such things as the specific IPACE user type, roles and permissions; current/relative usage, historical usage, and/or navigation." In various non-limiting embodiments, the site could allow for a variety of functionality based upon the IPACE Account 60 type; the IPACE user's roles (e.g. Inventor, Attorney, Draftsperson (54) and/or the like) and permissions; and/or whether the IPACE Account 60 is a paid subscriber/member or not; and if so, whether current.

A function 1705*a* depicted with an "Ad-Free Version," is an example where the IPACE user, such as an Inventor, Contributor (50), PTO registered (e.g. Attorney/Agent), IPACE Court member, and/or the like could accept, reject, and/or modify the data/content, advertising, and/or targeting components of the user interface, where a Target Ad (1) 1706*b*, a Target Ad (2) 1707*b*, a Target Ad (3) 1708*b*, and a Target Ad (4) 1709*b* could be targeted towards the IPACE USER based upon such things as which IPACE Account (60) had the highest Advertiser (57) Bid for targeting the current conditions and/or IPACE user of the IPACE-UI through the ADSTATS 124 and/or the FINANCIALS 114, and/or inventory rules.

Accounts (60) could bid/compete against other bidders to target completely different elements, conditions, segments, and/or user segmentations, but where the total bid amount placed is factored into which bidder's Campaign (PAC/PIN), Ad, Data/content, and the like; outweighs and beats out other bidders in terms of say dollar amount per bid, per appearance, per budget Over the course of time for a particular appearance on the page, a particular occurrence (how often), a particular rank (top to bottom, where top is, say the best) and/or the like. As well as delineating the bidding pool to specific segments, such as a particular time of day for the appearance and/or the bidding, particular website for the appearance, a particular geographic location for the bidders, a particular psychographic, a particular behavior, a particular user segment for the bidders and/or a particular geographic location for the appearance, based upon, say an IP address.

In various non-limiting embodiments, the data/content, advertisements, inventory, Ad Targeting rules and the like displayed for the IPACE User on the "User's Screen View of IPACE-UI (102) Home Page" 1737 are typically generated, interactive with, and pushed out by the connected IPACE HUB 100, but could also be generated and pushed out by a local file server and database, such as the IPACE Server 185 and IPACE STORAGEL-IPACE Storage 186 (shown earlier).

This data/content and targeted advertisement further benefits from any data/statistics known about a particular IPACE user when they log into the IPACE-UI system utilizing the Login 1704*a* function. For example, the IPACE user may select to view and/or interact with specific website data/content such as, say an article depicted by an area 1735. In various non-limiting embodiments, the data/content select reveals information about the user and the duration, manner of usage, and navigation in/out of this article/data/content may be stored, analyzed, and compared with other users to build data tables, correlations, schema, business logic, algorithms, statistics, and/or algorithms rules, conditions, logic, weighting, filtering, and/or the like; for advertising and data/content interaction success rates, such as, but not limited to click-throughs, views, dwell times, links in/out, actions taken/not-taken, abandonments, revisits, and/or actual purchases.

In various non-limiting embodiments, this home page could also be displayed on a mobile device (not shown) and may also have the same functionality, targeted data/content and/or targeted advertisements that could be pushed and/or pulled from the IPACE HUB 100 and/or PIN 106 that may either be requested by the IPACE user, is already queued up on the mobile device, and/or driven by other events, such as the IPACE user's user-interface navigation, ability to provide information and/or reply to a particular question by another Account manager, and/or from a particular IPACE member/user, and could also factor in the time of day, GPS coordinates, location tracking/triangulation, and/or with Campaign rules and conditions, such as whether there is a relative urgency to fill a particular PAC 104 by a particular moment in time, by a particular potential Participant with a particular role for a particular project or not.

FIG. 98*a* depicts an embodiment of an example screenshot of the user interface after a particular IPACE user has logged into the IPACE-UI 102 system. In this instance, an "IPACE User's Screen View of IPACE-UI 102 Home Page/Logged In" 1668, where the IPACE user, a "Kim Writer" 1711*a* has logged in. This causes the subsequent, appropriate menu selections, targeted data/content, and/or targeted ads to change accordingly. In this example, the IPACE user "Kim Writer" sees a home page with data/content relevant to her specifically. A "Reviews" 1670 section reflects comments left by other users that represent feedback directed to a subject that this particular IPACE user has indicated an interest towards and/or as feedback to this particular user specifically.

For instance, this feedback could be from such groups as a group of fellow Inventors (70) (or Patent Attorney (44)) with permission to view a specific project; a group of fellow IPACE-members with knowledge in general about similar projects/applications; a group of Peers (65) or Experts (75) with specific feedback for the specific project section (e.g. claims, Figures, written description, office action response, and/or the like); project goal, project deadline, PTO art unit/sub-unit, country, company, and/or the like; a group of Peers (65) or Experts (75) with feedback in general about similar, say claim drafting styles (e.g. the claims include for example means plus function language) without exposing the claims specifically; and/or a group of Peers (65) or Experts (75) in general post the publishing of the particular information seeking feedback, and the like. If this particular user had drafted a set of claims, the feedback could be specific to those particular claims, the style, the terminology and/or lexicon, case law, potential concerns/pitfalls, the art unit, the assigned examiner (66), supervisor, country, and/or the like.

In various non-limiting embodiments, the feedback may be isolated to one particular group and/or come from a collection of groups. In various non-limiting embodiments, the ability to give and receive feedback to a particular IPACE user may be set by a number or parties. For instance, the IPACE-UI 102 system may allow the Company with the PAC and/or PIN to grant, deny, and/or allow feedback to its IPACE members. This ability and/or the level of functionality applied to this feature may also be dependent upon the IPACE member/user seeking the feedback and/or dependent on the group's willingness to provide the feedback.

This ability and/or the level of functionality applied to this feedback feature may be dependent on fees paid by the Company with a particular PAC and/or PIN; dependent on fees paid by the Applicant seeking the feedback; and/or dependent on fees paid by the groups seeking to provide the Applicant the feedback. For example, a particular company may allow feedback for a particular PAC only to IPACE members/users who meet some group of conditions, but who did not qualify to say Participant (80) within a particular project, function, goal, and/or only from pre-qualified conditions, such as was a Patent Attorney (44) within a particular fee range for the particular PAC; but was or was not selected to participate.

In various non-limiting embodiments, the IPACE-UI 102 system could be set to prescreen particular feedback, a segment of feedback, and/or all feedback regarding the how appropriate the language and claim elements appear to either avoid a rejection, obtain a broad claim, avoid prosecution estoppels, future litigation issues and/or invalidity challenges for particular art unit, examiner (66), country, and the like; and/or terms that may lead to legal repercussions (for such things as invalidity, DOE limitations, confusion, restrictions, and/or the like). This prescreen tool would incorporate previous case law for known terms and comments ruled by the courts to be inappropriate for utilizing in general and/or for a particular set of circumstances and conditions. To provide feedback the IPACE user could setup specific roles and permissions that would in general and/or conditionally could provide feedback, such as fellow Employees (55), potential participants, Participants (80), Joint-Inventor/Co-Inventors (41), Contributors (50), Peers (65) (as defined by the IPACE user), Experts (75) (as defined by the IPACE user), and/or some combination of these segmentations, or the like.

FIG. 98*b* depicts an embodiment of an example screenshot of a mobile device 1681*a* and a third party website 1673 with a Widget 1678*a*, a website data/content (e.g. a Story, Article, Report, and/or the like) 1674 and/or a Targeted Ad 1675 generated and/or targeted by the IPACE-Hub 100 system. An "Ads targeted to potential Participants based on A.D.S.T.A.T.S. inventory and rules, including specific user type, current/relative usage, history, navigation and known I.D.s." 1676*a* is the data/content and/or ad targeting between the "IPACE-HUB generated Widget" 1677 at and A.D.S.T.A.T.S. supplied Ad 1678*a* preferably come from the IPACE Hub 100.

Starting with the "IPACE-HUB generated Widget" 1677*a* and A.D.S.T.A.T.S. supplied Ad 1678*a* area that delineates an example of a screenshot that the IPACE member/user could see when visiting a particular website that is connected to IPACE-Hub 100. For example, there could be the Targeted Ad 1675 that could appear at the top of a website page where the advertising supplied by IPACE-Hub incorporates information either known for users who visit this site in general, information known about the particular IPACE member/user; and/or information collected through current usage. For example, the IPACE member/user may select to view and/or interact with specific website data/content such as, say a news story or an article depicted by area 1674. This selected data/content reveals information about the user along with correlations for durations, manners of usage, clicks, inputs, and navigation (e.g. in/out of this article/data/content, UI, site, and/or the like) may be stored and compared with other users to build data tables, schema, correlations, and logic for advertising, data/content creation, and data/content interaction success rates, such as, but not limited to relative click-throughs, views, dwell times, links in/out, actions taken/not-taken, abandonments, challenges, comments, posting, reporting, predictions, perceptions, consumption, rankings, revisits, and/or actual purchases.

In various non-limiting embodiments, the area delineated by the brackets from a IPACE-Hub Generated Widget 1678*a* is an example of data/content that would preferably be automatically, conditionally, and/or selectively pushed and/or pulled from the IPACE-Hub 100 and may either be requested by the IPACE member/user, already queued up on the webpage, and/or driven by other events, such as the IPACE member/user's navigation, behaviors, patterns, profile, statistics, time-of-day, and/or the like. In various non-limiting embodiments, the IPACE-Hub Generated Widget 1677*a* data/content in this example is a list of criteria to attract Joint-Inventor/Co-Inventors (41) with a "Joint-Inventor/Co-Inventors WANTED!" headline example and with Criteria/Questions and potentials answers below. At the bottom of the IPACE-Hub Generated Widget 1677*a* area would preferably be a call to action and/or a link 1679*a*, which in this example reads: "Joint-Inventor/Co-Inventors: See current listings." So if the IPACE member/user clicks the link, he/she may interact with Campaigns pushed out from the IPACE-Hub 100 that meets the particular request and/or conditions of the link.

In various non-limiting embodiments, the mobile device 1680*a* would preferably also have data/content and/or a targeted ad 1681*a* that may be pushed and/or pulled from the IPACE-Hub 100 that may either is requested by the IPACE member/user, already queued up on the mobile device 1680*a*, and/or driven by other events, such as the IPACE member/user's user-interface navigation, ability to provide an answer 1683*a* to a particular criteria/question 1682*a* correctly, ability to answer questions promptly, time of day, GPS coordinates, location tracking/triangulation, and/or with Campaign rules and conditions, such as whether there is a relative urgency to fill a particular PAC 104 by a particular moment in time, by a particular Candidate 73 with a particular criteria for a particular Project or not.

FIG. 99*a* depicts an embodiment of an example screenshot of a mobile device 1680 and a third party website 1669*a* with a Widget 1678, a Categories List 1666, a Selected Sites List 1667, and/or a Targeted Ad 1701*h* generated and/or targeted by the IPACE-Hub 100 system. An "Ads targeted to Consumers based on A.D.S.T.A.T.S. inventory and rules, including specific user type, consumption, current/relative usage, history, navigation and known I.D.s." 1676 is the data/content and/or ad targeting between the "IPACE-HUB generated Quiz" 1677 and A.D.S.T.A.T.S. supplied Ad 1679 preferably come from the IPACE Hub 100.

In various non-limiting embodiments, the mobile device 1680 would preferably have data/content and/or a targeted ad 1681 that may be pushed and/or pulled from the IPACE-Hub 100 that may either is requested by the IPACE member/user, already queued up on the mobile device 1680, and/or driven by other events, such as the IPACE member/user's user-interface navigation, ability to provide an answer 1683 to a particular criteria/question 1682 correctly, ability to answer questions promptly, time of day, GPS coordinates, location tracking/triangulation, and/or with Campaign rules and conditions, such as whether there is a change in the Most Movies Viewed Leaderboard; a challenge, comment and/or the like to his status, point, data, rank, and/or the like; and/or the like.

Systems that delineate tasks, resources, incentives, roles, skills, experience, offers, and tracks progress and successfulness may greatly improve efficiencies and ultimately innovations. This system provides Inventors (70), original idea creators, Reporters (63), Predictors (62), judges, Peers (65), Experts (75), and/or the like; an ability to participate and collaborate in a confidential network of people with a wide range of expertise, and who better may help the Campaign Gatekeeper (42) who is a Lead Inventor (40), timely develop a product, service, work-product, hobby, craft, idea, concept, and/or file his/her patent, copyright, trademark application, while minimizing the risks to the Inventor and his/her invention. Further fostering motivation, skills, creativity, and available experience.

It may help the Campaign Gatekeeper (42) who is, for instance, a restaurant owner, timely develop a marketing materials, a menu, a pricing plan, products, services, and/or the like to run his/her business with the IdeaSocket module. It may help the Campaign Gatekeeper (42) who is, for instance, a person placing a report regarding an event he/she witnessed, and/or the like, to run then track and credit this person for who, when, where, how and what was reported by who, when, where and the like with the 1$^{st}$2Report module. It may help the Campaign Gatekeeper (42) who is, for instance, a person creating a prediction regarding a political outcome, and/or the like, to then track and credit this person for how relatively accurate he/she was in the prediction and the like, with the 1$^{st}$2Predict module.

Analyzing a User's Relative Brain Activity and Patterns

In various non-limiting embodiments, the IPACE system would preferably continually collect, track, and analyze a particular user's brain activity, patterns, and/or the like; (e.g. via PET scans, CAT scans, and/or the like) and correlated data/statistics to generate comparative analysis over time for the particular user, activity, event, project, components, and/or the like; where data/statistics could be compared relative to the same particular user's other brain activity (e.g. PET scans, data, statistics, patterns, and/or the like) to other particular users, to group of users, a particular segment of users, and/or the like.

In various non-limiting embodiments, the IPACE system analysis would preferably include a relative comparisons for periods of time ascertained, discerned, perceived, assumed and/or the like to correlate with a particular mood, emotion, accomplishment, motivation, creativity, and/or the like. The correlation of the periods of time ascertained, discerned, perceived, assumed and/or the like, with a particular mood, emotion, accomplishment, motivation, creativity, and/or like; may be derived, discerned, and/or the like, from data/statistics analysis over time, user-inputs, peer-input, expert-input (e.g. a doctor), and/or the like.

In addition, the analysis for correlations, relative patterns, and/or the like are not limited to creating intellection property. Further, the IPACE system would preferably include a plurality of creative activities, events, projects, components, and/or the like; for independently tracking and/or comparing. For example, the plurality of creative activities, events, projects, components, and/or the like, may comprise singing, writing music, playing an instrument, voice over, company/product naming, domain/brand name creating, new-words/new-slang/new-texting/new-acronyms, digital art/painting, 3D modeling, 2D and 3D animation, logo design, drawing, painting, sketching, carving, sewing, knitting, banner, pin, bumper-sticker, mug, accessory, apparel design, leather work, silverware, china/placeware, watch and jewelry design, luggage design, shoe design, metal-work, welding, sculpture design, signage/neon, glass-blowing, ceramics, calligraphy. typesetting, video editing/effects, acting, set design, lighting, laser-show, photography, modeling, hair-styling, make-up, plastic surgery, new beverage creations, cooking creations, new recipes, cake-designs, comedy skit writing/performing, writing (e.g. poetry, ad copy, tag-lines, slogans, campaign speech, courseware, tests, resumes, cover letters, emails, menus, pamphlets, blog/article, white-papers, reports, stories, books/novels, screenplay, plays, comedy, and/or the like), podcasts/audiobooks/CD/DVD design/scripts/navigation, weapon design, fireworks, sports performance, pet toy and accessory design, medical devices, pharmaceutical drug composite, product design/form-factor and packaging design, window/display design, exercise equipment, equipment design, furniture design, floral arrangements, parade float, landscape design, architectural design/drafting, mold design, circuit board design, software architecture designs/floorplans, stadiums/venue design, mobile application/UUSW design/navigation, software writing/constructing, hardware design, network design, vehicle and mass transit design, vehicle and mass transit constructing, alternative energy design, watercraft and boat design, space plans and flight design, tool design, map and routing design/methodologies, video games, toys, sport jerseys/logos/mascots, mousepads, posters, colleague, clocks, and/or the like.

In addition, the analysis for correlations, relative patterns, and/or the like are not limited to creativity, where activities, events, projects, components, and/or the like; may also comprise productivity, proficiency, aptitude, punctuality, reliability, judgment, initiative, communication-skills, comprehension, reasoning, logic, teamwork, relationship-building, critical-thinking, listening-skills, time-management, goal-setting, and/or the like. Further, the analysis for correlations, relative patterns, and/or the like may also comprise data collect for moods, attitudes, emotions, disorders, anxiety, depression, euphoria, disease, genetic history, family history, diagnosis, illness, medications, and/or the like.

Creative State vs. Other States In various non-limiting embodiments, the IPACE system preferably may track and analyze the relative freshness of a relatively quantifiable idea and/or concept from a particular member/user relative to his/her other relatively quantifiable ideas and/or concepts, relative to earlier moments in time, relative to other relatively quantifiable ideas and/or concepts, and/or the like. In addition, the IPACE system tracking and analysis may include and/or incorporate filtering for the relative freshness of a relatively quantifiable idea and/or concept from another particular member/user (e.g. a relatively quantifiable idea and/or concept from a second member/user), a particular group, segment of users, window of time, and/or the like. Further, the IPACE system tracking and analysis may include ascertained, discerned, and/or perceived data/statistics, such as who was doing what, when, where, why, and/or the like; along with perceived influencers, distractions, goals, assistance, and/or the like.

Overall-Personal-State

In various non-limiting embodiments, the IPACE system preferably may track and analyze someone's (e.g. an IPACE member/user) overall-personal-state and to a plurality of system delineated-personal-states, related personal data segments, profiles, personas, elements, and/or the like for comparison purposes. For example, the plurality of system delineated-personal-states may include tracking and analysis to display correlations, patterns, clustering, and/or the like in a sequence of inputs, events, times, and/or the like, that lead to a perceived, discerned, or known relative success, (e.g. a relatively more productivity, efficiency, success, ROI, motivation, status points, best feedback, and/or the like; when relatively compared to historical data for each independently, some combination, some permutation, and/or the like.

In various non-limiting embodiments, the degree to which a particular relative perception score becomes a particular relatively known or discerned score is based upon the amount of data, statistics, inputs, data/content, time, comparisons, and/or the like. Further the plurality of system delineated-personal-states, the related personal data segments, the profiles, the personas, the elements, and/or the like, may come from different members, users, participants, parties, groups, peers, segments, and/or the like.

In addition, the IPACE system tracking, analysis, may display correlations, patterns, clustering, and/or the like in a sequence of inputs, events, times, and/or the like, that lead to a perceived, discerned, or known relative satisfaction, outcome, goal, and/or the like, (e.g. an accomplishment relative to a goal, a relatively improved self-satisfaction, Joint-Inventor/Co-Inventor-satisfaction, participant-satisfaction, contributor-satisfaction, entity-satisfaction, partner-satisfaction, co-worker-satisfaction, family-member-satisfaction, spouse-satisfaction (or similar relationship), friend-satisfaction, and/or the like; when relatively compared to historical data for each independently, some combination, some permutation, and/or the like.

Further, a perceived, discerned, or known accomplishment score relative to a goal may track a list of goal attributes, comprising who set the goal, why, how, where and when; who accomplished the goal, why, how, where and when; how relatively significant the goal was perceived before accomplished relative to after it was relatively accomplished, and/or the like, where a number of factors and participants may be involved in the scoring. For example, the IPACE TOU/TOPs and/or the like, may establish that each relative goal accomplishment scoring is only scored by a certain group at specified moments, say after the goal is filed as accomplished by a particular IPACE member.

In another instance, the IPACE TOU/TOPs and/or the like, may establish that each relative goal accomplishment scoring may include data inputs and moments in time, as long as the scoring results satisfy a particular threshold for perception for a particular period of time. For example, perception thresholds may increase based upon such elements as a time elapsed; a preset milestone dates/times; an added participant; a participant added with a particular expertise (e.g. a patent attorney, where for instance, none was participating before); an accomplishment, action, notice, and/or the like by a perceived, discerned, or known competitor (e.g. a patent application filed, published, denied, appealed, PTAB/BPAI affirmed decision, PTAB/BPAI denied decision, a granted patent, a re-exam on a particular patent or claim, a complaint filed in federal court as plaintiff, a cased filed against as an infringer in federal court, an federal court appeal, and/or the like); an event such as an accomplishment, action, notice and/or the like (e.g. a patent application filed, published, denied, appealed, PTAB/BPAI affirmed decision, PTAB/BPAI denied decision, a granted patent, a re-exam on a particular patent or claim, a complaint filed in federal court as plaintiff, a cased filed against as an infringer in federal court, an federal court appeal, and/or the like).

Whereas, the case of the accomplishment, action, notice, and/or the like, by the perceived, discerned, or known competitor; the IPACE system would generate a relative competitor score based upon a tracking and analysis of any perceived, discerned, and/or known overlap per a specific overlap element and/or a segment of overlap elements (e.g. a patent claim (e.g. per country) in development; a patent claim pending; a patent claim issued (e.g. per country); a patent claim re-affirmed after re-exam, a patent claim that is in negotiations for licensing; a patent claim that is licensed; a patent claim that is in litigation; a patent claim awarded a settlement; a patent claim awarded an injunction; a patent claim awarded damages by, say a judge and/or jury; a patent claim awarded damages by, say a judge and/or jury re-affirmed on appeal; a copyright material/data/content in development, published, sold, licensed, awarded damages, and/or the like; a trademark in development, flied for (e.g. per country), granted, licensed, sold, awarded damages, and/or the like; a product, service, manufacturing-method, composition and/or the like, in development, in production, offered for sale, sold, on-sale, public-use, otherwise-available-to-the-public, licensed, and/or the like.

In addition, the relative competitor score based upon the perceived, discerned, and/or known overlap may include overlaps in territories (e.g. resources, manufacturing, selling, consuming, exporting/importing, and/or the like); sales representatives; employees and employee roles (e.g. a relatively high similarity of employee roles within a particular city); contractors and contractor roles; participants, contributors, attorneys, accountants, peers, experts, and/or the like; distributors, shippers, retailers (e.g. store locations, online, and/or the like), Accounts (60), customers, and any segmentation combination, permutation, and/or the like; where the relative competitor score is created (e.g. with details/breakouts for additional data and scores regarding data that was known or discerned at the time the relative competitor score was generated to data that was a perception (based-upon data that is perceived only, or in combination with known or discerned data/statistics, and/or the like, at the time the relative competitor score was generated); and where the results may be prioritize and/or sorted in a variety of manners, permutations, and/or the like. For example, starting with who, where, why, when, and/or the like, are the relatively largest competitors (or the like) per a particular specific overlap element and/or a particular segment of overlap elements.

In addition, the relative competitor score based upon the perceived, discerned, and/or known overlap may include overlaps in resources (manufacturing materials, manufacturing facilities, manufacturing workforce, and/or the like); customer acquisition times and methods (e.g. overlapping online advertising-methods, campaigns, channels, websites, affiliates, targeted audience/customers during the Super Bowl); customer-usage time-of-day (e.g. a person may listen to a car radio or talk on his/her mobile phone while driving his/her car); seasonality sales timelines (e.g. overlapping products where sales perform better in a particular season/day, say downhill skiing on a Saturday in December vs. watching/going-to a college football game); customer-wallets (e.g. overlapping customer entertainment-wallets, say between going to the movies or a comedy-club; or overlapping customer shopping-wallets, say between buying one particular car or another other car, or giving-up movie-nights to pay for the car); and/or the like.

In various non-limiting embodiments, the data reliability/validation score may comprise feedback back from, say specific IPACE Members/users or segments of IPACE members/users, such as Joint-Inventor/Co-Inventors, participants, contributors, co-workers, IPACE Court, former or mock jurors, former PTO examiners, peers, experts, family-members, friends, and/or the like, where such members may be asked to provide input/feedback in general that the IPACE system analyzes; input/feedback to specific questions, and/or the like. The data reliability/validation score of the input/feedback to specific questions may incorporate its own data reliability/validation score for the input/feedback, where say IPACE members who have historically proven relatively more reliable, accurate, punctual, profitable, successful, experienced, intelligent, educated, wise, honest, talented, accomplished, communicative, skilled, and/or the like, may have a relative higher value placed upon his/her answers, input, feedback, results, and/or the like, then say a non-IPACE member/user, a relatively new IPACE member/user and/or who is perceived or historically perceived as less reliable, accurate, punctual, profitable, successful, experienced, intelligent, educated, wise, honest, talented, accomplished, communicative, skilled, and/or the like.

In another instance, the IPACE TOU/TOPs and/or the like, may establish that each relative goal accomplishment scoring may include data inputs, such as feedback back from specific Members or segments of members, such as Joint-Inventor/Co-Inventors, participants, contributors, co-workers, IPACE Court, former or mock jurors, former PTO examiners, peers, experts, family-members, friends, and/or the like.

In addition, the IPACE system also tracks and analyze for correlations, patterns, clustering, and/or the like in a sequence of events that lead to a relative failures, deficiencies, issues, roadblocks, bottlenecks, communication failures, and/or the like (e.g. a relatively productivity, a relative delay, a relative concern, a relative collective concern, and/or the like).

In various non-limiting embodiments, the IPACE system would preferably track and analyze each relatively success, relative productivity, relative delay, relative concern, relative collective concern, and/or the like; and continually update the values per new data, statistics, new correlations, new facts, new laws, new participants, new regulations, new concerns, new group concerns, and/or the like. Further, the IPACE system would preferably track, analyze, score and rank concerns perceived to be relatively the most warranted, most exaggerated, and/or the like, based upon comparisons over time to historical data.

In addition, the IPACE system would preferably track, analyze, score, and rank concerns mostly typically expressed, per user, project type, deadline, art unit, examiner, claim construction type, claim type, and/or the like. Further, the IPACE system would preferably track, analyze, score, and rank concerns perceived to be relatively the most damaging to a particular relationships, type of relation, progress, and/or the like when compare to other concerns.

In various non-limiting embodiments, the IPACE system preferably may track someone's (e.g. an IPACE member/user) overall-personal-state and each personal-state-segment, where segments may comprise of the IPACE member's health (e.g. all measurements of weight, heart rate, and/or the like), medications/drugs (e.g. legal and illegal), nutritional supplements, mood (e.g. relatively happy-to-sad/awake-to-tired/and/or the like when relatively compared to an earlier Overall-personal-state or personal-state-segment), mood-altering events/materials (e.g. music/song/band/lyric-composition, sleep, lack-of-sleep, sex, vice/drug, and/or the like), learning materials (e.g. reading materials, TV view, podcasts, training/education programs, web reading, searches (e.g. Google®, Bing®, Yahoo®, and the like), at the time before, at, and after creating (e.g. hiking, lying in bed, driving to work, in a meeting, at a bar, at a movie, and/or the like); interactions (e.g. with friends, co-workers, inspirational speakers, church, and/or the like) and/or the like; to build and analyze correlations and relative comparisons of, to, and/or between relative success (e.g. speed, cost, ROI, value, and/or the like) and each such overall-personal-state; a collective overall-personal-state; for each personal-state-segment; collectively for all the personal-state-segments collected per a particular segment (e.g. moments of creative after sex).

Further, where the overall-personal-state and the personal-state-segment may be expressed and tracked relative to a moment in time (e.g. a particular date, day of the week, currently, last week, and/or the like) and/or over some iteration (e.g. birthdays, inventing moments, creating music, and/or the like).

Furthermore, where the overall-personal-state and the personal-state-segment may be built, tracked, and analyzed for correlations and relative comparisons of, to, and/or between the relative success one IPACE member/user "A" and another IPACE member/user's "B" states/segments; overall-personal-states and associated personal-state-segments; a particular IPACE member/user or plurality of IPACE members/users; a selected segment of IPACE members/users; and/or the like.

For example, the overall-personal-state and the personal-state-segment tracked and analyzed for correlations and relative comparisons of, to, and/or between the relative success the IPACE member/user "A" and other IPACE member/user states/segments may comprise who may or may not, say most closely match "A's" states/segments (e.g. a song writer who writes many lyrics, but where the lyrics that actually get recorded tend to come from the lyrics he/she writings just after exercising, say those song lyrics written within ninety minutes of hiking at least 3 miles).

In addition, the analyze of the IPACE member/user "A" and other IPACE member/user states/segments for correlations and relative comparisons may incorporate historical data over-the-course of time, to reveal, for example, moments where a particular segment tends to relatively hit a creative-wall (e.g. after a friend's death; an elected change in US President's party; a divorce; a pees death, and/or the like), where the data could go to reveal that it may typically take X number of days to reignite creative, but where such creating is the best/most-successful when relatively compared to that IPACE members' past success; that's associated segments' past success; and/or the like. Here, the creative-wall may be a user-specific-creative-wall relative to the specific IPACE member/user A's historical perceived, discerned, and/or known measurable previous inputs, accomplishments, status, feedback from other, applications, filed, and relative success historically, where a threshold of non-creativity gets created/established, passed, and/or the like. The creative-wall may also be for a collective-group, where the collective-group is comprised of selected segments and/or IPACE members/users; and generates a collective-group-creative-wall, Relative creativity and success scores may get modified over a course of time, where and when additional data and relationships modify history. For example, a non-creative-range may apply to a particular range of time (e.g. years, months, days, hours, minutes, seconds, milliseconds, and/or the like) where data and analysis perceived there to be relatively insufficient input, output, success, and/or the like, when compared to the IPACE member/user's past and/or other IPACE members/users; when an event triggers (e.g. a patent grant/sold/licensed, painting sold, a band signed to a label, a new contract; and/or the like) increases the value of a particular event that falls within that particular range of time during what was the perceived range for non-creativity. In various non-limiting embodiments, the same is true for decreasing a historically-significant-event/range, where the event/range may be a relatively specific moment in time, or a range of time, and where say a subsequent-negative-event causes the value or perceived historically-significant-event/range of the value to drop. For example, where a particular IPACE member/user, say a particular Lead Inventor (40) is denied patent, the patent application goes abandon, the potential patent become sale or leasing deal is not executed, a granted patent is invalidated, a competitor is granted a patent in a related industry/art-unit/classification, a competitor is named as prior art on an application, a competitor initiates a compliant for infringement against the Lead Inventor (40), the Lead Inventor dies before grant or trial is completed, and/or the like); where each subsequent-negative-event would comprise a score for the relative significance towards decreasing the earlier perceived significance, value, and/or the like of the previously considered historically significant event/range.

In various non-limiting embodiments, the IPACE system analysis of data/content would preferably include a scoring, ranking, listing, and/or the like; for a perceived, discerned, and/or known accomplishment (e.g. a school/learning accomplishment: grades, graduation, certificate, degree and/or the like); a religious accomplishment: Baptism, Christening, Bat-Mitzvah, Bar-Mitzvah, confirmation, graduation and/or the like); a physical accomplishment (e.g. strength, endurance, win and/or the like); a military accomplishment (e.g. enlistment, graduation, honorable-discharge and/or the like); a relationship accomplishment (e.g. meet, date, steady, engagement, marriage and/or the like); a family accomplishment (e.g. birth-of-child, adoption, green-card/citizenship-status, and/or the like); a political accomplishment (e.g. run, support, elect, win, pass, jobs, taxes and/or the like); a hobby accomplishment (e.g. build, perform, audience-size, sell, score, win, award, feedback and/or the like); a work accomplishment (e.g. interview, hiring, contract-executed, pay, bonus, stock-equity, benefits, vacation-time, performance-review, feedback, and/or the like); an purchase/acquisition accomplishment (e.g. house, vacation-house, land, car, college, business, travel, stock/equity, outfit/dress and/or the like); a savings-accomplishment (e.g. savings-account-amount, IRA-amount, Trust-amount, and/or the like); a business accomplishment: business-plan, prototype, IP-Accomplishment, funding, contract, partner, product, sale, shipment, and/or the like); an IP-Accomplishment (e.g. patent-application-filing, grant, licensing, infringement-settlement, damages-awarded, and/or the like); and/or the like.

After particular feedback, say a compliment from a particular IPACE Member, user with a status level, say a particular Lead Inventor who has already successfully litigated a granted patent against a well-known industry competitor.

In various non-limiting embodiments, the IPACE system analysis could include what particular room, who else was or wasn't around (e.g. CEO, boss, co-worker, parents, spouse, kids, pets, and/or the like); where each input was perceived to be input. For example, the input could be text, per a known or discerned PC locations, address, unique identifier, per GPS (or similar tracking systems), signal strength limitation of a particular access points (e.g. WiFi café), phone usage (e.g. triangulation), emails, Twitter® statements by the particular IPACE member/user and/or others to him/her or regarding events, location, status, tasks, accomplishments and\or the like. For example, a Twitter® statement from a particular co-worker "B" from an event at a specific time, could create a perception, discerned, or known fact that the particular co-worker "B" was not collaborating with the particular IPACE co-worker "A" at the time, if say, the particular IPACE co-worker "A" was creating new data/content at a different location at the same time the particular co-worker "B" was tweeting.

In various non-limiting embodiments, each relatively success, productivity, delay, concern, and/or the like per individual and/or collectively to isolate and determine patterns for each. For example, the IPACE system tracking and analysis could reveal that a particular inventor tendency to create relatively large patent applications, where data/content is continually added up until it is filed.

Here, the IPACE system analysis for relative success per say a patent claims, could reveal what particular data/content is perceived relatively more valuable, based upon when the data/content was input relative to other data/content (e.g. relatively early or relatively late), how much elapsed time is perceived per concept input, and/or the relative significance of the data/content, input, concept, and/or the like towards a measurable ascertained, discerned, and/or perceived success, accomplishment, benefit, and/or the like. For example, the measurable success could be for a granted patent claim, where the IPACE system may relatively confidently determine what data/content supports the claim, and when the data/content was input, modified, and/or the like, relative to other data/content, say relative late (e.g. with the last day of a 180 day project).

In another example, the measurable benefit could be where the IPACE system may relatively compare a first set of conditions, comprising user's inputs and usage of what applications, tools, features, functions, and/or the like; along with data and analysis regarding what is ascertained, discerned, and/or perceived for what was input when; by who (user/role); utilizing what computer, device, equipment, input device, output devices, storage, access, networks, connections, servers, software, OS, application, tool, feature, function; via what methodology, for how long, where, and/or like; that the IPACE system may analyze and relatively compared to a second set of conditions, comprising relatively similar set of circumstances, elements, inputs, characteristics, components, features, applications, conditions, goals, budgets, incentives, and/or the like, of the first set of conditions. Here, the IPACE system analysis could isolate what particular item or range of items are perceived to caused and/or correlated to a relatively improvement.

Further, the user could selective a particular item or range of items, say feature that is/was relatively unique or new to either the first or second set of conditions, for the IPACE system to specifically and comparatively analyze. For example, the user could specifically, conditionally, and/or selectively filter and/or include the elements to include in the first set of conditions and/or second set of conditions. Further, the IPACE system would preferably automatically, systematically, continuously, persistently, conditionally, and/or via/per actor/user-prompt based a particular relative comparison analysis upon and/or include an actor/user-specified item or group of actor/user-specified items. For instance, the actor/user-specified item or group of actor/user-specified items could be, say a specific employee who is/was performing a relatively new role; a specific patent attorney with a relatively better access to company files; a specific software upgrade to a relatively new version of software; a specific policy change for allowing participants to work relatively more hours from home; a specific tracking system with relatively more reward mechanisms measurable accomplishments; a specific hardware upgrade to relatively faster and more reliable equipment; a specific new mobile application with a relatively faster method to approve modifications; and/or some combination, permutation, and/or the like, of these.

In another example, the measurable accomplishment could be for a particular participant or user (e.g. an employee of a particular company) where the IPACE system may relatively compare a first set of measurements and correlated items against a second set of measurements and correlated items. For instance, the first and/or second set of measurements and correlated items may comprising the user's history of ascertained, discerned, and relatively perceived scores, ranking, assertions, feedback, challenges, and/or the like, over-time and further comprising: a score and a relative ranking for an efficiency (e.g. a system set of efficiency testing, monitoring, and analysis that relatively compares data, statistics, answers, and/or measurements to other moments in time, answers, data, statistics, other users, and/or the like), proficiency and productivity (e.g. a system set of proficiency and productivity testing, monitoring, and analysis that relatively compares data, statistics, answers, and/or measurements to other moments in time, answers, data, statistics, other users, and/or the like), consumed-educational-data/content (e.g. a measure of ascertained, discerned, and/or perceived pages/books read, videos watched, audio heard, and/or the like; preferably with comprehension, and retention testing), intelligence (e.g. a system collection of testing scores, scoring overall, per industry, per work responsibilities, emotional-intelligence testing, and/or the like), skills and aptitude (e.g. a system collection of testing and analysis), attitude (e.g. per user opinions, assessment tests, managers, historical record analysis, and/or the like), prompt and reliable (e.g. a system collection of user inputs, calendars, schedules, requests, communications, responsibilities, and/or the like, that are preferably correlated, monitored and measurably compared to ascertained, discerned, and/or perceived key moments in time, where each moment in time falls along a scored continuum from zero (0) for no relevance to a commitment at that particular moment in time, to, say one-hundred (100), where that particular moment in time has a commitment that is known or discerned to be the relatively most critical and important event; where the user may input and/or the IPACE system may collect and/or monitor data comprising an assumed work arrival/departure time, a meeting time, a presentation time; along with data regarding accumulated and consumed vacation time, comp. time, sick days, tenure, and/or the like; along with an acceptable time gap, for say responding to a particular person regarding a particular issue with a particular level of urgency), attitude (e.g. a system collection per user of opinions, assessment tests, managers, historical record analysis, and/or the like), title (e.g. preferably normalized across the system, the industry, company, and/or the like), prestige and status (e.g. a system collection of user feedback, accomplishments, status points, and/or the like), compensation (e.g. a system collection of compensation offered, rates, accepted, earned, pending, the terms, relative to others, and/or the like), equity (e.g. a system collection of equity offered, accepted, earned, pending, the terms, relative to others, and/or the like), stock options (e.g. a system collection of options offered, accepted, earned, pending, the terms, relative to others, and/or the like), education (e.g. a system collection of schools, events, online, scores, tests, degrees, classes, and/or the like), and/or the like, where each may be relative to a particular window of time, a particular segment (e.g. of responsibilities), a particular project, and/or the like.

Further, the user's inputs/outputs, data, statistics, data/content, tests, correlations, outside feedback/inputs, scores, ranking, and/or the like, are preferably tracked, monitored, analyzed, and/or the like; and where each tracked element and/or input may generate and/or update a score, perception, ranking, and/or the like. Here, the IPACE system analysis comparing the first and second set of measurements and correlated items could isolate what particular item or range of items are perceived to caused and/or correlated to a relatively accomplishment, regression, and/or the like. Further, the analysis and relative comparisons could isolate and/or include data and measurement for accomplishments correlating to a ROI, a historic value, a current value, a future value, and/or the like.

Further, the user could selective a particular item or range of items, say feature that is/was relatively unique or new to either the first or second set of measurements and correlated items, for the IPACE system to specifically and comparatively analyze. For example, the user could specifically, conditionally, and/or selectively filter and/or include the elements to include in the first set of measurements and correlated items and/or second set of measurements and correlated items.

In various non-limiting embodiments, the IPACE system preferably each measurements and correlated item may be systematically acknowledged, countered, challenged, and/or the like by, say the user, the employer, peers, experts, IPACE system, IPACE court, and/or the like.

In various non-limiting embodiments, the IPACE system would preferably analyze and compare a relatively dissimilar set of items, comprising components, measurement, data/content, users, and/or the like; to analyzed and generate a list of relative similarities, correlations, and/or the like. For example, the IPACE system would preferably automatically, systematically, continuously, persistently, conditionally, and/or via/per actor/user-prompt compare a first set of measurements and correlated items against a second set of measurements and correlated items; where there is no known or discerned overlap or where relatively little overlap is perceived between the first and second set of measurements and correlated items.

For instance, the first set of measurements and correlated items could be for a first particular employee (e.g. say a Patent Attorney) of a first particular company (e.g. a prestigious New York IP Law Firm); and the second set of measurements and correlated items; may be for a second particular employee (e.g. say a school teacher) of a second particular company (e.g. a public high school in Los Angeles); where the IPACE system may analyze and relatively compare the measurements and items to generate a list of relative similar items. For example, the list of relatively similar items may reveal that the two employees are relatively most similar when it comes to being prompt for work, followed by an overlap prompt response data to say emails, and so on.

In various non-limiting embodiments, the list of relatively similar items would have a score for each listed item, preferably along with a ranking, any correlated data/content, associated data/statistics, and/or the like. In addition, preferably the user could specifically, conditionally, and/or selectively filter, sort, modify, and/or include specific items, correlated data/content, data, statistics, measurements, elements, conditions, and/or the like. In various non-limiting embodiments, the IPACE system analysis and relatively comparison could incorporate a third set of measurement and correlated items, and so on.

In various non-limiting embodiments, the IPACE system would preferably analyze and compare a relatively dissimilar set of items, comprising components, measurement, data/content, users, and/or the like; to generate a list of correlations. For example, the IPACE system would preferably analyze and compare the relatively dissimilar set of items, comprising components, measurement, functions, and/or the like; along with data and analysis regarding what is ascertained, discerned, and/or perceived for what was input when; by who (user/role); utilizing what computer, device, equipment, input device, output devices, storage, access, networks, connections, servers, software, OS, application, tool, feature, function; via what methodology, for how long, where, and/or like.

In another example, the measurable accomplishment could be where the IPACE system may relatively compare the first set of conditions, comprising user's inputs and usage of what progress, say comprising a relatively similar deadline scenario; set of goals; participants; computer, device, equipment, input device, software, OS, application, tool, feature, function; methodology, quantity of input and/or data/content type (e.g. text, Figures, research, and/or the like) in a relatively similar project, and/or the like, but where a particular item or range of items, is relatively unique or new to relative to other data/content, say relative late (e.g. with the last day of a 180 day project).

In various non-limiting embodiments, the IPACE system would preferably analyze and relatively compare what user input, application tools, features, and/or the like, were relatively mostly used, when compared to other features, a similar quantity of input in a relatively similar project, and/or the like, relative to other data/content, say relative late (e.g. with the last day of a 180 day project); say per a particular segment (e.g. a particular patent claim that was granted).

Health and Brain Analysis In various non-limiting embodiments, the IPACE system would preferably measure brain patterns (e.g. via PET and/or the like) before, during and following a particular classified activity and/or or perceived activity (e.g. creativity, (e.g. conception, creating claims, and/or the like); copying, reading, writing, drawing, influence, hesitation, disorders, simulators (e.g. food, nutrition, drugs, exercise, and/or the like); motivators (e.g. money, credit, time-off, prestige, status, rank, and/or the like); addictions (e.g. and/or the like) and/or the like.

In various non-limiting embodiments, the IPACE system analysis could include historical data from specific participants, relatively similar participants, a group of users, a particular segment of users, and/or the like. The historical data could include medical records, e.g. physicals, blood work, images (e.g. x-rays, PET-scans, MRIs, CAT scans, and/or the like), doctor analysis for health, concerns, disorders, medications, and/or the like. In addition, perceived or projected concerns, issues, disorders, and/or the like, say due relatively a slow heart rate, being relative overweight, being relatively older, and/or the like; a particular member/user/participant history, a family history, and/or the like.

FIG. 99*b* depicts an embodiment of an example screenshot of the user interface where the IPACE member/user has selected to view an Overall Leaderboard 1736*a*. In this instance, a "User's screen View of IPACE-UI/METER/Logged-In" 1669, has been selected utilizing a "METER" menu selection. This causes the subsequent and appropriate menu selections to change accordingly, along with any targeted ads that may appear (e.g. in area 1701*g*, 1672*b*, and/or like).

In various non-limiting embodiments, the system and computer-implement method compromising, receiving a first user input, analyzing the first user input, generating a relative novelty score, where the first user input is relatively compared with a second input, monitoring/analyzing the input novelty score against a relative novelty criteria/fitness, wherein violating the relative novelty criteria/fitness generates a prompt, sending the prompt to an entity, and receiving a decision from the entity. The IPACE system and computer-implement method above, wherein the prompt may be a threshold adjustment, an alert, an acknowledgement, a correction, a suggestion, a decision, a counter-proposal, a fee-adjustment, a billing-adjustment, a score-adjustment, a competition, litigation, and/or the like. The IPACE system and computer-implement method above, wherein the decision may be a final, partial absolute, temporary, contingent, conditional, circumstantial, finite, counter, acceptance, suspension, throttle, variation, termination, suggestion, rejection, licensing, litigation, arbitration, mediation, and/or the like, decision.

In various non-limiting embodiments, the system and computer-implement method compromising, receiving a first user input, analyzing the first user input, generating a relative novelty score, where the first user input is relatively compared with a second input, monitoring/analyzing the input novelty score against a relative novelty criteria/fitness, wherein violating the relative novelty criteria/fitness generates a prompt, sending the prompt to an entity, and receiving a decision from the entity. The IPACE system and computer-implement method above, wherein the prompt may be a threshold adjustment, an alert, an acknowledgement, a correction, a suggestion, a decision, a counter-proposal, a fee-adjustment, a billing-adjustment, a score-adjustment, a competition, litigation, and/or the like. The IPACE system and computer-implement method above, wherein the decision may be a final, partial absolute, temporary, contingent, conditional, circumstantial, finite, counter, acceptance, suspension, throttle, variation, termination, suggestion, rejection, licensing, litigation, arbitration, mediation, and/or the like, decision.

The IPACE system and computer-implement method above, wherein the relative novelty criteria/fitness is relative to the first user. The IPACE system and computer-implement method above, wherein the relative novelty criteria/fitness may be relative to a second user, a plurality of users, a panel of judges, an algorithm, a qualified expert, some variation/combination/permutation of these, and/or the like.

The IPACE system and computer-implement method above, wherein the relative novelty criteria/fitness may be relative to an overlap, non-overlap, union, non-union, Boolean operation, algorithm, usage criteria, style criteria, temporal criteria, segment criteria/filter, project criteria/filter, application, Operating System, device, location criteria/filter, domain, industry, art-unit, success criteria/threshold, investment criteria/threshold, participation criteria/threshold, participant criteria/threshold, budget criteria/threshold, point-system criteria/threshold, income criteria/threshold, profit criteria/filter/threshold, and/or the like.

In various non-limiting embodiments, the disclosed system and associated computer-implement methods compromising, receiving a first user input, analyzing the first user input, generating a list of scored criteria/fitness/threshold comprising an absolute and/or a relative score for novelty, non-obviousness, authorship, enablement-disclosure/support for a Person Having Ordinary Skill In The Art (PHOSITA), utility provided, legality, successfulness, reliability, creditability, accuracy, popularity, temporal, demographic, psychological, behavioral, legibility, legality, offensiveness, complaints, insults, deception, fraud, credit-worthiness, predictability, impulsivity, commercial-viability, participant health, industry health, patent office health, attractiveness, suitability, sustainability, marketability, success-likelihood, commercial-success-likelihood, practicality, efficiency, efficacy, desirability, infringers, potential infringers, likely infringers, and/or the like; where the first user input is relatively compared with a second input, monitoring/analyzing the inputs from the list of scored criteria/fitness/threshold against a relative from the scored criteria/fitness/threshold list score, wherein violating the absolute and/or relative from the scored criteria/fitness/threshold list score generates a prompt, sending the prompt to an entity, and receiving a decision from the entity.

Systems that delineate tasks, resources, incentives, roles, skills, experience, offers, and tracks progress and successfulness may greatly improve efficiencies and ultimately innovations. This system provides Inventors (70), original idea creators, Reporters (63), Predictors (62), judges, Peers (65), Experts (75), and/or the like; an ability to participate and collaborate in a confidential network of people with a wide range of expertise, and who better may help the Campaign Gatekeeper (42) who is a Lead Inventor (40), timely develop a product, service, work-product, hobby, craft, idea, concept, and/or file his/her patent, copyright, trademark application, while minimizing the risks to the Inventor and his/her invention. Further fostering motivation, skills, creativity, and available experience.

It may help the Campaign Gatekeeper (42) who is, for instance, a restaurant owner, timely develop a marketing materials, a menu, a pricing plan, products, services, and/or the like to run his/her business with the IdeaSocket module. It may help the Campaign Gatekeeper (42) who is, for instance, a person placing a report regarding an event he/she witnessed, and/or the like, to run then track and credit this person for who, when, where, how and what was reported by who, when, where and the like with the $1^{st}$2Report module. It may help the Campaign Gatekeeper (42) who is, for instance, a person creating a prediction regarding a political outcome, and/or the like, to then track and credit this person for how relatively accurate he/she was in the prediction and the like, with the $1^{st}$2Predict module.

The disclosure presents various methods performed by a computer having a memory and a processor for data interchange, the method compromising a receiving a second input to a processor; analyzing the second input with the processor; generating a relative novelty score, where the second input is relatively compared with a first input; analyzing the relative novelty score with a relative novelty criteria, wherein an input violating the relative novelty criteria generates a prompt; sending the prompt to an entity; and receiving a decision from the entity.

The disclosure presents various methods performed by a computer having a memory and a processor for data interchange, the method compromising: a receiving a first input to a processor; analyzing the first input utilizing the processor; generating a relative novelty score, where the first input is relatively compared with a second input; analyzing the relative novelty score against a relative novelty criteria, wherein a violation of the relative novelty criteria; generates a prompt; sending the prompt to an entity; and receiving a decision from the entity.

Further, wherein the prompt is a request. Further, wherein the prompt is an adjustment. Further, wherein the prompt is a counter. Further, wherein the prompt is a second decision. Further, wherein the prompt is an acknowledgement. Further, wherein the decision is a final. Further, wherein the decision is contingent. Further, wherein the decision is a partial. Further, wherein the decision is a collection.

Further, wherein the relative novelty criteria is relative to the first input. Further, wherein the relative novelty criteria is relative to a second input. Further, wherein the relative novelty criteria is relative to a plurality of inputs. Further, wherein the relative novelty criteria is relative to a panel of judges. Further, wherein the relative novelty criteria is relative to an algorithm. Further, wherein the relative novelty criteria is relative to a qualified expert. Further, wherein the relative novelty criteria is relative to an overlap. Further, wherein the relative novelty criteria is relative to a usage criteria.

The disclosure presents various methods performed by a computer having a memory and a processor for data interchange, the method compromising. a receiving a first user input; analyzing the first user input; generating a relative accuracy score, where the first user input is relatively compared with a second input; analyzing the relative accuracy score against a relative accuracy criteria, wherein a violation of the relative accuracy criteria generates a prompt; sending the prompt to an entity; and receiving a decision from the entity.

The disclosure presents various methods performed by a computer having a memory and a processor for information extraction, natural language processing, and relationship mapping, including parsing, analyzing, indexing, classifying, evaluating, and/or the like, including the utilization of semantics analysis where each every data element, object, person, item, node, device, location, subject, delineation, segment, interval, and/or the like, mentioned herein should be considered a node for relationship mapping. Further, where this entire specification, pages, headings, paragraphs, sentences, words, figures, steps, parts, objects, tables, fields, and/or the like is a node, and/or can be parsed and treated like a node for relationship purposes. Further, each and every element herein this specification, pages, headings, paragraphs, sentences, words, figures, steps, parts, objects, tables, fields, node, user, term, rule, element, and/or the like can be parsed, analyzed, and evaluated to provide a relationship to each every other node, including nodes referenced outside the specifications, such as website, other art, prior applications. Further, each and every element herein this specification, pages, headings, paragraphs, sentences, words, figures, steps, parts, objects, tables, fields, node, user, term, rule, element, and/or the like can be parsed, analyzed, and evaluated to generate triples, IP-Triples, triple statements, IP-Statements, and/or the like.

The foregoing description of the present disclosure has been provided for purposes of illustration and description. It is not intended to be exhaustive or to limit any invention to the precise forms disclosed. Many modifications and variations will be apparent to the practitioner skilled in the art. Embodiments were chosen and described in order to best explain the principles of any particular invention and its practical application, thereby enabling others skilled in the art to understand any particular invention, the various embodiments and with various modifications that are suited to the particular use contemplated. It is intended that the scope of a particular invention be defined by the following claims and their equivalents.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method of performing an automated predictive evaluation of one or more user inputs, implemented at least in part by one or more computing devices each connected to a central server, the method comprising:

receiving at the central server, the one or more user inputs through a user interface on the one or more computing devices;

identifying a preselected database including one or more contents, selected from at least one repository within one or more content servers, each of the one or more contents being associated to one or more authors; wherein the selection of the one or more contents comprising:

performing one or more searches relating to the one or more user inputs to determine relevant contents from a plurality of contents stored on the one or more content servers;

for each of the relevant contents, checking if there is a conflict in authorship to determine conflicting contents;

filtering out the conflicting contents;

selecting an analysis module depending upon the one or more user inputs, the analysis module comprising a set of rules for automatically analyzing the one or more user inputs, the set of rules being stored within a rules repository and adapted to be updated or modified in accordance to one or more events; and generating an output utilizing the selected analysis module;

wherein the one or more data content servers are connected to each other using a communication connection and being constantly updated in real time with modifications in any of the plurality of contents or addition of new contents onto the one or more content servers.

2. The method of claim 1, wherein each of the computing devices is connected to the central server through a TCP/IP connection via World Wide Web using an internet browser.

3. The method of claim 1, wherein the communication connection is selected from one or more of but not limited to a TCP/IP connection, a mobile network and a wireless connection.

4. The method of claim 1, wherein the conflict in the authorship is determined using an authorship content module.

5. The method of claim 4, wherein the authorship content module comprising one or more criterion identifying content from a predetermined author as being conflicting.

6. The method of claim 1, wherein the predictive evaluation comprising a patentability profile of the one or more user inputs wherein further the analysis module comprises a patentability module.

7. The method of claim 6, wherein the patentability profile includes an estimated likelihood of a novelty of the one or more user inputs relative to the preselected database.

8. The method of claim 7, wherein the preselected database is a defined IP universe.

9. The method of claim 6, wherein the patentability module is adapted to determine a relative overlap of each of the one or more contents with the one or more user inputs.

10. The method of claim 1, wherein the one or more authors comprising a content contributor or a participant selected from one or more of inventors, project managers, draftsperson, editors, proofers, reviewers, attorneys, patent attorneys, patent agents, other licensed professionals, engineers, non-certified experts, researchers, translator, instructors, recruiters, press, PR, advertiser, employees, contractors, peers, professors, students, IP prosecutors, IP licenser, IP acquirer, IP litigators, former BPAI judges, former PTAB judges, former PTO examiner, former jury members, or web based sources including patent office databases, USPTO, PCT, WO, WIPO, EPO, per country, Japan, China, Korea, India, Canada, Mexico, Australia, Brazil, Russia, all other countries, job sites, job postings, websites, legal records, court records, patent litigation records, patent licensing records, court records, articles, RSS feeds, newsfeeds, and social media.

11. The method of claim 1, wherein the one or more events comprising an update within an information value stored within an information model repository.

12. The method of claim 11, wherein the information value stored within the information model repository is dynamically bounded to one or more updates or modification within the plurality of contents of the one or more content servers.

13. The method of claim 1, wherein the one or more events comprising an artificial intelligence system based evaluation of updates or modifications within the plurality of contents stored on the one or more content servers.

14. The method of claim 1, wherein the one or more events comprising an artificial intelligence system based evaluation of updates or modifications within a continually improving indexed pre-analysis.

15. The method of claim 1, wherein the one or more user inputs comprising a patent claim input directed towards a particular project.

16. The method of claim 1, further comprising revising the patent claim input to generate a modified patent claim input and electronically running the patentability module to determine a modified patentability profile for the modified patent claim input.

17. The method of claim 16, wherein the patentability profile includes an evaluated contribution of each of the authors to the patent claim input.

18. The method of claim 17, wherein the evaluated contribution is determined by evaluating a relative overlap of each of the contents of each of the authors with the patent claim input.

19. The method of claim 18, wherein the evaluated contribution includes a determined compensation for at least one of the authors.

20. A method of determining a patentability profile of a patent claim input, implemented at least in part by one or more computing devices each connected to a central server, the method comprising:

receiving at the central server, the patent claim input through a user interface on the one or more computing devices;

identifying a preselected database including one or more contents, selected from at least one repository within one or more content servers, each of the one or more contents being associated to one or more authors; wherein the selection of the one or more contents comprising:

performing one or more searches relating to the input query to determine relevant contents from a plurality of contents stored on the one or more content servers;

for each of the relevant contents, checking if there is a conflict in authorship to determine conflicting contents;

filtering out the conflicting contents; and running a patentability module adapted to determine a relative overlap of each of the one or more contents with the user claim input, the patentability module comprising a set of rules for automatically analyzing the user claim input, the set of rules being stored within a rules repository and adapted to be updated or modified in accordance to one or more events;

wherein the one or more content servers are connected to each other using a communication connection and being constantly updated in real time with modifications to the one or more contents or addition of new contents therewithin.

* * * * *